US007591539B2

(12) United States Patent
Silverbrook

(10) Patent No.: US 7,591,539 B2
(45) Date of Patent: Sep. 22, 2009

(54) INKJET PRINTHEAD WITH NARROW PRINTING ZONE

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 620 days.

(21) Appl. No.: 10/922,879

(22) Filed: Aug. 23, 2004

(65) Prior Publication Data

US 2005/0024435 A1 Feb. 3, 2005
US 2008/0024556 A9 Jan. 31, 2008

Related U.S. Application Data

(63) Continuation-in-part of application No. 10/407,212, filed on Apr. 7, 2003, now Pat. No. 7,416,280, which is a continuation of application No. 09/113,122, filed on Jul. 10, 1998, now Pat. No. 6,557,977.

(30) Foreign Application Priority Data

Jul. 15, 1997 (AU) .................................... PO7991
Jul. 15, 1997 (AU) .................................... PO8004

(51) Int. Cl.
*B41J 2/04* (2006.01)

(52) U.S. Cl. ............................ 347/54; 347/43; 347/65

(58) Field of Classification Search .................. 347/20, 347/54, 56, 61–65, 67–68, 40, 42–44, 12, 347/13, 47, 70–72; 60/527–529
See application file for complete search history.

(56) References Cited

U.S. PATENT DOCUMENTS 4,032,929 A 6/1977 Fischbeck et al.

(Continued)

FOREIGN PATENT DOCUMENTS

DE 3245283 6/1984

(Continued)

OTHER PUBLICATIONS

Abstract JP 2265751 Oct. 30, 1990 App No. 6486202 (Matsushita Electric Ind Co Ltd).

(Continued)

*Primary Examiner*—Juanita D Stephens

(57) ABSTRACT

An inkjet printhead that has an array of drop ejection apparatuses formed by lithographic etching and deposition techniques on a first side of a supporting wafer substrate. Each of the drop ejection apparatuses having a chamber with a nozzle and an actuator for ejecting drops of ink through the nozzle. A plurality of ink supply conduits extending through the wafer from a second side of the wafer to the array of drop ejection apparatuses on the first side. The array is configured into adjacent rows of the drop ejection apparatuses and each of the ink supply conduits such that each of the ink supply conduits supplies ink to the drop ejection apparatuses in two adjacent rows. By feeding adjacent rows of nozzle from a common ink supply conduit extending from the back side of the wafer, the rows can be positioned very close together. This makes the array very thin which inherently reduces the width of the print zone. This in turn reduces the need for the media feed system to accurately flatten the media as it passes the printhead. This is particularly advantageous for pagewidth printheads because reducing the width of the print zone in scanning printheads increases the number of scans needed per page which tends to slow the print speed.

88 Claims, 564 Drawing Sheets

U.S. PATENT DOCUMENTS

| | | | | |
|---|---|---|---|---|
| 4,210,920 | A | 7/1980 | Burnett et al. | |
| 4,460,905 | A | 7/1984 | Thomas | |
| 4,576,111 | A | 3/1986 | Slomianny | |
| 4,633,267 | A | 12/1986 | Meinhof | |
| 4,723,131 | A | 2/1988 | Droit | |
| 4,737,802 | A | 4/1988 | Mielke | |
| 4,864,824 | A | 9/1989 | Gabriel et al. | |
| 5,016,023 | A * | 5/1991 | Chan et al. | 347/42 |
| 5,119,116 | A * | 6/1992 | Yu | 347/65 |
| 5,602,574 | A * | 2/1997 | Williams | 347/43 |
| 5,719,604 | A * | 2/1998 | Inui et al. | 347/54 |
| 5,812,159 | A * | 9/1998 | Anagnostopoulos et al. | 347/55 |
| 5,903,380 | A | 5/1999 | Motamedi et al. | |
| 5,982,521 | A | 11/1999 | Bessho et al. | |
| 6,130,689 | A | 10/2000 | Choi | |

FOREIGN PATENT DOCUMENTS

| | | |
|---|---|---|
| DE | 4139731 | 6/1993 |
| EP | 0189794 | 8/1986 |
| EP | 371763 | 6/1990 |
| EP | 0417673 | 3/1991 |
| EP | 0479441 | 4/1992 |
| EP | 0671271 | 9/1995 |
| GB | 2262152 | 6/1993 |
| GB | 1569425 | 12/1997 |
| JP | 359093356 | 5/1984 |
| JP | 03202351 | 12/1989 |
| SE | 9601403 | 10/1997 |
| WO | WO 86/05722 | 10/1986 |
| WO | WO 97/12689 | 4/1997 |

OTHER PUBLICATIONS

Abstract JP2265752 Oct. 30, 1990 App No. 6486205 (Matsushita Elec Ind Co Ltd).

Abstract JP2150353 Jun. 8, 1990 App No. 63303835 (Nec Home Electron Ltd).

Abstract JP06106725 Apr. 19, 1994 App.No. 04274410 (Ricoh Co Ltd).

Abstract JP06134985 May 17, 1994 App No. 04289974 (Ricoh Co Ltd).

Abstract JP06336011 Dec. 6, 1994 App No. 05129167 (Sharp Corp).

Abstract JP03065349 Mar. 20, 1991 App No. 01201587 (Matsushita Elec Ind Co Ltd).

Abstract JP05318724 Dec. 3, 1993 App No. 04125268 (Seikosha Co Ltd).

Abstract JP04368851 Dec. 21, 1992 App No. 03144576 (Seiko Epson Corp).

Abstract JP60131254 Jul. 12, 1985 App No. 58240583 (Ricoh Co Ltd).

Abstract JP04129745 Apr. 30, 1992 App No. 02252254 (Seiko Epson Corp).

Abstract JP02219655 Sep. 3, 1990 App No. 01041035 (Sharp Corp).

Abstract JP02273241 Nov. 7, 1990 App No. 01094761 (Ricoh Co Ltd).

Abstract JP04357039 Dec. 10, 1992 App No. 03131219 (Rohm Co Ltd).

Abstract JP02034342 Feb. 5, 1990 App No. 63185095 (Seiko Epson Corp).

Abstract JP55059972 vol. 004, No. 102 (M-022) Jul. 22, 1980 (Seiko Epson Corp).

Abstract JP04126255 vol. 016 No. 384 (M-1296) Aug. 17, 1992 (Seiko Epson Corp).

* cited by examiner

| | | |
|---|---|---|
| Silicon | Sacrificial material | Elastomer |
| Boron doped silicon | Cupronickel | Polyimide |
| Silicon nitride ($Si_3N_4$) | CoNiFe or NiFe | Indium tin oxide (ITO) |
| CMOS device region | Permanent magnet | PTFE |
| Aluminum | Polysilicon | Conductive PTFE |
| Glass ($SiO_2$) | Titanium Nitride (TiN) | Terfenol-D |
| Copper | Titanium boride ($TiB_2$) | Shape memory alloy |
| Gold | Adhesive | Tantalum |
| | Resist | Ink |
FIG. 702
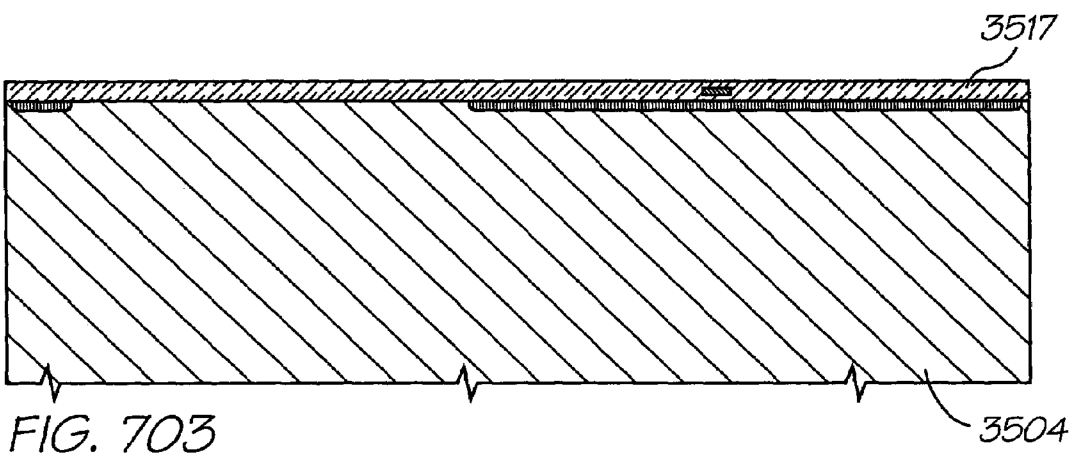
FIG. 703
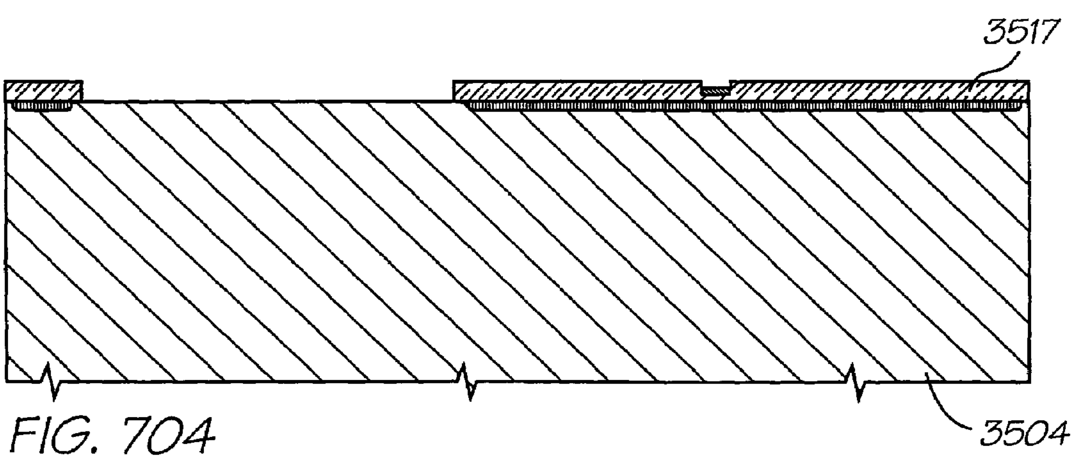
FIG. 704

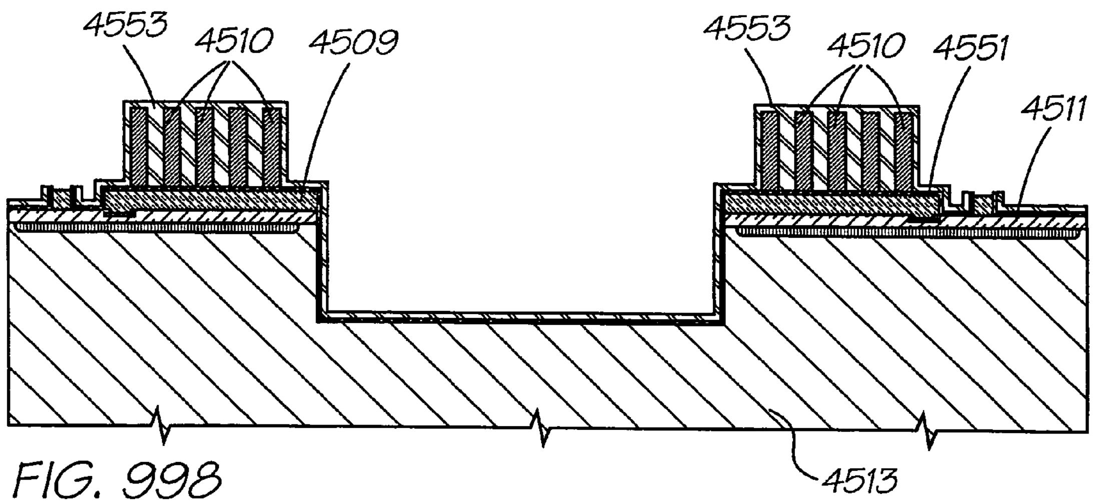
FIG. 998
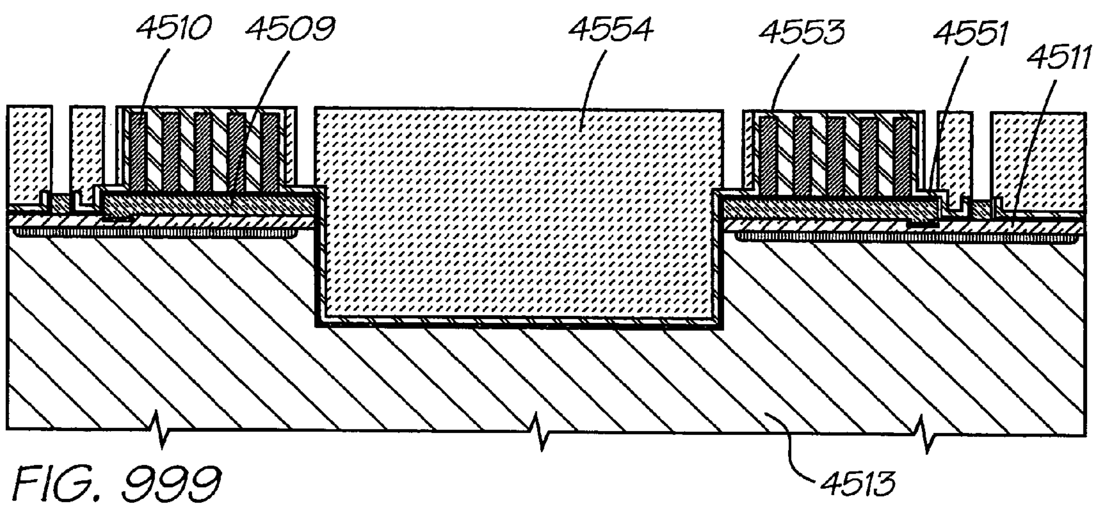
FIG. 999
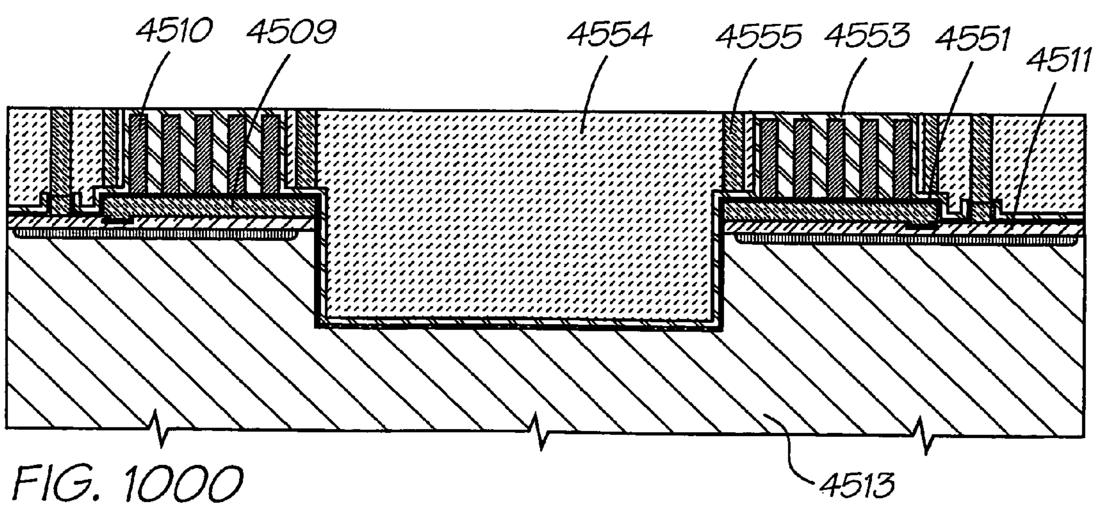
FIG. 1000

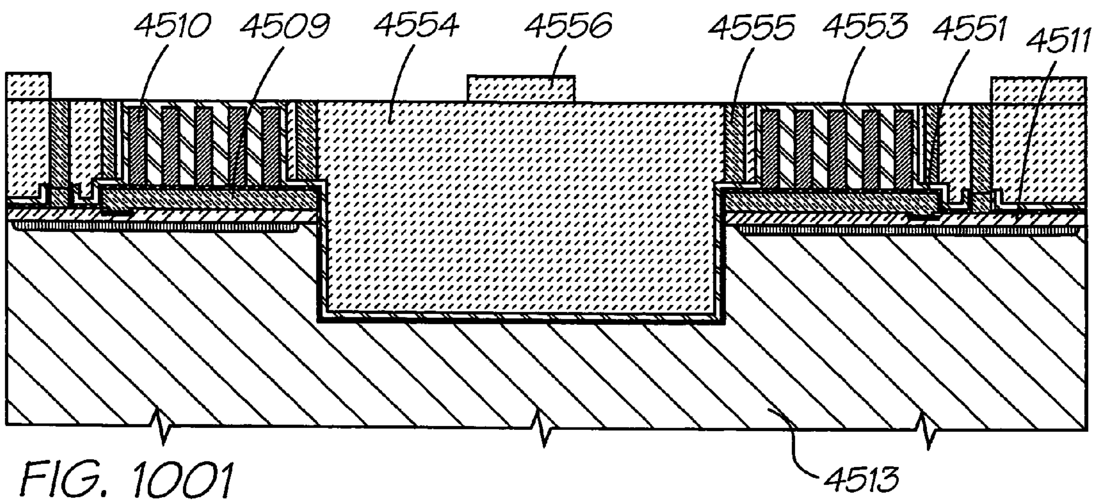
FIG. 1001
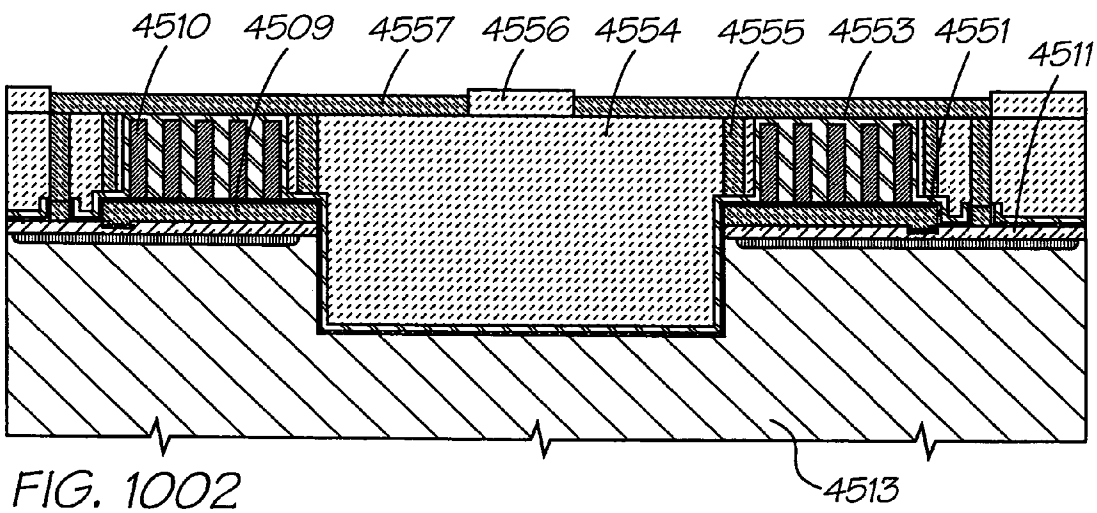
FIG. 1002
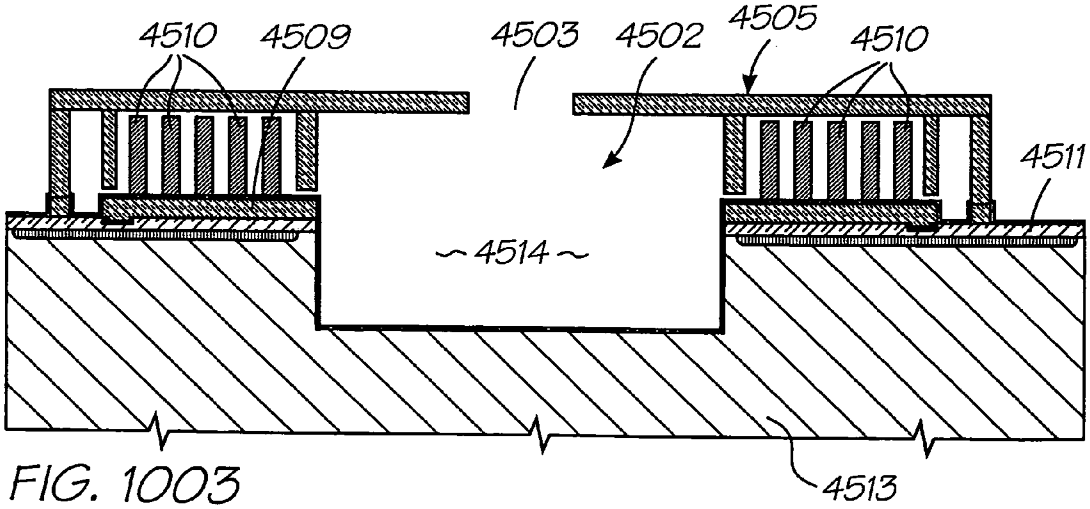
FIG. 1003

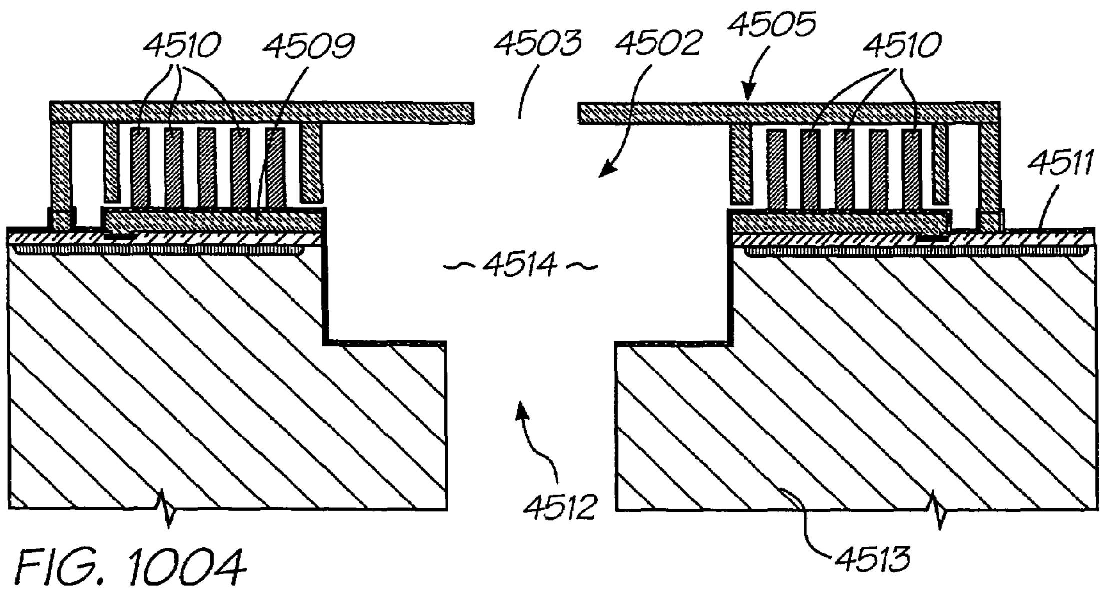
FIG. 1004
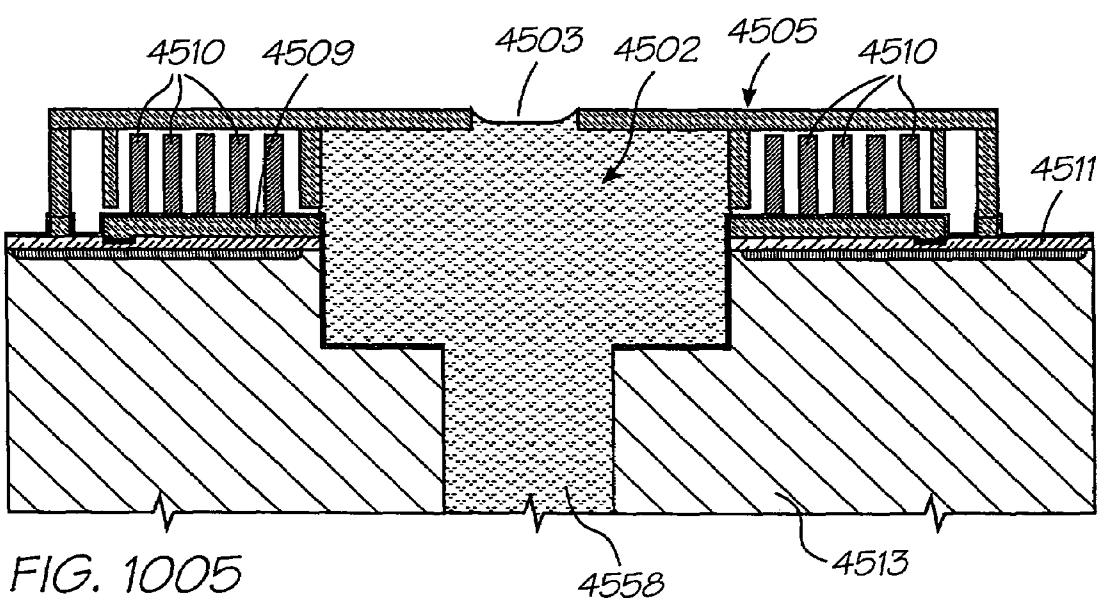
FIG. 1005

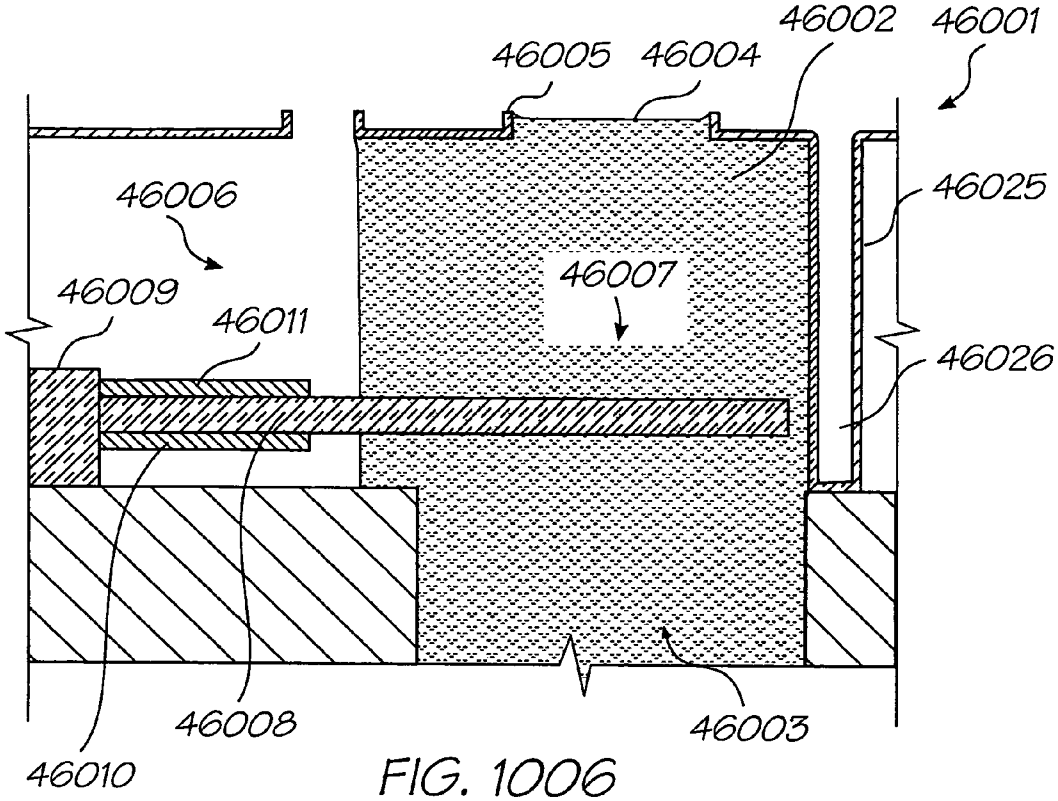
FIG. 1006
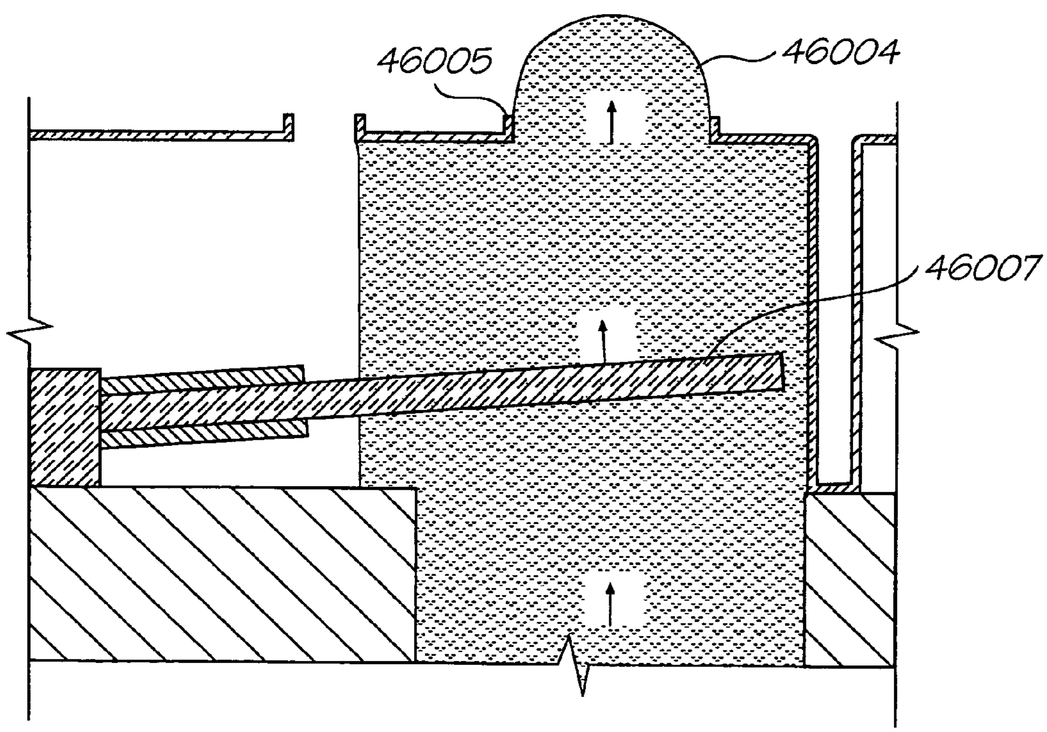
FIG. 1007

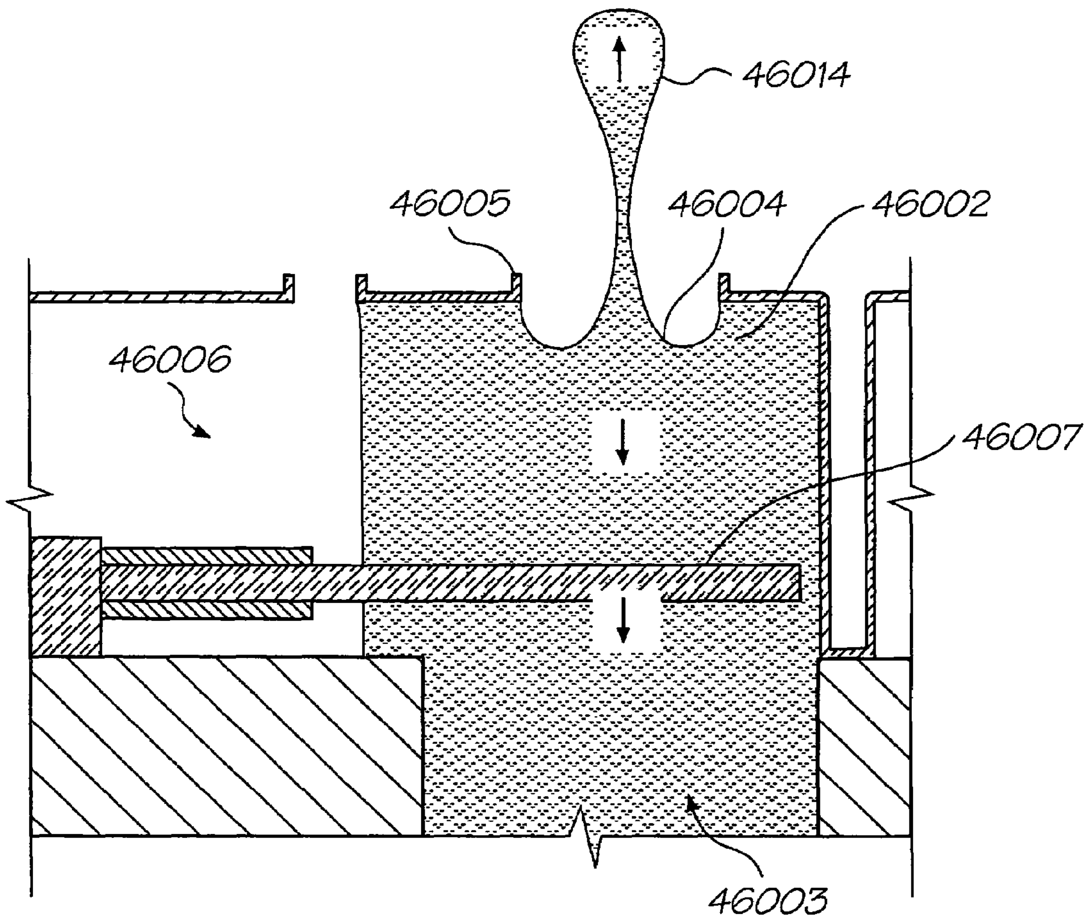
FIG. 1008
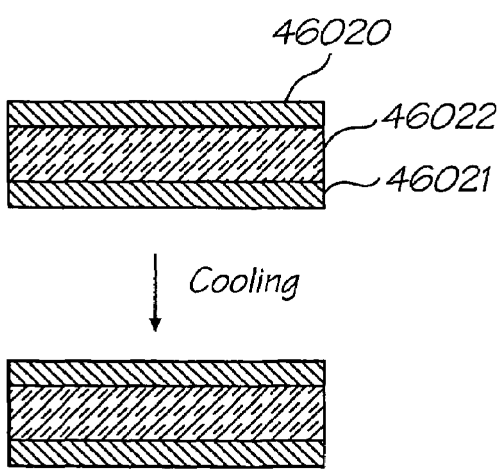
FIG. 1009
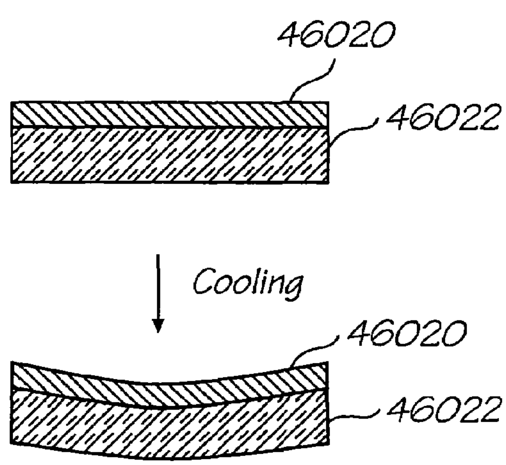
FIG. 1010

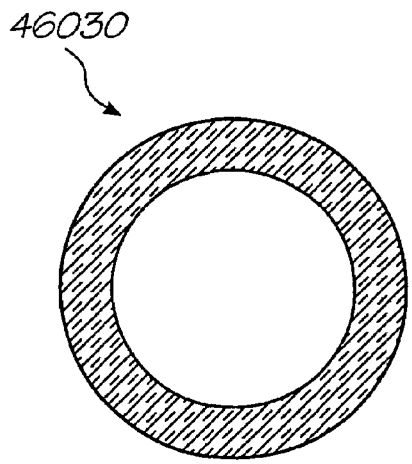
FIG. 1011
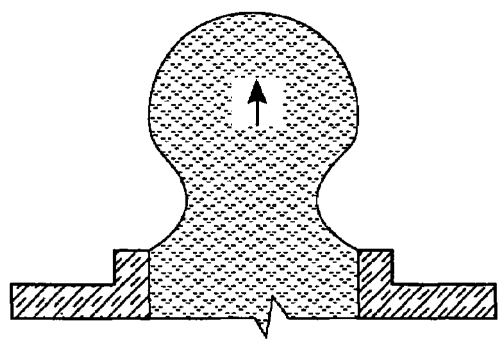
FIG. 1012
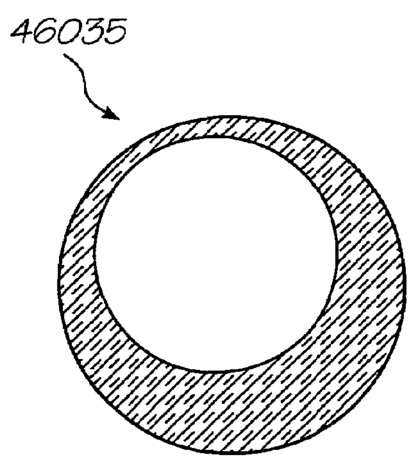
FIG. 1013
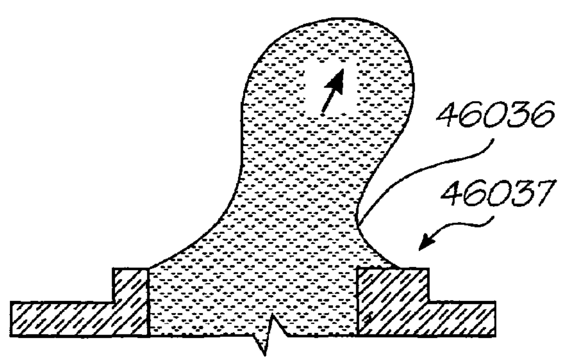
FIG. 1014

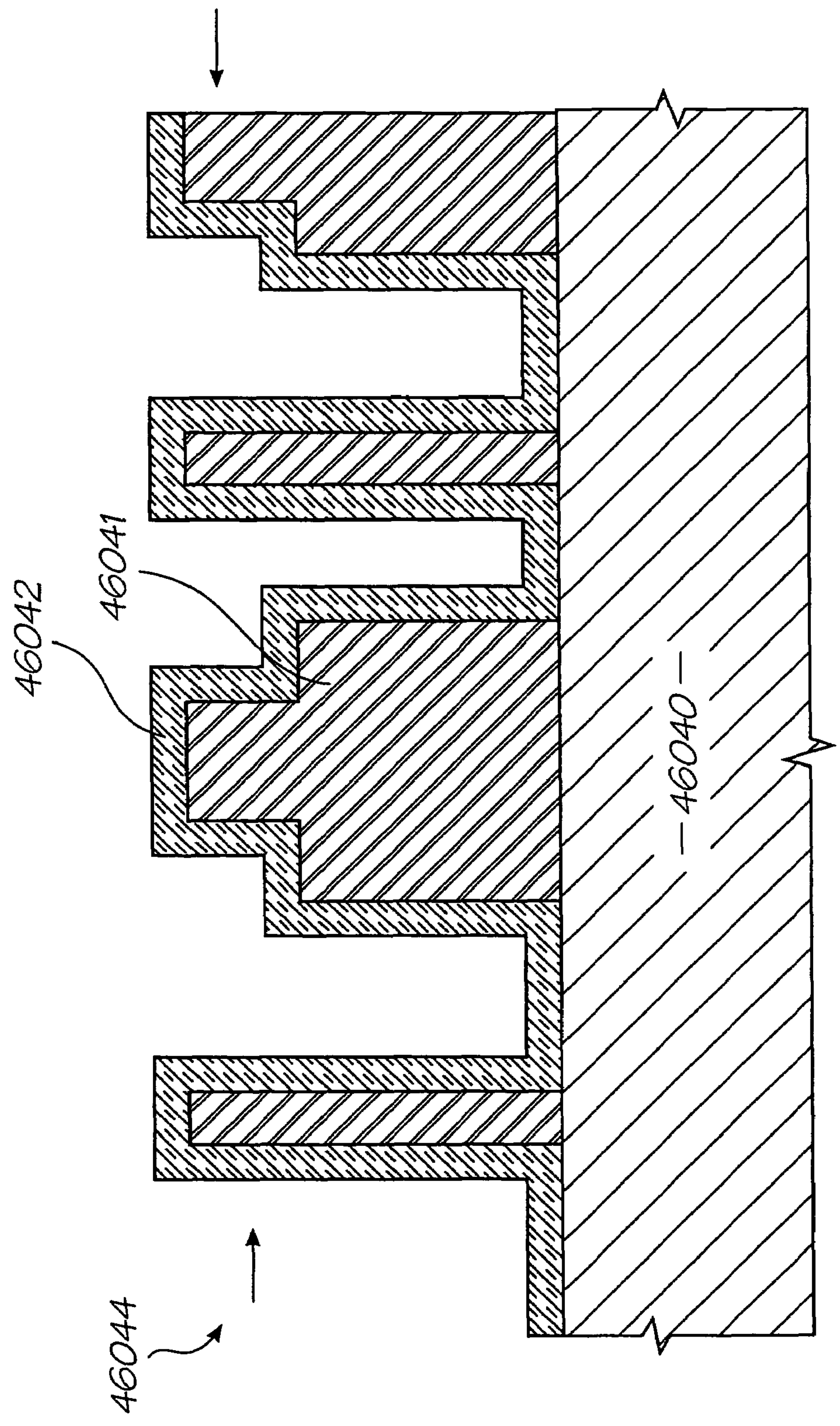
FIG. 1015

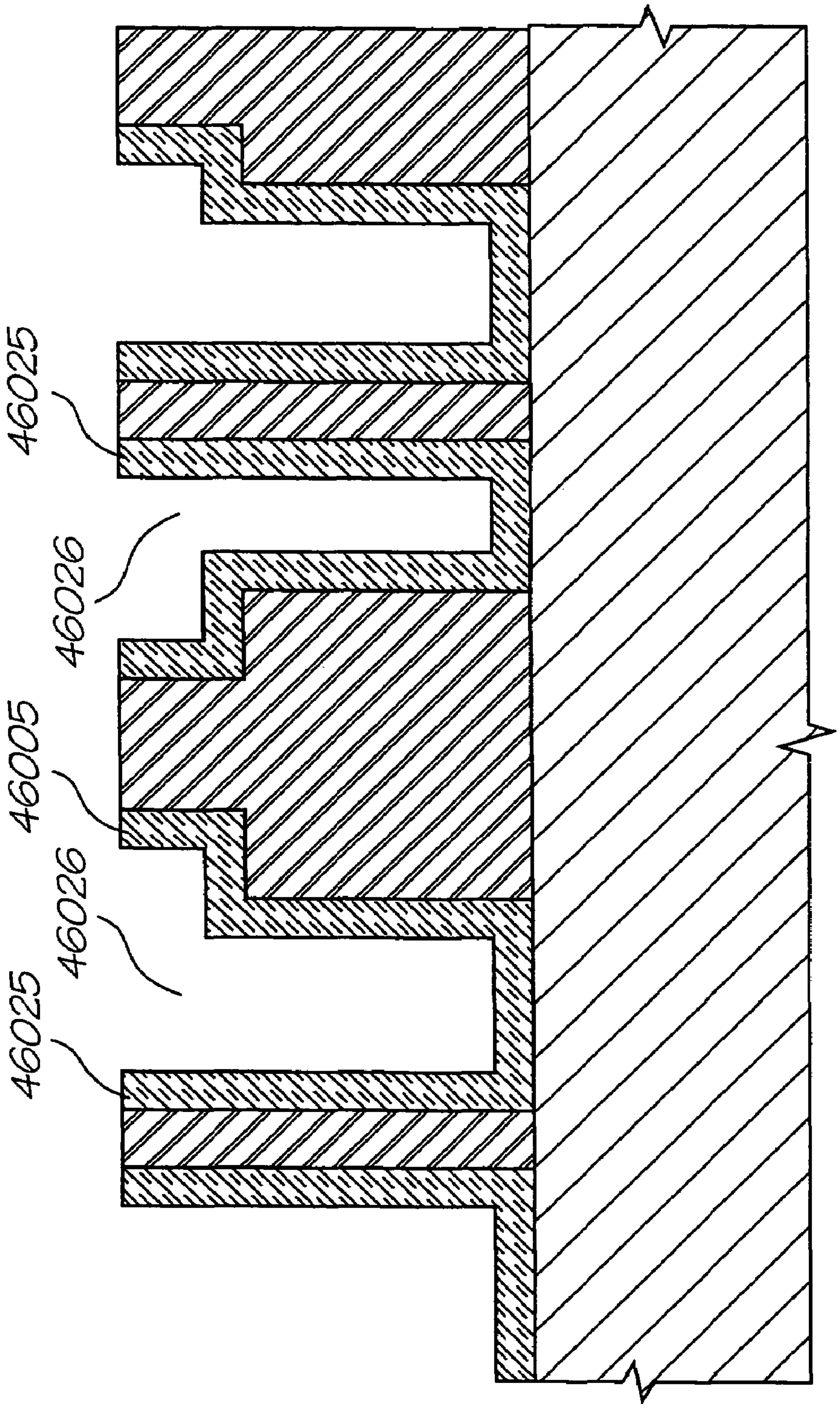
FIG. 1016

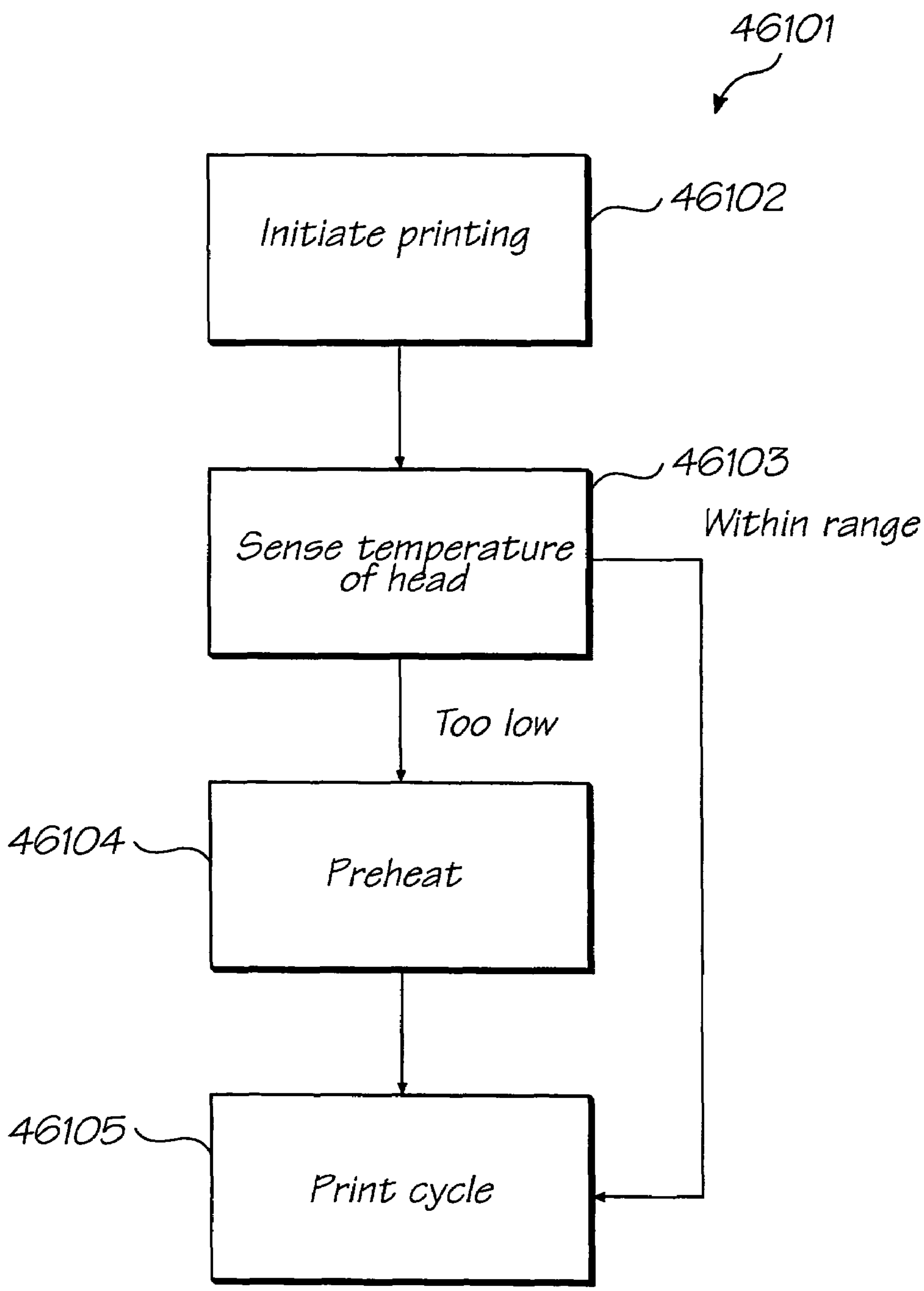
FIG. 1017

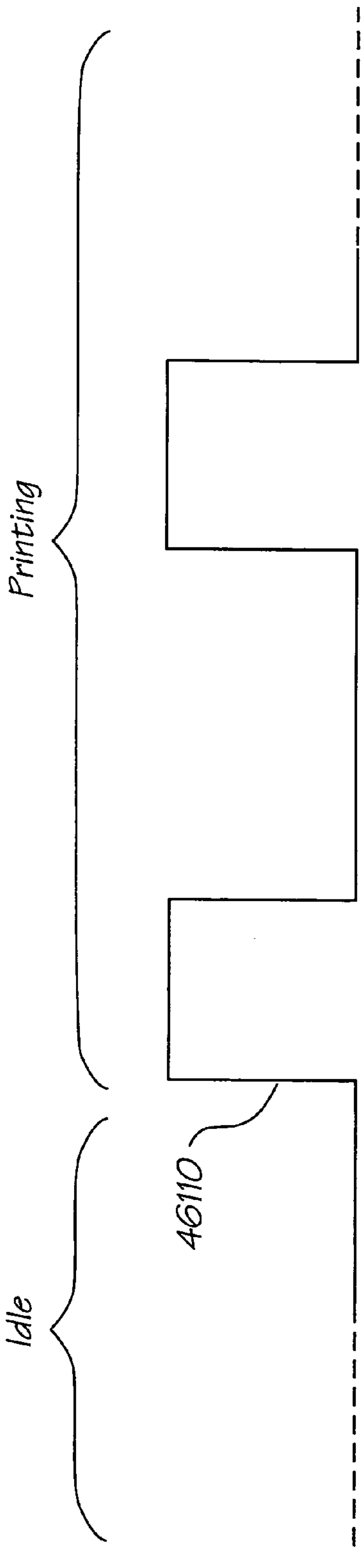
FIG. 1018
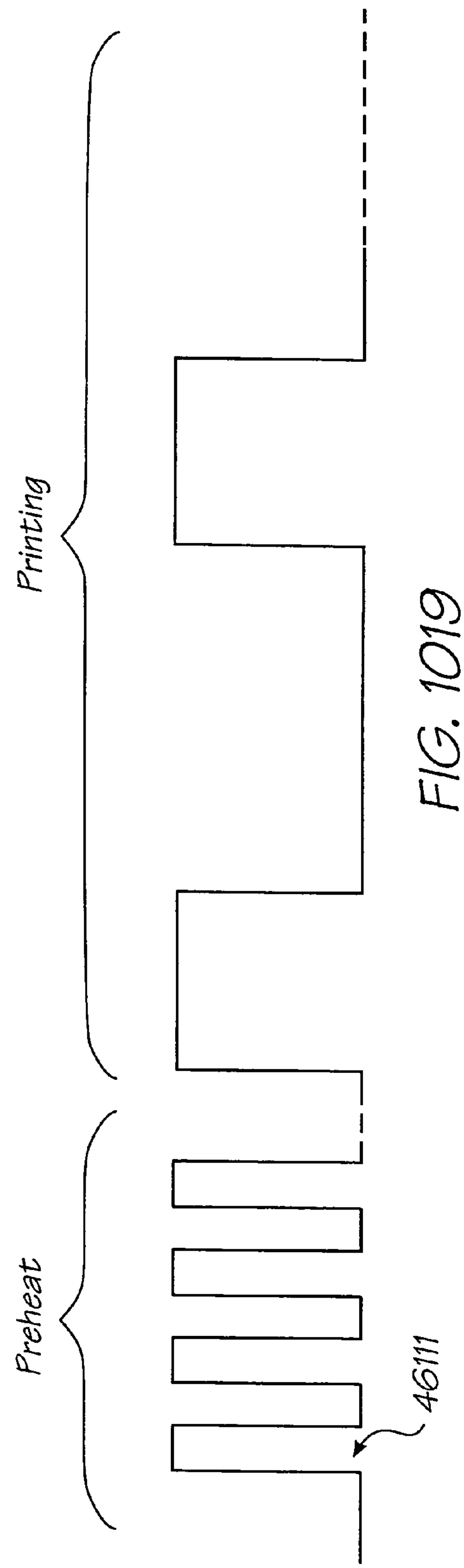
FIG. 1019

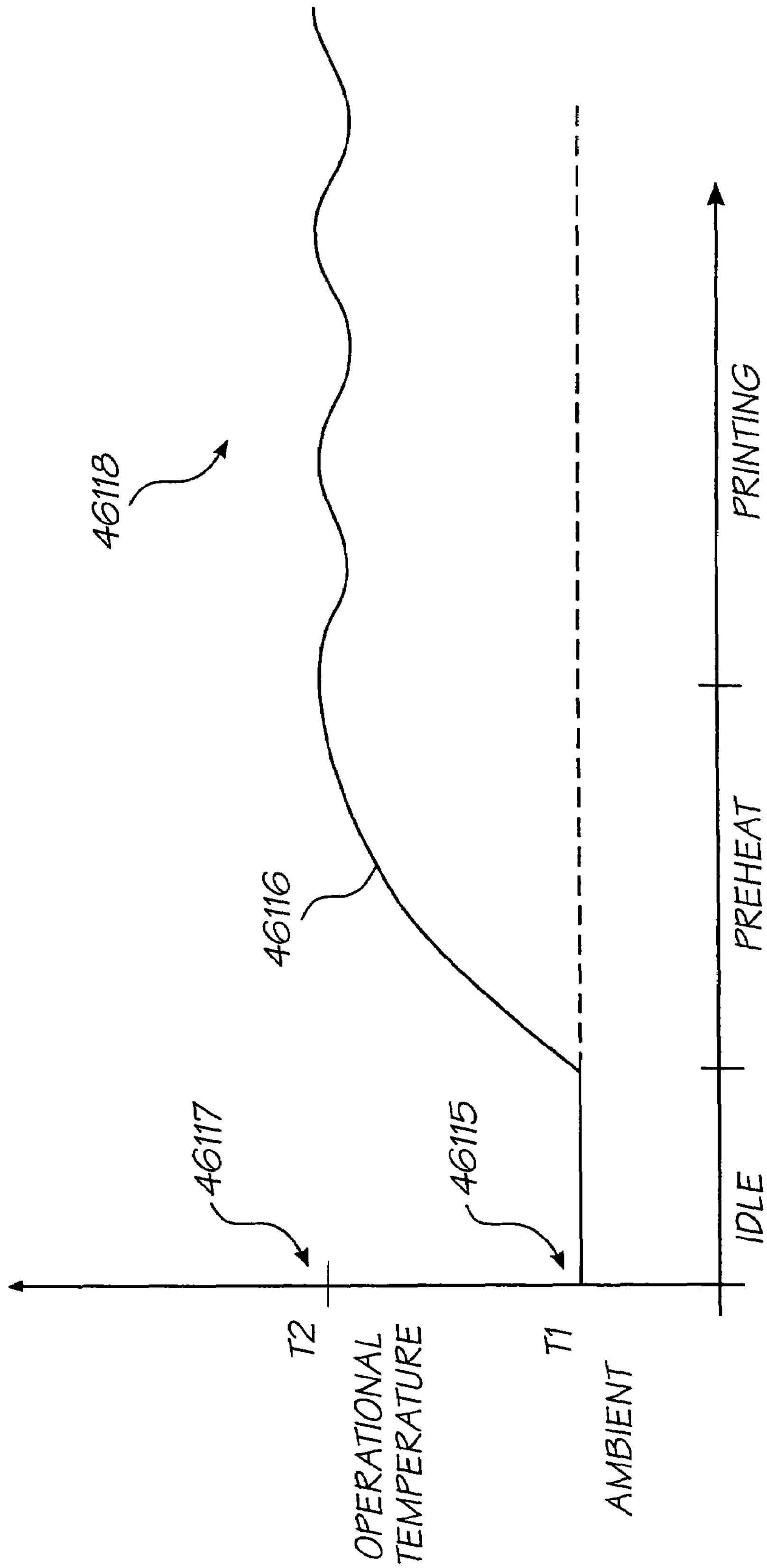
FIG. 1020

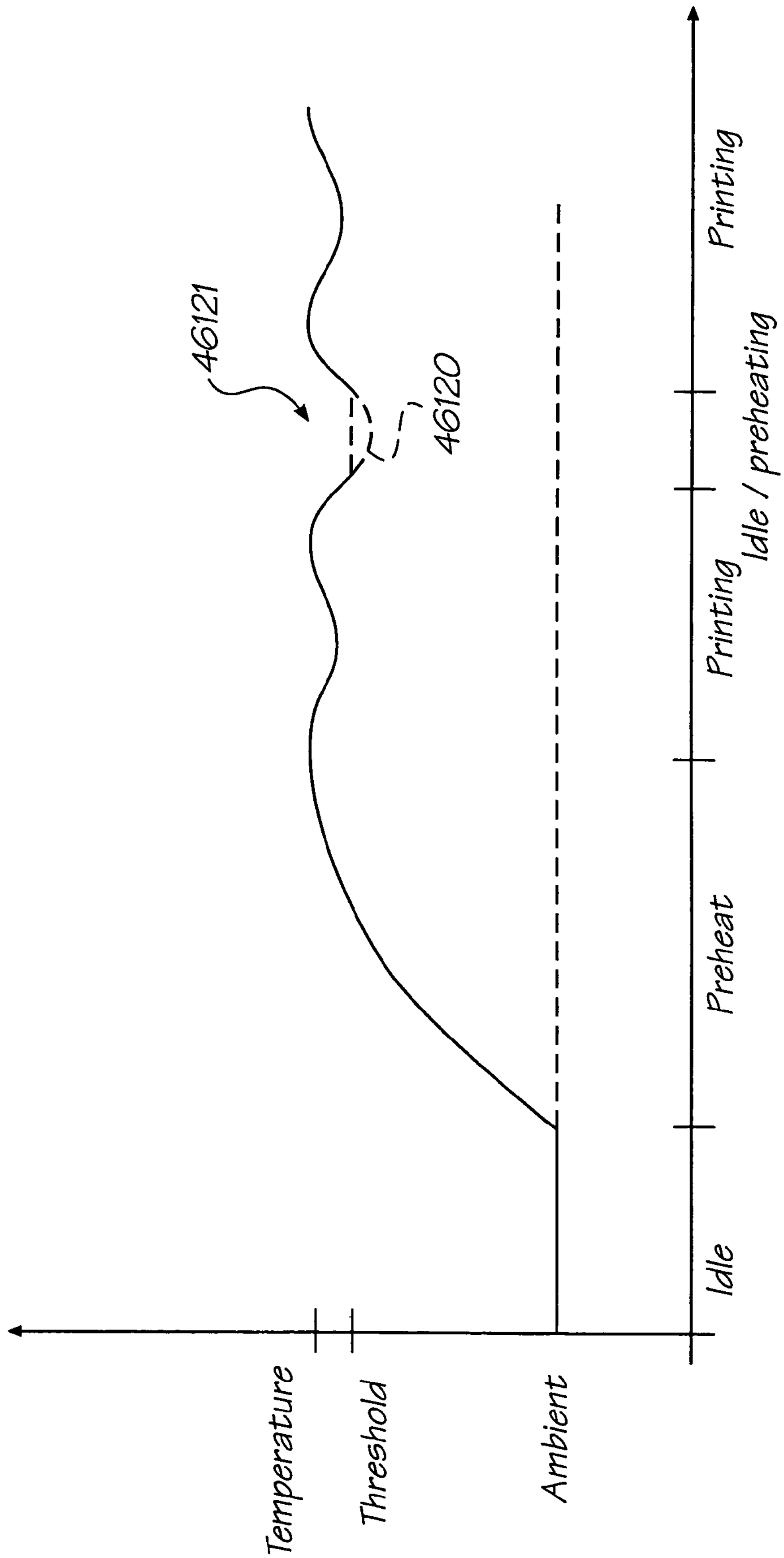
FIG. 1021

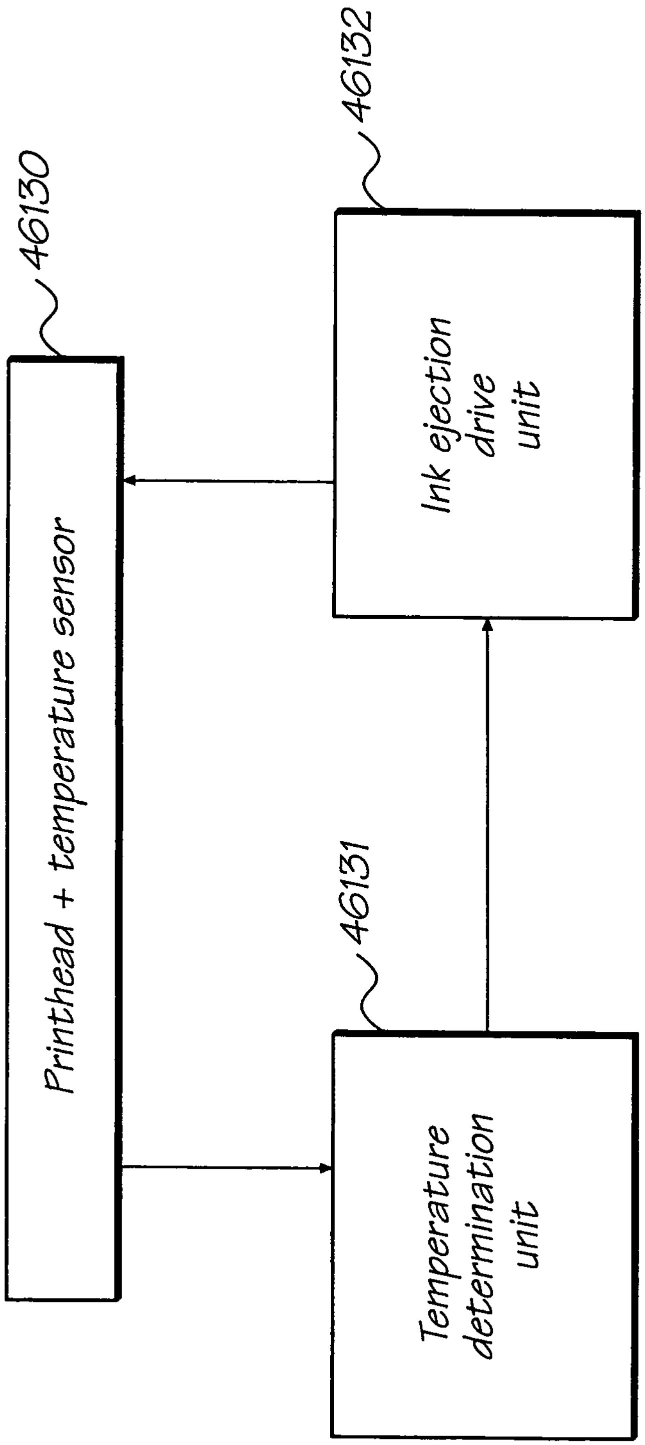
FIG. 1022

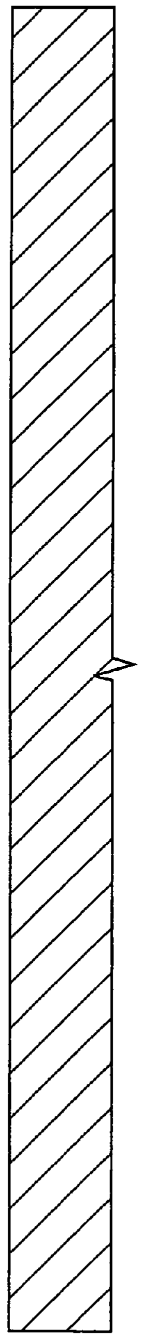
FIG. 1023
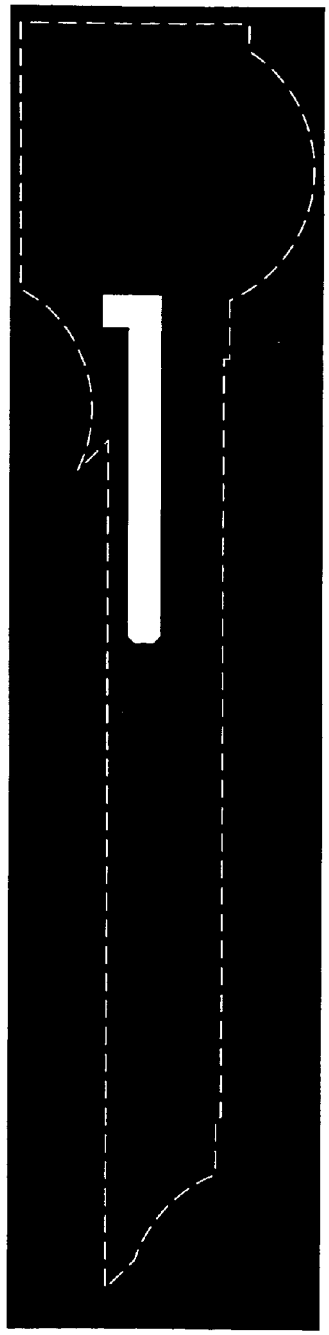
FIG. 1024
N-Well mask
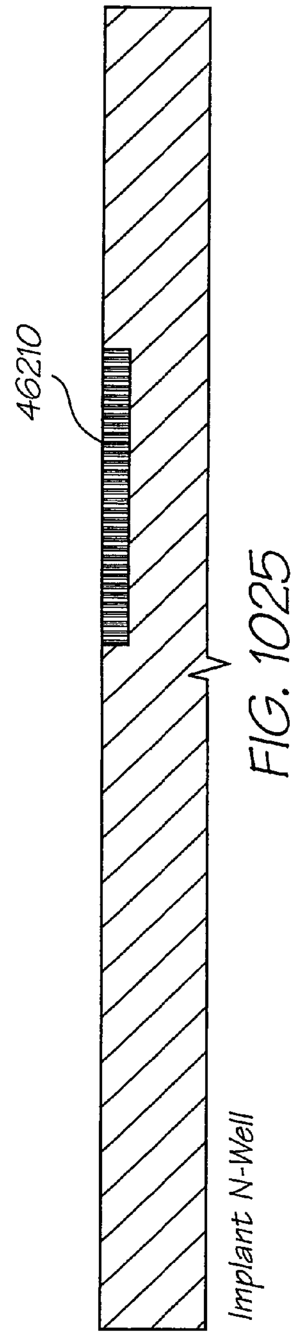
FIG. 1025
Implant N-Well

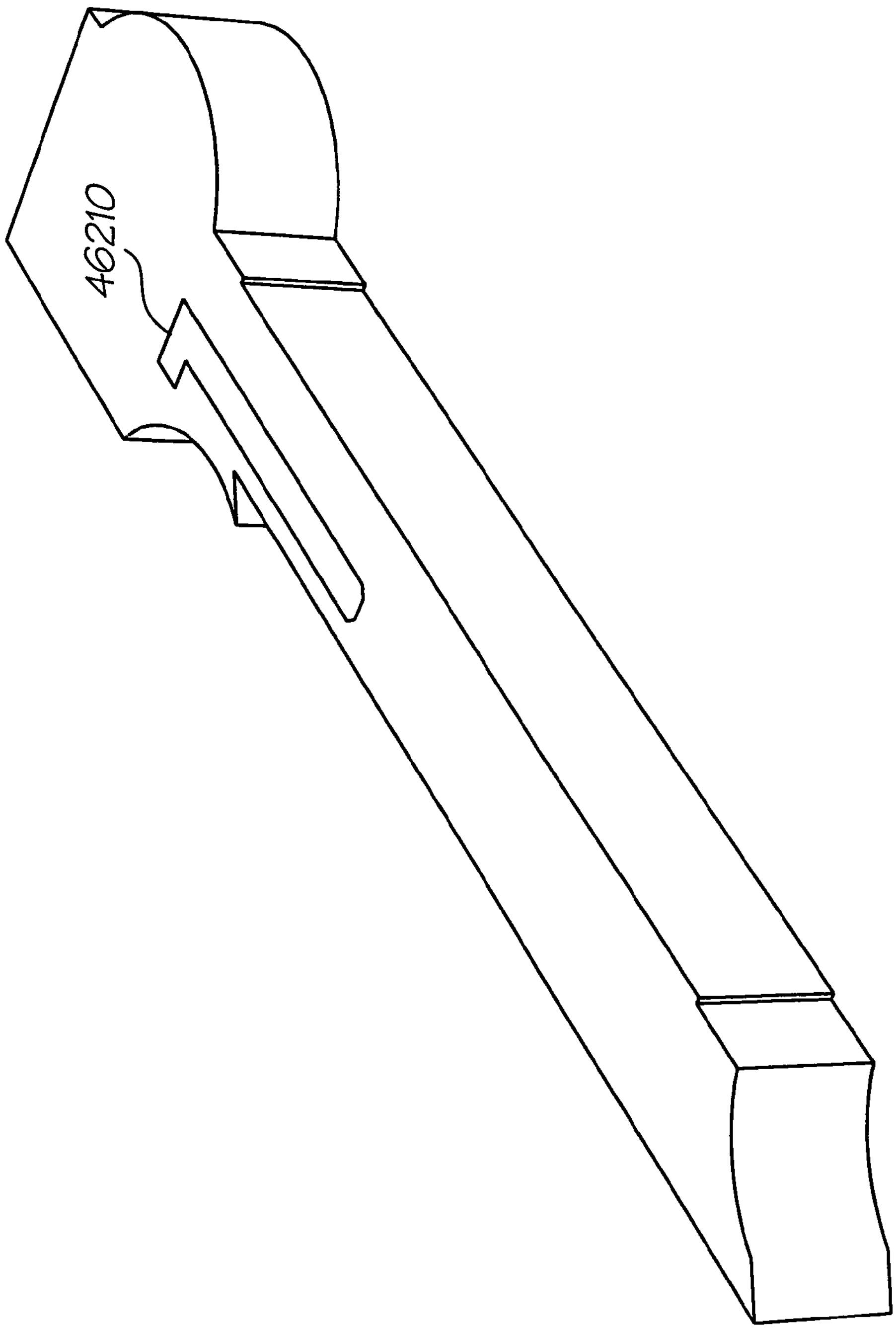
FIG. 1026

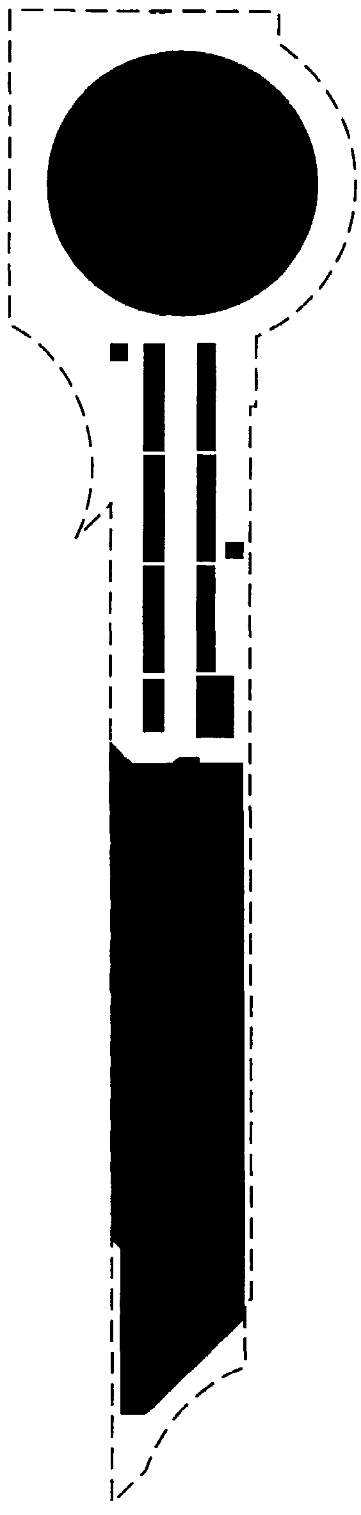
FIG. 1027
Active mask
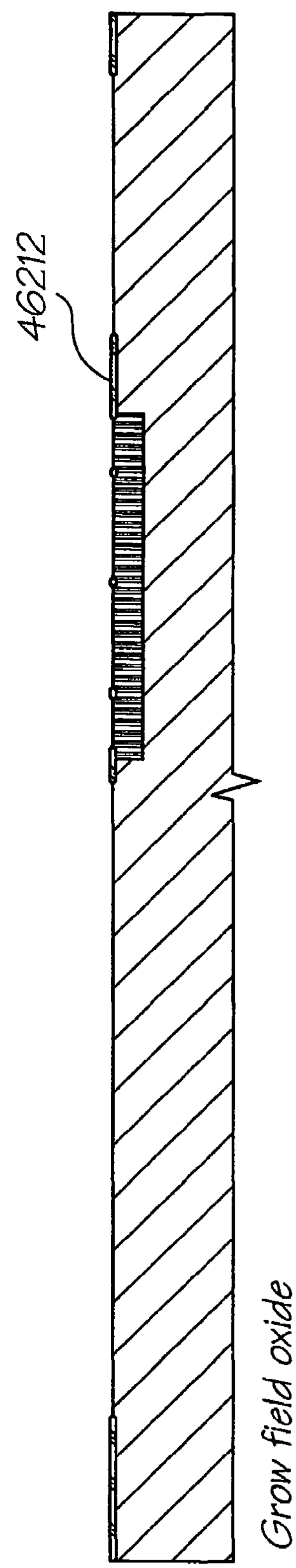
FIG. 1028
Grow field oxide

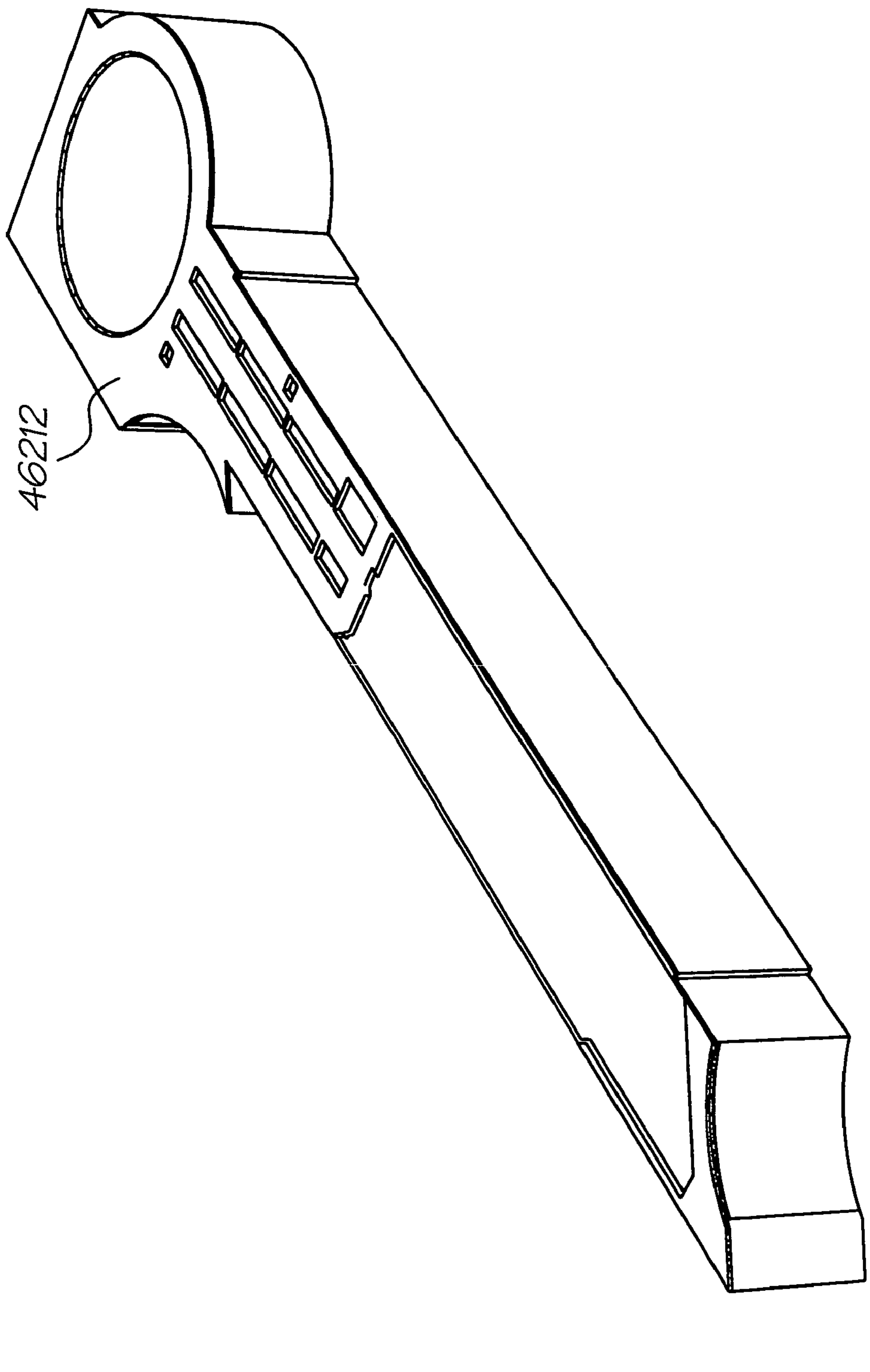
FIG. 1029

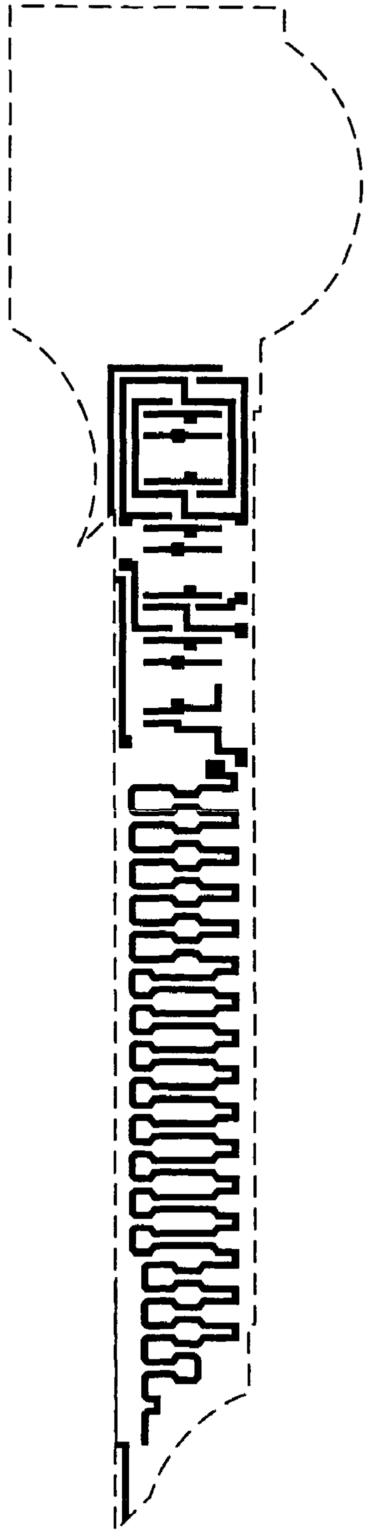
FIG. 1030
Poly mask
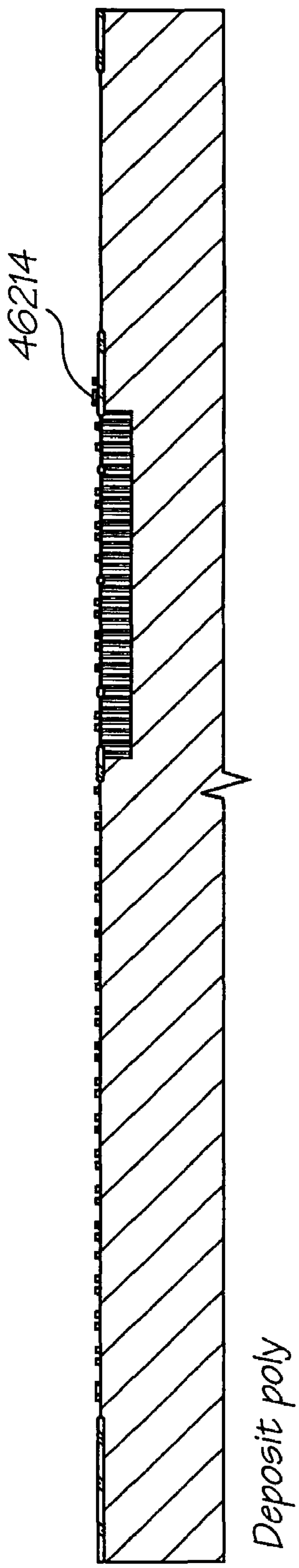
FIG. 1031
Deposit poly

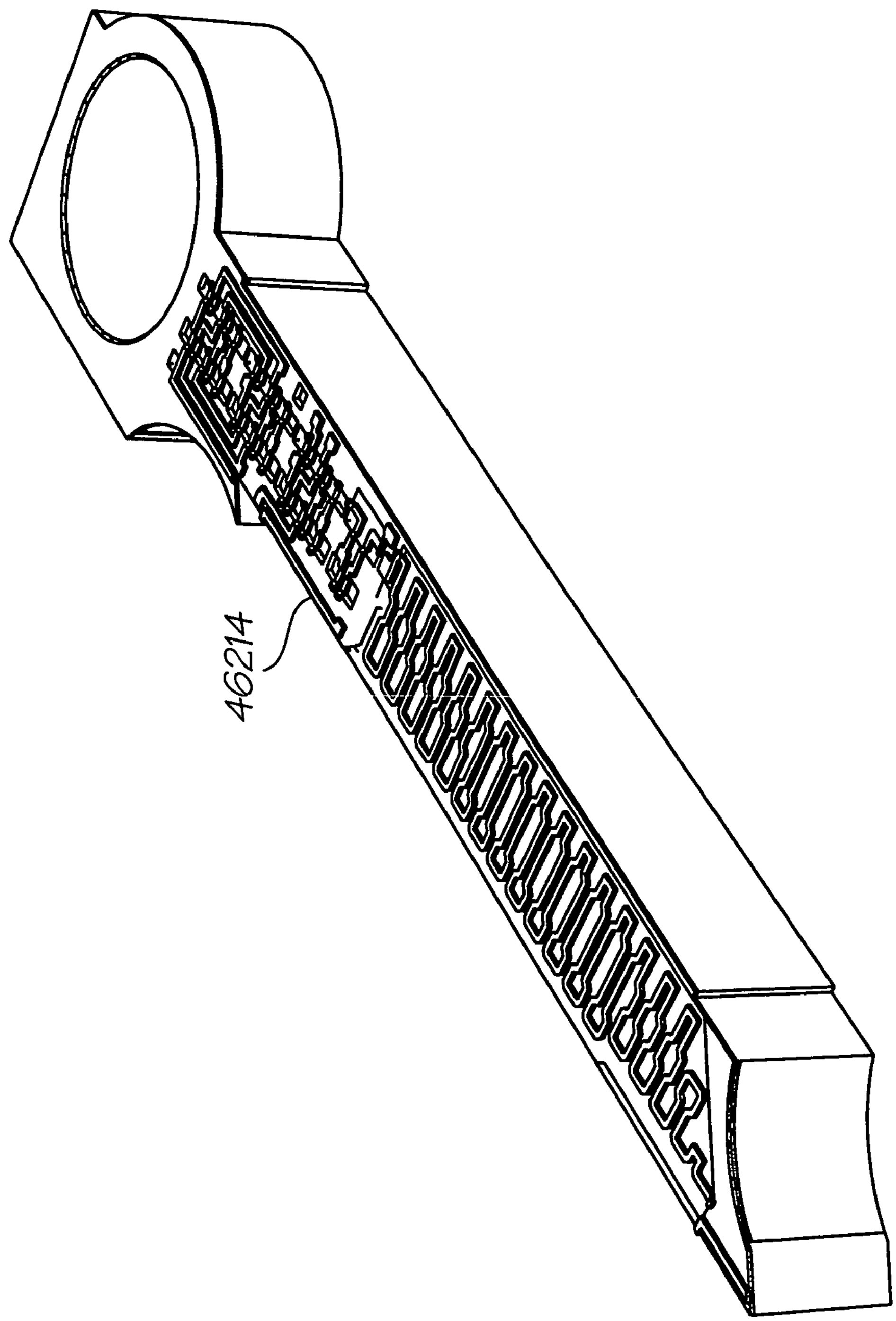
FIG. 1032

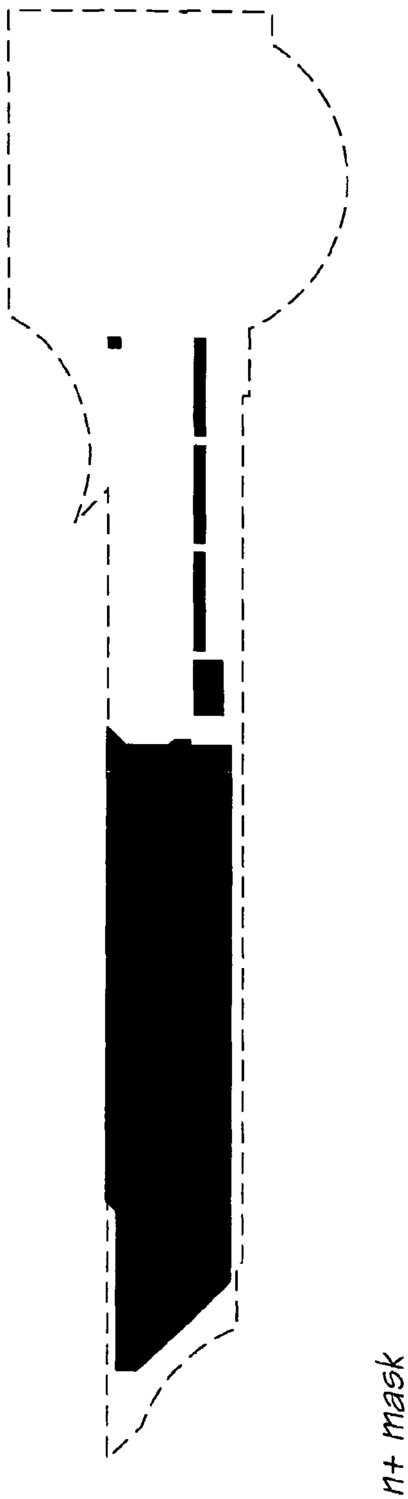
FIG. 1033
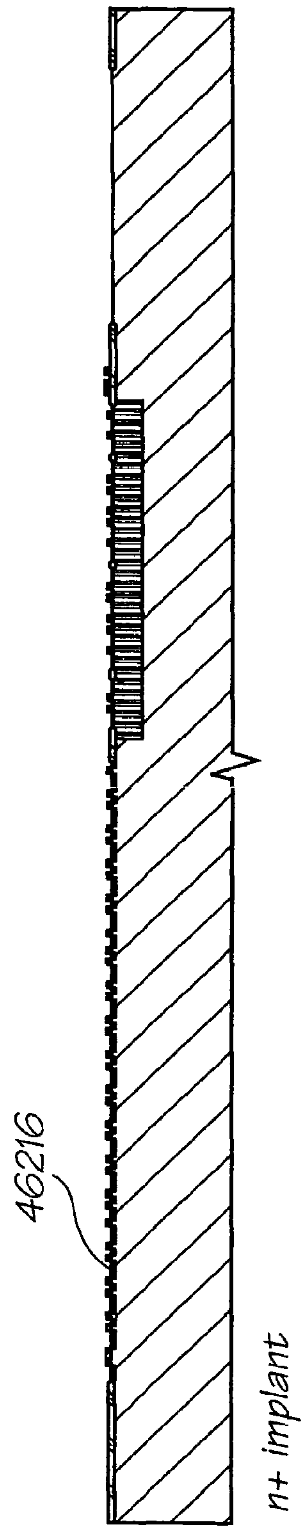
FIG. 1034

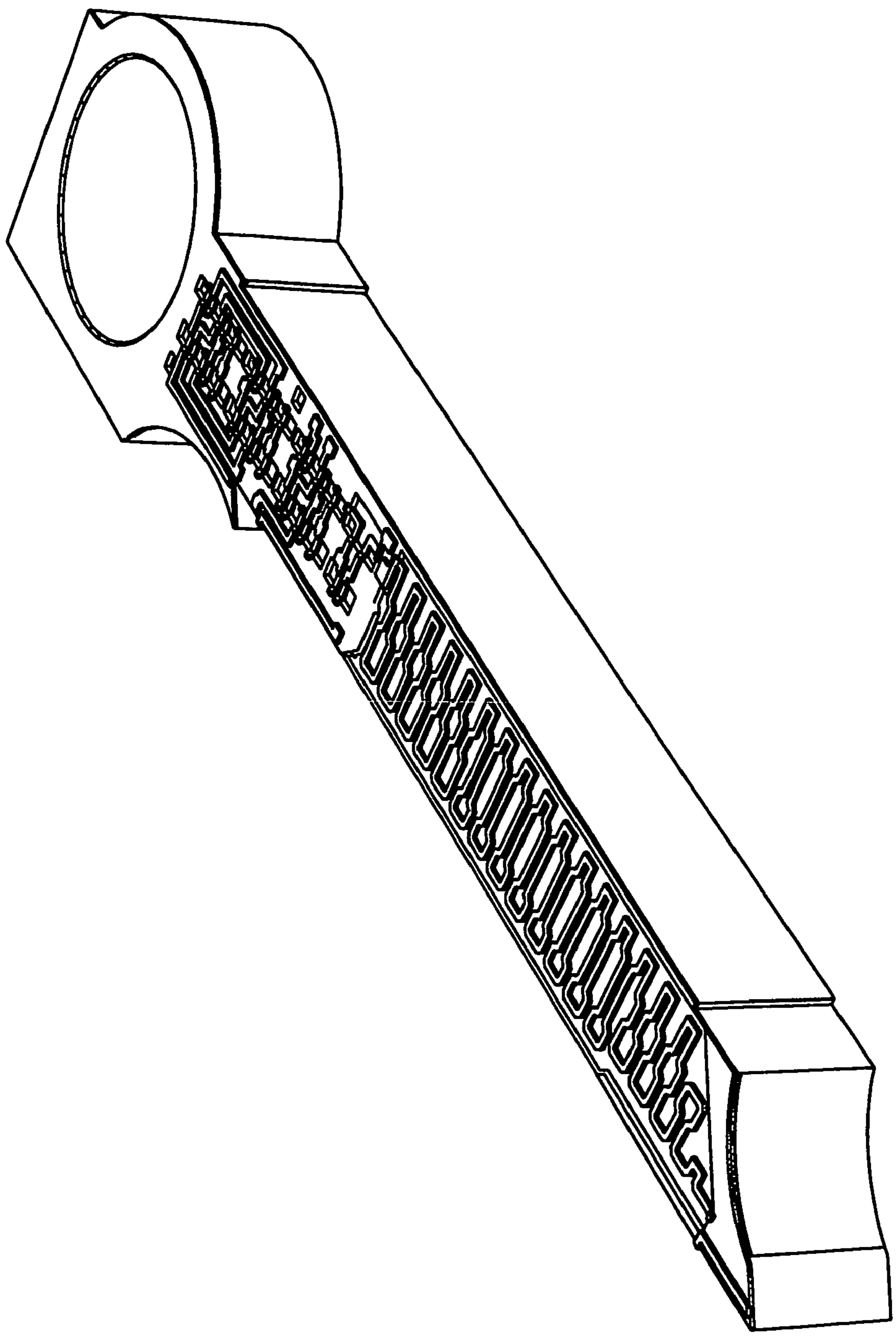
FIG. 1035

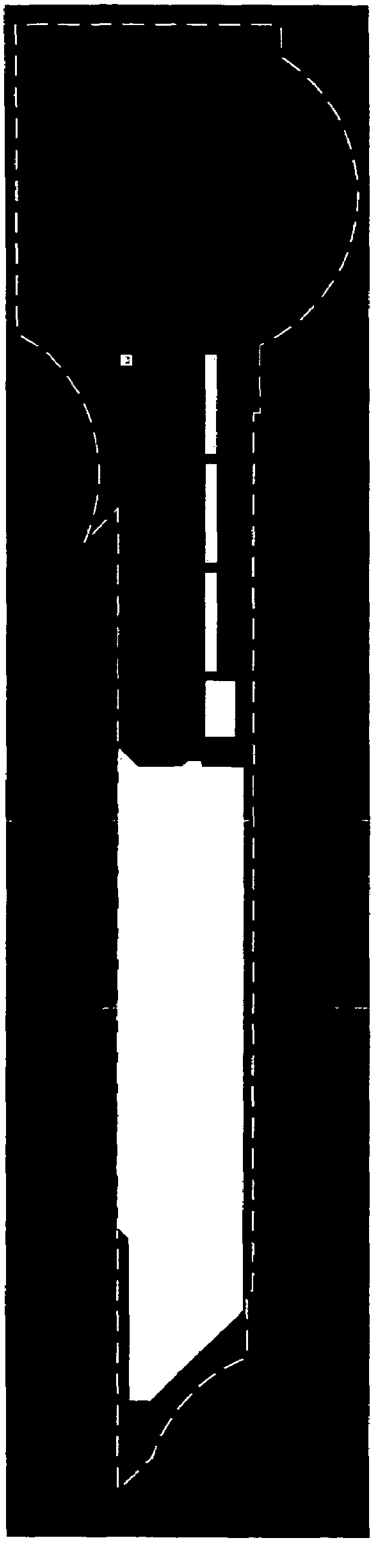
p+ mask
FIG. 1036
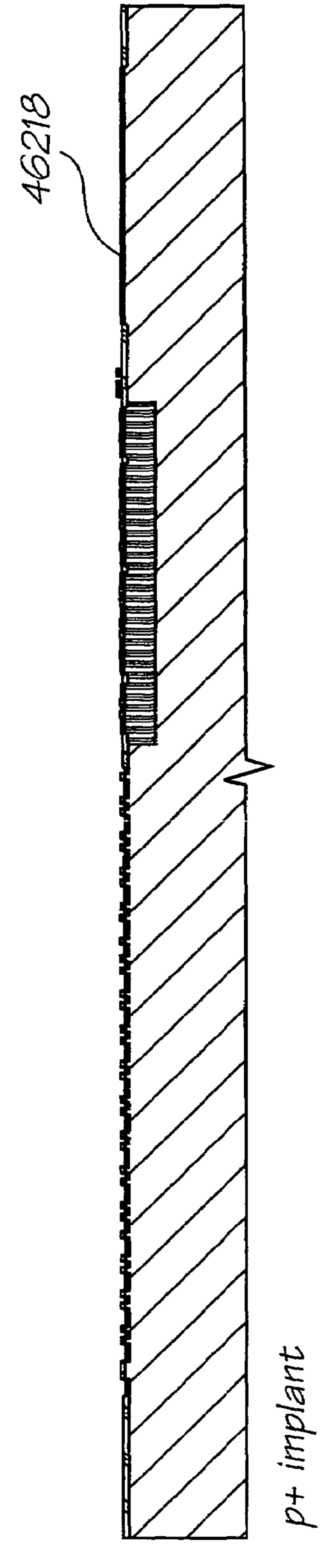
p+ implant
FIG. 1037

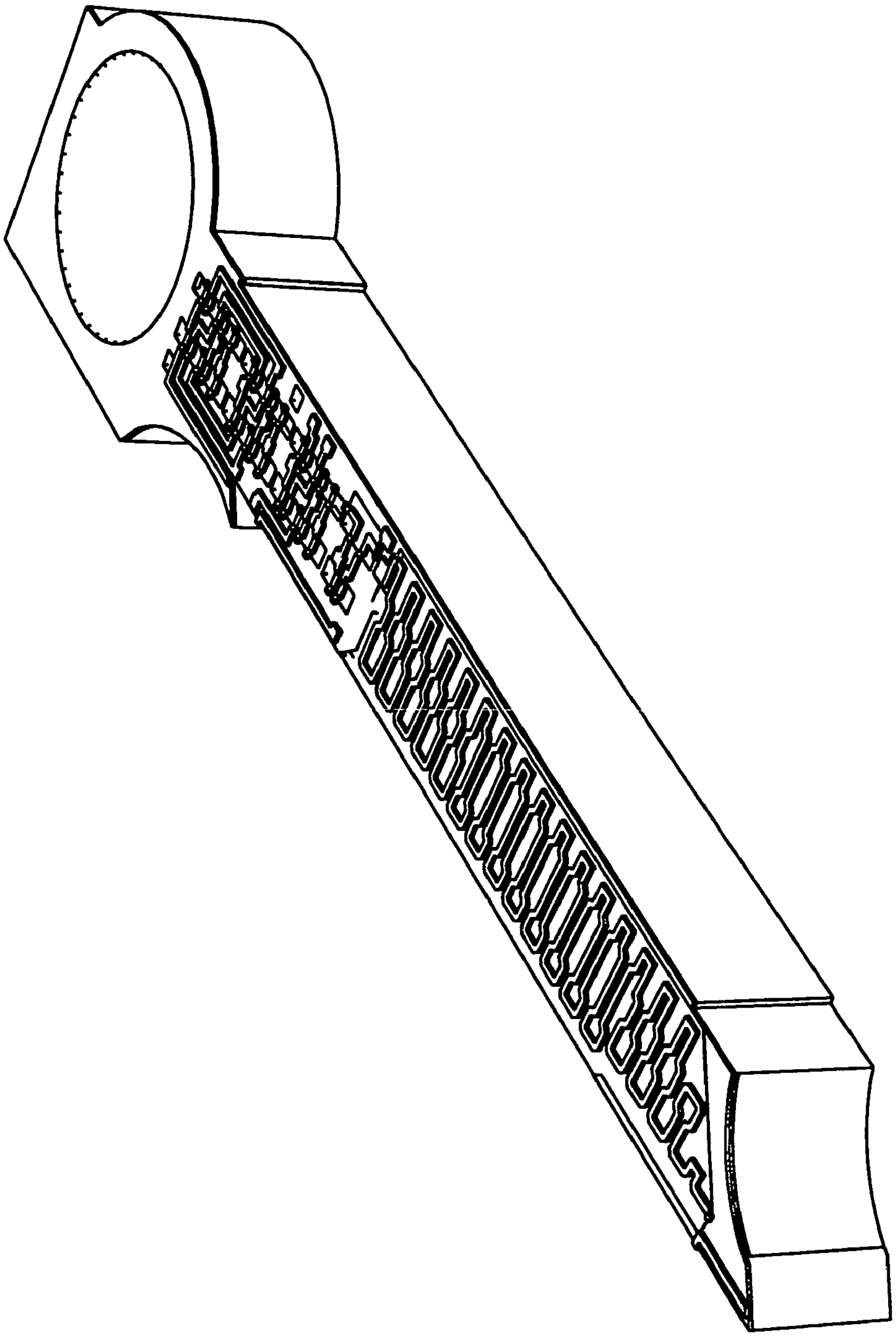
FIG. 1038

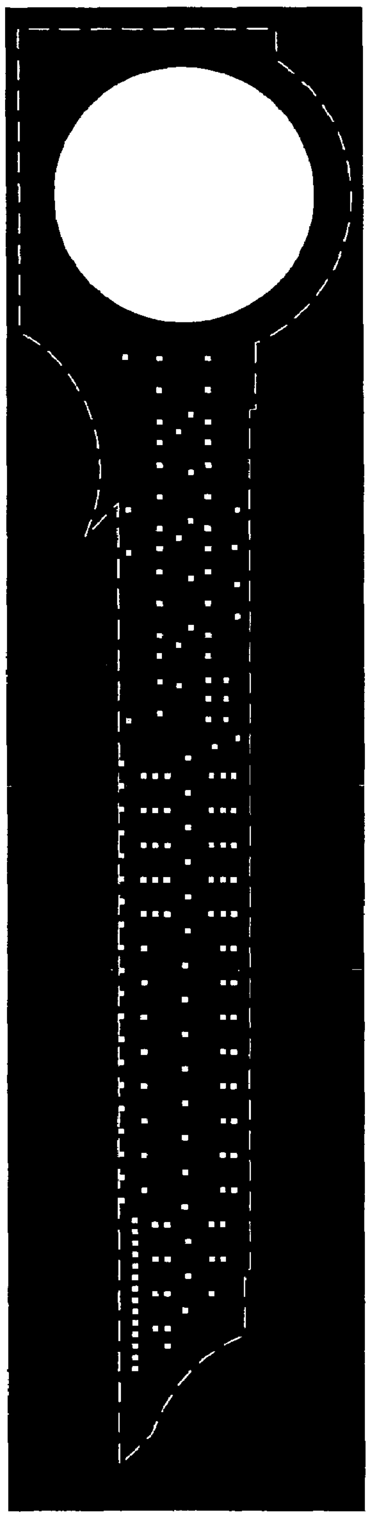
FIG. 1039
Contacts mask
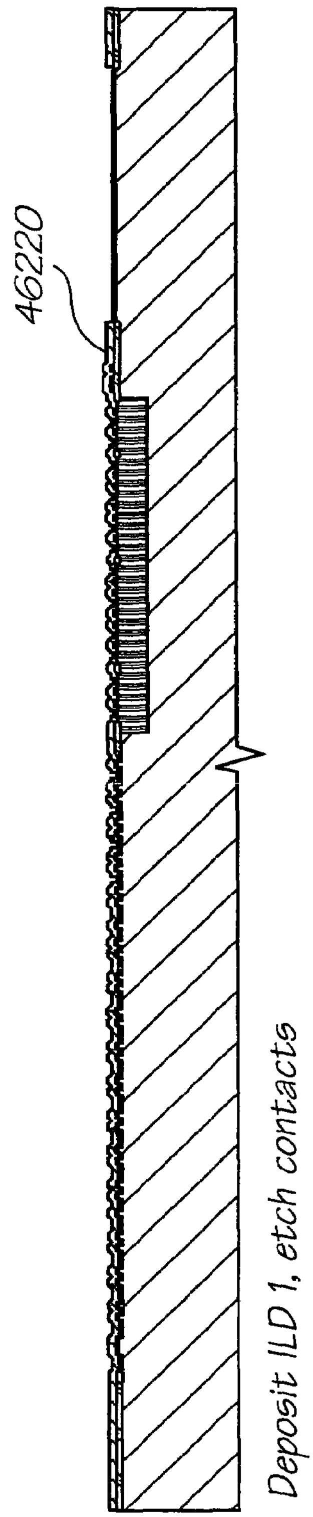
FIG. 1040
Deposit ILD 1, etch contacts

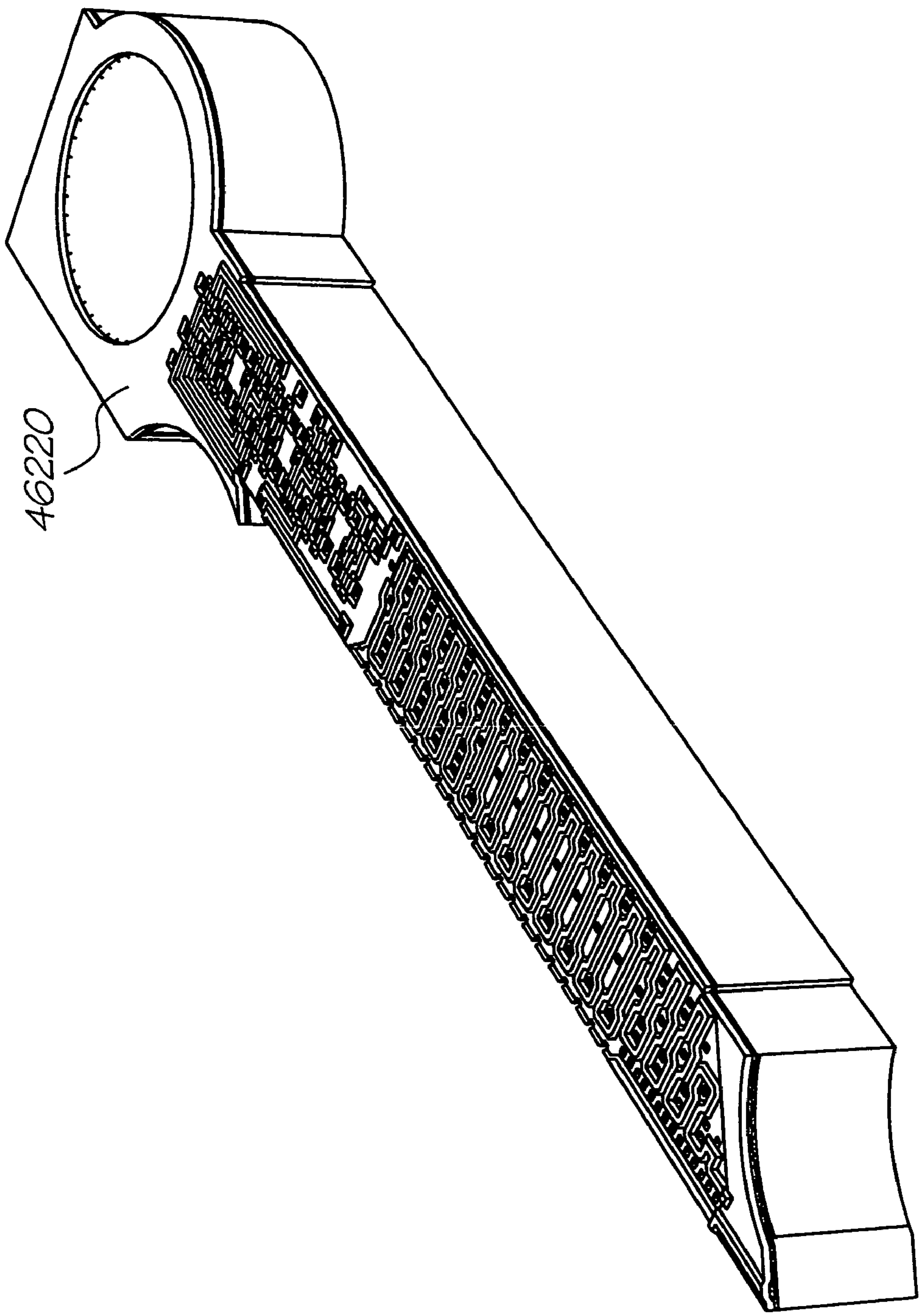
FIG. 1041

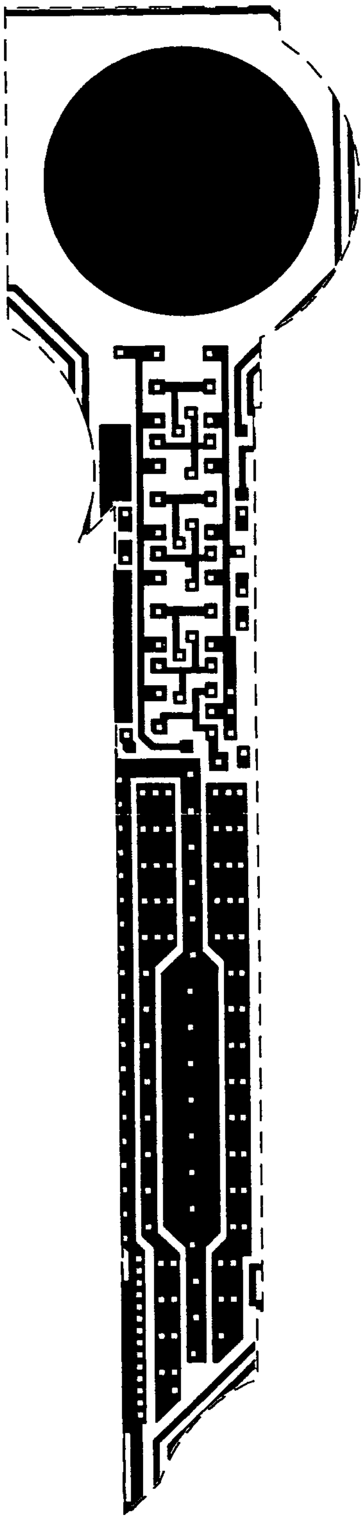
FIG. 1042
Metal 1 mask
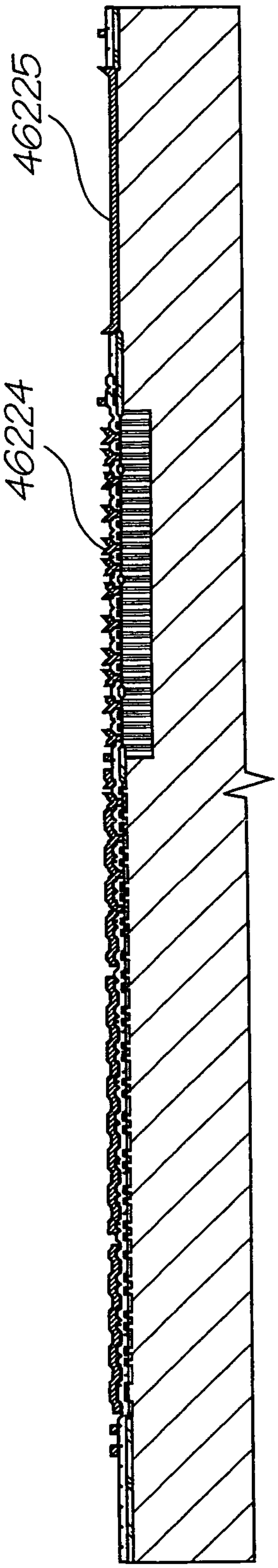
FIG. 1043
Deposit Metal 1

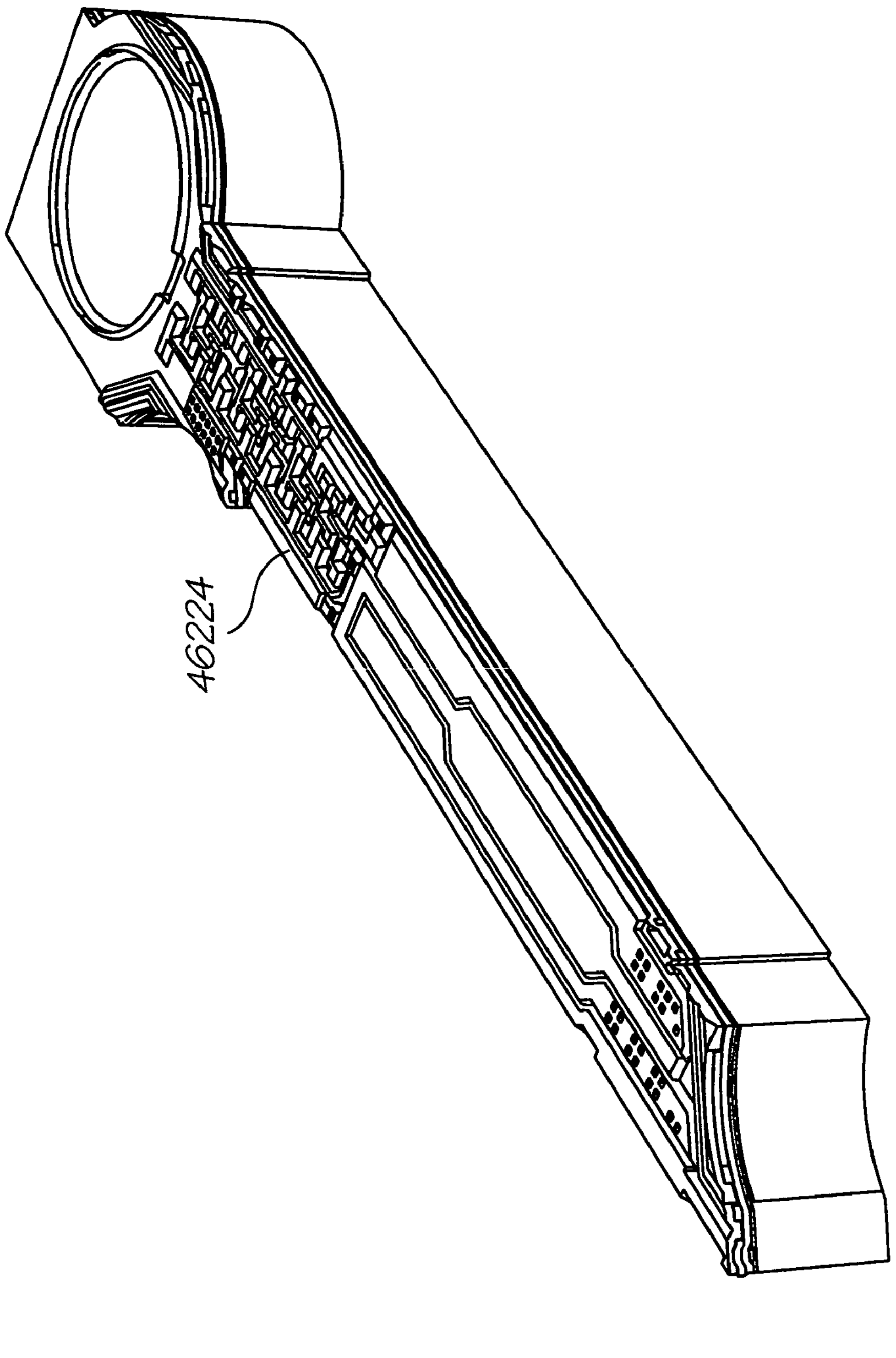
FIG. 1044

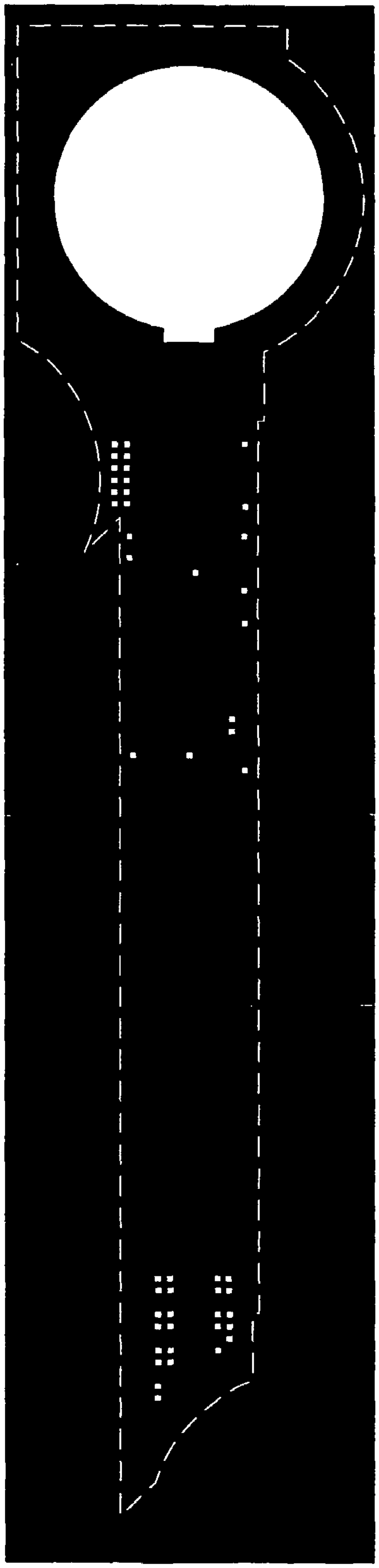
FIG. 1045
Via 1 mask
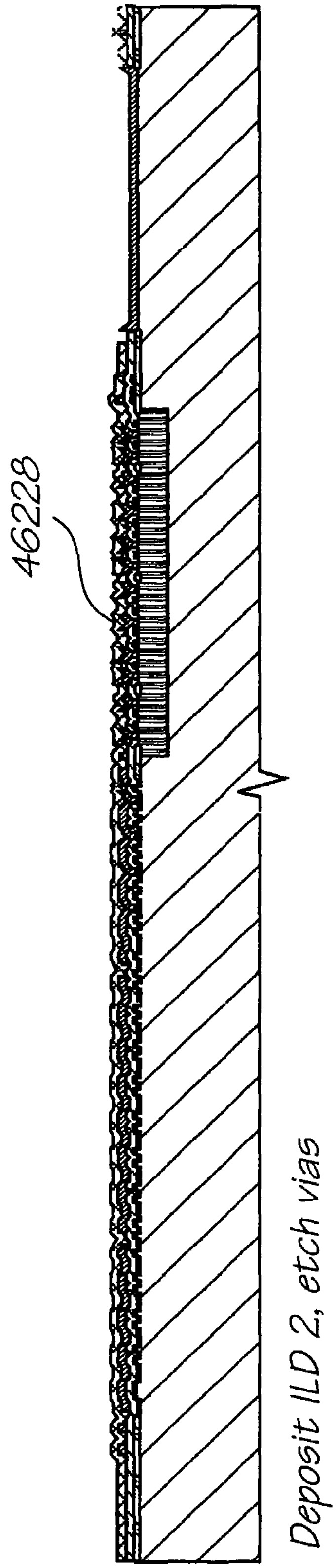
FIG. 1046
Deposit ILD 2, etch vias

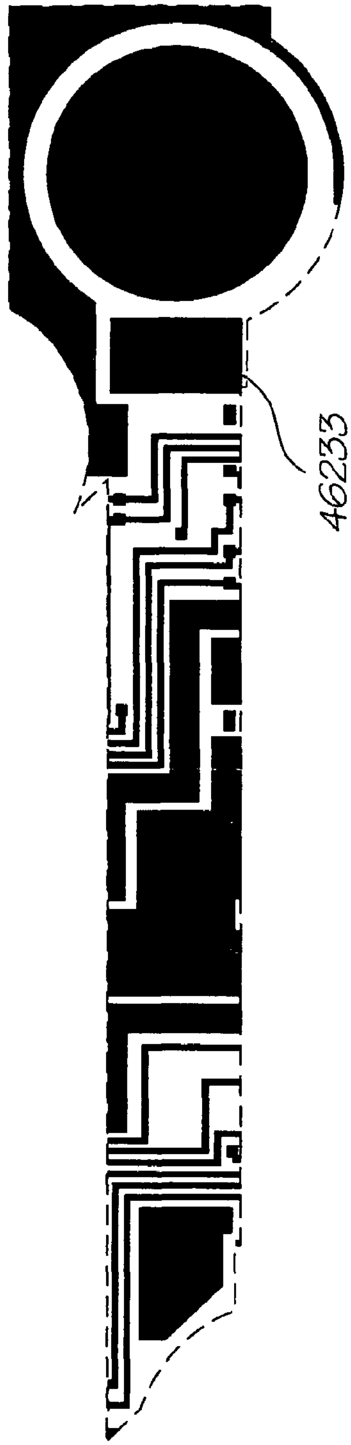
FIG. 1047
Metal 2 mask
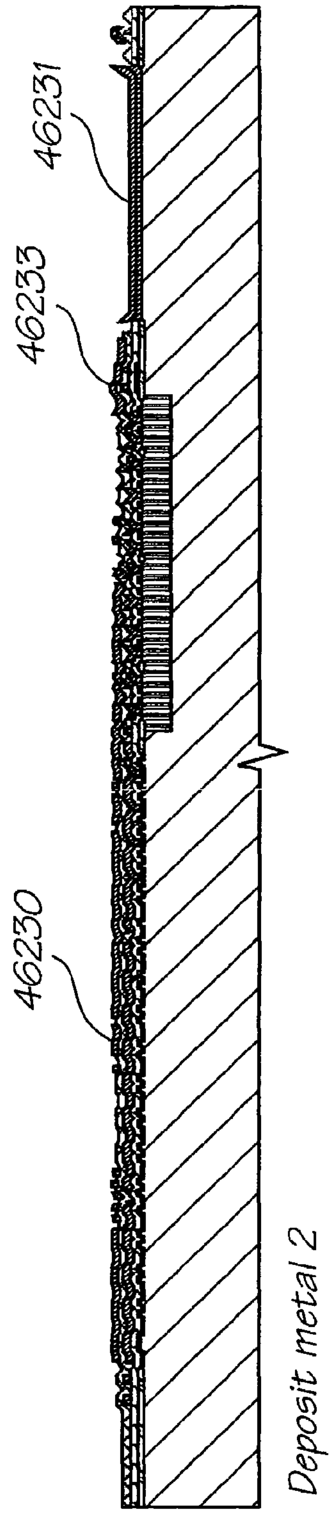
FIG. 1048
Deposit metal 2

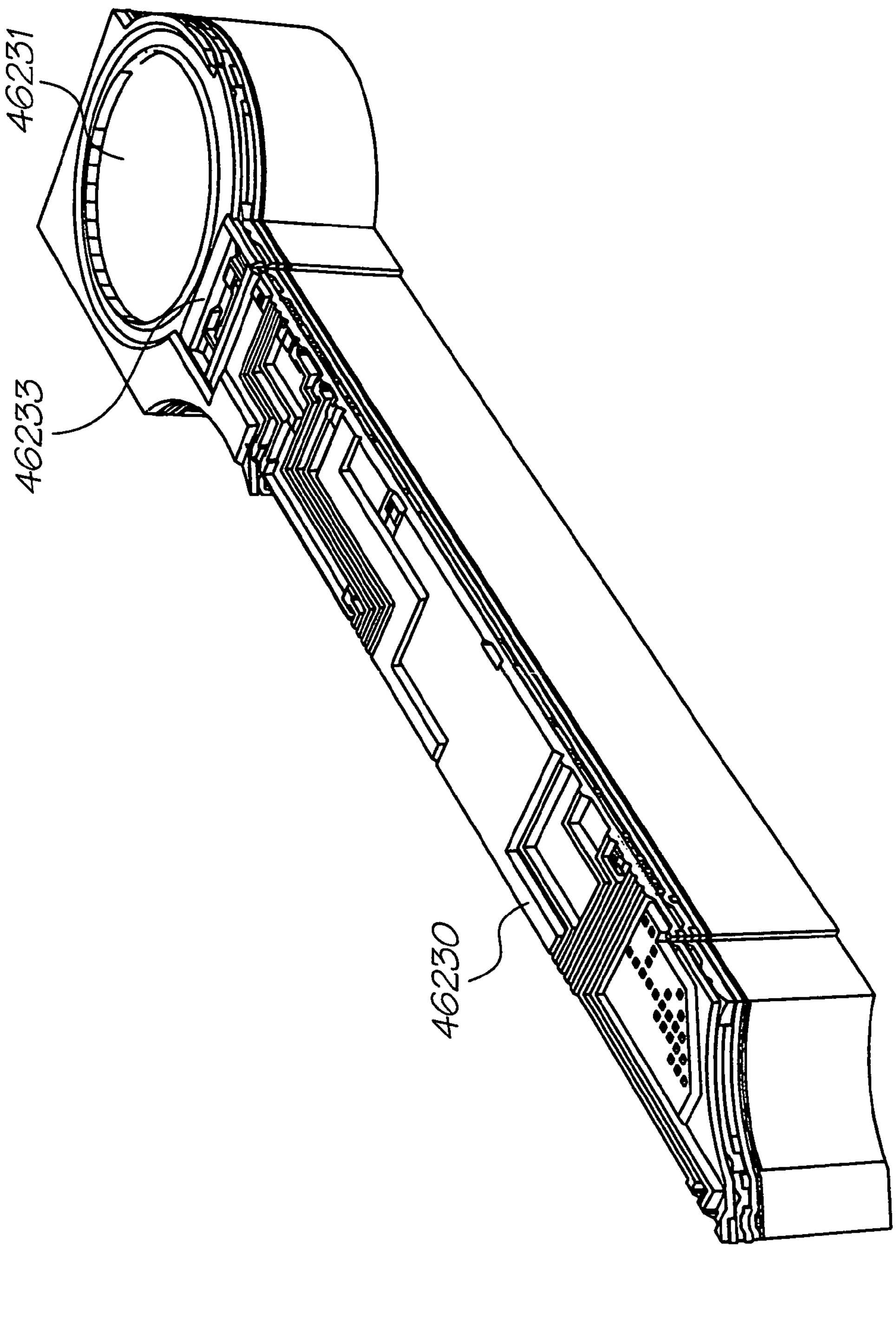
FIG. 1049

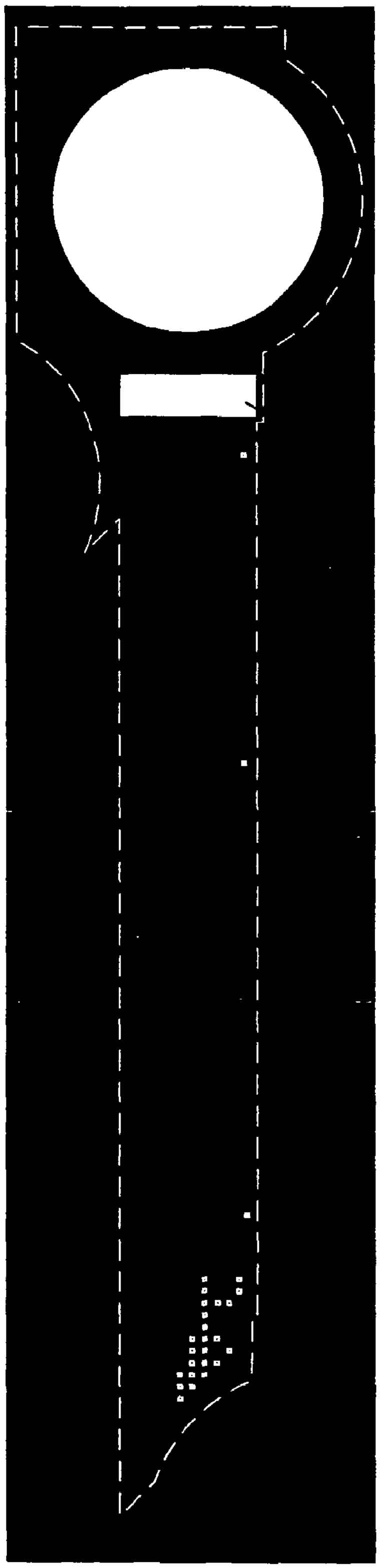
Via 2 mask
FIG. 1050
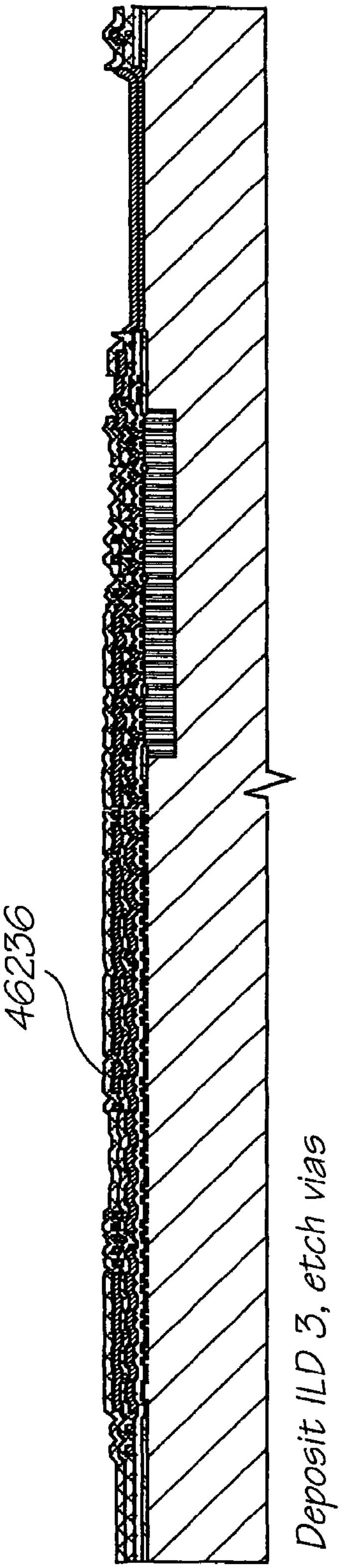
Deposit ILD 3, etch vias
FIG. 1051

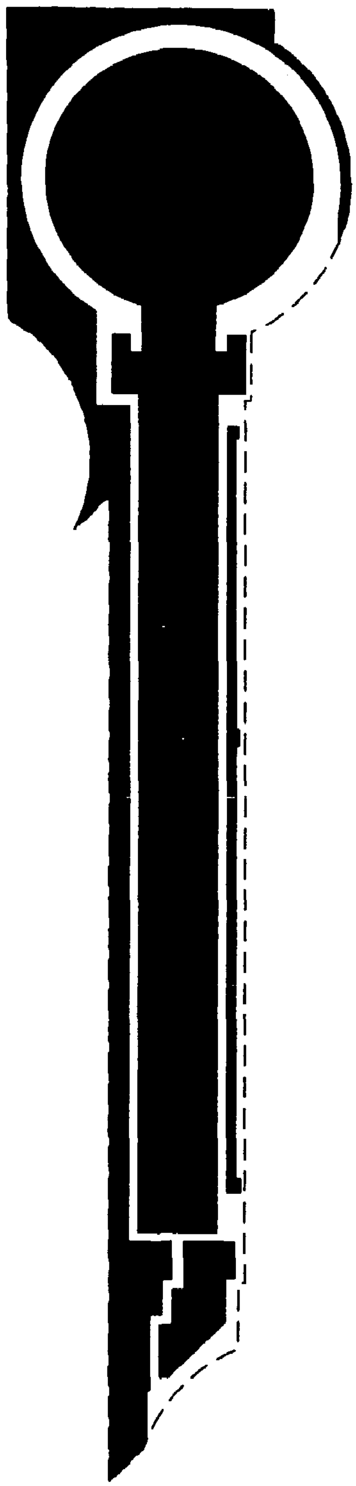
FIG. 1052
Metal 3 mask
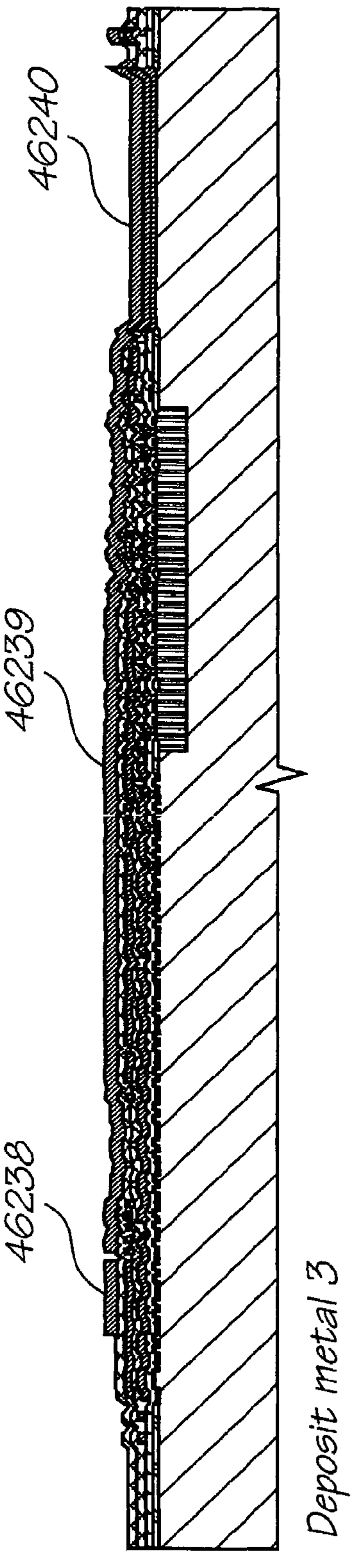
FIG. 1053
Deposit metal 3

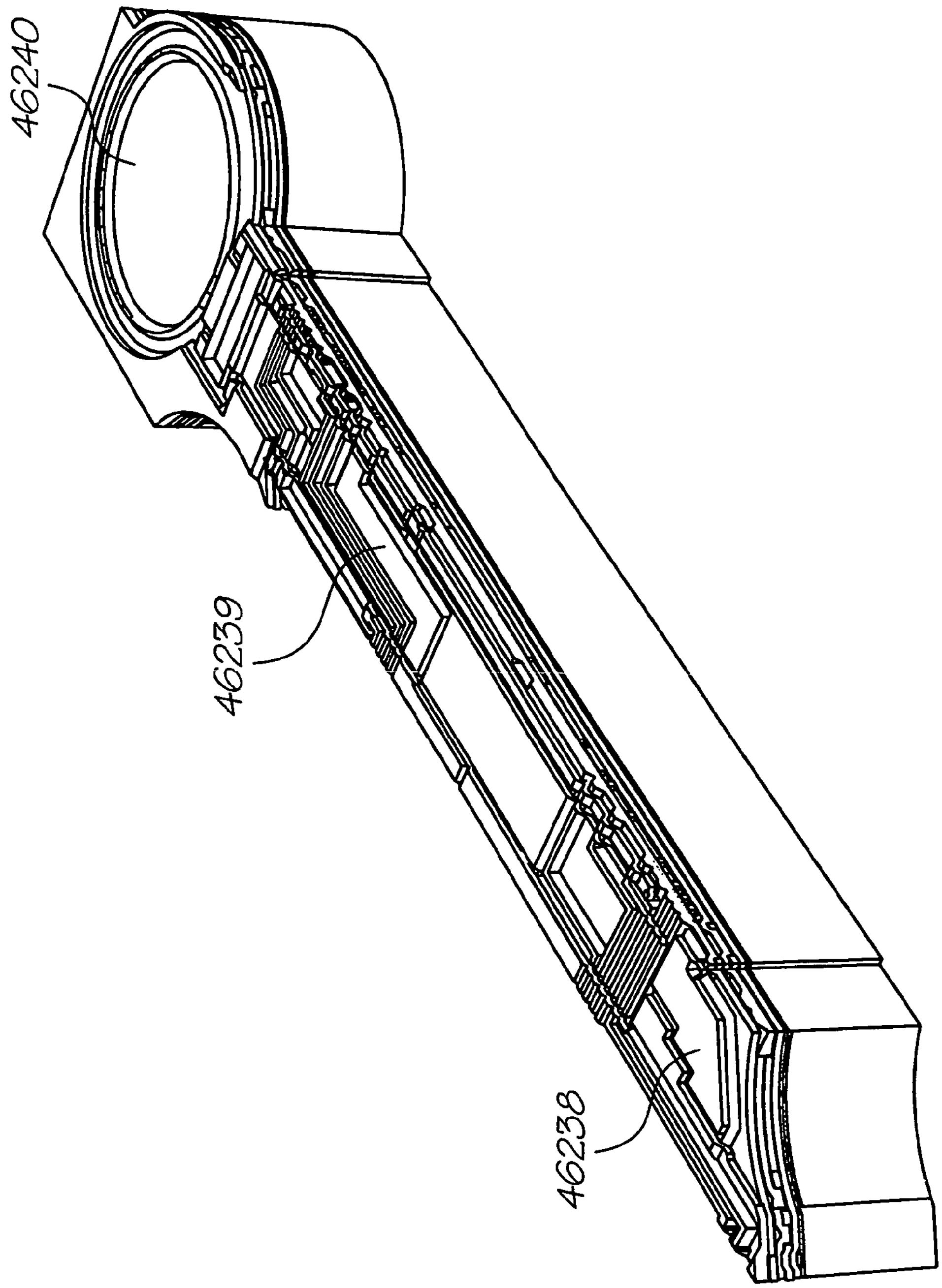
FIG. 1054

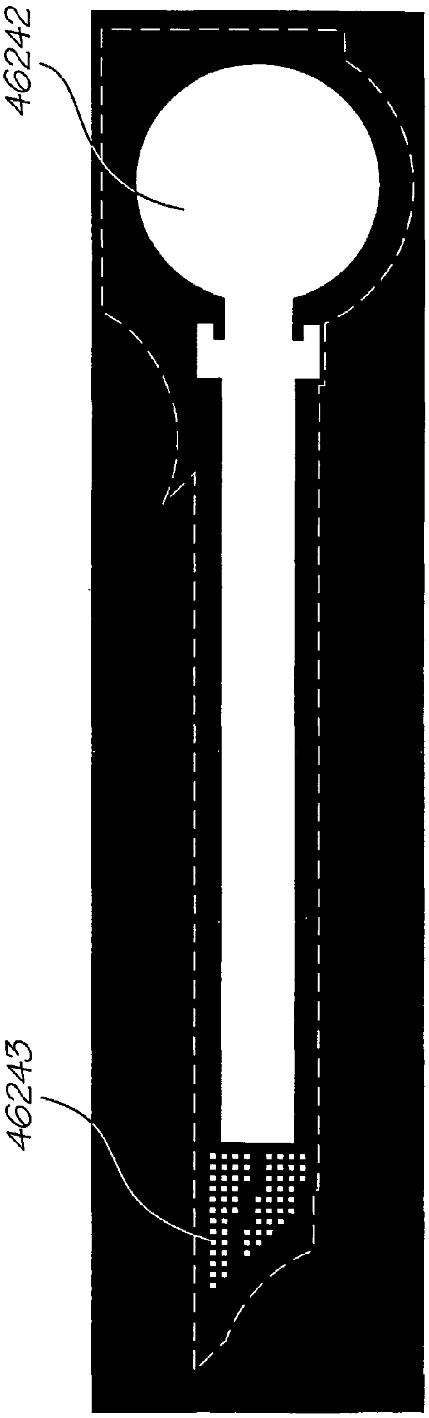
Via 3 / Passivation mask
FIG. 1055
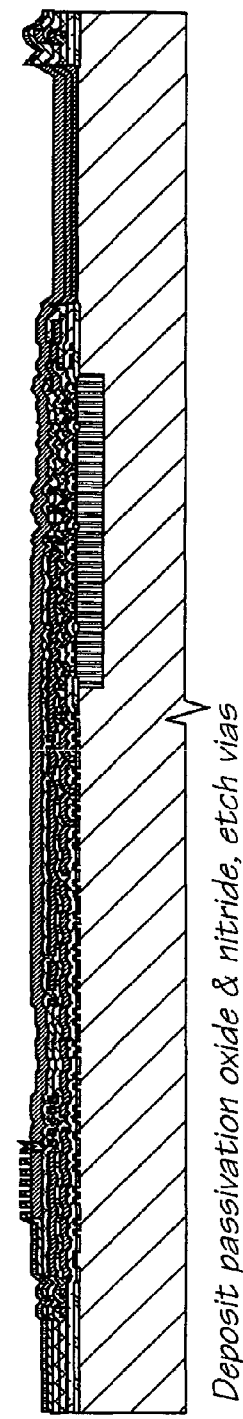
Deposit passivation oxide & nitride, etch vias
FIG. 1056

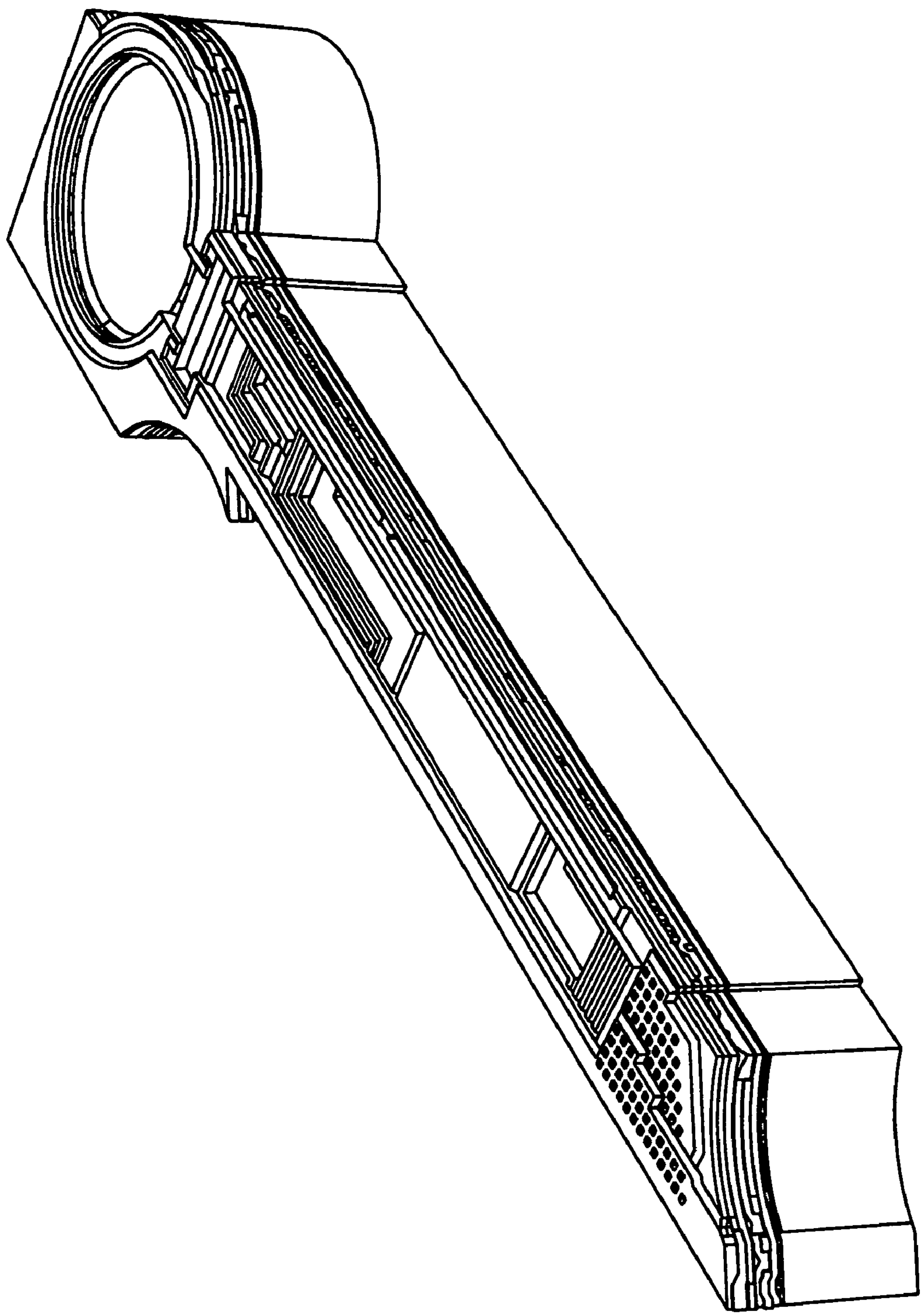
FIG. 1057

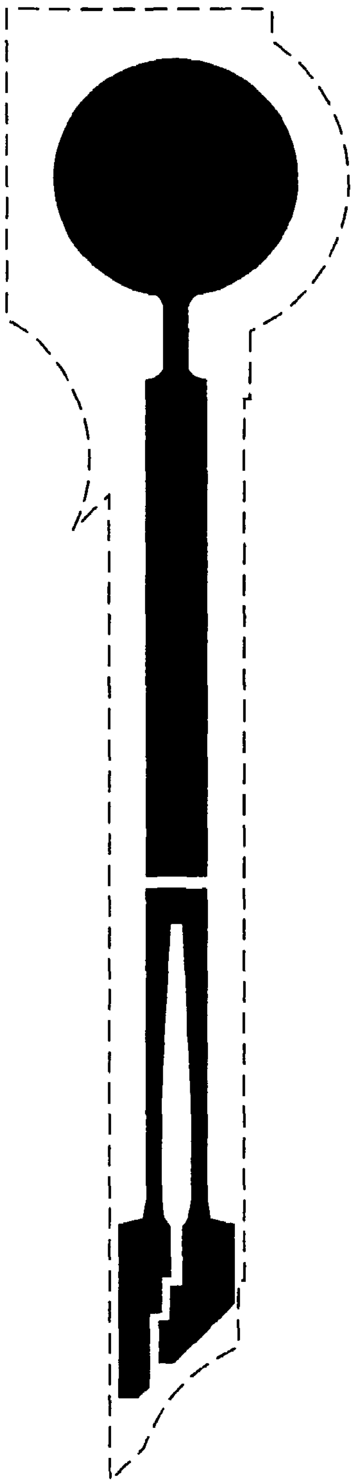
FIG. 1058
Heater mask
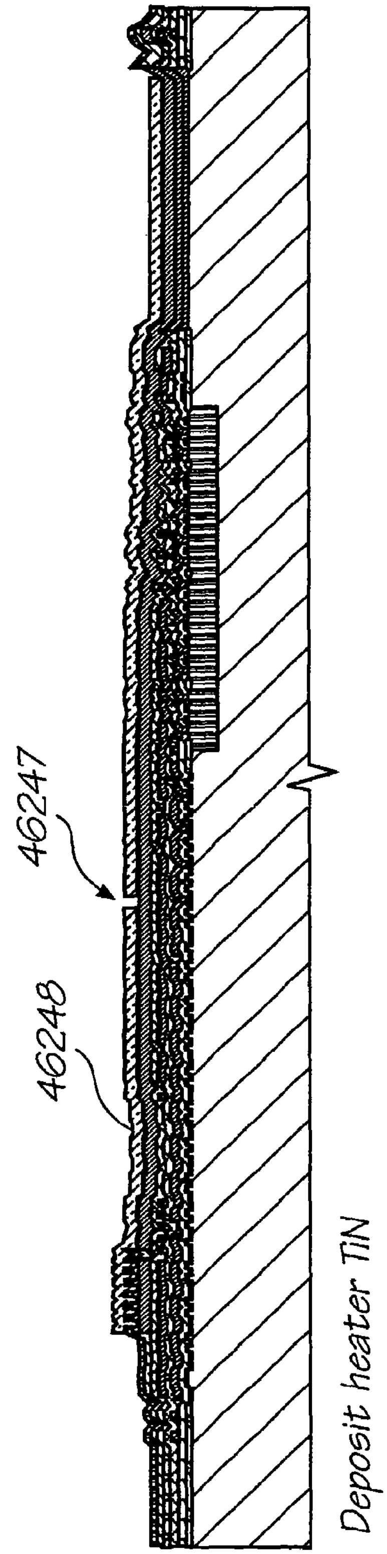
FIG. 1059
Deposit heater TiN

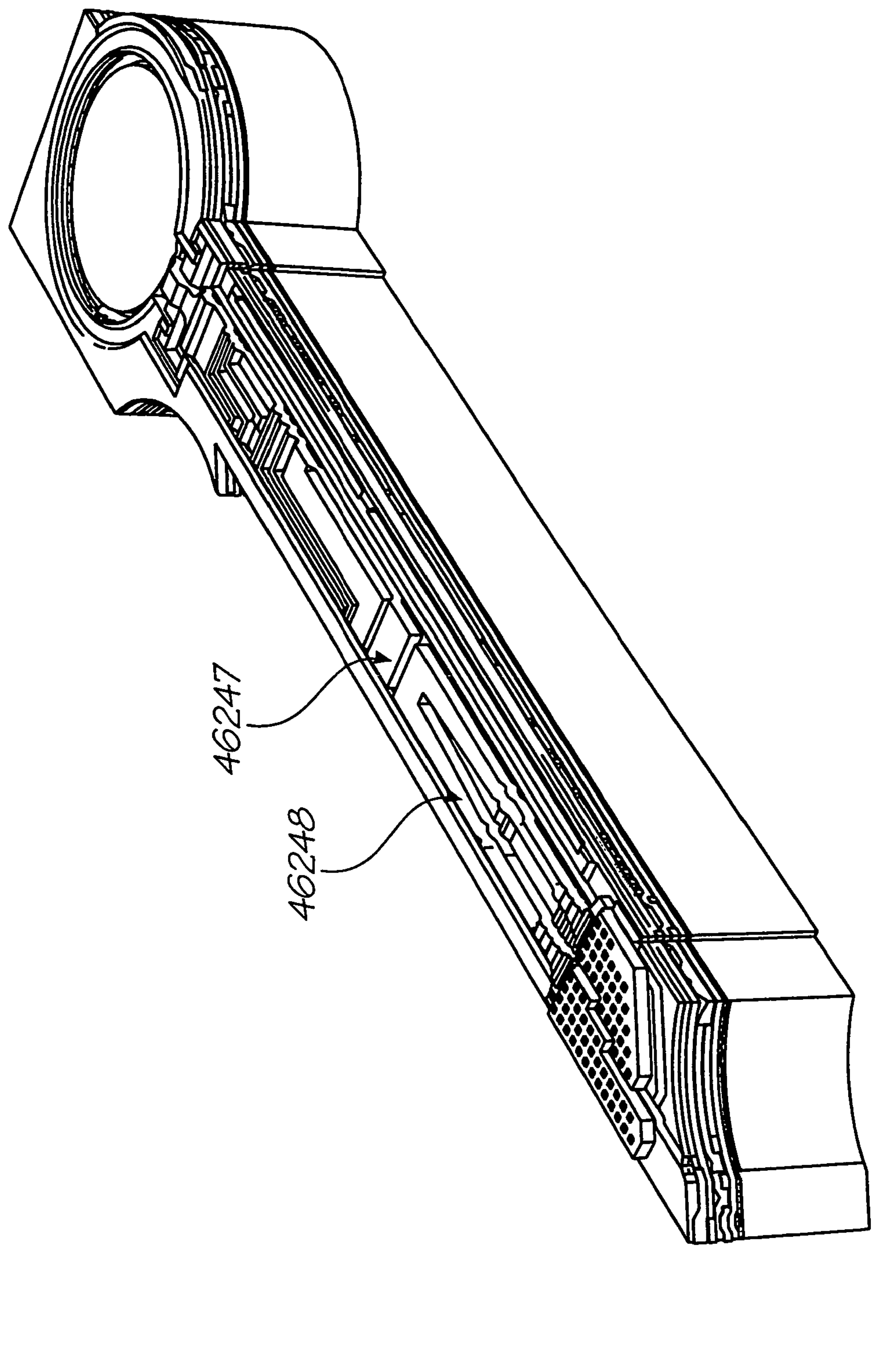
FIG. 1060

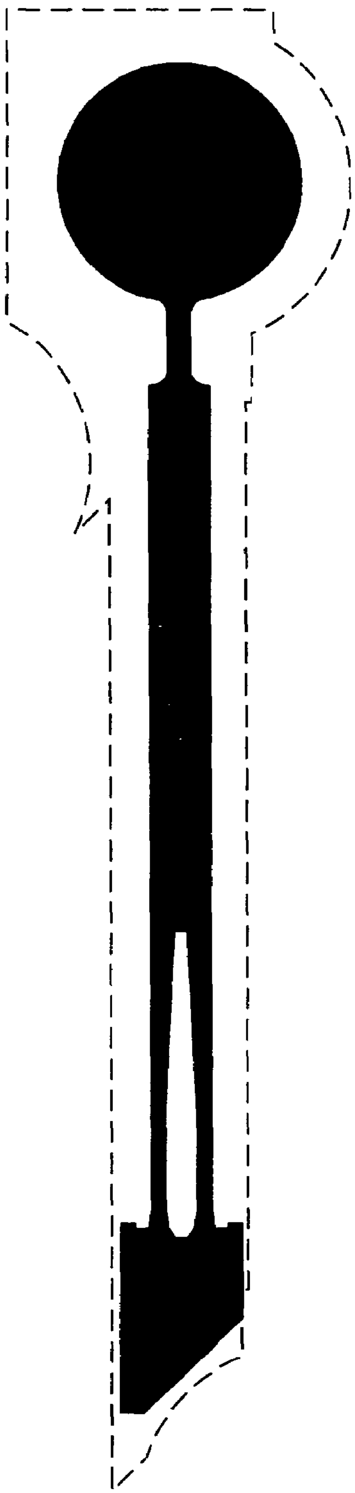
FIG. 1061
Actuator / bend compensator mask
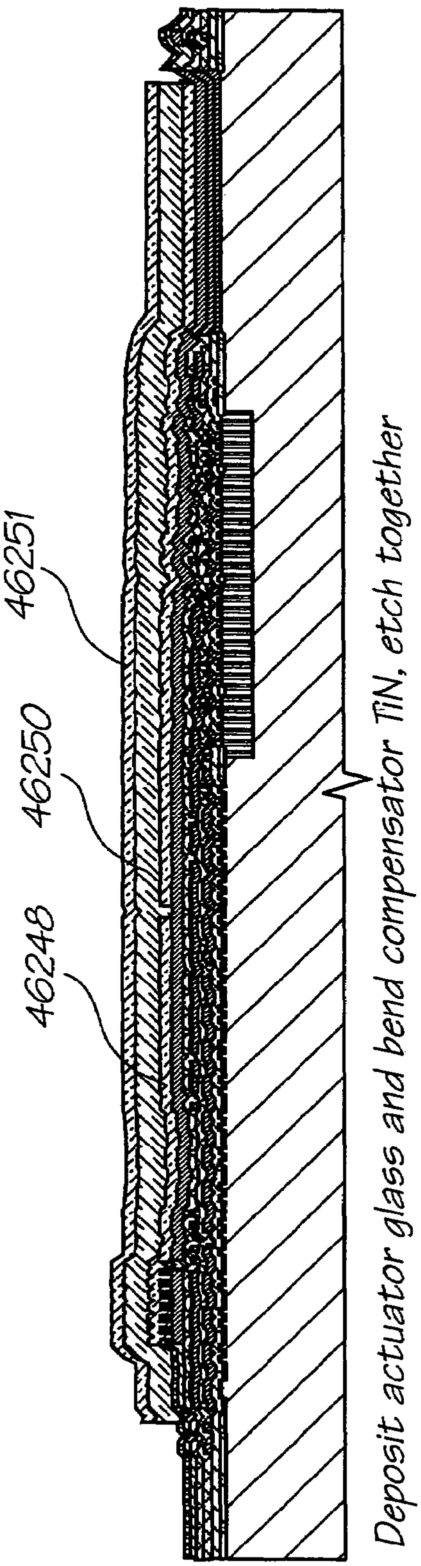
FIG. 1062
Deposit actuator glass and bend compensator TiN, etch together

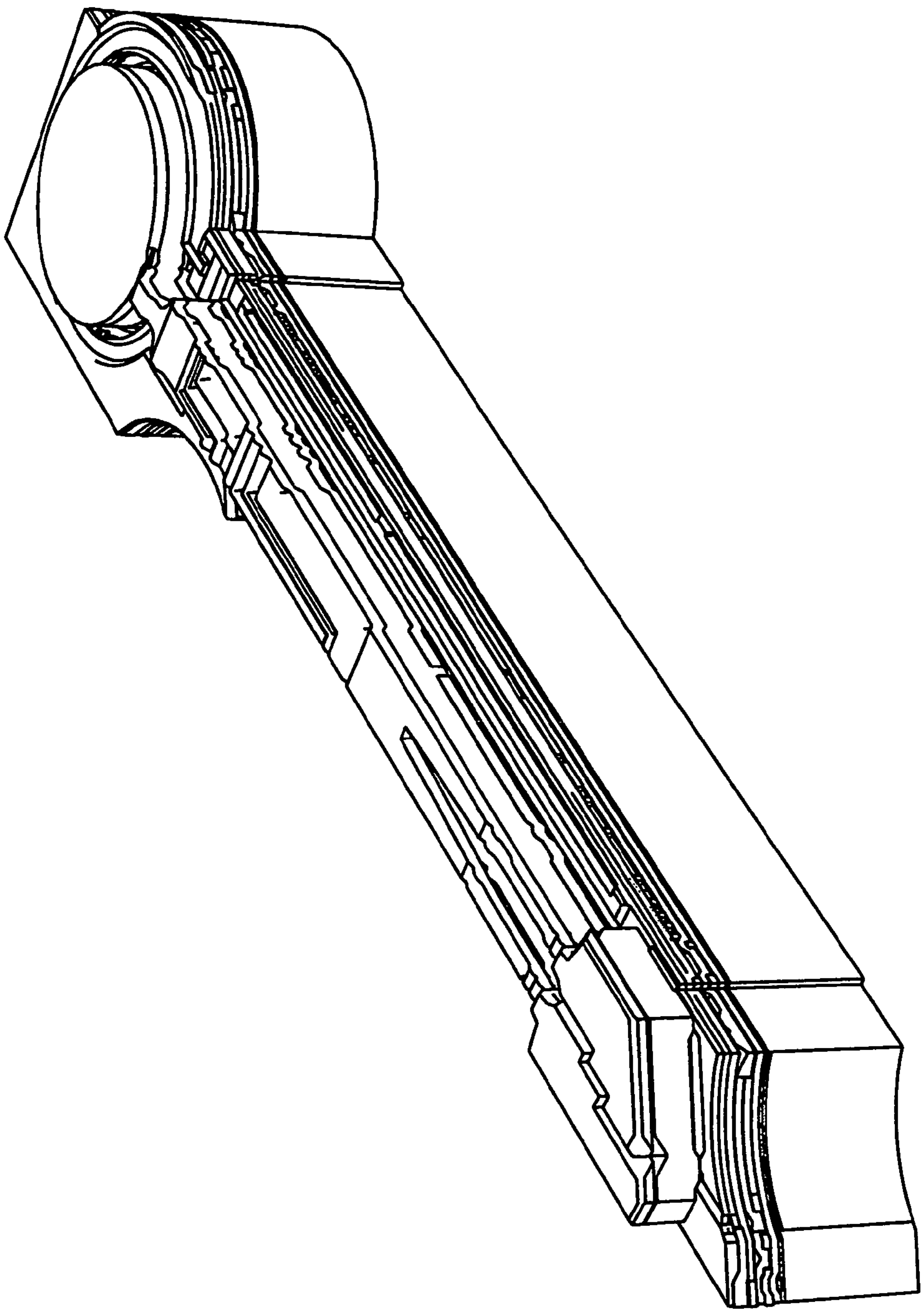
FIG. 1063

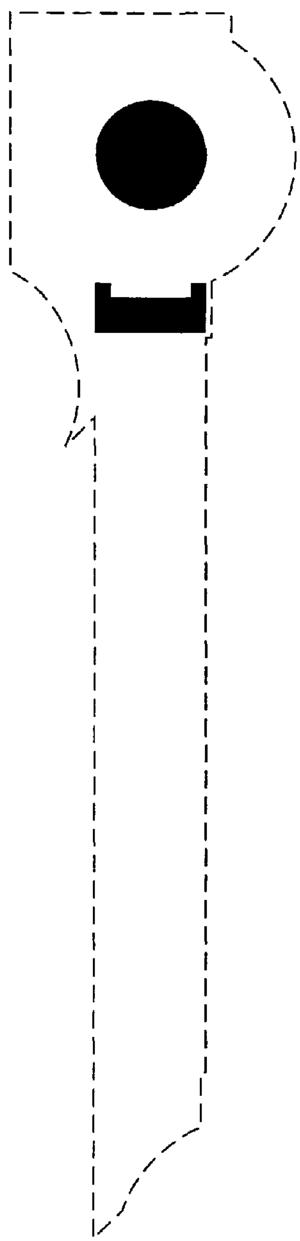
FIG. 1064
Nozzle mask
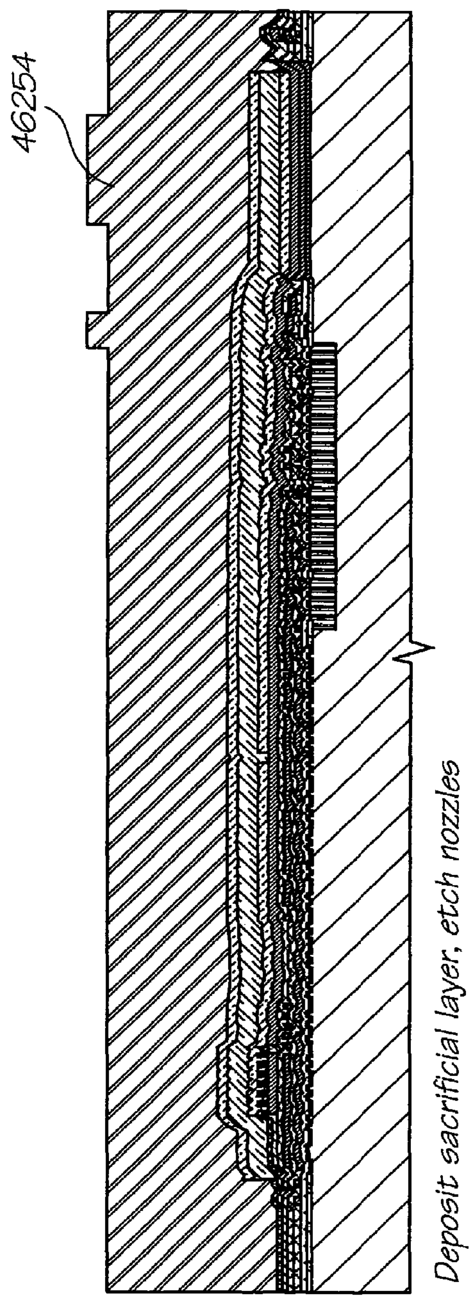
FIG. 1065
Deposit sacrificial layer, etch nozzles

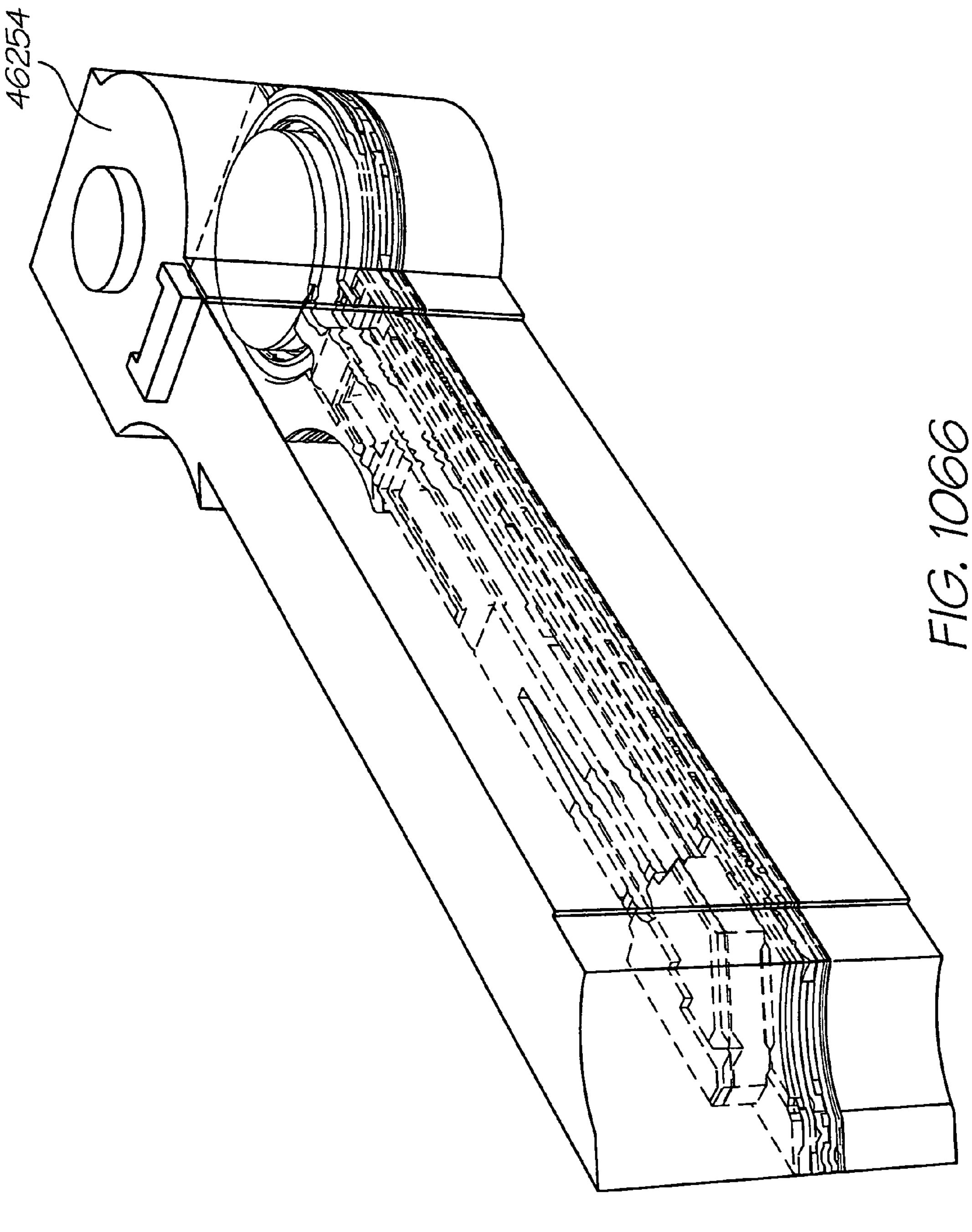
FIG. 1066

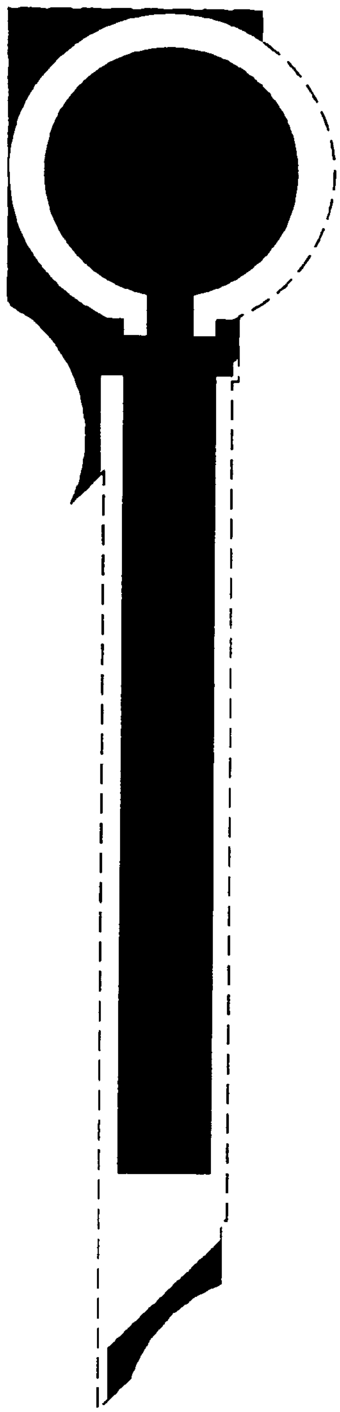
FIG. 1067
Chamber mask
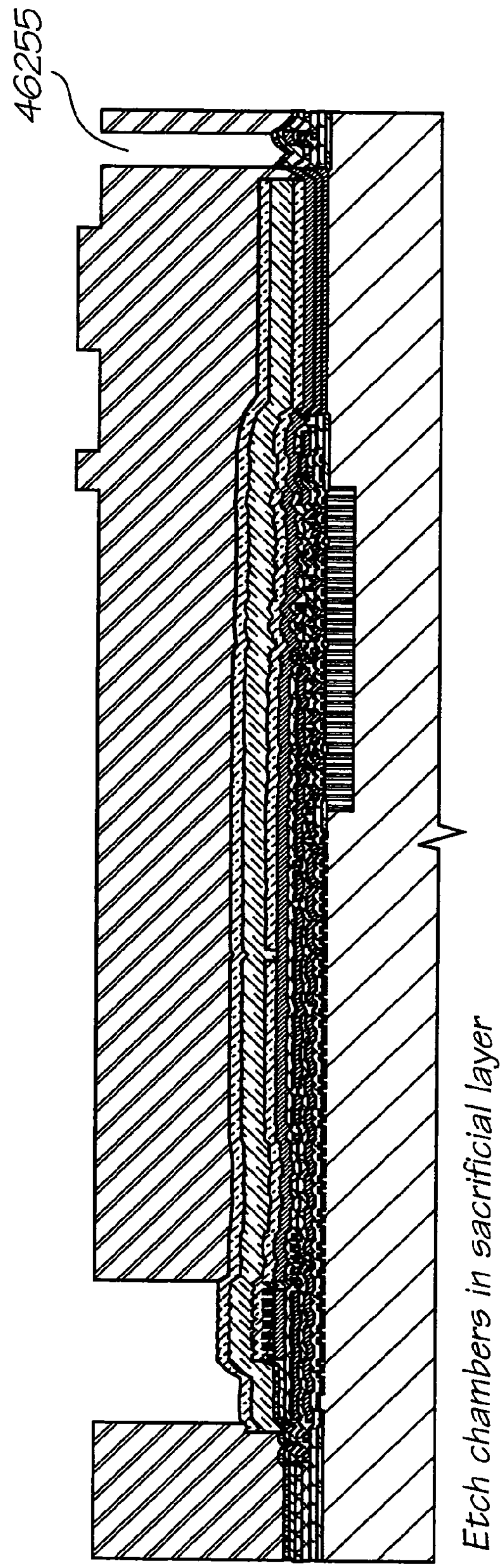
FIG. 1068
Etch chambers in sacrificial layer

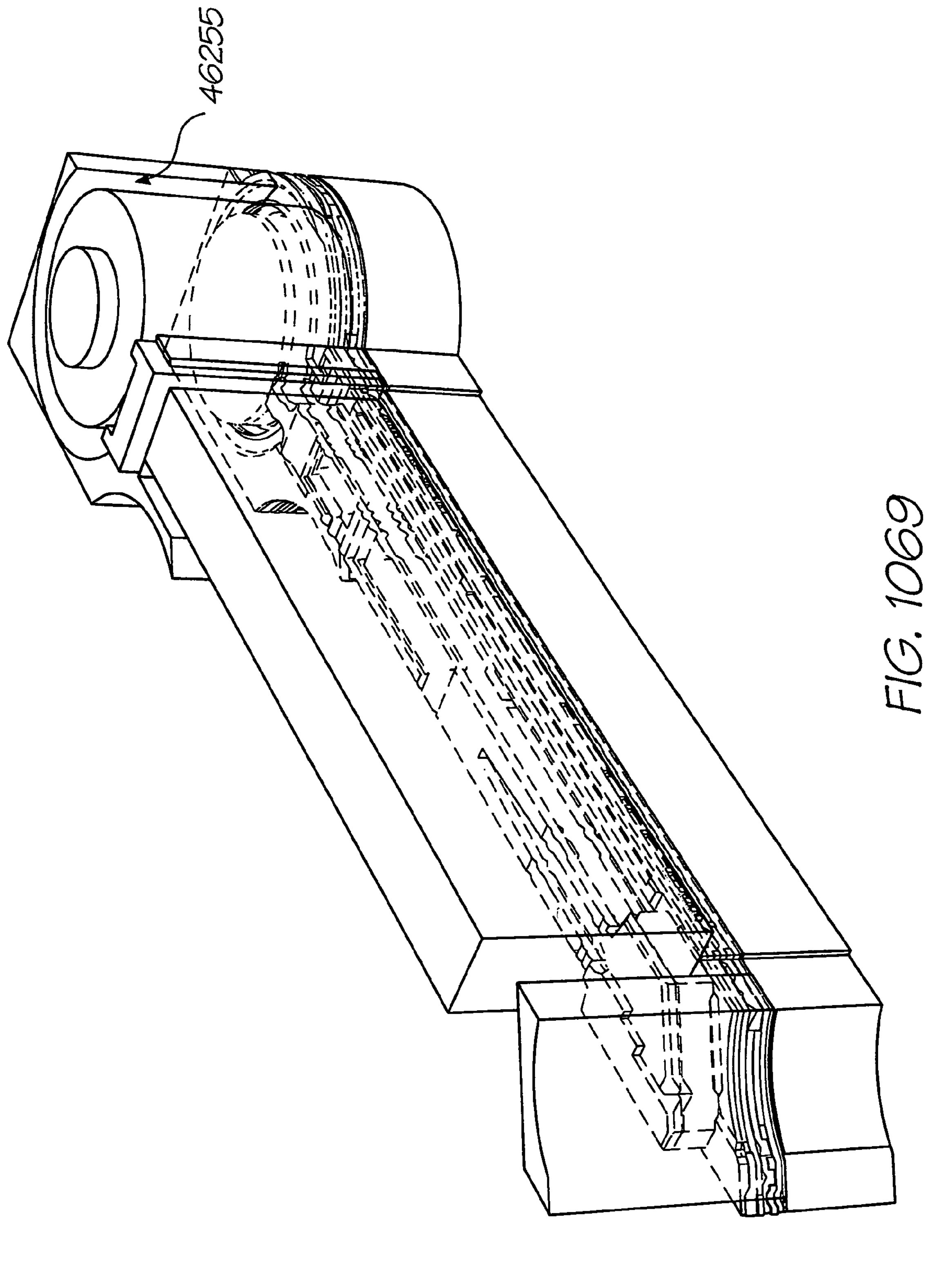
FIG. 1069

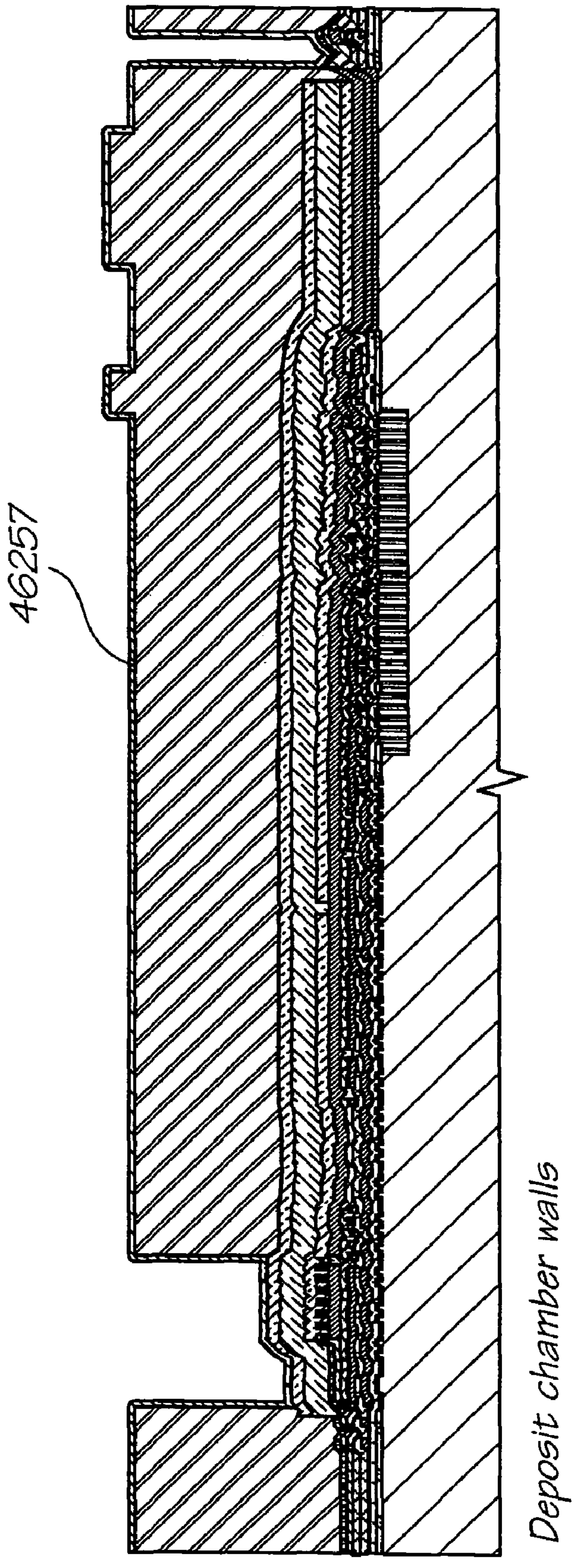
FIG. 1070

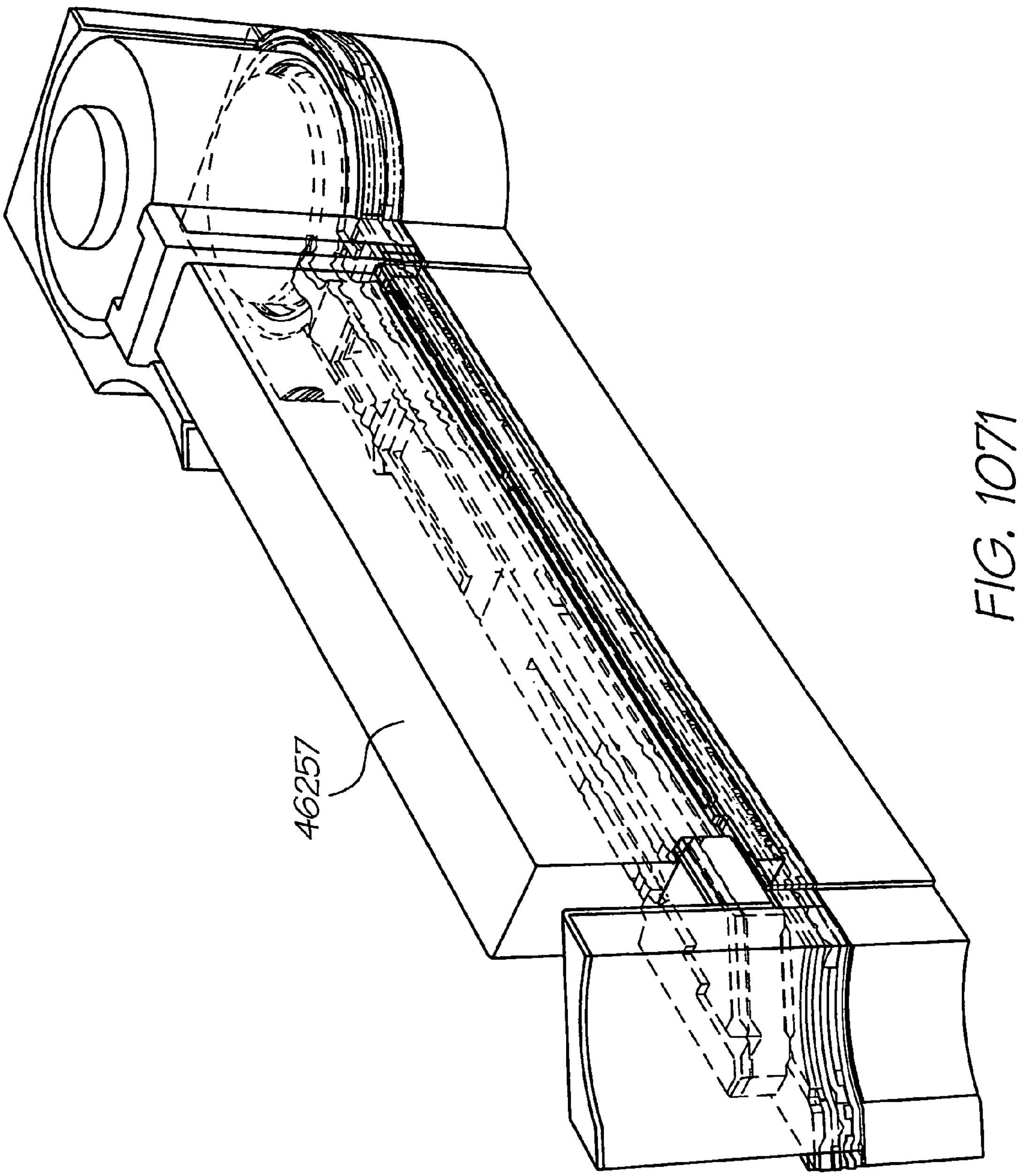
FIG. 1071

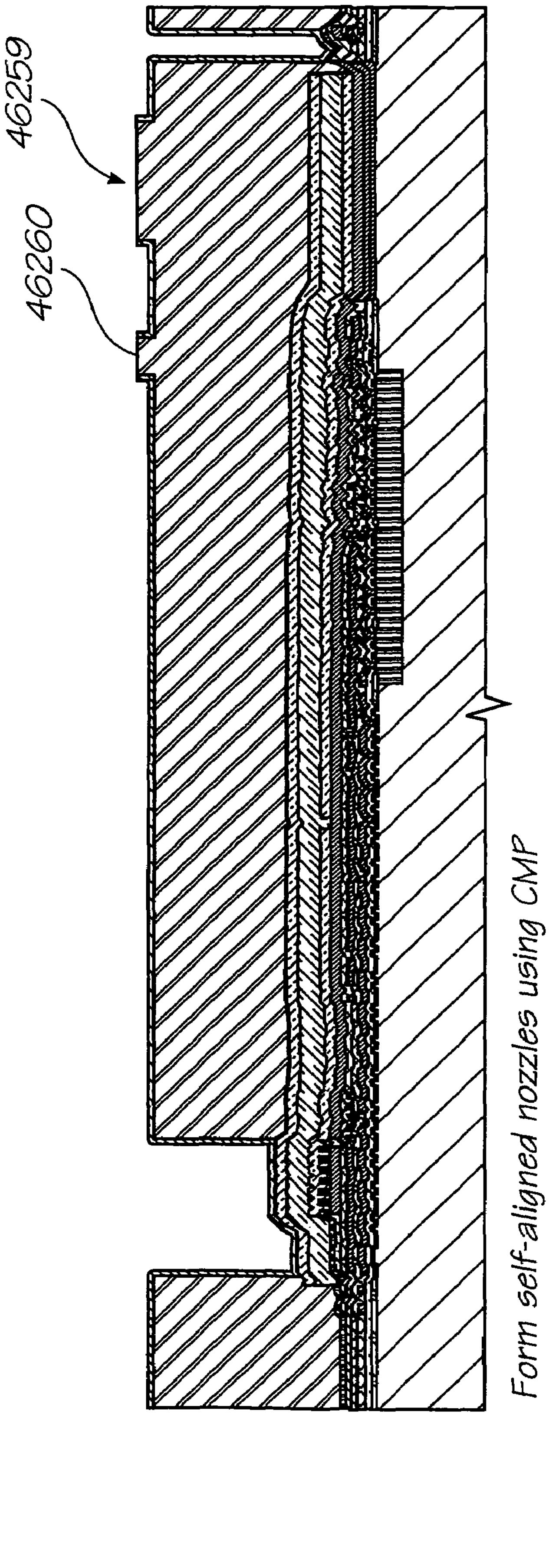
Form self-aligned nozzles using CMP
FIG. 1072

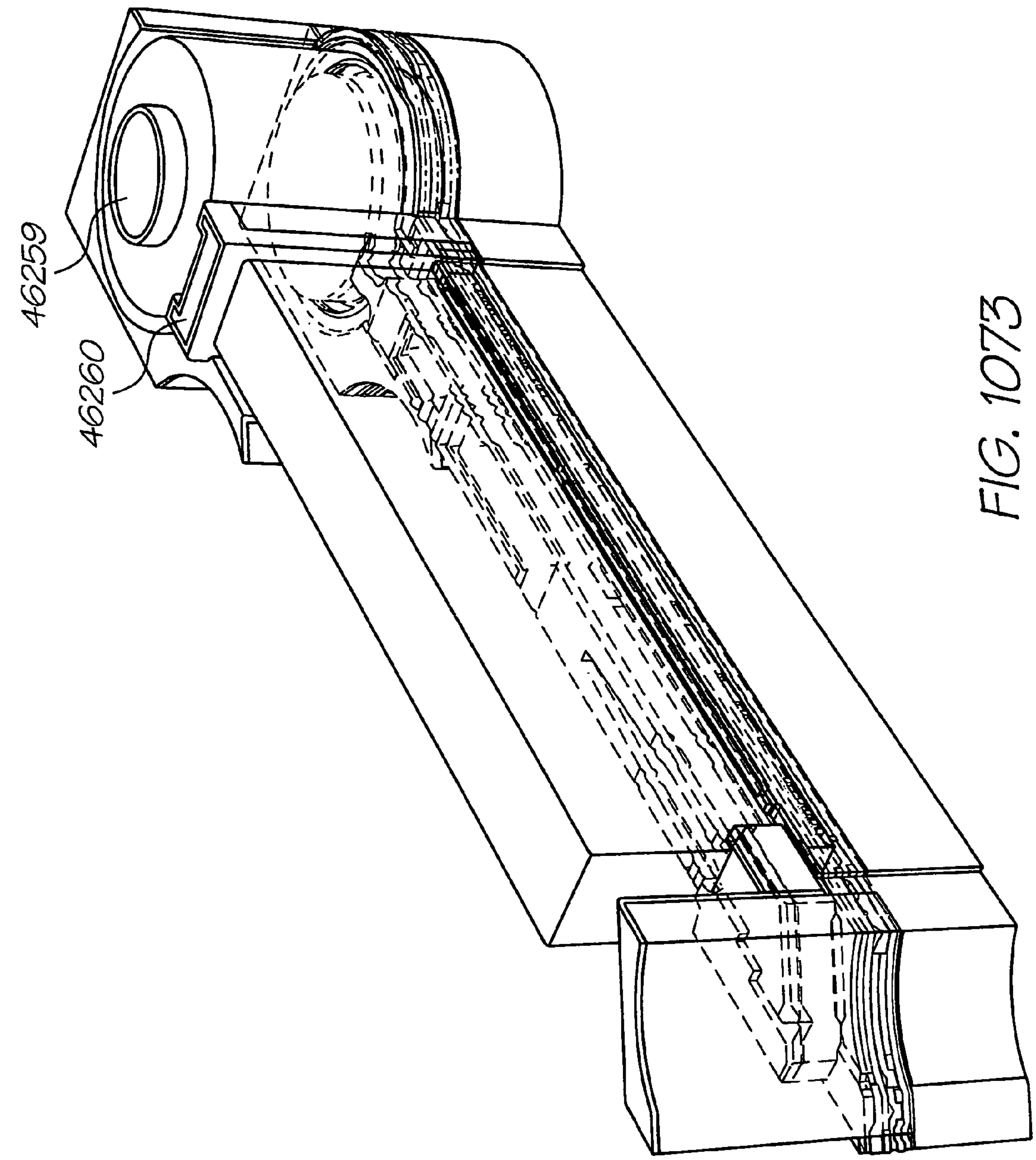
FIG. 1073

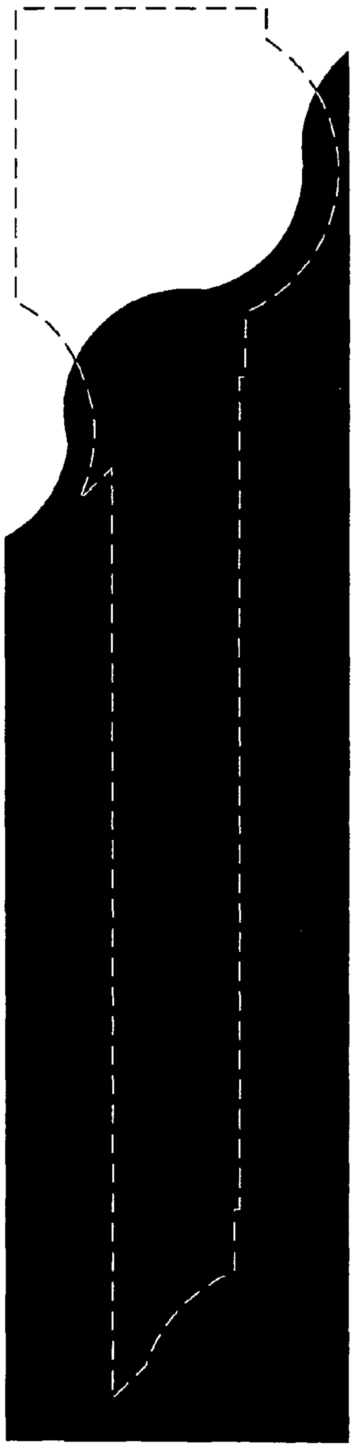
FIG. 1075
Back-etch inlet mask
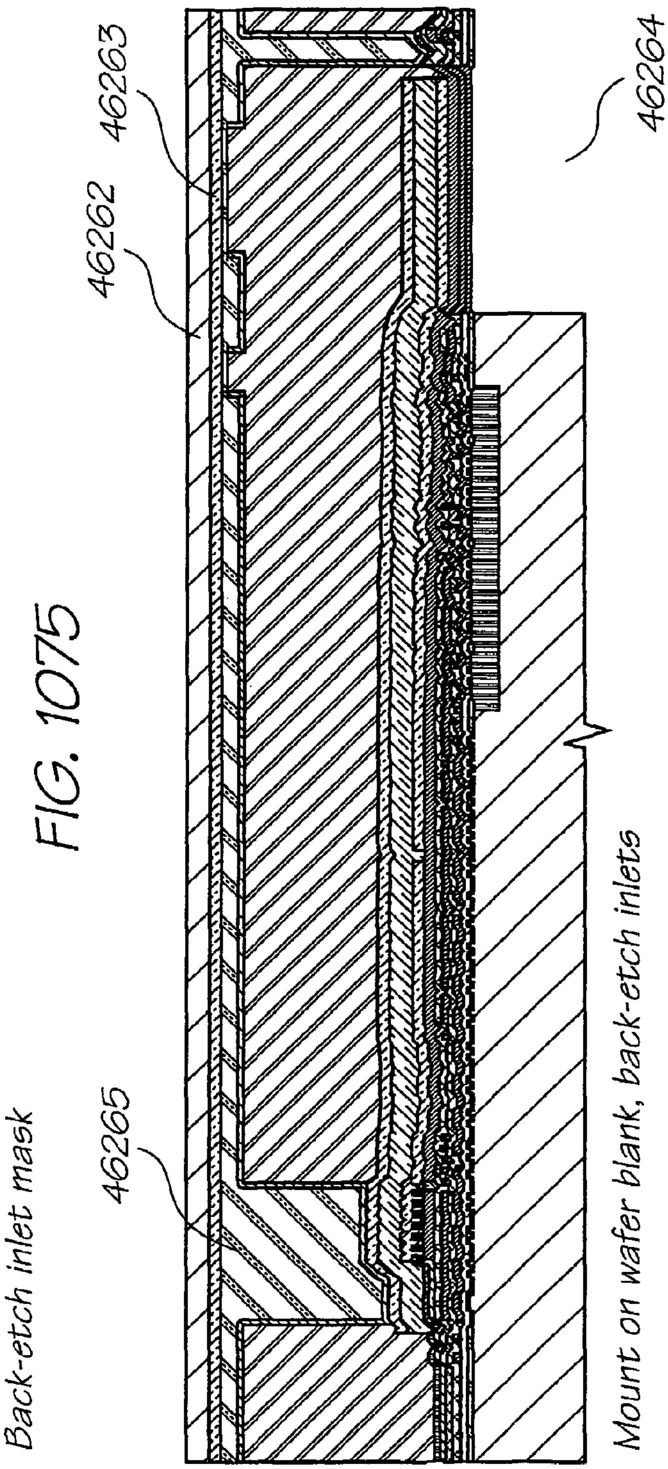
FIG. 1074
Mount on wafer blank, back-etch inlets

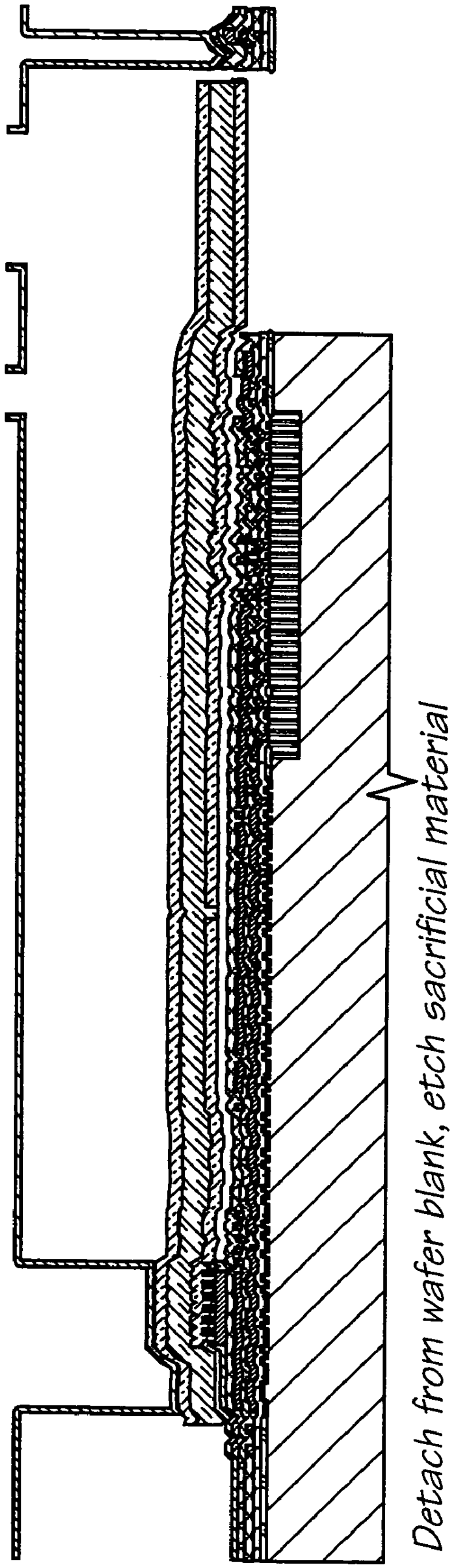
FIG. 1076

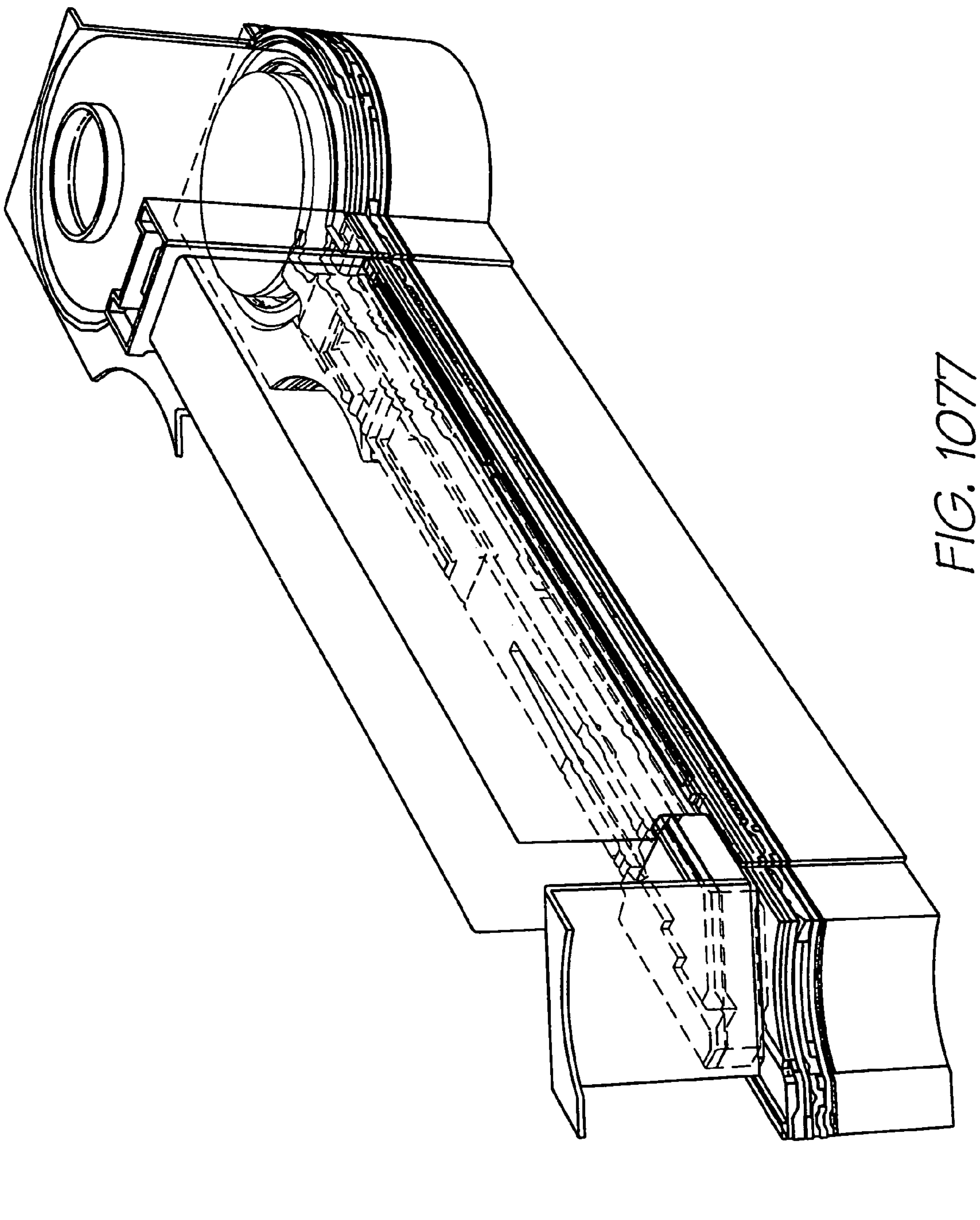
FIG. 1077

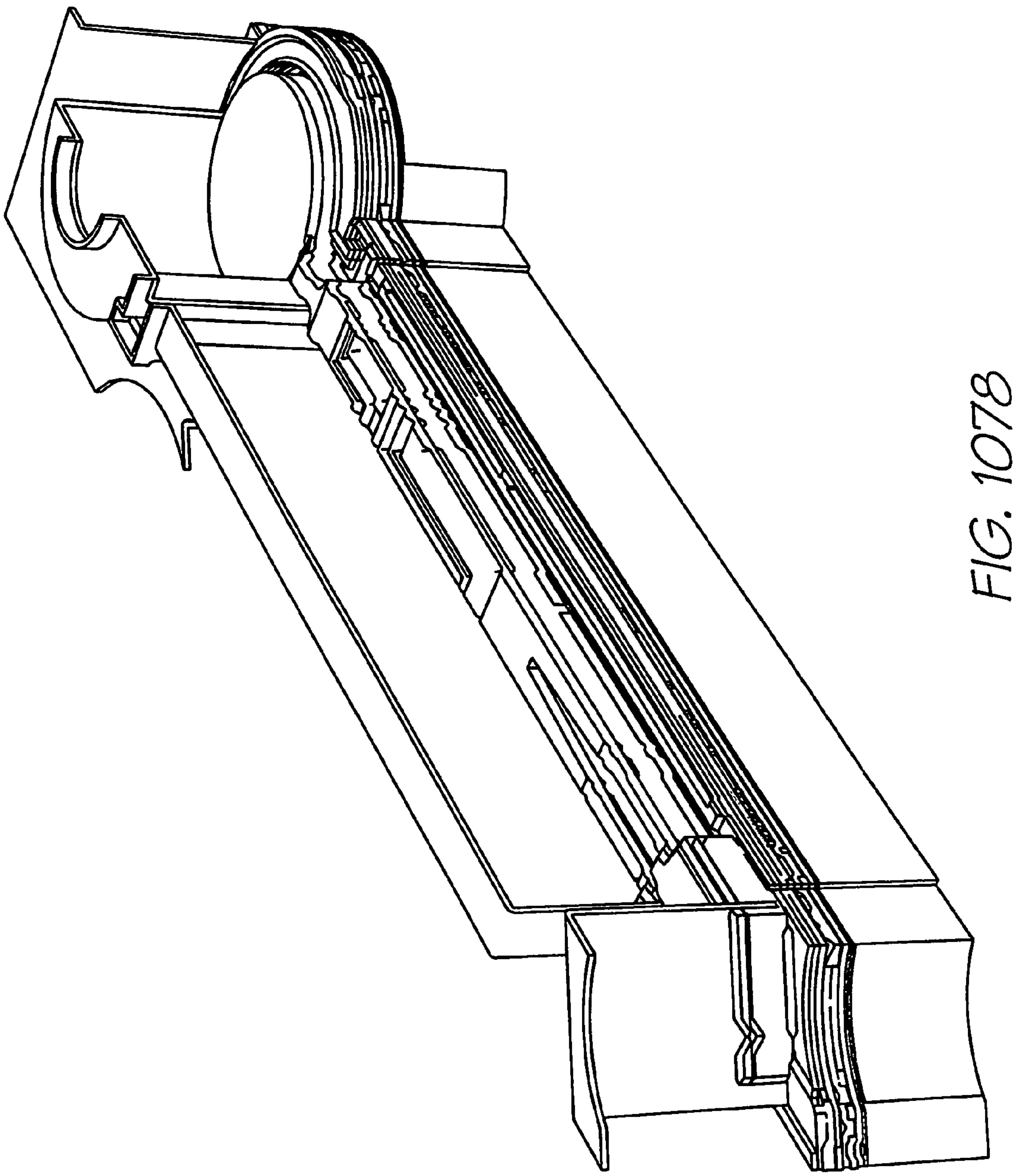
FIG. 1078

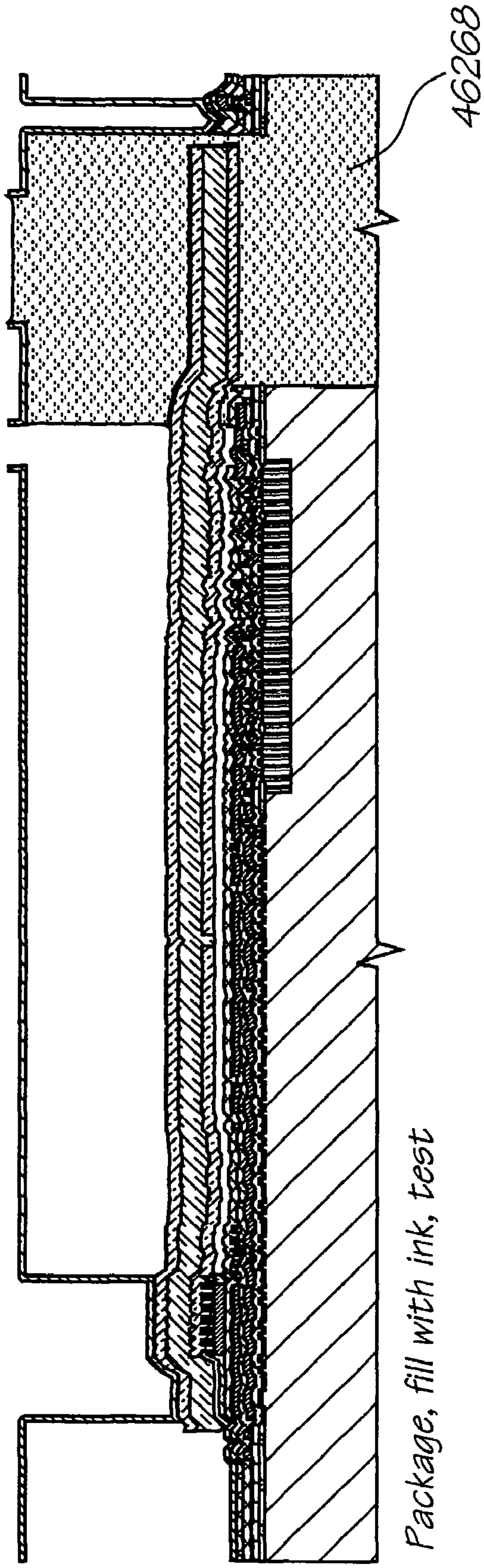
FIG. 1079

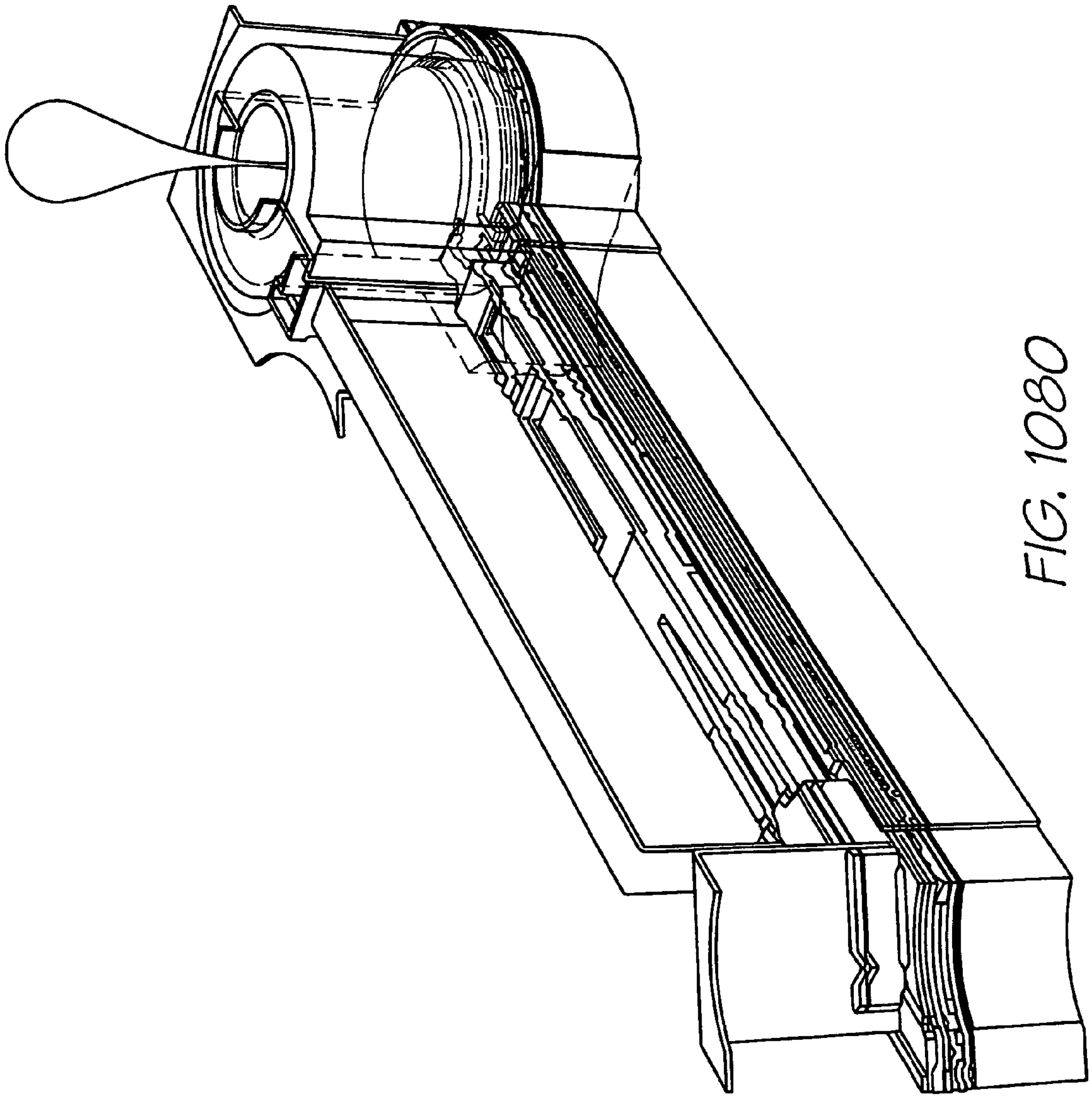
FIG. 1080

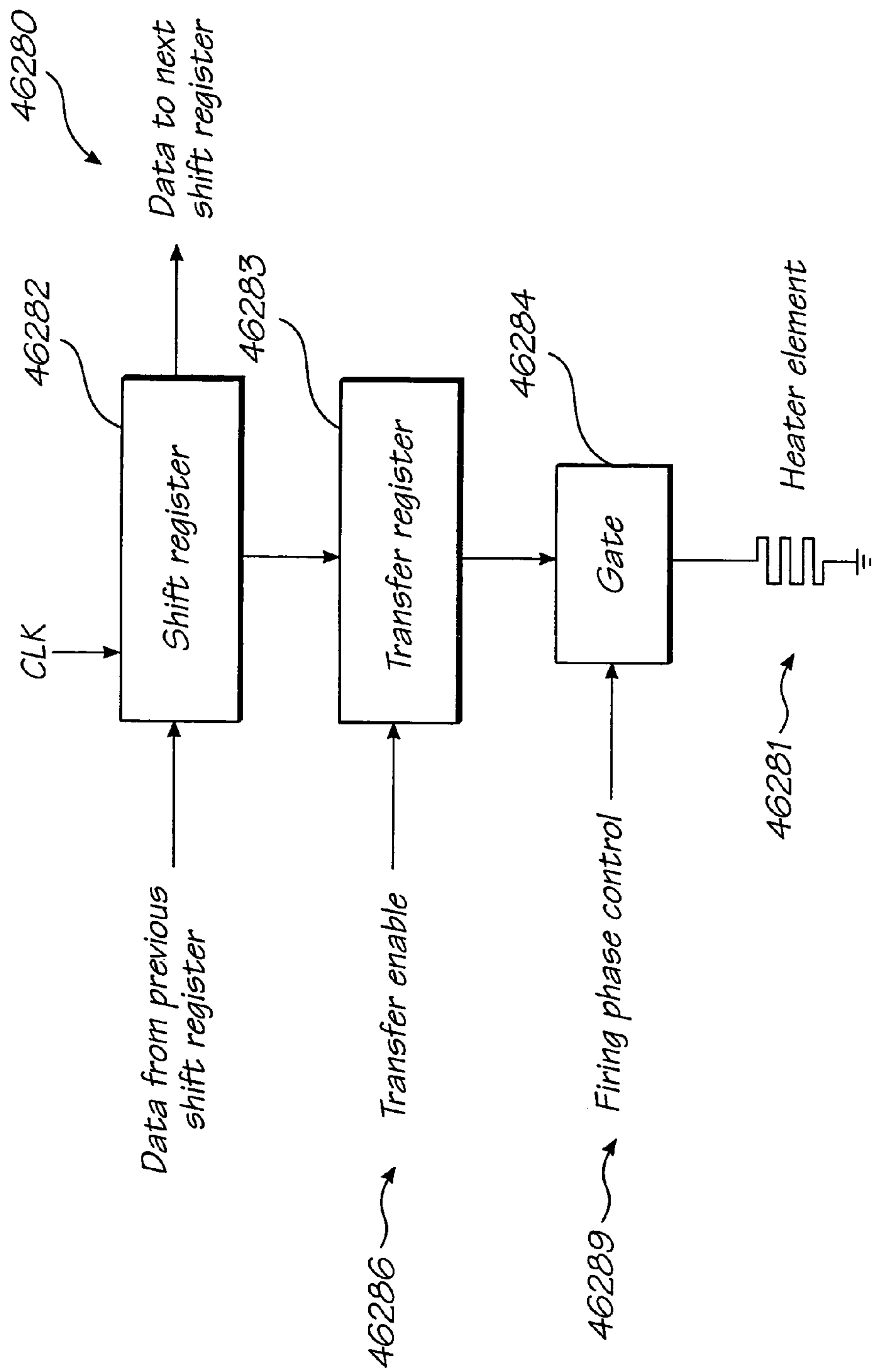
FIG. 1081

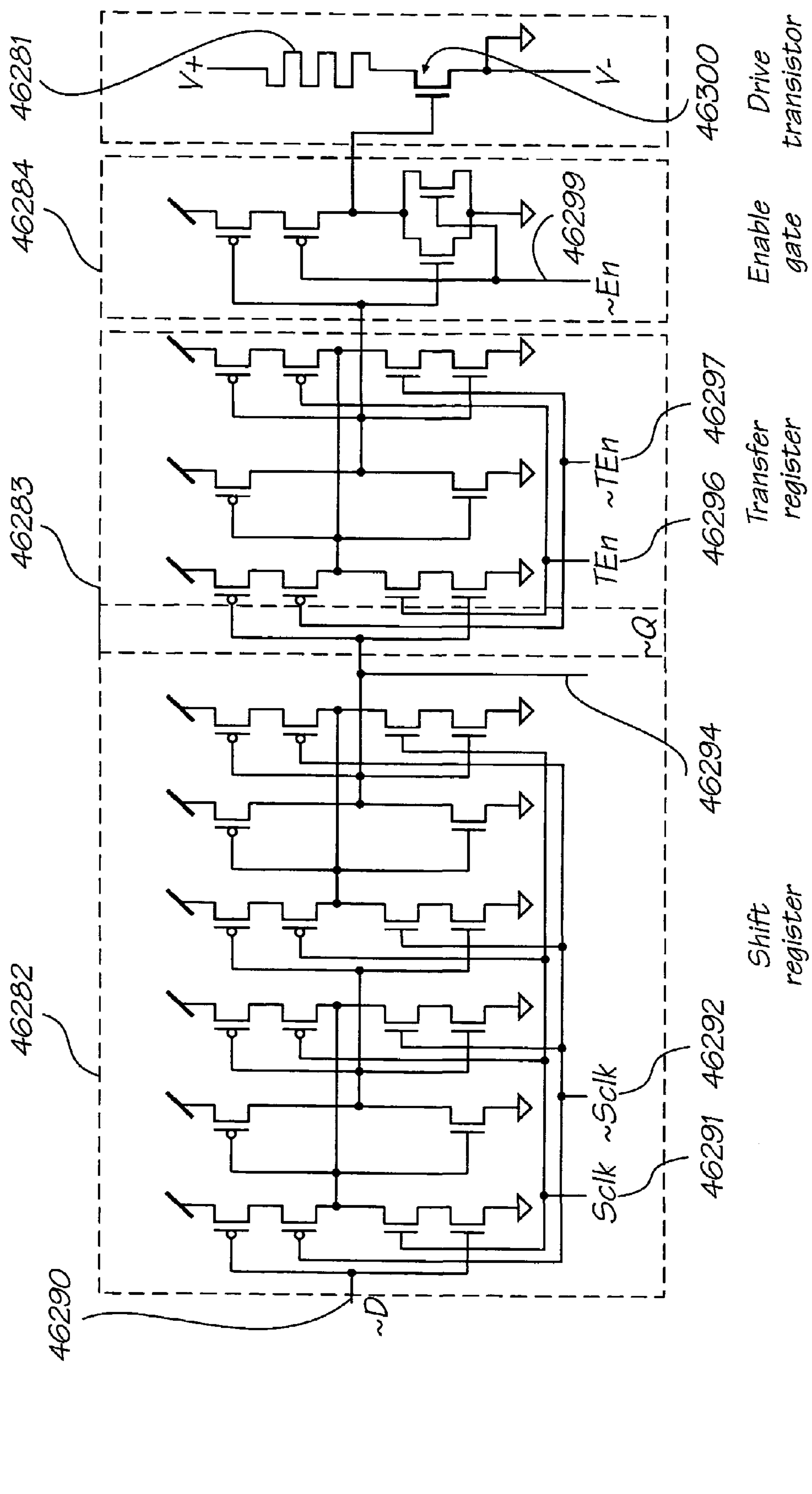
FIG. 1082

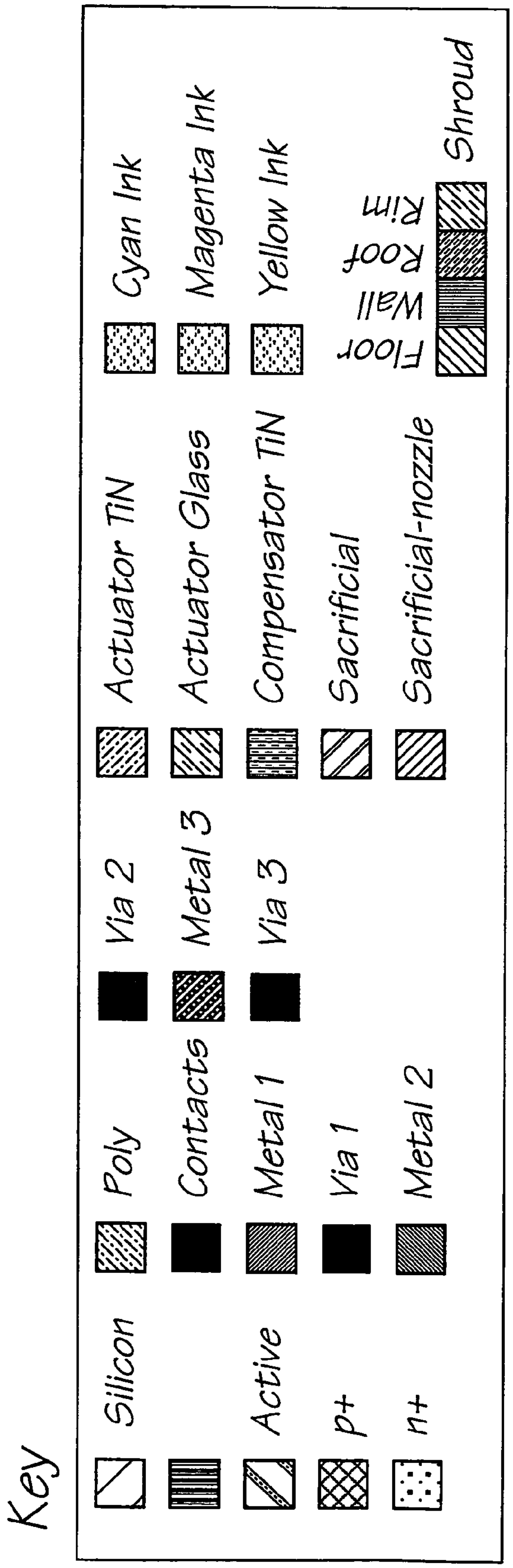
FIG. 1083

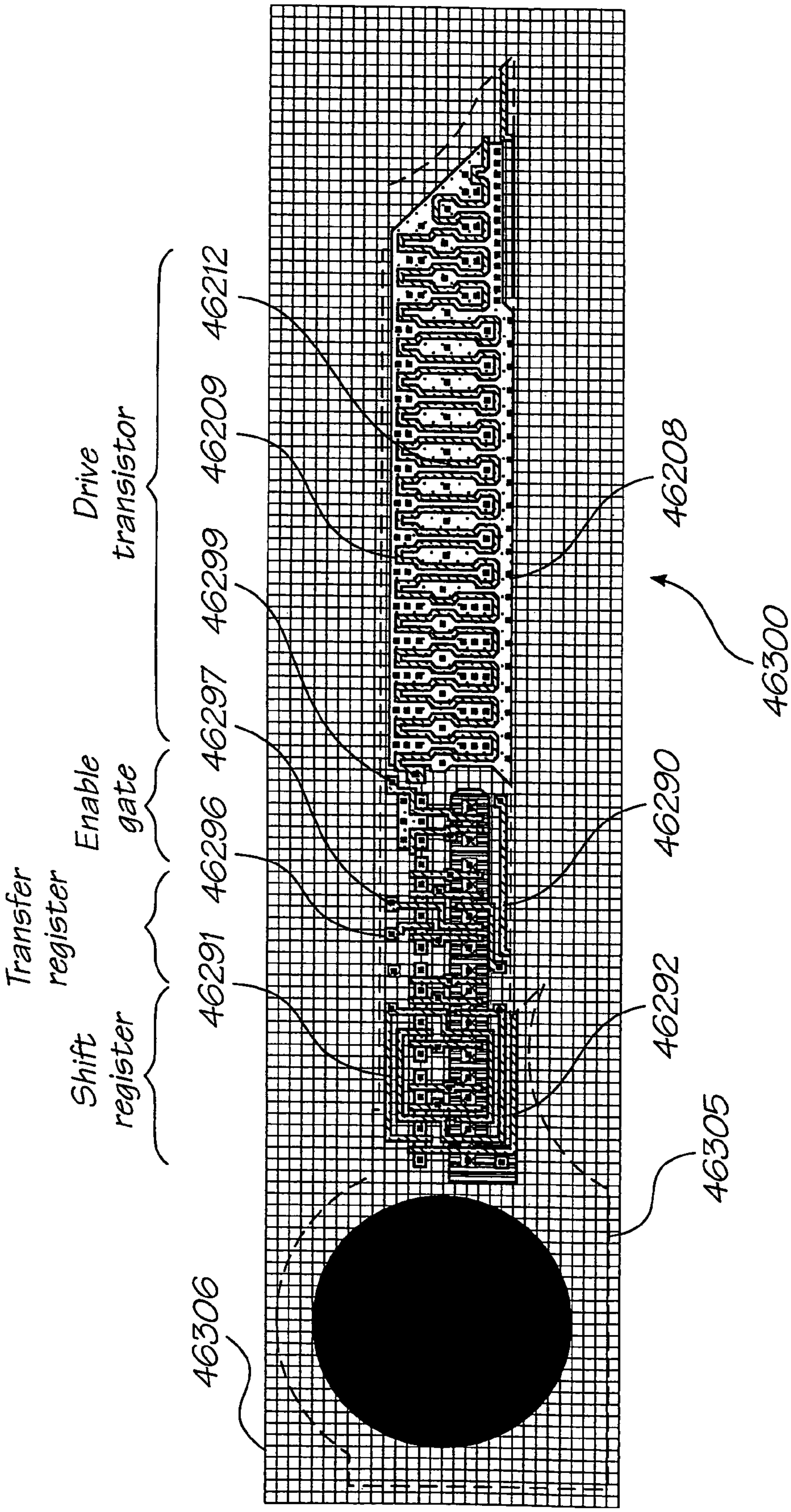
FIG. 1084

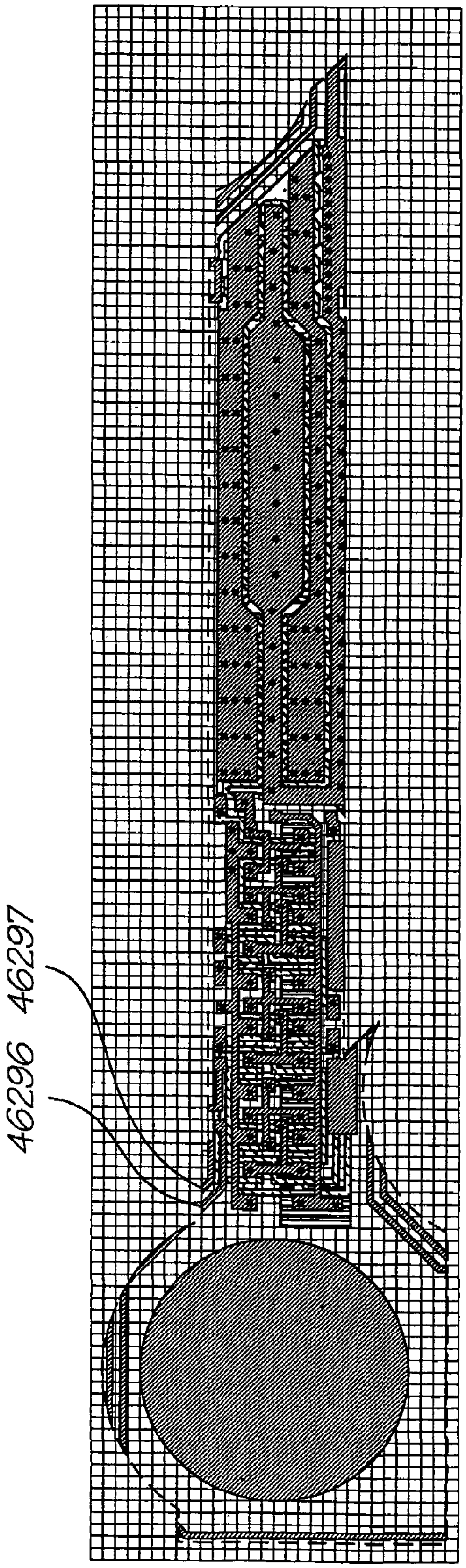
FIG. 1085

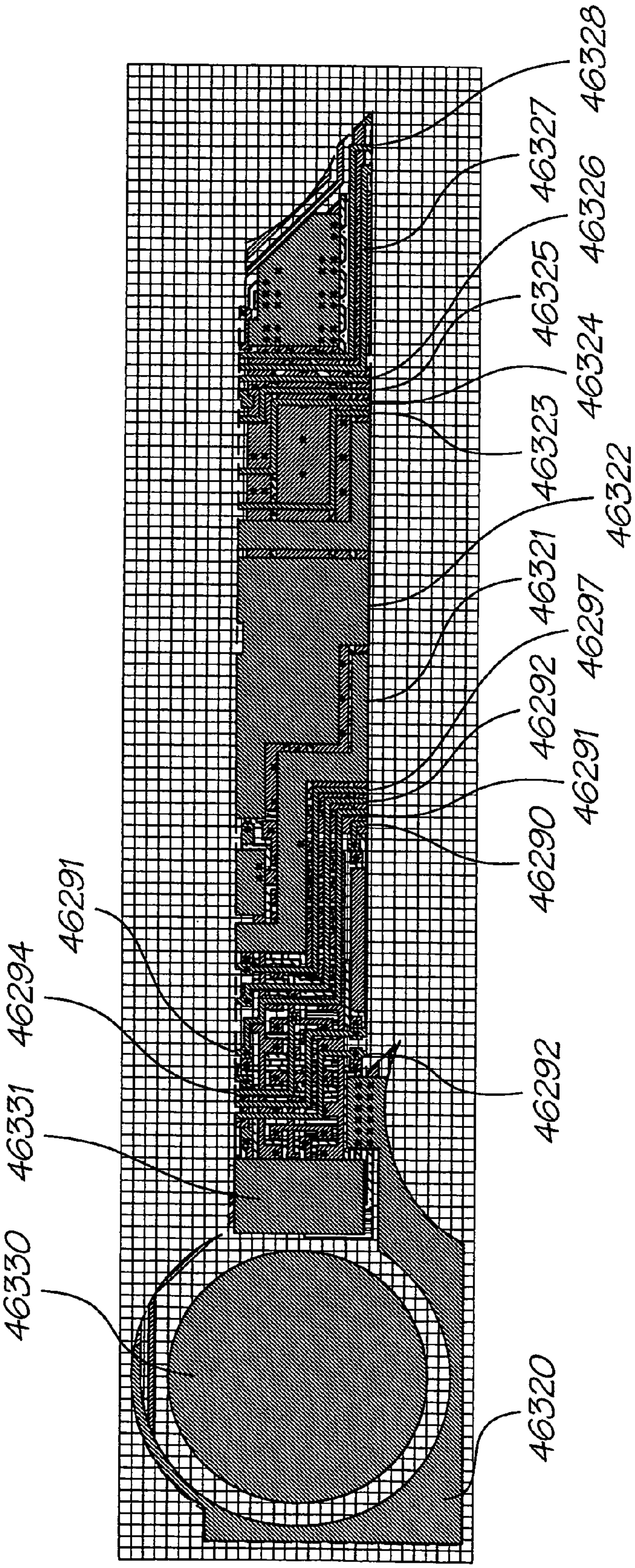
FIG. 1086

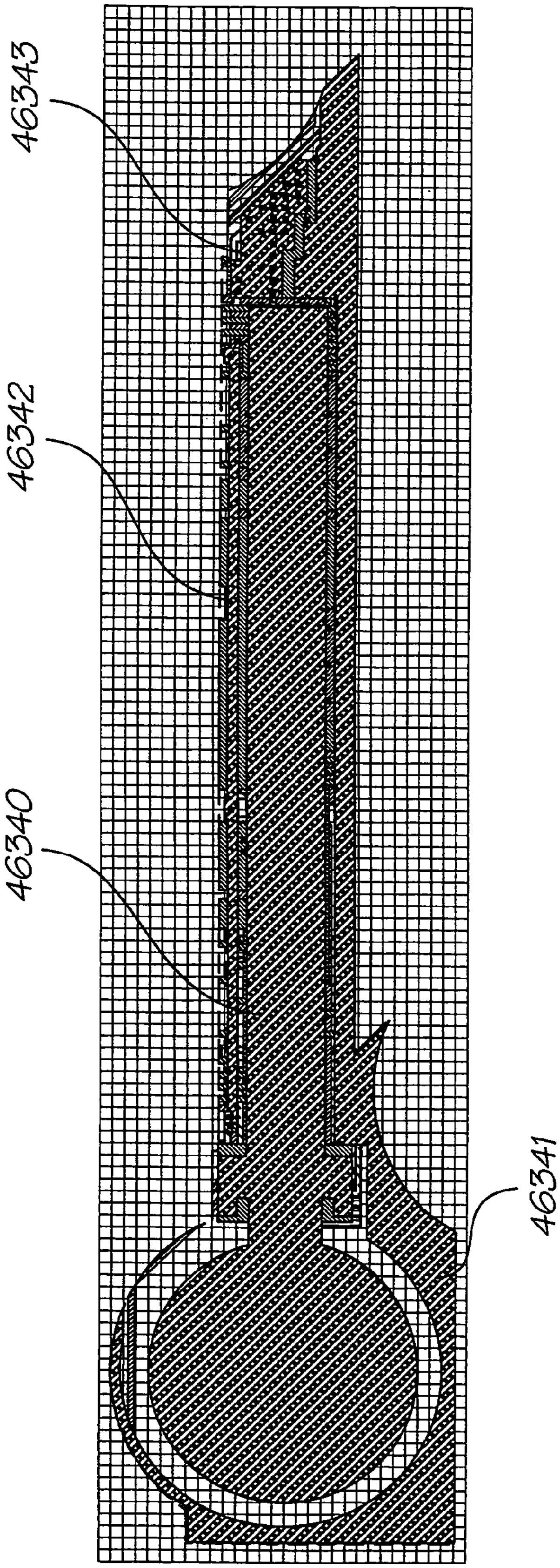
FIG. 1087

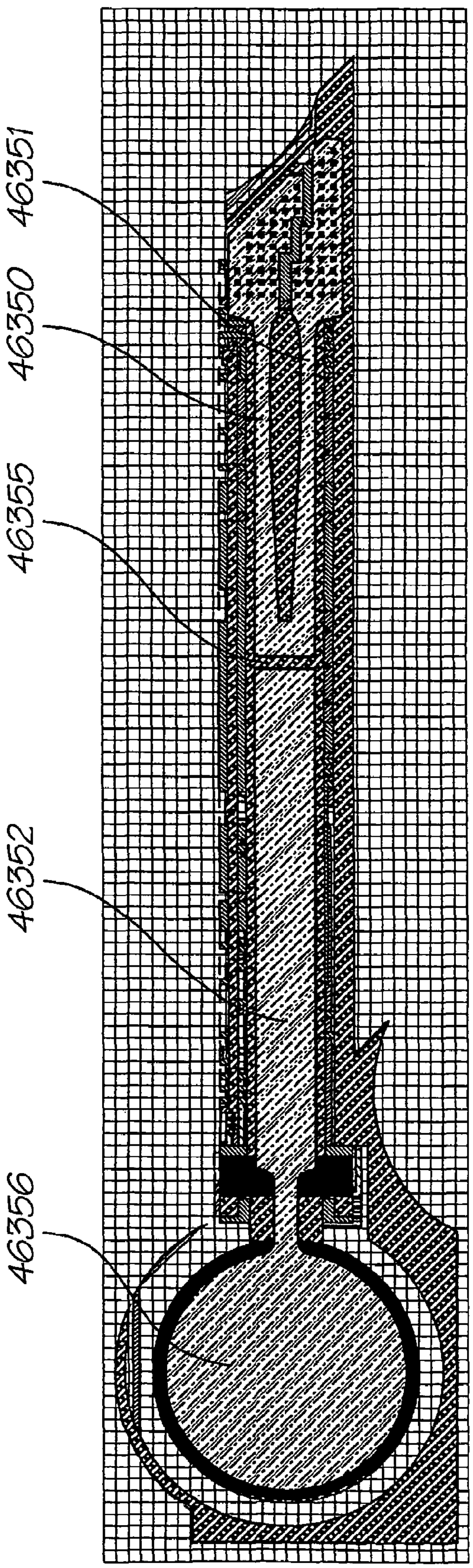
FIG. 1088

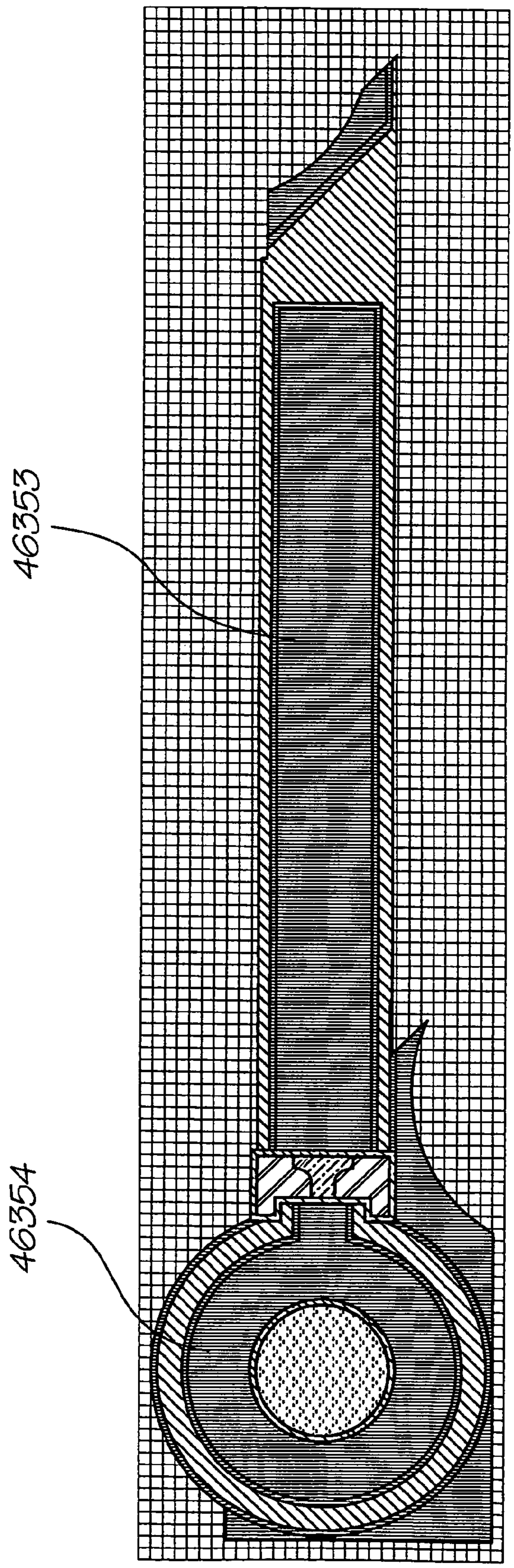
FIG. 1089

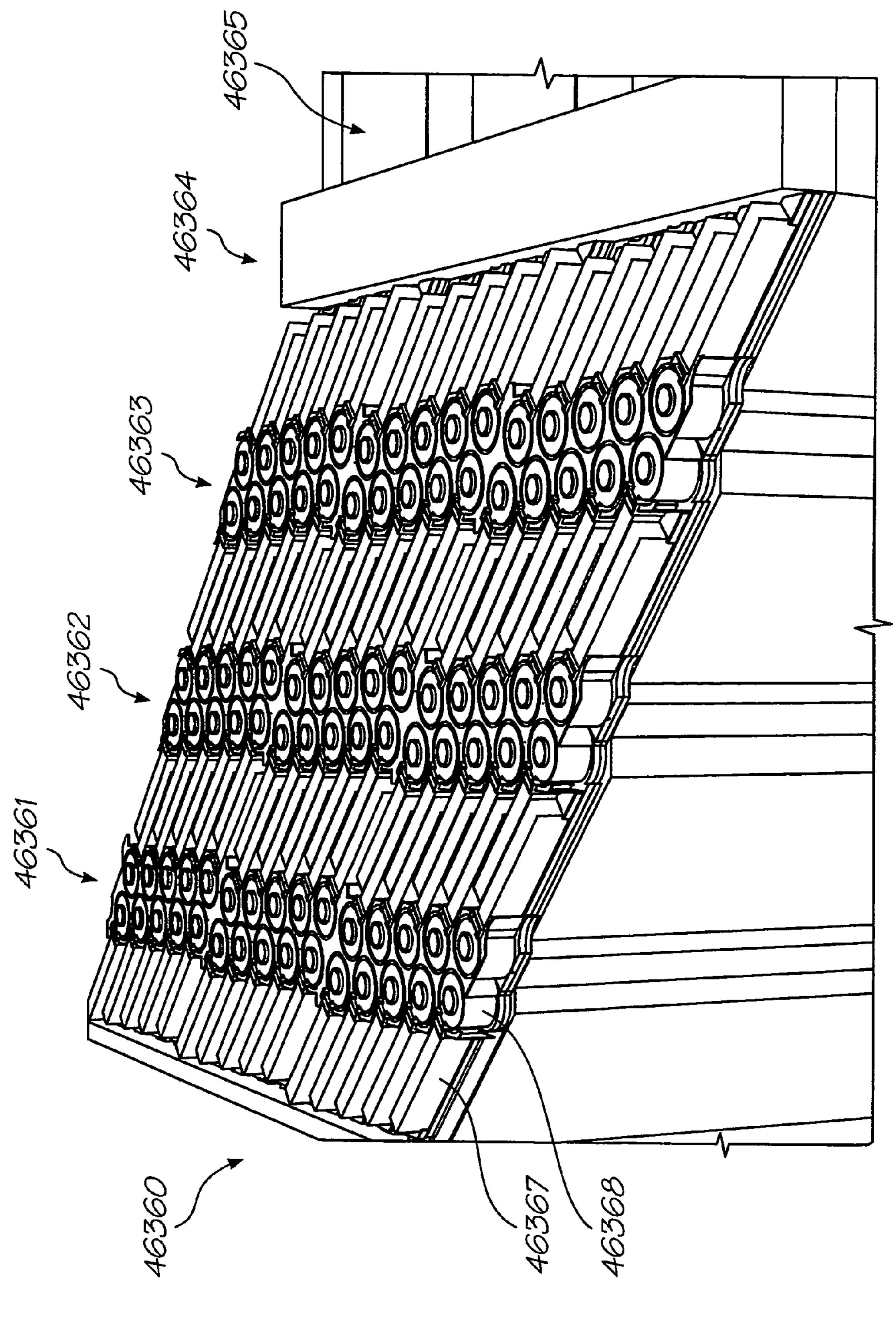
FIG. 1090

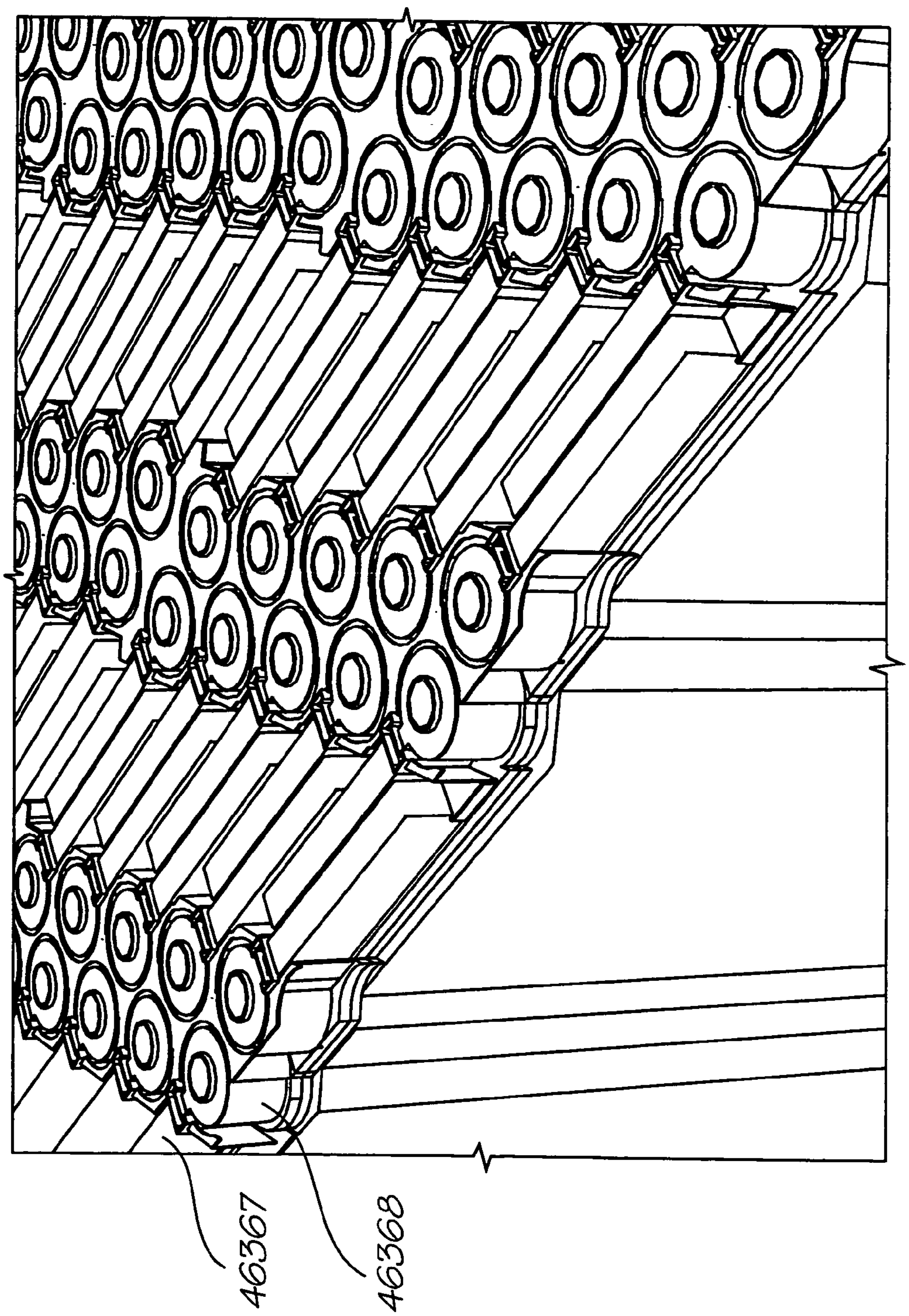
FIG. 1091

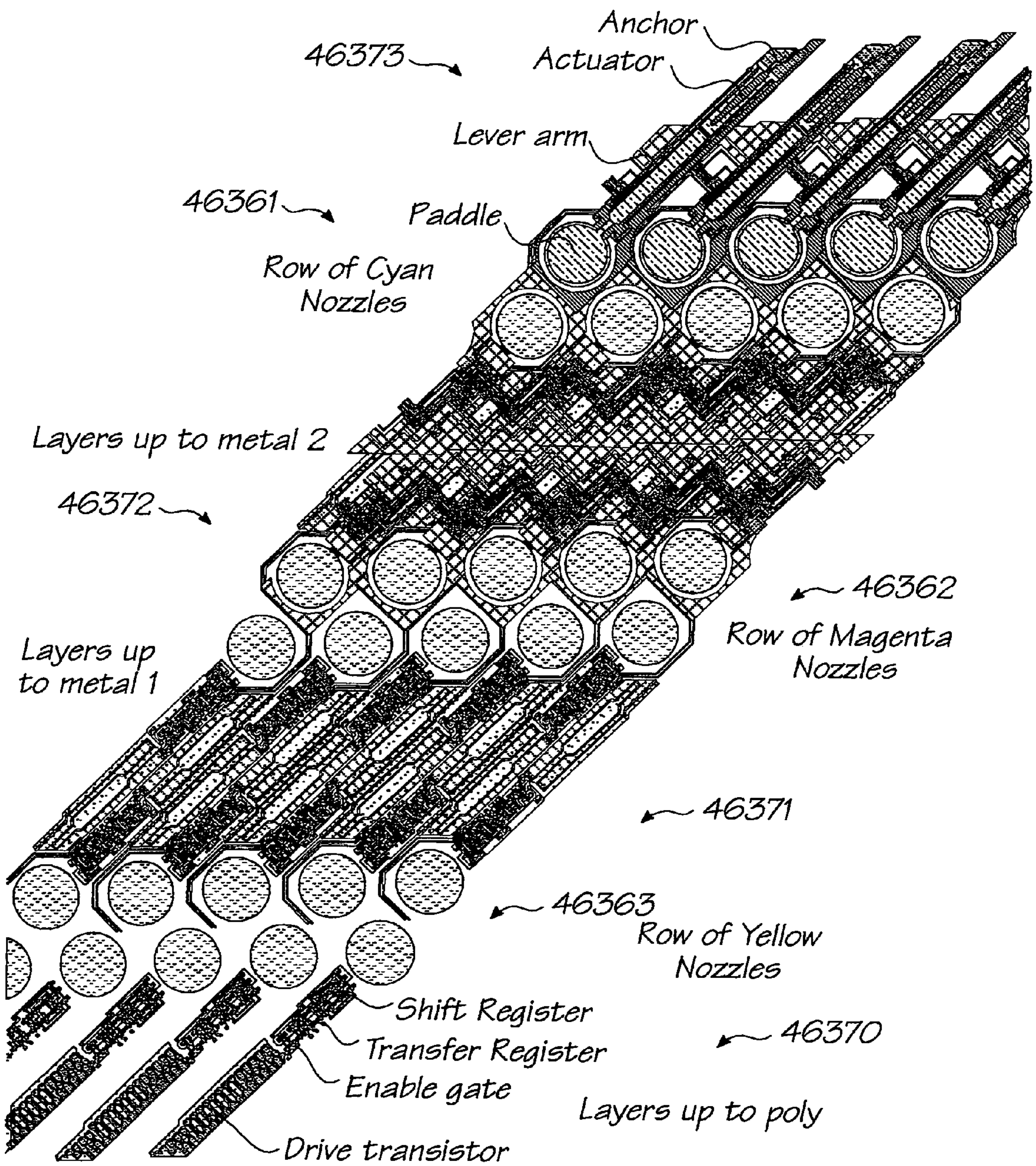
FIG. 1092

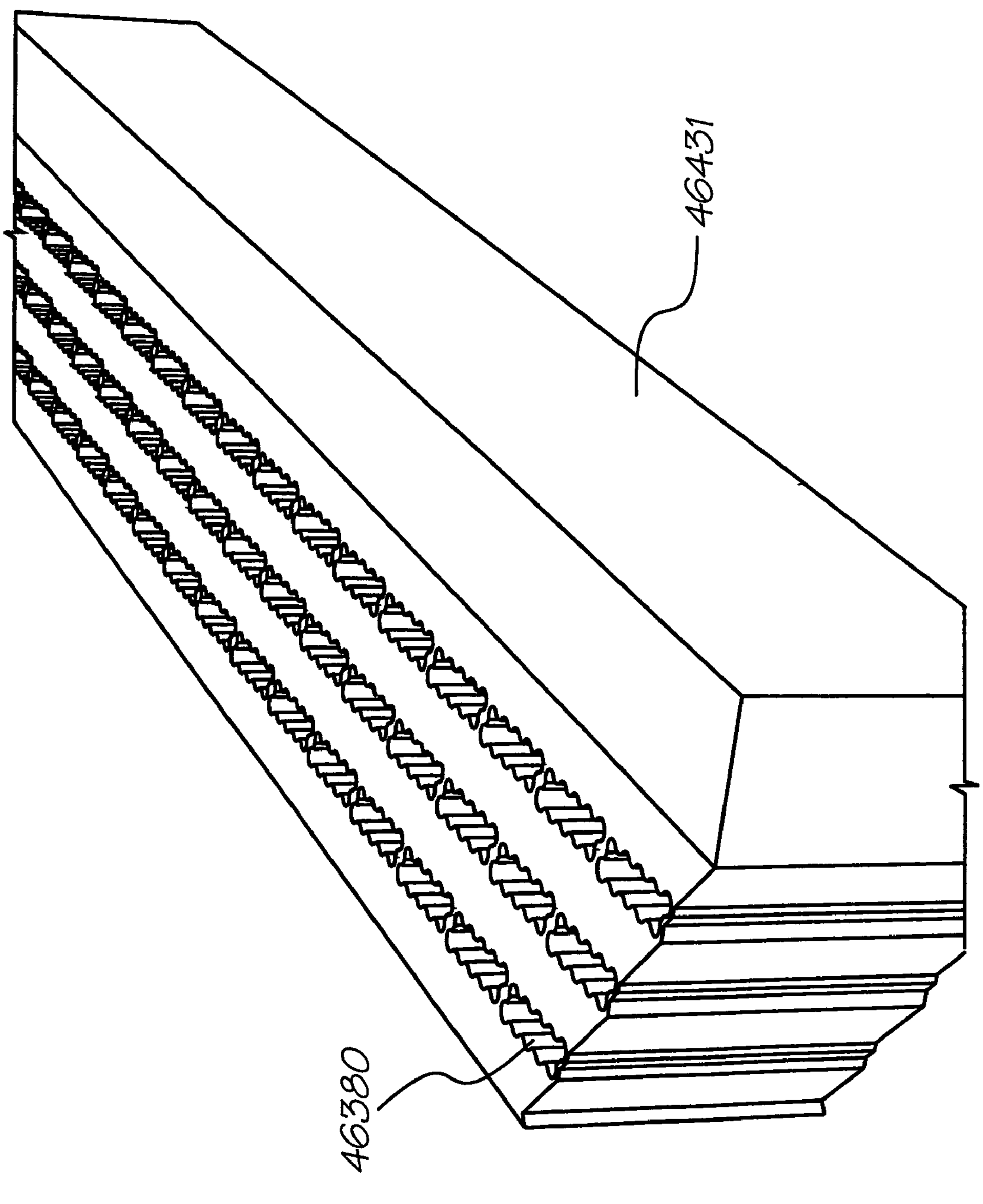
FIG. 1093

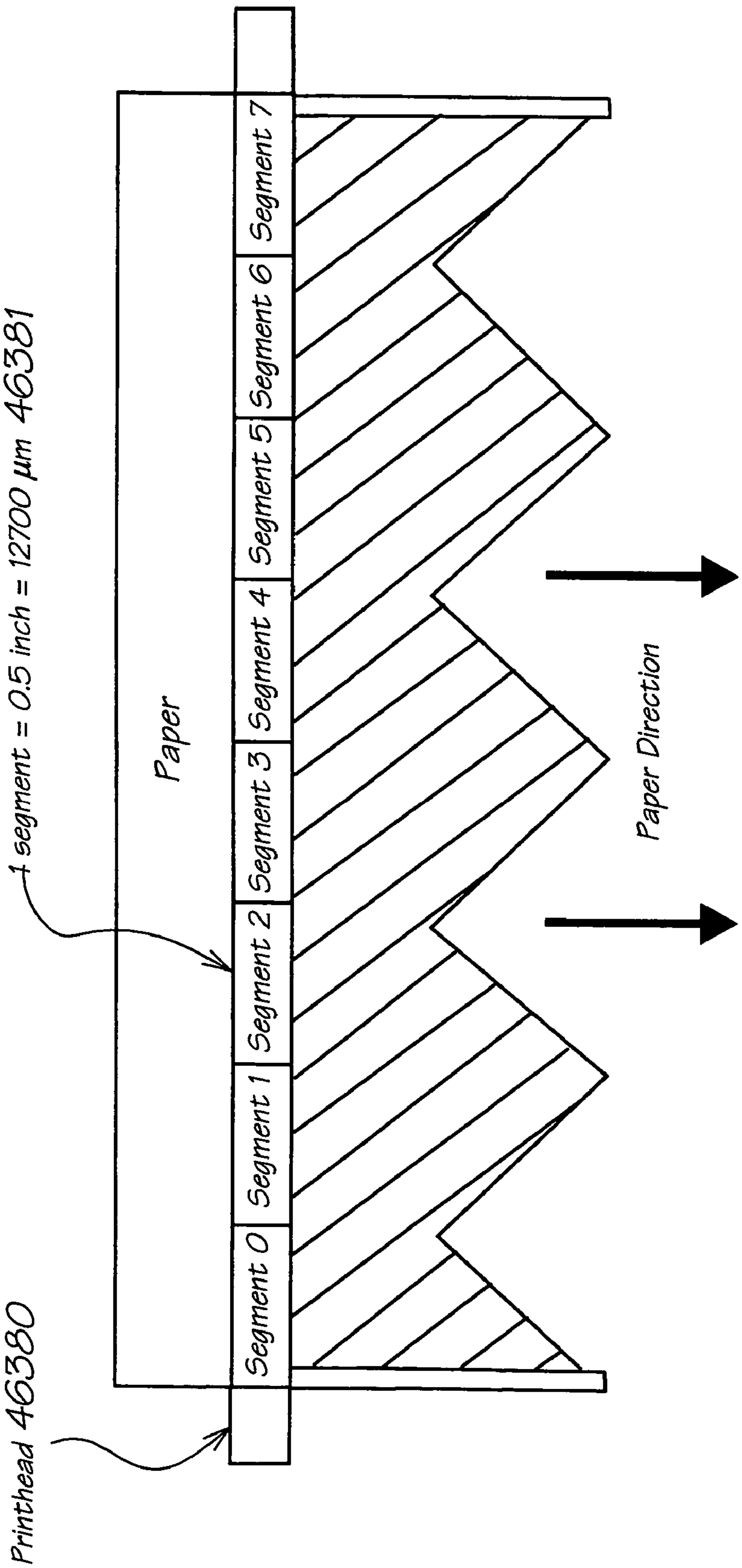
FIG. 1094

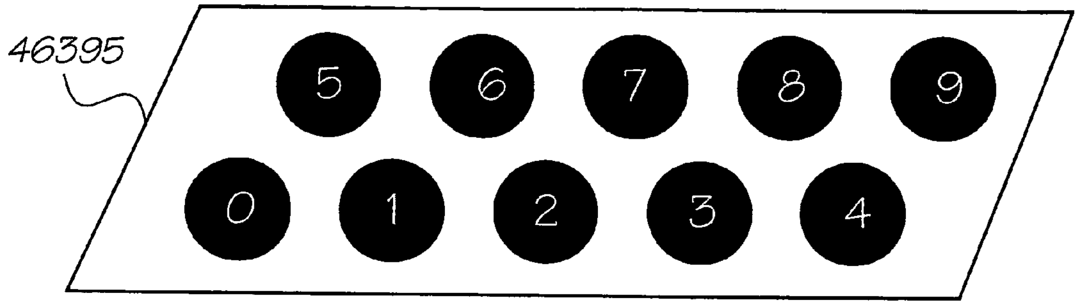
A single pod, numbered by firing order
FIG. 1095
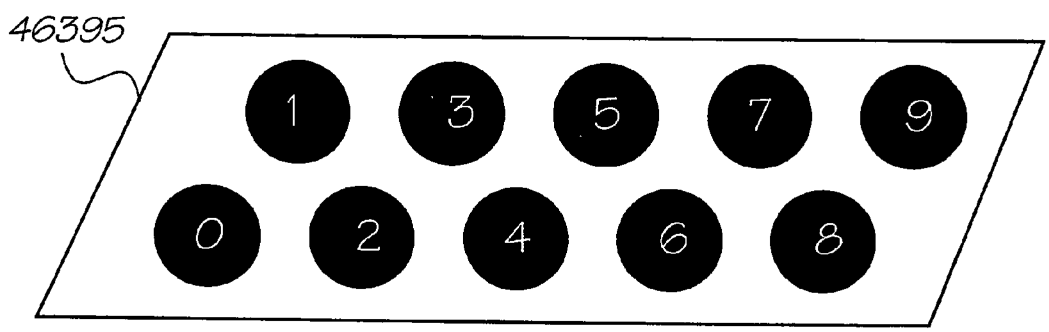
FIG. 1096
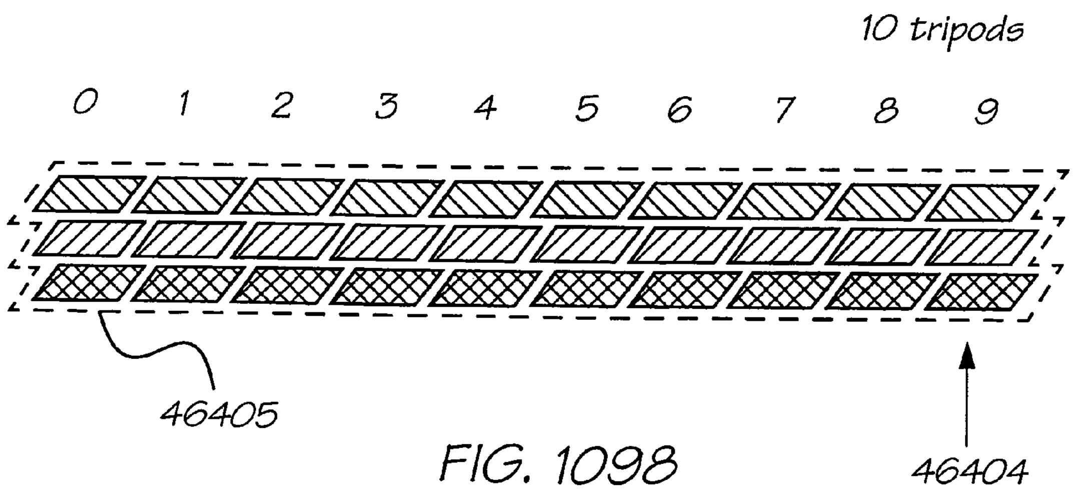
FIG. 1098

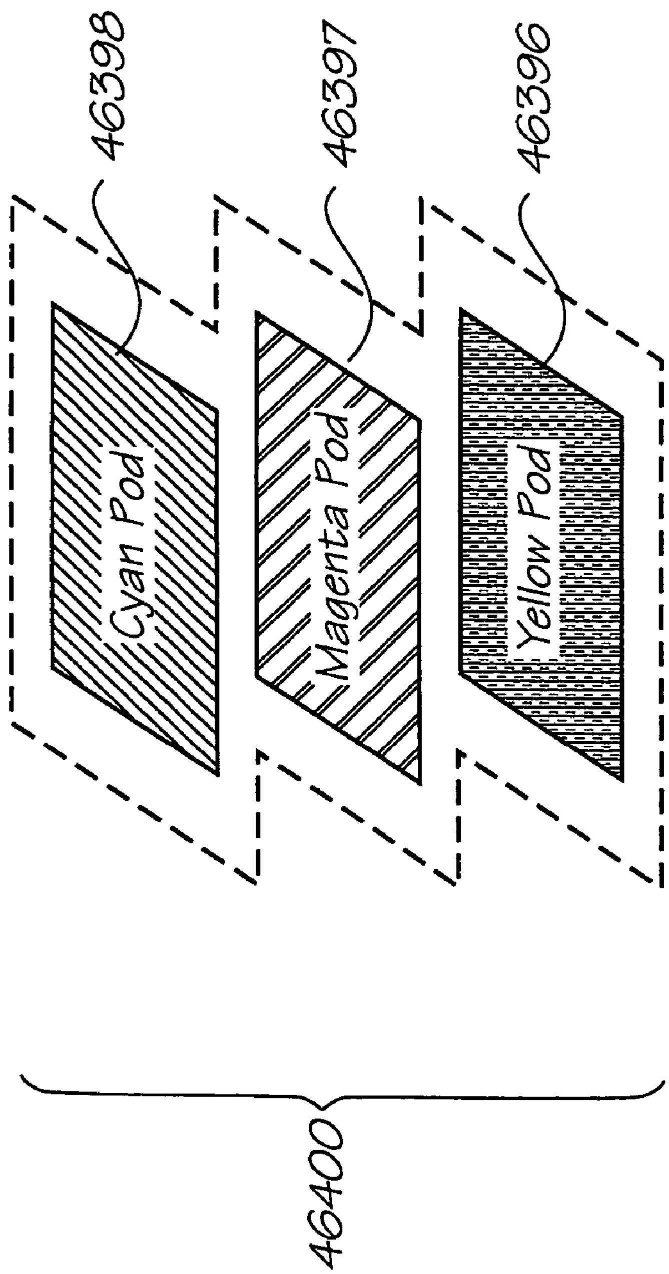
FIG. 1097

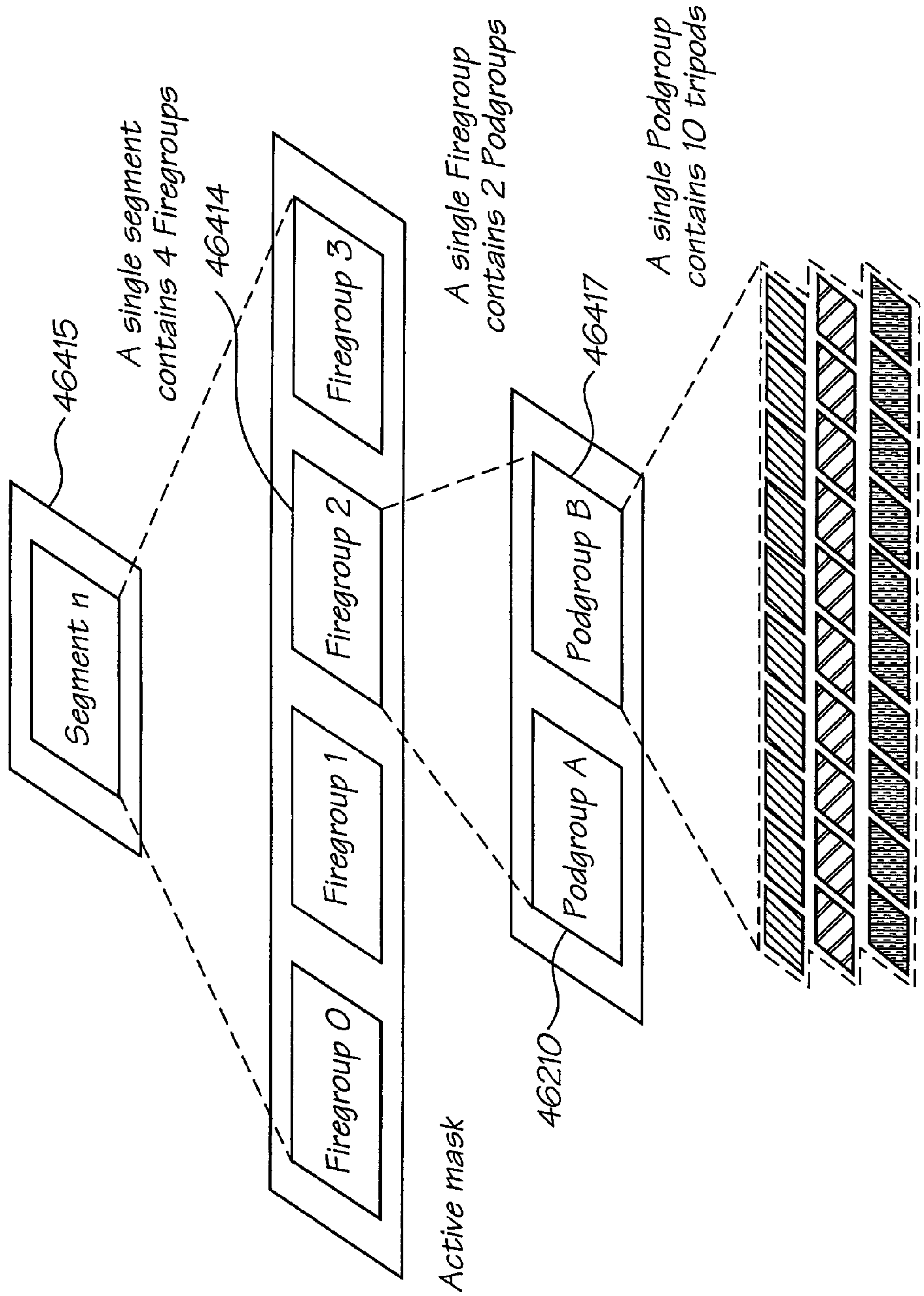
FIG. 1099

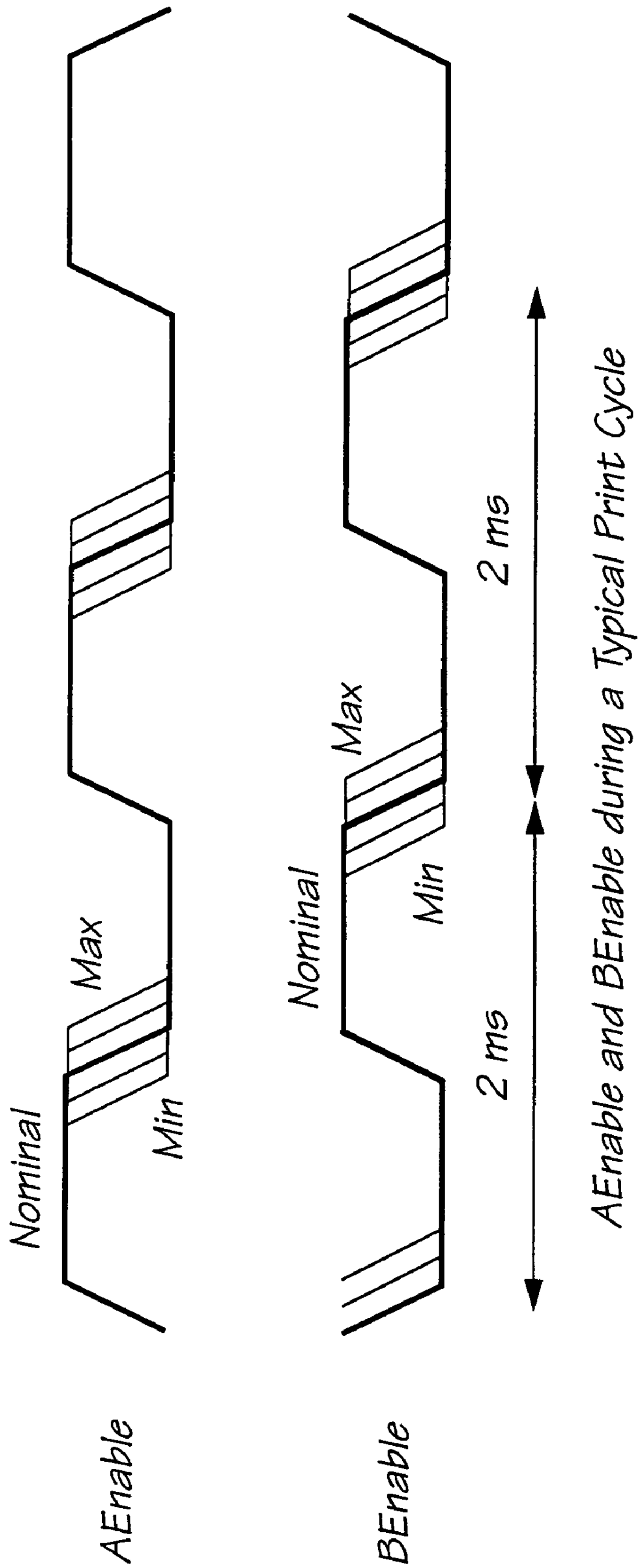
FIG. 1100

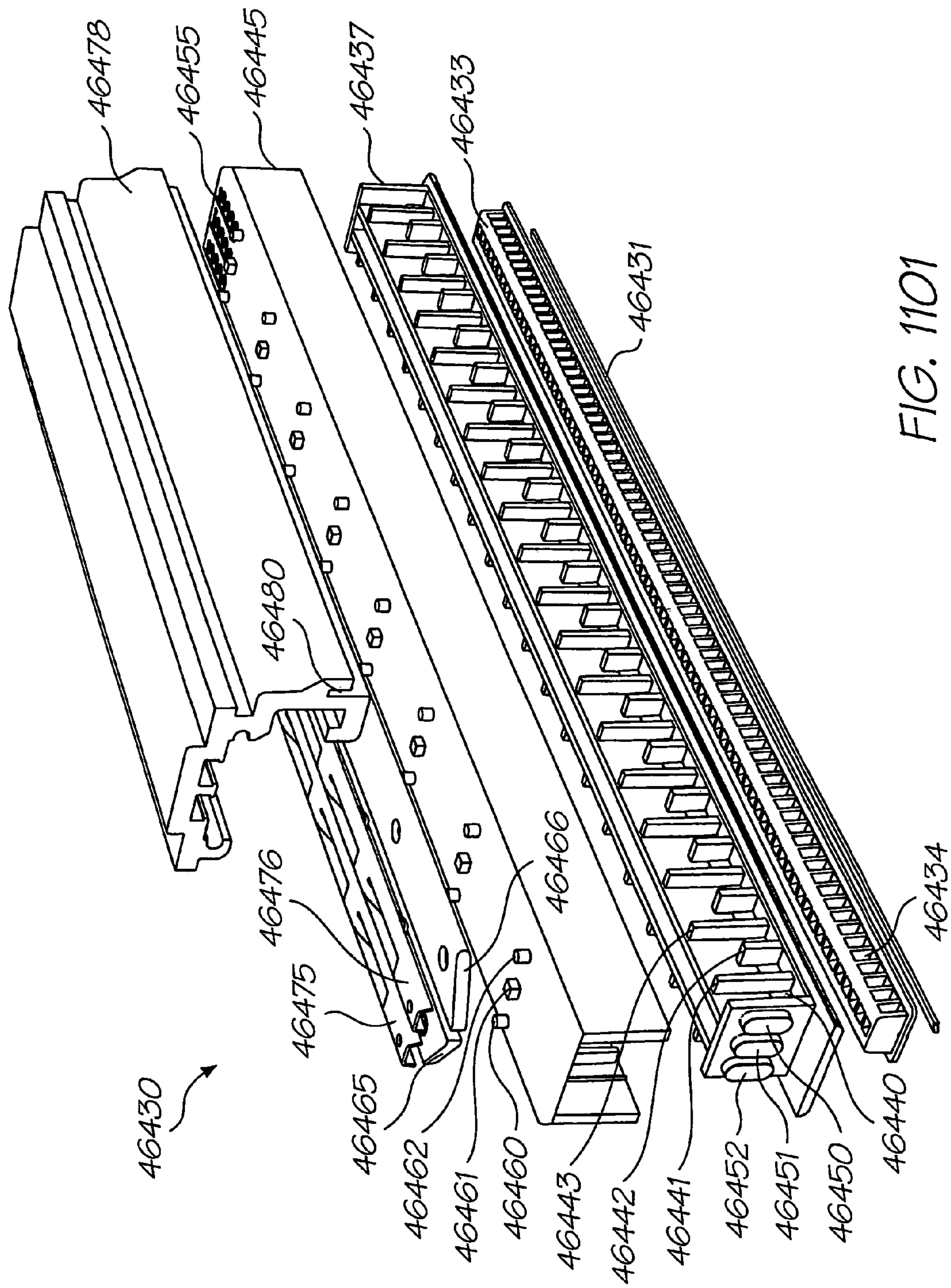
FIG. 1101

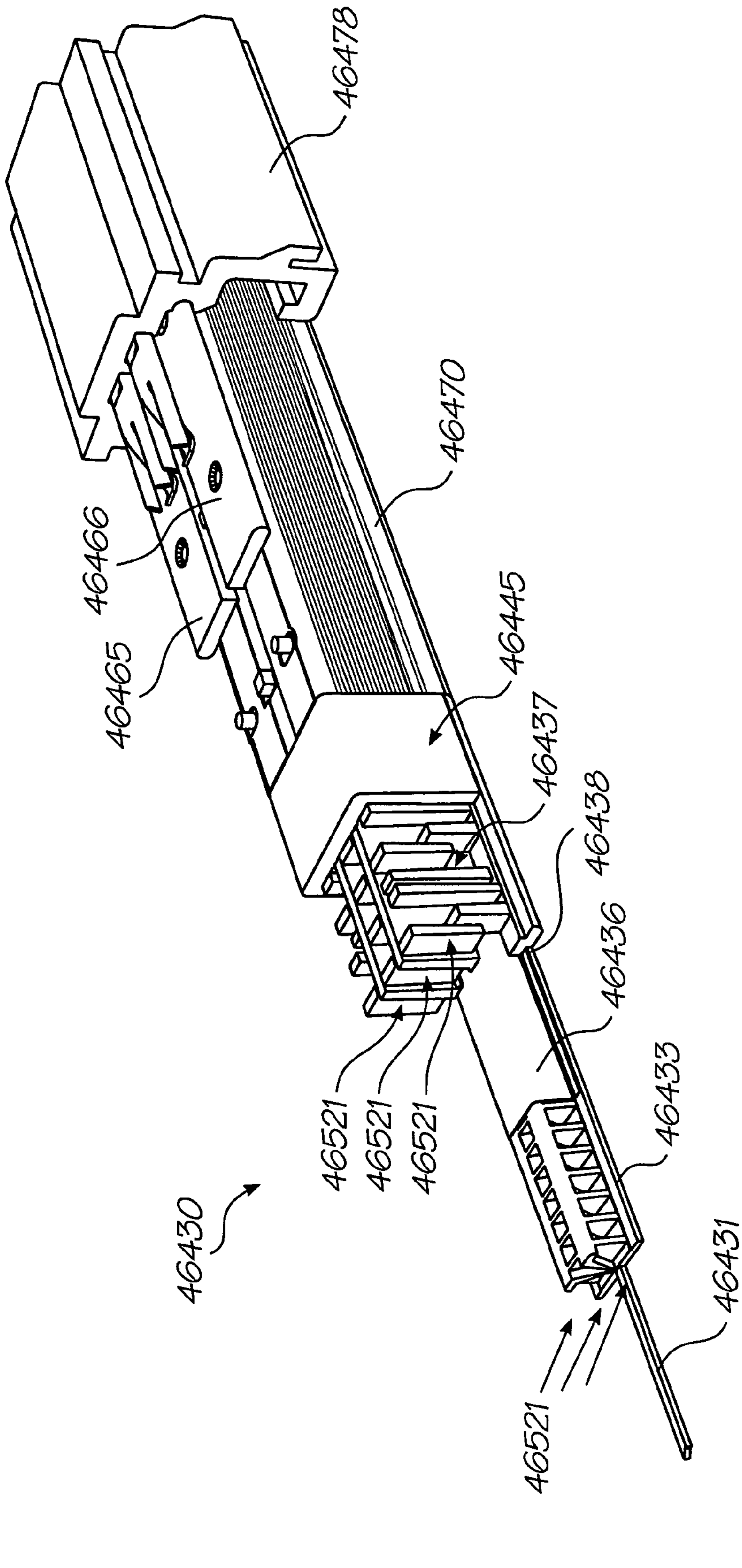
FIG. 1102

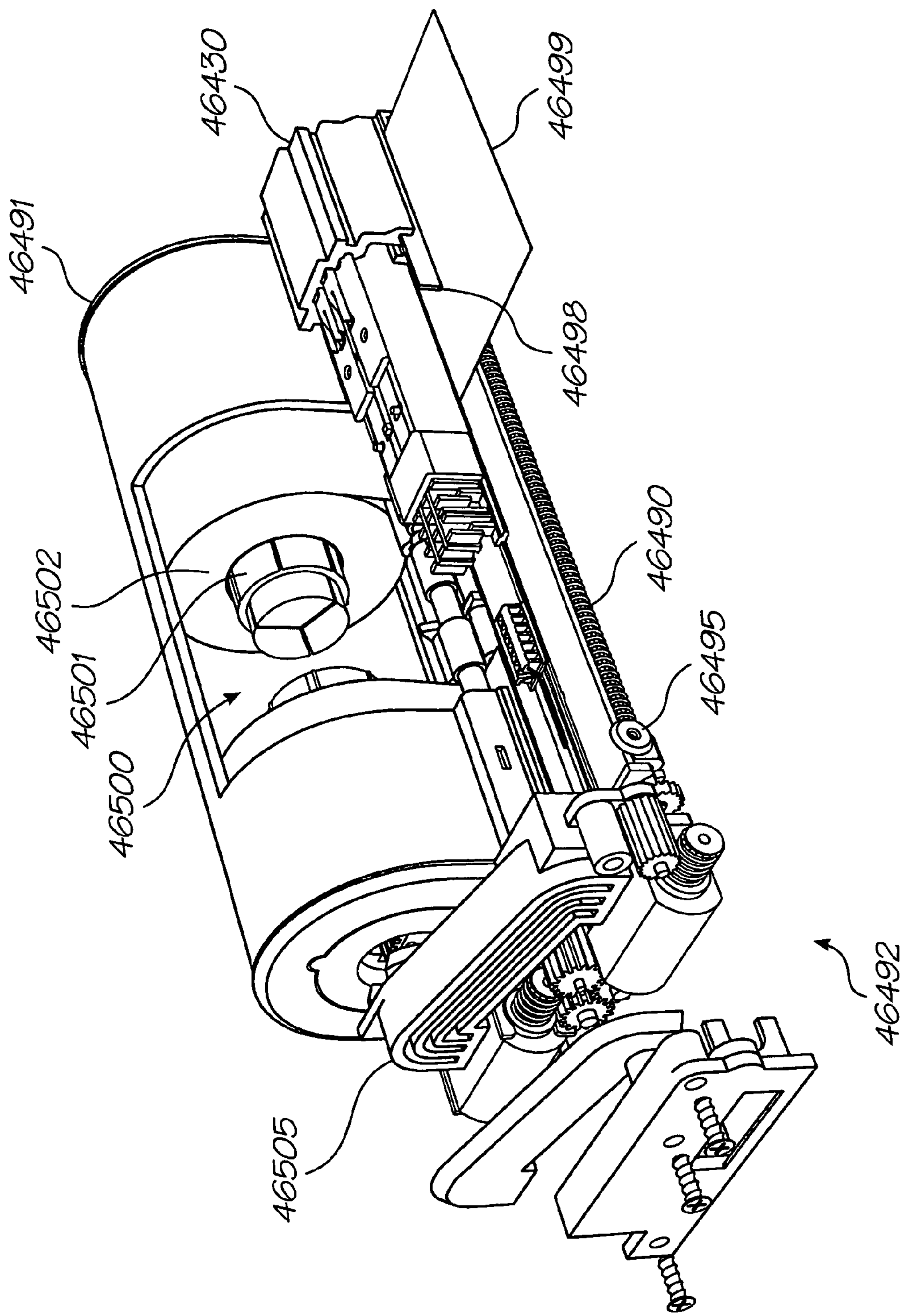
FIG. 1103

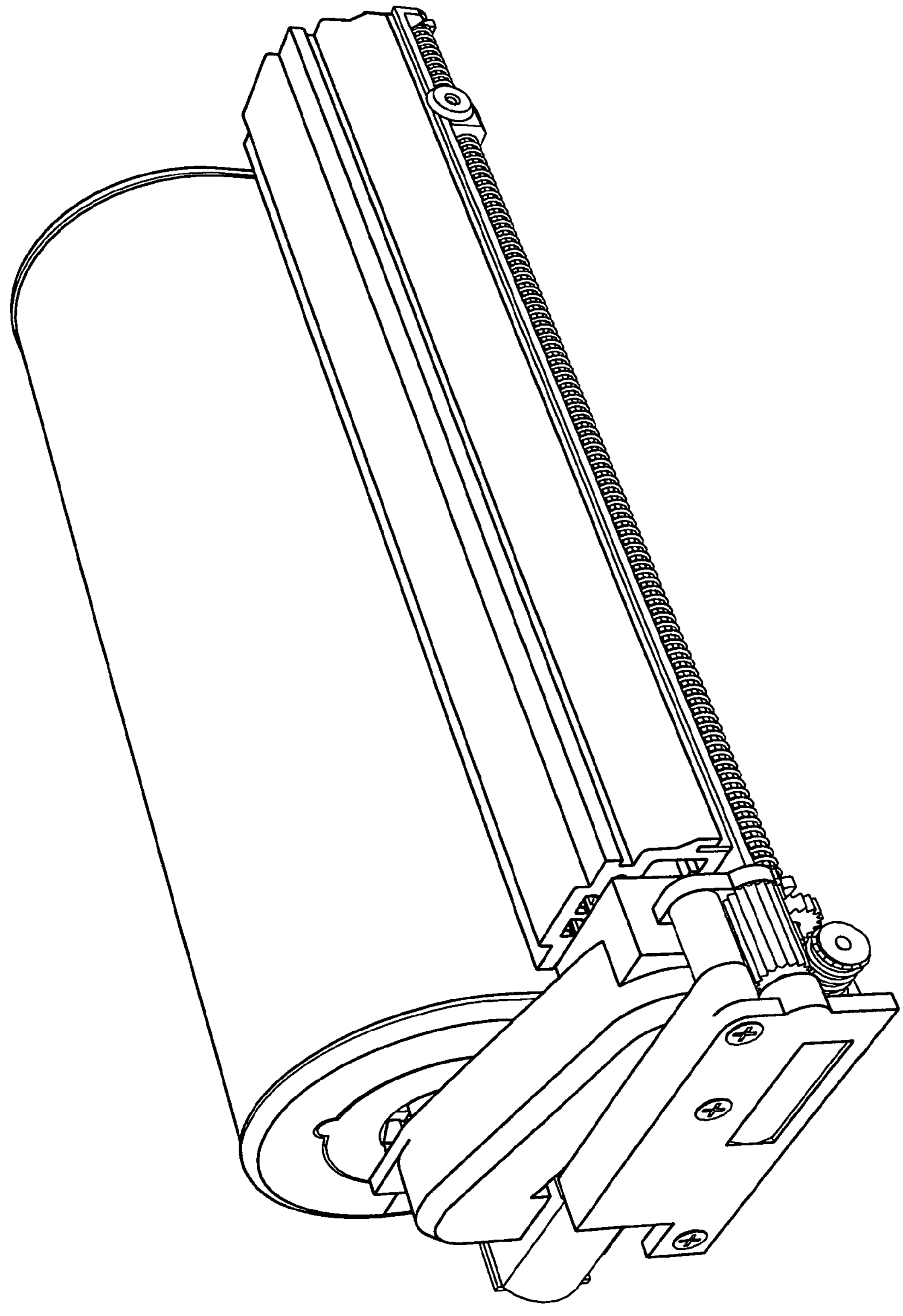
FIG. 1104

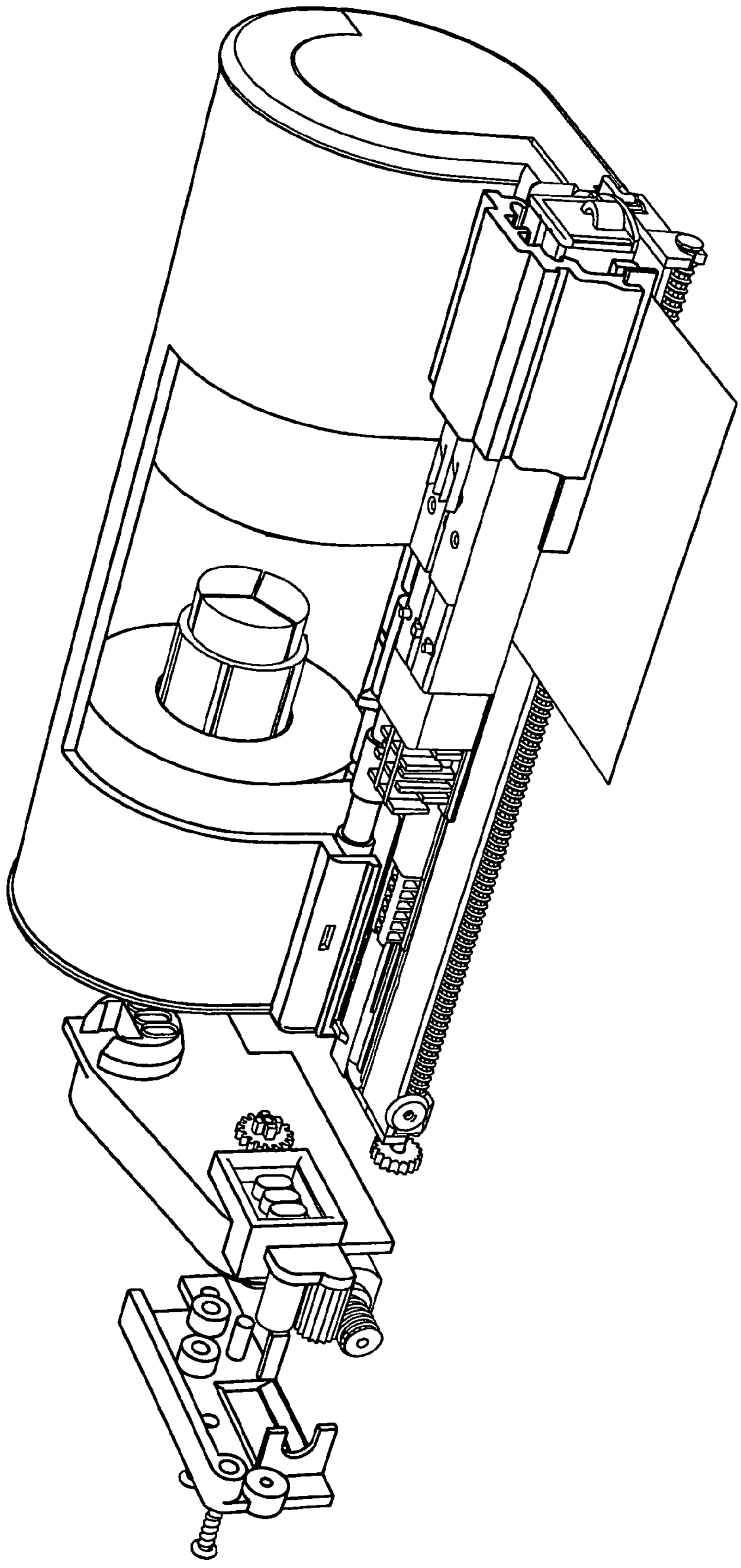
FIG. 1105

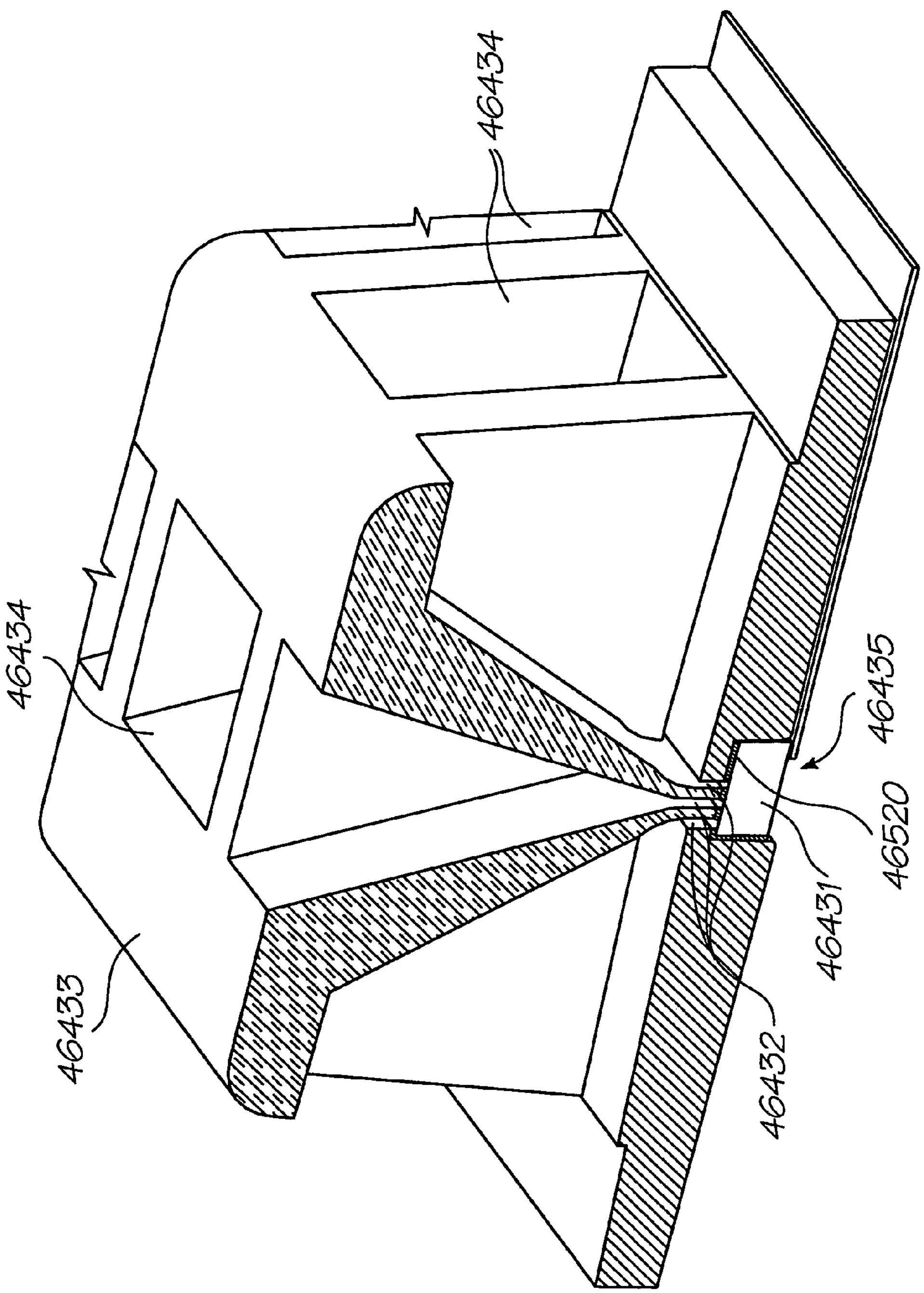
FIG. 1106

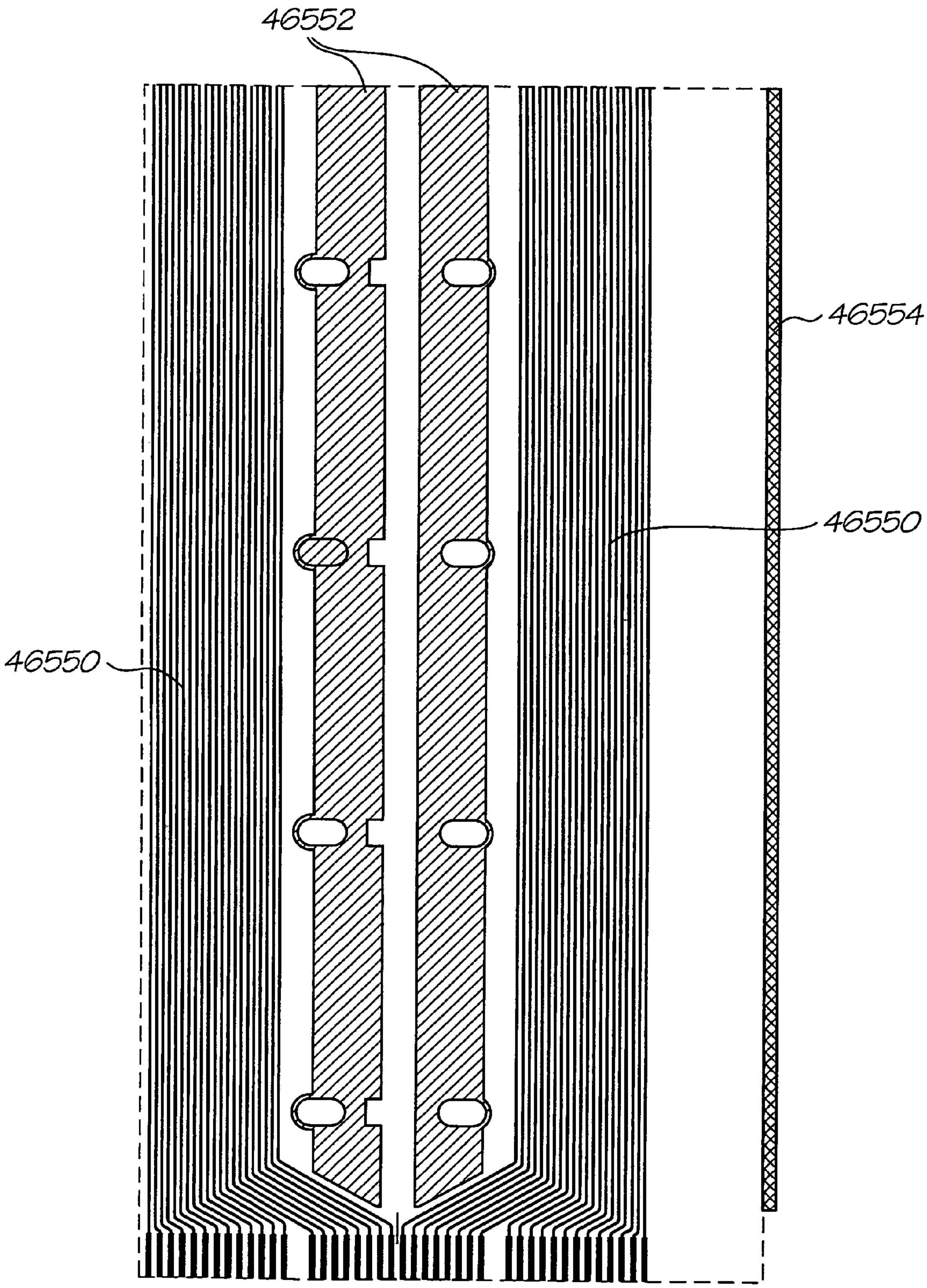
FIG. 1107

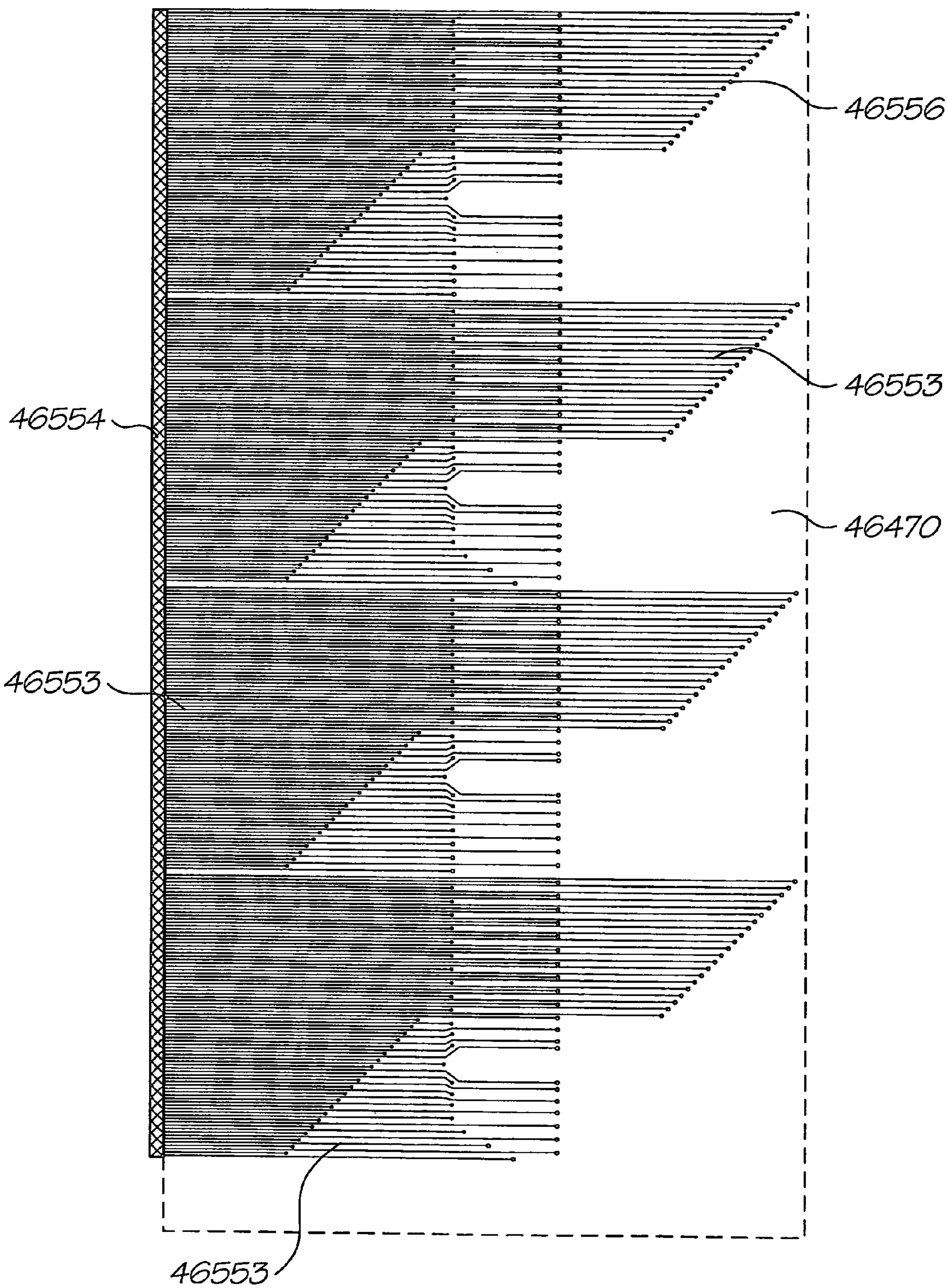
FIG. 1108

INKJET PRINTHEAD WITH NARROW PRINTING ZONE

CROSS REFERENCES TO RELATED APPLICATIONS

This is a CIP Application of U.S. application Ser. No. 10/407,212, filed on Apr. 7, 2003 now U.S. Pat. No. 7,416, 280, which is a Continuation Application of U.S. application Ser. No. 09/113,122, filed on Jul. 10, 1998, now issued as U.S. Pat. No. 6,557,977.

The following Australian provisional patent applications are hereby incorporated by reference. For the purposes of location and identification, US patents/patent applications identified by their US patent/patent application serial numbers are listed alongside the Australian applications from which the U.S. patents/patent applications claim the right of priority.

| CROSS-REFERENCED AUSTRALIAN PROVISIONAL PATENT APPLICATION NO. | U.S. Pat. No./patent application Ser. No. (CLAIMING RIGHT OF PRIORITY FROM AUSTRALIAN PROVISIONAL APPLICATION) | DOCKET NO. |
|---|---|---|
| PO7991 | 09/113,060 | ART01 |
| PO8505 | 6,476,863 | ART02 |
| PO7988 | 09/113,073 | ART03 |
| PO9395 | 6,322,181 | ART04 |
| PO8017 | 6,597,817 | ART06 |
| PO8014 | 6,227,648 | ART07 |
| PO8025 | 09/112,750 | ART08 |
| PO8032 | 6,690,419 | ART09 |
| PO7999 | 09/112,743 | ART10 |
| PO7998 | 09/112,742 | ART11 |
| PO8031 | 09/112,741 | ART12 |
| PO8030 | 6,196,541 | ART13 |
| PO7997 | 6,195,150 | ART15 |
| PO7979 | 6,362,868 | ART16 |
| PO8015 | 09/112,738 | ART17 |
| PO7978 | 09/113,067 | ART18 |
| PO7982 | 6,431,669 | ART19 |
| PO7989 | 6,362,869 | ART20 |
| PO8019 | 6,472,052 | ART21 |
| PO7980 | 6,356,715 | ART22 |
| PO8018 | 09/112,777 | ART24 |
| PO7938 | 6,636,216 | ART25 |
| PO8016 | 6,366,693 | ART26 |
| PO8024 | 6,329,990 | ART27 |
| PO7940 | 09/113,072 | ART28 |
| PO7939 | 6,459,495 | ART29 |
| PO8501 | 6,137,500 | ART30 |
| PO8500 | 6,690,416 | ART31 |
| PO7987 | 09/113,071 | ART32 |
| PO8022 | 6,398,328 | ART33 |
| PO8497 | 09/113,090 | ART34 |
| PO8020 | 6,431,704 | ART38 |
| PO8023 | 09/113,222 | ART39 |
| PO8504 | 09/112,786 | ART42 |
| PO8000 | 6,415,054 | ART43 |
| PO7977 | 09/112,782 | ART44 |
| PO7934 | 6,665,454 | ART45 |
| PO7990 | 09/113,059 | ART46 |
| PO8499 | 6,486,886 | ART47 |
| PO8502 | 6,381,361 | ART48 |
| PO7981 | 6,317,192 | ART50 |
| PO7986 | 09/113,057 | ART51 |
| PO7983 | 09/113,054 | ART52 |
| PO8026 | 6,646,757 | ART53 |
| PO8027 | 09/112,759 | ART54 |
| PO8028 | 6,624,848 | ART56 |
| PO9394 | 6,357,135 | ART57 |
| PO9396 | 09/113,107 | ART58 |

-continued

| CROSS-REFERENCED AUSTRALIAN PROVISIONAL PATENT APPLICATION NO. | U.S. Pat. No./patent application Ser. No. (CLAIMING RIGHT OF PRIORITY FROM AUSTRALIAN PROVISIONAL APPLICATION) | DOCKET NO. |
|---|---|---|
| PO9397 | 6,271,931 | ART59 |
| PO9398 | 6,353,772 | ART60 |
| PO9399 | 6,106,147 | ART61 |
| PO9400 | 6,665,008 | ART62 |
| PO9401 | 6,304,291 | ART63 |
| PO9402 | 09/112,788 | ART64 |
| PO9403 | 6,305,770 | ART65 |
| PO9405 | 6,289,262 | ART66 |
| PP0959 | 6,315,200 | ART68 |
| PP1397 | 6,217,165 | ART69 |
| PP2370 | 09/112,781 | DOT01 |
| PP2371 | 09/113,052 | DOT02 |
| PO8003 | 6,350,023 | Fluid01 |
| PO8005 | 6,318,849 | Fluid02 |
| PO9404 | 09/113,101 | Fluid03 |
| PO8066 | 6,227,652 | IJ01 |
| PO8072 | 6,213,588 | IJ02 |
| PO8040 | 6,213,589 | IJ03 |
| PO8071 | 6,231,163 | IJ04 |
| PO8047 | 6,247,795 | IJ05 |
| PO8035 | 6,394,581 | IJ06 |
| PO8044 | 6,244,691 | IJ07 |
| PO8063 | 6,257,704 | IJ08 |
| PO8057 | 6,416,168 | IJ09 |
| PO8056 | 6,220,694 | IJ10 |
| PO8069 | 6,257,705 | IJ11 |
| PO8049 | 6,247,794 | IJ12 |
| PO8036 | 6,234,610 | IJ13 |
| PO8048 | 6,247,793 | IJ14 |
| PO8070 | 6,264,306 | IJ15 |
| PO8067 | 6,241,342 | IJ16 |
| PO8001 | 6,247,792 | IJ17 |
| PO8038 | 6,264,307 | IJ18 |
| PO8033 | 6,254,220 | IJ19 |
| PO8002 | 6,234,611 | IJ20 |
| PO8068 | 6,302,528 | IJ21 |
| PO8062 | 6,283,582 | IJ22 |
| PO8034 | 6,239,821 | IJ23 |
| PO8039 | 6,338,547 | IJ24 |
| PO8041 | 6,247,796 | IJ25 |
| PO8004 | 6,557,977 | IJ26 |
| PO8037 | 6,390,603 | IJ27 |
| PO8043 | 6,362,843 | IJ28 |
| PO8042 | 6,293,653 | IJ29 |
| PO8064 | 6,312,107 | IJ30 |
| PO9389 | 6,227,653 | IJ31 |
| PO9391 | 6,234,609 | IJ32 |
| PP0888 | 6,238,040 | IJ33 |
| PP0891 | 6,188,415 | IJ34 |
| PP0890 | 6,227,654 | IJ35 |
| PP0873 | 6,209,989 | IJ36 |
| PP0993 | 6,247,791 | IJ37 |
| PP0890 | 6,336,710 | IJ38 |
| PP1398 | 6,217,153 | IJ39 |
| PP2592 | 6,416,167 | IJ40 |
| PP2593 | 6,243,113 | IJ41 |
| PP3991 | 6,283,581 | IJ42 |
| PP3987 | 6,247,790 | IJ43 |
| PP3985 | 6,260,953 | IJ44 |
| PP3983 | 6,267,469 | IJ45 |
| PO7935 | 6,224,780 | IJM01 |
| PO7936 | 6,235,212 | IJM02 |
| PO7937 | 6,280,643 | IJM03 |
| PO8061 | 6,284,147 | IJM04 |
| PO8054 | 6,214,244 | IJM05 |
| PO8065 | 6,071,750 | IJM06 |
| PO8055 | 6,267,905 | IJM07 |
| PO8053 | 6,251,298 | IJM08 |
| PO8078 | 6,258,285 | IJM09 |
| PO7933 | 6,225,138 | IJM10 |
| PO7950 | 6,241,904 | IJM11 |

-continued

| CROSS-REFERENCED AUSTRALIAN PROVISIONAL PATENT APPLICATION NO. | U.S. Pat. No./patent application Ser. No. (CLAIMING RIGHT OF PRIORITY FROM AUSTRALIAN PROVISIONAL APPLICATION) | DOCKET NO. |
|---|---|---|
| PO7949 | 6,299,786 | IJM12 |
| PO8060 | 09/113,124 | IJM13 |
| PO8059 | 6,231,773 | IJM14 |
| PO8073 | 6,190,931 | IJM15 |
| PO8076 | 6,248,249 | IJM16 |
| PO8075 | 09/113,120 | IJM17 |
| PO8079 | 6,241,906 | IJM18 |
| PO8050 | 6,565,762 | IJM19 |
| PO8052 | 6,241,905 | IJM20 |
| PO7948 | 6,451,216 | IJM21 |
| PO7951 | 6,231,772 | IJM22 |
| PO8074 | 6,274,056 | IJM23 |
| PO7941 | 6,290,861 | IJM24 |
| PO8077 | 6,248,248 | IJM25 |
| PO8058 | 6,306,671 | 11M26 |
| PO8051 | 6,331,258 | IJM27 |
| PO8045 | 6,110,754 | IJM28 |
| PO7952 | 6,294,101 | IJM29 |
| PO8046 | 6,416,679 | IJM30 |
| PO9390 | 6,264,849 | IJM31 |
| PO9392 | 6,254,793 | IJM32 |
| PP0889 | 6,235,211 | IJM35 |
| PP0887 | 6,491,833 | IJM36 |
| PP0882 | 6,264,850 | IJM37 |
| PP0874 | 6,258,284 | IJM38 |
| PP1396 | 6,312,615 | IJM39 |
| PP3989 | 6,228,668 | IJM40 |
| PP2591 | 6,180,427 | IJM41 |
| PP3990 | 6,171,875 | IJM42 |
| PP3986 | 6,267,904 | IJM43 |
| PP3984 | 6,245,247 | IJM44 |
| PP3982 | 6,315,914 | IJM45 |
| PP0895 | 6,231,148 | IR01 |
| PP0870 | 09/113,106 | IR02 |
| PP0869 | 6,293,658 | IR04 |
| PP0887 | 6,614,560 | IR05 |
| PP0885 | 6,238,033 | IR06 |
| PP0884 | 6,312,070 | IR10 |
| PP0886 | 6,238,111 | IR12 |
| PP0871 | 09/113,086 | IR13 |
| PP0876 | 09/113,094 | IR14 |
| PP0877 | 6,378,970 | IR16 |
| PP0878 | 6,196,739 | IR17 |
| PP0879 | 09/112,774 | IR18 |
| PP0883 | 6,270,182 | IR19 |
| PP0880 | 6,152,619 | IR20 |
| PP0881 | 09/113,092 | IR21 |
| PO8006 | 6,087,638 | MEMS02 |
| PO8007 | 6,340,222 | MEMS03 |
| PO8008 | 09/113,062 | MEMS04 |
| PO8010 | 6,041,600 | MEMS05 |
| PO8011 | 6,299,300 | MEMS06 |
| PO7947 | 6,067,797 | MEMS07 |
| PO7944 | 6,286,935 | MEMS09 |
| PO7946 | 6,044,646 | MEMS10 |
| PO9393 | 09/113,065 | MEMS11 |
| PP0875 | 09/113,078 | MEMS12 |
| PP0894 | 6,382,769 | MEMS13 |

STATEMENT REGARDING FEDERALLY SPONSORED RESEARCH OR DEVELOPMENT

Not applicable.

FIELD OF THE INVENTION

The present invention relates to the operation and construction of an ink jet printer device.

BACKGROUND OF THE INVENTION

Many different types of printing have been invented, a large number of which are presently in use. The known forms of print have a variety of methods for marking the print media with a relevant marking media. Commonly used forms of printing include offset printing, laser printing and copying devices, dot matrix type impact printers, thermal paper printers, film recorders, thermal wax printers, dye sublimation printers and ink jet printers both of the drop on demand and continuous flow type. Each type of printer has its own advantages and problems when considering cost, speed, quality, reliability, simplicity of construction and operation etc.

In recent years, the field of ink jet printing, wherein each individual pixel of ink is derived from one or more ink nozzles has become increasingly popular primarily due to its inexpensive and versatile nature.

Many different techniques of ink jet printing have been invented. For a survey of the field, reference is made to an article by J Moore, “Non-Impact Printing: Introduction and Historical Perspective”, Output Hard Copy Devices, Editors R Dubeck and S Sherr, pages 207-220 (1988).

Ink Jet printers themselves come in many different forms. The utilization of a continuous stream of ink in ink jet printing appears to date back to at least 1929 wherein U.S. Pat. No. 1,941,001 by Hansell discloses a simple form of continuous stream electrostatic ink jet printing.

U.S. Pat. No. 3,596,275 by Sweet also discloses a process of continuous ink jet printing including a step wherein the ink jet stream is modulated by a high frequency electrostatic field so as to cause drop separation. This technique is still utilized by several manufacturers including Elmjet and Scitex (see also U.S. Pat. No. 3,373,437 by Sweet et al).

Piezoelectric ink jet printers are also one form of commonly utilized ink jet printing device. Piezoelectric systems are disclosed by Kyser et al. in U.S. Pat. No. 3,946,398 (1970) which utilizes a diaphragm mode of operation, by Zolten in U.S. Pat. No. 3,683,212 (1970) which discloses a squeeze mode of operation of a piezoelectric crystal, Stemme in U.S. Pat. No. 3,747,120 (1972) discloses a bend mode of piezoelectric operation, Howkins in U.S. Pat. No. 4,459,601 discloses a piezoelectric push mode actuation of the ink jet stream and Fischbeck in U.S. Pat. No. 4,584,590 which discloses a shear mode type of piezoelectric transducer element.

Recently, thermal ink jet printing has become an extremely popular form of ink jet printing. The ink jet printing techniques include those disclosed by Endo et al in GB 2007162 (1979) and Vaught et al in U.S. Pat. No. 4,490,728. Both the aforementioned references disclose ink jet printing techniques which rely upon the activation of an electrothermal actuator which results in the creation of a bubble in a constricted space, such as a nozzle, which thereby causes the ejection of ink from an aperture connected to the confined space onto a relevant print media. Printing devices utilizing the electro-thermal actuator are manufactured by manufacturers such as Canon and Hewlett Packard.

As can be seen from the foregoing, many different types of printing technologies are available. Ideally, a printing technology should have a number of desirable attributes. These include inexpensive construction and operation, high speed operation, safe and continuous long term operation etc. Each technology may have its own advantages and disadvantages in the areas of cost, speed, quality, reliability, power usage, simplicity of construction operation, durability and consumables.

The paper feed system must be capable of feeding the paper past the printhead while maintaining the paper surface at a precise distance from the printhead. Variations in the distance from the nozzles to the paper across the print zone (that is, the band of paper that is printed by the array of nozzles at any one time, or alternatively the width of the array of nozzles with respect to the direction of travel of the paper), will affect the printing characteristics and quality. As the ejection surface of the printheads are flat, the paper must be kept completely flat and parallel to the ejection surface as it passes the printhead. This can present design complications, especially for high speed printing.

SUMMARY OF THE INVENTION

Accordingly, the invention provides an inkjet printhead with an array of drop ejection apparatuses, each inkjet drop ejection apparatus comprising:

a chamber with a nozzle; and, an actuator for ejecting drops of ink through the nozzle; wherein, the array is configured such that it produces a print zone less than 3 mm wide on a print media substrate fed past the printhead.

By reducing the width of the print zone, there is no need for the media feed system to accurately flatten the media as it passes the printhead. This is particularly advantageous for pagewidth printheads because reducing the width of the print zone in scanning printheads increases the number of scans needed per page which tends to slow the print speed. Elongate thin printhead chips (see for example IJ29 described below), can be installed on the printhead side-by-side (with a slight overlap to prevent banding) to produce a pagewidth array of nozzles on the printhead that is less than 3 mm wide with respect to the paper feed direction.

BRIEF DESCRIPTION OF THE DRAWINGS

FIG. 417 is an exploded perspective view illustrating the construction of the nozzle arrangement in accordance with a preferred embodiment of the present invention;

Figure 1:
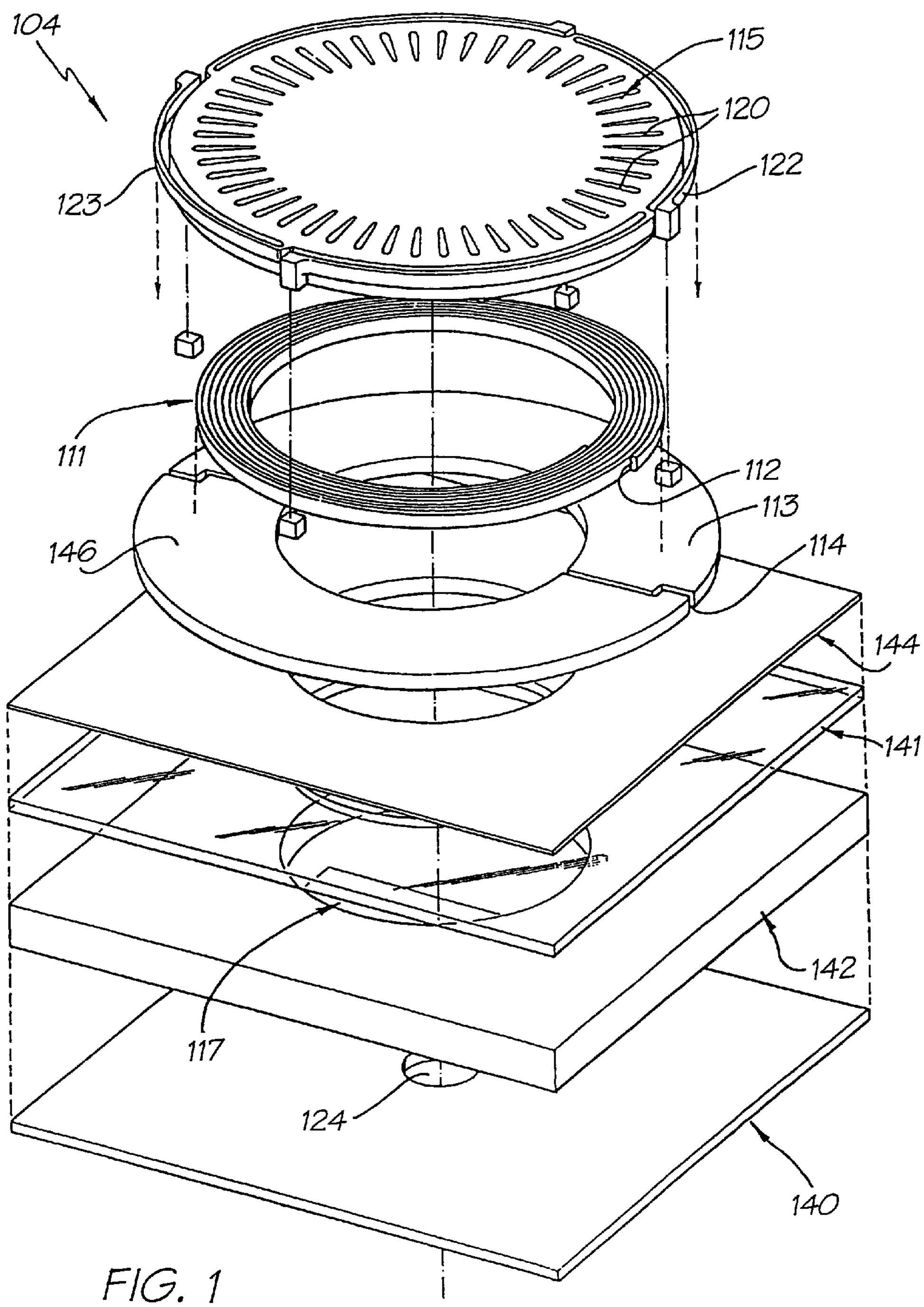
FIG. 1 is an exploded perspective view illustrating the construction of a single ink jet nozzle in accordance with a preferred embodiment of the present invention.
Figure 345:
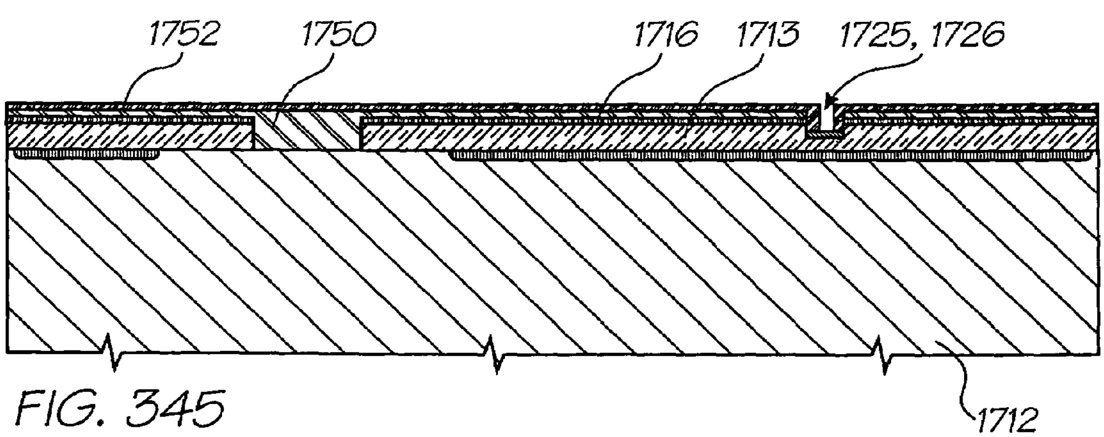
Figure 418:
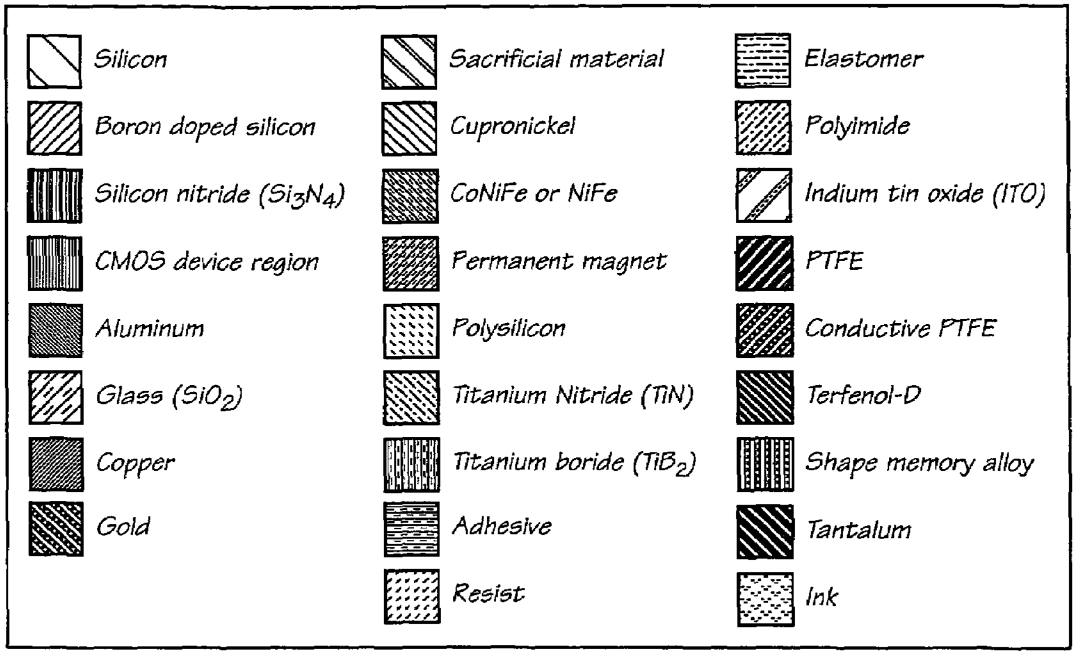
Figure 431:
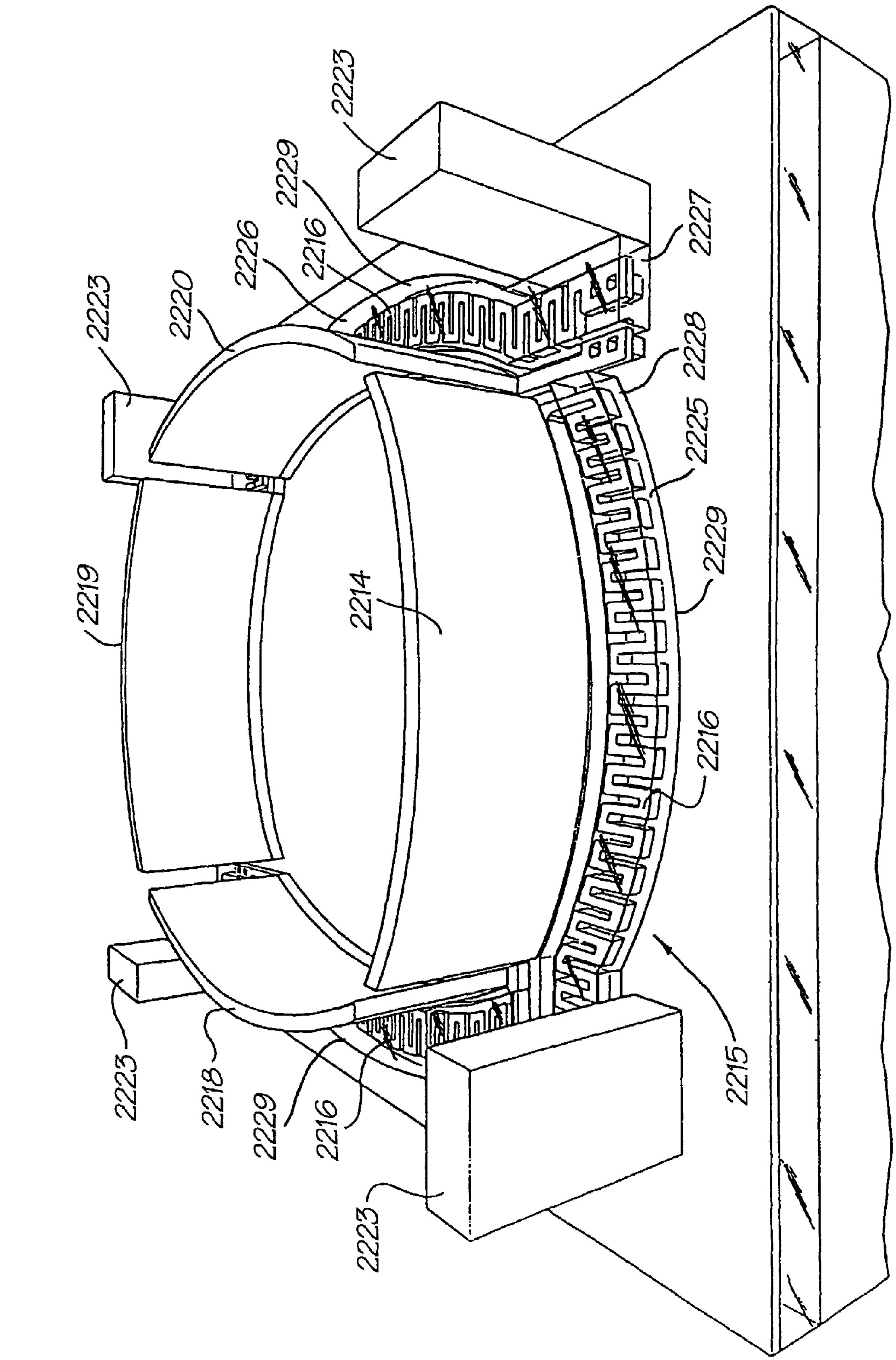
Figure 432:
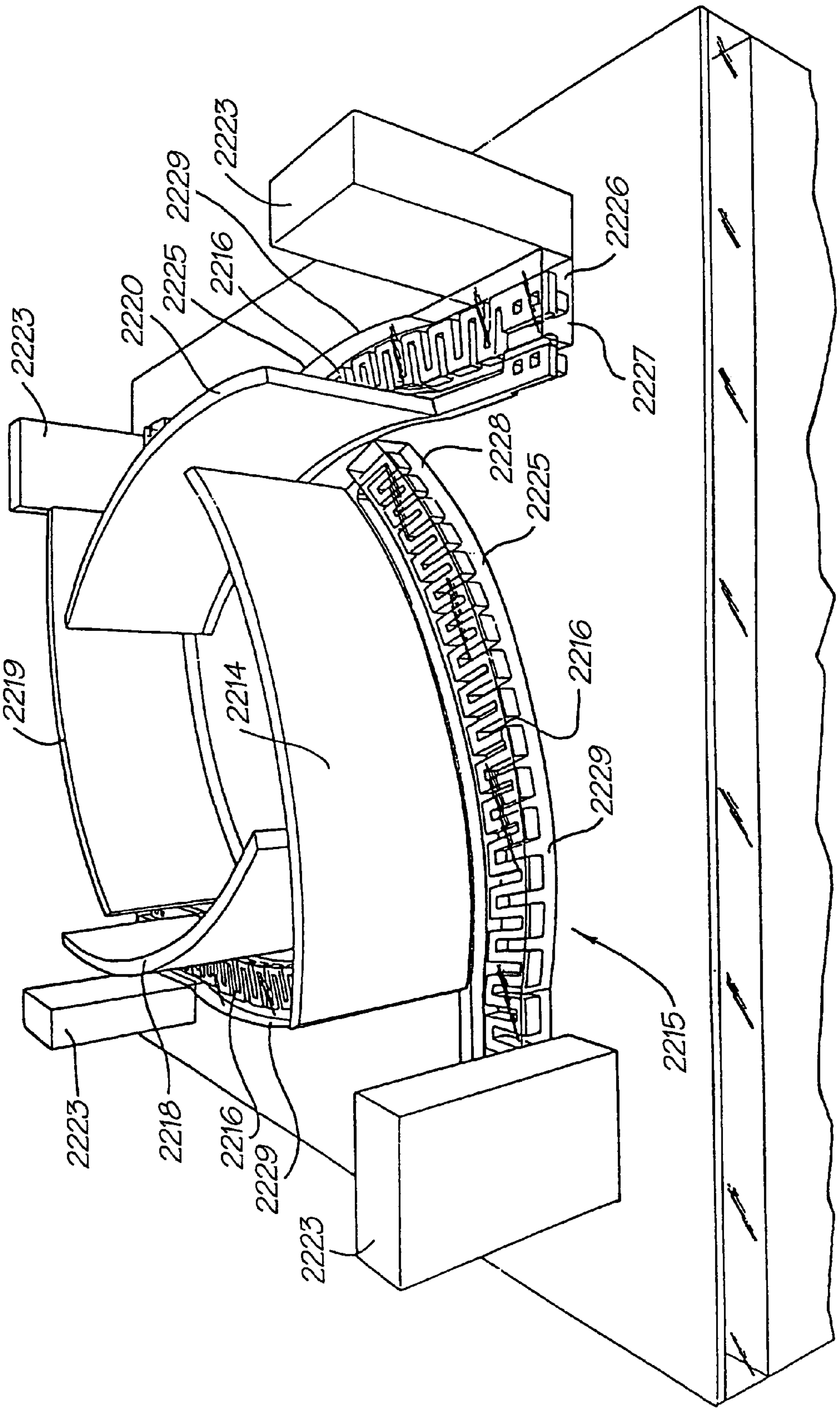
Figure 433:
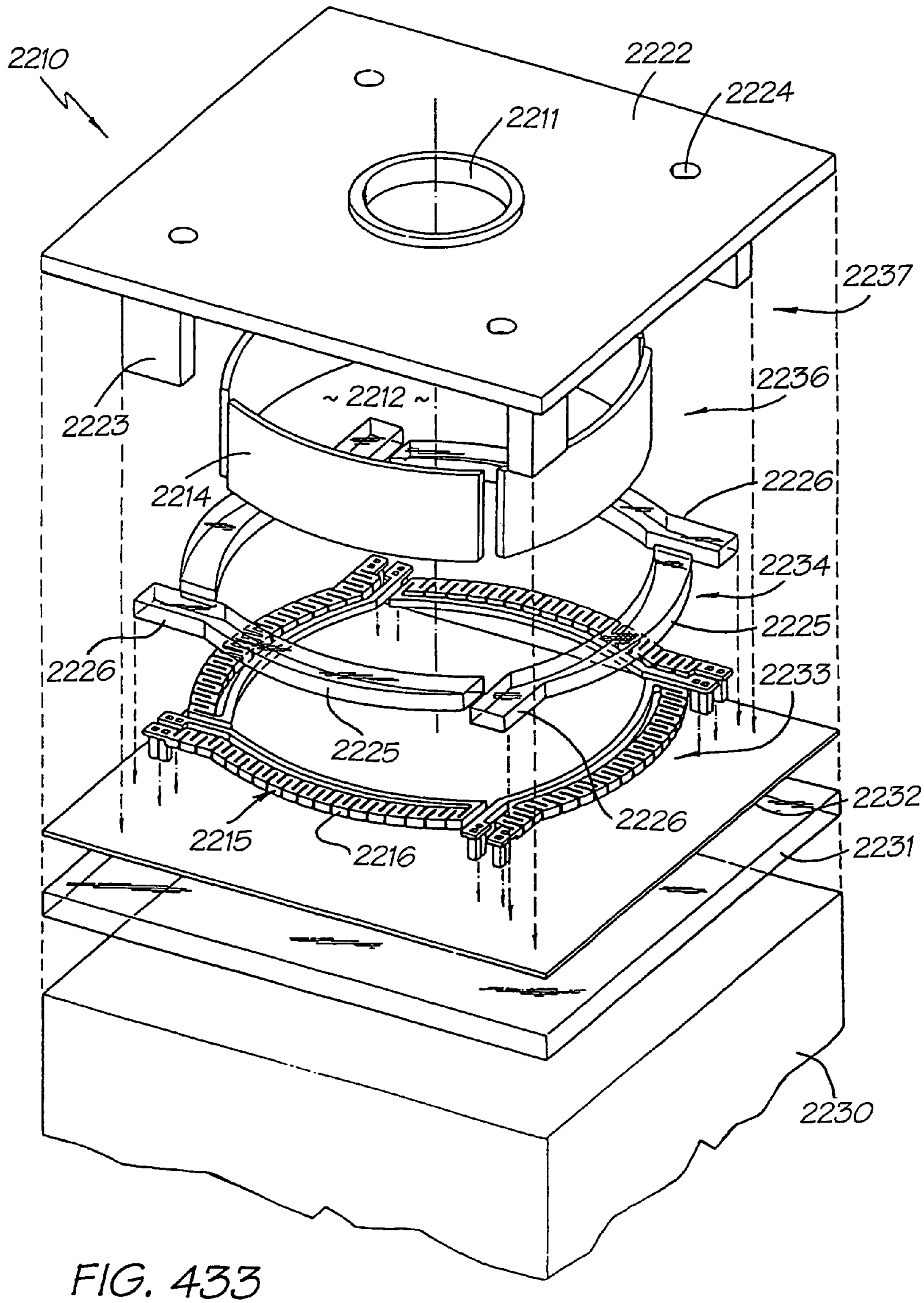
Figure 434:
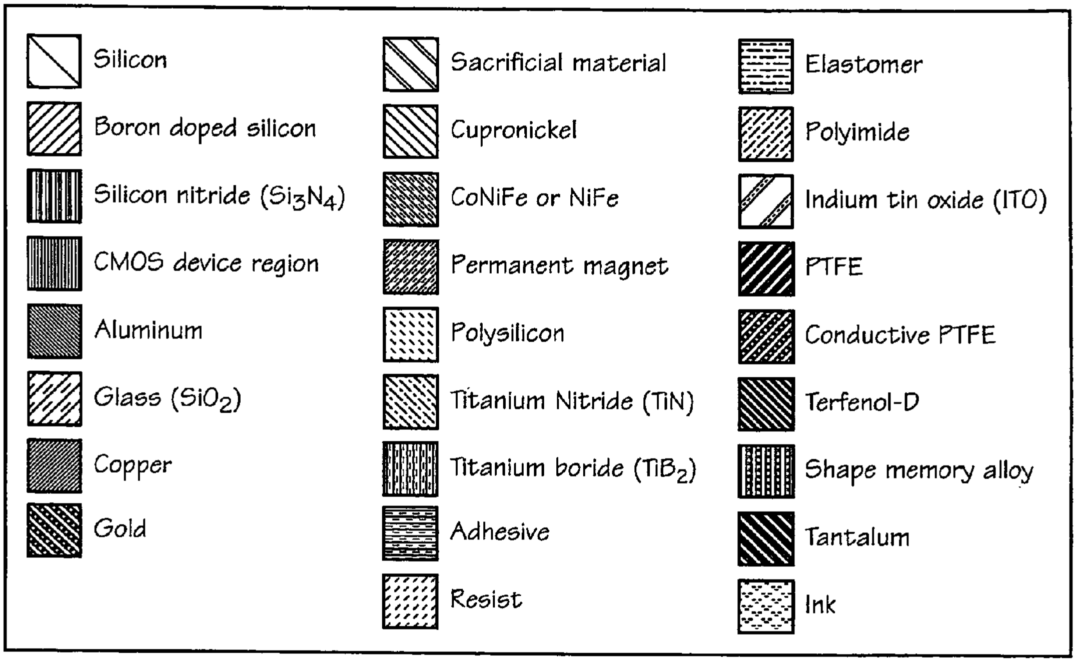
Figure 447:
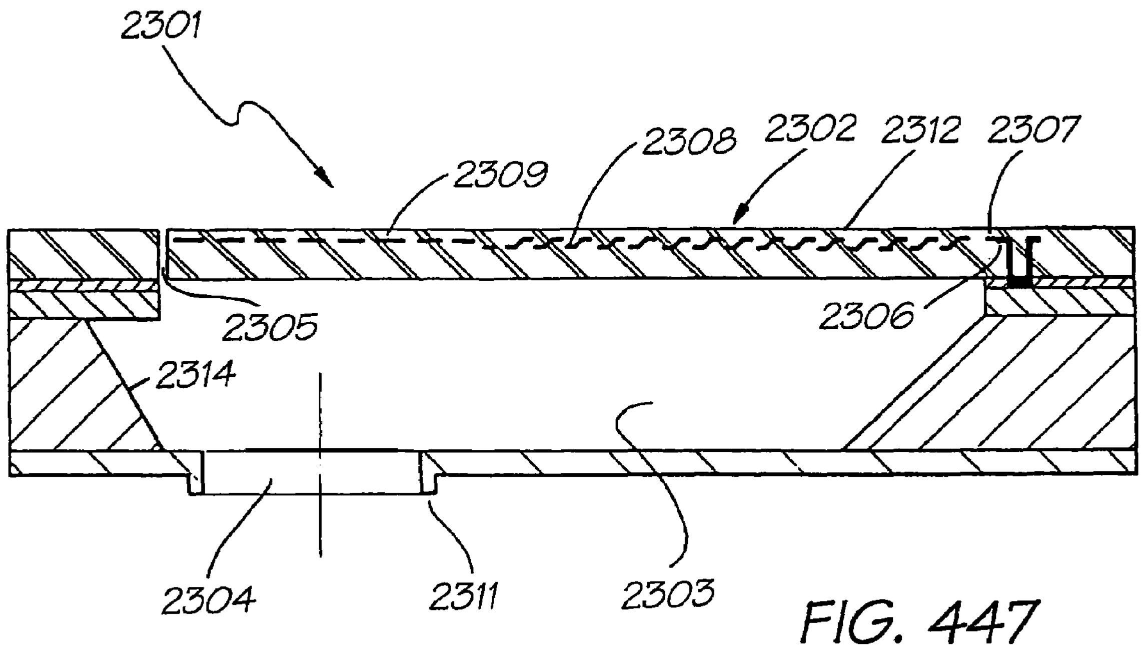
Figure 448:
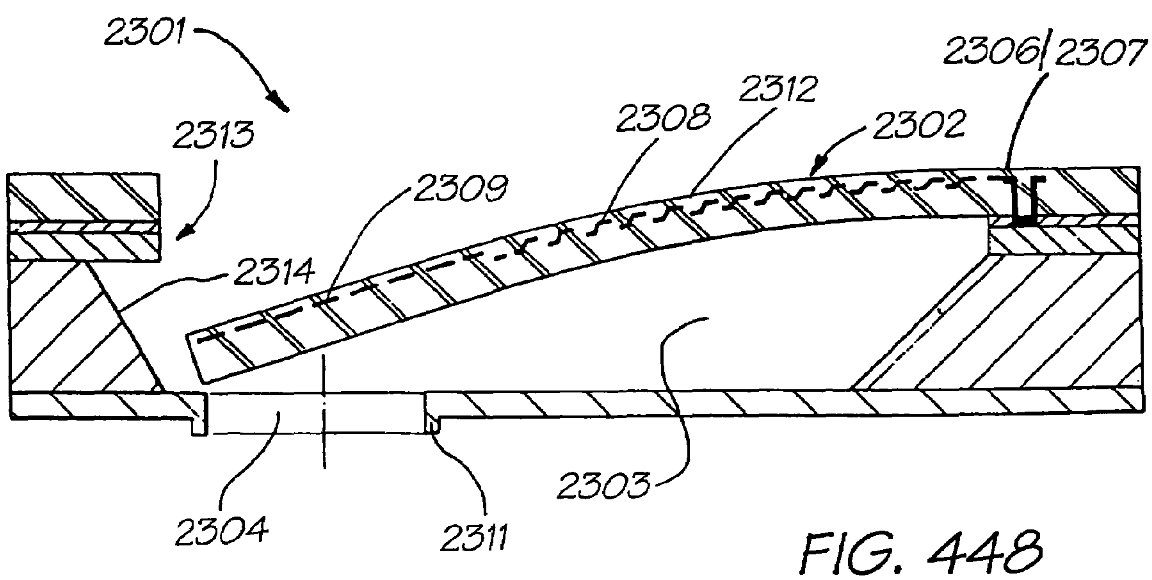
Figure 449:
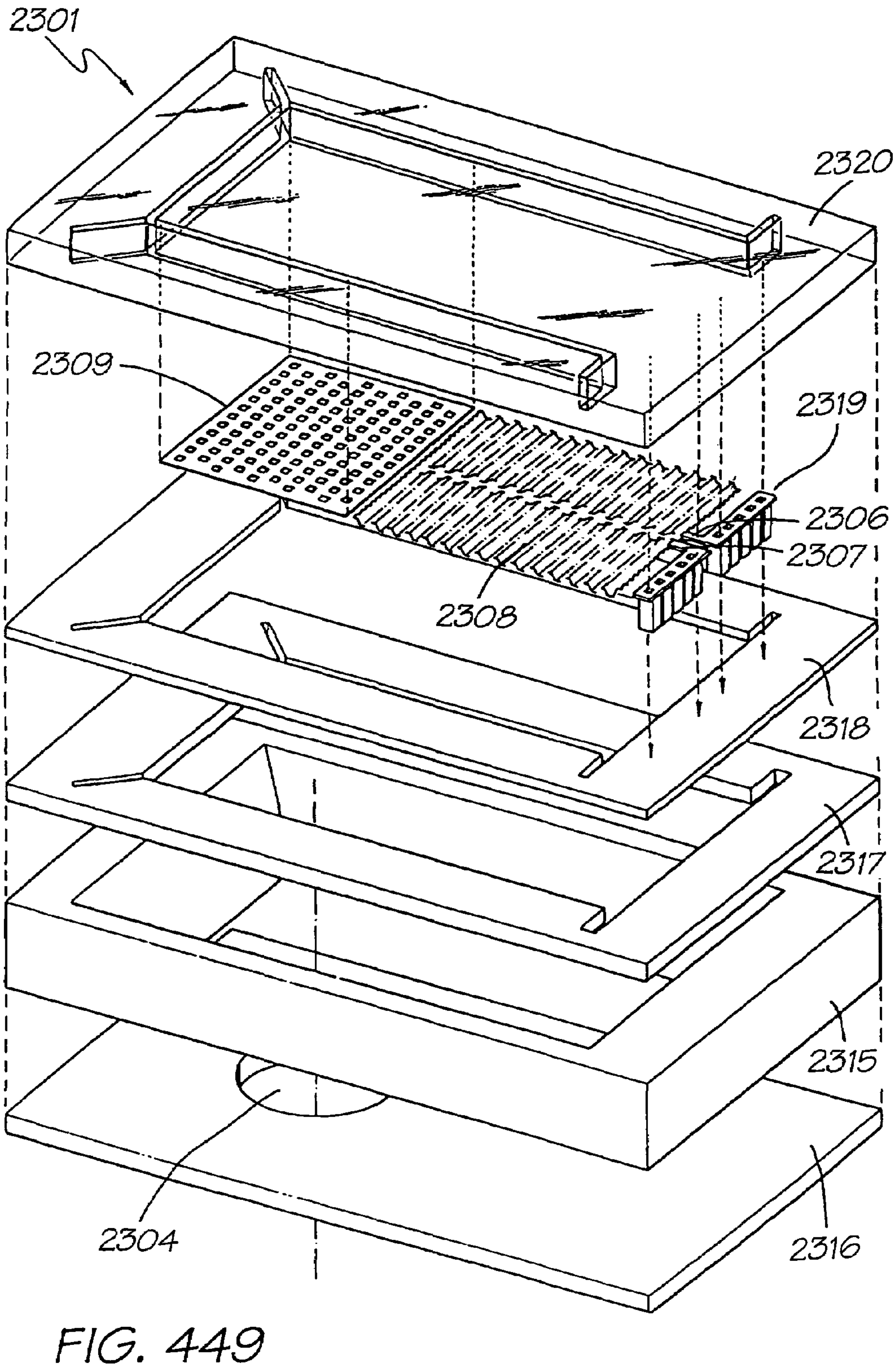
Figure 450:
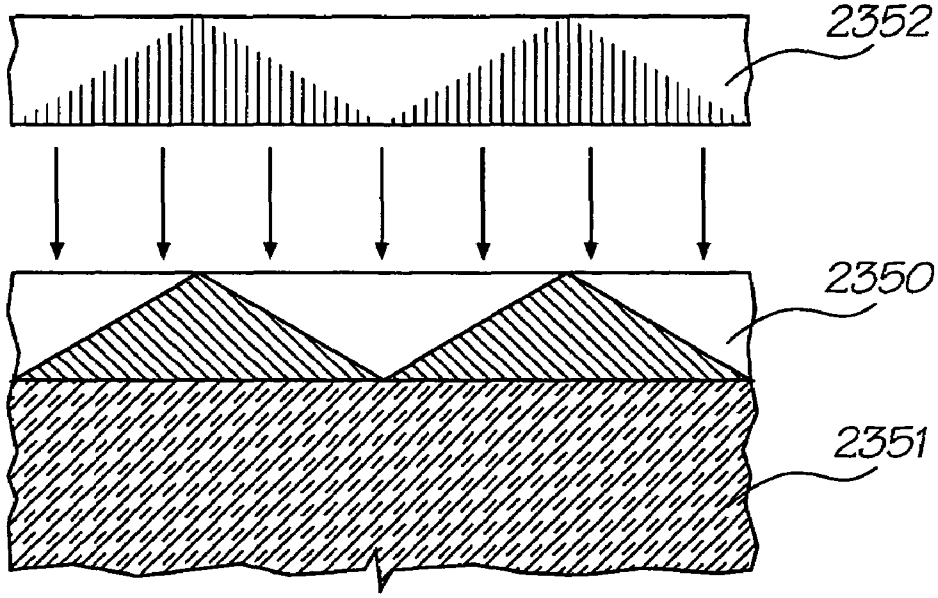
Figure 451:
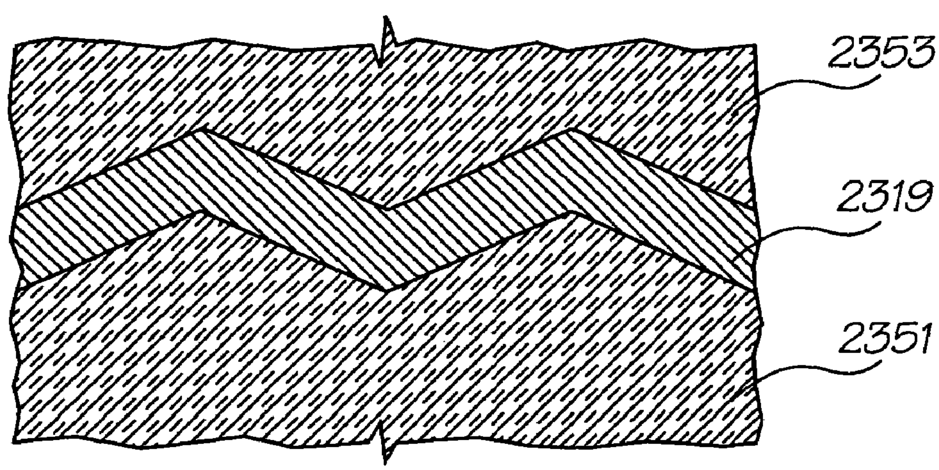
Figure 452:
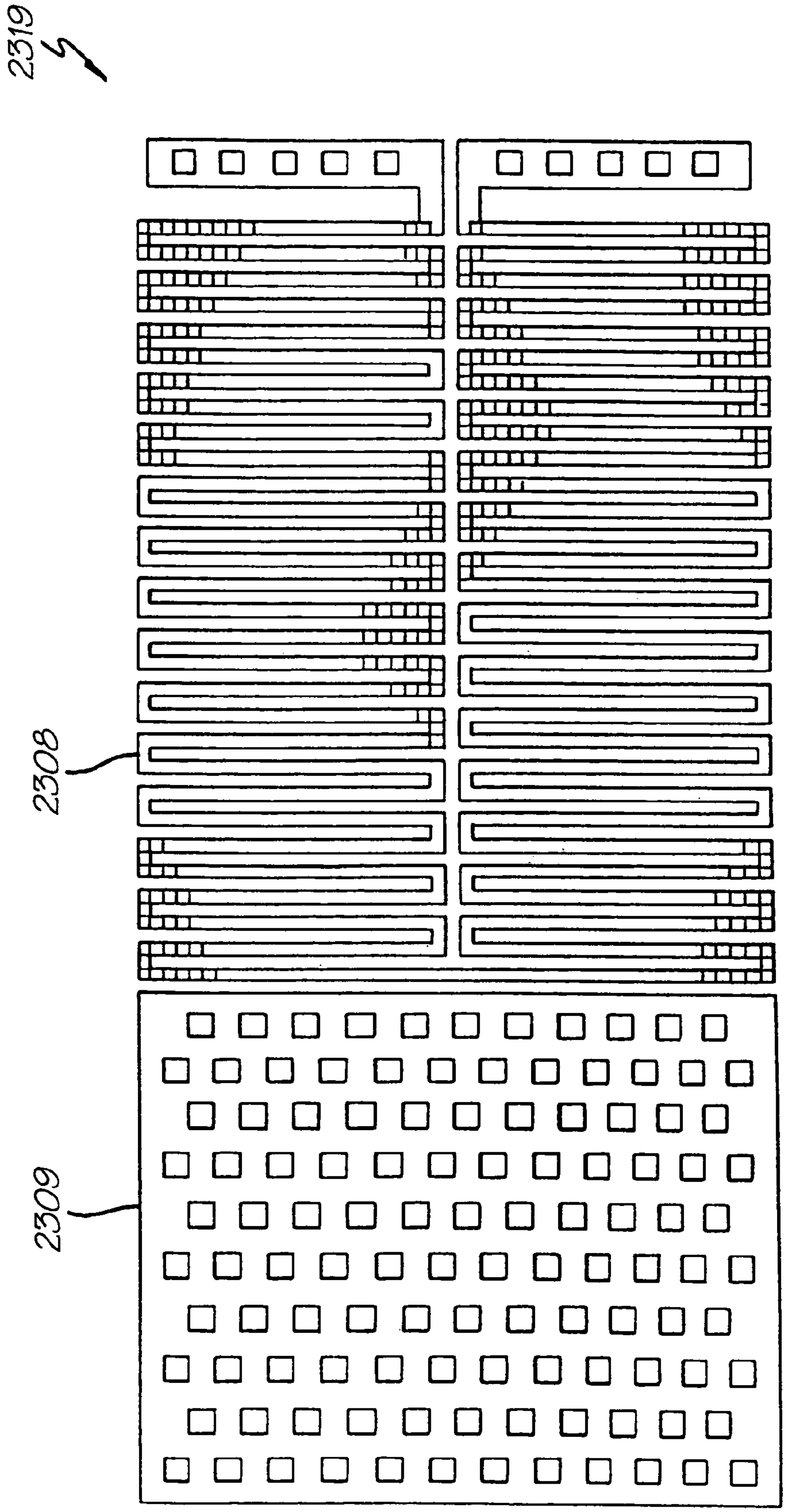
Figure 453:
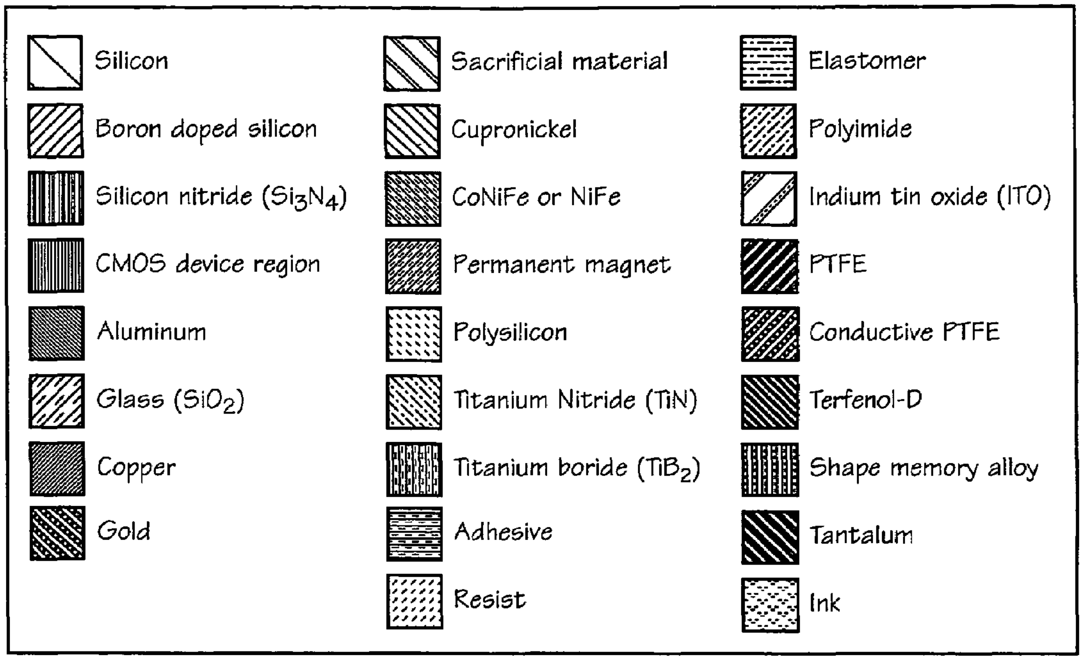
Figure 466:
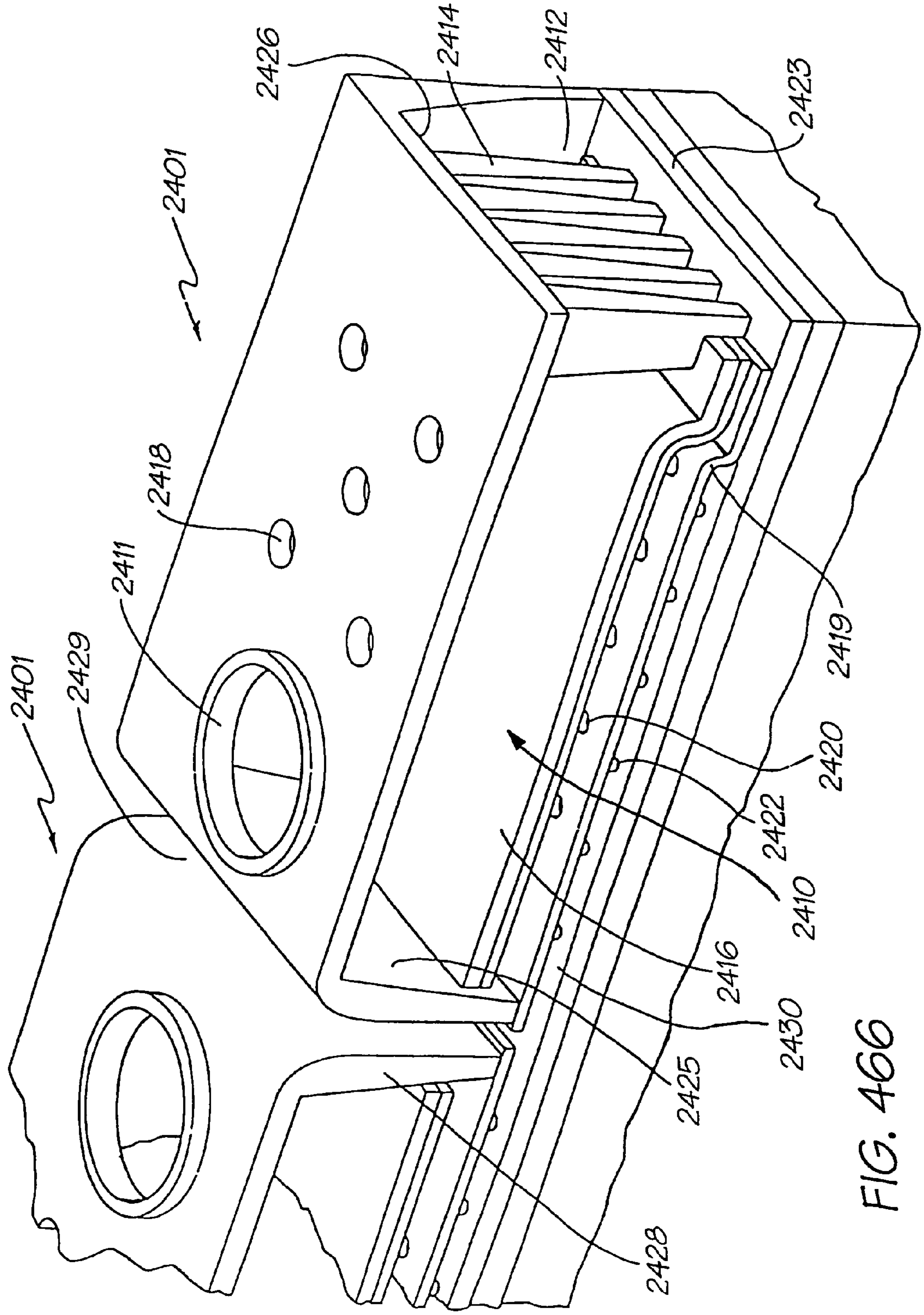
Figure 467:
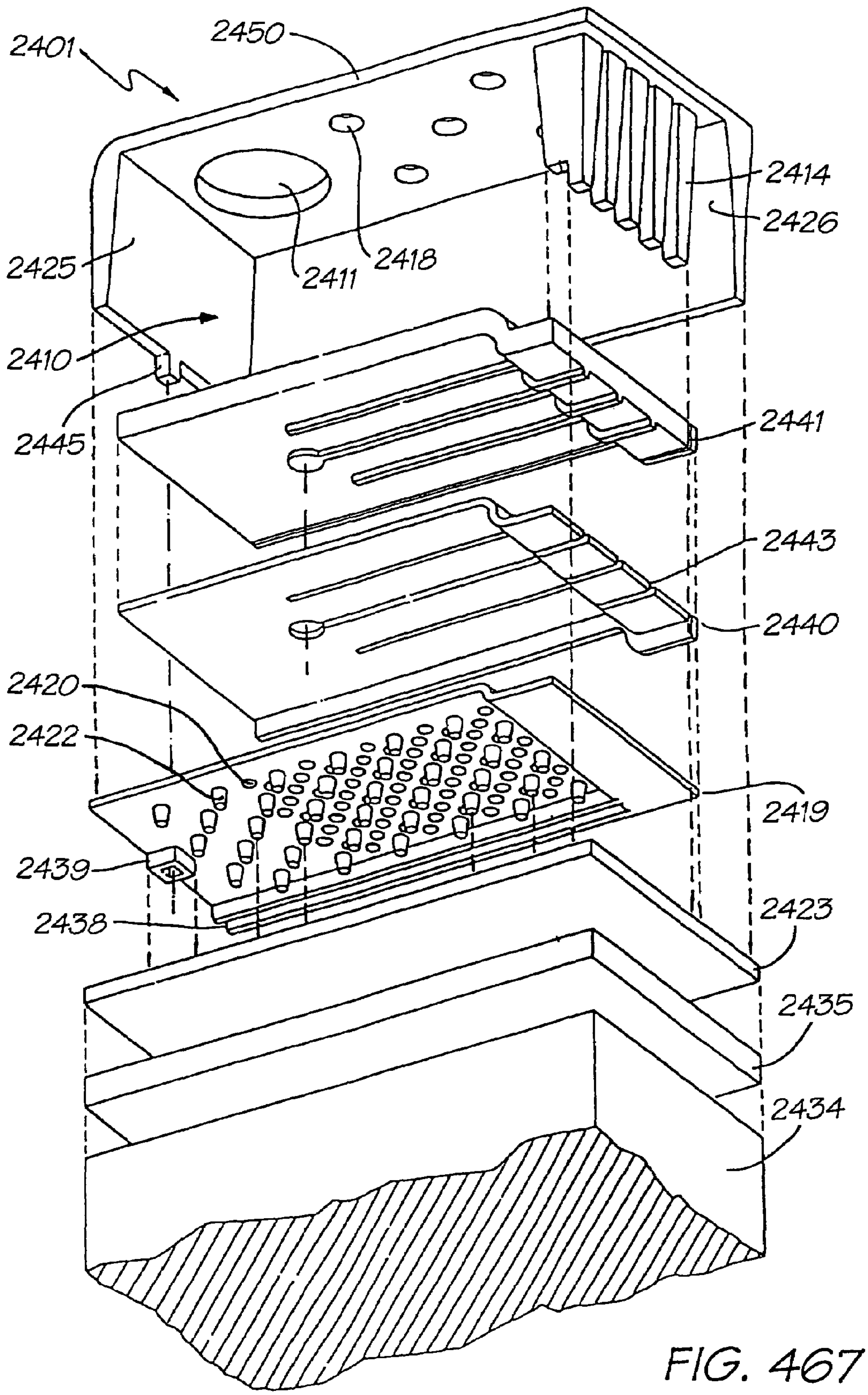
Figure 468:
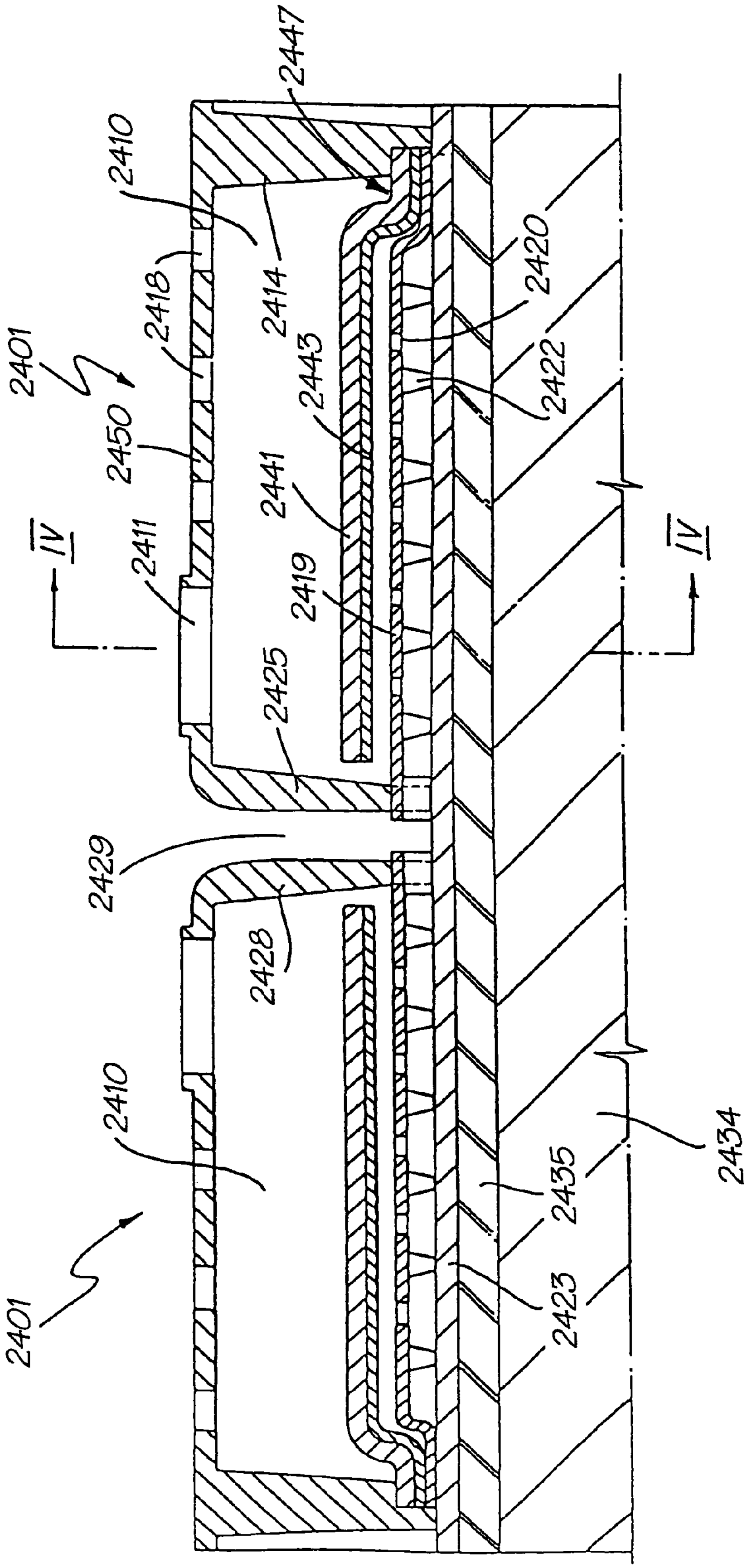
Figure 469:
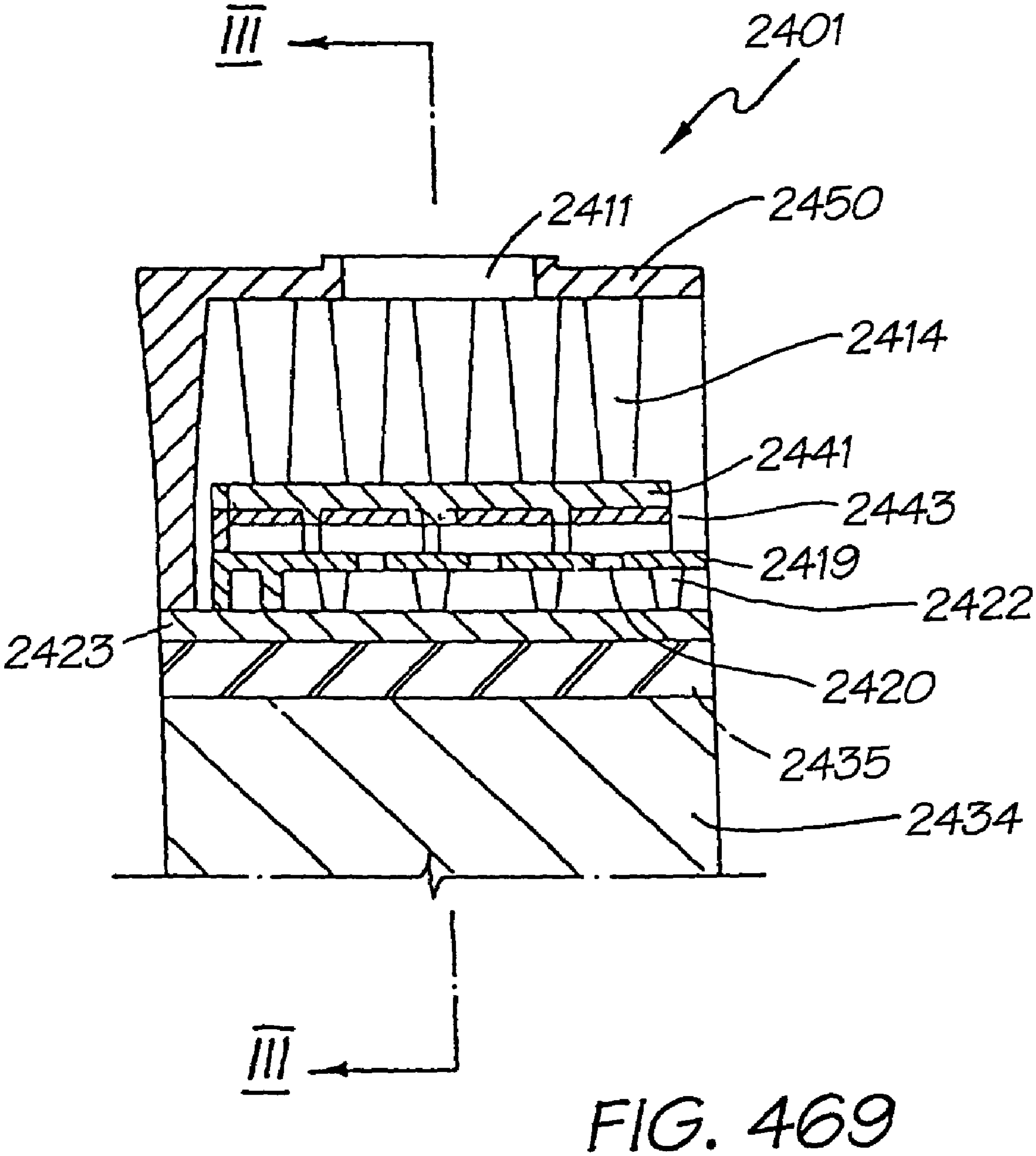
Figure 470:
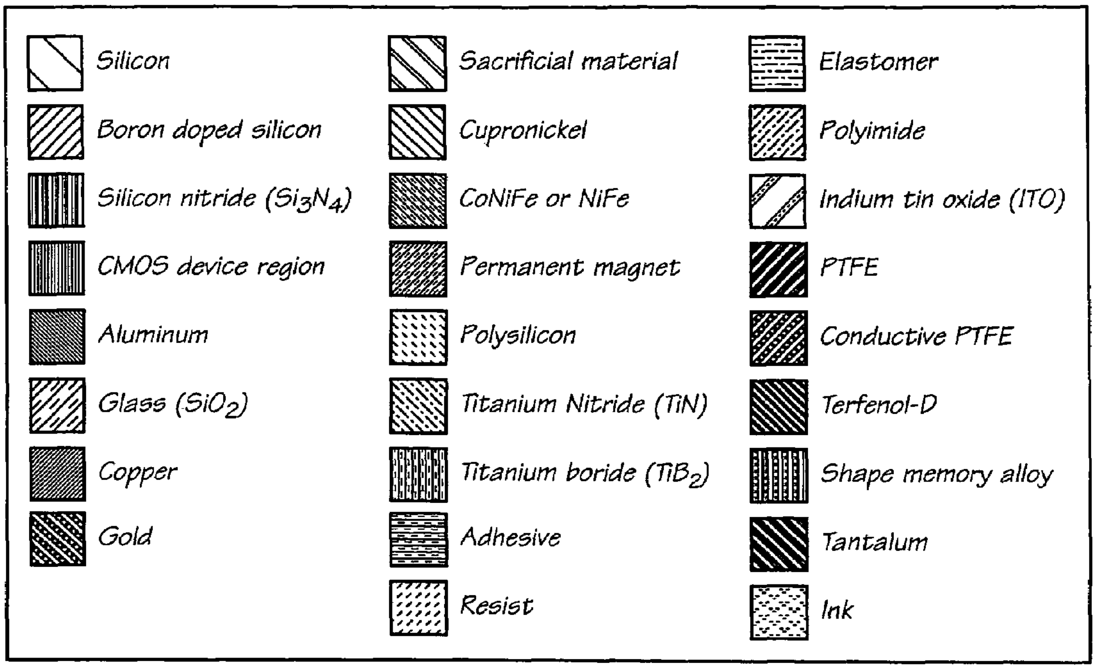
Figure 485:
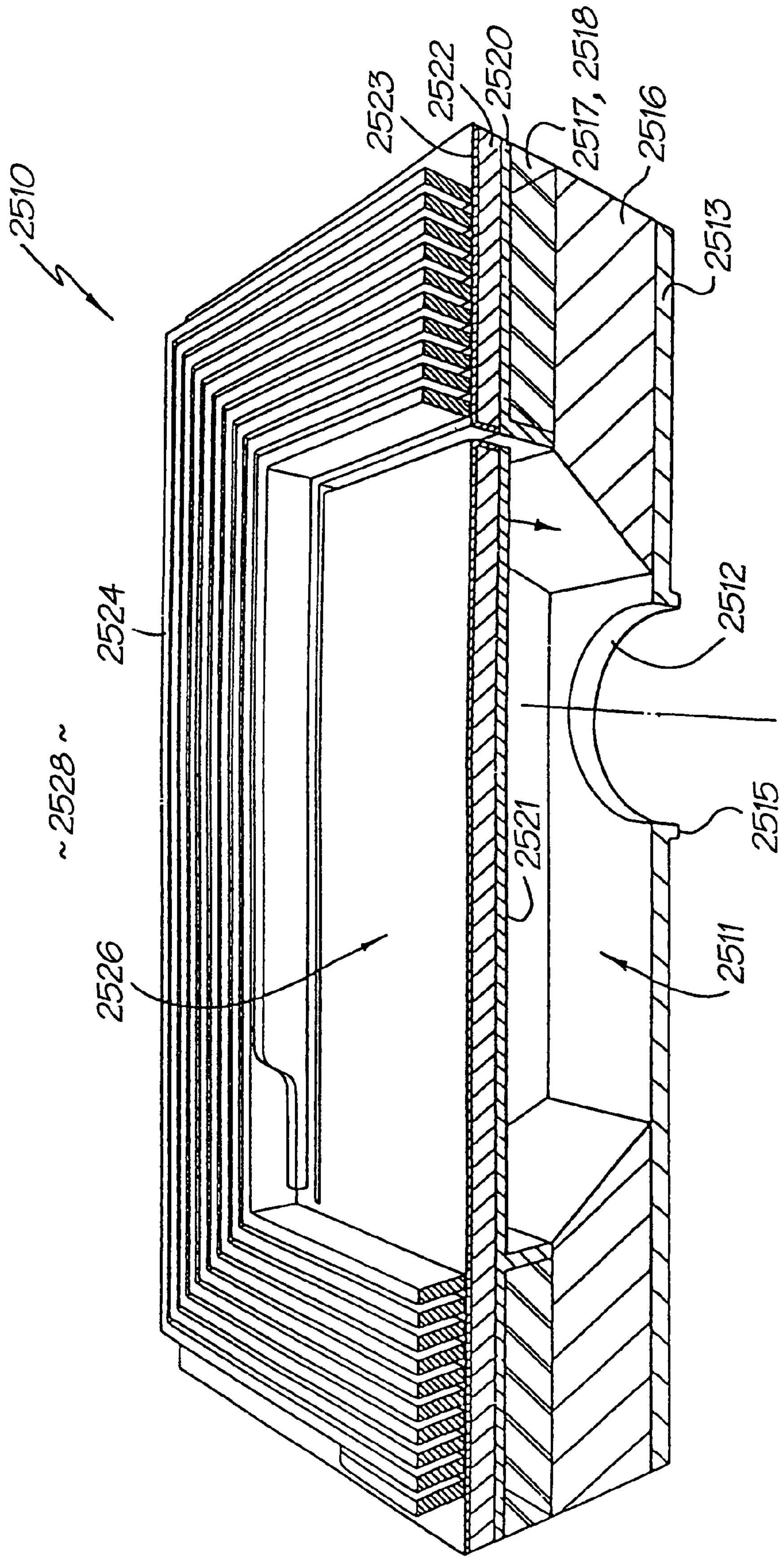
Figure 486:
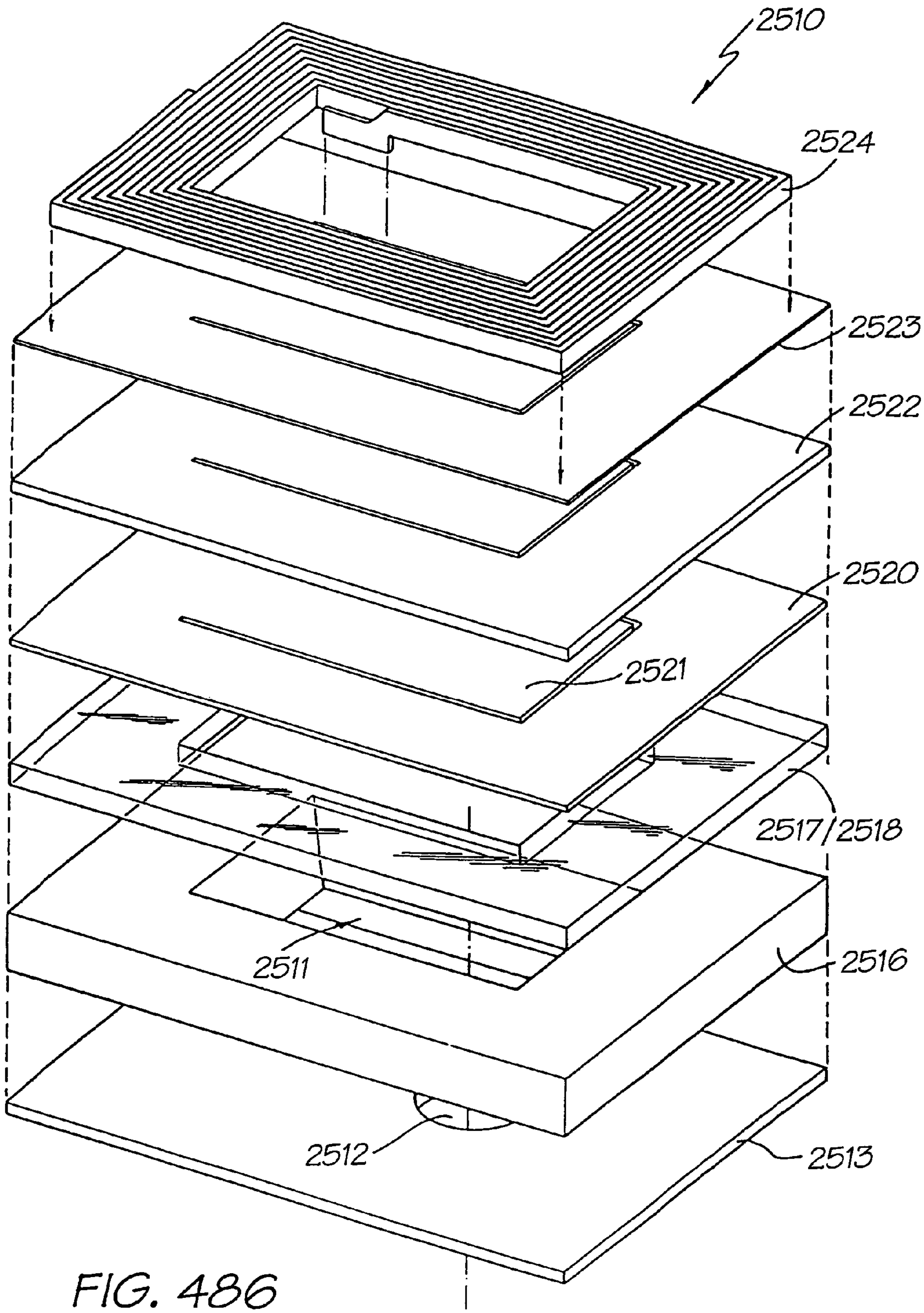
Figure 487:
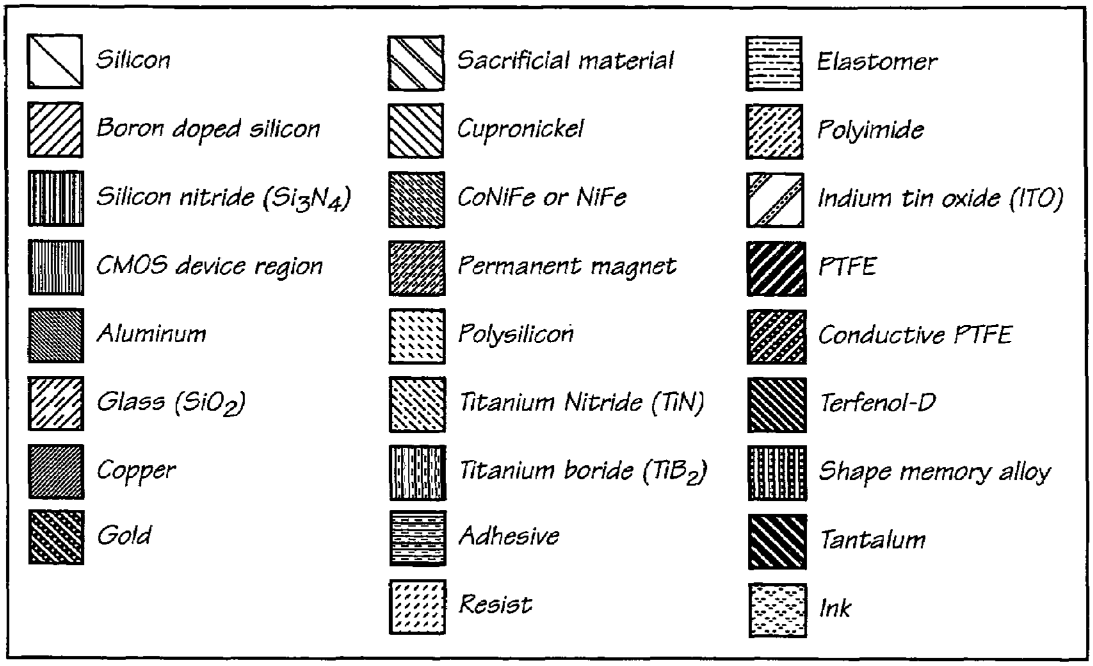
Figure 500:
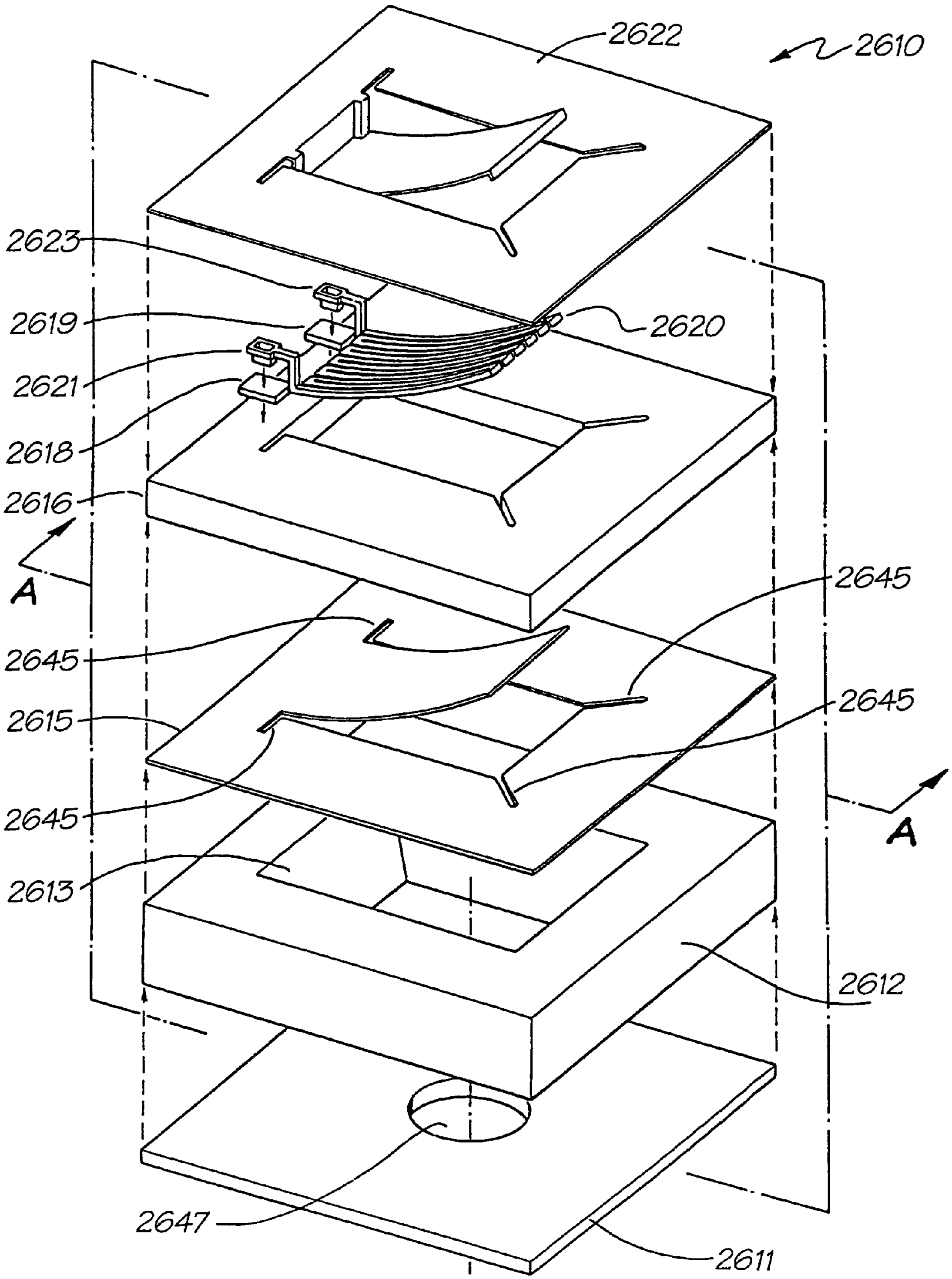
Figure 501:
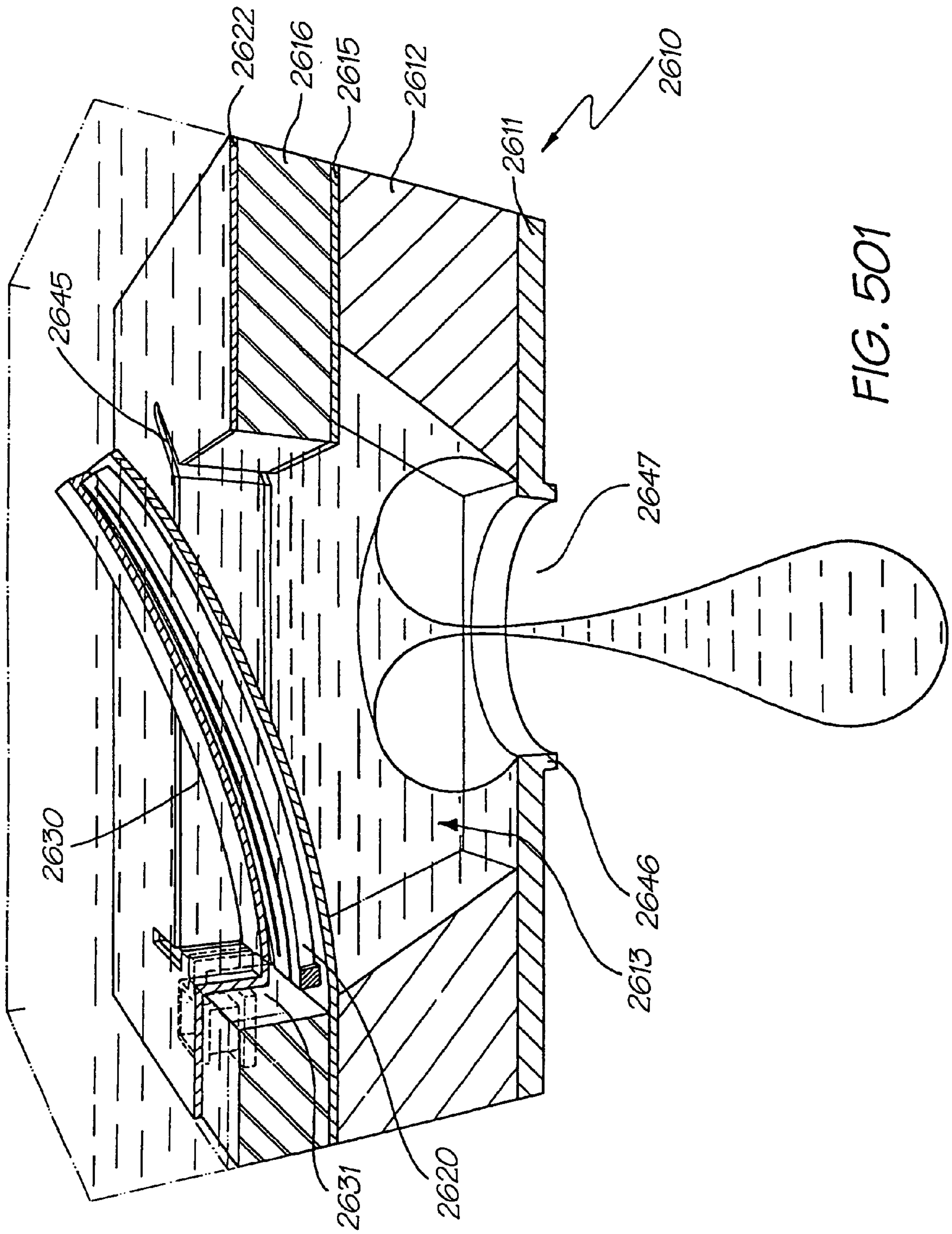
Figure 502:
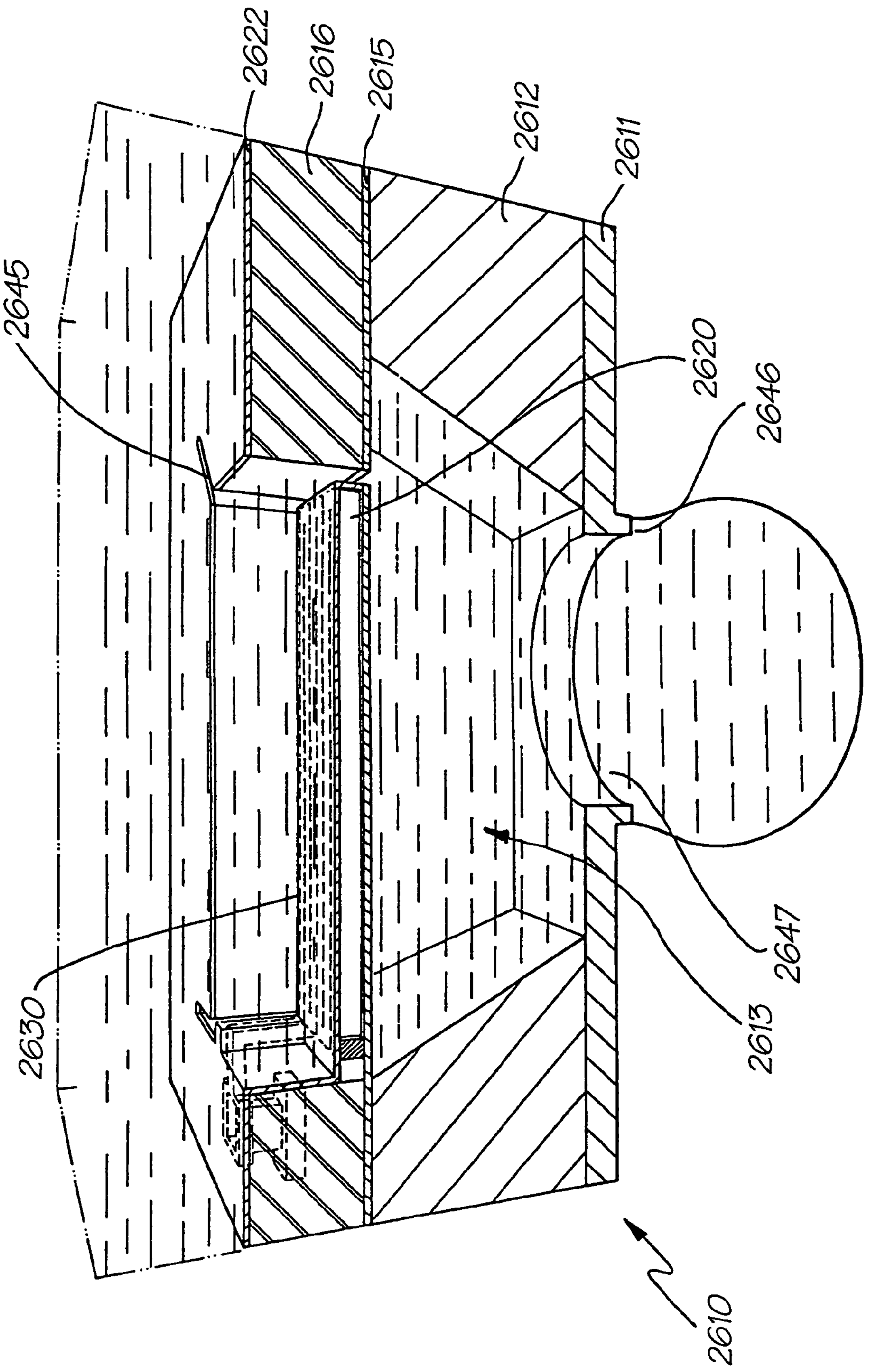
Figure 503:
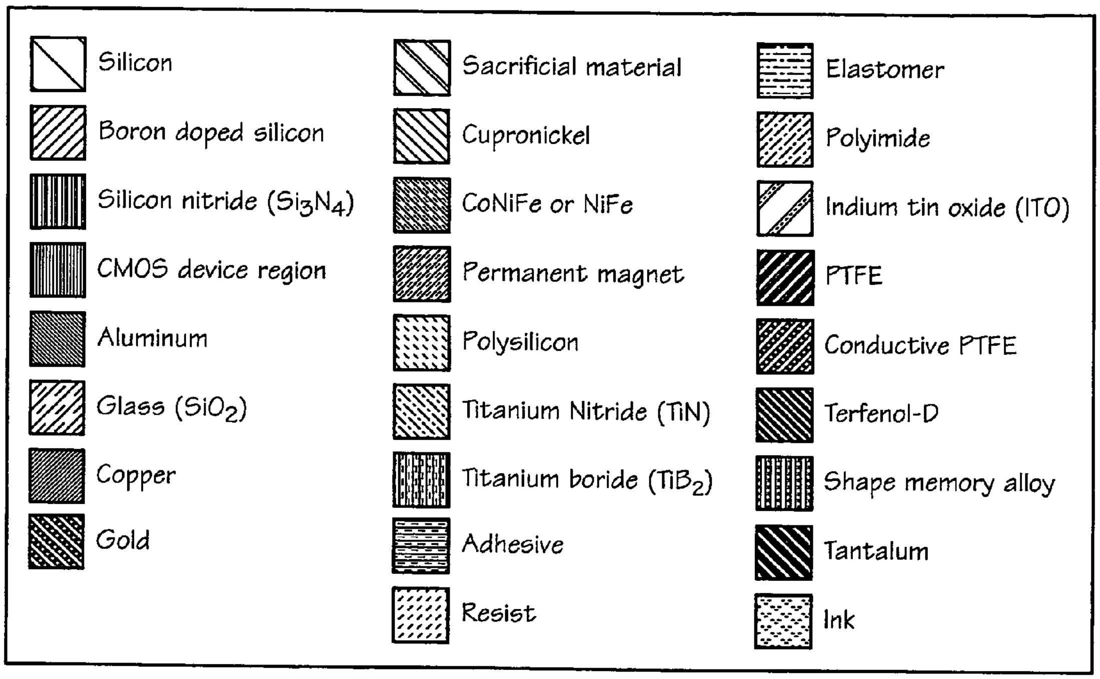
Figure 515:
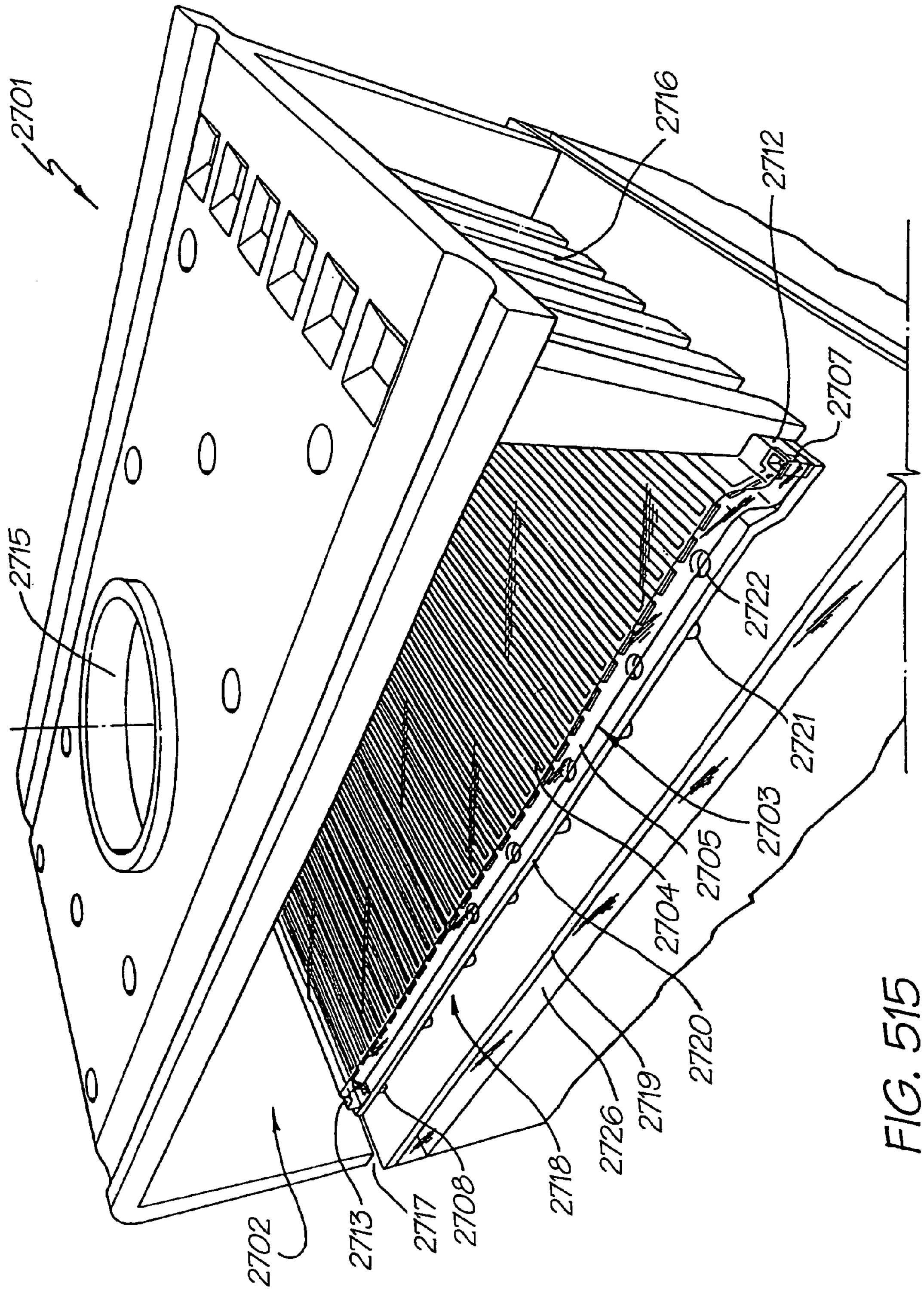
Figure 516:
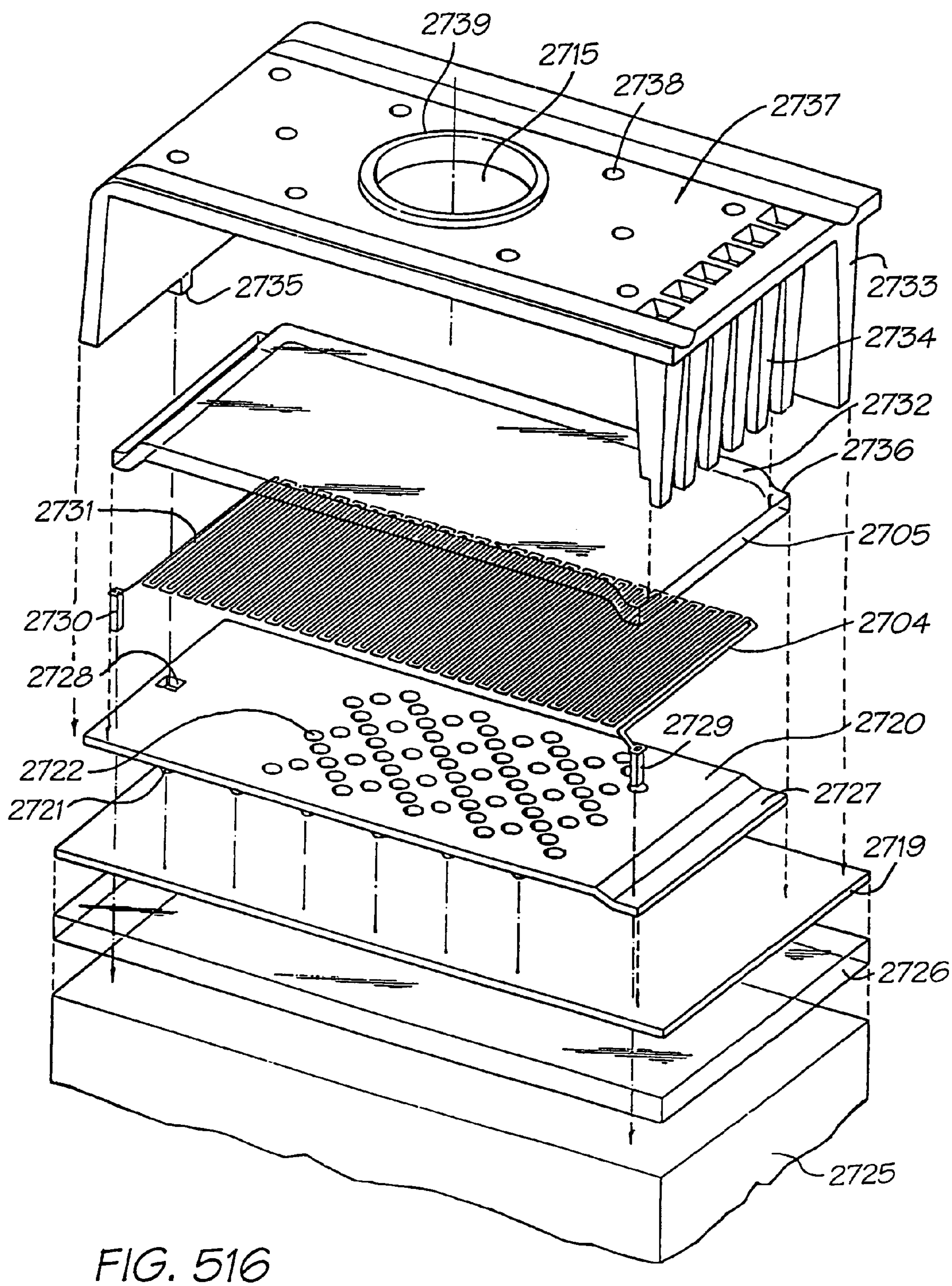
Figure 517:
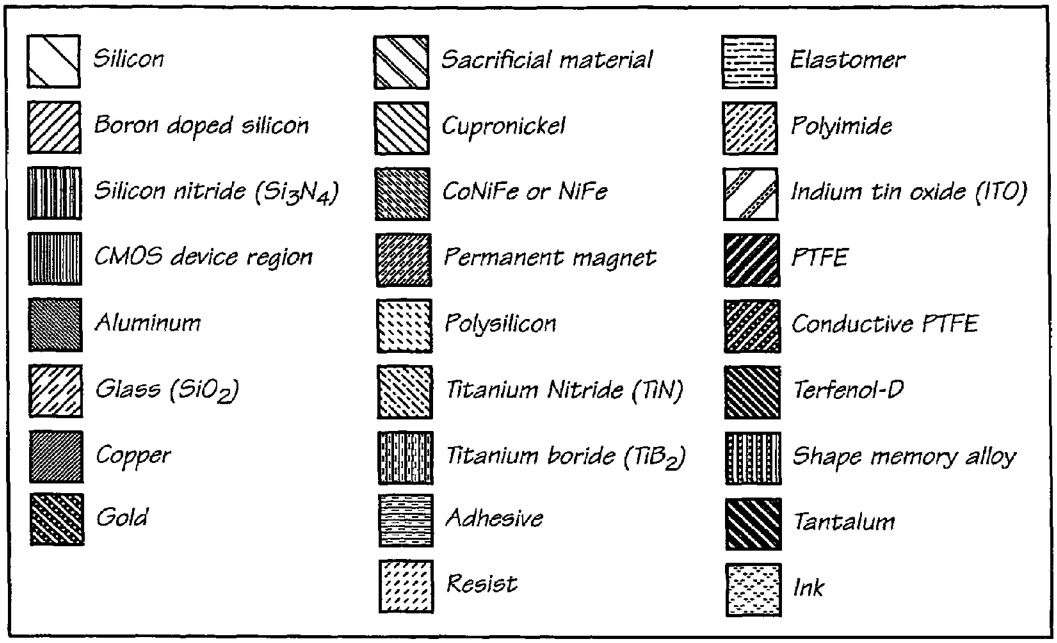
Figure 531:
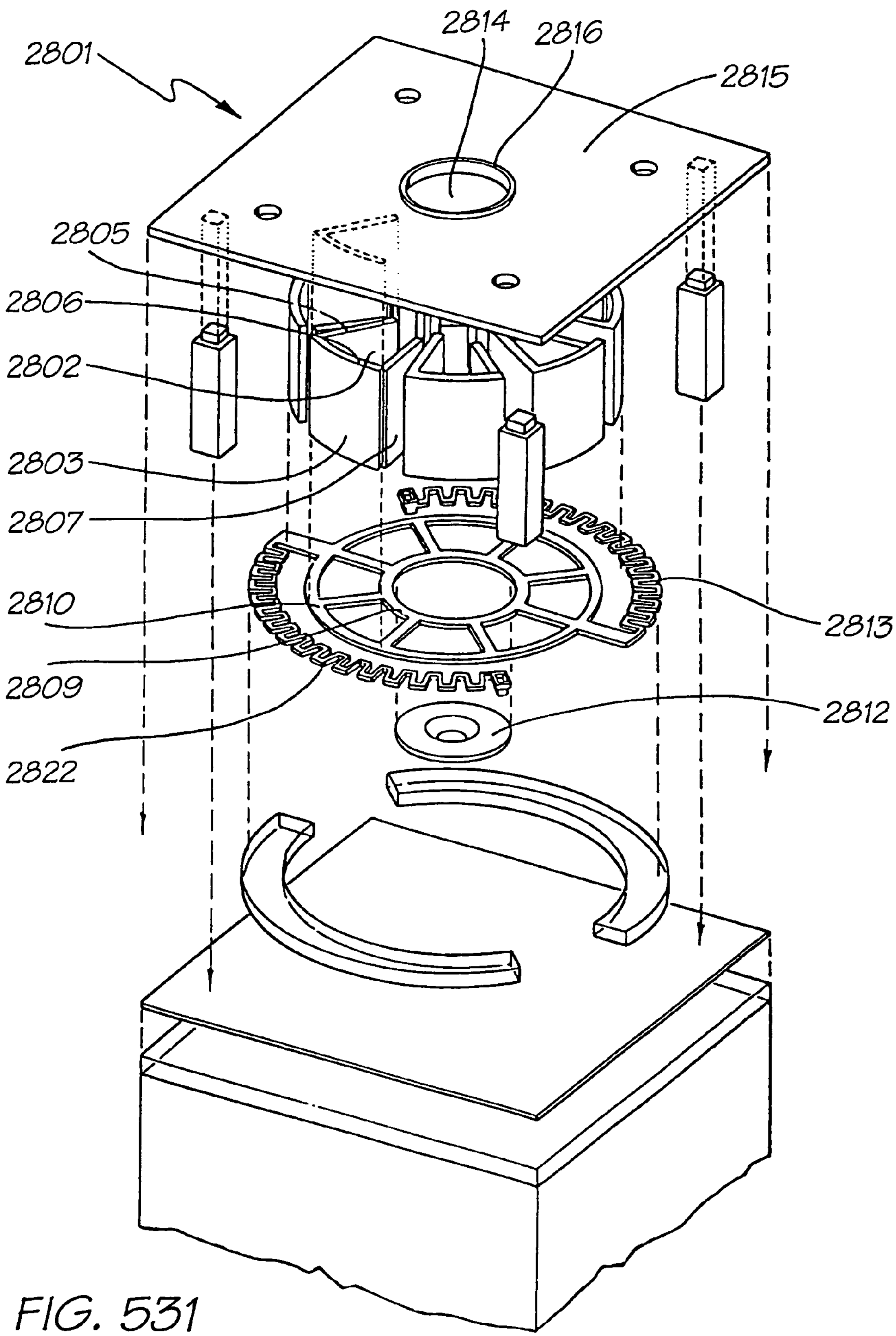
Figure 532:
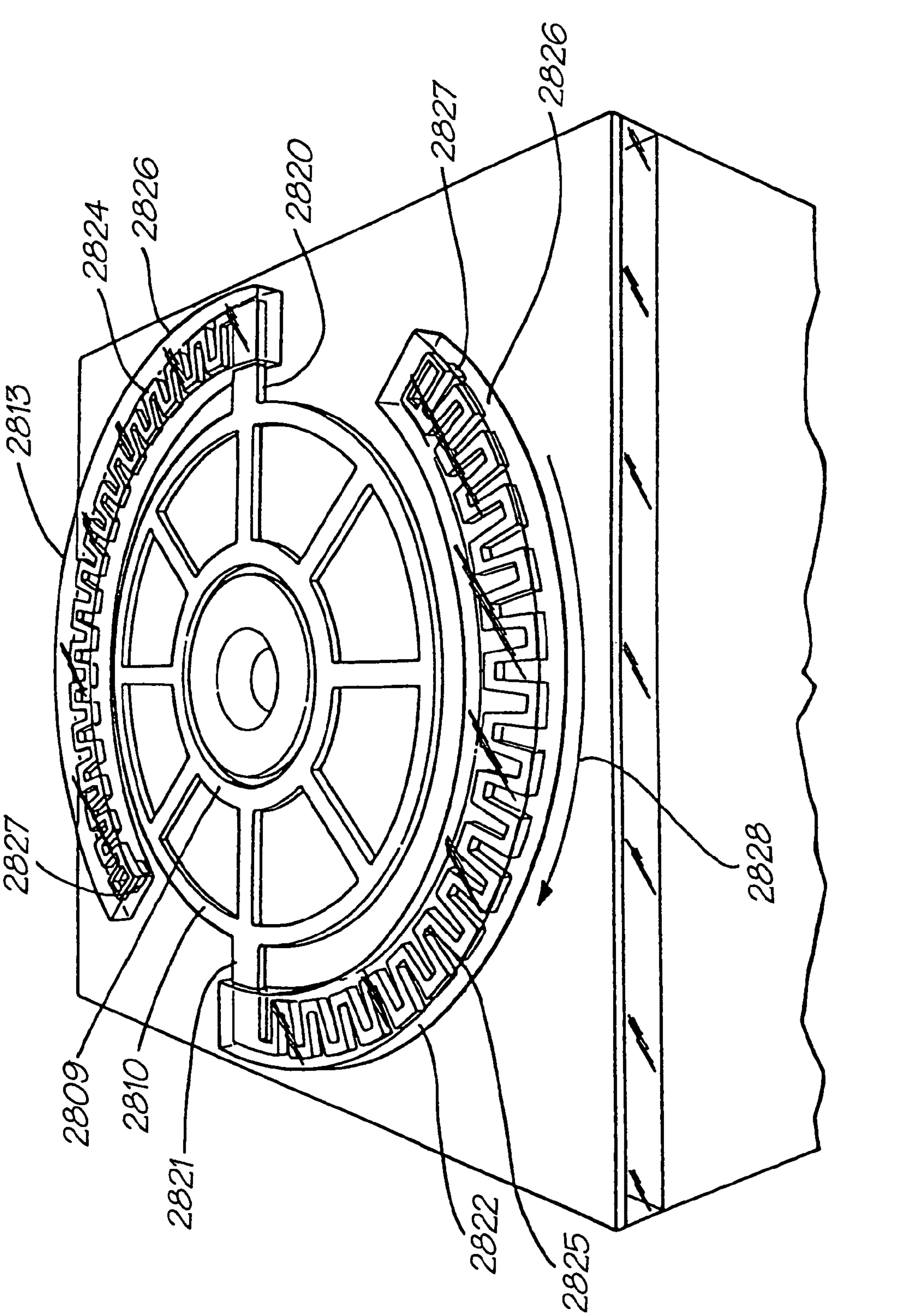
Figure 533:
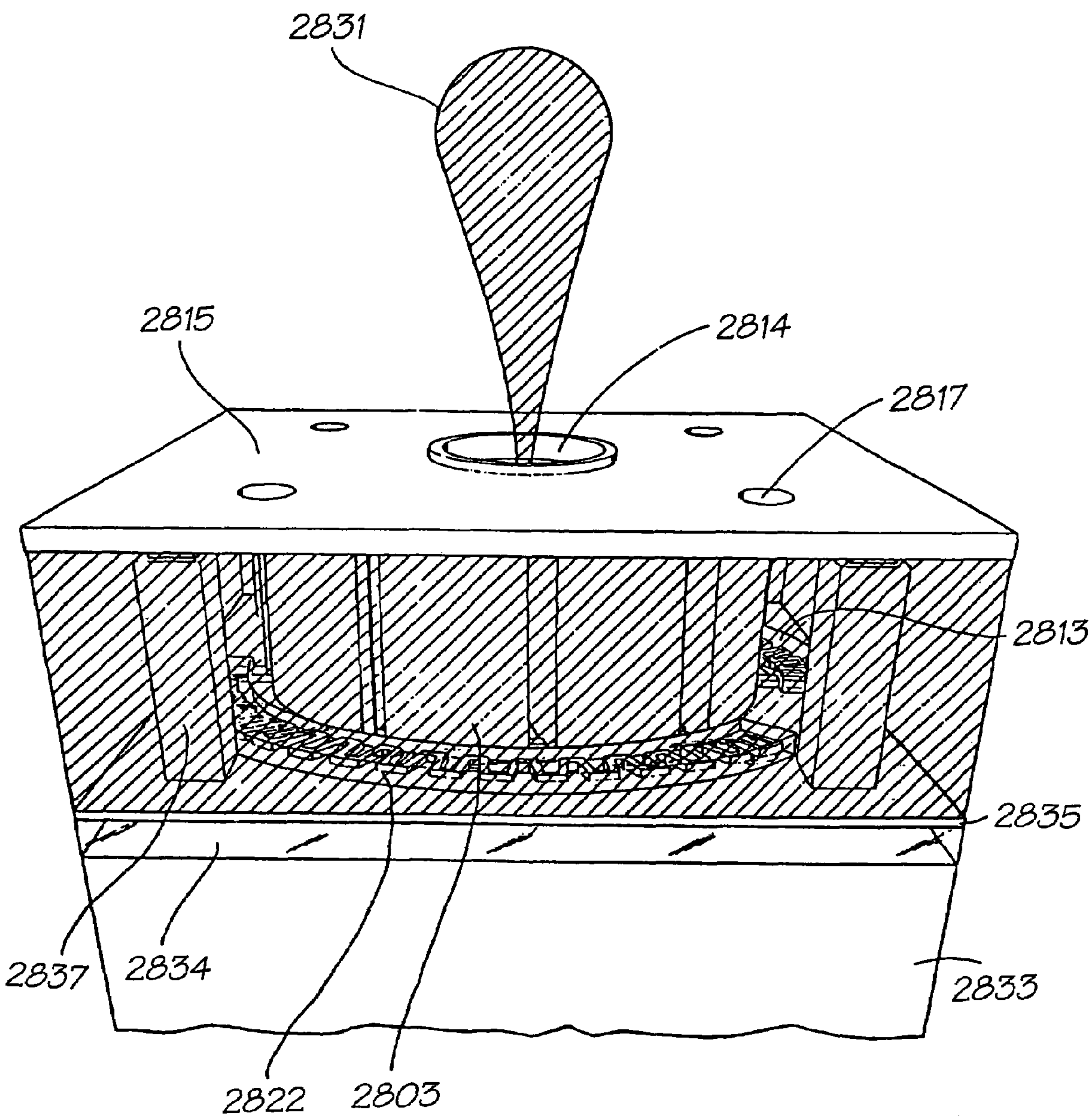
Figure 534:
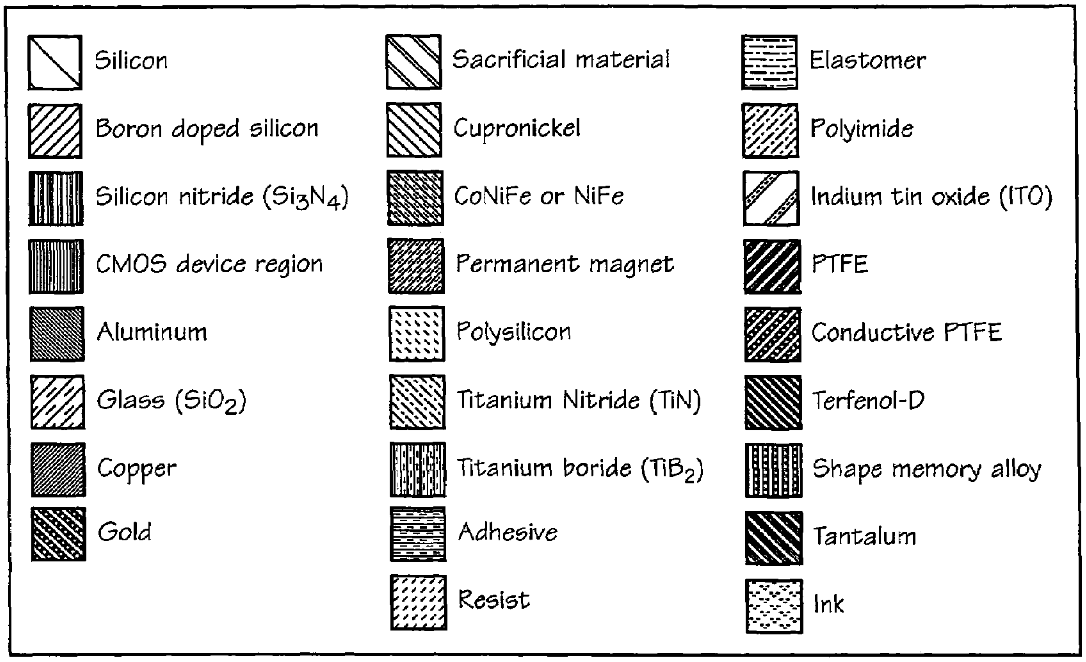
Figure 547:
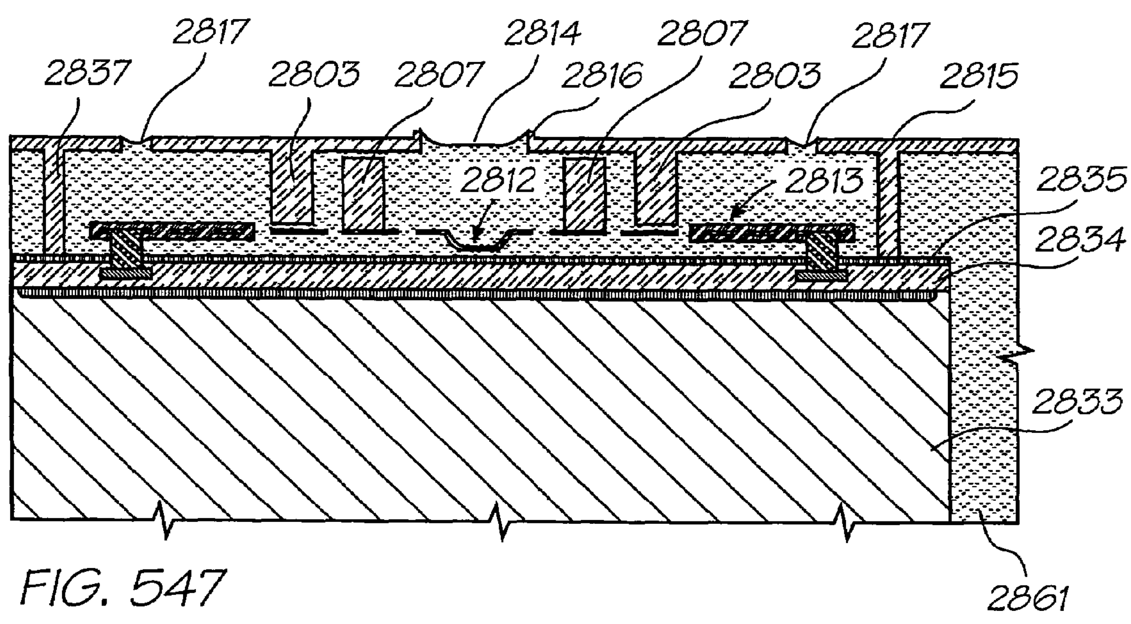
Figure 548:
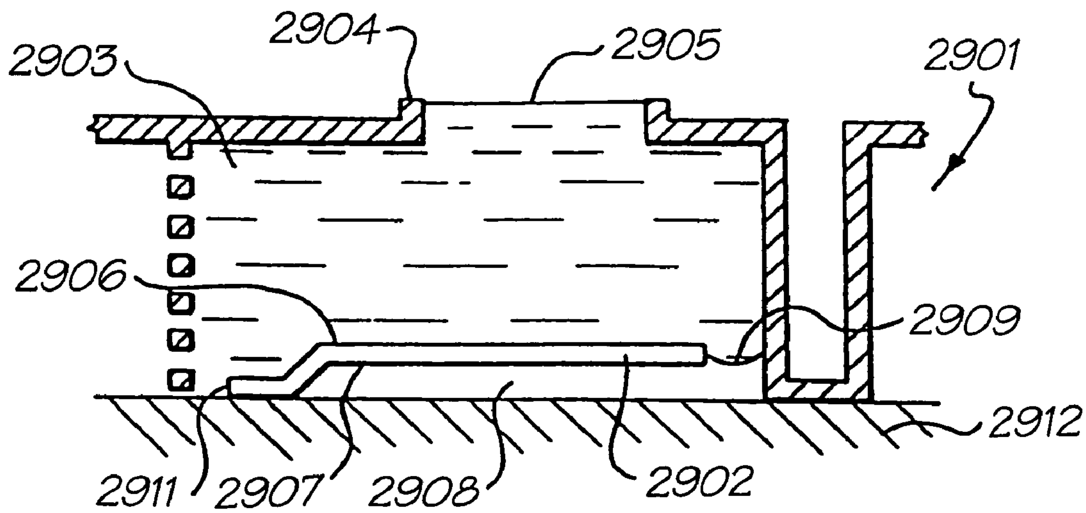
Figure 549:
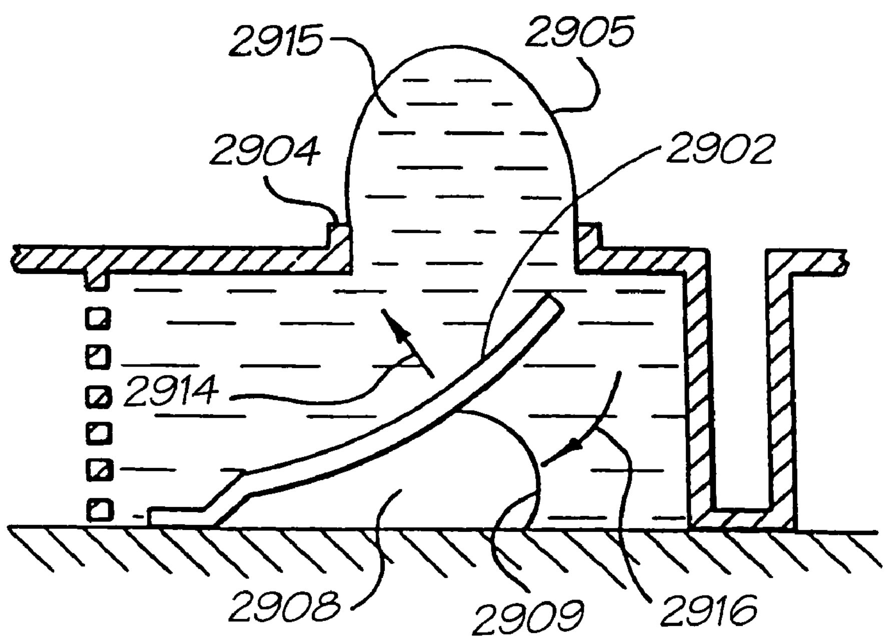
Figure 550:
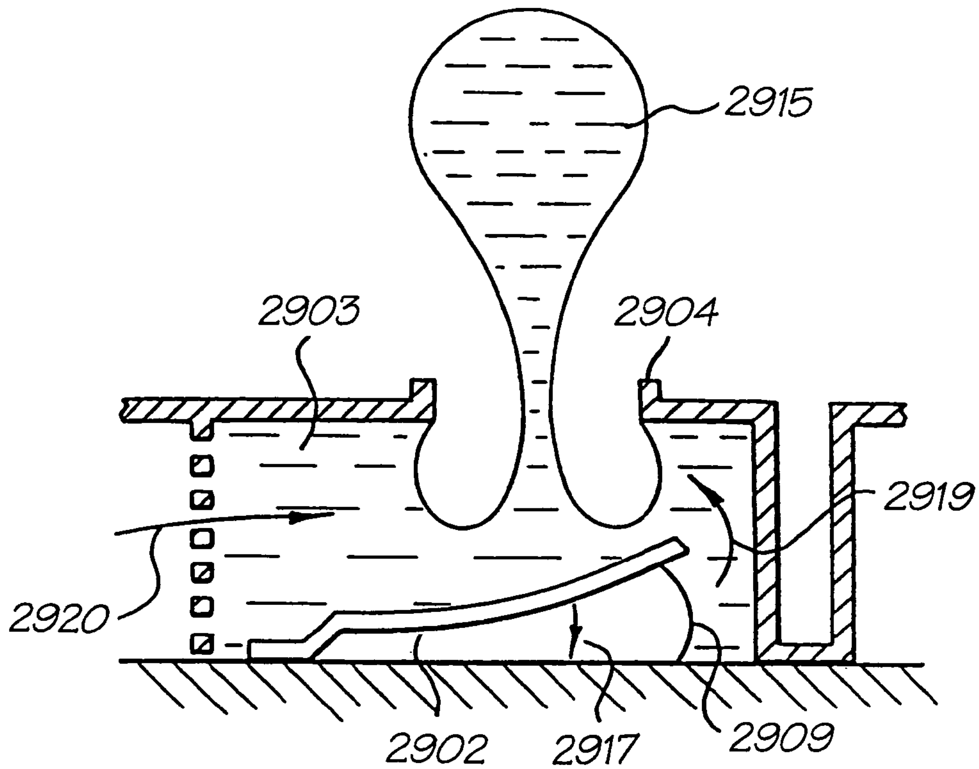
Figure 551:
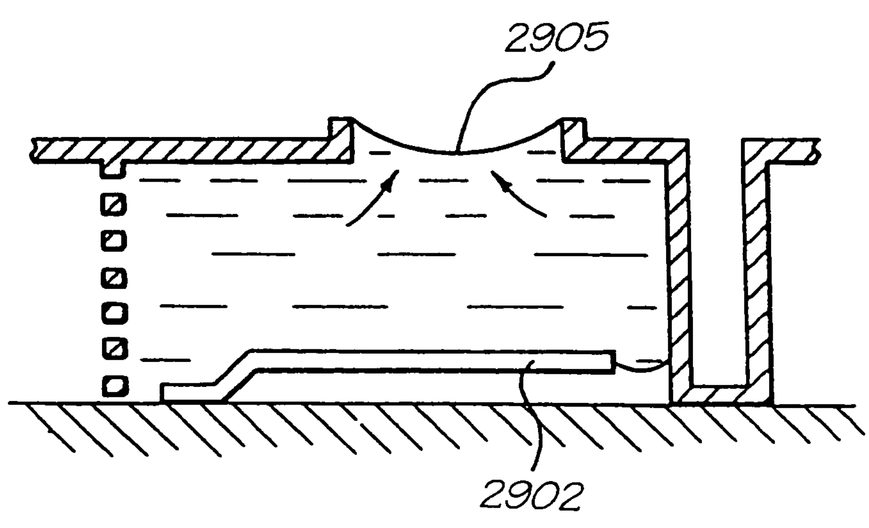
Figure 552:
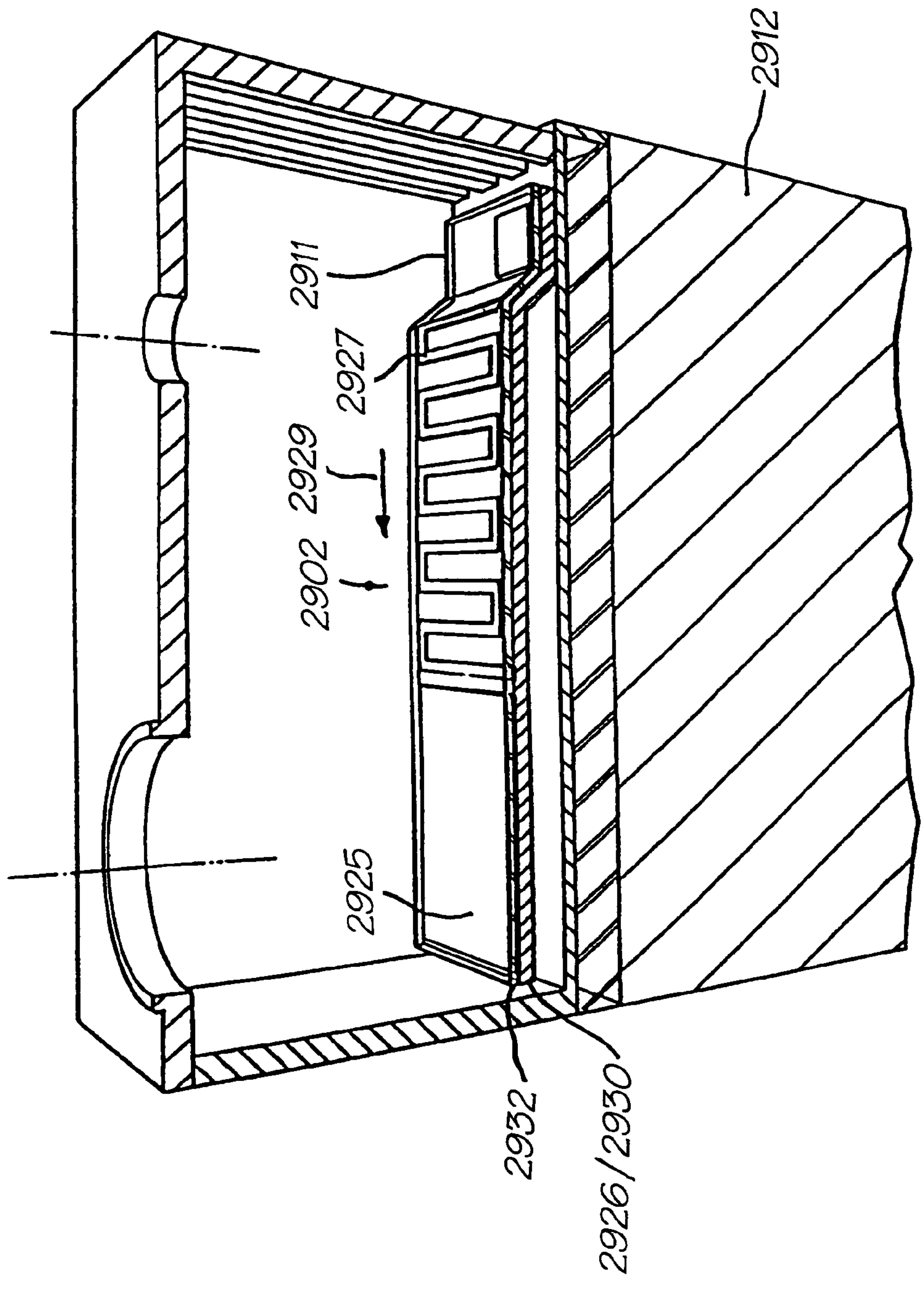
Figure 553:
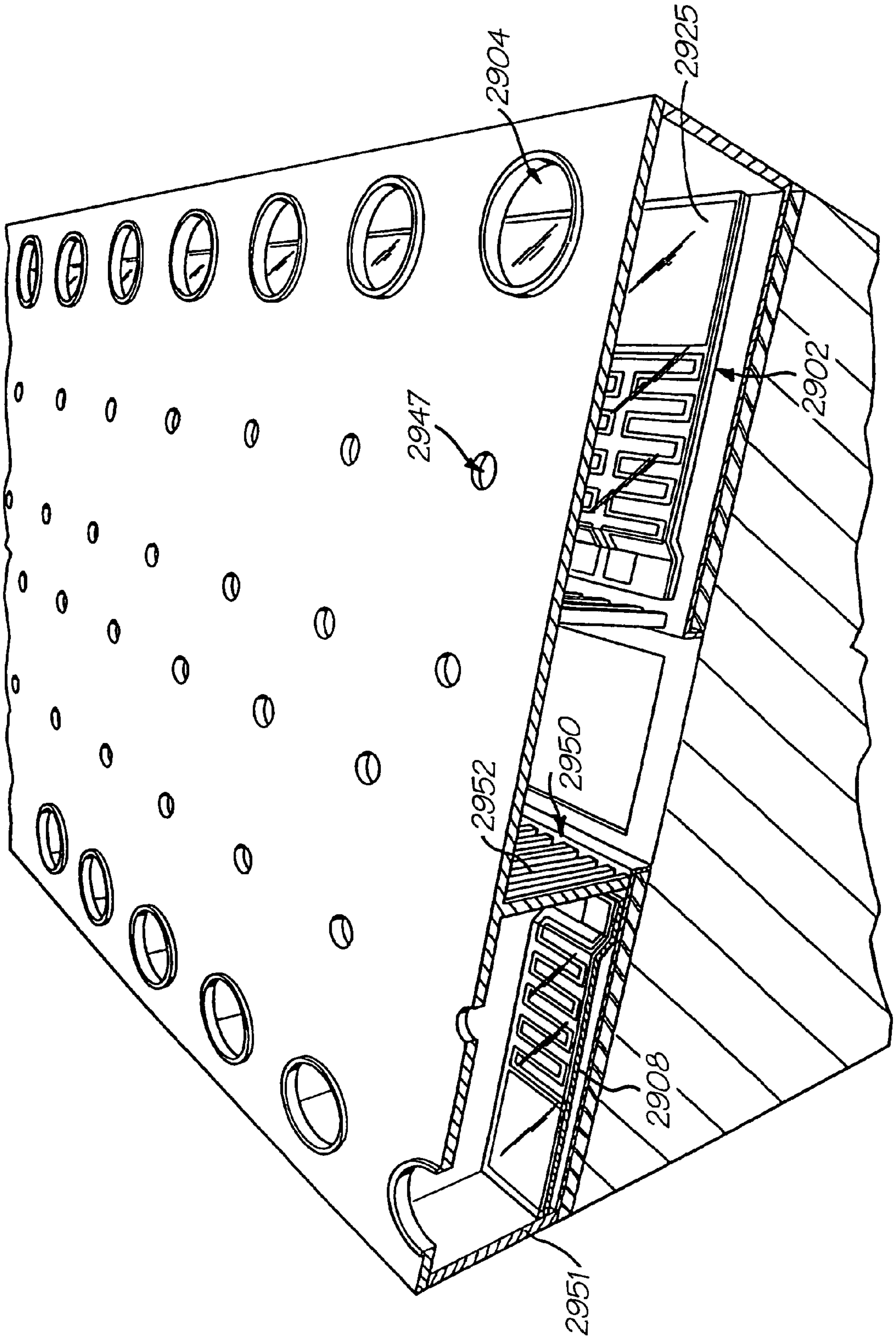
Figure 554:
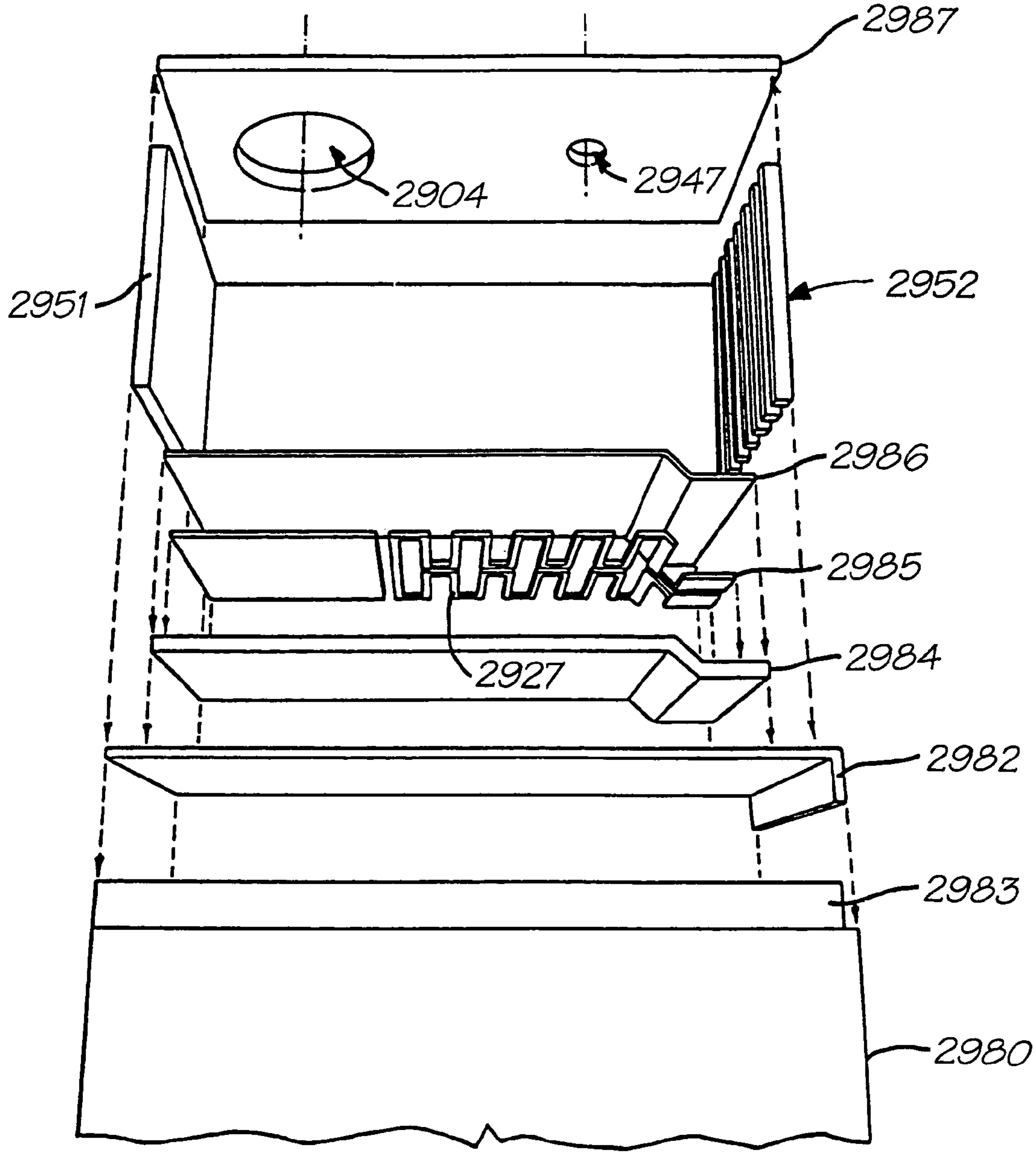
Figure 555:
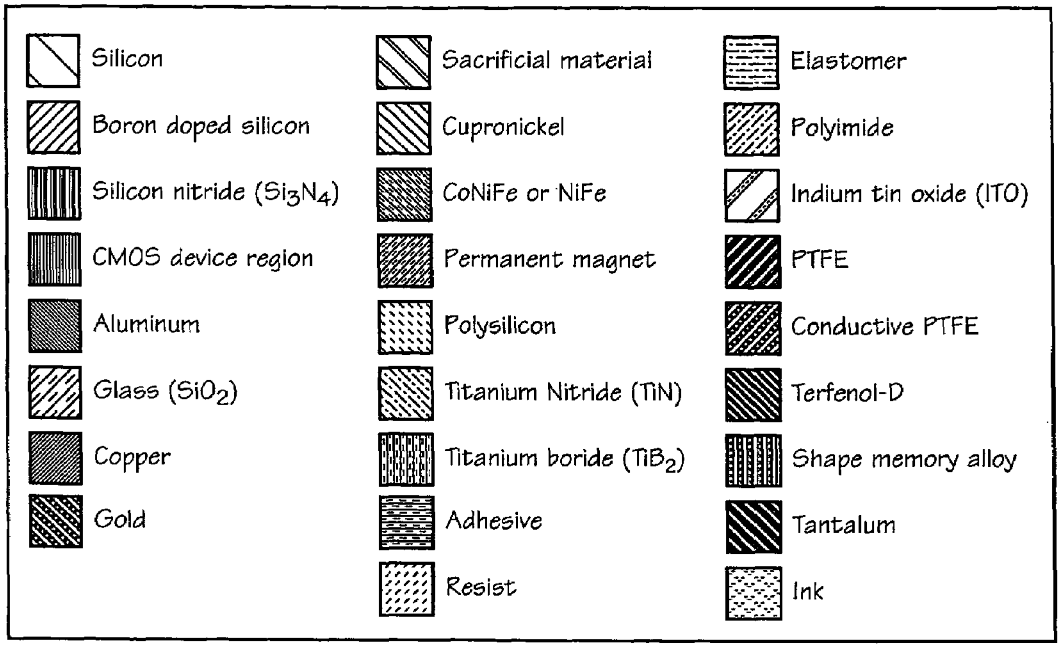
Figure 568:
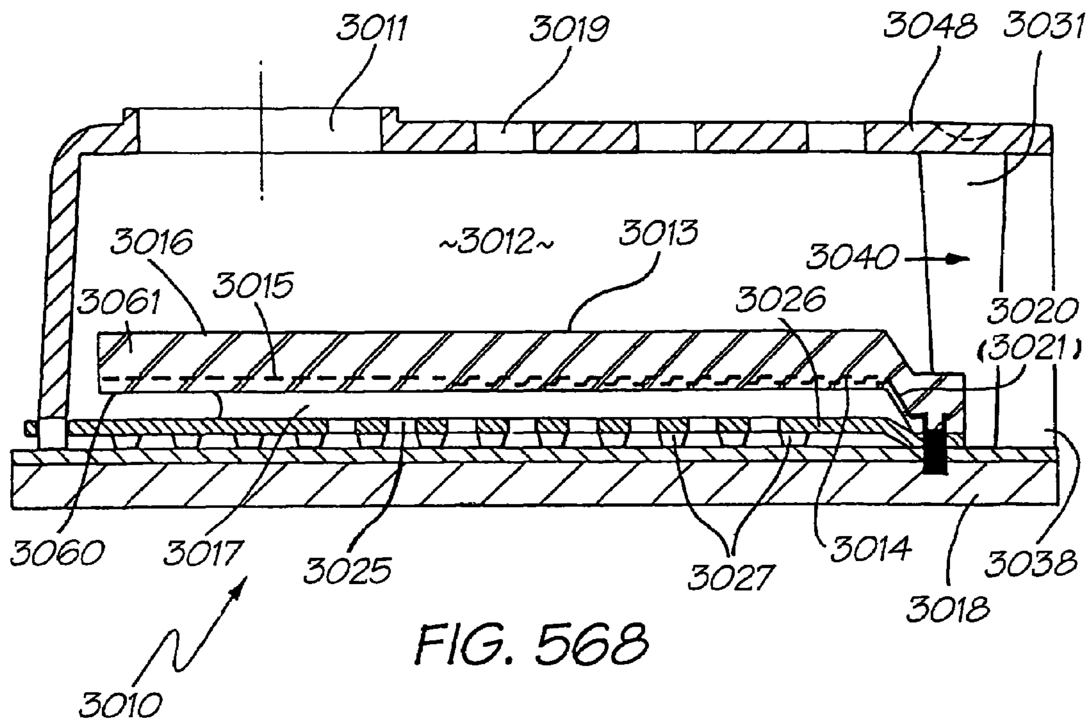
Figure 569:
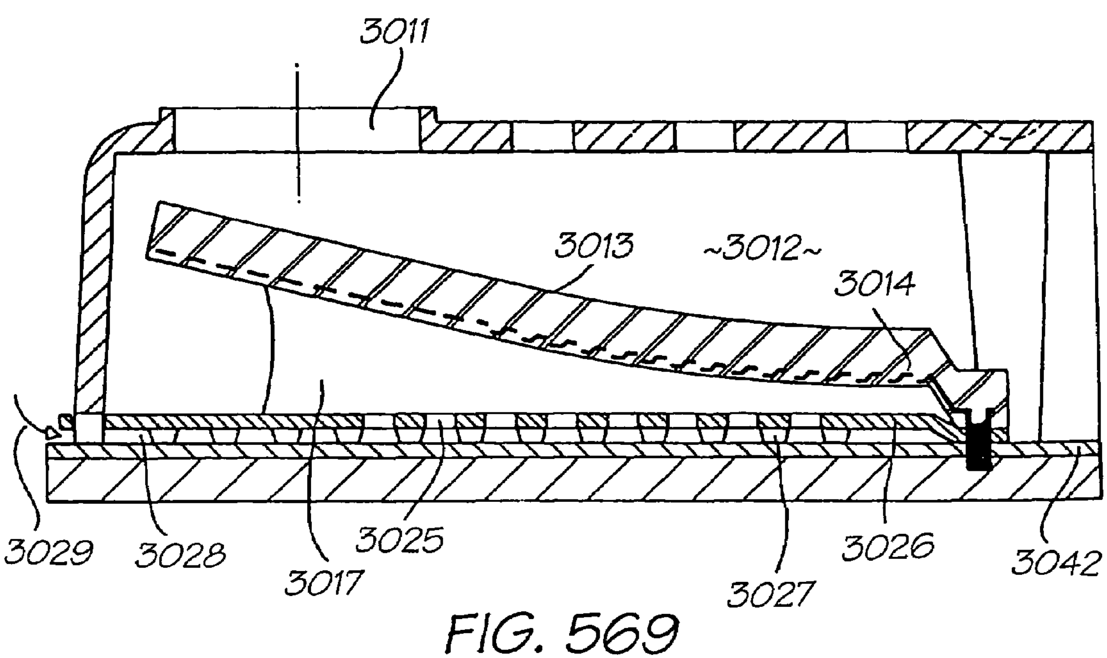
Figure 570:
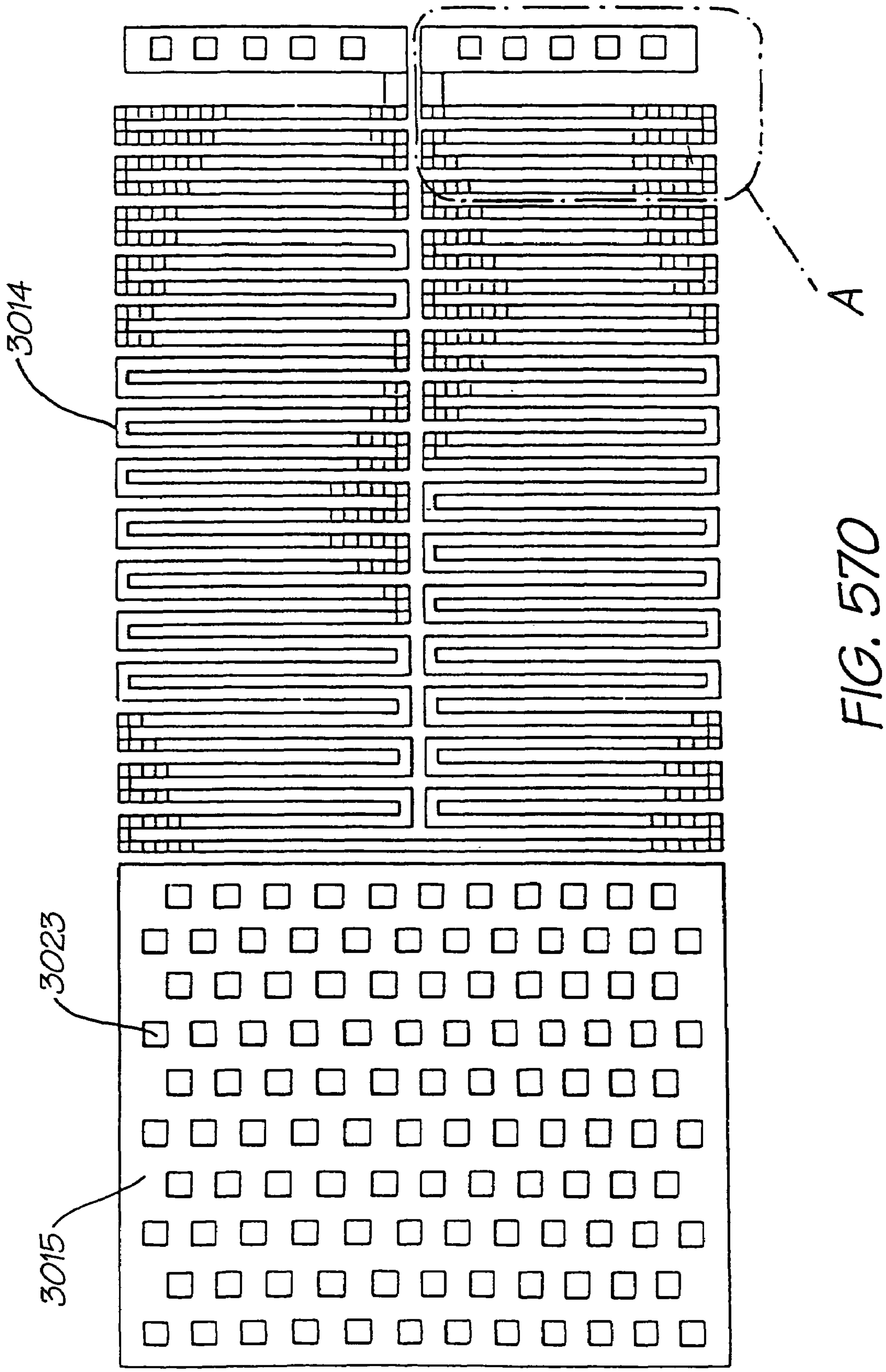
Figure 571:
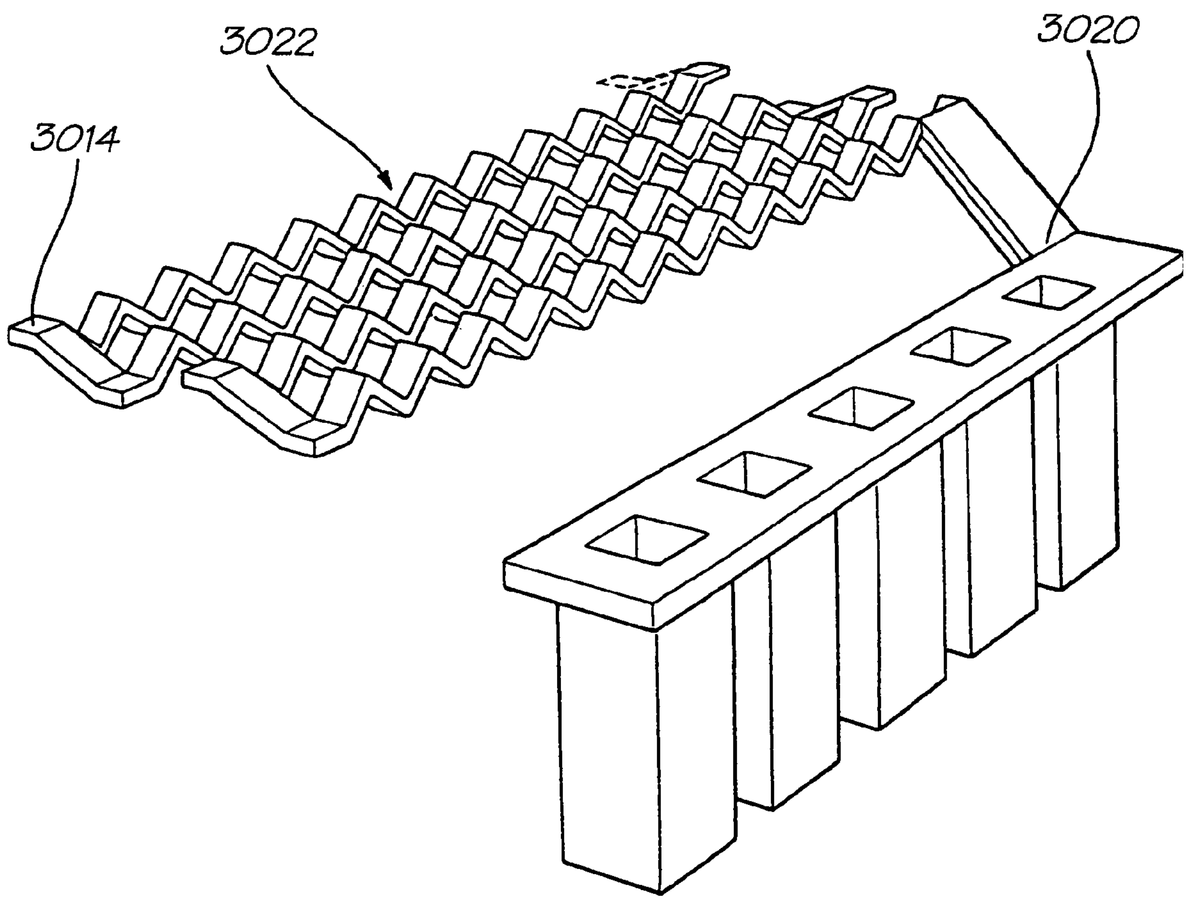
Figure 572:
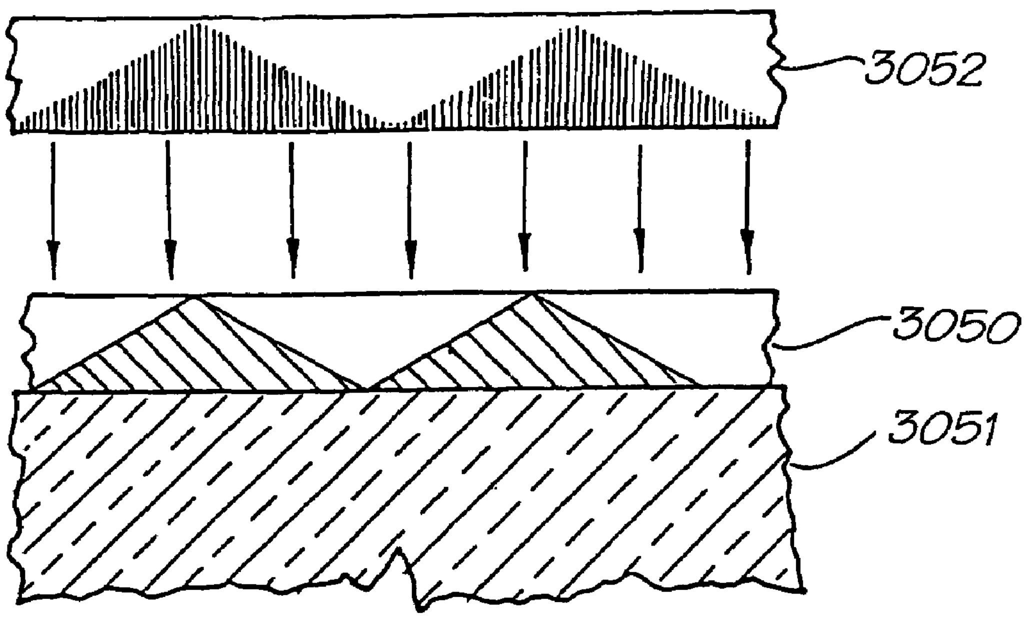
Figure 573:
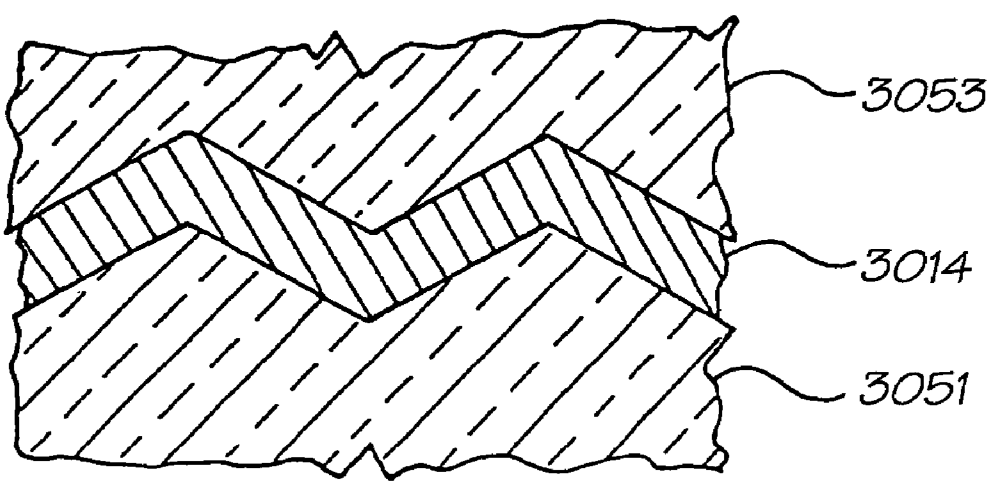
Figure 574:
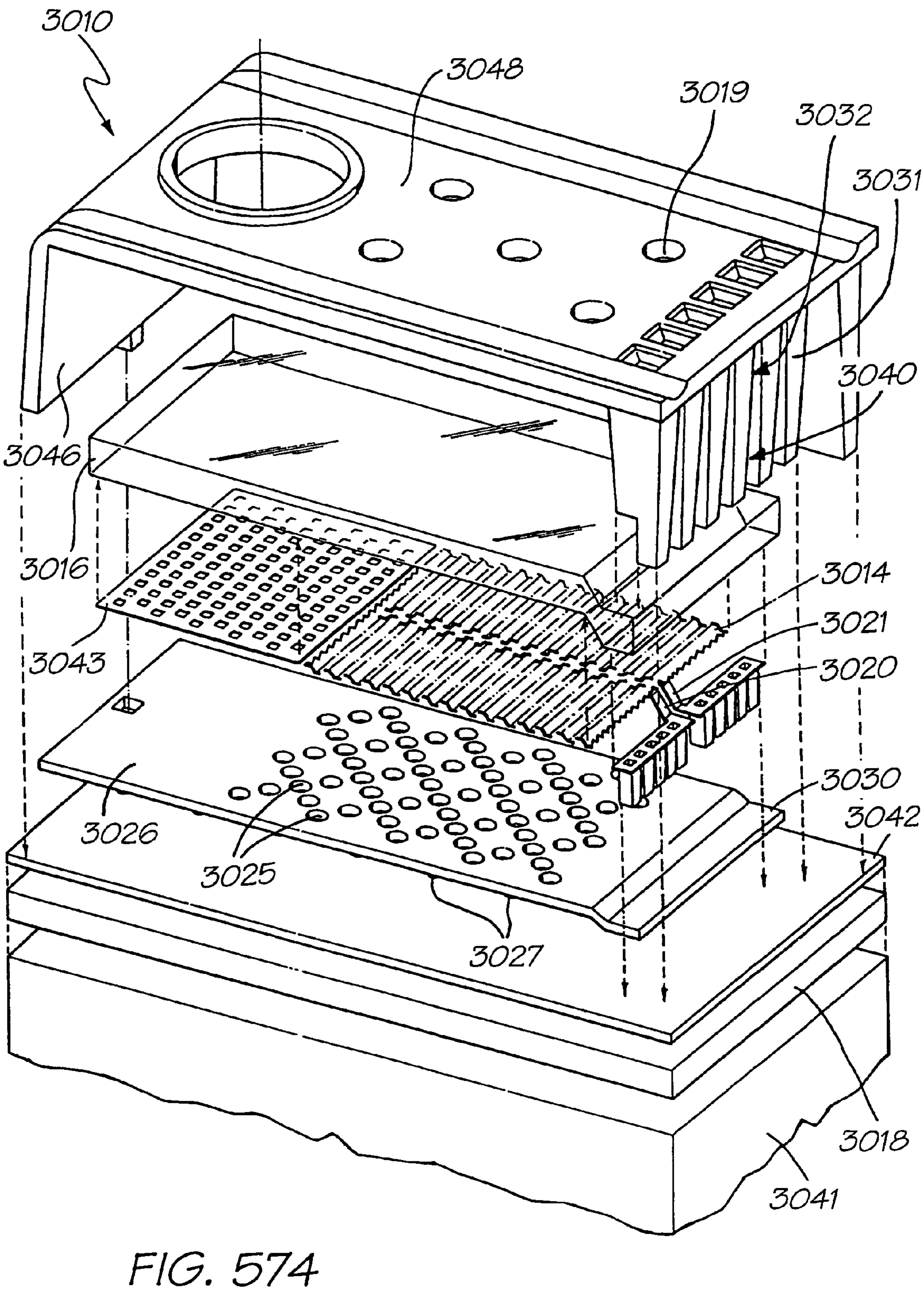
Figure 575:
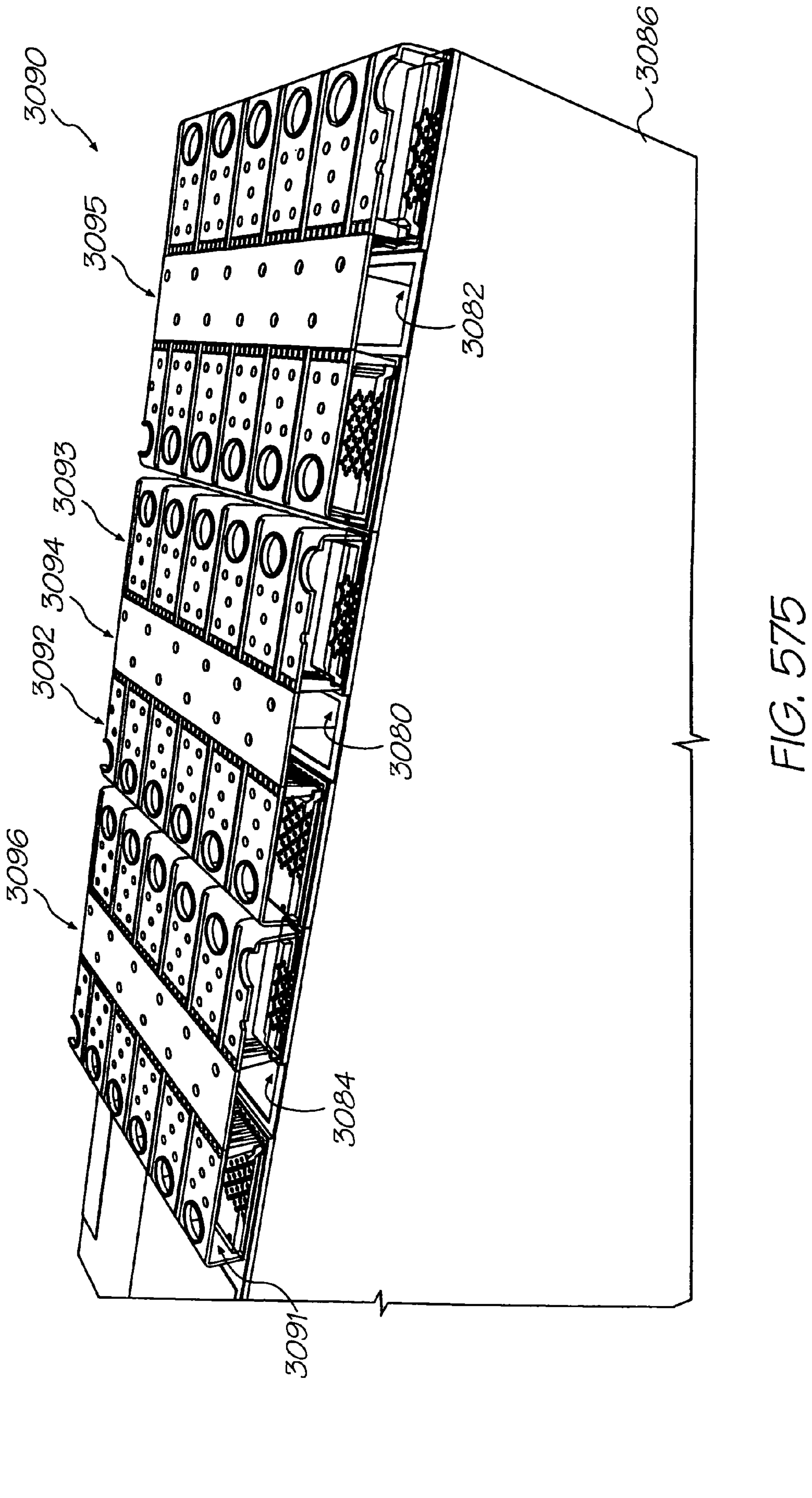
Figure 576:
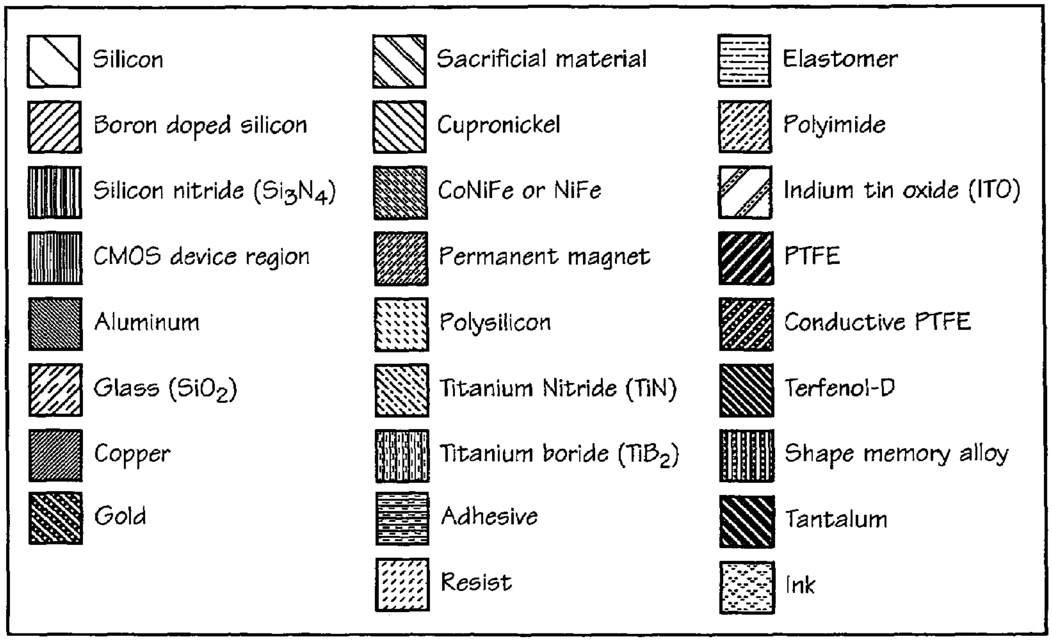
Figure 591:
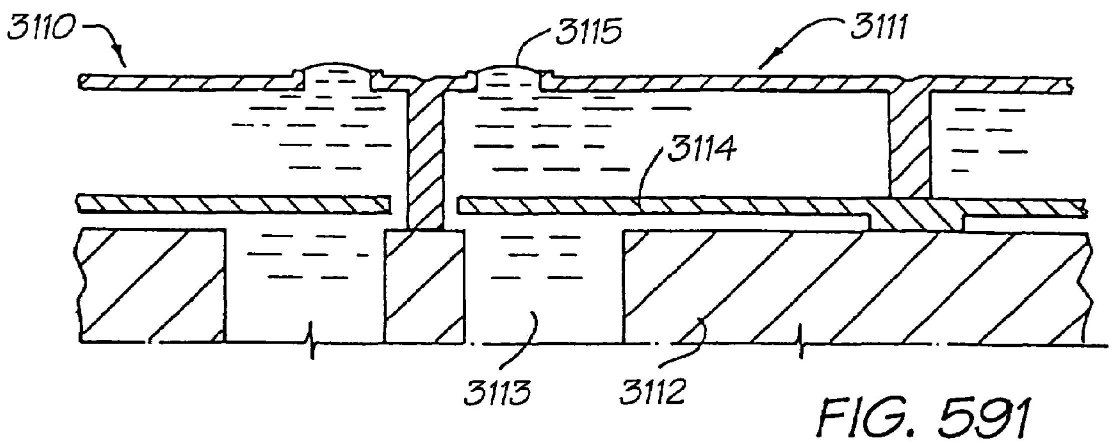
Figure 592:
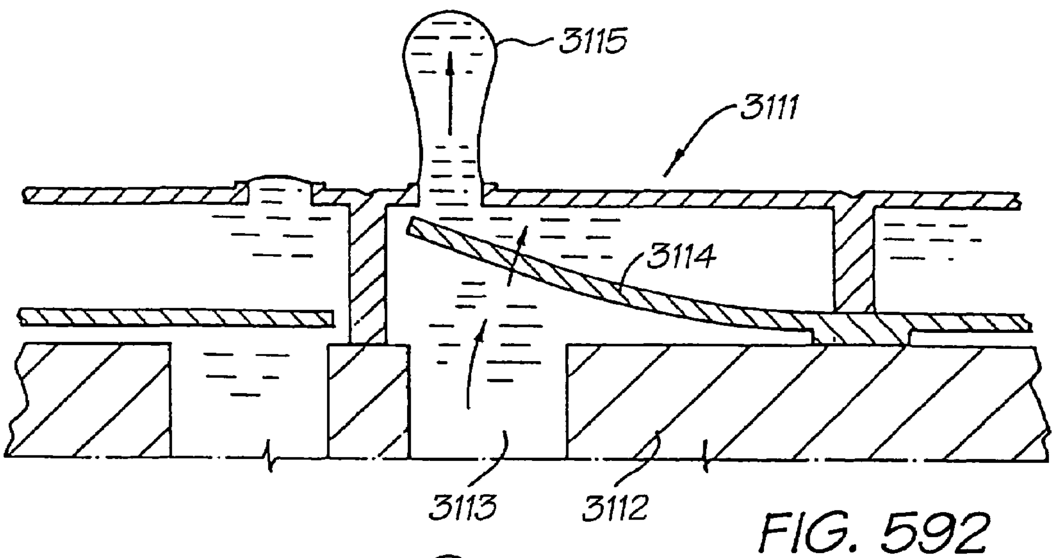
Figure 593:
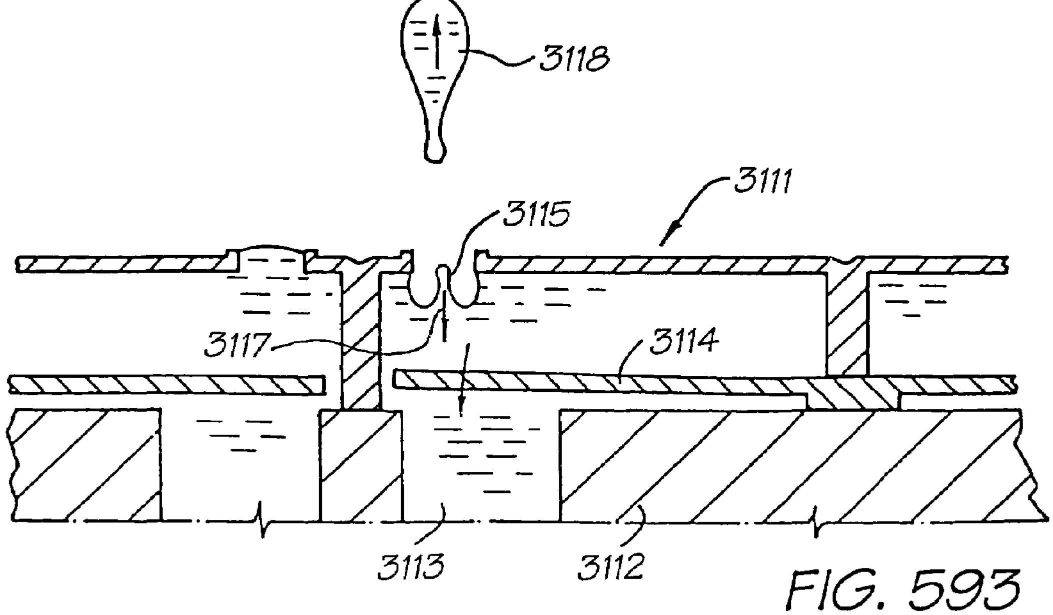
Figure 594:
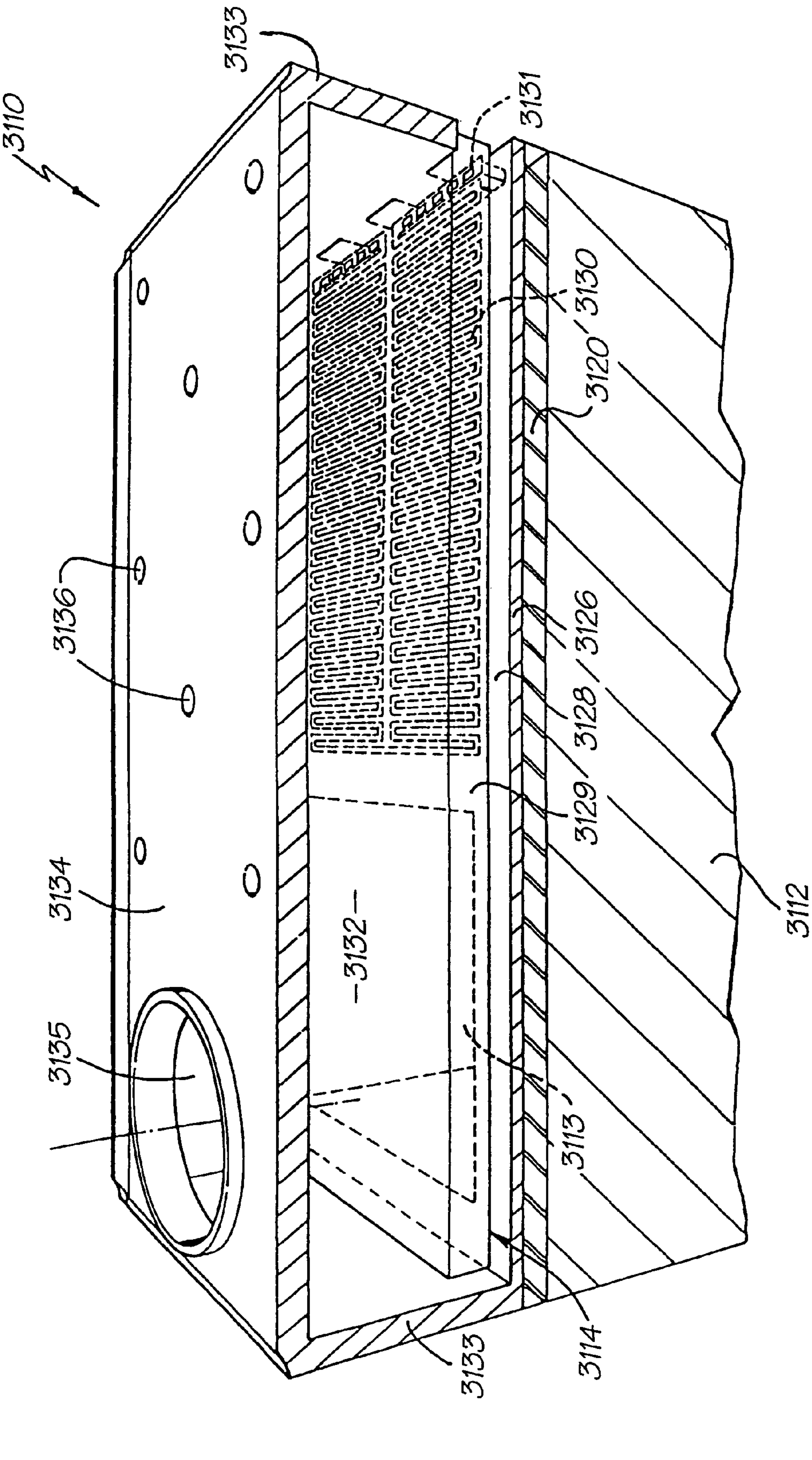
Figure 595:
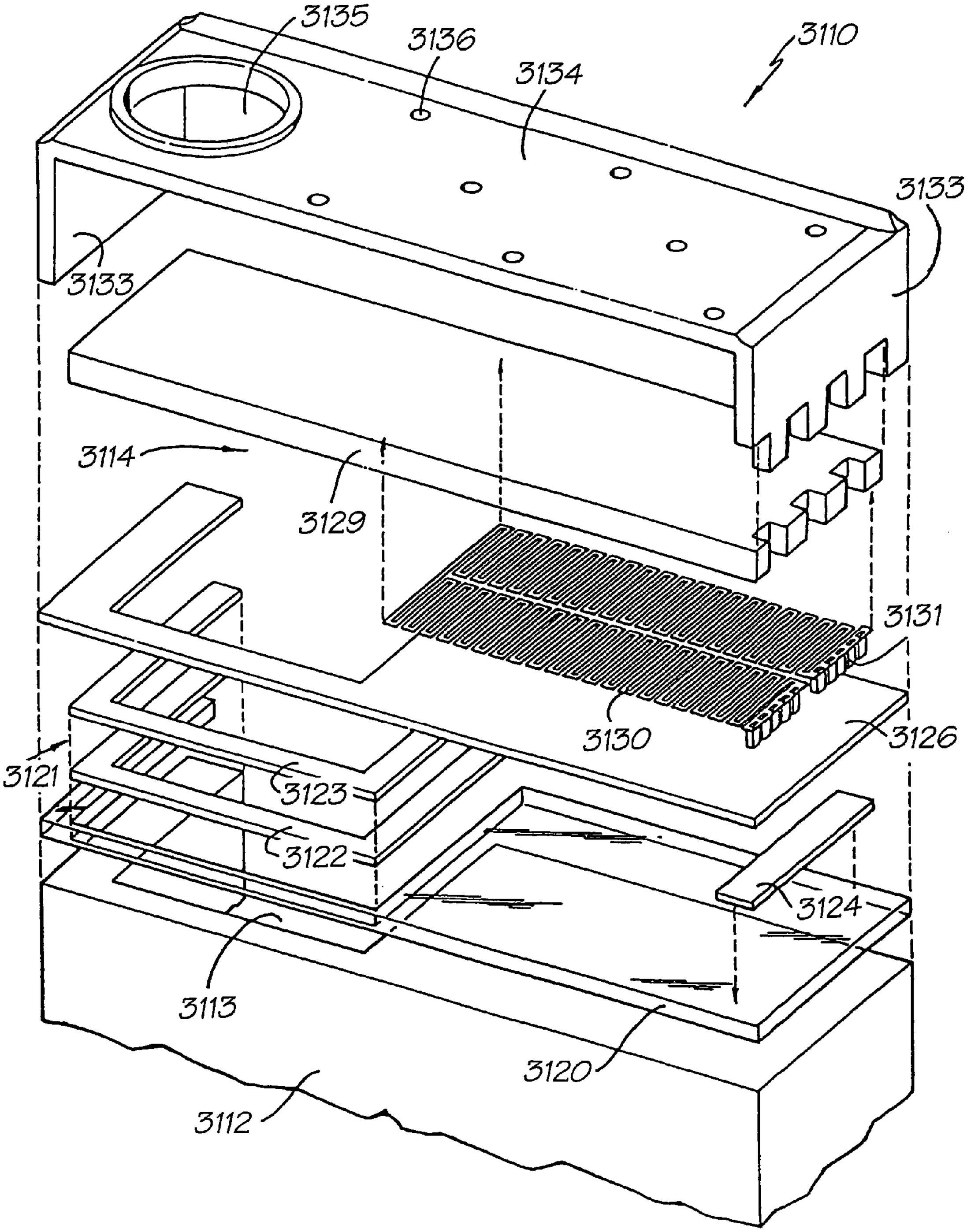
Figure 606:
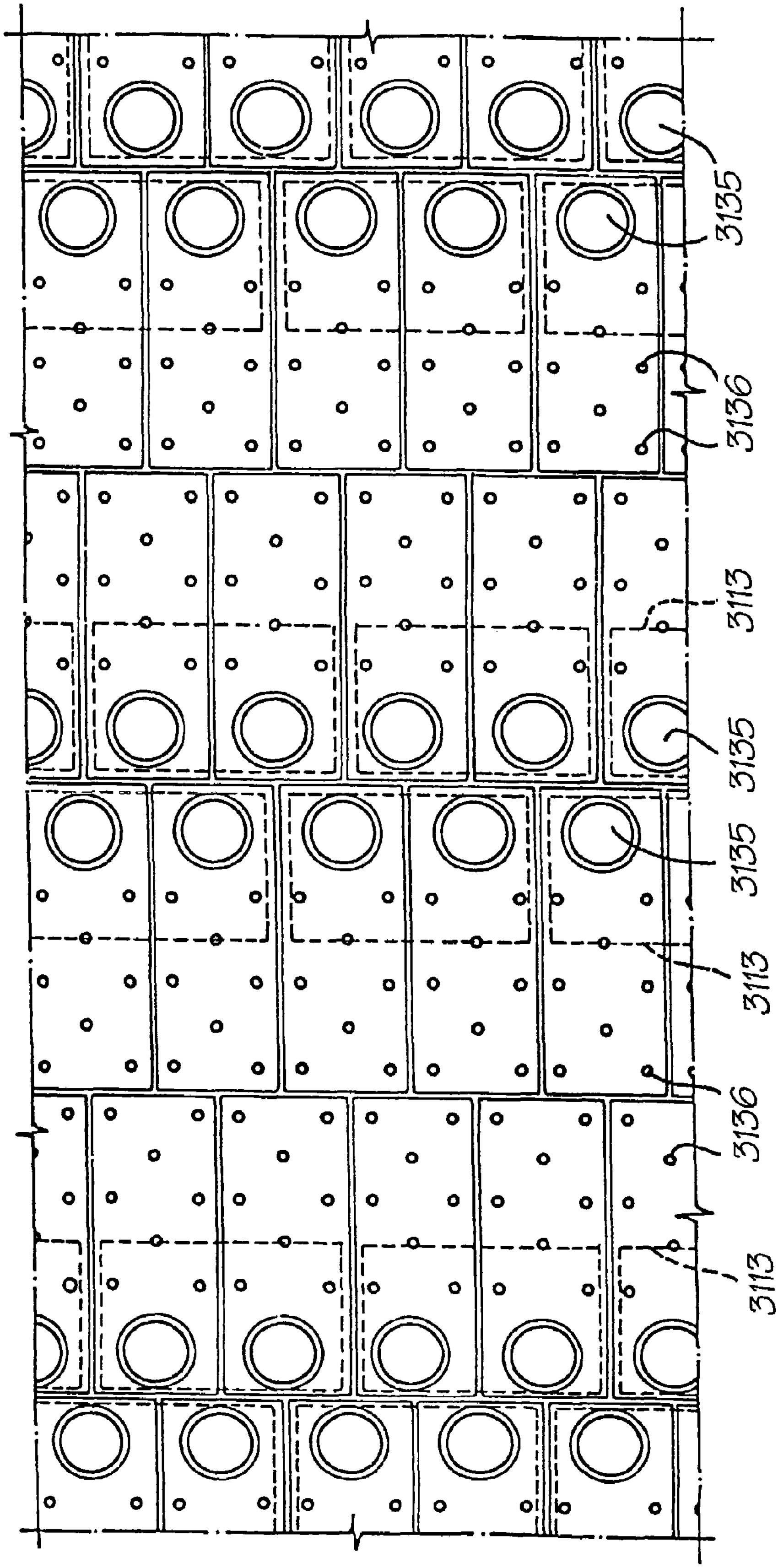
Figure 607:
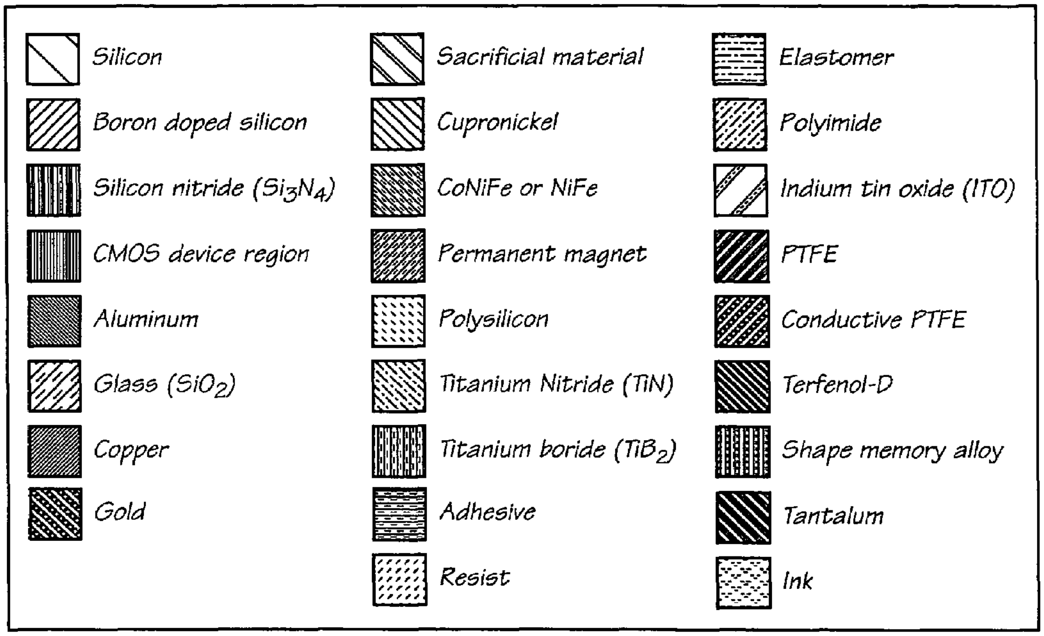
Figure 620:
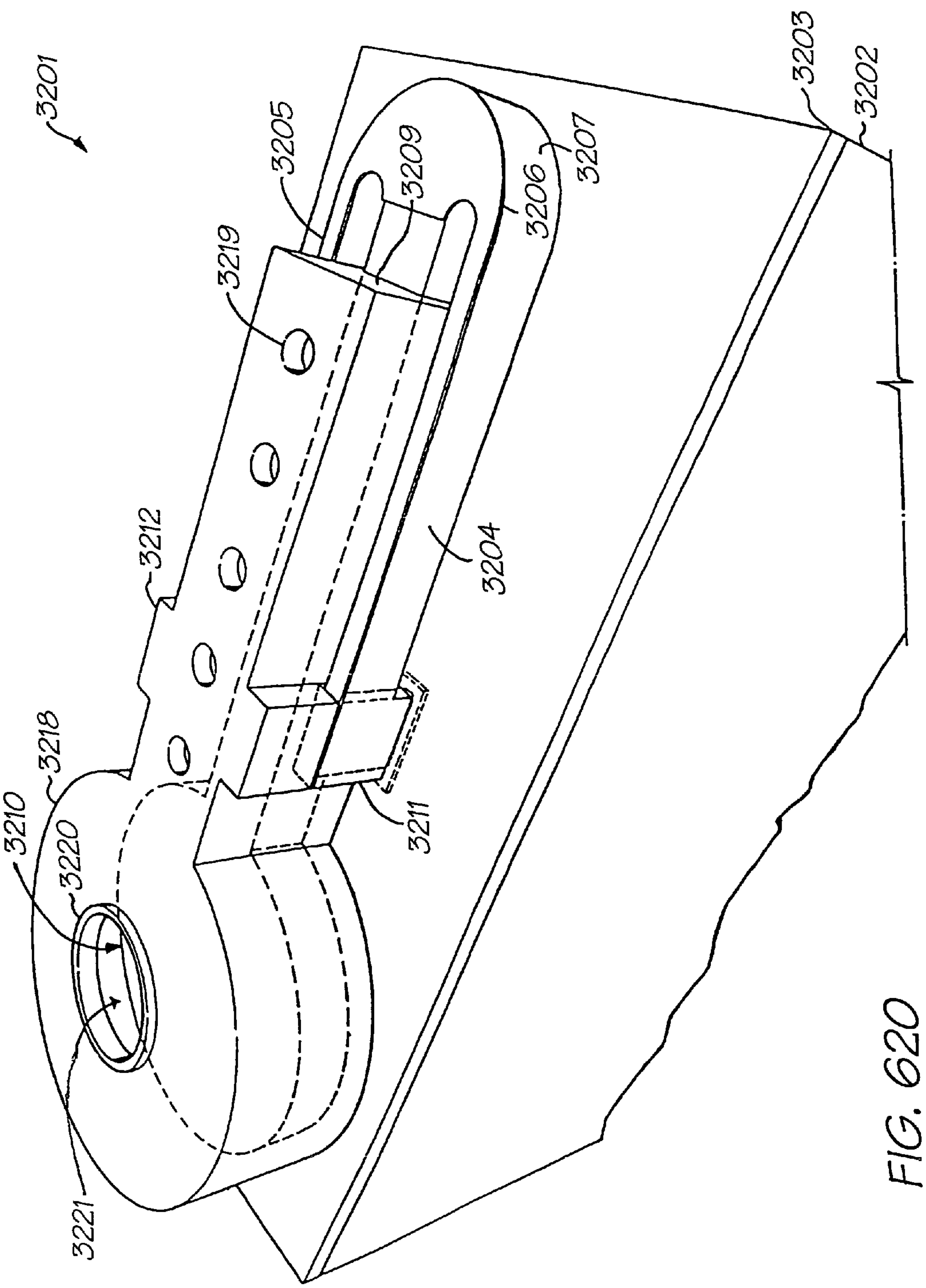
Figure 621:
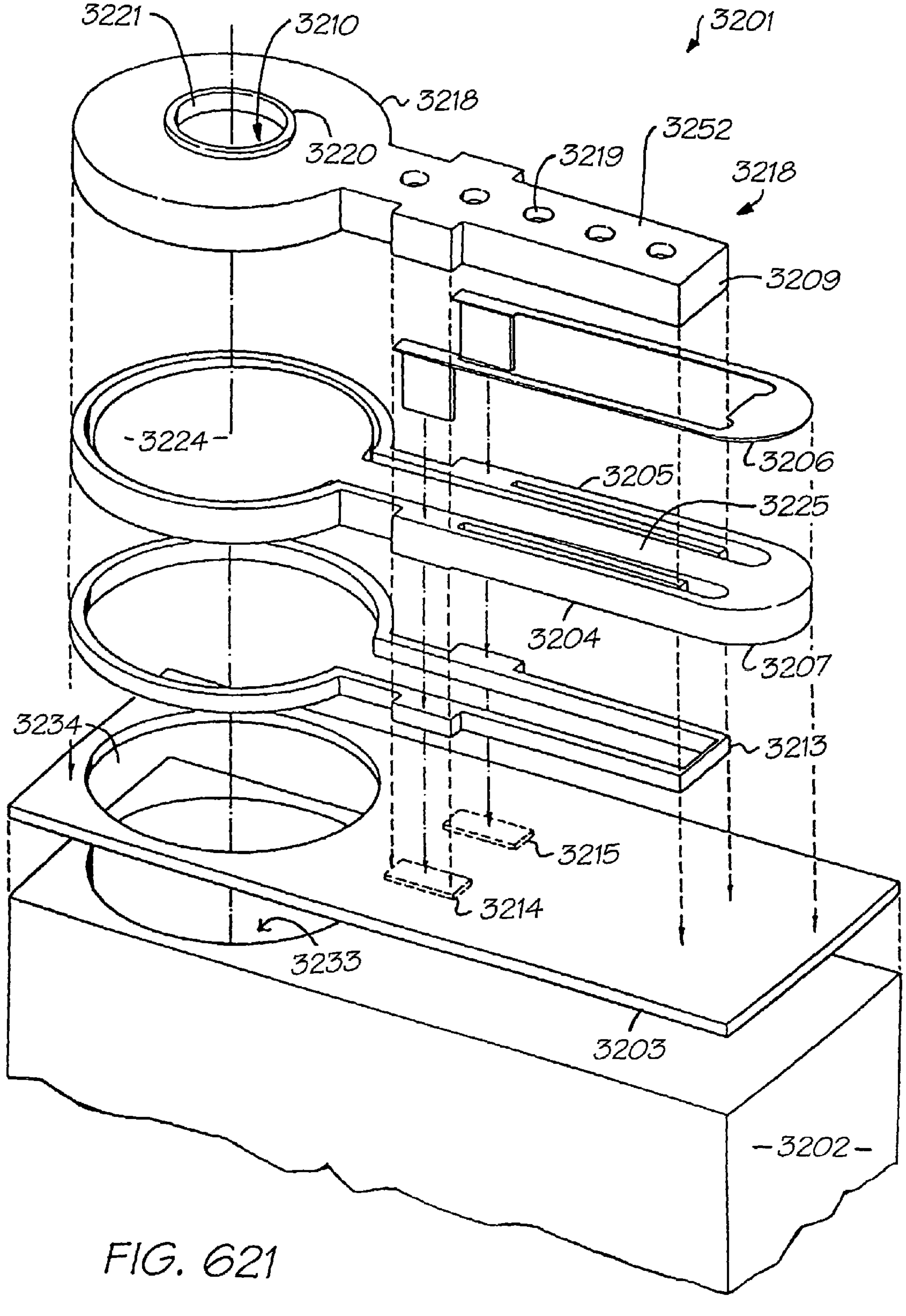
Figure 622:
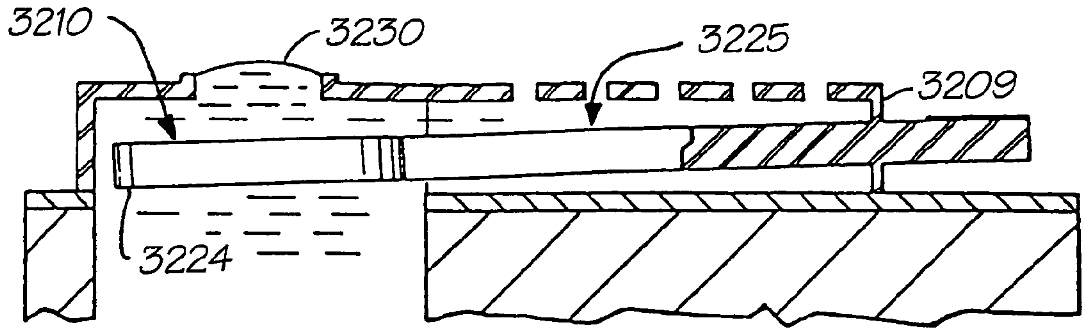
Figure 623:
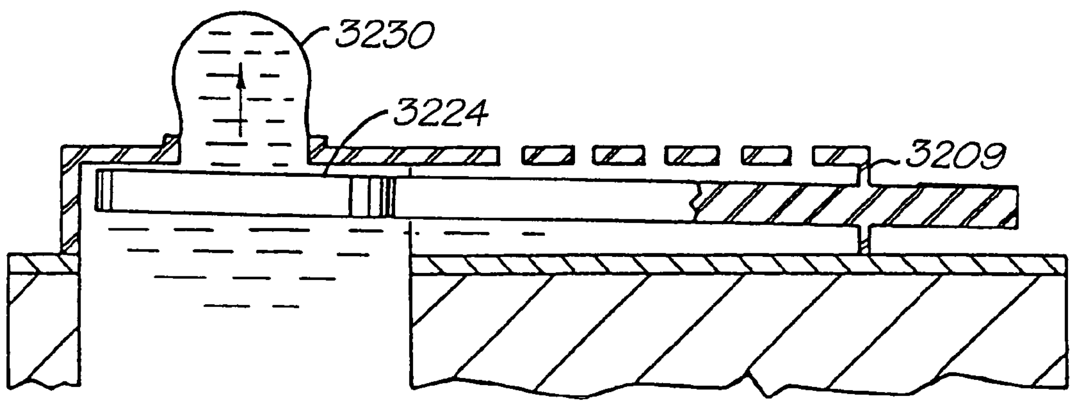
Figure 624:
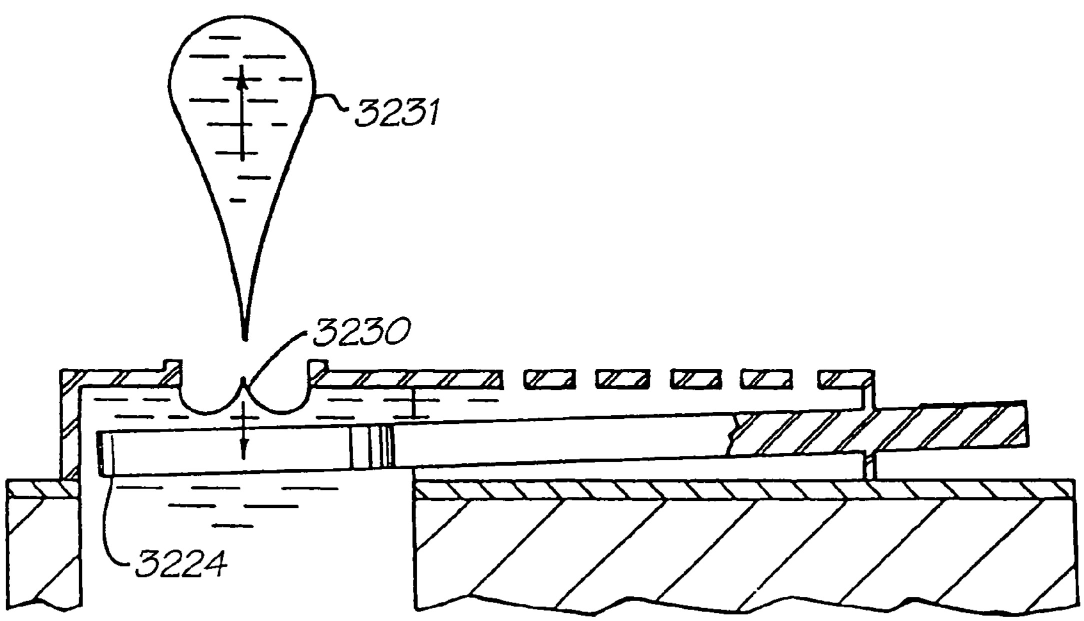

FIG. 418 provides a legend of the materials indicated in FIGS. 419 to 430;

FIG. 419 to FIG. 430 illustrate sectional views of the manufacturing steps in one form of construction of the nozzle arrangement;

FIG. 431 is a perspective view of the actuator portions of a single ink jet nozzle in a quiescent position, constructed in accordance with a preferred embodiment;

FIG. 432 is a perspective view of the actuator portions of a single ink jet nozzle in a quiescent position constructed in accordance with a preferred embodiment;

FIG. 433 is an exploded perspective view illustrating the construction of a single ink jet nozzle in accordance with a preferred embodiment;

FIG. 434 provides a legend of the materials indicated in FIGS. 435 to 446;

FIG. 435 to FIG. 446 illustrate sectional views of the manufacturing steps in one form of construction of an ink jet printhead nozzle;

FIG. 447 is a cross-sectional view of a single ink jet nozzle constructed in accordance with a preferred embodiment, in its quiescent state;

FIG. 448 is a cross-sectional view of a single ink jet nozzle constructed in accordance with a preferred embodiment, in its activated state;

FIG. 449 is an exploded perspective view illustrating the construction of a single ink jet nozzle in accordance with a preferred embodiment;

FIG. 450 is a cross-sectional schematic diagram illustrating the construction of a corrugated conductive layer in accordance with a preferred embodiment of the present invention;

FIG. 451 is a schematic cross-sectional diagram illustrating the development of a resist material through a half-toned mask utilized in the fabrication of a single ink jet nozzle in accordance with a preferred embodiment;

FIG. 452 is a top view of the conductive layer only of the thermal actuator of a single ink jet nozzle constructed in accordance with a preferred embodiment;

FIG. 453 provides a legend of the materials indicated in FIGS. 454 to 465;

FIG. 454 to FIG. 465 illustrate sectional views of the manufacturing steps in one form of construction of an ink jet printhead nozzle;

FIG. 466 is a cut out topside view illustrating two adjoining inject nozzles constructed in accordance with a preferred embodiment;

FIG. 467 is an exploded perspective view illustrating the construction of a single inject nozzle in accordance with a preferred embodiment;

FIG. 468 is a sectional view through the nozzles of FIG. 466;

FIG. 469 is a sectional view through the line IV-IV' of FIG. 468;

FIG. 470 provides a legend of the materials indicated in FIGS. 471 to 484;

FIG. 471 to FIG. 484 illustrate sectional views of the manufacturing steps in one form of construction of an ink jet printhead nozzle;

FIG. 485 is a perspective cross-sectional view of a single ink jet nozzle constructed in accordance with a preferred embodiment;

FIG. 486 is an exploded perspective view illustrating the construction of a single ink jet nozzle in accordance with a preferred embodiment;

FIG. 487 provides a legend of the materials indicated in FIGS. 488 to 499;

FIG. 488 to FIG. 499 illustrate sectional views of the manufacturing steps in one form of construction of an ink jet printhead nozzle;

FIG. 500 is an exploded perspective view of a single ink jet nozzle as constructed in accordance with a preferred embodiment;

FIG. 501 is a top cross sectional view of a single ink jet nozzle in its quiescent state taken along line A-A in FIG. 500;

FIG. 502 is a top cross sectional view of a single ink jet nozzle in its actuated state taken along line A-A in FIG. 500;

FIG. 503 provides a legend of the materials indicated in FIGS. 504 to 514;

FIG. 504 to FIG. 514 illustrate sectional views of the manufacturing steps in one form of construction of an ink jet printhead nozzle;

FIG. 515 is a perspective view partly in sections of a single ink jet nozzle constructed in accordance with a preferred embodiment;

FIG. 516 is an exploded perspective view partly in section illustrating the construction of a single ink nozzle in accordance with a preferred embodiment of the present invention;

FIG. 517 provides a legend of the materials indicated in FIGS. 518 to 530;

FIG. 518 to FIG. 530 illustrate sectional views of the manufacturing steps in one form of construction of an ink jet printhead nozzle;

FIG. 531 is an exploded perspective view illustrating the construction of a single ink jet nozzle arrangement in accordance with a preferred embodiment of the present invention;

FIG. 532 is a plan view taken from above of relevant portions of an ink jet nozzle arrangement in accordance with a preferred embodiment;

FIG. 533 is a cross-sectional view through a single nozzle arrangement, illustrating a drop being ejected out of the nozzle aperture;

FIG. 534 provides a legend of the materials indicated in FIGS. 345 to 547;

FIG. 535 to FIG. 547 illustrate sectional views of the manufacturing steps in one form of construction of an ink jet nozzle arrangement;

FIG. 548 is a schematic cross-sectional view of a single ink jet nozzle constructed in accordance with a preferred embodiment, in its quiescent state;

FIG. 549 is a cross-sectional schematic diagram of a single ink jet nozzle constructed in accordance with a preferred embodiment, illustrating the activated state;

FIG. 550 is a schematic cross-sectional diagram of a single ink jet nozzle illustrating the deactivation state;

FIG. 551 is a schematic cross-sectional diagram of a single ink jet nozzle constructed in accordance with a preferred embodiment, after returning into its quiescent state;

FIG. 552 is a schematic, cross-sectional perspective diagram of a single ink jet nozzle constructed in accordance with a preferred embodiment;

FIG. 553 is a perspective view of a group of ink jet nozzles;

FIG. 554 is an exploded perspective view illustrating the construction of a single ink jet nozzle in accordance with a preferred embodiment;

FIG. 555 provides a legend of the materials indicated in FIGS. 556 to 567;

FIG. 556 to FIG. 567 illustrate sectional views of the manufacturing steps in one form of construction of an ink jet printhead nozzle;

FIG. 568 is a schematic cross-sectional view of a single ink jet nozzle constructed in accordance with a preferred embodiment;

FIG. 569 is a schematic cross-sectional view of a single ink jet nozzle constructed in accordance with a preferred embodiment, with the thermal actuator in its activated state;

FIG. 570 is a schematic diagram of the conductive layer utilized in the thermal actuator of the ink jet nozzle constructed in accordance with a preferred embodiment FIG. 571 is a close-up perspective view of portion A of FIG. 570;

FIG. 572 is a cross-sectional schematic diagram illustrating the construction of a corrugated conductive layer in accordance with a preferred embodiment of the present invention;

FIG. 573 is a schematic cross-sectional diagram illustrating the development of a resist material through a half-toned mask utilized in the fabrication of a single ink jet nozzle in accordance with a preferred embodiment;

FIG. 574 is an exploded perspective view illustrating the construction of a single ink jet nozzle in accordance with a preferred embodiment;

FIG. 575 is a perspective view of a section of an ink jet printhead configuration utilizing ink jet nozzles constructed in accordance with a preferred embodiment FIG. 576 provides a legend of the materials indicated in FIGS. 577 to 590;

FIG. 577 to FIG. 590 illustrate sectional views of the manufacturing steps in one form of construction of an ink jet printhead nozzle;

FIGS. 591-593 illustrate basic operation of a preferred embodiments of nozzle arrangements of the invention;

FIG. 594 is a sectional view of a preferred embodiment of a nozzle arrangement of the invention;

FIG. 595 is an exploded perspective view of a preferred embodiment;

FIGS. 596-605 are cross-sectional views illustrating various steps in the construction of a preferred embodiment of the nozzle arrangement;

FIG. 606 illustrates a top view of an array of ink jet nozzle arrangements constructed in accordance with the principles of the present invention;

FIG. 607 provides a legend of the materials indicated in FIGS. 608 to 619;

FIG. 608 to FIG. 619 illustrate sectional views of the manufacturing steps in one form of construction of an ink jet printhead having nozzle arrangements of the invention;

FIG. 620 illustrates a nozzle arrangement in accordance with the invention;

FIG. 621 is an exploded perspective view of the nozzle arrangement of FIG. 1;

FIGS. 622 to 624 illustrate the operation of the nozzle arrangement

Figure 625:
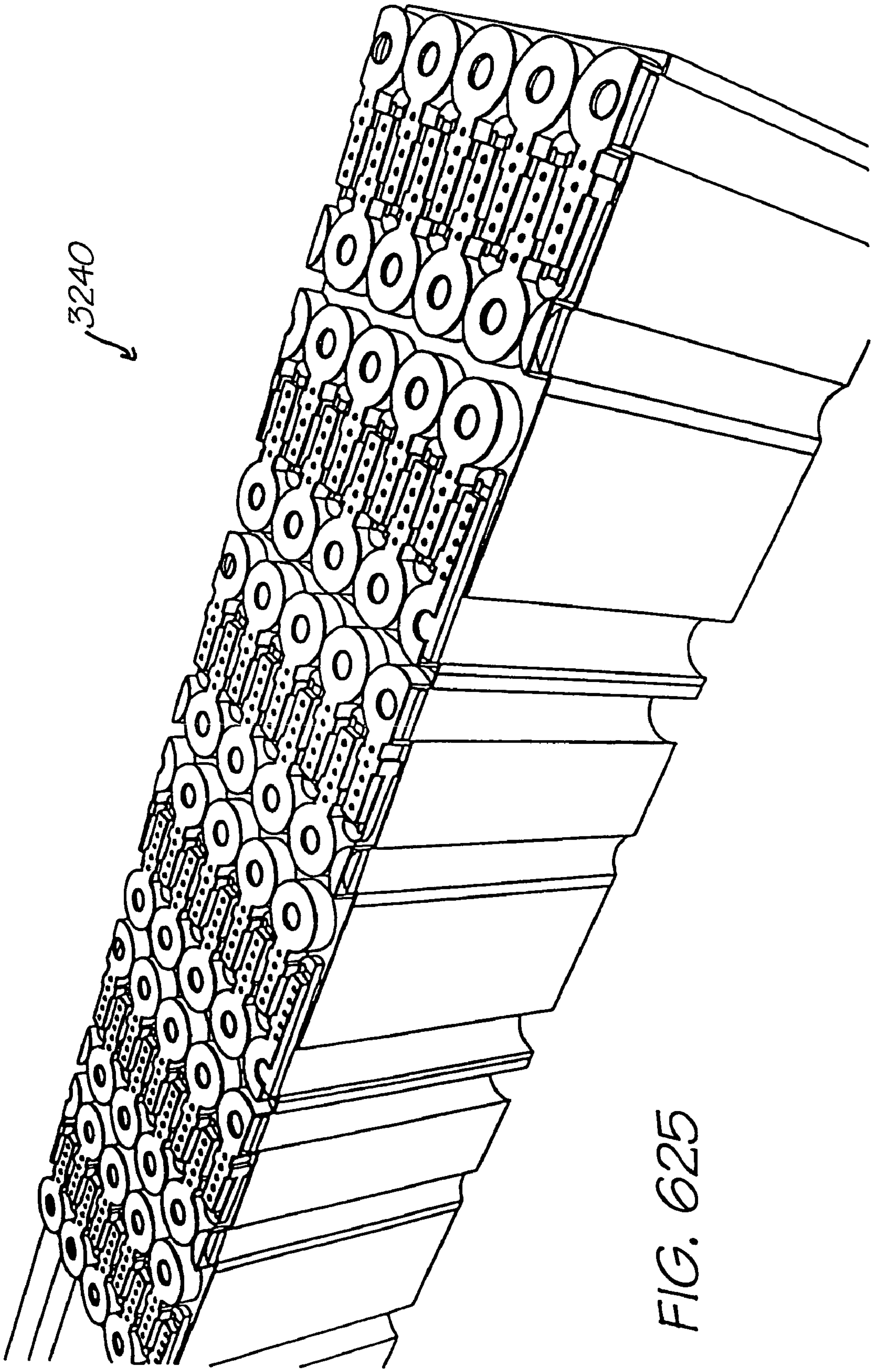

FIG. 625 illustrates an array of nozzle arrangements for use with an inkjet printhead.

Figure 626:
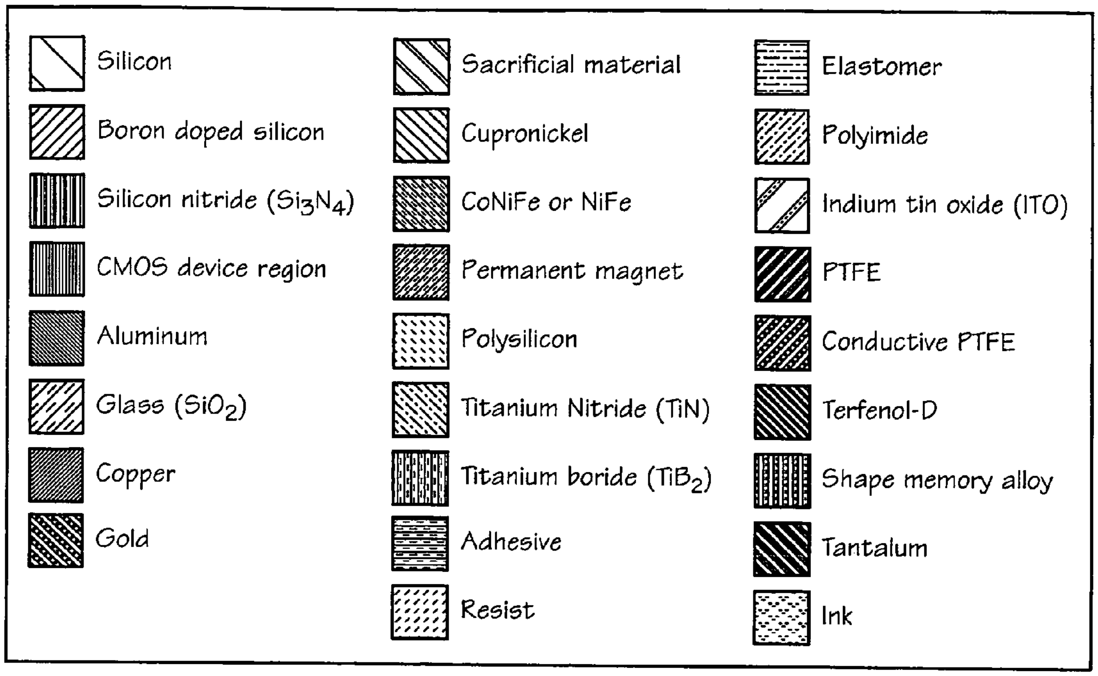
Figure 639:
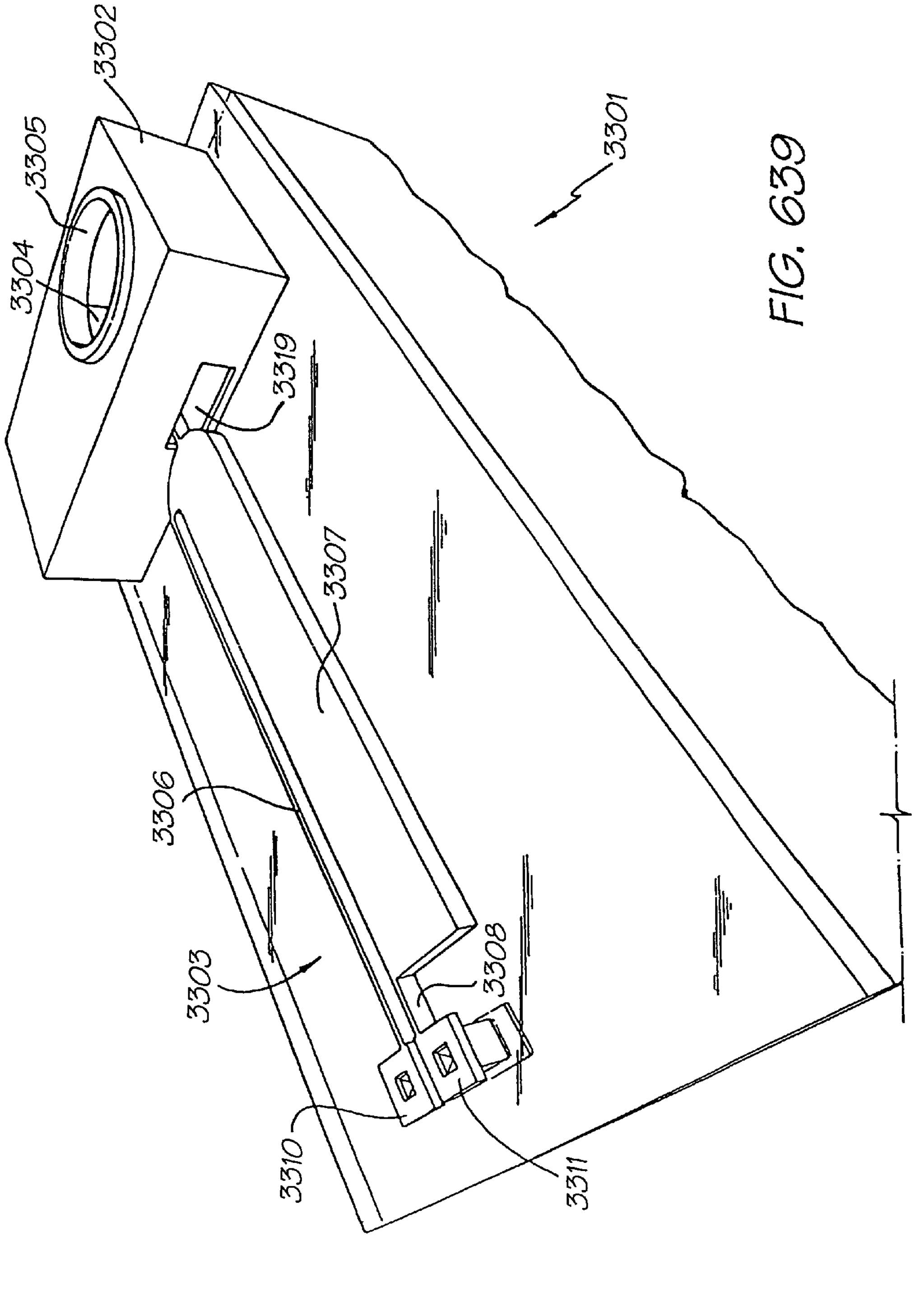
Figure 640:
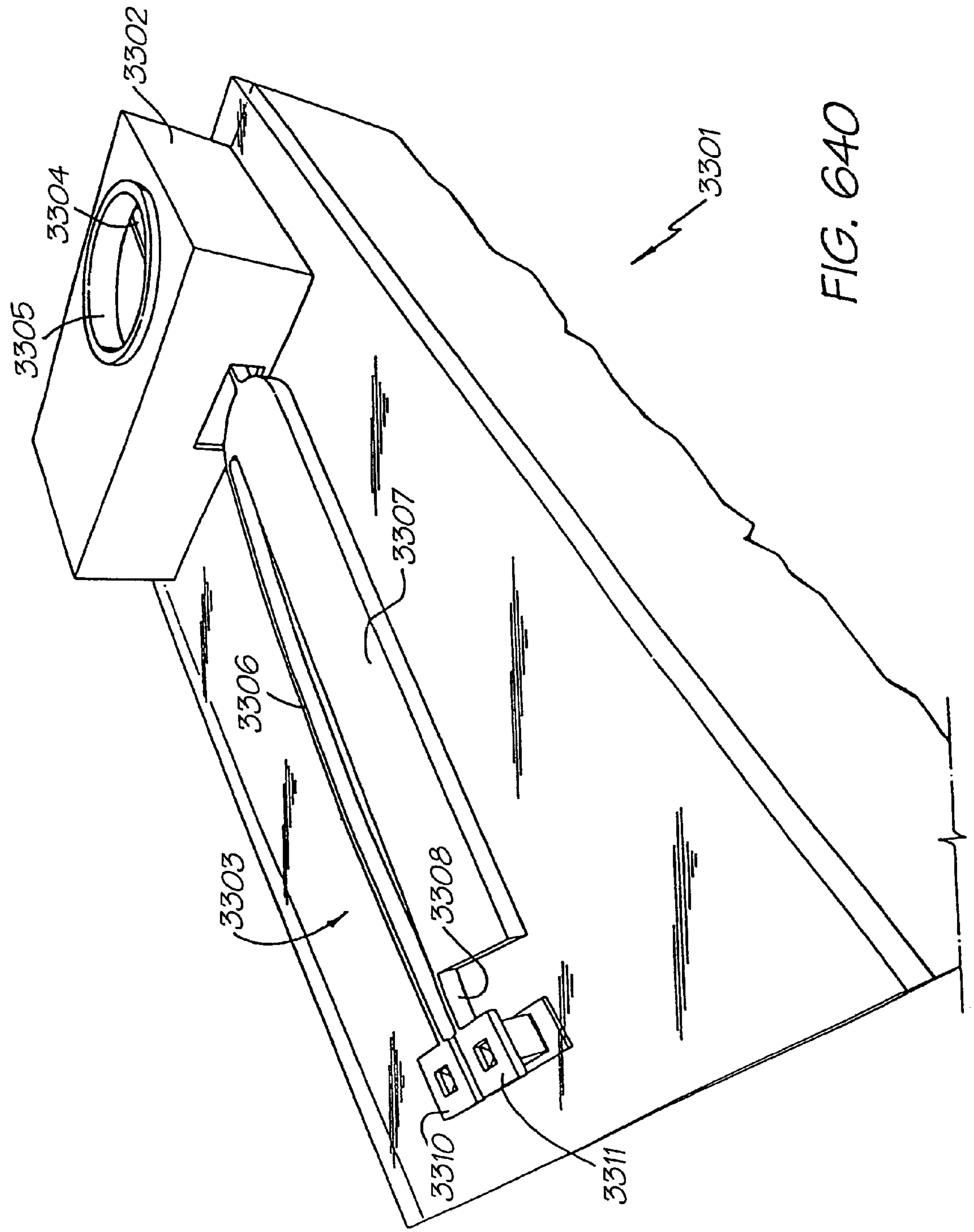
Figure 641:
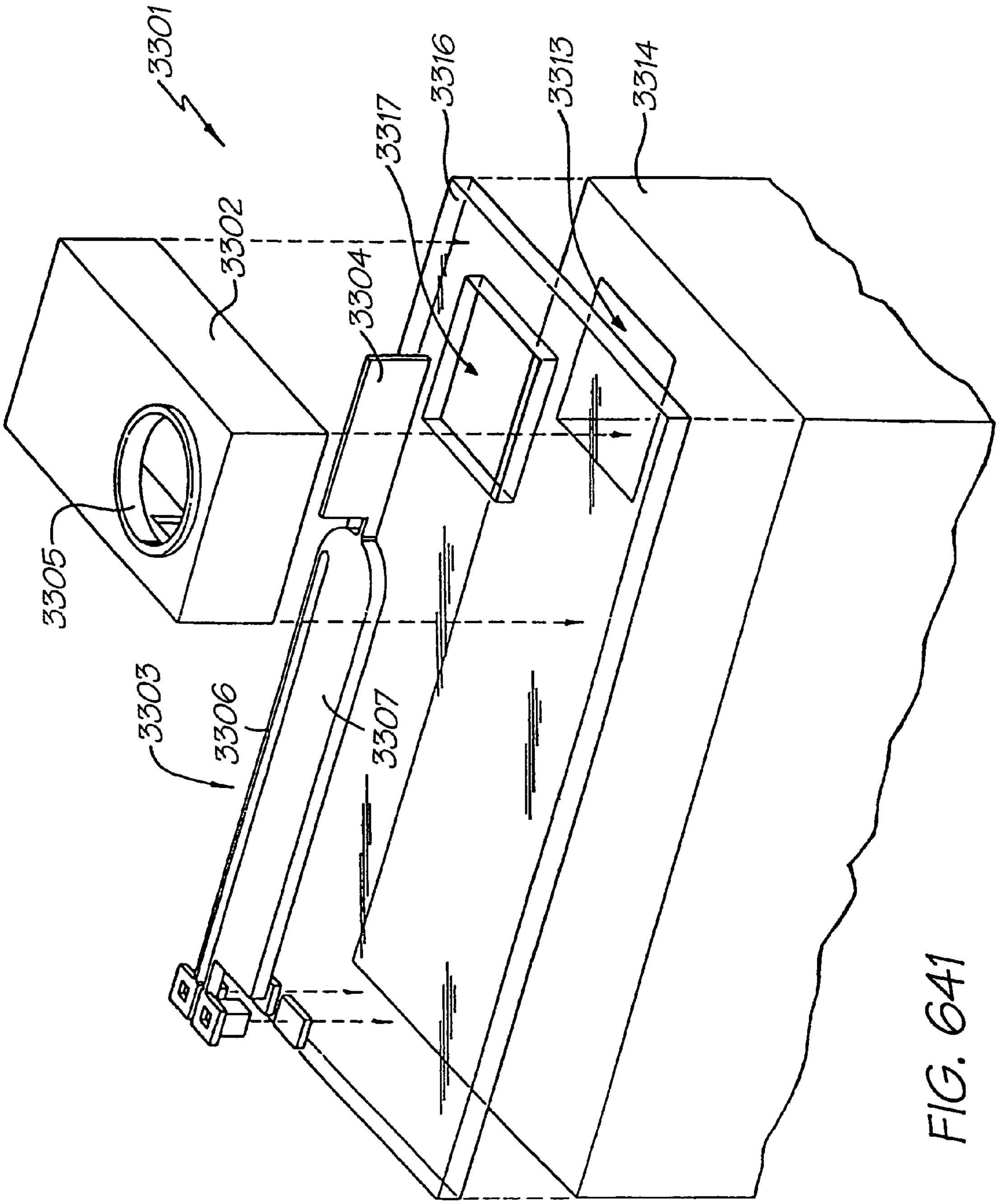
Figure 642:
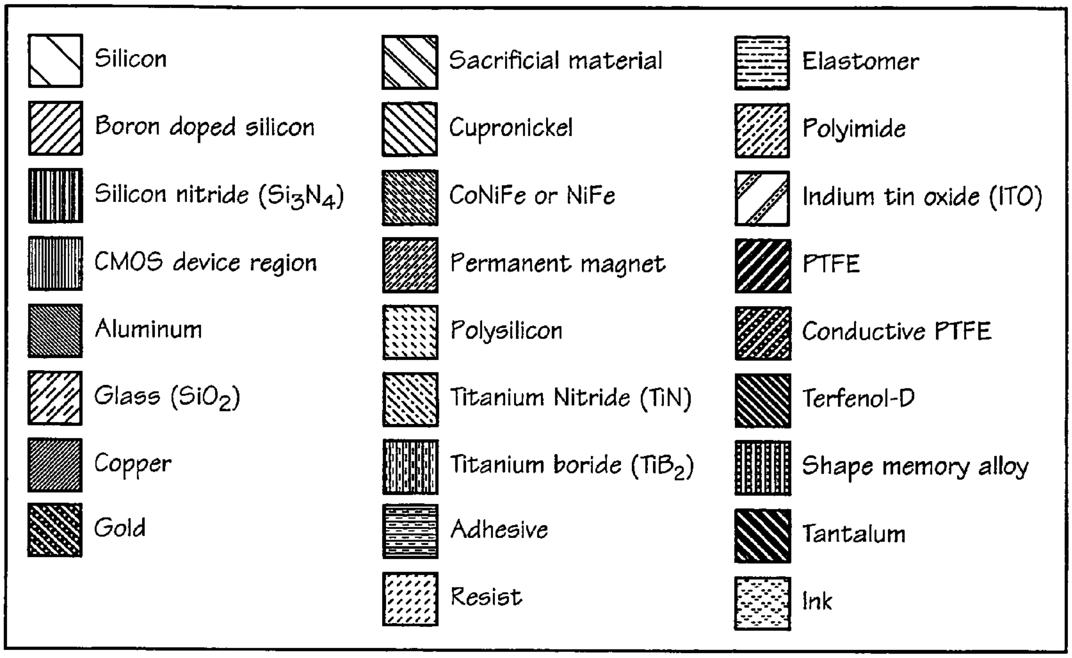
Figure 655:
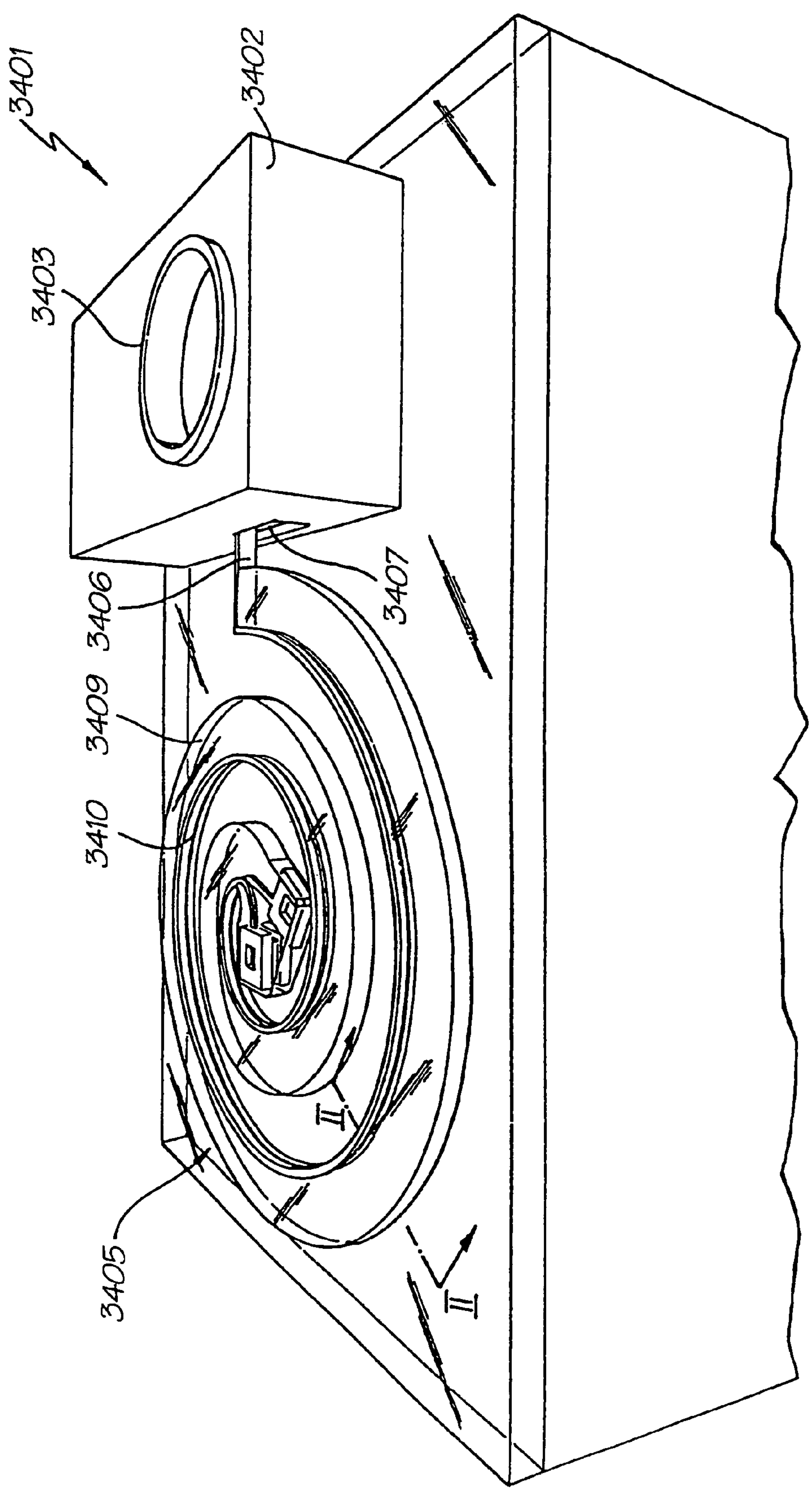
Figure 656:
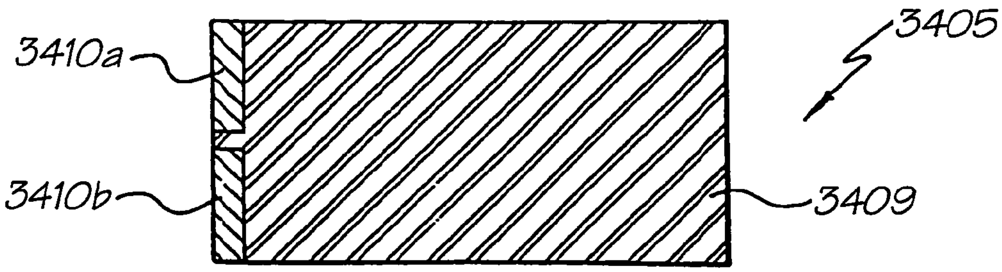
Figure 657:
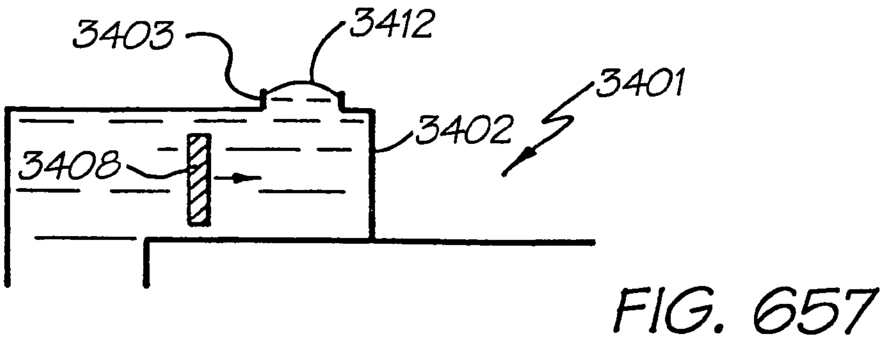
Figure 658:
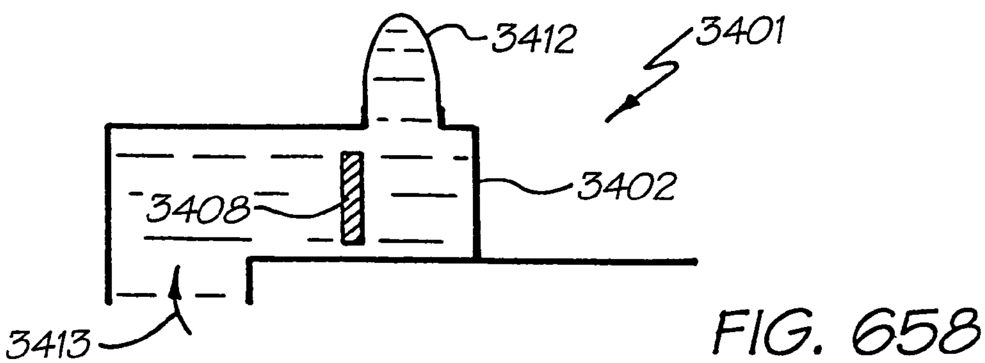
Figure 659:
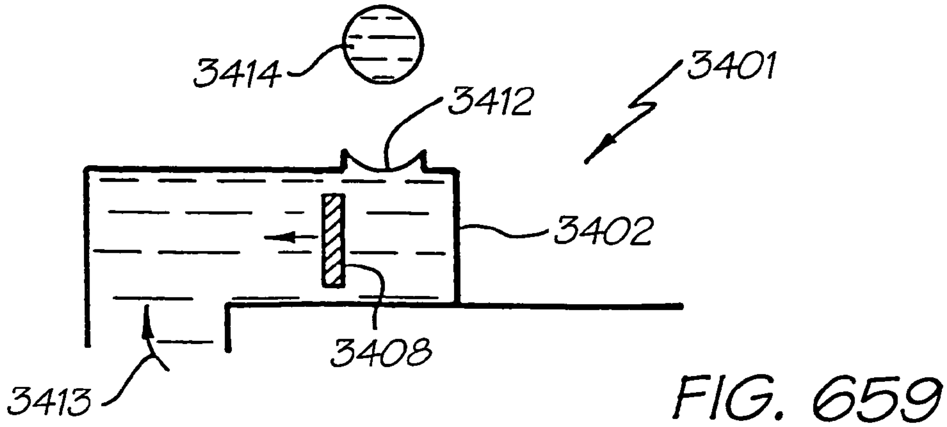
Figure 660:
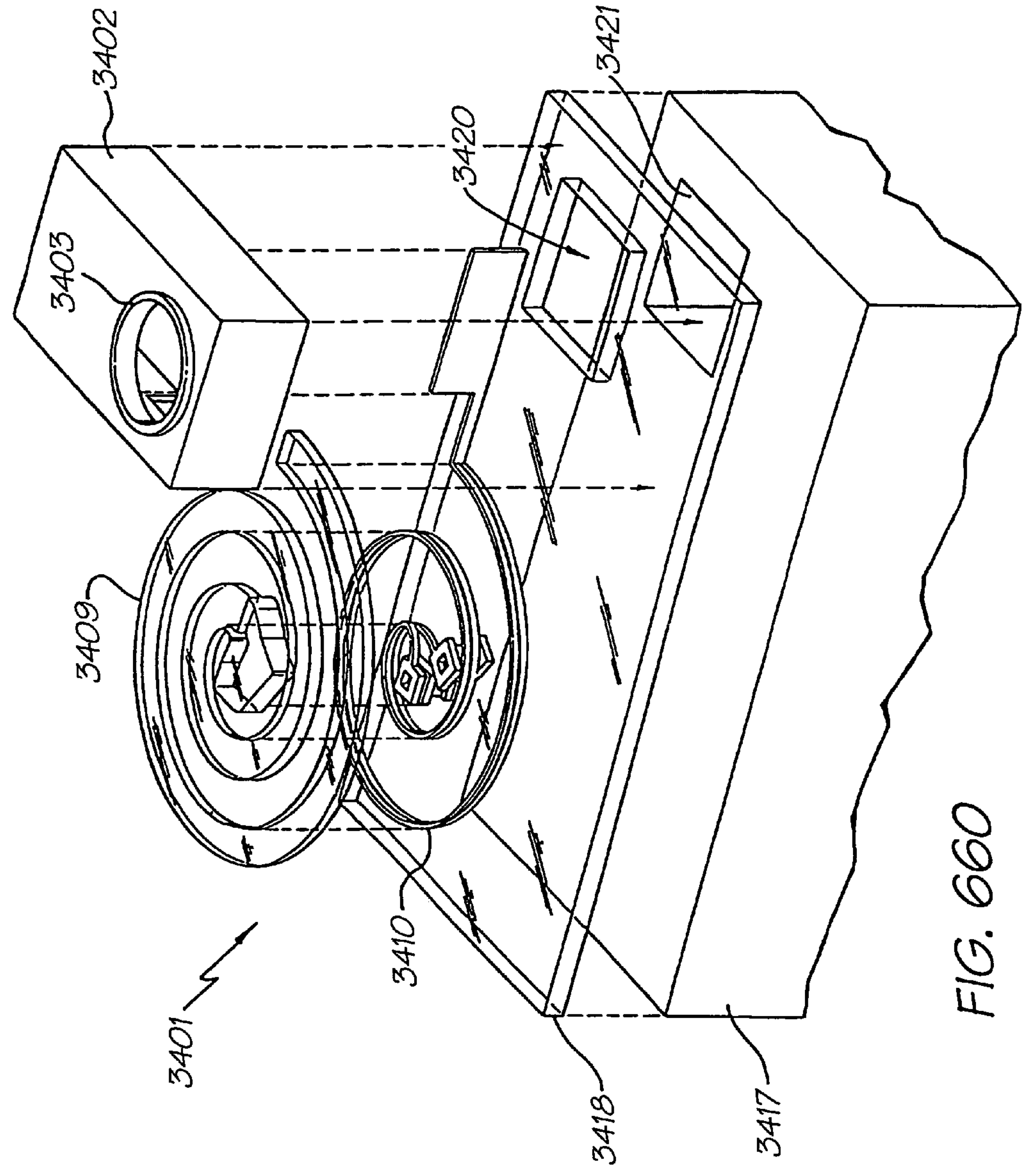

FIG. 626 provides a legend of the materials indicated in FIGS. 627 to 638;

FIG. 627 to FIG. 638 illustrate sectional views of the manufacturing steps in one form of construction of an ink jet printhead nozzle;

FIG. 639 illustrates a perspective view of an ink jet nozzle arrangement in accordance with a preferred embodiment;

FIG. 640 illustrates the arrangement of FIG. 639 when the actuator is in an activated position;

FIG. 641 illustrates an exploded perspective view of the major components of a preferred embodiment;

FIG. 642 provides a legend of the materials indicated in FIGS. 643 to 654;

FIG. 643 to FIG. 654 illustrate sectional views of the manufacturing steps in one form of construction of an ink jet printhead nozzle;

FIG. 655 illustrates a single ink ejection mechanism as constructed in accordance with the principles of a preferred embodiment;

FIG. 656 is a section through the line II-II of the actuator arm of FIG. 655;

FIGS. 657-659 illustrate the basic operation of the ink ejection mechanism of a preferred embodiment;

FIG. 660 is an exploded perspective view of an ink ejection mechanism.

Figure 661:
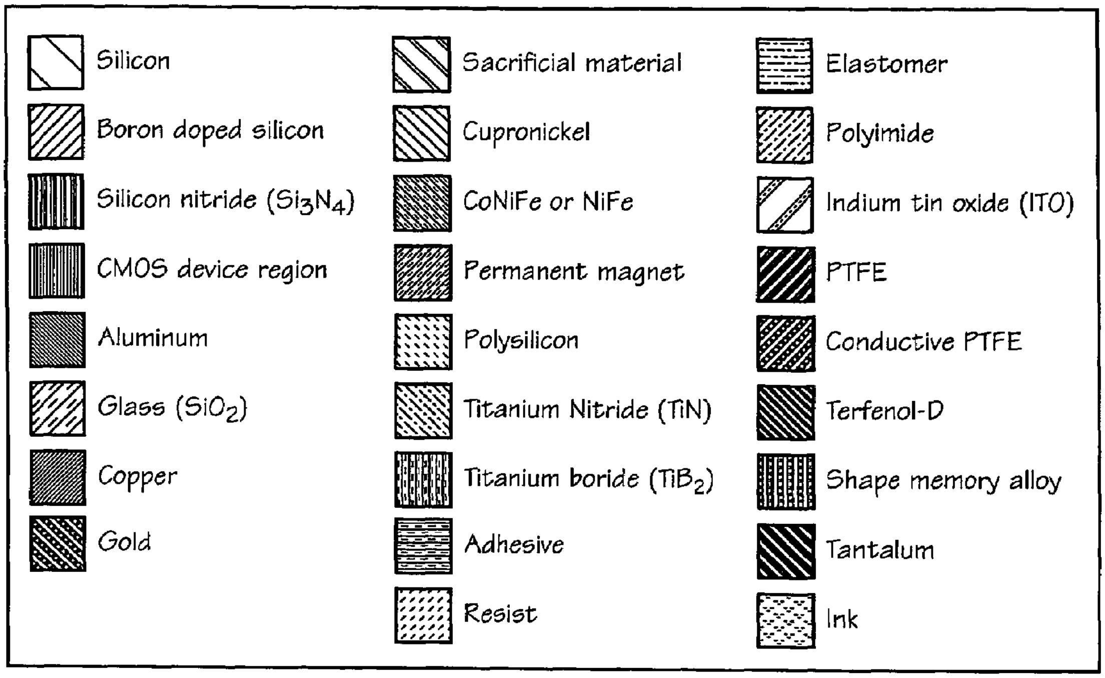
Figure 677:
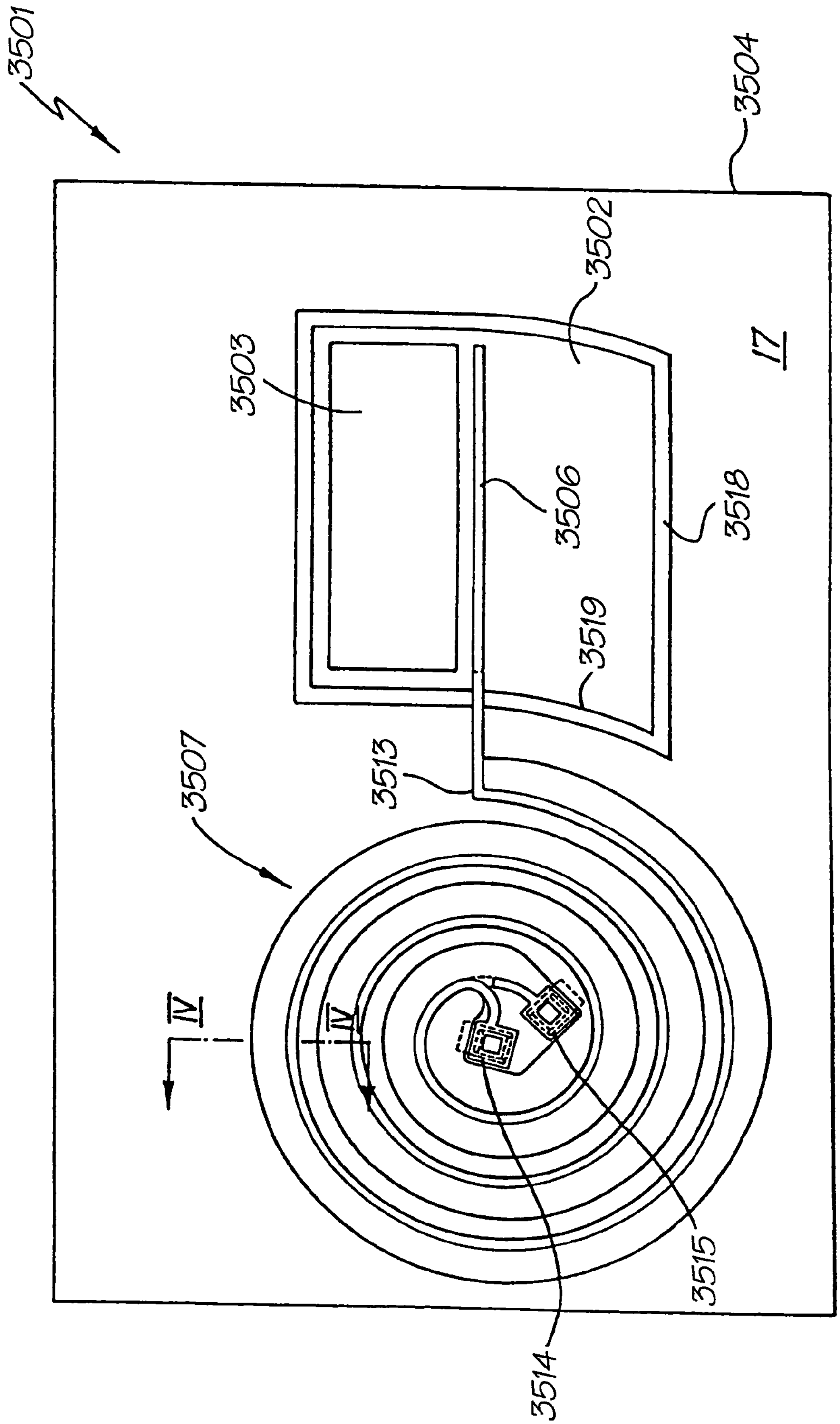
Figure 678:
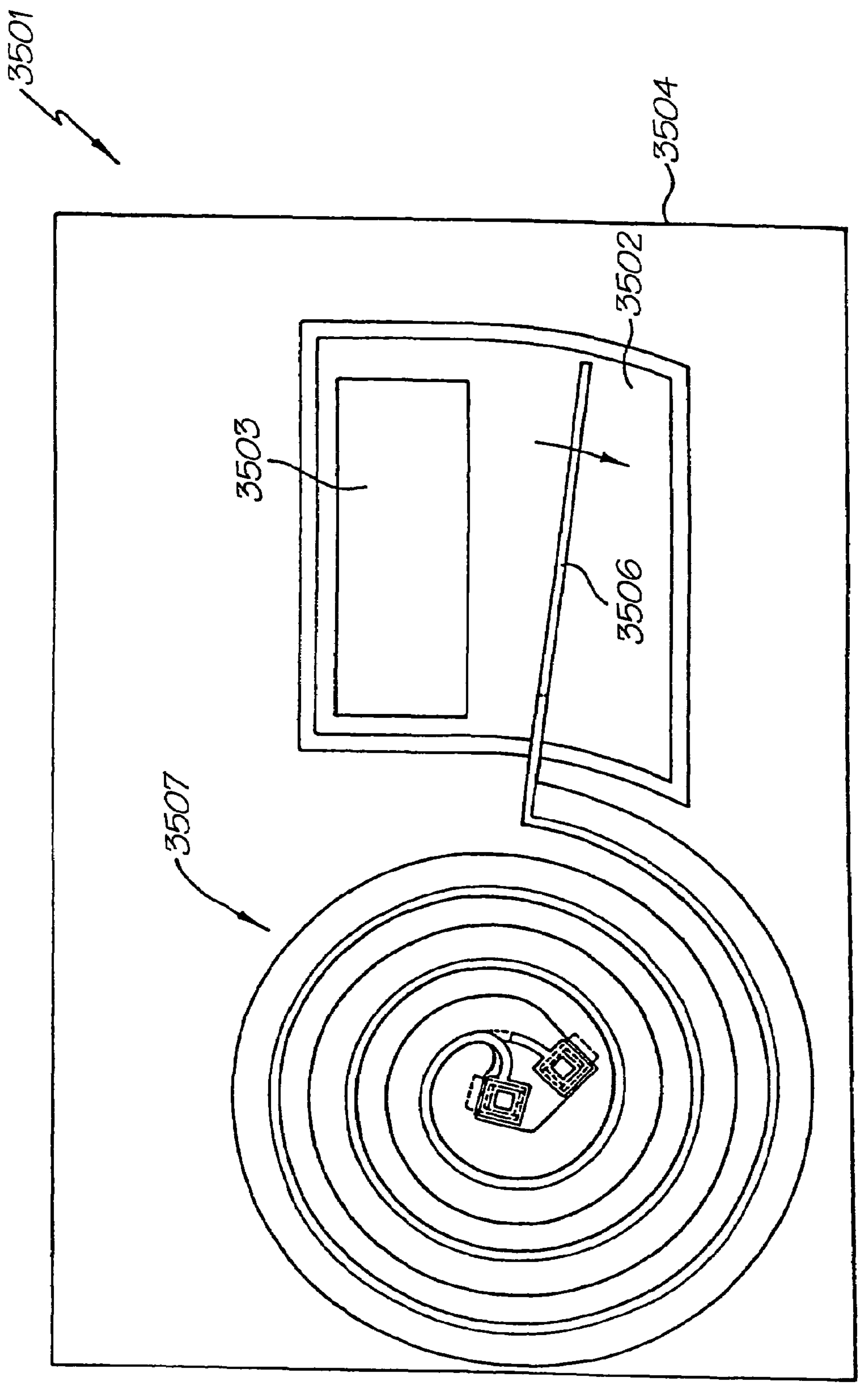
Figure 679:
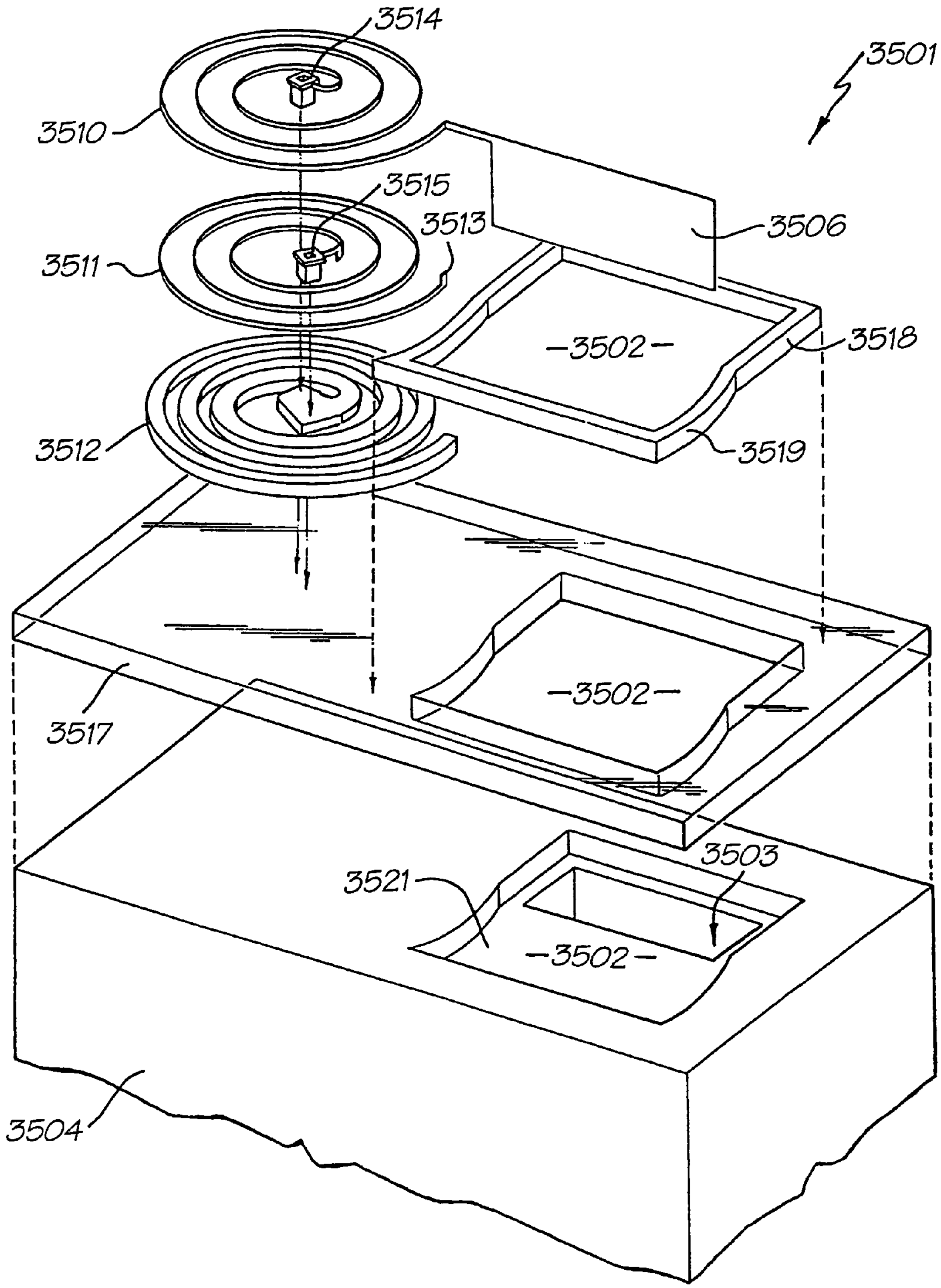
Figure 680:
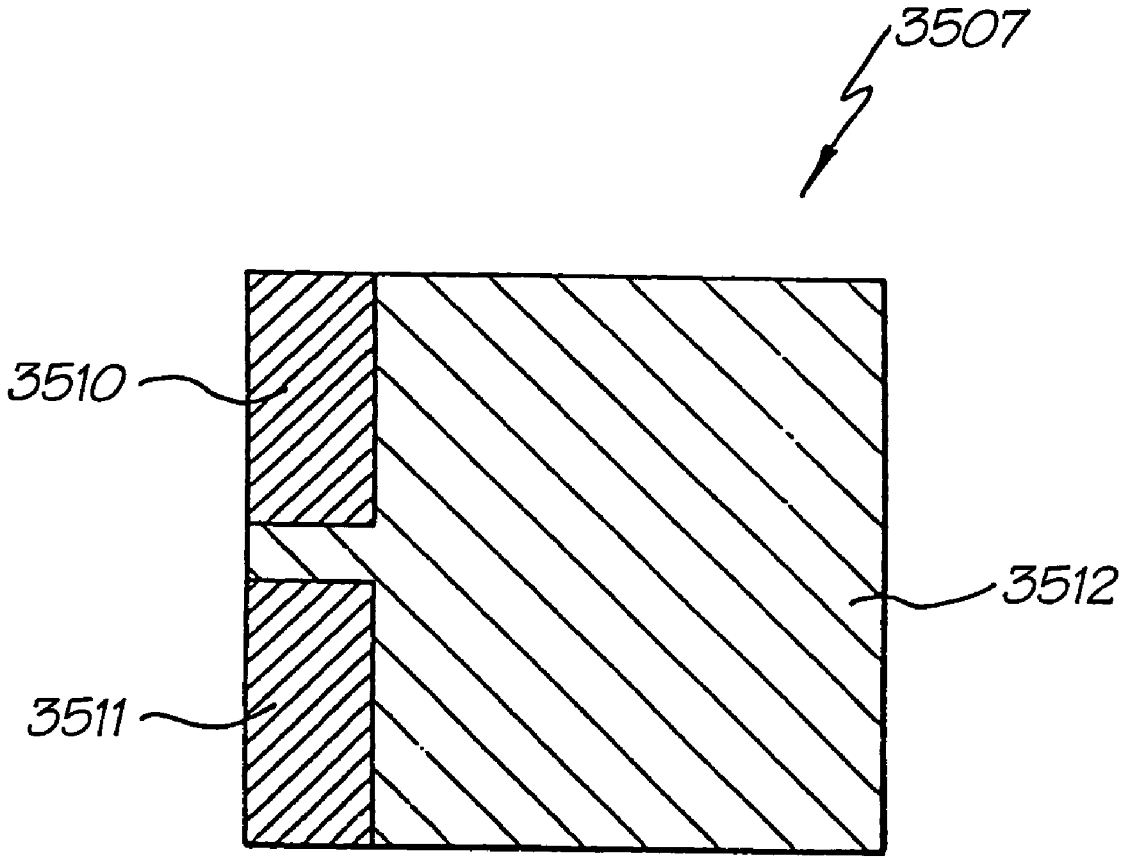
Figure 681:
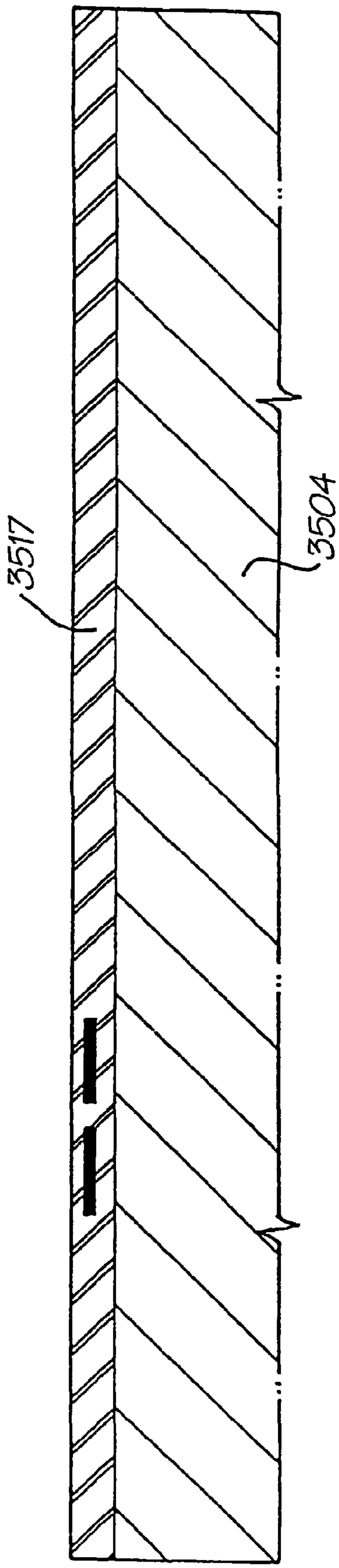
Figure 701:
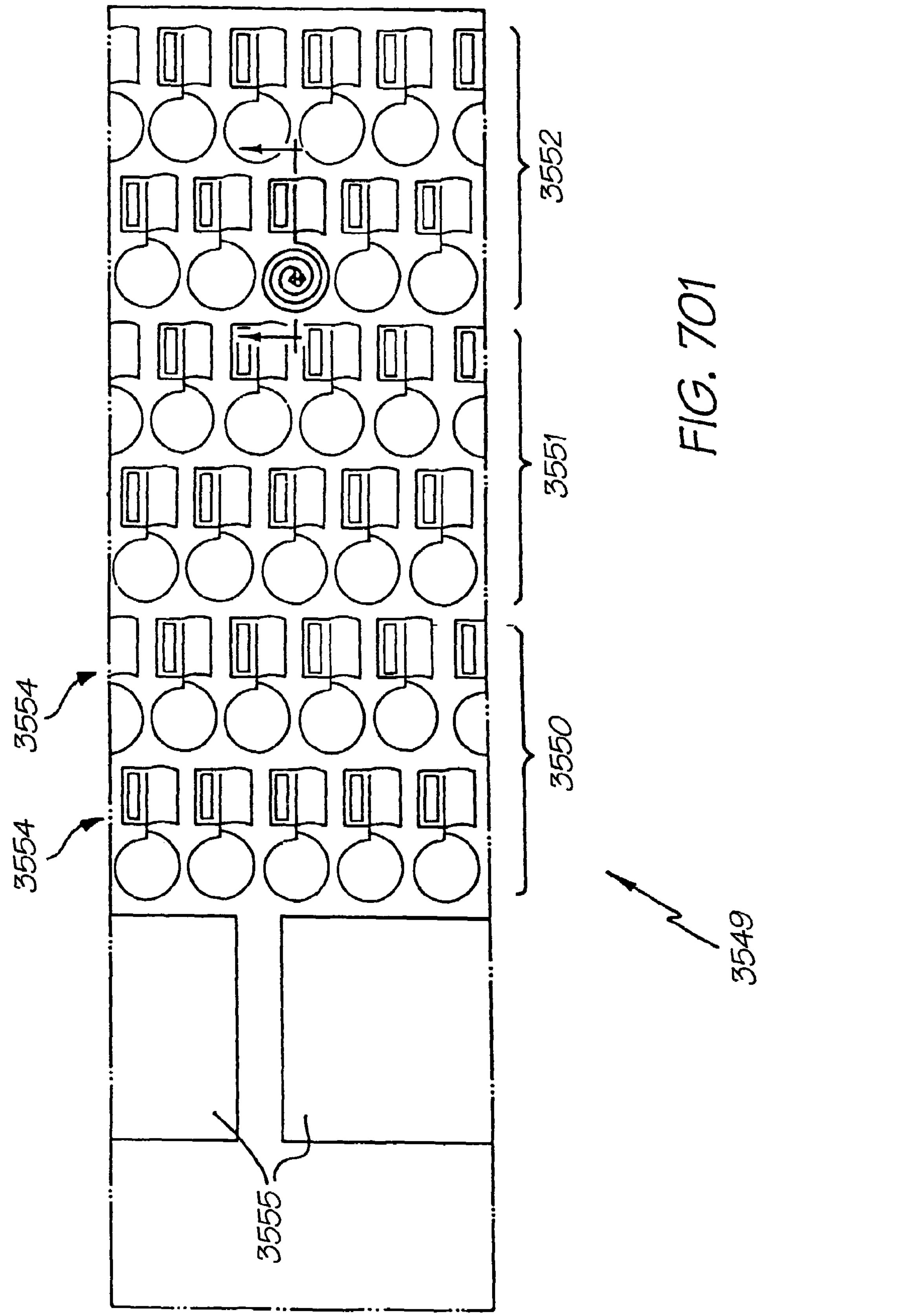

FIG. 661 provides a legend of the materials indicated in FIGS. 662 to 676;

FIG. 662 to FIG. 676 illustrate sectional views of the manufacturing steps in one form of construction of an ink jet printhead nozzle;

FIG. 677 is a descriptive view of an ink ejection arrangement when in a quiescent state;

FIG. 678 is a descriptive view of an ejection arrangement when in an activated state;

FIG. 679 is an exploded perspective view of the different components of an ink ejection arrangement;

FIG. 680 illustrates a cross section through the line IV-IV of FIG. 677;

FIGS. 681 to 700 illustrate the various manufacturing steps in the construction of a preferred embodiment;

FIG. 701 illustrates a portion of an array of ink ejection arrangements as constructed in accordance with a preferred embodiment.

Figure 720:
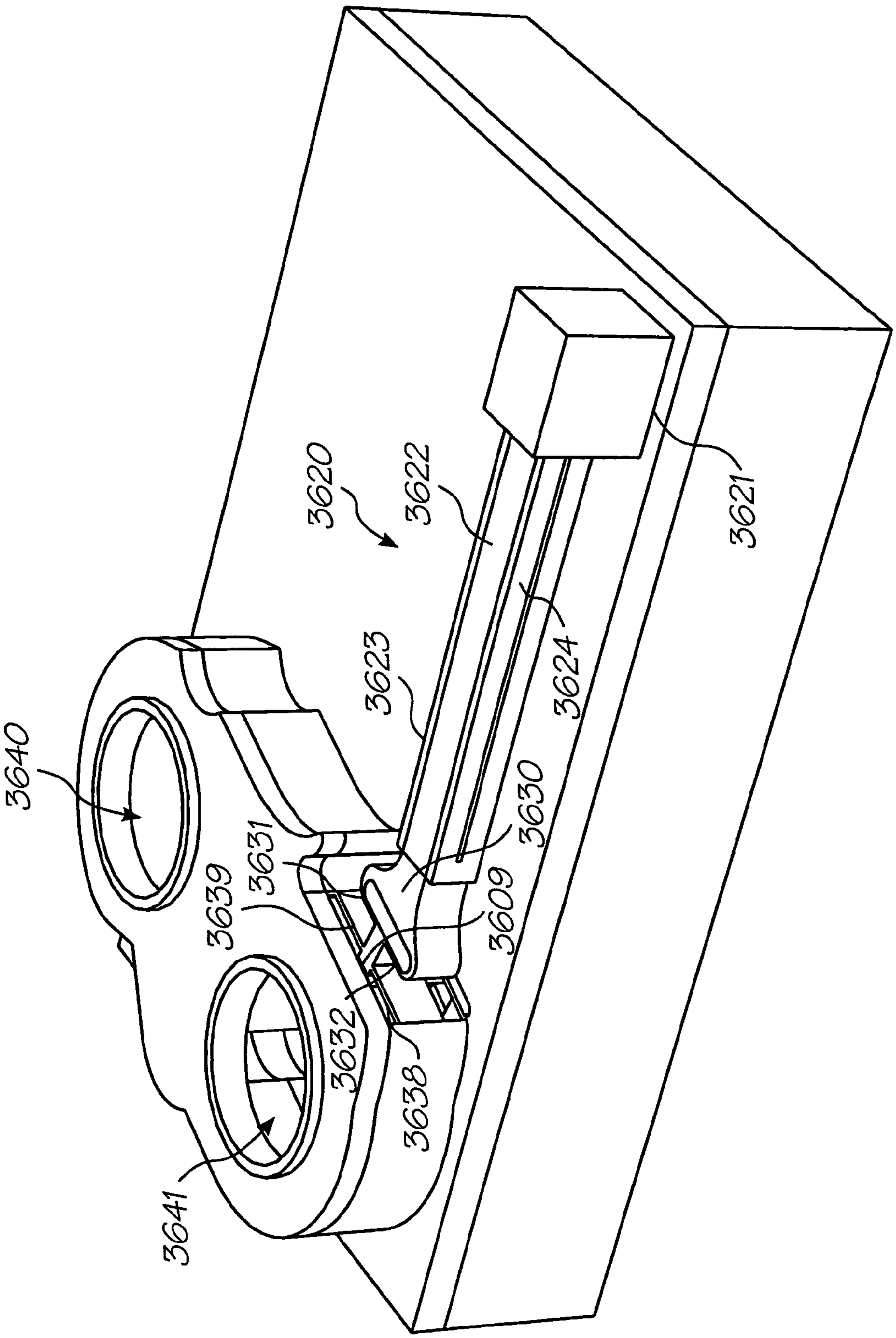

FIG. 702 provides a legend of the materials indicated in FIGS. 27 to 38;

FIGS. 703 to 714 illustrate sectional views of manufacturing steps of one form of construction of the ink ejection arrangement;

FIGS. 715-719 comprise schematic illustrations of the operation of a preferred embodiment;

FIG. 720 illustrates a side perspective view, of a single nozzle arrangement of a preferred embodiment.

Figure 721:
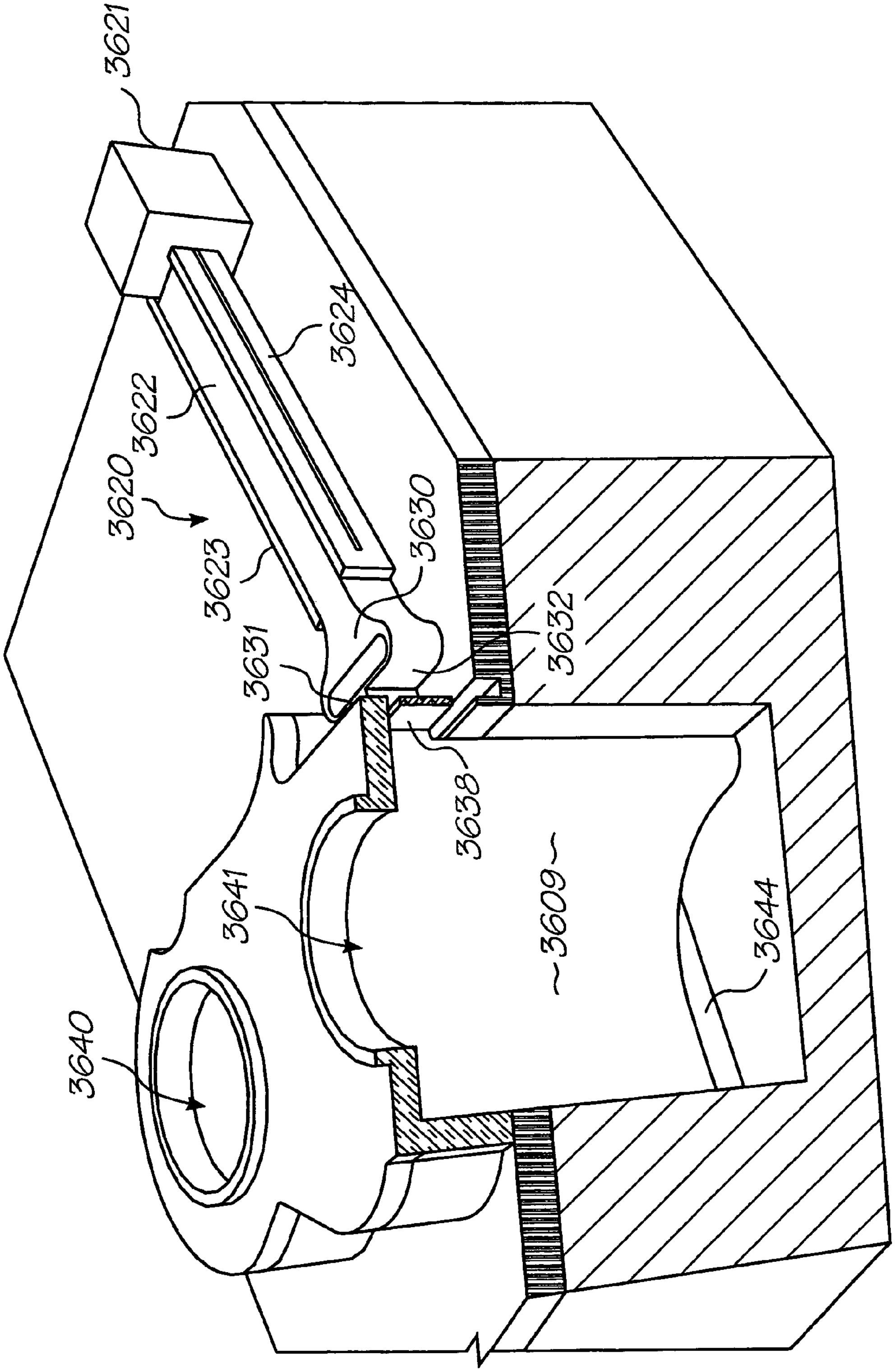
Figure 742:
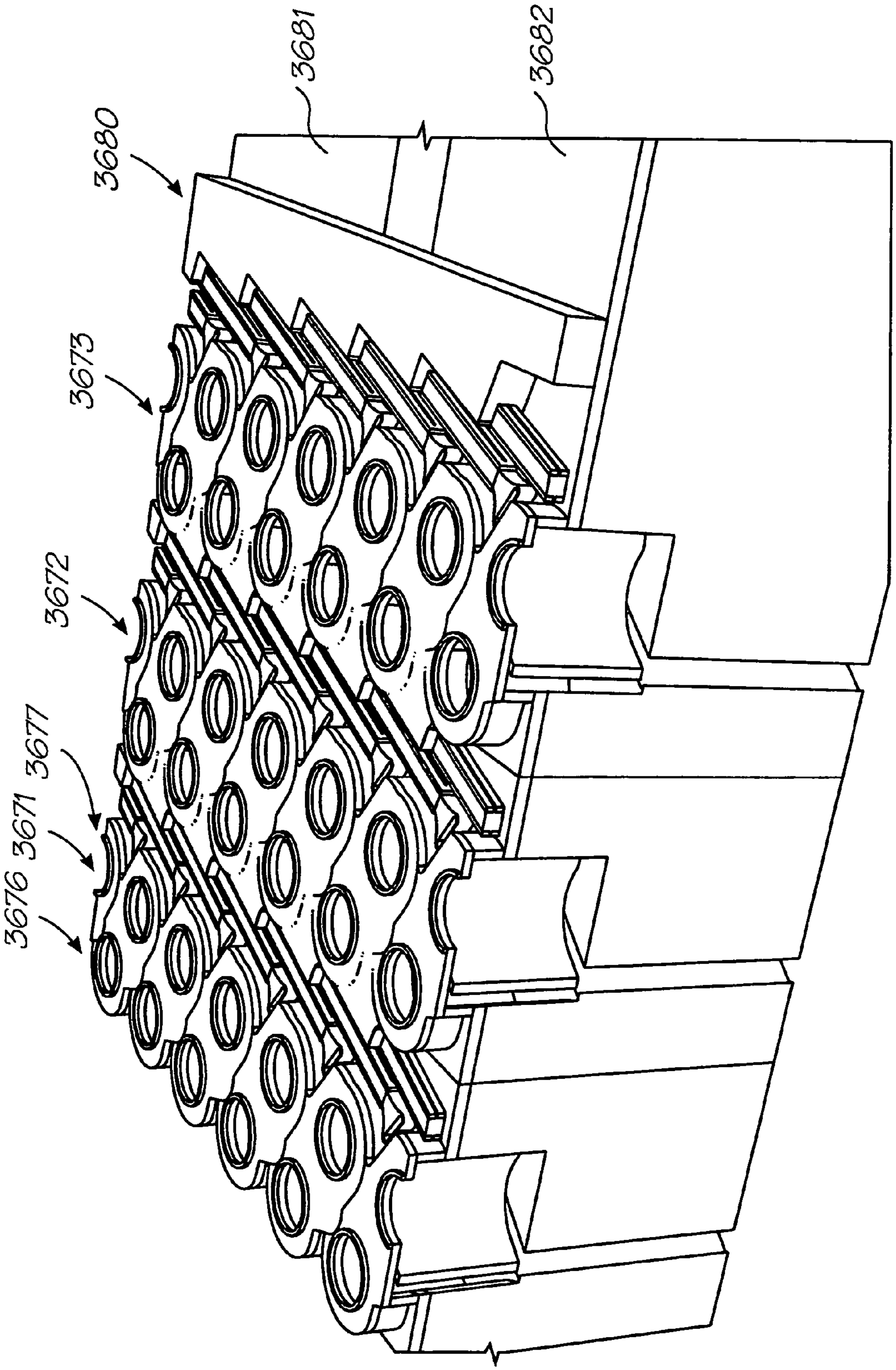
Figure 743:
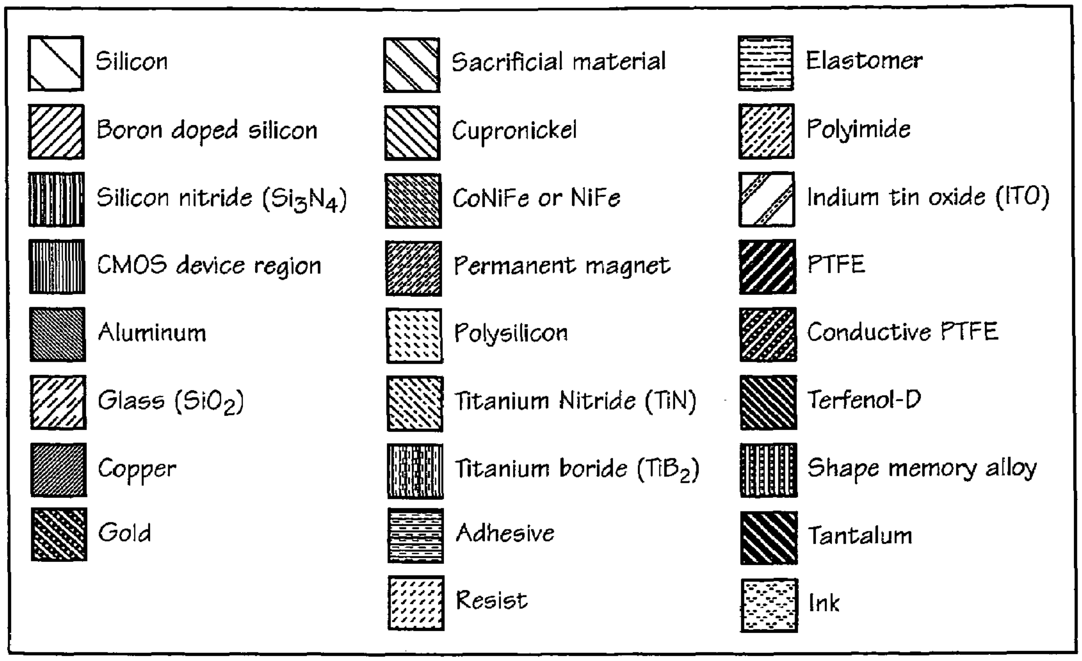
Figure 764:
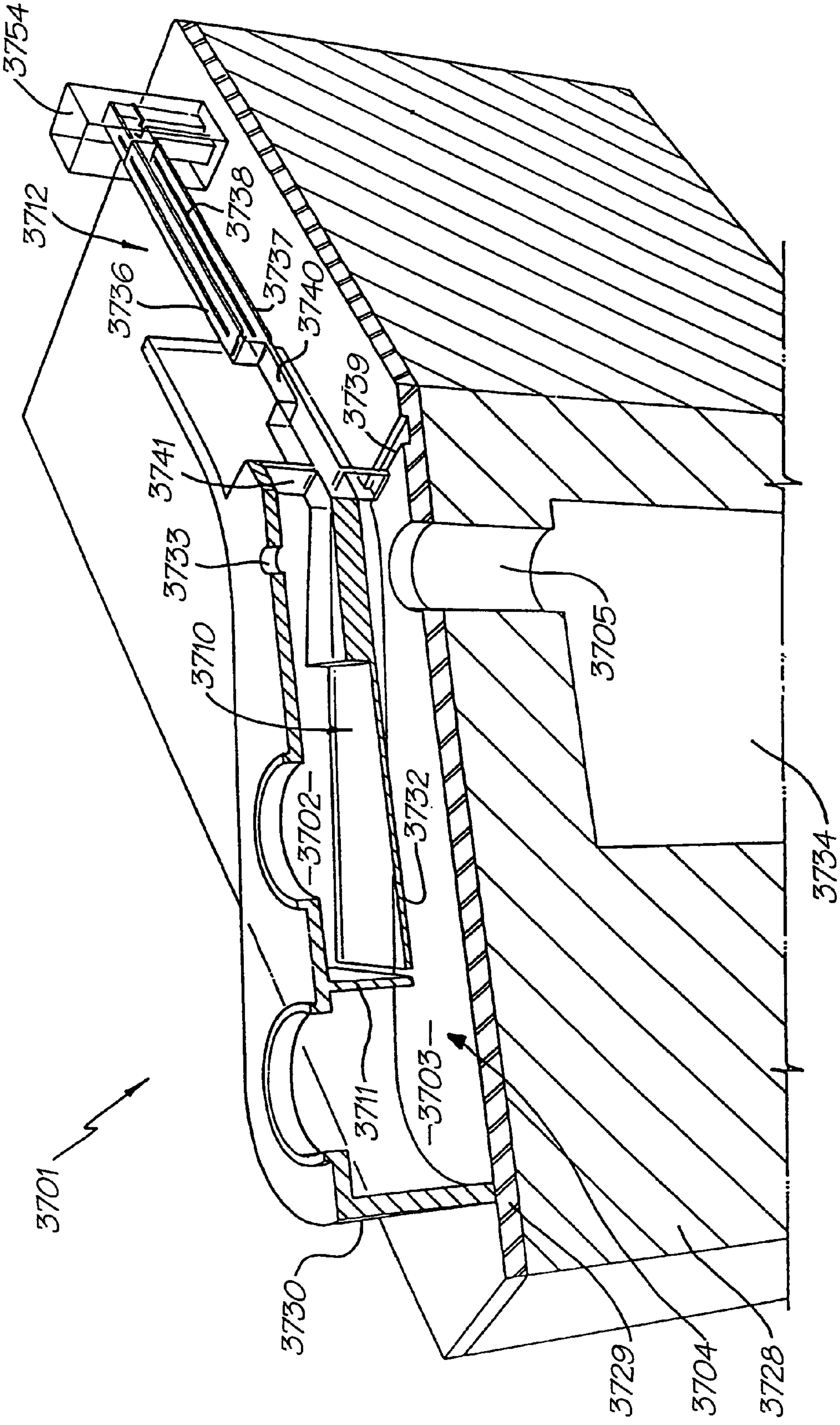
Figure 782:
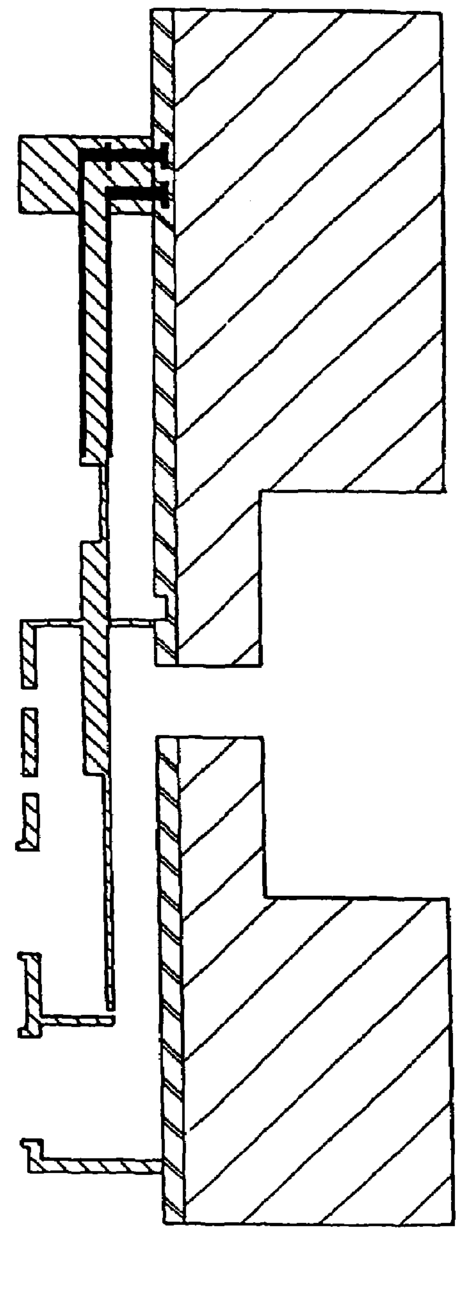
Figure 783:
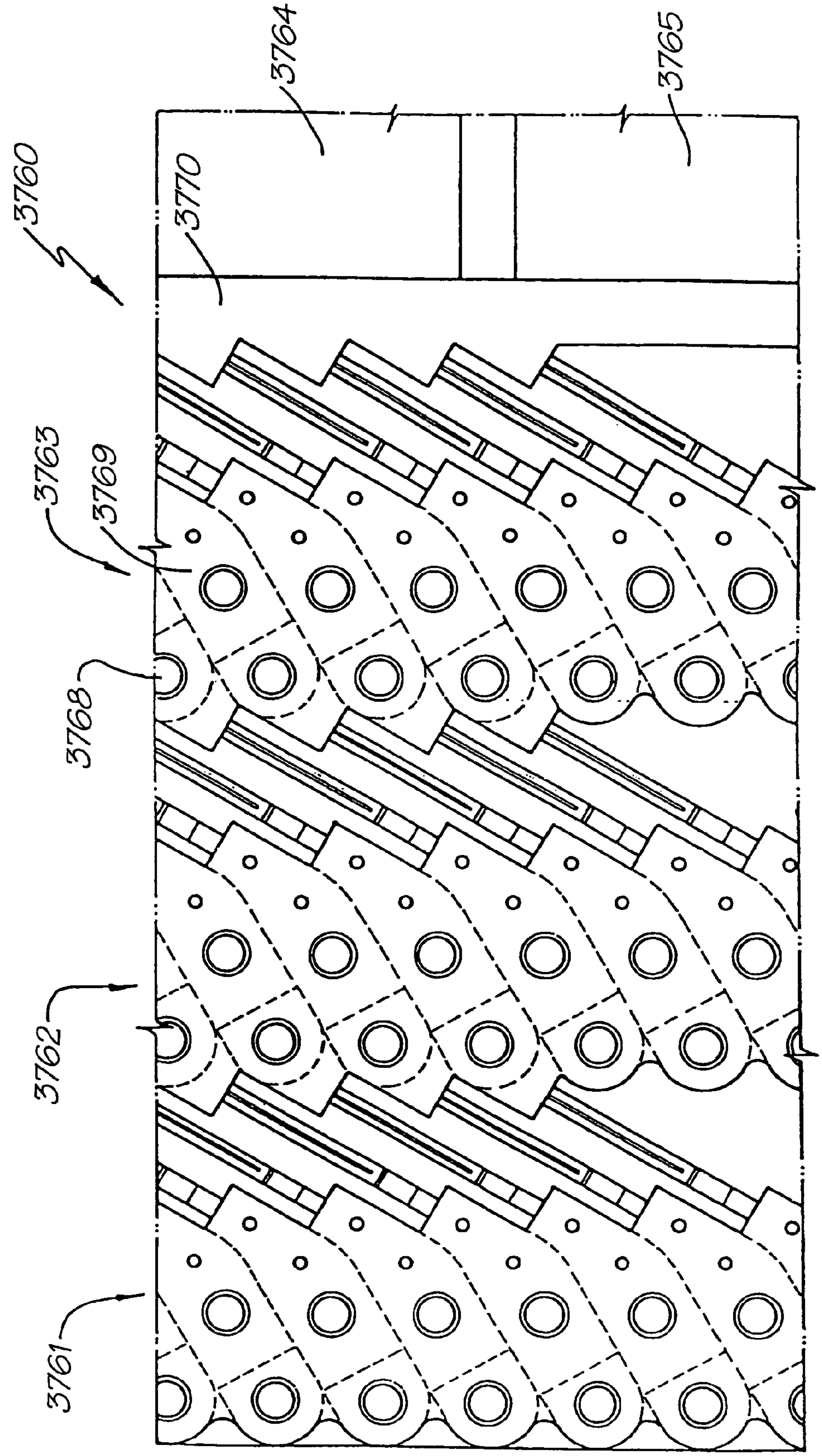

FIG. 721 illustrates a perspective view, partly in section of a single nozzle arrangement of a preferred embodiment;

FIGS. 722-741 are cross sectional views of the processing steps in the construction of a preferred embodiment;

FIG. 742 illustrates a part of an array view of a portion of a printhead as constructed in accordance with the principles of the present invention;

FIG. 743 provides a legend of the materials indicated in FIGS. 744 to 756;

FIG. 744 to FIG. 758 illustrate sectional views of the manufacturing steps in one form of construction of an ink jet printhead nozzle;

FIGS. 759-763 illustrate schematically the principles operation of a preferred embodiment;

FIG. 764 is a perspective view, partly in section of one form of construction of a preferred embodiment;

FIGS. 765-782 illustrate various steps in the construction of a preferred embodiment; and FIG. 783 illustrates an array view illustrating a portion of a printhead constructed in accordance with a preferred embodiment.

Figure 784:
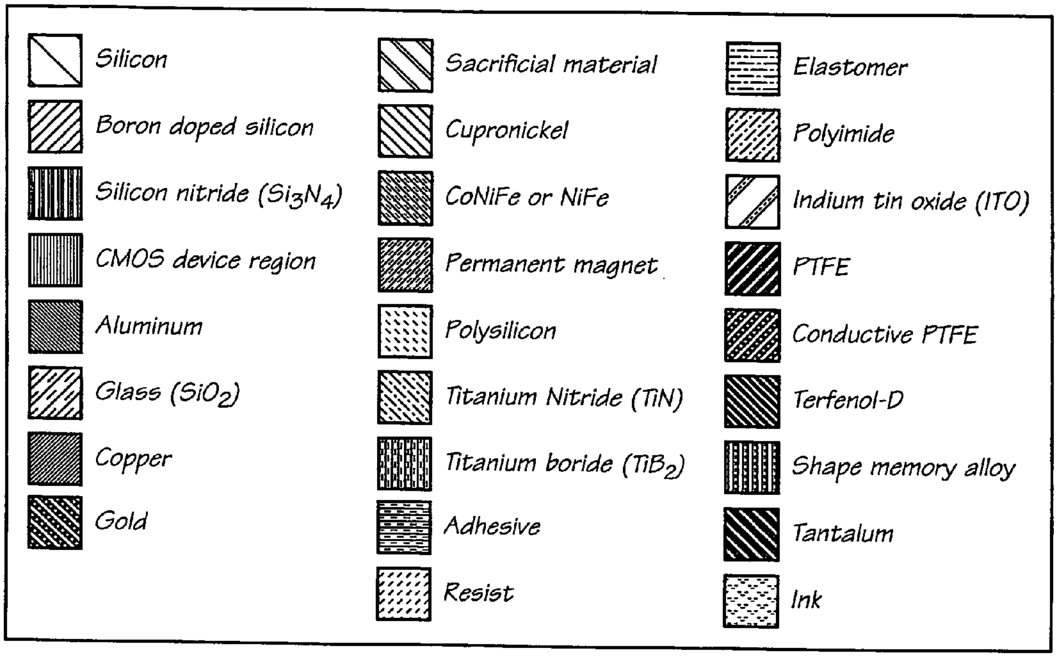
Figure 807:
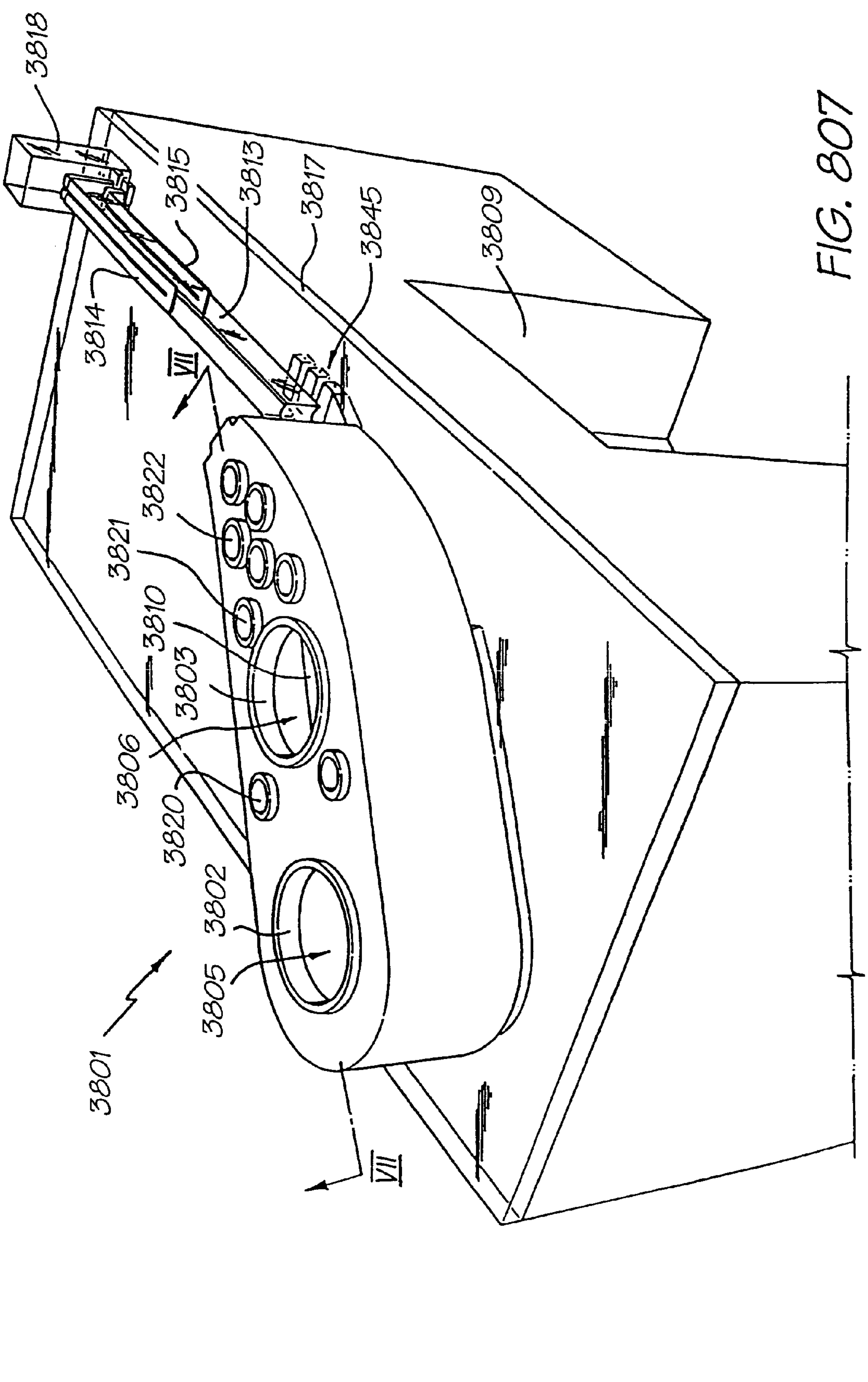
Figure 808:
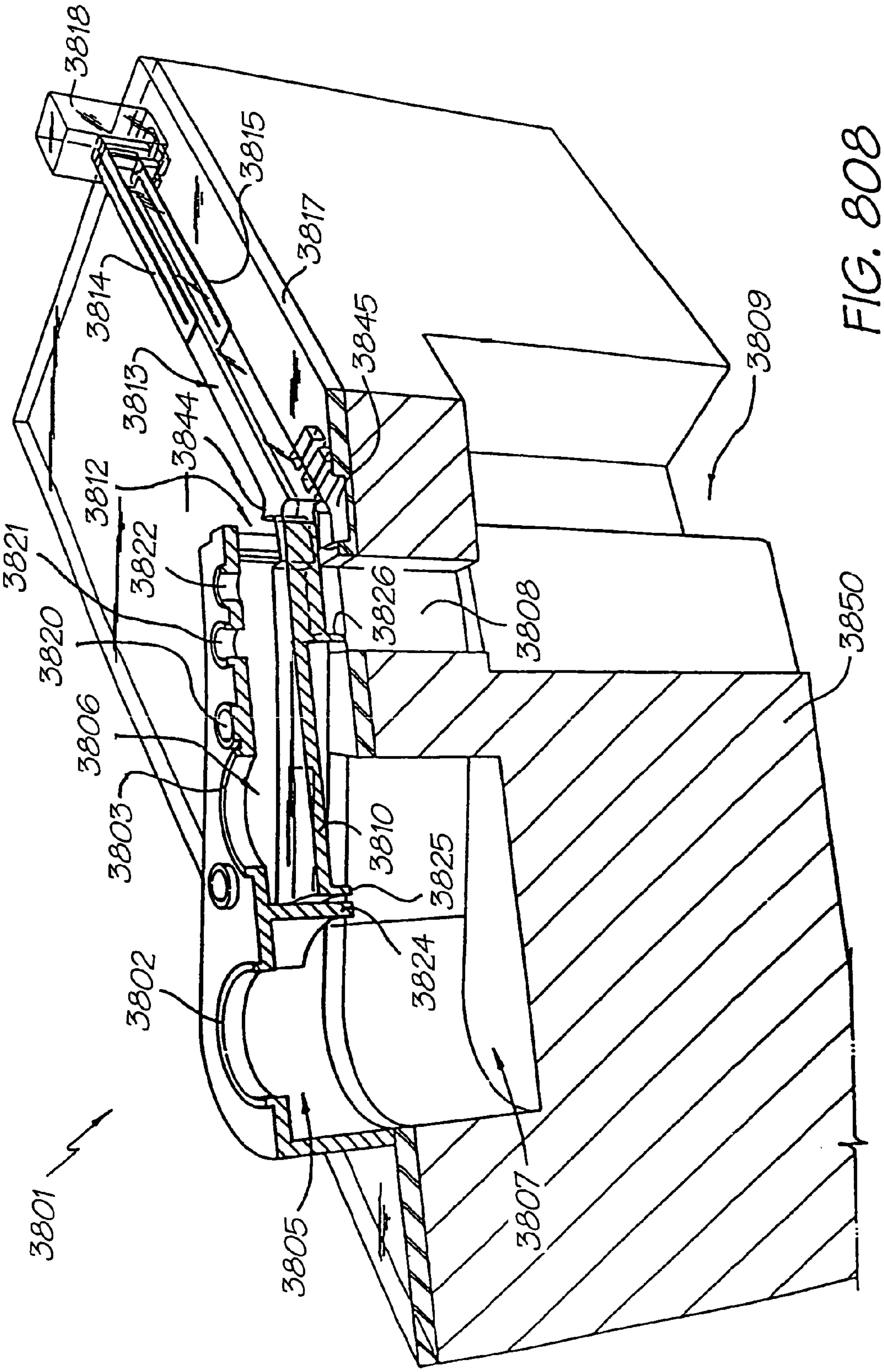
Figure 828:
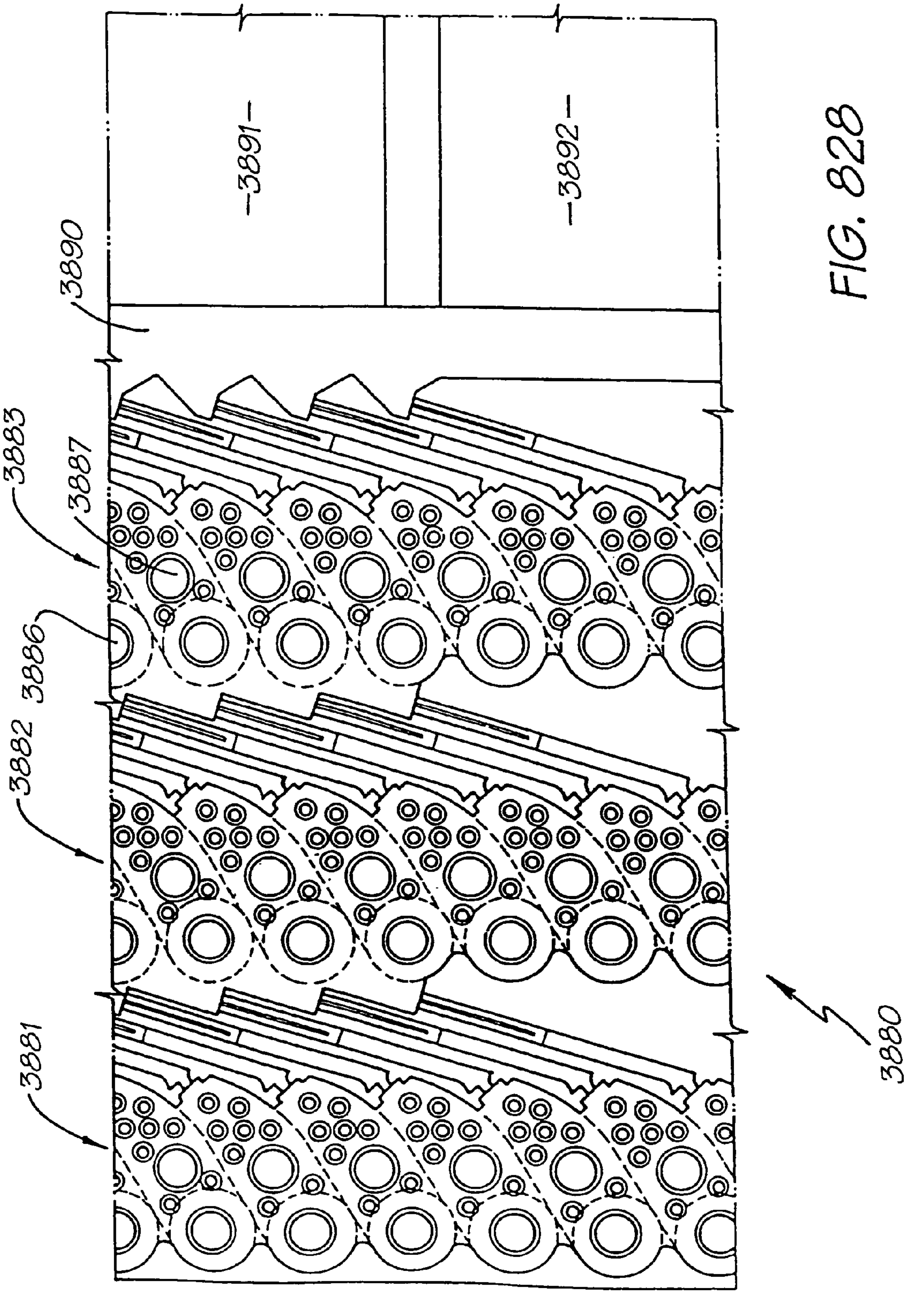
Figure 829:
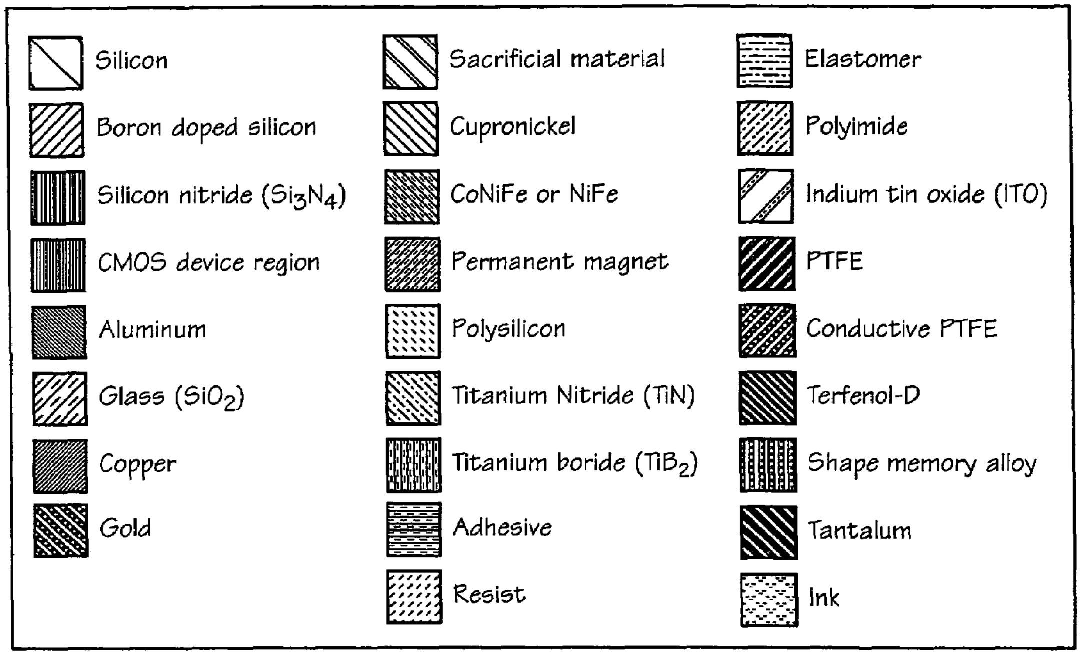
Figure 849:
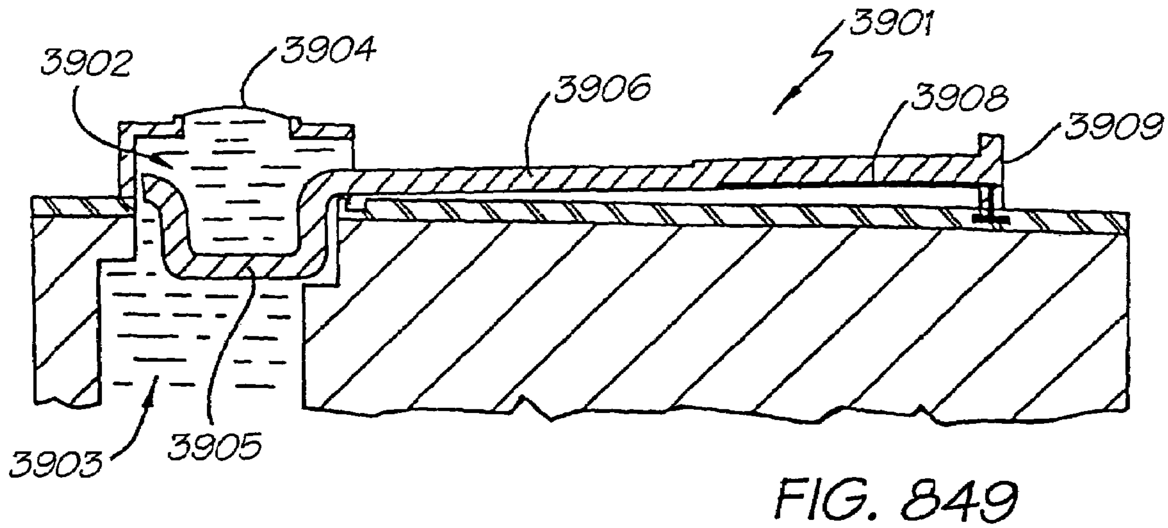
Figure 850:
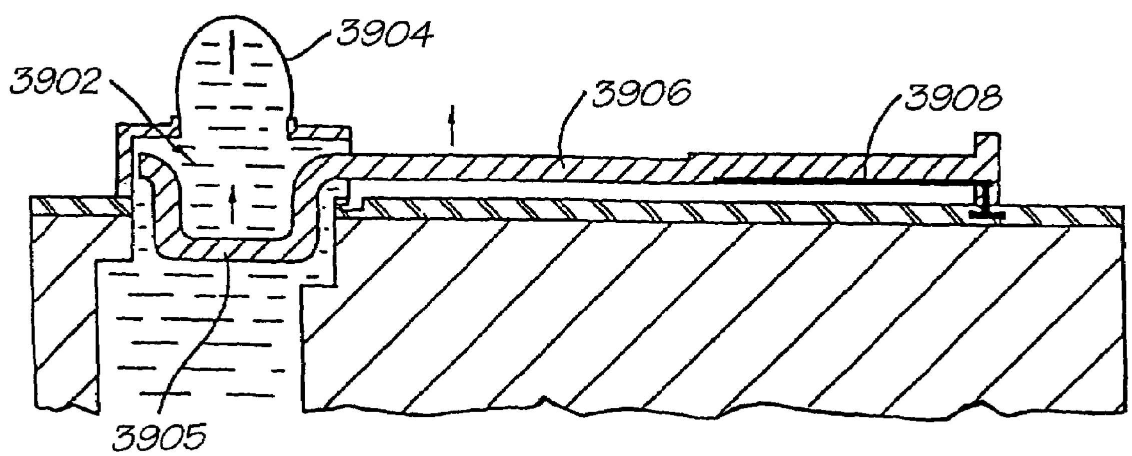
Figure 851:
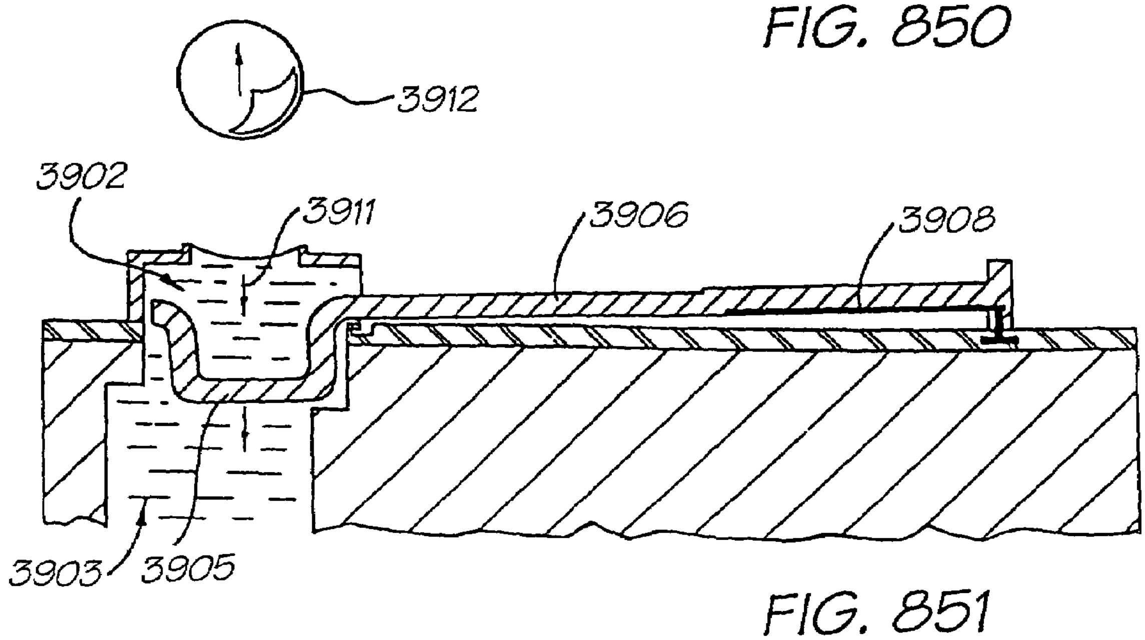
Figure 852:
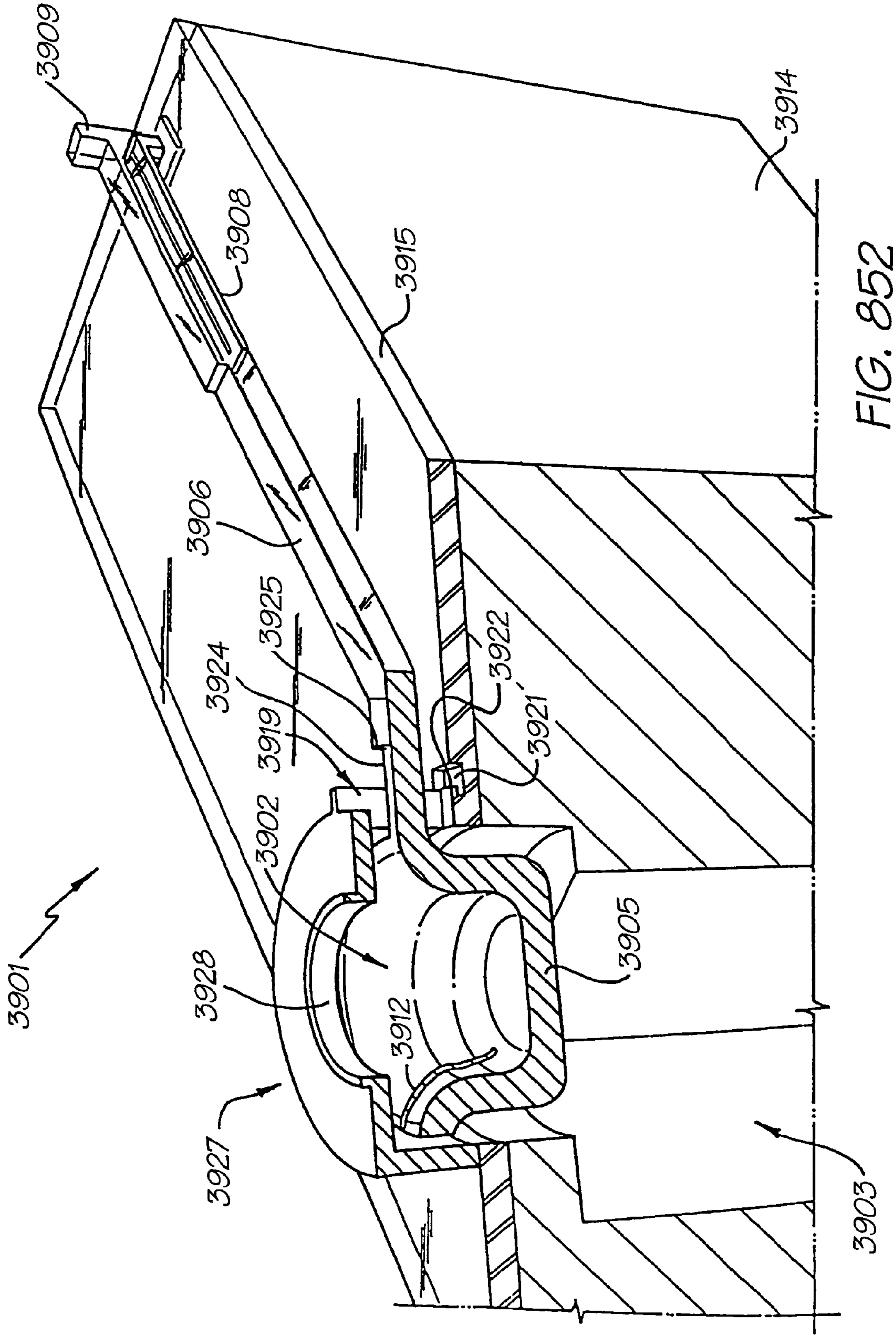
Figure 853:
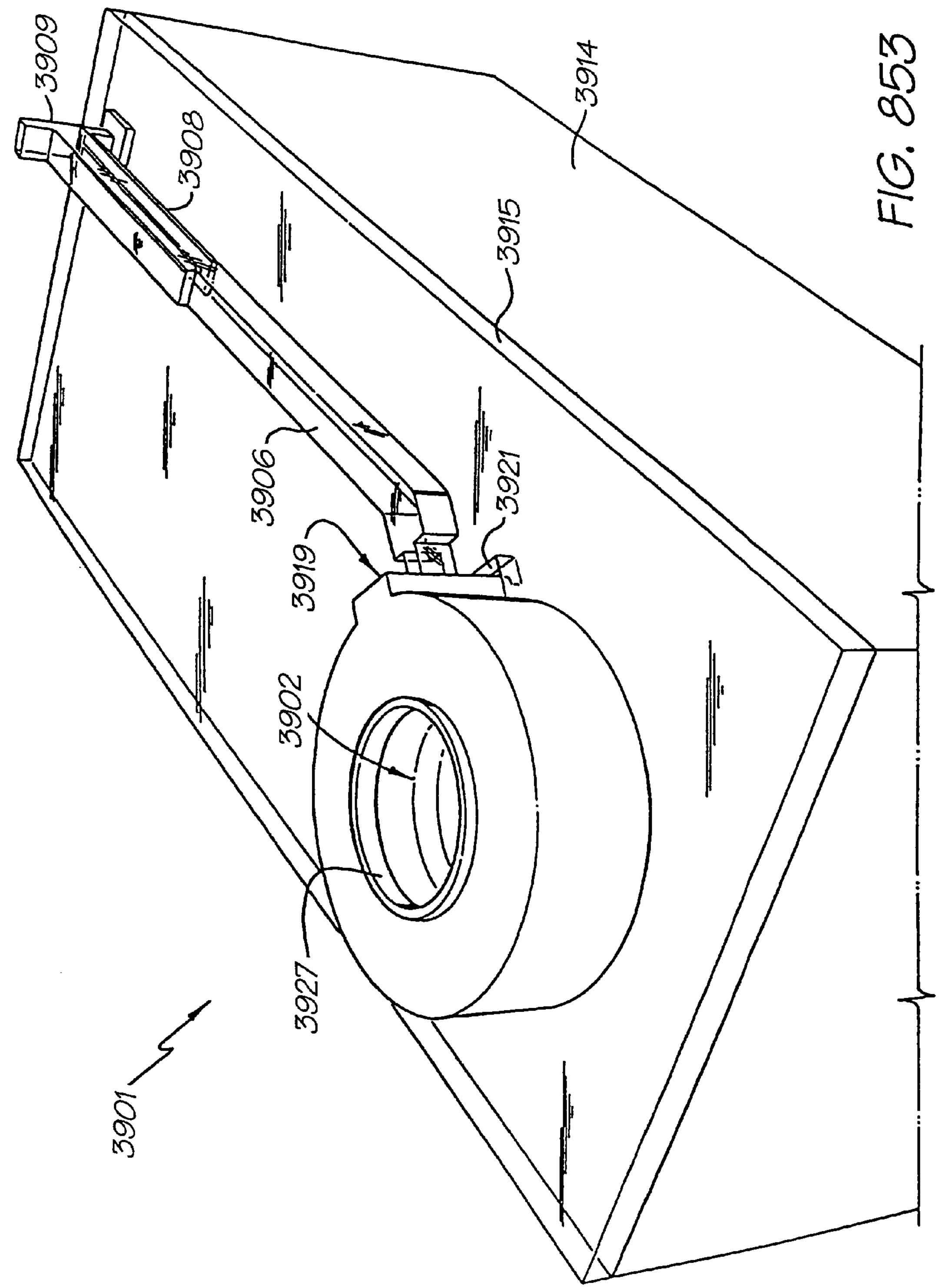
Figure 864:
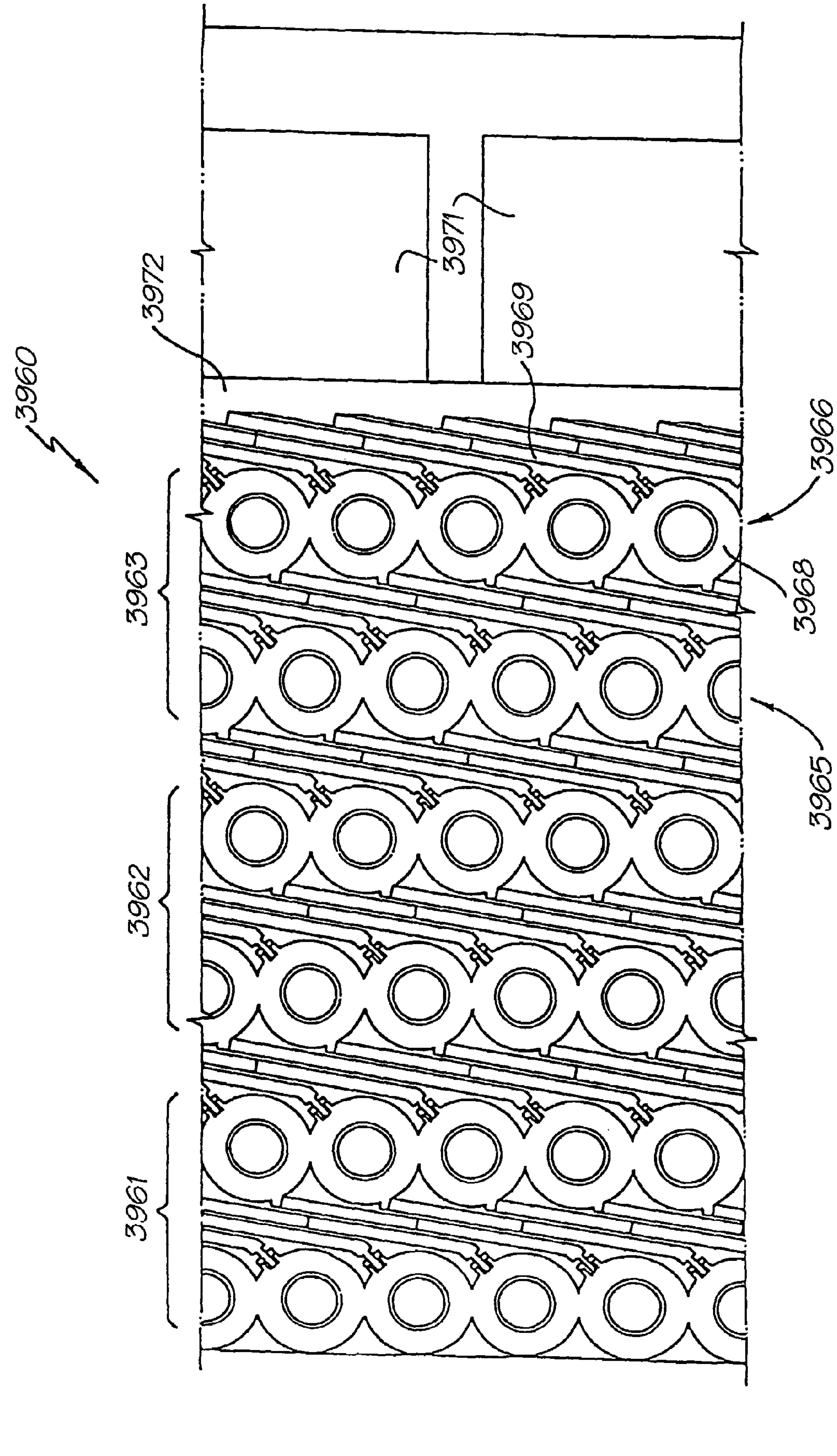

FIG. 784 provides a legend of the materials indicated in FIGS. 785 to 800;

FIG. 785 to FIG. 801 illustrate sectional views of the manufacturing steps in one form of construction of an ink jet printhead nozzle;

FIGS. 802-806 comprise schematic illustrations showing the operation of a preferred embodiment of a nozzle arrangement of this invention;

FIG. 807 illustrates a perspective view, of a single nozzle arrangement of a preferred embodiment;

FIG. 808 illustrates a perspective view, partly in section of a single nozzle arrangement of a preferred embodiment;

FIGS. 809-827 are cross sectional views of the processing steps in the construction of a preferred embodiment;

FIG. 828 illustrates a part of an array view of a printhead as constructed in accordance with the principles of the present invention;

FIG. 829 provides a legend of the materials indicated in FIGS. 830 to 848;

FIG. 830 to FIG. 848 illustrate sectional views of the manufacturing steps in one form of construction of an ink jet printhead including nozzle arrangements of this invention;

FIGS. 849-851 are schematic illustrations of the operational principles of a preferred embodiment;

FIG. 852 illustrates a perspective view, partly in section of a single inkjet nozzle of a preferred embodiment;

FIG. 853 is a side perspective view of a single inkjet nozzle of a preferred embodiment;

FIGS. 854-863 illustrate the various manufacturing processing steps in the construction of a preferred embodiment;

FIG. 864 illustrates a portion of an array view of a printhead having a large number of nozzles, each constructed in accordance with the principles of the present invention.

Figure 865:
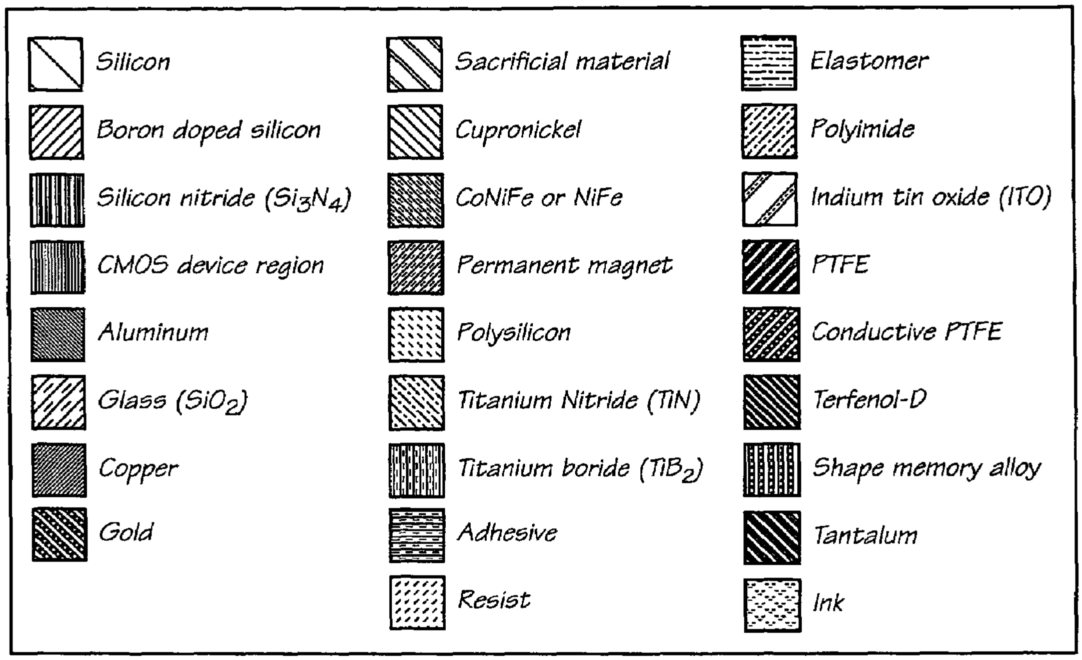
Figure 877:
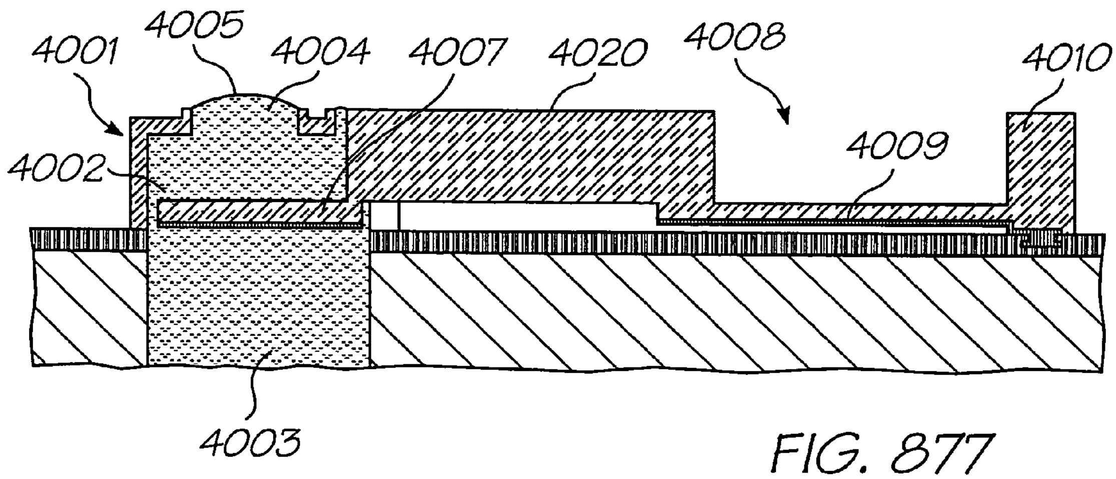
Figure 878:
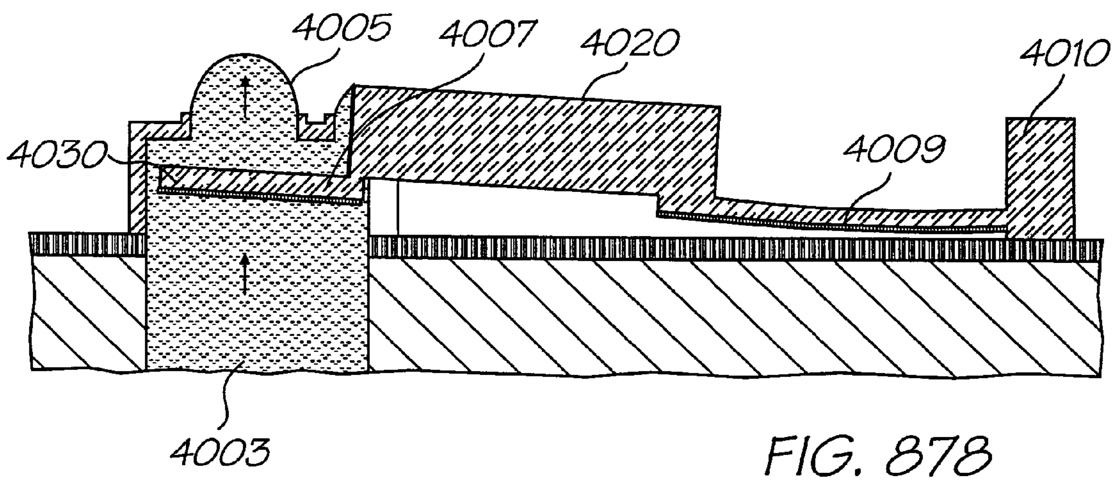
Figure 879:
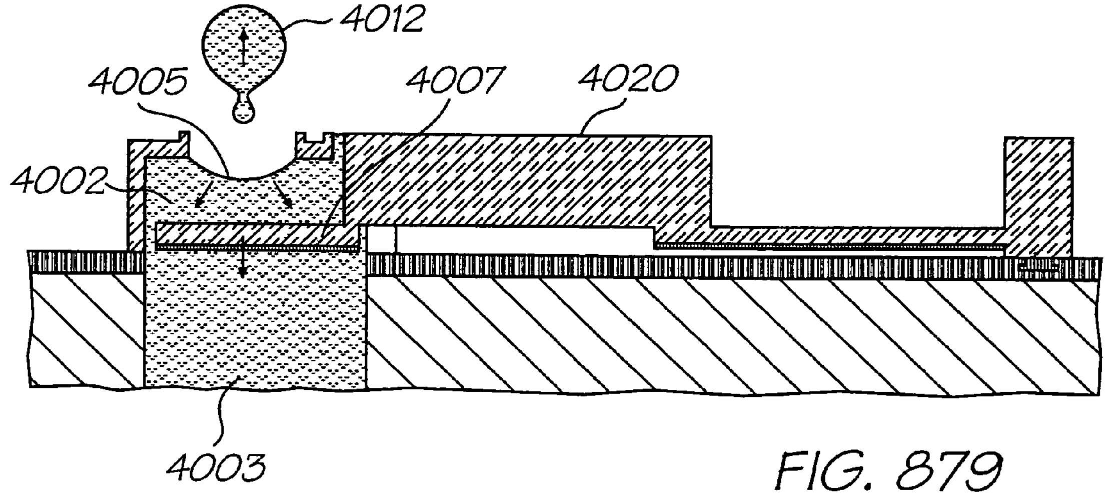
Figure 880:
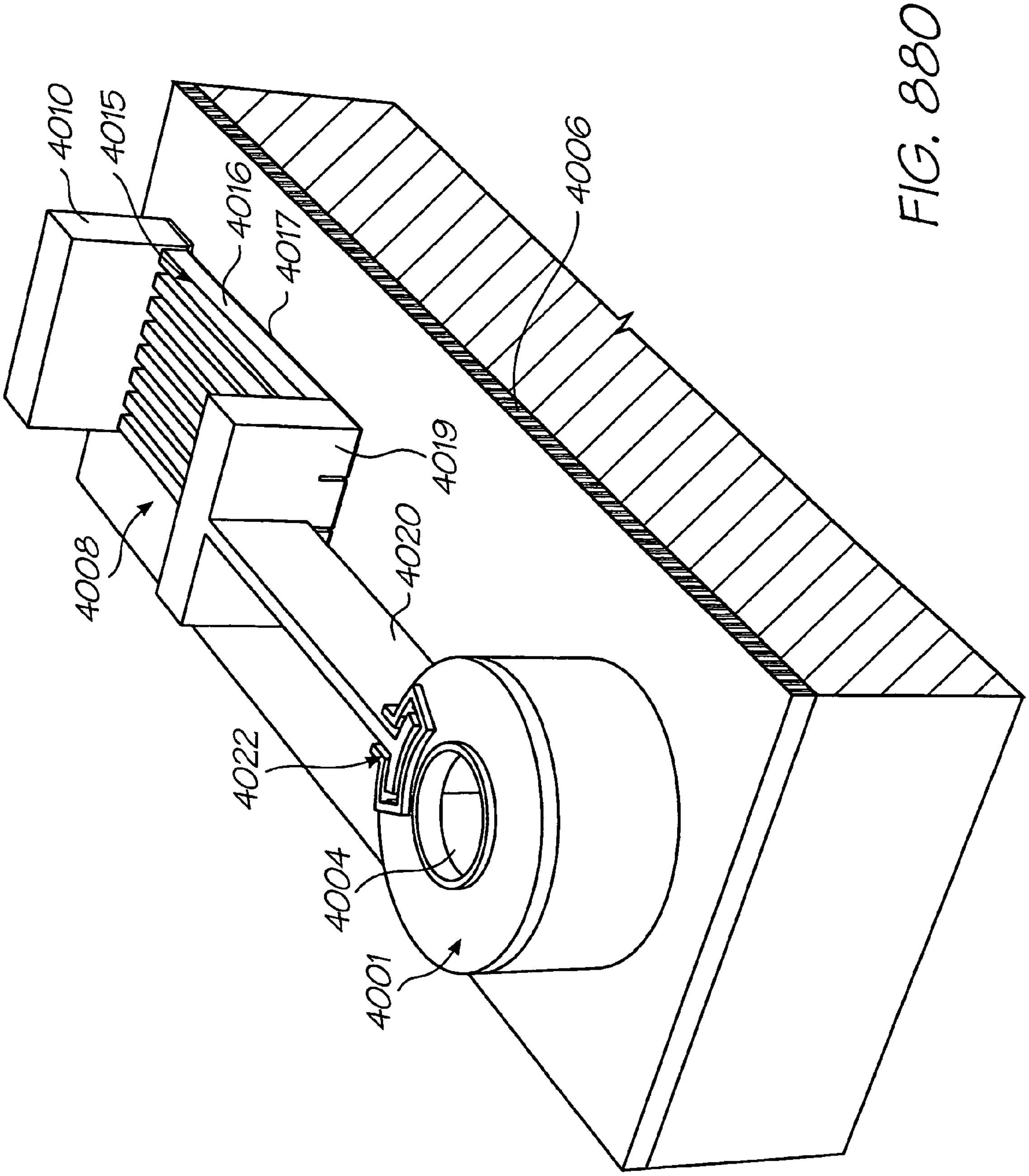
Figure 881:
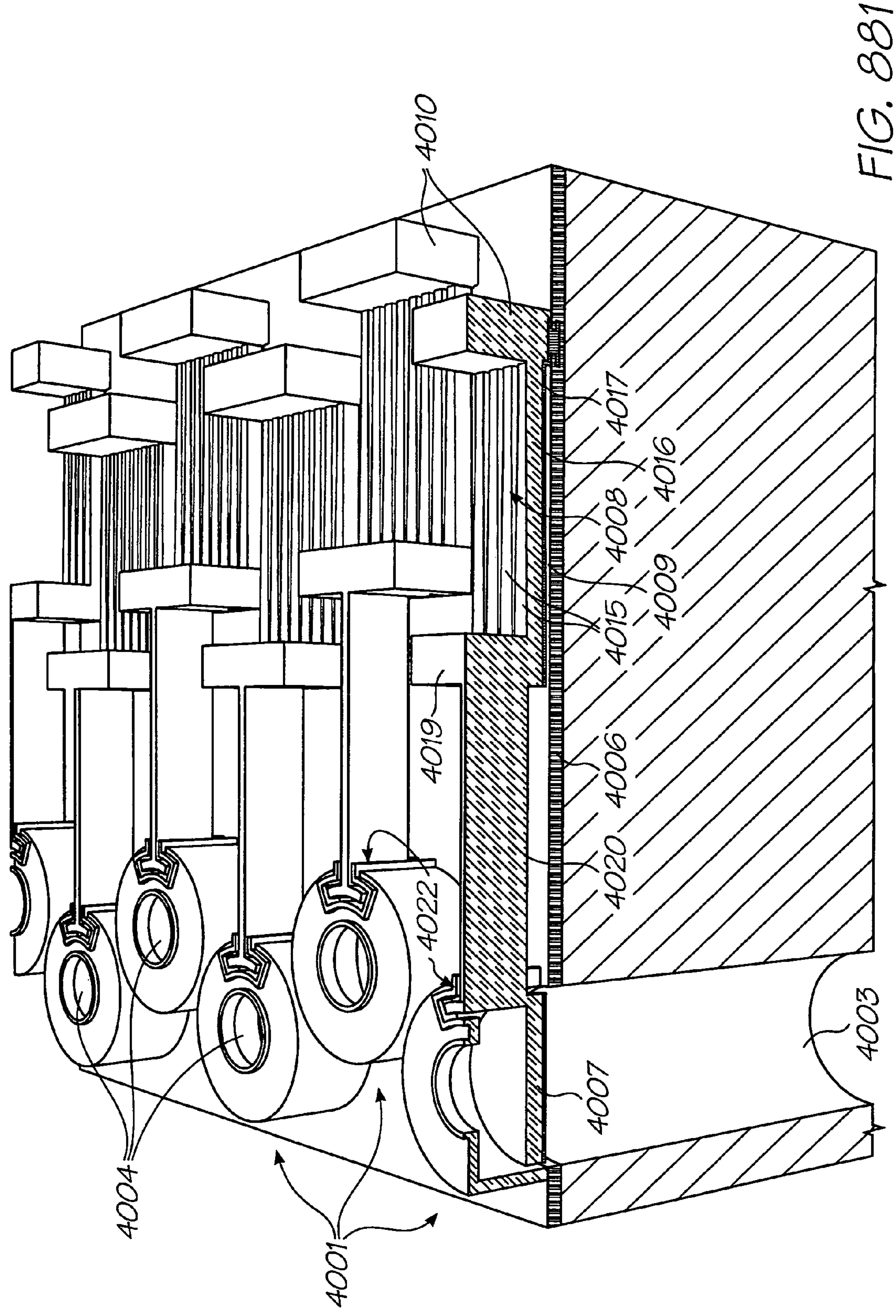
Figure 882:
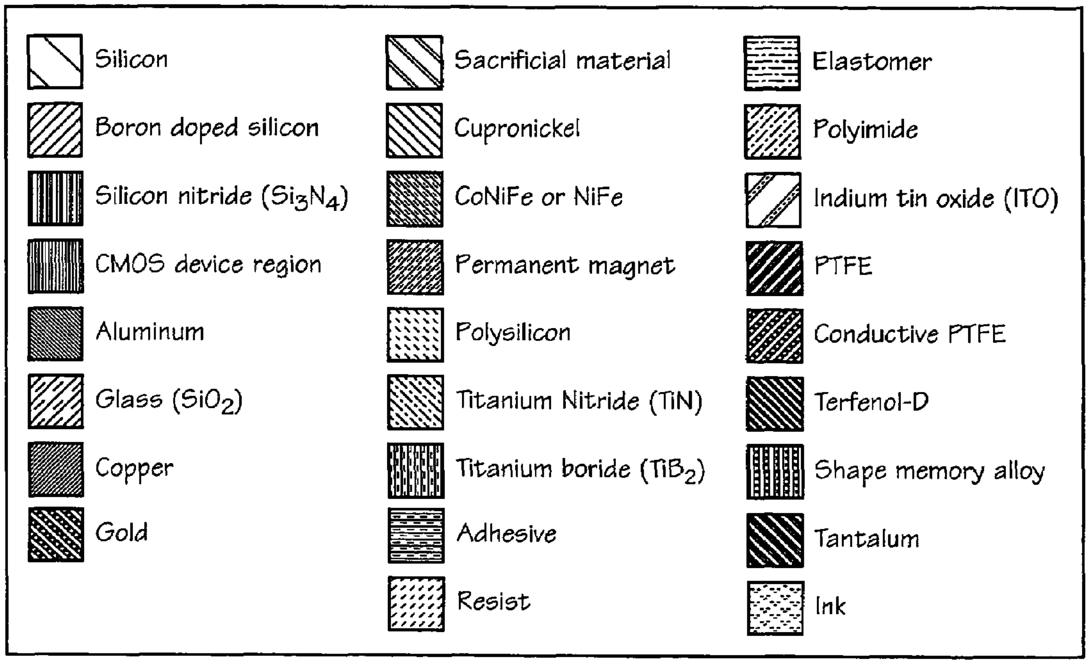
Figure 893:
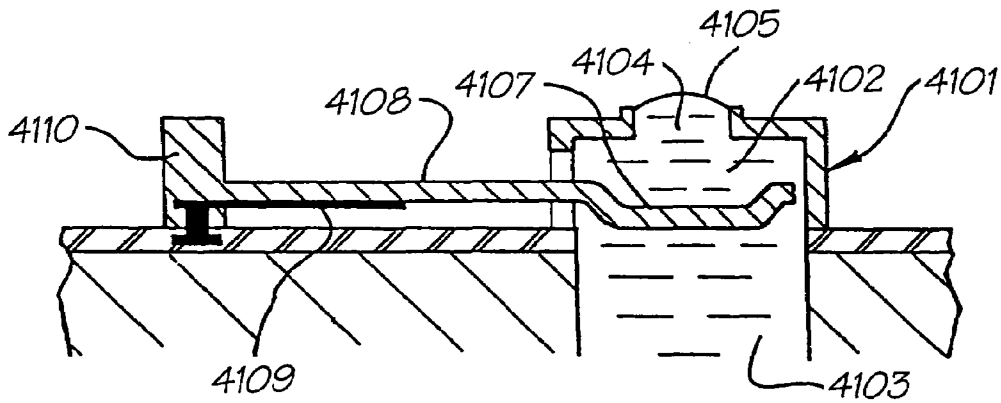
Figure 894:
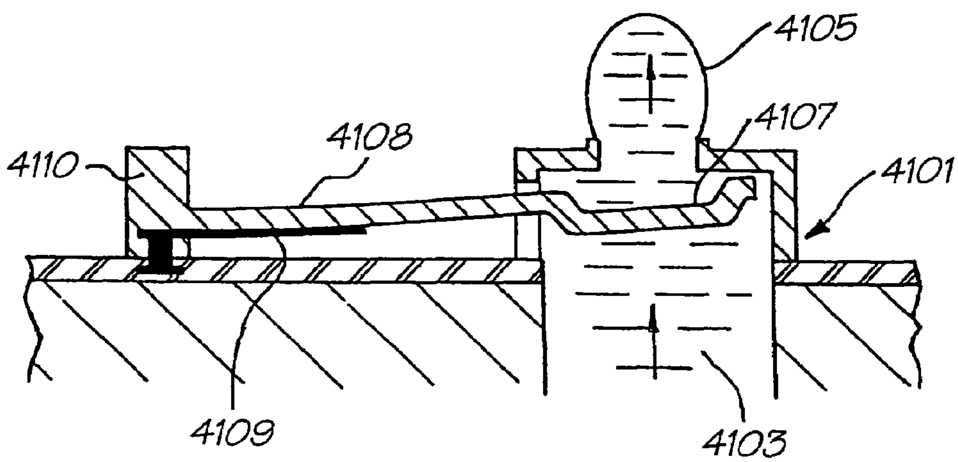
Figure 895:
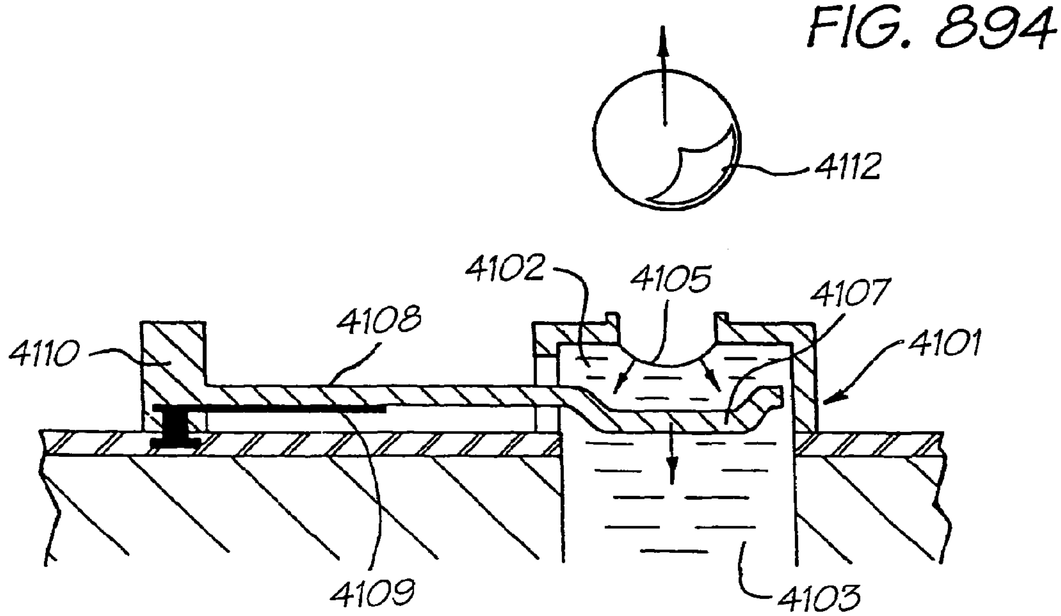
Figure 896:
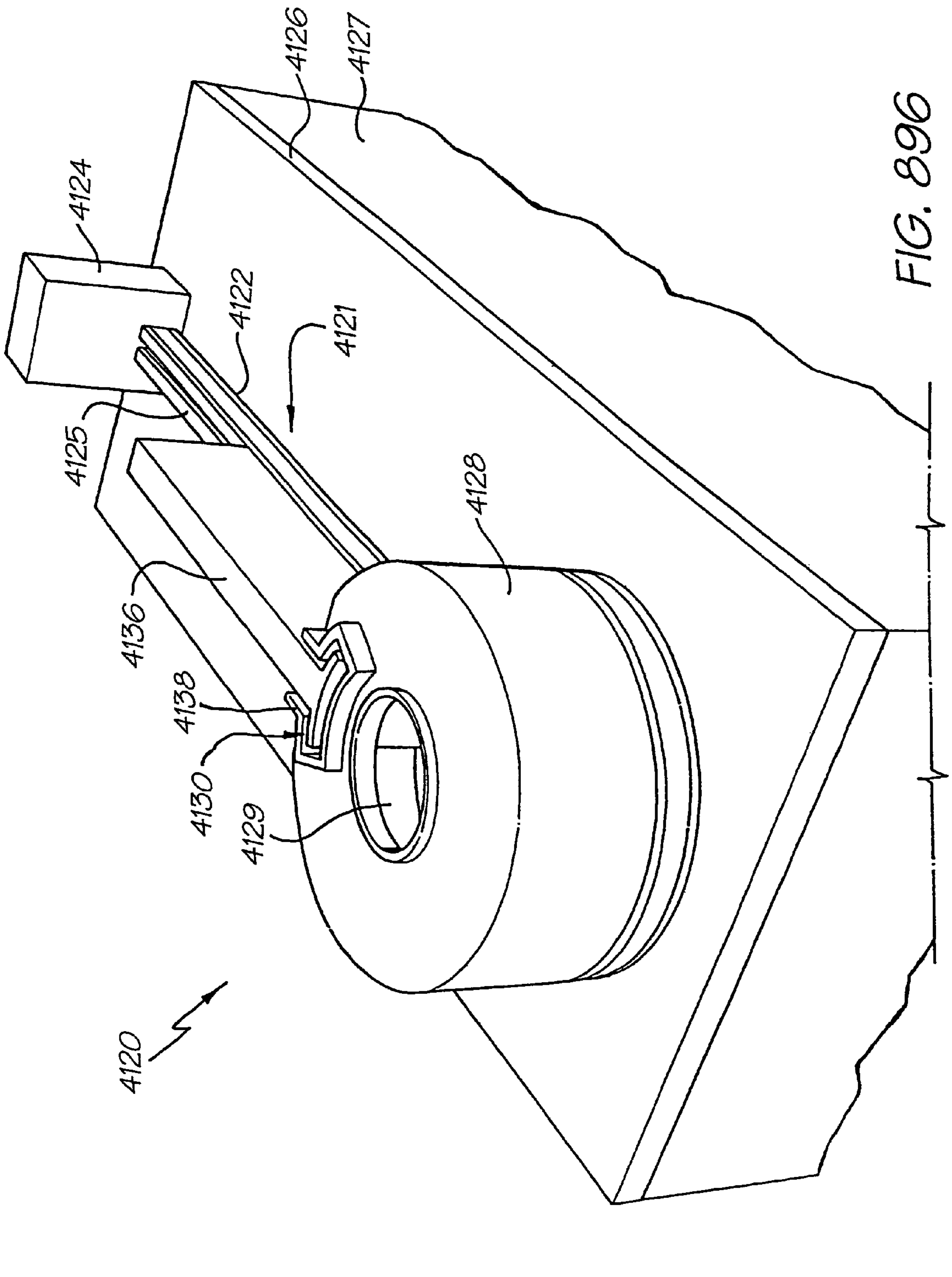
Figure 897:
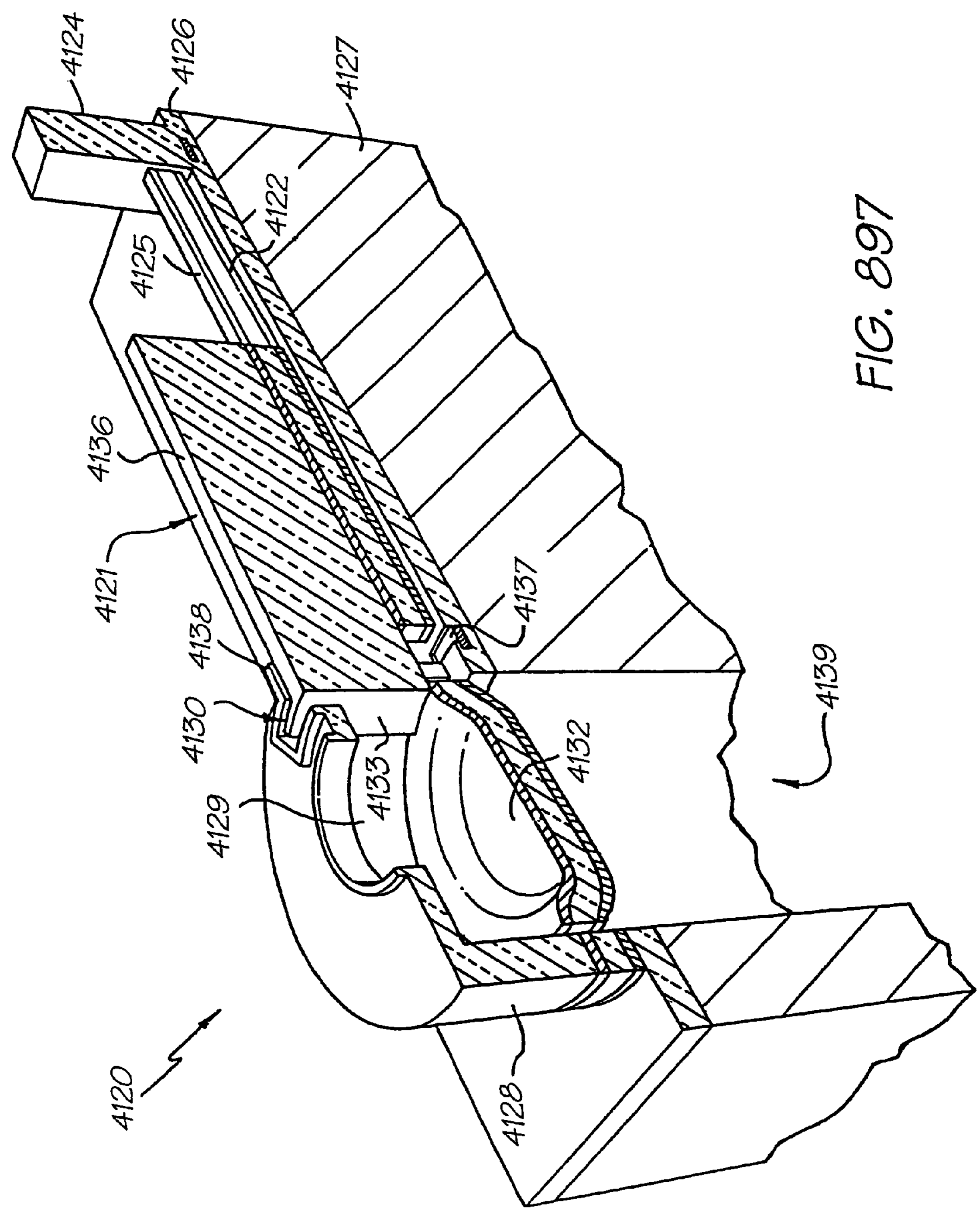
Figure 898:
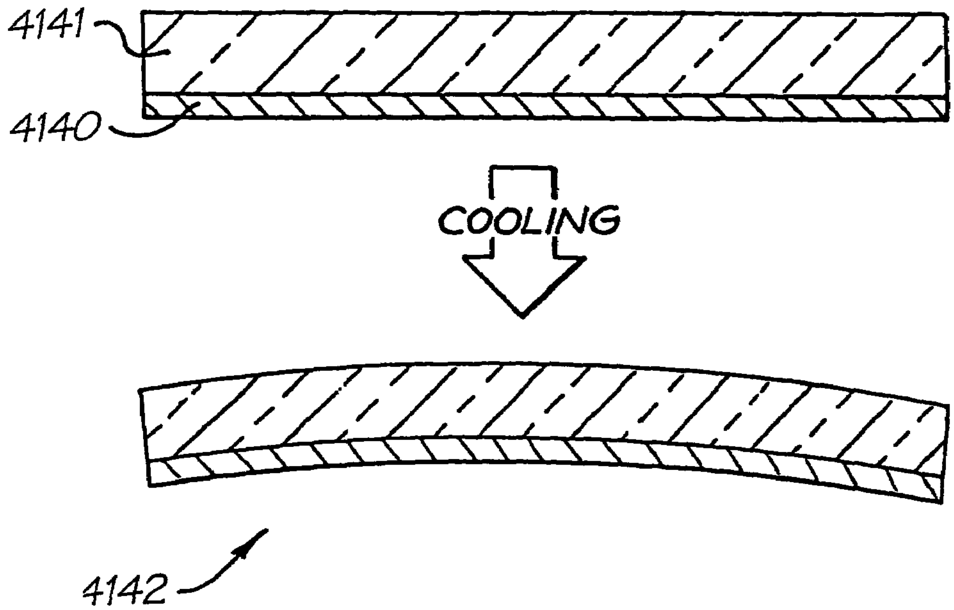
Figure 908:
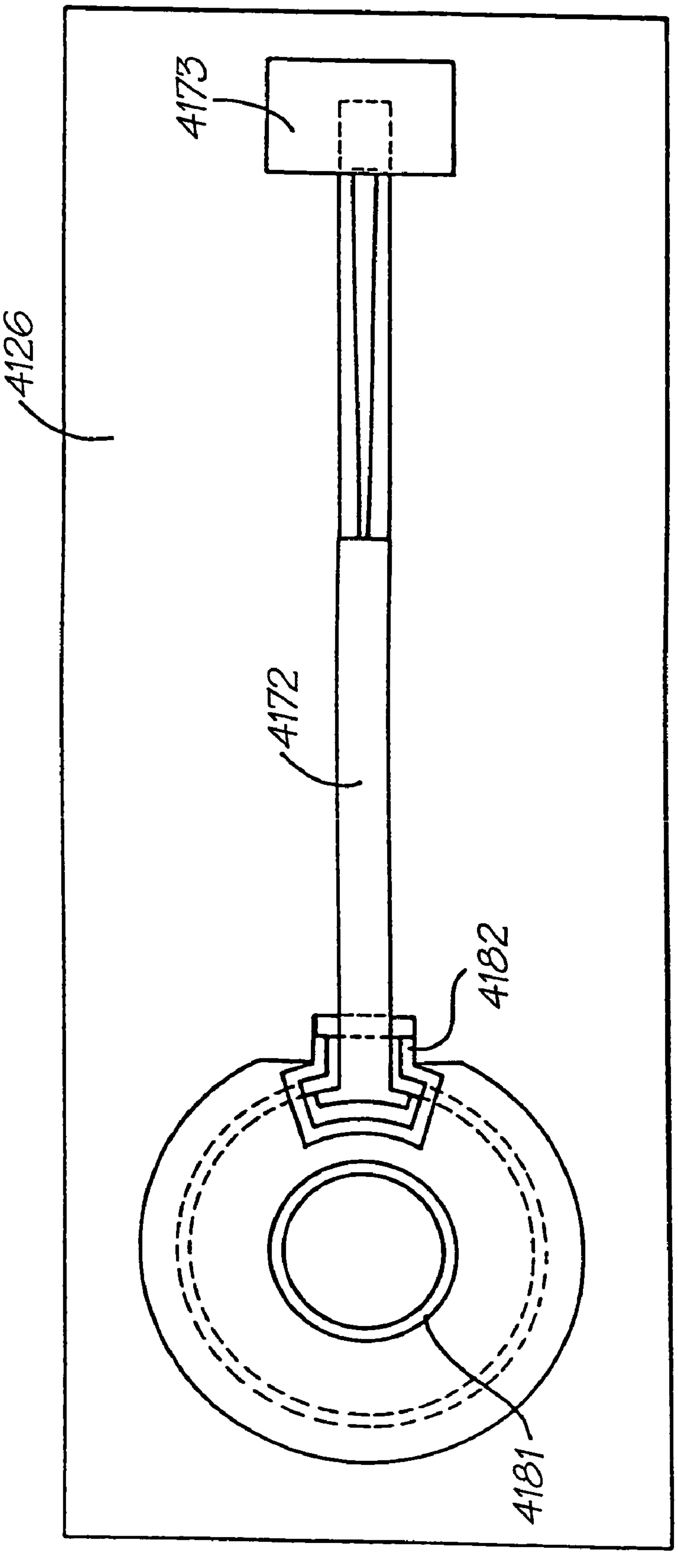
Figure 909:
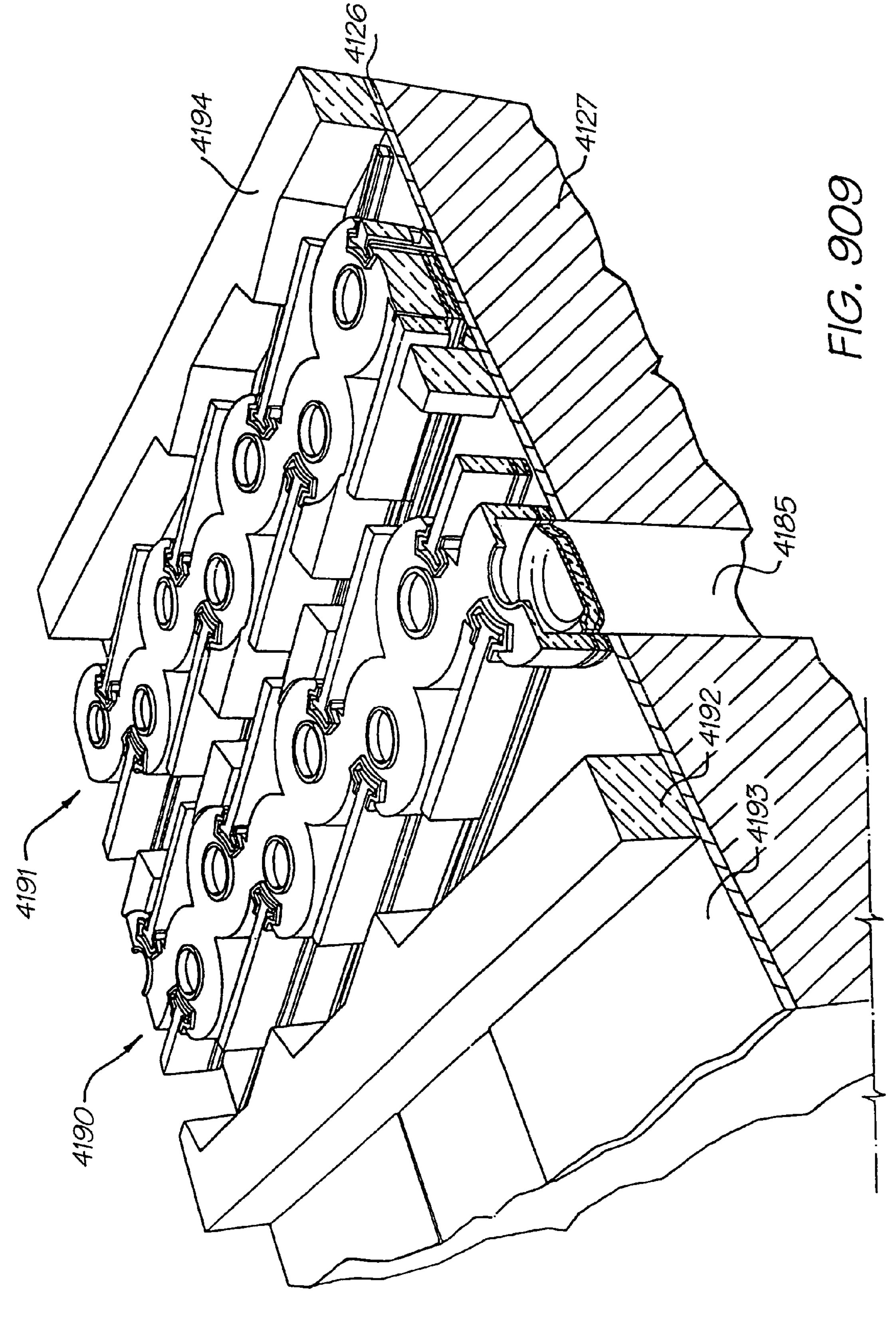
Figure 910:
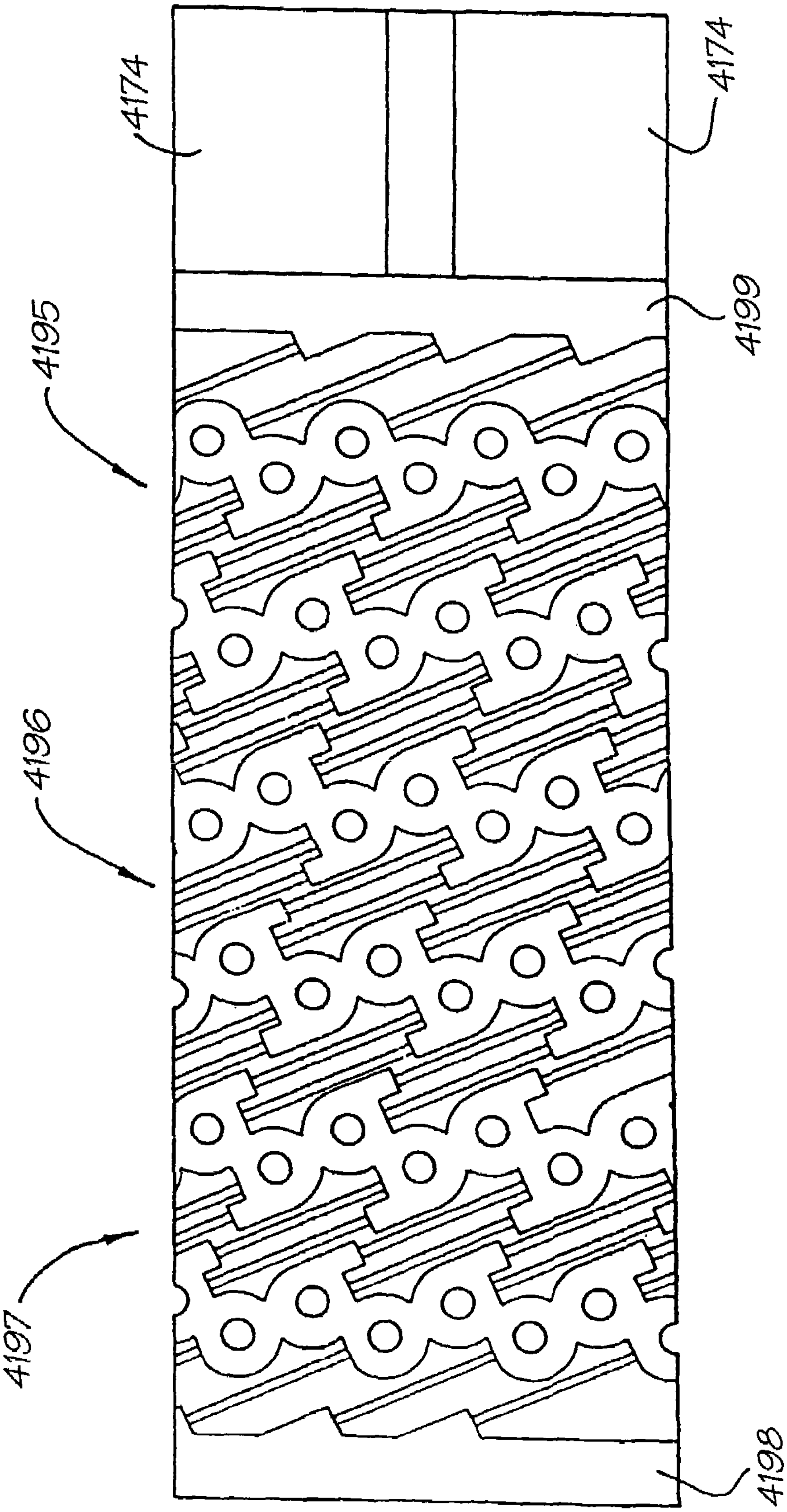
Figure 911:
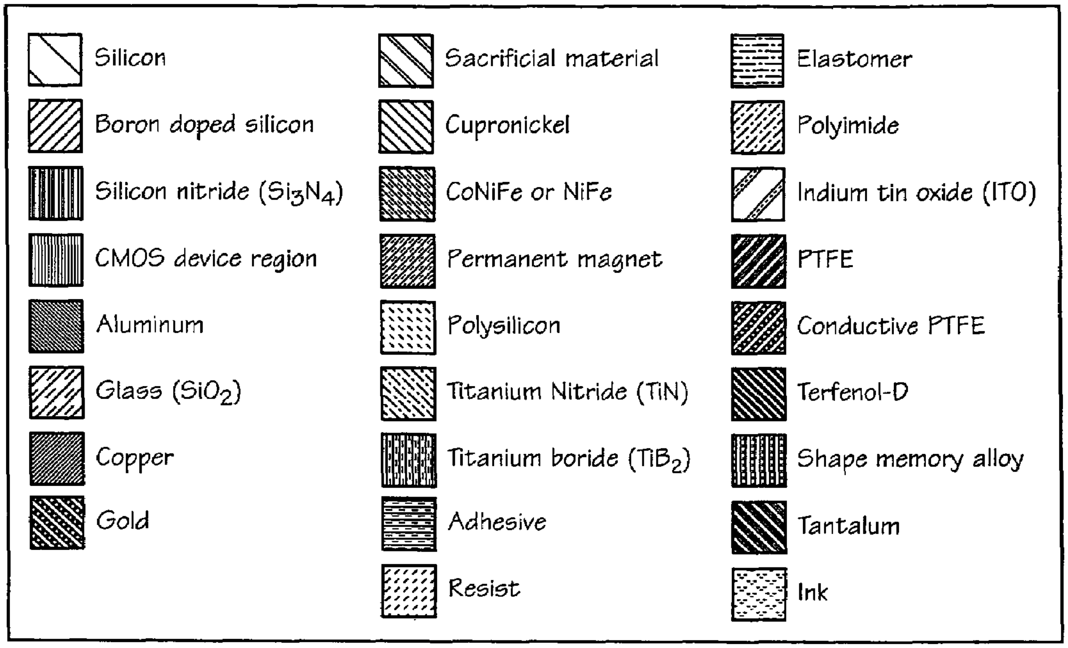
Figure 922:
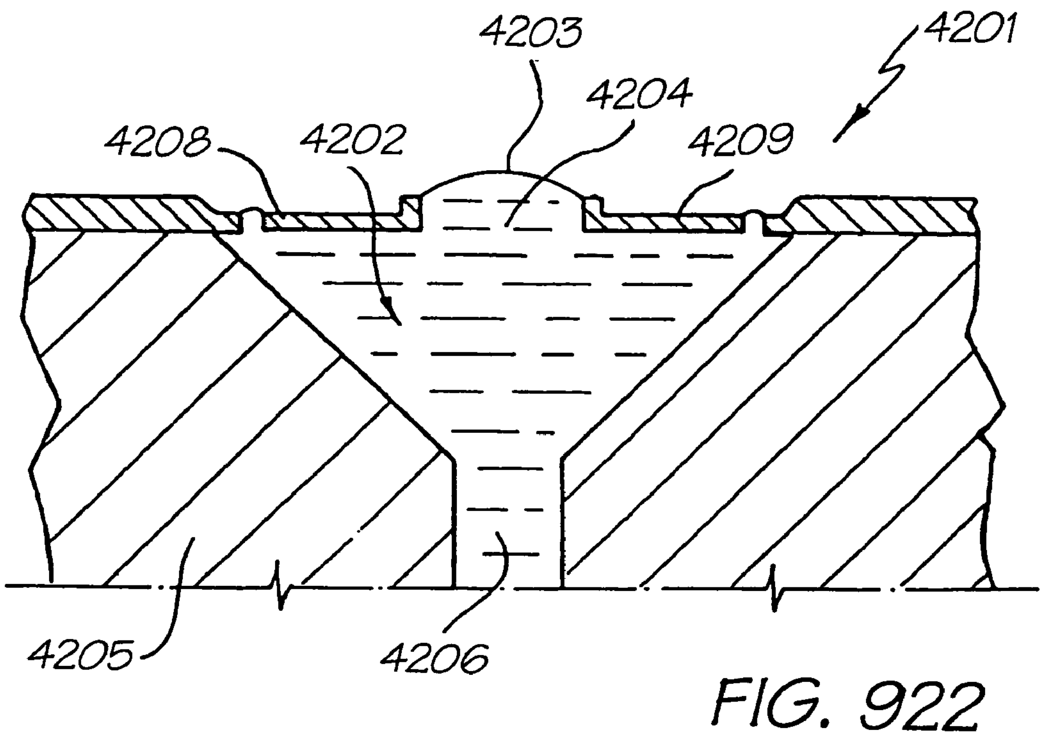
Figure 923:
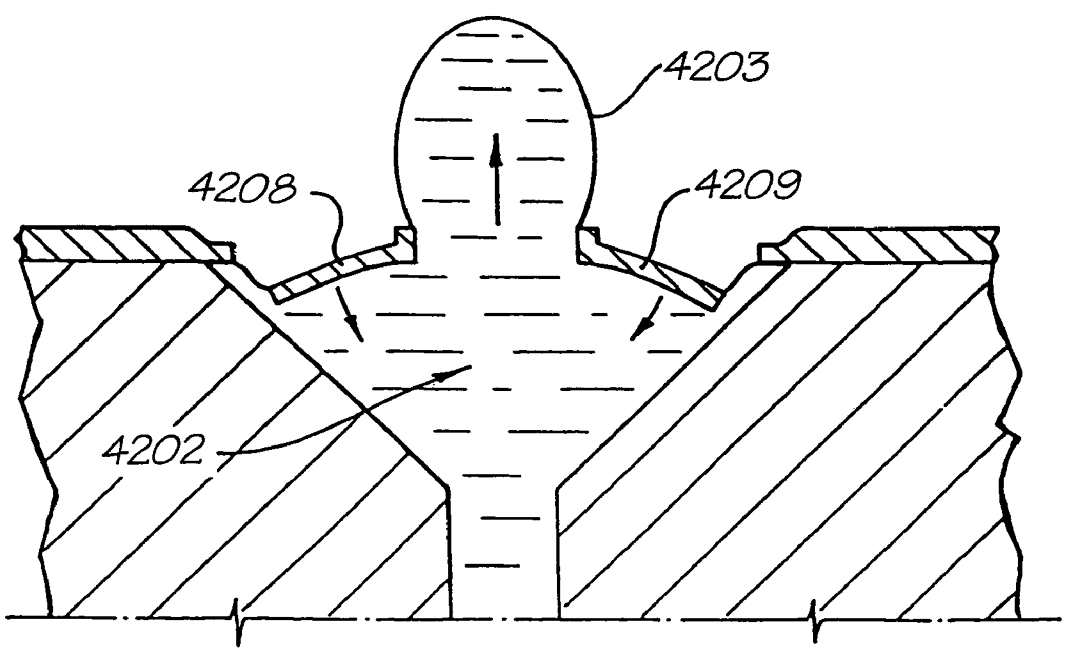
Figure 924:
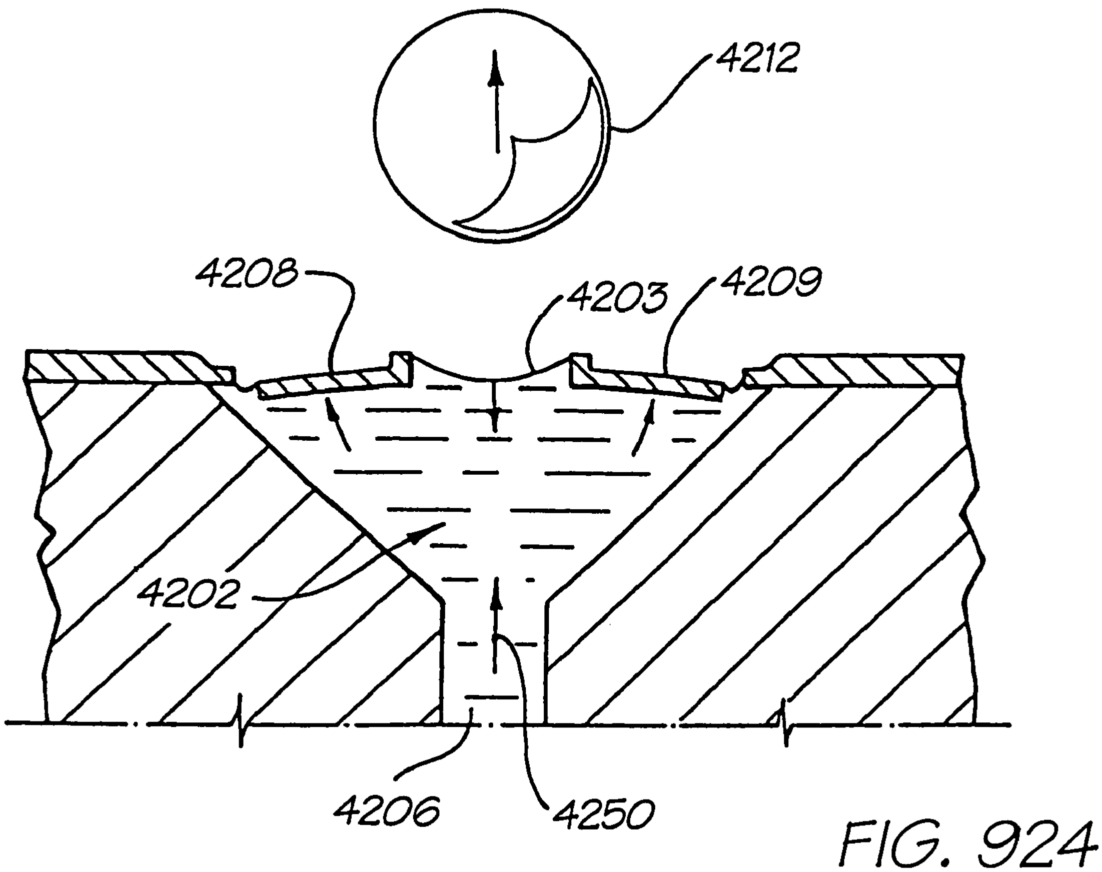
Figure 925A:
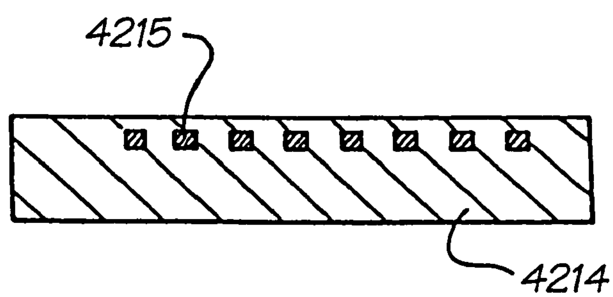
Figure 925B:
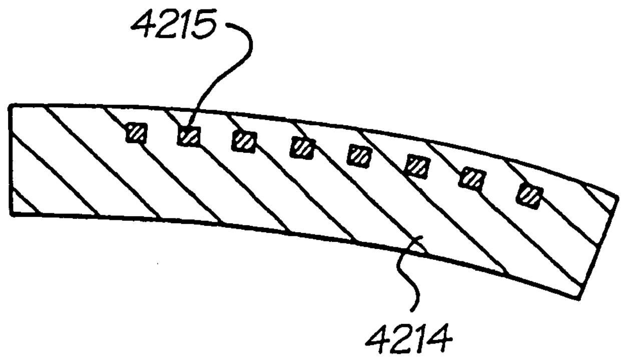
Figure 926:
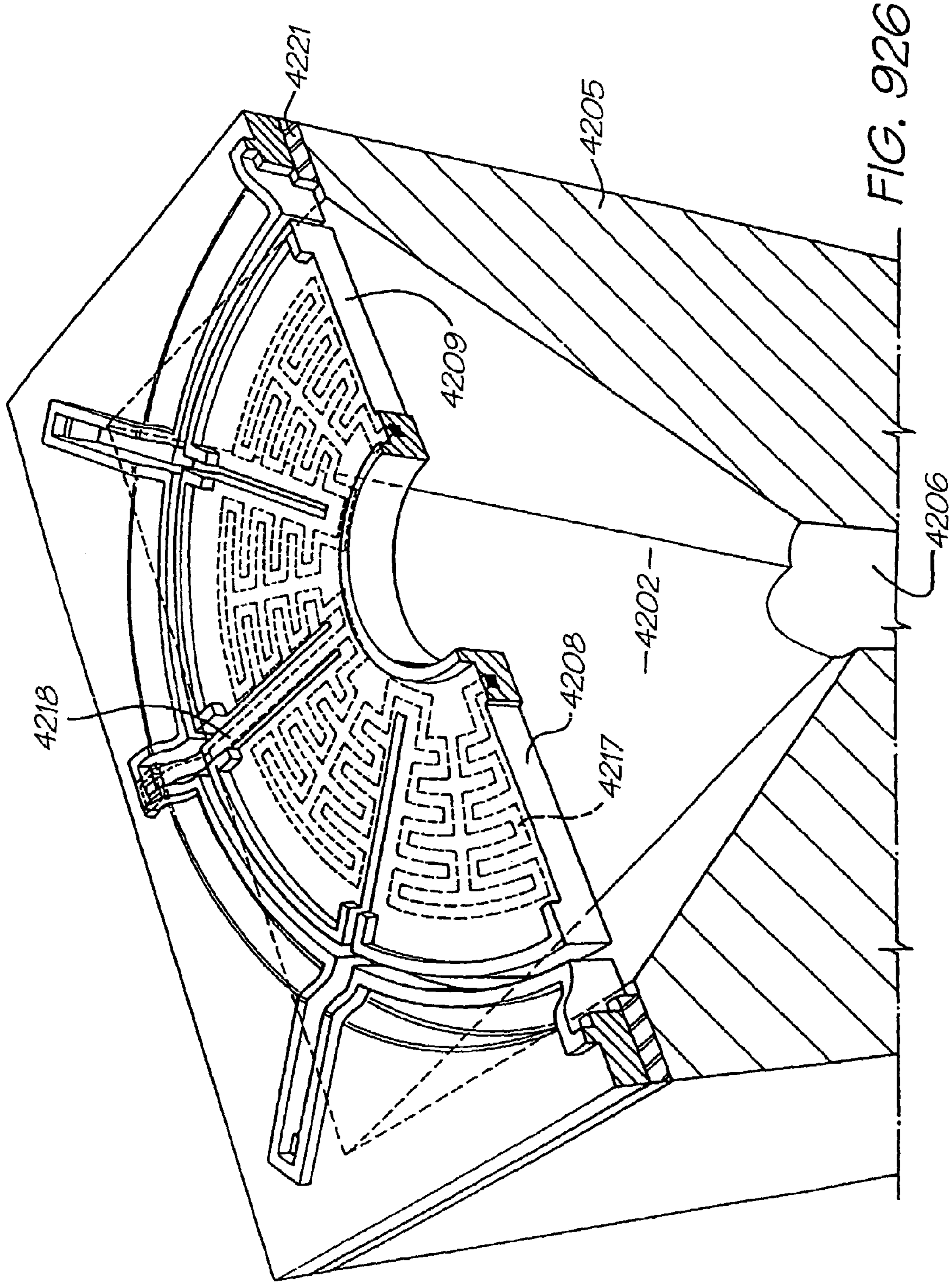
Figure 933:
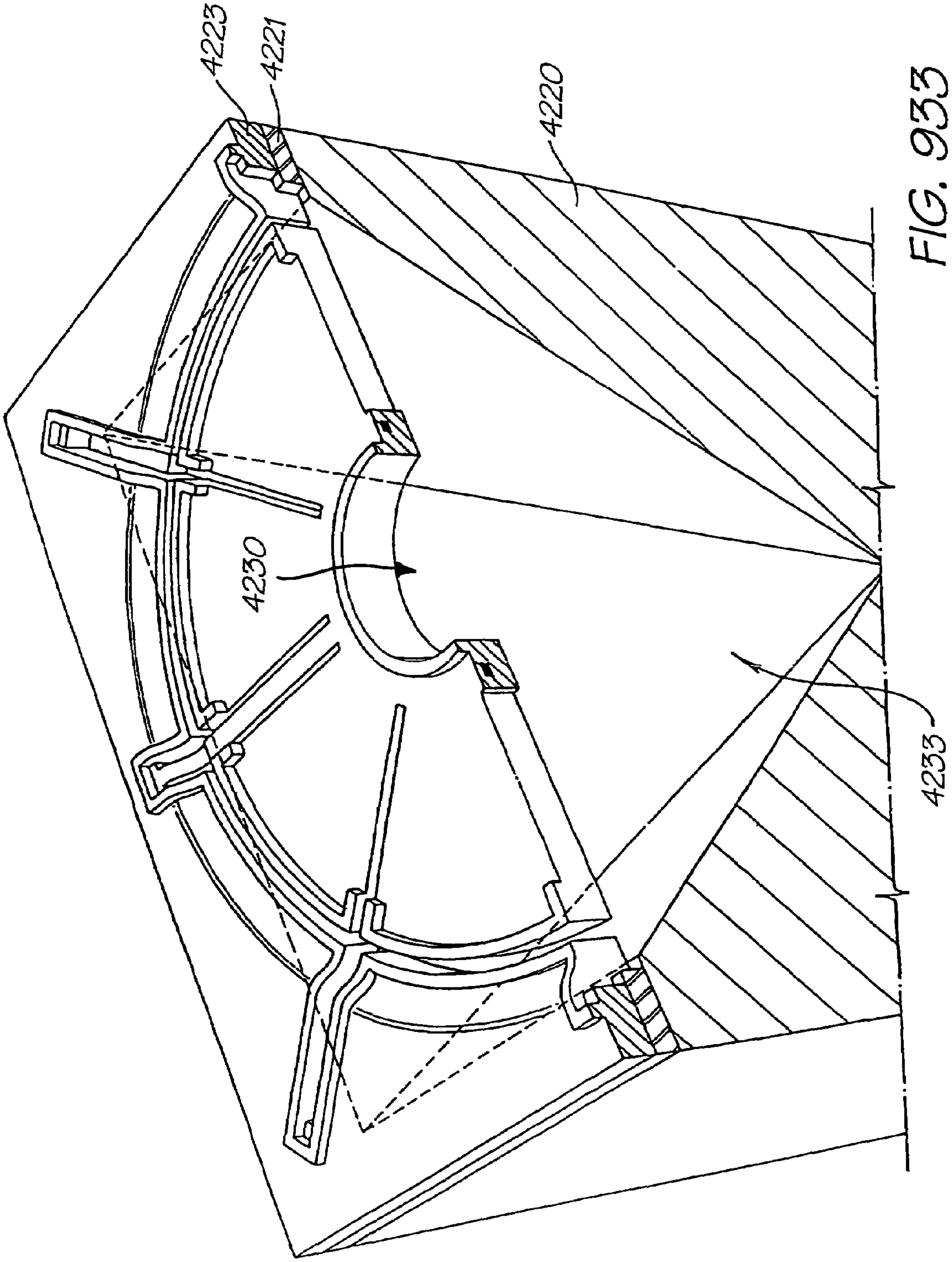
Figure 934:
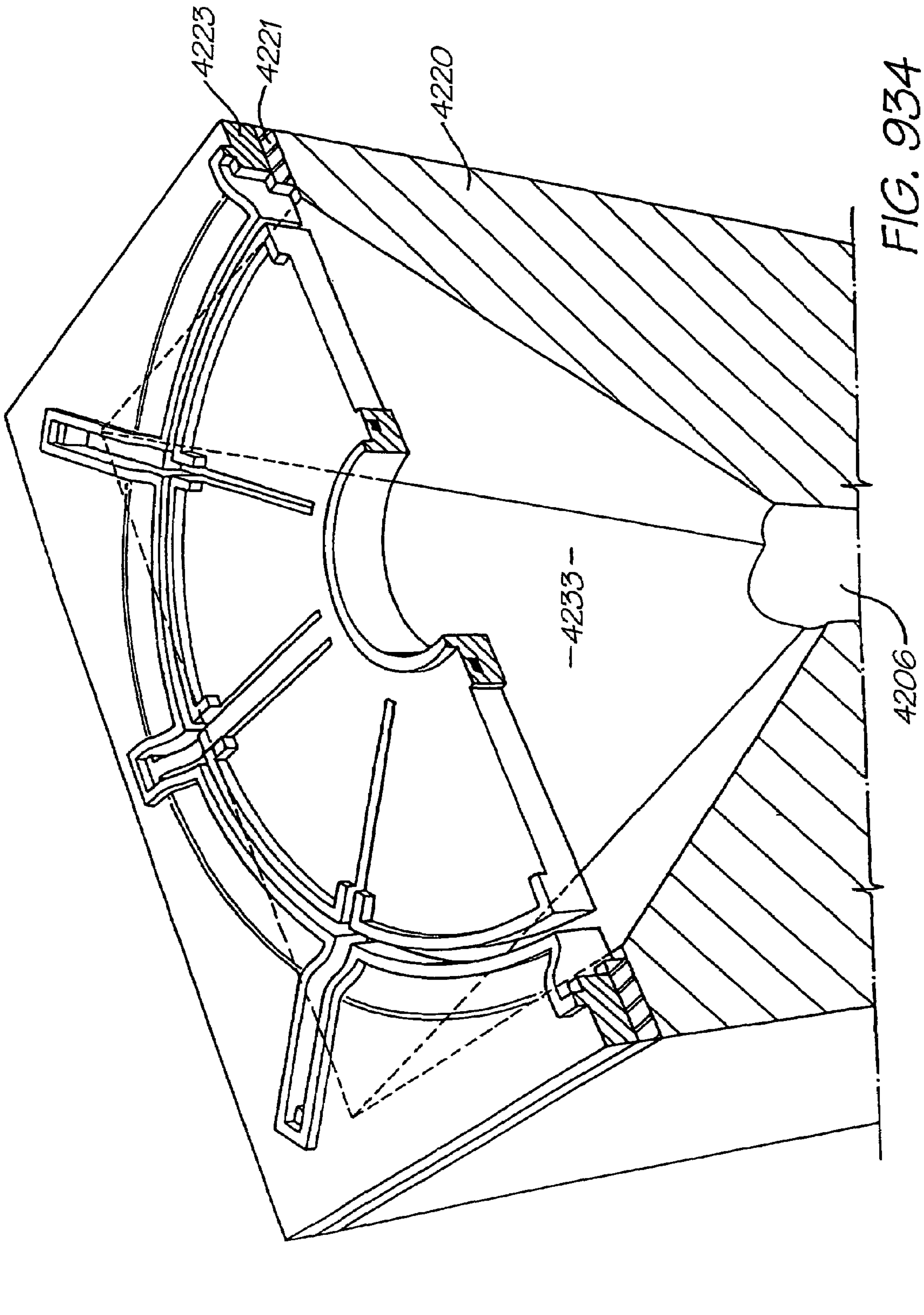
Figure 935:
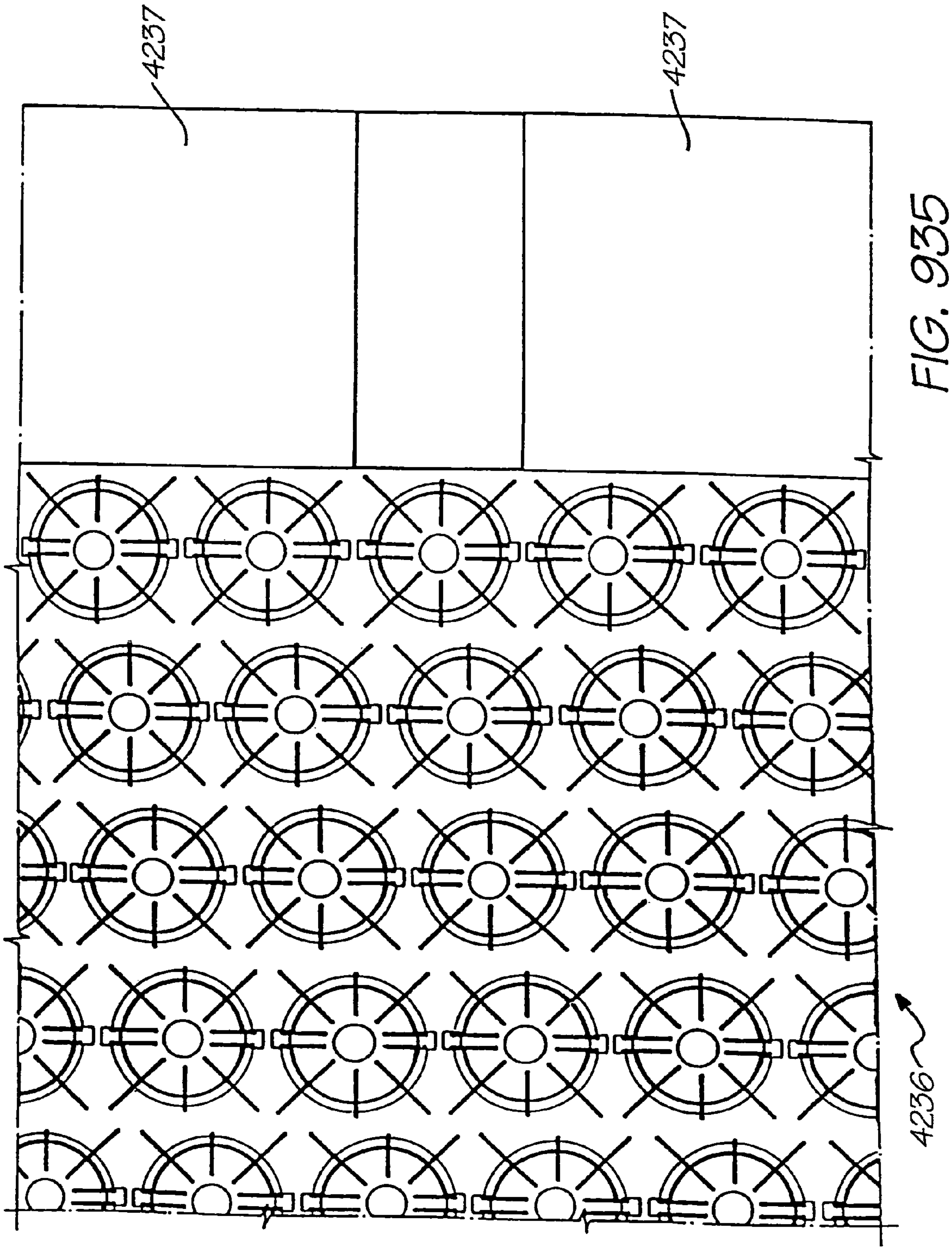
Figure 936:
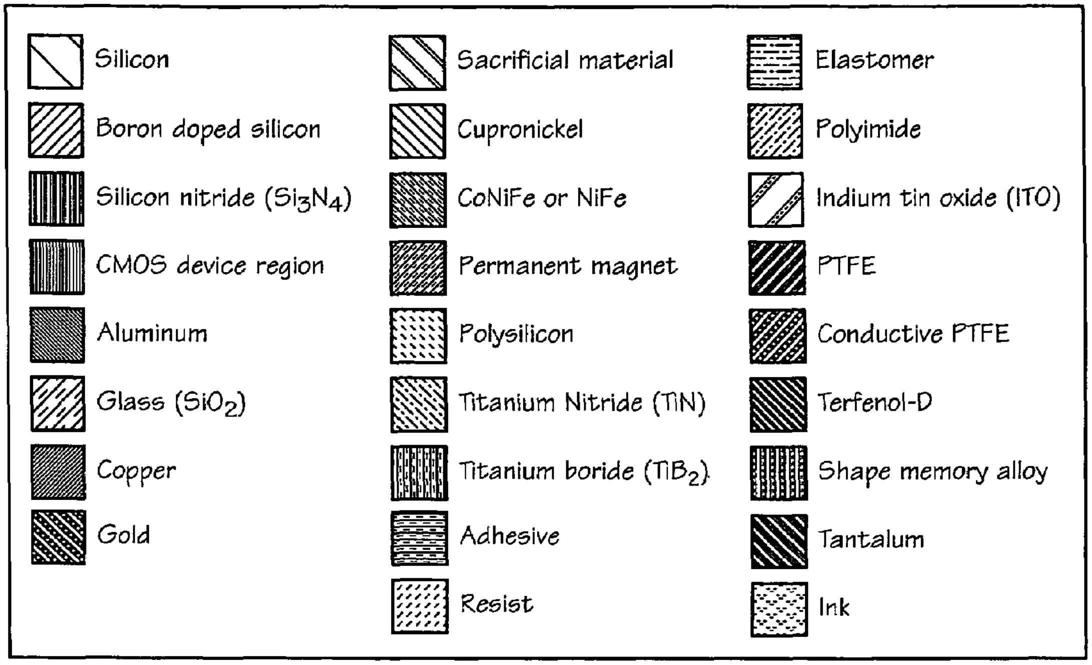
Figure 945:
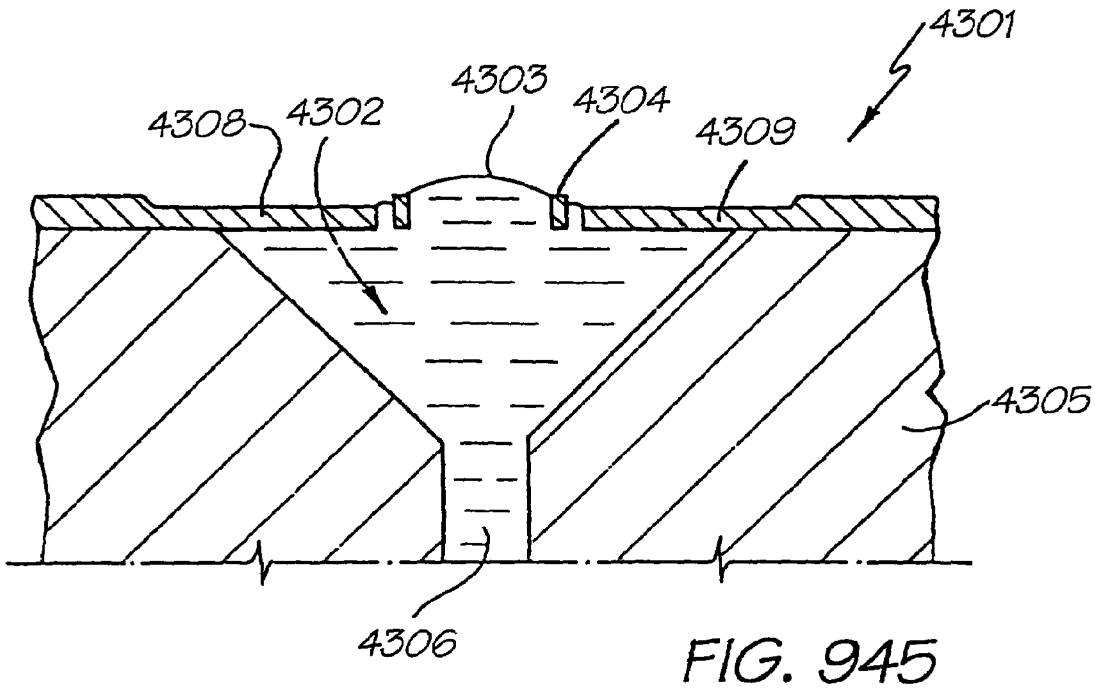
Figure 946:
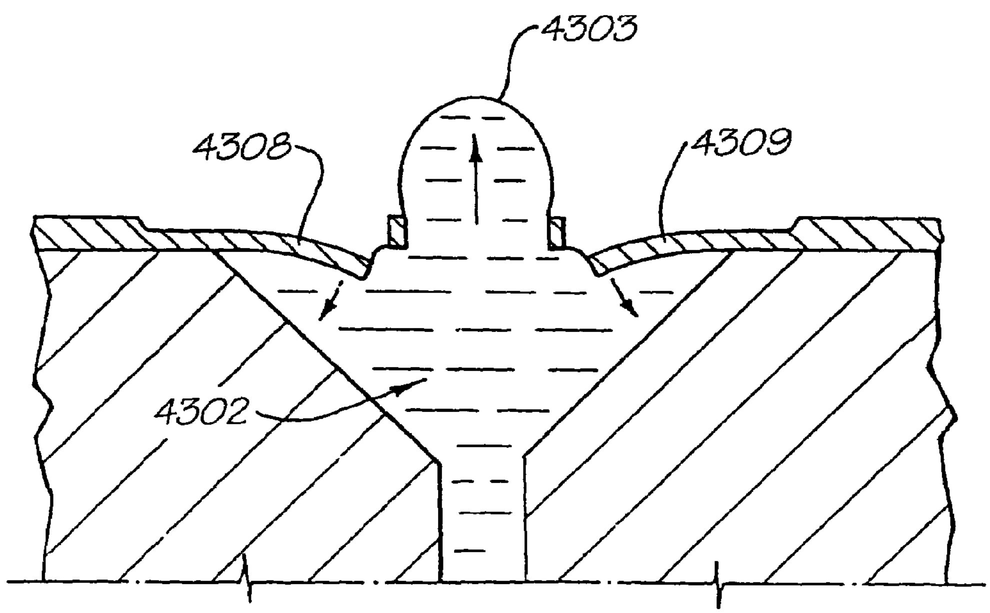
Figure 947:
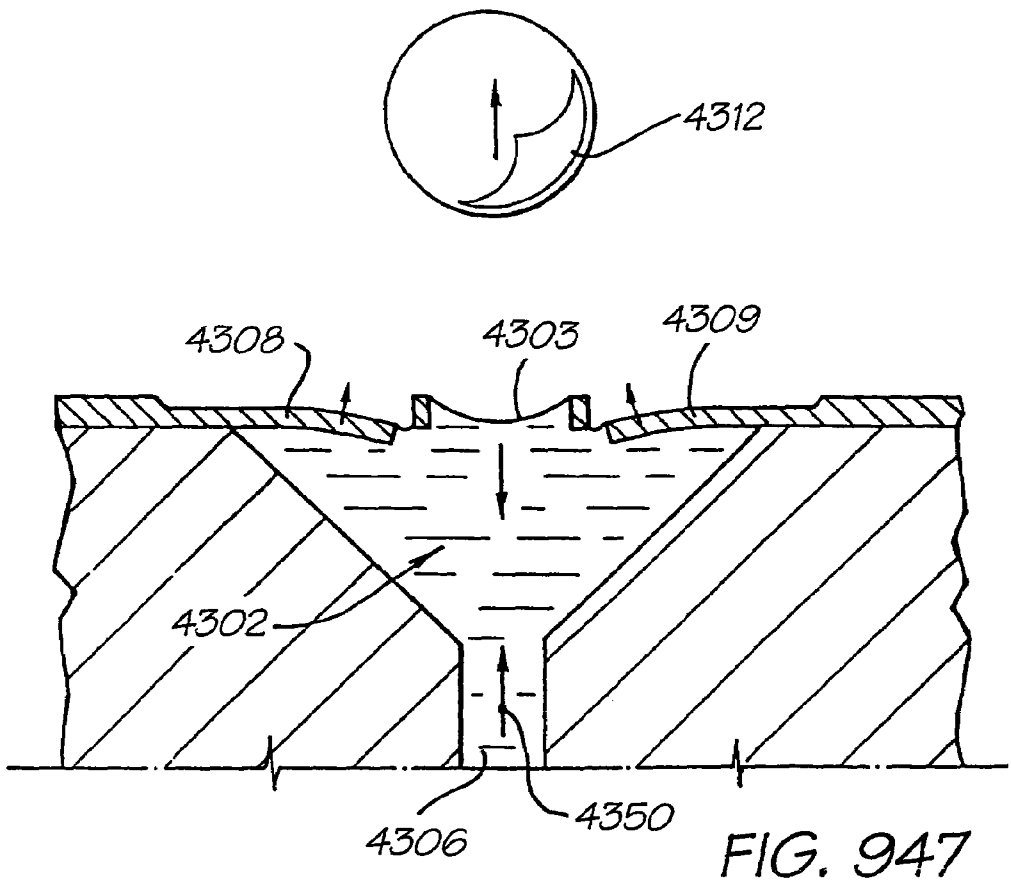
Figure 948A:
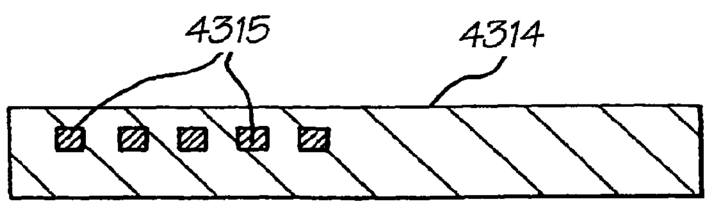
Figure 948B:
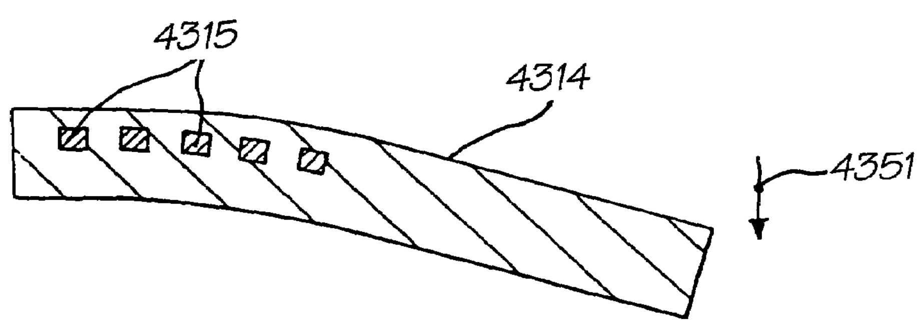
Figure 949:
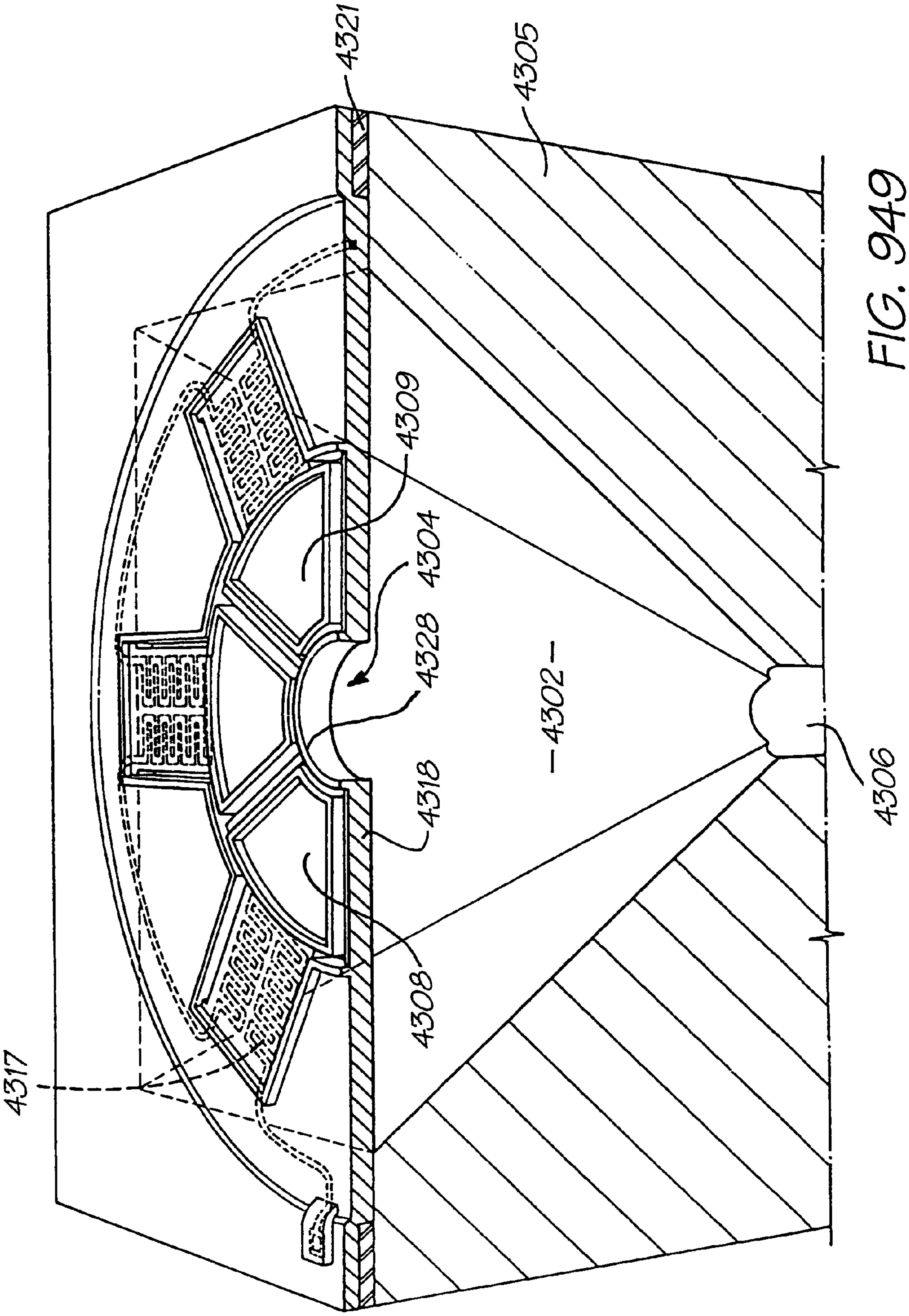
Figure 958:
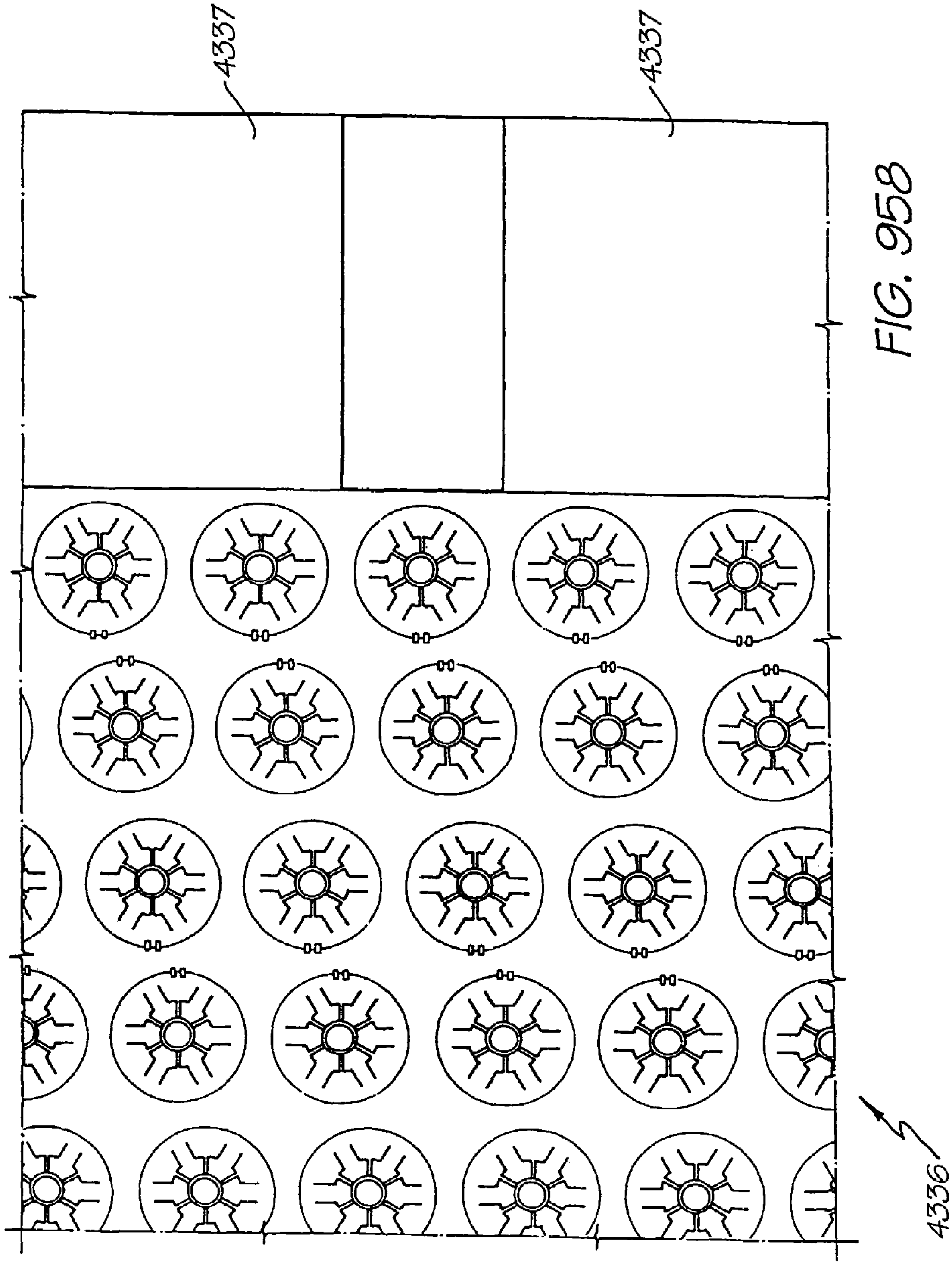
Figure 959:
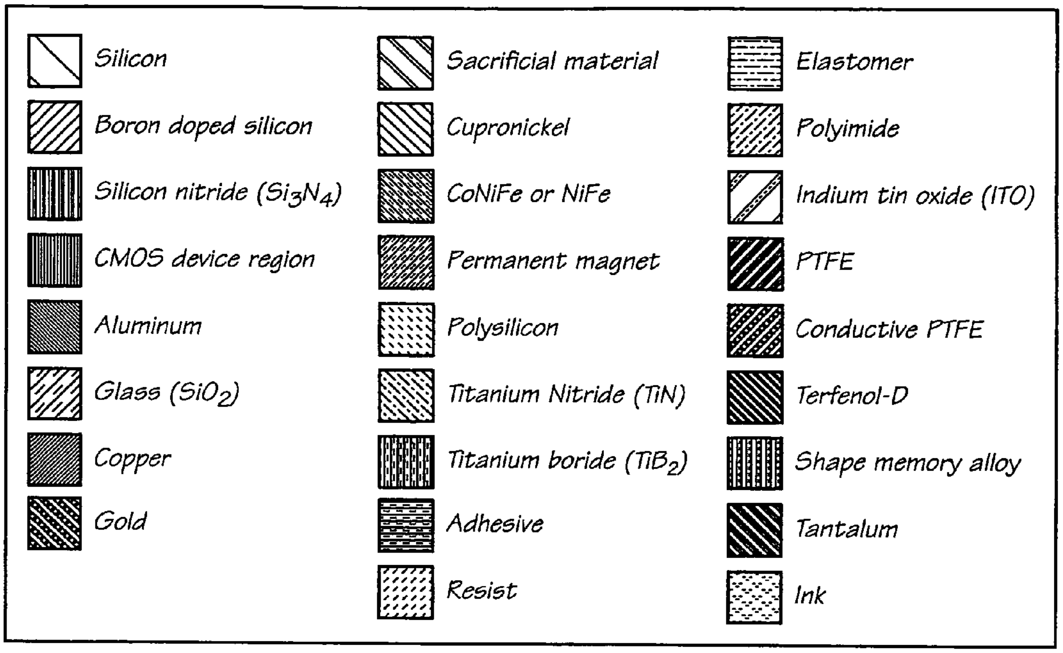
Figure 968:
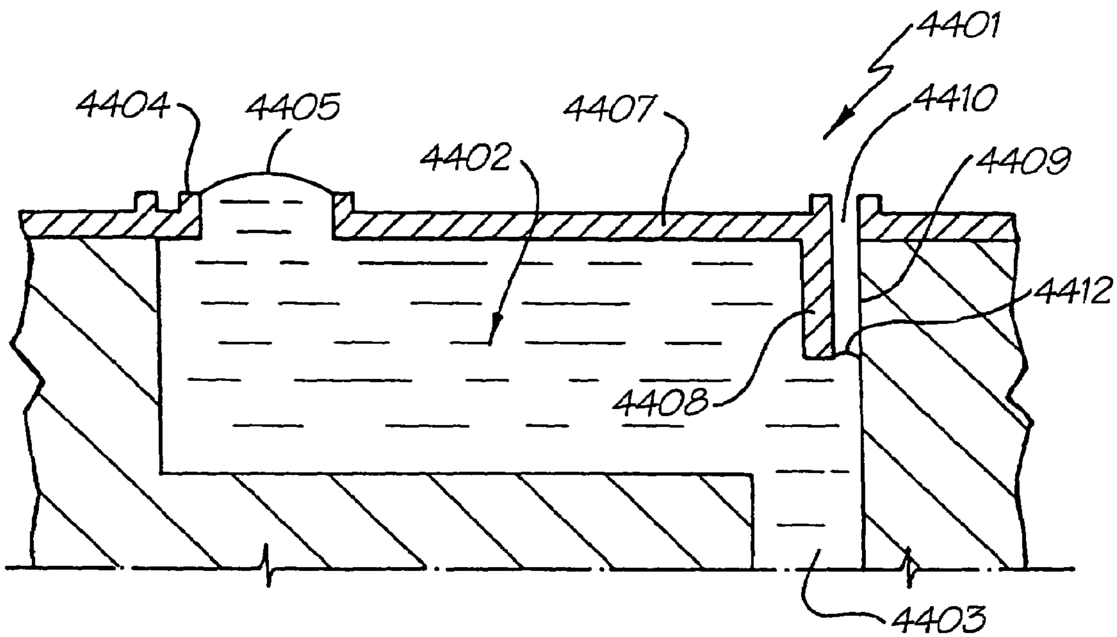
Figure 969:
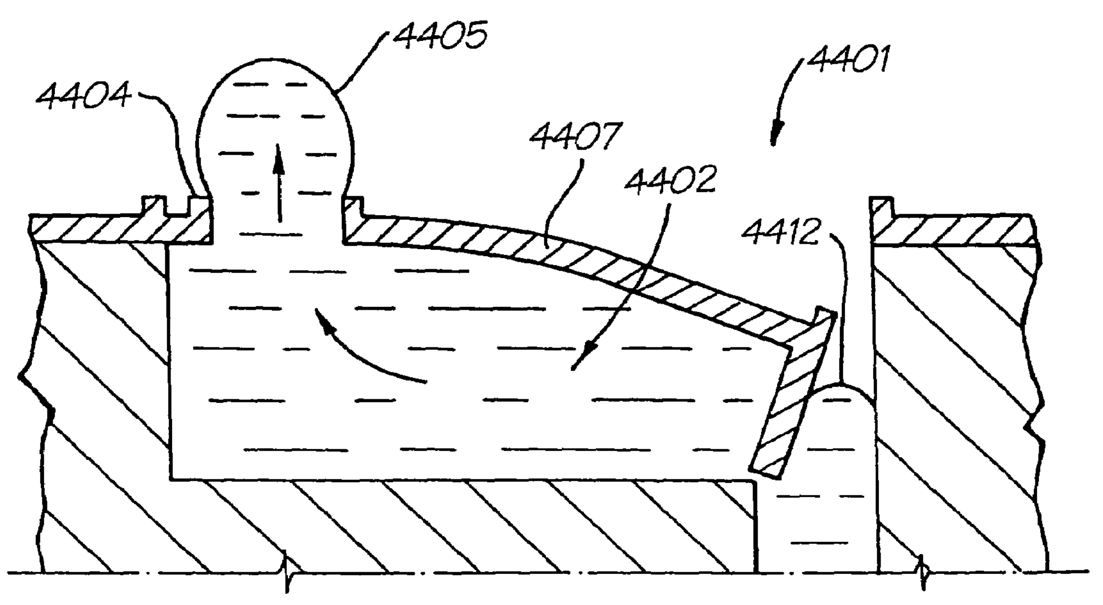
Figure 970:
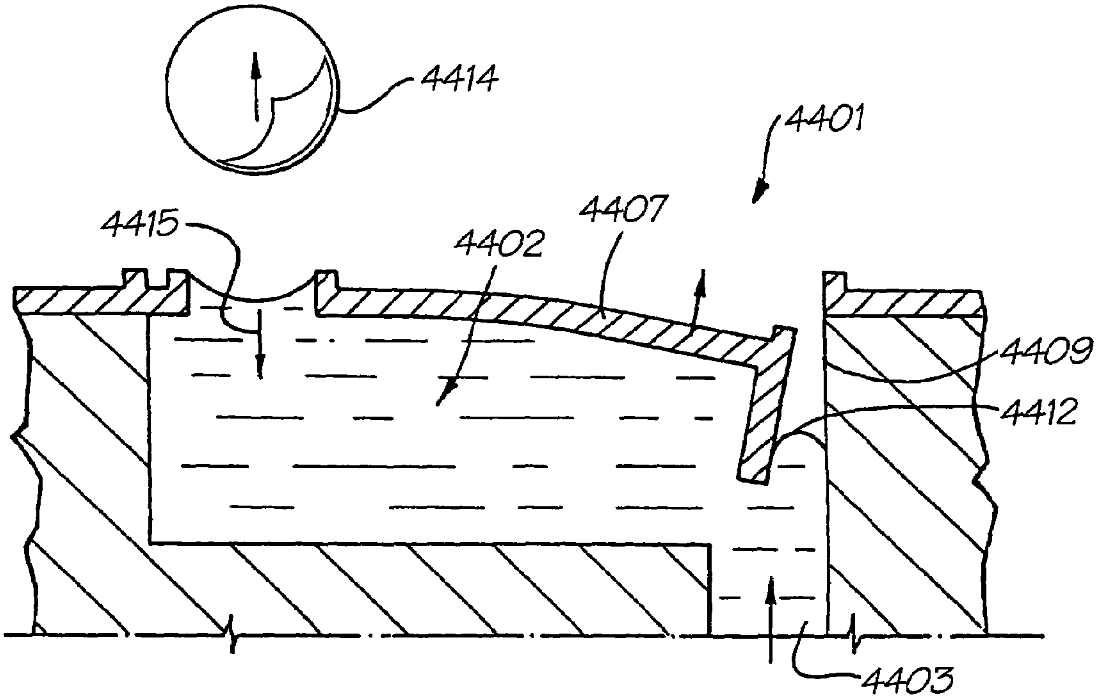
Figure 971A:
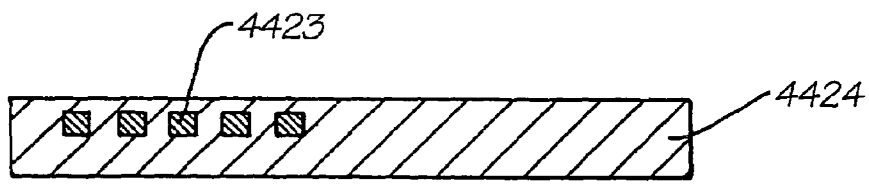
Figure 971B:
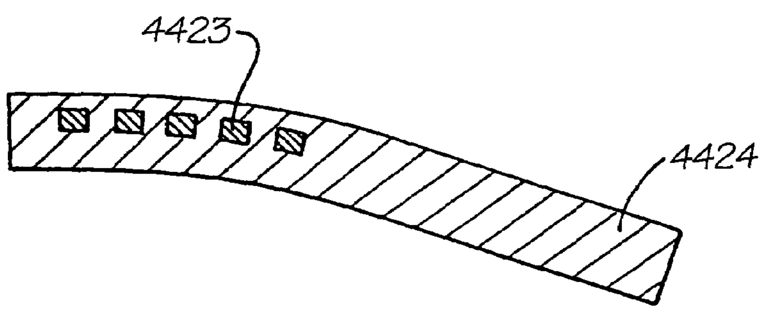
Figure 972:
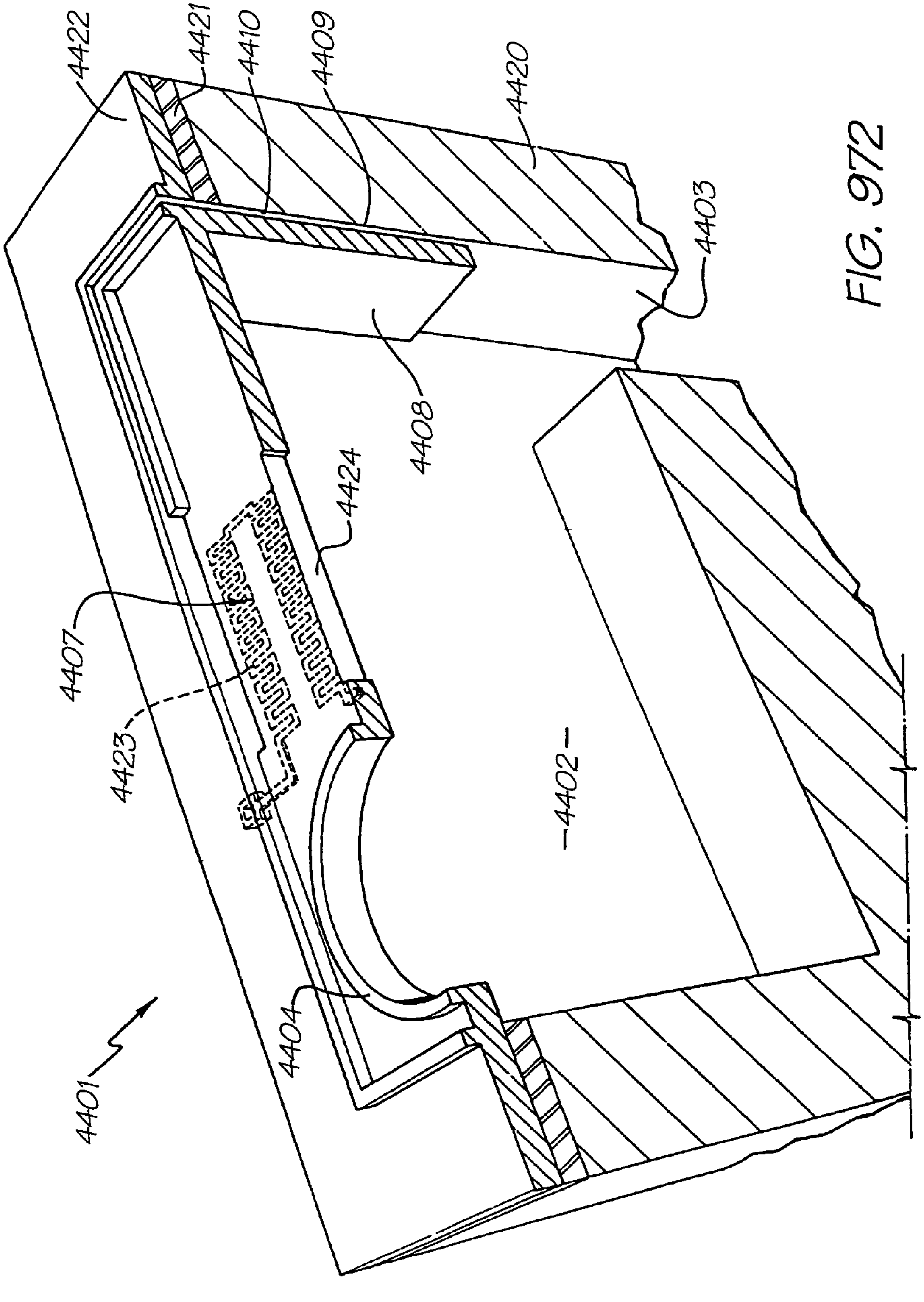
Figure 973:
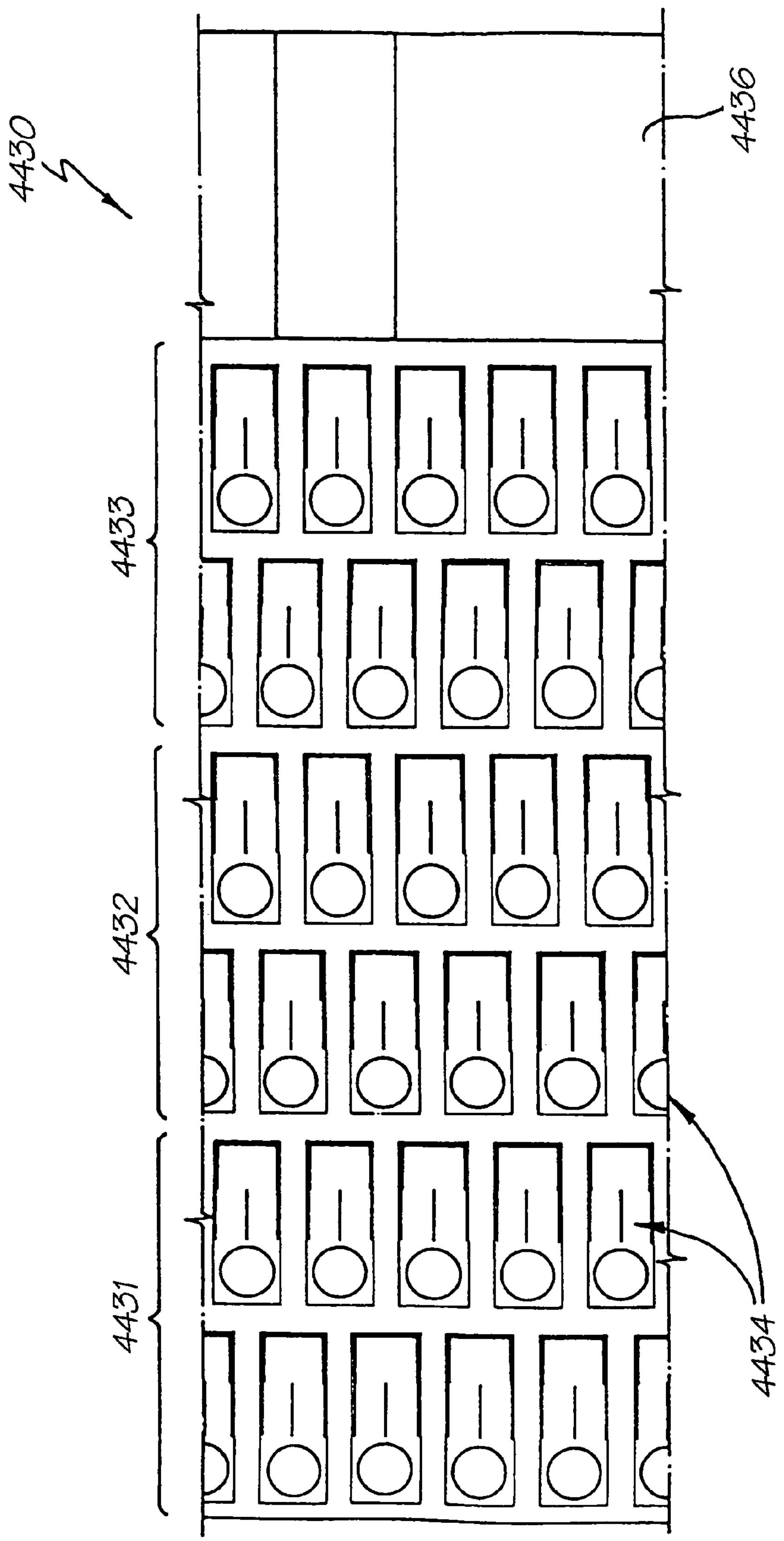

FIG. 865 provides a legend of the materials indicated in FIGS. 866 to 876;

FIG. 866 to FIG. 876 illustrate sectional views of the manufacturing steps in one form of construction of an ink jet printhead nozzle;

FIGS. 877-879 illustrate the basic operational principles of a preferred embodiment;

FIG. 880 illustrates a three dimensional view of a single ink jet nozzle arrangement constructed in accordance with a preferred embodiment;

FIG. 881 illustrates an array of the nozzle arrangements of FIG. 880;

FIG. 882 shows a table to be used with reference to FIGS. 883 to 892;

FIGS. 883 to 892 show various stages in the manufacture of the ink jet nozzle arrangement of FIG. 880;

FIGS. 893-895 illustrate the operational principles of a preferred embodiment;

FIG. 896 is a side perspective view of a single nozzle arrangement of a preferred embodiment;

FIG. 897 illustrates a sectional side view of a single nozzle arrangement;

FIGS. 898 and 898 illustrate operational principles of a preferred embodiment;

FIGS. 900-907 illustrate the manufacturing steps in the construction of a preferred embodiment;

FIG. 908 illustrates a top plan view of a single nozzle;

FIG. 909 illustrates a portion of a single color printhead device;

FIG. 910 illustrates a portion of a thee color printhead device;

FIG. 911 provides a legend of the materials indicated in FIGS. 912 to 921;

FIG. 912 to FIG. 921 illustrate sectional views of the manufacturing steps in one form of construction of an ink jet printhead nozzle;

FIGS. 922-924 are schematic sectional views illustrating the operational principles of a preferred embodiment;

FIG. 925(*a*) and FIG. 925(*b*) are again schematic sections illustrating the operational principles of the thermal actuator device;

FIG. 926 is a side perspective view, partly in section, of a single nozzle arrangement constructed in accordance with a preferred embodiments;

FIGS. 927-934 illustrate side perspective views, partly in section, illustrating the manufacturing steps of a preferred embodiments; and FIG. 935 illustrates an array of ink jet nozzles formed in accordance with the manufacturing procedures of a preferred embodiment;

FIG. 936 provides a legend of the materials indicated in FIGS. 937 to 944;

FIG. 937 to FIG. 944 illustrate sectional views of the manufacturing steps in one form of construction of an ink jet printhead nozzle;

FIGS. 945-947 are schematic sectional views illustrating the operational principles of a preferred embodiment;

FIG. 948(*a*) and FIG. 948(*b*) are again schematic sections illustrating the operational principles of the thermal actuator device;

FIG. 949 is a side perspective view, partly in section, of a single nozzle arrangement constructed in accordance with a preferred embodiments;

FIGS. 950-957 are side perspective views, partly in section, illustrating the manufacturing steps of a preferred embodiments;

FIG. 958 illustrates an array of ink jet nozzles formed in accordance with the manufacturing procedures of a preferred embodiment;

FIG. 959 provides a legend of the materials indicated in FIGS. 960 to 967;

FIG. 960 to FIG. 967 illustrate sectional views of the manufacturing steps in one form of construction of a nozzle arrangement in accordance with the invention;

FIG. 968 to FIG. 970 are schematic sectional views illustrating the operational principles of a preferred embodiment;

FIG. 971*a* and FIG. 971*b* illustrate the operational principles of the thermal actuator of a preferred embodiment;

FIG. 972 is a side perspective view of a single nozzle arrangement of a preferred embodiment;

FIG. 973 illustrates an array view of a portion of a printhead constructed in accordance with the principles of a preferred embodiment.

Figure 974:
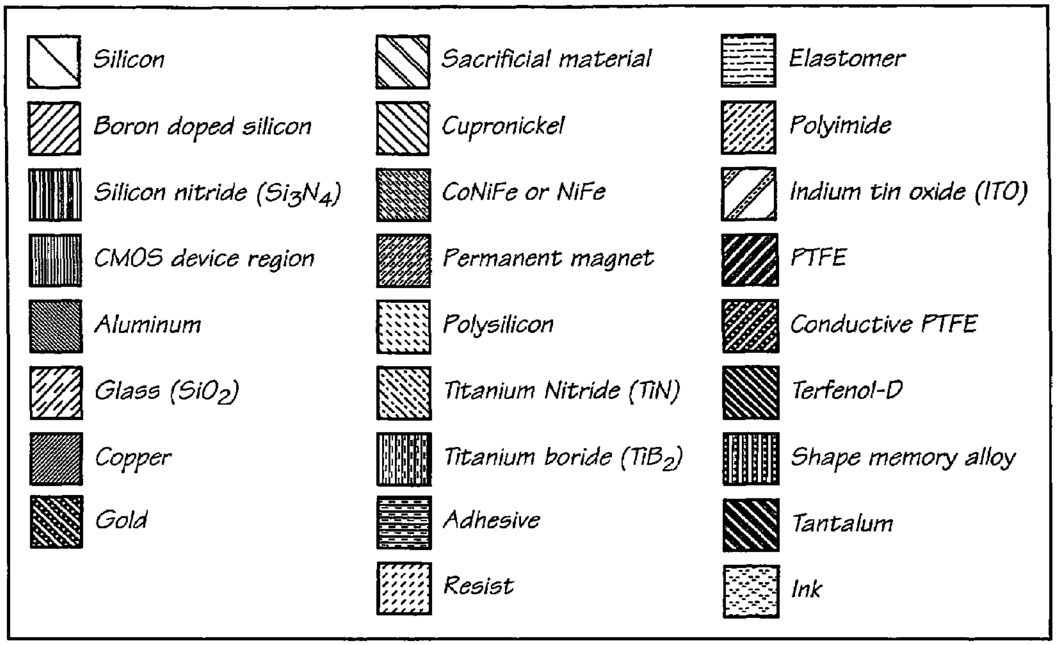
Figure 985:
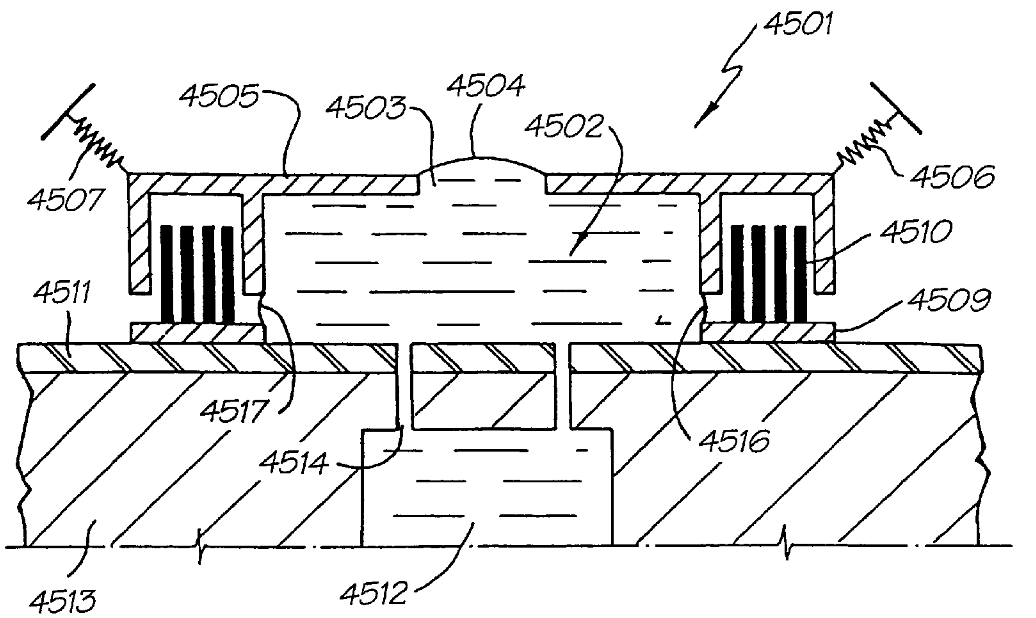
Figure 986:
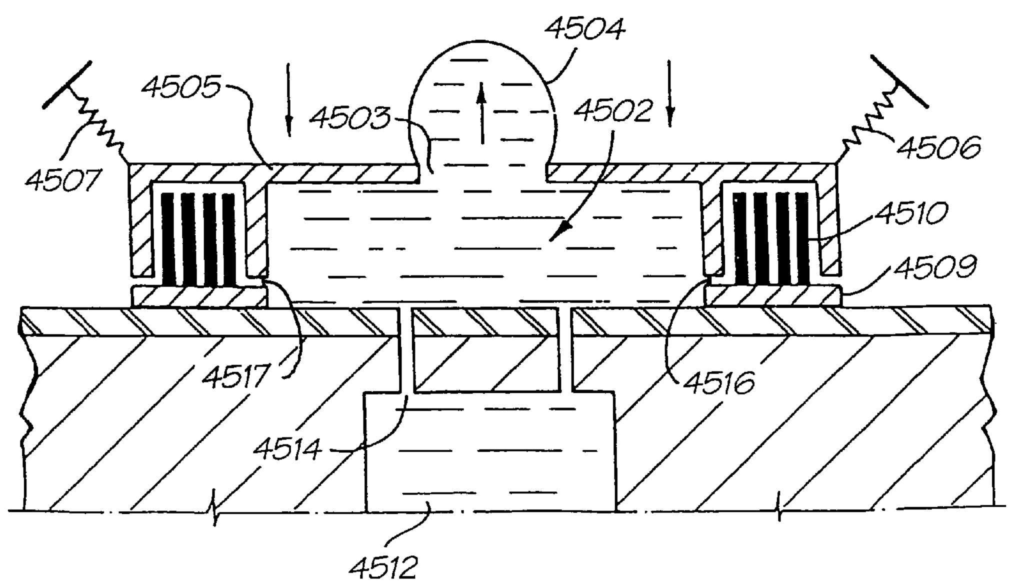
Figure 987:
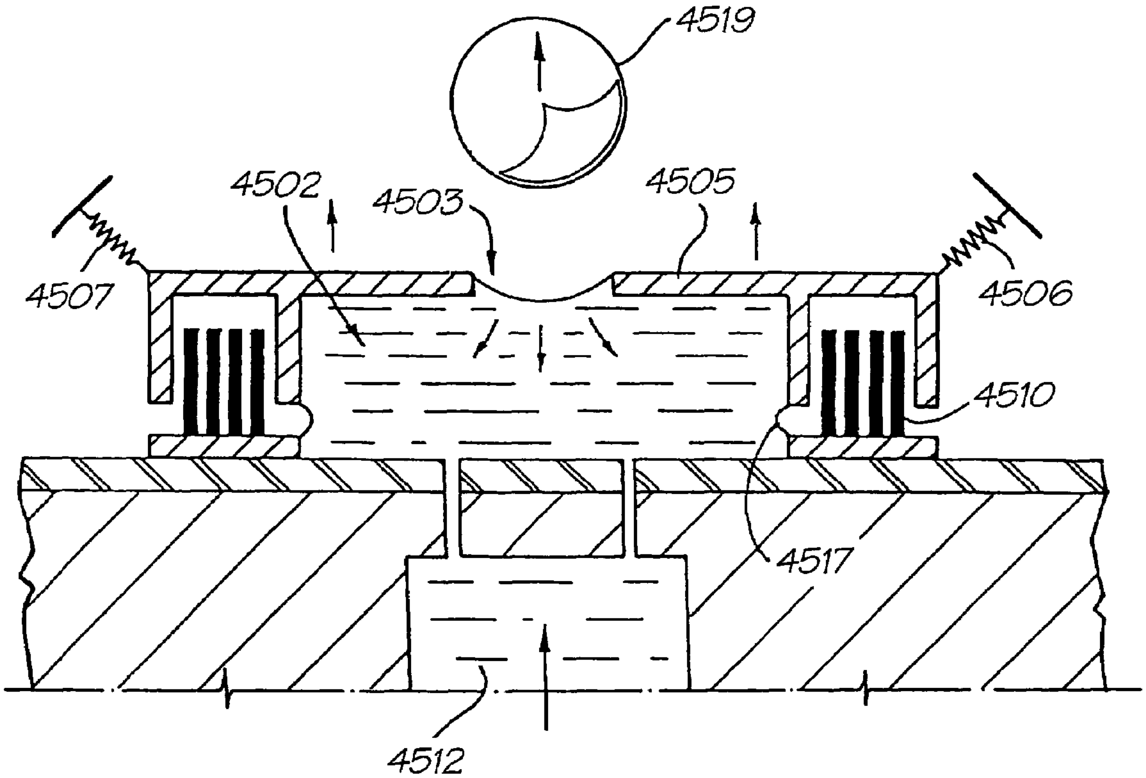

FIG. 974 provides a legend of the materials indicated in FIGS. 975 to 983;

FIG. 975 to FIG. 984 illustrate sectional views of the manufacturing steps in one form of construction of an ink jet printhead nozzle;

FIG. 985 to FIG. 987 are schematic illustrations of the operation of an ink jet nozzle arrangement of an embodiment.

Figure 988:
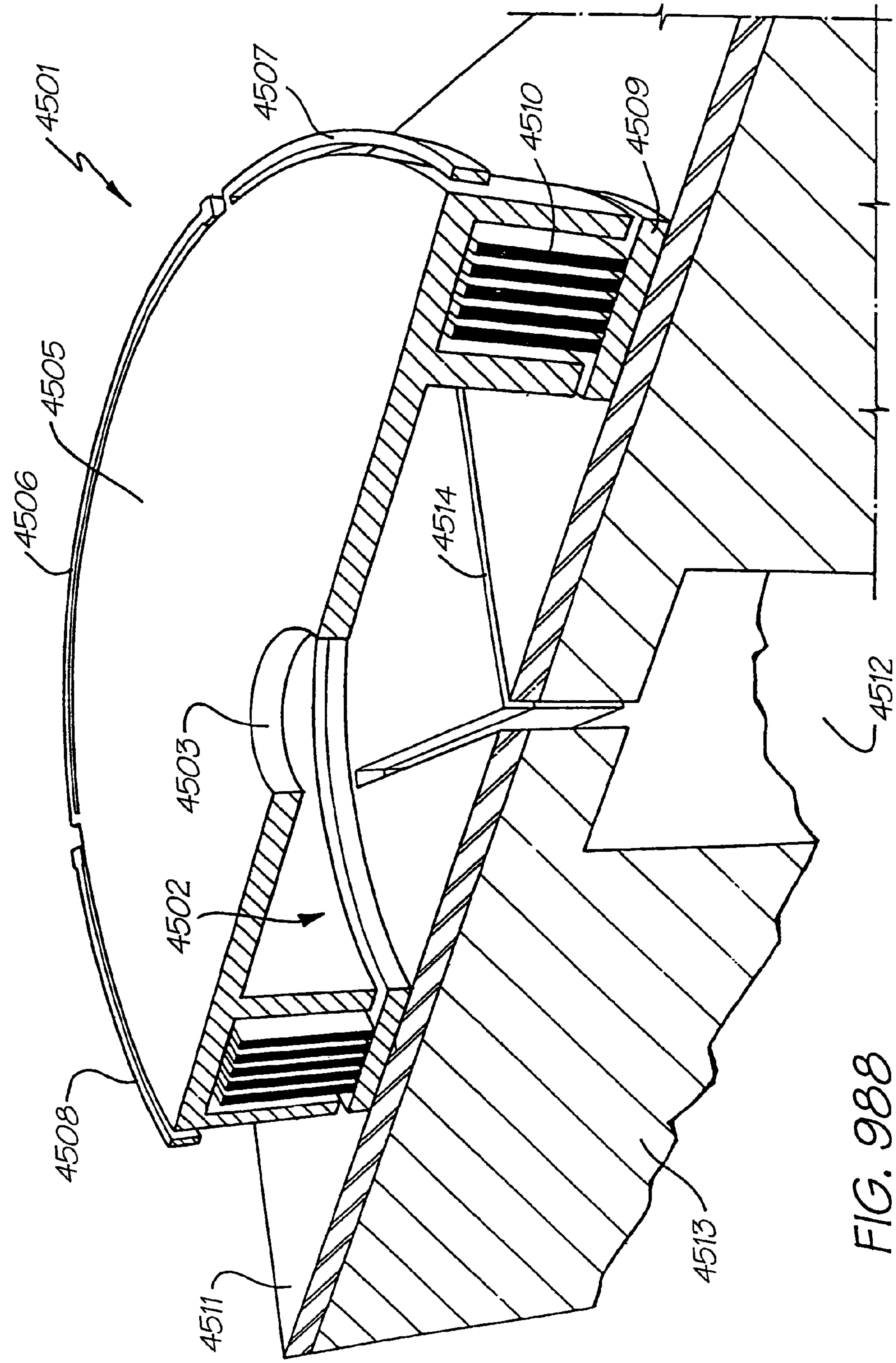
Figure 989:
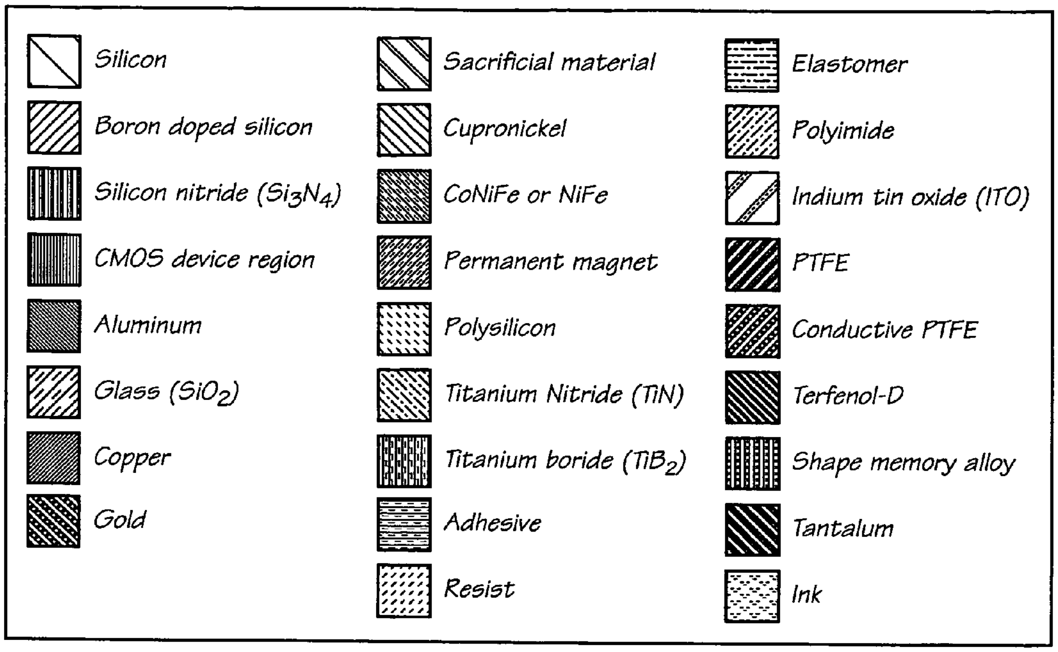

FIG. 988 illustrates a side perspective view, partly in section, of a single ink jet nozzle arrangement of an embodiment;

FIG. 989 provides a legend of the materials indicated in FIGS. 990 to 1005;

FIG. 990 to FIG. 1005 illustrate sectional views of the manufacturing steps in one form of construction of an ink jet printhead nozzle;

FIG. 1006 schematically illustrates a preferred embodiment of a single ink jet nozzle in a quiescent position;

FIG. 1007 schematically illustrates a preferred embodiment of a single inkjet nozzle in a firing position;

FIG. 1008 schematically illustrates a preferred embodiment of a single inkjet nozzle in a refilling position;

FIG. 1009 illustrates a bi-layer cooling process;

FIG. 1010 illustrates a single-layer cooling process;

FIG. 1011 is a top view of an aligned nozzle;

FIG. 1012 is a sectional view of an aligned nozzle;

FIG. 1013 is a top view of an aligned nozzle;

FIG. 1014 is a sectional view of an aligned nozzle;

FIG. 1015 is a sectional view of a process on constructing an ink jet nozzle;

FIG. 1016 is a sectional view of a process on constructing an ink jet nozzle after Chemical Mechanical Planarization;

FIG. 1017 illustrates the steps involved in the preferred embodiment in preheating the ink;

FIG. 1018 illustrates the normal printing clocking cycle;

FIG. 1019 illustrates the utilization of a preheating cycle;

FIG. 1020 illustrates a graph of likely print head operation temperature;

FIG. 1021 illustrates a graph of likely print head operation temperature;

FIG. 1022 illustrates one form of driving a print head for preheating

FIG. 1023 illustrates a sectional view of a portion of an initial wafer on which an ink jet nozzle structure is to be formed;

FIG. 1024 illustrates the mask for N-well processing;

FIG. 1025 illustrates a sectional view of a portion of the wafer after N-well processing;

FIG. 1026 illustrates a side perspective view partly in section of a single nozzle after N-well processing;

FIG. 1027 illustrates the active channel mask;

FIG. 1028 illustrates a sectional view of the field oxide;

FIG. 1029 illustrates a side perspective view partly in section of a single nozzle after field oxide deposition;

FIG. 1030 illustrates the poly mask;

FIG. 1031 illustrates a sectional view of the deposited poly;

FIG. 1032 illustrates a side perspective view partly in section of a single nozzle after poly deposition;

FIG. 1033 illustrates the n+ mask;

FIG. 1034 illustrates a sectional view of the n+ implant;

FIG. 1035 illustrates a side perspective view partly in section of a single nozzle after n+ implant;

FIG. 1036 illustrates the p+ mask;

FIG. 1037 illustrates a sectional view showing the effect of the p+ implant;

FIG. 1038 illustrates a side perspective view partly in section of a single nozzle after p+ implant;

FIG. 1039 illustrates the contacts mask;

FIG. 1040 illustrates a sectional view showing the effects of depositing ILD 1 and etching contact vias;

FIG. 1041 illustrates a side perspective view partly in section of a single nozzle after depositing ILD 1 and etching contact vias;

FIG. 1042 illustrates the Metal 1 mask;

FIG. 1043 illustrates a sectional view showing the effect of the metal deposition of the Metal 1 layer;

FIG. 1044 illustrates a side perspective view partly in section of a single nozzle after metal 1 deposition;

FIG. 1045 illustrates the Via 1 mask;

FIG. 1046 illustrates a sectional view showing the effects of depositing ILD 2 and etching contact vias;

FIG. 1047 illustrates the Metal 2 mask;

FIG. 1048 illustrates a sectional view showing the effects of depositing the Metal 2 layer;

FIG. 1049 illustrates a side perspective view partly in section of a single nozzle after metal 2 deposition;

FIG. 1050 illustrates the Via 2 mask;

FIG. 1051 illustrates a sectional view showing the effects of depositing ILD 3 and etching contact vias;

FIG. 1052 illustrates the Metal 3 mask;

FIG. 1053 illustrates a sectional view showing the effects of depositing the Metal 3 layer;

FIG. 1054 illustrates a side perspective view partly in section of a single nozzle after metal 3 deposition;

FIG. 1055 illustrates the Via 3 mask;

FIG. 1056 illustrates a sectional view showing the effects of depositing passivation oxide and nitride and etching vias;

FIG. 1057 illustrates a side perspective view partly in section of a single nozzle after depositing passivation oxide and nitride and etching vias;

FIG. 1058 illustrates the heater mask;

FIG. 1059 illustrates a sectional view showing the effect of depositing the heater titanium nitride layer;

FIG. 1060 illustrates a side perspective view partly in section of a single nozzle after depositing the heater titanium nitride layer;

FIG. 1061 illustrates the actuator/bend compensator mask;

FIG. 1062 illustrates a sectional view showing the effect of depositing the actuator glass and bend compensator titanium nitride after etching;

FIG. 1063 illustrates a side perspective view partly in section of a single nozzle after depositing and etching the actuator glass and bend compensator titanium nitride layers;

FIG. 1064 illustrates the nozzle mask;

FIG. 1065 illustrates a sectional view showing the effect of the depositing of the sacrificial layer and etching the nozzles;

FIG. 1066 illustrates a side perspective view partly in section of a single nozzle after depositing and initial etching the sacrificial layer;

FIG. 1067 illustrates the nozzle chamber mask;

FIG. 1068 illustrates a sectional view showing the etched chambers in the sacrificial layer;

FIG. 1069 illustrates a side perspective view partly in section of a single nozzle after further etching of the sacrificial layer;

FIG. 1070 illustrates a sectional view showing the deposited layer of the nozzle chamber walls;

FIG. 1071 illustrates a side perspective view partly in section of a single nozzle after further deposition of the nozzle chamber walls;

FIG. 1072 illustrates a sectional view showing the process of creating self aligned nozzles using Chemical Mechanical Planarization (CMP);

FIG. 1073 illustrates a side perspective view partly in section of a single nozzle after CMP of the nozzle chamber walls;

FIG. 1074 illustrates a sectional view showing the nozzle mounted on a wafer blank;

FIG. 1075 illustrates the back etch inlet mask;

FIG. 1076 illustrates a sectional view showing the etching away of the sacrificial layers;

FIG. 1077 illustrates a side perspective view partly in section of a single nozzle after etching away of the sacrificial layers;

FIG. 1078 illustrates a side perspective view partly in section of a single nozzle after etching away of the sacrificial layers taken along a different section line;

FIG. 1079 illustrates a sectional view showing a nozzle filled with ink;

FIG. 1080 illustrates a side perspective view partly in section of a single nozzle ejecting ink;

FIG. 1081 illustrates a schematic of the control logic for a single nozzle;

FIG. 1082 illustrates a CMOS implementation of the control logic of a single nozzle;

FIG. 1083 illustrates a legend or key of the various layers utilized in the described CMOS/MEMS implementation;

FIG. 1084 illustrates the CMOS levels up to the poly level;

FIG. 1085 illustrates the CMOS levels up to the metal 1 level;

FIG. 1086 illustrates the CMOS levels up to the metal 2 level;

FIG. 1087 illustrates the CMOS levels up to the metal 3 level;

FIG. 1088 illustrates the CMOS and MEMS levels up to the MEMS heater level;

FIG. 1089 illustrates the Actuator Shroud Level;

FIG. 1090 illustrates a side perspective partly in section of a portion of an ink jet head;

FIG. 1091 illustrates an enlarged view of a side perspective partly in section of a portion of an ink jet head;

FIG. 1092 illustrates a number of layers formed in the construction of a series of actuators;

FIG. 1093 illustrates a portion of the back surface of a wafer showing the through wafer ink supply channels;

FIG. 1094 illustrates the arrangement of segments in a print head;

FIG. 1095 illustrates schematically a single pod numbered by firing order;

FIG. 1096 illustrates schematically a single pod numbered by logical order;

FIG. 1097 illustrates schematically a single tripod containing one pod of each color;

FIG. 1098 illustrates schematically a single podgroup containing 10 tripods;

FIG. 1099 illustrates schematically, the relationship between segments, firegroups and tripods;

FIG. 1100 illustrates clocking for AEnable and BEnable during a typical print cycle;

FIG. 1101 illustrates an exploded perspective view of the incorporation of a print head into an ink channel molding support structure;

FIG. 1102 illustrates a side perspective view partly in section of the ink channel molding support structure;

FIG. 1103 illustrates a side perspective view partly in section of a print roll unit, print head and platen; and FIG. 1104 illustrates a side perspective view of a print roll unit, print head and platen;

FIG. 1105 illustrates a side exploded perspective view of a print roll unit, print head and platen;

FIG. 1106 is an enlarged perspective part view illustrating the attachment of a print head to an ink distribution manifold as shown in FIGS. 1101 and 1102;

FIG. 1107 illustrates an opened out plan view of the outermost side of the tape automated bonded film shown in FIG. 1102; and FIG. 1108 illustrates the reverse side of the opened out tape automated bonded film shown in FIG. 1107.

DESCRIPTION OF PREFERRED AND OTHER EMBODIMENTS

The ink jet designs shown here are suitable for a wide range of digital printing systems, from battery powered one-time use digital cameras, through to desktop and network printers, and through to commercial printing systems For ease of manufacture using standard process equipment, the print head is designed to be a monolithic 0.5 micron CMOS chip with MEMS post processing. For a general introduction to micro-electric mechanical systems (MEMS) reference is made to standard proceedings in this field including the proceedings of the SPIE (International Society for Optical Engineering), volumes 2642 and 2882 which contain the proceedings for recent advances and conferences in this field.

For color photographic applications, the print head is 100 mm long, with a width which depends upon the ink jet type. The smallest print head designed is IJ38, which is 0.35 mm wide, giving a chip area of 35 square mm. The print heads each contain 19,200 nozzles plus data and control circuitry.

Tables of Drop-on-Demand Ink Jets

Eleven important characteristics of the fundamental operation of individual ink jet nozzles have been identified. These characteristics are largely orthogonal, and so can be elucidated as an eleven dimensional matrix. Most of the eleven axes of this matrix include entries developed by the present assignee.

The following tables form the axes of an eleven dimensional table of ink jet types.

Actuator mechanism (18 types)
Basic operation mode (7 types)
Auxiliary mechanism (8 types)
Actuator amplification or modification method (17 types)
Actuator motion (19 types)
Nozzle refill method (4 types)
Method of restricting back-flow through inlet (10 types)
Nozzle clearing method (9 types)
Nozzle plate construction (9 types)
Drop ejection direction (5 types)
Ink type (7 types)

The complete eleven dimensional table represented by these axes contains 36.9 billion possible configurations of ink jet nozzle. While not all of the possible combinations result in a viable ink jet technology, many million configurations are viable. It is clearly impractical to elucidate all of the possible configurations. Instead, certain ink jet types have been investigated in detail. These are designated IJ01 to IJ46.

Other ink jet configurations can readily be derived from these 46 examples by substituting alternative configurations along one or more of the 11 axes. Most of the IJ01 to IJ346 examples can be made into ink jet print heads with characteristics superior to any currently available ink jet technology.

Where there are prior art examples known to the inventor, one or more of these examples are listed in the examples column of the tables below. The IJ01 to IJ46 series are also listed in the examples column. In some cases, a printer may be listed more than once in a table, where it shares characteristics with more than one entry.

Suitable applications for the ink jet technologies include: Home printers, Office network printers, Short run digital printers, Commercial print systems, Fabric printers, Pocket printers, Internet WWW printers, Video printers, Medical imaging, Wide format printers, Notebook PC printers, Fax machines, Industrial printing systems, Photocopiers, Photographic minilabs etc.

The information associated with the aforementioned 11 dimensional matrix are set out in the following tables.

| | Description | Advantages | Disadvantages | Examples |
|---|---|---|---|---|
| | | Actuator mechanism (applied only to selected ink drops) | | |
| Thermal bubble | An electrothermal heater heats the ink to above boiling point, transferring significant heat to the aqueous ink. A bubble nucleates and quickly forms, expelling the ink. The efficiency of the process is low, with typically less than 0.05% of the electrical energy being transformed into kinetic energy of the drop. | Large force generated<br>Simple construction<br>No moving parts<br>Fast operation<br>Small chip area required for actuator | High power<br>Ink carrier limited to water<br>Low efficiency<br>High temperatures required<br>High mechanical stress<br>Unusual materials required<br>Large drive transistors<br>Cavitation causes actuator failure<br>Kogation reduces bubble formation<br>Large print heads are difficult to fabricate | Canon Bubblejet 1979 Endo et al GB patent 2,007,162<br>Xerox heater-in-pit 1990 Hawkins et al U.S. Pat. No. 4,899,181<br>Hewlett-Packard TIJ 1982 Vaught et al U.S. Pat. No. 4,490,728 |
| Piezo-electric | A piezoelectric crystal such as lead lanthanum zirconate (PZT) is electrically activated, and either expands, | Low power consumption<br>Many ink types can be used<br>Fast operation | Very large area required for actuator<br>Difficult to integrate with electronics<br>High voltage drive | Kyser et al U.S. Pat. No. 3,946,398<br>Zoltan U.S. Pat. No. 3,683,212<br>1973 Stemme U.S. Pat. No. 3,747,120 |

-continued

| | Description | Advantages | Disadvantages | Examples |
|---|---|---|---|---|
| | shears, or bends to apply pressure to the ink, ejecting drops. | High efficiency | transistors required<br>Full pagewidth print heads impractical due to actuator size<br>Requires electrical poling in high field strengths during manufacture | Epson Stylus<br>Tektronix<br>IJ04 |
| Electro-strictive | An electric field is used to activate electrostriction in relaxor materials such as lead lanthanum zirconate titanate (PLZT) or lead magnesium niobate (PMN). | Low power consumption<br>Many ink types can be used<br>Low thermal expansion<br>Electric field strength required (approx. 3.5 V/micrometer) can be generated without difficulty<br>Does not require electrical poling | Low maximum strain (approx. 0.01%)<br>Large area required for actuator due to low strain<br>Response speed is marginal (~10 microseconds)<br>High voltage drive transistors required<br>Full pagewidth print heads impractical due to actuator size | Seiko Epson, Usui et all JP 253401/96<br>IJ04 |
| Ferro-electric | An electric field is used to induce a phase transition between the antiferroelectric (AFE) and ferroelectric (FE) phase. Perovskite materials such as tin modified lead lanthanum zirconate titanate (PLZSnT) exhibit large strains of up to 1% associated with the AFE to FE phase transition. | Low power consumption<br>Many ink types can be used<br>Fast operation (<1 microsecond)<br>Relatively high longitudinal strain<br>High efficiency<br>Electric field strength of around 3 V/micron can be readily provided | Difficult to integrate with electronics<br>Unusual materials such as PLZSnT are required<br>Actuators require a large area | IJ04 |
| Electro-static plates | Conductive plates are separated by a compressible or fluid dielectric (usually air). Upon application of a voltage, the plates attract each other and displace ink, causing drop ejection. The conductive plates may be in a comb or honeycomb structure, or stacked to increase the surface area and therefore the force. | Law power consumption<br>Many ink types can be used<br>Fast operation | Difficult to operate electrostatic devices in an aqueous environment<br>The electrostatic actuator will normally need to be separated from the ink<br>Very large area required to achieve high forces<br>High voltage drive transistors may be required<br>Full pagewidth print heads are not competitive due to actuator size | IJ02, IJ04 |
| Electro-static pull on ink | A strong electric field is applied to the ink, whereupon electrostatic attraction accelerates the ink towards the print medium. | Low current consumption<br>Low temperature | High voltage required<br>May be damaged by sparks due to air breakdown<br>Required field strength increases as the drop size decreases<br>High voltage drive transistors required<br>Electrostatic field attracts dust | 1989 Saito et al, U.S. Pat. No. 4,799,068<br>1989 Miura et al, U.S. Pat. No. 4,810,954<br>Tone-jet |
| Permanent magnet electro-magnetic | An electromagnet directly attracts a permanent magnet, displacing ink and causing drop ejection. Rare earth magnets with a field strength around 1 Tesla can be used. Examples are: Samarium Cobalt (SaCo) and magnetic materials in the neodymium iron boron | Low power consumption<br>Many ink types can be used<br>Fast operation<br>High efficiency<br>Easy extension from single nozzles to pagewidth print heads | Complex fabrication<br>Permanent magnetic material such as Neodymium Iron Boron (NdFeB) required.<br>High local currents required<br>Copper metalization should be used for long electromigration lifetime and low resistivity | IJ07, IJ10 |

-continued

| | Description | Advantages | Disadvantages | Examples |
|---|---|---|---|---|
| | family (NdFeB, NdDyFeBNb, NdDyFeB, etc) | | Pigmented inks are usually infeasible<br>Operating temperature limited to the Curie temperature (around 540 K) | |
| Soft magnetic core electro-magnetic | A solenoid induced a magnetic field in a soft magnetic core or yoke fabricated from a ferrous material such as electroplated iron alloys such as CoNiFe [1], CoFe, or NiFe alloys. Typically, the soft magnetic material is in two parts, which are normally held apart by a spring. When the solenoid is actuated, the two parts attract, displacing the ink. | Low power consumption<br>Many ink types can be used<br>Fast operation<br>High efficiency<br>Easy extension from single nozzles to pagewidth print heads | Complex fabrication<br>Materials not usually present in a CMOS fab such as NiFe, CoNiFe, or CoFe are required<br>High local currents required<br>Copper metalization should be used for long electromigration lifetime and low resistivity<br>Electroplating is required<br>High saturation flux density is required (2.0-2.1 T is achievable with CoNiFe [1]) | IJ01, IJ05, IJ08, IJ10, IJ12, IJ14, IJ15, IJ17 |
| Lorenz force | The Lorenz force acting on a current carrying wire in a magnetic field is utilized.<br>This allows the magnetic field to be supplied externally to the print head, for example with rare earth permanent magnets.<br>Only the current carrying wire need be fabricated on the print-head, simplifying materials requirements. | Low power consumption<br>Many ink types can be used<br>Fast operation<br>High efficiency<br>Easy extension from single nozzles to pagewidth print heads | Force acts as a twisting motion<br>Typically, only a quarter of the solenoid length provides force in a useful direction<br>High local currents required<br>Copper metalization should be used for long electromigration lifetime and low resistivity<br>Pigmented inks are usually infeasible | IJ06, IJ11, IJ13, IJ16 |
| Magneto-striction | The actuator uses the giant magnetostrictive effect of materials such as Terfenol-D (an alloy of terbium, dysprosium and iron developed at the Naval Ordnance Laboratory, hence Ter-Fe-NOL). For best efficiency, the actuator should be pre-stressed to approx. 8 MPa. | Many ink types can be used<br>Fast operation<br>Easy extension from single nozzles to pagewidth print heads<br>High force is available | Force acts as a twisting motion<br>Unusual materials such as Terfenol-D are required<br>High local currents required<br>Copper metalization should be used for long electromigration lifetime and low resistivity<br>Pre-stressing may be required | Fischenbeck, U.S. Pat. No. 4,032,929<br>IJ25 |
| Surface tension reduction | Ink under positive pressure is held in a nozzle by surface tension. The surface tension of the ink is reduced below the bubble threshold, causing the ink to egress from the nozzle. | Low power consumption<br>Simple construction<br>No unusual materials required in fabrication<br>High efficiency<br>Easy extension from single nozzles to pagewidth print heads | Requires supplementary force to effect drop separation<br>Requires special ink surfactants<br>Speed may be limited by surfactant properties | Silverbrook, EP 0771 658 A2 and related patent applications |
| Viscosity reduction | The ink viscosity is locally reduced to select which drops are to be ejected. A viscosity reduction can be achieved electrothermally with most inks, but special inks can be engineered for a 100:1 viscosity reduction. | Simple construction<br>No unusual materials required in fabrication<br>Easy extension from single nozzles to pagewidth print heads | Requires supplementary force to effect drop separation<br>Requires special ink viscosity properties<br>High speed is difficult to achieve<br>Requires oscillating ink pressure<br>A high temperature difference (typically 80 degrees) is required | Silverbrook, EP 0771 658 A2 and related patent applications |
| Acoustic | An acoustic wave is generated and focussed | Can operate without a nozzle plate | Complex drive circuitry<br>Complex fabrication | 1993 Hadimioglu et al, EUP 550,192 |

-continued

| | Description | Advantages | Disadvantages | Examples |
|---|---|---|---|---|
| | upon the drop ejection region. | | Low efficiency<br>Poor control of drop position<br>Poor control of drop volume | 1993 Elrod et al, EUP 572,220 |
| Thermo-elastic bend actuator | An actuator which relies upon differential thermal expansion upon Joule heating is used. | Low power consumption<br>Many ink types can be used<br>Simple planar fabrication<br>Small chip area required for each actuator<br>Fast operation<br>High efficiency<br>CMOS compatible voltages and currents<br>Standard MEMS processes can be used<br>Easy extension from single nozzles to pagewidth print heads | Efficient aqueous operation requires a thermal insulator on the hot side<br>Corrosion prevention can be difficult<br>Pigmented inks may be infeasible, as pigment particles may jam the bend actuator | IJ03, IJ09, IJ17, IJ18, IJ19, IJ20, IJ21, IJ22, IJ23, IJ24, IJ27, IJ28, IJ29, IJ30, IJ31, IJ32, IJ33, IJ34, IJ35, IJ36, IJ37, IJ38, IJ39, IJ40, IJ41 |
| High CTE thermo-elastic actuator | A material with a very high coefficient of thermal expansion (CTE) such as polytetrafluoroethylene (PTFE) is used. As high CTE materials are usually non-conductive, a heater fabricated from a conductive material is incorporated. A 50 micron long PTFE bend actuator with polysilicon heater and 15 mW power input can provide 180 microNewton force and 10 micron deflection. Actuator motions include:<br>Bend<br>Push<br>Buckle<br>Rotate | High force can be generated<br>Three methods of PTFE deposition are under development: chemical vapor deposition (CVD), spin coating, and evaporation<br>PTFE is a candidate for low dielectric constant insulation in ULSI<br>Very low power consumption<br>Many ink types can be used<br>Simple planar fabrication<br>Small chip area required for each actuator<br>Fast operation<br>High efficiency<br>CMOS compatible voltages and currents<br>Easy extension from single nozzles to pagewidth print heads | Requires special material (e.g. PTFE)<br>Requires a PTFE deposition process, which is not yet standard in ULSI fabs<br>PTFE deposition cannot be followed with high temperature (above 350° C.) processing<br>Pigmented inks may be infeasible, as pigment particles may jam the bend actuator | IJ09, IJ17, IJ18, IJ20, IJ21, IJ22, IJ23, IJ24, IJ27, IJ28, IJ29, IJ30, IJ31, IJ42, IJ43, IJ44 |
| Conductive polymer thermo-elastic actuator | A polymer with a high coefficient of thermal expansion (such as PTFE) is doped with conducting substances to increase its conductivity to about 3 orders of magnitude below that of copper. The conducting polymer expands when resistively heated. Examples of conducting dopants include:<br>Carbon nanotubes<br>Metal fibers<br>Conductive polymers such as doped polythiophene<br>Carbon granules | High force can be generated<br>Veiy low power consumption<br>Many ink types can be used<br>Simple planar fabrication<br>Small chip area required for each actuator<br>Fast operation<br>High efficiency<br>CMOS compatible voltages and currents<br>Easy extension from single nozzles to pagewidth print heads | Requires special materials development (High CTE conductive polymer)<br>Requires a PTFE deposition process, which is not yet standard in ULSI fabs<br>PTFE deposition cannot be followed with high temperature (above 350° C.) processing<br>Evaporation and CVD deposition techniques cannot be used<br>Pigmented inks may be infeasible, as pigment particles may jam the bend actuator | IJ24 |
| Shape memory alloy | A shape memory alloy such as TiNi (also known as Nitinol - Nickel Titanium alloy developed at the Naval | High force is available (stresses of hundreds of MPa)<br>Large strain is available (more than 3%) | Fatigue limits maximum number of cycles<br>Low strain (1%) is required to extend | IJ26 |

-continued

| | Description | Advantages | Disadvantages | Examples |
|---|---|---|---|---|
| | Ordnance Laboratory) is thermally switched between its weak martensitic state and its high stiffness austenic state. The shape of the actuator in its martensitic state is deformed relative to the austenic shape. The shape change causes ejection of a drop. | High corrosion resistance<br>Simple construction<br>Easy extension from single nozzles to pagewidth print heads<br>Low voltage operation | fatigue resistance<br>Cycle rate limited by heat removal<br>Requires unusual materials (TiNi)<br>The latent heat of transformation must be provided<br>High current operation<br>Requires pre-stressing to distort the martensitic state | |
| Linear Magnetic Actuator | Linear magnetic actuators include the Linear Induction Actuator (LIA), Linear Permanent Magnet Synchronous Actuator (LPMSA), Linear Reluctance Synchronous Actuator (LRSA), Linear Switched Reluctance Actuator (LSRA), and the Linear Stepper Actuator (LSA). | Linear Magnetic actuators can be constructed with high thrust, long travel, and high efficiency using planar semiconductor fabrication techniques<br>Long actuator travel is available<br>Medium force is available<br>Low voltage operation | Requires unusual semiconductor materials such as soft magnetic alloys (e.g. CoNiFe)<br>Some varieties also require permanent magnetic materials such as Neodymium iron boron (NdFeB)<br>Requires complex multi-phase drive circuitry<br>High current operation | IJ12 |
| | | **Basic operation mode** | | |
| Actuator directly pushes ink | This is the simplest made of operation: the actuator directly supplies sufficient kinetic energy to expel the drop. The drop must have a sufficient velocity to overcome the surface tension. | Simple operation<br>No external fields required<br>Satellite drops can be avoided if drop velocity is less than 4 m/s<br>Can be efficient, depending upon the actuator used | Drop repetition rate is usually limited to around 10 kHz. However, this is not fundamental to the method, but is related to the refill method normally used<br>All of the drop kinetic energy must be provided by the actuator<br>Satellite drops usually form if drop velocity is greater than 4.5 m/s | Thermal ink jet<br>Piezoelectnc ink jet<br>IJ01, IJ02, IJ03, IJ04, IJ05, IJ06, IJ07, IJ09, IJ11, IJ12, IJ14, IJ16, IJ20, IJ22, IJ23, IJ24, IJ25, IJ26, IJ27, IJ28, IJ29, IJ30, IJ31, IJ32, IJ33, IJ34, IJ35, IJ36, IJ37, IJ38, IJ39, IJ40, IJ41, IJ42, IJ43, IJ44 |
| Proximity | The drops to be printed are selected by some manner (e.g. thermally induced surface tension reduction of pressurized ink). Selected drops are separated from the ink in the nozzle by contact with the print medium or a transfer roller. | Very simple print head fabrication can be used<br>The drop selection means does not need to provide the energy required to separate the drop from the nozzle | Requires close proximity between the print head and the print media or transfer roller<br>May require two print heads printing alternate rows of the image<br>Monolithic color print heads are difficult | Silverbrook, EP 0771 658 A2 and related patent applications |
| Electro-static pull on ink | The drops to be printed are selected by some manner (e.g. thermally induced surface tension reduction of pressurized ink). Selected drops are separated from the ink in the nozzle by a strong electric field. | Very simple print head fabrication can be used<br>The drop selection means does not need to provide the energy required to separate the drop from the nozzle | Requires very high electrostatic field<br>Electrostatic field for small nozzle sizes is above air breakdown<br>Electrostatic field may attract dust | Silverbrook, EP 0771 658 A2 and related patent applications<br>Tone-Jet |
| Magnetic pull on ink | The drops to be printed are selected by some manner (e.g. thermally induced surface tension reduction of pressurized ink). Selected drops are separated from the ink in the nozzle by a strong magnetic field acting on the magnetic ink. | Very simple print head fabrication can be used<br>The drop selection means does not need to provide the energy required to separate the drop from the nozzle | Requires magnetic ink<br>Ink colors other than black are difficult<br>Requires very high magnetic fields | Silverbrook, EP 0771 658 A2 and related patent applications |

-continued

| | Description | Advantages | Disadvantages | Examples |
|---|---|---|---|---|
| Shutter | The actuator moves a shutter to block ink flow to the nozzle. The ink pressure is pulsed at a multiple of the drop ejection frequency. | High speed (>50 kHz) operation can be achieved due to reduced refill time<br>Drop timing can be very accurate<br>The actuator energy can be very low | Moving parts are required<br>Requires ink pressure modulator<br>Friction and wear must be considered<br>Stiction is possible | IJ13, IJ17, IJ21 |
| Shuttered grill | The actuator moves a shutter to block ink flow through a grill to the nozzle. The shutter movement need only be equal to the width of the grill holes, | Actuators with small travel can be used<br>Actuators with small force can be used<br>High speed (>50 kHz) operation can be achieved | Moving parts are required<br>Requires ink pressure modulator<br>Friction and wear must be considered<br>Stiction is possible | IJ08, IJ15, IJ18, IJ19 |
| Pulsed magnetic pull on ink pusher | A pulsed magnetic field attracts an 'ink pusher' at the drop ejection frequency. An actuator controls a catch, which prevents the ink pusher from moving when a drop is not to be ejected. | Extremely low energy operation is possible<br>No heat dissipation problems | Requires an external pulsed magnetic field<br>Requires special materials for both the actuator and the ink pusher<br>Complex construction | IJ10 |
| | | Auxiliary mechanism (applied to all nozzles) | | |
| None | The actuator directly fires the ink drop, and there is no external field or other mechanism required. | Simplicity of construction<br>Simplicity of operation<br>Small physical size | Drop ejection energy must be supplied by individual nozzle actuator | Most ink jets, including piezoelectric and thermal bubble.<br>IJ01, IJ02, IJ03, IJ04, IJ05, IJ07, IJ09, IJ11, IJ12, IJ14, IJ20, IJ22, IJ23, IJ24, IJ25, IJ26, IJ27, IJ28, IJ29, IJ30, IJ31, IJ32, IJ33, IJ34, IJ35, IJ36, IJ37, IJ38, IJ39, IJ40, IJ41, IJ42, IJ43, IJ44 |
| Oscillating ink pressure (including acoustic stimulation) | The ink pressure oscillates, providing much of the drop ejection energy. The actuator selects which drops are to be fired by selectively blocking or enabling nozzles. The ink pressure oscillation may be achieved by vibrating the print head, or preferably by an actuator in the ink supply. | Oscillating ink pressure can provide a refill pulse, allowing higher operating speed<br>The actuators may operate with much lower energy<br>Acoustic lenses can be used to focus the sound on the nozzles | Requires external ink pressure oscillator<br>Ink pressure phase and amplitude must be carefully controlled<br>Acoustic reflections in the ink chamber must be designed for | Silverbrook, EP 0771 658 A2 and related patent applications<br>IJ08, IJ13, IJ15, IJ17, IJ18, IJ19, IJ21 |
| Media proximity | The print head is placed in close proximity to the print medium. Selected drops protrude from the print head further than unselected drops, and contact the print medium. The drop soaks into the medium fast enough to cause drop separation. | Low power<br>High accuracy<br>Simple print head construction | Precision assembly required<br>Paper fibers may cause problems<br>Cannot print on rough substrates | Silverbrook, EP 0771 658 A2 and related patent applications |
| Transfer roller | Drops are printed to a transfer roller instead of straight to the print medium. A transfer roller can also be used for proximity drop separation. | High accuracy<br>Wide range of print substrates can be used<br>Ink can be dried on the transfer roller | Bulky<br>Expensive<br>Complex construction | Silverbrook, EP 0771 658 A2 and related patent applications<br>Tektronix hot melt piezoelectric ink jet<br>Any of the IJ series |
| Electro-static | An electric field is used to accelerate selected drops towards the print medium. | Low power<br>Simple print head construction | Field strength required for separation of small drops is near or above air breakdown | Silverbrook, EP 0771 658 A2 and related patent applications<br>Tone-Jet |

-continued

| | Description | Advantages | Disadvantages | Examples |
|---|---|---|---|---|
| Direct magnetic field | A magnetic field is used to accelerate selected drops of magnetic ink towards the print medium. | Low power<br>Simple print head construction | Requires magnetic ink<br>Requires strong magnetic field | Silverbrook, EP 0771 658 A2 and related patent applications |
| Cross magnetic field | The print head is placed in a constant magnetic field. The Lorenz force in a current carrying wire is used to move the actuator. | Does not require magnetic materials to be integrated in the print head manufacturing process | Requires external magnet<br>Current densities may be high, resulting in electromigration problems | IJ06, IJ16 |
| Pulsed magnetic field | A pulsed magnetic field is used to cyclically attract a paddle, which pushes on the ink. A small actuator moves a catch, which selectively prevents the paddle from moving. | Very low power operation is possible<br>Small print head size | Complex print head construction<br>Magnetic materials required in print head | IJ10 |
| | | Actuator amplification or modification method | | |
| None | No actuator mechanical amplification is used. The actuator directly drives the drop ejection process. | Operational simplicity | Many actuator mechanisms have insufficient travel, or insufficient force, to efficiently drive the drop ejection process | Thermal Bubble Ink jet<br>IJ01, IJ02, IJ06, IJ07, IJ16, IJ25, IJ26 |
| Differential expansion bend actuator | An actuator material expands more on one side than on the other. The expansion may be thermal, piezoelectric, magnetostrictive, or other mechanism. The bend actuator converts a high force low travel actuator mechanism to high travel, lower force mechanism. | Provides greater travel in a reduced print head area | High stresses are involved<br>Care must be taken that the materials do not delaminate<br>Residual bend resulting from high temperature or high stress during formation | Piezoelectric<br>IJ03, IJ09, IJ17, IJ18, IJ19, IJ20, IJ21, IJ22, IJ23, IJ24, IJ27, IJ29, IJ30, IJ31, IJ32, IJ33, IJ34, IJ35, IJ36, IJ37, IJ38, IJ39, IJ42, IJ43, IJ44 |
| Transient bend actuator | A trilayer bend actuator where the two outside layers are identical. This cancels bend due to ambient temperature and residual stress. The actuator only responds to transient heating of one side or the other. | Very good temperature stability<br>High speed, as a new drop can be fired before heat dissipates<br>Cancels residual stress of formation | High stresses are involved<br>Care must be taken that the materials do not delaminate | IJ40, IJ41 |
| Reverse spring | The actuator loads a spring. When the actuator is turned off, the spring releases. This can reverse the force/distance curve of the actuator to make it compatible with the force/time requirements of the drop ejection. | Better coupling to the ink | Fabrication complexity<br>High stress in the spring | IJ05, IJ11 |
| Actuator stack | A series of thin actuators are stacked. This can be appropriate where actuators require high electric field strength, such as electrostatic and piezoelectric actuators. | Increased travel<br>Reduced drive voltage | Increased fabrication complexity<br>Increased possibility of short circuits due to pinholes | Some piezoelectric ink jets<br>IJ04 |
| Multiple actuators | Multiple smaller actuators are used simultaneously to move the ink. Each actuator need provide only a portion of the force required. | Increases the force available from an actuator<br>Multiple actuators can be positioned to control ink flow accurately | Actuator forces may not add linearly, reducing efficiency | IJ12, IJ13, IJ18, IJ20, IJ22, IJ28, IJ42, IJ43 |
| Linear Spring | A linear spring is used to transform a motion with small travel and high force into a longer | Matches low travel actuator with higher travel requirements<br>Non-contact method of | Requires print head area for the spring | IJ15 |

-continued

| | Description | Advantages | Disadvantages | Examples |
|---|---|---|---|---|
| | travel, lower force motion. | motion transformation | | |
| Coiled actuator | A bend actuator is coiled to provide greater travel in a reduced chip area. | Increases travel<br>Reduces chip area<br>Planar implementations are relatively easy to fabricate. | Generally restricted to planar implementations due to extreme fabrication difficulty in other orientations. | IJ17, IJ21, IJ34, IJ35 |
| Flexure bend actuator | A bend actuator has a small region near the fixture point, which flexes much more readily than the remainder of the actuator. The actuator flexing is effectively converted from an even coiling to an angular bend, resulting in greater travel of the actuator tip. | Simple means of increasing travel of a bend actuator | Care must be taken not to exceed the elastic limit in the flexure area<br>Stress distribution is very uneven<br>Difficult to accurately model with finite element analysis | IJ10, IJ19, IJ33 |
| Catch | The actuator controls a small catch. The catch either enables or disables movement of an ink pusher that is controlled in a bulk manner. | Very low actuator energy<br>Very small actuator size | Complex construction<br>Requires external force<br>Unsuitable for pigmented inks | IJ10 |
| Gears | Gears can be used to increase travel at the expense of duration. Circular gears, rack and pinion, ratchets, and other gearing methods can be used. | Low force, low travel actuators can be used<br>Can be fabricated using standard surface MEMS processes | Moving parts are required<br>Several actuator cycles are required<br>More complex drive electronics<br>Complex construction<br>Friction, friction, and wear are possible | IJ13 |
| Buckle plate | A buckle plate can be used to change a slow actuator into a fast motion. It can also convert a high force, low travel actuator into a high travel, medium force motion. | Very fast movement achievable | Must stay within elastic limits of the materials for long device life<br>High stresses involved<br>Generally high power requirement | S. Hirata et al, "An Ink-jet Head Using Diaphragm Microactuator", Proc. IEEE MEMS, Feb. 1996, pp 418-423.<br>IJ18, IJ27 |
| Tapered magnetic pole | A tapered magnetic pole can increase travel at the expense of force. | Linearizes the magnetic force/distance curve | Complex construction | IJ14 |
| Lever | A lever and fulcrum is used to transform a motion with small travel and high force into a motion with longer travel and lower force. The lever can also reverse the direction of travel. | Matches low travel actuator with higher travel requirements<br>Fulcrum area has no linear movement, and can be used for a fluid seal | High stress around the fulcrum | IJ32, IJ36, IJ37 |
| Rotary impeller | The actuator is connected to a rotary impeller. A small angular deflection of the actuator results in a rotation of the impeller vanes, which push the ink against stationary vanes and out of the nozzle. | High mechanical advantage<br>The ratio of force to travel of the actuator can be matched to the nozzle requirements by varying the number of impeller vanes | Complex construction<br>Unsuitable for pigmented inks | IJ28 |
| Acoustic lens | A refractive or diffractive (e.g. zone plate) acoustic lens is used to concentrate sound waves. | No moving parts | Large area required<br>Only relevant for acoustic ink jets | 1993 Hadimioglu et al, EUP 550,192<br>1993 Elrod et al, EUP 572,220 |
| Sharp conductive point | A sharp point is used to concentrate an electrostatic field. | Simple construction | Difficult to fabricate using standard VLSI processes for a surface ejecting ink-jet<br>Only relevant for electrostatic ink jets | Tone-jet |

-continued

| | Description | Advantages | Disadvantages | Examples |
|---|---|---|---|---|
| | | Actuator motion | | |
| Volume expansion | The volume of the actuator changes, pushing the ink in all directions. | Simple construction in the case of thermal ink jet | High energy is typically required to achieve volume expansion. This leads to thermal stress, cavitation, and kogation in thermal ink jet implementations | Hewlett-Packard Thermal Ink jet Canon Bubblejet |
| Linear, normal to chip surface | The actuator moves in a direction normal to the print head surface. The nozzle is typically in the line of movement. | Efficient coupling to ink drops ejected normal to the surface | High fabrication complexity may be required to achieve perpendicular motion | IJL, IJ02, IJ04, IJ07, IJ11, IJ14 |
| Parallel to chip surface | The actuator moves parallel to the print head surface. Drop ejection may still be normal to the surface. | Suitable for planar fabrication | Fabrication complexity Friction Stiction | IJ12, IJ13, IJ15, IJ33, , IJ34, IJ35, IJ36 |
| Membrane push | An actuator with a high force but small area is used to push a stiff membrane that is in contact with the ink. | The effective area of the actuator becomes the membrane area | Fabrication complexity Actuator size Difficulty of integration in a VLSI process | 1982 Howkins U.S. Pat. No. 4,459,601 |
| Rotary | The actuator causes the rotation of some element, such a grill or impeller | Rotary levers may be used to increase travel Small chip area requirements | Device complexity May have friction at a pivot point | IJ05, IJ08, IJ13, IJ28 |
| Bend | The actuator bends when energized. This may be due to differential thermal expansion, piezoelectric expansion, magnetostriction, or other form of relative dimensional change. | A very small change in dimensions can be converted to a large motion. | Requires the actuator to be made from at least two distinct layers, or to have a thermal difference across the actuator | 1970 Kyser et al U.S. Pat. No. 3,946,398 1973 Stemme U.S. Pat. No. 3,747,120 IJ03, IJ09, IJ10, IJ19, IJ23, IJ24, IJ25, IJ29, IJ30, IJ31, IJ33, IJ34, IJ35 |
| Swivel | The actuator swivels around a central pivot. This motion is suitable where there are opposite forces applied to opposite sides of the paddle, e.g. Lorenz force. | Allows operation where the net linear force on the paddle is zero Small chip area requirements | Inefficient coupling to the ink motion | IJ06 |
| Straighten | The actuator is normally bent, and straightens when energized. | Can be used with shape memory alloys where the austenic phase is planar | Requires careful balance of stresses to ensure that the quiescent bend is accurate | IJ26, IJ32 |
| Double bend | The actuator bends in one direction when one element is energized, and bends the other way when another element is energized. | One actuator can be used to power two nozzles. Reduced chip size. Not sensitive to ambient temperature | Difficult to make the drops ejected by both bend directions identical. A small efficiency loss compared to equivalent single bend actuators. | IJ36, IJ37, IJ38 |
| Shear | Energizing the actuator causes a shear motion in the actuator material. | Can increase the effective travel of piezoelectric actuators | Not readily applicable to other actuator mechanisms | 1985 Fishbeck U.S. Pat. No. 4,584,590 |
| Radial con-striction | The actuator squeezes an ink reservoir, forcing ink from a constricted nozzle. | Relatively easy to fabricate single nozzles from glass tubing as macroscopic structures | High force required Inefficient Difficult to integrate with VLSI processes | 1970 Zoltan U.S. Pat. No. 3,683,212 |
| Coil/uncoil | A coiled actuator uncoils or coils more tightly. The motion of the free end of the actuator ejects the ink. | Easy to fabricate as a planar VLSI process Small area required, therefore low cost | Difficult to fabricate for non-planar devices Poor out-of-plane stiffness | IJ17, IJ21, IJ34, IJ35 |
| Bow | The actuator bows (or buckles) in the middle when energized. | Can increase the speed of travel Mechanically rigid | Maximum travel is constrained High force required | IJ16, IJ18, IJ27 |
| Push-Pull | Two actuators control a shutter. One actuator | The structure is pinned at both ends, so has a | Not readily suitable for ink jets which directly | IJ18 |

-continued

| | Description | Advantages | Disadvantages | Examples |
|---|---|---|---|---|
| | pulls the shutter, and the other pushes it | high out-of-plane rigidity | push the ink | |
| Curl inwards | A set of actuators curl inwards to reduce the volume of ink that they enclose. | Good fluid flow to the region behind the actuator increases efficiency | Design complexity | IJ20, IJ42 |
| Curl outwards | A set of actuators curl outwards, pressurizing ink in a chamber surrounding the actuators, and expelling ink from a nozzle in the chamber. | Relatively simple construction | Relatively large chip area | IJ43 |
| Iris | Multiple vanes enclose a volume of ink. These simultaneously rotate, reducing the volume between the vanes. | High efficiency<br>Small chip area | High fabrication complexity<br>Not suitable for pigmented inks | IJ22 |
| Acoustic vibration | The actuator vibrates at a high frequency. | The actuator can be physically distant from the ink | Large area required for efficient operation at useful frequencies<br>Acoustic coupling and crosstalk<br>Complex drive circuitiy<br>Poor control of drop volume and position | 1993 Hadimioglu et al, EUP 550,192<br>1993 Elrod et al, EUP 572,220 |
| None | In various ink jet designs the actuator does not move. | No moving parts | Various other tradeoffs are required to eliminate moving parts | Silverbrook, EP 0771 658 A2 and related patent applications<br>Tone-jet |
| | | Nozzle refill method | | |
| Surface tension | This is the normal way that ink jets are refilled. After the actuator is energized, it typically returns rapidly to its normal position. This rapid return sucks in air through the nozzle opening. The ink surface tension at the nozzle then exerts a small force restoring the meniscus to a minimum area. This force refills the nozzle. | Fabrication simplicity<br>Operational simplicity | Low speed<br>Surface tension force relatively small compared to actuator force<br>Long refill time usually dominates the total repetition rate | Thermal ink jet<br>Piezoelectric ink jet<br>IJ01-IJ07, IJ10-IJ14, IJ16, IJ20, IJ22-IJ45 |
| Shuttered oscillating ink pressure | Ink to the nozzle chamber is provided at a pressure that oscillates at twice the drop ejection frequency. When a drop is to be ejected, the shutter is opened for 3 half cycles: drop ejection, actuator return, and refill. The shutter is then closed to prevent the nozzle chamber emptying during the next negative pressure cycle. | High speed<br>Low actuator energy, as the actuator need only open or close the shutter, instead of ejecting the ink drop | Requires common ink pressure oscillator<br>May not be suitable for pigmented inks | IJ08, IJ13, IJ15, IJ17, IJ18, IJ19, IJ21 |
| Refill actuator | After the main actuator has ejected a drop a second (refill) actuator is energized. The refill actuator pushes ink into the nozzle chamber. The refill actuator returns slowly, to prevent its return from emptying the chamber again. | High speed, as the nozzle is actively refilled | Requires two independent actuators per nozzle | IJ09 |
| Positive ink pressure | The ink is held a slight positive pressure. After the ink drop is ejected, | High refill rate, therefore a high drop repetition rate is | Surface spill must be prevented<br>Highly hydrophobic | Silverbrook, EP 0771 658 A2 and related patent applications |

-continued

| | Description | Advantages | Disadvantages | Examples |
|---|---|---|---|---|
| | the nozzle chamber fills quickly as surface tension and ink pressure both operate to refill the nozzle. | possible | print head surfaces are required | Alternative for:, IJ01-IJ07, IJ10-IJ14, IJ16, IJ20, IJ22-IJ45 |
| | | Method of restricting back-flow through inlet | | |
| Long inlet channel | The ink inlet channel to the nozzle chamber is made long and relatively narrow, relying on viscous drag to reduce inlet back-flow. | Design simplicity<br>Operational simplicity<br>Reduces crosstalk | Restricts refill rate<br>May result in a relatively large chip area<br>Only partially effective | Thermal ink jet<br>Piezoelectric ink jet<br>IJ42, IJ43 |
| Positive ink pressure | The ink is under a positive pressure, so that in the quiescent state some of the ink drop already protrudes from the nozzle. This reduces the pressure in the nozzle chamber which is required to eject a certain volume of ink. The reduction in chamber pressure results in a reduction in ink pushed out through the inlet. | Drop selection and separation forces can be reduced<br>Fast refill time | Requires a method (such as a nozzle rim or effective hydrophobizing, or both) to prevent flooding of the ejection surface of the print head. | Silverbrook, EP 0771 658 A2 and related patent applications<br>Possible operation of the following: IJ01-IJ07, IJ09-IJ12, IJ14, IJ16, IJ20, IJ22, , IJ23-IJ34, 1136-IJ41, IJ44 |
| Baffle | One or more baffles are placed in the inlet ink flow. When the actuator is energized, the rapid ink movement creates eddies which restrict the flow through the inlet. The slower refill process is unrestricted, and does not result in eddies. | The refill rate is not as restricted as the long inlet method.<br>Reduces crosstalk | Design complexity<br>May increase fabrication complexity (e.g. Tektronix hot melt Piezoelectric print heads). | HP Thermal Ink Jet<br>Tektronix piezoelectric ink jet |
| Flexible flap restricts inlet | In this method recently disclosed by Canon, the expanding actuator (bubble) pushes on a flexible flap that restricts the inlet. | Significantly reduces back-flow for edge-shooter thermal ink jet devices | Not applicable to most ink jet configurations<br>Increased fabrication complexity<br>Inelastic deformation of polymer flap results in creep over extended use | Canon |
| Inlet filter | A filter is located between the ink inlet and the nozzle chamber. The filter has a multitude of small holes or slots, restricting ink flow. The filter also removes particles which may block the nozzle. | Additional advantage of ink filtration<br>Ink filter may be fabricated with no additional process steps | Restricts refill rate<br>May result in complex construction | IJ04, IJ12, IJ24, IJ27, IJ29, IJ30 |
| Small inlet compared to nozzle | The ink inlet channel to the nozzle chamber has a substantially smaller cross section than that of the nozzle, resulting in easier ink egress out of the nozzle than out of the inlet. | Design simplicity | Restricts refill rate<br>May result in a relatively large chip area<br>Only partially effective | IJ02, IJ37, IJ44 |
| Inlet shutter | A secondaiy actuator controls the position of a shutter, closing off the ink inlet when the main actuator is energized. | Increases speed of the ink-jet print head operation | Requires separate refill actuator and drive circuit | IJ09 |
| The inlet is located | The method avoids the problem of inlet back- | Back-flow problem is eliminated | Requires careful design to minimize the | IJ01, IJ03, IJ05, IJ06, IJ07, IJ10, IJ11, IJ14, |

-continued

| | Description | Advantages | Disadvantages | Examples |
|---|---|---|---|---|
| behind the ink-pushing surface | flow by arranging the ink-pushing surface of the actuator between the inlet and the nozzle. | | negative pressure behind the paddle | IJ16, IJ22, IJ23, IJ25, IJ28, IJ31, IJ32, IJ33, IJ34, IJ35, IJ36, IJ39, IJ40, IJ41 |
| Part of the actuator moves to shut off the inlet | The actuator and a wall of the ink chamber are arranged so that the motion of the actuator closes off the inlet. | Significant reductions in back-flow can be achieved<br>Compact designs possible | Small increase in fabrication complexity | IJ07, IJ20, IJ26, IJ38 |
| Nozzle actuator does not result in ink back-flow | In some configurations of ink jet, there is no expansion or movement of an actuator which may cause ink back-flow through the inlet. | Ink back-flow problem is eliminated | None related to ink back-flow on actuation | Silverbrook, EP 0771 658 A2 and related patent applications<br>Valve-jet<br>Tone-jet |
| | | Nozzle Clearing Method | | |
| Normal nozzle firing | All of the nozzles are fired periodically, before the ink has a chance to dry. When not in use the nozzles are sealed (capped) against air.<br>The nozzle firing is usually performed during a special clearing cycle, after first moving the print head to a cleaning station. | No added complexity on the print head | May not be sufficient to displace dried ink | Most ink jet systems<br>IJ01, IJ02, IJ03, IJ04, IJ05, IJ06, IJ07, IJ09, IJ10, IJ11, IJ12, IJ14, IJ16, IJ20, IJ22, IJ23, IJ24, IJ25, IJ26, IJ27, IJ28, IJ29, IJ30, IJ31, IJ32, IJ33, IJ34, IJ36, IJ37, IJ38, IJ39, IJ40,, IJ41, IJ42, IJ43, IJ44,, IJ45 |
| Extra power to ink heater | In systems which heat the ink, but do not boil it under normal situations, nozzle cleanng can be achieved by over-powering the heater and boiling ink at the nozzle. | Can be highly effective if the heater is adjacent to the nozzle | Requires higher drive voltage for clearing<br>May require larger drive transistors | Silverbrook, EP 0771 658 A2 and related patent applications |
| Rapid succession of actuator pulses | The actuator is fired in rapid succession. In some configurations, this may cause heat build-up at the nozzle which boils the ink, clearing the nozzle. In other situations, it may cause sufficient vibrations to dislodge clogged nozzles. | Does not require extra drive circuits on the print head<br>Can be readily controlled and initiated by digital logic | Effectiveness depends substantially upon the configuration of the ink jet nozzle | May be used with: IJ01, IJ02, IJ03, IJ04, IJ05, IJ06, IJ07, IJ09, IJ10, IJ11, IJ14, IJ16, IJ20, IJ22, IJ23, IJ24, IJ25, IJ27, IJ28, IJ29, IJ30, IJ31, IJ32, IJ33, IJ34, IJ36, IJ37, IJ38, IJ39, IJ40, IJ41, IJ42, IJ43, IJ44, IJ45 |
| Extra power to ink pushing actuator | Where an actuator is not normally driven to the limit of its motion, nozzle clearing may be assisted by providing an enhanced drive signal to the actuator. | A simple solution where applicable | Not suitable where there is a hard limit to actuator movement | May be used with: IJ03, IJ09, IJ16, IJ20, IJ23, IJ24, IJ25, IJ27, IJ29, IJ30, IJ31, IJ32, IJ39, IJ40, IJ41, IJ42, IJ43, IJ44, IJ45 |
| Acoustic resonance | An ultrasonic wave is applied to the ink chamber. This wave is of an appropriate amplitude and frequency to cause sufficient force at the nozzle to clear blockages. This is easiest to achieve if the ultrasonic wave is at a resonant frequency of the ink cavity. | A high nozzle clearing capability can be achieved<br>May be implemented at very low cost in systems which already include acoustic actuators | High implementation cost if system does not already include an acoustic actuator | IJ08, IJ13, IJ15, IJ17, IJ18, IJ19, IJ21 |
| Nozzle clearing plate | A microfabricated plate is pushed against the nozzles. The plate has a post for every nozzle, A post moves through | Can clear severely clogged nozzles | Accurate mechanical alignment is required<br>Moving parts are required<br>There is risk of damage | Silverbrook, EP 0771 658 A2 and related patent applications |

-continued

| | Description | Advantages | Disadvantages | Examples |
|---|---|---|---|---|
| | each nozzle, displacing dried ink. | | to the nozzles<br>Accurate fabrication is required | |
| Ink pressure pulse | The pressure of the ink is temporarily increased so that ink streams from all of the nozzles. This may be used in conjunction with actuator energizing. | May be effective where other methods cannot be used | Requires pressure pump or other pressure actuator<br>Expensive<br>Wasteful of ink | May be used with all IJ series ink jets |
| Print head wiper | A flexible 'blade' is wiped across the print head surface. The blade is usually fabricated from a flexible polymer, e.g. rubber or synthetic elastomer. | Effective for planar print head surfaces<br>Low cost | Difficult to use if print head surface is non-planar or very fragile<br>Requires mechanical parts<br>Blade can wear out in high volume print systems | Many ink jet systems |
| Separate ink boiling heater | A separate heater is provided at the nozzle although the normal drop ejection mechanism does not require it. The heaters do not require individual drive circuits, as many nozzles can be cleared simultaneously, and no imaging is required. | Can be effective where other nozzle clearing methods cannot be used<br>Can be implemented at no additional cost in some ink jet configurations | Fabrication complexity | Can be used with many IJ series ink jets |
| | | Nozzle plate construction | | |
| Electro-formed nickel | A nozzle plate is separately fabricated from electroformed nickel, and bonded to the print head chip. | Fabrication simplicity | High temperatures and pressures are required to bond nozzle plate<br>Minimum thickness constraints<br>Differential thermal expansion | Hewlett Packard Thermal Ink jet |
| Laser ablated or drilled polymer | Individual nozzle holes are ablated by an intense UV laser in a nozzle plate, which is typically a polymer such as polyimide or polysuiphone | No masks required<br>Can be quite fast<br>Some control over nozzle profile is possible<br>Equipment required is relatively low cost | Each hole must be individually formed<br>Special equipment required<br>Slow where there axe many thousands of nozzles per print head<br>May produce thin burrs at exit holes | Canon Bubblejet<br>1988 Sercel et al., SPIE, Vol. 998 Excimer Beam Applications, pp. 76-83<br>1993 Watanabe et al., U.S. Pat. No. 5,208,604 |
| Silicon micro-machined | A separate nozzle plate is micromachined from single cxystal silicon, and bonded to the print head wafer. | High accuracy is attainable | Two part construction<br>High cost<br>Requires precision alignment<br>Nozzles may be clogged by adhesive | K. Bean, IEEE Transactions on Electron Devices, Vol. ED-25, No. 10, 1978, pp 1185-1195<br>Xerox 1990 Hawkins et al., U.S. Pat. No. 4,899,181 |
| Glass capillaries | Fine glass capillaries are drawn from glass tubing. This method has been used for making individual nozzles, but is difficult to use for bulk manufacturing of print heads with thousands of nozzles. | No expensive equipment required<br>Simple to make single nozzles | Very small nozzle sizes are difficult to form<br>Not suited for mass production | 1970 Zoltan U.S. Pat. No. 3,683,212 |
| Monolithic, surface micro-machined using VLSI litho-graphic processes | The nozzle plate is deposited as a layer using standard VLSI deposition techniques. Nozzles are etched in the nozzle plate using VLSI lithography and etching. | High accuracy (<1 micron)<br>Monolithic<br>Low cost<br>Existing processes can be used | Requires sacrificial layer under the nozzle plate to form the nozzle chamber<br>Surface may be fragile to the touch | Silverbrook, EP 0771 658 A2 and related patent applications<br>IJ01, IJ02, IJ04, IJ11, IJ12, IJ17, IJ18, IJ20, IJ22, IJ24, IJ27, IJ28, IJ29, IJ30, IJ31, IJ32, IJ33, IJ34, IJ36, IJ37, IJ38, IJ39, IJ40, IJ41, IJ42, IJ43, IJ44 |
| Monolithic, etched | The nozzle plate is a buried etch stop in the | High accuracy (<1 micron) | Requires long etch times | IJ03, IJ05, IJ06, IJ07, IJ08, IJ09, IJ10, IJ13, |

-continued

| | Description | Advantages | Disadvantages | Examples |
|---|---|---|---|---|
| through substrate | wafer. Nozzle chambers are etched in the front of the wafer, and the wafer is thinned from the back side. Nozzles are then etched in the etch stop layer. | Monolithic<br>Low cost<br>No differential expansion | Requires a support wafer | IJ14, IJ15, IJ16, IJ19, IJ21, IJ23, IJ25, IJ26 |
| No nozzle plate | Various methods have been tried to eliminate the nozzles entirely, to prevent nozzle clogging. These include thermal bubble mechanisms and acoustic lens mechanisms | No nozzles to become clogged | Difficult to control drop position accurately<br>Crosstalk problems | Ricoh 1995 Sekiya et al U.S. Pat. No. 5,412,413<br>1993 Hadimioglu et al EUP 550,192<br>1993 Elrod et al EUP 572,220 |
| Trough | Each drop ejector has a trough through which a paddle moves. There is no nozzle plate. | Reduced manufacturing complexity<br>Monolithic | Drop firing direction is sensitive to wicking. | IJ35 |
| Nozzle slit instead of individual nozzles | The elimination of nozzle holes and replacement by a slit encompassing many actuator positions reduces nozzle clogging, but increases crosstalk due to ink surface waves | No nozzles to become clogged | Difficult to control drop position accurately<br>Crosstalk problems | 1989 Saito et al U.S. Pat. No. 4,799,068 |
| | | Drop ejection direction | | |
| Edge ('edge shooter') | Ink flow is along the surface of the chip, and ink drops are ejected from the chip edge. | Simple construction<br>No silicon etching required<br>Good heat sinking via substrate<br>Mechanically strong<br>Ease of chip banding | Nozzles limited to edge<br>High resolution is difficult<br>Fast color printing requires one print head per color | Canon Bubblejet 1979 Endo et al GB patent 2,007,162<br>Xerox heater-in-pit 1990 Hawkins et al U.S. Pat. No. 4,899,181<br>Tone-jet |
| Surface ('roof shooter') | Ink flow is along the surface of the chip, and ink drops are ejected from the chip surface, nonnal to the plane of the chip. | No bulk silicon etching required<br>Silicon can make an effective heat sink<br>Mechanical strength | Maximum ink flow is severely restricted | Hewlett-Packard TIJ 1982 Vaught et al U.S. Pat. No. 4,490,728<br>IJ02, IJ11, IJ12, IJ20, IJ22 |
| Through chip, forward ('up shooter') | Ink flow is through the chip, and ink drops are ejected from the front surface of the chip. | High ink flow<br>Suitable for pagewidth print heads<br>High nozzle packing density therefore low manufacturing cost | Requires bulk silicon etching | Silverbrook, EP 0771 658 A2 and related patent applications<br>IJ04, IJ17, IJ18, IJ24, IJ27-IJ45 |
| Through chip, reverse ('down shooter') | Ink flow is through the chip, and ink drops are ejected from the rear surface of the chip. | High ink flow<br>Suitable for pagewidth print heads<br>High nozzle packing density therefore low manufacturing cost | Requires wafer thinning<br>Requires special handling during manufacture | IJ01, IJ03, IJ05, IJ06, IJ07, IJ08, IJ09, IJ10, IJ13, IJ14, IJ15, IJ16, IJ19, IJ21, IJ23, IJ25, IJ26 |
| Through actuator | Ink flow is through the actuator, which is not fabricated as part of the same substrate as the drive transistors. | Suitable for piezoelectric print heads | Pagewidth print heads require several thousand connections to drive circuits<br>Cannot be manufactured in standard CMOS fabs<br>Complex assembly required | Epson Stylus<br>Tektronix hot melt piezoelectric ink jets |
| | | Ink type | | |
| Aqueous, dye | Water based ink which typically contains: water, dye, surfactant, humectant, and biocide. Modern ink dyes have high water-fastness, light fastness | Environmentally friendly<br>No odor | Slow drying<br>Corrosive<br>Bleeds on paper<br>May strikethrough<br>Cockles paper | Most existing ink jets<br>All IJ series ink jets<br>Silverbrook, EP 0771 658 A2 and related patent applications |
| Aqueous, pigment | Water based ink which typically contains: water, pigment, | Environmentally friendly<br>No odor | Slow drying<br>Corrosive<br>Pigment may clog | IJ02, IJ04, IJ21, IJ26, IJ27, IJ30<br>Silverbrook, EP 0771 |

-continued

| | Description | Advantages | Disadvantages | Examples |
|---|---|---|---|---|
| | surfactant, humectant, and biocide. Pigments have an advantage in reduced bleed, wicking and strikethrough. | Reduced bleed Reduced wicking Reduced strikethrough | nozzles Pigment may clog actuator mechanisms Cockles paper | 658 A2 and related patent applications Piezoelectric ink-jets Thermal ink jets (with significant restrictions) |
| Methyl Ethyl Ketone (MEK) | MEK is a highly volatile solvent used for industrial printing on difficult surfaces such as aluminum cans. | Very fast drying Prints on various substrates such as metals and plastics | Odorous Flammable | All IJ series ink jets |
| Alcohol (ethanol, 2-butanol, and others) | Alcohol based inks can be used where the printer must operate at temperatures below the freezing point of water. An example of this is in-camera consumer photographic printing. | Fast drying Operates at sub-freezing temperatures Reduced paper cockle Low cost | Slight odor Flammable | All IJ series ink jets |
| Phase change (hot melt) | The ink is solid at room temperature, and is melted in the print head before jetting. Hot melt inks are usually wax based, with a melting point around 80° C. After jetting the ink freezes almost instantly upon contacting the print medium or a transfer roller. | No drying time- ink instantly freezes on the print medium Almost any print medium can be used No paper cockle occurs No wicking occurs No bleed occurs No strikethrough occurs Long warm-up time | High viscosity Printed ink typically has a ‘waxy’ feel Printed pages may ‘block’ Ink temperature may be above the curie point of permanent magnets Ink heaters consume power | Tektronix hot melt piezoelectric ink jets 1989 Nowak U.S. Pat. No. 4,820,346 All IJ series ink jets |
| Oil | Oil based inks are extensively used in offset printing. They have advantages in improved characteristics on paper (especially no wicking or cockle). Oil soluble dies and pigments are required. | High solubility medium for some dyes Does not cockle paper Does not wick through paper | High viscosity: this is a significant limitation for use in ink jets, which usually require a low viscosity. Some short chain and multi-branched oils have a sufficiently low viscosity. Slow drying | All IJ series ink jets |
| Micro-emulsion | A microemulsion is a stable, self forming emulsion of oil, water, and surfactant. The characteristic drop size is less than 100 nm, and is determined by the prefened curvature of the surfactant. | Stops ink bleed High dye solubiity Water, oil, and amphiphiuic soluble dies can be used Can stabilize pigment suspensions | Viscosity higher than water Cost is slightly higher than water based ink High surfactant concentration required (around 5%) | All IJ series ink jets |

IJ01

In FIG. 1, there is illustrated an exploded perspective view illustrating the construction of a single ink jet nozzle 104 in accordance with the principles of the present invention.

The nozzle 104 operates on the principle of electromechanical energy conversion and comprises a solenoid 111 which is connected electrically at a first end 112 to a magnetic plate 113 which is in turn connected to a current source e.g. 114 utilized to activate the ink nozzle 104. The magnetic plate 113 can be constructed from electrically conductive iron.

A second magnetic plunger 115 is also provided, again being constructed from soft magnetic iron. Upon energising the solenoid 111, the plunger 115 is attracted to the fixed magnetic plate 113. The plunger thereby pushes against the ink within the nozzle 104 creating a high pressure zone in the nozzle chamber 117. This causes a movement of the ink in the nozzle chamber 117 and in a first design, subsequent ejection of an ink drop. A series of apertures e.g. 120 is provided so that ink in the region of solenoid 111 is squirted out of the holes 120 in the top of the plunger 115 as it moves towards lower plate 113. This prevents ink trapped in the area of solenoid 111 from increasing the pressure on the plunger 115 and thereby increasing the magnetic forces needed to move the plunger 115.

Figure 2:
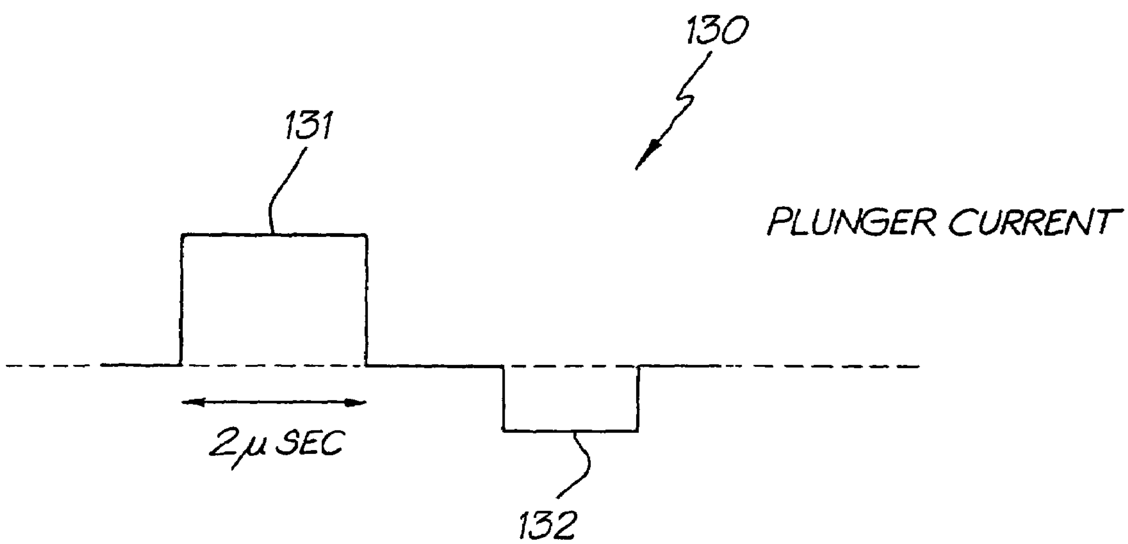
FIG. 2 is a timing diagram illustrating the operation of a preferred embodiment.

Referring now to FIG. 2, there is illustrated a timing diagram 130 of the plunger current control signal. Initially, a solenoid current pulse 131 is activated for the movement of the plunger and ejection of a drop from the ink nozzle. After approximately 2 micro-seconds, the current to the solenoid is turned off. At the same time or at a slightly later time, a reverse current pulse 132 is applied having approximately half the magnitude of the forward current. As the plunger has a residual magnetism, the reverse current pulse 132 causes the plunger to move backwards towards its original position. A series of torsional springs 122, 123 (FIG. 1) also assists in the return of the plunger to its original position. The reverse current pulse 132 is turned off before the magnetism of the plunger 115 is reversed which would otherwise result in the plunger being attracted to the fixed plate 113 again. Returning to FIG. 1, the forced return of the plunger 115 to its quiescent position results in a low pressure in the chamber 117. This can cause ink to begin flowing from the outlet nozzle 124 inwards and also ingests air to the chamber 117. The forward velocity of the drop and the backward velocity of the ink in the chamber 117 are resolved by the ink drop breaking off around the nozzle 124. The ink drop then continues to travel toward the recording medium under its own momentum. The nozzle refills due to the surface tension of the ink at the nozzle tip 124. Shortly after the time of drop break off, a meniscus at the nozzle tip is formed with an approximately concave hemispherical surface. The surface tension will exert a net forward force on the ink which will result in nozzle refilling. The repetition rate of the nozzle 104 is therefore principally determined by the nozzle refill time which will be 100 microseconds, depending on the device geometry, ink surface tension and the volume of the ejected drop.

Figure 3:
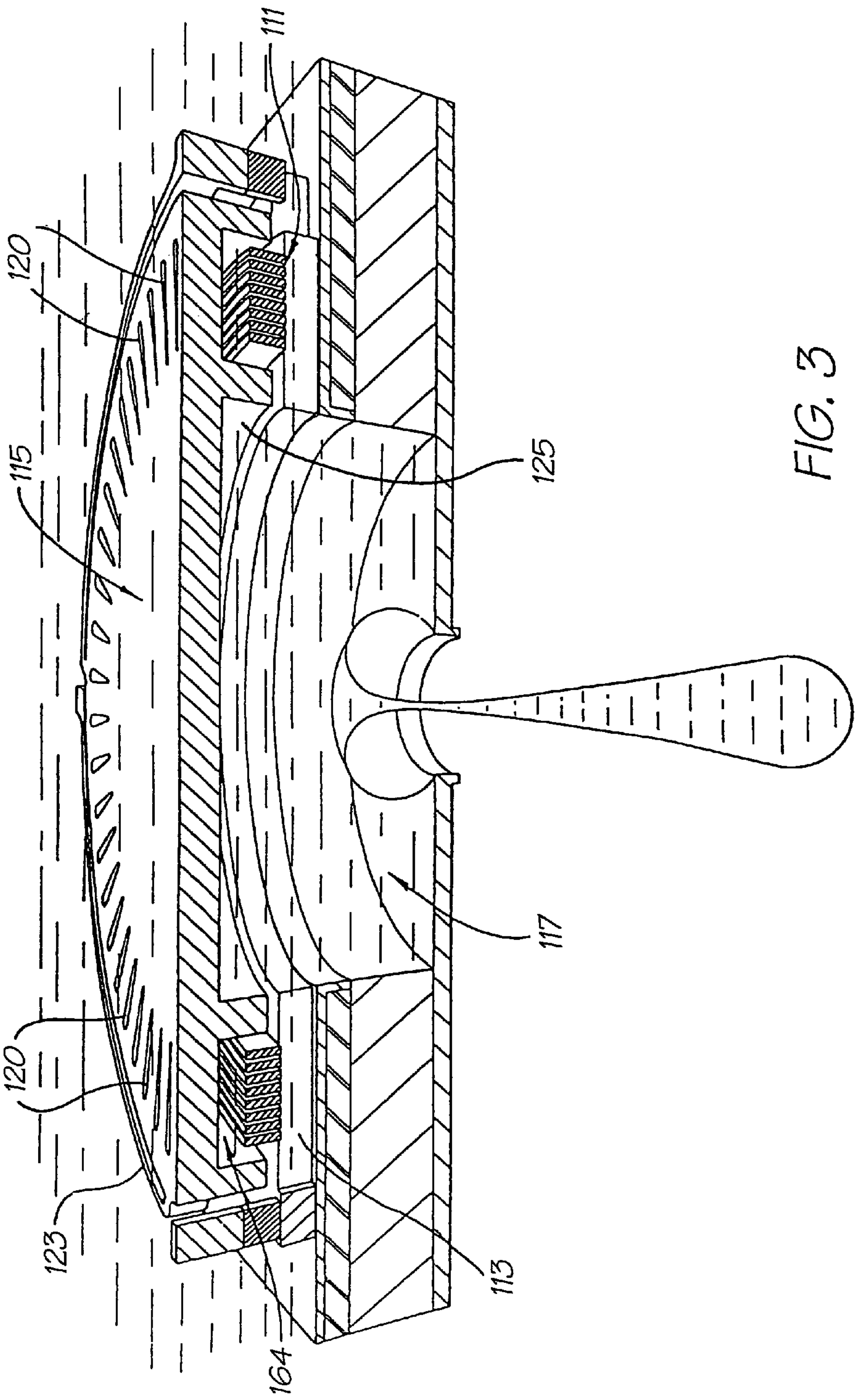
FIG. 3 is a cross-sectional top view of a single ink nozzle constructed in accordance with a preferred embodiment of the present invention.

Turning now to FIG. 3, an important aspect of the operation of the electro-magnetically driven print nozzle will now be described. Upon a current flowing through the coil 111, the plate 115 becomes strongly attracted to the plate 113. The plate 115 experiences a downward force and begins movement towards the plate 113. This movement imparts a momentum to the ink within the nozzle chamber 117. The ink is subsequently ejected as hereinbefore described. Unfortunately, the movement of the plate 115 causes a build-up of pressure in the area 164 between the plate 115 and the coil 111. This build-up would normally result in a reduced effectiveness of the plate 115 in ejecting ink.

However, in a first design the plate 115 preferably includes a series of apertures e.g. 120 which allow for the flow of ink from the area 164 back into the ink chamber and thereby allow a reduction in the pressure in area 164. This results in an increased effectiveness in the operation of the plate 115.

Preferably, the apertures 120 are of a teardrop shape increasing in width with increasing radial distance from a centre of the plunger. The aperture profile thereby provides minimal disturbance of the magnetic flux through the plunger while maintaining structural integrity of plunger 115.

After the plunger 115 has reached its end position, the current through coil 111 is reversed resulting in a repulsion of the two plates 113, 115. Additionally, the torsional spring e.g. 123 acts to return the plate 115 to its initial position.

The use of a torsional spring e.g. 123 has a number of substantial benefits including a compact layout. The construction of the torsional spring from the same material and same processing steps as that of the plate 115 simplifies the manufacturing process.

In an alternative design, the top surface of plate 115 does not include a series of apertures. Rather, the inner radial surface 125 (see FIG. 3) of plate 115 comprises slots of substantially constant cross-sectional profile in fluid communication between the nozzle chamber 117 and the area 164 between plate 115 and the solenoid 111. Upon activation of the coil 111, the plate 115 is attracted to the armature plate 113 and experiences a force directed towards plate 113. As a result of the movement, fluid in the area 164 is compressed and experiences a higher pressure than its surrounds. As a result, the flow of fluid takes place out of the slots in the inner radial surface 125 plate 115 into the nozzle chamber 117. The flow of fluid into chamber 117, in addition to the movement of the plate 115, causes the ejection of ink out of the ink nozzle port 124. Again, the movement of the plate 115 causes the torsional springs, for example 123, to be resiliently deformed. Upon completion of the movement of the plate 115, the coil 111 is deactivated and a slight reverse current is applied. The reverse current acts to repel the plate 115 from the armature plate 113. The torsional springs, for example 123, act as additional means to return the plate 115 to its initial or quiescent position.

Fabrication

Returning now to FIG. 1, the nozzle apparatus is constructed from the following main parts including a nozzle surface 140 having an aperture 124 which can be constructed from boron doped silicon 150. The radius of the aperture 124 of the nozzle is an important determinant of drop velocity and drop size.

Next, a CMOS silicon layer 142 is provided upon which is fabricated all the data storage and driving circuitry 141 necessary for the operation of the nozzle 4. In this layer a nozzle chamber 117 is also constructed. The nozzle chamber 117 should be wide enough so that viscous drag from the chamber walls does not significantly increase the force required of the plunger. It should also be deep enough so that any air ingested through the nozzle port 124 when the plunger returns to its quiescent state does not extend to the plunger device. If it does, the ingested bubble may form a cylindrical surface instead of a hemispherical surface resulting in the nozzle not refilling properly. A CMOS dielectric and insulating layer 144 containing various current paths for the current connection to the plunger device is also provided.

Next, a fixed plate of ferroelectric material is provided having two parts 113, 146. The two parts 113, 146 are electrically insulated from one another.

Next, a solenoid 111 is provided. This can comprise a spiral coil of deposited copper. Preferably a single spiral layer is utilized to avoid fabrication difficulty and copper is used for a low resistivity and high electro-migration resistance.

Next, a plunger 115 of ferromagnetic material is provided to maximise the magnetic force generated. The plunger 115 and fixed magnetic plate 113, 146 surround the solenoid 111 as a torus. Thus, little magnetic flux is lost and the flux is concentrated around the gap between the plunger 115 and the fixed plate 113, 146.

The gap between the fixed plate 113, 146 and the plunger 115 is one of the most important "parts" of the print nozzle 104. The size of the gap will strongly affect the magnetic force generated, and also limits the travel of the plunger 115. A small gap is desirable to achieve a strong magnetic force, but a large gap is desirable to allow longer plunger 115 travel, and therefore allow a smaller plunger radius to be utilised.

Next, the springs, e.g. 122, 123 for returning to the plunger 115 to its quiescent position after a drop has been ejected are provided. The springs, e.g. 122, 123 can be fabricated from the same material, and in the same processing steps, as the plunger 115. Preferably the springs, e.g. 122, 123 act as torsional springs in their interaction with the plunger 115.

Finally, all surfaces are coated with passivation layers, which may be silicon nitride ($Si_3N_4$), diamond like carbon (DLC), or other chemically inert, highly impermeable layer. The passivation layers are especially important for device lifetime, as the active device will be immersed in the ink.

One form of detailed manufacturing process which can be used to fabricate monolithic ink jet print heads operating in accordance with the principles taught by the present embodiment can proceed utilizing the following steps:

1. Using a double sided polished wafer deposit 3 microns of epitaxial silicon heavily doped with boron 150.

2. Deposit 10 microns of epitaxial silicon 142, either p-type or n-type, depending upon the CMOS process used.

Figure 4:
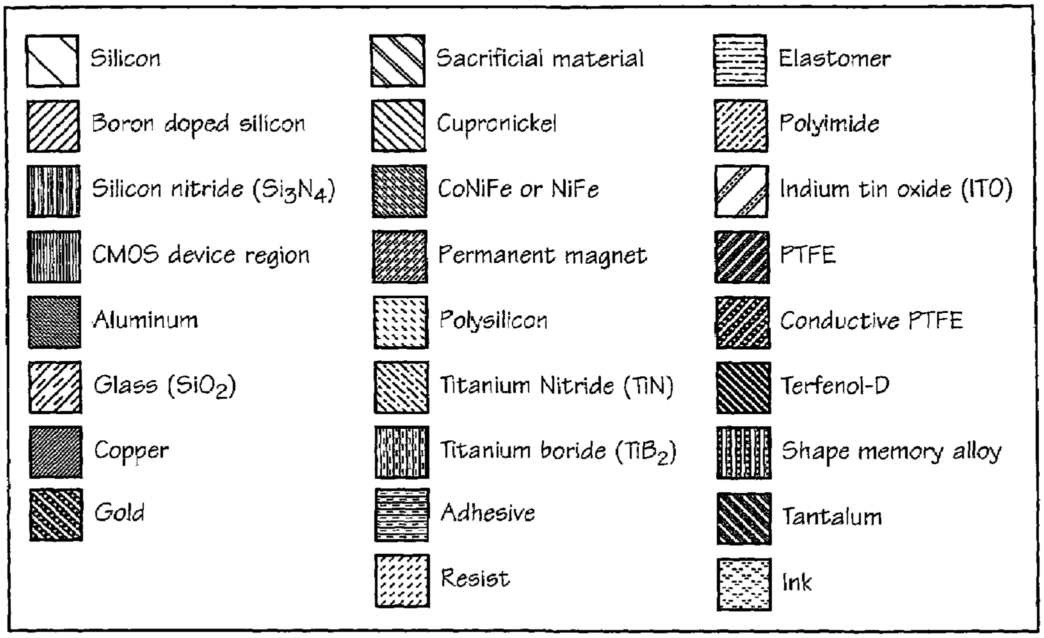
FIG. 4 provides a legend of the materials indicated in FIGS. 5 to 21.
Figure 5:
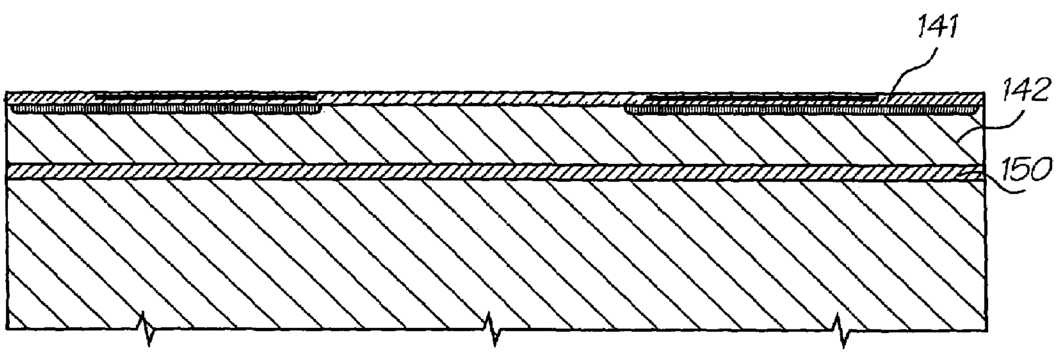
FIG. 5 to FIG. 21 illustrate sectional views of the manufacturing steps in one form of construction of an ink jet printhead nozzle.

3. Complete a 0.5 micron, one poly, 2 metal CMOS process. This step is shown at 141 in FIG. 5. For clarity, these diagrams may not be to scale, and may not represent a cross section though any single plane of the nozzle. FIG. 4 is a key to representations of various materials in these manufacturing diagrams, and those of other cross referenced ink jet configurations.

4. Etch the CMOS oxide layers 141 down to silicon or aluminum using Mask 1. This mask defines the nozzle chamber, the edges of the print heads chips, and the vias for the contacts from the aluminum electrodes to the two halves of the split fixed magnetic plate.

Figure 6:
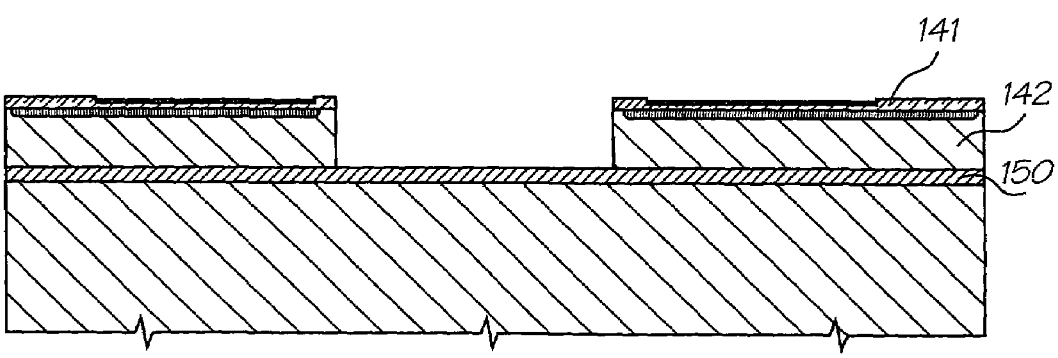

5. Plasma etch the silicon 142 down to the boron doped buried layer 150, using oxide from step 4 as a mask. This etch does not substantially etch the aluminum. This step is shown in FIG. 6.

6. Deposit a seed layer of cobalt nickel iron alloy. CoNiFe is chosen due to a high saturation flux density of 2 Tesla, and a low coercivity. [Osaka, Tetsuya et al, A soft magnetic CoNiFe film with high saturation magnetic flux density, Nature 392, 796-798 (1998)].

Figure 7:
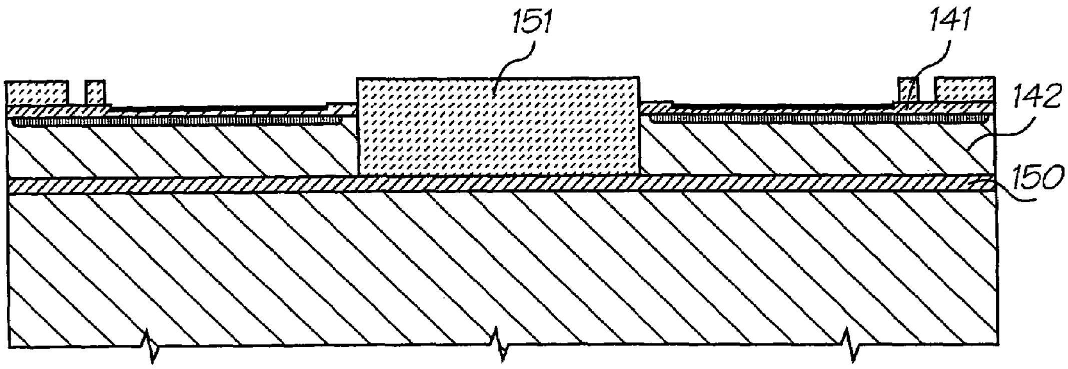

7. Spin on 4 microns of resist 151, expose with Mask 2, and develop. This mask defines the split fixed magnetic plate, for which the resist acts as an electroplating mold. This step is shown in FIG. 7.

Figure 8:
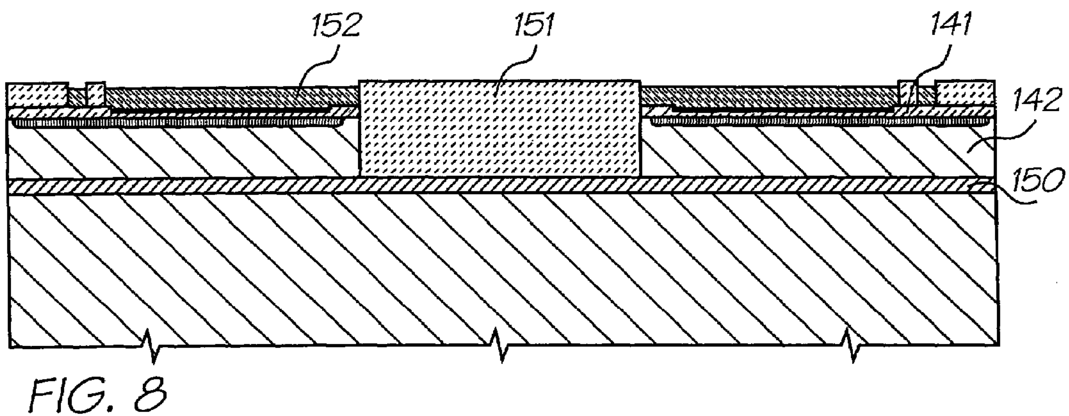

8. Electroplate 3 microns of CoNiFe 152. This step is shown in FIG. 8.

Figure 9:
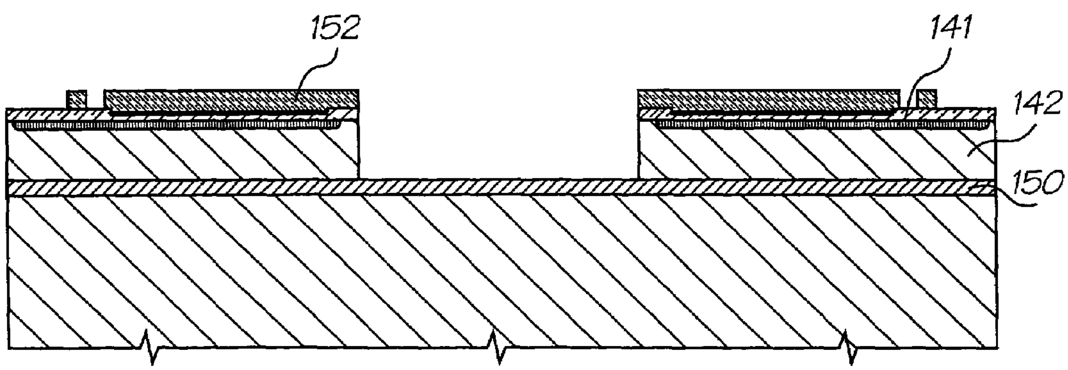

9. Strip the resist 151 and etch the exposed seed layer. This step is shown in FIG. 9.

10. Deposit 0.1 microns of silicon nitride ($Si_3N_4$).

11. Etch the nitride layer using Mask 3. This mask defines the contact vias from each end of the solenoid coil to the two halves of the split fixed magnetic plate.

12. Deposit a seed layer of copper. Copper is used for its low resistivity (which results in higher efficiency) and its high electromigration resistance, which increases reliability at high current densities.

Figure 10:
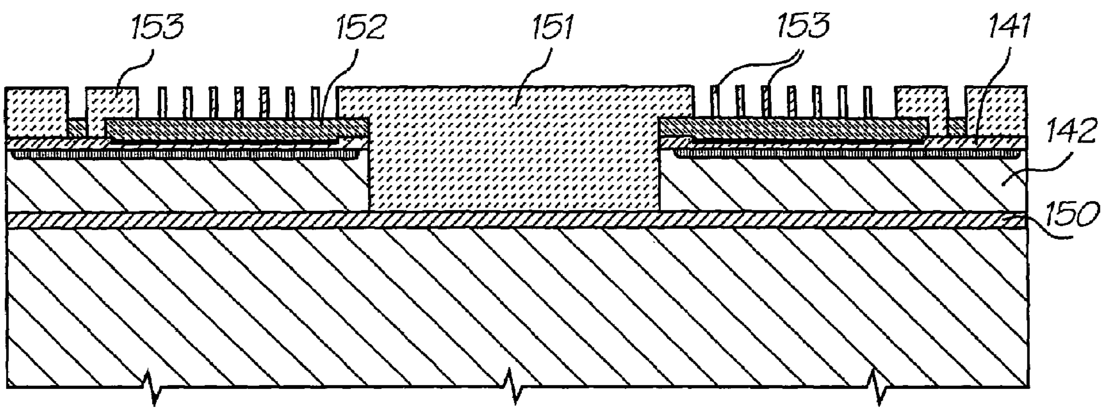

13. Spin on 5 microns of resist 153, expose with Mask 4, and develop. This mask defines the solenoid spiral coil and the spring posts, for which the resist acts as an electroplating mold. This step is shown in FIG. 10.

14. Electroplate 4 microns of copper 154.

Figure 11:
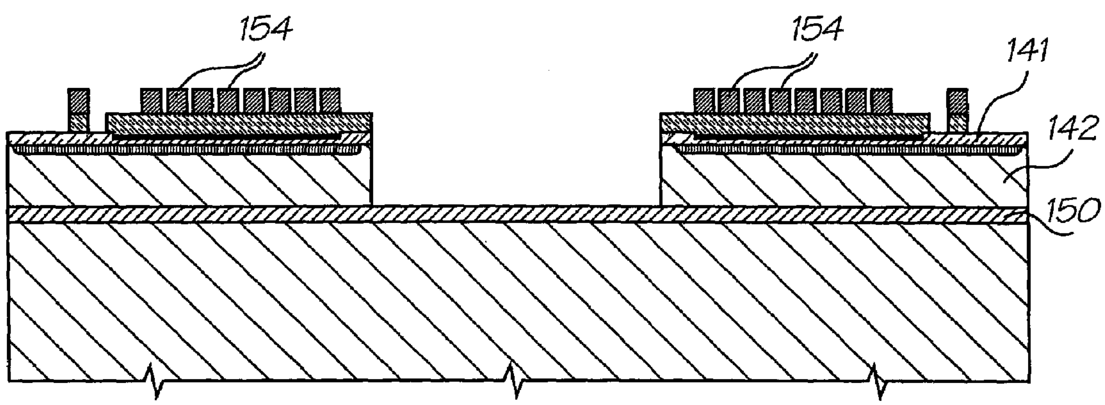

15. Strip the resist 153 and etch the exposed copper seed layer. This step is shown in FIG. 11.

16. Wafer probe. All electrical connections are complete at this point, bond pads are accessible, and the chips are not yet separated.

17. Deposit 0.1 microns of silicon nitride.

18. Deposit 1 micron of sacrificial material 156. This layer 156 determines the magnetic gap.

Figure 12:
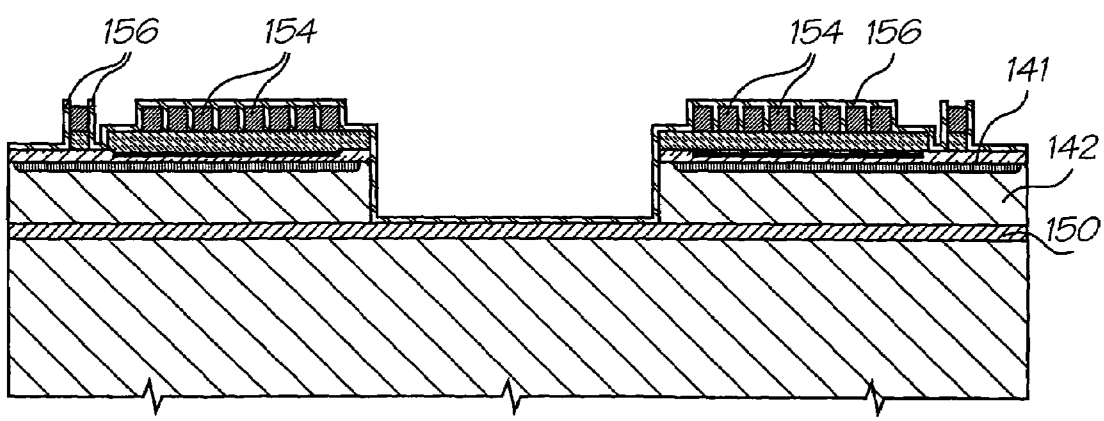

19. Etch the sacrificial material 156 using Mask 5. This mask defines the spring posts. This step is shown in FIG. 12.

20. Deposit a seed layer of CoNiFe.

Figure 13:
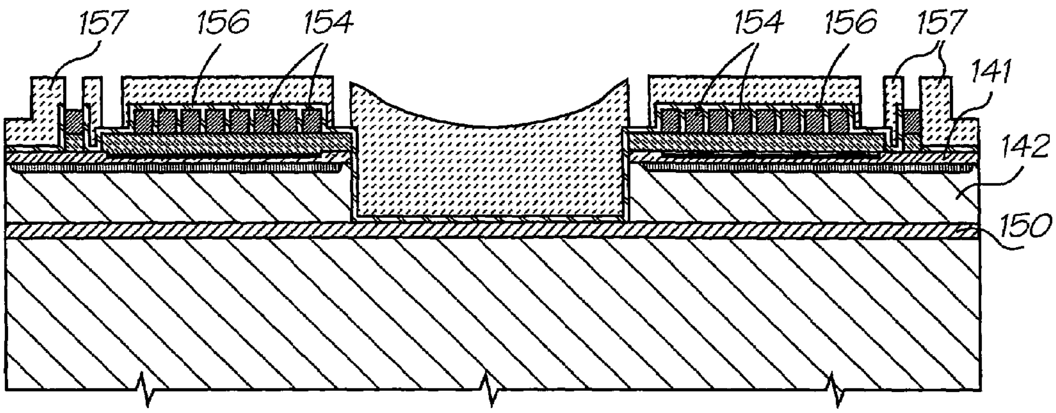

21. Spin on 4.5 microns of resist 157, expose with Mask 6, and develop. This mask defines the walls of the magnetic plunger, plus the spring posts. The resist forms an electroplating mold for these parts. This step is shown in FIG. 13.

Figure 14:
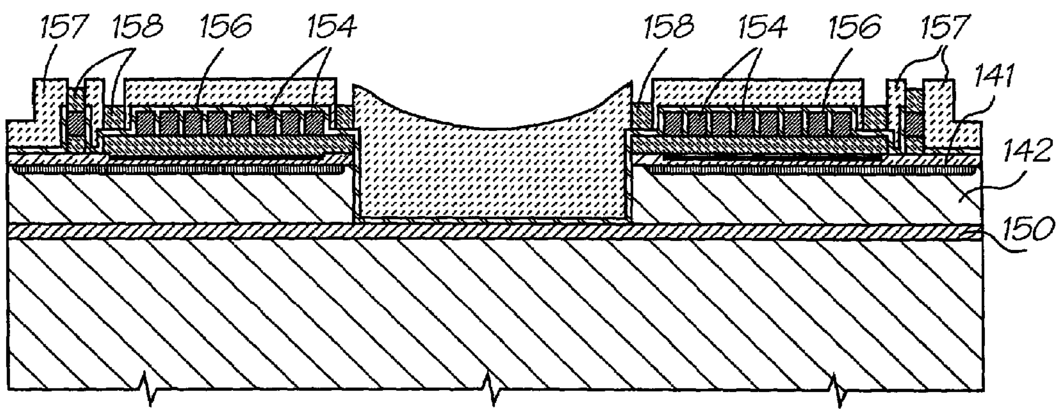

22. Electroplate 4 microns of CoNiFe 158. This step is shown in FIG. 14.

23. Deposit a seed layer of CoNiFe.

Figure 15:
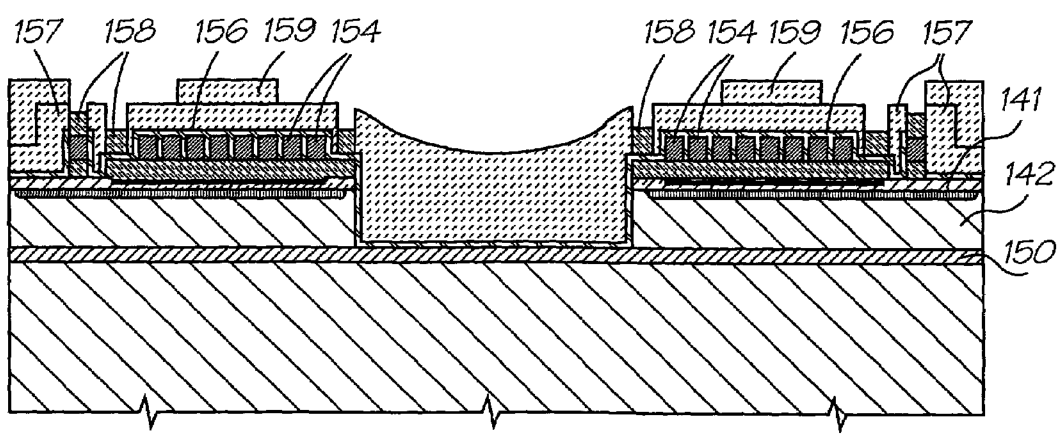

24. Spin on 4 microns of resist 159, expose with Mask 7, and develop. This mask defines the roof of the magnetic plunger, the springs, and the spring posts. The resist forms an electroplating mold for these parts. This step is shown in FIG. 15.

Figure 16:
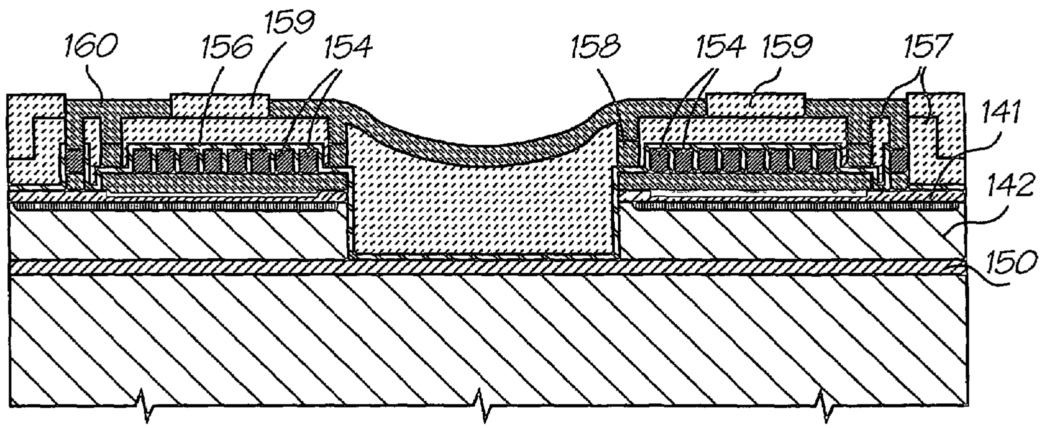

25. Electroplate 3 microns of CoNiFe 160. This step is shown in FIG. 16.

Figure 17:
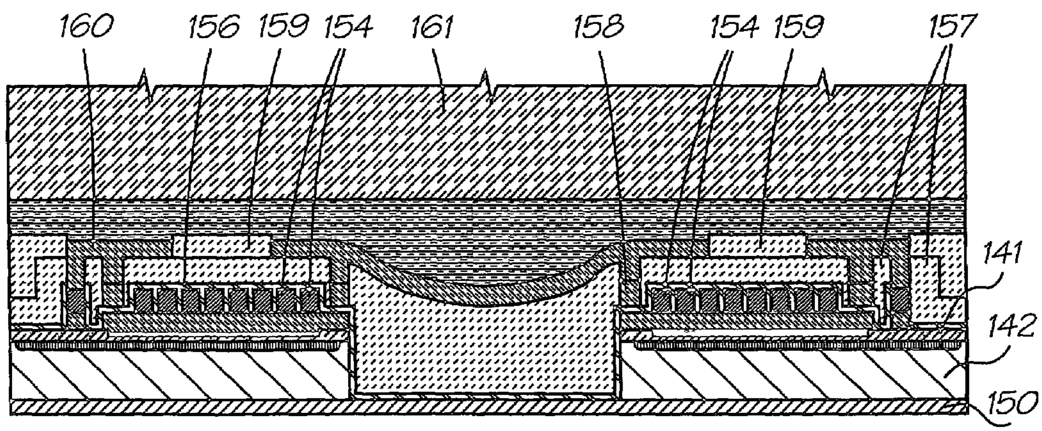

26. Mount the wafer on a glass blank 161 and back-etch the wafer using KOH, with no mask. This etch thins the wafer and stops at the buried boron doped silicon layer 150. This step is shown in FIG. 17.

Figure 18:
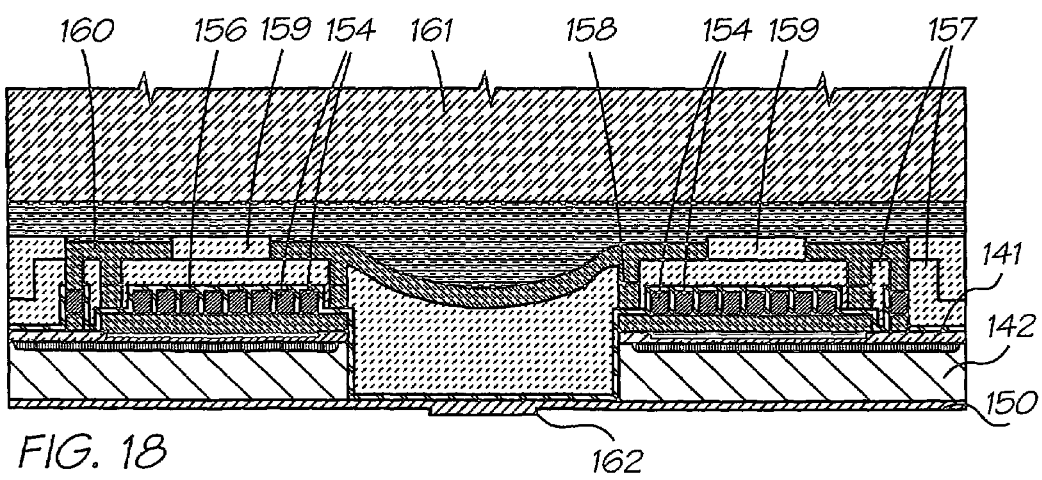

27. Plasma back-etch the boron doped silicon layer 150 to a depth of (approx.) 1 micron using Mask 8. This mask defines the nozzle rim 162. This step is shown in FIG. 18.

Figure 19:
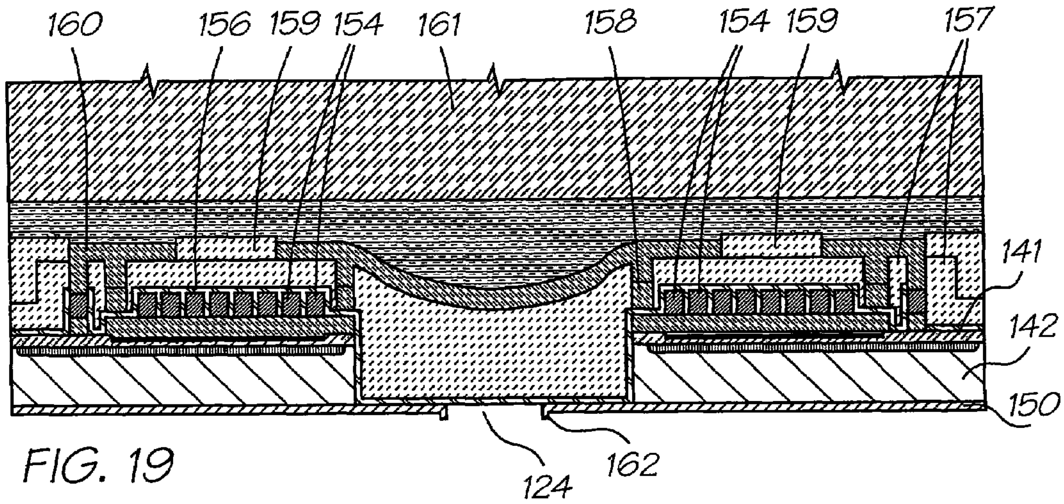

28. Plasma back-etch through the boron doped layer using Mask 9. This mask defines the nozzle, and the edge of the chips. At this stage, the chips are separate, but are still mounted on the glass blank. This step is shown in FIG. 19.

Figure 20:
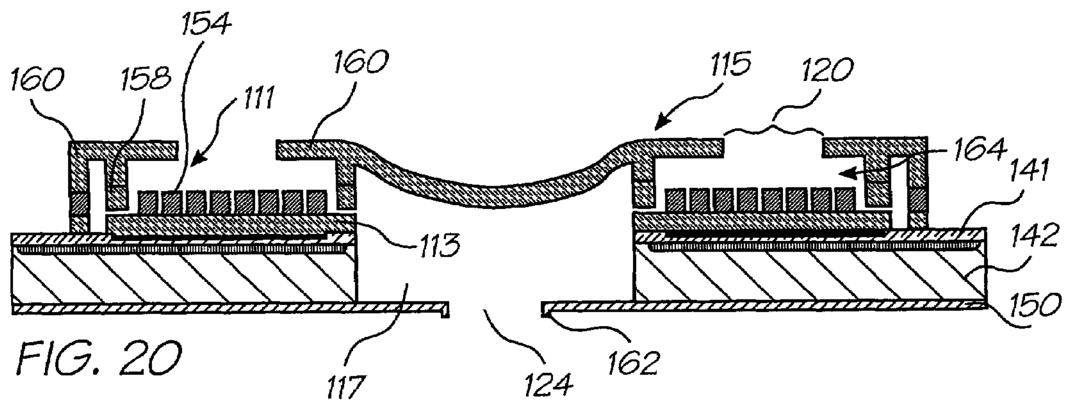

29. Detach the chips from the glass blank. Strip all adhesive, resist, sacrificial, and exposed seed layers. This step is shown in FIG. 20.

30. Mount the printheads in their packaging, which may be a molded plastic former incorporating ink channels which supply different colors of ink to the appropriate regions of the front surface of the wafer.

31. Connect the print heads to their interconnect systems.

32. Hydrophobize the front surface of the printheads.

Figure 21:
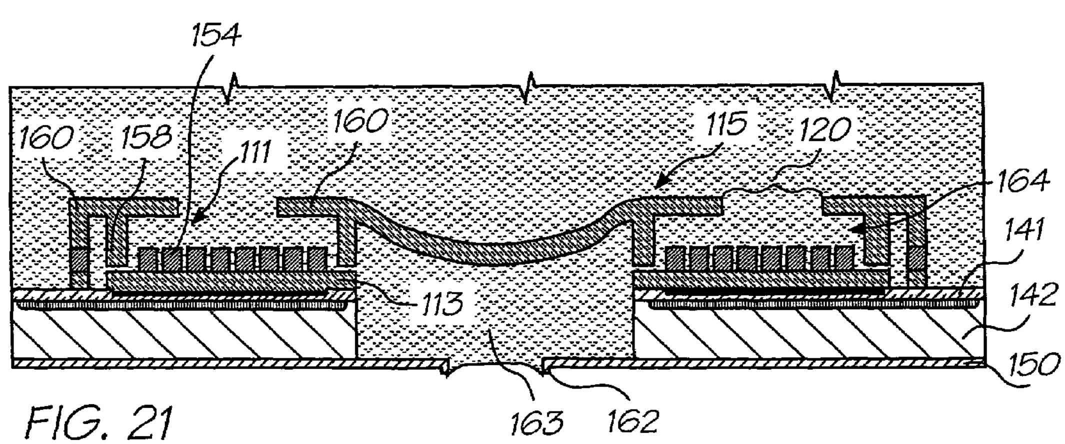

33. Fill the completed print heads with ink 163 and test them. A filled nozzle is shown in FIG. 21.

IJ02

In a preferred embodiment, an ink jet print head is made up of a plurality of nozzle chambers each having an ink ejection port. Ink is ejected from the ink ejection port through the utilization of attraction between two parallel plates.

Figure 22:
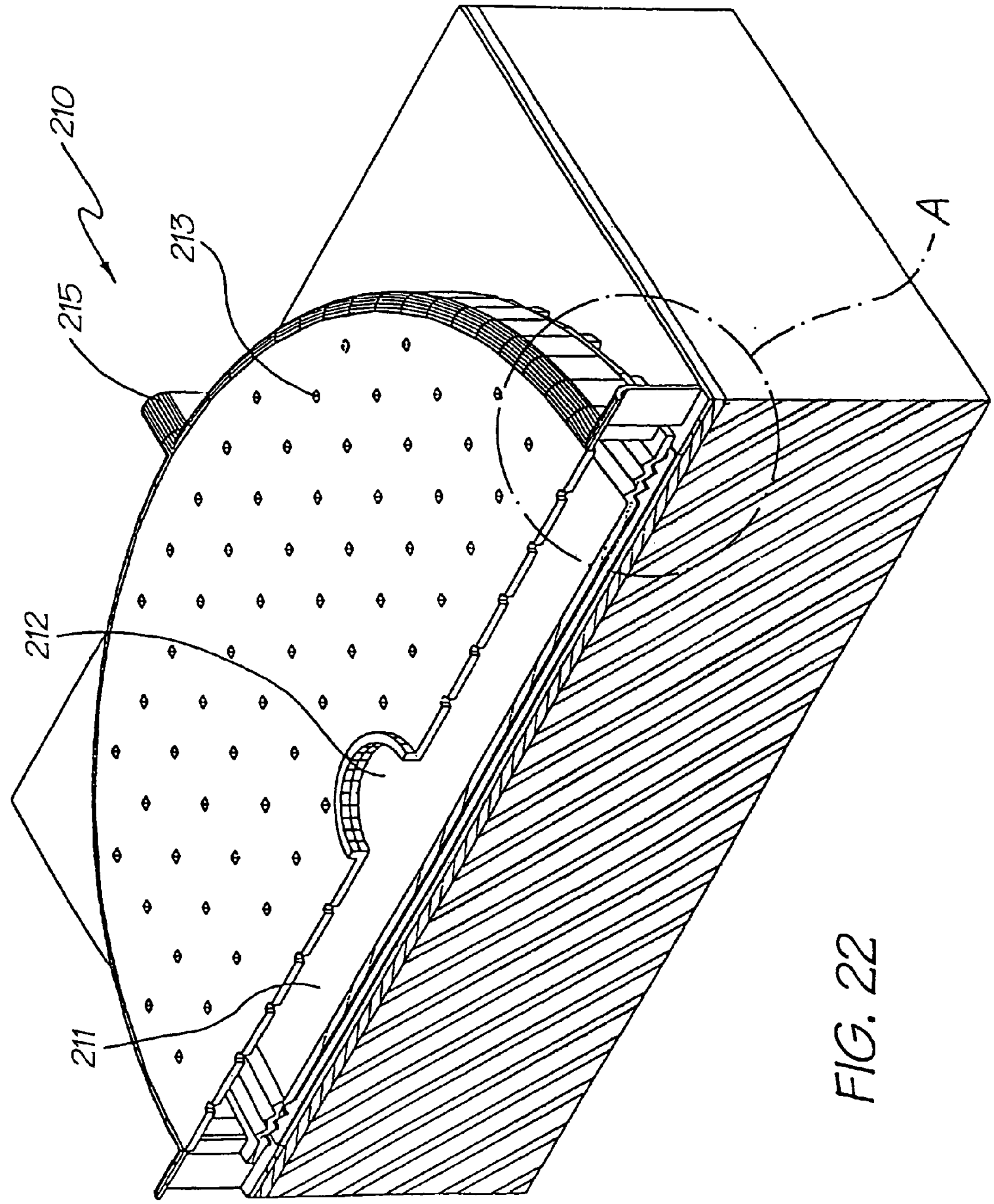
FIG. 22 is a perspective cross-sectional view of a single ink jet nozzle constructed in accordance with a preferred embodiment.

Turning initially to FIG. 22, there is illustrated a cross-sectional view of a single nozzle arrangement 210 as constructed in accordance with a preferred embodiment. The nozzle arrangement 210 includes a nozzle chamber 211 in which is stored ink to be ejected out of an ink ejection port 212. The nozzle arrangement 210 can be constructed on the top of a silicon wafer utilizing micro electromechanical systems construction techniques as will become more apparent hereinafter. The top of the nozzle plate also includes a series of regular spaced etchant holes, e.g. 213 which are provided for efficient sacrificial etching of lower layers of the nozzle arrangement 210 during construction. The size of the etchant holes 213 is small enough that surface tension characteristics inhibit ejection from the holes 213 during operation.

Ink is supplied to the nozzle chamber 211 via an ink supply channel, e.g. 215.

Figure 23:
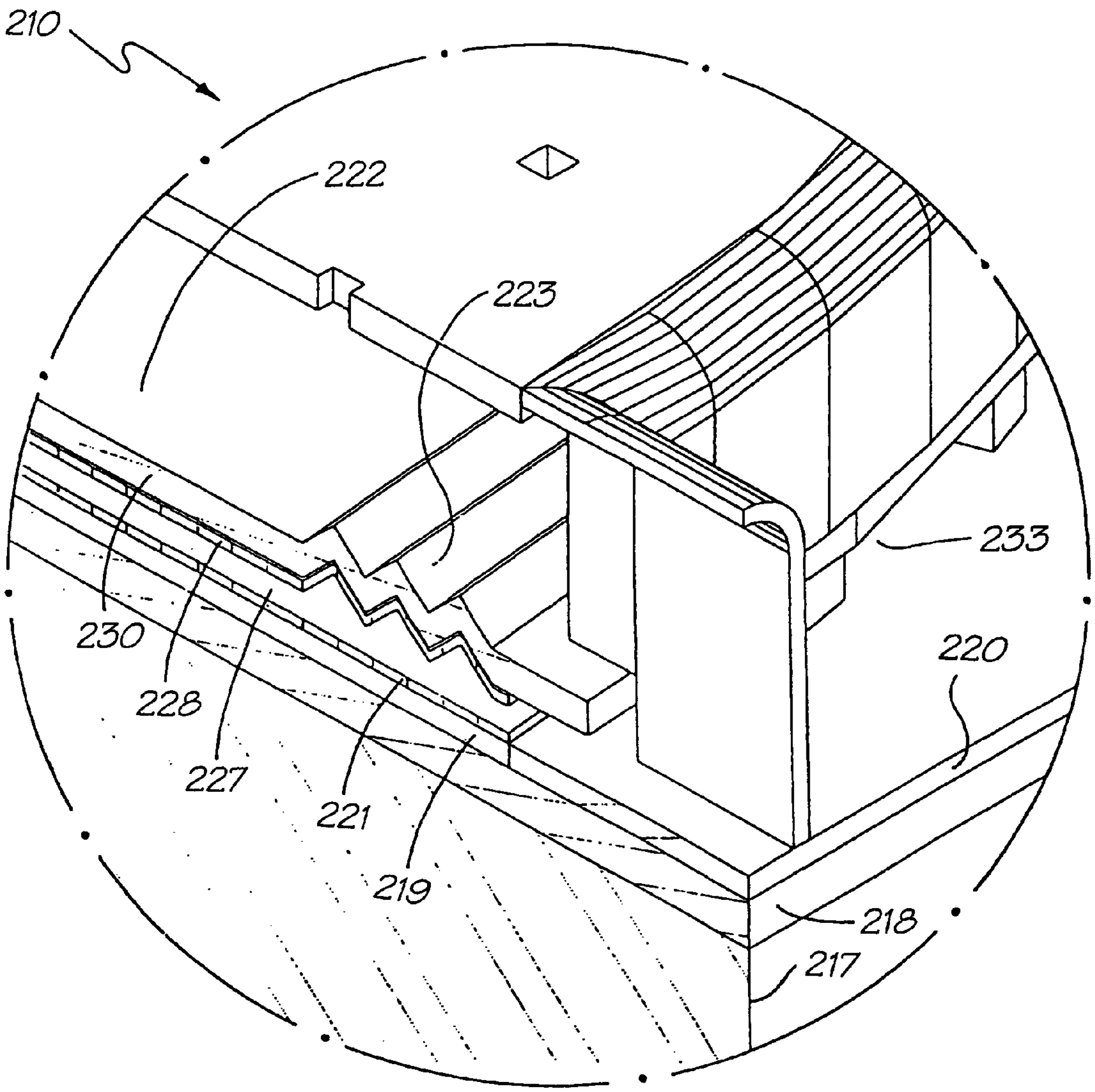
FIG. 23 is a close-up perspective cross-sectional view (portion A of FIG. 22), of a single ink jet nozzle constructed in accordance with a preferred embodiment.

Turning now to FIG. 23, there is illustrated a cross-sectional view of one side of the nozzle arrangement 210. A nozzle arrangement 210 is constructed on a silicon wafer base 217 on top of which is first constructed a standard CMOS two level metal layer 218 which includes the required drive and control circuitry for each nozzle arrangement. The layer 218, which includes two levels of aluminum, includes one level of aluminum 219 being utilized as a bottom electrode plate. Other portions 220 of this layer can comprise nitride passivation. On top of the layer 219 there is provided a thin polytetrafluoroethylene (PTFE) layer 221.

Next, an air gap 227 is provided between the top and bottom layers. This is followed by a further PTFE layer 228 which forms part of the top plate 222. The two PTFE layers 221, 228 are provided so as to reduce possible stiction effects between the upper and lower plates. Next, a top aluminum electrode layer 230 is provided followed by a nitride layer (not shown) which provides structural integrity to the top electro plate. The layers 228-230 are fabricated so as to include a corrugated portion 223 which concertinas upon movement of the top plate 222.

By placing a potential difference across the two aluminum layers 219 and 230, the top plate 222 is attracted to bottom aluminum layer 219 thereby resulting in a movement of the top plate 222 towards the bottom plate 219. This results in energy being stored in the concertinaed spring arrangement 223 in addition to air passing out of the side air holes, e.g. 233 and the ink being sucked into the nozzle chamber as a result of the distortion of the meniscus over the ink ejection port 212 (FIG. 22). Subsequently, the potential across the plates is eliminated thereby causing the concertinaed spring portion 223 to rapidly return the plate 222 to its rest position. The rapid movement of the plate 222 causes the consequential ejection of ink from the nozzle chamber via the ink ejection port 212 (FIG. 22). Additionally, air flows in via air gap 233 underneath the plate 222.

Figure 24:
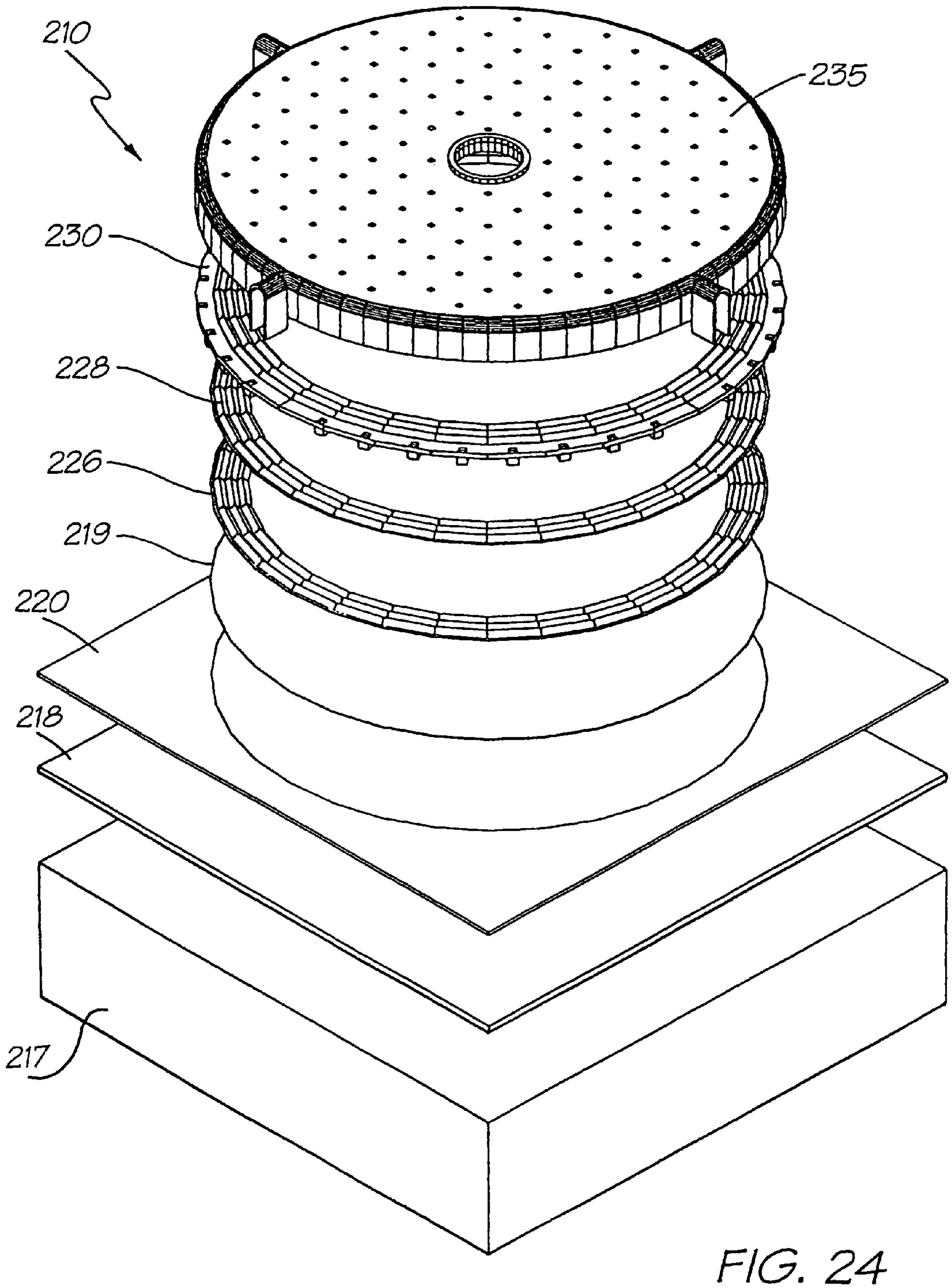
FIG. 24 is an exploded perspective view illustrating the construction of a single ink jet nozzle in accordance with a preferred embodiment.

The ink jet nozzles of a preferred embodiment can be formed from utilization of semi-conductor fabrication and MEMS techniques. Turning to FIG. 24, there is illustrated an exploded perspective view of the various layers in the final construction of a nozzle arrangement 210. At the lowest layer is the silicon wafer 217 upon which all other processing steps take place. On top of the silicon layer 217 is the CMOS circuitry layer 218 which primarily comprises glass. On top of this layer is a nitride passivation layer 220 which is primarily utilized to passivate and protect the lower glass layer from any sacrificial process that may be utilized in the building up of subsequent layers. Next there is provided the aluminum layer 219 which, in the alternative, can form part of the lower CMOS glass layer 218. This layer 219 forms the bottom plate. Next, two PTFE layers 226, 228 are provided between which is laid down a sacrificial layer, such as glass, which is subsequently etched away so as to release the plate 222 (FIG. 23). On top of the PTFE layer 228 is laid down the aluminum layer 230 and a subsequent thicker nitride layer (not shown) which provides structural support to the top electrode stopping it from sagging or deforming. After this comes the top nitride nozzle chamber layer 235 which forms the rest of the nozzle chamber and ink supply channel. The layer 235 can be formed from the depositing and etching of a sacrificial layer and then depositing the nitride layer, etching the nozzle and etchant holes utilizing an appropriate mask before etching away the sacrificial material.

Obviously, print heads can be formed from large arrays of nozzle arrangements 210 on a single wafer which is subsequently diced into separate print heads. Ink supply can be either from the side of the wafer or through the wafer utilizing deep anisotropic etching systems such as high density low pressure plasma etching systems available from surface technology systems. Further, the corrugated portion 223 can be formed through the utilisation of a half tone mask process.

Figure 25:
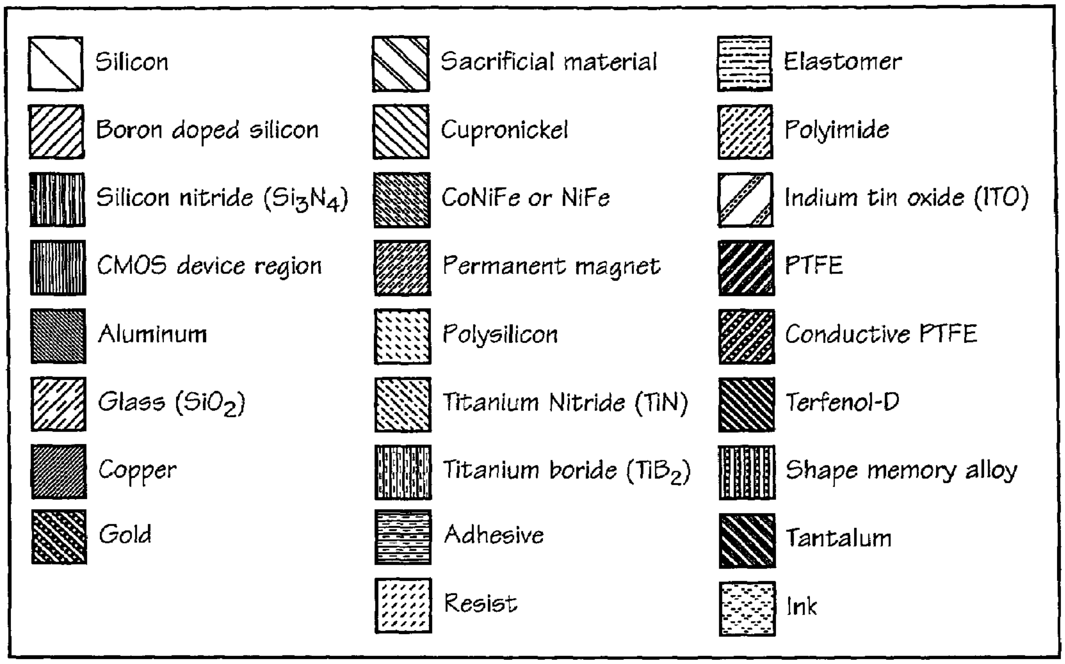
FIG. 25 provides a legend of the materials indicated in FIGS. 26 to 36.
Figure 26:
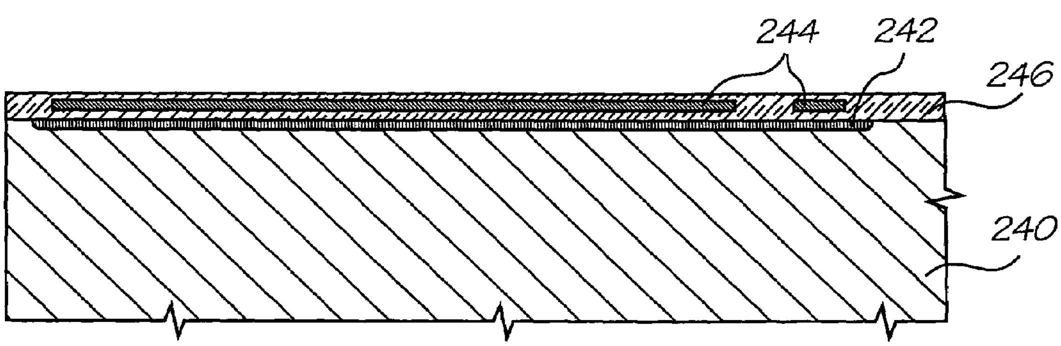
FIG. 26 to FIG. 36 illustrate sectional views of the manufacturing steps in one form of construction of an ink jet printhead nozzle.

One form of detailed manufacturing process which can be used to fabricate monolithic ink jet print heads operating in accordance with the principles taught by the present embodiment can proceed utilizing the following steps:

1. Using a double sided polished wafer 240, complete a 0.5 micron, one poly, 2 metal CMOS process 242. This step is shown in FIG. 26. For clarity, these diagrams may not be to scale, and may not represent a cross section though any single plane of the nozzle. FIG. 25 is a key to representations of various materials in these manufacturing diagrams, and those of other cross referenced ink jet configurations.

Figure 27:
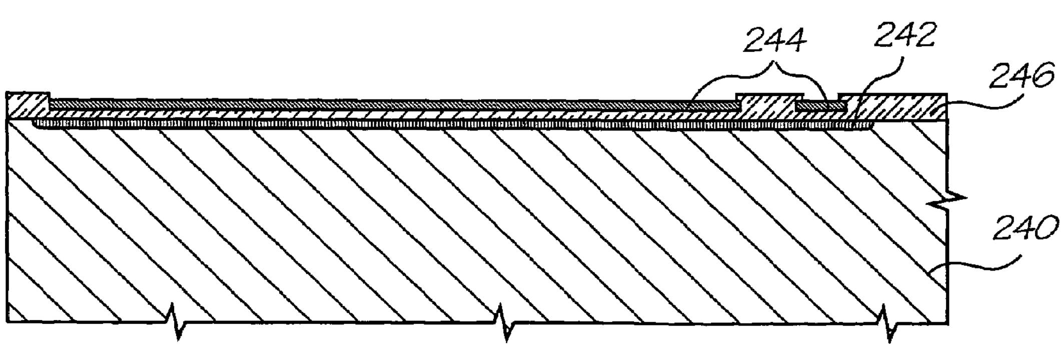

2. Etch the passivation layers 246 to expose the bottom electrode 244, formed of second level metal. This etch is performed using Mask 1. This step is shown in FIG. 27.

3. Deposit 50 nm of PTFE or other highly hydrophobic material.

4. Deposit 0.5 microns of sacrificial material, e.g. polyimide 248.

5. Deposit 0.5 microns of (sacrificial) photosensitive polyimide.

Figure 28:
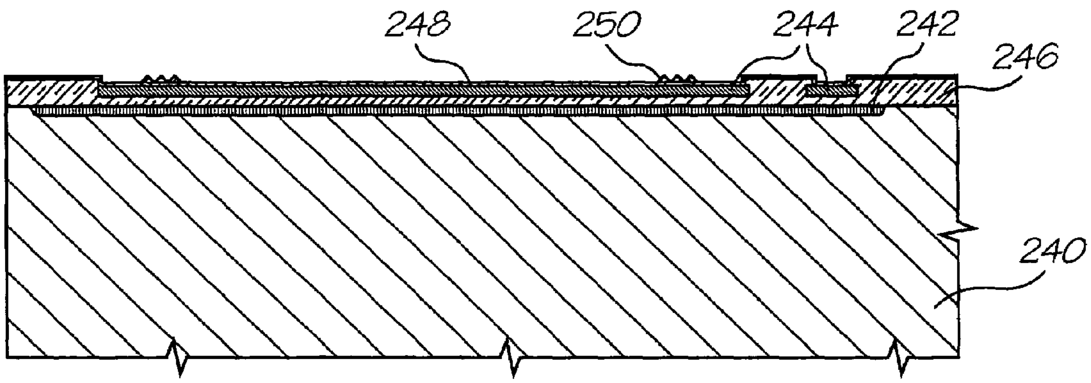

6. Expose and develop the photosensitive polyimide using Mask 2. This mask is a gray-scale mask which defines the concertina edge 250 of the upper electrode. The result of the etch is a series of triangular ridges at the circumference of the electrode. This concertina edge is used to convert tensile stress into bend strain, and thereby allow the upper electrode to move when a voltage is applied across the electrodes. This step is shown in FIG. 28.

7. Etch the polyimide and passivation layers using Mask 3, which exposes the contacts for the upper electrode which are formed in second level metal.

8. Deposit 0.1 microns of tantalum 252, forming the upper electrode.

9. Deposit 0.5 microns of silicon nitride ($Si_3N_4$), which forms the movable membrane of the upper electrode.

Figure 29:
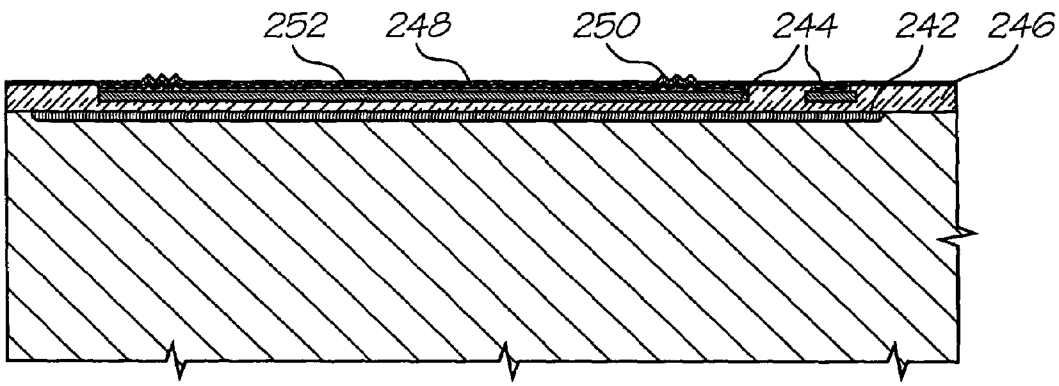

10. Etch the nitride and tantalum using Mask 4. This mask defines the upper electrode, as well as the contacts to the upper electrode. This step is shown in FIG. 29.

11. Deposit 12 microns of (sacrificial) photosensitive polyimide 254.

Figure 30:
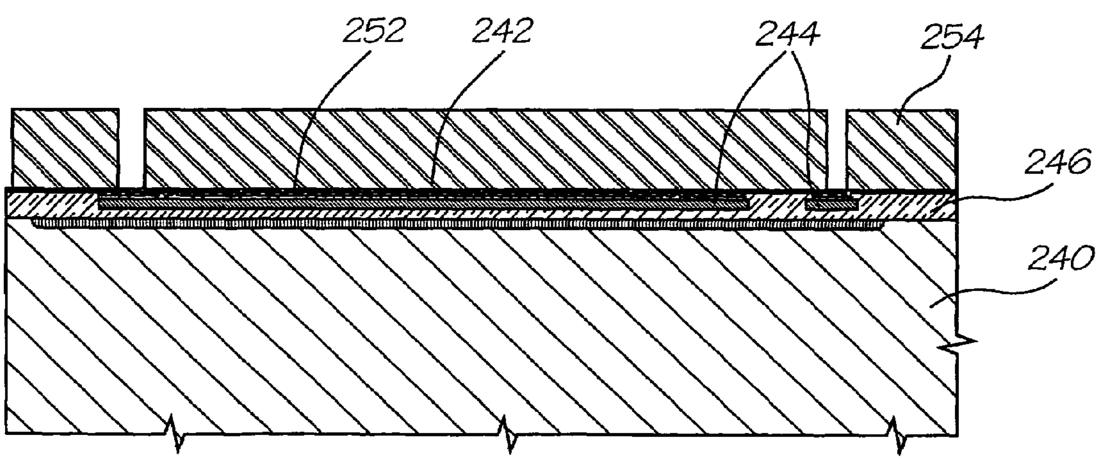

12. Expose and develop the photosensitive polyimide using Mask 5. A proximity aligner can be used to obtain a large depth of focus, as the line-width for this step is greater than 2 microns, and can be 5 microns or more. This mask defines the nozzle chamber walls. This step is shown in FIG. 30.

Figure 31:
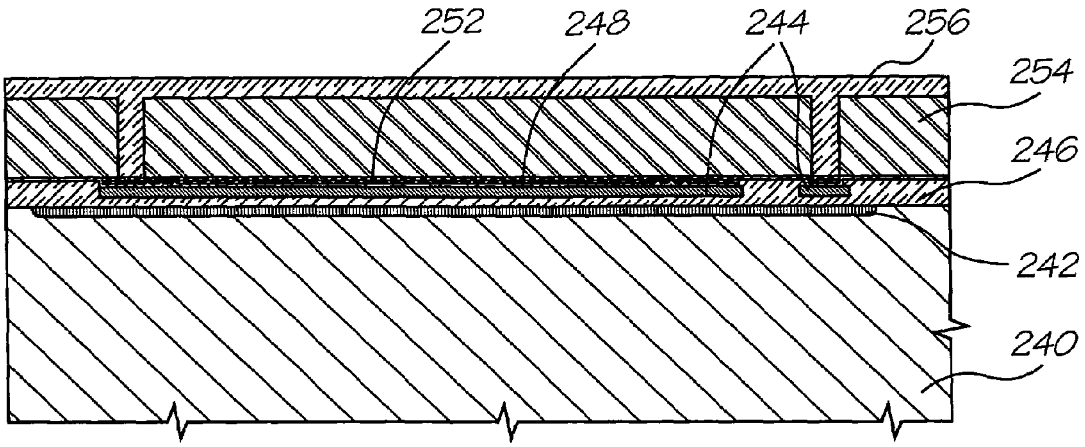

13. Deposit 3 microns of PECVD glass 256. This step is shown in FIG. 31.

Figure 32:
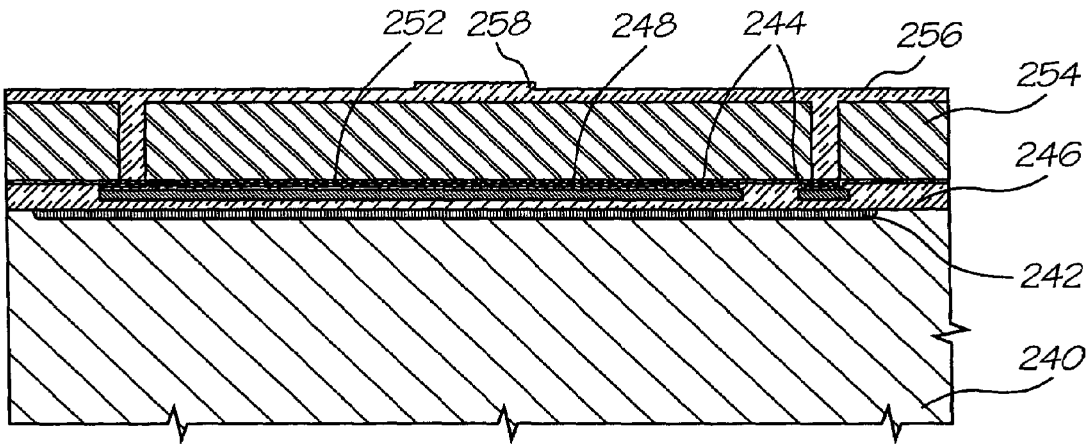

14. Etch to a depth of 1 micron using Mask 6. This mask defines the nozzle rim 258. This step is shown in FIG. 32.

Figure 33:
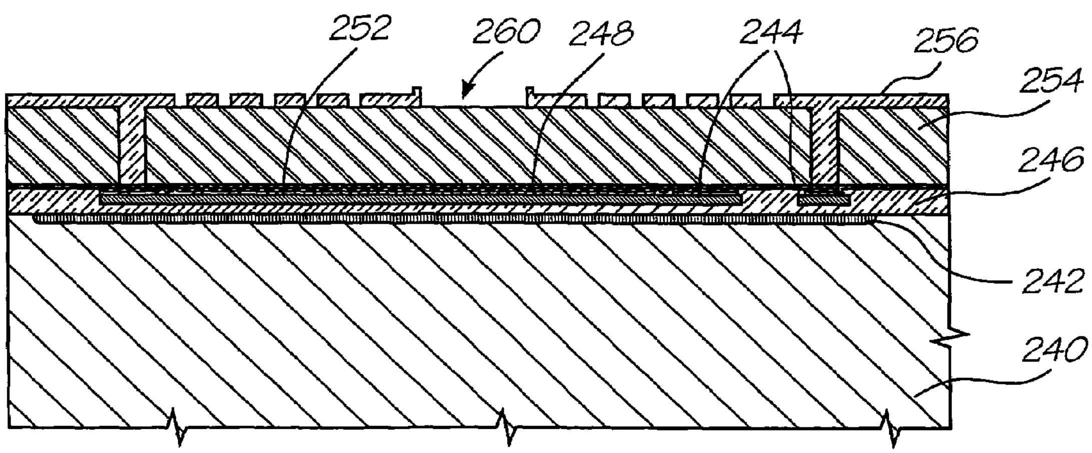

15. Etch down to the sacrificial layer 254 using Mask 7. This mask defines the roof of the nozzle chamber, and the nozzle 260 itself. This step is shown in FIG. 33.

16. Back-etch completely through the silicon wafer 246 (with, for example, an ASE Advanced Silicon Etcher from Surface Technology Systems) using Mask 8. This mask defines the ink inlets 262 which are etched through the wafer 240. The wafer 240 is also diced by this etch.

Figure 34:
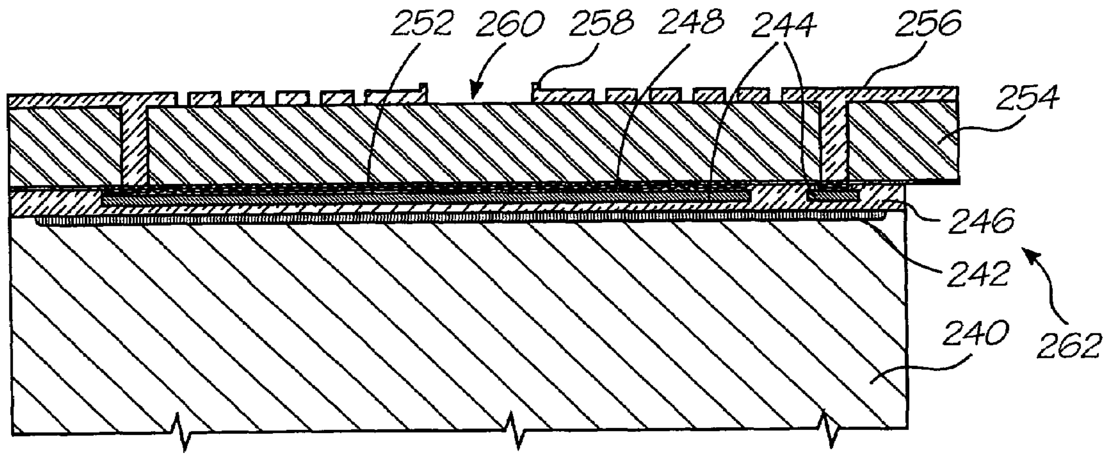

17. Back-etch through the CMOS oxide layer through the holes in the wafer 240. This step is shown in FIG. 34.

Figure 35:
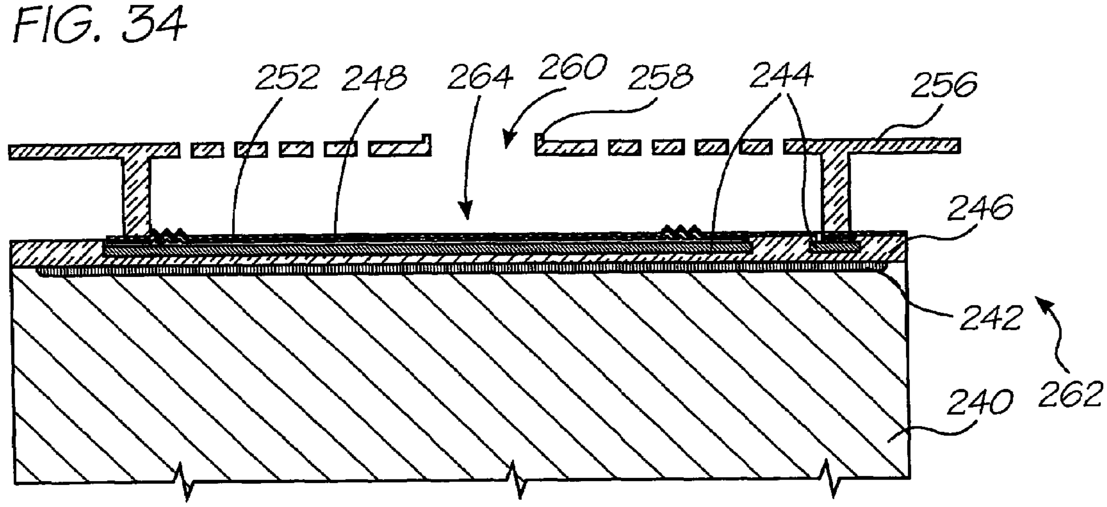

18. Etch the sacrificial polyimide 254. The nozzle chambers 264 are cleared, a gap is formed between the electrodes and the chips are separated by this etch. To avoid stiction, a final rinse using supercooled carbon dioxide can be used. This step is shown in FIG. 35.

19. Mount the print heads in their packaging, which may be a molded plastic former incorporating ink channels which supply the appropriate color ink to the ink inlets at the back of the wafer.

20. Connect the print heads to their interconnect systems. For a low profile connection with minimum disruption of airflow, TAB may be used. Wire bonding may also be used if the printer is to be operated with sufficient clearance to the paper.

21. Hydrophobize the front surface of the print heads.

Figure 36:
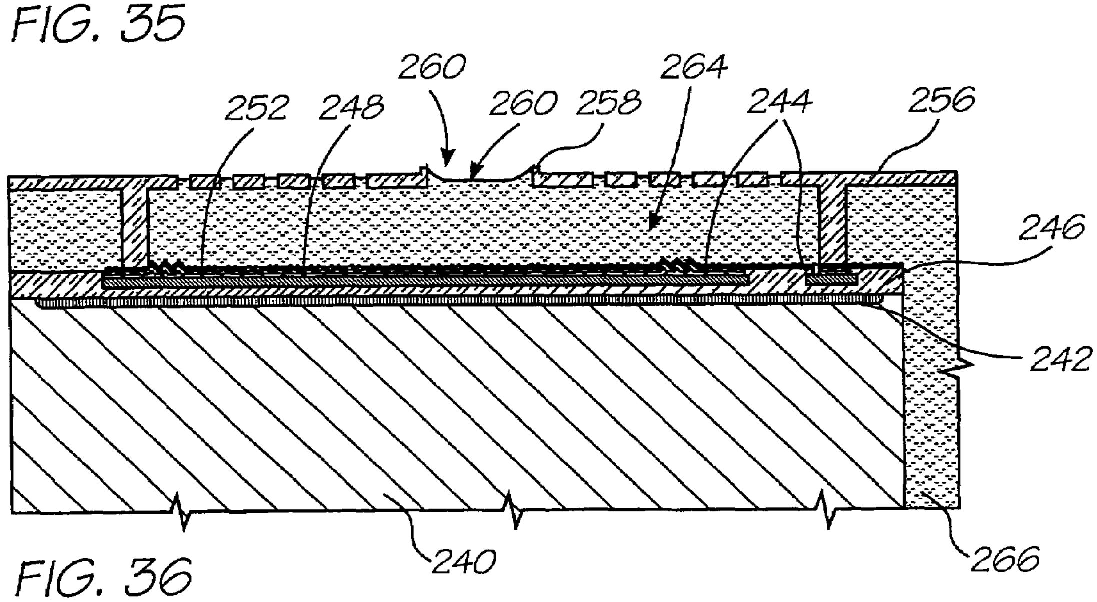

22. Fill the completed print heads with ink 266 and test them. A filled nozzle is shown in FIG. 36.

IJ03

In a preferred embodiment, there is provided an ink jet printer having nozzle chambers. Each nozzle chamber includes a thermoelastic bend actuator that utilizes a planar resistive material in the construction of the bend actuator. The bend actuator is activated when it is required to eject ink from a chamber.

Figure 37:
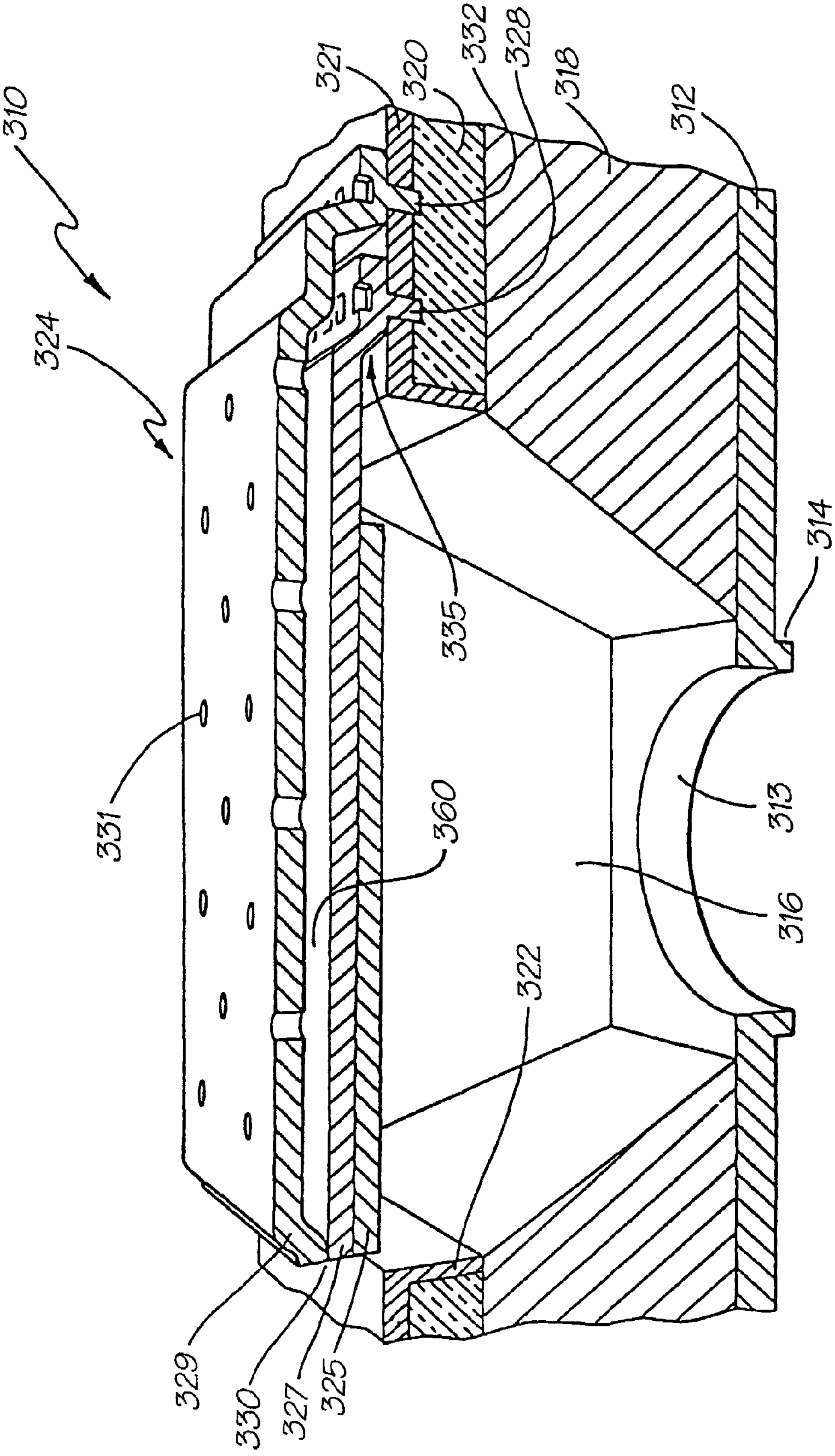
FIG. 37 is cross-sectional view, partly in section, of a single ink jet nozzle constructed in accordance with an embodiment of the present invention.

Turning now to FIG. 37, there is illustrated a cross-sectional view, partly in section of a nozzle arrangement 310 as constructed in accordance with a preferred embodiment. The nozzle arrangement 310 can be formed as part of an array of nozzles fabricated on a semi-conductor wafer utilizing techniques known in the production of micro-electro-mechanical systems (MEMS). The nozzle arrangement 310 includes a boron doped silicon wafer layer 312 which can be constructed by a back etching a silicon wafer 318 which has a buried boron doped epitaxial layer. The boron doped layer can be further etched so as to define a nozzle hole 313 and rim 314.

The nozzle arrangement 310 includes a nozzle chamber 316 which can be constructed by utilization of an anisotropic crystallographic etch of the silicon portions 318 of the wafer.

On top of the silicon portions 318 is included a glass layer 320 which can comprise CMOS drive circuitry including a two level metal layer (not shown) so as to provide control and drive circuitry for the thermal actuator. On top of the CMOS glass layer 320 is provided a nitride layer 321 which includes side portions 322 which act to passivate lower layers from etching that is utilized in construction of the nozzle arrangement 310. The nozzle arrangement 310 includes a paddle actuator 324 which is constructed on a nitride base 325 which acts to form a rigid paddle for the overall actuator 324. Next, an aluminum layer 327 is provided with the aluminum layer 327 being interconnected by vias 328 with the lower CMOS circuitry so as to form a first portion of a circuit. The aluminum layer 327 is interconnected at a point 330 to an Indium Tin Oxide (ITO) layer 329 which provides for resistive heating on demand. The ITO layer 329 includes a number of etch holes 331 for allowing the etching away of a lower level sacrificial layer which is formed between the layers 327, 329. The ITO layer is further connected to the lower glass CMOS circuitry layer by via 332. On top of the ITO layer 329 is optionally provided a polytetrafluoroethylene layer (not shown) which provides for insulation and further rapid expansion of the top layer 329 upon heating as a result of passing a current through the bottom layer 327 and ITO layer 329.

The back surface of the nozzle arrangement 310 is placed in an ink reservoir so as to allow ink to flow into nozzle chamber 316. When it is desired to eject a drop of ink a current is passed through the aluminum layer 327 and ITO layer 329. The aluminum layer 327 provides a very low resistance path to the current whereas the ITO layer 329 provides a high resistance path to the current. Each of the layers 327, 329 are passivated by means of coating by a thin nitride layer (not shown) so as to insulate and passivate the layers from the surrounding ink. Upon heating of the ITO layer 329 and optionally PTFE layer, the top of the actuator 324 expands more rapidly than the bottom portions of the actuator 324. This results in a rapid bending of the actuator 324, particularly around the point 335 due to the utilization of the rigid nitride paddle arrangement 325. This accentuates the downward movement of the actuator 324 which results in the ejection of ink from ink ejection nozzle 313.

Between the two layers 327, 329 is provided a gap 360 which can be constructed via utilization of etching of sacrificial layers so as to dissolve away sacrificial material between the two layers. Hence, in operation ink is allowed to enter this area and thereby provides a further cooling of the lower surface of the actuator 324 so as to assist in accentuating the bending. Upon de-activation of the actuator 324, it returns to its quiescent position above the nozzle chamber 316. The nozzle chamber 316 refills due to the surface tension of the ink through the gaps between the actuator 324 and the nozzle chamber 316.

The PTFE layer has a high coefficient of thermal expansion and therefore further assists in accentuating any bending of the actuator 324. Therefore, in order to eject ink from the nozzle chamber 316, a current is passed through the planar layers 327, 329 resulting in resistive heating of the top layer 329 which further results in a general bending down of the actuator 324 resulting in the ejection of ink.

The nozzle arrangement 310 is mounted on a second silicon chip wafer which defines an ink reservoir channel to the back of the nozzle arrangement 310 for resupply of ink.

Figure 38:
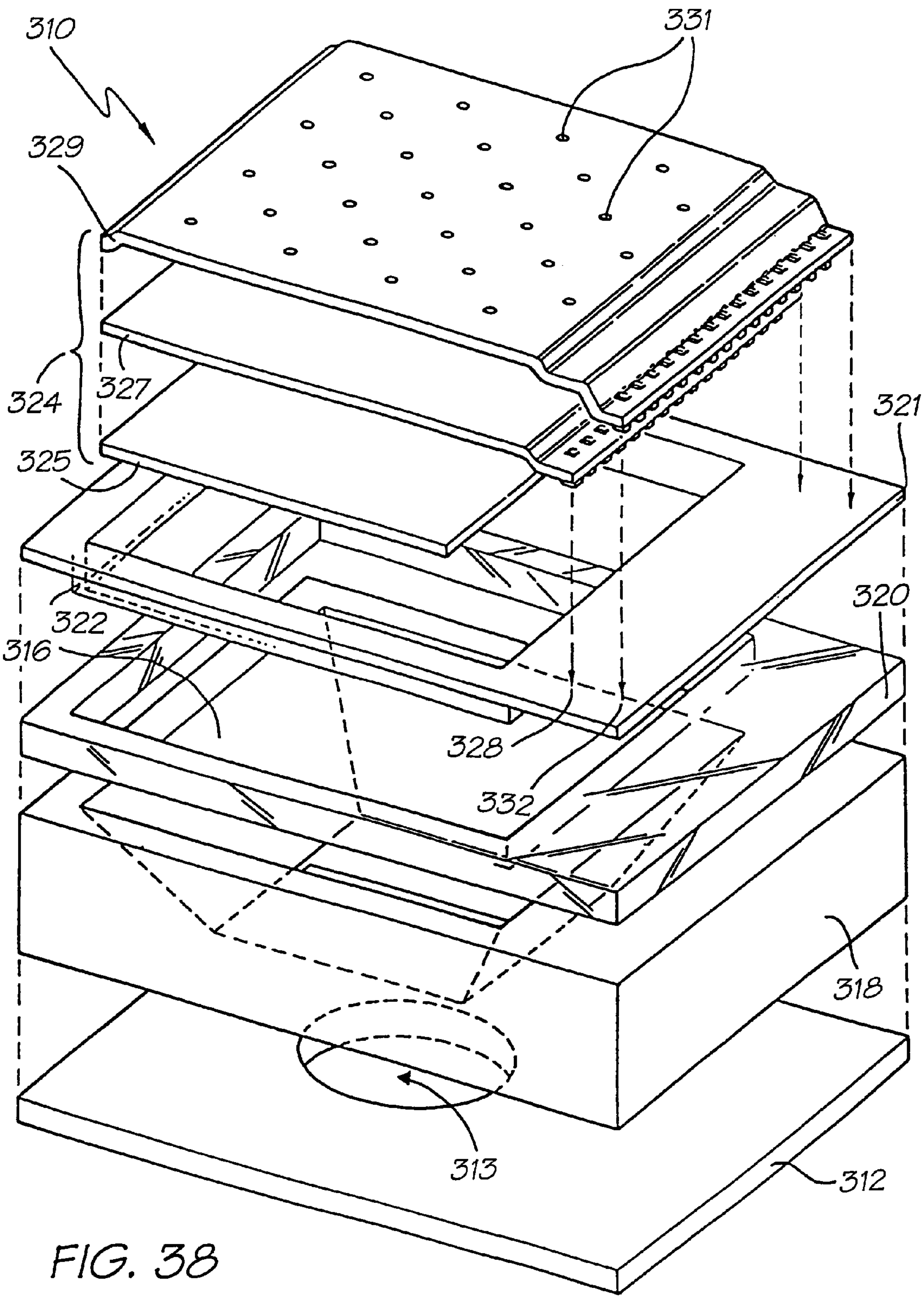
FIG. 38 is an exploded perspective view illustrating the construction of a single ink jet nozzle in accordance with an embodiment of the present invention.

Turning now to FIG. 38, there is illustrated an exploded perspective view illustrating the various layers of a nozzle arrangement 310. The arrangement 310 can, as noted previously, be constructed from back etching to the boron doped layer. The actuator 324 can further be constructed through the utilization of a sacrificial layer filling the nozzle chamber 316 and the depositing of the various layers 325, 327, 329 and optional PTFE layer before sacrificially etching the nozzle chamber 316 in addition to the sacrificial material in area 360 (See FIG. 37). To this end, the nitride layer 321 includes side portions 322 which act to passivate the portions of the lower glass layer 320 which would otherwise be attacked as a result of sacrificial etching.

One form of detailed manufacturing process which can be used to fabricate monolithic ink jet print heads operating in accordance with the principles taught by the present embodiment can proceed utilizing the following steps:

1. Using a double sided polished wafer deposit 3 microns of epitaxial silicon heavily doped with boron 312.

2. Deposit 10 microns of epitaxial silicon 318, either p-type or n-type, depending upon the CMOS process used.

Figure 39:
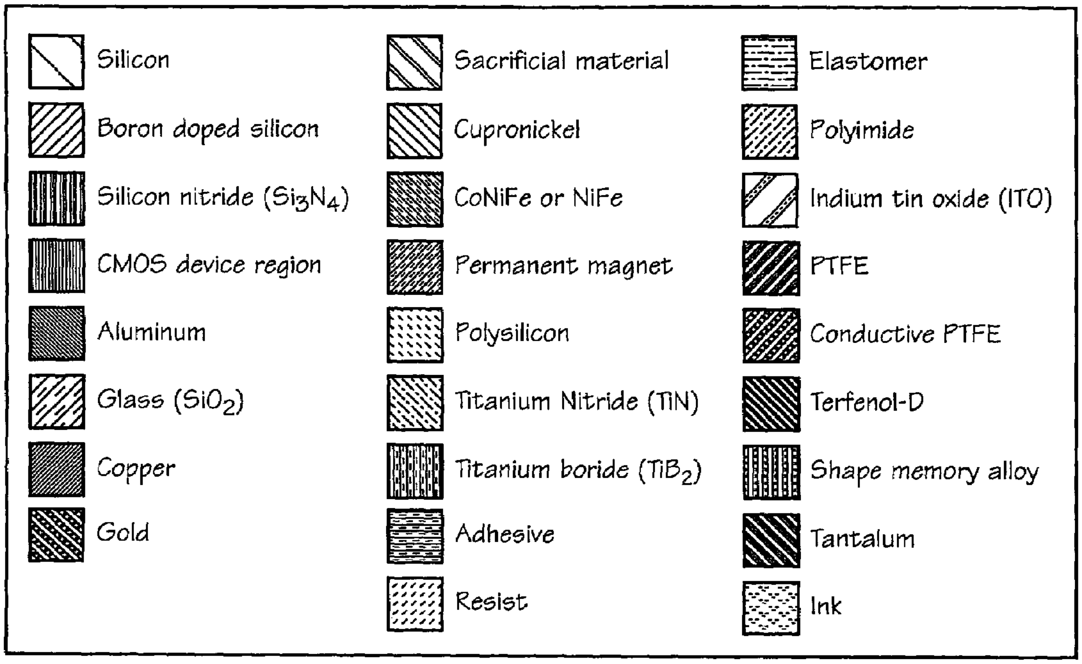
FIG. 39 provides a legend of the materials indicated in FIGS. 40 to 55.
Figure 40:
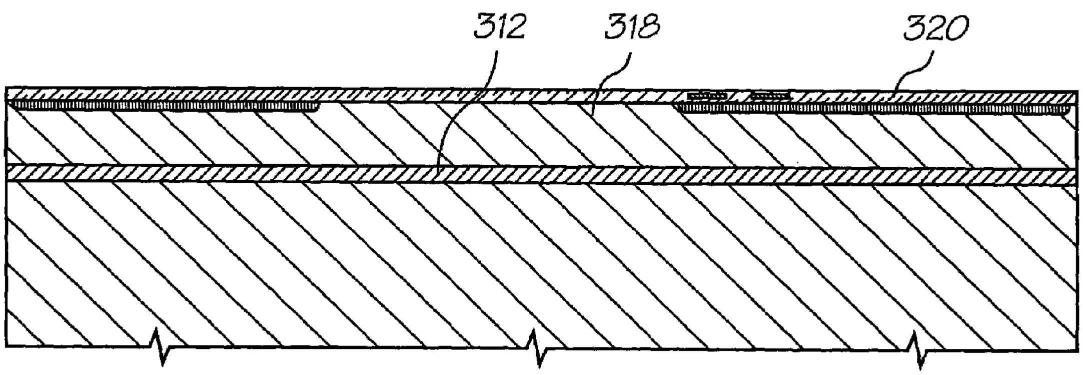
FIG. 40 to FIG. 55 illustrate sectional views of the manufacturing steps in one form of construction of an ink jet printhead nozzle.

3. Complete a 0.5 micron, one poly, 2 metal CMOS process 320. This step is shown in FIG. 40. For clarity, these diagrams may not be to scale, and may not represent a cross section though any single plane of the nozzle. FIG. 39 is a key to representations of various materials in these manufacturing diagrams, and those of other cross referenced ink jet configurations.

Figure 41:
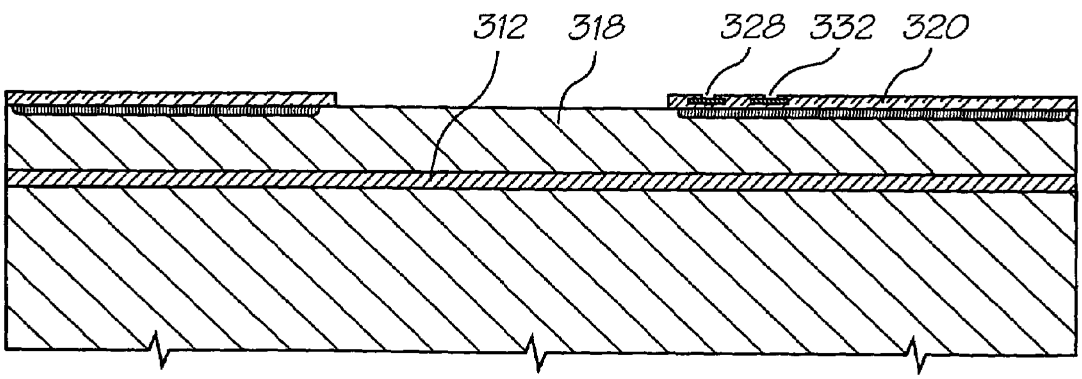

4. Etch the CMOS oxide layers down to silicon 318 or second level metal using Mask 1. This mask defines the nozzle cavity and the bend actuator electrode contact vias 328, 332. This step is shown in FIG. 41.

Figure 42:
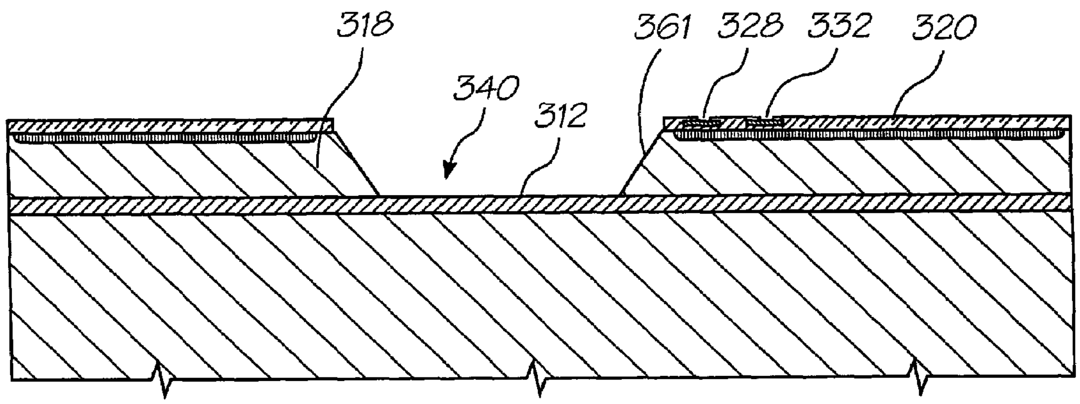

5. Crystallographically etch the exposed silicon 318 using KOH as shown at 340. This etch stops on <111> crystallographic planes 361, and on the boron doped silicon buried layer 312. This step is shown in FIG. 42.

Figure 43:
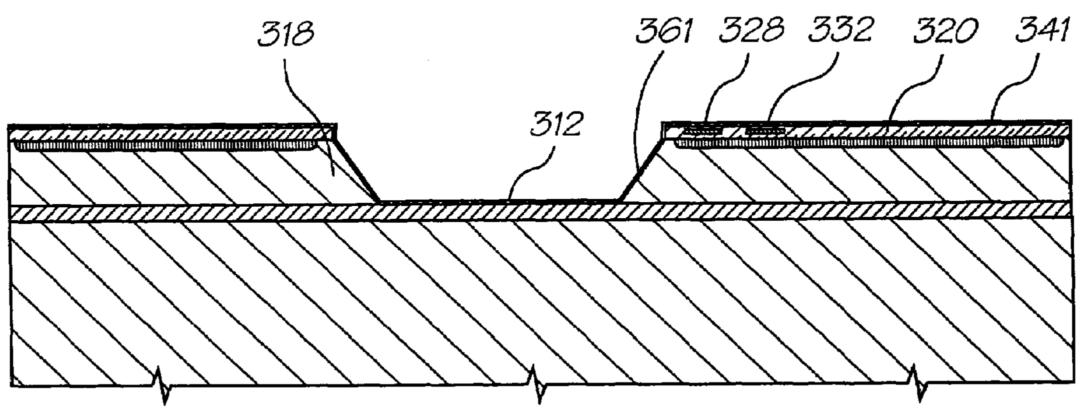

6. Deposit 0.5 microns of low stress PECVD silicon nitride 341 ($Si_3N_4$). The nitride 341 acts as an ion diffusion barrier. This step is shown in FIG. 43.

Figure 44:
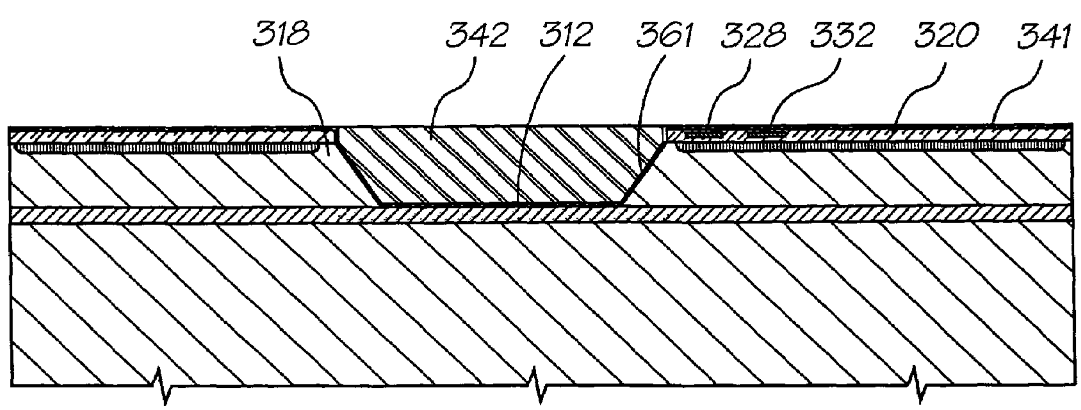

7. Deposit a thick sacrificial layer 342 (e.g. low stress glass), filling the nozzle cavity. Planarize the sacrificial layer 342 down to the nitride 341 surface. This step is shown in FIG. 44.

8. Deposit 1 micron of tantalum 343. This layer acts as a stiffener for the bend actuator.

Figure 45:
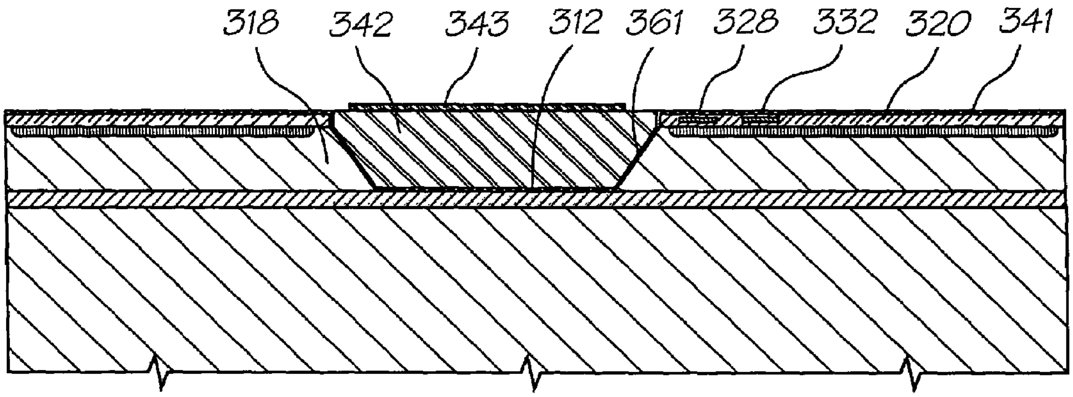

9. Etch the tantalum 343 using Mask 2. This step is shown in FIG. 45. This mask defines the space around the stiffener section of the bend actuator, and the electrode contact vias.

Figure 46:
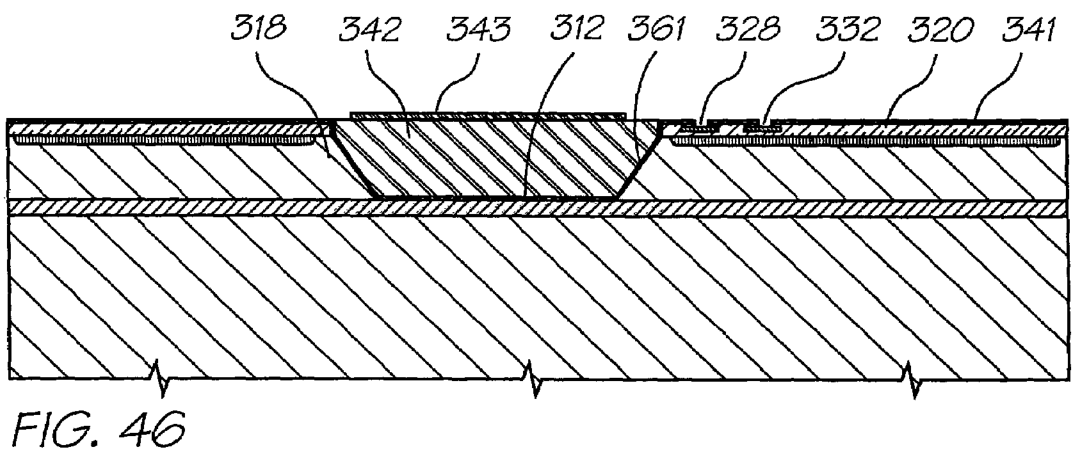

10. Etch nitride 341 still using Mask 2. This clears the nitride from the electrode contact vias 328, 332. This step is shown in FIG. 46.

Figure 47:
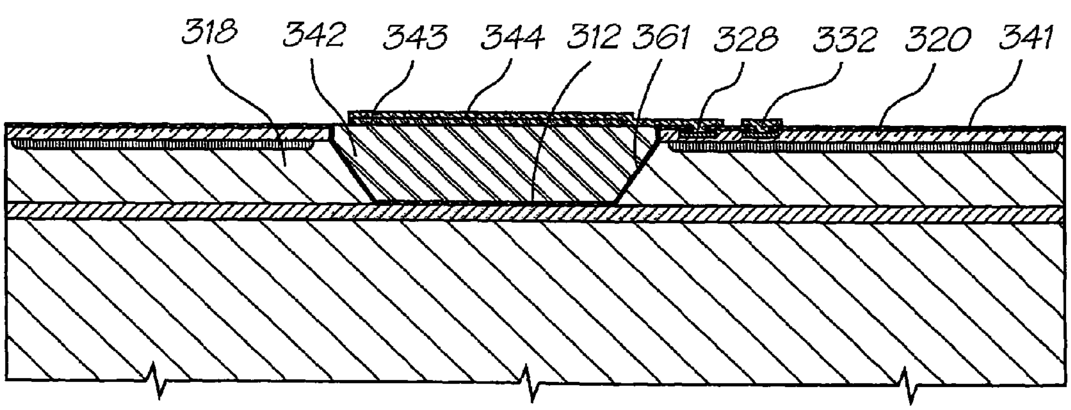

11. Deposit one-micron of gold 344, patterned using Mask 3. This may be deposited in a lift-off process. Gold is used for its corrosion resistance and low Young's modulus. This mask defines the lower conductor of the bend actuator. This step is shown in FIG. 47.

12. Deposit 1 micron of thermal blanket 345. This material should be a non-conductive material with a very low Young's modulus and a low thermal conductivity, such as an elastomer or foamed polymer.

Figure 48:
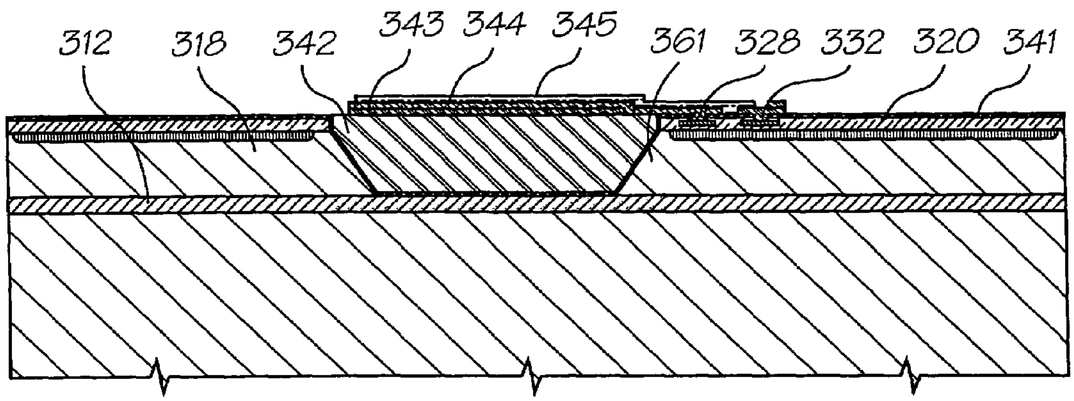

13. Pattern the thermal blanket 345 using Mask 4. This mask defines the contacts between the upper and lower conductors, and the upper conductor and the drive circuitry. This step is shown in FIG. 48.

14. Deposit 1 micron of a material 346 with a very high resistivity (but still conductive), a high Young's modulus, a low heat capacity, and a high coefficient of thermal expansion. A material such as indium tin oxide (ITO) may be used, depending upon the dimensions of the bend actuator.

Figure 49:
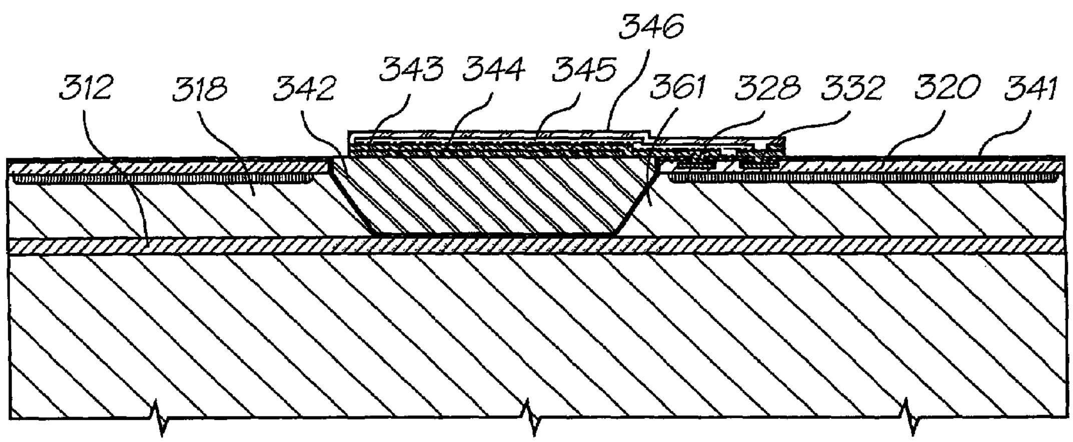

15. Pattern the ITO 346 using Mask 5. This mask defines the upper conductor of the bend actuator. This step is shown in FIG. 49.

16. Deposit a further 1 micron of thermal blanket 347.

Figure 50:
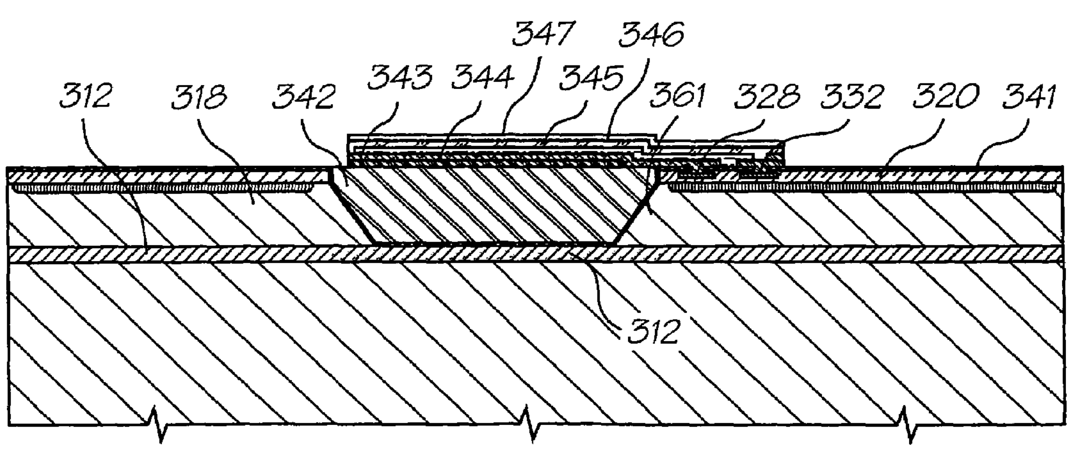

17. Pattern the thermal blanket 347 using Mask 6. This mask defines the bend actuator, and allows ink to flow around the actuator into the nozzle cavity. This step is shown in FIG. 50.

Figure 51:
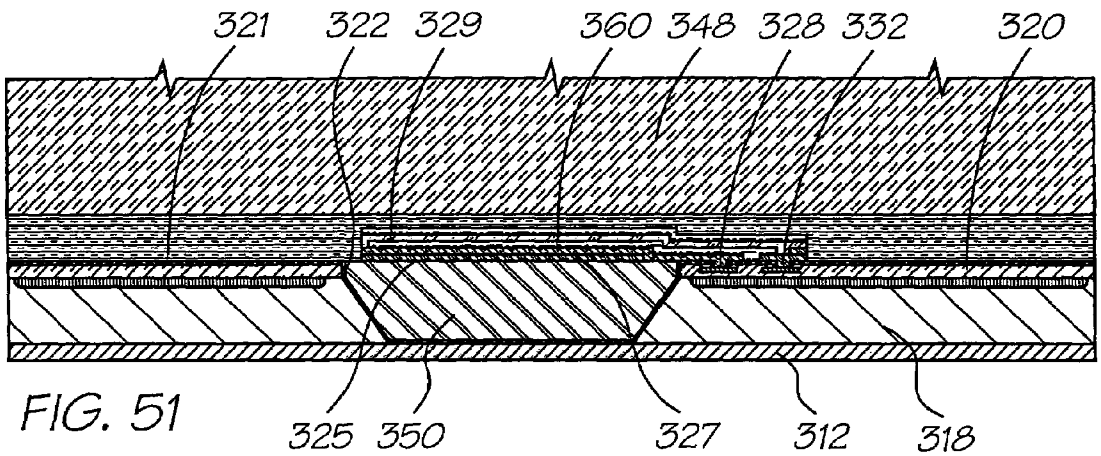

18. Mount the wafer on a glass blank 348 and back-etch the wafer using KOH, with no mask. This etch thins the wafer and stops at the buried boron doped silicon layer 312. This step is shown in FIG. 51.

Figure 52:
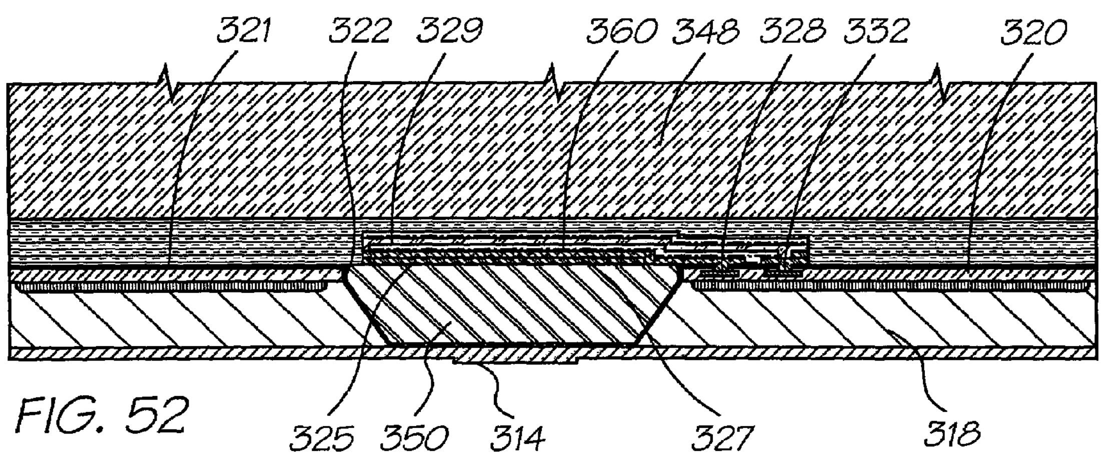

19. Plasma back-etch the boron doped silicon layer 312 to a depth of 1 micron using Mask 7. This mask defines the nozzle rim 314. This step is shown in FIG. 52.

20. Plasma back-etch through the boron doped layer 312 using Mask 8. This mask defines the nozzle 313, and the edge of the chips.

Figure 53:
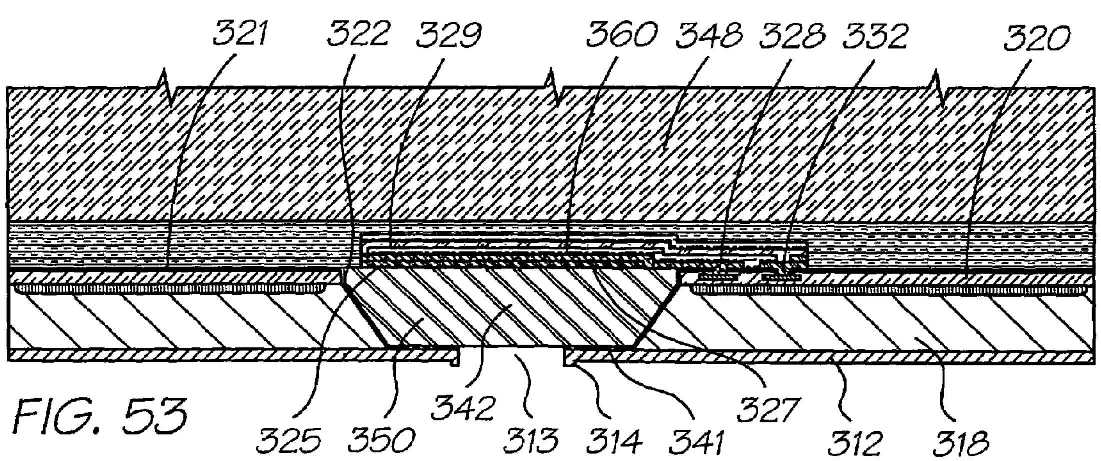

21. Plasma back-etch nitride 341 up to the glass sacrificial layer 342 through the holes in the boron doped silicon layer 312. At this stage, the chips are separate, but are still mounted on the glass blank. This step is shown in FIG. 53.

22. Strip the adhesive layer to detach the chips from the glass blank 348.

Figure 54:
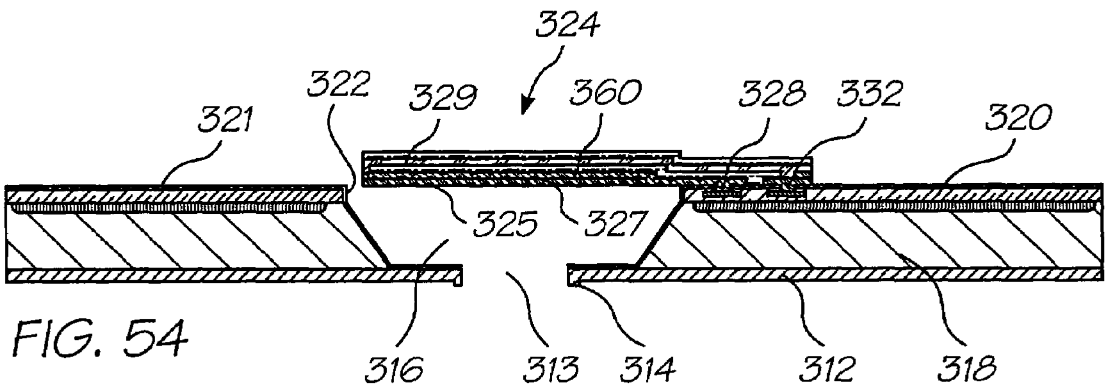

23. Etch the sacrificial glass layer 342 in buffered HF. This step is shown in FIG. 54.

24. Mount the printheads in their packaging, which may be a molded plastic former incorporating ink channels which supply different colors of ink to the appropriate regions of the front surface of the wafer.

25. Connect the printheads to their interconnect systems.

26. Hydrophobize the front surface of the printheads.

Figure 55:
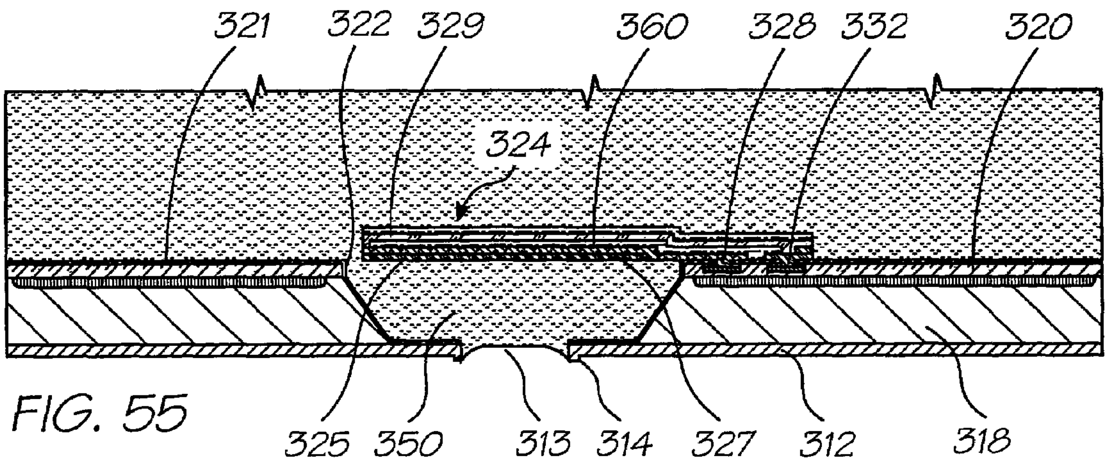

27. Fill the completed printheads with ink 350 and test them. A filled nozzle is shown in FIG. 55.

IJ04

In a preferred embodiment, a stacked capacitive actuator is provided which has alternative electrode layers sandwiched between a compressible polymer. Hence, on activation of the stacked capacitor the plates are drawn together compressing the polymer thereby storing energy in the compressed polymer. The capacitor is then de-activated or drained with the result that the compressed polymer acts to return the actuator to its original position and thereby causes the ejection of ink-from an ink ejection port.

Figure 56:
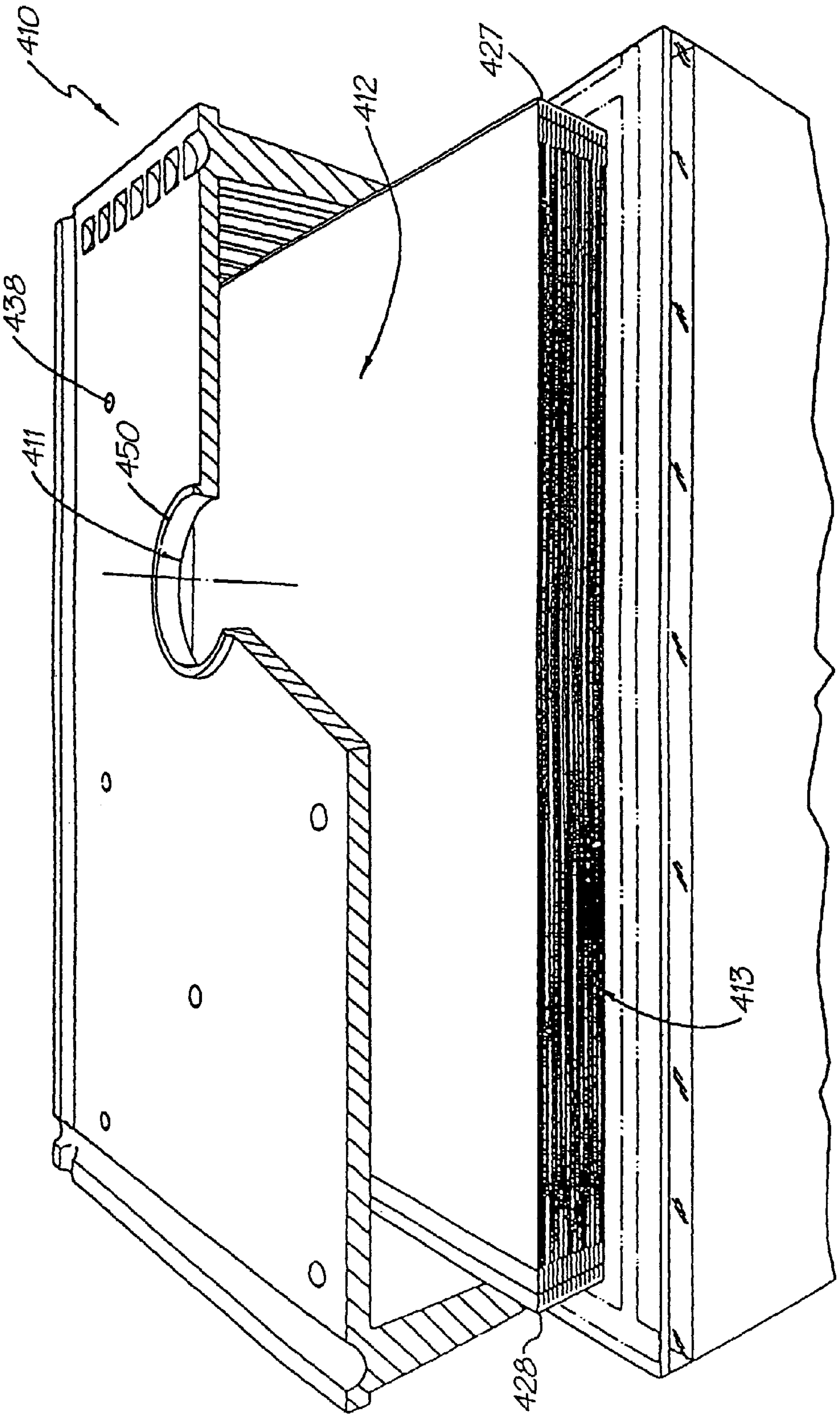
FIG. 56 is a perspective view through a single ink jet nozzle constructed in accordance with a preferred embodiment of the present invention.
Figure 57:
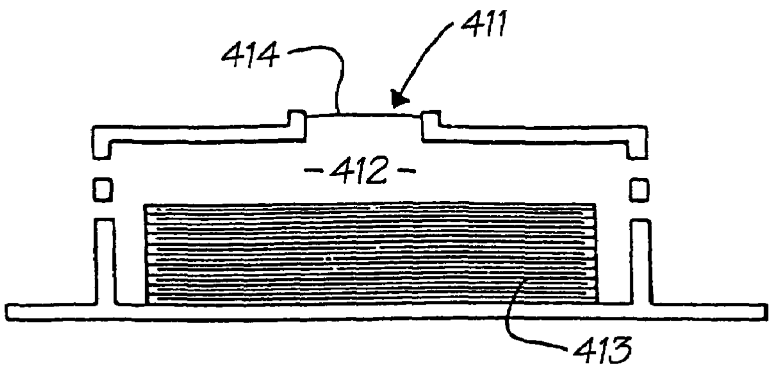
FIG. 57 is a schematic cross-sectional view of the ink nozzle constructed in accordance with a preferred embodiment of the present invention, with the actuator in its quiescent state.
Figure 58:
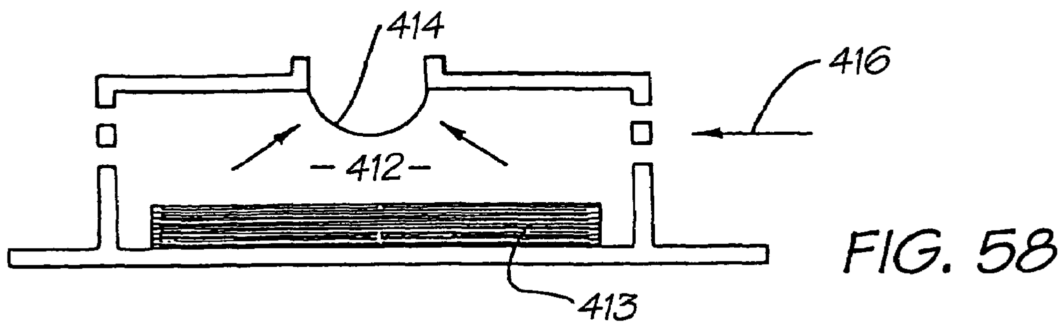
FIG. 58 is a schematic cross-sectional view of the ink nozzle immediately after activation of the actuator.

Turning now to FIG. 56, there is illustrated a single nozzle arrangement 410 as constructed in accordance with a preferred embodiment. The nozzle arrangement 410 includes an ink ejection portal 411 for the ejection of ink on demand. The ink is ejected from a nozzle chamber 412 by means of a stacked capacitor-type device 413. In a first design, the stacked capacitor device 413 consists of capacitive plates sandwiched between a compressible polymer. Upon charging of the capacitive plates, the polymer is compressed thereby resulting in a general "accordion" or "concertinaing" of the actuator 413 so that its top surface moves away from the ink ejection portal 411. The compression of the polymer sandwich stores energy in the compressed polymer. The capacitors are subsequently rapidly discharged resulting in the energy in the compressed polymer being released upon the polymer's return to quiescent position. The return of the actuator to its quiescent position results in the ejection of ink from the nozzle chamber 412. The process is illustrated schematically in FIGS. 57-60 with FIG. 57 illustrating the nozzle chamber 412 in its quiescent or idle state, having an ink meniscus 414 around the nozzle ejection portal 411. Subsequently, the electrostatic actuator 413 is activated resulting in its contraction as indicated in FIG. 58. The contraction results in the meniscus 414 changing shape as indicated with the resulting surface tension effects resulting in the drawing in of ink around the meniscus and consequently ink 416 flows into nozzle chamber 412.

Figure 59:
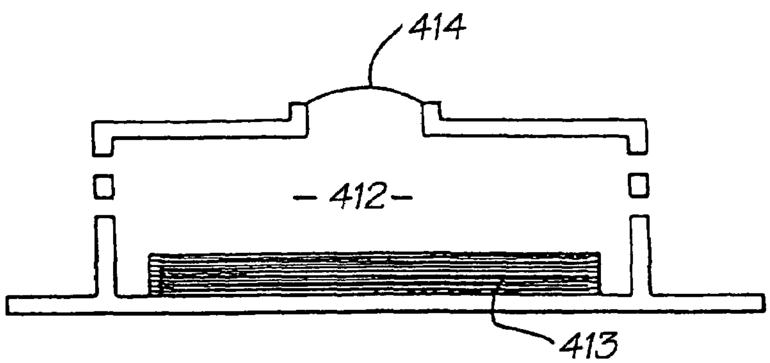
FIG. 59 is a schematic cross-sectional view illustrating the ink jet nozzle ready for firing.
Figure 60:
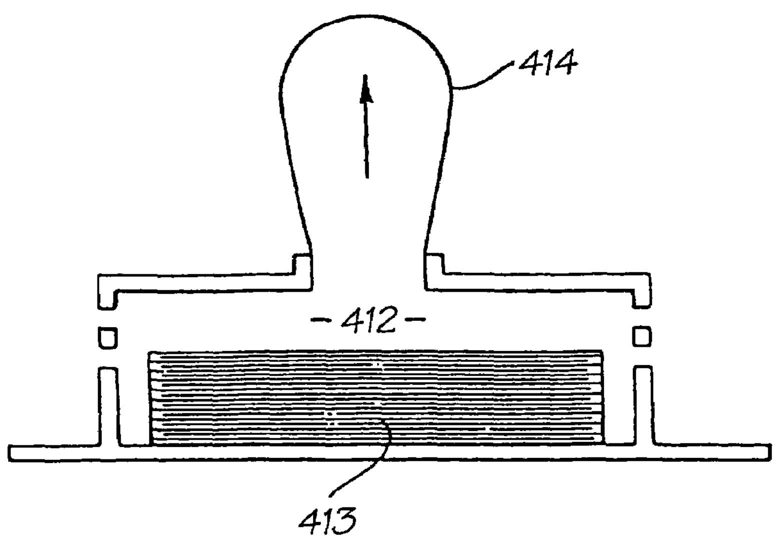
FIG. 60 is a schematic cross-sectional view of the ink nozzle immediately after deactivation of the actuator.

After sufficient time, the meniscus 414 returns to its quiescent position with the capacitor 413 being loaded ready for firing (FIG. 59). The capacitor plates 413 are then rapidly discharged resulting, as illustrated in FIG. 60, in the rapid return of the actuator 413 to its original position. The rapid return imparts a momentum to the ink within the nozzle chamber 412 so as to cause the expansion of the ink meniscus 414 and the subsequent ejection of ink from the nozzle chamber 412.

Figure 61:
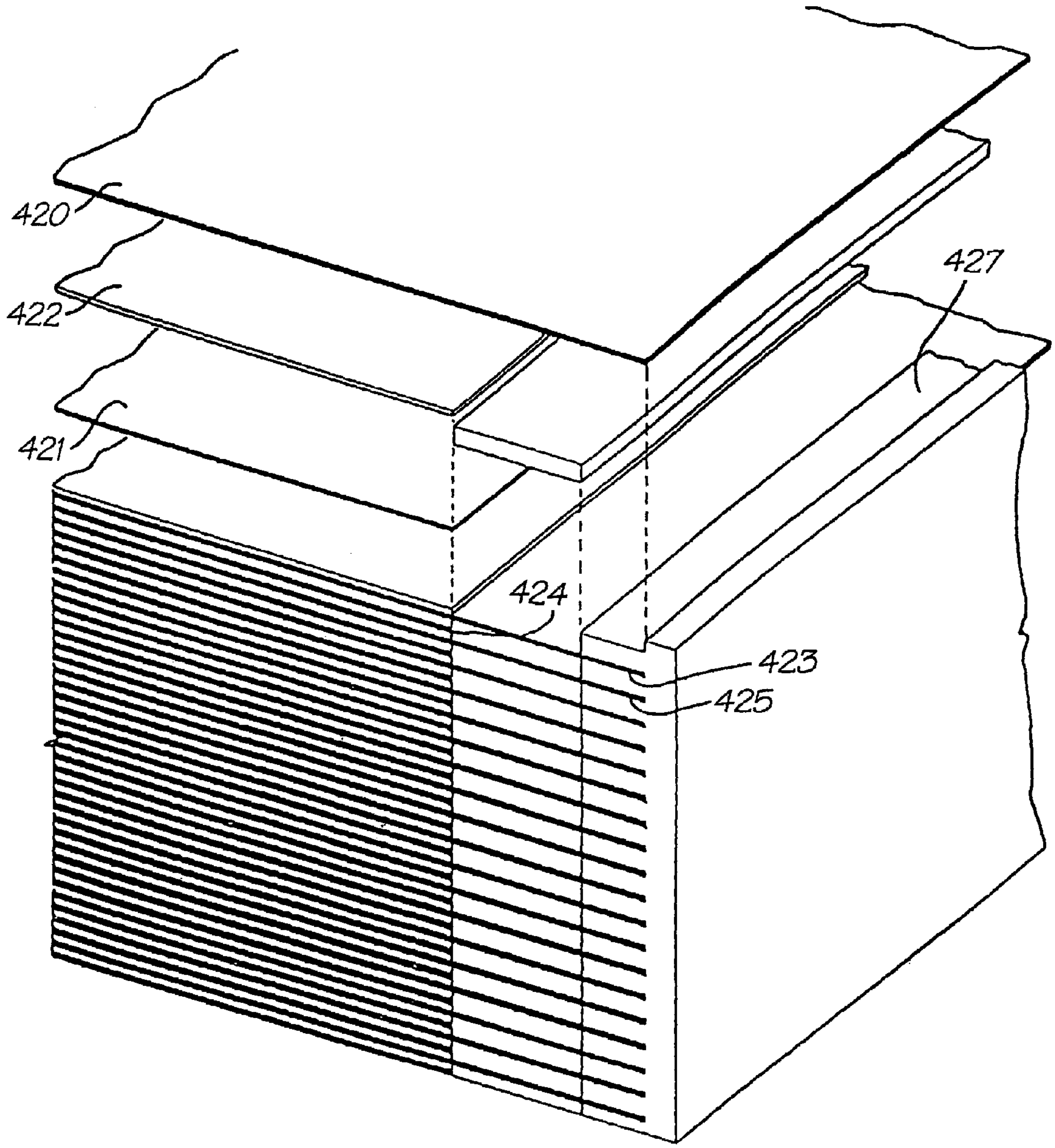
FIG. 61 is a perspective view, in part exploded, of the actuator of a single ink jet nozzle constructed in accordance with a preferred embodiment of the present invention.

Turning now to FIG. 61, there is illustrated a perspective view of a portion of the actuator 413 exploded in part. The actuator 413 consists of a series of interleaved plates 420, 421 between which is sandwiched a compressive material 422, for example styrene-ethylene-butylene-styrene block copolymer. One group of electrodes, e.g. 420, 423, 425 jut out at one side of the stacked capacitor layout A second series of electrodes, e.g. 421, 424 jut out a second side of the capacitive actuator. The electrodes are connected at one side to a first conductive material 427 and the other series of electrodes, e.g. 421, 424 are connected to second conductive material 428 (FIG. 56). The two conductive materials 427, 428 are electrically isolated from one another and are in turn interconnected to lower signal and drive layers as will become more readily apparent hereinafter.

In alternative designs, the stacked capacitor device 413 consists of other thin film materials in place of the styrene-ethylene-butylene-styrene block copolymer. Such materials may include:

1) Piezoelectric materials such as PZT

2) Electrostrictive materials such as PLZT

3) Materials, that can be electrically switched between a ferro-electric and an anti-ferro-electric phase such as PLZSnT.

Importantly, the electrode actuator 413 can be rapidly constructed utilizing chemical vapor deposition (CVD) techniques. The various layers, 420, 421, 422 can be laid down on a planar wafer one after another covering the whole surface of the wafer. A stack can be built up rapidly utilizing CVD techniques. The two sets of electrodes are preferably deposited utilizing separate metals. For example, aluminum and tantalum could be utilized as materials for the metal layers. The utilization of different metal layers allows for selective etching utilizing a mask layer so as to form the structure as indicated in FIG. 61. For example, the CVD sandwich can be first laid down and then a series of selective etchings utilizing appropriate masks can be utilized to produce the overall stacked capacitor structure. The utilization of the CVD process substantially enhances the efficiency of production of the stacked capacitor devices.

Construction of the Ink Nozzle Arrangement

Figure 62:
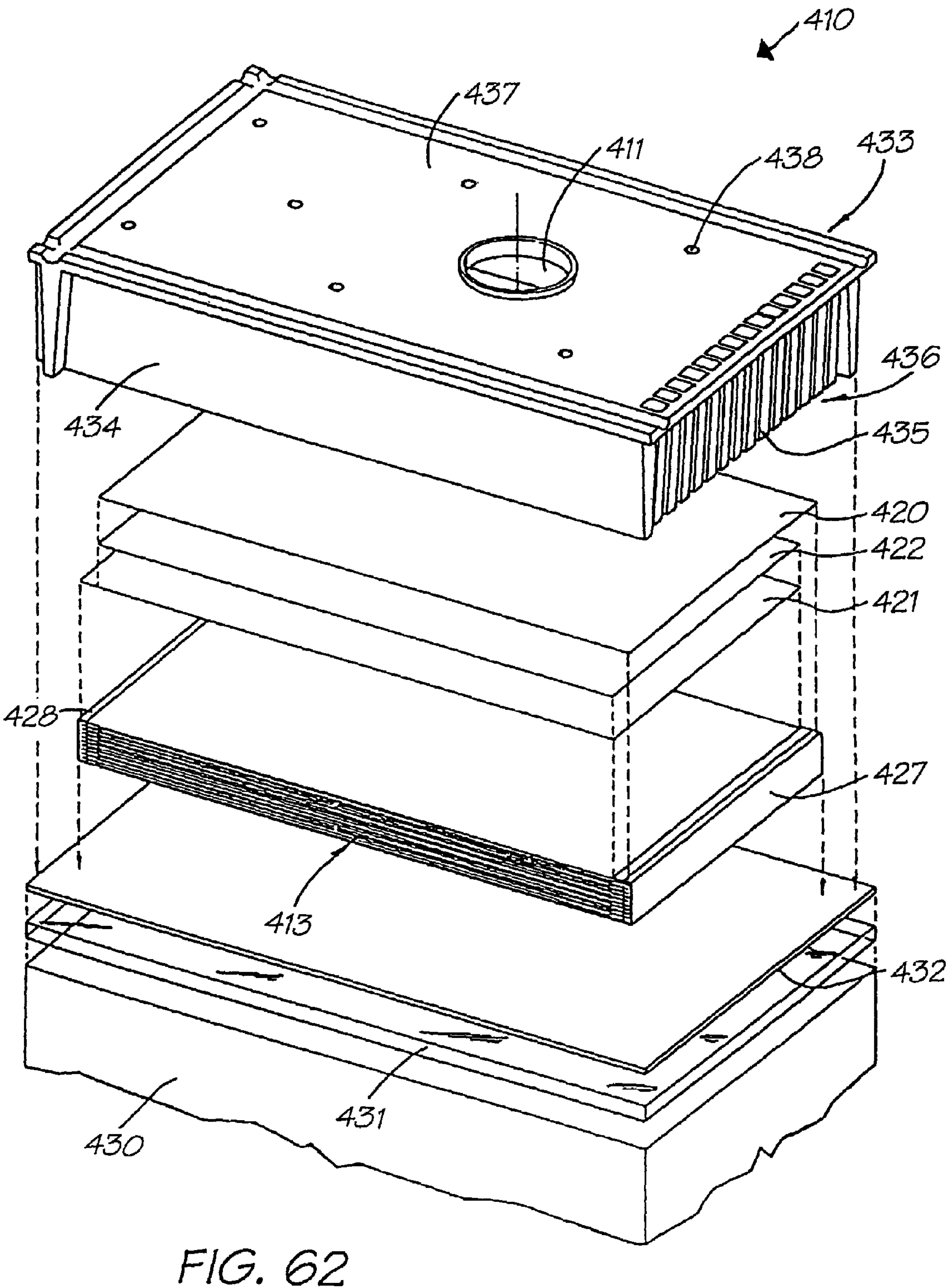
FIG. 62 is an exploded perspective view illustrating the construction of a single ink jet nozzle in accordance with a preferred embodiment of the present invention.

Turning now to FIG. 62 there is shown an exploded perspective view illustrating the construction of a single ink jet nozzle in accordance with a preferred embodiment. The ink jet nozzle arrangement 410 is constructed on a standard silicon wafer 430 on top of which is constructed data drive circuitry which can be constructed in the usual manner such as a two-level metal CMOS layer 431. On top of the CMOS layer 431 is constructed a nitride passivation layer 432 which provides passivation protection for the lower layers during operation and also should an etchant be utilized which would normally dissolve the lower layers. The various layers of the stacked device 413, for example 420, 421, 422, can be laid down utilizing CVD techniques. The stacked device 413 is constructed utilizing the aforementioned production steps including utilizing appropriate masks for selective etchings to produce the overall stacked capacitor structure. Further, interconnection can be provided between the electrodes 427,428 and the circuitry in the CMOS layer 431. Finally, a nitride layer 433 is provided so as to form the walls of the nozzle chamber, e.g. 434, and posts, e.g. 435, in one open wall 436 of the nozzle chamber. The surface layer 437 of the layer 433 can be deposited onto a sacrificial material. The sacrificial material is subsequently etched so as to form the nozzle chamber 412 (FIG. 56). To this end, the top layer 437 includes etchant holes, e.g. 438, so as to speed up the etching process in addition to the ink ejection portal 411. The diameter of the etchant holes, e.g. 438, is significantly smaller than that of the ink ejection portal 411. If required an additional nitride layer may be provided on top of the layer 420 to protect the stacked device 413 during the etching of the sacrificial material to form the nozzle chamber 412 (FIG. 56) and during operation of the ink jet nozzle.

Figure 63:
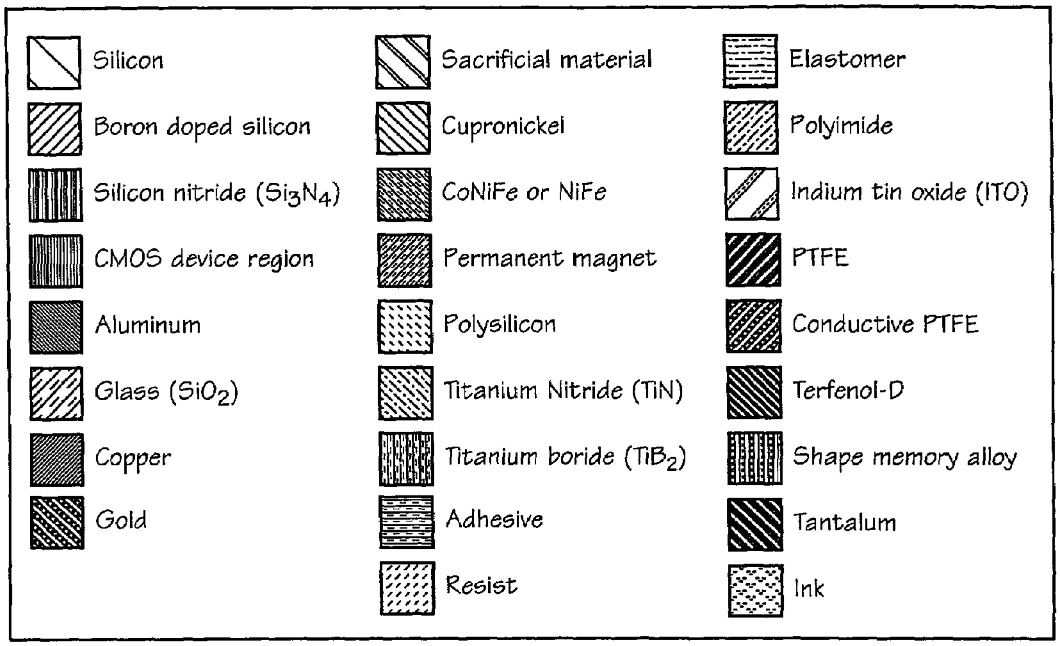
FIG. 63 provides a legend of the materials indicated in FIGS. 64 to 77.
Figure 64:
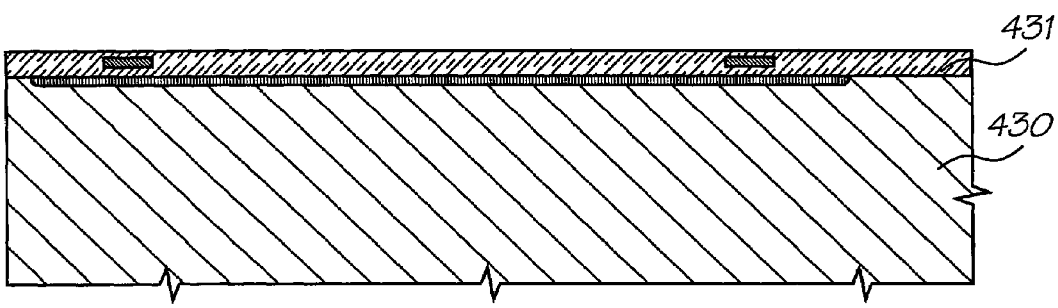
FIG. 64 to FIG. 77 illustrate sectional views of the manufacturing steps in one form of construction of an ink jet printhead nozzle.

One form of detailed manufacturing process which can be used to fabricate monolithic ink jet print heads operating in accordance with the principles taught by the present embodiment can proceed utilizing the following steps:

1. Using a double sided polished wafer 430, complete a 0.5 micron, one poly, 2 metal CMOS layer 431 process. This step is shown in FIG. 64. For clarity, these diagrams may not be to scale, and may not represent a cross section though any single plane of the nozzle. FIG. 63 is a key to representations of various materials in these manufacturing diagrams, and those of other cross referenced inkjet configurations.

2. Etch the CMOS oxide layers 431 to second level metal using Mask 1. This mask defines the contact vias from the electrostatic stack to the drive circuitry.

3. Deposit 0.1 microns of aluminum.

4. Deposit 0.1 microns of elastomer.

5. Deposit 0.1 microns of tantalum.

6. Deposit 0.1 microns of elastomer.

Figure 65:
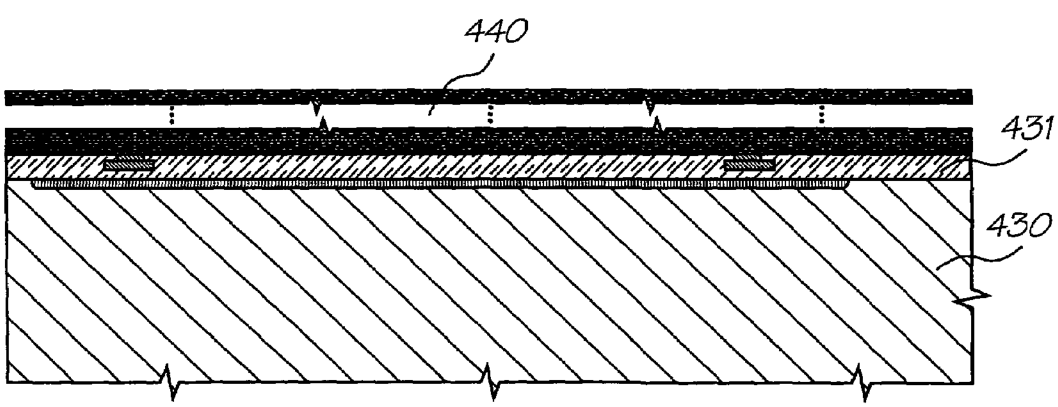

7. Repeat steps 2 to 5 twenty times to create a stack 440 of alternating metal and elastomer which is 8 microns high, with 40 metal layers and 40 elastomer layers. This step is shown in FIG. 65.

Figure 66:
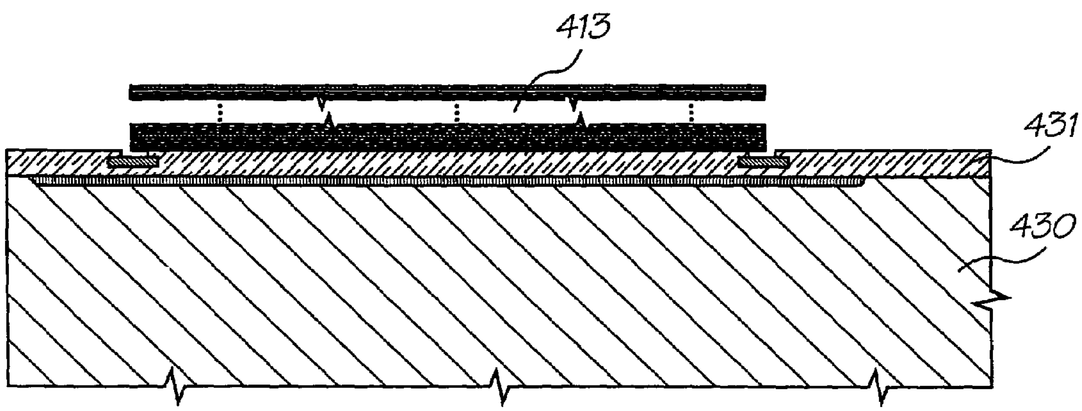

8. Etch the stack 440 using Mask 2. This leaves a separate rectangular multi-layer stack 413 for each nozzle. This step is shown in FIG. 66.

Figure 67:
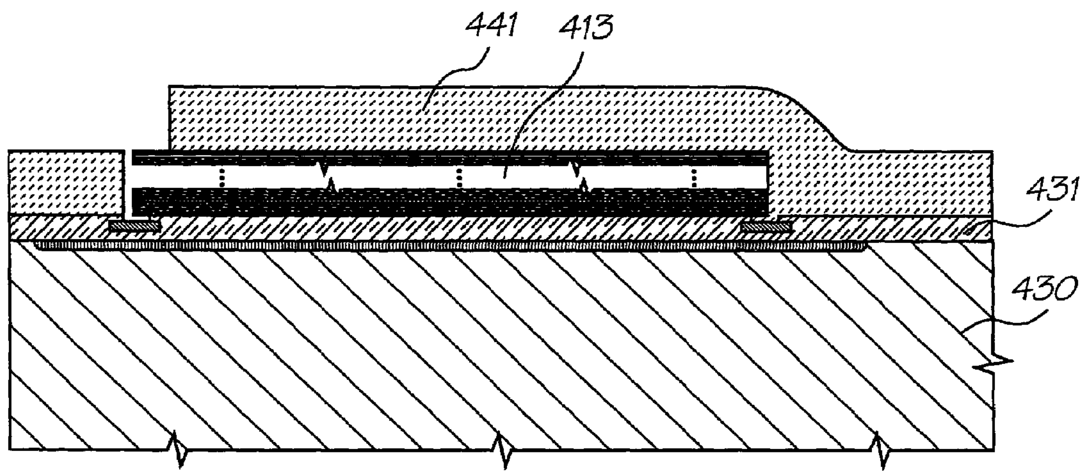

9. Spin on resist 441, expose with Mask 3, and develop. This mask defines one side of the stack 413. This step is shown in FIG. 67.

10. Etch the exposed elastomer layers to a horizontal depth of 1 micron.

11. Wet etch the exposed aluminum layers to a horizontal depth of 3 microns.

12. Foam the exposed elastomer layers by 50 nm to close the 0.1 micron gap left by the etched aluminum.

Figure 68:
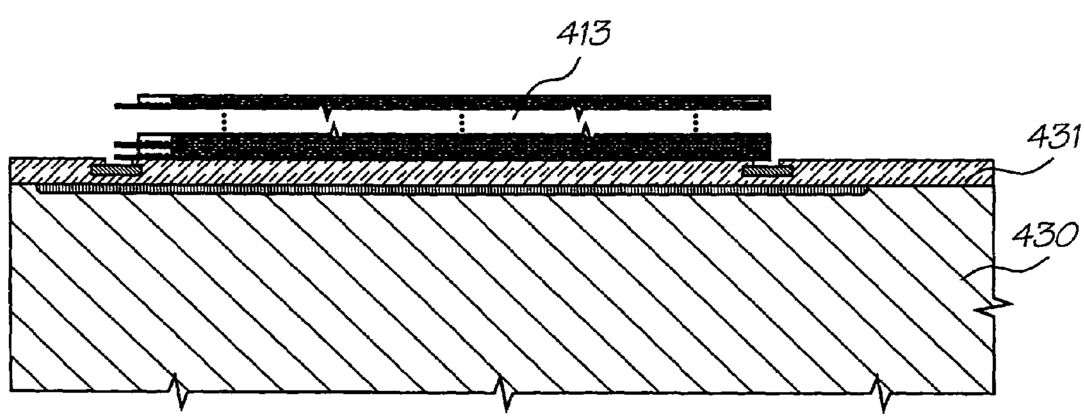

13. Strip the resist 441. This step is shown in FIG. 68.

Figure 69:
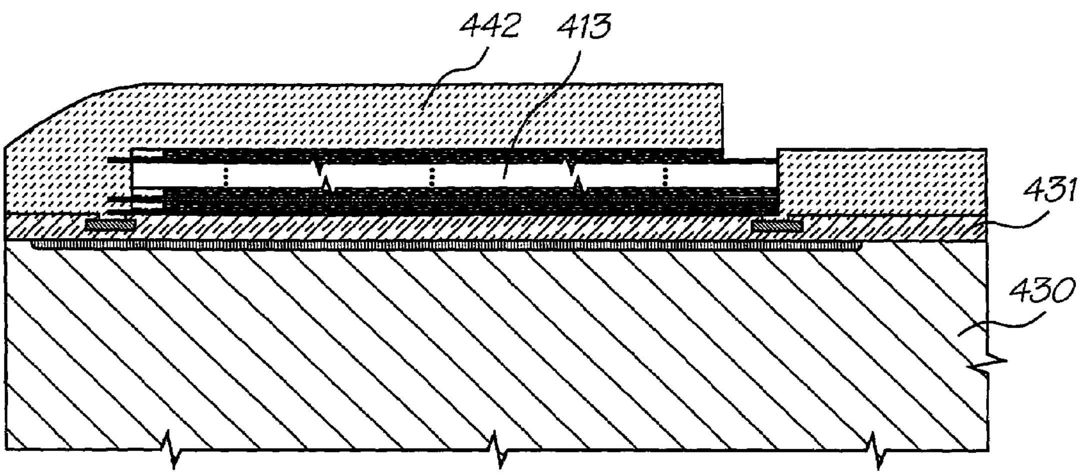

14. Spin on resist 442, expose with Mask 4, and develop. This mask defines the opposite side of the stack 413. This step is shown in FIG. 69.

15. Etch the exposed elastomer layers to a horizontal depth of 1 micron.

16. Wet etch the exposed tantalum layers to a horizontal depth of 3 microns.

17. Foam the exposed elastomer layers by 50 nm to close the 0.1 micron gap left by the etched aluminum.

Figure 70:
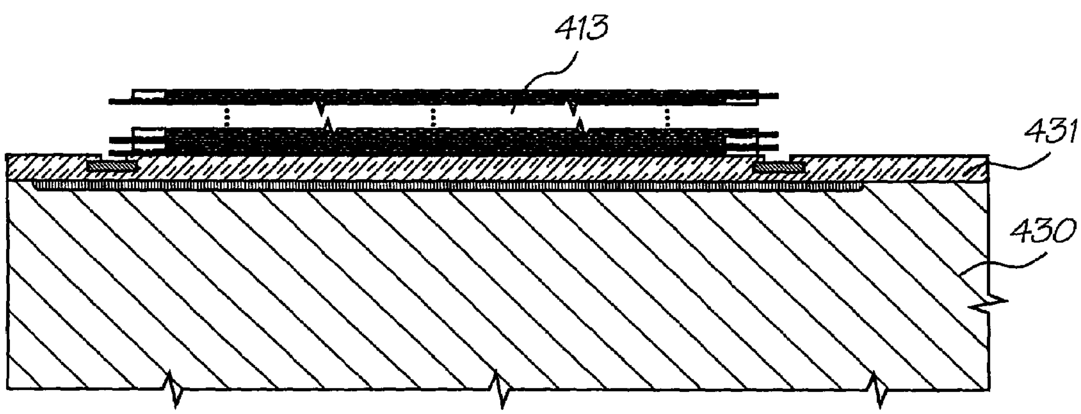

18. Strip the resist 442. This step is shown in FIG. 70.

19. Deposit 1.5 microns of tantalum 443. This metal contacts all of the aluminum layers on one side of the stack 413, and all of the tantalum layers on the other side of the stack 413.

Figure 71:
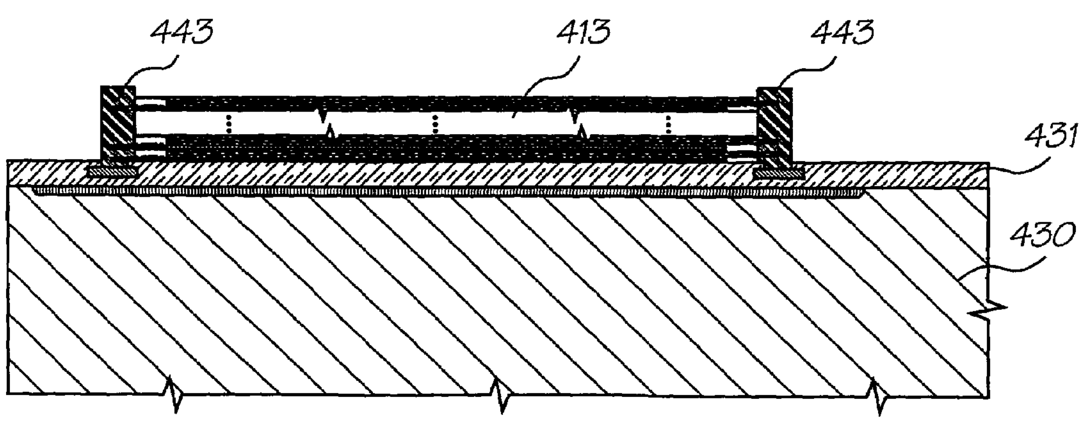

20. Etch the tantalum 443 using Mask 5. This mask defines the electrodes at both edges of the stack 413. This step is shown in FIG. 71.

21. Deposit 18 microns of sacrificial material 444 (e.g. photosensitive polyimide).

Figure 72:
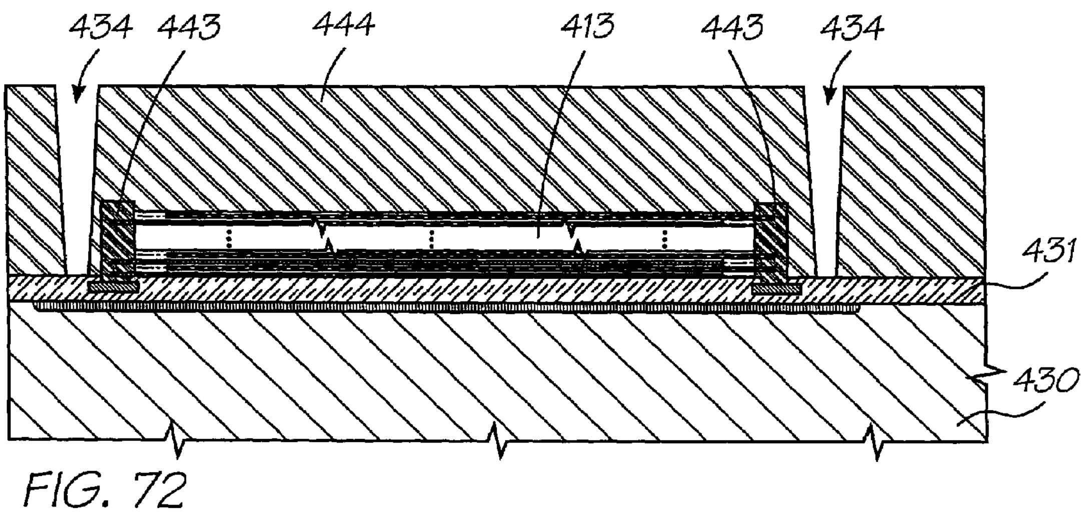

22. Expose and develop the sacrificial layer 444 using Mask 6 using a proximity aligner. This mask defines the nozzle chamber walls 434 and inlet filter. This step is shown in FIG. 72.

23. Deposit 3 microns of PECVD glass 445.

Figure 73:
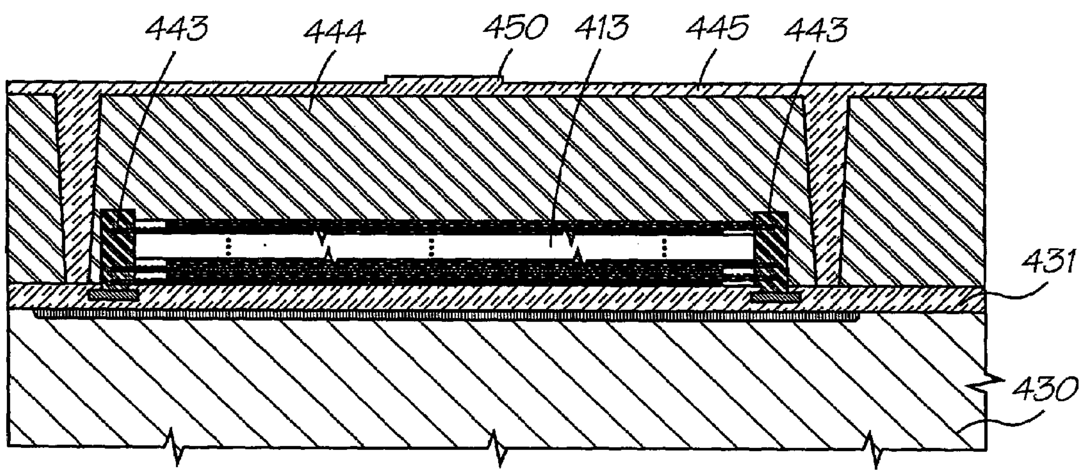

24. Etch to a depth of 1 micron using Mask 7. This mask defines the nozzle rim 450. This step is shown in FIG. 73.

Figure 74:
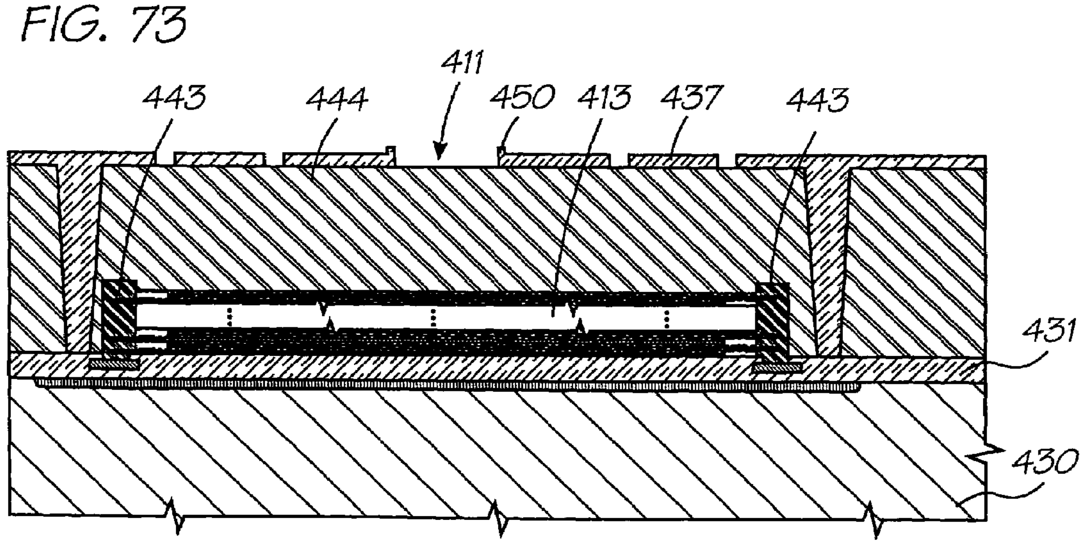

25. Etch down to the sacrificial layer 444 using Mask 8. This mask defines the roof 437 of the nozzle chamber, and the nozzle 411 itself. This step is shown in FIG. 74.

Figure 75:
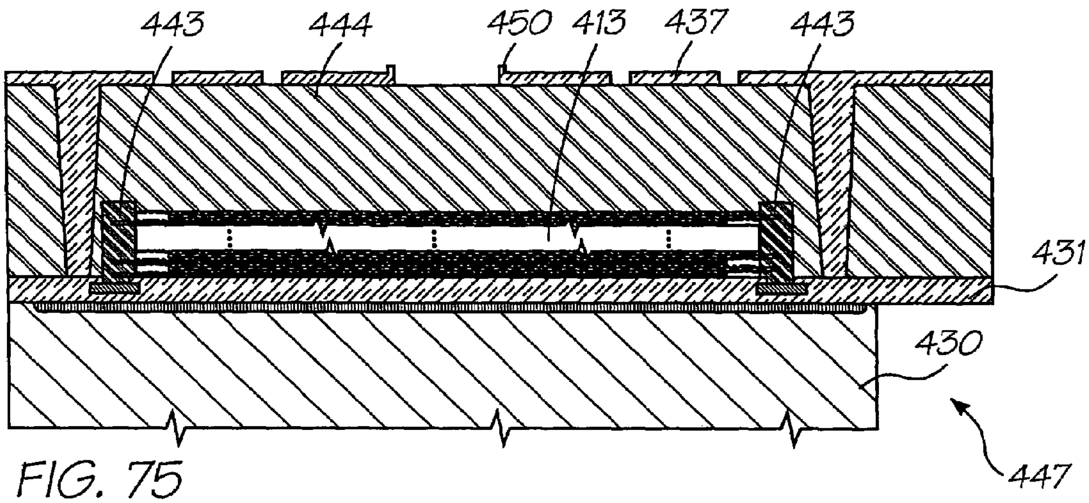

26. Back-etch completely through the silicon wafer 430 (with, for example, an ASE Advanced Silicon Etcher from Surface Technology Systems) using Mask 9. This mask defines the ink inlets 447 which are etched through the wafer. The wafer is also diced by this etch. This step is shown in FIG. 75.

27. Back-etch through the CMOS oxide layer 431 through the holes in the wafer.

Figure 76:
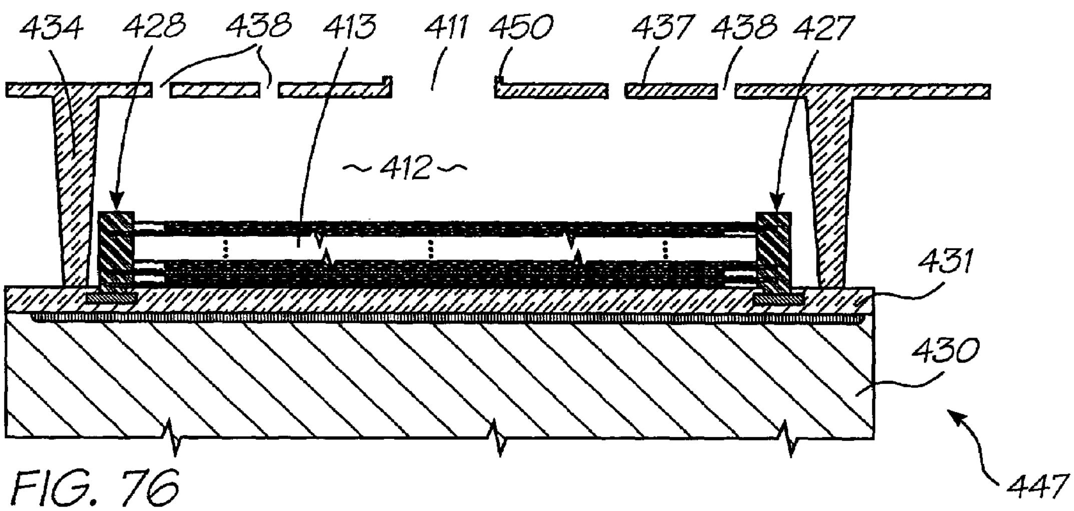

28. Etch the sacrificial material 444. The nozzle chambers 412 are cleared, and the chips are separated by this etch. This step is shown in FIG. 76.

29. Mount the printheads in their packaging, which may be a molded plastic former incorporating ink channels which supply the appropriate color ink to the ink inlets at the back of the wafer.

30. Connect the printheads to their interconnect systems. For a low profile connection with minimum disruption of airflow, TAB may be used. Wire bonding may also be used if the printer is to be operated with sufficient clearance to the paper.

31. Hydrophobize the front surface of the printheads.

Figure 77:
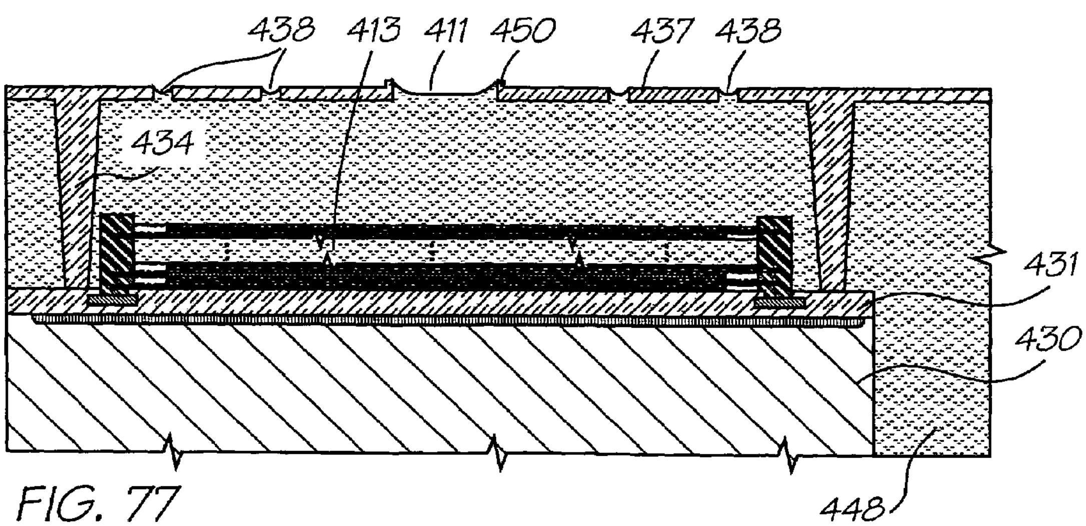

32. Fill the completed printheads with ink 448 and test them. A filled nozzle is shown in FIG. 77.

IJ05

A preferred embodiment of the present invention relies upon a magnetic actuator to “load” a spring, such that, upon deactivation of the magnetic actuator the resultant movement of the spring causes ejection of a drop of ink as the spring returns to its original position.

Figure 78:
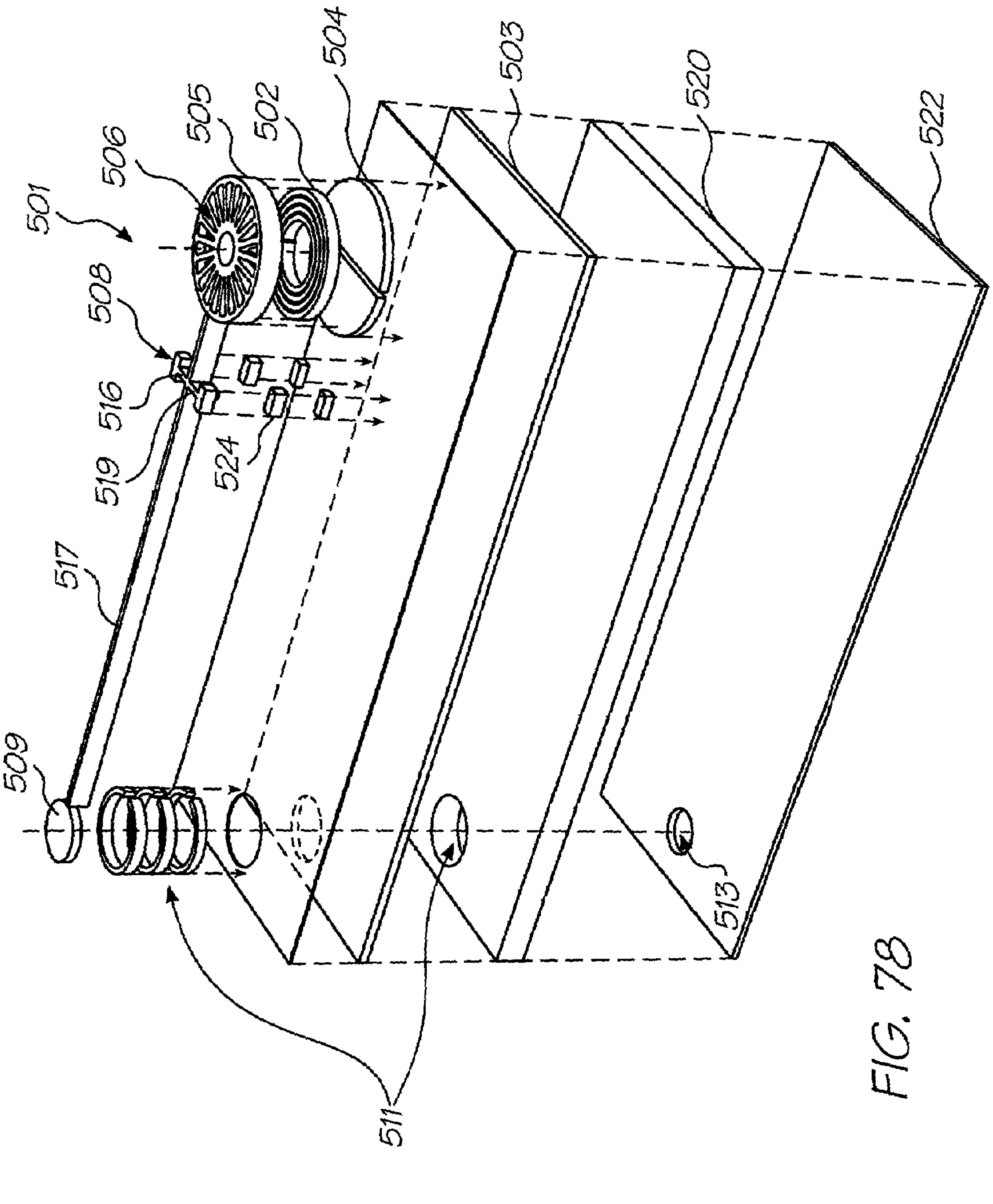
FIG. 78 is an exploded perspective view illustrating the construction of a single ink jet nozzle in accordance with a preferred embodiment.

Turning to FIG. 78, there is illustrated an exploded perspective view of an ink nozzle arrangement 501 constructed in accordance with a preferred embodiment. It would be understood that a preferred embodiment can be constructed as an array of nozzle arrangements 501 so as to together form a line for printing.

The operation of the ink nozzle arrangement 501 of FIG. 78 proceeds by a solenoid 502 being energized by way of a driving circuit 503 when it is desired to print out a ink drop. The energized solenoid 502 induces a magnetic field in a fixed soft magnetic pole 504 and a moveable soft magnetic pole 505. The solenoid power is turned on to a maximum current for long enough to move the moveable pole 505 from its rest position to a stopped position close to the fixed magnetic pole 504. The ink nozzle arrangement 501 of FIG. 78 sits within an ink chamber filled with ink. Therefore, holes 506 are provided in the moveable soft magnetic pole 505 for "squirting" out of ink from around the coil 502 when the pole 505 undergoes movement.

The moveable soft magnetic pole is balanced by a fulcrum 508 with a piston head 509. Movement of the magnetic pole 505 closer to the stationary pole 504 causes the piston head 509 to move away from a nozzle chamber 511 drawing air into the chamber 511 via an ink ejection port 513. The piston 509 is then held open above the nozzle chamber 511 by means of maintaining a low "keeper" current through solenoid 502. The keeper level current through solenoid 502 being sufficient to maintain the moveable pole 505 against the fixed soft magnetic pole 504. The level of current will be substantially less than the maximum current level because the gap between the two poles 504 and 505 is at a minimum. For example, a keeper level current of 10% of the maximum current level may be suitable. During this phase of operation, the meniscus of ink at the nozzle tip or ink ejection port 513 is a concave hemisphere due to the in flow of air. The surface tension on the meniscus exerts a net force on the ink which results in ink flow from the ink chamber into the nozzle chamber 511. This results in the nozzle chamber refilling, replacing the volume taken up by the piston head 509 which has been withdrawn. This process takes approximately 100 microseconds.

The current within solenoid 502 is then reversed to half that of the maximum current. The reversal demagnetises the magnetic poles and initiates a return of the piston 509 to its rest position. The piston 509 is moved to its normal rest position by both the magnetic repulsion and by the energy stored in a stressed tortional spring 516, 519 which was put in a state of torsion upon the movement of moveable pole 505.

The forces applied to the piston 509 as a result of the reverse current and spring 516, 519 will be greatest at the beginning of the movement of the piston 509 and will decrease as the spring elastic stress falls to zero. As a result, the acceleration of piston 509 is high at the beginning of a reverse stroke and the resultant ink velocity within the chamber 511 becomes uniform during the stroke. This results in an increased operating tolerance before ink flow over the printhead surface will occur.

At a predetermined time during the return stroke, the solenoid reverse current is turned off. The current is turned off when the residual magnetism of the movable pole is at a minimum. The piston 509 continues to move towards its original rest position.

The piston 509 will overshoot the quiescent or rest position due to its inertia. Overshoot in the piston movement achieves two things: greater ejected drop volume and velocity, and improved drop break off as the piston returns from overshoot to its quiescent position.

The piston 509 will eventually return from overshoot to the quiescent position. This return is caused by the springs 516, 519 which are now stressed in the opposite direction. The piston return "sucks" some of the ink back into the nozzle chamber 511, causing the ink ligament connecting the ink drop to the ink in the nozzle chamber 511 to thin. The forward velocity of the drop and the backward velocity of the ink in the nozzle chamber 511 are resolved by the ink drop breaking off from the ink in the nozzle chamber 511.

The piston 509 stays in the quiescent position until the next drop ejection cycle.

A liquid ink printhead has one ink nozzle arrangement 501 associated with each of the multitude of nozzles. The arrangement 501 has the following major parts:

(1) Drive circuitry 503 for driving the solenoid 502.

(2) An ejection port 513. The radius of the ejection port 513 is an important determinant of drop velocity and drop size.

(3) A piston 509. This is a cylinder which moves through the nozzle chamber 511 to expel the ink. The piston 509 is connected to one end of the lever arm 517. The piston radius is approximately 1.5 to 2 times the radius of the ejection port 513. The ink drop volume output is mostly determined by the volume of ink displaced by the piston 509 during the piston return stroke.

(4) A nozzle chamber 511. The nozzle chamber 511 is slightly wider than the piston 509. The gap between the piston 509 and the nozzle chamber walls is as small as is required to ensure that the piston does not contact the nozzle chamber during actuation or return. If the printheads are fabricated using 0.5 micron semiconductor lithography, then a 1 micron gap will usually be sufficient. The nozzle chamber is also deep enough so that air ingested through the ejection port 513 when the plunger 509 returns to its quiescent state does not extend to the piston 509. If it does, the ingested bubble may form a cylindrical surface instead of a hemispherical surface. If this happens, the nozzle will not refill properly.

(5) A solenoid 502. This is a spiral coil of copper. Copper is used for its low resistivity, and high electro-migration resistance.

(6) A fixed magnetic pole of ferromagnetic material 504.

(7) A moveable magnetic pole of ferromagnetic material 505. To maximise the magnetic force generated, the moveable magnetic pole 505 and fixed magnetic pole 504 surround the solenoid 502 as a torus. Thus little magnetic flux is lost, and the flux is concentrated across the gap between the moveable magnetic pole 505 and the fixed pole 504. The moveable magnetic pole 505 has holes in the surface 506 (FIG. 78) above the solenoid to allow trapped ink to escape. These holes are arranged and shaped so as to minimise their effect on the magnetic force generated between the moveable magnetic pole 505 and the fixed magnetic pole 504.

(8) A magnetic gap. The gap between the fixed plate 504 and the moveable magnetic pole 505 is one of the most important "parts" of the print actuator. The size of the gap strongly affects the magnetic force generated, and also limits the travel of the moveable magnetic pole 505. A small gap is desirable to achieve a strong magnetic force. The travel of the piston 509 is related to the travel of the moveable magnetic pole 505 (and therefore the gap) by the lever arm 517.

(9) Length of the lever arm 517. The lever arm 517 allows the travel of the piston 509 and the moveable magnetic pole 505 to be independently optimised. At the short end of the lever arm 517 is the moveable magnetic pole 505. At the long end of the lever arm 517 is the piston 509. The spring 516 is at the fulcrum 508 optimum travel for the moveable magnetic pole 505 is less than 1 micron, so as to minimise the magnetic gap. The optimum travel for the piston 509 is approximately 5 micron for a 1200 dpi printer. The difference in optimum travel is resolved by a lever 517 with a 5:1 or greater ratio in arm length.

(10) Springs 516, 519 (FIG. 78). The springs e.g. 516 return the piston to its quiescent position after a deactivation of the actuator. The springs 516 are at the fulcrum 508 of the lever arm.

(11) Passivation layers (not shown). All surfaces are preferably coated with passivation layers, which may be silicon nitride ($Si_3N_4$), diamond like carbon (DLC), or other chemically inert, highly impermeable layer. The passivation layers are especially important for device lifetime, as the active device is immersed in the ink. As will be evident from the foregoing description there is an advantage in ejecting the drop on deactivation of the solenoid 502. This advantage comes from the rate of acceleration of the moving magnetic pole 505 which is used as a piston or plunger.

The force produced by a moveable magnetic pole by an electromagnetic induced field is approximately proportional to the inverse square of the gap between the moveable 505 and static magnetic poles 504. When the solenoid 502 is off, this gap is at a maximum. When the solenoid 502 is turned on, the moving pole 505 is attracted to the static pole 504. As the gap decreases, the force increases, accelerating the movable pole 505 faster. The velocity increases in a highly non-linear fashion, approximately with the square of time. During the reverse movement of the moving pole 505 upon deactivation the acceleration of the moving pole 505 is greatest at the beginning and then slows as the spring elastic stress falls to zero. As a result, the velocity of the moving pole 505 is more uniform during the reverse stroke movement.

(1) The velocity of piston or plunger 509 is much more constant over the duration of the drop ejection stroke.

(2) The piston or plunger 509 can readily be entirely removed from the ink chamber during the ink fill stage, and thereby the nozzle filling time can be reduced, allowing faster printhead operation.

However, this approach does have some disadvantages over a direct firing type of actuator:

(1) The stresses on the spring 516 are relatively large. Careful design is required to ensure that the springs operate at below the yield strength of the materials used.

(2) The solenoid 502 must be provided with a "keeper" current for the nozzle fill duration. The keeper current will typically be less than 10% of the solenoid actuation current However, the nozzle fill duration is typically around 50 times the drop firing duration, so the keeper energy will typically exceed the solenoid actuation energy.

(3) The operation of the actuator is more complex due to the requirement for a "keeper" phase.

The printhead is fabricated from two silicon wafers. A first wafer is used to fabricate the print nozzles (the printhead wafer) and a second wafer (the Ink Channel Wafer) is utilized to fabricate the various ink channels in addition to providing a support means for the first channel. The fabrication process then proceeds as follows:

(1) Start with a single crystal silicon wafer 520, which has a buried epitaxial layer 522 of silicon which is heavily doped with boron. The boron should be doped to preferably $10^{20}$ atoms per $cm^3$ of boron or more, and be approximately 3 micron thick, and be doped in a manner suitable for the active semiconductor device technology chosen. The wafer diameter of the printhead wafer should be the same as the ink channel wafer.

(2) Fabricate the drive transistors and data distribution circuitry 503 according to the process chosen (eg. CMOS).

(3) Planarise the wafer 520 using chemical Mechanical Planarisation (CMP).

(4) Deposit 5 micron of glass ($SiO_2$) over the second level metal.

(5) Using a dual damascene process, etch two levels into the top oxide layer. Level 1 is 4 micron deep, and level 2 is 5 micron deep. Level 2 contacts the second level metal. The masks for the static magnetic pole are used.

(6) Deposit 5 micron of nickel iron alloy (NiFe).

(7) Planarise the wafer using CMP, until the level of the $SiO_2$ is reached forming the magnetic pole 504.

(8) Deposit 0.1 micron of silicon nitride ($Si_3N_4$).

(9) Etch the $Si_3N_4$ for via holes for the connections to the solenoids, and for the nozzle chamber region 511.

(10) Deposit 4 micron of $SiO_2$.

(11) Plasma etch the $SiO_2$ in using the solenoid and support post mask.

(12) Deposit a thin diffusion barrier, such as Ti, TiN, or TiW, and an adhesion layer if the diffusion layer chosen has insufficient adhesion.

(13) Deposit 4 micron of copper for forming the solenoid 502 and spring posts 524. The deposition may be by sputtering, CVD, or electroless plating. As well as lower resistivity than aluminium, copper has significantly higher resistance to electro-migration. The electro-migration resistance is significant, as current densities in the order of $3\times10^6$ Amps/$cm^2$ may be required. Copper films deposited by low energy kinetic ion bias sputtering have been found to have 1,000 to 100,000 times larger electro-migration lifetimes larger than aluminum silicon alloy. The deposited copper should be alloyed and layered for maximum electro-migration lifetimes than aluminum silicon alloy. The deposited copper should be alloyed and layered for maximum electro-migration resistance, while maintaining high electrical conductivity.

(14) Planarise the wafer using CMP, until the level of the $SiO_2$ is reached. A damascene process is used for the copper layer due to the difficulty involved in etching copper. However, since the damascene dielectric layer is subsequently removed, processing is actually simpler if a standard deposit/etch cycle is used instead of damascene. However, it should be noted that the aspect ratio of the copper etch would be 8:1 for this design, compared to only 4:1 for a damascene oxide etch. This difference occurs because the copper is 1 micron wide and 4 micron thick, but has only 0.5 micron spacing. Damascene processing also reduces the lithographic difficultly, as the resist is on oxide, not metal.

(15) Plasma etch the nozzle chamber 511, stopping at the boron doped epitaxial silicon layer 521. This etch will be through around 13 micron of $SiO_2$, and 8 micron of silicon. The etch should be highly anisotropic, with near vertical sidewalls. The etch stop detection can be on boron in the exhaust gasses. If this etch is selective against NiFe, the masks for this step and the following step can be combined, and the following step can be eliminated. This step also etches the edge of the printhead wafer down to the boron layer, for later separation.

(16) Etch the $SiO_2$ layer. This need only be removed in the regions above the NiFe fixed magnetic poles, so it can be removed in the previous step if an Si and $SiO_2$ etch selective against NiFe is used.

(17) Conformably deposit 0.5 micron of high density $Si_3N_4$. This forms a corrosion barrier, so should be free of pin-holes, and be impermeable to OH ions.

(18) Deposit a thick sacrificial layer 540. This layer should entirely fill the nozzle chambers, and coat the entire wafer to an added thickness of 8 microns. The sacrificial layer may be $SiO_2$.

(19) Etch two depths in the sacrificial layer for a dual damascene process. The deep etch is 8 microns, and the shallow etch is 3 microns. The masks defines the piston 509, the lever arm 517, the springs 516 and the moveable magnetic pole 505.

(20) Conformably deposit 0.1 micron of high density $Si_3N_4$. This forms a corrosion barrier, so should be flee of pin-holes, and be impermeable to OH ions.

(21) Deposit 8 micron of nickel iron alloy (NiFe).

(22) Planarise the wafer using CMP, until the level of the $SiO_2$ is reached.

(23) Deposit 0.1 micron of silicon nitride ($Si_3N_4$).

(24) Etch the $Si_3N_4$ everywhere except the top of the plungers.

(25) Open the bond pads.

(26) Permanently bond the wafer onto a pre-fabricated ink channel wafer. The active side of the printhead wafer faces the ink channel wafer. The ink channel wafer is attached to a backing plate, as it has already been etched into separate ink channel chips.

(27) Etch the printhead wafer to entirely remove the backside silicon to the level of the boron doped epitaxial layer 522. This etch can be a batch wet etch in ethylenediamine pyrocatechol (EDP).

(28) Mask the nozzle rim 514 from the underside of the printhead wafer. This mask also includes the chip edges.

(31) Etch through the boron doped silicon layer 522, thereby creating the nozzle holes. This etch should also etch fairly deeply into the sacrificial material in the nozzle chambers to reduce time required to remove the sacrificial layer.

(32) Completely etch the sacrificial material. If this material is $SiO_2$ then a HF etch can be used. The nitride coating on the various layers protects the other glass dielectric layers and other materials in the device from HF etching. Access of the HF to the sacrificial layer material is through the nozzle, and simultaneously through the ink channel chip. The effective depth of the etch is 21 microns.

(33) Separate the chips from the backing plate. Each chip is now a full printhead including ink channels. The two wafers have already been etched through, so the printheads do not need to be diced

(34) Test the printheads and TAB bond the good printheads.

(35) Hydrophobize the front surface of the printheads.

(36) Perform final testing on the TAB bonded printheads.

Figure 79:
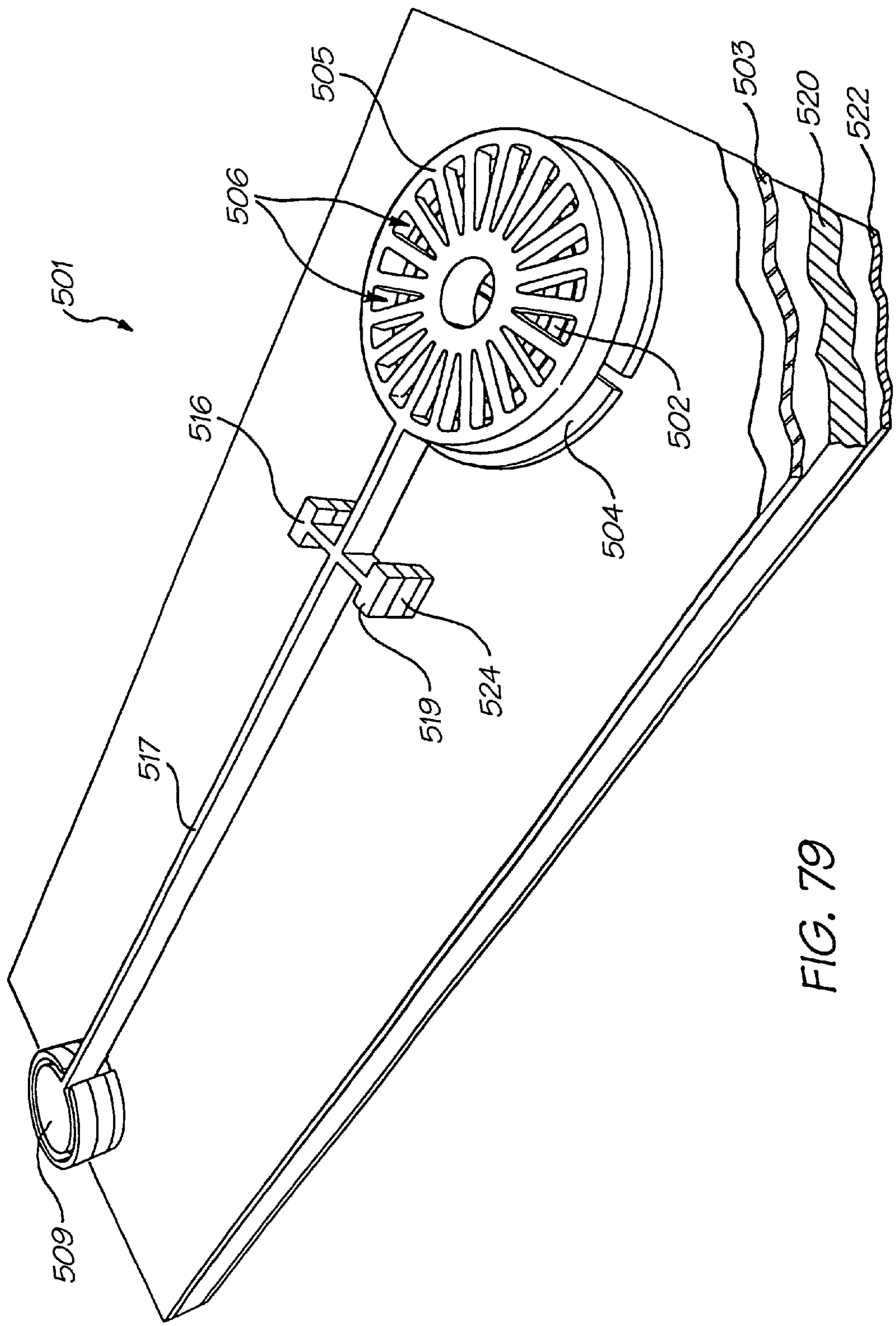
FIG. 79 is a perspective view, in part in section, of a single ink jet nozzle constructed in accordance with a preferred embodiment.

FIG. 79 shows a perspective view, in part in section, of a single ink jet nozzle arrangement 501 constructed in accordance with a preferred embodiment.

One alternative form of detailed manufacturing process which can be used to fabricate monolithic ink jet printheads operating in accordance with the principles taught by the present embodiment can proceed utilizing the following steps:

1. Using a double sided polished wafer deposit 3 microns of epitaxial silicon heavily doped with boron.

2. Deposit 10 microns of epitaxial silicon, either p-type or n-type, depending upon the CMOS process used.

Figure 80:
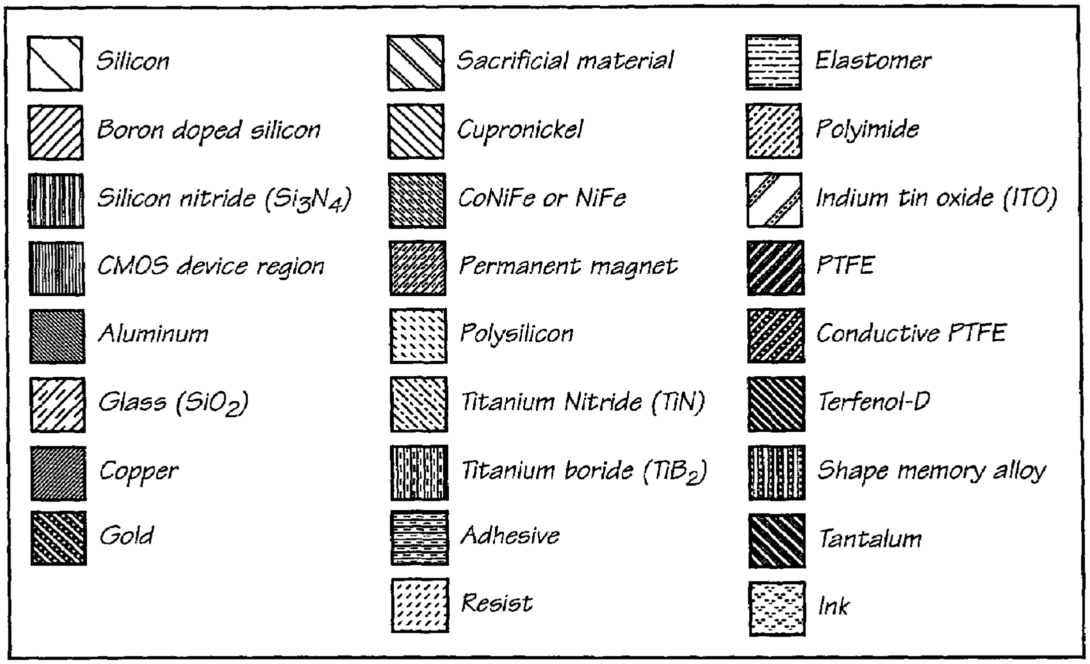
FIG. 80 provides a legend of the materials indicated in FIGS. 81 to 97.
Figure 81:
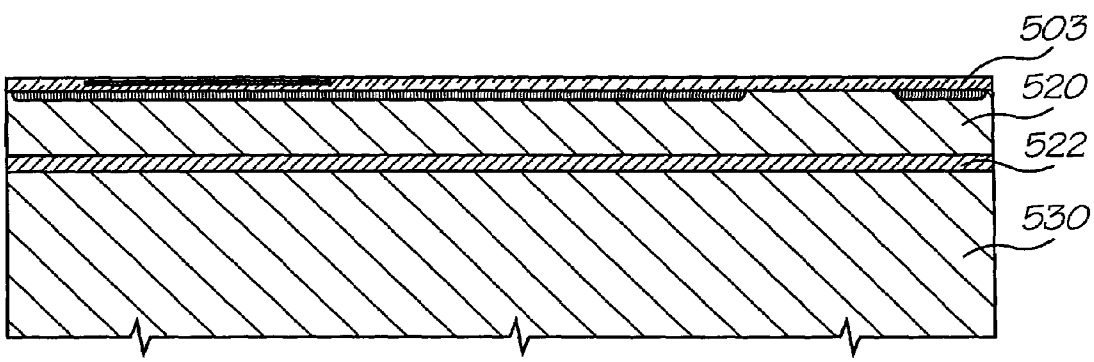
FIG. 81 to FIG. 97 illustrate sectional views of the manufacturing steps in one form of construction of an ink jet printhead nozzle.

3. Complete a 0.5 micron, one poly, 2 metal CMOS process. This step is shown in FIG. 81. For clarity, these diagrams may not be to scale, and may not represent a cross section though any single plane of the nozzle. FIG. 80 is a key to representations of various materials in these manufacturing diagrams.

4. Etch the CMOS oxide layers down to silicon or aluminum using Mask 1. This mask defines the nozzle chamber, the edges of the printheads chips, and the vias for the contacts from the aluminum electrodes to the two halves of the split fixed magnetic plate.

Figure 82:
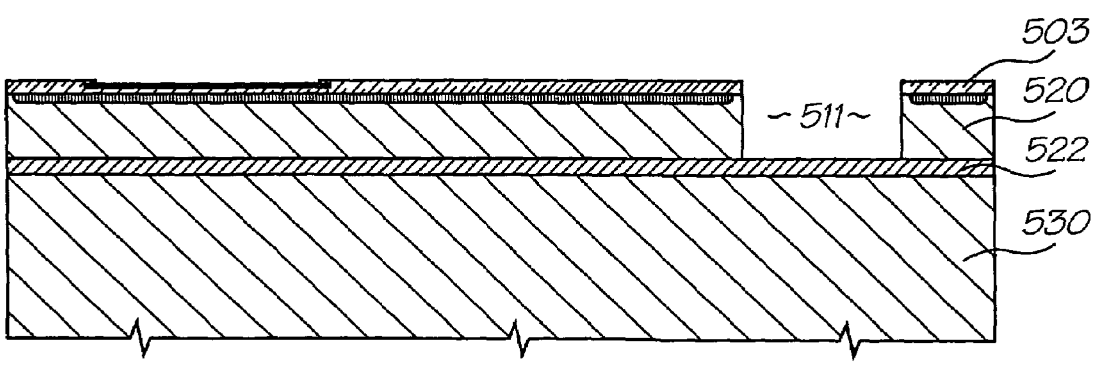

5. Plasma etch the silicon down to the boron doped buried layer, using oxide from step 4 as a mask. This etch does not substantially etch the aluminum. This step is shown in FIG. 82.

6. Deposit a seed layer of cobalt nickel iron alloy. CoNiFe is chosen due to a high saturation flux density of 2 Tesla, and a low coercivity. [Osaka, Tetsuya et al, A soft magnetic CoNiFe film with high saturation magnetic flux density, Nature 392, 796-798 (1998)].

Figure 83:
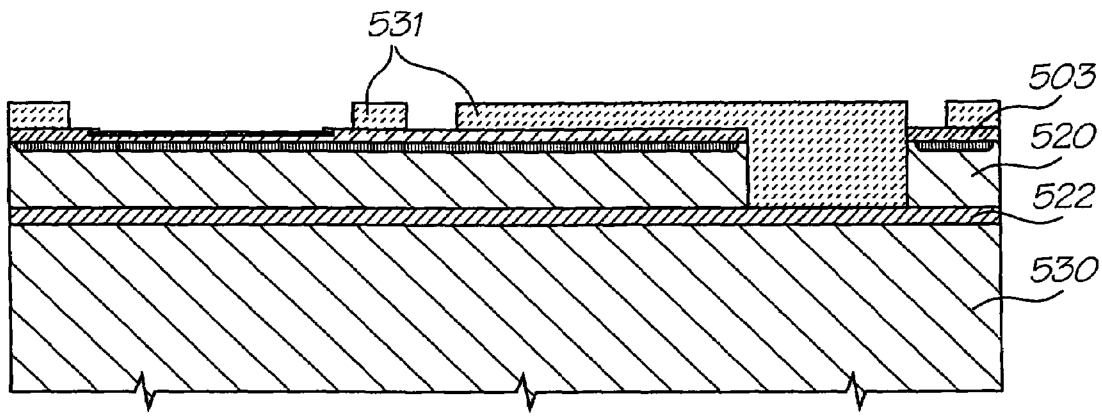

7. Spin on 4 microns of resist, expose with Mask 2, and develop. This mask defines the split fixed magnetic plate and the nozzle chamber wall, for which the resist acts as an electroplating mold. This step is shown in FIG. 83.

Figure 84:
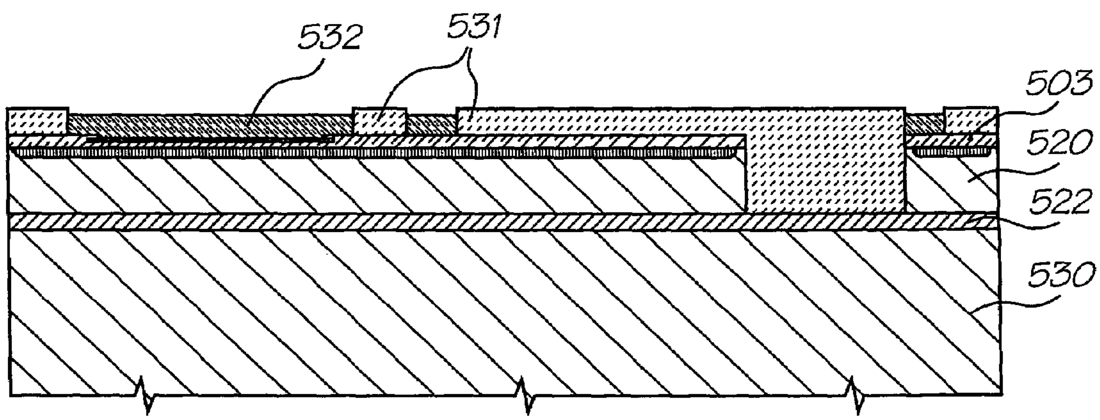

8. Electroplate 3 microns of CoNiFe. This step is shown in FIG. 84.

Figure 85:
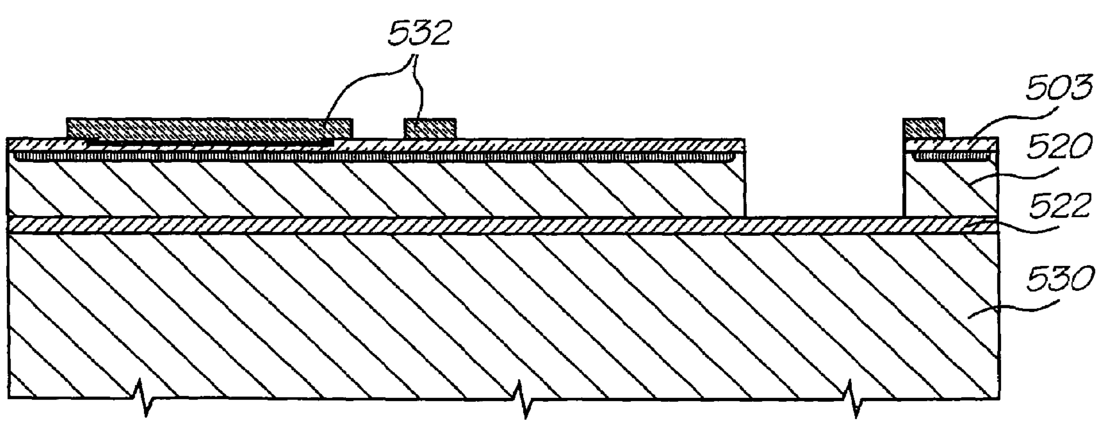

9. Strip the resist and etch the exposed seed layer. This step is shown in FIG. 85.

10. Deposit 0.1 microns of silicon nitride ($Si_3N_4$).

11. Etch the nitride layer using Mask 3. This mask defines the contact vias from each end of the solenoid coil to the two halves of the split fixed magnetic plate.

12. Deposit a seed layer of copper. Copper is used for its low resistivity (which results in higher efficiency) and its high electromigration resistance, which increases reliability at high current densities.

Figure 86:
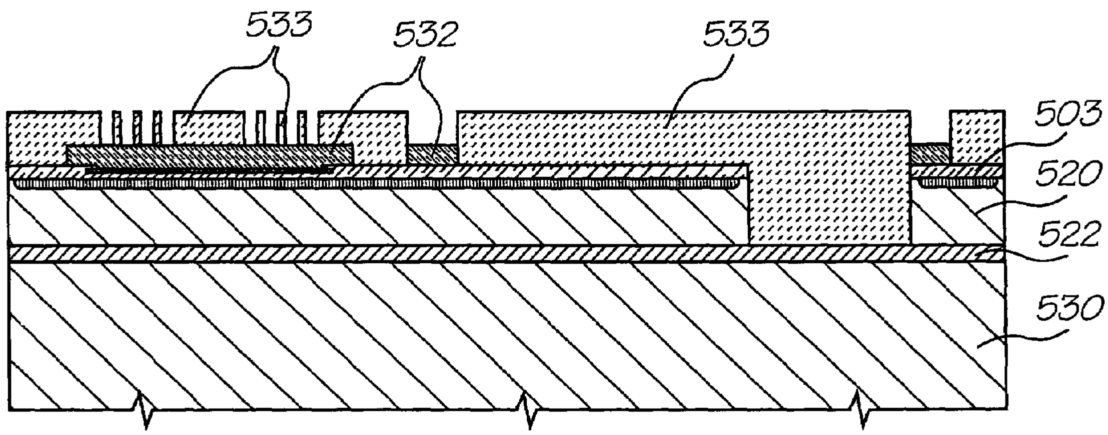

13. Spin on 5 microns of resist, expose with Mask 4, and develop. This mask defines the solenoid spiral coil, the nozzle chamber wall and the spring posts, for which the resist acts as an electroplating mold. This step is shown in FIG. 86.

14. Electroplate 4 microns of copper.

Figure 87:
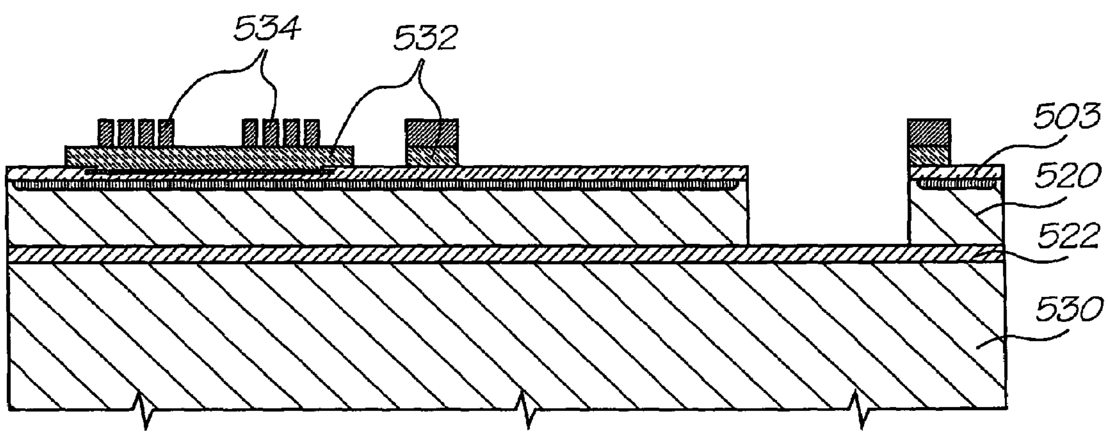

15. Strip the resist and etch the exposed copper seed layer. This step is shown in FIG. 87.

16. Wafer probe. All electrical connections are complete at this point, bond pads are accessible, and the chips are not yet separated.

17. Deposit 0.1 microns of silicon nitride.

18. Deposit 1 micron of sacrificial material. This layer determines the magnetic gap.

Figure 88:
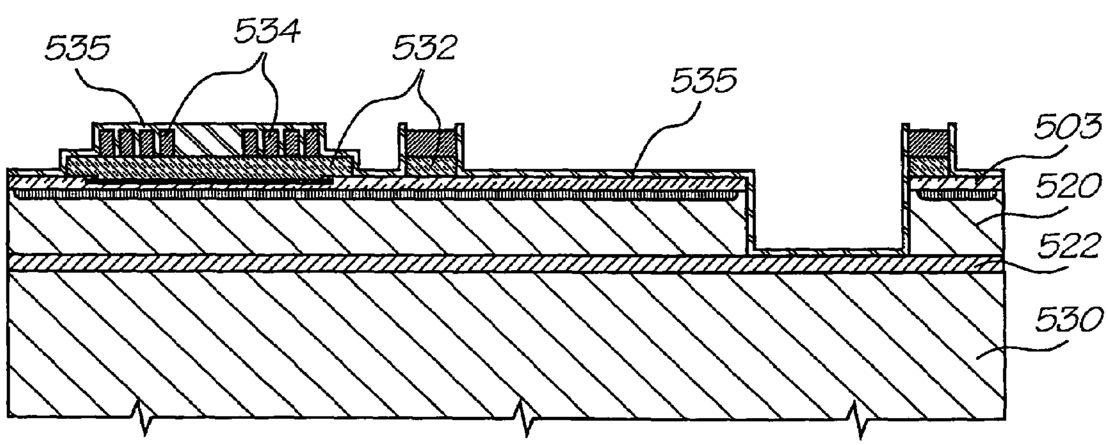

19. Etch the sacrificial material using Mask 5. This mask defines the spring posts and the nozzle chamber wall. This step is shown in FIG. 88.

20. Deposit a seed layer of CoNiFe.

Figure 89:
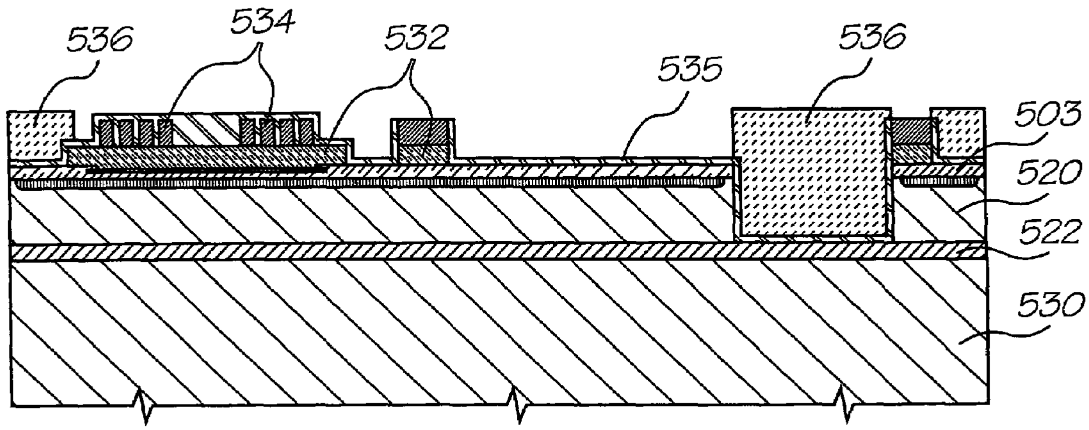

21. Spin on 4.5 microns of resist, expose with Mask 6, and develop. This mask defines the walls of the magnetic plunger, the lever arm, the nozzle chamber wall and the spring posts. The resist forms an electroplating mold for these parts. This step is shown in FIG. 89.

Figure 90:
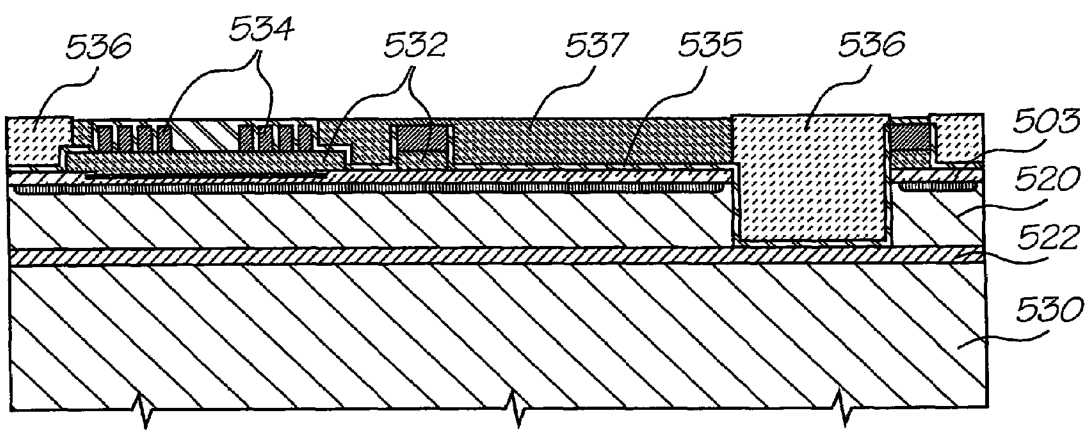

22. Electroplate 4 microns of CoNiFe. This step is shown in FIG. 90.

23. Deposit a seed layer of CoNiFe.

Figure 91:
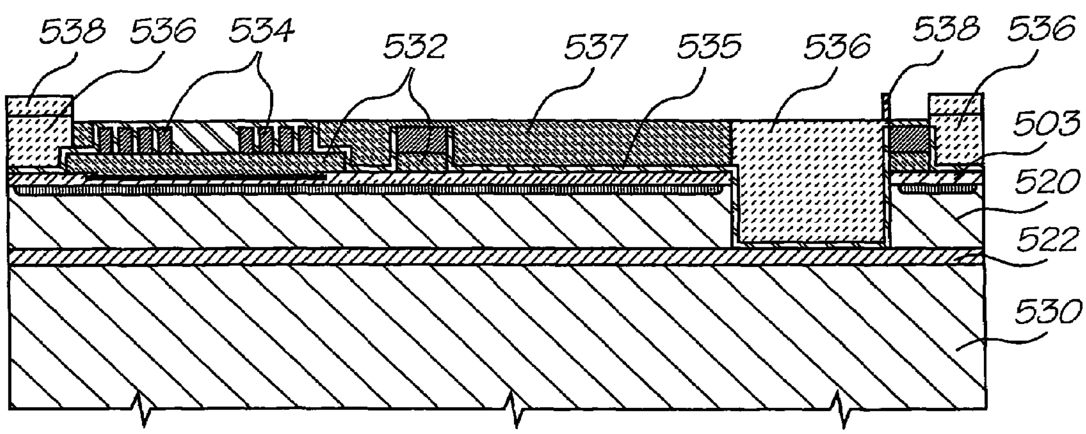

24. Spin on 4 microns of resist, expose with Mask 7, and develop. This mask defines the roof of the magnetic plunger, the nozzle chamber wall, the lever arm, the springs, and the spring posts. The resist forms an electroplating mold for these parts. This step is shown in FIG. 91.

Figure 92:
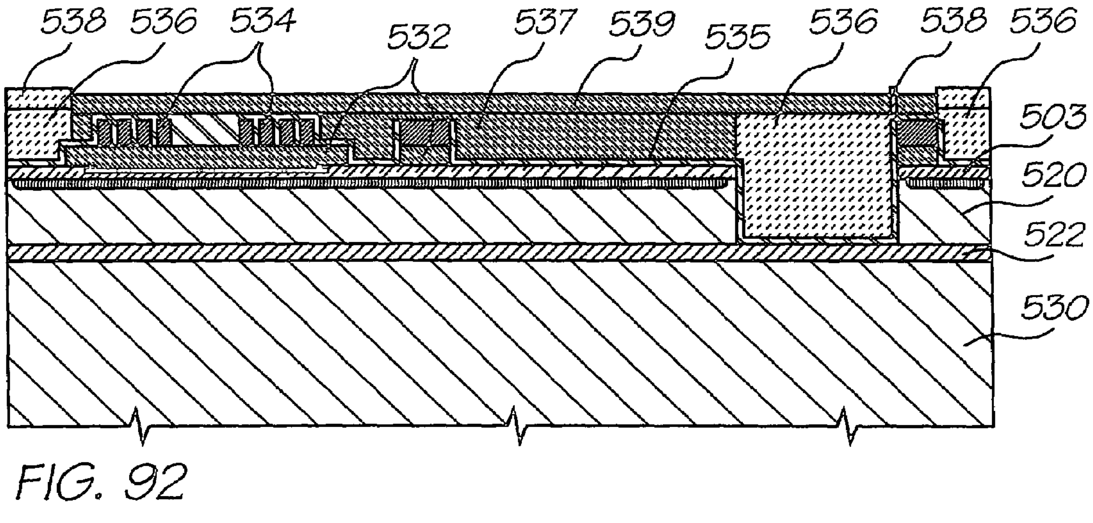

25. Electroplate 3 microns of CoNiFe. This step is shown in FIG. 92.

Figure 93:
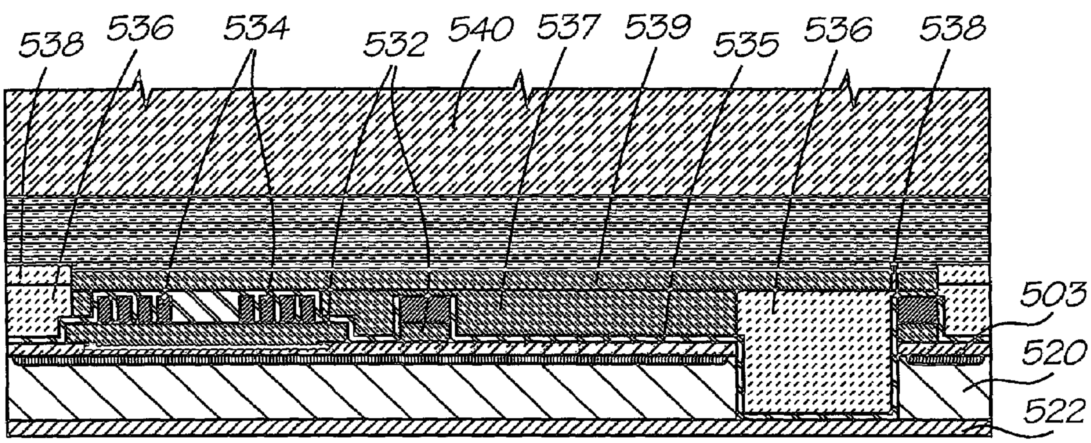

26. Mount the wafer on a glass blank and back-etch the wafer using KOH, with no mask. This etch thins the wafer and stops at the buried boron doped silicon layer. This step is shown in FIG. 93.

Figure 94:
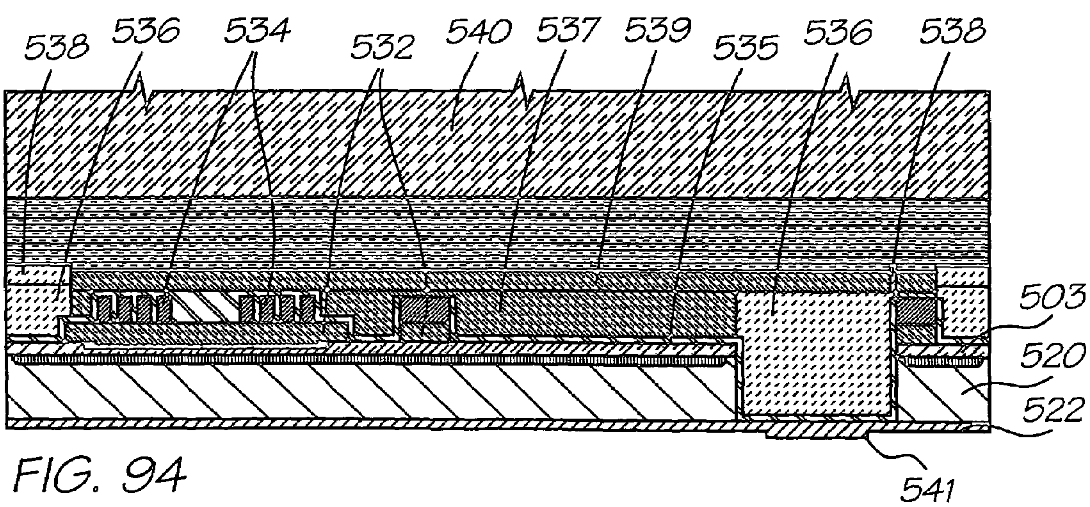

27. Plasma back-etch the boron doped silicon layer to a depth of 1 micron using Mask 8. This mask defines the nozzle rim. This step is shown in FIG. 94.

Figure 95:
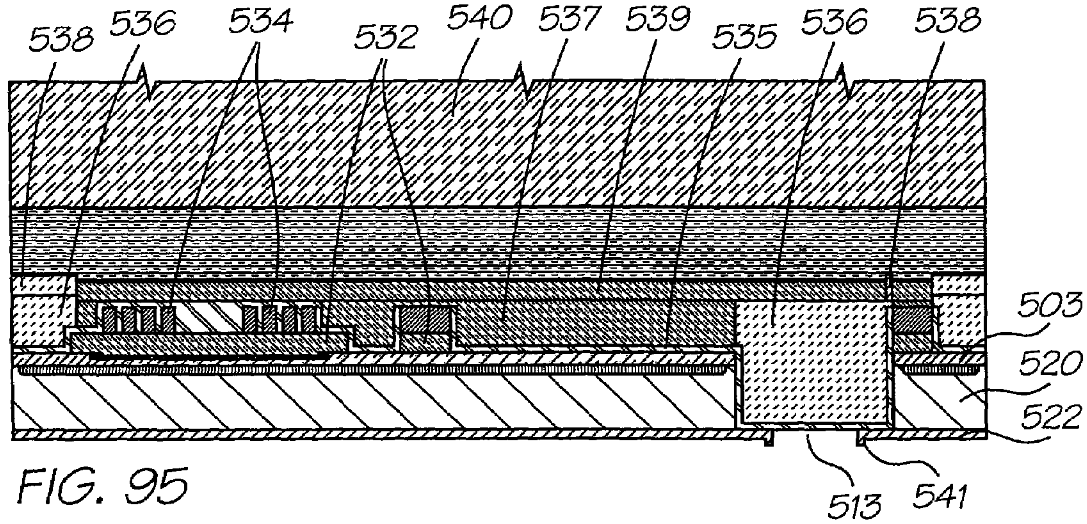

28. Plasma back-etch through the boron doped layer using Mask 9. This mask defines the nozzle, and the edge of the chips. At this stage, the chips are separate, but are still mounted on the glass blank. This step is shown in FIG. 95.

Figure 96:
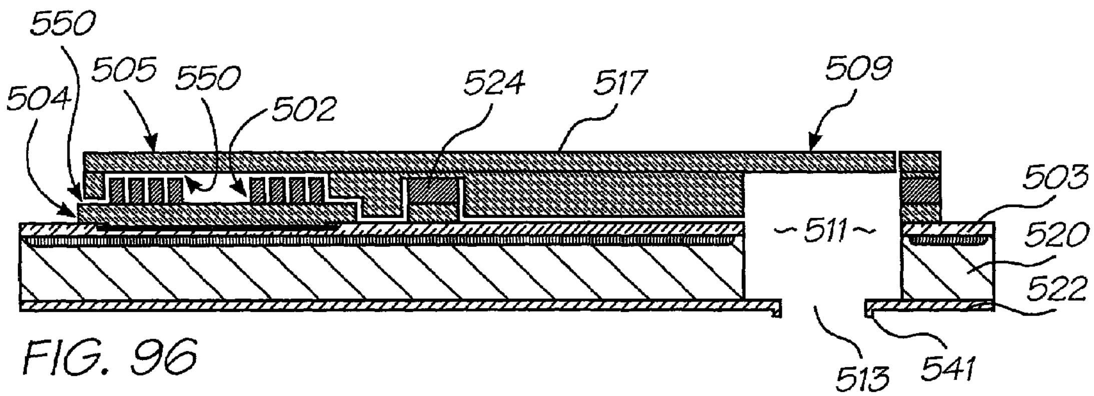

29. Detach the chips from the glass blank. Strip all adhesive, resist, sacrificial, and exposed seed layers. This step is shown in FIG. 96.

30. Mount the printheads in their packaging, which may be a molded plastic former incorporating ink channels which supply different colors of ink to the appropriate regions of the front surface of the wafer.

31. Connect the printheads to their interconnect systems.

32. Hydrophobize the front surface of the printheads.

Figure 97:
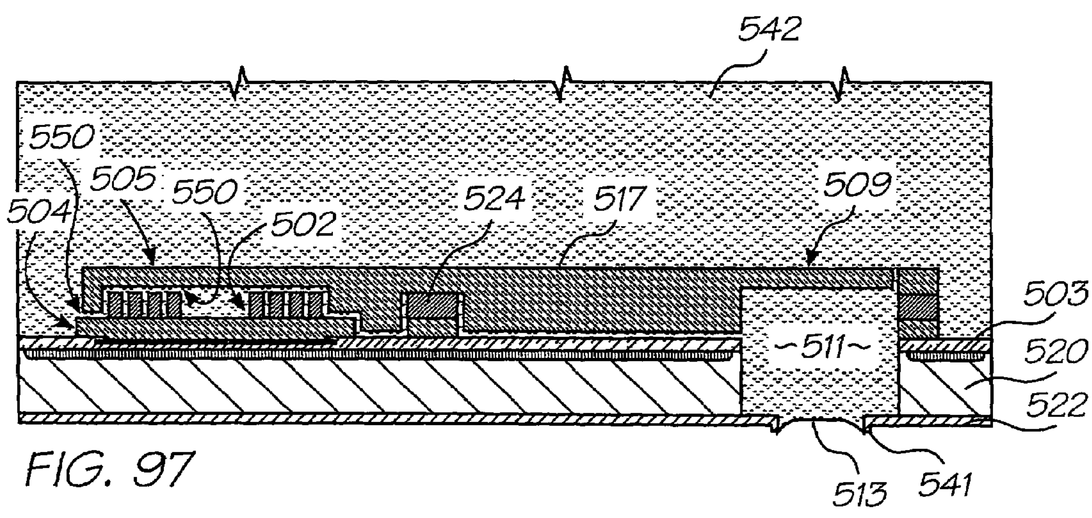

33. Fill the completed printheads with ink and test them. A filled nozzle is shown in FIG. 97.

IJ06

Figure 98:
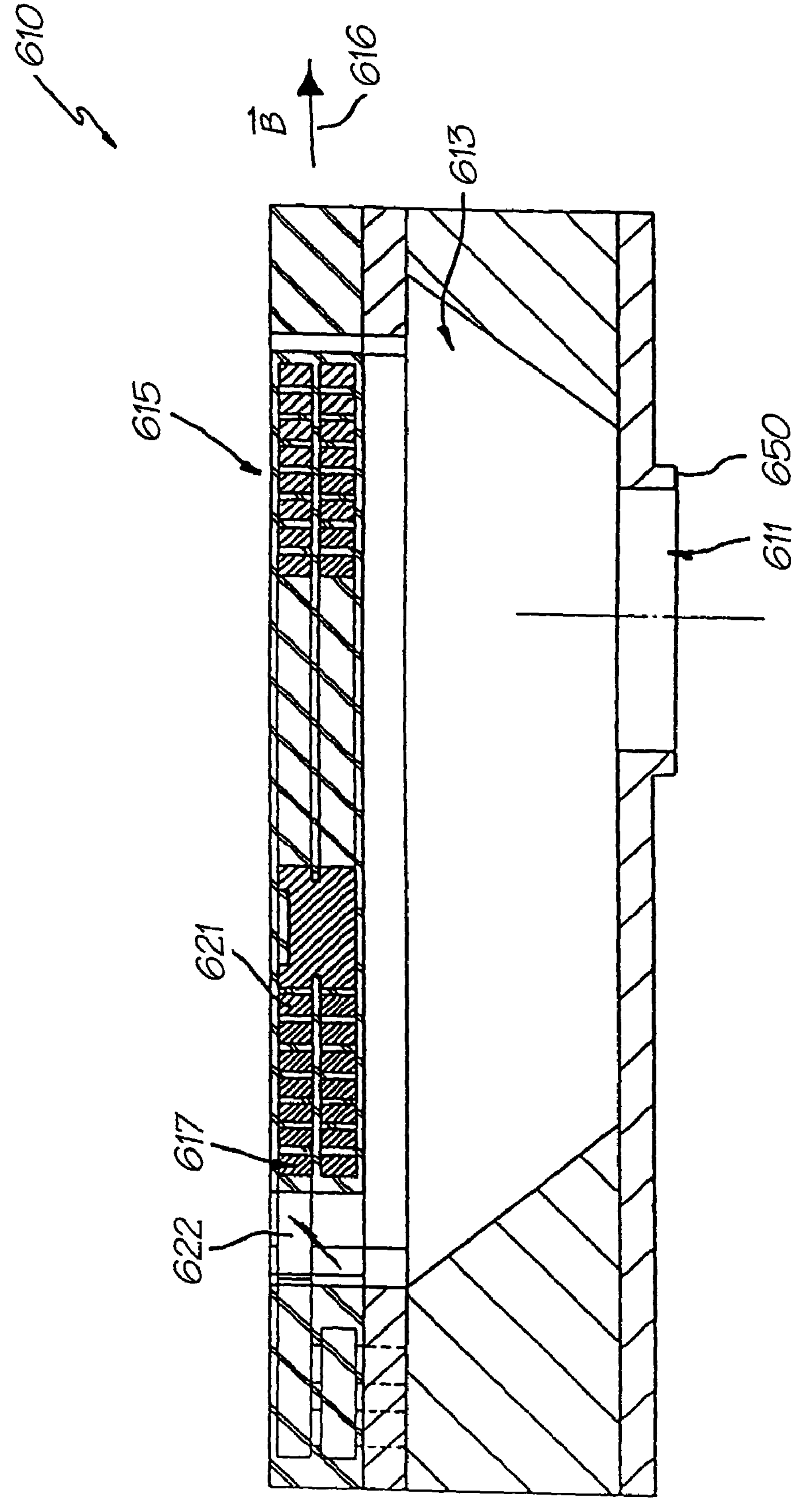
FIG. 98 is a cross-sectional view of a single ink jet nozzle constructed in accordance with a preferred embodiment in its quiescent state.

Referring now to FIG. 98, there is illustrated a cross-sectional view of a single ink nozzle unit 610 constructed in accordance with a preferred embodiment. The ink nozzle unit 610 includes an ink ejection nozzle 611 for the ejection of ink which resides in a nozzle chamber 613. The ink is ejected from the nozzle chamber 613 by means of movement of paddle 615. The paddle 615 operates in a magnetic field 616 which runs along the plane of the paddle 615. The paddle 615 includes at least one solenoid coil 617 which operates under the control of nozzle activation signal. The paddle 615 operates in accordance with the well known principal of the force experienced by a moving electric charge in a magnetic field. Hence, when it is desired to activate the paddle 615 to eject an ink drop out of ink ejection nozzle 611, the solenoid coil 617 is activated. As a result of the activation, one end of the paddle will experience a downward force 619 (See FIG. 99) while the other end of the paddle will experience an upward force 620. The downward force 619 results in a corresponding movement of the paddle and the resultant ejection of ink.

Figure 99:
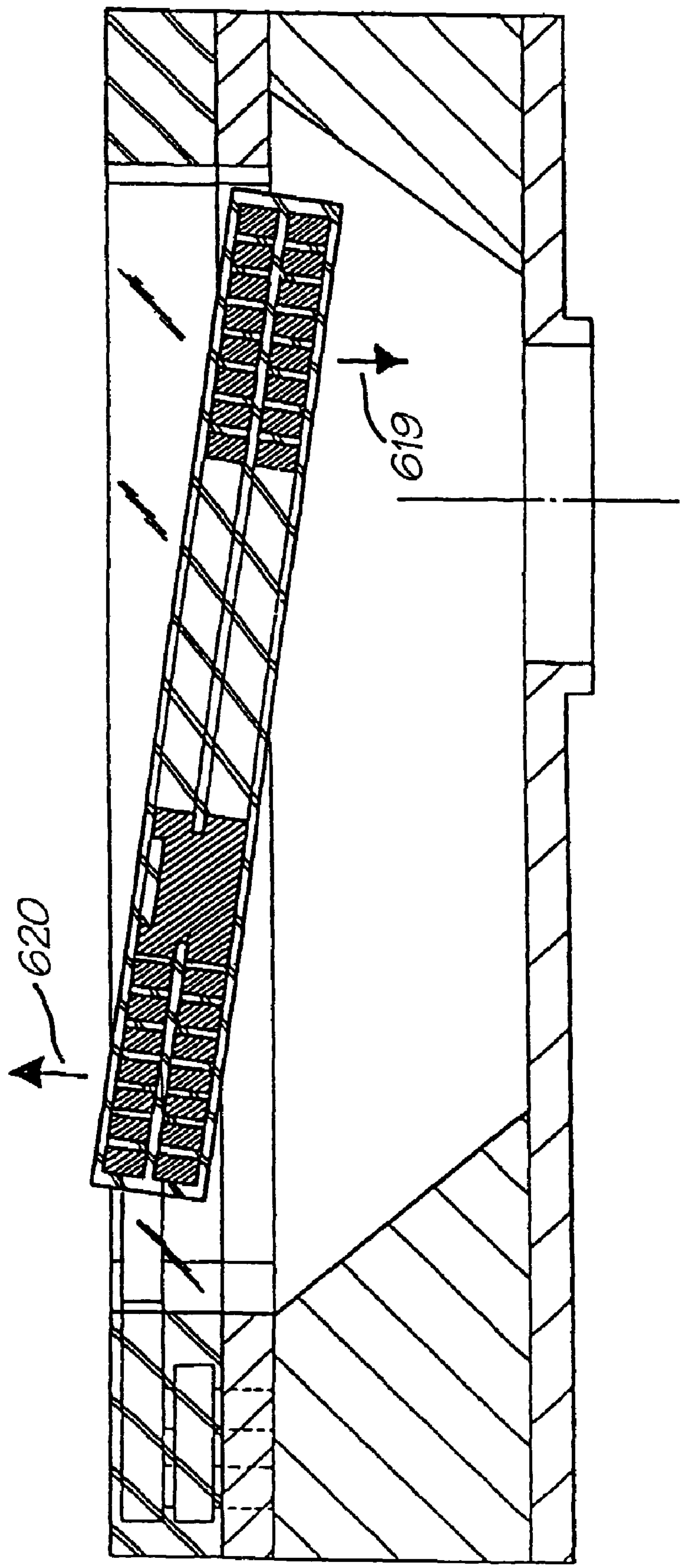
FIG. 99 is a cross-sectional view of a single ink jet nozzle constructed in accordance with a preferred embodiment, illustrating the state upon activation of the actuator.

As can be seen from the cross section of FIG. 98, the paddle 615 can comprise multiple layers of solenoid wires with the solenoid wires, e.g. 621, forming a complete circuit having the current flow in a counter clockwise direction around a centre of the paddle 615. This results in paddle 615 experiencing a rotation about an axis through (as illustrated in FIG. 99) the centre point the rotation being assisted by means of a torsional spring, e.g. 622, which acts to return the paddle 615 to its quiescent state after deactivation of the current paddle 615. Whilst a torsional spring 622 is to be preferred it is envisaged that other forms of springs may be possible such as a leaf spring or the like.

The nozzle chamber 613 refills due to the surface tension of the ink at the ejection nozzle 611 after the ejection of ink.

Manufacturing Construction Process

The construction of the inkjet nozzles can proceed by way of utilisation of microelectronic fabrication techniques commonly known to those skilled in the field of semi-conductor fabrication.

In accordance with one form of construction, two wafers are utilized upon which the active circuitry and ink jet print nozzles are fabricated and a further wafer in which the ink channels are fabricated.

Figure 100:
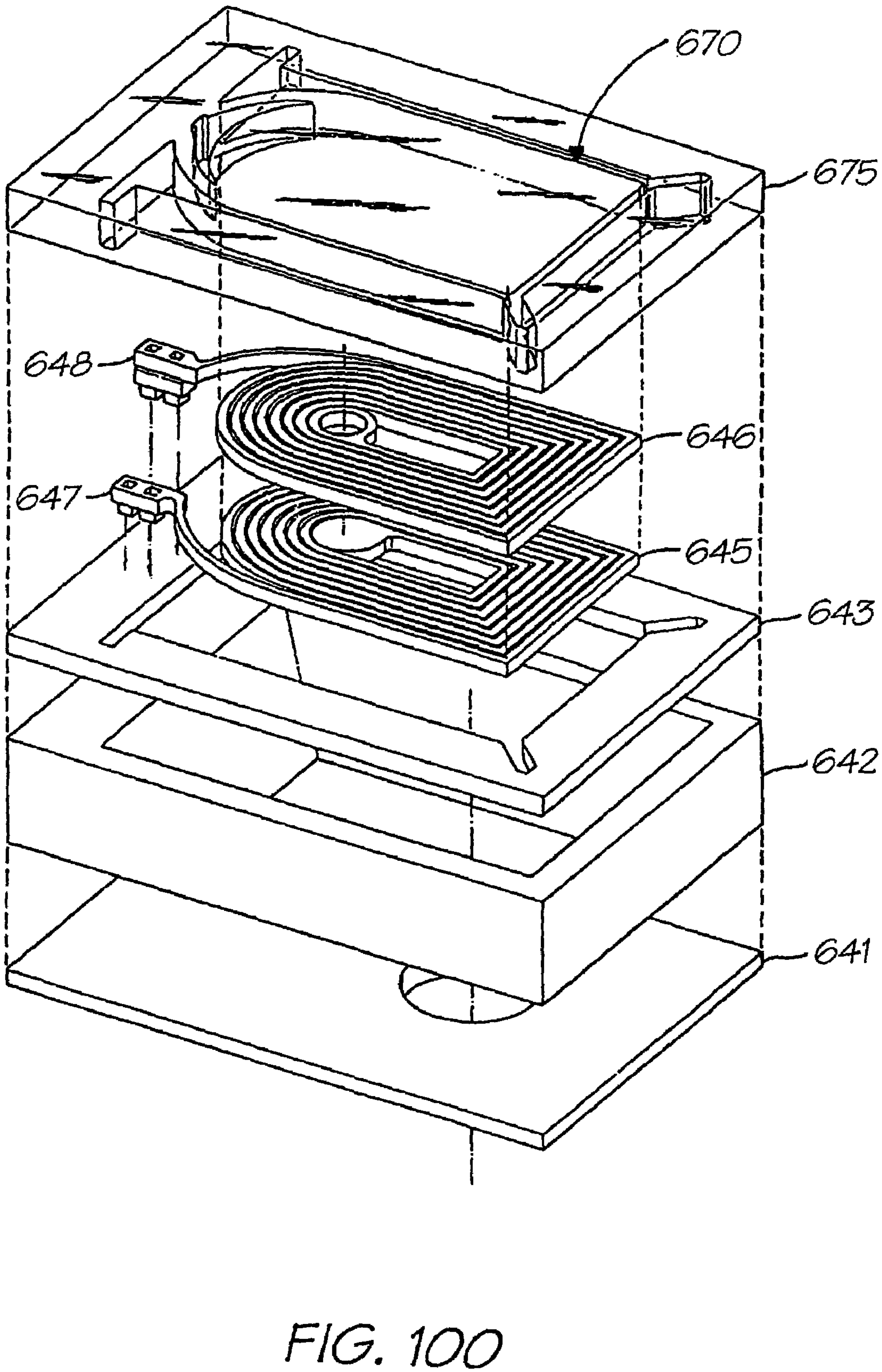
FIG. 100 is an exploded perspective view illustrating the construction of a single ink jet nozzle in accordance with a preferred embodiment.

Turning now to FIG. 100, there is illustrated an exploded perspective view of a single ink jet nozzle constructed in accordance with a preferred embodiment. Construction begins which a silicon wafer (see FIG. 102) upon which has been fabricated an epitaxial boron doped layer 641 and an epitaxial silicon layer 642. The boron layer is doped to a concentration of preferably $10^{20}/cm^3$ of boron or more and is approximately 2 microns thick. The silicon epitaxial layer is constructed to be approximately 8 microns thick and is doped in a manner suitable for the active semi conductor device technology.

Next, the drive transistors and distribution circuitry are constructed in accordance with the fabrication process chosen resulting in a CMOS logic and drive transistor level 643. A silicon nitride layer (not shown) is then deposited.

The paddle metal layers are constructed utilizing a damascene process which is a well known process utilizing chemical mechanical polishing techniques (CMP) well known for utilization as a multi-level metal application. The solenoid coils in paddle 615 (FIG. 98) can be constructed from a double layer which for a first layer 645, is produced utilizing a single damascene process.

Next, a second layer 646 is deposited utilizing this time a dual damascene process. The copper layers 645, 646 include contact posts 647, 648, for interconnection of the electromagnetic coil to the CMOS layer 643 through vias in the silicon nitride layer (not shown). However, the metal post portion also includes a via interconnecting it with the lower copper level. The damascene process is finished with a planarized glass layer. The glass layers produced during utilisation of the damascene processes utilized for the deposition of layers 645, 646, are shown as one layer 675 in FIG. 100.

Subsequently, the paddle is formed and separated from the adjacent glass layer by means of a plasma etch as the etch being down to the position of silicon layer 642. Further, the nozzle chamber 613 underneath the panel is removed by means of a silicon anisotropic wet etch which will edge down to the boron layer 641. A passivation layer is then applied. The passivation layer can comprise a conformable diamond like carbon layer or a high density $Si_3N_4$ coating, this coating provides a protective layer for the paddle and its surrounds as the paddle must exist in the highly corrosive environment water and ink.

Next, the silicon wafer can be back-etched through the boron doped layer and the ejection port 611 and an ejection port rim 650 (FIG. 98) can also be formed utilizing etching procedures.

One form of alternative detailed manufacturing process which can be used to fabricate monolithic ink jet print heads operating in accordance with the principles taught by the present embodiment can proceed utilizing the following steps:

1. Using a double sided polished wafer 640 deposit 3 microns of epitaxial silicon heavily doped with boron 641.

2. Deposit 10 microns of epitaxial silicon 642, either p-type or n-type, depending upon the CMOS process used.

Figure 101:
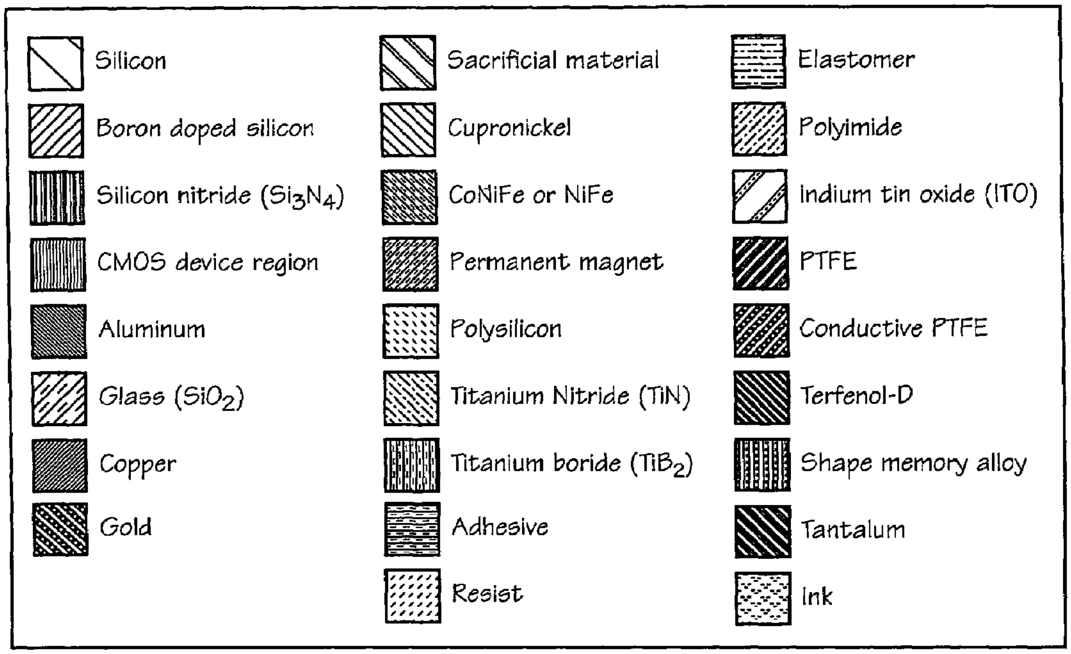
FIG. 101 provides a legend of the materials indicated in FIGS. 102 to 112.
Figure 102:
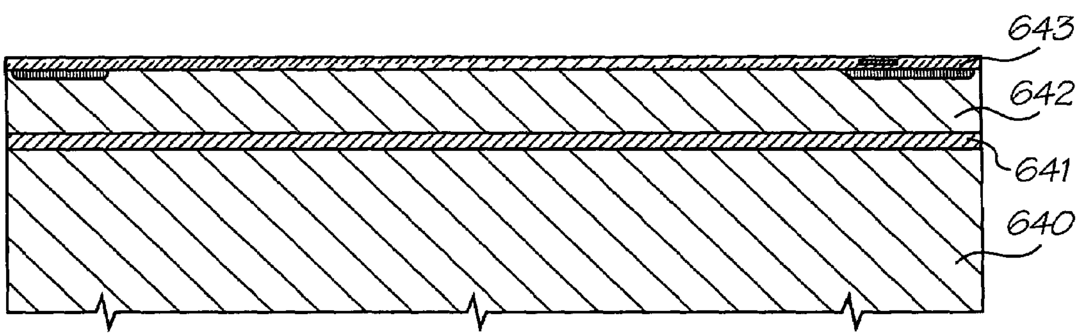
FIG. 102 to FIG. 112 illustrate sectional views of the manufacturing steps in one form of construction of an ink jet printhead nozzle.

3. Complete a 0.5 micron, one poly, 2 metal CMOS process to form layers 643. This step is shown in FIG. 102. For clarity, these diagrams may not be to scale, and may not represent a cross section though any single plane of the nozzle. FIG. 101 is a key to representations of various materials in these manufacturing diagrams, and those of other cross referenced ink jet configurations.

4. Deposit 0.1 microns of silicon nitride ($Si_3N_4$) (not shown).

5. Etch the nitride layer using Mask 1. This mask defines the contact vias from the solenoid coil to the second-level metal contacts.

6. Deposit a seed layer of copper. Copper is used for its low resistivity (which results in higher efficiency) and its high electromigration resistance, which increases reliability at high current densities.

Figure 103:
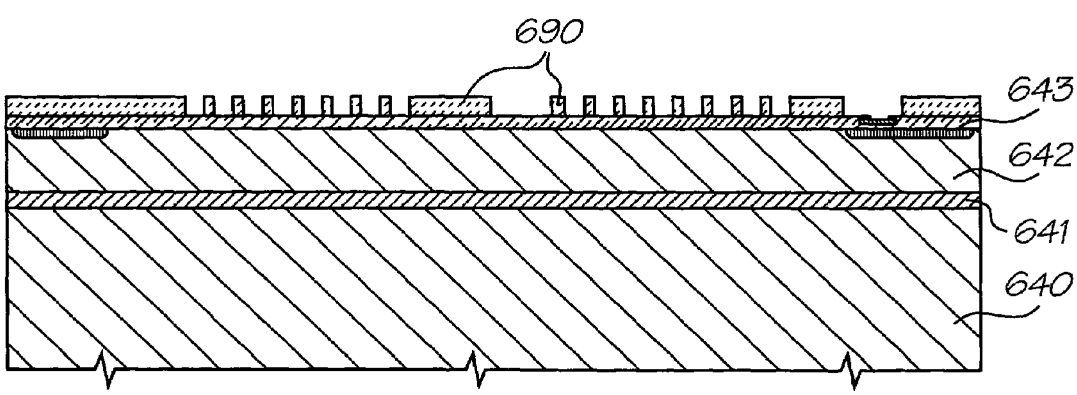

7. Spin on 3 microns of resist 690, expose with Mask 2, and develop. This mask defines the first level coil of the solenoid. The resist acts as an electroplating mold. This step is shown in FIG. 103.

8. Electroplate 2 microns of copper 645.

Figure 104:
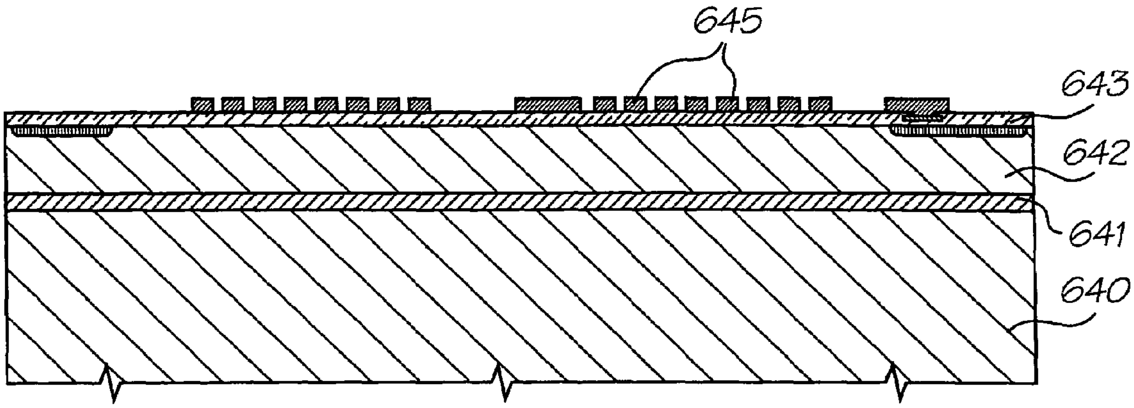

9. Strip the resist and etch the exposed copper seed layer. This step is shown in FIG. 104.

10. Deposit 0.1 microns of silicon nitride ($Si_3N_4$) 691.

11. Etch the nitride layer using Mask 3. This mask defines the contact vias 647, 648 between the first level and the second level of the solenoid.

12. Deposit a seed layer of copper.

Figure 105:
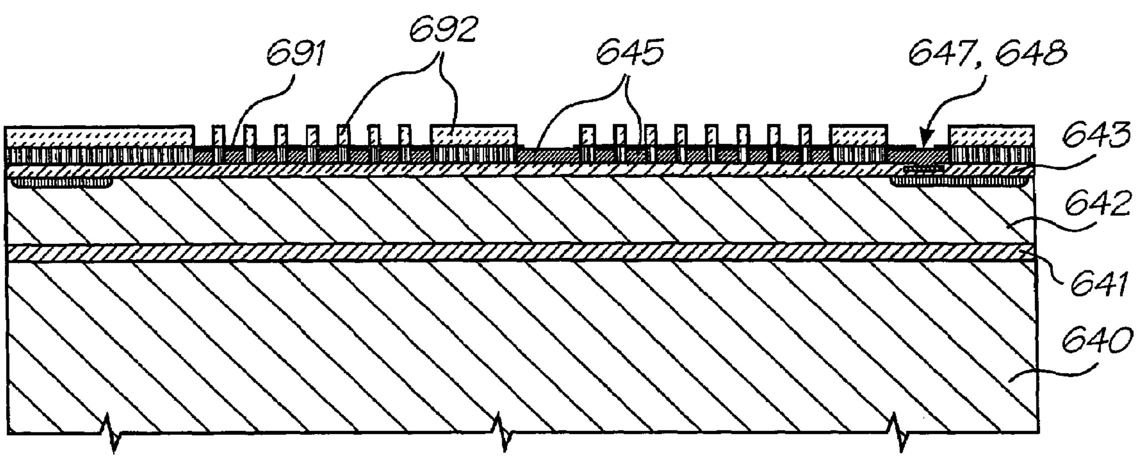

13. Spin on 3 microns of resist 692, expose with Mask 4, and develop. This mask defines the second level coil of the solenoid. The resist acts as an electroplating mold. This step is shown in FIG. 105.

14. Electroplate 2 microns of copper 646.

Figure 106:
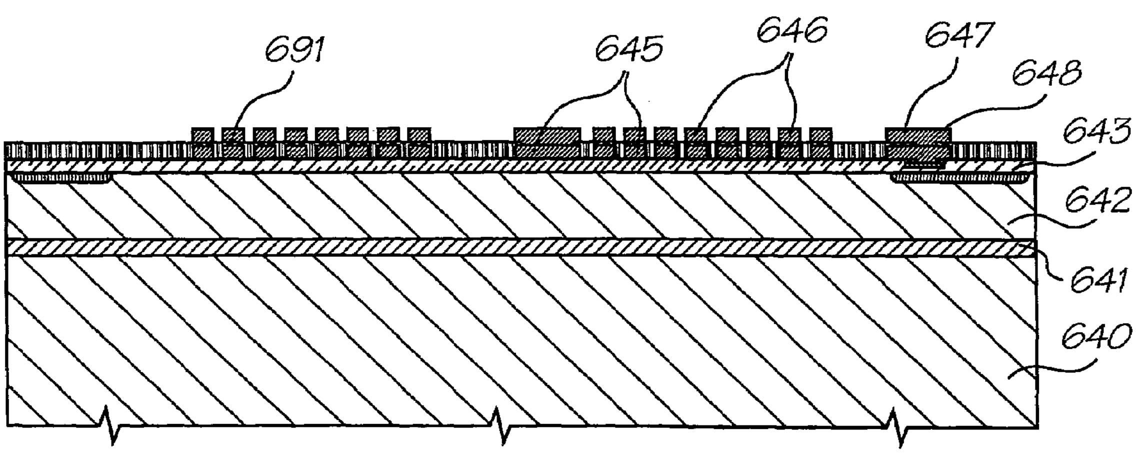

15. Strip the resist and etch the exposed copper seed layer. This step is shown in FIG. 106.

16. Wafer probe. All electrical connections are complete at this point, bond pads are accessible, and the chips are not yet separated.

17. Deposit 0.1 microns of silicon nitride 693.

Figure 107:
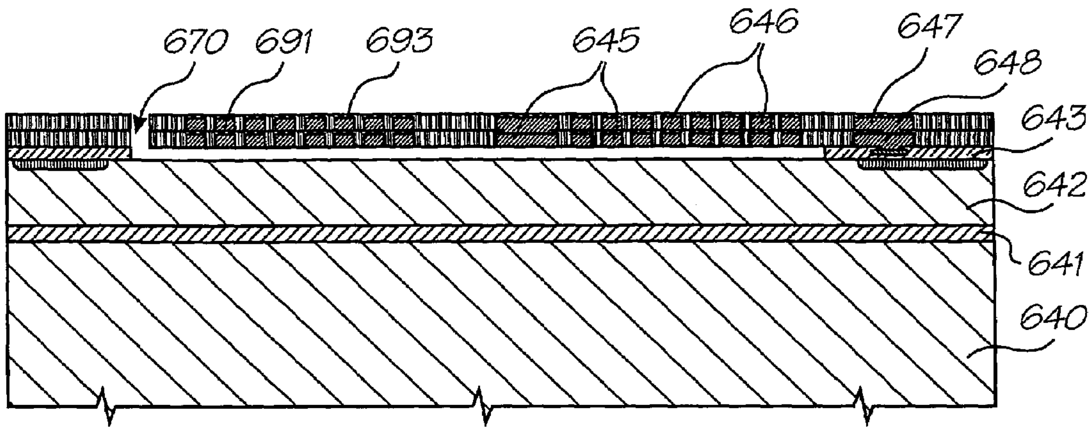

18. Etch the nitride and CMOS oxide layers down to silicon using Mask 5. This mask defines the nozzle chamber mask and the edges 670 of the print heads chips for crystallographic wet etching. This step is shown in FIG. 107.

19. Crystallographically etch the exposed silicon using KOH. This etch stops on <111> crystallographic planes 694, and on the boron doped silicon buried layer. Due to the design of Mask 5, this etch undercuts the silicon, providing clearance for the paddle to rotate downwards.

Figure 108:
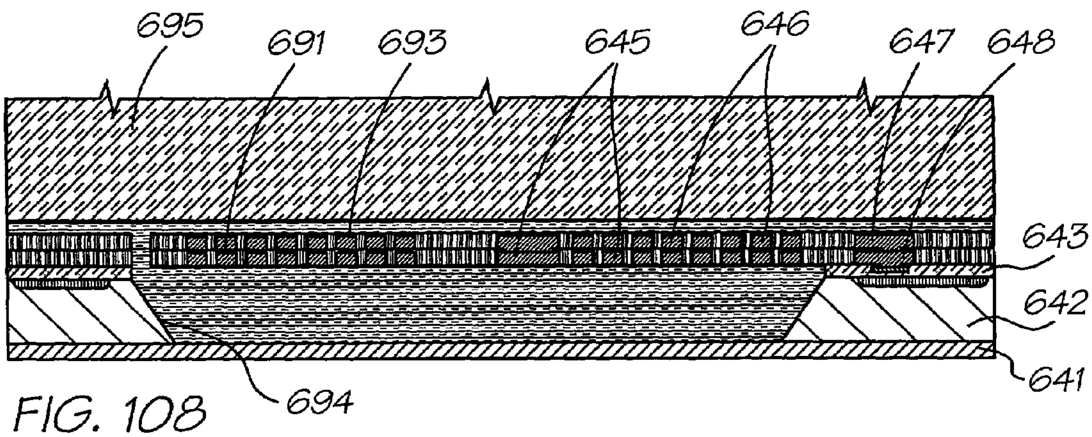

20. Mount the wafer on a glass blank 695 and back-etch the wafer using KOH, with no mask. This etch thins the wafer and stops at the buried boron doped silicon layer. This step is shown in FIG. 108.

Figure 109:
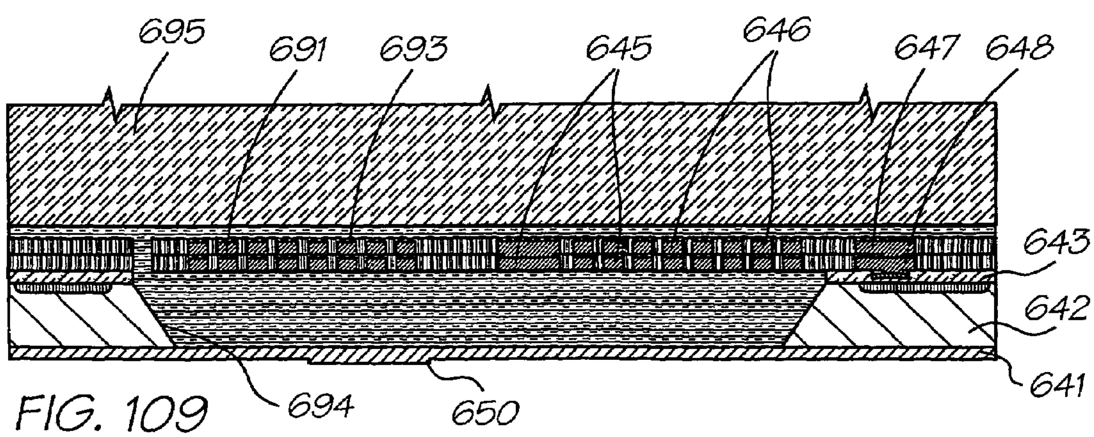

21. Plasma back-etch the boron doped silicon layer to a depth of 1 micron using Mask 6. This mask defines the nozzle rim 650. This step is shown in FIG. 109.

Figure 110:
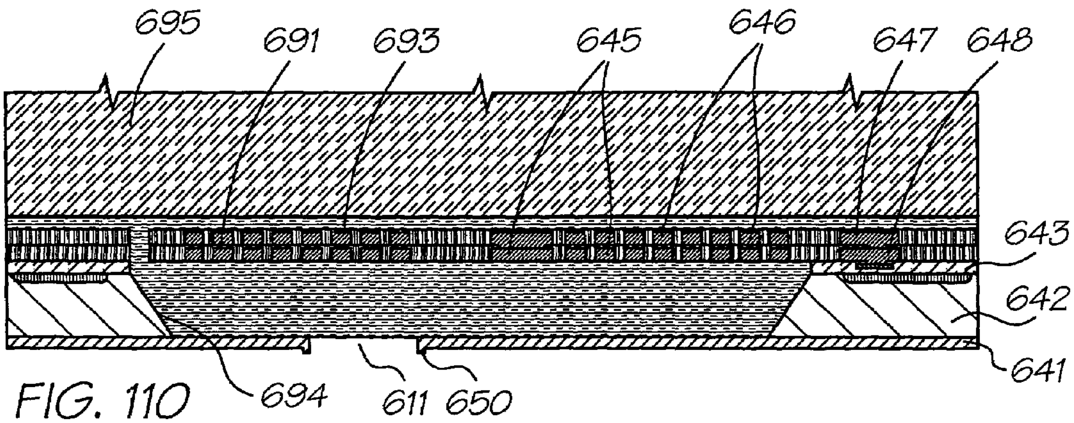

22. Plasma back-etch through the boron doped layer using Mask 7. This mask defines the ink ejection nozzle 611, and the edge of the chips. At this stage, the chips are separate, but are still mounted on the glass blank. This step is shown in FIG. 110.

Figure 111:
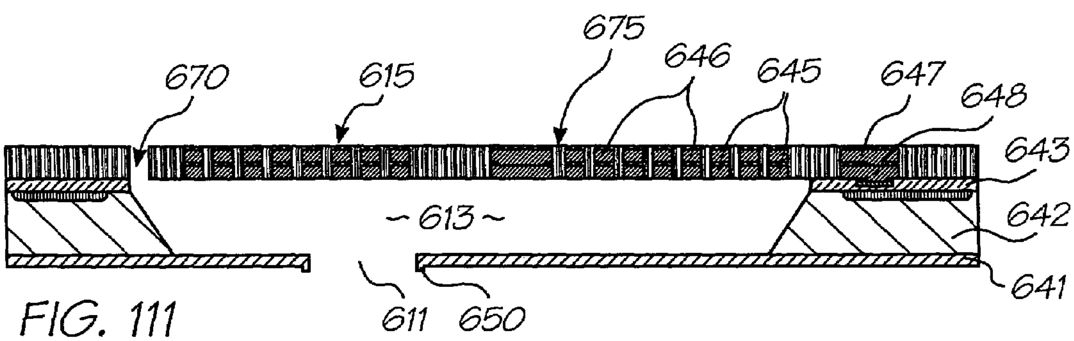

23. Strip the adhesive layer to detach the chips from the glass blank. This step is shown in FIG. 111.

24. Mount the print heads in their packaging, which may be a molded plastic former incorporating ink channels which supply different colors of ink to the appropriate regions of the front surface of the wafer.

25. Connect the print heads to their interconnect systems.

26. Hydrophobize the front surface of the print heads.

Figure 112:
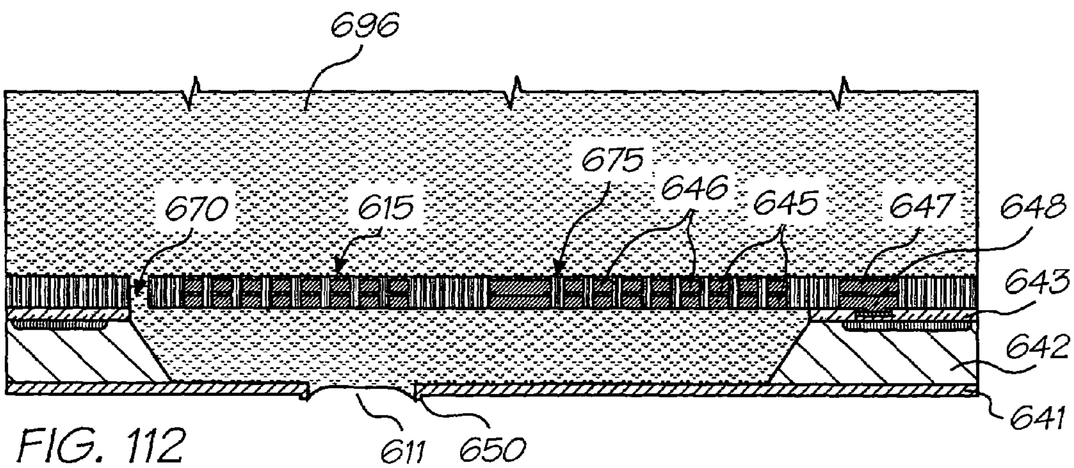

27. Fill with ink 696, apply a strong magnetic field in the plane of the chip surface, and test the completed print heads. A filled nozzle is shown in FIG. 112.

IJ07

Figure 113:
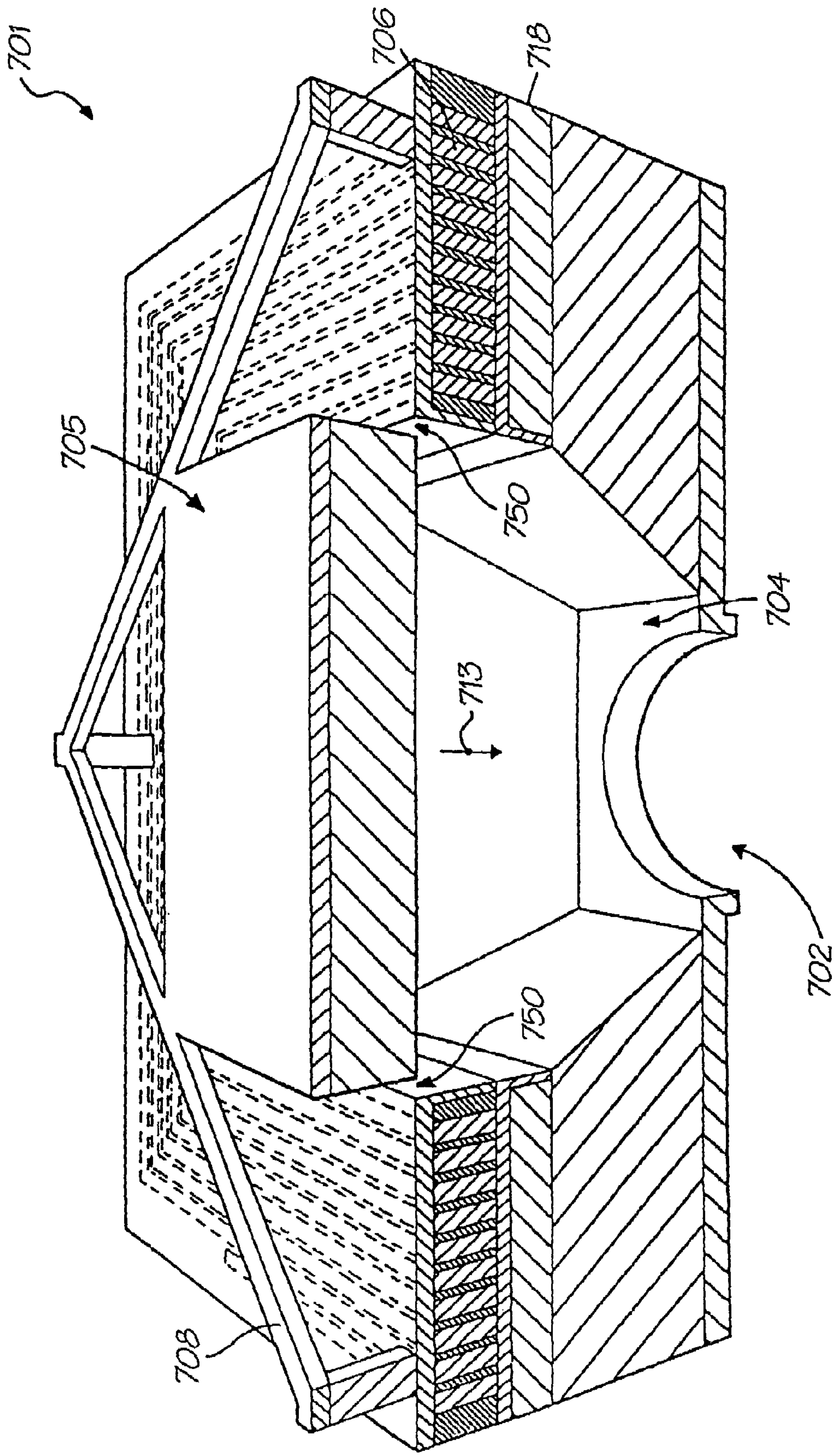
FIG. 113 is a perspective cross-sectional view of a single ink jet nozzle apparatus constructed in accordance with a preferred embodiment.

Turning initially to FIG. 113, there is illustrated a perspective view in section of a single nozzle apparatus 701 constructed in accordance with the techniques of a preferred embodiment.

Each nozzle apparatus 701 includes a nozzle outlet port 702 for the ejection of ink from a nozzle chamber 704 as a result of activation of an electromagnetic piston 705. The electromagnetic piston 705 is activated via a solenoid coil 706 which is positioned about the piston 705. When a current passes through the solenoid coil 706, the piston 705 experiences a force in the direction as indicated by an arrow 713. As a result, the piston 705 begins moving towards the outlet port 702 and thus imparts momentum to ink within the nozzle chamber 704. The piston 705 is mounted on torsional springs 708, 709 so that the springs 708, 709 act against the movement of the piston 705. The torsional springs 708 are configured so that they do not fully stop the movement of the piston 705.

Upon completion of an ejection cycle, the current to the coil 706 is turned off. As a result, the torsional springs 708, 709 act to return the piston 705 to its rest position as initially shown in FIG. 113. Subsequently, surface tension forces cause the chamber 704 to refill with ink and to return ready for "re-firing".

Current to the coil 706 is provided via aluminum connectors (not shown) which interconnect the coil 706 with a semiconductor drive transistor and logic layer 718.

Construction

A liquid ink jet print head has one nozzle apparatus 701 associated with a respective one of each of a multitude of nozzle apparatus 701. It will be evident that each nozzle apparatus 701 has the following major parts, which are constructed using standard semi-conductor and micromechanical construction techniques:

1. Drive circuitry within the logic layer 718.

2. The nozzle outlet port 702. The radius of the nozzle outlet port 702 is an important determinant of drop velocity and drop size.

3. The magnetic piston 705. This can be manufactured from a rare earth magnetic material such as neodymium iron boron (NdFeB) or samarium cobalt (SaCo). The pistons 705 are magnetised after a last high temperature step in the fabrication of the print heads, to ensure that the Curie temperature is not exceeded after magnetisation. A typical print head may include many thousands of pistons 705 all of which can be magnetised simultaneously and in the same direction.

4. The nozzle chamber 704. The nozzle chamber 704 is slightly wider than the piston 705. The gap 750 between the piston 705 and the nozzle chamber 704 can be as small as is required to ensure that the piston 705 does not contact the nozzle chamber 704 during actuation or return of the piston 705. If the print heads are fabricated using a standard 0.5 μm lithography process, then a 1 μm gap will usually be sufficient. The nozzle chamber 704 should also be deep enough so that air ingested through the outlet port 702 when the piston 705 returns to its quiescent state does not extend to the piston 705. If it does, the ingested air bubble may form a cylindrical surface instead of a hemispherical surface. If this happens, the nozzle chamber 704 may not refill properly.

5. The solenoid coil 706. This is a spiral coil of copper. A double layer spiral is used to obtain a high field strength with a small device radius. Copper is used for its low resistivity, and high electro-migration resistance.

6. Springs 708. The springs 708 return the piston 705 to its quiescent position after a drop of ink has been ejected. The springs 708 can be fabricated from silicon nitride.

7. Passivation layers. All surfaces are coated with passivation layers, which may be silicon nitride ($Si_3N_4$), diamond like carbon (DLC), or other chemically inert, highly impermeable layer. The passivation layers are especially important for device lifetime, as the active device is immersed in the ink.

Example Method of Fabrication

Figure 114:
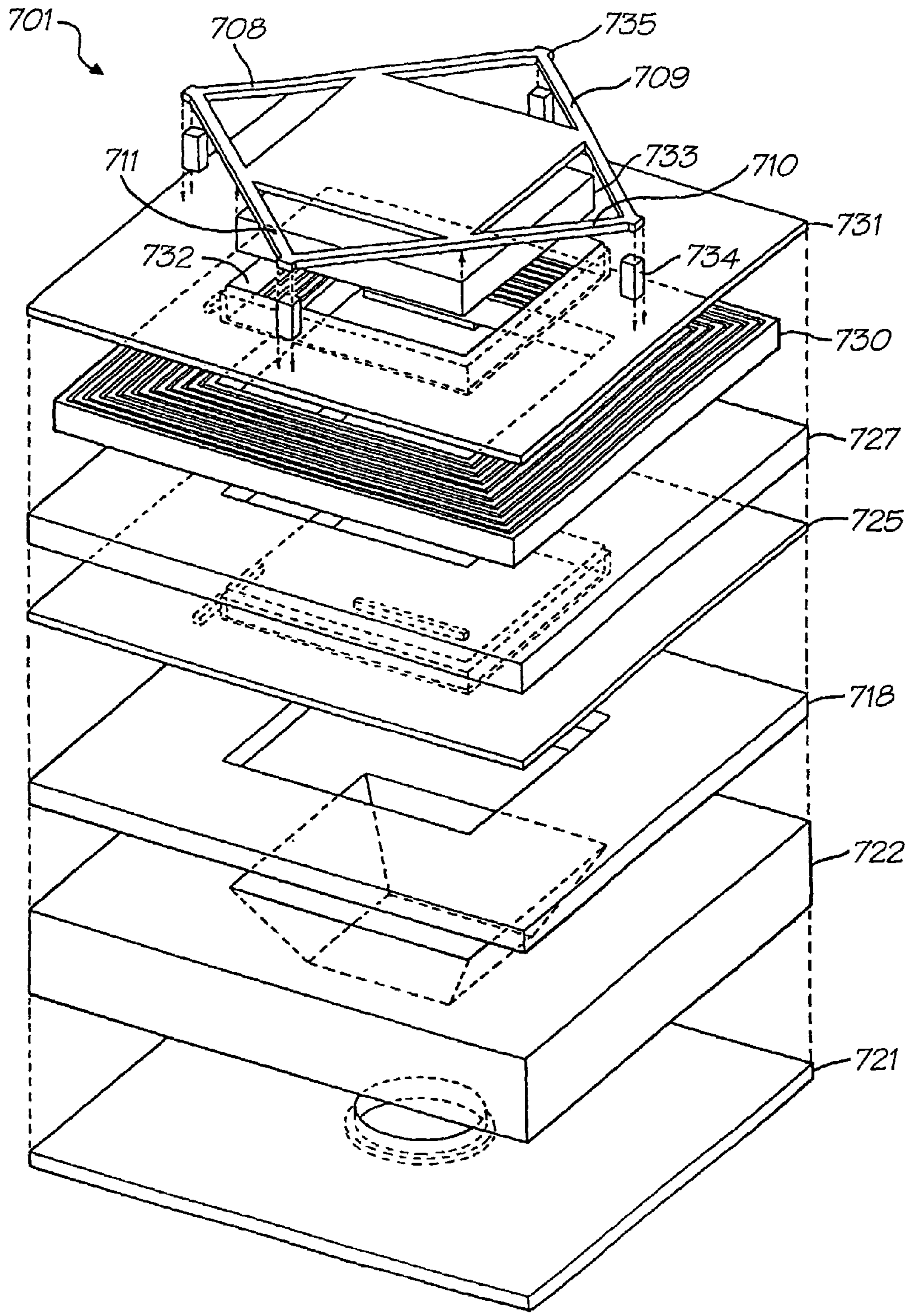
FIG. 114 is an exploded perspective view illustrating the construction of the ink jet nozzle apparatus in accordance with a preferred embodiment.

The print head is fabricated from two silicon apparatus wafers. A first wafer is used to fabricate the nozzle apparatus (the print head wafer) and a second wafer is utilized to fabricate the various ink channels in addition to providing a support means for the first channel (the Ink Channel Wafer). FIG. 114 is an exploded perspective view illustrating the construction of the ink jet nozzle apparatus 701 on a print head wafer. The fabrication process proceeds as follows:

Start with a single silicon wafer, which has a buried epitaxial layer 721 of silicon which is heavily doped with boron. The boron should be doped to preferably $10^{20}$ atoms per $cm^3$ of boron or more, and be approximately 31 μm thick. A lightly doped silicon epitaxial layer 722 on top of the boron doped layer 721 should be approximately 8 μm thick, and be doped in a manner suitable for the active semiconductor device technology chosen. This is the starting point for the print head wafer. The wafer diameter should be the same as that of the ink channel wafer.

Next, fabricate the drive transistors and data distribution circuitry required for each nozzle according to the process chosen, in a standard CMOS layer 718 up until oxide over the first level metal. On top of the CMOS layer 718 is deposited a silicon nitride passivation layer 725. Next, a silicon oxide layer 727 is deposited. The silicon oxide layer 727 is etched utilizing a mask for a copper coil layer. Subsequently, a copper layer 730 is deposited through the mask for the copper coil. The layers 727, 725 also include vias (not shown) for the interconnection of the copper coil layer 730 to the underlying CMOS layer 718. Next, the nozzle chamber 704 (FIG. 113) is etched. Subsequently, a sacrificial material is deposited to fill the etched volume (not shown) entirely. On top of the sacrificial material a silicon nitride layer 731 is deposited, including site portions 732. Next, the magnetic material layer 733 is deposited utilizing the magnetic piston mask. This layer also includes posts, 734.

A final silicon nitride layer 735 is then deposited onto an additional sacrificial layer (not shown) to cover the bare portions of nitride layer 731 to the height of the magnetic material layer 733, utilizing a mask for the magnetic piston and the torsional springs 708. The torsional springs 708, and the magnetic piston 705 (see FIG. 113) are liberated by etching the aforementioned sacrificial material.

One form of detailed manufacturing process which can be used to fabricate monolithic ink jet print heads operating in accordance with the principles taught by the present embodiment can proceed utilizing the following steps:

1. Using a double sided polished wafer 751 deposit 3 microns of epitaxial silicon heavily doped with boron 721.

2. Deposit 10 microns of epitaxial silicon 722, either p-type or n-type, depending upon the CMOS process used.

Figure 115:
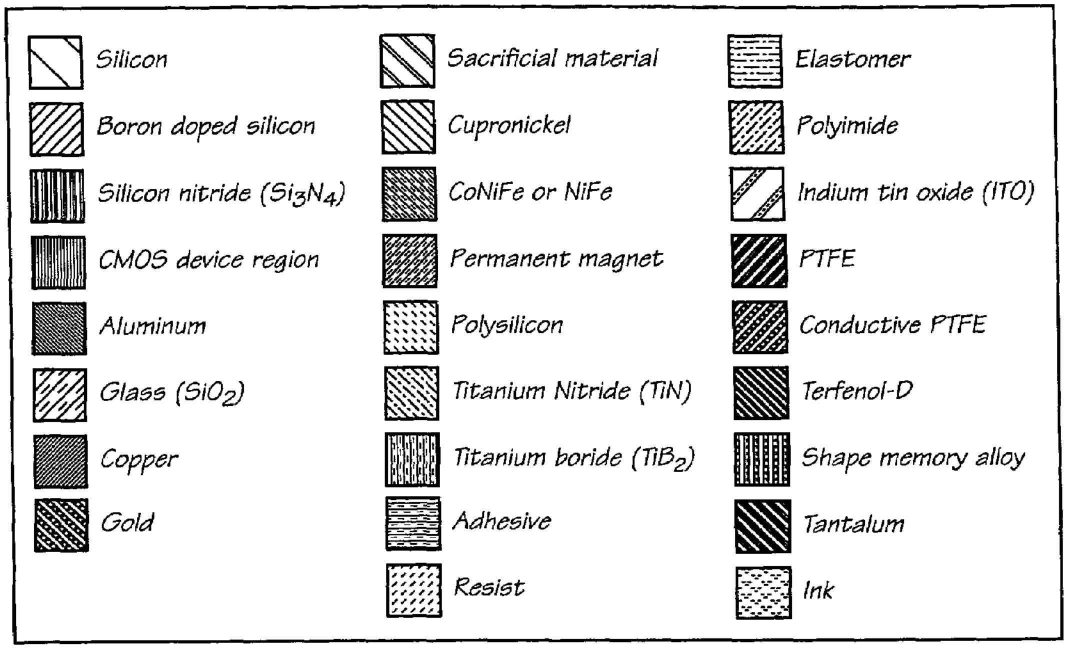
FIG. 115 provides a legend of the materials indicated in FIGS. 116 to 130.
Figure 116:
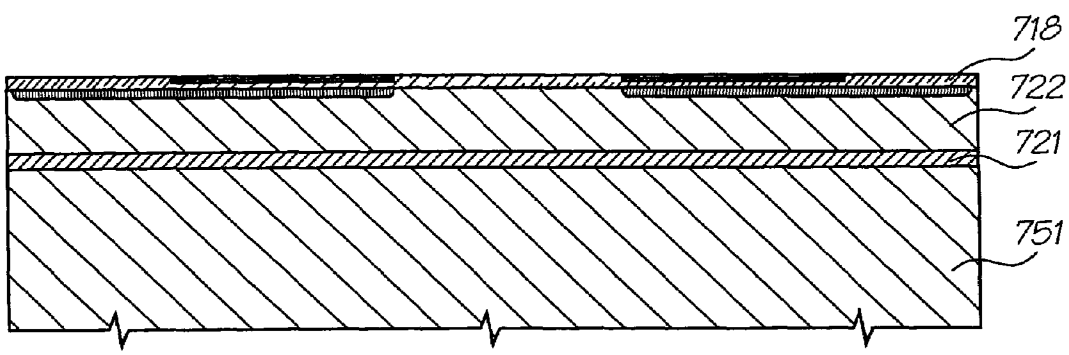
FIG. 116 to FIG. 130 illustrate sectional views of the manufacturing steps in one form of construction of the ink jet nozzle apparatus.

3. Complete a 0.5 micron, one poly, 2 metal CMOS process 718. The metal layers are copper instead of aluminum, due to high current densities and subsequent high temperature processing. This step is shown in FIG. 116. For clarity, these diagrams may not be to scale, and may not represent a cross section though any single plane of the nozzle. FIG. 115 is a key to representations of various materials in these manufacturing diagrams, and those of other cross referenced ink jet configurations.

4. Deposit 0.5 microns of low stress PECVD silicon nitride ($Si_3N_4$) 752. The nitride acts as a dielectric, and etch stop, a copper diffusion barrier, and an ion diffusion barrier. As the speed of operation of the print head is low, the high dielectric constant of silicon nitride is not important, so the nitride layer can be thick compared to sub-micron CMOS back-end processes.

Figure 117:
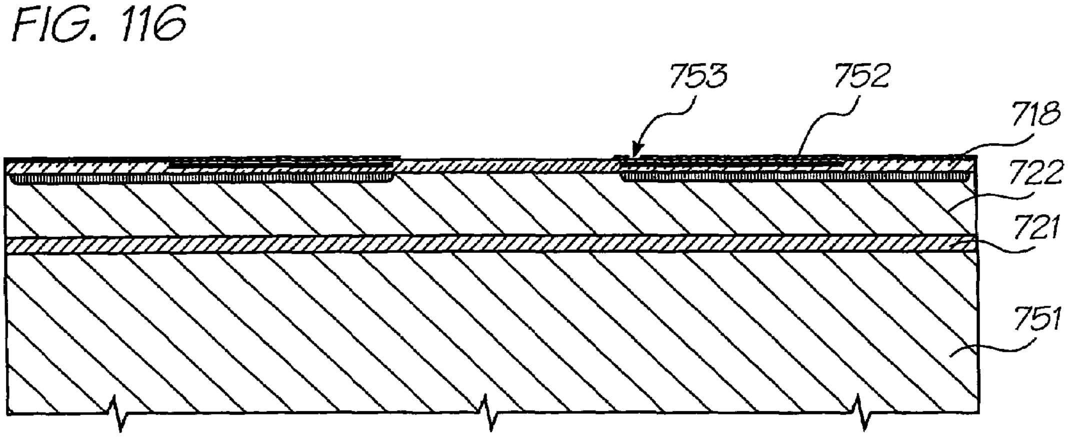

5. Etch the nitride layer using Mask 1. This mask defines the contact vias 753 from the solenoid coil to the second-level metal contacts, as well as the nozzle chamber. This step is shown in FIG. 117.

6. Deposit 4 microns of PECVD glass 754.

Figure 118:
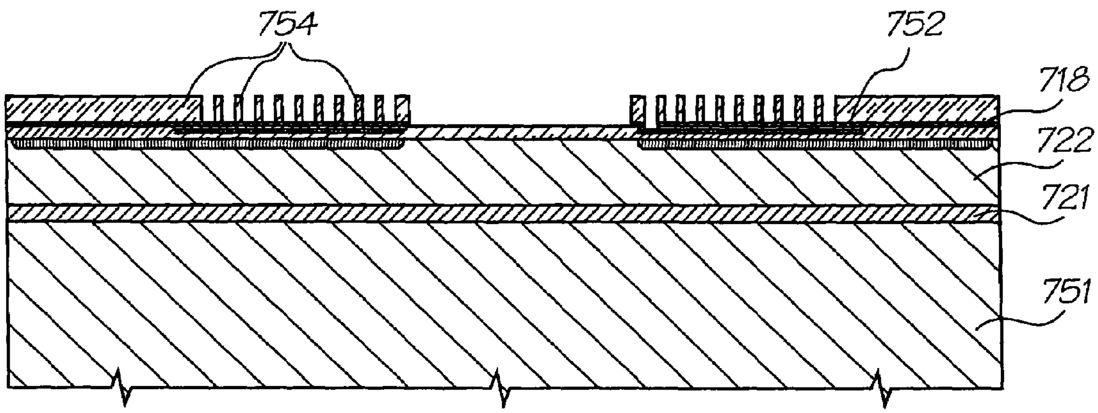

7. Etch the glass down to nitride or second level metal using Mask 2. This mask defines the solenoid. This step is shown in FIG. 118.

8. Deposit a thin barrier layer of Ta or TaN.

9. Deposit a seed layer of copper. Copper is used for its low resistivity (which results in higher efficiency) and its high electromigration resistance, which increases reliability at high current densities.

10. Electroplate 4 microns of copper 755.

Figure 119:
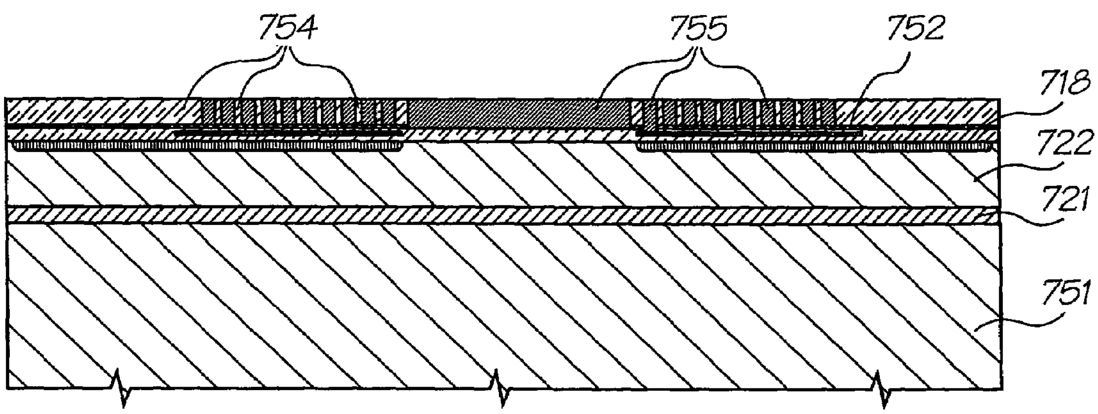

11. Planarize using CMP. Steps 4 to 11 represent a copper dual damascene process, with a 4:1 copper aspect ratio (4 microns high, 1 micron wide). This step is shown in FIG. 119.

Figure 120:
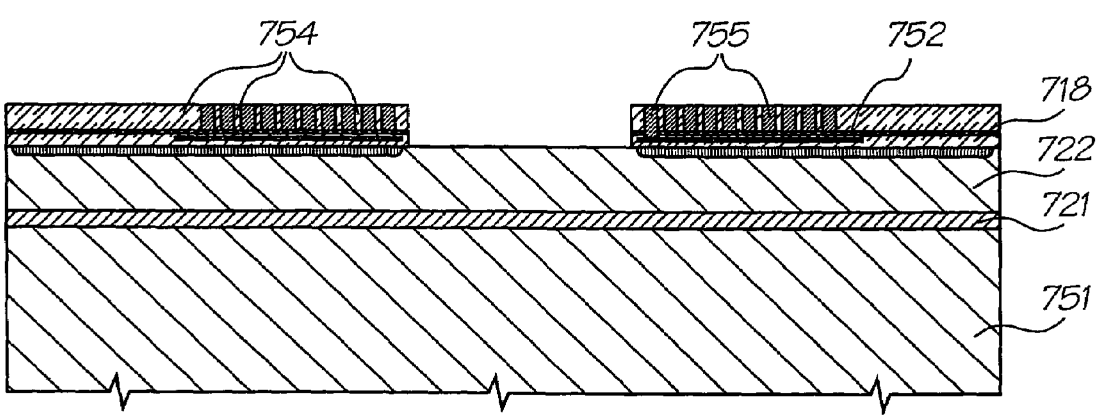

12. Etch down to silicon using Mask 3. This mask defines the nozzle cavity. This step is shown in FIG. 120.

Figure 121:
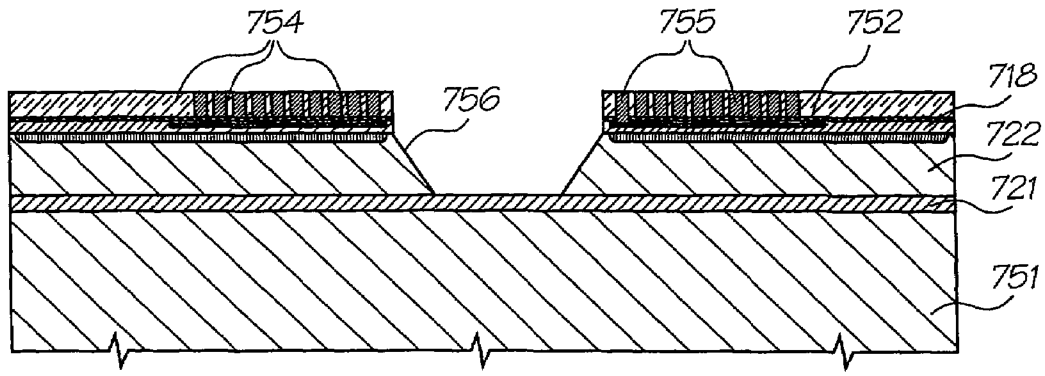

13. Crystallographically etch the exposed silicon using KOH. This etch stops on <111> crystallographic planes 756, and on the boron doped silicon buried layer. This step is shown in FIG. 121.

14. Deposit 0.5 microns of low stress PECVD silicon nitride 757.

15. Open the bond pads using Mask 4.

16. Wafer probe. All electrical connections are complete at this point, bond pads are accessible, and the chips are not yet separated.

Figure 122:
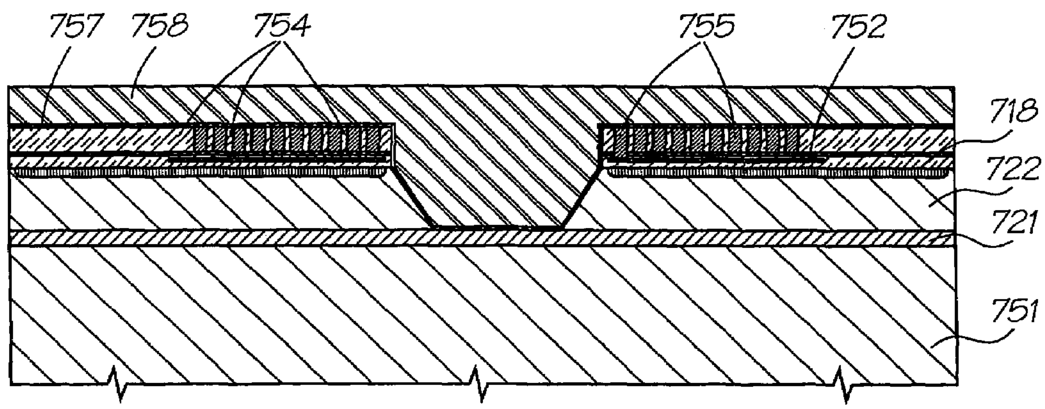

17. Deposit a thick sacrificial layer 758 (e.g. low stress glass), filling the nozzle cavity. Planarize the sacrificial layer to a depth of 5 microns over the nitride surface. This step is shown in FIG. 122.

Figure 123:
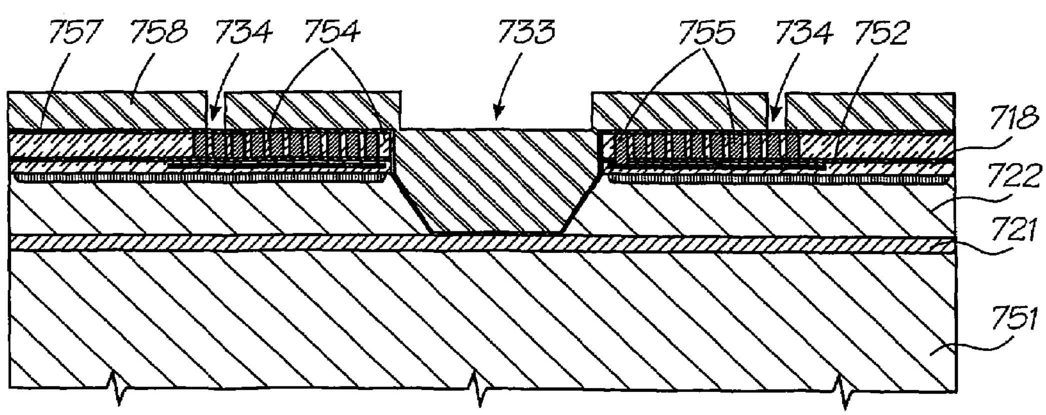

18. Etch the sacrificial layer to a depth of 6 microns using Mask 5. This mask defines the permanent magnet of the pistons plus the magnet support posts. This step is shown in FIG. 123.

Figure 124:
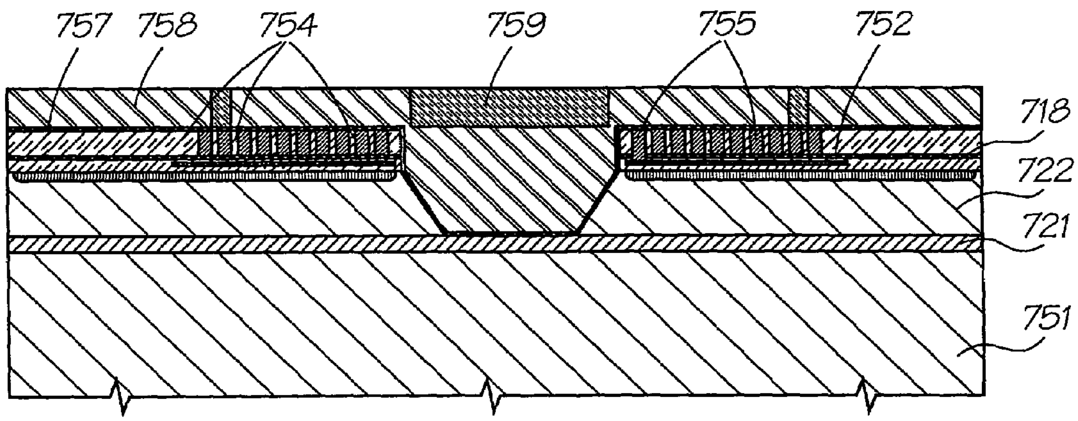

19. Deposit 6 microns of permanent magnet material such as neodymium iron boron (NdFeB) 759. Planarize. This step is shown in FIG. 124.

20. Deposit 0.5 microns of low stress PECVD silicon nitride 760.

Figure 125:
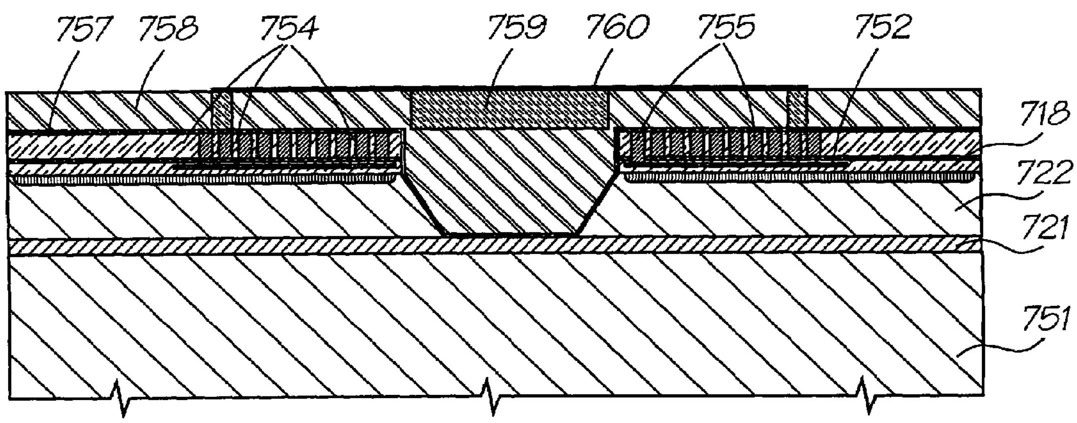

21. Etch the nitride using Mask 6, which defines the spring. This step is shown in FIG. 125.

22. Anneal the permanent magnet material at a temperature which is dependant upon the material.

23. Place the wafer in a uniform magnetic field of 2 Tesla (20,000 Gauss) with the field normal to the chip surface. This magnetizes the permanent magnet.

Figure 126:
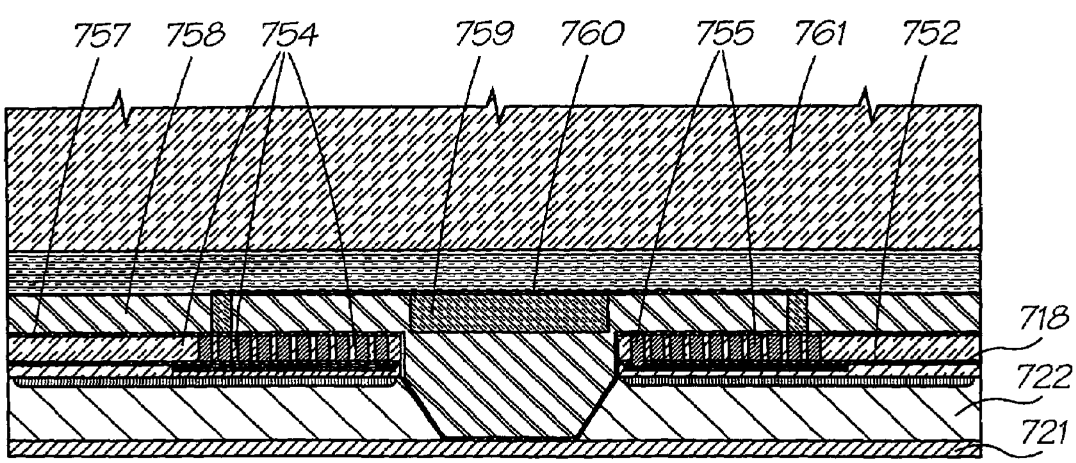

24. Mount the wafer on a glass blank and back-etch the wafer using KOH, with no mask. This etch thins the wafer and stops at the buried boron doped silicon layer. This step is shown in FIG. 126.

Figure 127:
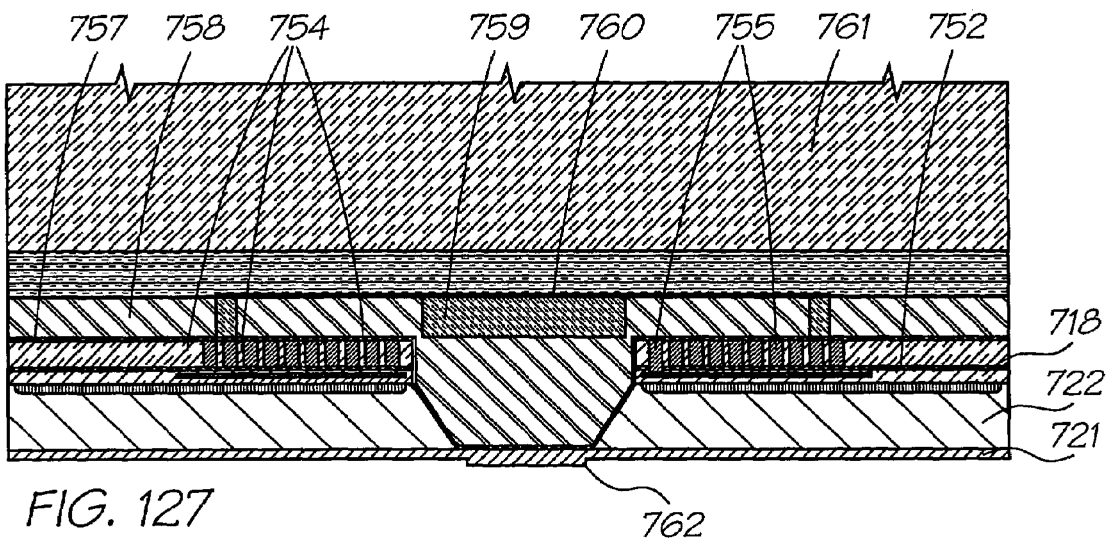

25. Plasma back-etch the boron doped silicon layer to a depth of 1 micron using Mask 7. This mask defines the nozzle rim 762. This step is shown in FIG. 127.

26. Plasma back-etch through the boron doped layer using Mask 8. This mask defines the nozzle 702, and the edge of the chips.

Figure 128:
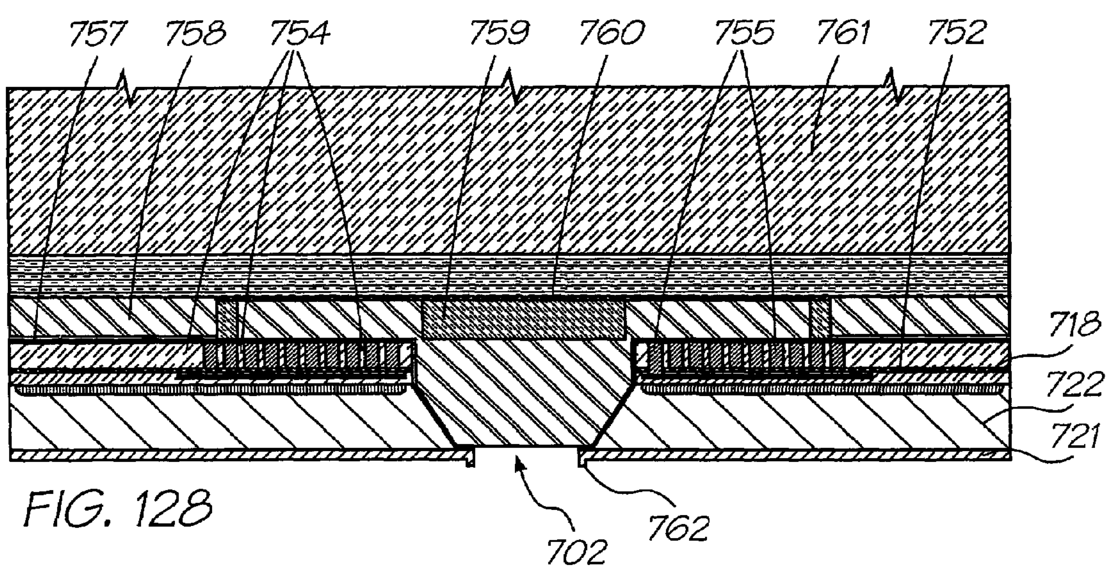

27. Plasma back-etch nitride up to the glass sacrificial layer through the holes in the boron doped silicon layer. At this stage, the chips are separate, but are still mounted on the glass blank. This step is shown in FIG. 128.

28. Strip the adhesive layer to detach the chips from the glass blank.

Figure 129:
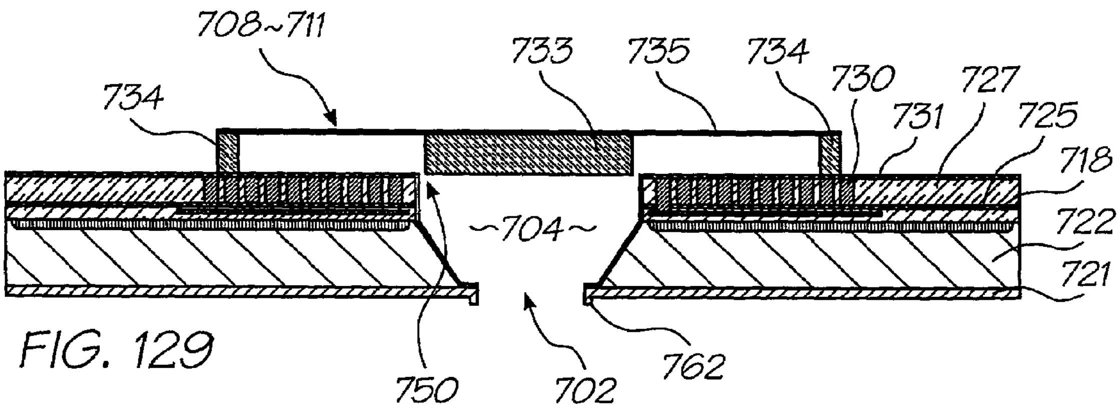

29. Etch the sacrificial glass layer in buffered HF. This step is shown in FIG. 129.

30. Mount the print heads in their packaging, which may be a molded plastic former incorporating ink channels which supply different colors of ink to the appropriate regions of the front surface of the wafer.

31. Connect the print heads to their interconnect systems.

32. Hydrophobize the front surface of the print heads.

Figure 130:
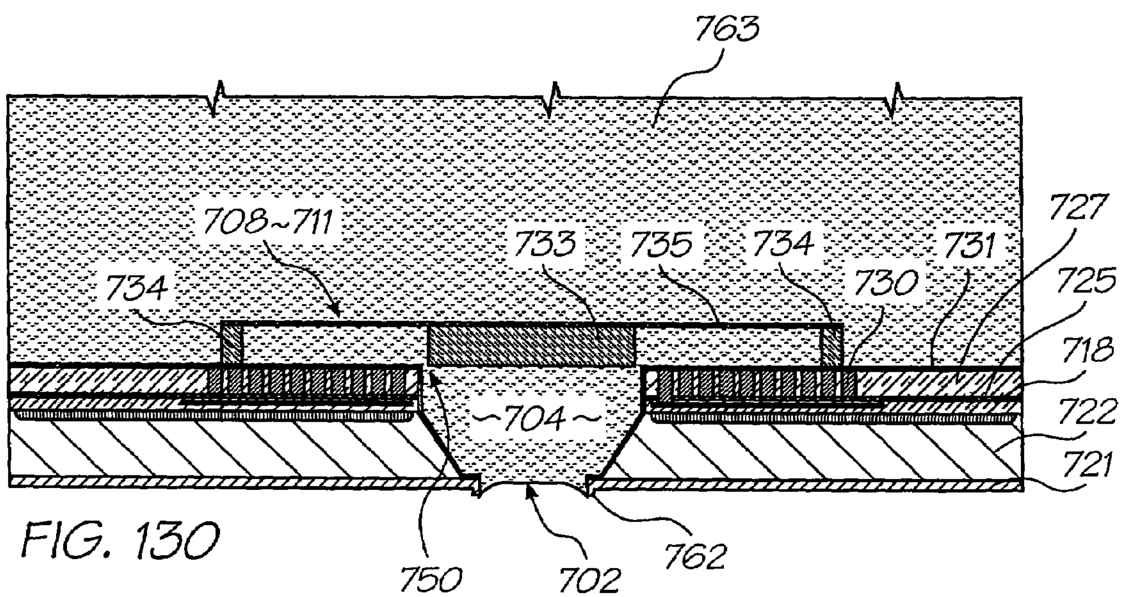

33. Fill the completed print heads with ink 763 and test them. A filled nozzle is shown in FIG. 130.

IJ08

In a preferred embodiment, a shutter is actuated by means of a magnetic coil, the coil being used to move the shutter to thereby cause the shutter to open or close. The shutter is disposed between an ink reservoir having an oscillating ink pressure and a nozzle chamber having an ink ejection port defined therein for the ejection of ink. When the shutter is open, ink is allowed to flow from the ink reservoir through to the nozzle chamber and thereby cause an ejection of ink from the ink ejection port. When the shutter is closed, the nozzle chamber remains in a stable state such that no ink is ejected from the chamber.

Figure 131:
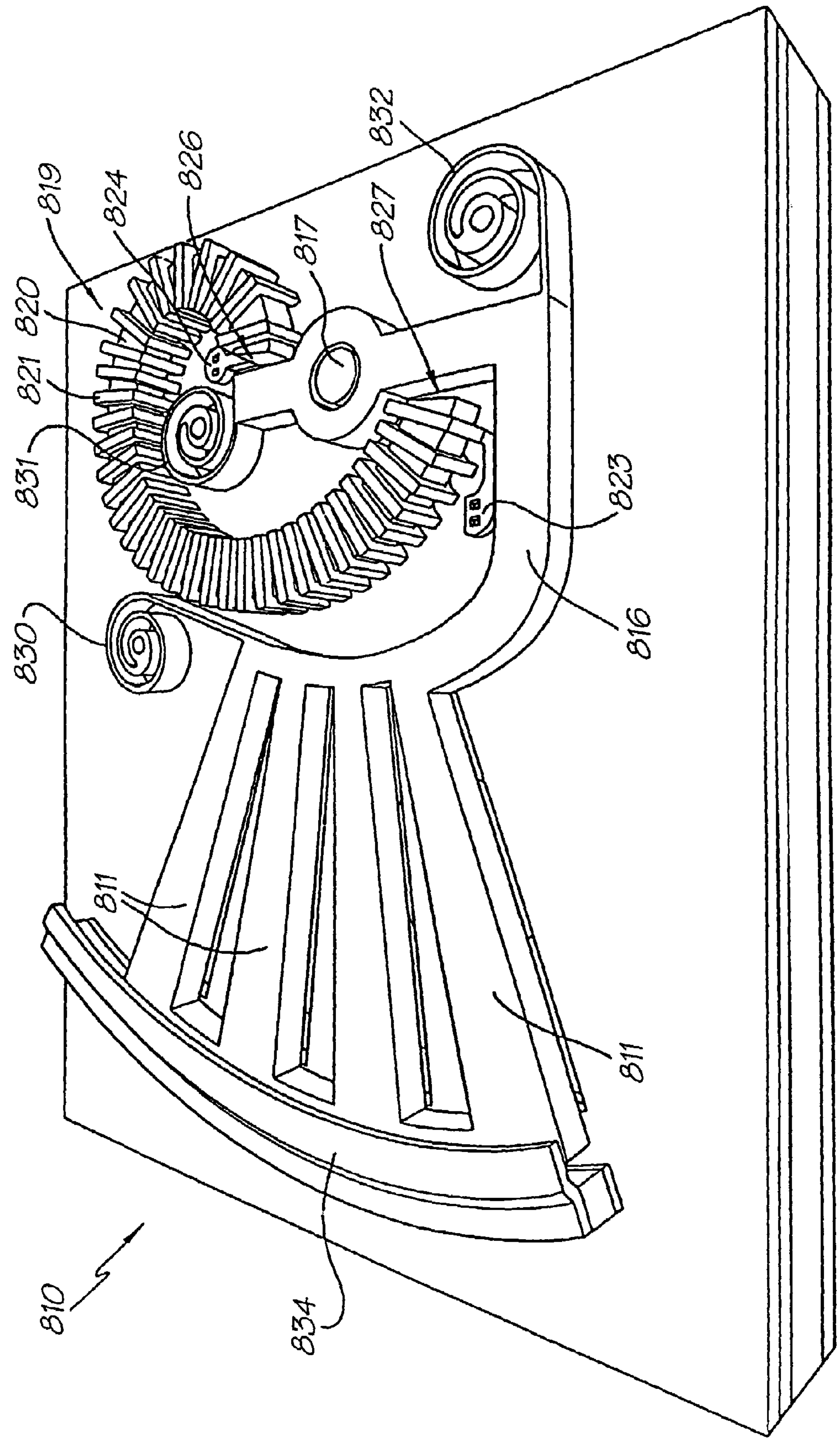
FIG. 131 is a perspective view of a single ink jet nozzle constructed in accordance with a preferred embodiment, with the shutter means in its closed position.
Figure 132:
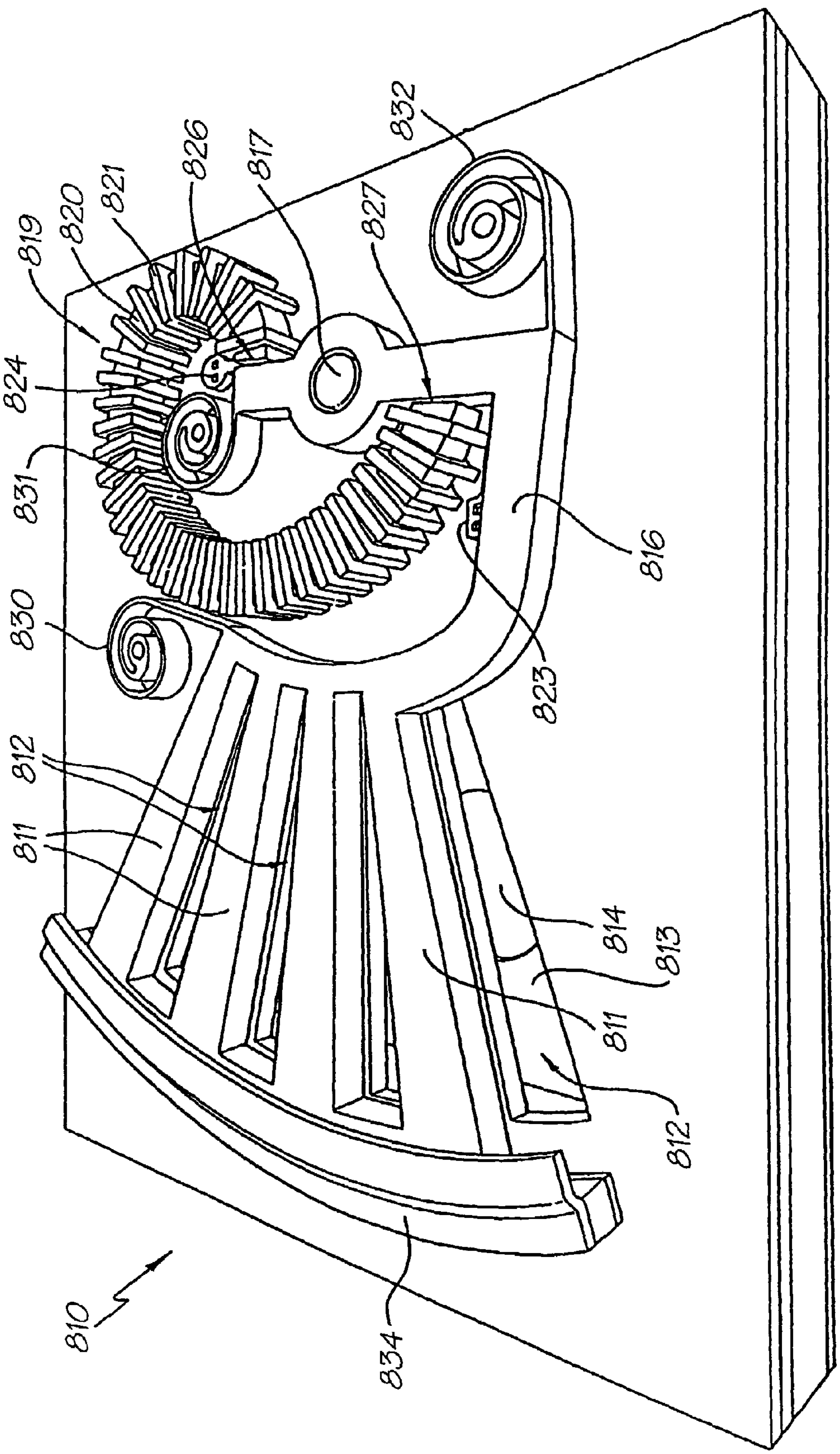
FIG. 132 is a perspective view of a single ink jet nozzle constructed in accordance with a preferred embodiment, with the shutter means in its open position.

Turning now to FIG. 131, there is illustrated a single ink jet nozzle arrangement 810 in a closed position. The arrangement 810 includes a series of shutters 811 which are located above corresponding apertures to a nozzle chamber. In FIG. 132, the ink jet nozzle 810 is illustrated in an open position which also illustrates the apertures 812 providing a fluid interconnection to a nozzle chamber 813 and an ink ejection port 814. The shutters e.g. 811 as shown in FIGS. 131 and 132 are interconnected and further connected to an arm 816 which is pivotally mounted about a pivot point 817 about which the shutters e.g. 811 rotate. The shutter 811 and arm 816 are constructed from nickel iron (NiFe) so as to be magnetically attracted to an electromagnetic device 819. The electromagnetic device 819 comprises a NiFe core 820 around which is constructed a copper coil 821. The copper coil 821 is connected to a lower drive layer via vias 823, 824. The coil 819 is activated by sending a current through the coil 821 which results in its magnification and corresponding attraction in the areas 826, 827. The high levels of attraction are due to its close proximity to the ends of the electromagnet 819. This results in a general rotation of the surfaces 826, 827 around the pivot point 817 which in turn results in a corresponding rotation of the shutter 811 from a closed to an open position.

A number of coiled springs 830-832 are also provided. The coiled springs store energy as a consequence of the rotation of the shutter 811. Hence, upon deactivation of the electromagnet 819 the coil springs 830-832 act to return the shutter 811 to its closed position. As mentioned previously, the opening and closing of the shutter 811 allows for the flow of ink to the ink nozzle chamber for a subsequent ejection. The coil 819 is activated rotating the arm 816 bringing the surfaces 826, 827 into close contact with the electromagnet 819. The surfaces 826, 827 are kept in contact with the electromagnet 819 by means of utilisation of a keeper current which, due the close proximity between the surfaces 826, 827 is substantially less than that required to initially move the arm 816.

The shutter 811 is maintained in the plane by means of a guide 834 which overlaps slightly with an end portion of the shutter 811.

Figure 133:
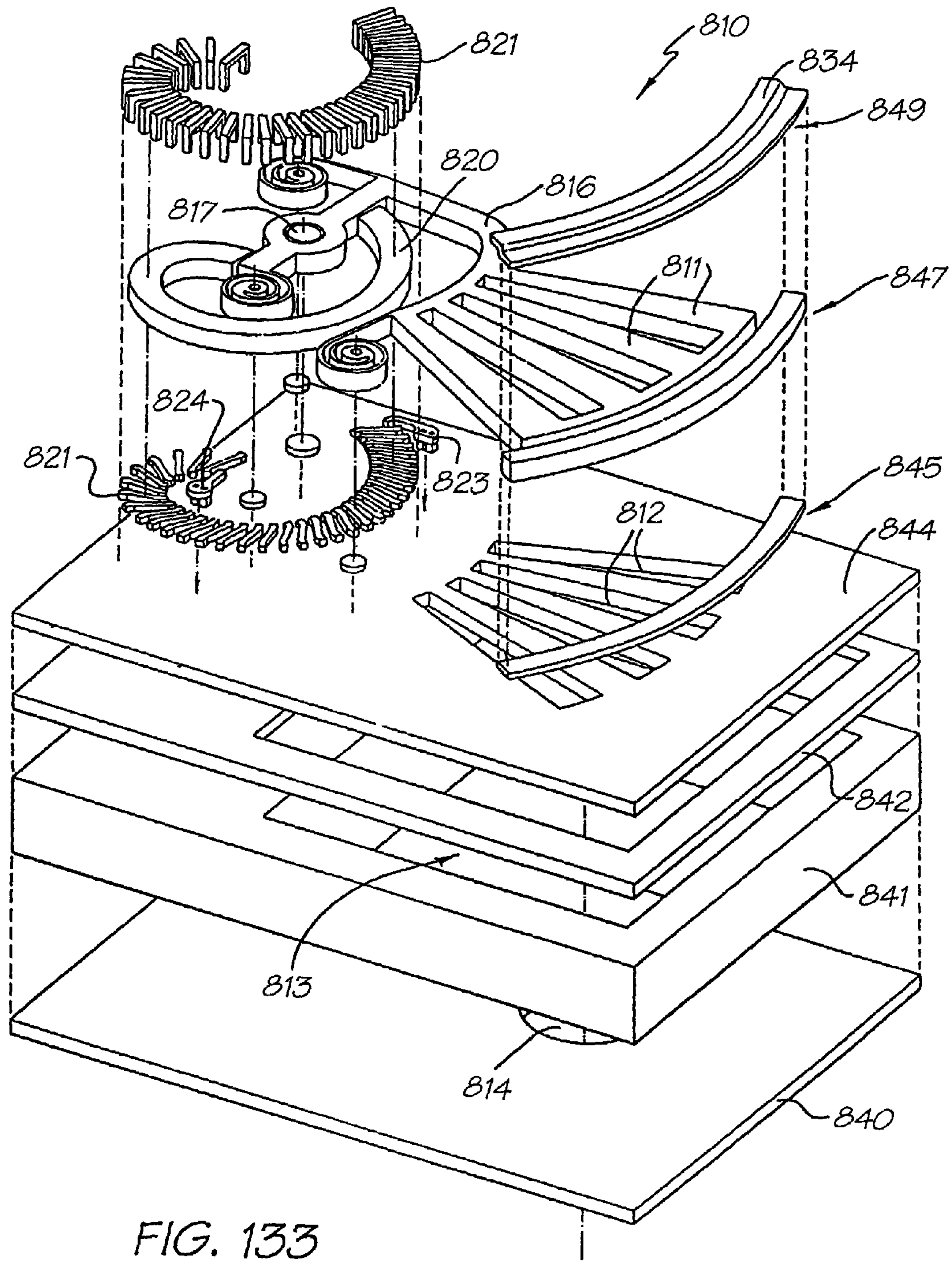
FIG. 133 is an exploded perspective view illustrating the construction of a single ink jet nozzle in accordance with a preferred embodiment.

Turning now to FIG. 133, there is illustrated an exploded perspective of one form of construction of a nozzle arrangement 810 in accordance with a preferred embodiment. The bottom level consists of a boron doped silicon layer 840 which can be formed from constructing a buried epitaxial layer within a selected wafer and then back etching using the boron doped layer as an etch stop. Subsequently, there is provided a silicon layer 841 which includes a crystallographically etched pit forming the nozzle chamber 813. On top of the silicon layer 841 there is constructed a 2 micron silicon dioxide layer 842 which includes the nozzle chamber pit opening whose side walls are passivated by a subsequent nitride layer. On top of the silicon dioxide layer 842 is constructed a nitride layer 844 which provides passivation of the lower silicon dioxide layer and also provides a base on which to construct the electromagnetic portions and the shutter. The nitride layer 844 and lower silicon dioxide layer having suitable vias for the interconnection to the ends of the electromagnetic circuit for the purposes of supplying power on demand to the electromagnetic circuit.

Next, a copper layer 845 is provided. The copper layer providing a base wiring layer for the electromagnetic array in addition to a lower portion of the pivot 817 and a lower portion of the copper layer being used to form a part of the construction of the guide 834.

Next, a NiFe layer 847 is provided which is used for the formation of the internal portions 820 of the electromagnet, in addition to the pivot, aperture arm and shutter 811 in addition to a portion of the guide 834, in addition to the various spiral springs. On top of the NiFe layer 847 is provided a copper layer 849 for providing the top and side windings of the coil 821 in addition to providing the formation of the top portion of guide 834. Each of the layers 845, 847 can be conductively insulated from its surroundings where required through the use of a nitride passivation layer (not shown). Further, a top passivation layer can be provided to cover the various top layers which will be exposed to the ink within the ink reservoir and nozzle chamber. The various levels 845, 849 can be formed through the use of supporting sacrificial structures which are subsequently sacrificially etched away to leave the operable device.

One form of detailed manufacturing process which can be used to fabricate monolithic ink jet printheads operating in accordance with the principles taught by the present embodiment can proceed using the following steps:

1. Using a double sided polished wafer 850 deposit 3 microns of epitaxial silicon heavily doped with boron 840.

2. Deposit 10 microns of epitaxial silicon 841, either p-type or n-type, depending upon the CMOS process used.

Figure 134:
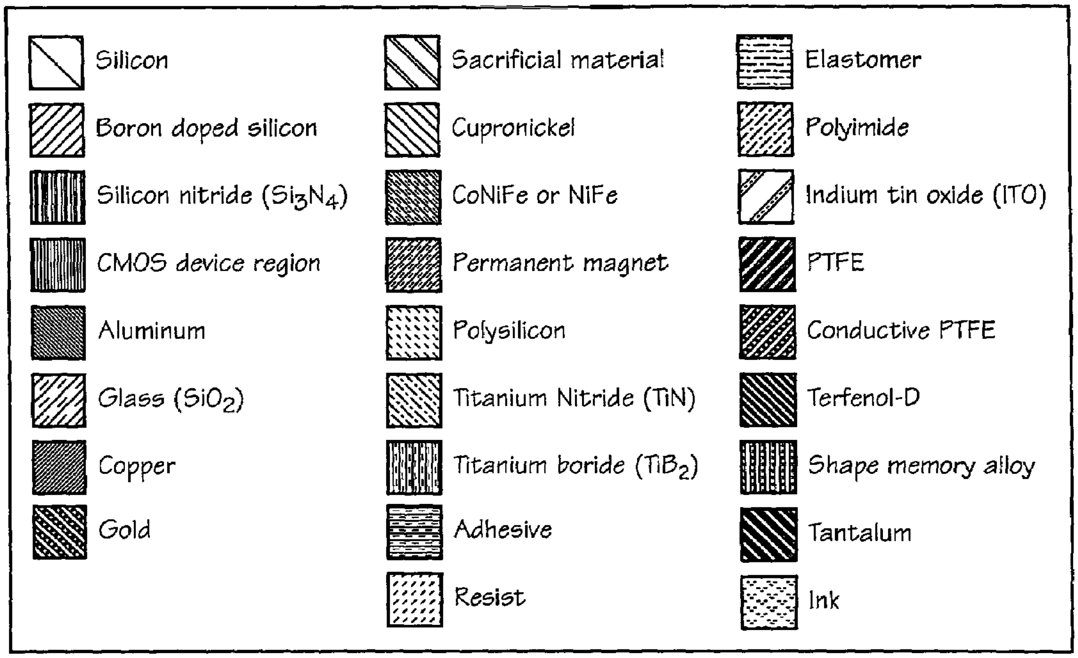
FIG. 134 provides a legend of the materials indicated in FIGS. 135 to 156.
Figure 135:
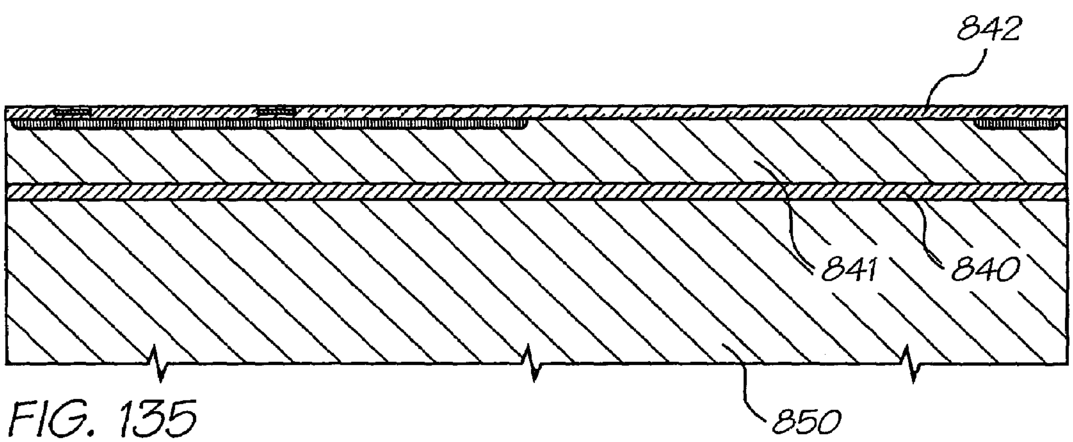
FIG. 135 to FIG. 156 illustrate sectional views of the manufacturing steps in one form of construction of an ink jet printhead nozzle.

3. Complete a 0.5 micron, one poly, 2 metal CMOS process 842. This step is shown in FIG. 135. For clarity, these diagrams may not be to scale, and may not represent a cross section though any single plane of the nozzle. FIG. 134 is a key to representations of various materials in these manufacturing diagrams, and those of other cross referenced ink jet configurations.

Figure 136:
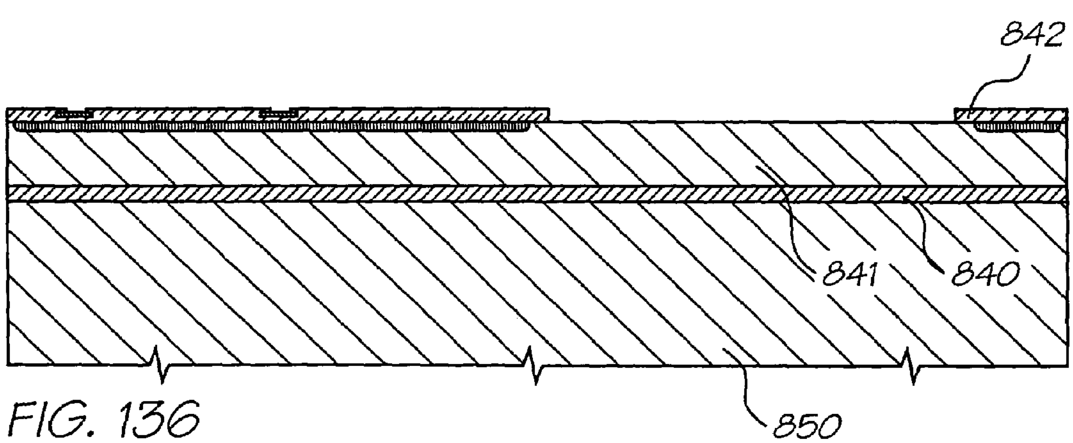

4. Etch the CMOS oxide layers down to silicon or aluminum using Mask 1. This mask defines the nozzle chamber, and the edges of the printheads chips. This step is shown in FIG. 136.

Figure 137:
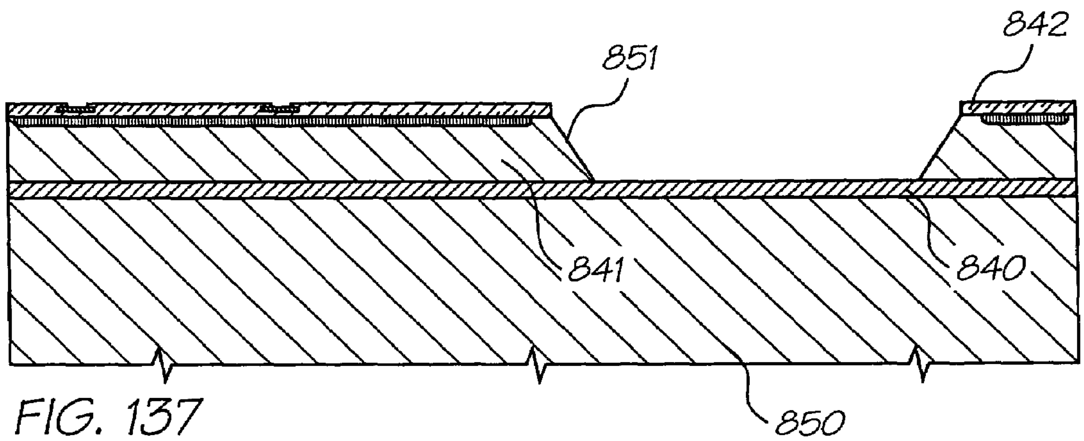

5. Crystallographically etch the exposed silicon using KOH. This etch stops on <111> crystallographic planes 851, and on the boron doped silicon buried layer. This step is shown in FIG. 137.

Figure 138:
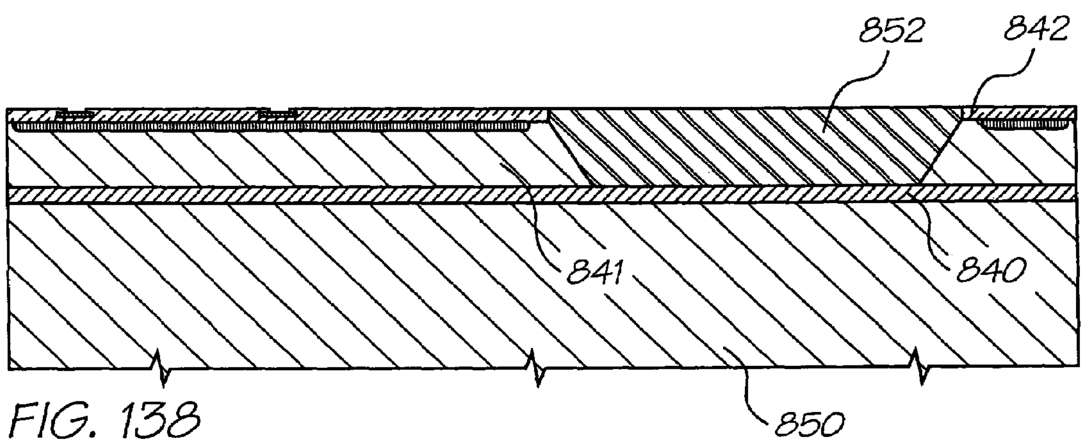

6. Deposit 10 microns of sacrificial material 852. Planarize down to oxide using CMP. The sacrificial material temporarily fills the nozzle cavity. This step is shown in FIG. 138.

7. Deposit 0.5 microns of silicon nitride ($Si_3N_4$) 844.

Figure 139:
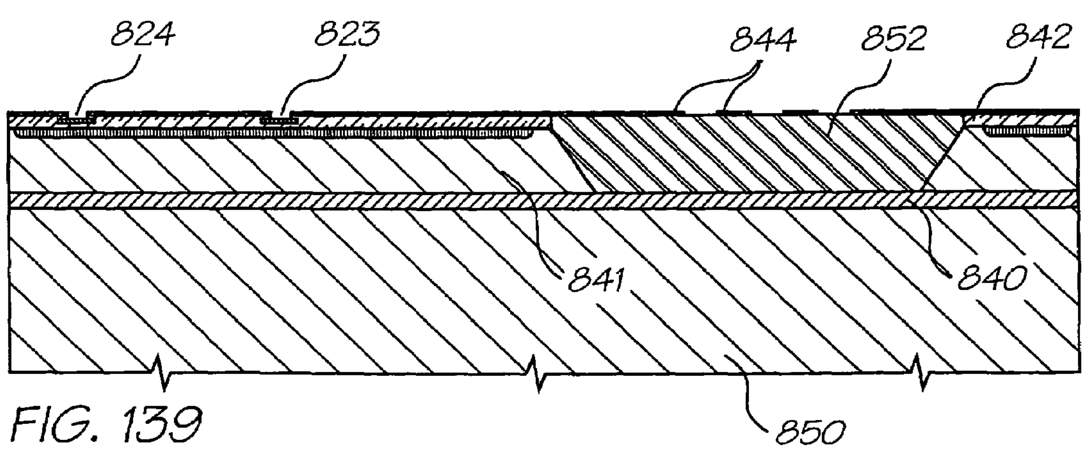

8. Etch nitride 844 and oxide down to aluminum or sacrificial material using Mask 3. This mask defines the contact vias 823, 824 from the aluminum electrodes to the solenoid, as well as the fixed grill over the nozzle cavity. This step is shown in FIG. 139.

9. Deposit a seed layer of copper. Copper is used for its low resistivity (which results in higher efficiency) and its high electromigration resistance, which increases reliability at high current densities.

Figure 140:
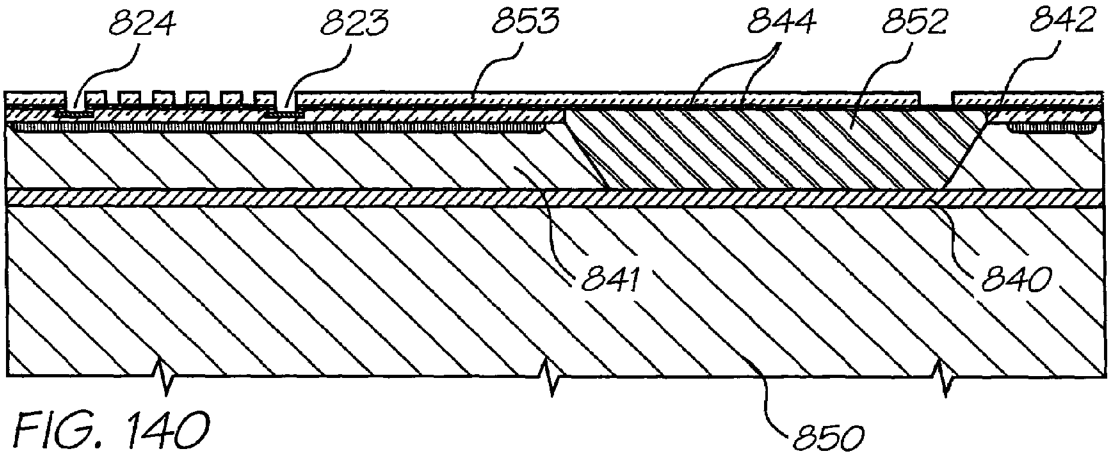

10. Spin on 2 microns of resist 853, expose with Mask 4, and develop. This mask defines the lower side of the solenoid square helix, as well as the lowest layer of the shutter grill vertical stop. The resist acts as an electroplating mold. This step is shown in FIG. 140.

Figure 141:
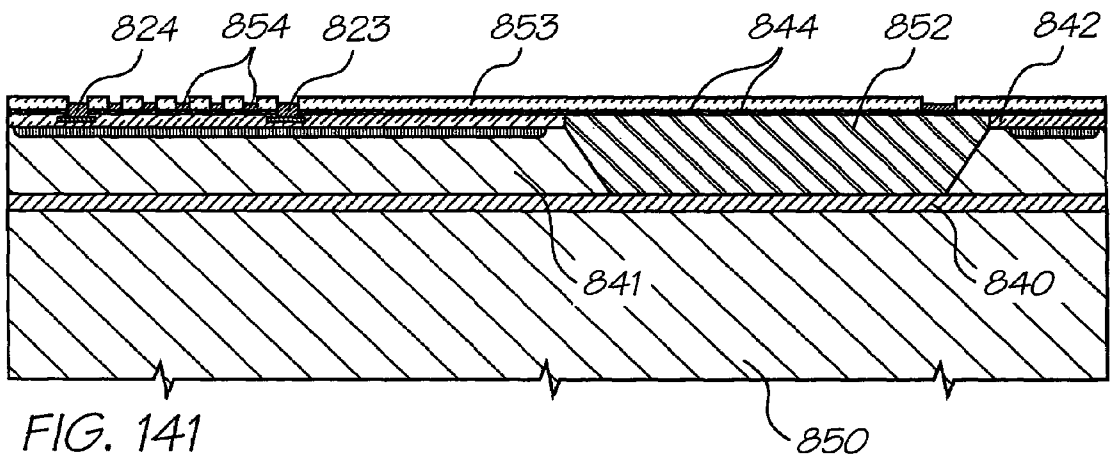

11. Electroplate 1 micron of copper 854. This step is shown in FIG. 141.

Figure 142:
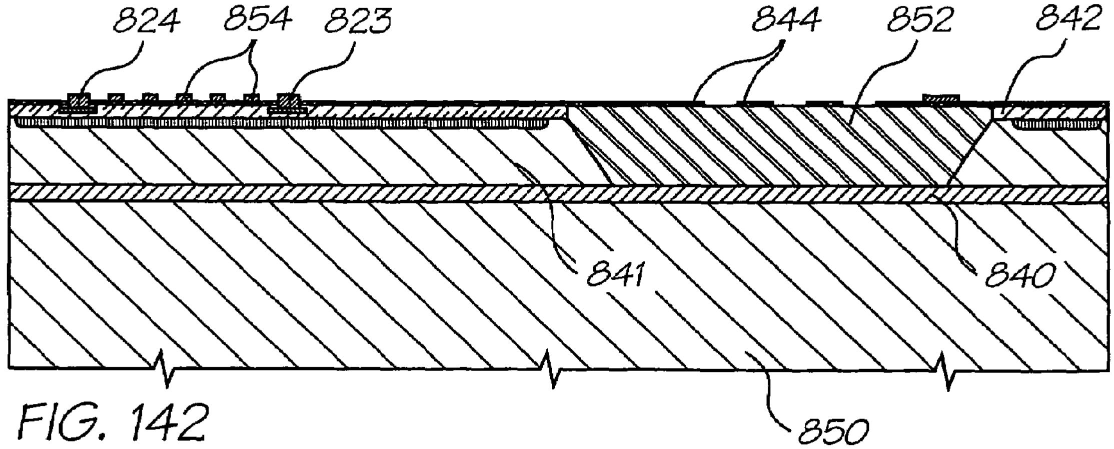

12. Strip the resist and etch the exposed copper seed layer. This step is shown in FIG. 142.

13. Deposit 0.1 microns of silicon nitride.

14. Deposit 0.5 microns of sacrificial material 855.

Figure 143:
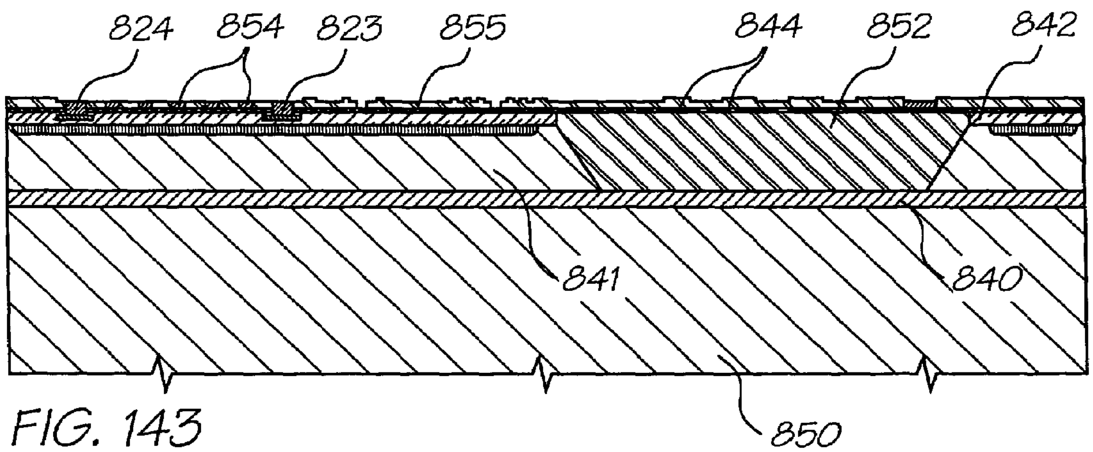

15. Etch the sacrificial material down to nitride using Mask 5. This mask defines the solenoid, the fixed magnetic pole, the pivot 817 (FIG. 131), the spring posts, and the middle layer of the shutter grill vertical stop. This step is shown in FIG. 143.

16. Deposit a seed layer of cobalt nickel iron alloy. CoNiFe is chosen due to a high saturation flux density of 2 Tesla, and a low coercivity. [Osaka, Tetsuya et al, A soft magnetic CoNiFe film with high saturation magnetic flux density, Nature 392, 796-798 (1998)].

Figure 144:
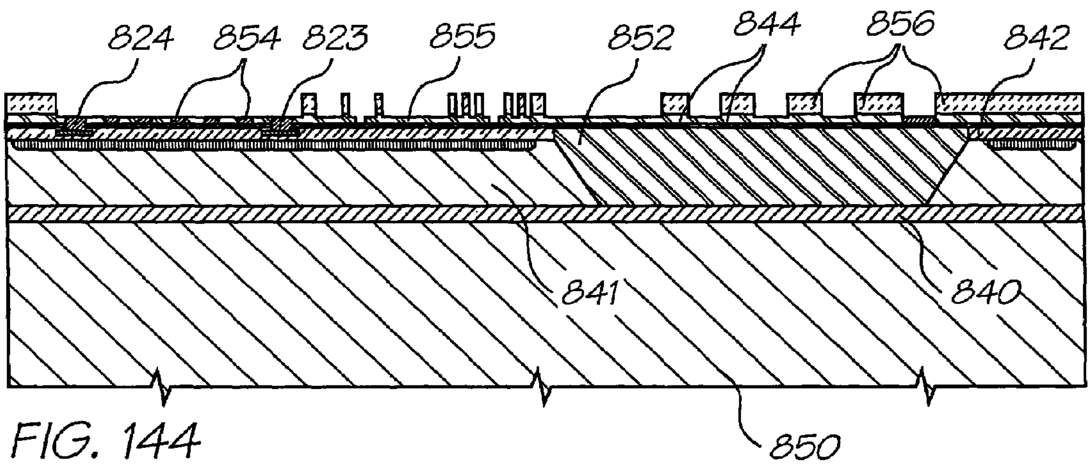

17. Spin on 3 microns of resist 856, expose with Mask 6, and develop. This mask defines all of the soft magnetic parts, being the fixed magnetic pole, the pivot 817, the shutter grill, the lever arm 816, the spring posts, and the middle layer of the shutter grill vertical stop. The resist acts as an electroplating mold. This step is shown in FIG. 144.

Figure 145:
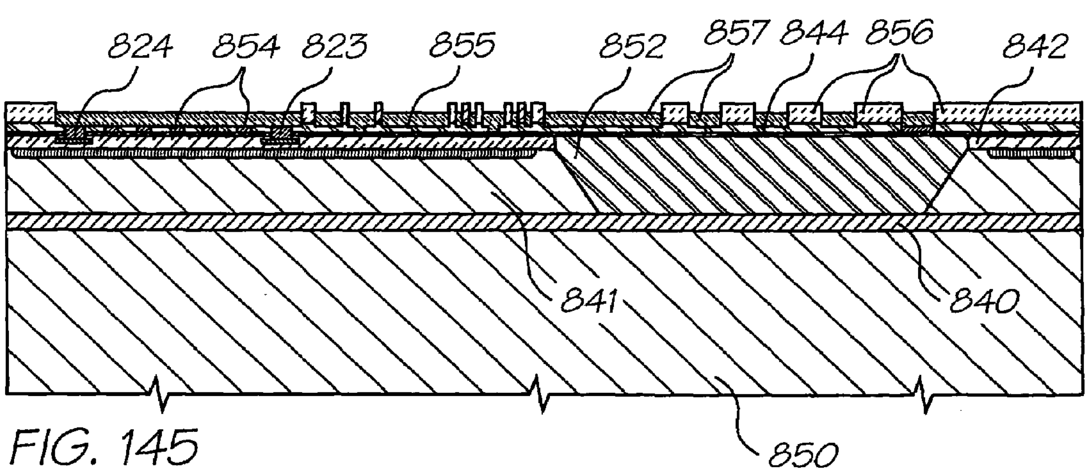

18. Electroplate 2 microns of CoNiFe 857. This step is shown in FIG. 145.

Figure 146:
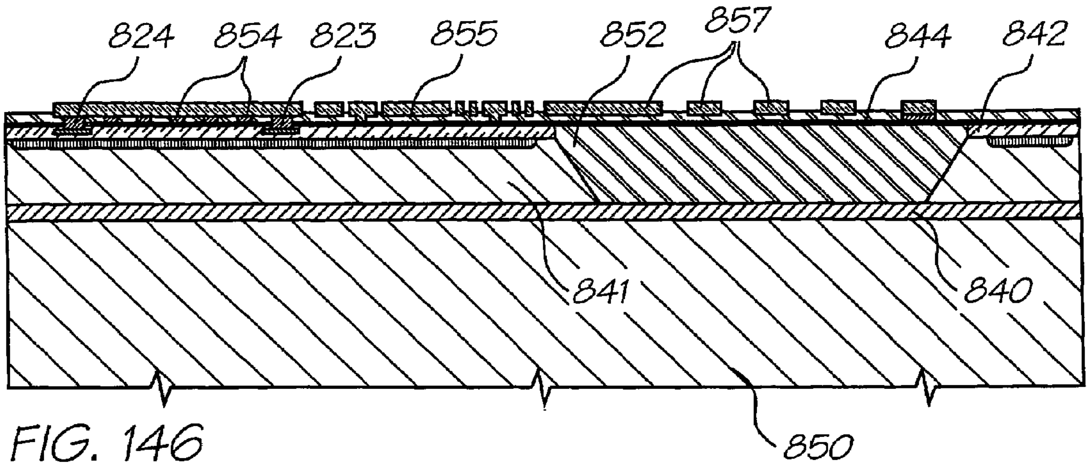

19. Strip the resist and etch the exposed seed layer. This step is shown in FIG. 146.

20. Deposit 0.1 microns of silicon nitride ($Si_3N_4$).

Figure 147:
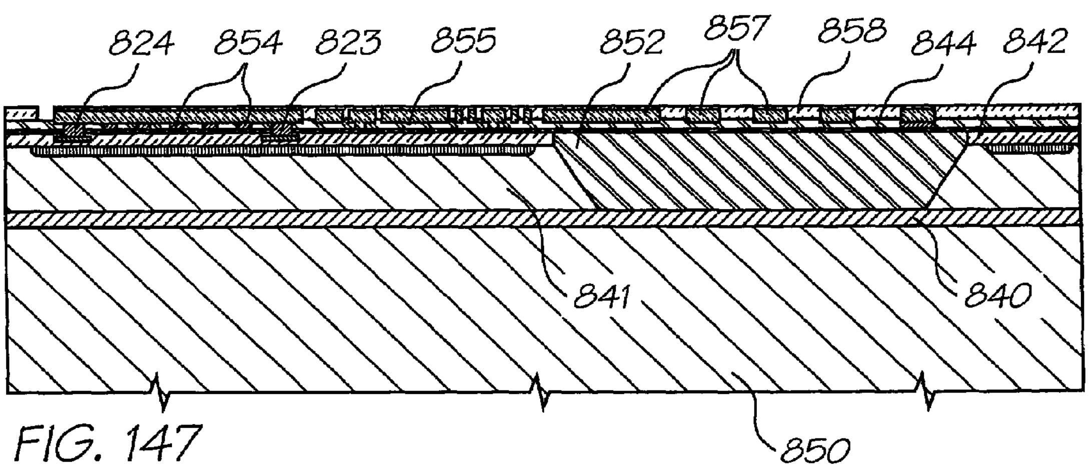

21. Spin on 2 microns of resist 858, expose with Mask 7, and develop. This mask defines the solenoid vertical wire segments, for which the resist acts as an electroplating mold. This step is shown in FIG. 147.

22. Etch the nitride down to copper using the Mask 7 resist.

Figure 148:
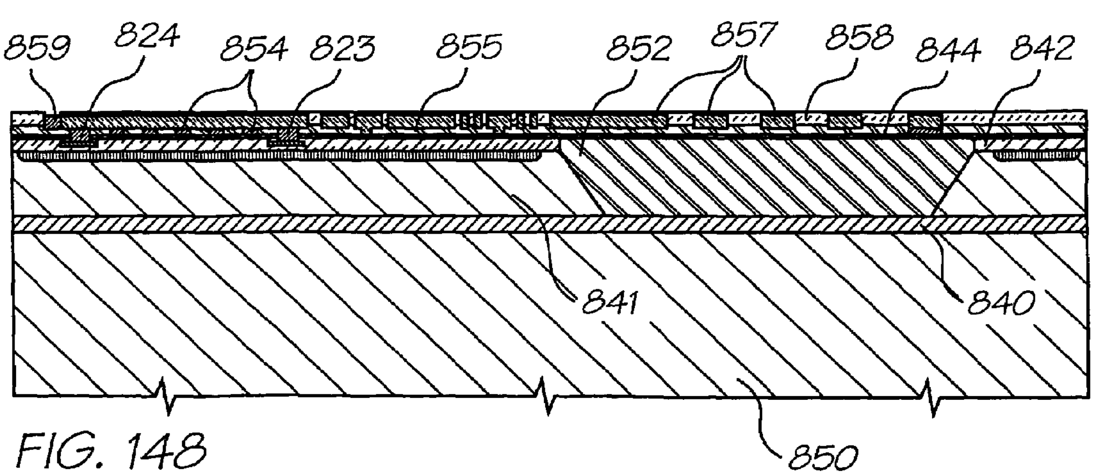

23. Electroplate 2 microns of copper 859. This step is shown in FIG. 148.

24. Deposit a seed layer of copper.

Figure 149:
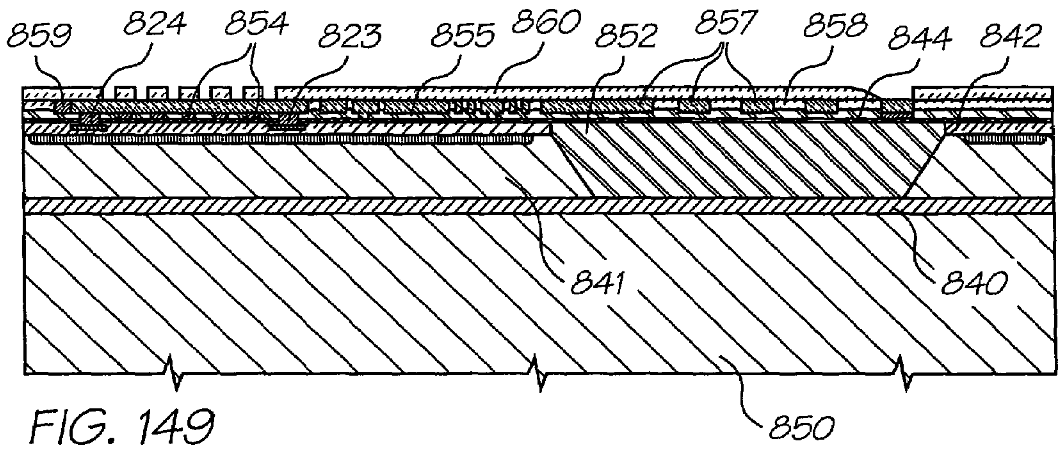

25. Spin on 2 microns of resist 860, expose with Mask 8, and develop. This mask defines the upper side of the solenoid square helix, as well as the upper layer of the shutter grill vertical stop. The resist acts as an electroplating mold. This step is shown in FIG. 149.

Figure 150:
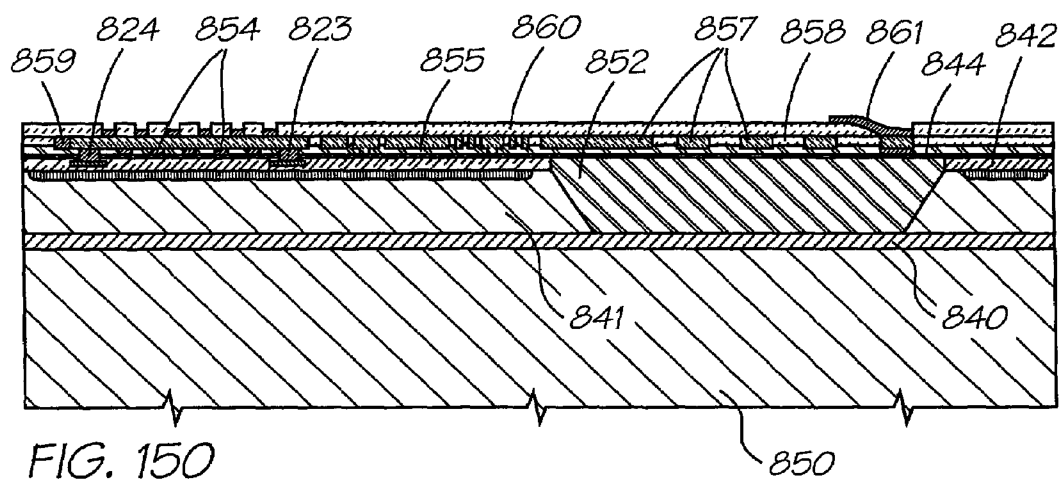

26. Electroplate 1 micron of copper 861. This step is shown in FIG. 150.

Figure 151:
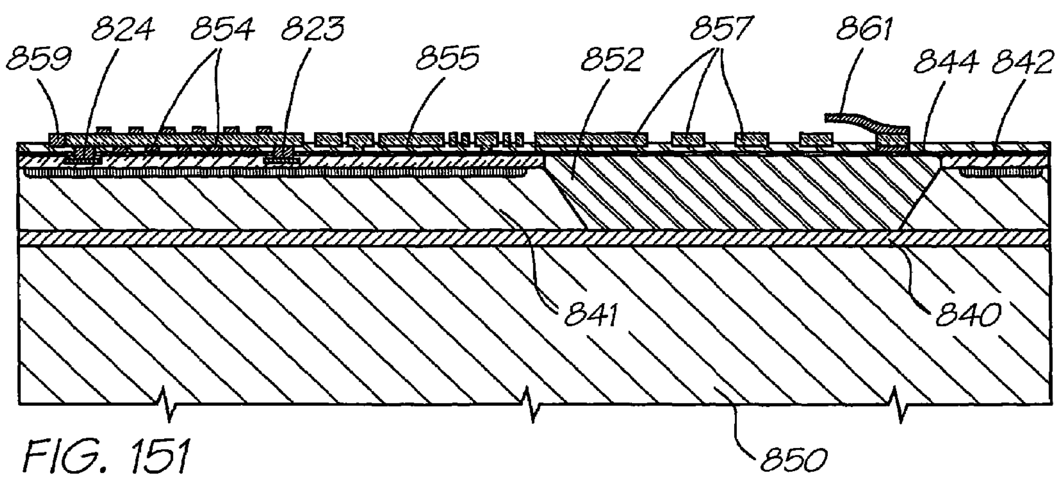

27. Strip the resist and etch the exposed copper seed layer, and strip the newly exposed resist. This step is shown in FIG. 151.

28. Deposit 0.1 microns of conformal silicon nitride as a corrosion barrier.

29. Open the bond pads using Mask 9.

30. Wafer probe. All electrical connections are complete at this point, bond pads are accessible, and the chips are not yet separated.

Figure 152:
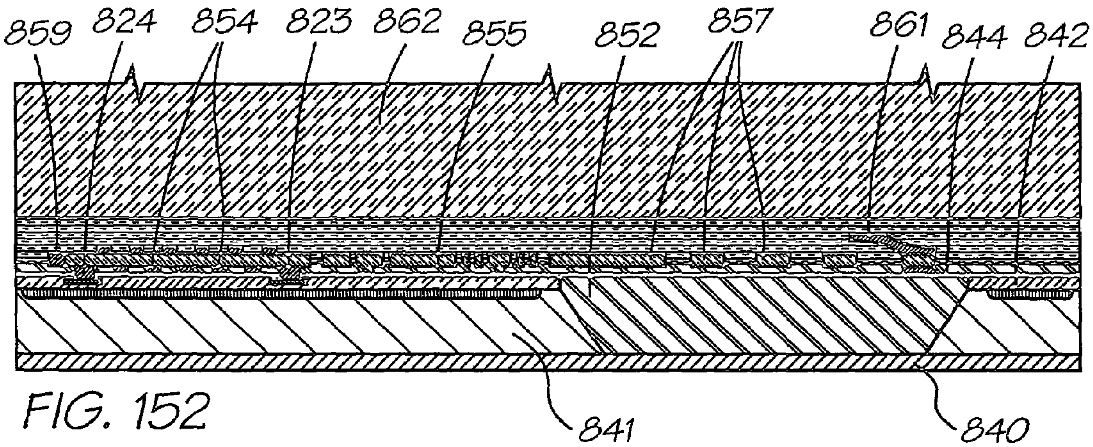

31. Mount the wafer on a glass blank 862 and back-etch the wafer using KOH, with no mask. This etch thins the wafer and stops at the buried boron doped silicon layer 840. This step is shown in FIG. 152.

Figure 153:
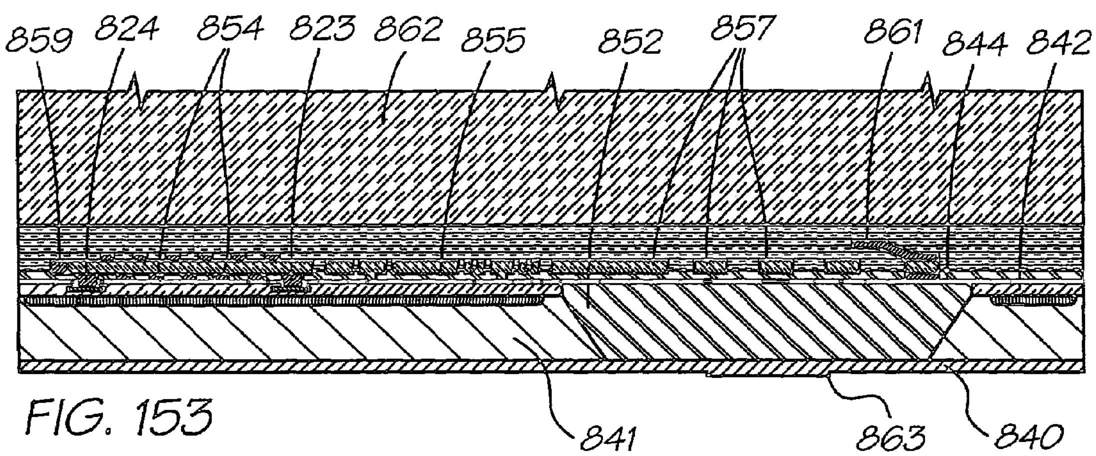

32. Plasma back-etch the boron doped silicon layer 840 to a depth of 1 micron using Mask 9. This mask defines the nozzle rim 863. This step is shown in FIG. 153.

Figure 154:
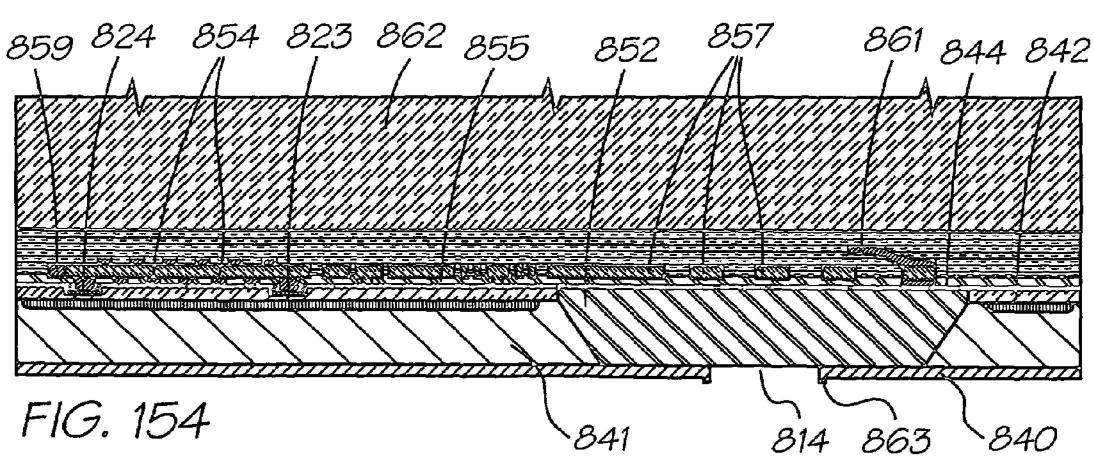

33. Plasma back-etch through the boron doped layer 840 using Mask 10. This mask defines the nozzle 814, and the edge of the chips. At this stage, the chips are separate, but are still mounted on the glass blank. This step is shown in FIG. 154.

Figure 155:
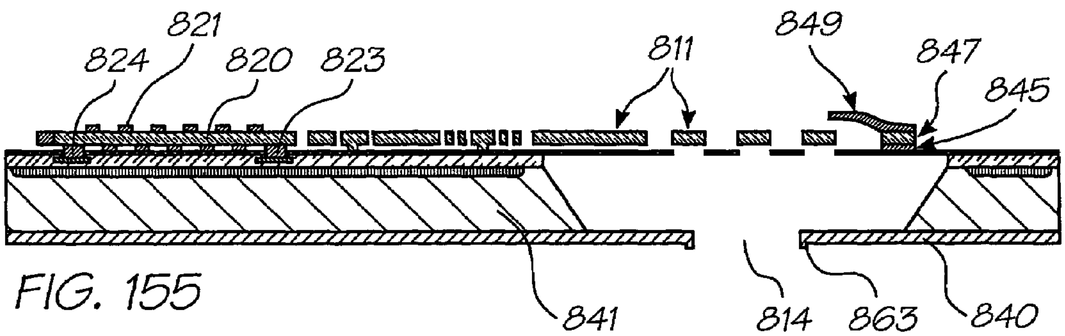

34. Detach the chips from the glass blank 862. Strip all adhesive, resist, sacrificial, and exposed seed layers. This step is shown in FIG. 155.

35. Mount the printheads in their packaging, which may be a molded plastic former incorporating ink channels which supply different colors of ink to the appropriate regions of the front surface of the wafer. The package also includes a piezoelectric actuator attached to the rear of the ink channels. The piezoelectric actuator provides the oscillating ink pressure required for the ink jet operation.

36. Connect the printheads to their interconnect systems.

37. Hydrophobize the front surface of the printheads.

Figure 156:
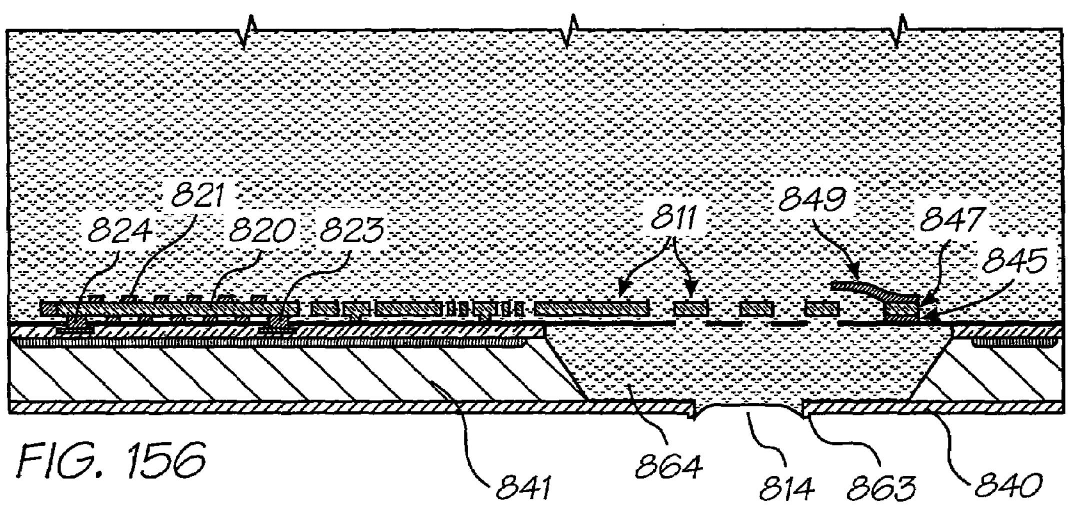

38. Fill the completed printheads with ink 864 and test them. A filled nozzle is shown in FIG. 156.

IJ09

In a preferred embodiment, each nozzle chamber having a nozzle ejection portal further includes two thermal actuators. The first thermal actuator is utilized for the ejection of ink from the nozzle chamber while a second thermal actuator is utilized for pumping ink into the nozzle chamber for rapid ejection of subsequent drops.

Normally, ink chamber refill is a result of surface tension effects of drawing ink into a nozzle chamber. In a preferred embodiment, the nozzle chamber refill is assisted by an actuator which pumps ink into the nozzle chamber so as to allow for a rapid refill of the chamber and therefore a more rapid operation of the nozzle chamber in ejecting ink drops.

Figure 157:
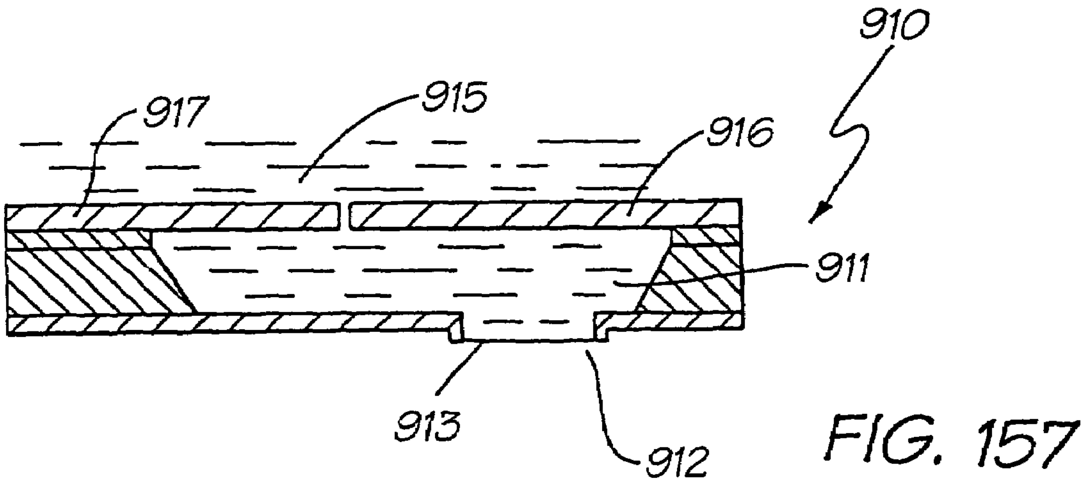
FIG. 157 is a cross-sectional schematic diagram of the inkjet nozzle chamber in its quiescent state.

Turning to FIGS. 157-162 which represent various schematic cross sectional views of the operation of a single nozzle chamber, the operation of a preferred embodiment will now be discussed. In FIG. 157, a single nozzle chamber is schematically illustrated in section. The nozzle arrangement 910 includes a nozzle chamber 911 filled with ink and a nozzle ink ejection port 912 having an ink meniscus 913 in a quiescent position. The nozzle chamber 911 is interconnected to an ink reservoir 915 for the supply of ink to the nozzle chamber. Two paddle-type thermal actuators 916, 917 are provided for the control of the ejection of ink from nozzle port 912 and the refilling of chamber 911. Both of the thermal actuators 916, 917 are controlled by means of passing an electrical current through a resistor so as to actuate the actuator. The structure of the thermal actuators 916, 917 will be discussed further herein after. The arrangement of FIG. 157 illustrates the nozzle arrangement when it is in its quiescent or idle position.

Figure 158:
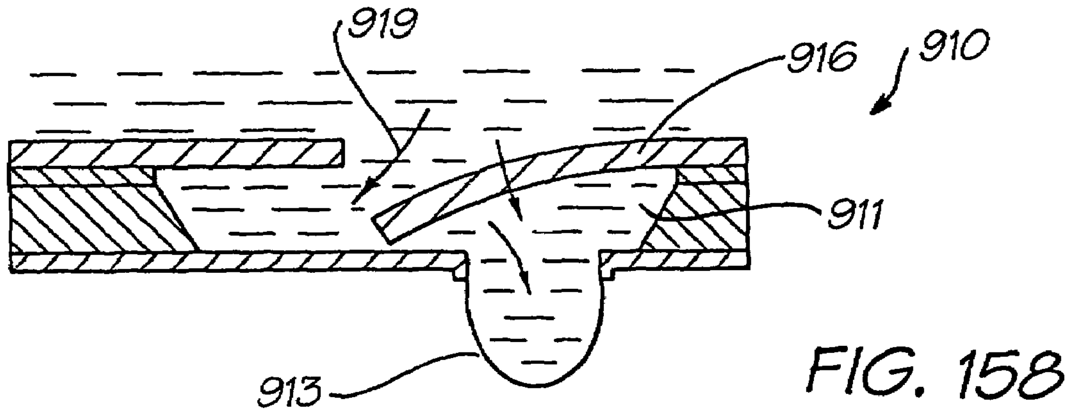
FIG. 158 is a cross-sectional schematic diagram of the inkjet nozzle chamber during activation of the first actuator to eject ink.

When it is desired to eject a drop of ink via the port 912, the actuator 916 is activated, as shown in FIG. 158. The activation of activator 916 results in it bending downwards forcing the ink within the nozzle chamber out of the port 912, thereby resulting in a rapid growth of the ink meniscus 913. Further, ink flows into the nozzle chamber 911 as indicated by arrow 919.

Figure 159:
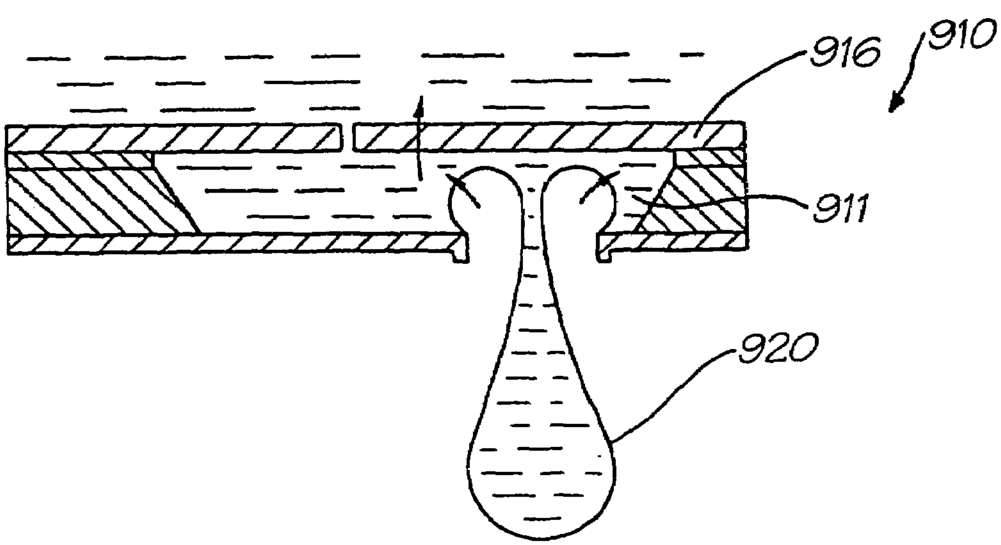
FIG. 159 is a cross-sectional schematic diagram of the inkjet nozzle chamber after deactivation of the first actuator.

The main actuator 916 is then retracted as illustrated in FIG. 159, which results in a collapse of the ink meniscus so as to form ink drop 920. The ink drop 920 eventually breaks off from the main body of ink within the nozzle chamber 911.

Figure 160:
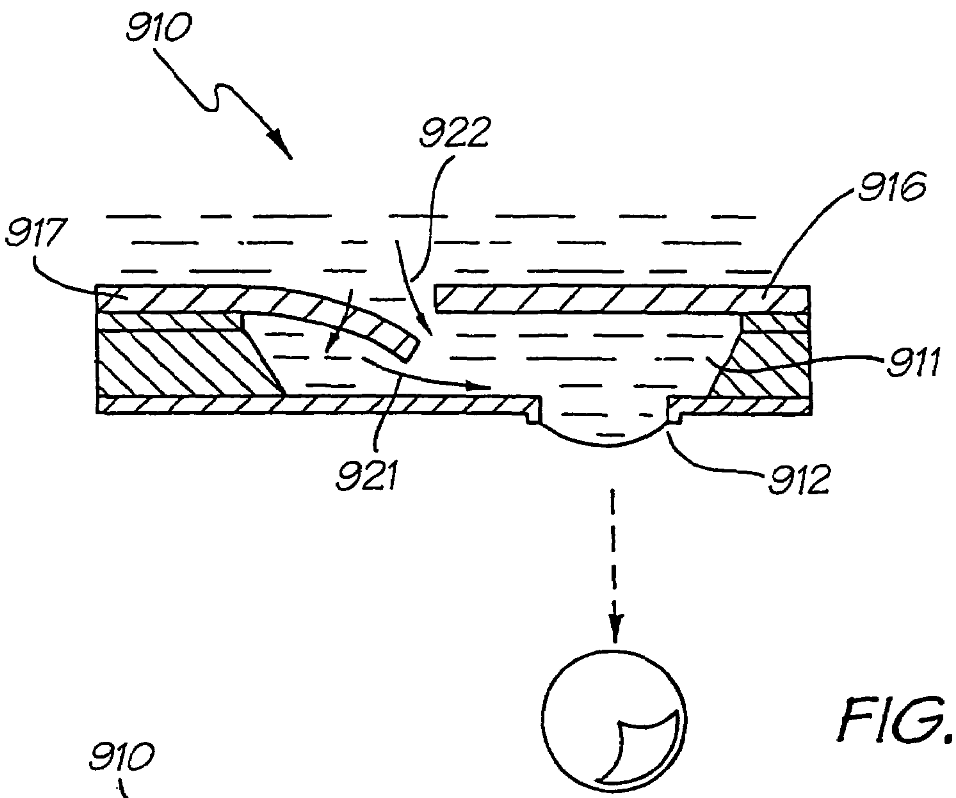
FIG. 160 is a cross-sectional schematic diagram of the inkjet nozzle chamber during activation of the second actuator to refill the chamber.

Next, as illustrated in FIG. 160, the actuator 917 is activated so as to cause rapid refill in the area around the nozzle portal 912. The refill comes generally from ink flows 921, 922.

Figure 161:
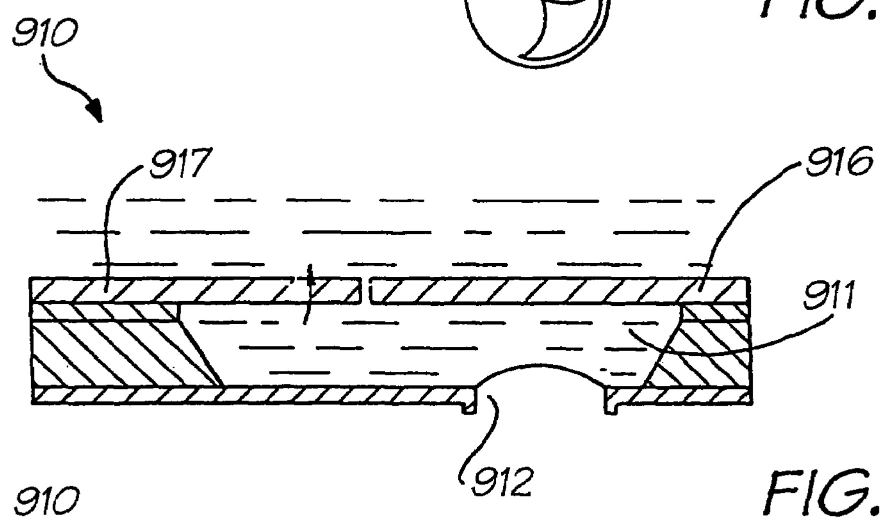
FIG. 161 is a cross-sectional schematic diagram of the inkjet nozzle chamber after deactivation of the actuator to refill the chamber.
Figure 162:
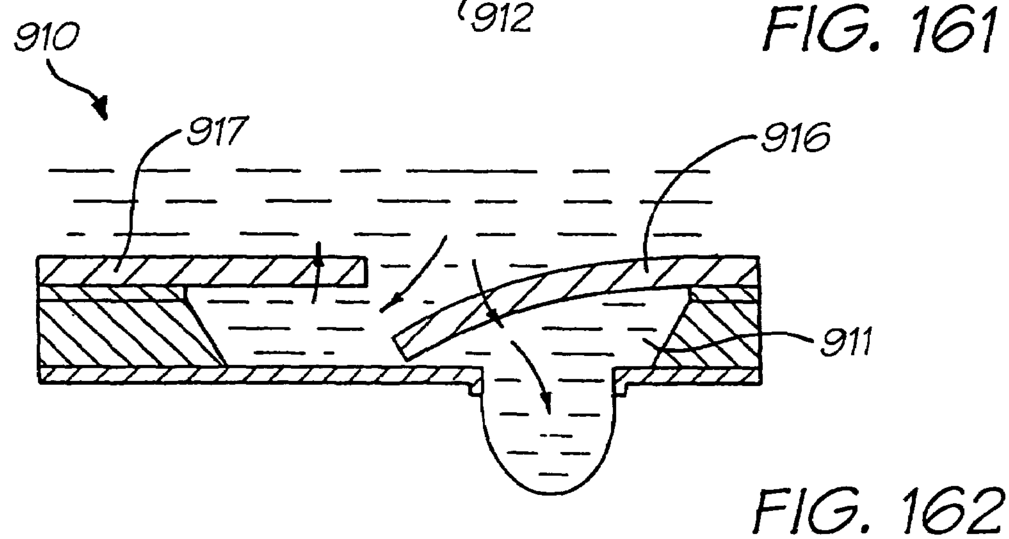
FIG. 162 is a cross-sectional schematic diagram of the inkjet nozzle chamber during simultaneous activation of the ejection actuator whilst deactivation of the pump actuator.

Next, two alternative procedures are utilized depending on whether the nozzle chamber is to be fired in a next ink ejection cycle or whether no drop is to be fired. The case where no drop is to be fired is illustrated in FIG. 161 and basically comprises the return of actuator 917 to its quiescent position with the nozzle port area refilling by means of surface tension effects drawing ink into the nozzle chamber 911.

Where it is desired to fire another drop in the next ink drop ejection cycle, the actuator 916 is activated simultaneously which is illustrated in FIG. 162 with the return of the actuator 917 to its quiescent position. This results in more rapid refilling of the nozzle chamber 911 in addition to simultaneous drop ejection from the ejection nozzle 912.

Hence, it can be seen that the arrangement as illustrated in FIGS. 157 to 162 results in a rapid refilling of the nozzle chamber 911 and therefore the more rapid cycling of ejecting drops from the nozzle chamber 911. This leads to higher speed and improved operation of a preferred embodiment.

Figure 163:
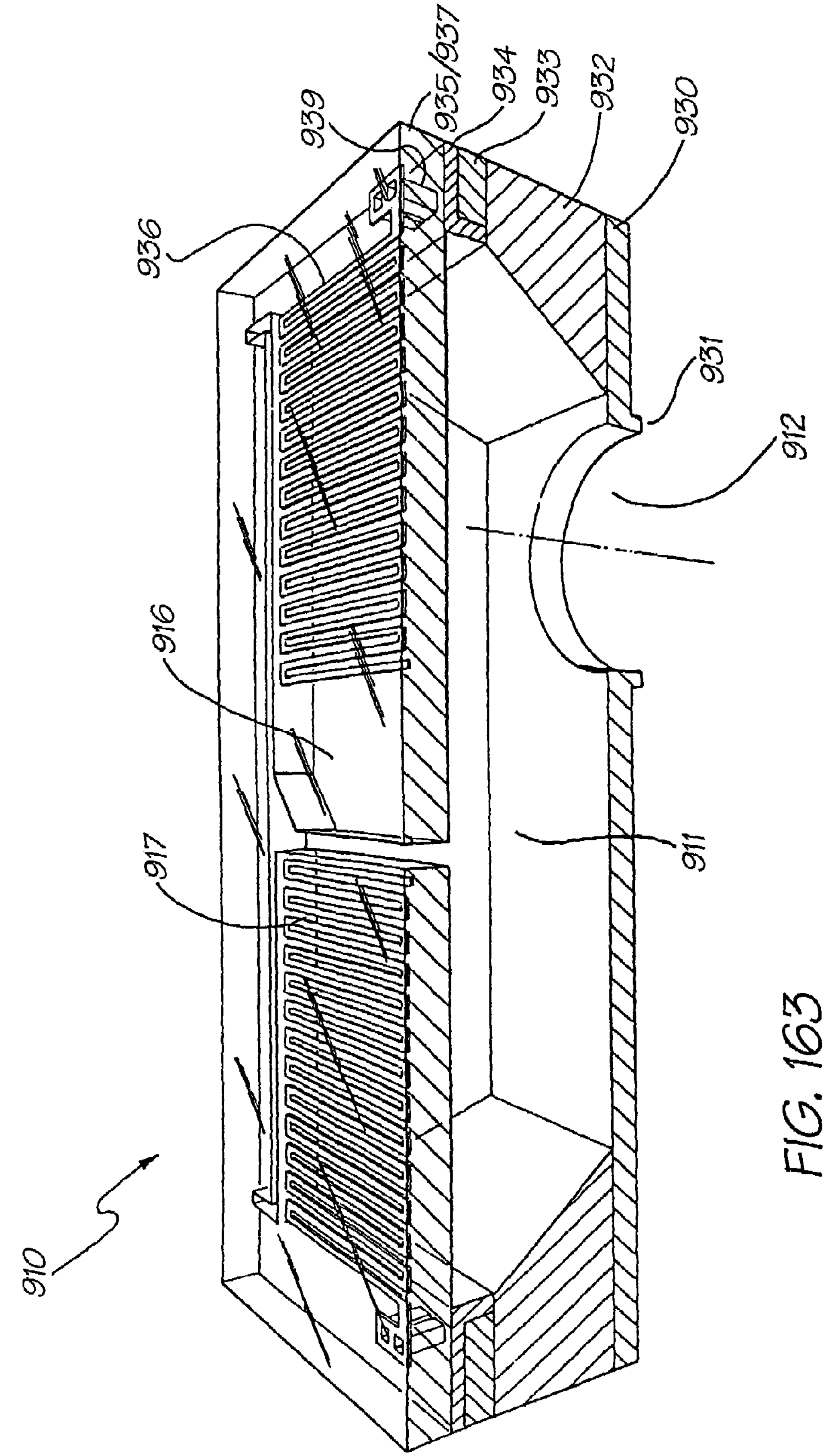
FIG. 163 is a top view cross-sectional diagram of the inkjet nozzle chamber.

Turning now to FIG. 163, there is a illustrated a sectional perspective view of a single nozzle arrangement 910 of a preferred embodiment. A preferred embodiment can be constructed on a silicon wafer with a large number of nozzles 910 being constructed at any one time. The nozzle chambers can be constructed through back etching a silicon wafer to a boron doped epitaxial layer 930 using the boron doping as an etchant stop. The boron doped layer is then further etched utilizing the relevant masks to form the nozzle port 912 and nozzle rim 931. The nozzle chamber proper is formed from a crystallographic etch of the portion of the silicon wafer 932. The silicon wafer can include a two level metal standard CMOS layer 933 which includes the interconnect and drive circuitry for the actuator devices. The CMOS layer 933 is interconnected to the actuators via appropriate vias. On top of the CMOS layer 933 is placed a nitride layer 934. The nitride layer is provided to passivate the lower CMOS layer 933 from any sacrificial etchant which is utilized to etch sacrificial material in construction of the actuators 916, 917. The actuators 916, 917 can be constructed by filling the nozzle chamber 911 with a sacrificial material, such as sacrificial glass and depositing the actuator layers utilizing standard micro-electro-mechanical systems (MEMS) processing techniques.

On top of the nitride layer 934 is deposited a first PTFE layer 935 followed by a copper layer 936 and a second PTFE layer 937. These layers are utilized with appropriate masks so as to form the actuators 916, 917. The copper layer 936 is formed near the top surface of the corresponding actuators and is in a serpentine shape. Upon passing a current through the copper layer 936, the copper layer is heated. The copper layer 936 is encased in the PTFE layers 935, 937. PTFE has a much greater coefficient of thermal expansion than copper ($770\times10^{-6}$) and hence is caused to expand more rapidly than the copper layer 936, such that, upon heating, the copper serpentine shaped layer 936 expands via concertinaing at the same rate as the surrounding Teflon layers. Further, the copper layer 936 is formed near the top of each actuator and hence, upon heating of the copper element, the lower PTFE layer 935 remains cooler than the upper PTFE layer 937. This results in a bending of the actuator so as to achieve its actuation effects. The copper layer 936 is interconnected to the lower CMOS layer 934 by means of vias eg 939. Further, the PTFE layers 935/937, which are normally hydrophobic, undergo treatment so as to be hydrophilic. Many suitable treatments exist such as plasma damaging in an ammonia atmosphere. In addition, other materials having considerable properties can be utilized.

Figure 164:
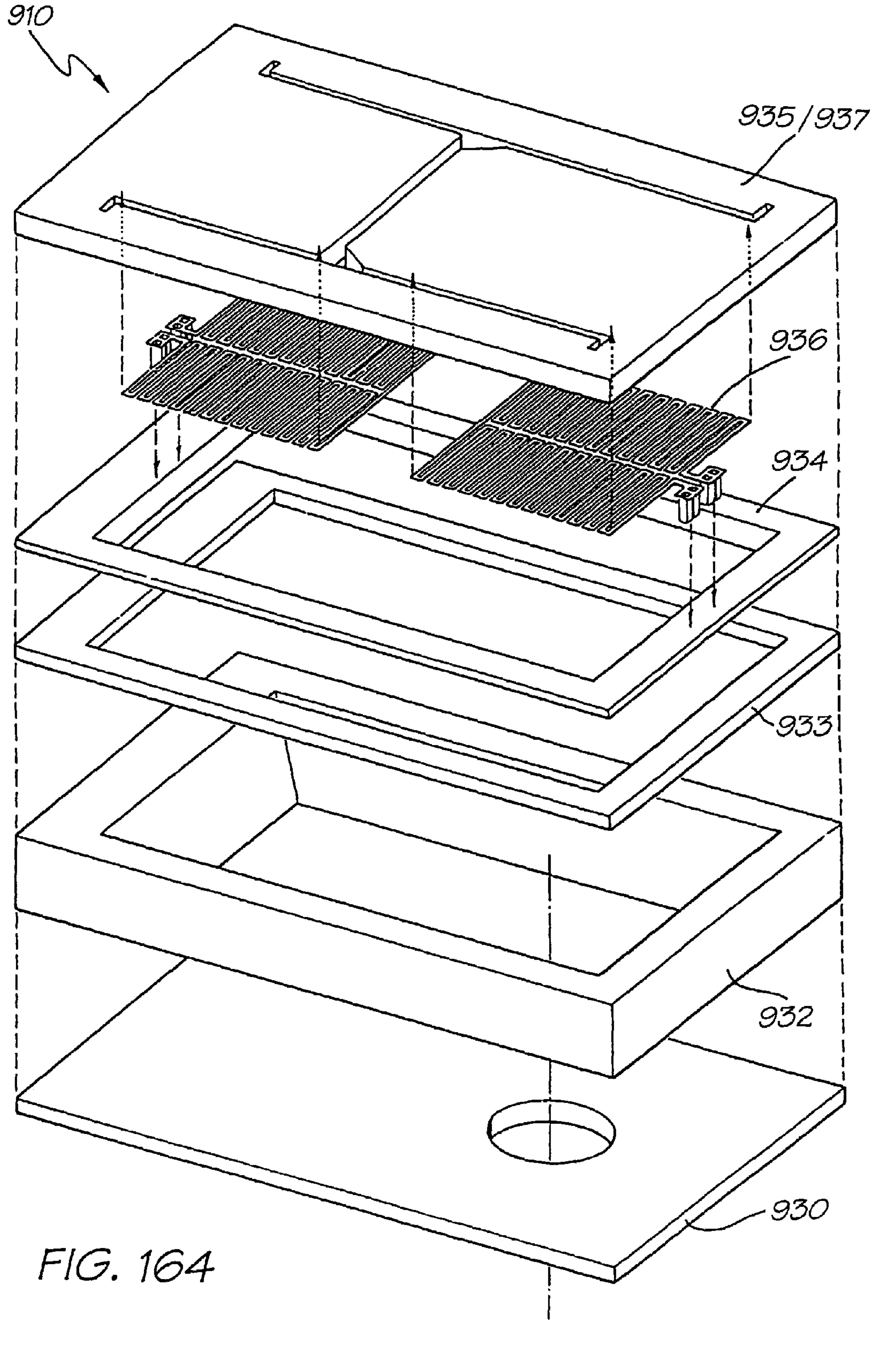
FIG. 164 is an exploded perspective view illustrating the construction of the inkjet nozzle chamber in accordance with a preferred embodiment.

Turning to FIG. 164, there is illustrated an exploded perspective of the various layers of an ink jet nozzle 910 as constructed in accordance with a single nozzle arrangement 910 of a preferred embodiment The layers include the lower boron layer 930, the silicon and anisotropically etched layer 932, CMOS glass layer 933, nitride passivation layer 934, copper heater layer 936 and PTFE layers 935, 937, which are illustrated in one layer but formed with an upper and lower Teflon layer embedding copper layer 936.

One form of detailed manufacturing process which can be used to fabricate monolithic ink jet print heads operating in accordance with the principles taught by the present embodiment can proceed utilizing the following steps:

1. Using a double sided polished wafer 950 deposit 3 microns of epitaxial silicon heavily doped with boron 930.

2. Deposit 10 microns of epitaxial silicon 932, either p-type or n-type, depending upon the CMOS process used.

Figure 165:
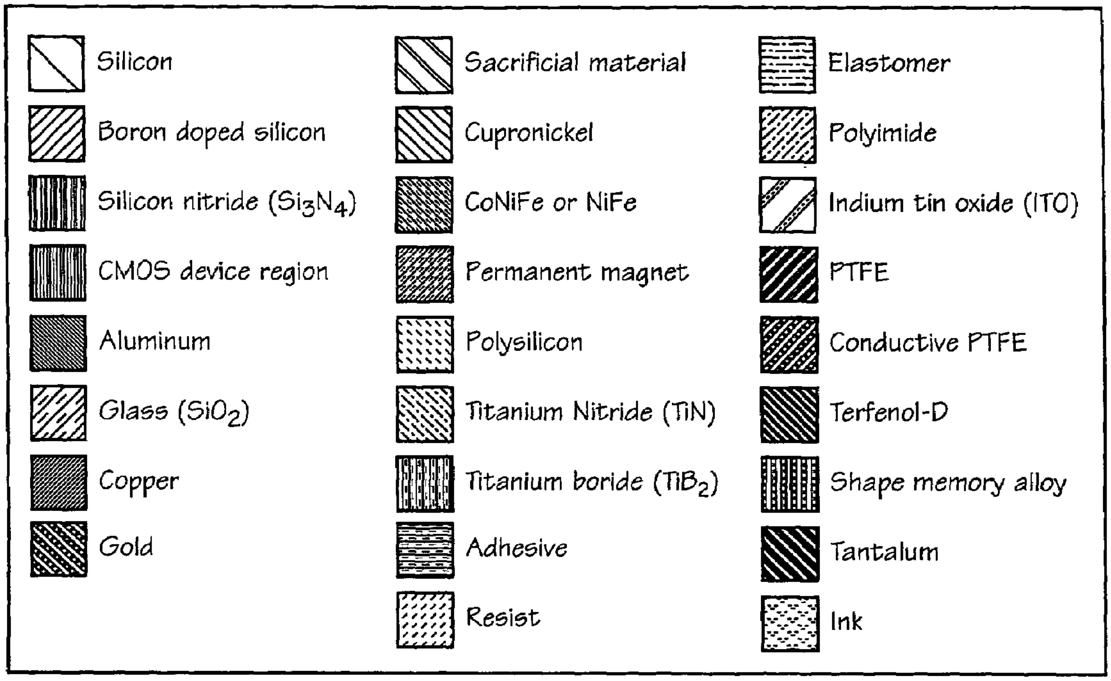
FIG. 165 provides a legend of the materials indicated in FIGS. 166 to 178.
Figure 166:
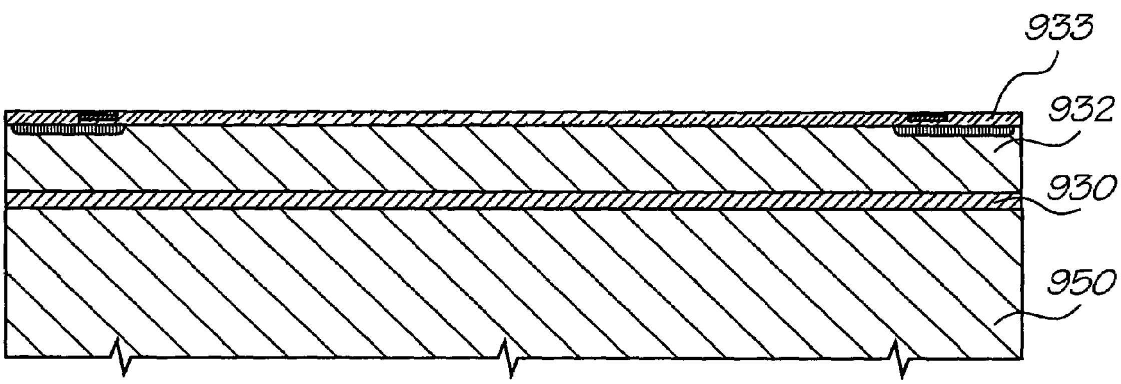
FIG. 166 to FIG. 178 illustrate sectional views of the manufacturing steps in one form of construction of an ink jet printhead nozzle.

3. Complete a 0.5 micron, one poly, 2 metal CMOS process 933. The metal layers are copper instead of aluminum, due to high current densities and subsequent high temperature processing. This step is shown in FIG. 166. For clarity, these diagrams may not be to scale, and may not represent a cross section though any single plane of the nozzle. FIG. 165 is a key to representations of various materials in these manufacturing diagrams, and those of other cross referenced ink jet configurations.

Figure 167:
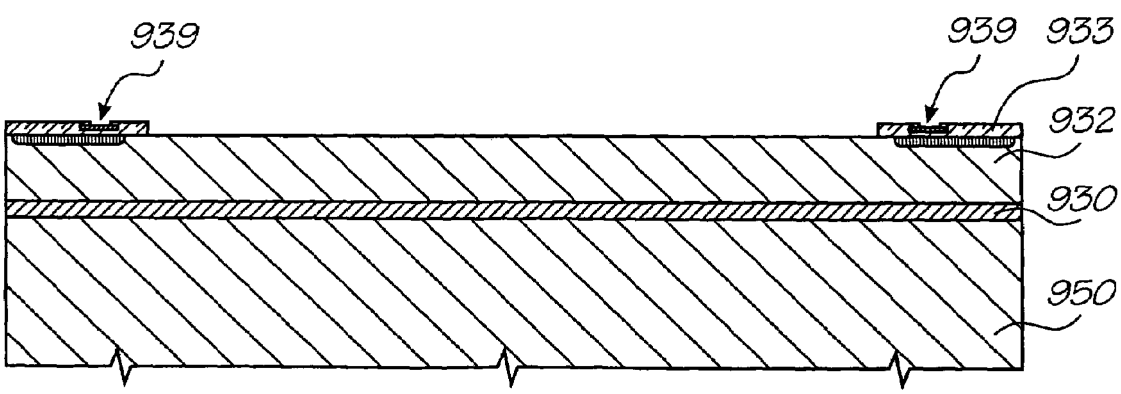

4. Etch the CMOS oxide layers 933 down to silicon or second level metal using Mask 1. This mask defines the nozzle cavity and the bend actuator electrode contact vias 939. This step is shown in FIG. 167.

Figure 168:
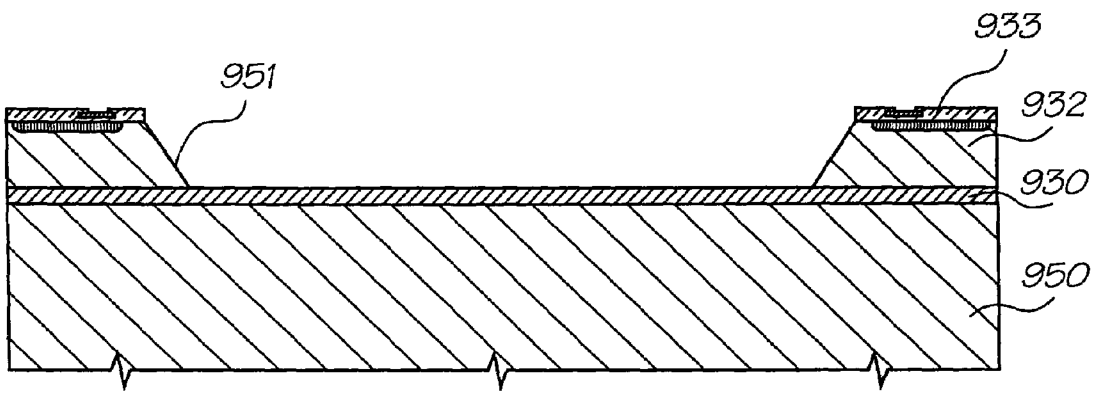

5. Crystallographically etch the exposed silicon using KOH. This etch stops on (111) crystallographic planes 951, and on the boron doped silicon buried layer. This step is shown in FIG. 168.

Figure 169:
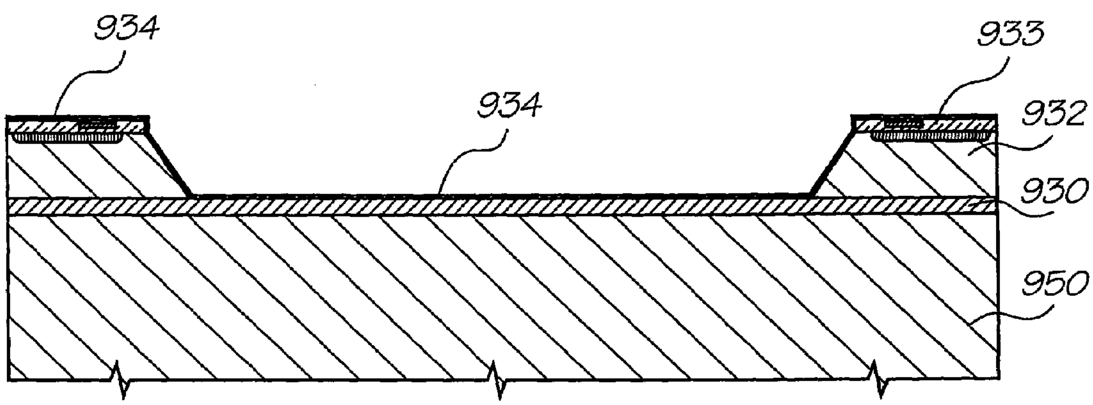

6. Deposit 0.5 microns of low stress PECVD silicon nitride 934 ($Si_3N_4$). The nitride acts as an ion diffusion barrier. This step is shown in FIG. 169.

Figure 170:
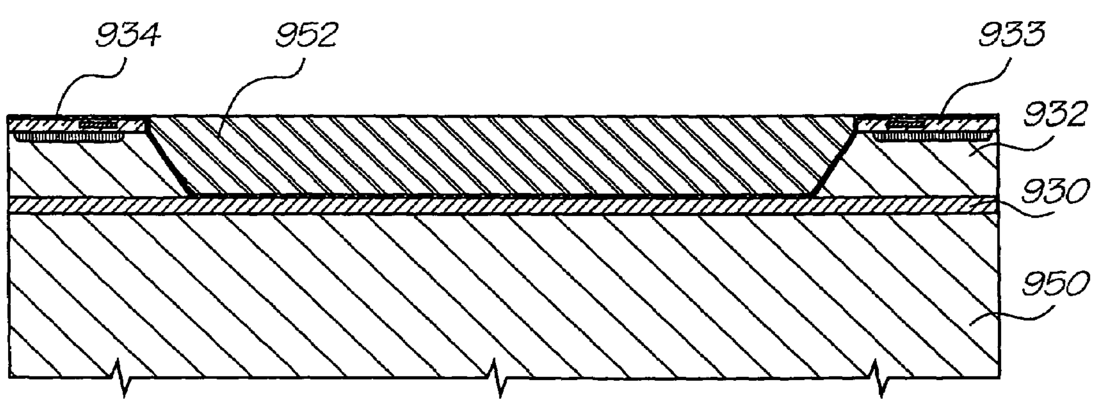

7. Deposit a thick sacrificial layer 952 (e.g. low stress glass), filling the nozzle cavity. Planarize the sacrificial layer down to the nitride surface. This step is shown in FIG. 170.

8. Deposit 1.5 microns of polytetrafluoroethylene 935 (PTFE).

9. Etch the PTFE using Mask 2. This mask defines the contact vias 939 for the heater electrodes.

Figure 171:
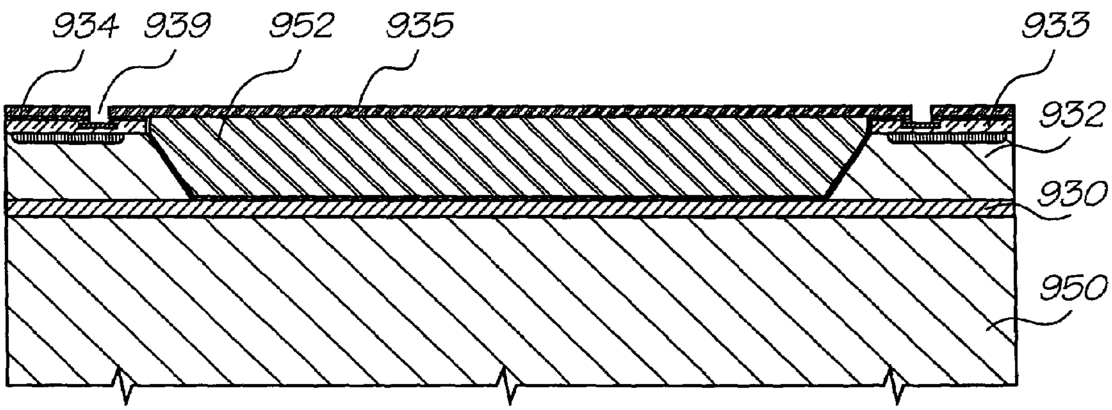

10. Using the same mask, etch down through the nitride and CMOS oxide layers to second level metal. This step is shown in FIG. 171.

Figure 172:
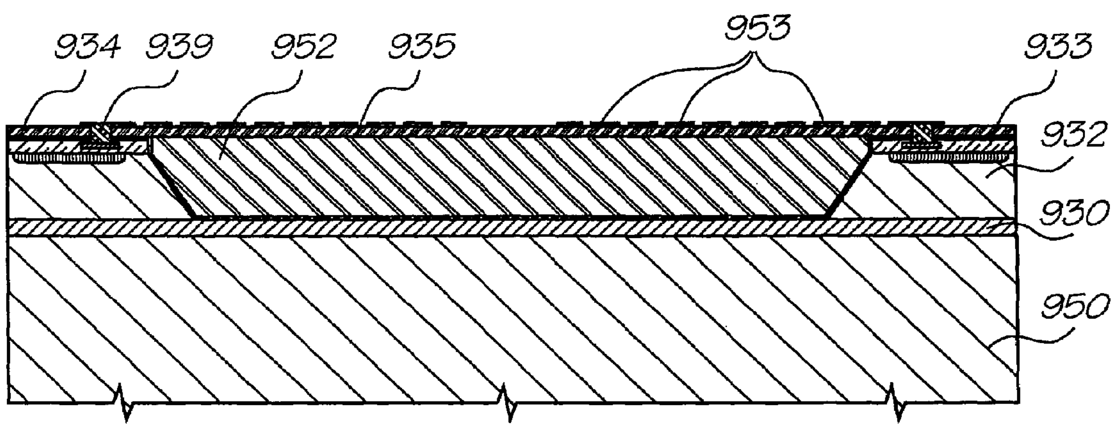

11. Deposit and pattern 0.5 microns of gold 953 using a lift-off process using Mask 3. This mask defines the heater pattern. This step is shown in FIG. 172.

12. Deposit 0.5 microns of PTFE 937.

Figure 173:
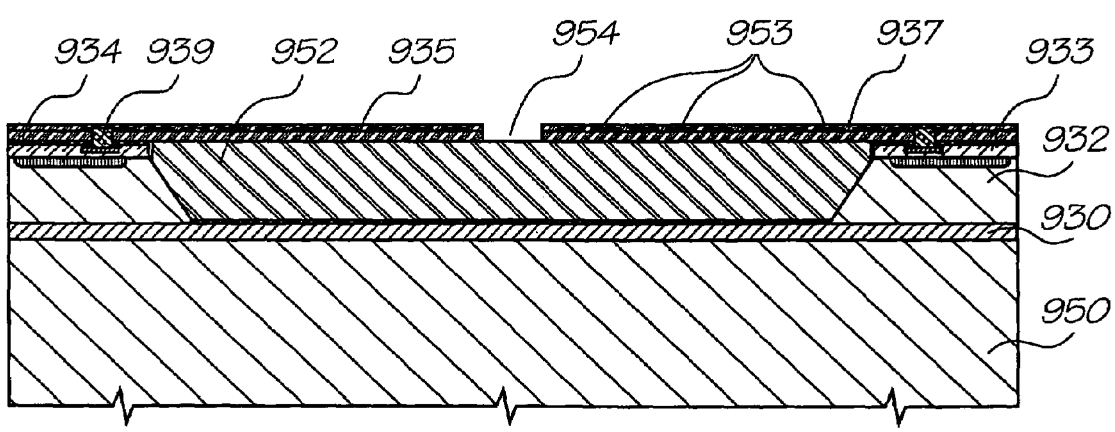

13. Etch both layers of PTFE down to sacrificial glass using Mask 4. This mask defines the gap 954 at the edges of the main actuator paddle and the refill actuator paddle. This step is shown in FIG. 173.

Figure 174:
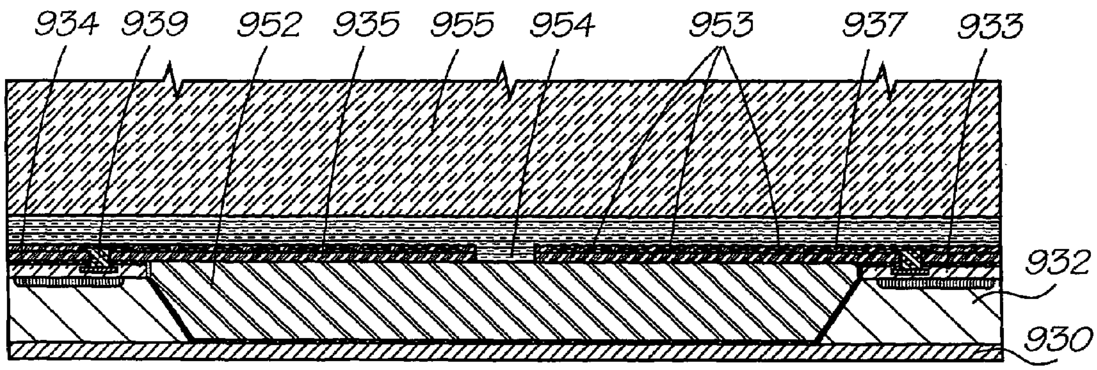

14. Mount the wafer on a glass blank 955 and back-etch the wafer using KOH, with no mask. This etch thins the wafer and stops at the buried boron doped silicon layer. This step is shown in FIG. 174.

Figure 175:
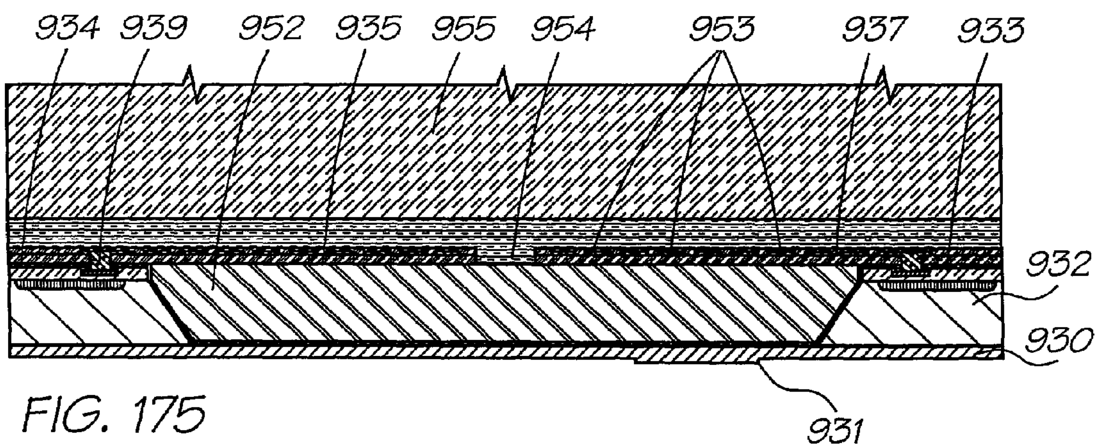

15. Plasma back-etch the boron doped silicon layer to a depth of 1 micron using Mask 5. This mask defines the nozzle rim 931. This step is shown in FIG. 175.

16. Plasma back-etch through the boron doped layer using Mask 6. This mask defines the nozzle 912, and the edge of the chips.

Figure 176:
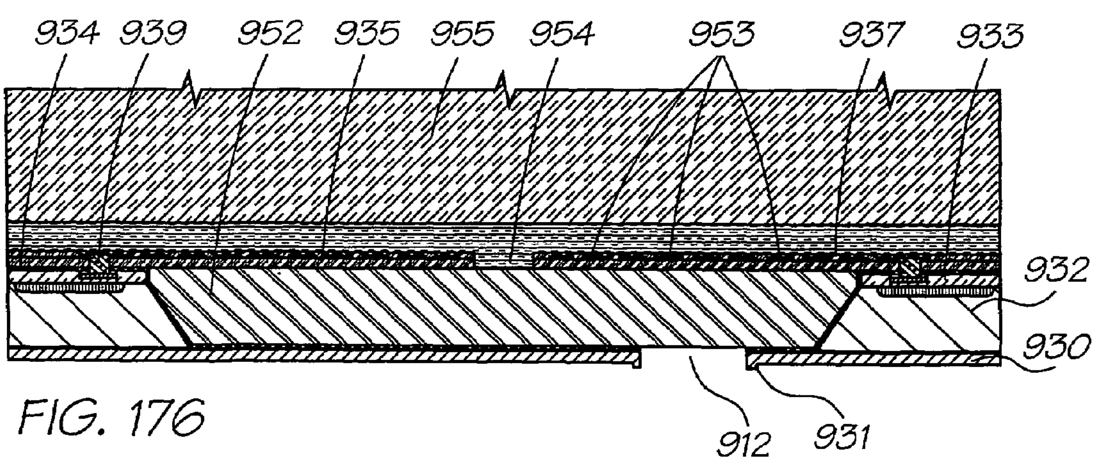

17. Plasma back-etch nitride up to the glass sacrificial layer through the holes in the boron doped silicon layer. At this stage, the chips are separate, but are still mounted on the glass blank. This step is shown in FIG. 176.

18. Strip the adhesive layer to detach the chips from the glass blank.

Figure 177:
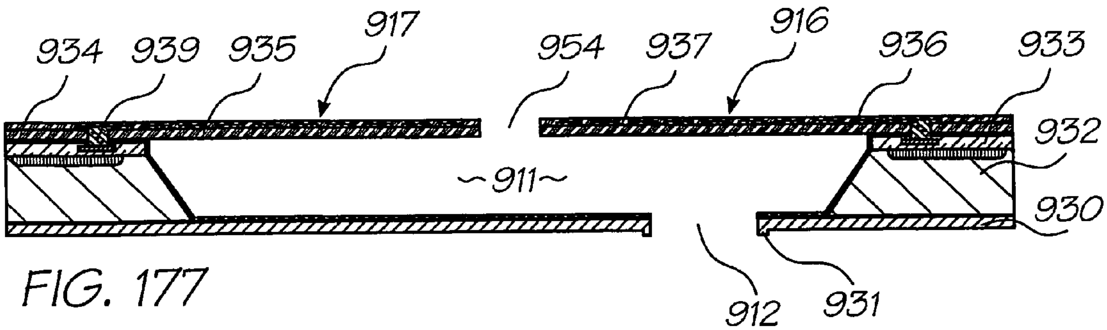

19. Etch the sacrificial glass layer in buffered HF. This step is shown in FIG. 177.

20. Mount the print heads in their packaging, which may be a molded plastic former incorporating ink channels which supply different colors of ink to the appropriate regions of the front surface of the wafer.

21. Connect the print heads to their interconnect systems.

22. Hydrophobize the front surface of the print heads.

Figure 178:
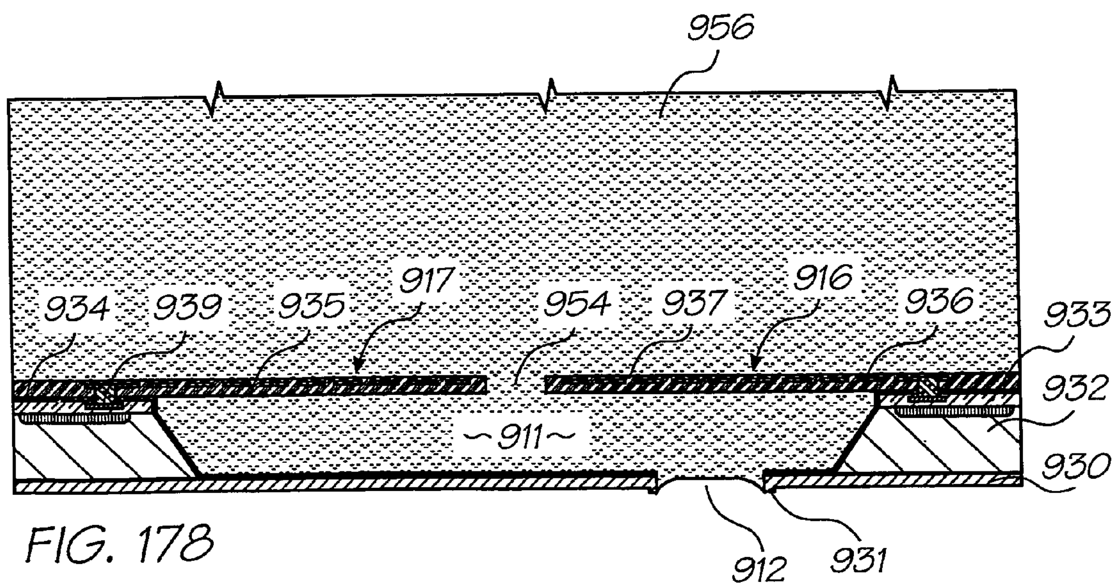

23. Fill the completed print heads with ink 956 and test them. A filled nozzle is shown in FIG. 178.

IJ10

In a preferred embodiment, an array of the nozzle arrangements is provided with each of the nozzles being under the influence of a outside pulsed magnetic field. The outside pulsed magnetic field causes selected nozzle arrangements to eject ink from their ink nozzle chambers.

Figure 179:
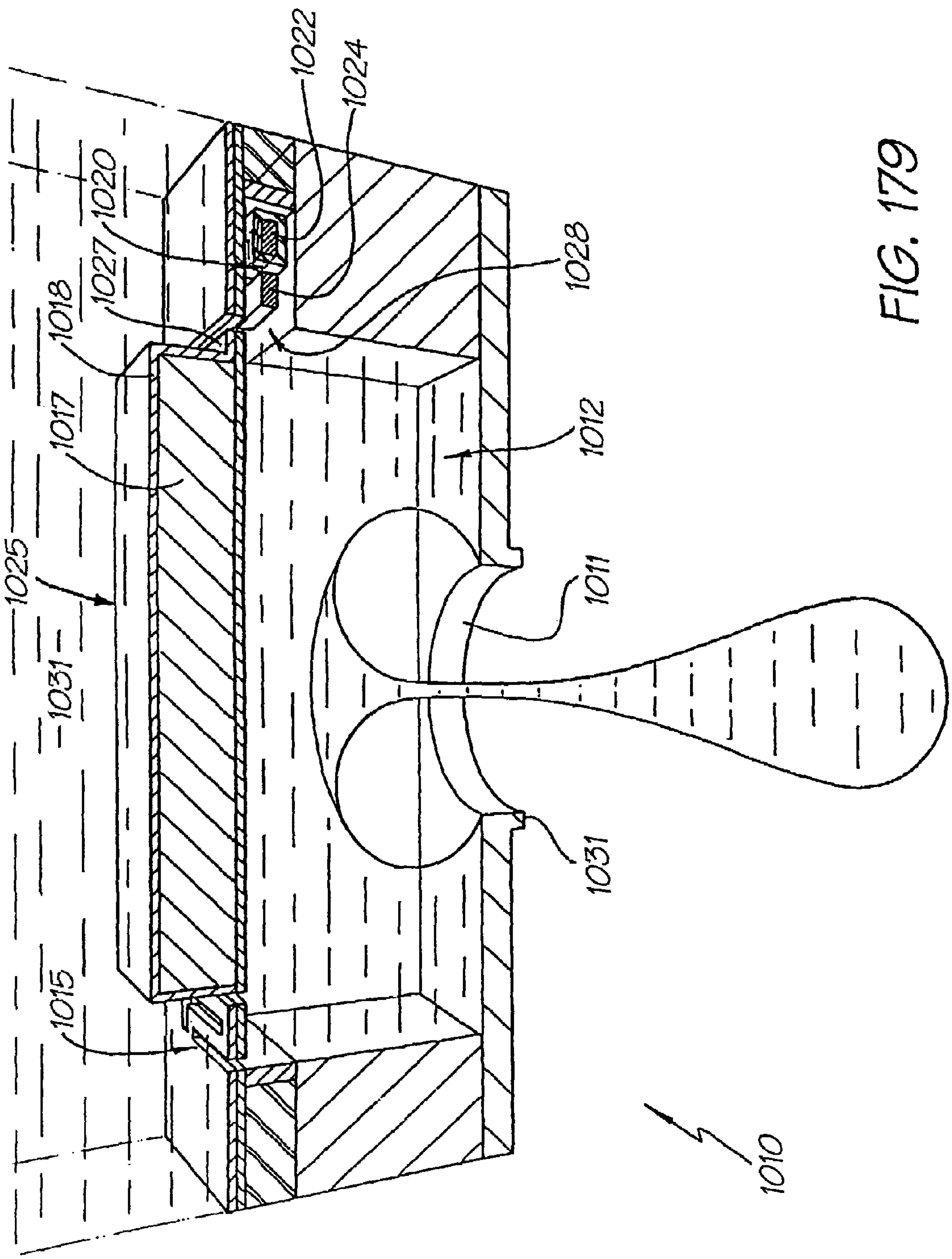
FIG. 179 is a perspective, partly sectional view of a single nozzle arrangement for an ink jet printhead in its quiescent position constructed in accordance with a preferred embodiment.
Figure 180:
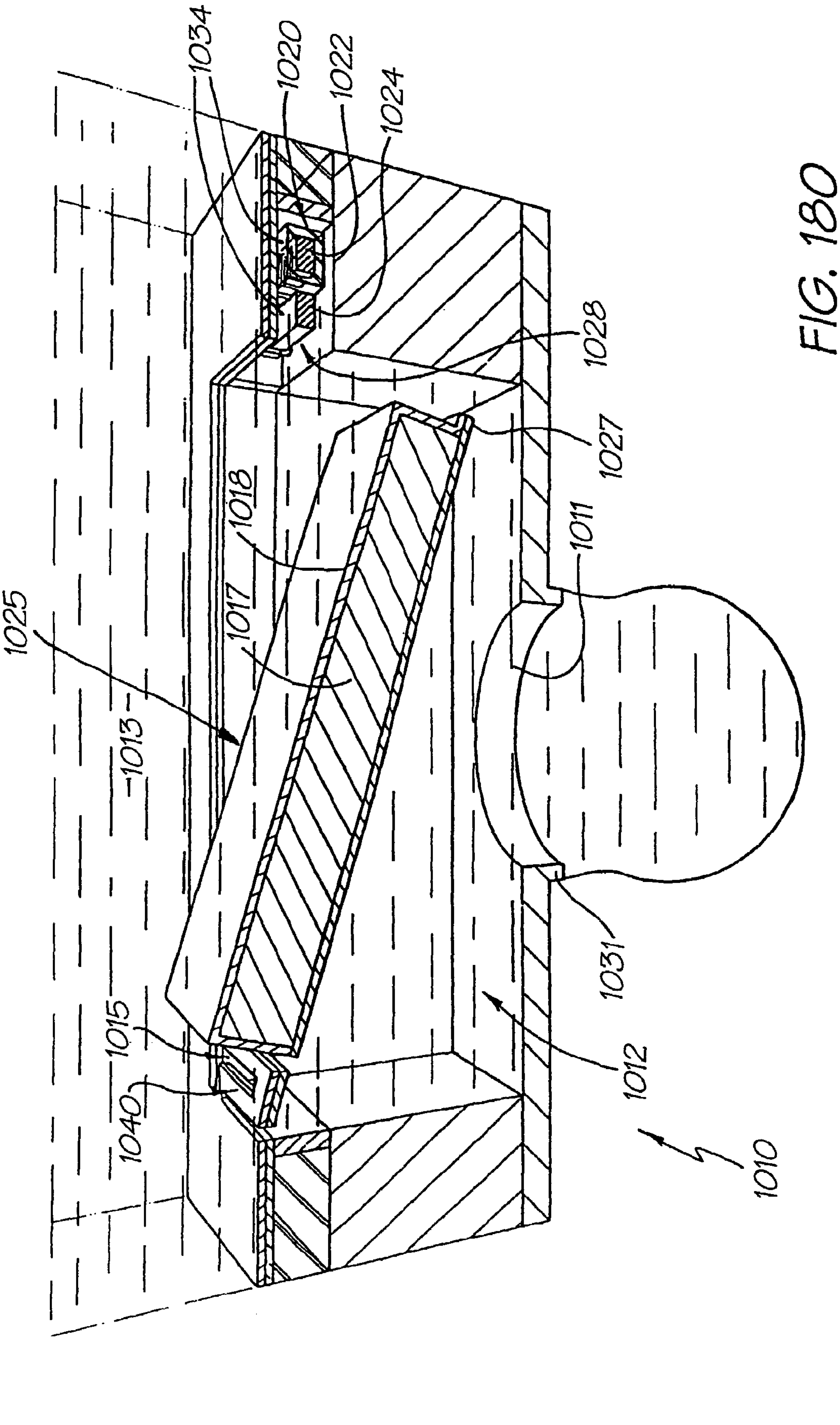
FIG. 180 is a perspective, partly sectional view of the nozzle arrangement in its firing position constructed in accordance with a preferred embodiment.

Turning initially to FIG. 179 and FIG. 180, there is illustrated a side perspective view, partly in section, of a single ink jet nozzle arrangement 1010. FIG. 179 illustrates the nozzle arrangement 1010 in a quiescent position and FIG. 180 illustrates the nozzle arrangement 1010 in an ink ejection position. The nozzle arrangement 1010 has an ink ejection port 1011 for the ejection of ink on demand. The ink ejection port 1011 is connected to an ink nozzle chamber 1012 which is usually filled with ink and supplied from an ink reservoir 1013 via holes e.g. 1015.

A magnetic actuation device 1025 is included and comprises a magnetic soft core 1017 which is surrounded by a nitride coating e.g. 1018. The nitride coating 1018 includes an end protuberance 1027.

The magnetic core 1017, operates under the influence of an external pulsed magnetic field. Hence, when the external magnetic field is very high, the actuator 1025 is caused to move rapidly downwards and to thereby cause the ejection of ink from the ink ejection port 1011. Adjacent the actuator 1025 is provided a blocking mechanism 1020 which comprises a thermal actuator which includes a copper resistive circuit having two arms 1022, 1024. A current is passed through the connected arms 1022, 1024 thereby causing them to be heated. The arm 1022, being of a thinner construction undergoes more resistive heating than the arm 1024 which has a much thicker structure. The arm 1022 is also of a serpentine nature and is encased in polytetrafluoroethylene (PTFE) which has a high coefficient of thermal expansion, thereby increasing the degree of expansion upon heating. The copper portions expand with the PTFE portions by means of a concertina-like movement The arm 1024 has a thinned portion 1029 (FIG. 181) which becomes the concentrated bending region in the resolution of the various forces activated upon heating. Hence, any bending of the arm 1024 is accentuated in the portion 1029 and upon heating, the region 1029 bends so that end portion 1026 (FIG. 181) moves out to block any downward movement of the edge 1027 of the actuator 1025. Hence, when it is desired to eject an ink drop from a particular nozzle chamber 1012, the blocking mechanism 1020 is not activated and as a result ink is ejected from the ink ejection port 1011 during the next external magnetic pulse phase. When the nozzle arrangement 1010 is not to eject ink, the locking mechanism 1020 is activated to block any movement of the actuator 1025 and therefore stop the ejection of ink from the port 1011. Movement of the blocking mechanism is indicated at 1021 in FIG. 181.

Importantly, the actuator 1020 is located within a cavity 1028 such that the volume of ink flowing past the arm 1022 is extremely low whereas the arm 1024 receives a much larger volume of ink flow during operation.

Figure 181:
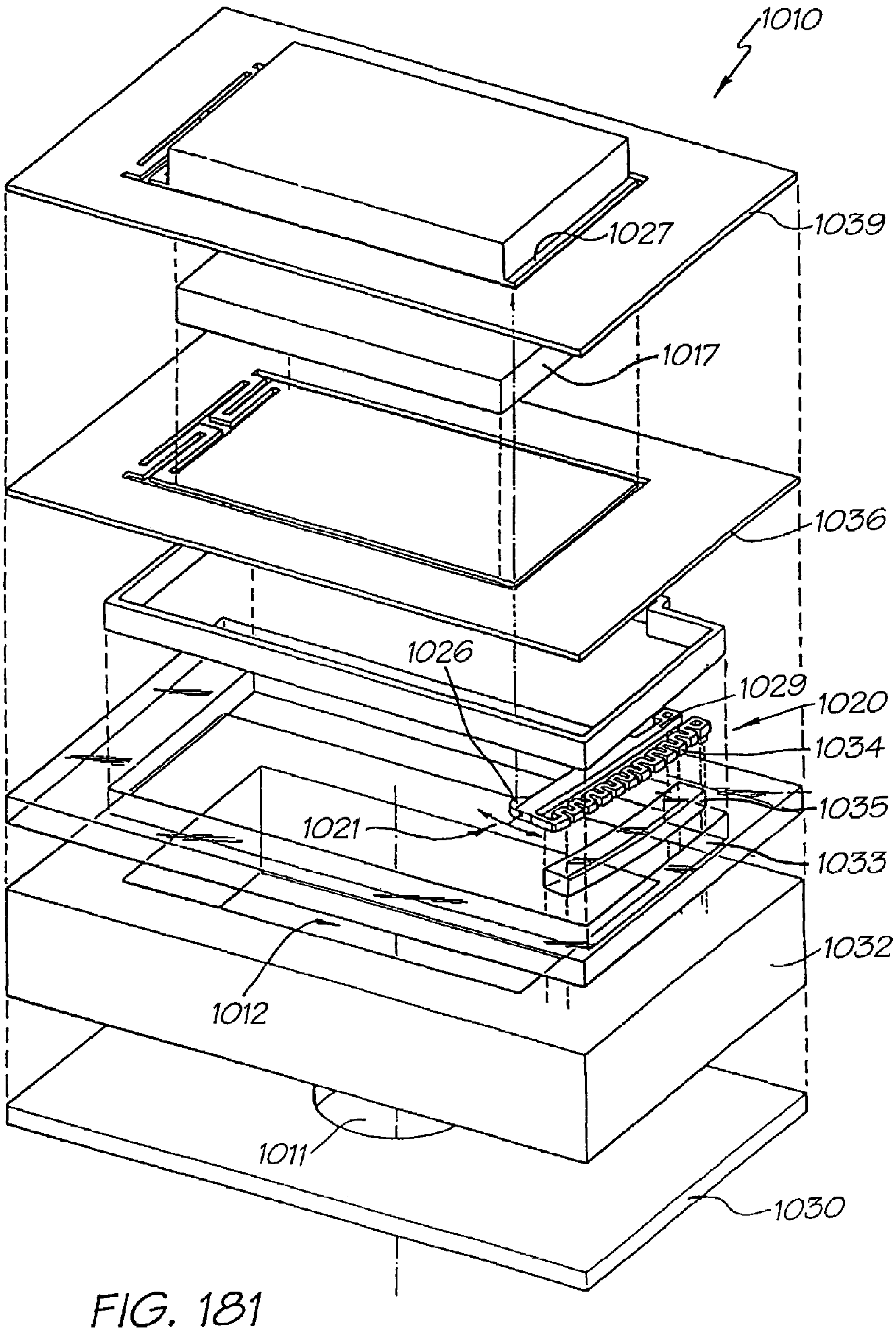
FIG. 181 is an exploded perspective illustrating the construction of the nozzle arrangement in accordance with a preferred embodiment.

Turning now to FIG. 181, there is illustrated an exploded perspective view of a single nozzle arrangement 1010 illustrating the various layers which make up the nozzle arrangement 1010. The nozzle arrangement 1010 can be constructed on a semiconductor wafer utilizing standard semiconductor processing techniques in addition to those techniques commonly used for the construction of micro-electromechanical systems (MEMS). At the bottom level 1030 is constructed a nozzle plate 1030 including the ink ejection port 1011. The nozzle plate 1030 can be constructed from a buried boron doped epitaxial layer of a silicon wafer which has been back etched to the point of the epitaxial layer. The epitaxial layer itself is then etched utilizing a mask so as to form a nozzle rim 1031 (See FIG. 179) and the ejection port 1011.

Next, the silicon wafer layer 1032 is etched to define the nozzle chamber 1012. The silicon layer 1032 is etched to contain substantially vertical side walls by using high density, low pressure plasma etching such as that available from Surface Technology Systems and subsequently filled with sacrificial material which is later etched away.

On top of the silicon layer 1032 is deposited a two level CMOS circuitry layer 1033 which comprises substantially glass in addition to the usual metal and poly layers. A layer 1033 includes the formation of the heater element contacts which can be constructed from copper. The PTFE layer 1035 can be provided as a departure from normal construction with a bottom PTFE layer being first deposited followed by a copper layer 1034 and a second PTFE layer to cover the copper layer 1034.

Next, a nitride passivation layer 1036 is provided which acts to provide a passivation surface for the lower layers in addition to providing a base for a soft magnetic Nickel Ferrous layer 1017 which forms the magnetic actuator portion of the actuator 1025. The nitride layer 1036 includes bending portions 1040 (FIG. 180) utilized in the bending of the actuator.

Next a nitride passivation layer 1039 is provided so as to passivate the top and side surfaces of the nickel iron (NiFe) layer 1017.

One form of detailed manufacturing process which can be used to fabricate monolithic ink jet printheads operating in accordance with the principles taught by the present embodiment can proceed utilizing the following steps:

Using a double sided polished wafer 1050 deposit 3 microns of epitaxial silicon heavily doped with boron 1030.

Deposit 10 microns of epitaxial silicon 1032 either p-type or n-type, depending upon the CMOS process used.

Figure 182:
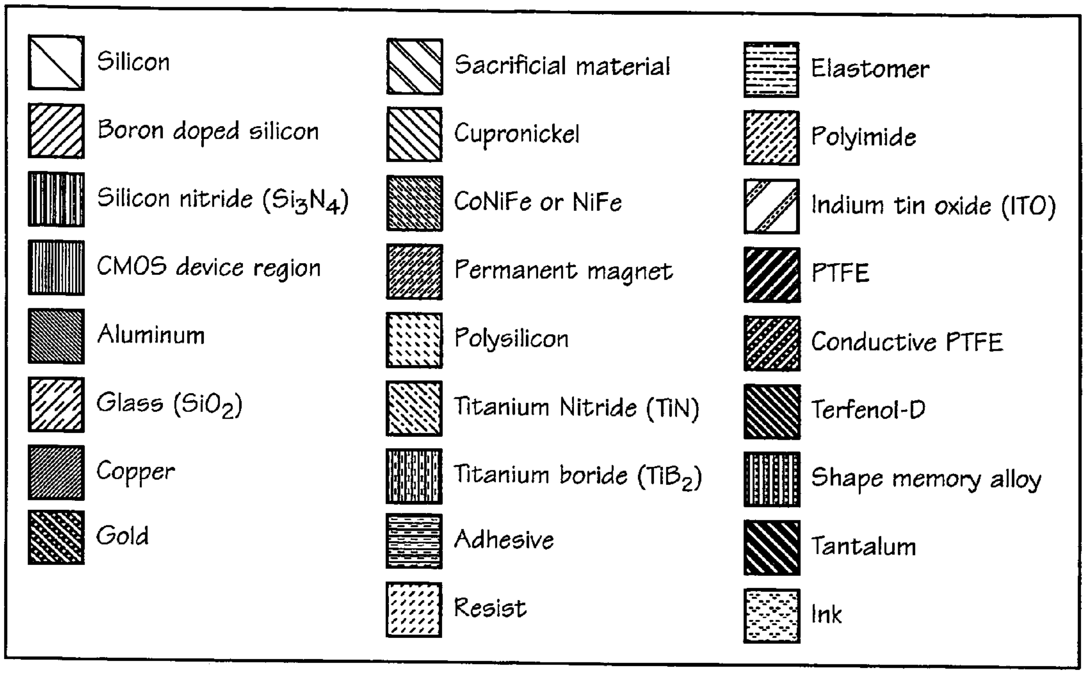
FIG. 182 provides a legend of the materials indicated in FIGS. 183 to 197.
Figure 183:
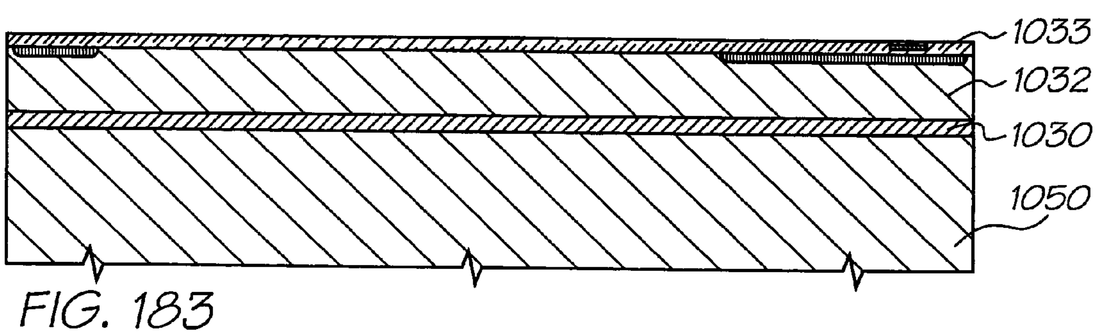
FIG. 183 to FIG. 197 illustrate sectional views of the manufacturing steps in one form of construction of an ink jet printhead nozzle.

Complete drive transistors, data distribution, and timing circuits using a 0.5 micron, one poly, 2 metal CMOS process 1033. Relevant features of the wafer at this step are shown in FIG. 183. For clarity, these diagrams may not be to scale, and may not represent a cross section though any single plane of the nozzle. FIG. 182 is a key to representations of various materials in these manufacturing diagrams, and those of other cross referenced ink jet configurations.

Figure 184:
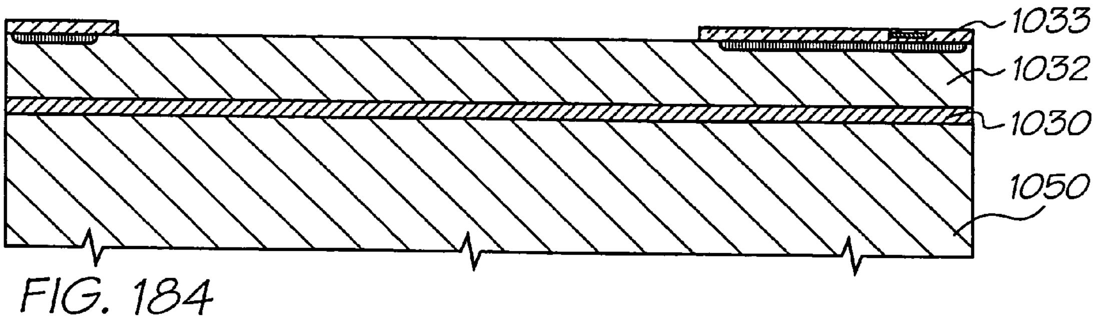

Etch the CMOS oxide layers down to silicon or aluminum using Mask 1. This mask defines the nozzle chamber, and the edges of the print head chips. This step is shown in FIG. 184.

Figure 185:
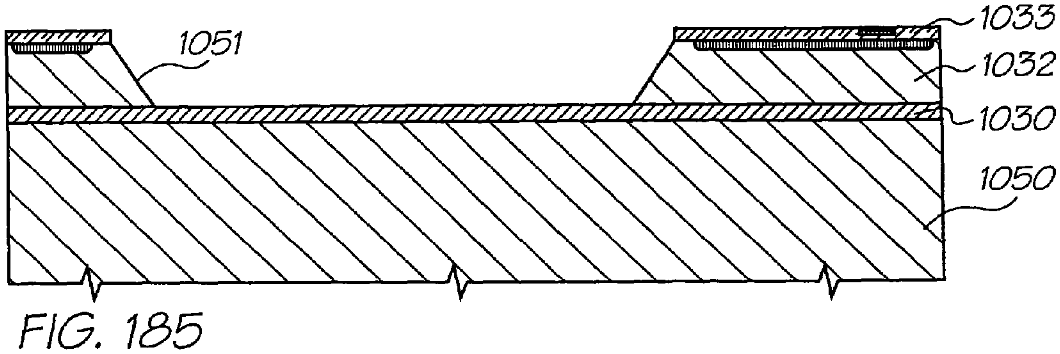

Crystallographically etch the exposed silicon using, for example, KOH or EDP (ethylenediamine pyrocatechol). This etch stops on <111> crystallographic planes 1051, and on the boron doped silicon buried layer. This step is shown in FIG. 185.

Deposit 0.5 microns of silicon nitride ($Si_3N_4$) 1052.

Figure 186:
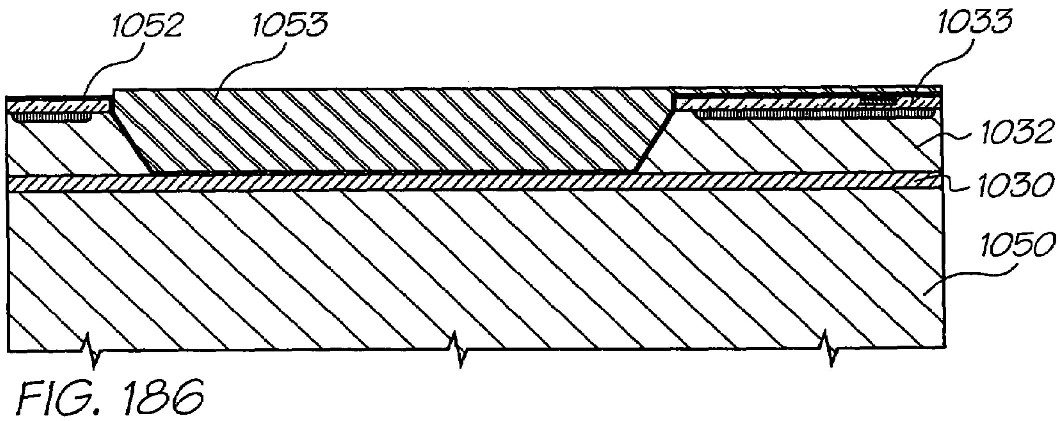

Deposit 10 microns of sacrificial material 1053. Planarize down to one micron over nitride using CMP. The sacrificial material temporarily fills the nozzle cavity. This step is shown in FIG. 186.

Deposit 0.5 microns of polytetrafluoroethylene (PTFE) 1054.

Figure 187:
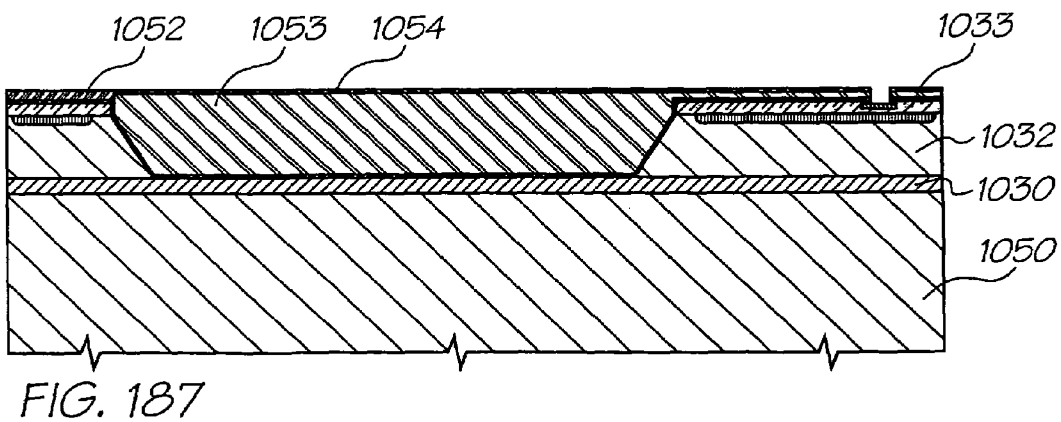

Etch contact vias in the PTFE, the sacrificial material, nitride, and CMOS oxide layers down to second level metal using Mask 2. This step is shown in FIG. 187.

Deposit 1 micron of titanium nitride (TiN) 1055.

Figure 188:
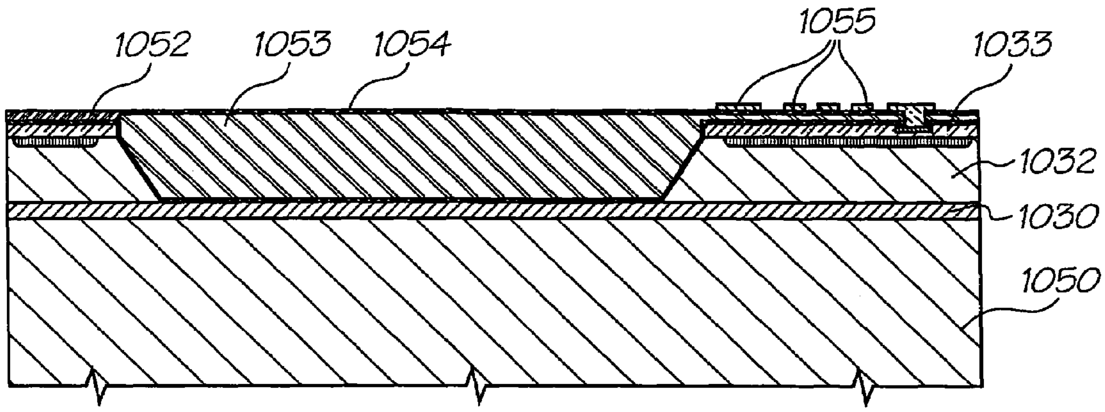

Etch the TiN using Mask 3. This mask defines the heater pattern for the hot arm of the catch actuator, the cold arm of the catch actuator, and the catch This step is shown in FIG. 188.

Deposit 1 micron of PTFE 1056.

Figure 189:
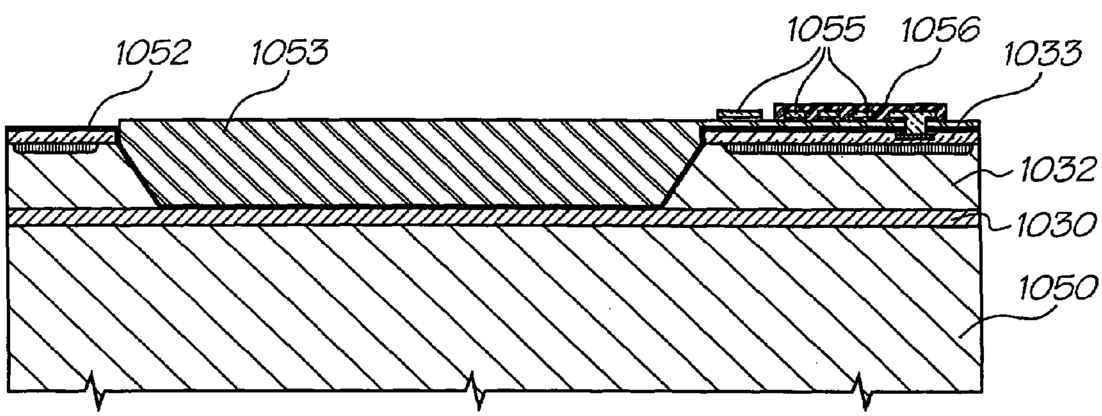

Etch both layers of PTFE using Mask 4. This mask defines the sleeve of the hot arm of the catch actuator. This step is shown in FIG. 189.

Deposit a seed layer for electroplating.

Figure 190:
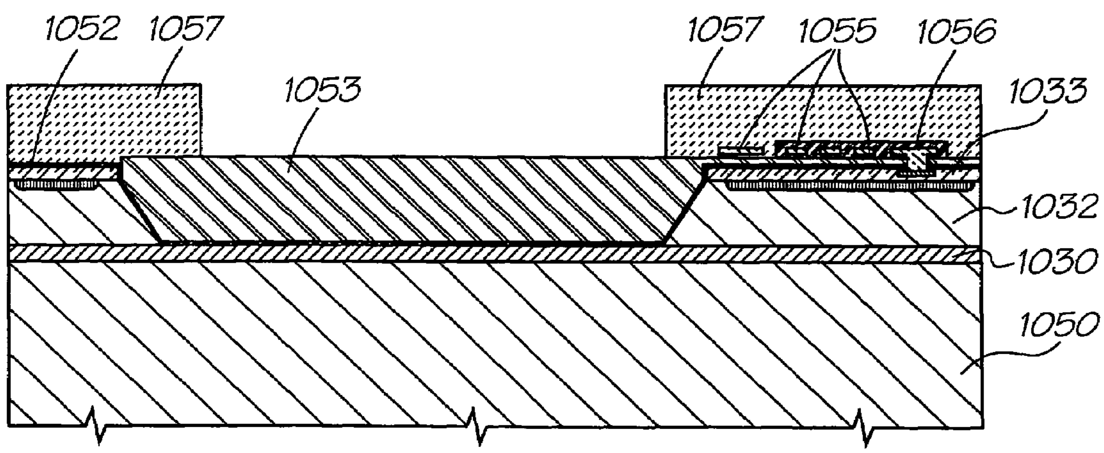

Spin on 11 microns of resist 1057, and expose and develop the resist using Mask 5. This mask defines the magnetic paddle. This step in shown in FIG. 190.

Figure 191:
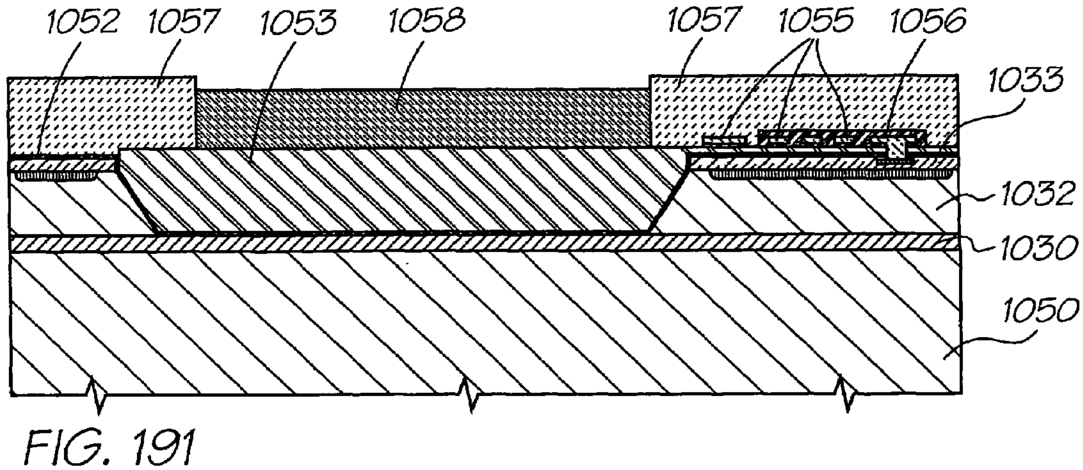

Electroplate 10 microns of ferromagnetic material 1058 such as nickel iron (NiFe). This step is shown in FIG. 191.

Strip the resist and etch the seed layer.

Deposit 0.5 microns of low stress PECVD silicon nitride 1059.

Figure 192:
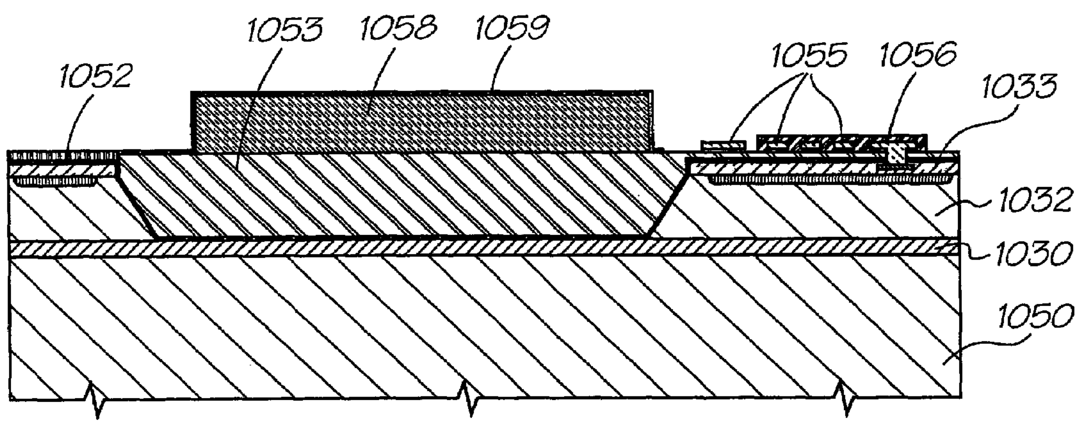

Etch the nitride using Mask 6, which defines the spring. This step is shown in FIG. 192.

Figure 193:
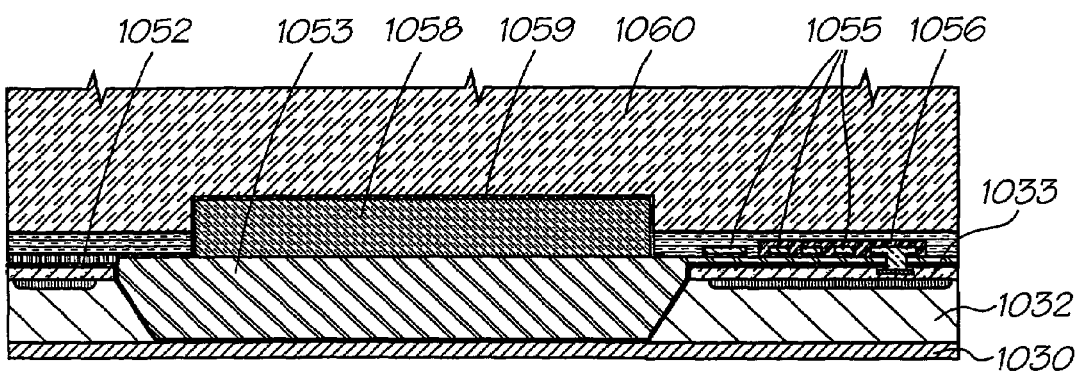

Mount the wafer on a glass blank 1060 and back-etch the wafer using KOH with no mask. This etch thins the wafer and stops at the buried boron doped silicon layer. This step is shown in FIG. 193.

Figure 194:
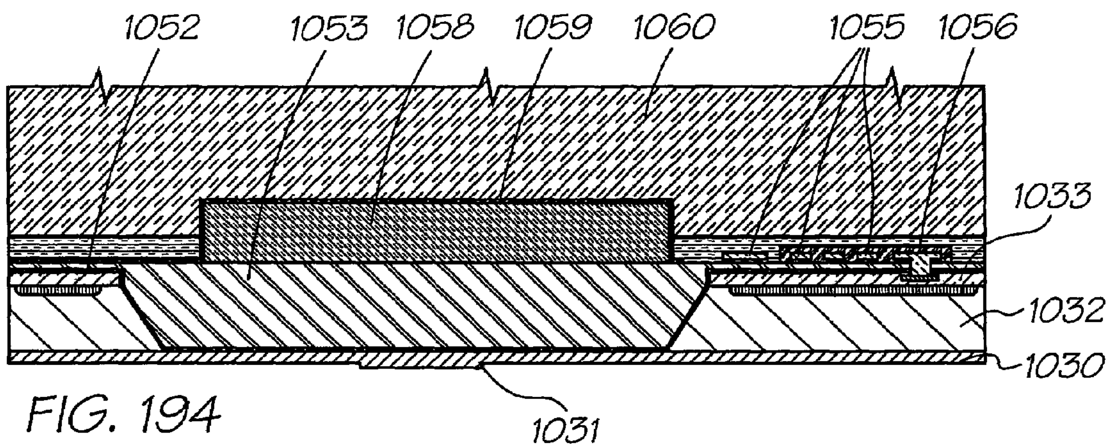

Plasma back-etch the boron doped silicon layer to a depth of 1 micron using Mask 7. This mask defines the nozzle rim 1031. This step is shown in FIG. 194.

Plasma back-etch through the boron doped layer using Mask 8. This mask defines the nozzle 1011, and the edge of the chips.

Figure 195:
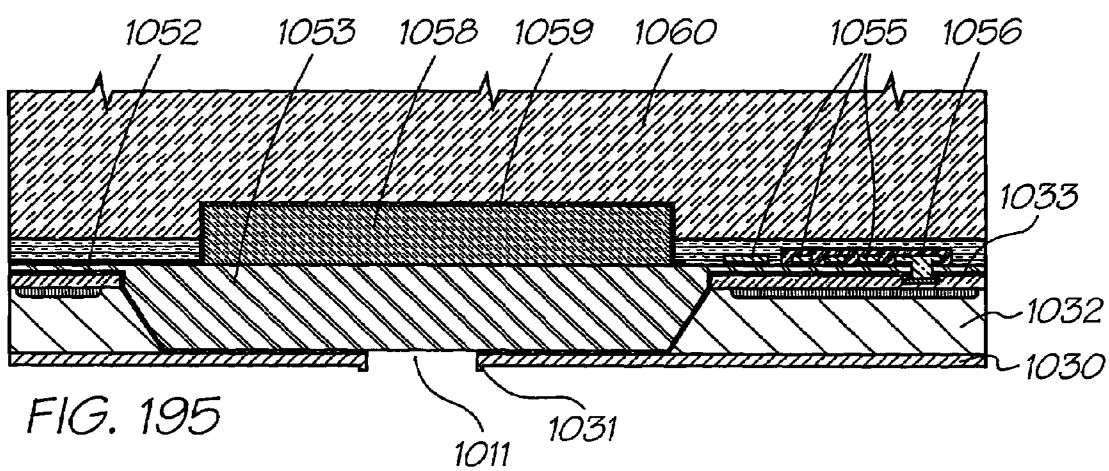

Plasma back-etch nitride up to the glass sacrificial layer through the holes in the boron doped silicon layer. At this stage, the chips are separate, but are still mounted on the glass blank. This step is shown in FIG. 195.

Strip the adhesive layer to detach the chips from the glass blank.

Figure 196:
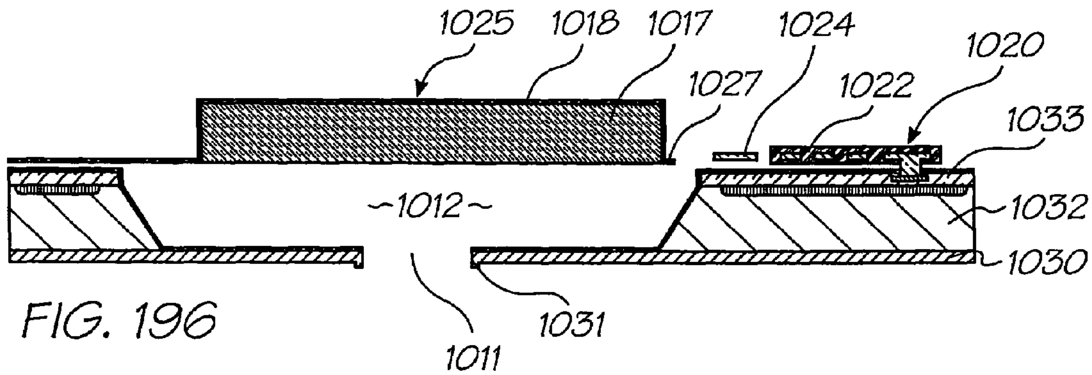

Etch the sacrificial layer. This step is shown in FIG. 196.

Mount the printheads in their packaging, which may be a molded plastic former incorporating ink channels which supply different colors of ink to the appropriate regions of the front surface of the wafer.

Connect the printheads to their interconnect systems.

Hydrophobize the front surface to the printheads.

Figure 197:
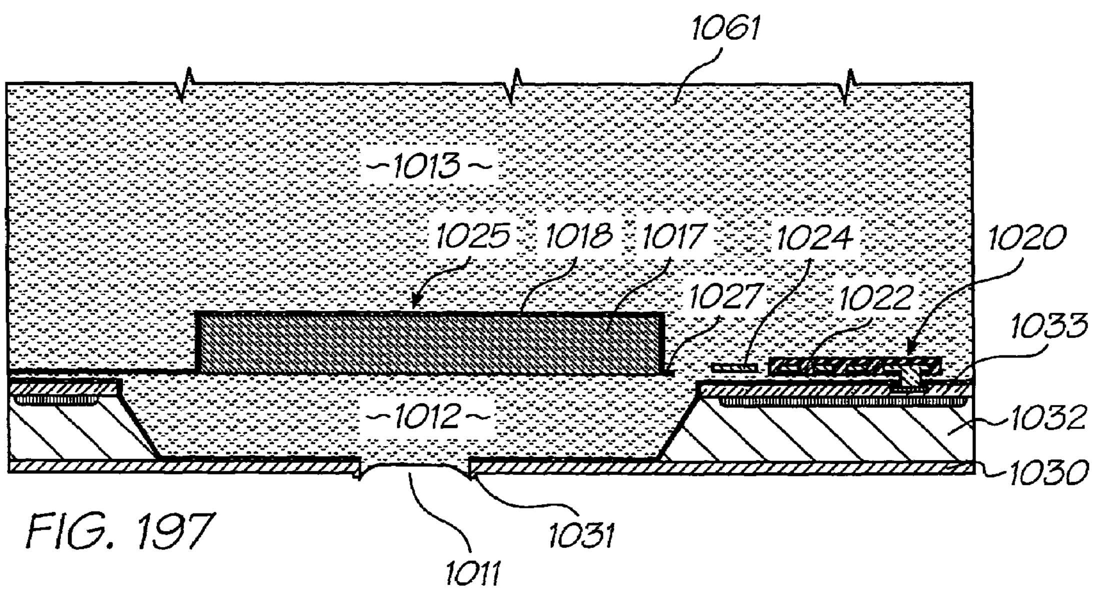

Fill the completed print heads with ink 1061, apply an oscillating magnetic field, and test the printheads. This step is shown in FIG. 197.

IJ11

Figure 198:
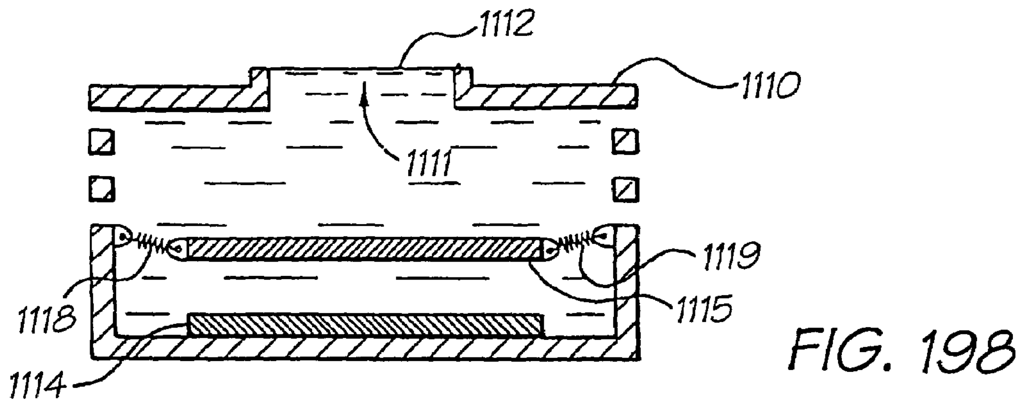
FIG. 198 is a cross sectional view of a single ink jet nozzle as constructed in accordance with a preferred embodiment in its quiescent state.

In a preferred embodiment, there is provided an ink jet nozzle and chamber filled with ink. Within said jet nozzle chamber is located a static coil and a movable coil. When energized, the static and movable coils are attracted towards one another, loading a spring. The ink drop is ejected from the nozzle when the coils are de-energized. Turn now to FIGS. 198-201, there is illustrated schematically the operation of a preferred embodiment In FIG. 198, there is shown a single ink jet nozzle chamber 1110 having an ink ejection port 1111 and ink meniscus in this position 1112. Inside the nozzle chamber 1110 are located a fixed or static coil 1114 and a movable coil 1115. The arrangement of FIG. 198 illustrates the quiescent state in the ink jet nozzle chamber.

Figure 199:
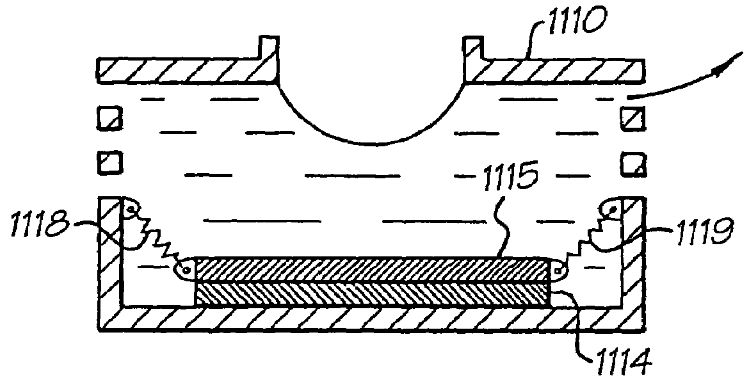
FIG. 199 is a cross sectional view of a single ink jet nozzle as constructed in accordance with a preferred embodiment after reaching its stop position.
Figure 200:
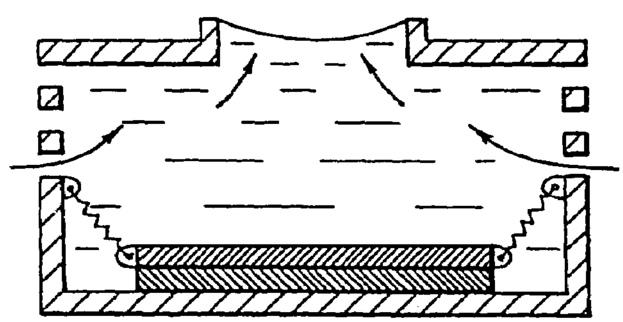
FIG. 200 is a cross sectional view of a single ink jet nozzle as constructed in accordance with a preferred embodiment in the keeper face position.

The two coils are then energized resulting in an attraction to one another. This results in the movable plate 1115 moving towards the static or fixed plate 1114 as illustrated in FIG. 199. As a result of the movement, springs 1118, 1119 are loaded. Additionally, the movement of coil 1115 may cause ink to flow out of the chamber 10 in addition to a change in the shape of the meniscus 1112. The coils are energized for long enough for the moving coil 1115 to reach its position (approximate two microseconds). The coil currents are then turned to a lower "level" while the nozzle fills. The keeper power can be substantially less than the maximum current level used to move the plate 1115 because the magnetic gap between the plates 1114 and 1115 is at a minimum when the moving coil 1115 is at its stop position. The surface tension on the meniscus 1112 inserts a net force on the ink which results in nozzle refilling as illustrated in FIG. 200. The nozzle refilling replaces the volume of the piston withdrawal with ink in a process which should take approximately 100 microseconds.

Figure 201:
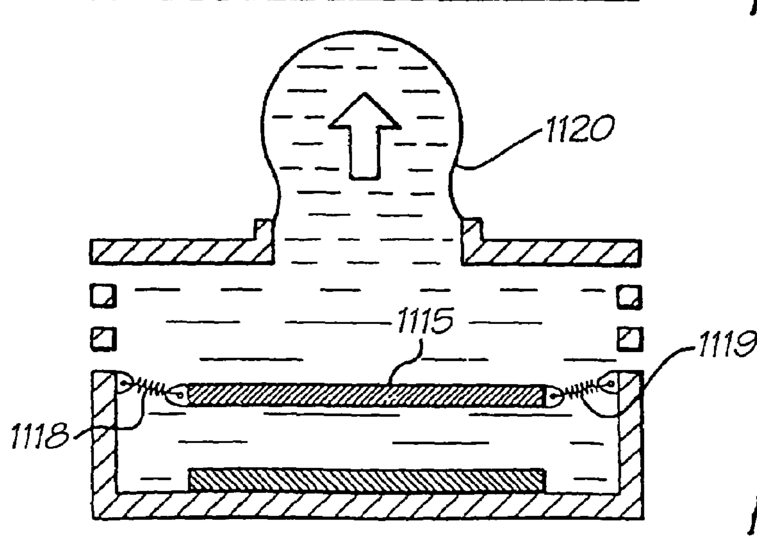
FIG. 201 is a cross sectional view of a single ink jet nozzle as constructed in accordance with a preferred embodiment after de-energising from the keeper level.

Turning to FIG. 201, the coil current is then turned off and the movable coil 1115 acts as a plunger which is accelerated to its normal position by the springs 1118, 1119 as illustrated in FIG. 201. The spring force on the plunger coil 1115 will be greatest at the beginning of its stroke and slows as the spring elastic stress falls to zero. As a result, the acceleration of plunger plate 1115 is high at the beginning of the stroke but decreases during the stroke resulting in a more uniform ink velocity during the stroke. The movement plate 1115 causes the meniscus to bulge and break off performing ink drop 1120. The plunger coil 1115 in turn settles in its quiescent position until the next drop ejection cycle.

Figure 202:
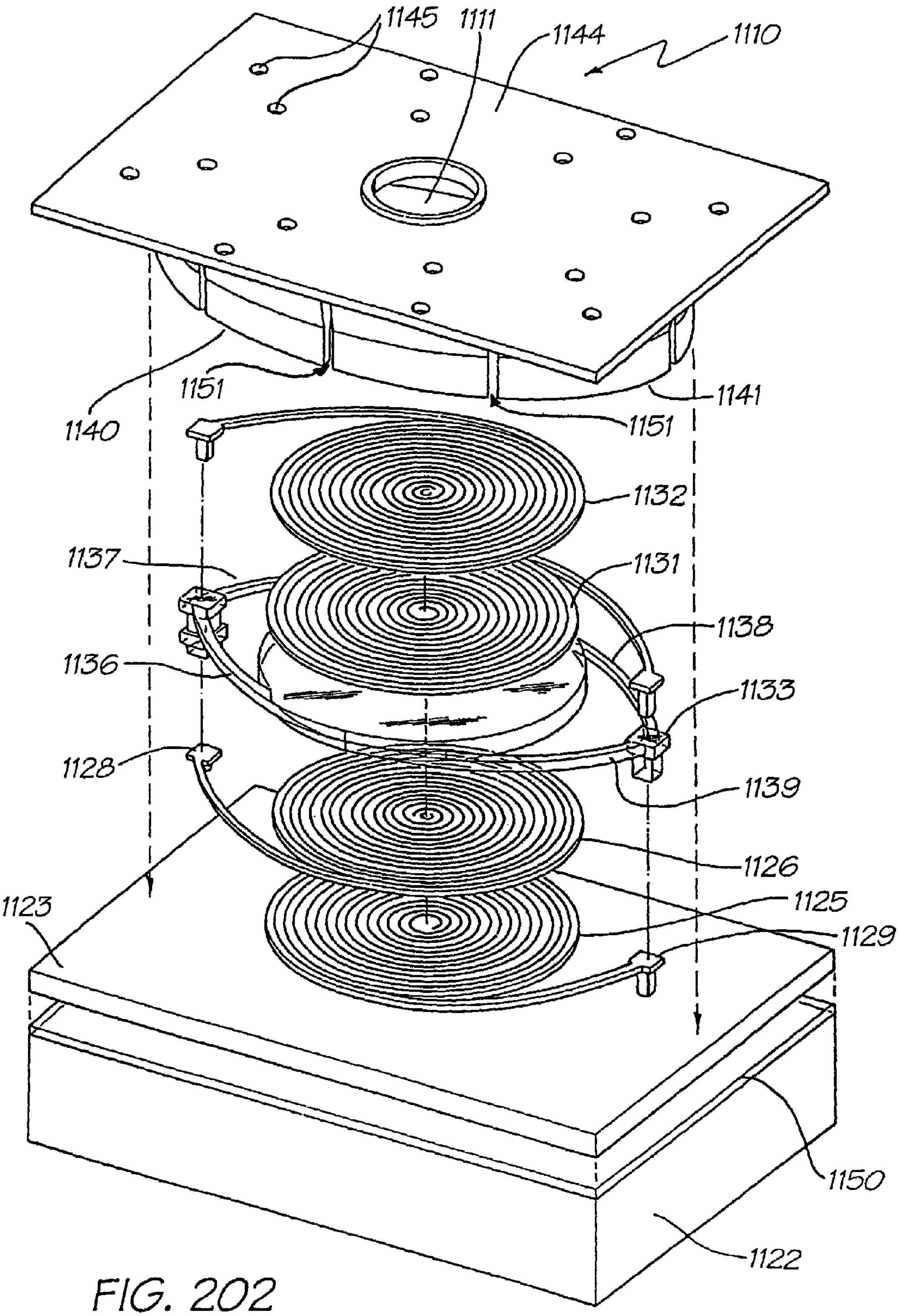
FIG. 202 is an exploded perspective view illustrating the construction of a preferred embodiment.

Turning now to FIG. 202, there is illustrated a perspective view of one form of construction of an ink jet nozzle 1110. The ink jet nozzle 1110 can be constructed on a silicon wafer base 1122 as part of a large array of nozzles 1110 which can be formed for the purposes of providing a printhead having a certain dpi, for example, a 1600 dpi printhead. The printhead 1110 can be constructed using advanced silicon semi-conductor fabrication and micro machining and micro fabrication process technology. The wafer is first processed to include lower level drive circuitry (not shown) before being finished off with a two microns thick layer 1150 with appropriate vias for interconnection. Preferably, the CMOS layer can include one level of metal for providing basic interconnects. On top of the layer 1150 is constructed a nitride layer 1123 in which is embedded two coil layers 1125 and 1126. The coil layers 1125, 1126 can be embedded within the nitride layer 1123 through the utilisation of the well-known dual damascene process and chemical mechanical planarization techniques ("Chemical Mechanical Planarisation of Micro Electronic Materials" by Sterger Wald et al published 1997 by John Wiley and Sons Inc., New York, N.Y.). The two coils 1125, 1126 are interconnected using a fire at their central point and are further connected, by appropriate vias at ends 1128, 1129 to the end points 1128, 1129. Similarly, the movable coil can be formed from two copper coils 1131, 1132 which are encased within a further nitride layer 1133. The copper coil 1131, 1132 and nitride layer 1133 also include torsional springs 1136-1139 which are formed so that the top moveable coil has a stable state away from the bottom fixed coil. Upon passing a current through the various copper coils, the top copper coils 1131, 1132 are attracted to the bottom copper coils 1125, 1126 thereby resulting in a loading being placed on the torsional springs 1136-1139 such that, when the current is turned off, the springs 1136-1139 act to move the top moveable coil to its original position. The nozzle chamber can be formed via nitride wall portions e.g. 1140, 1141 having slots e.g. 1151 between adjacent wall portions. The slots 1151 allow for the flow of ink into the chamber as required A top nitride plate 1144 is provided to cap the top of the internals of 1110 and to provide in flow channel support The nozzle plate 1144 includes a series of holes 1145 provided to assist in sacrificial etching of lower level layers. Also provided is the ink injection nozzle 1111 having a ridge around its side so as to assist in resisting any in flow on to the outside surface of the nozzle 1110. The etched through holes 1145 are of much smaller diameter than the nozzle hole 1111 and, as such, surface tension will act to retain the ink within the through holes of 1145 whilst simultaneously the injection of ink from nozzle 1111.

As mentioned previously, the various layers of the nozzle 1110 can be constructed in accordance with standard semiconductor and micro mechanical techniques. These techniques utilise the dual damascene process as mentioned earlier in addition to the utilisation of sacrificial etch layers to provide support for structures which are later released by means of etching the sacrificial layer.

Figure 203:
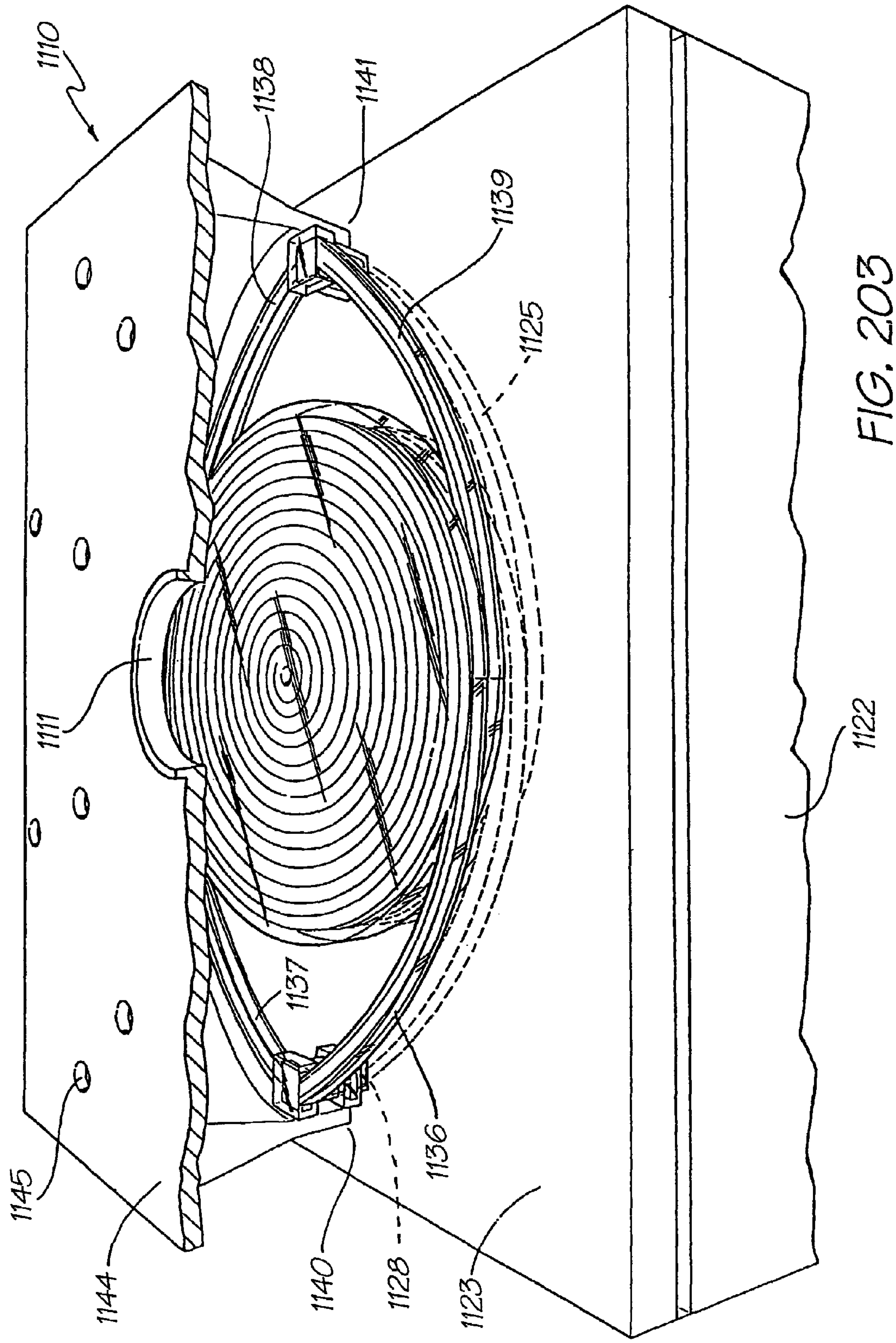
FIG. 203 is the cut out topside view of a single ink jet nozzle constructed in accordance with a preferred embodiment in the keeper level.

The ink can be supplied within the nozzle 1110 by standard techniques such as providing ink channels along the side of the wafer so as to allow the flow of ink into the area under the surface of nozzle plate 1144. Alternatively, ink channel portals can be provided through the wafer by a high density low pressure plasma etch processing system such as that available from surface technology system and known as their Advanced Silicon Etch (ASE) process. The etched portals 1145 being so small that surface tension affects not allow the ink to leak out of the small portal holes. In FIG. 203, there is shown a final assembled ink jet nozzle ready for the ejection of ink.

Figure 204:
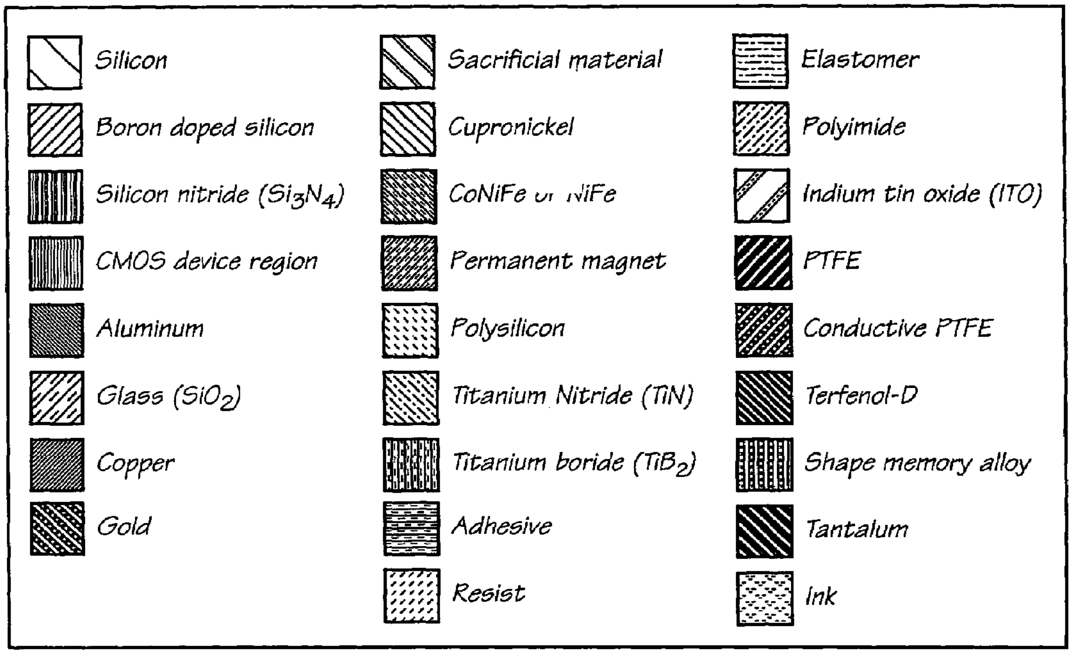
FIG. 204 provides a legend of the materials indicated in FIGS. 205 to 224.
Figure 205:
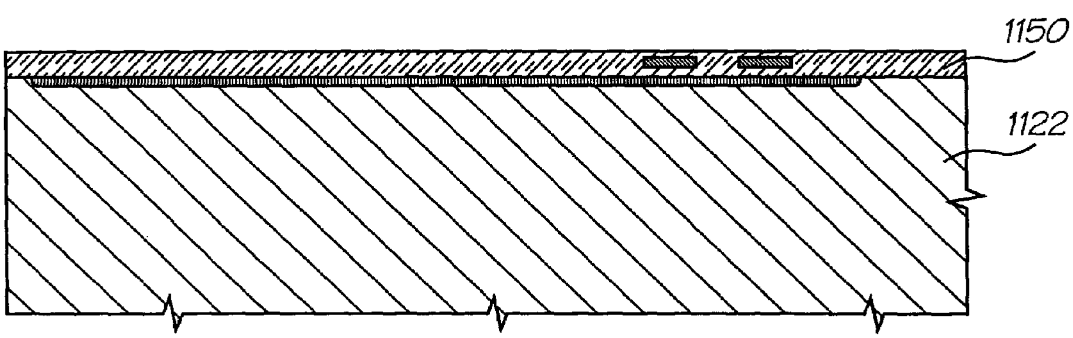
FIG. 205 to FIG. 224 illustrate sectional views of the manufacturing steps in one form of construction of an ink jet printhead nozzle.

One form of detailed manufacturing process which can be used to fabricate monolithic ink jet print heads operating in accordance with the principles taught by the present embodiment can proceed by the following steps:

1. Using a double sided polished wafer 1122, Complete drive transistors, data distribution, and timing circuits using a 0.5 micron, one poly, 2 metal CMOS process 1150. This step is shown in FIG. 205. For clarity, these diagrams may not be to scale, and may not represent a cross section though any single plane of the nozzle. FIG. 204 is a key to representations of various materials in these manufacturing diagrams, and those of other cross referenced ink jet configurations.

2. Deposit 0.5 microns of low stress PECVD silicon nitride ($Si_3N_4$) 1123. The nitride acts as a dielectric, and etch stop, a copper diffusion barrier, and an ion diffusion barrier. As the speed of operation of the print head is low, the high dielectric constant of silicon nitride is not important, so the nitride layer can be thick compared to sub-micron CMOS back-end processes.

Figure 206:
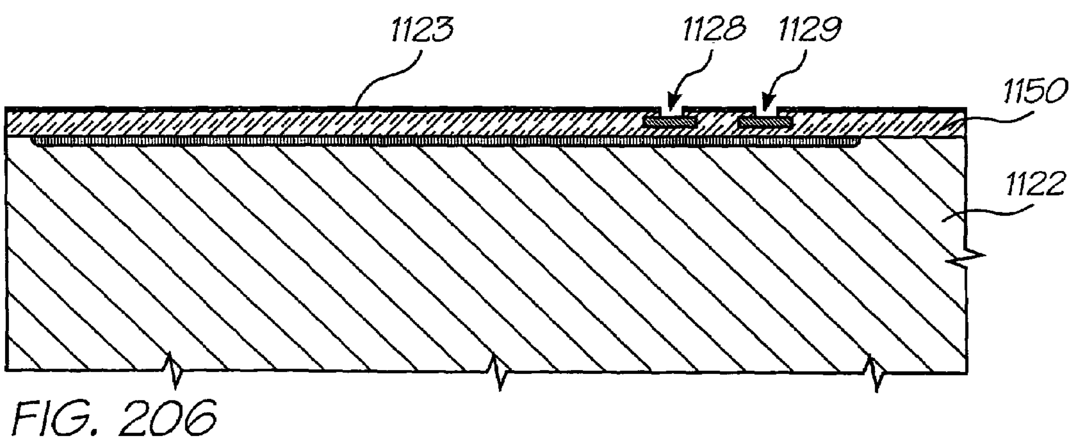

3. Etch the nitride layer using Mask 1. This mask defines the contact vias 1128, 1129 from the solenoid coil to the second-level metal contacts. This step is shown in FIG. 206.

4. Deposit 1 micron of PECVD glass 1152.

Figure 207:
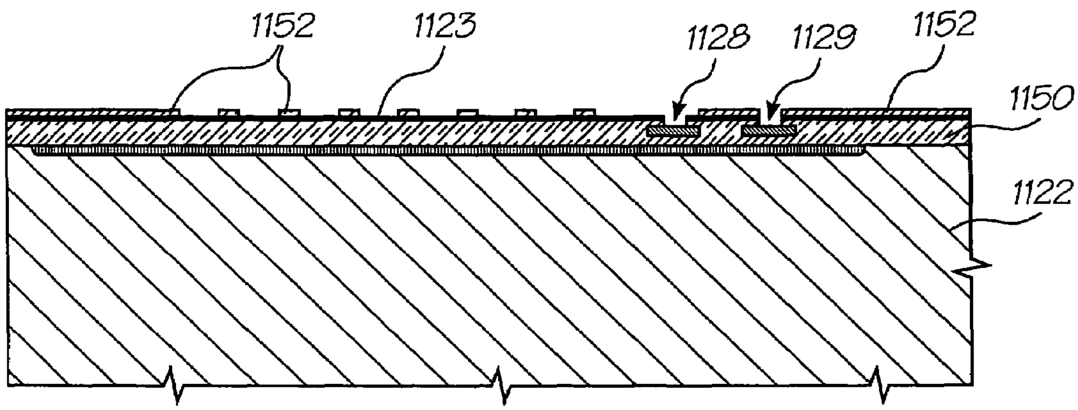

5. Etch the glass down to nitride or second level metal using Mask 2. This mask defines first layer of the fixed solenoid 1114 (See FIGS. 198-201). This step is shown in FIG. 207.

6. Deposit a thin barrier layer of Ta or TaN.

7. Deposit a seed layer of copper. Copper is used for its low resistivity (which results in higher efficiency) and its high electromigration resistance, which increases reliability at high current densities.

8. Electroplate 1 micron of copper 1153

Figure 208:
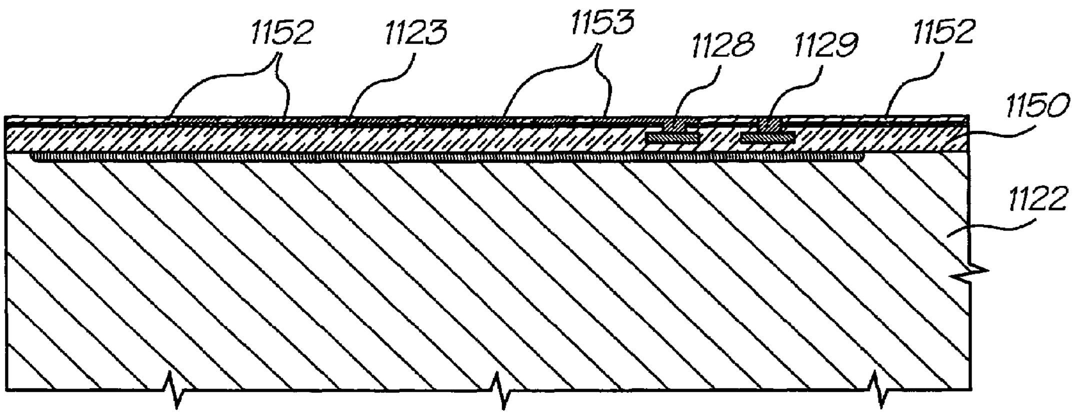

9. Planarize using CMP. Steps 2 to 9 represent a copper dual damascene process. This step is shown in FIG. 208.

10. Deposit 0.5 microns of low stress PECVD silicon nitride 1154.

Figure 209:
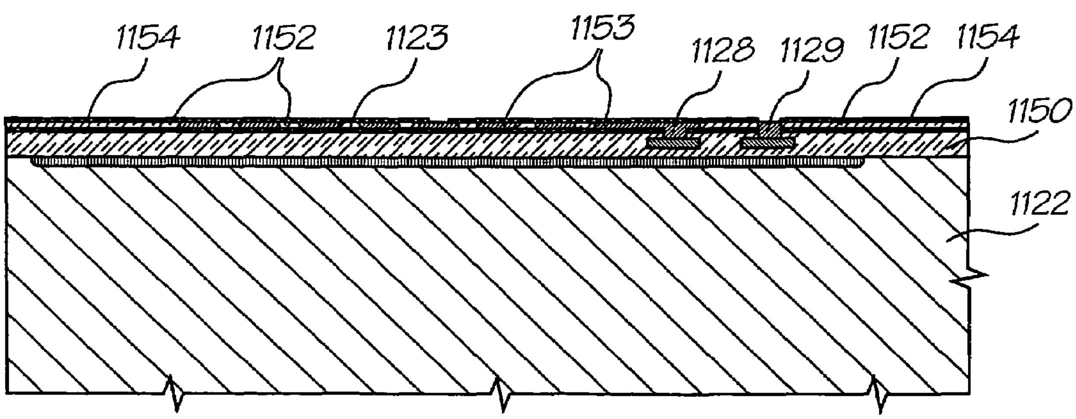

11. Etch the nitride layer using Mask 3. This mask defines the defines the vias from the second layer to the first layer of the fixed solenoid 1114. This step is shown in FIG. 209.

12. Deposit 1 micron of PECVD glass 1155.

Figure 210:
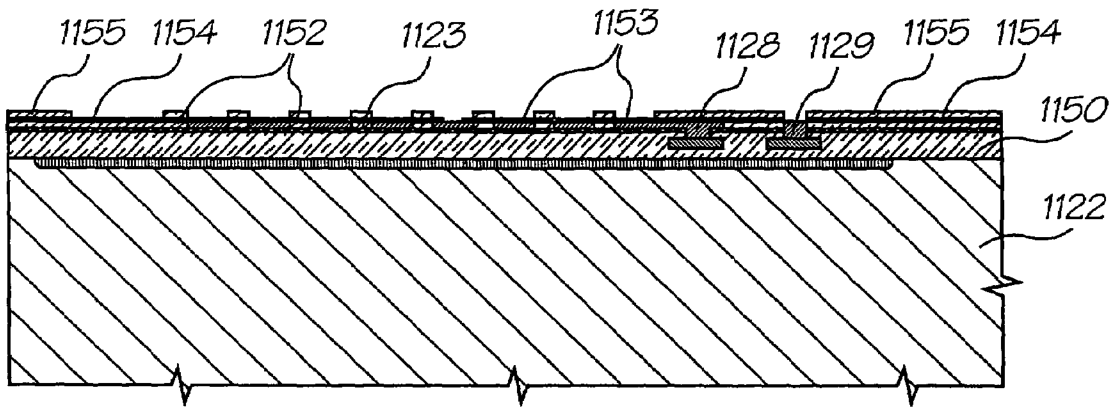

13. Etch the glass down to nitride or copper using Mask 4. This mask defines second layer of the fixed solenoid 1114. This step is shown in FIG. 210.

14. Deposit a thin barrier layer and seed layer.

15. Electroplate 1 micron of copper 1156.

Figure 211:
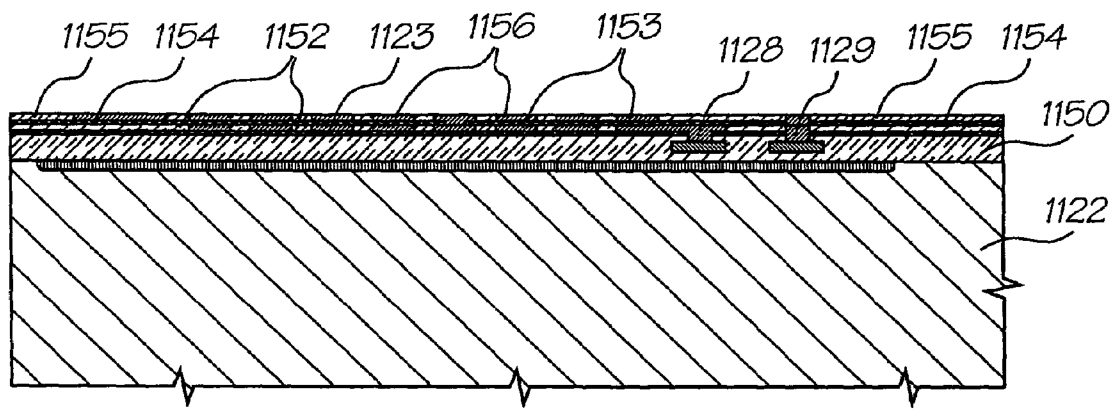

16. Planarize using CMP. Steps 10 to 16 represent a second copper dual damascene process. This step is shown in FIG. 211.

17. Deposit 0.5 microns of low stress PECVD silicon nitride 1157.

18. Deposit 0.1 microns of PTFE. This is to hydrophobize the space between the two solenoids 1114, 1115 (See FIGS. 198-201), so that when the nozzle 1110 fills with ink, this space forms an air bubble. The allows the upper solenoid 1115 to move more freely.

19. Deposit 4 microns of sacrificial material 1158. This forms the space between the two solenoids 1114, 1115.

20. Deposit 0.1 microns of low stress PECVD silicon nitride (Not shown).

Figure 212:
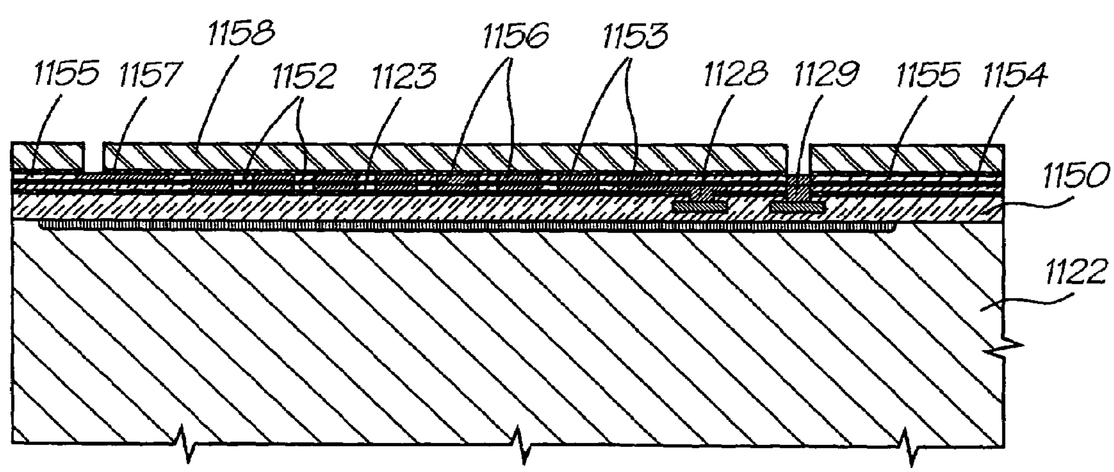

21. Etch the nitride layer, the sacrificial layer, the PTFE layer, and the nitride layer of step 17 using Mask 5. This mask defines the vias from the first layer of the moving solenoid 1115 to the second layer the fixed solenoid 1114. This step is shown in FIG. 212.

22. Deposit 1 micron of PECVD glass 1159.

Figure 213:
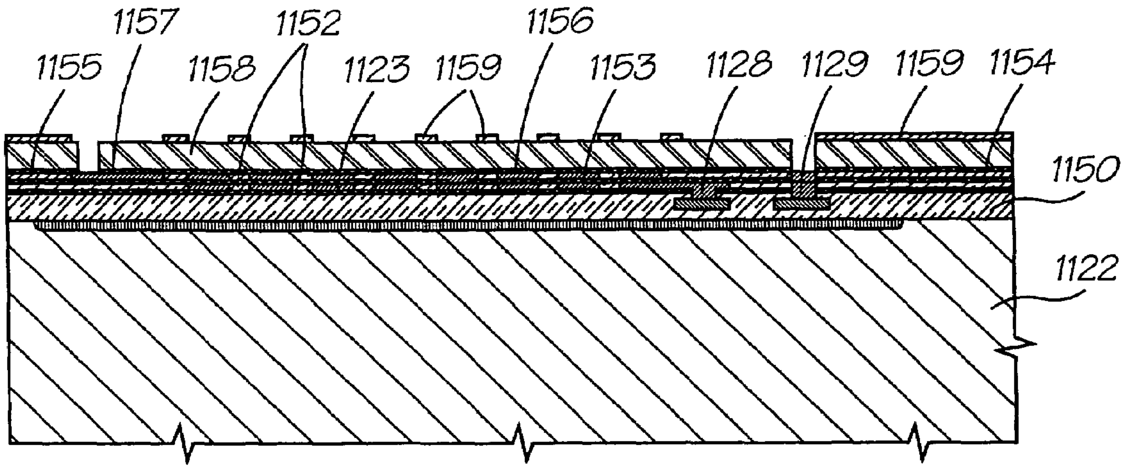

23. Etch the glass down to nitride or copper using Mask 6. This mask defines first layer of the moving solenoid This step is shown in FIG. 213.

24. Deposit a thin barrier layer and seed layer.

25. Electroplate 1 micron of copper 1160.

Figure 214:
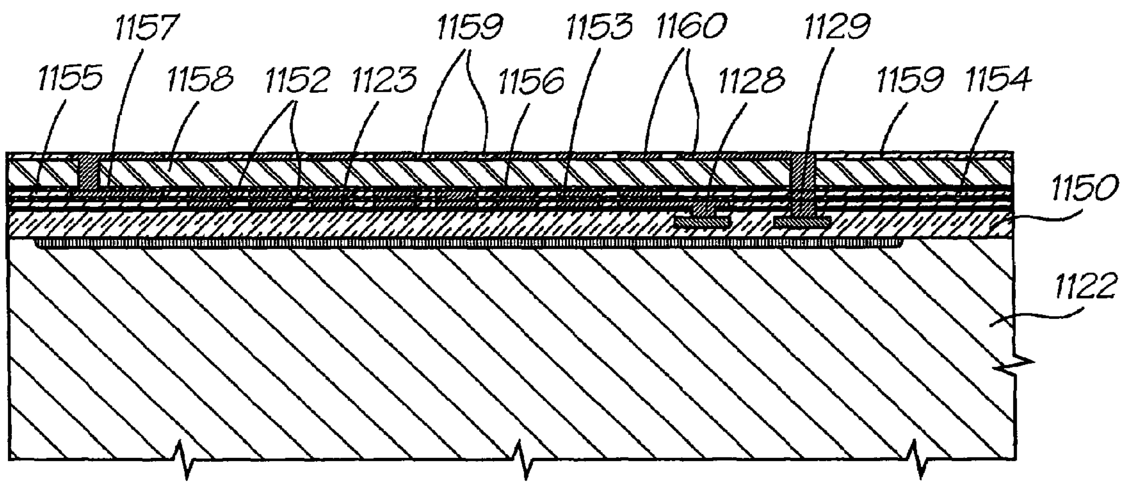

26. Planarize using CMP. Steps 20 to 26 represent a third copper dual damascene process. This step is shown in FIG. 214.

27. Deposit 0.1 microns of low stress PECVD silicon nitride 1161.

Figure 215:
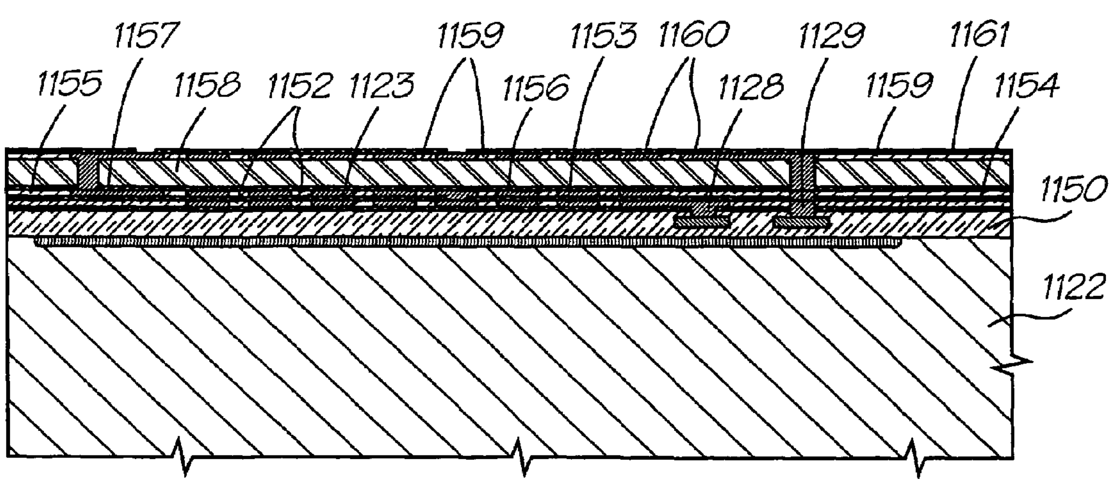

28. Etch the nitride layer using Mask 7. This mask defines the vias from the second layer the moving solenoid 1115 to the first layer of the moving solenoid. This step is shown in FIG. 215.

29. Deposit 1 micron of PECVD glass 1162.

Figure 216:
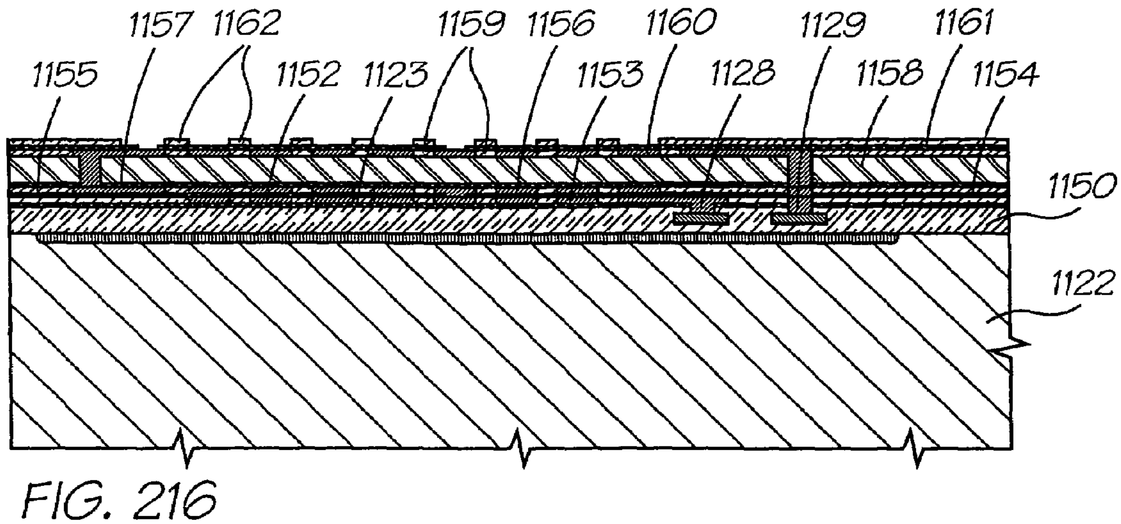

30. Etch the glass down to nitride or copper using Mask 8. This mask defines the second layer of the moving solenoid 1115. This step is shown in FIG. 216.

31. Deposit a thin barrier layer and seed layer.

32. Electroplate 1 micron of copper 1163.

Figure 217:
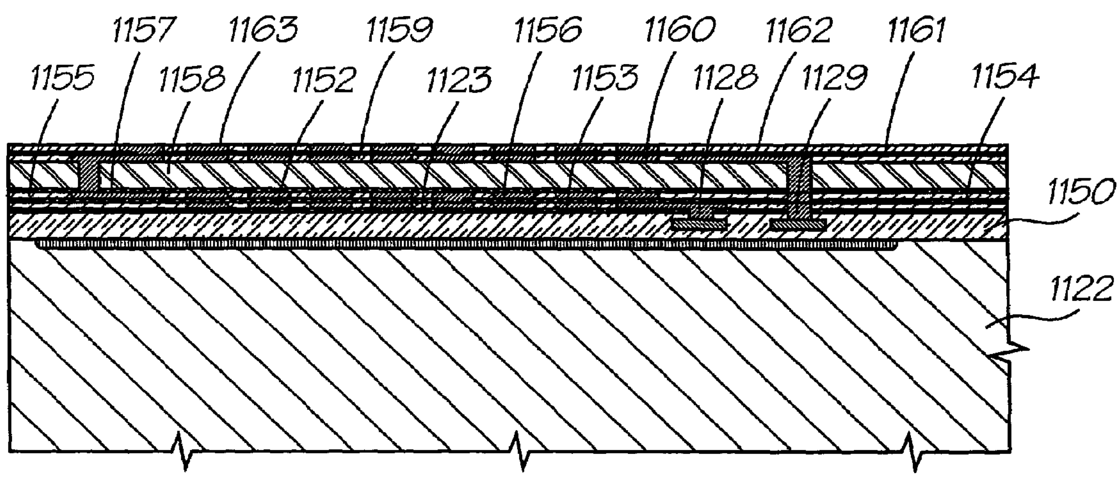

33. Planarize using CMP. Steps 27 to 33 represent a fourth copper dual damascene process. This step is shown in FIG. 217.

34. Deposit 0.1 microns of low stress PECVD silicon nitride 1164.

Figure 218:
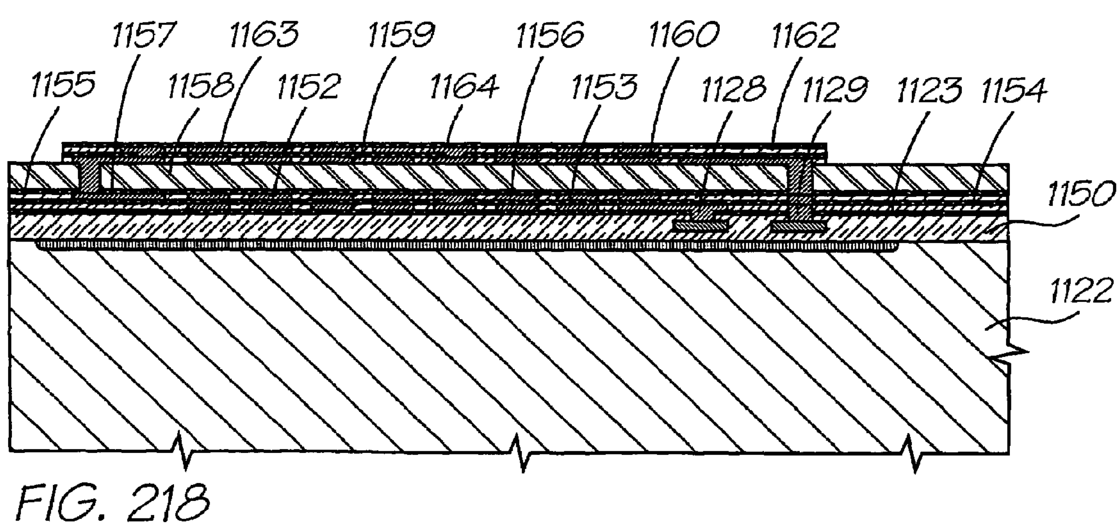

35. Etch the nitride using Mask 9. This mask defines the moving solenoid 1115, including its springs 1136-1139, and allows the sacrificial material in the space between the solenoids 1114, 1115 to be etched. It also defines the bond pads. This step is shown in FIG. 218.

36. Wafer probe. All electrical connections are complete at this point, bond pads are accessible, and the chips are not yet separated.

37. Deposit 10 microns of sacrificial material 1165.

Figure 219:
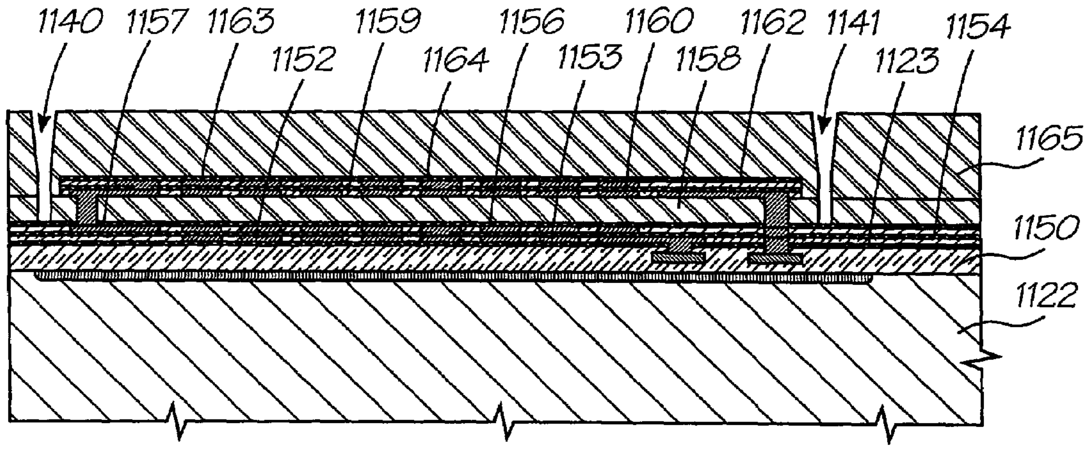

38. Etch the sacrificial material using Mask 10. This mask defines the nozzle chamber wall 1140, 1141. This step is shown in FIG. 219.

39. Deposit 3 microns of PECVD glass 1166.

Figure 220:
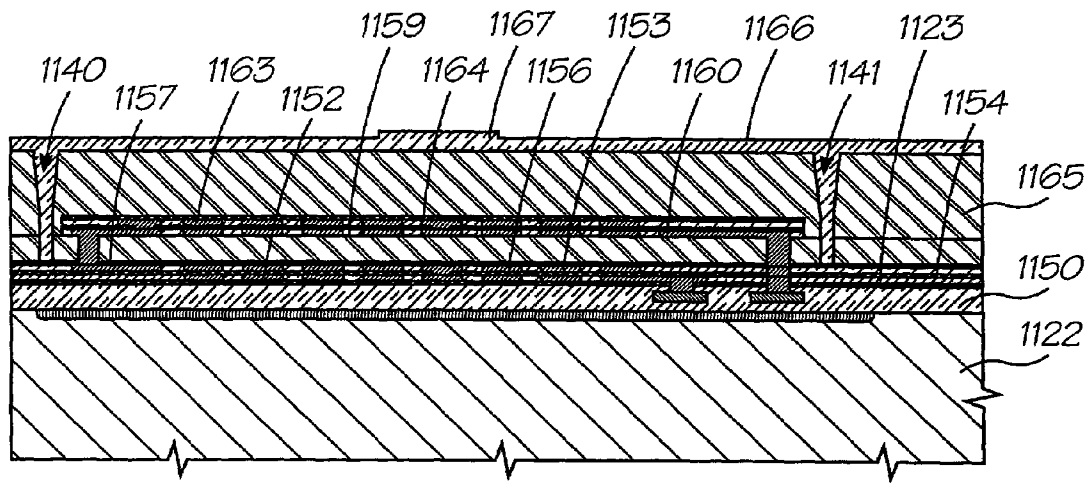

40. Etch to a depth of 1 micron using Mask 11. This mask defines the nozzle rim 1167. This step is shown in FIG. 220.

Figure 221:
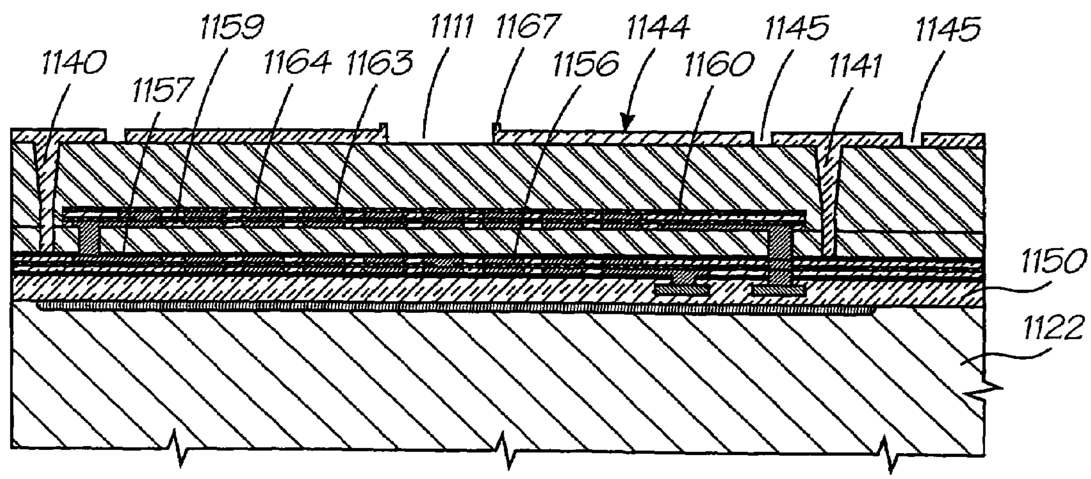

41. Etch down to the sacrificial layer using Mask 12. This mask defines the roof 1144 of the nozzle 1110 chamber, and the nozzle itself 1111. This step is shown in FIG. 221.

Figure 222:
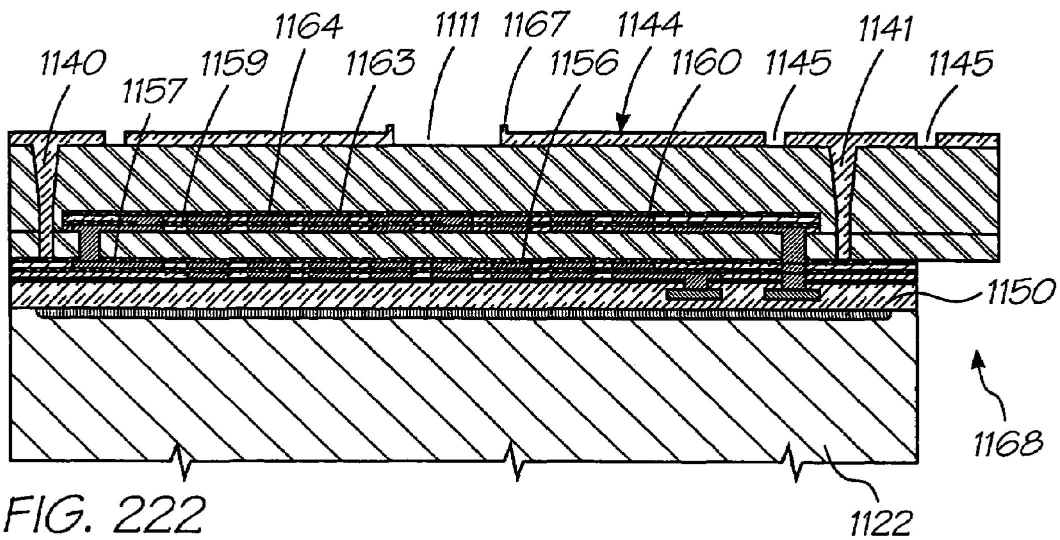

42. Back-etch completely through the silicon wafer (with, for example, an ASE Advanced Silicon Etcher from Surface Technology Systems) using Mask 7. This mask defines the ink inlets 1168 which are etched through the wafer. The wafer is also diced by this etch. This step is shown in FIG. 222.

Figure 223:
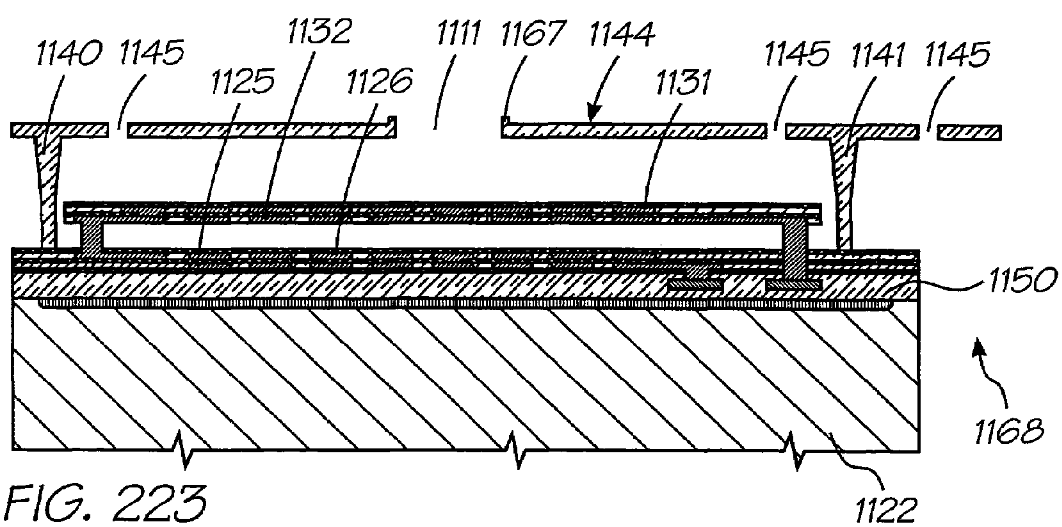

43. Etch the sacrificial material. The nozzle chambers are cleared, the actuators freed, and the chips are separated by this etch. This step is shown in FIG. 223.

44. Mount the printheads in their packaging, which may be a molded plastic former incorporating ink channels which supply the appropriate color ink to the ink inlets at the back of the wafer.

45. Connect the printheads to their interconnect systems. For a low profile connection with minimum disruption of airflow, TAB may be used. Wire bonding may also be used if the printer is to be operated with sufficient clearance to the paper.

46. Hydrophobize the front surface of the printheads.

Figure 224:
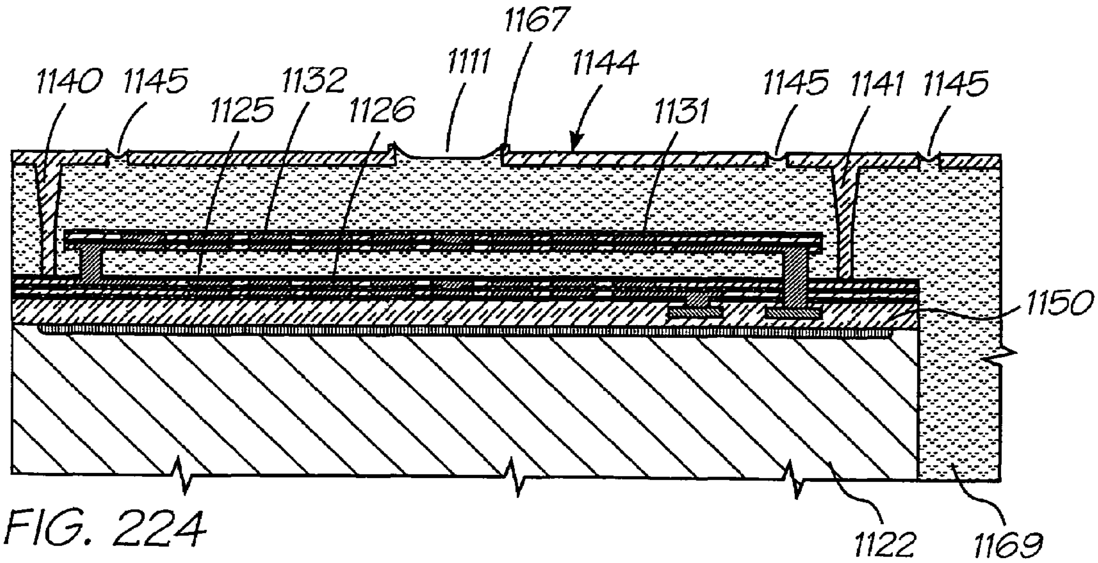

47. Fill the completed printheads with ink 1169 and test them. A filled nozzle is shown in FIG. 224.

IJ12

In a preferred embodiment, a linear stepper motor is utilized to control a plunger device. The plunger device compressing ink within a nozzle chamber so as to thereby cause the ejection of ink from the chamber on demand.

Figure 225:
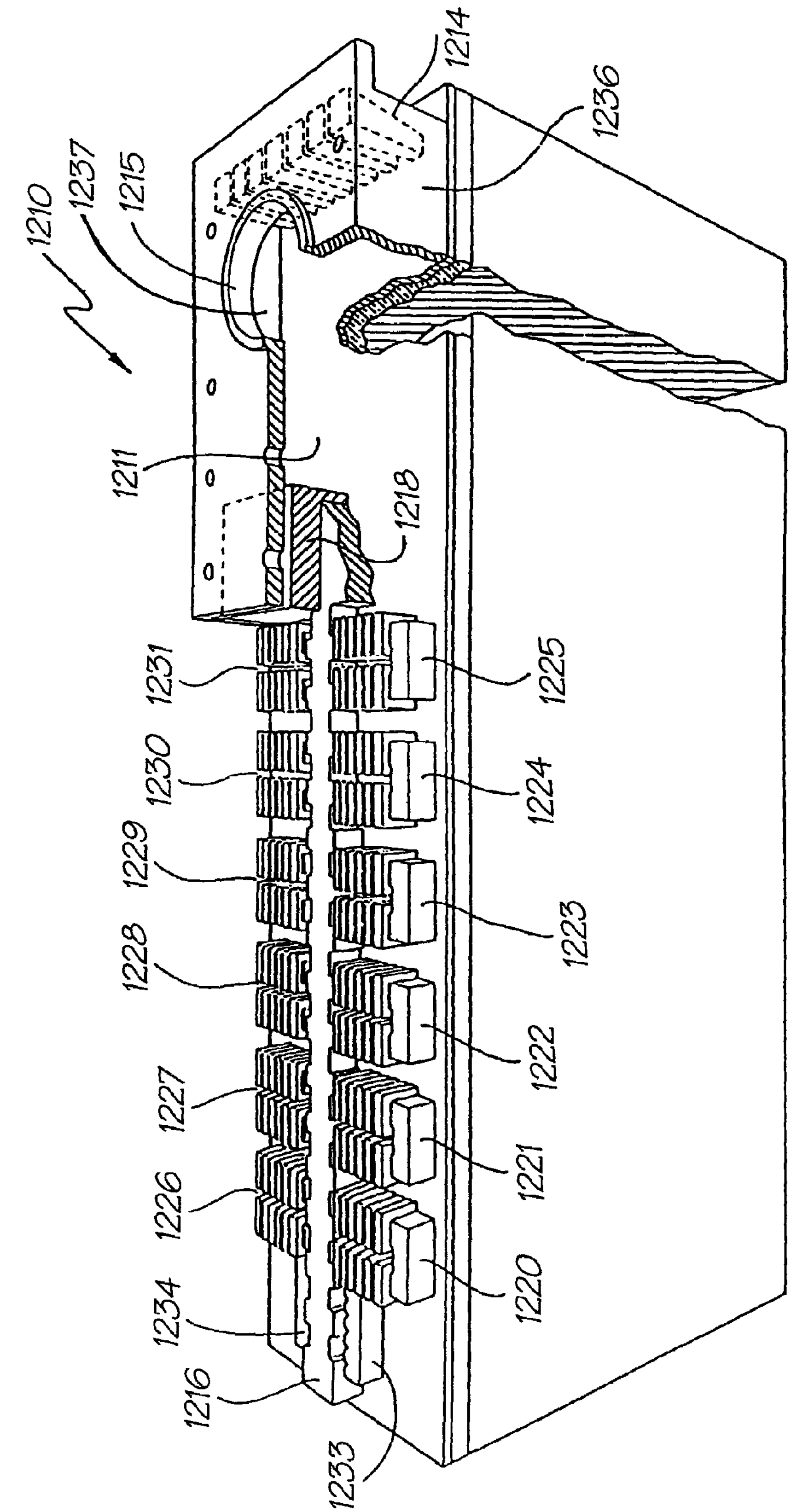
FIG. 225 is a cut-out top view of an ink jet nozzle in accordance with a preferred embodiment.

Turning to FIG. 225, there is illustrated a single nozzle arrangement 1210 as constructed in accordance with a preferred embodiment The nozzle arrangement 1210 includes a nozzle chamber 1211 into which ink flows via a nozzle chamber filter portion 1214 which includes a series of posts which filter out foreign bodies in the ink in flow. The nozzle chamber 1211 includes an ink ejection port 1215 for the ejection of ink on demand. Normally, the nozzle chamber 1211 is filled with ink.

A linear actuator 1216 is provided for rapidly compressing a nickel ferrous plunger 1218 into the nozzle chamber 1211 so as to compress the volume of ink within chamber 1211 to thereby cause ejection of drops from the ink ejection port 1215. The plunger 1218 is connected to the stepper moving pole device 1216 which is actuated by means of a three phase arrangement of electromagnets 1220 to 1231. The electromagnets are driven in three phases with electro magnets 1220, 1226, 1223 and 1229 being driven in a first phase, electromagnets 1221, 1227, 1224, 1230 being driven in a second phase and electromagnets 1222, 1228, 1225, 1231 being driven in a third phase. The electromagnets are driven in a reversible manner so as to de-actuate plunger 1218 via actuator 1216. The actuator 1216 is guided at one end by a means of guide 1233, 1234. At the other end, the plunger 1218 is coated with a hydrophobic material such as polytetrafluoroethylene (PTFE) which can form a major part of the plunger 1218. The PTFE acts to repel the ink from the nozzle chamber 1211 resulting in the creation of a membrane e.g. 1238, 1239 (See FIG. 248*a*) between the plunger 1218 and side walls e.g. 1236, 1237. The surface tension characteristics of the membranes 1238, 1239 act to balanced one another thereby guiding the plunger 1218 within the nozzle chamber. The meniscus e.g. 1238, 1239 further stops ink from flowing out of the chamber 1211 and hence the electromagnets 1220 to 1231 can be operated in normal air.

The nozzle arrangement 1210 is therefore operated to eject drops on demand by means of activating the actuator 1216 by appropriately synchronised driving of electromagnets 1220 to 1231. The actuation of the actuator 1216 results in the plunger 1218 moving towards the nozzle ink ejection port 1215 thereby causing ink to be ejected from the port 1215.

Subsequently, the electromagnets are driven in reverse thereby moving the plunger in an opposite direction resulting in the in flow of ink from an ink supply connected to the ink inlet port 1214.

Preferably, multiple ink nozzle arrangements 1210 can be constructed adjacent to one another to form a multiple nozzle ink ejection mechanism. The nozzle arrangements 1210 are preferably constructed in an array print head constructed on a single silicon wafer which is subsequently diced in accordance with requirements. The diced print heads can then be interconnected to an ink supply which can comprise a through chip ink flow or ink flow from the side of a chip.

Figure 226:
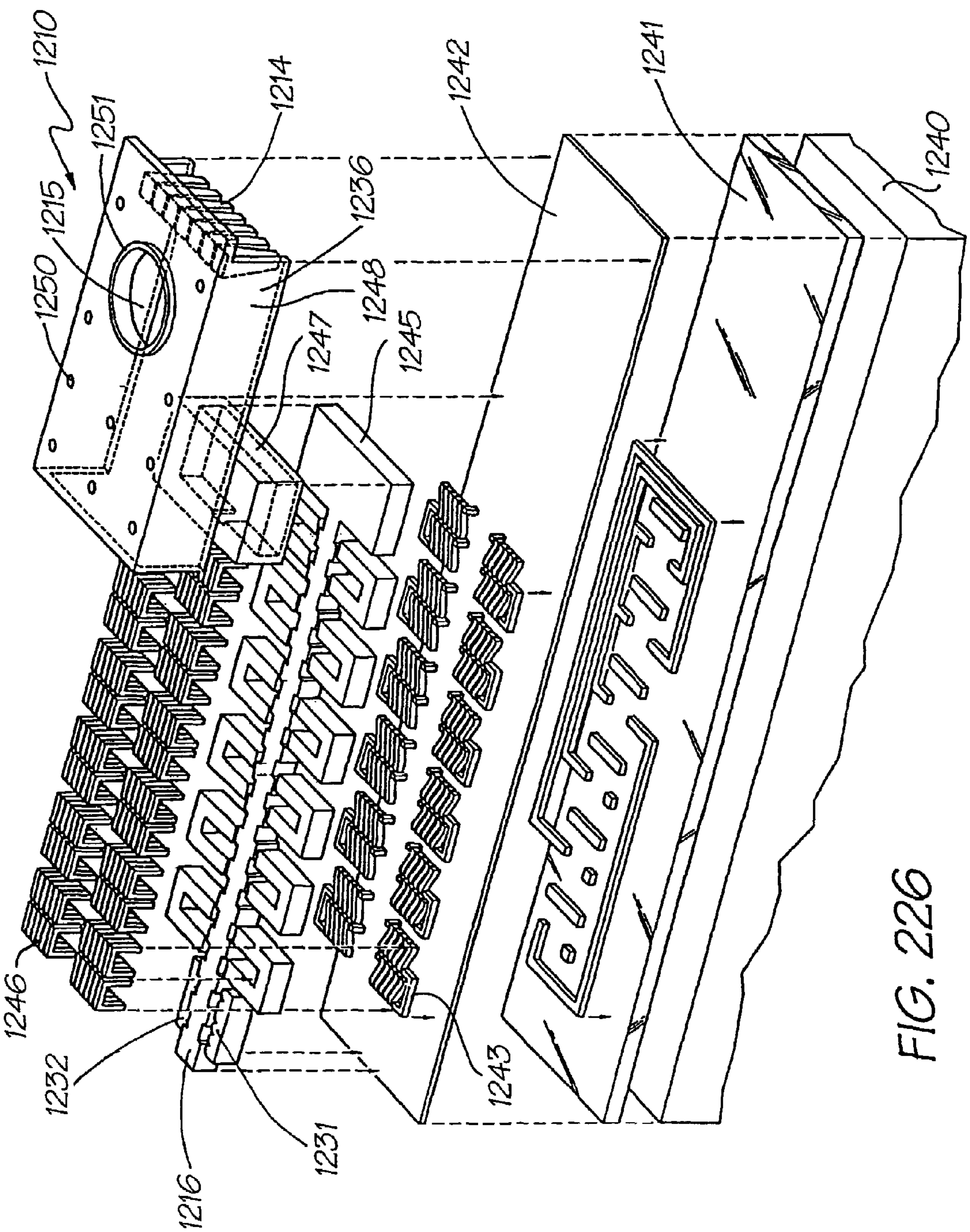
FIG. 226 is an exploded perspective view illustrating the construction of a single ink jet nozzle in accordance with a preferred embodiment.

Turning now to FIG. 226, there is shown an exploded perspective of the various layers of the nozzle arrangement 1210. The nozzle arrangement can be constructed on top of a silicon wafer 1240 which has a standard electronic circuitry layer such as a two level metal CMOS layer 1241. The two metal CMOS provides the drive and control circuitry for the ejection of ink from the nozzles by interconnection of the electromagnets to the CMOS layer. On top of the CMOS layer 1241 is a nitride passivation layer 1242 which passivates the lower layers against any ink erosion in addition to any etching of the lower CMOS glass layer should a sacrificial etching process be used in the construction of the nozzle arrangement 1210.

On top of the nitride layer 1242 is constructed various other layers. The wafer layer 1240, the CMOS layer 1241 and the nitride passivation layer 1242 are constructed with the appropriate fires for interconnecting to the above layers. On top of the nitride layer 1242 is constructed a bottom copper layer 1243 which interconnects with the CMOS layer 1241 as appropriate. Next, a nickel ferrous layer 1245 is constructed which includes portions for the core of the electromagnets and the actuator 1216 and guides 1231, 1232. On top of the NiFe layer 1245 is constructed a second copper layer 1246 which forms the rest of the electromagnetic device. The copper layer 1246 can be constructed using a dual damascene process. Next a PTFE layer 1247 is laid down followed by a nitride layer 1248 which includes the side filter portions and side wall portions of the nozzle chamber. In the top of the nitride layer 1248, the ejection port 1215 and the rim 1251 are constructed by means of etching. In the top of the nitride layer 1248 is also provided a number of apertures 1250 which are provided for the sacrificial etching of any sacrificial material used in the construction of the various lower layers including the nitride layer 1248.

It will be understood by those skilled in the art of construction of micro-electro-mechanical systems (MEMS) that the various layers 1243, 1245 to 1248 can be constructed by means of utilizing a sacrificial material to deposit the structure of various layers and subsequent etching away of the sacrificial material as to release the structure of the nozzle arrangement 1210.

Figure 227:
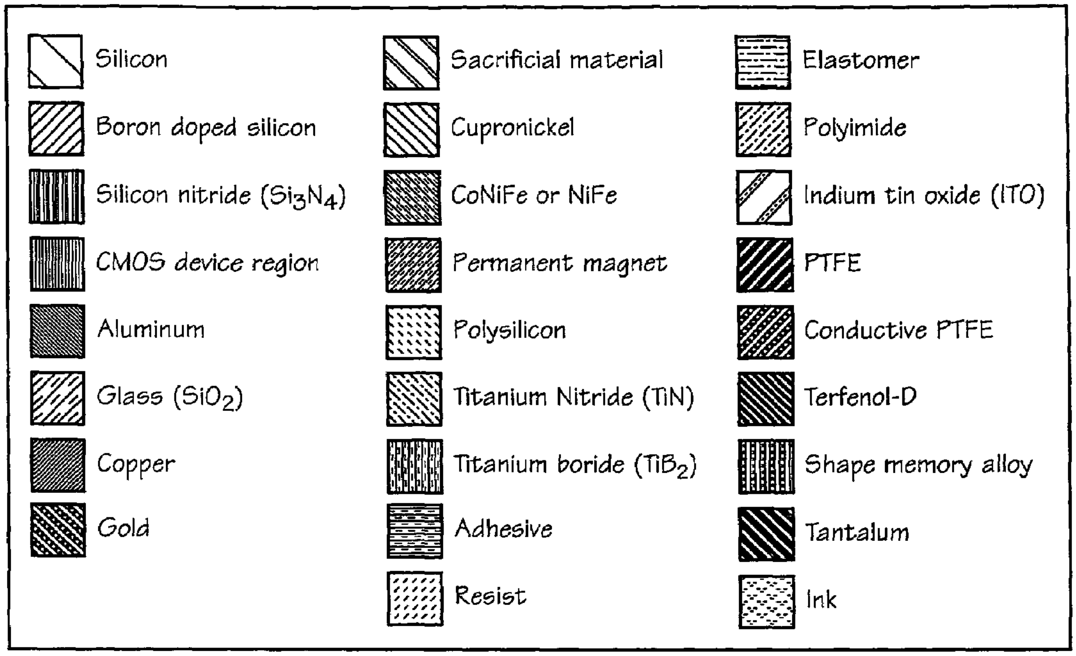
FIG. 227 provides a legend of the materials indicated in FIGS. 228 to 248.
Figure 228:
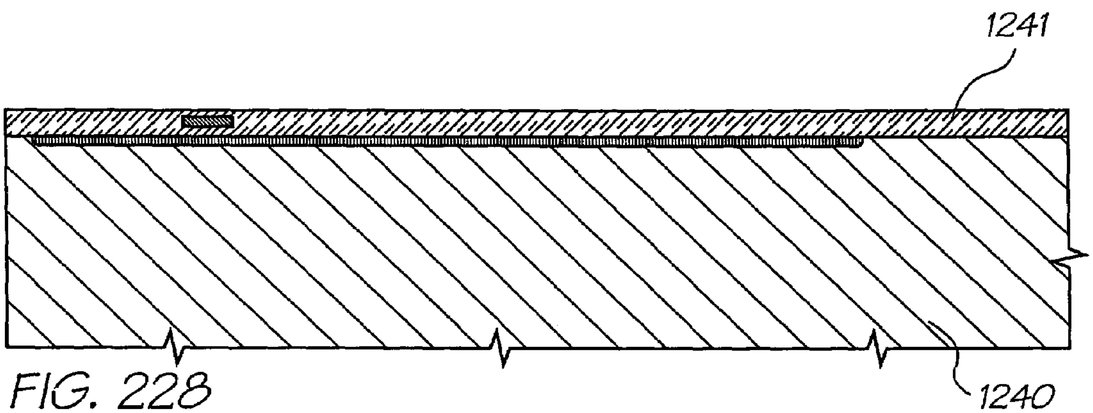
FIG. 228 to FIG. 248 illustrate sectional views of the manufacturing steps in one form of construction of an ink jet printhead nozzle.

One form of detailed manufacturing process which can be used to fabricate monolithic ink jet print heads operating in accordance with the principles taught by the present embodiment can proceed utilizing the following steps:

1. Using a double sided polished wafer 1240, complete drive transistors, data distribution, and timing circuits using a 0.5 micron, one poly, 2 metal CMOS process 1241. This step is shown in FIG. 228. For clarity, these diagrams may not be to scale, and may not represent a cross section though any single plane of the nozzle. FIG. 227 is a key to representations of various materials in these manufacturing diagrams, and those of other cross referenced ink jet configurations.

2. Deposit 1 micron of sacrificial material 1260.

Figure 229:
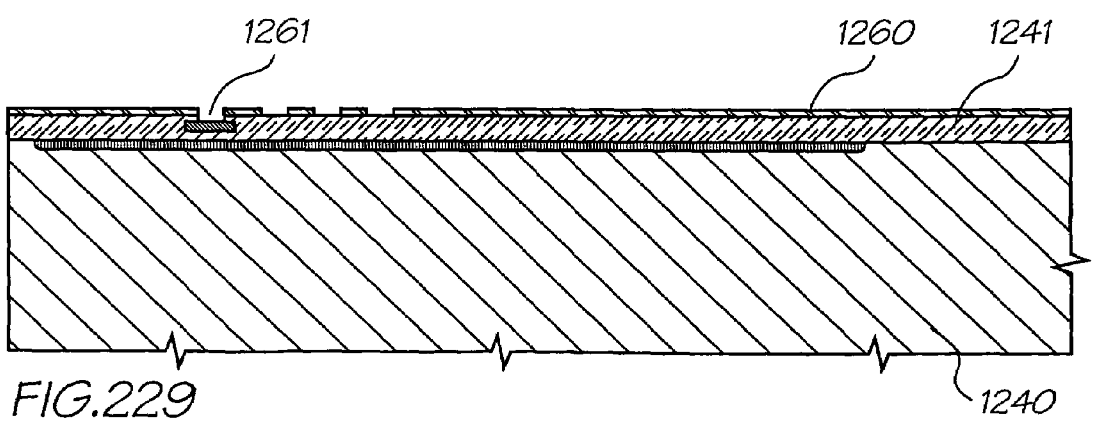

3. Etch the sacrificial material and the CMOS oxide layers down to second level metal using Mask 1. This mask defines the contact vias 1261 from the second level metal electrodes to the solenoids. This step is shown in FIG. 229.

4. Deposit a barrier layer of titanium nitride (TiN) and a seed layer of copper.

Figure 230:
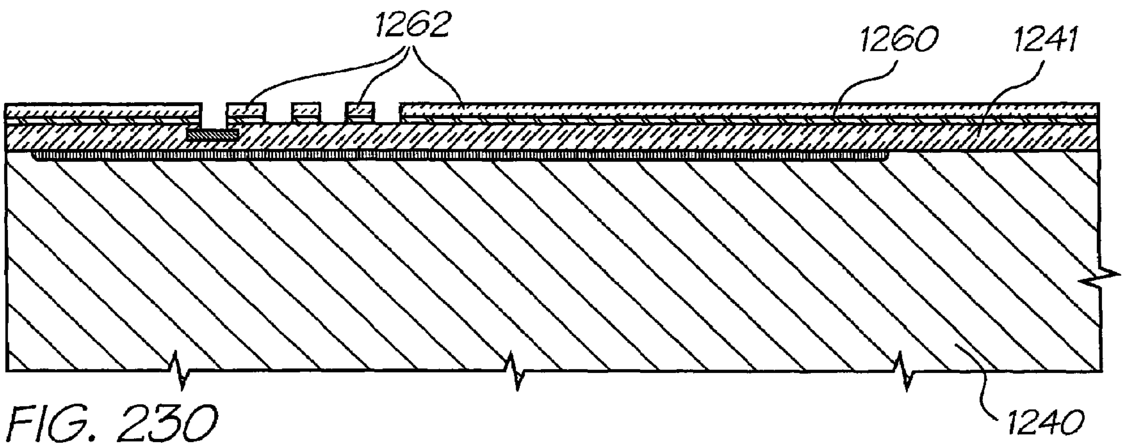

5. Spin on 2 microns of resist 1262, expose with Mask 2, and develop. This mask defines the lower side of the solenoid square helix. The resist acts as an electroplating mold. This step is shown in FIG. 230.

6. Electroplate 1 micron of copper 1263. Copper is used for its low resistivity (which results in higher efficiency) and its high electromigration resistance, which increases reliability at high current densities.

Figure 231:
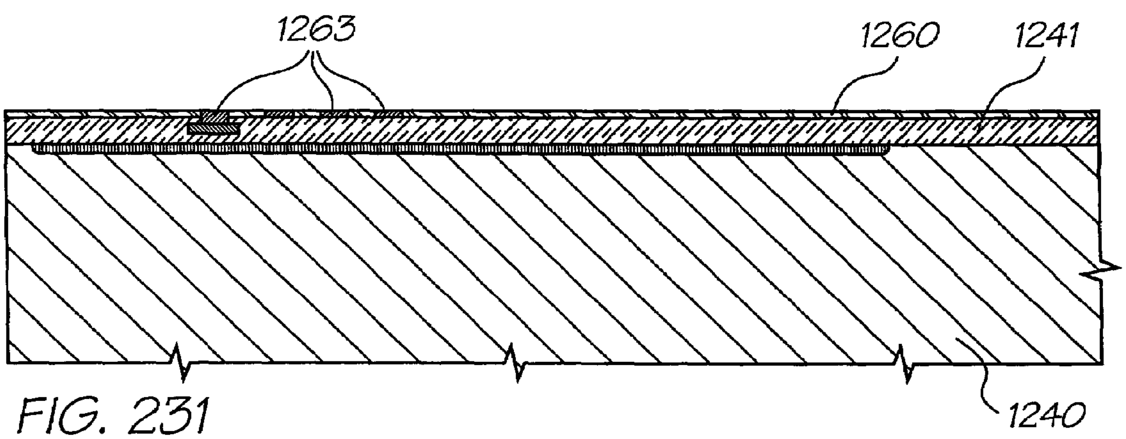

7. Strip the resist and etch the exposed barrier and seed layers. This step is shown in FIG. 231.

8. Deposit 0.1 microns of silicon nitride.

9. Deposit a seed layer of cobalt nickel iron alloy. CoNiFe is chosen due to a high saturation flux density of 2 Tesla, and a low coercivity. [Osaka, Tetsuya et al, A soft magnetic CoNiFe film with high saturation magnetic flux density, Nature 392, 796-798 (1998)].

Figure 232:
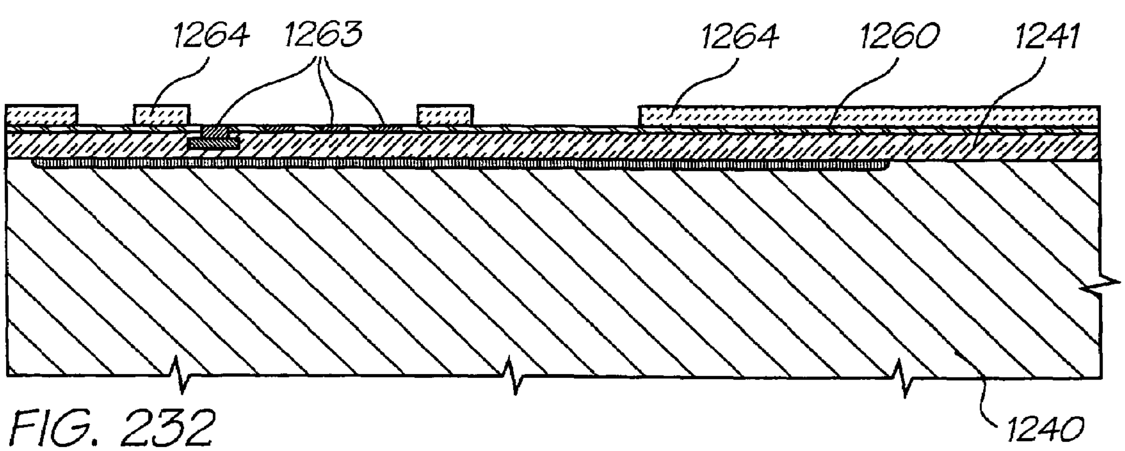

10. Spin on 3 microns of resist 1264, expose with Mask 3, and develop. This mask defines all of the soft magnetic parts, being the fixed magnetic pole of the solenoids, the moving poles of the linear actuator, the horizontal guides, and the core of the ink plunger. The resist acts as an electroplating mold. This step is shown in FIG. 232.

Figure 233:
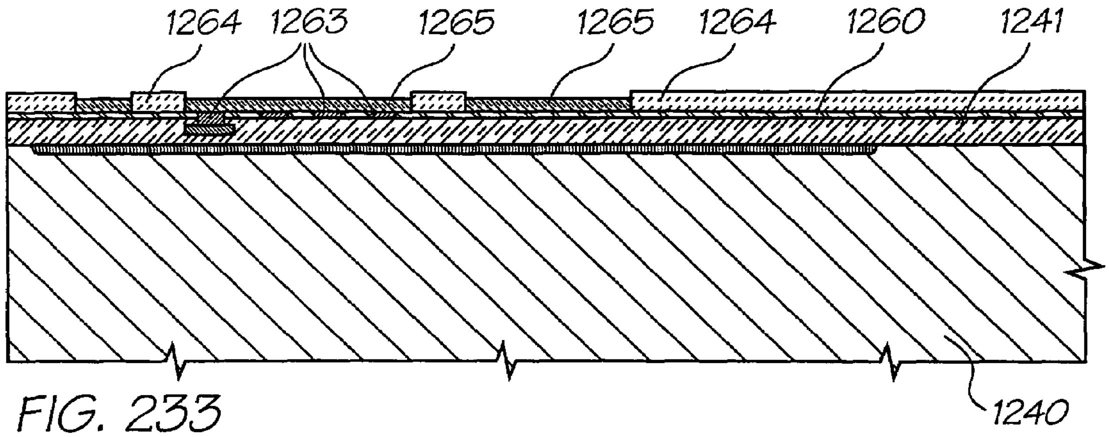

11. Electroplate 2 microns of CoNiFe 1265. This step is shown in FIG. 233.

Figure 234:
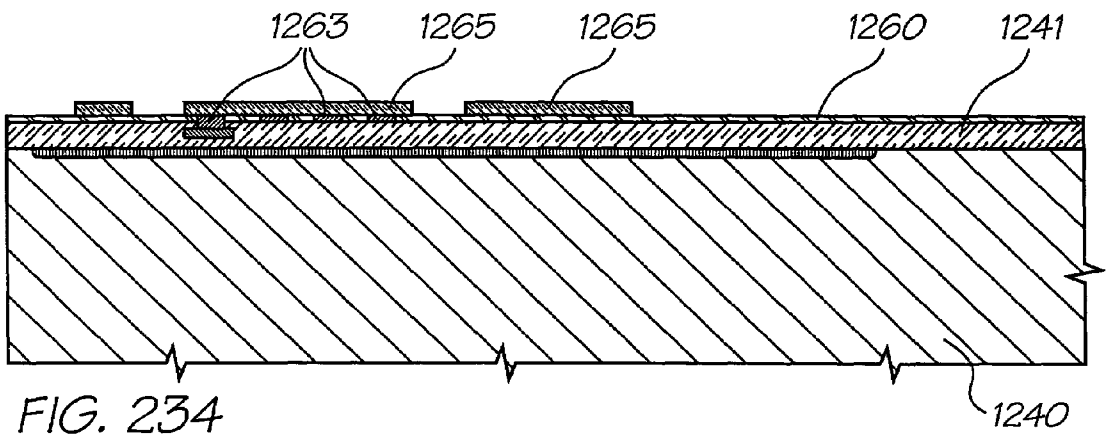

12. Strip the resist and etch the exposed seed layer. This step is shown in FIG. 234.

13. Deposit 0.1 microns of silicon nitride ($Si_3N_4$) (not shown).

Figure 235:
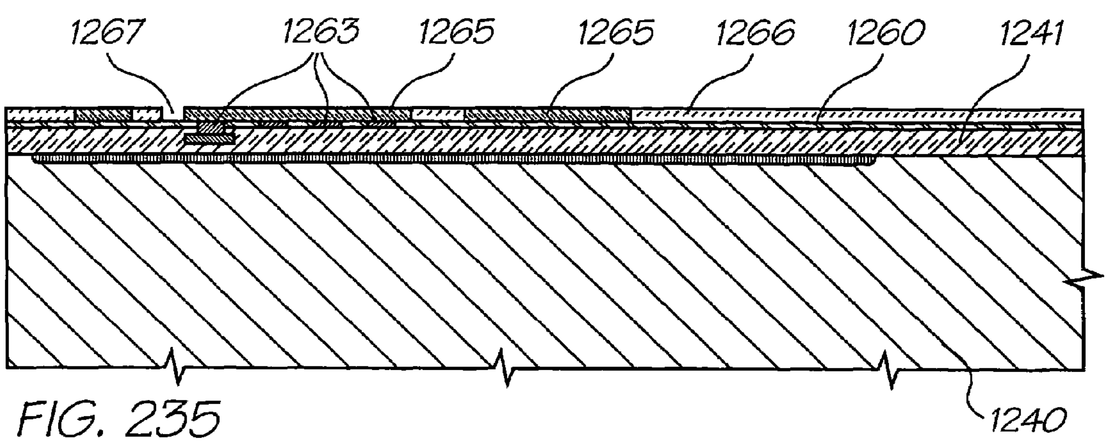

14. Spin on 2 microns of resist 1266, expose with Mask 4, and develop. This mask defines the solenoid vertical wire segments 1267, for which the resist acts as an electroplating mold. This step is shown in FIG. 235.

15. Etch the nitride down to copper using the Mask 4 resist.

Figure 236:
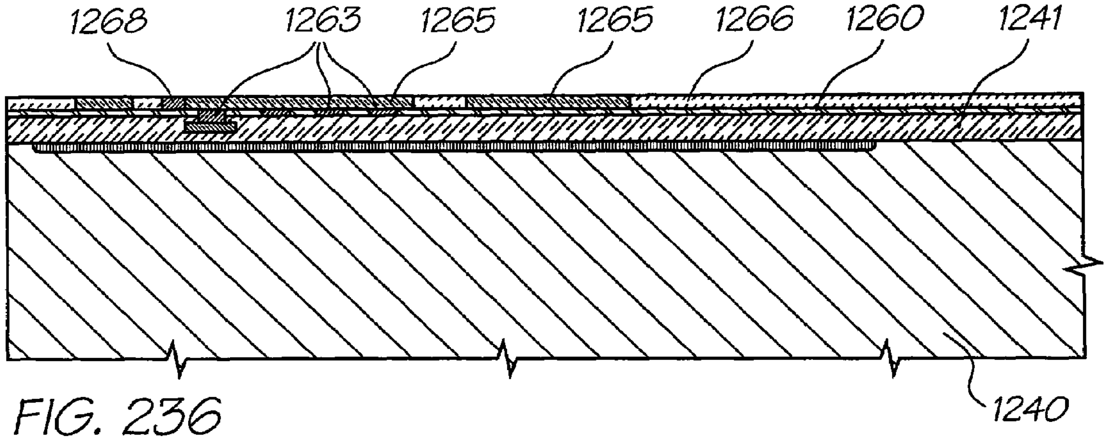

16. Electroplate 2 microns of copper 1268. This step is shown in FIG. 236.

17. Deposit a seed layer of copper.

Figure 237:
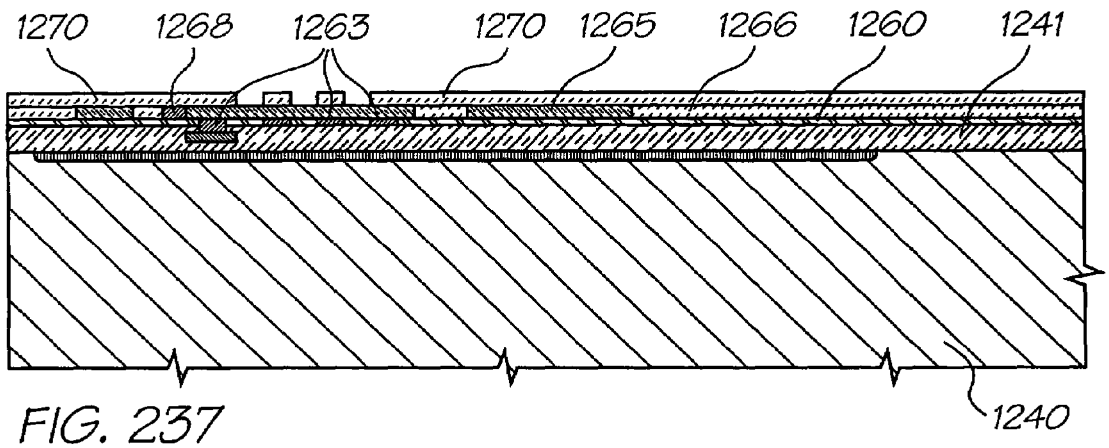

18. Spin on 2 microns of resist 1270, expose with Mask 5, and develop. This mask defines the upper side of the solenoid square helix. The resist acts as an electroplating mold. This step is shown in FIG. 237.

Figure 238:
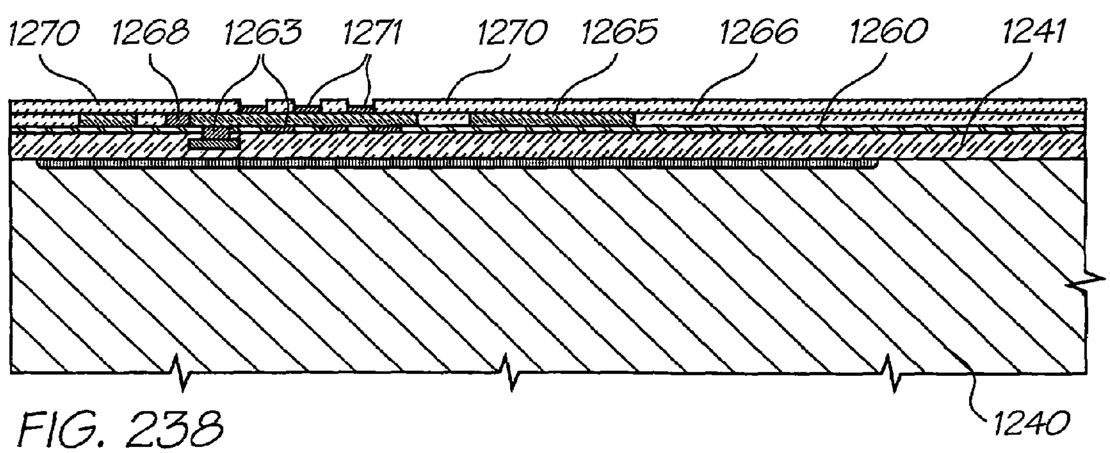

19. Electroplate 1 micron of copper 1271. This step is shown in FIG. 238.

Figure 239:
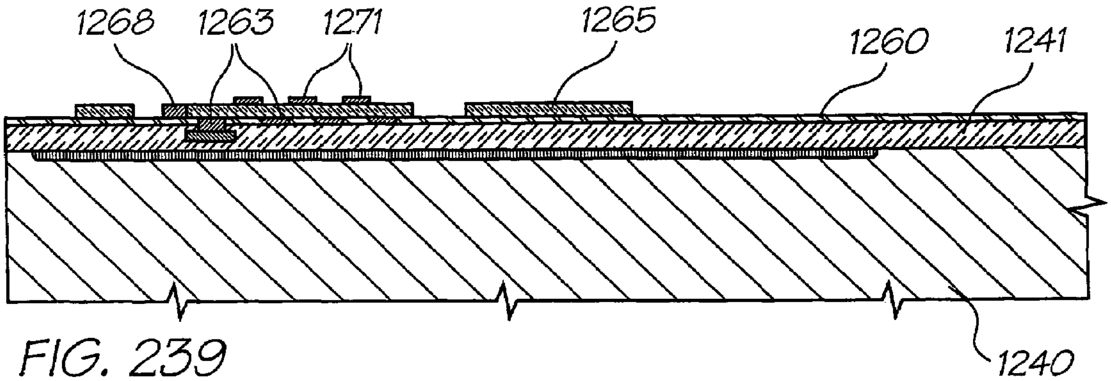

20. Strip the resist and etch the exposed copper seed layer, and strip the newly exposed resist This step is shown in FIG. 239.

21. Open the bond pads using Mask 6.

22. Wafer probe. All electrical connections are complete at this point, bond pads are accessible, and the chips are not yet separated.

23. Deposit 5 microns of PTFE 1272.

Figure 240:
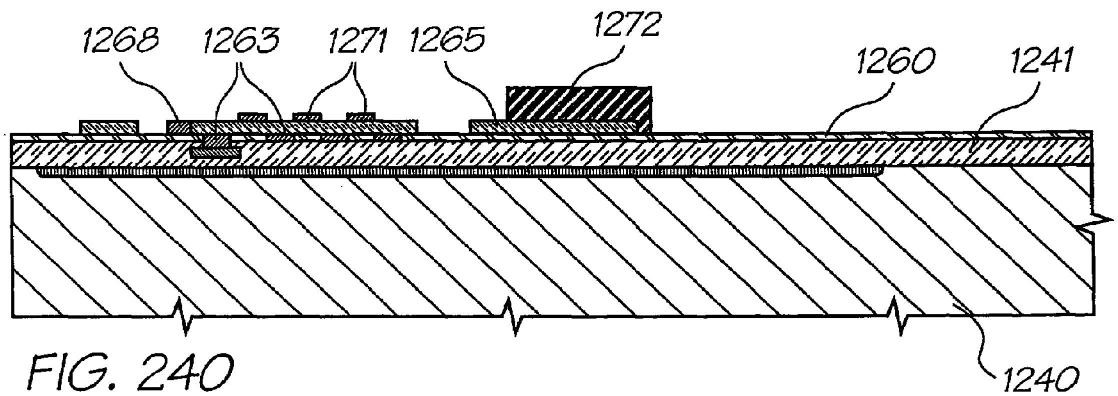

24. Etch the PTFE down to the sacrificial layer using Mask 7. This mask defines the ink plunger. This step is shown in FIG. 240.

Figure 241:
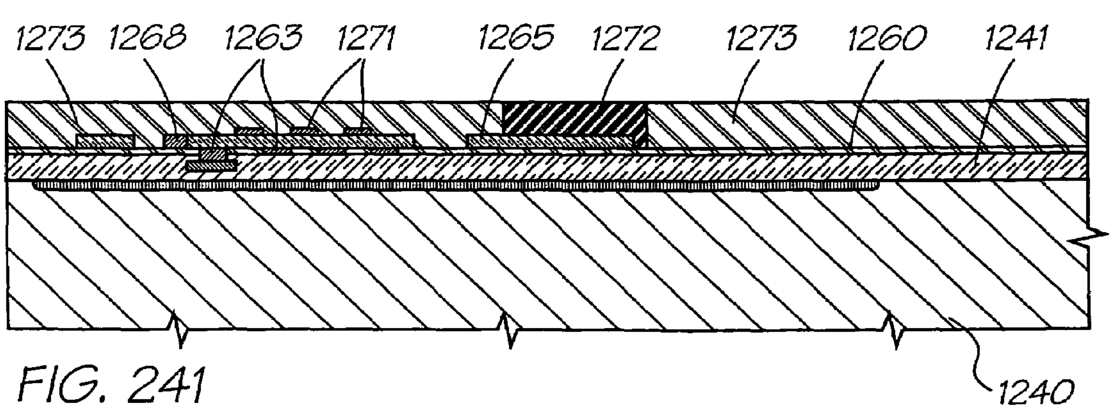

25. Deposit 8 microns of sacrificial material 1273. Planarize using CMP to the top of the PTFE ink pusher. This step is shown in FIG. 241.

Figure 242:
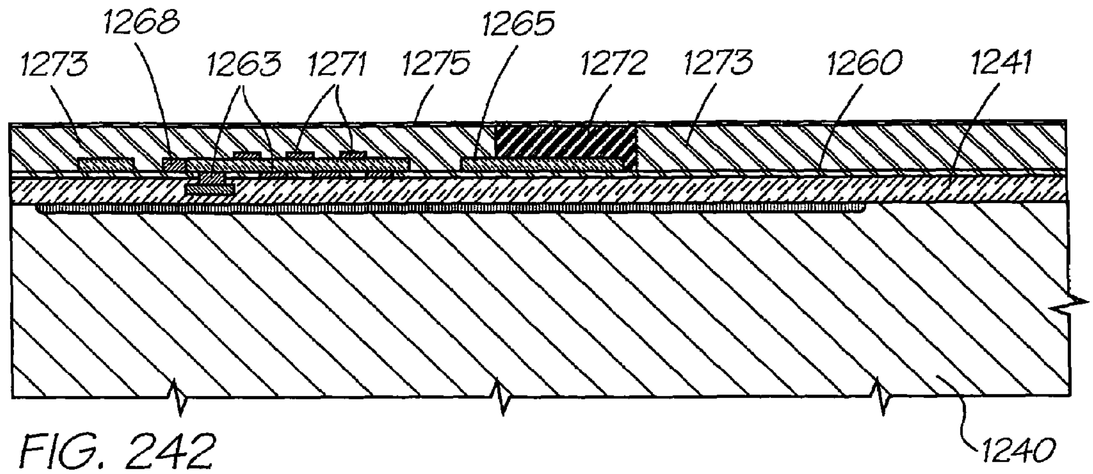

26. Deposit 0.5 microns of sacrificial material 1275. This step is shown in FIG. 242.

Figure 243:
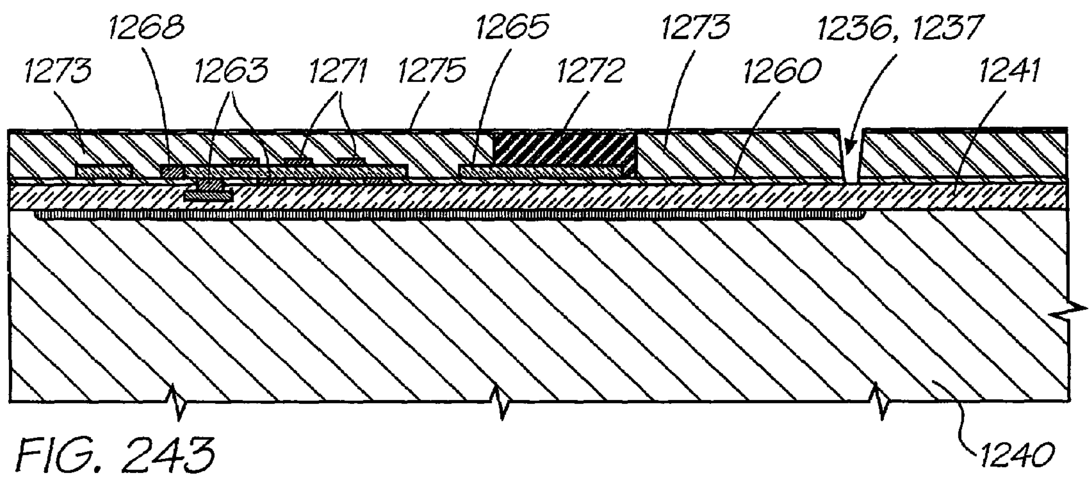

27. Etch all layers of sacrificial material using Mask 8. This mask defines the nozzle chamber wall 1236, 1237. This step is shown in FIG. 243.

28. Deposit 3 microns of PECVD glass 1276.

Figure 244:
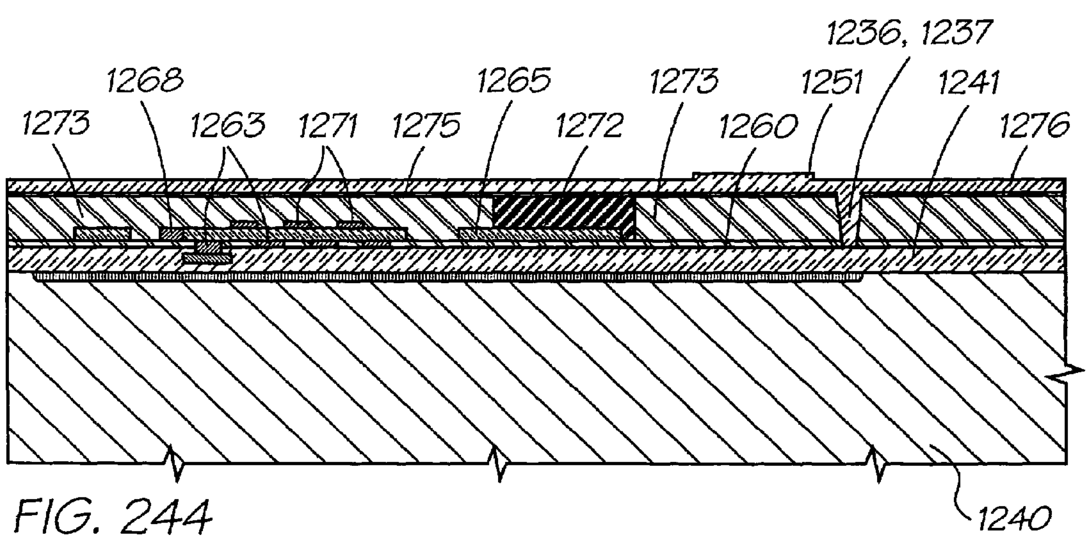

29. Etch to a depth of (approx.) 1 micron using Mask 9. This mask defines the nozzle rim 1251. This step is shown in FIG. 244.

Figure 245:
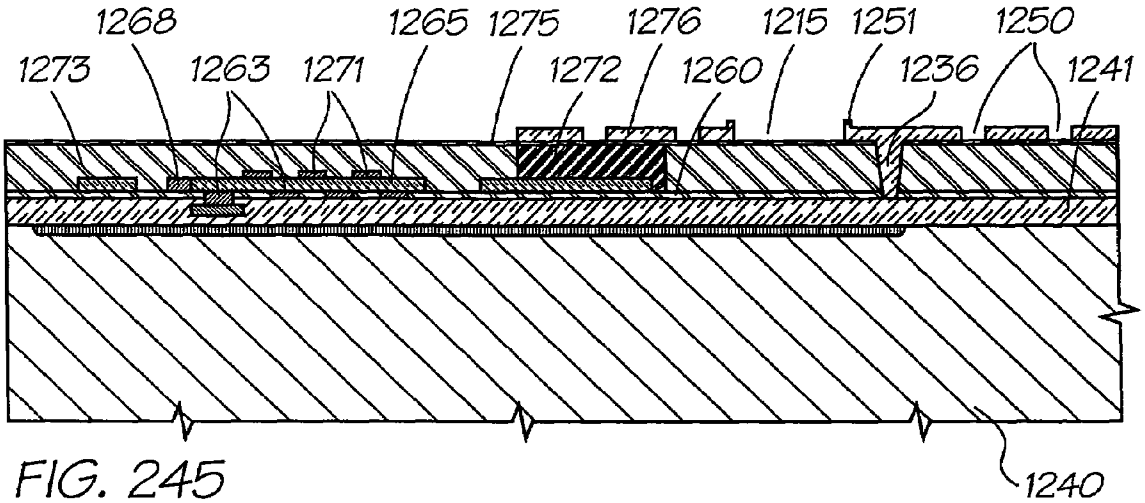

30. Etch down to the sacrificial layer using Mask 10. This mask defines the roof of the nozzle chamber, the nozzle 1215, and the sacrificial etch access holes 1250. This step is shown in FIG. 245.

Figure 246:
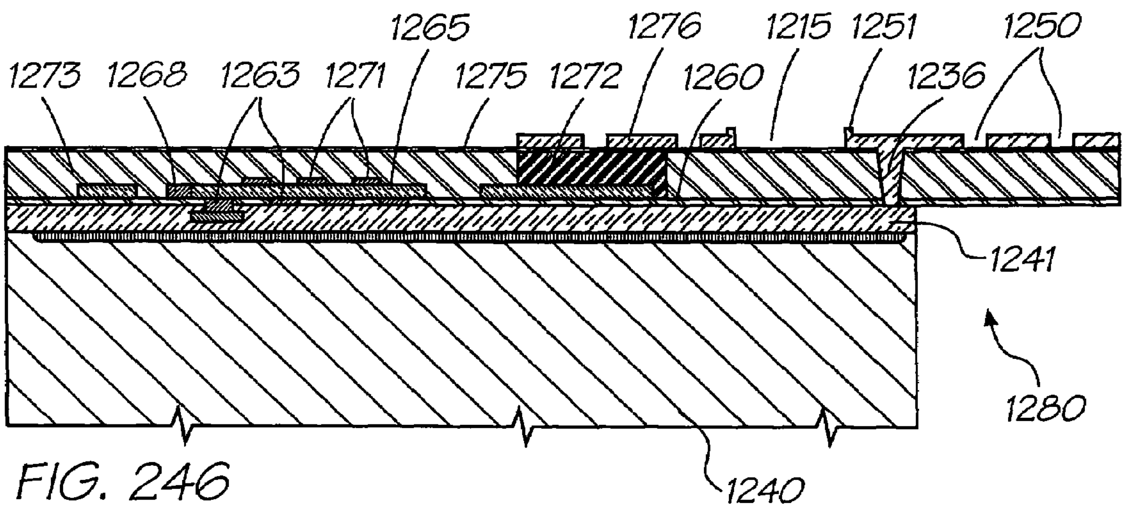

31. Back-etch completely through the silicon wafer (with, for example, an ASE Advanced Silicon Etcher from Surface Technology Systems) using Mask 11. Continue the back-etch through the CMOS glass layers until the sacrificial layer is reached. This mask defines the ink inlets 1280 which are etched through the wafer. The wafer is also diced by this etch. This step is shown in FIG. 246.

Figure 247:
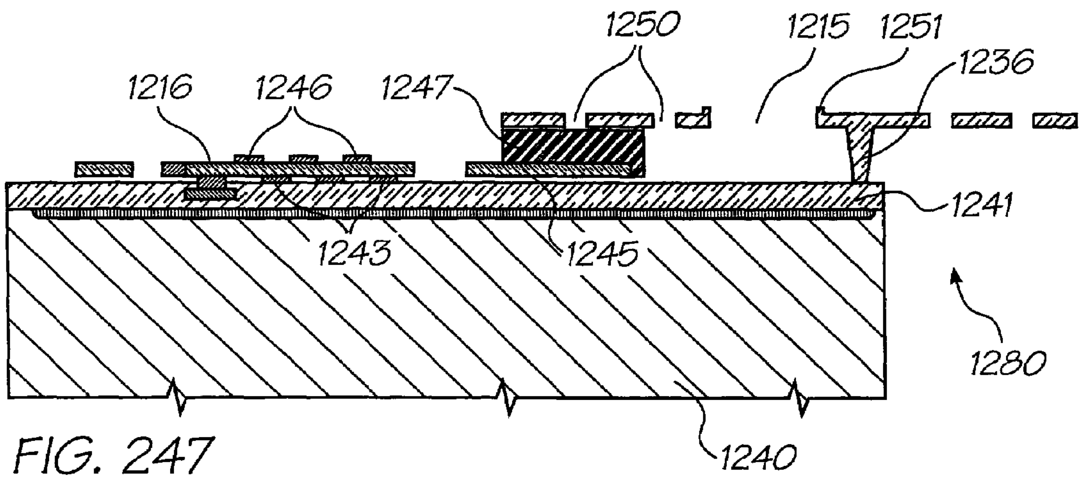

32. Etch the sacrificial material. The nozzle chambers are cleared, the actuators freed, and the chips are separated by this etch This step is shown in FIG. 247.

33. Mount the printheads in their packaging, which may be a molded plastic former incorporating ink channels which supply the appropriate color ink to the ink inlets at the back of the wafer. The package also includes a piezoelectric actuator attached to the rear of the ink channels. The piezoelectric actuator provides the oscillating ink pressure required for the ink jet operation.

34. Connect the printheads to their interconnect systems. For a low profile connection with minimum disruption of airflow, TAB may be used. Wire bonding may also be used if the printer is to be operated with sufficient clearance to the paper.

35. Hydrophobize the front surface of the printheads.

Figure 248:
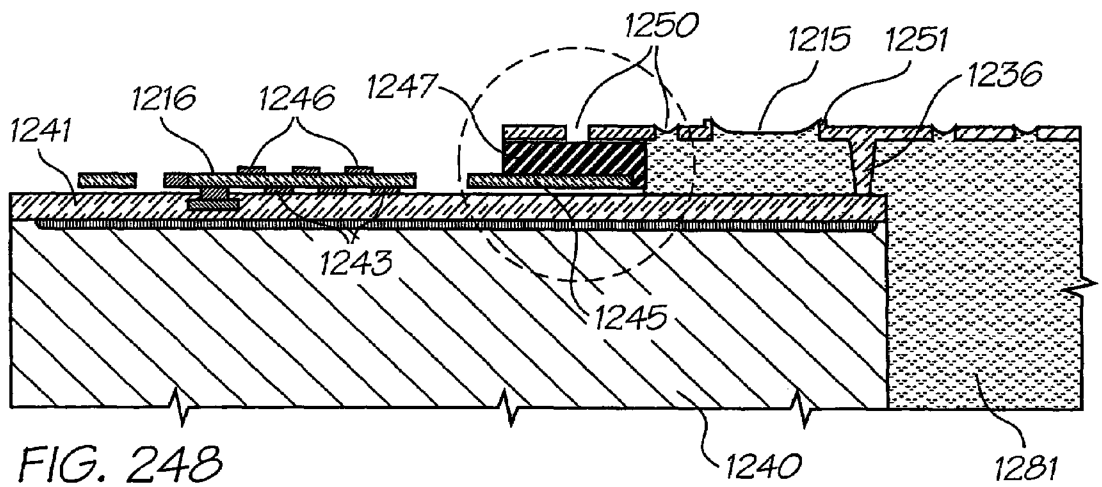
Figure 248A:
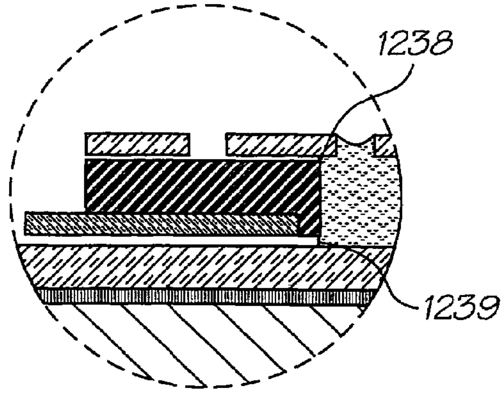

36. Fill the completed printheads with ink 1281 and test them. A filled nozzle is shown in FIG. 248.

IJ13

In a preferred embodiment, an ink jet nozzle chamber is provided having a shutter mechanism which open and closes over a nozzle chamber. The shutter mechanism includes a ratchet drive which slides open and close. The ratchet drive is driven by a gearing mechanism which in turn is driven by a drive actuator which is activated by passing an electric current through the drive actuator in a magnetic field. The actuator force is "geared down" so as to drive a ratchet and pawl mechanism to thereby open and shut the shutter over a nozzle chamber.

Figure 249:
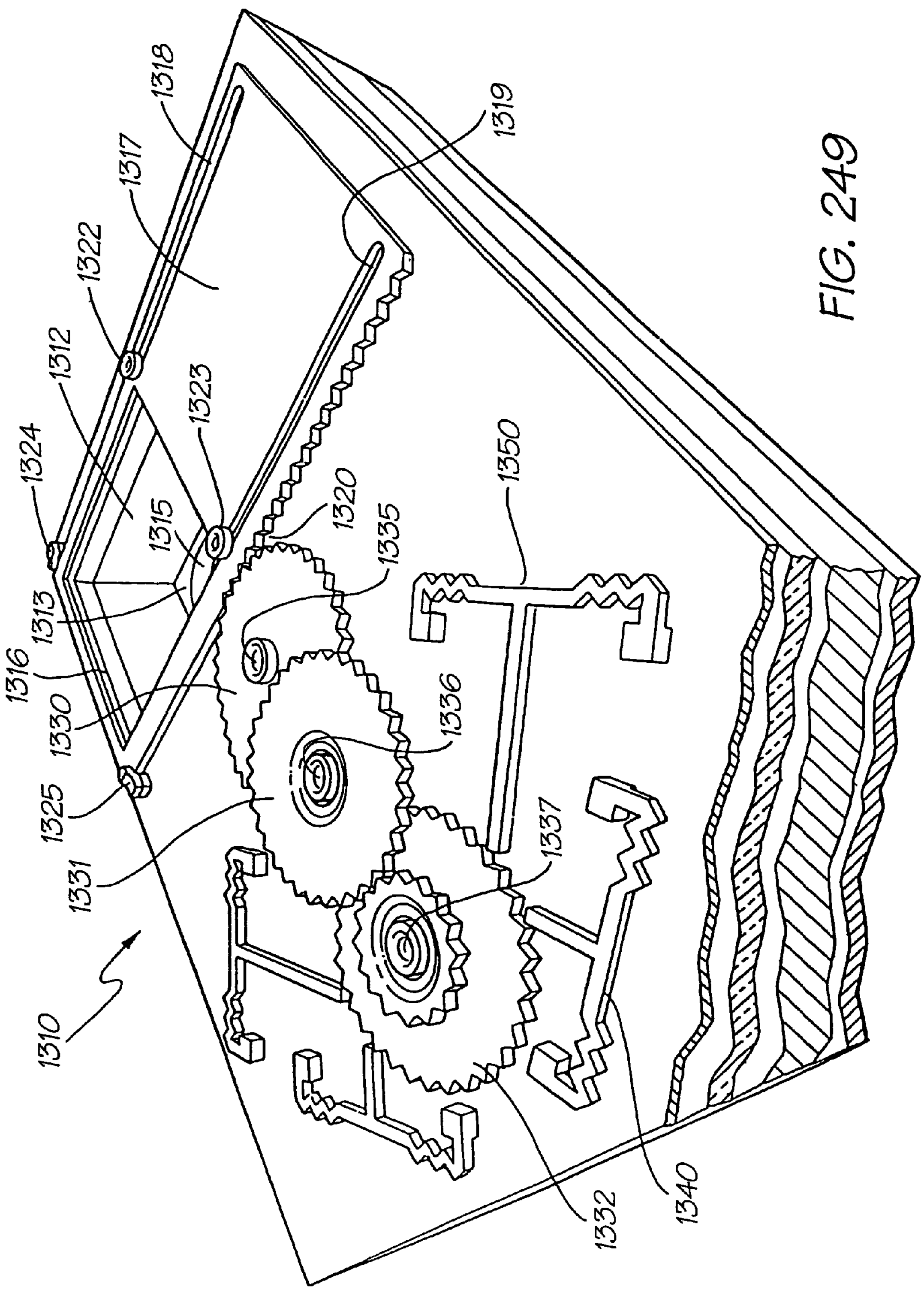
FIG. 249 is a cut-out top perspective view of the ink nozzle in accordance with a preferred embodiment of the present invention.

Turning to FIG. 249, there is illustrated a single nozzle arrangement 1310 as shown in an open position. The nozzle arrangement 1310 includes a nozzle chamber 1312 having an anisotropic (111) crystallographic etched pit which is etched down to what is originally a boron doped buried epitaxial layer 1313 which includes a nozzle rim 1314 (FIG. 251) and a nozzle ejection port 1315 which ejects ink. The ink flows in through a fluid passage 1316 when the aperture 1316 is open. The ink flowing through passage 1316 flows from an ink reservoir which operates under an oscillating ink pressure. When the shutter is open, ink is ejected from the ink ejection port 1315. The shutter mechanism includes a plate 1317 which is driven via means of guide slots 1318, 1319 to a closed position. The driving of the nozzle plate is via a latch mechanism 1320 with the plate structure being kept in a correct path by means of retainers 1322 to 1325.

The nozzle arrangement 1310 can be constructed using a two level poly process which can be a standard micro-electro mechanical system production technique (MEMS). The plate

Figure 250:
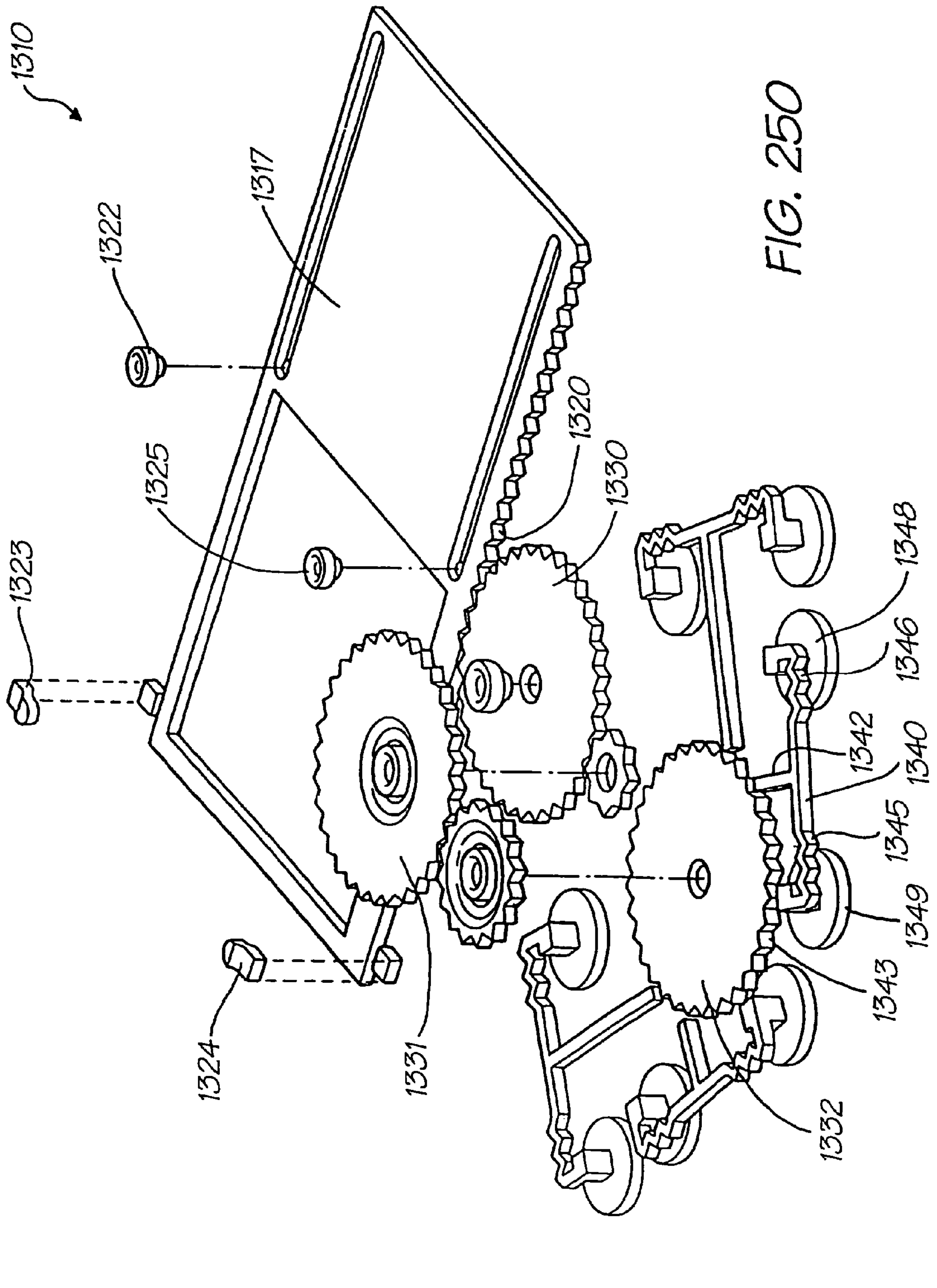
FIG. 250 is an exploded perspective view illustrating the shutter mechanism in accordance with a preferred embodiment of the present invention.

1317 can be constructed from a first level polysilicon and the retainers 1322 to 1325 can be constructed from a lower first level poly portion and a second level poly portion, as it is more apparent from the exploded perspective view illustrated in FIG. 250.

The bottom circuit of plate 1317 includes a number of pits which are provided on the bottom surface of plate 1317 so as to reduce stiction effects.

The ratchet mechanism 1320 is driven by a gearing arrangement which includes first gear wheel 1330, second gear wheel 1331 and third gear wheel 1332. These gear wheels 1330 to 1332 are constructed using two level poly with each gear wheel being constructed around a corresponding central pivot 1335 to 1337. The gears 1330 to 1332 operate to gear down the ratchet speed with the gears being driven by a gear actuator mechanism 1340.

Turning to FIG. 250 there is illustrated on exploded perspective a single nozzle chamber 1310. The actuator 1340 comprises mainly a copper circuit having a drive end 1342 which engages and drives the cogs 1343 of the gear wheel 1332. The copper portion includes serpentine sections 1345, 1346 which concertina upon movement of the end 1342. The end 1342 is actuated by means of passing an electric current through the copper portions in the presence of a magnetic field perpendicular to the surface of the wafer such that the interaction of the magnetic field and circuit result in a Lorenz force acting on the actuator 1340 so as to move the end 1342 to drive the cogs 1343. The copper portions are mounted on aluminum disks 1348, 1349 which are connected to lower levels of circuitry on the wafer upon which actuator 1340 is mounted.

Returning to FIG. 249, the actuator 1340 can be driven at a high speed with the gear wheels 1330 to 1332 acting to gear down the high speed driving of actuator 1340 so as to drive ratchet mechanism 1320 open and closed on demand. Hence, when it is desired to eject a drop of ink from nozzle 1315, the shutter is opened by means of driving actuator 1340. Upon the next high pressure part of the oscillating pressure cycle, ink will be ejected from the nozzle 1315. If no ink is to be ejected from a subsequent cycle, a second actuator 1350 is utilized to drive the gear wheel in the opposite direction thereby resulting in the closing of the shutter plate 1317 over the nozzle chamber 1312 resulting in no ink being ejected in subsequent pressure cycles. The pits act to reduce the forces required for driving the shutter plate 1317 to an open and closed position.

Figure 251:
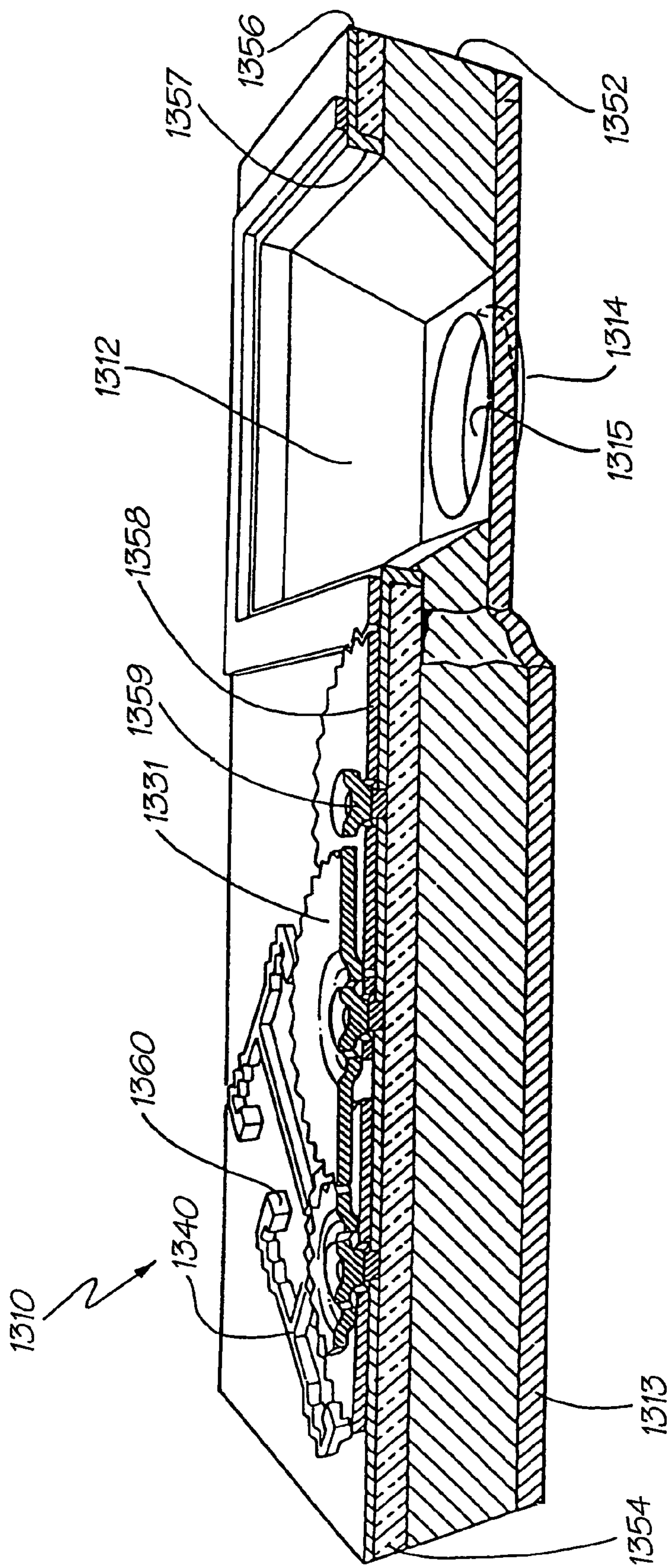
FIG. 251 is a top cross-sectional perspective view of the ink nozzle constructed in accordance with a preferred embodiment of the present invention.

Turning to FIG. 251, there is illustrated a top cross-sectional view illustrating the various layers making up a single nozzle chamber 1310. The nozzle chambers can be formed as part of an array of nozzle chambers making up a single print head which in turn forms part of an array of print head fabricated on a semiconductor wafer in accordance with in accordance with the semiconductor wafer fabrication techniques well known to those skilled in the art of MEMS fabrication and construction.

The bottom boron layer 1313 can be formed from the processing step of back etching a silicon wafer utilizing a buried epitaxial boron doped layer as the etch stop. Further processing of the boron layer can be undertaken so as to define the nozzle hole 1315 which can include a nozzle rim 1314.

The next layer is a silicon layer 1352 which normally sits on top of the boron doped layer 1313. The silicon layer 1352 includes an anisotropically etched pit 1312 so as to define the structure of the nozzle chamber. On top of the silicon layer 1352 is provided a glass layer 1354 which includes the various electrical circuitry (not shown) for driving the actuators. The layer 1354 is passivated by means of a nitride layer 1356 which includes trenches 1357 for passivating the side walls of glass layer 1354.

On top of the passivation layer 1356 is provided a first level polysilicon layer 1358 which defines the shutter and various cog wheels. The second poly layer 1359 includes the various retainer mechanisms and gear wheel 1331. Next, a copper layer 1360 is provided for defining the copper circuit actuator. The copper 1360 is interconnected with lower portions of glass layer 1354 for forming the circuit for driving the copper actuator.

The nozzle chamber 1310 can be constructed using the standard MEMS processes including forming the various layers using the sacrificial material such as silicon dioxide and subsequently sacrificially etching the lower layers away.

Subsequently, wafers that contain a series of print heads can be diced into separate printheads mounted on a wall of an ink supply chamber having a piezo electric oscillator actuator for the control of pressure in the ink supply chamber. Ink is then ejected on demand by opening the shutter plate 1317 during periods of high oscillation pressure so as to eject ink. The nozzles being actuated by means of placing the printhead in a strong magnetic field using permanent magnets or electromagnetic devices and driving current through the actuators e.g. 1340, 1350 as required to open and close the shutter and thereby eject drops of ink on demand.

One form of detailed manufacturing process which can be used to fabricate monolithic ink jet printheads operating in accordance with the principles taught by the present embodiment can proceed utilizing the following steps:

1. Using a double sided polished wafer deposit 3 microns of epitaxial silicon heavily doped with boron 1313.

Figure 252:
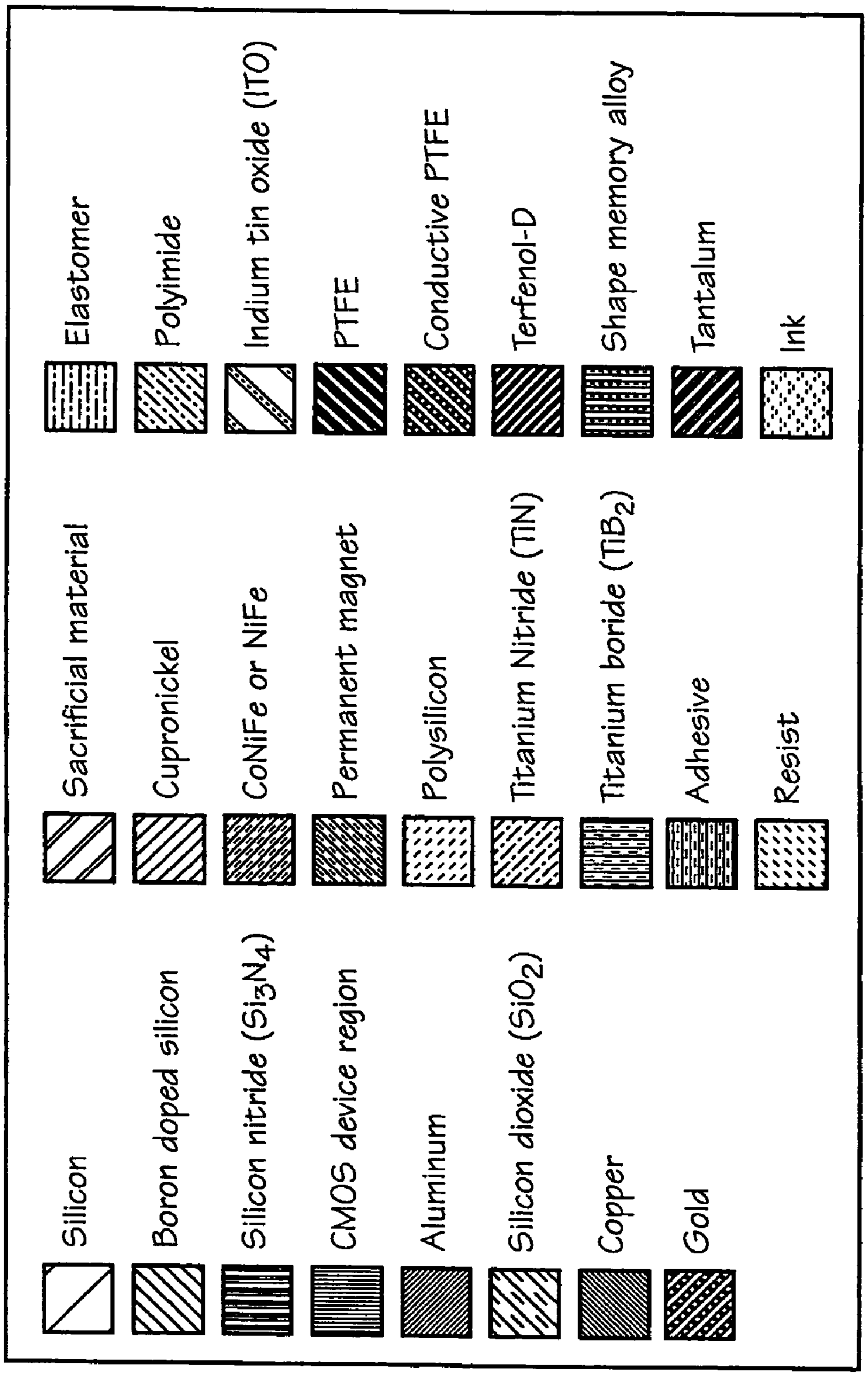
FIG. 252 provides a legend of the materials indicated in FIGS. 253 to 266.
Figure 253:
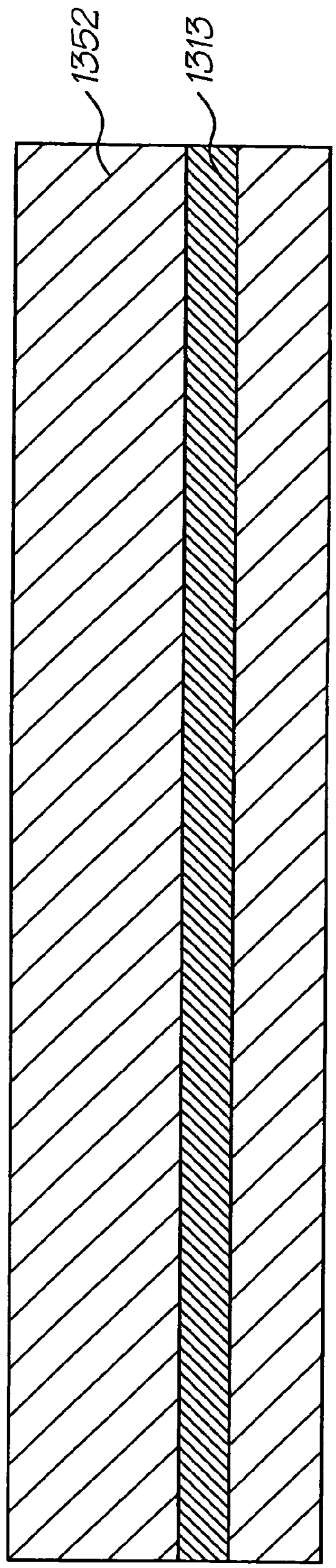
FIG. 253 to FIG. 267 illustrate sectional views of the manufacturing steps in one form of construction of an ink jet printhead nozzle.

2. Deposit 10 microns of n/n+ epitaxial silicon 1352. Note that the epitaxial layer is substantially thicker than required for CMOS. This is because the nozzle chambers are crystallographically etched from this layer. This step is shown in FIG. 253. FIG. 252 is a key to representations of various materials in these manufacturing diagrams. For clarity, these diagrams may not be to scale, and may not represent a cross section though any single plane of the nozzle.

Figure 254:
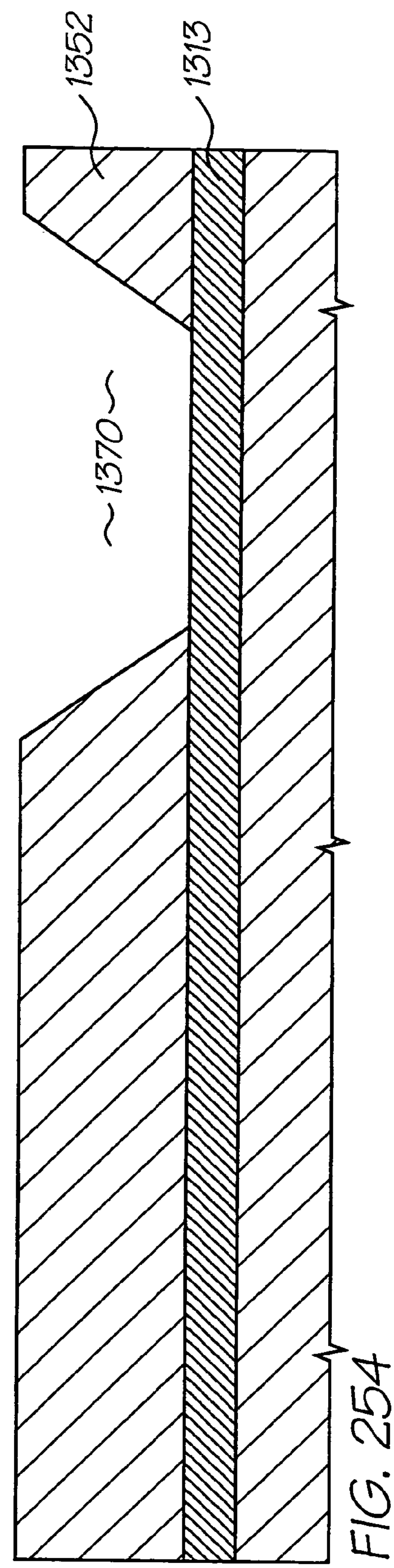

3. Crystallographically etch the epitaxial silicon using, for example, KOH or EDP (ethylenediamine pyrocatechol) 1370 using MEMS Mask 1. This mask defines the nozzle cavity. This etch stops on (111) crystallographic planes, and on the boron doped silicon buried layer. This step is shown in FIG. 254.

Figure 255:
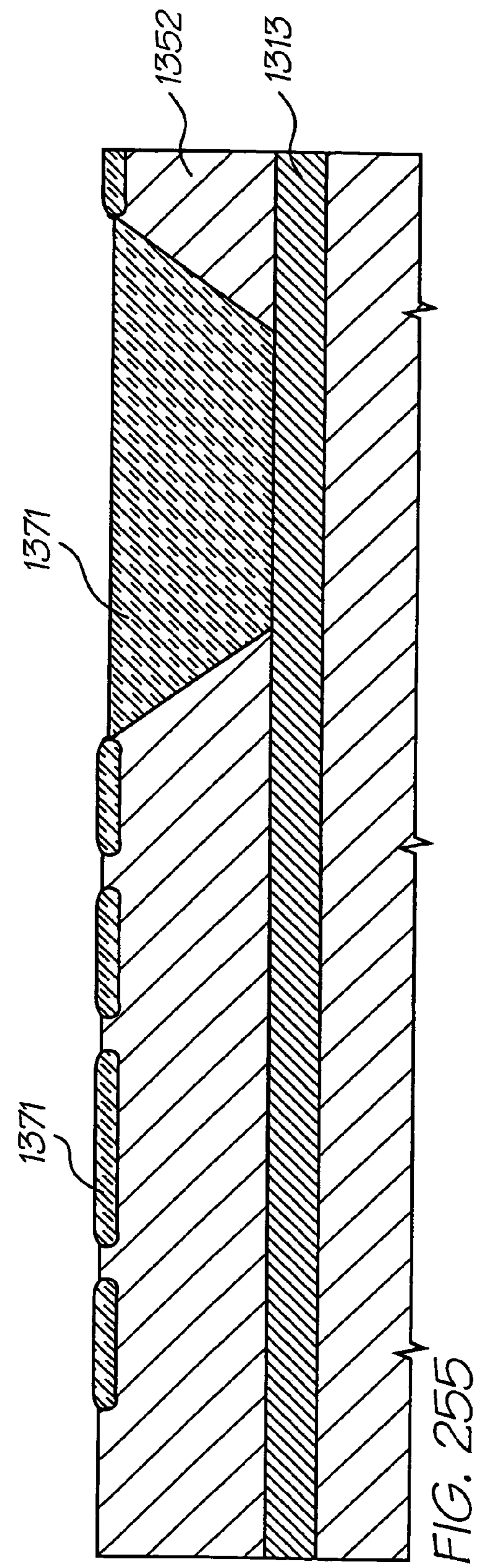

4. Deposit 12 microns of low stress sacrificial oxide 1371. Planarize down to silicon using CMP. The sacrificial material temporarily fills the nozzle cavity. This step is shown in FIG. 255.

5. Begin fabrication of the drive transistors, data distribution, and timing circuits using a CMOS process. The MEMS processes which form the mechanical components of the inkjet are interleaved with the CMOS device fabrication steps. The example given here is of a 1 micron, 2 poly, 2 metal retrograde P-well process. The mechanical components are formed from the CMOS polysilicon layers. For clarity, the CMOS active components are omitted.

Figure 256:
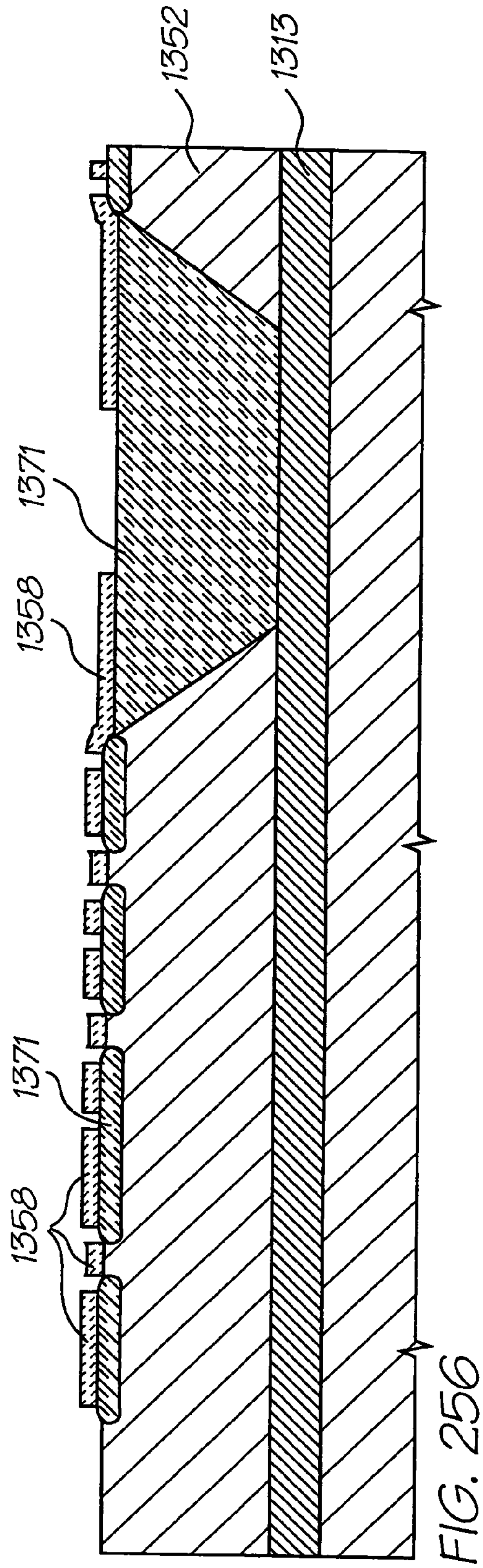

6. Grow the field oxide using standard LOCOS techniques to a thickness of 0.5 microns. As well as the isolation between transistors, the field oxide is used as a MEMS sacrificial layer, so inkjet mechanical details are incorporated in the active area mask. The MEMS features of this step are shown in FIG. 256.

7. Perform the PMOS field threshold implant. The MEMS fabrication has no effect on this step except in calculation of the total thermal budget.

8. Perform the retrograde P-well and NMOS threshold adjust implants using the P-well mask. The MEMS fabrication has no effect on this step except in calculation of the total thermal budget.

9. Perform the PMOS N-tub deep phosphorus punch-through control implant and shallow boron implant The MEMS fabrication has no effect on this step except in calculation of the total thermal budget.

10. Deposit and etch the first polysilicon layer 1358. As well as gates and local connections, this layer includes the lower-layer of MEMS components. This includes the lower layer of gears, the shutter, and the shutter guide. It is preferable that this layer be thicker than the normal CMOS thickness. A polysilicon thickness of 1 micron can be used. The MEMS features of this step are shown in FIG. 256.

11. Perform the NMOS lightly doped drain (LDD) implant This process is unaltered by the inclusion of MEMS in the process flow.

12. Perform the oxide deposition and RIE etch for polysilicon gate sidewall spacers. This process is unaltered by the inclusion of MEMS in the process flow.

13. Perform the NMOS source/drain implant The extended high temperature anneal time to reduce stress in the two polysilicon layers must be taken into account in the thermal budget for diffusion of this implant. Otherwise, there is no effect from the MEMS portion of the chip.

14. Perform the PMOS source/drain implant As with the NMOS source/drain implant, the only effect from the MEMS portion of the chip is on thermal budget for diffusion of this implant.

Figure 257:
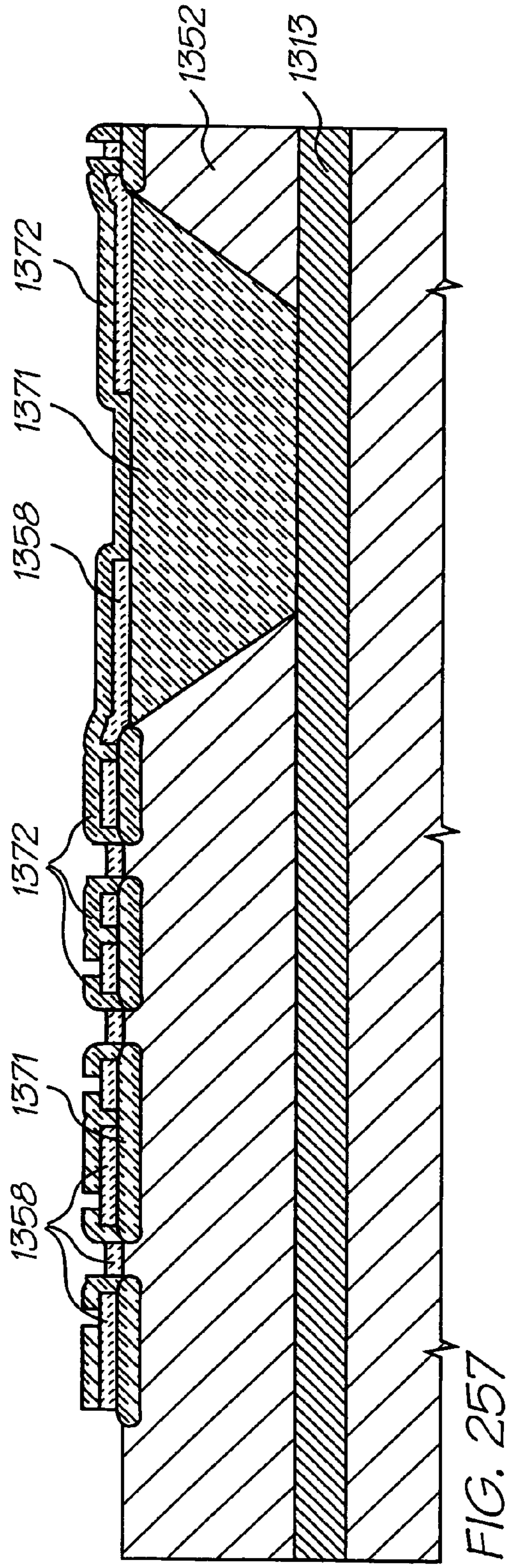

15. Deposit 1 micron of glass 1372 as the first interlevel dielectric and etch using the CMOS contacts mask. The CMOS mask for this level also contains the pattern for the MEMS inter-poly sacrificial oxide. The MEMS features of this step are shown in FIG. 257.

Figure 258:
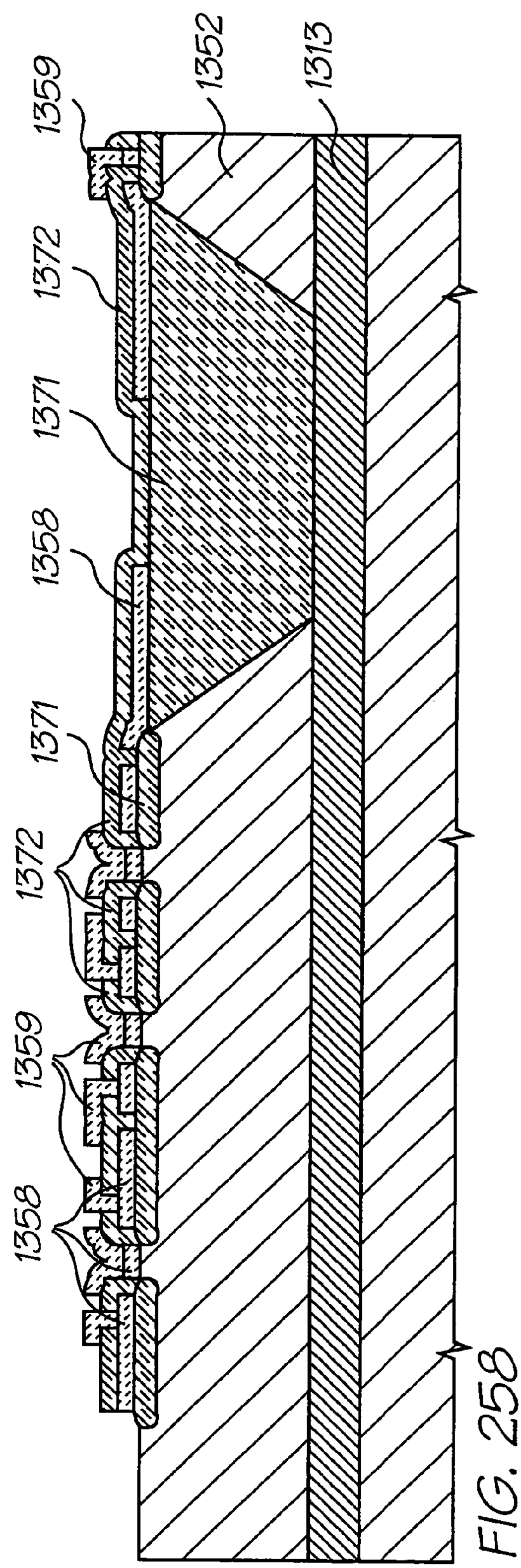

16. Deposit and etch the second polysilicon layer 1359. As well as CMOS local connections, this layer includes the upper layer of MEMS components. This includes the upper layer of gears and the shutter guides. A polysilicon thickness of 1 micron can be used. The MEMS features of this step are shown in FIG. 258.

17. Deposit 1 micron of glass 1373 as the second interlevel dielectric and etch using the CMOS via 1 mask. The CMOS mask for this level also contains the pattern for the MEMS actuator contacts.

Figure 259:
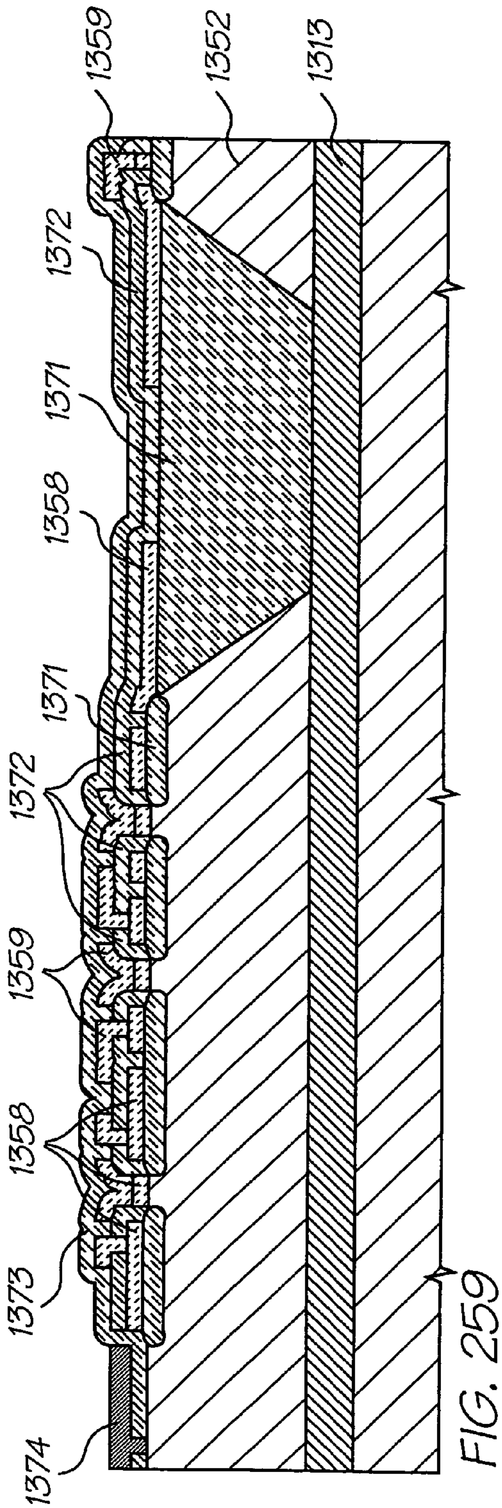

18. Metal 1 1374 deposition and etch. Metal 1 should be non-corrosive in water, such as gold or platinum, if it is to be used as the Lorenz actuator. The MEMS features of this step are shown in FIG. 259.

Figure 260:
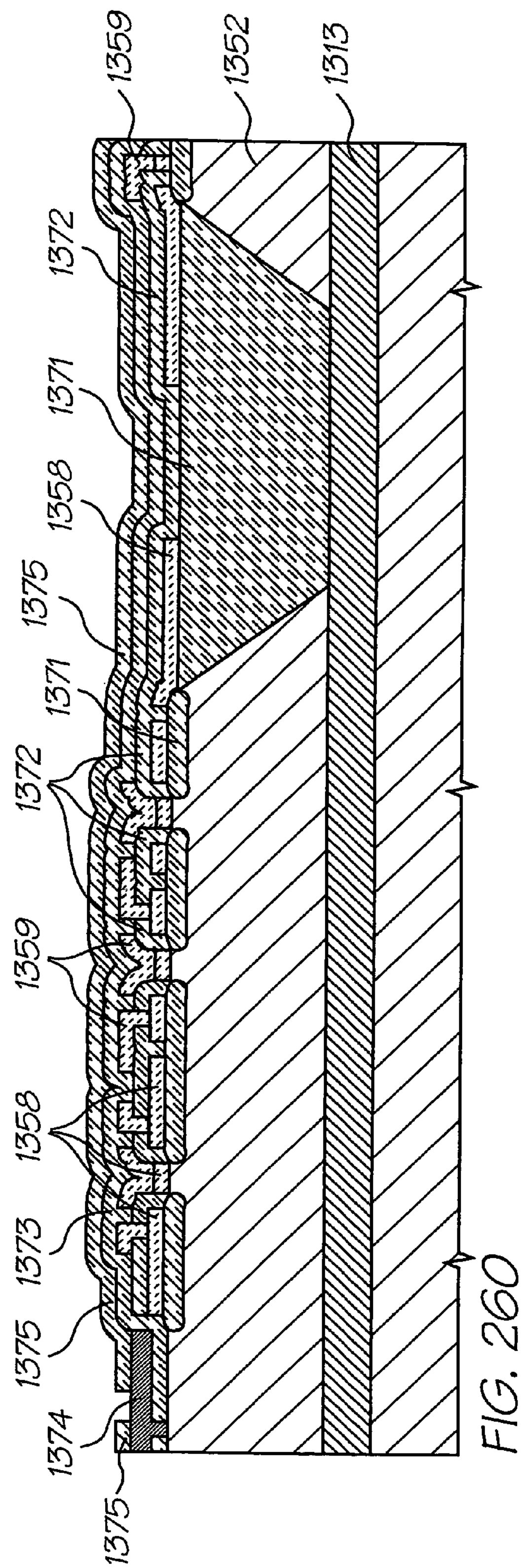

19. Third interlevel dielectric deposition 1375 and etch as shown in FIG. 260. This is the standard CMOS third interlevel dielectric. The mask pattern includes complete coverage of the MEMS area.

20. Metal 2 1379 deposition and etch. This is the standard CMOS metal 2. The mask pattern includes no metal 2 in the MEMS area.

Figure 261:
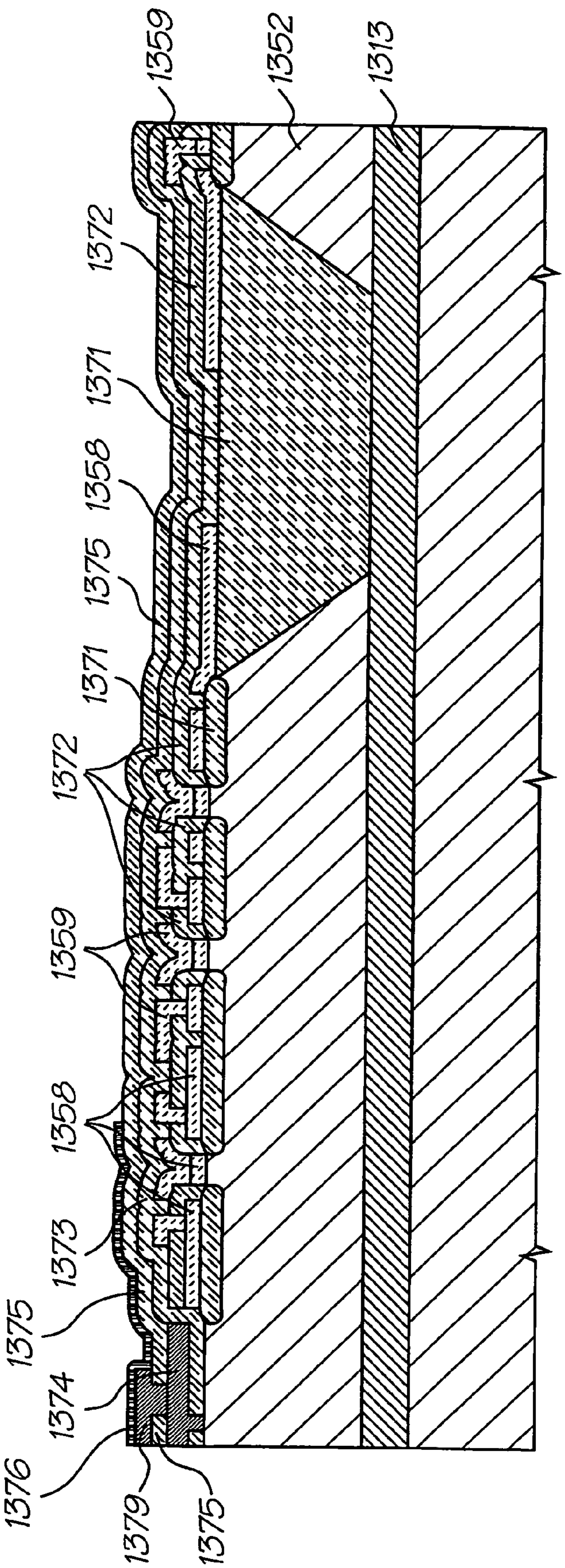

21. Deposit 0.5 microns of silicon nitride ($Si_3N_4$) 1376 and etch using MEMS Mask 2. This mask defines the region of sacrificial oxide etch performed in step 26. The silicon nitride aperture is substantially undersized, as the sacrificial oxide etch is isotropic. The CMOS devices must be located sufficiently far from the MEMS devices that they are not affected by the sacrificial oxide etch The MEMS features of this step are shown in FIG. 261.

Figure 262:
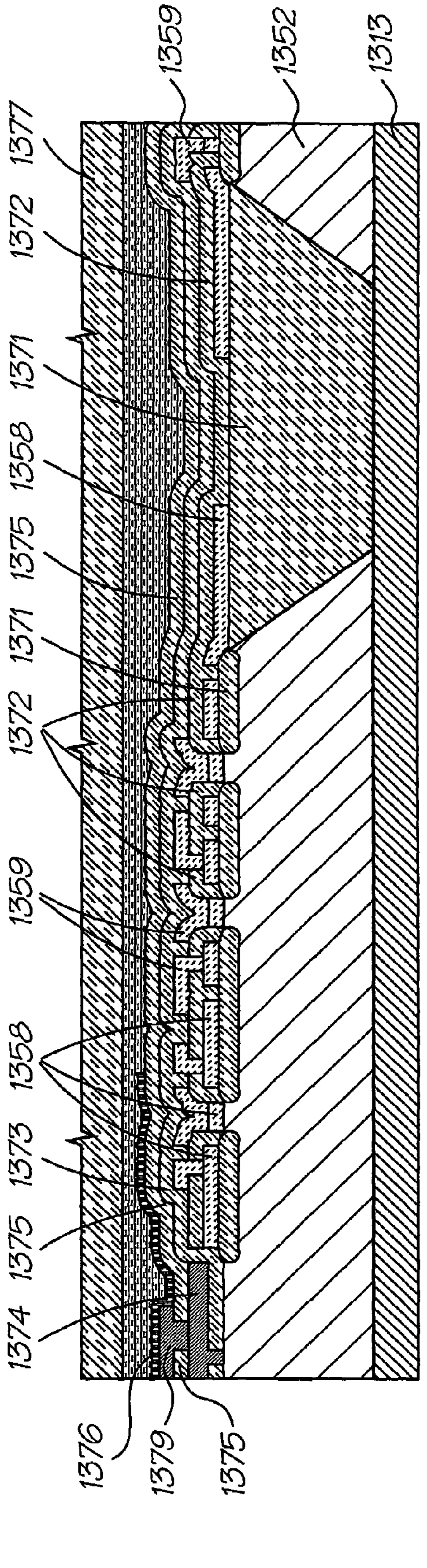

22. Mount the wafer on a glass blank 1377 and back-etch the wafer using KOH with no mask. This etch thins the wafer and stops at the buried boron doped silicon layer. The MEMS features of this step are shown in FIG. 262.

Figure 263:
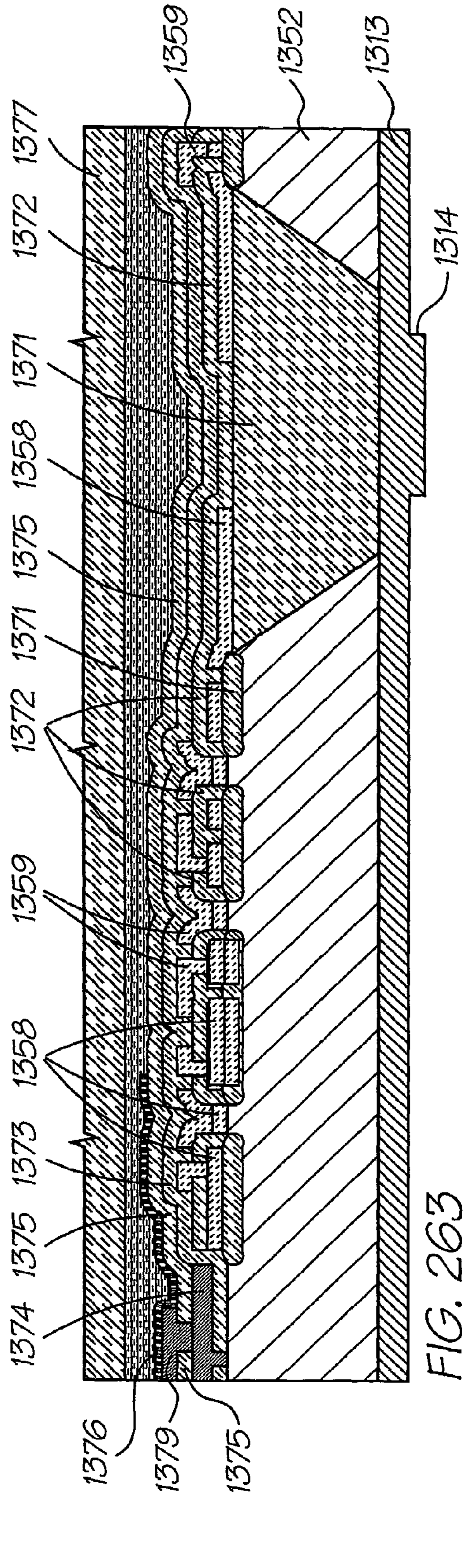

23. Plasma back-etch the boron doped silicon layer to a depth of 1 micron using MEMS Mask 3. This mask defines the nozzle rim 1314. The MEMS features of this step are shown in FIG. 263.

Figure 264:
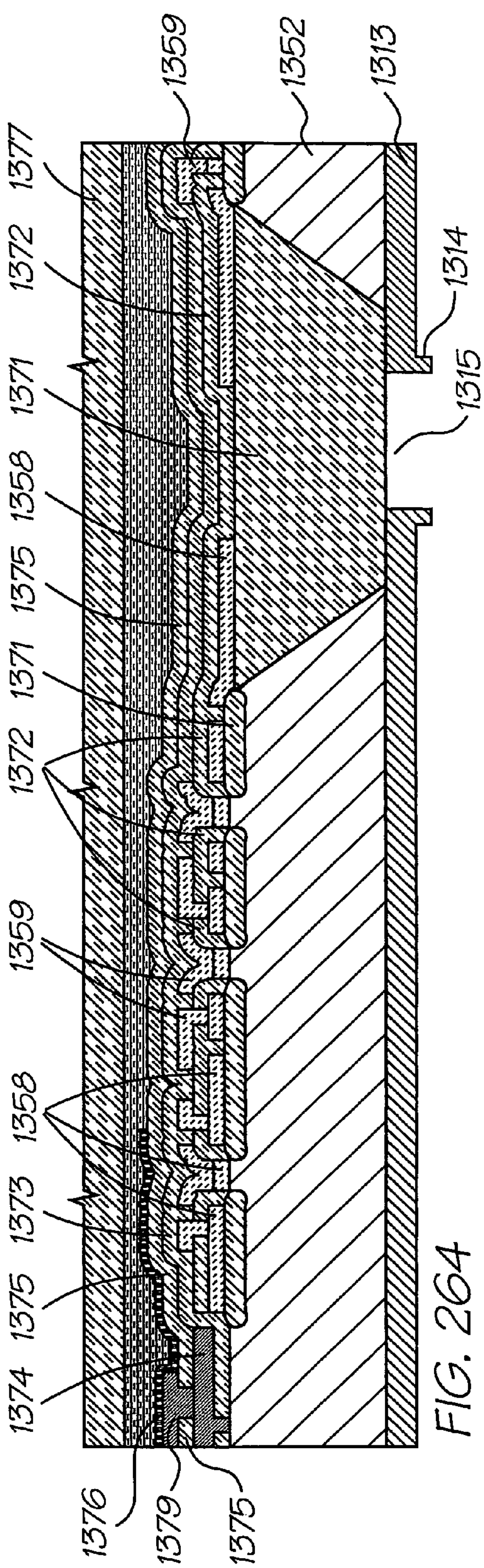

24. Plasma back-etch through the boron doped layer using MEMS Mask 4. This mask defines the nozzle, and the edge of the chips. At this stage, the chips are separate, but are still mounted on the glass blank. The MEMS features of this step are shown in FIG. 264.

Figure 265:
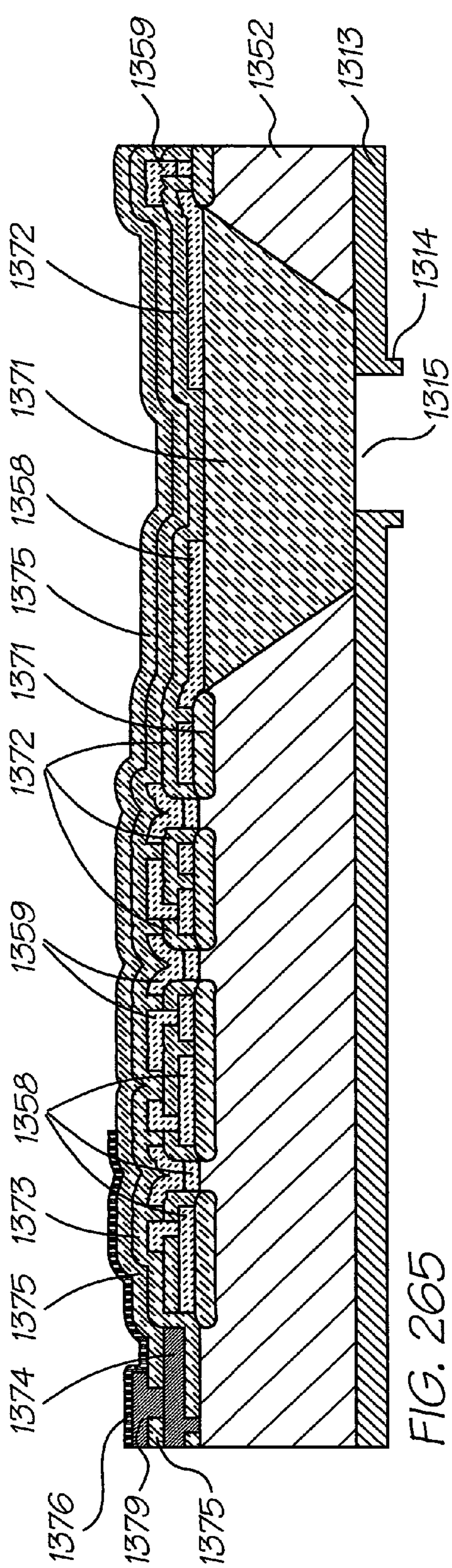

25. Detach the chips from the glass blank. Strip the adhesive. This step is shown in FIG. 265.

Figure 266:
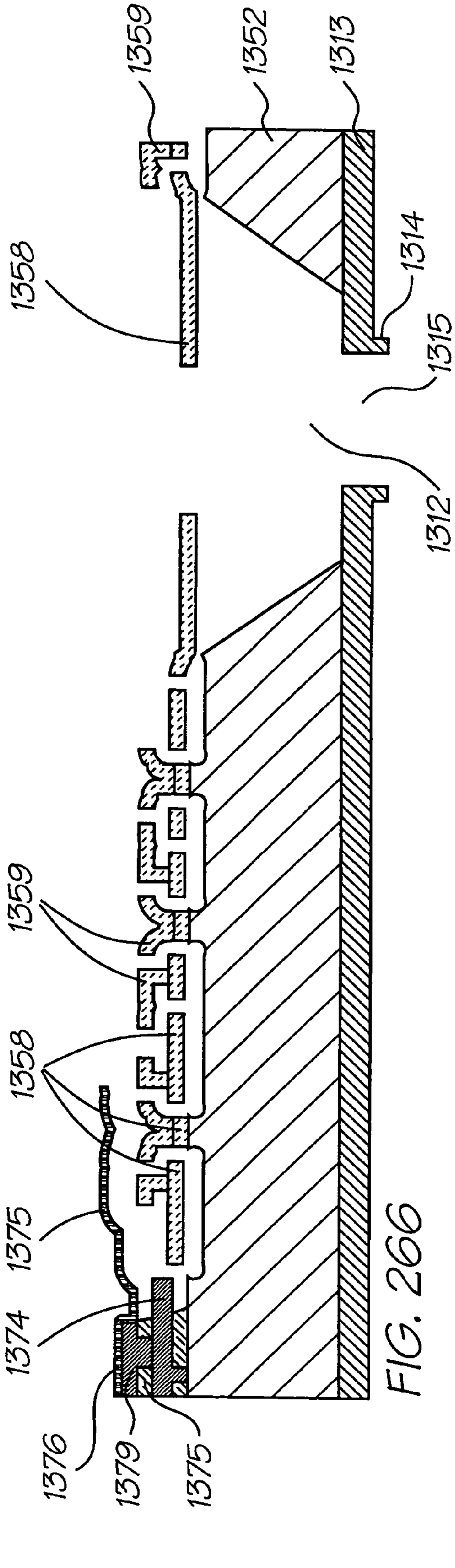

26. Etch the sacrificial oxide using vapor phase etching (VPE) using an anhydrous HF/methanol vapor mixture. The use of a dry etch avoids problems with stiction. This step is shown in FIG. 266.

27. Mount the printheads in their packaging, which may be a molded plastic former incorporating ink channels which supply different colors of ink to the appropriate regions of the front surface of the wafer. The package also includes a piezoelectric actuator attached to the rear of the ink channels. The piezoelectric actuator provides the oscillating ink pressure required for the ink jet operation. The package also contains the permanent magnets which provide the 1 Tesla magnetic field for the Lorenz actuators formed of metal 1.

28. Connect the printheads to their interconnect systems.

29. Hydrophobize the front surface of the print heads.

Figure 267:
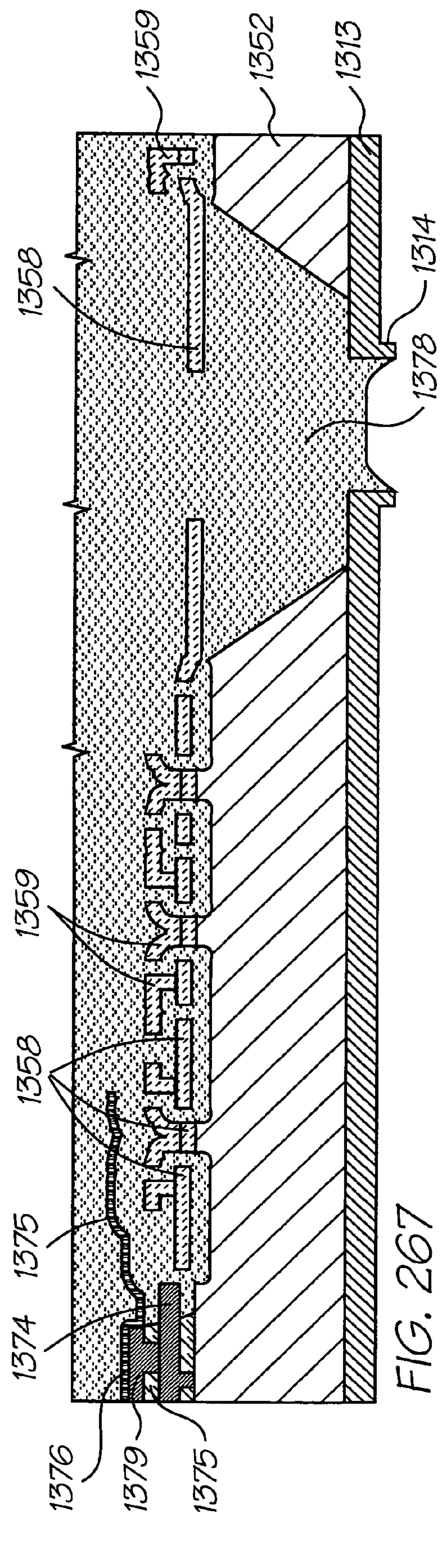

30. Fill the completed printheads with ink 1378 and test them. A filled nozzle is shown in FIG. 267.

IJ14

In a preferred embodiment, there is provided an ink jet nozzle which incorporates a plunger that is surrounded by an electromagnetic device. The plunger is made from a magnetic material such that upon activation of the magnetic device, the plunger is forced towards a nozzle outlet port thereby resulting in the ejection of ink from the outlet port. Upon deactivation of the electromagnet, the plunger returns to its rest position due to of a series springs constructed to return the electromagnet to its rest position.

Figure 268:
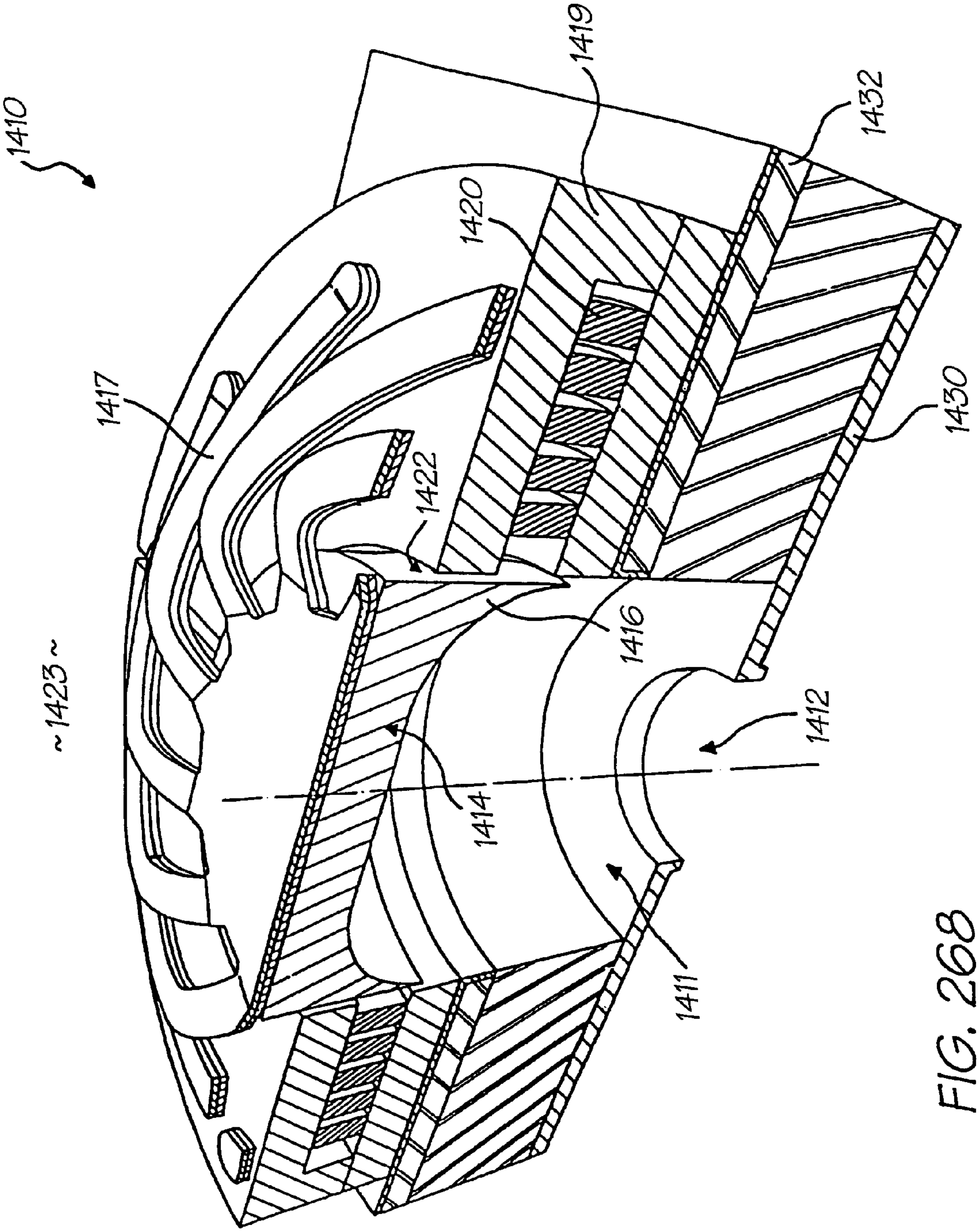
FIG. 268 is a perspective cross-sectional view of a single ink jet nozzle constructed in accordance with a preferred embodiment.

FIG. 268 illustrates a sectional view through a single ink jet nozzle 1410 as constructed with a preferred embodiment The inkjet nozzle 1410 includes a nozzle chamber 1411 which is connected to a nozzle output port 1412 for the ejection of ink. The ink is ejected by means of a tapered plunger device 1414 which is made of a soft magnetic material such as nickel-ferrous material (NiFe). The plunger 1414 includes tapered end portions, e.g. 1416, in addition to interconnecting nitride springs, e.g. 1417.

An electromagnetic device is constructed around the plunger 1414 and includes outer soft magnetic material 1419 which surrounds a copper current carrying wire core 1420 with a first end of the copper coil 1420 connected to a first portion of a nickel-ferrous material and a second end of the copper coil is connected to a second portion of the nickel-ferrous material. The circuit being further formed by means of vias (not shown) connecting the current carrying wire to lower layers which can take the structure of standard CMOS fabrication layers.

Upon activation of the electromagnet, the tapered plunger portions 1416 are attracted to the electromagnet. The tapering allows for the forces to be resolved by means of downward movement of the overall plunger 1414, the downward movement thereby causing the ejection of ink from ink ejection port 1412. In due of course, the plunger will move to a stable state having its top surface substantially flush with the electromagnet Upon turning the power off, the plunger 1414 will return to its original position as a result of energy stored within that nitride springs 1417. The nozzle chamber 1411 is refilled by inlet holes 1422 from the ink reservoir 1423.

Figure 269:
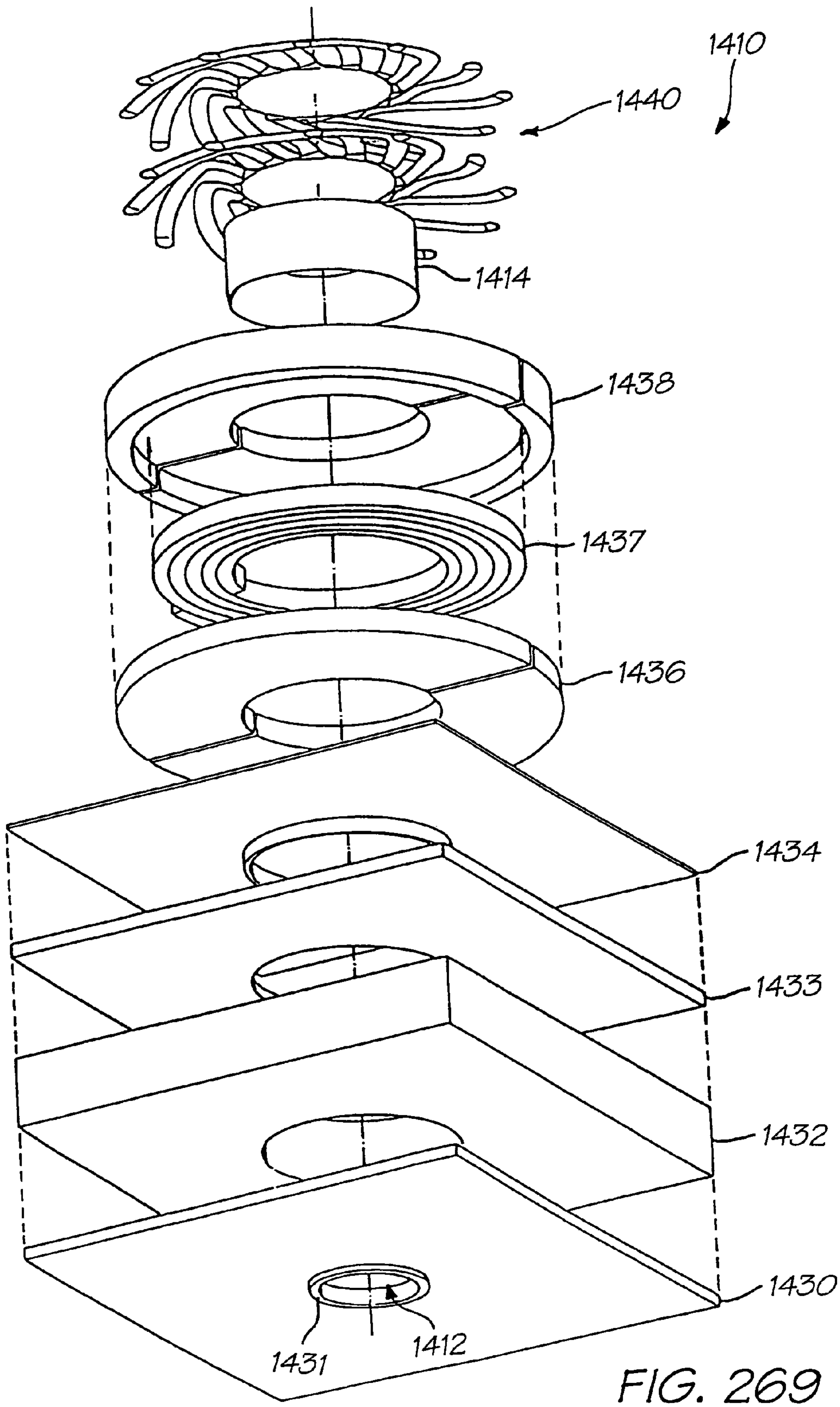
FIG. 269 is an exploded perspective view illustrating the construction of a single ink jet nozzle in accordance with a preferred embodiment.

Turning now to FIG. 269, there is illustrated in exploded perspective the various layers used in construction of a single nozzle 1410. The bottom layer 1430 can be formed by back etching a silicon wafer which has a boron dope epitaxial layer as the etch stop. The boron dope layer 1430 can be further individually masked and etched so as to form nozzle rim 1431 and the nozzle ejection port 1412. Next, a silicon layer 1432 is formed. The silicon layer 1432 can be formed as part of the original wafer having the buried boron doped layer 1430. The nozzle chamber proper can be formed substantially from high density low pressure plasma etching of the silicon layer 1432 so as to produce substantially vertical side walls thereby forming the nozzle chamber. On top of the silicon layer 1432 is formed a glass layered 1433 which can include the drive and control circuitry required for driving an array of nozzles 1410. The drive and control circuitry can comprise standard two level metal CMOS circuitry intra-connected to form the copper coil circuit by means of vias though upper layers (not shown). Next, a nitride passivation layer 1434 is provided so as to passivate any lower glass layers, e.g. 1433, from sacrificial etches should a sacrificial etching be used in the formation of portions of the nozzle. On top of the nitride layer 1434 is formed a first nickel-ferrous layer 1436 followed by a copper layer 1437, and further nickel-ferrous layer 1438 which can be formed via a dual damascene process. On top of the layer 1438 is formed the final nitride spring layer 1440 with the springs being formed by means of semiconductor treatment of the nitride layer 1440 so as to release the springs in tension so as to thereby cause a slight rating of the plunger 1414. A number of techniques not disclosed in FIG. 269 can be used in the construction of various portions of the arrangement 1410. For example, the nozzle chamber can be formed by using the aforementioned plasma etch and then subsequently filling the nozzle chamber with sacrificial material such as glass so as to provide a support for the plunger 1414 with the plunger 1414 being subsequently released via sacrificial etching of the sacrificial layers.

Further, the tapered end portions of the nickel-ferrous material can be formed so that the use of a half-tone mask having an intensity pattern corresponding to the desired bottom tapered profile of plunger 1414. The half-tone mask can be used to half-tone a resist so that the shape is transferred to the resist and subsequently to a lower layer, such as sacrificial glass on top of which is laid the nickel-ferrous material which can be finally planarized using chemical mechanical planarization techniques.

One form of detailed manufacturing process which can be used to fabricate monolithic ink jet print heads operating in accordance with the principles taught by the present embodiment can proceed using the following steps:

1. Using a double sided polished wafer 1450 deposit 3 microns of epitaxial silicon heavily doped with boron 1430.

2. Deposit 10 microns of epitaxial silicon 1432, either p-type or n-type, depending upon the CMOS process used.

Figure 270:
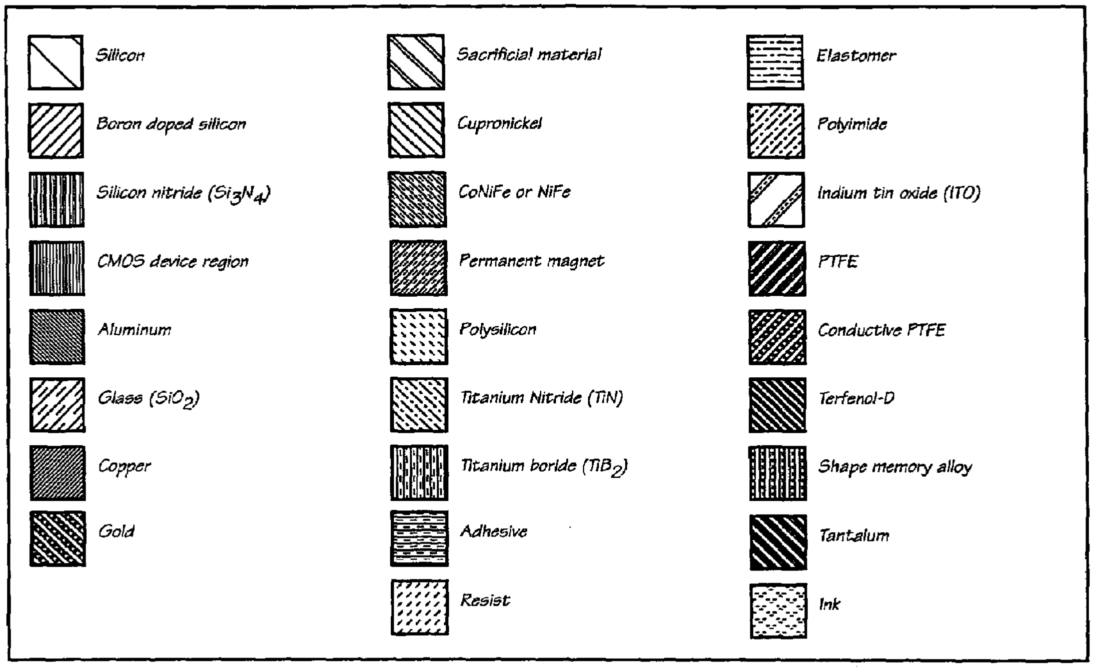
FIG. 270 provides a legend of the materials indicated in FIGS. 271 to 289.
Figure 271:
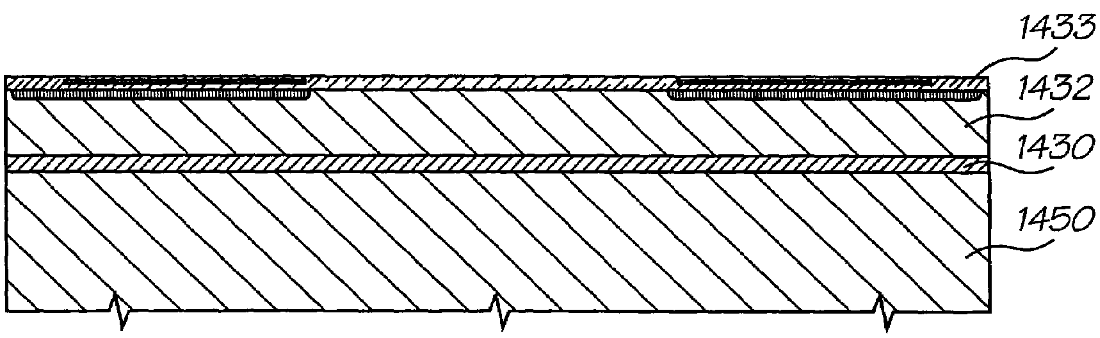
FIG. 271 to FIG. 289 illustrate sectional views of the manufacturing steps in one form of construction of an ink jet printhead nozzle.

3. Complete drive transistors, data distribution, and timing circuits using a 0.5 micron, one poly, 2 metal CMOS process 1433. This step is shown in FIG. 271. For clarity, these diagrams may not be to scale, and may not represent a cross section though any single plane of the nozzle. FIG. 270 is a key to representations of various materials in these manufacturing diagrams, and those of other cross referenced ink jet configurations.

4.Etch the CMOS oxide layers 1433 down to silicon 1432 or aluminum using Mask 1. This mask defines the nozzle chamber 1411 and the edges of the print heads chips.

Figure 272:
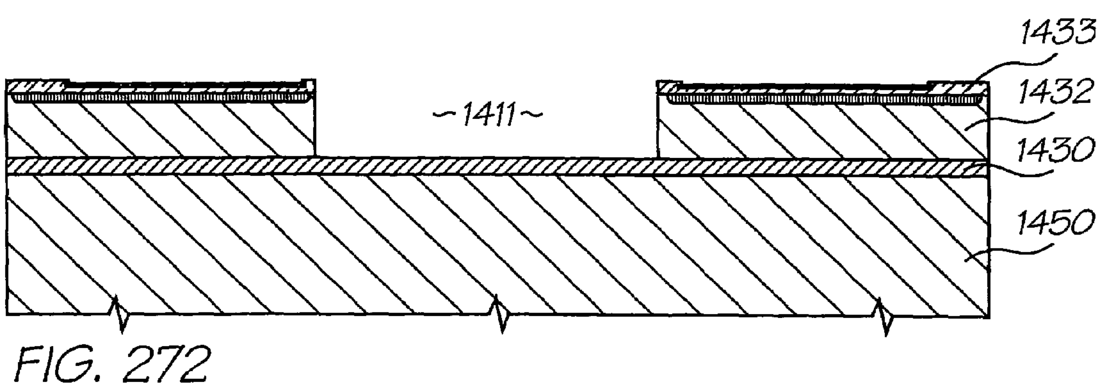

5. Plasma etch the silicon 1432 down to the boron doped buried layer, using oxide from step 4 as a mask. This etch does not substantially etch the aluminum. This step is shown in FIG. 272.

6. Deposit 0.5 microns of silicon nitride 1434 ($Si_3N_4$).

7. Deposit 12 microns of sacrificial material 1451.

Figure 273:
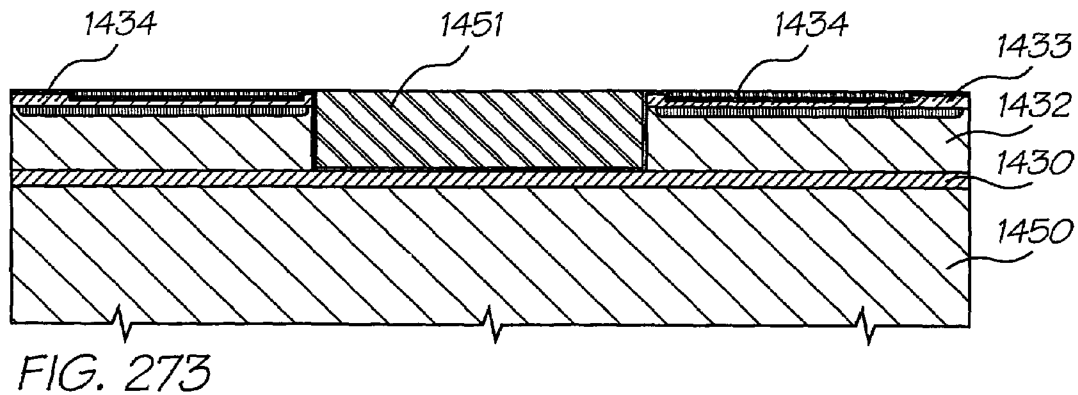

8. Planarize down to nitride using CMP. This fills the nozzle chamber level to the chip surface. This step is shown in FIG. 273.

Figure 274:
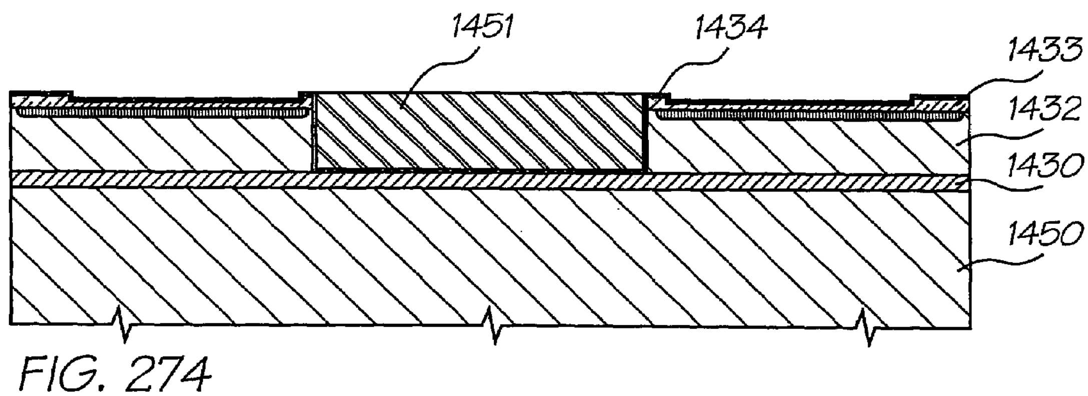

9. Etch nitride 1434 and CMOS oxide layers down to second level metal using Mask 2. This mask defines the vias for the contacts from the second level metal electrodes to the two halves of the split fixed magnetic pole. This step is shown in FIG. 274.

10. Deposit a seed layer of cobalt nickel iron alloy. CoNiFe is chosen due to high saturation flux density of 2 Tesla, and a low coercivity. [Osaka, Tetsuya et al, A soft magnetic CoNiFe film with high saturation magnetic flux density, Nature 392, 796-798 (1998)].

Figure 275:
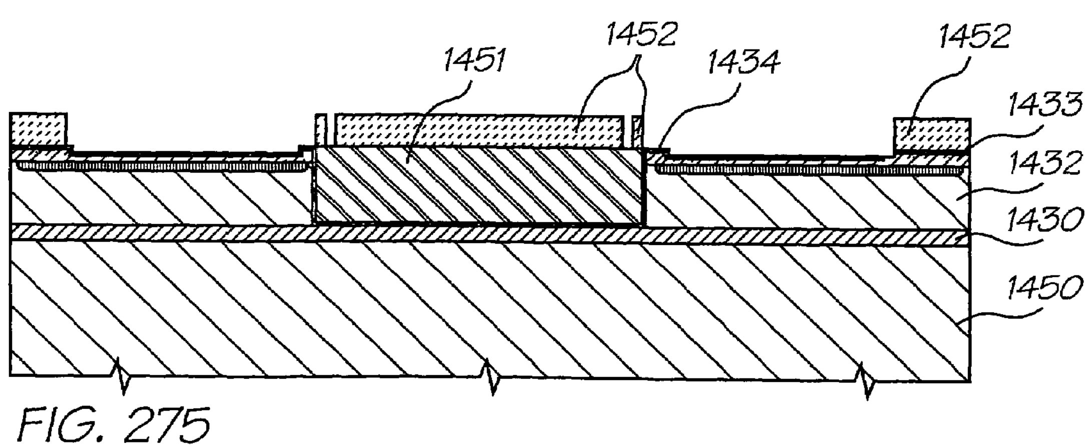

11. Spin on 5 microns of resist 1452, expose with Mask 3, and develop. This mask defines the lowest layer of the split fixed magnetic pole, and the thinnest rim of the magnetic plunger. The resist acts as an electroplating mold. This step is shown in FIG. 275.

Figure 276:
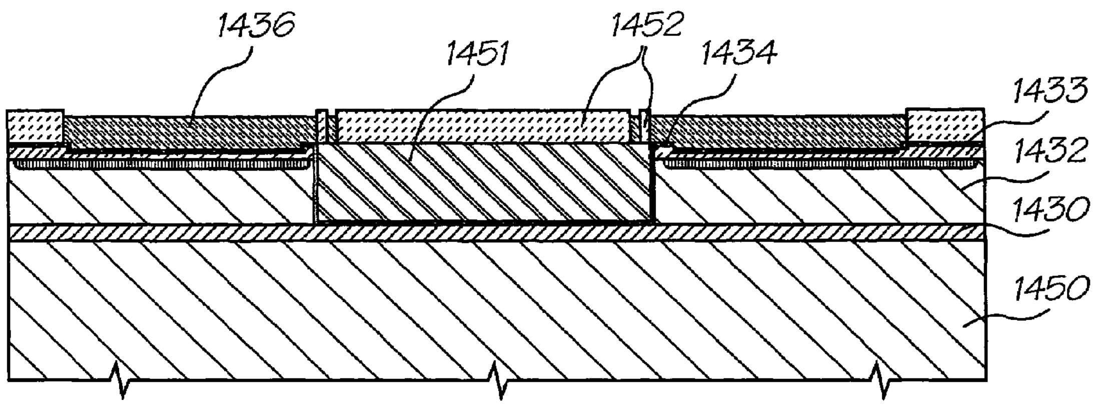

12. Electroplate 4 microns of CoNiFe 1436. This step is shown in FIG. 276.

13. Deposit 0.1 microns of silicon nitride ($Si_3N_4$).

14. Etch the nitride layer using Mask 4. This mask defines the contact vias from each end of the solenoid coil to the two halves of the split fixed magnetic pole.

15. Deposit a seed layer of copper.

Figure 277:
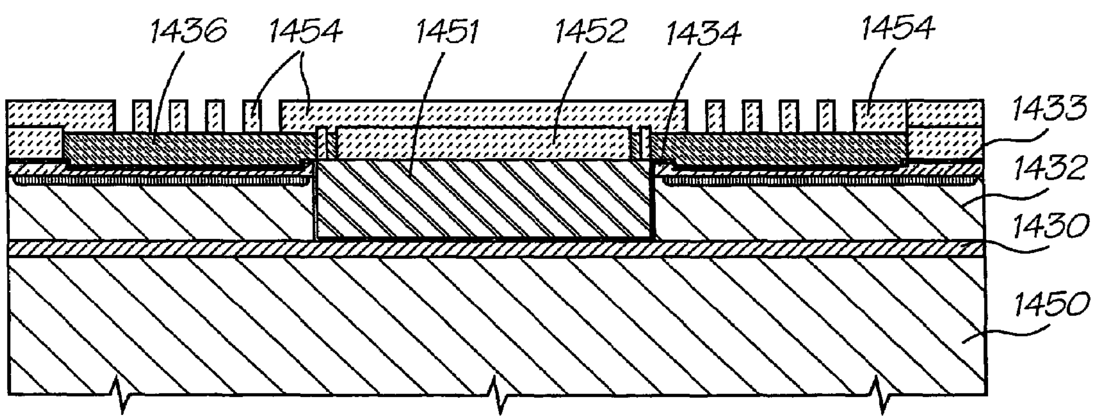

16. Spin on 5 microns of resist 1454, expose with Mask 5, and develop. This mask defines the solenoid spiral coil and the spring posts, for which the resist acts as an electroplating mold. This step is shown in FIG. 277.

17. Electroplate 4 microns of copper 1437. Copper is used for its low resistivity (which results in higher efficiency) and its high electromigration resistance, which increases reliability at high current densities.

Figure 278:
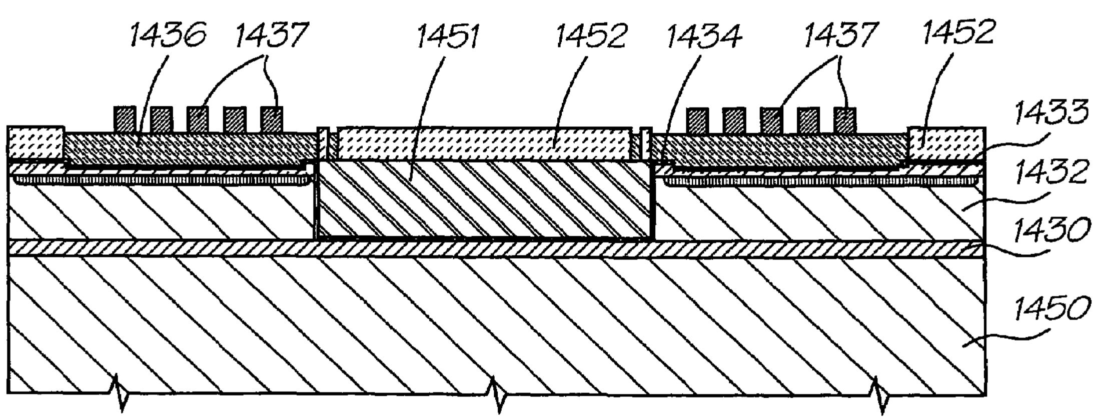

18. Strip the resist 1454 and etch the exposed copper seed layer. This step is shown in FIG. 278.

19. Wafer probe. All electrical connections are complete at this point, bond pads are accessible, and the chips are not yet separated.

20. Deposit 0.1 microns of silicon nitride. This layer of nitride provides corrosion protection and electrical insulation to the copper coil.

21. Etch the nitride layer using Mask 6. This mask defines the regions of continuity between the lower and the middle layers of CoNiFe.

Figure 279:
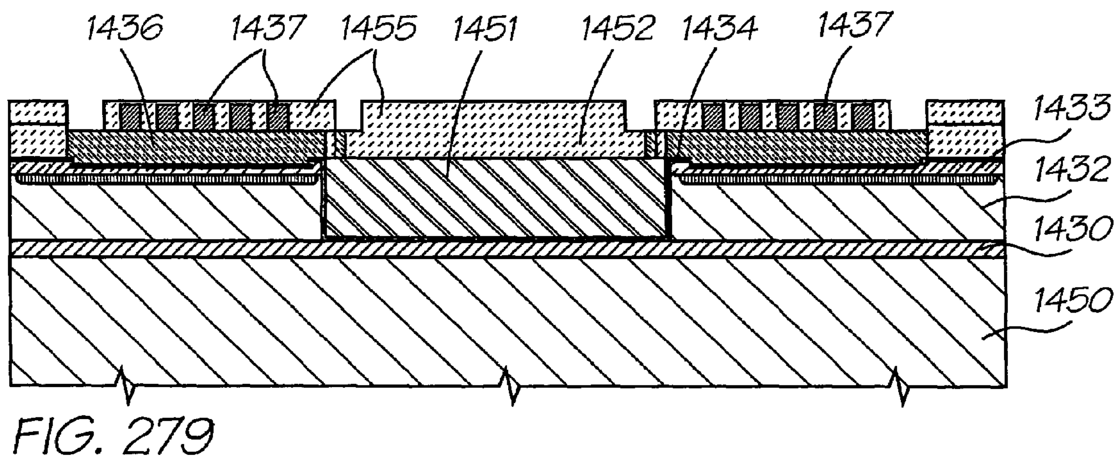

22. Spin on 4.5 microns of resist 1455, expose with Mask 6, and develop. This mask defines the middle layer of the split fixed magnetic pole, and the middle rim of the magnetic plunger. The resist forms an electroplating mold for these parts. This step is shown in FIG. 279.

Figure 280:
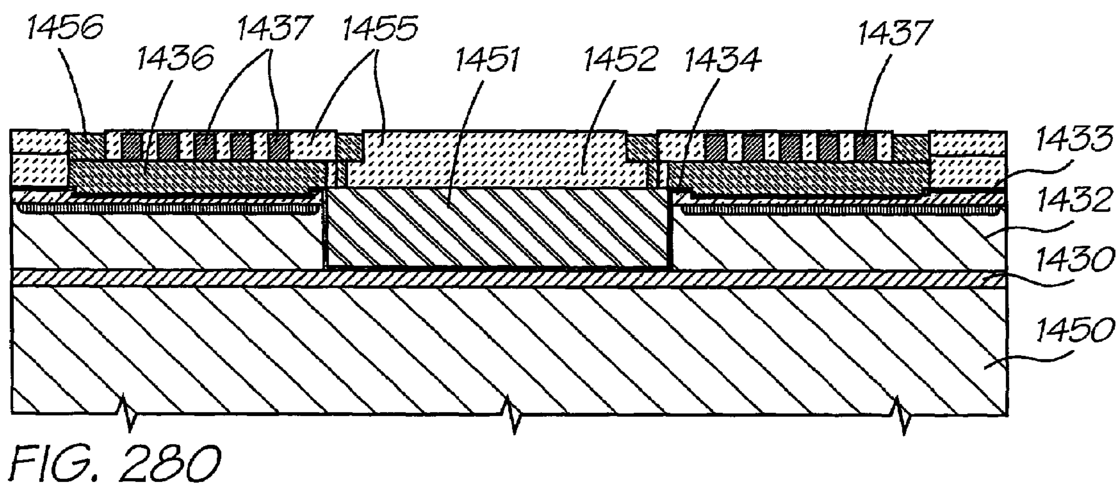

23. Electroplate 4 microns of CoNiFe 1456. The lowest layer of CoNiFe acts as the seed layer. This step is shown in FIG. 280.

24. Deposit a seed layer of CoNiFe.

Figure 281:
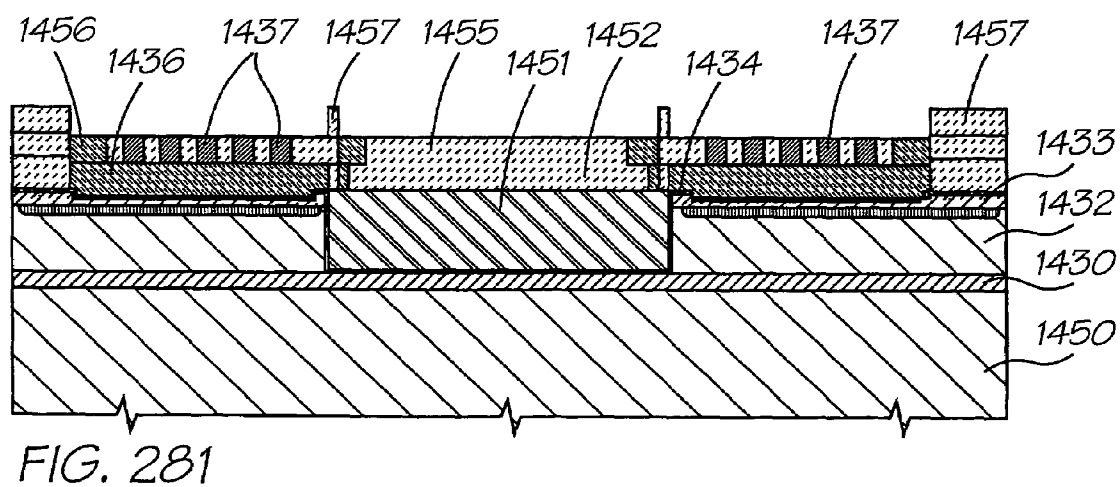

25. Spin on 4.5 microns of resist 1457, expose with Mask 7, and develop. This mask defines the highest layer of the split fixed magnetic pole and the roof of the magnetic plunger. The resist forms electroplating mold for these parts. This step is shown in FIG. 281.

Figure 282:
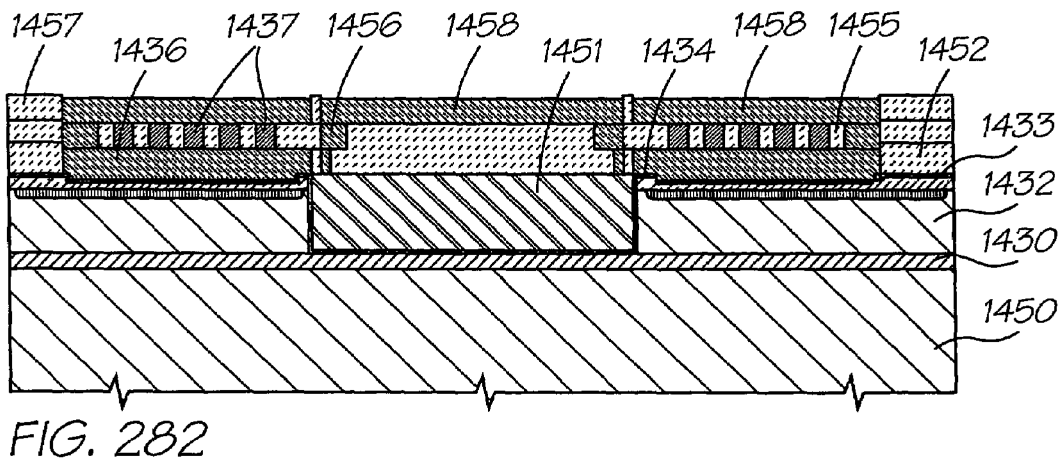

26. Electroplate 4 microns of CoNiFe 1458. This step is shown in FIG. 282.

27. Deposit 1 micron of sacrificial material 1459.

Figure 283:
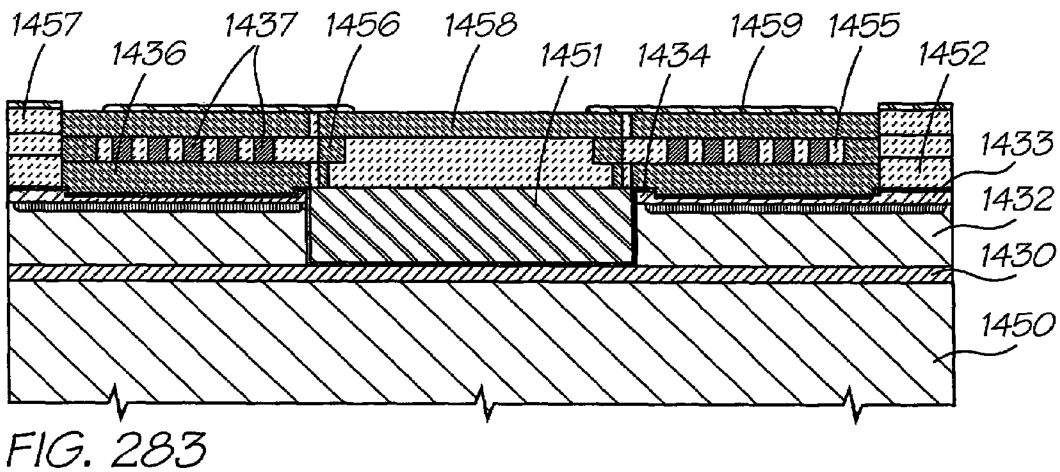

28. Etch the sacrificial material 1459 using Mask 8. This mask defines the contact points of the nitride springs to the split fixed magnetic poles and the magnetic plunger. This step is shown in FIG. 283.

29. Deposit 0.1 microns of low stress silicon nitride 1460.

30. Deposit 0.1 microns of high stress silicon nitride 1461.

These two layers 1460, 1461 of nitride form pre-stressed spring which lifts the magnetic plunger 1414 out of core space of the fixed magnetic pole.

Figure 284:
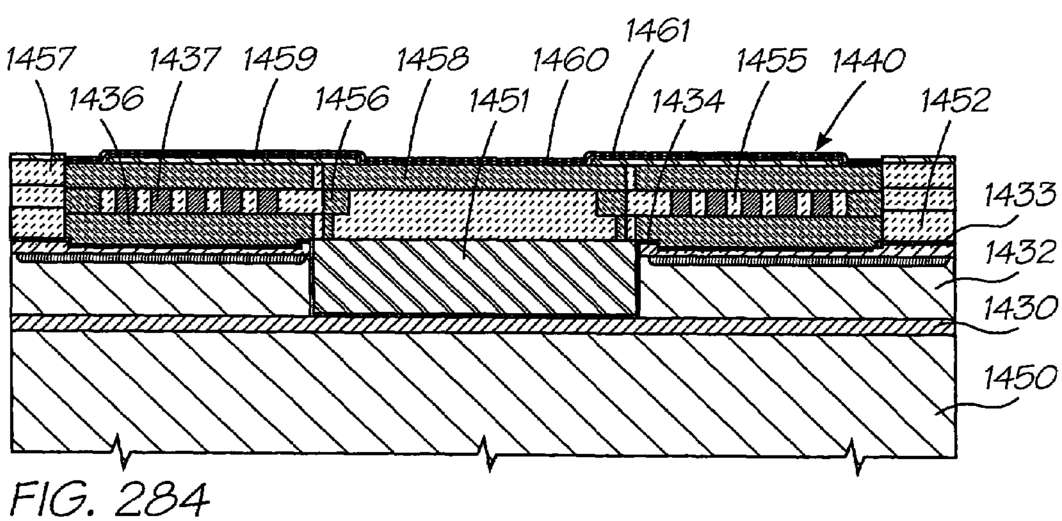

31. Etch the two layers 1460, 1461 of nitride using Mask 9. This mask defines the nitride spring 1440. This step is shown in FIG. 284.

Figure 285:
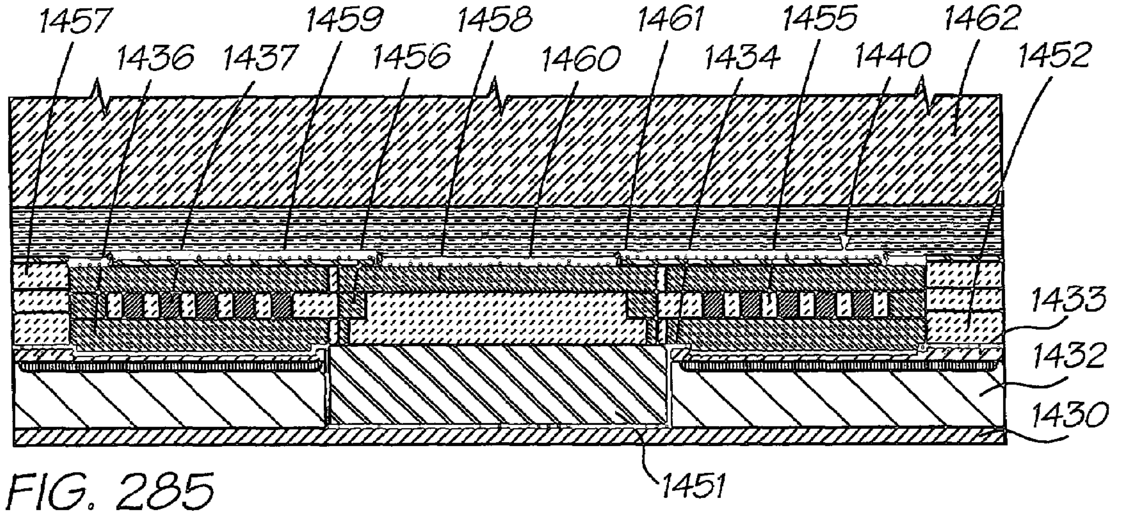

32. Mount the wafer on a glass blank 1462 and back-etch the wafer using KOH with no mask. This etch thins the wafer and stops at the buried boron doped silicon layer 1430. This step is shown in FIG. 285.

Figure 286:
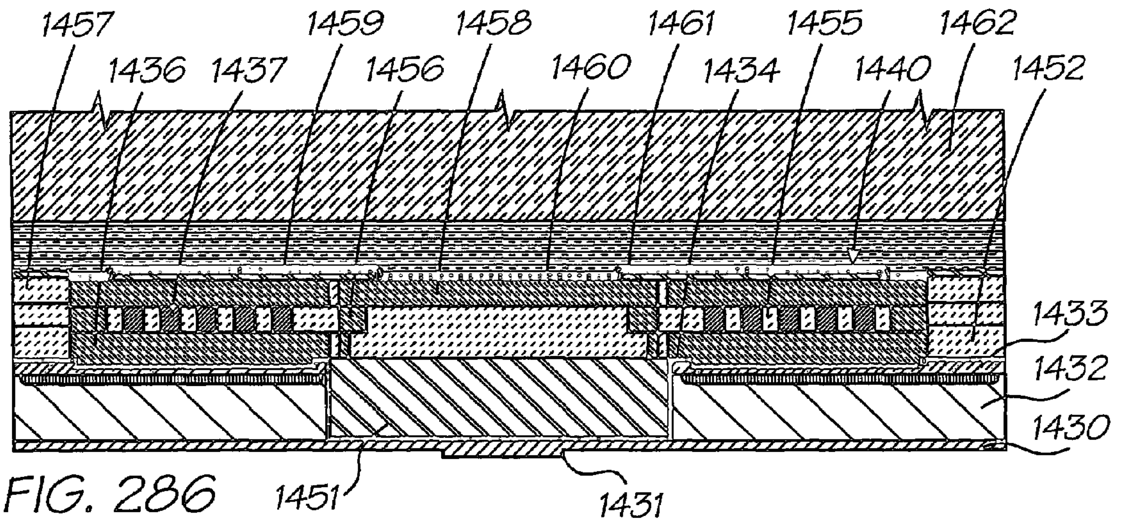

33. Plasma back-etch the boron doped silicon layer to a depth of (approx.) 1micron using Mask 10. This mask defines the nozzle rim 1431. This step is shown in FIG. 286.

Figure 287:
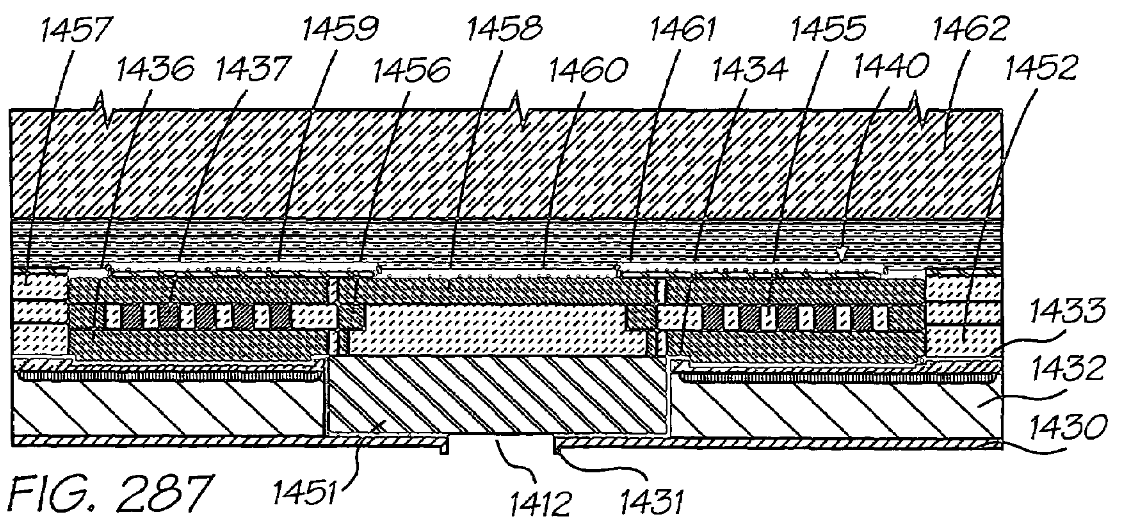

34. Plasma back-etch through the boron doped layer using Mask 11. This mask defines the nozzle 1412, and the edge of the chips. At this stage, the chips are separate, but are still mounted on the glass blank This step is shown in FIG. 287.

Figure 288:
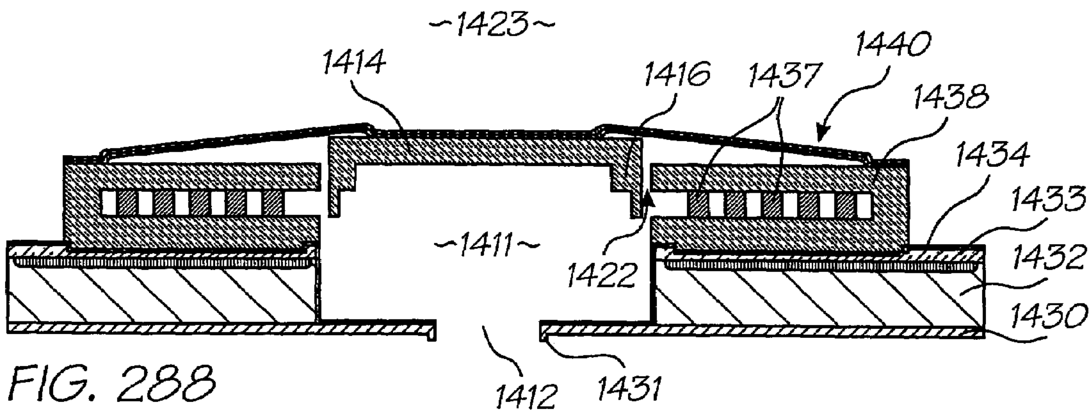

35. Detach the chips from the glass blank Strip all adhesive, resist, sacrificial, and exposed seed layers. The nitride spring 1440 is released in this step, lifting the magnetic plunger out of the fixed magnetic pole by 3 microns. This step is shown in FIG. 288.

36. Mount the printheads in their packaging, which may be a molded plastic former incorporating ink channels which supply different colors of ink to the appropriate regions of the front surface of the wafer.

37. Connect the printheads to their interconnect systems.

38. Hydrophobize the front surface of the printheads.

39. Fill the completed printheads with ink 1463 and test them.

Figure 289:
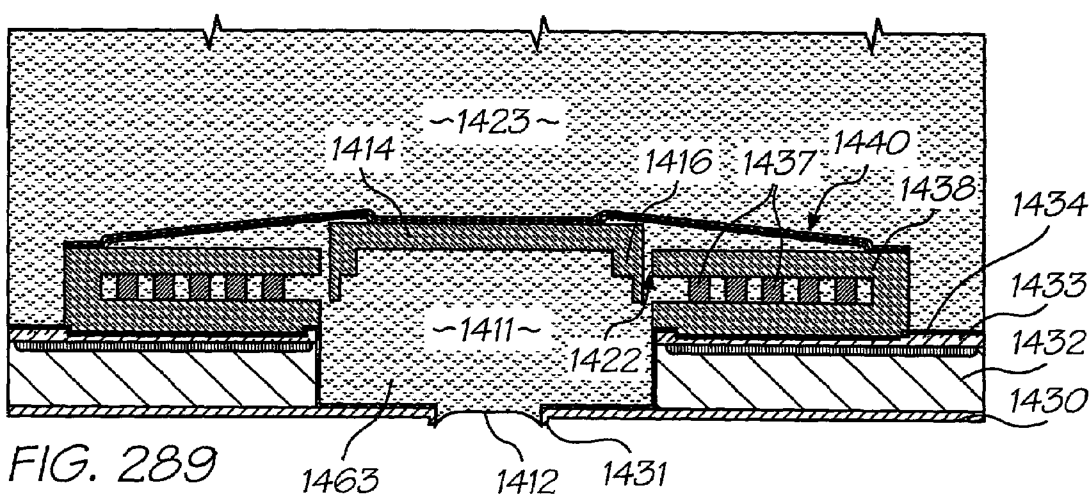

A filled nozzle is shown in FIG. 289.

IJ15

In the present invention, a magnetically actuated ink jet print nozzle is provided for the ejection of ink from an ink chamber. The magnetically actuated ink jet utilizes a linear spring to increase the travel of a shutter grill which blocks any ink pressure variations in a nozzle when in a closed position. However when the shutter is open, pressure variations are directly transmitted to the nozzle chamber and can result in the ejection of ink from the chamber. An oscillating ink pressure within an ink reservoir is used therefore to eject ink from nozzles having an open shutter grill.

Figure 290:
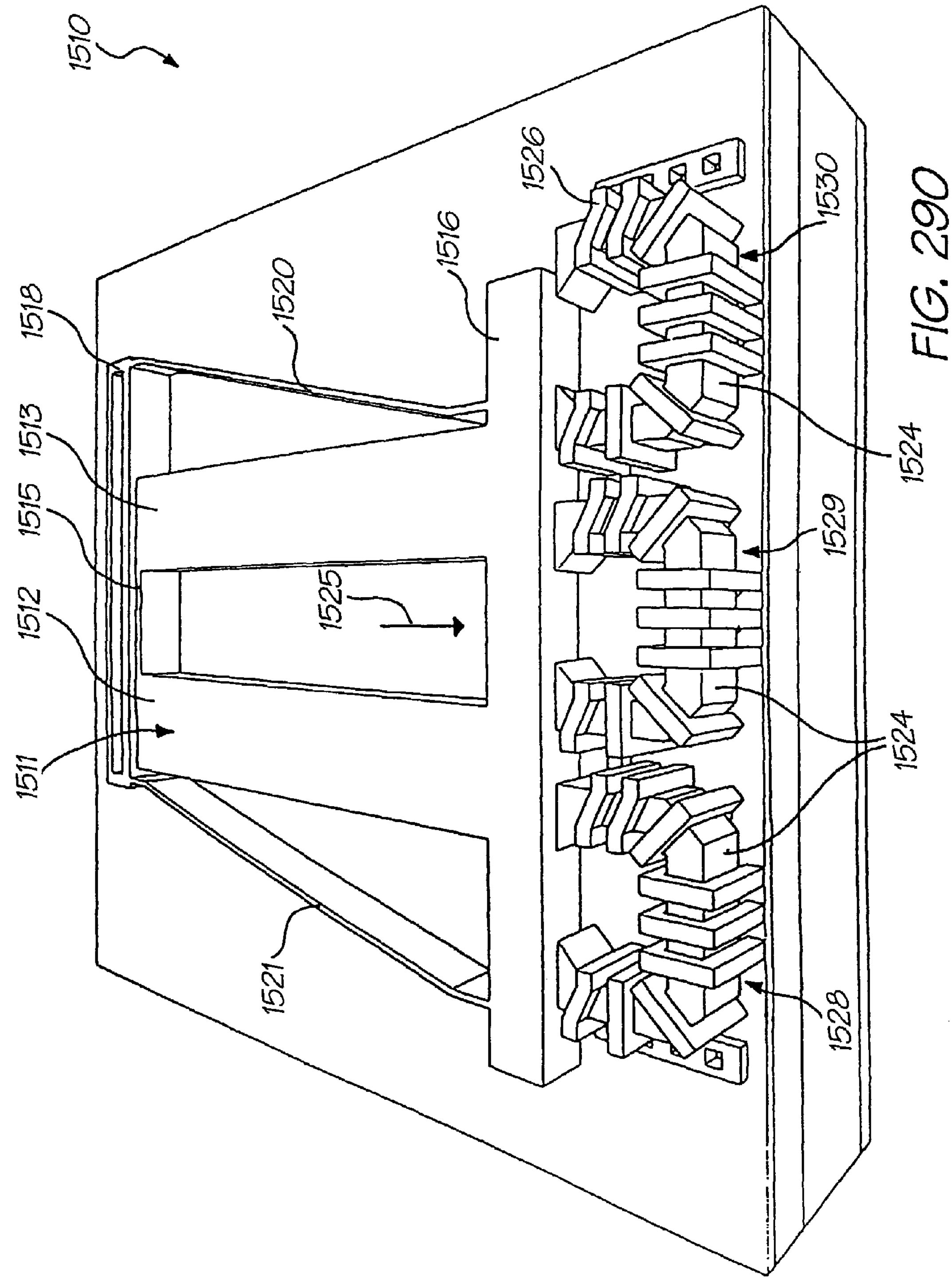
FIG. 290 is a perspective view of a single ink jet nozzle constructed in accordance with a preferred embodiment, in its closed position.

In FIG. 290, there is illustrated a single nozzle mechanism 1510 of a preferred embodiment when in a closed or rest position. The arrangement 1510 includes a shutter mechanism 1511 having shutters 1512, 1513 which are interconnected together by part 1515 at one end for providing structural stability. The two shutters 1512, 1513 are interconnected at another end to a moveable bar 1516 which is further connected to a stationary positioned bar 1518 via leaf springs 1520, 1521. The moveable bar 1516 can be made of a soft magnetic (NiFe) material.

Figure 291:
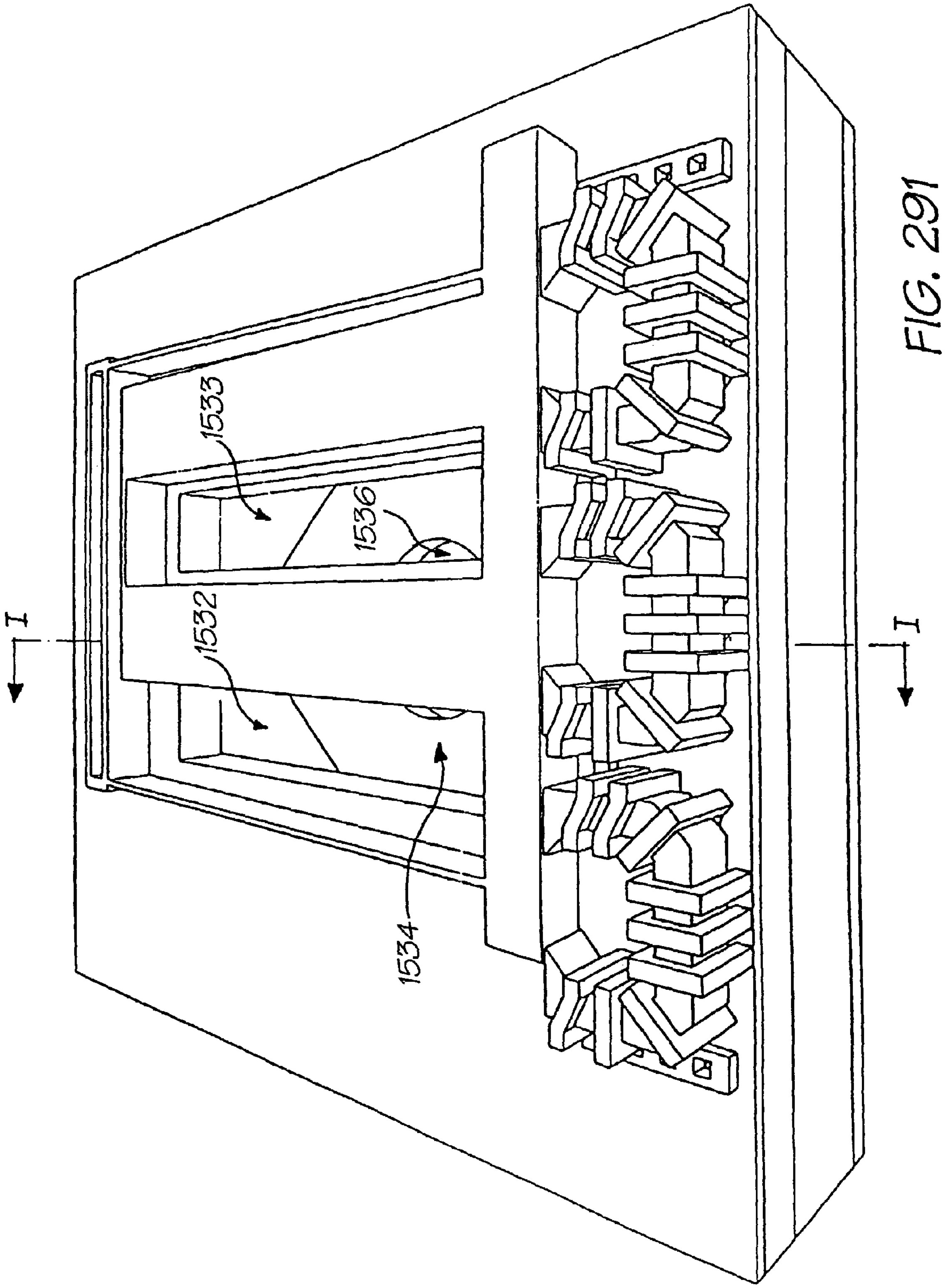
FIG. 291 is a perspective view of a single ink jet nozzle constructed in accordance with a preferred embodiment, in its open position.

An electromagnetic actuator is utilized to attract the moveable bar 1516 generally in the direction of arrow 1525. The electromagnetic actuator consists of a series of soft iron claws 1524 around which is formed a copper coil wire 1526. The electromagnetic actuators can comprise a series of actuators 1528-1530 interconnected via the copper coil windings. Hence, when it is desired to open the shutters 1512-1513 the coil 1526 is activated resulting in an attraction of bar 1516 towards the electromagnets 1528-1530. The attraction results in a corresponding interaction with linear springs 1520, 1521 and a movement of shutters 1512, 1513 to an open position as illustrated in FIG. 291. The result of the actuation being to open portals 1532, 1533 into a nozzle chamber 1534 thereby allowing the ejection of ink through an ink ejection nozzle 1536.

The linear springs 1520, 1521 are designed to increase the movement of the shutter as a result of actuation by a factor of eight A one micron motion of the bar towards the electromagnets will result in an eight micron sideways movement. This dramatically improves the efficiency of the system, as any magnetic field falls off strongly with distance, while the linear springs have a linear relationship between motion in one axis and the other. The use of the linear springs 1520, 1521 therefore allows the relatively large motion required to be easily achieved.

The surface of the wafer is directly immersed in an ink reservoir or in relatively large ink channels. An ultrasonic transducer (for example, a piezoelectric transducer), not shown, is positioned in the reservoir. The transducer oscillates the ink pressure at approximately 100 KHz. The ink pressure oscillation is sufficient that ink drops would be ejected from the nozzle when it is not blocked by the shutters 1512, 1513. When data signals distributed on the print head indicate that a particular nozzle is to eject a drop of ink, the drive transistor for that nozzle is turned on. This energizes the actuators 1528-1530, which moves the shutters 1512, 1513 so that they are not blocking the ink chamber. The peak of the ink pressure variation causes the ink to be squirted out of the nozzle. As the ink pressure goes negative, ink is drawn back into the nozzle, causing drop break-off. The shutters 1512, 1513 are kept open until the nozzle is refilled on the next positive pressure cycle. They are then shut to prevent the ink from being withdrawn from the nozzle on the next negative pressure cycle.

Each drop ejection takes two ink pressure cycles. Preferably half of the nozzles should eject drops in one phase, and the other half of the nozzles should eject drops in the other phase. This minimizes the pressure variations which occur due to a large number of nozzles being actuated.

The amplitude of the ultrasonic transducer can be further altered in response to the viscosity of the ink (which is typically affected by temperature), and the number of drops which are to be ejected in a current cycle. This amplitude adjustment can be used to maintain consistent drop size in varying environmental conditions.

Figure 292:
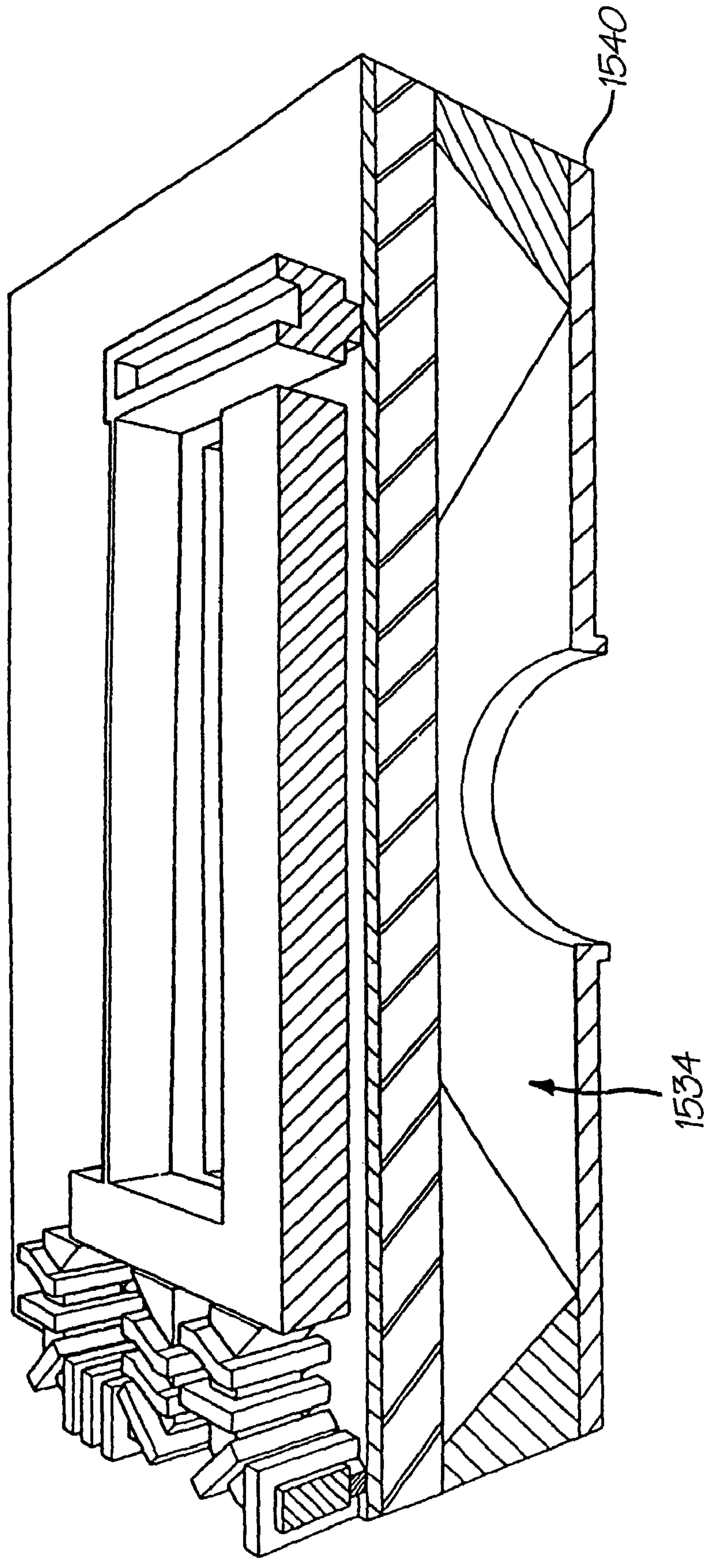
FIG. 292 is a perspective, cross-sectional view taken along the line I-I of FIG. 291, of a single ink jet nozzle in accordance with a preferred embodiment.

In FIG. 292, there is illustrated a section taken through the line I-I of FIG. 291 so as to illustrate the nozzle chamber 1534 which can be formed utilizing an anisotropic crystallographic etch of the silicon substrate. The etch access through the substrate can be via the slots 1532, 1533 (FIG. 290) in the shutter grill.

The device is manufactured on <100> silicon with a buried boron etch stop layer 1540, but rotated 45° in relation to the <010> and <001> planes. Therefore, the <111> planes which stop the crystallographic etch of nozzle chamber form a 45° rectangle which superscribes the slots in the fixed grill. This etch will proceed quite slowly, due to limited access of etchant to the silicon. However, the etch can be performed at the same time as the bulk silicon etch which thins the bottom of the wafer.

Figure 293:
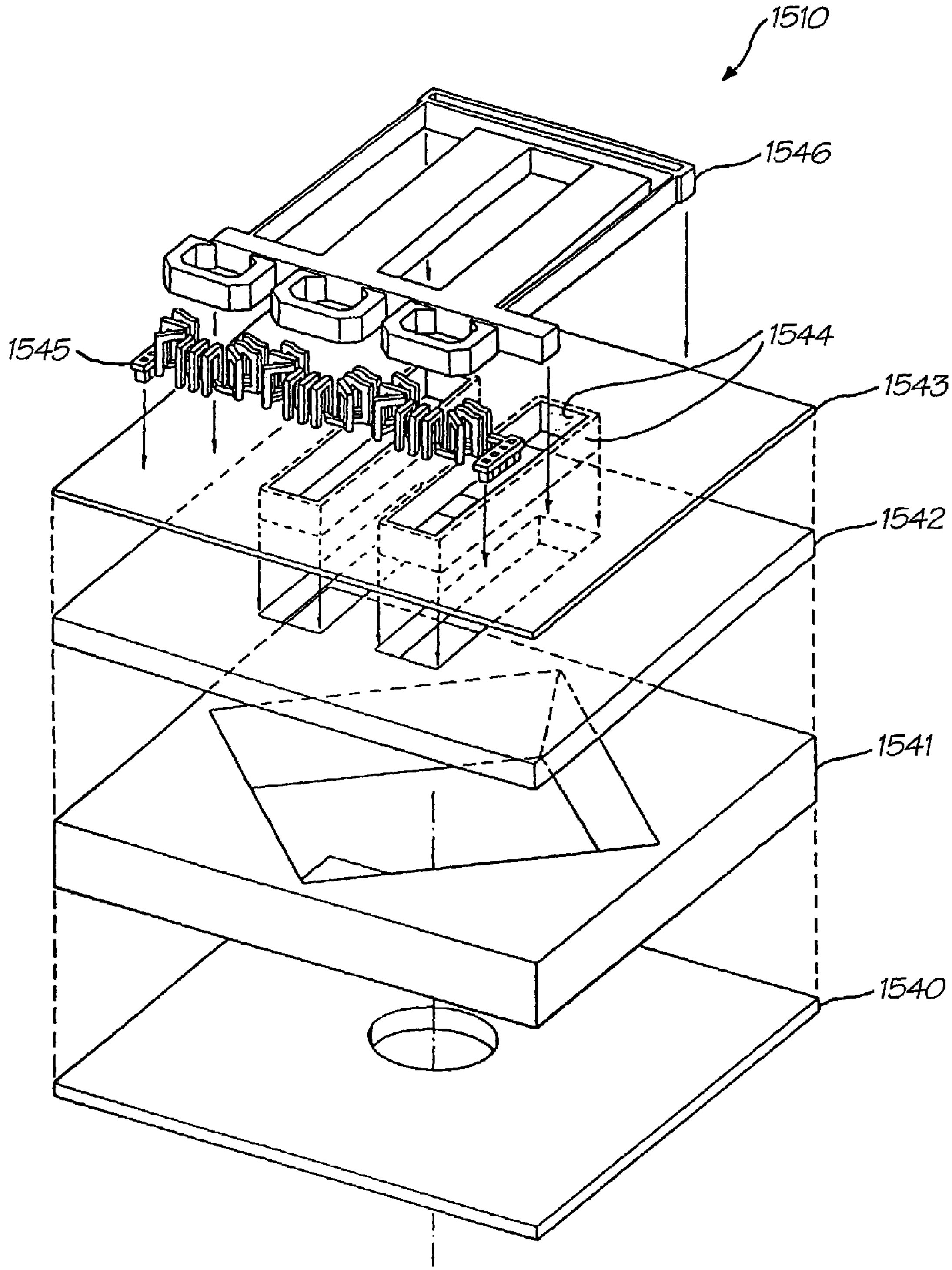
FIG. 293 is an exploded perspective view illustrating the construction of a single ink jet nozzle in accordance with a preferred embodiment.

In FIG. 293, there is illustrated an exploded perspective view of the various layers formed in the construction of an ink jet print head 1510. The layers include the boron doped layer 1540 which acts as an etch stop and can be derived from back etching a silicon wafer having a buried epitaxial layer as is well known in Micro Electro Mechanical Systems (MEMS). The nozzle chamber side walls are formed from a crystallographic graphic etch of the wafer 1541 with the boron doped layer 1540 being utilized as an etch stop.

A subsequent layer 1542 is constructed for the provision of drive transistors and printer logic and can comprise a two level metal CMOS processing layer 1542. The CMOS processing layer is covered by a nitride layer 1543 which includes portions 1544 which cover and protect the side walls of the CMOS layer 1542. The copper layer 1545 can be constructed utilizing a dual damascene process. Finally, a soft metal (NiFe) layer 1546 is provided for forming the rest of the actuator. Each of the layers 1544, 1545 are separately coated by a nitride insulating layer (not shown) which provides passivation and insulation and can be a standard 0.1 micron process.

The arrangement of FIG. 290 therefore provides an ink jet nozzle having a high speed firing rate (approximately 50 KHz) which is suitable for fabrication in arrays of ink jet nozzles, one along side another, for fabrication as a monolithic page width print head.

One form of detailed manufacturing process which can be used to fabricate monolithic ink jet print heads operating in accordance with the principles taught by the present embodiment can proceed utilizing the following steps:

1. Using a double sided polished wafer 1550 deposit 3 microns of epitaxial silicon heavily doped with boron 1540.

2. Deposit 10 microns of epitaxial silicon 1541, either p-type or n-type, depending upon the CMOS process used.

Figure 294:
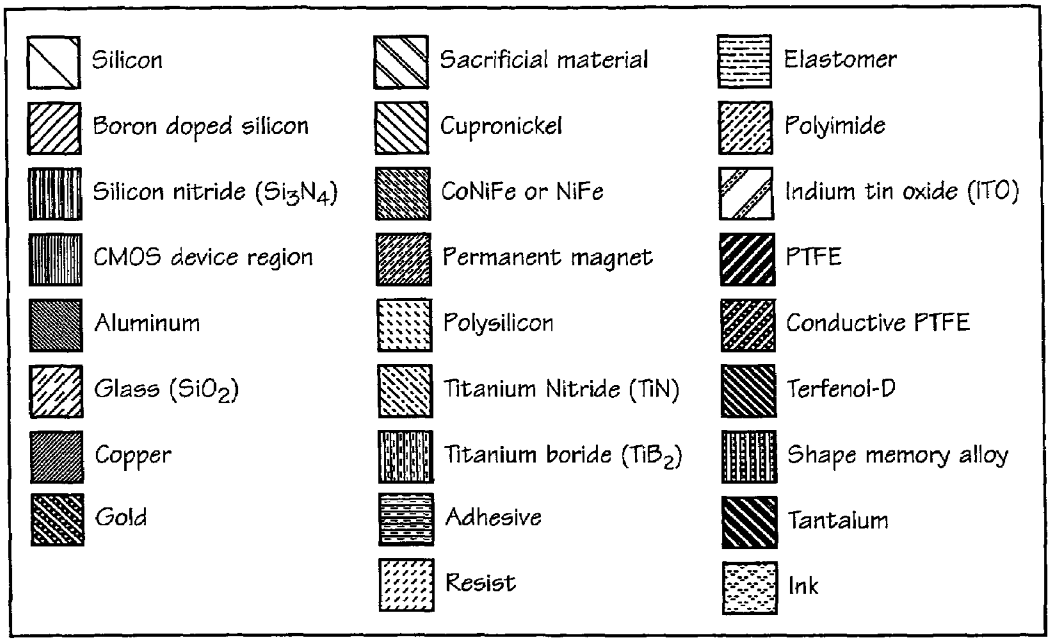
FIG. 294 provides a legend of the materials indicated in FIGS. 295 to 316.
Figure 295:
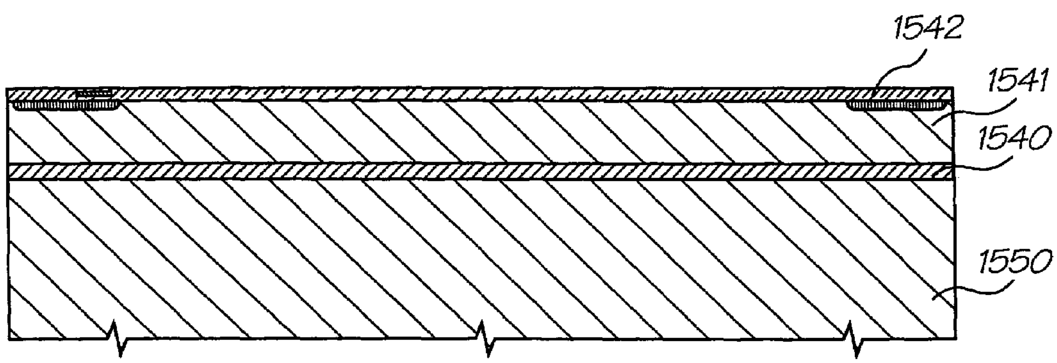
FIG. 295 to FIG. 316 illustrate sectional views of the manufacturing steps in one form of construction of an ink jet printhead nozzle.

3. Complete drive transistors, data distribution, and timing circuits using a 0.5 micron, one poly, 2 metal CMOS process. Relevant features of the wafer 1550 at this step are shown in FIG. 295. For clarity, these diagrams may not be to scale, and may not represent a cross section though any single plane of the nozzle. FIG. 294 is a key to representations of various materials in these manufacturing diagrams, and those of other cross-referenced, ink jet configurations.

Figure 296:
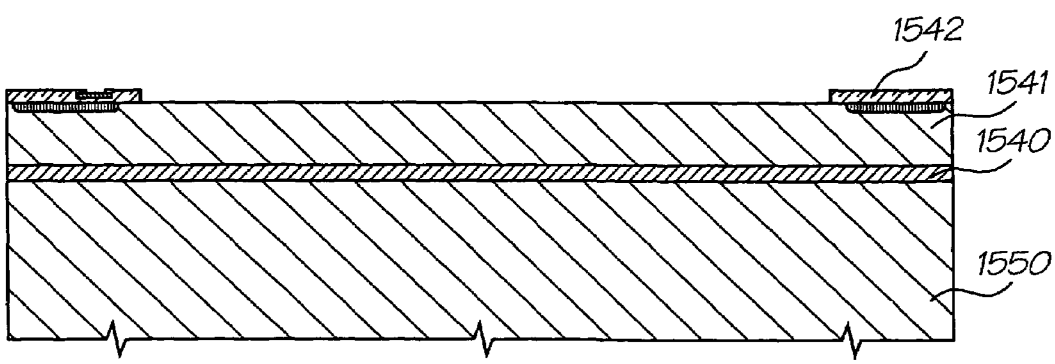

4. Etch the CMOS oxide layers 1541 down to silicon or aluminum using Mask 1. This mask defines the nozzle chamber 1534, and the edges of the print head chips. This step is shown in FIG. 296.

Figure 297:
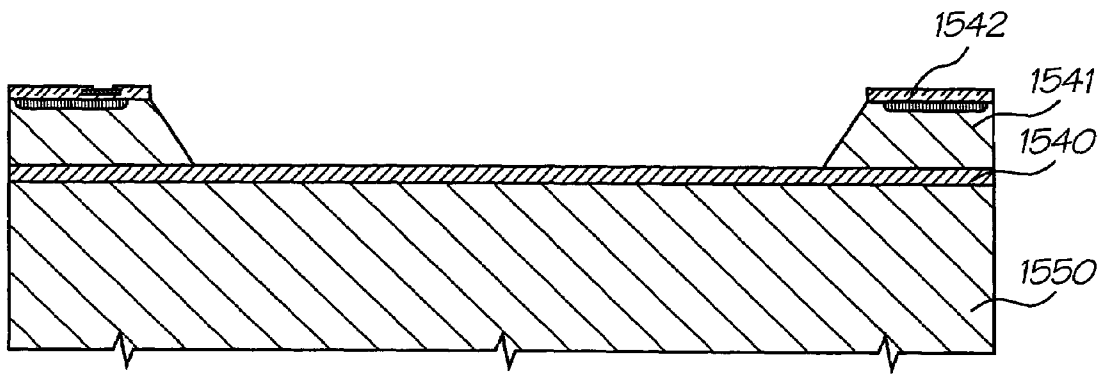

5. Crystallographically etch the exposed silicon using, for example, KOH or EDP (ethylenediamine pyrocatechol). This etch stops on <111> crystallographic planes, and on the boron doped silicon buried layer. This step is shown in FIG. 297.

Figure 298:
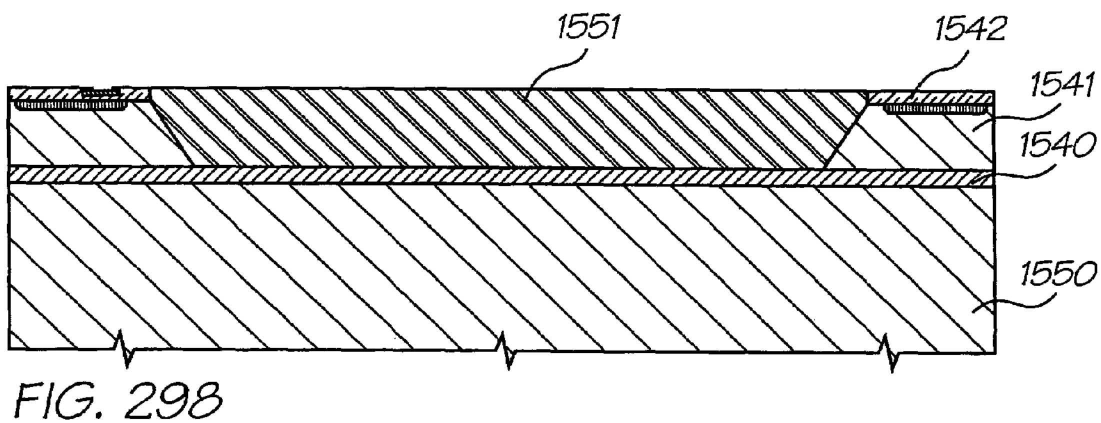

6. Deposit 12 microns of sacrificial material 1551. Planarize down to oxide using CMP. The sacrificial material temporarily fills the nozzle cavity. This step is shown in FIG. 298.

7. Deposit 0.5 microns of silicon nitride ($Si_3N_4$) 1552.

Figure 299:
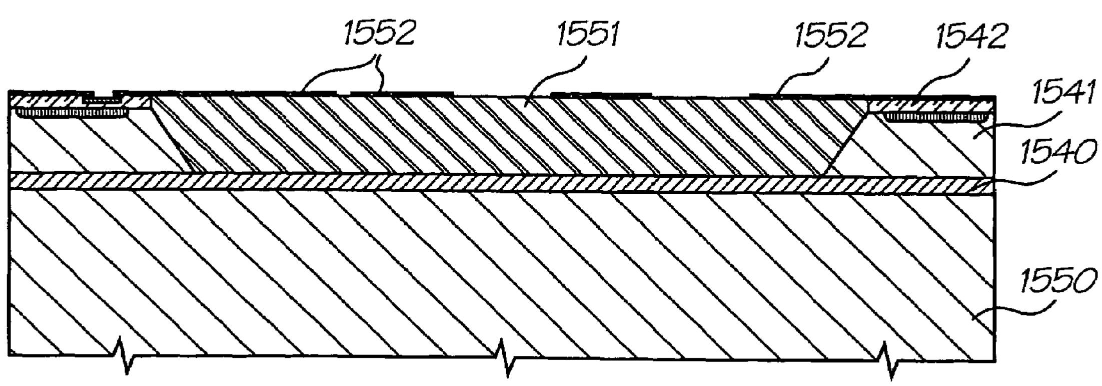

8. Etch nitride 1552 and oxide down to aluminum 1542 or sacrificial material 1551 using Mask 3. This mask defines the contact vias from the aluminum electrodes to the solenoid, as well as the fixed grill over the nozzle cavity. This step is shown in FIG. 299.

9. Deposit a seed layer of copper. Copper is used for its low resistivity (which results in higher efficiency) and its high electromigration resistance, which increases reliability at high current densities.

Figure 300:
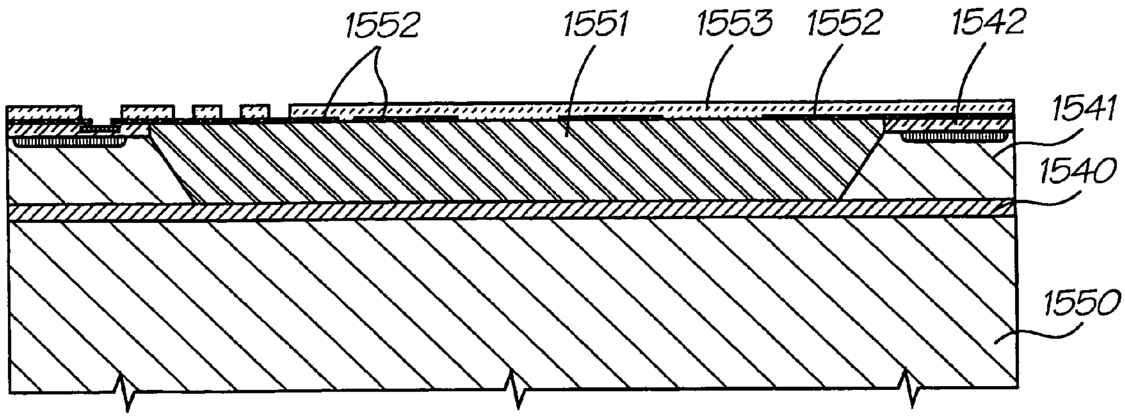

10. Spin on 2 microns of resist 1553, expose with Mask 4, and develop. This mask defines the lower side of the solenoid square helix. The resist acts as an electroplating mold. This step is shown in FIG. 300.

Figure 301:
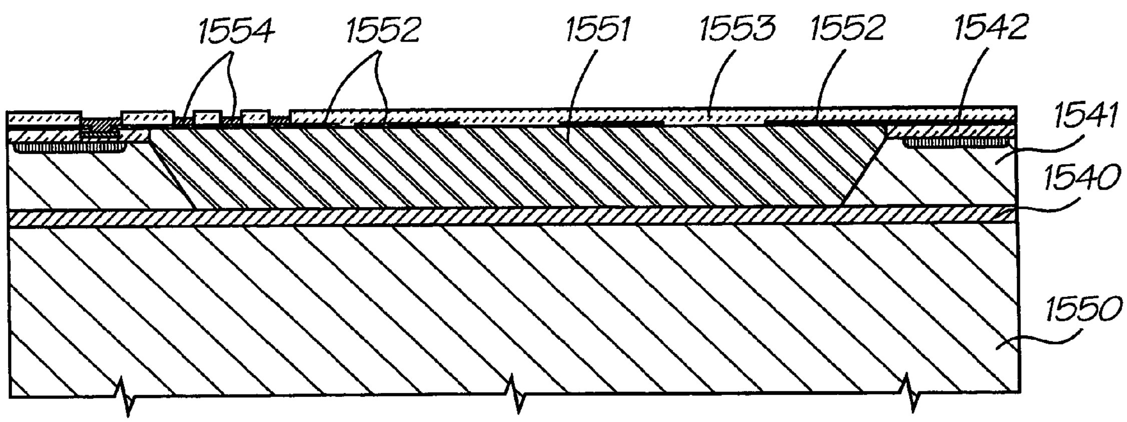

11. Electroplate 1 micron of copper 1554. This step is shown in FIG. 301.

Figure 302:
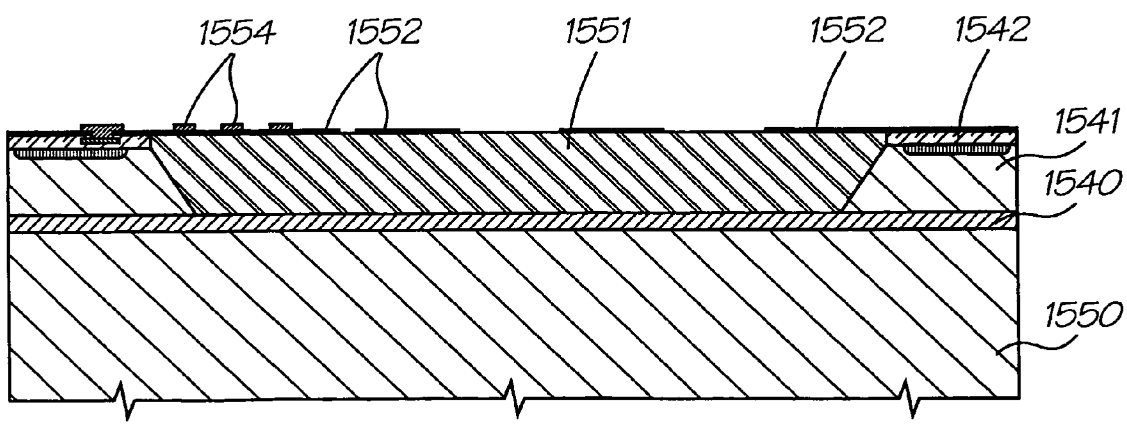

12. Strip the resist 1553 and etch the exposed copper seed layer. This step is shown in FIG. 302.

13. Deposit 0.1 microns of silicon nitride.

14. Deposit 0.5 microns of sacrificial material 1556.

Figure 303:
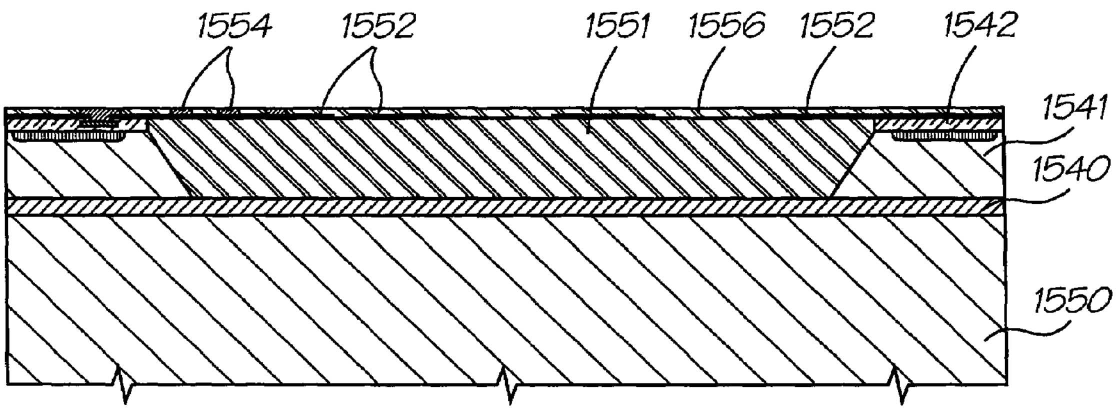

15. Etch the sacrificial material 1556 down to nitride 1552 using Mask 5. This mask defines the solenoid, the fixed magnetic pole, and the linear spring anchor. This step is shown in FIG. 303.

16. Deposit a seed layer of cobalt nickel iron alloy. CoNiFe is chosen due to a high saturation flux density of 2 Tesla, and a low coercivity. [Osaka, Tetsuya et al, A soft magnetic CoNiFe film with high saturation magnetic flux density, Nature 392, 796-798 (1998)].

Figure 304:
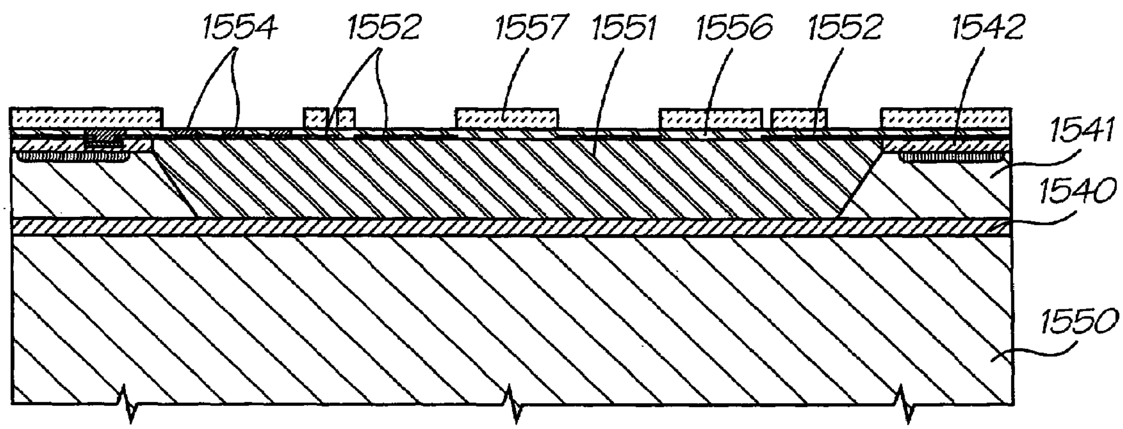

17. Spin on 3 microns of resist 1557, expose with Mask 6, and develop. This mask defines all of the soft magnetic parts, being the U shaped fixed magnetic poles, the linear spring, the linear spring anchor, and the shutter grill. The resist acts as the electroplating mold. This step is shown in FIG. 304.

Figure 305:
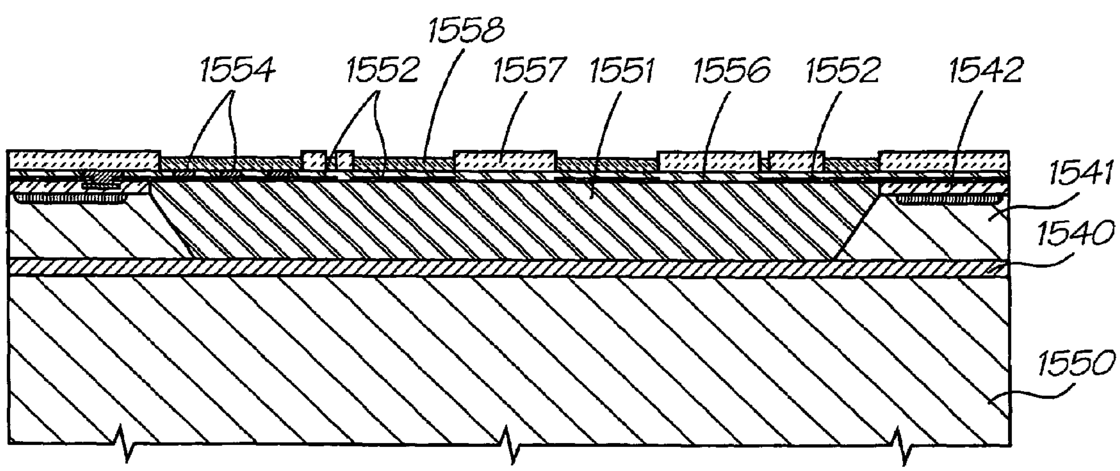

18. Electroplate 2 microns of CoNiFe 1558. This step is shown in FIG. 305.

Figure 306:
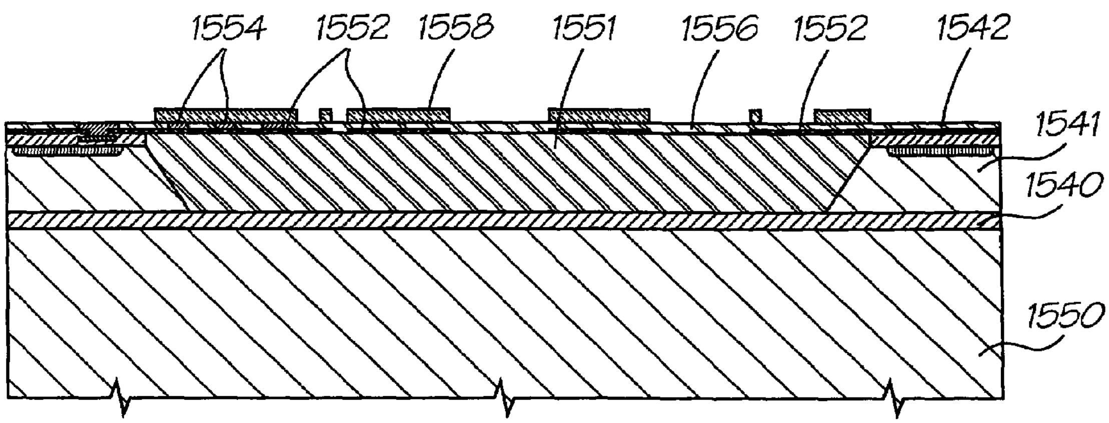

19. Strip the resist 1557 and etch the exposed seed layer. This step is shown in FIG. 306.

20. Deposit 0.1 microns of silicon nitride ($Si_3N_4$).

Figure 307:
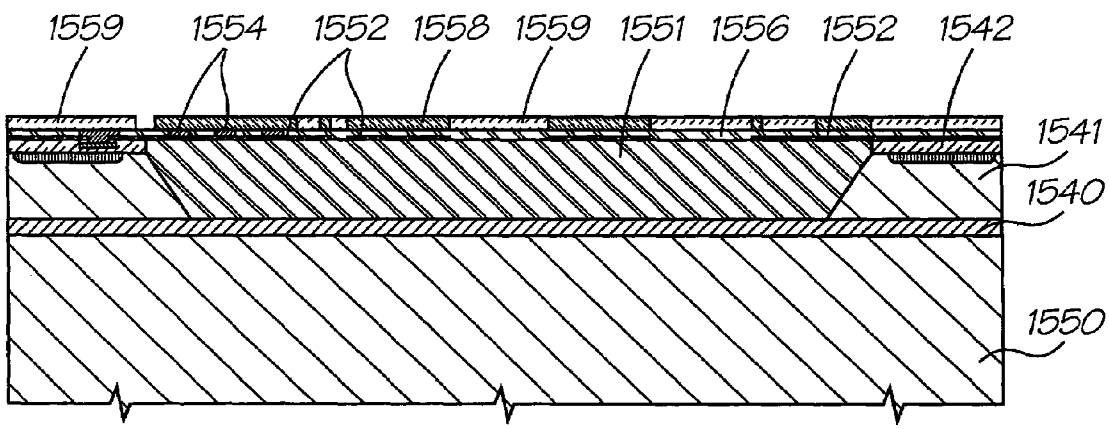

21. Spin on 2 microns of resist 1559, expose with Mask 7, and develop. This mask defines the solenoid vertical wire segments, for which the resist acts as an electroplating mold. This step is shown in FIG. 307.

22. Etch the nitride down to copper using the Mask 7 resist.

Figure 308:
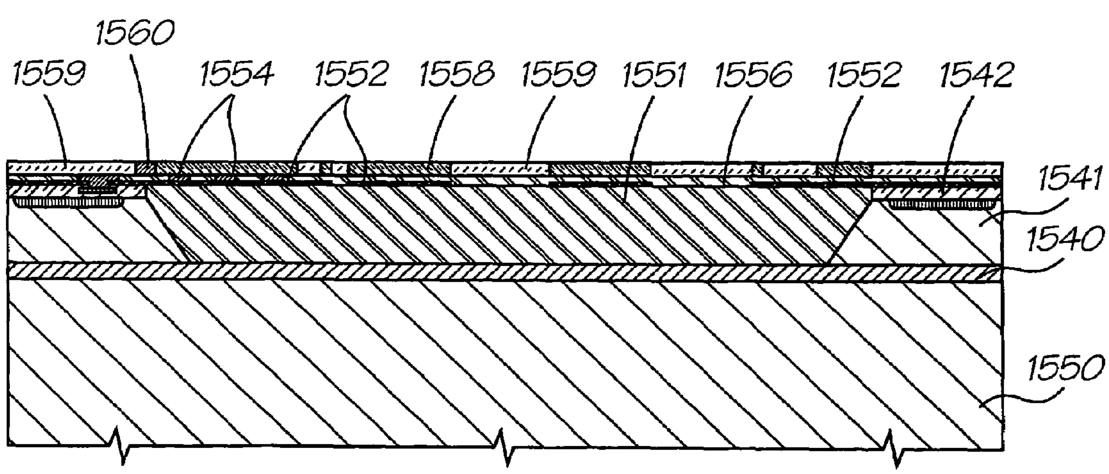

23. Electroplate 2 microns of copper 1560. This step is shown in FIG. 308.

24. Deposit a seed layer of copper.

Figure 309:
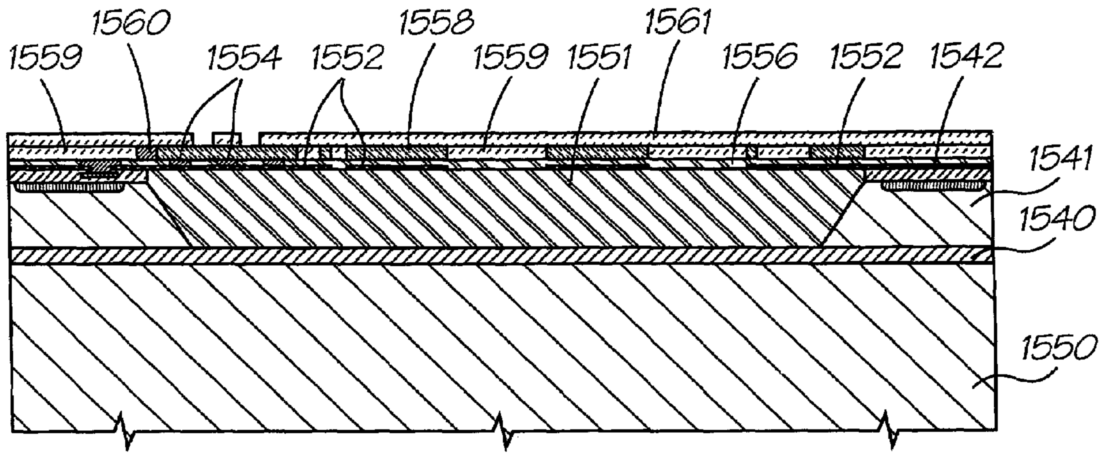

25. Spin on 2 microns of resist 1561, expose with Mask 8, and develop. This mask defines the upper side of the solenoid square helix. The resist acts as an electroplating mold. This step is shown in FIG. 309.

Figure 310:
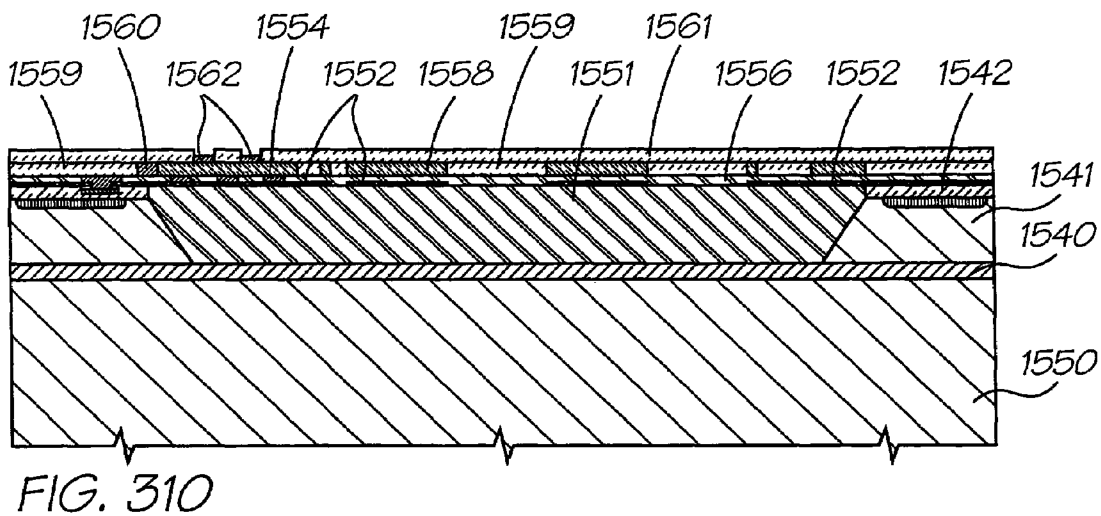

26. Electroplate 1 micron of copper 1562. This step is shown in FIG. 310.

Figure 311:
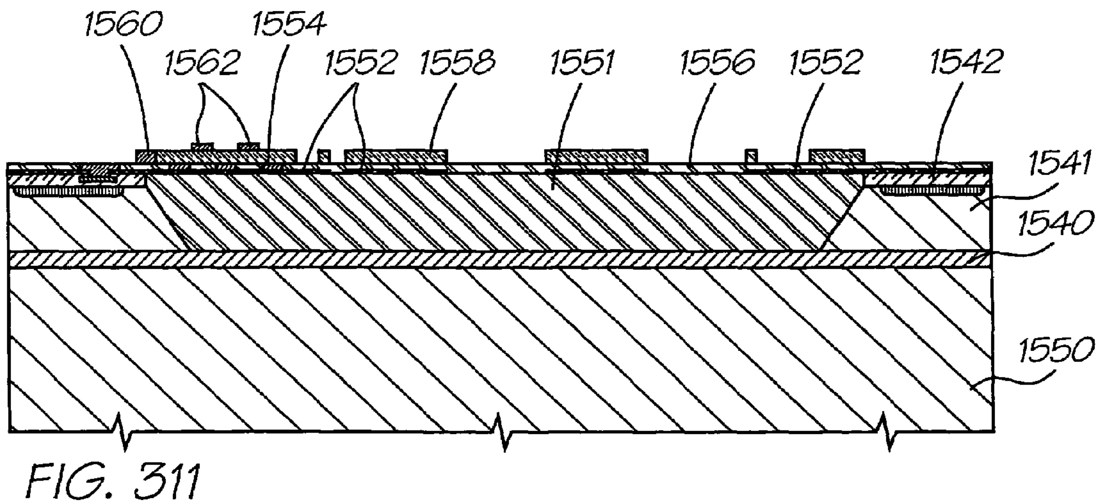

27. Strip the resist 1559 and 1561 and etch the exposed copper seed layer, and strip the newly exposed resist. This step is shown in FIG. 311.

28. Deposit 0.1 microns of conformal silicon nitride as a corrosion barrier.

29. Open the bond pads using Mask 9.

30. Wafer probe. All electrical connections are complete at this point, bond pads are accessible, and the chips are not yet separated.

Figure 312:
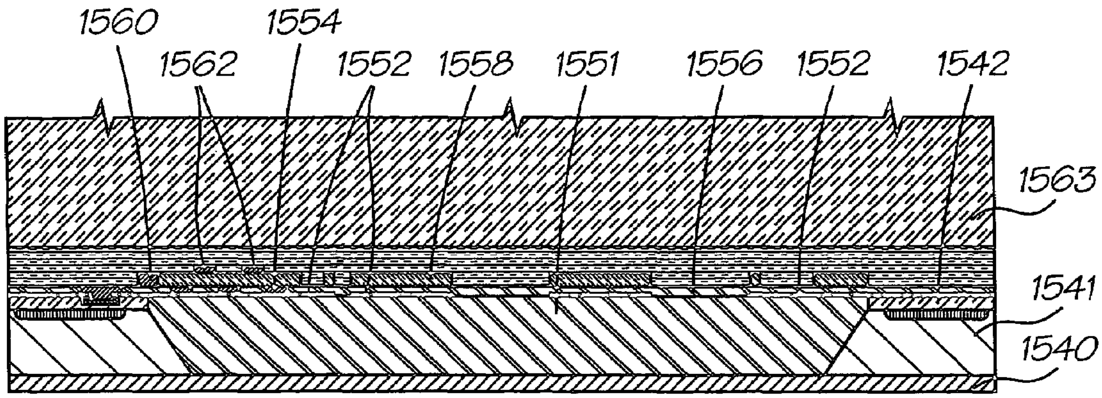

31. Mount the wafer on a glass blank 1563 and back-etch the wafer 1550 using KOH with no mask. This etch thins the wafer and stops at the buried boron doped silicon layer 1540. This step is shown in FIG. 312.

Figure 313:
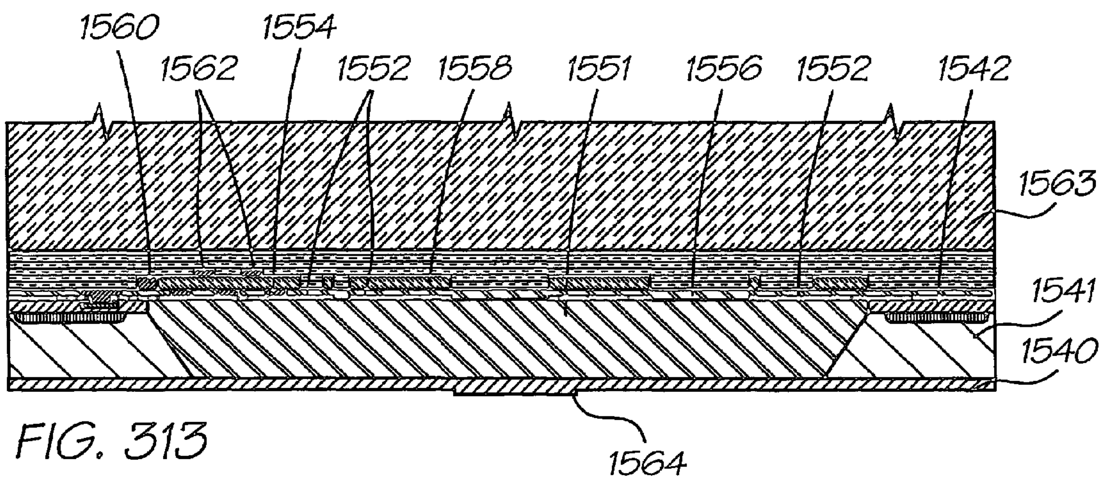

32. Plasma back-etch the boron doped silicon layer 1540 to a depth of 1 micron using Mask 9. This mask defines the nozzle rim 1564. This step is shown in FIG. 313.

Figure 314:
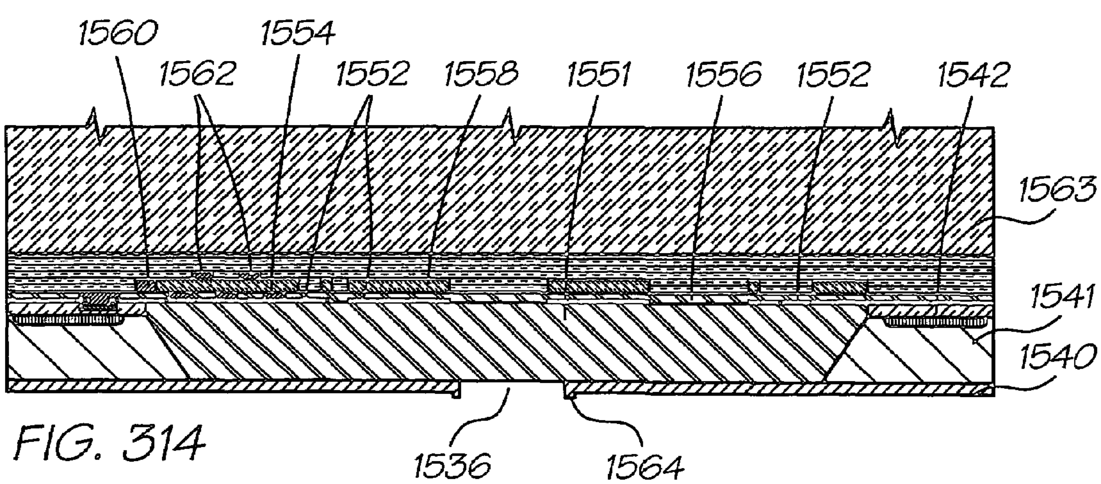

33. Plasma back-etch through the boron doped layer using Mask 10. This mask defines the nozzle 1536, and the edge of the chips. At this stage, the chips are separate, but are still mounted on the glass blank. This step is shown in FIG. 314.

Figure 315:
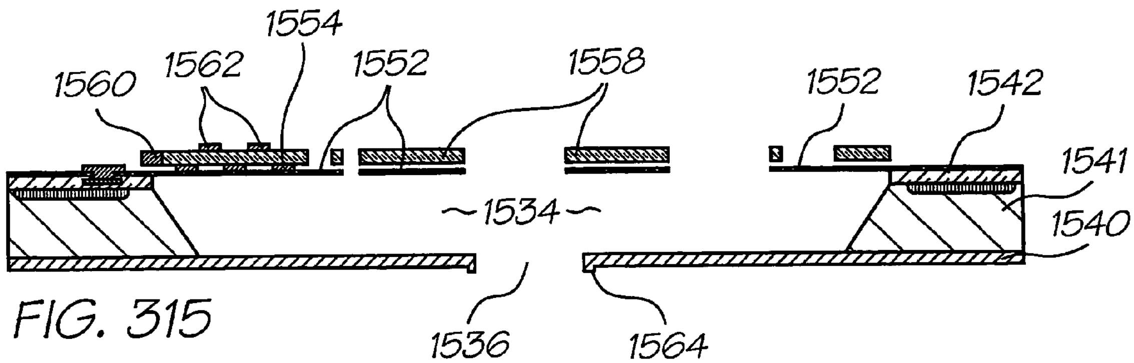

34. Detach the chips from the glass blank 1563. Strip all adhesive, resist, sacrificial, and exposed seed layers. This step is shown in FIG. 315.

35. Mount the print heads in their packaging, which may be a molded plastic former incorporating ink channels which supply different colors of ink to the appropriate regions of the front surface of the wafer. The package also includes a piezoelectric actuator attached to the rear of the ink channels. The piezoelectric actuator provides the oscillating ink pressure required for the ink jet operation.

36. Connect the print heads to their interconnect systems.

37. Hydrophobize the front surface of the print heads.

Figure 316:
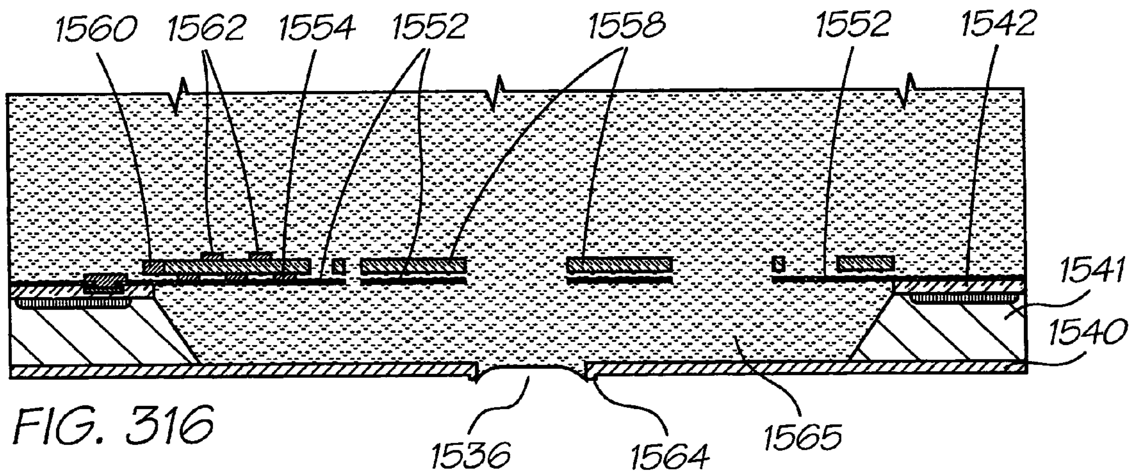

38. Fill the completed print heads with ink 1565 and test them. A filled nozzle is shown in FIG. 316.

IJ16

A preferred embodiment uses a Lorenz force on a current carrying wire in a magnetic field to actuate a diaphragm for the injection of ink from a nozzle chamber via a nozzle hole. The magnetic field is static and is provided by a permanent magnetic yoke around the nozzles of an ink jet head.

Figure 317:
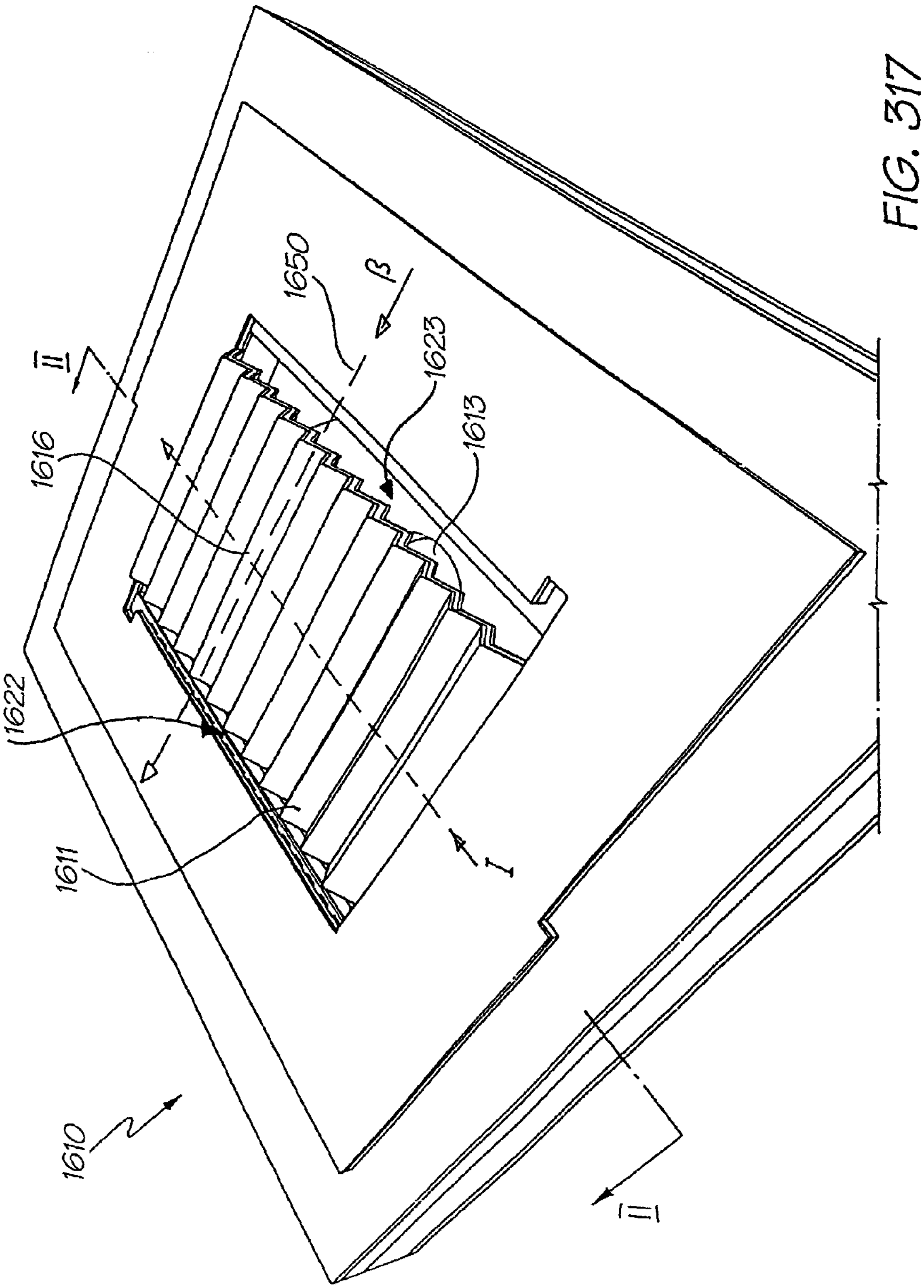
FIG. 317 is a schematic top view of a single ink jet nozzle chamber apparatus constructed in accordance with a preferred embodiment.
Figure 324:
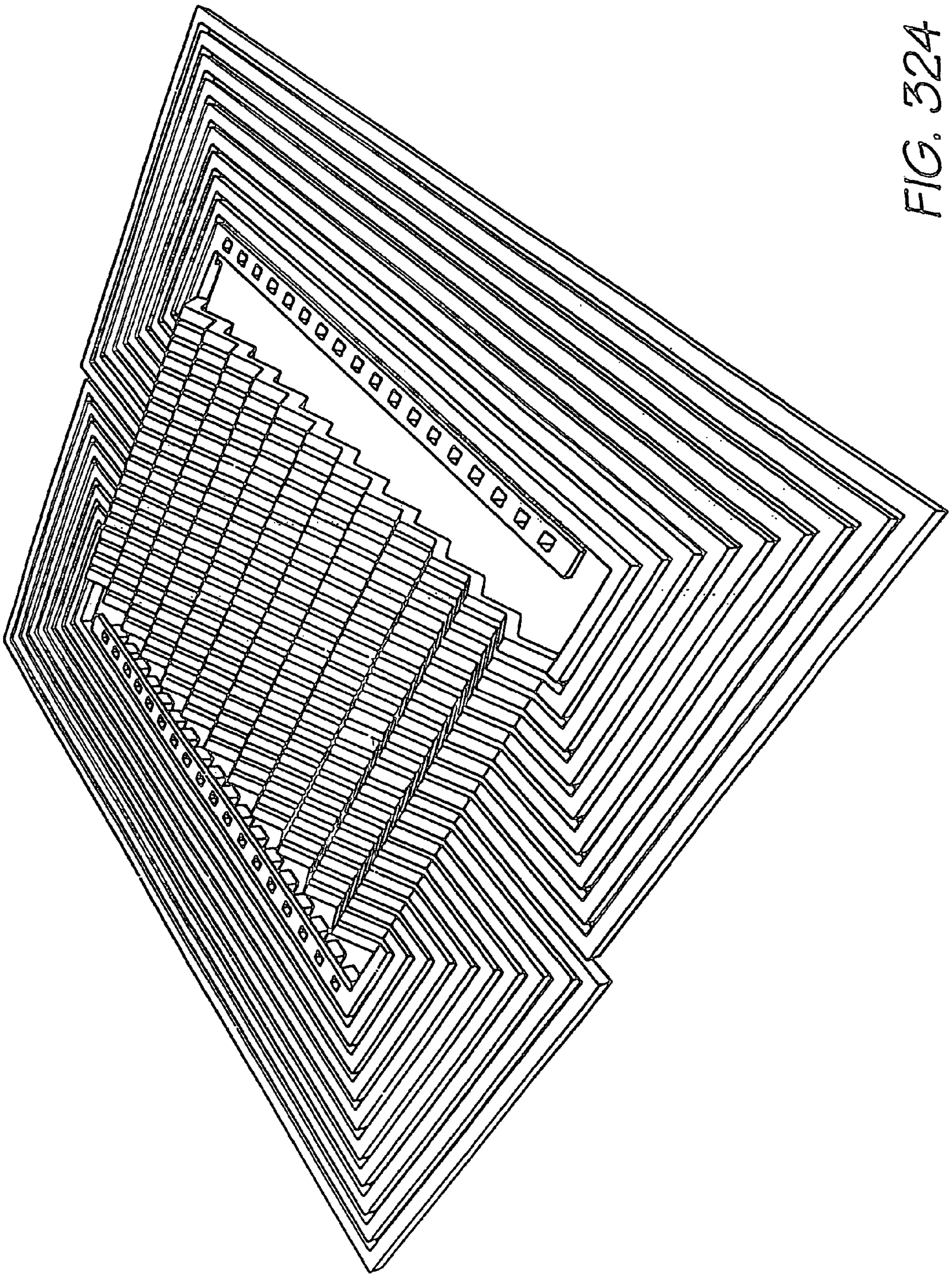
FIG. 324 is a perspective view of the heater traces used in a single ink jet nozzle constructed in accordance with a preferred embodiment.

Referring initially to FIG. 317, there is illustrated a single ink jet nozzle chamber apparatus 1610 as constructed in accordance with a preferred embodiment. Each ink jet nozzle 1610 includes a diaphragm 1611 of a corrugated form which is suspended over a nozzle chamber having a ink port 1613 for the injection of ink. The diaphragm 1611 is constructed from a number of layers including a plane copper coil layer which consists of a large number of copper coils which form a circuit for the flow of electric current across the diaphragm 1611. The electric current in the wires of the diaphragm coil section 1611 all flowing in the same direction. FIG. 324 is a perspective view of the current circuit utilized in the construction of a single ink jet nozzle, illustrating the corrugated structure of the traces in the diaphragm 1611 of FIG. 317. A permanent magnetic yoke (not shown) is arranged so that the magnetic field β, 1616, is in the plane of the chip's surface, perpendicular to the direction of current flow across the diaphragm coil 1611.

Figure 318:
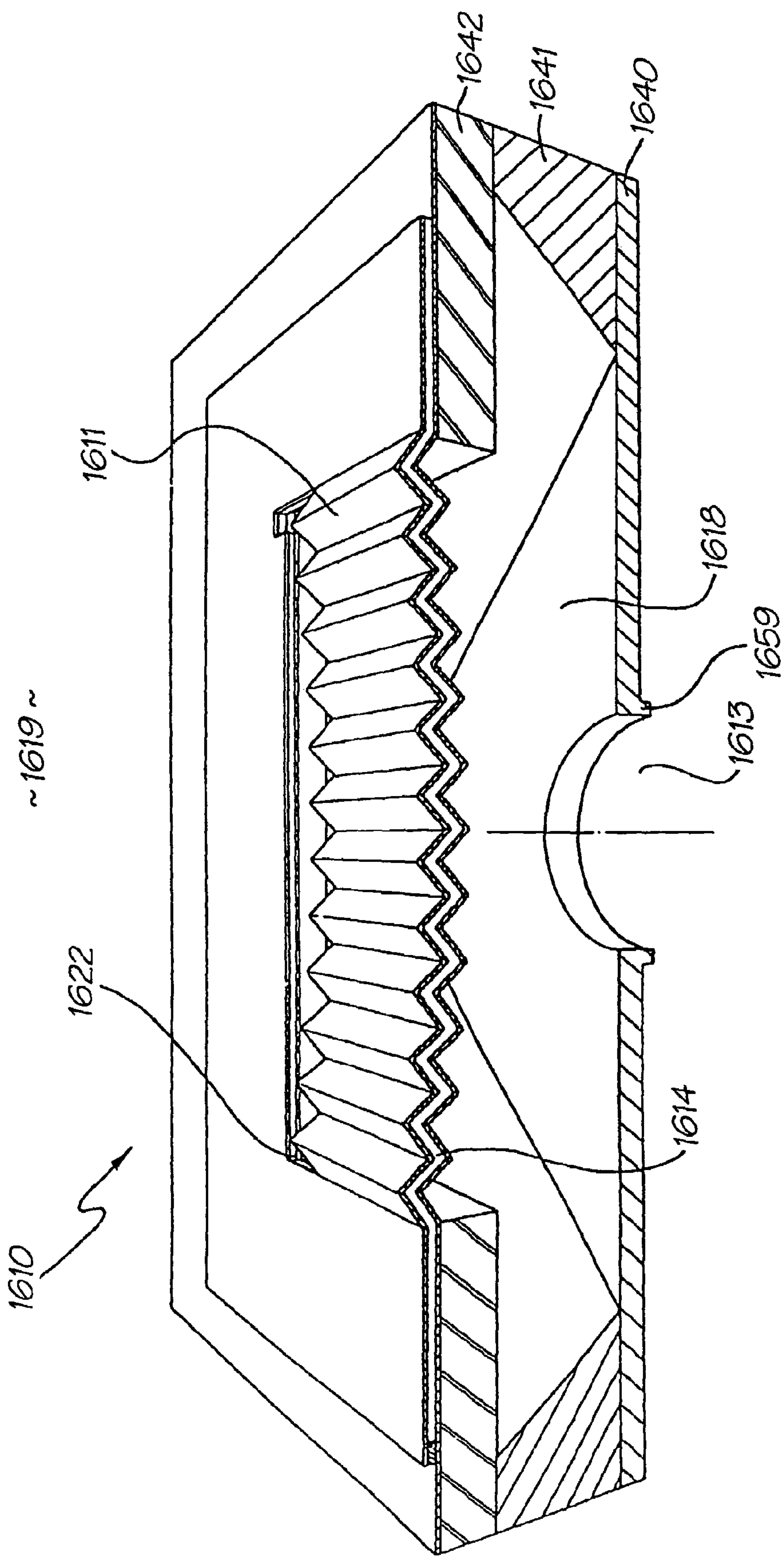
FIG. 318 is a top cross-sectional view of a single ink jet nozzle chamber apparatus with the diaphragm in its activated stage.

In FIG. 318, there is illustrated a sectional view of the ink jet nozzle 1610 taken along the line A-A[1] of FIG. 317 when the diaphragm 1611 has been activated by current flowing through coil wires 1614. The diaphragm 1611 is forced generally in the direction of nozzle 1613 thereby resulting in ink within chamber 1618 being ejected out of port 1613. The diaphragm 1611 and chamber 1618 are connected to an ink reservoir 1619 which, after the ejection of ink via port 1613, results in a refilling of chamber 1618 from ink reservoir 1619.

The movement of the diaphragm 1611 results from a Lorenz interaction between the coil current and the magnetic field.

The diaphragm 1611 is corrugated so that the diaphragm motion occurs as an elastic bending motion. This is important as a flat diaphragm may be prevented from flexing by tensile stress.

When data signals distributed on the printhead indicate that a particular nozzle is to eject a drop of ink, the drive transistor for that nozzle is turned on. This energizes the coil 1614, causing elastic deformation of the diaphragm 1611 downwards, ejecting ink. After approximately 3 μs, the coil current is turned off, and the diaphragm 1611 returns to its quiescent position. The diaphragm return 'sucks' some of the ink back into the nozzle, causing the ink ligament connecting the ink drop to the ink in the nozzle to thin. The forward velocity of the drop and backward velocity of the ink in the chamber 1618 are resolved by the ink drop breaking off from the ink in the nozzle. The ink drop then continues towards the recording medium. Ink refill of the nozzle chamber 1618 is via the two slots 1622, 1623 at either side of the diaphragm. The ink refill is caused by the surface tension of the ink meniscus at the nozzle.

Figure 319:
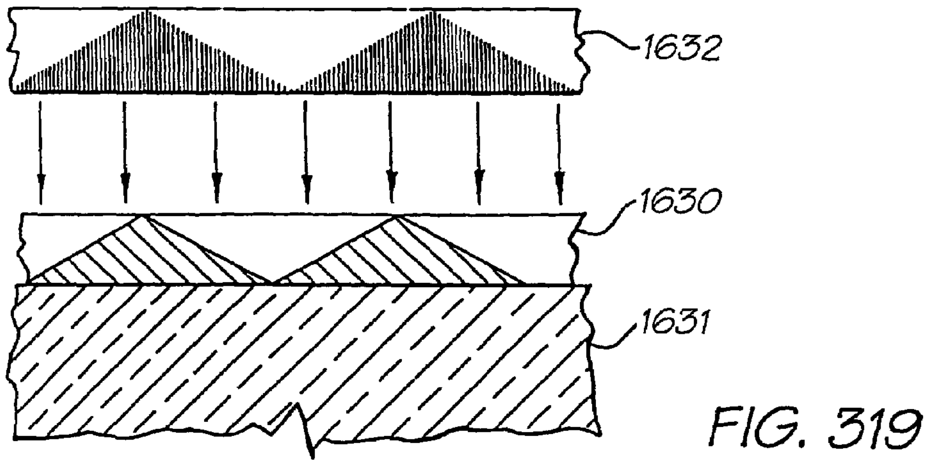
FIG. 319 is a schematic cross-sectional view illustrating the exposure of a resist layer through a halftone mask.

Turning to FIG. 319, the corrugated diaphragm can be formed by depositing a resist layer 1630 on top of a sacrificial glass layer 1631. The resist layer 1630 is exposed using a mask 1632 having a halftone pattern delineating the corrugations.

Figure 320:
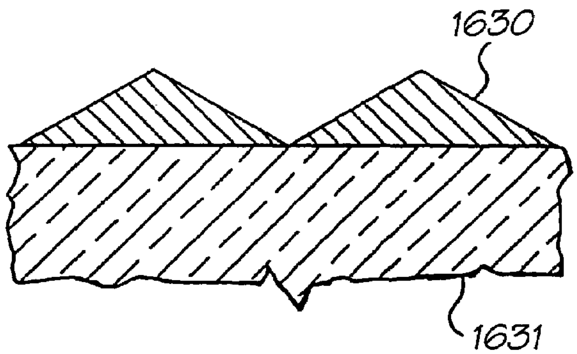
FIG. 320 is a schematic cross-sectional view illustrating the resist layer after development exhibiting a corrugated pattern.
Figure 321:
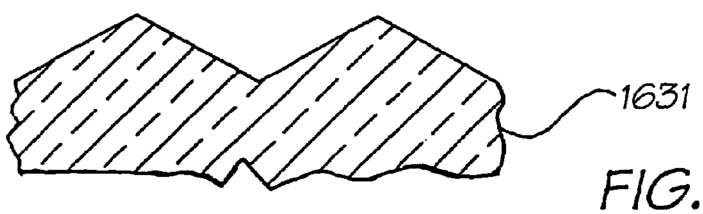
FIG. 321 is a schematic cross-sectional view illustrating the transfer of the corrugated pattern onto the substrate by etching.
Figure 322:
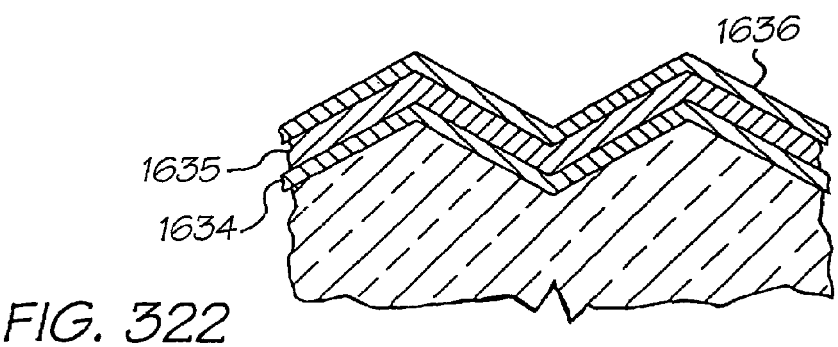
FIG. 322 is a schematic cross-sectional view illustrating the construction of an embedded, corrugated, conduction layer.

After development, as is illustrated in FIG. 320, the resist 1630 contains the corrugation pattern. The resist layer 1630 and the sacrificial glass layer are then etched using an etchant that erodes the resist 1630 at substantially the same rate as the sacrificial glass 1631. This transfers the corrugated pattern into the sacrificial glass layer 1631 as illustrated in FIG. 321. As illustrated in FIG. 322, subsequently, a nitride passivation layer 1634 is deposited followed a copper layer 1635 which is patterned using a coil mask. A further nitride passivation layer 1636 follows on top of the copper layer 1635. Slots 1622, 1623 in the nitride layer at the side of the diaphragm can be etched (FIG. 317) and subsequently, the sacrificial glass layer can be etched away leaving the corrugated diaphragm.

Figure 323:
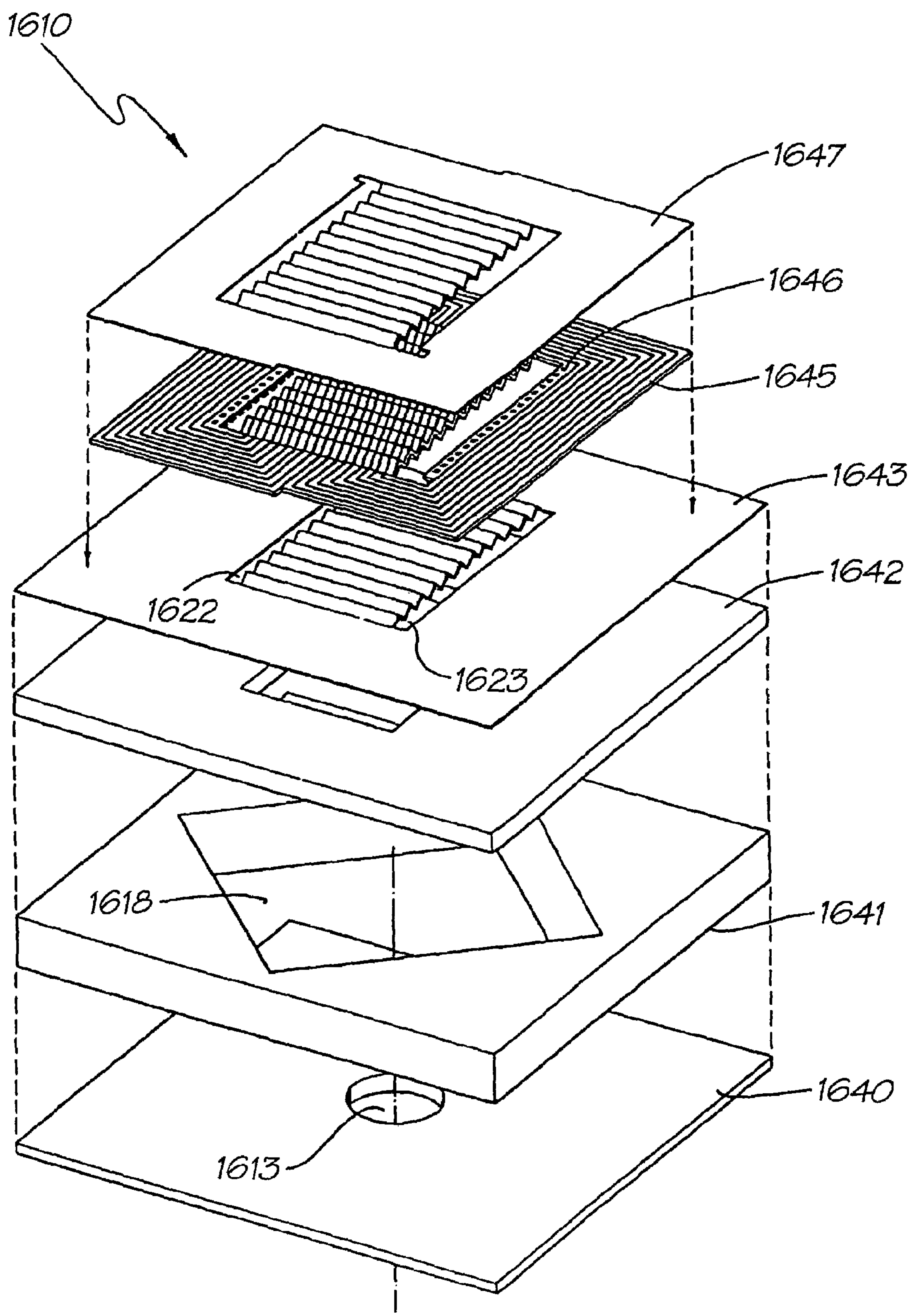
FIG. 323 is an exploded perspective view illustrating the construction of a single ink jet nozzle in accordance with a preferred embodiment.

In FIG. 323, there is illustrated an exploded perspective view of the various layers of an ink jet nozzle 1610 which is constructed on a silicon wafer having a buried boron doped epitaxial layer 1640 which is back etched in a final processing step, including the etching of ink port 1613. The silicon substrate 1641, as will be discussed below, is an anisotropically crystallographically etched so as to form the nozzle chamber structure. On top of the silicon substrate layer 1641 is a CMOS layer 1642 which can comprise standard CMOS processing to form two level metal drive and control circuitry. On top of the CMOS layer 1642 is a first passivation layer 1643 which can comprise silicon nitride which protects the lower layers from any subsequent etching processes. On top of this layer is formed the copper layer 1645 having through holes e.g. 1646 to the CMOS layer 1642 for the supply of current On top of the copper layer 1645 is a second nitrate passivation layer 1647 which provides for protection of the copper layer from ink and provides insulation.

The nozzle 1610 can be formed as part of an array of nozzles formed on a single wafer. After construction, the wafer creating nozzles 1610 can be bonded to a second ink supply wafer having ink channels for the supply of ink such that the nozzle 1610 is effectively supplied with an ink reservoir on one side and ejects ink through the hole 1613 onto print media or the like on demand as required.

The nozzle chamber 1618 is formed using an anisotropic crystallographic etch of the silicon substrate. Etchant access to the substrate is via the slots 1622, 1623 at the sides of the diaphragm. The device is manufactured on <100> silicon (with a buried boron etch stop layer), but rotated 45° in relation to the <010> and <001> planes. Therefore, the <111> planes which stop the crystallographic etch of the nozzle chamber form a 45° rectangle which superscribes the slot in the nitride layer. This etch will proceed quite slowly, due to limited access of etchant to the silicon. However, the etch can be performed at the same time as the bulk silicon etch which thins the wafer. The drop firing rate is around 7 KHz. The ink jet head is suitable for fabrication as a monolithic page wide print head. The illustration shows a single nozzle of a 1600 dpi print head in 'down shooter' configuration.

One form of detailed manufacturing process which can be used to fabricate monolithic ink jet print heads operating in accordance with the principles taught by the present embodiment can proceed utilizing the following steps:

1. Using a double sided polished wafer 1650 deposit 3 microns of epitaxial silicon heavily doped with boron 1640.

2. Deposit 10 microns of epitaxial silicon 1641, either p-type or n-type, depending upon the CMOS process used.

Figure 325:
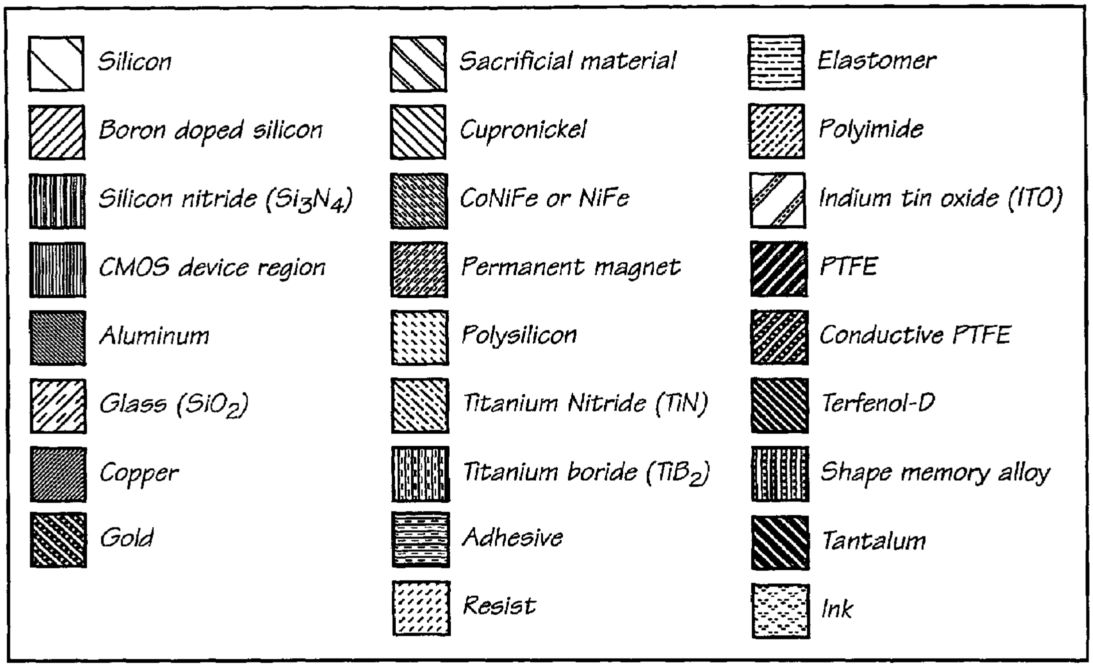
FIG. 325 provides a legend of the materials indicated in FIGS. 326 to 336.
Figure 326:
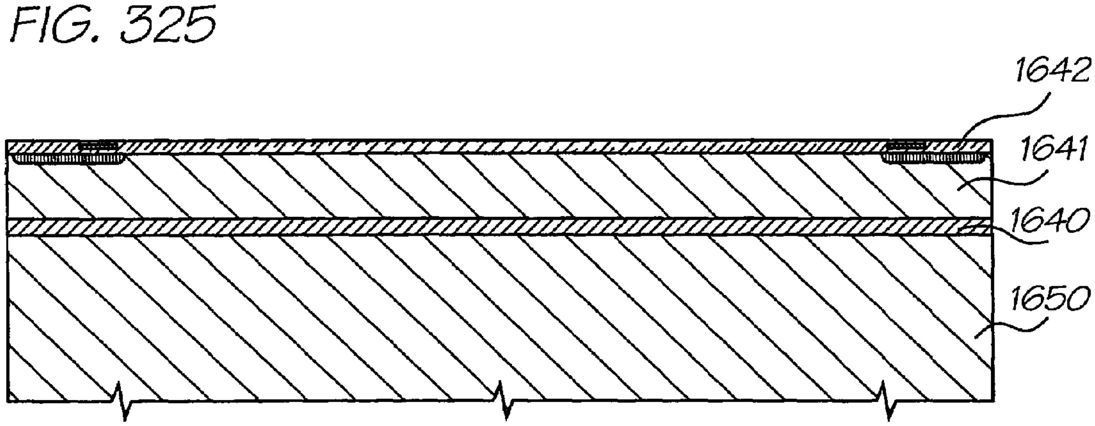
FIG. 326 to FIG. 337 illustrate sectional views of the manufacturing steps in one form of construction of an ink jet printhead nozzle.

3. Complete drive transistors, data distribution, and timing circuits using a 0.5 micron, one poly, 2 metal CMOS process 1642. This step is shown in FIG. 326. For clarity, these diagrams may not be to scale, and may not represent a cross section though any single plane of the nozzle. FIG. 325 is a key to representations of various materials in these manufacturing diagrams, and those of other cross referenced ink jet configurations.

Figure 327:
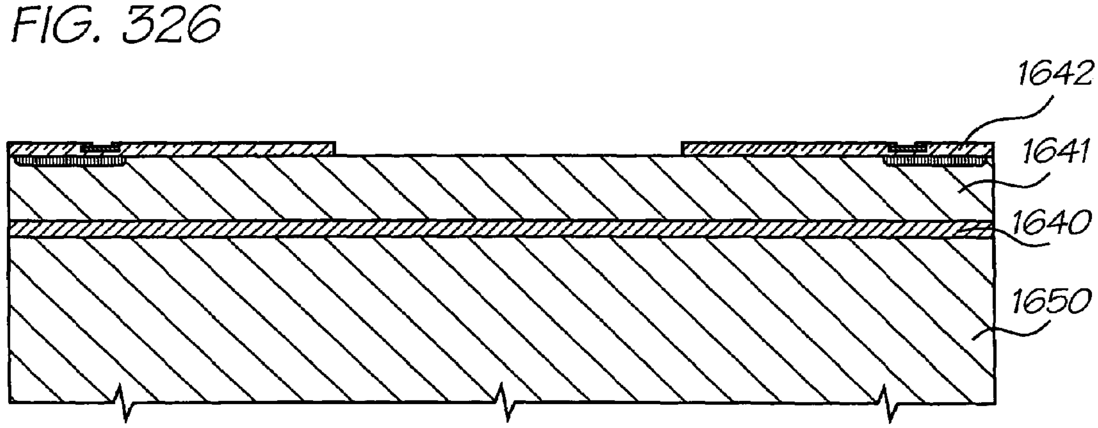

4. Etch the CMOS oxide layers down to silicon or aluminum using Mask 1. This mask defines the nozzle chamber, and the edges of the print heads chips. This step is shown in FIG. 327.

Figure 328:
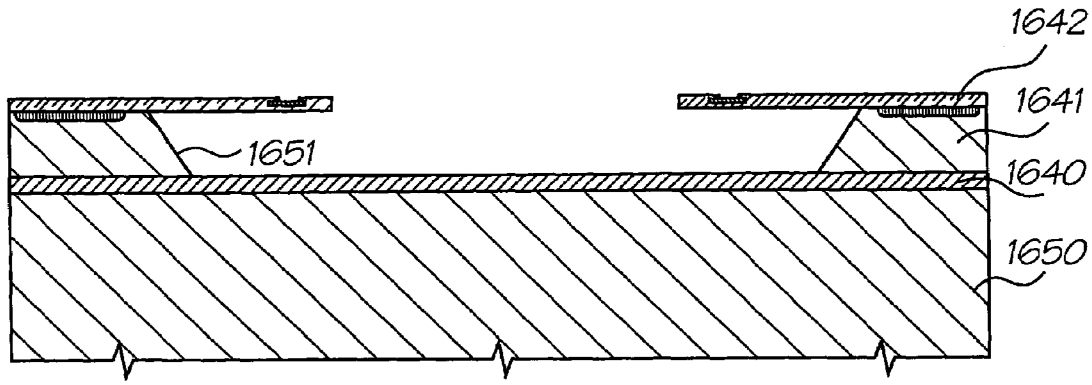

5. Crystallographically etch the exposed silicon using, for example, KOH or EDP (ethylenediamine pyrocatechol). This etch stops on <111> crystallographic planes 1651, and on the boron doped silicon buried layer. This step is shown in FIG. 328.

Figure 329:
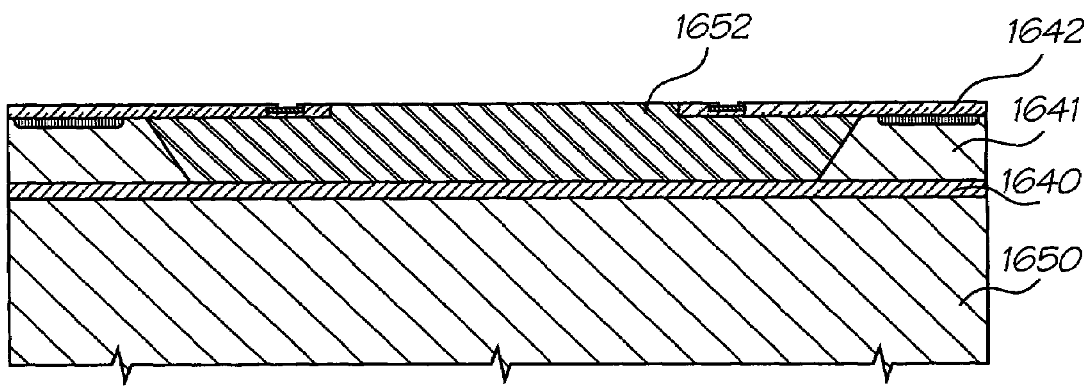

6. Deposit 12 microns of sacrificial material (polyimide) 1652. Planarize down to oxide using CMP. The sacrificial material temporarily fills the nozzle cavity. This step is shown in FIG. 329.

7. Deposit 1 micron of (sacrificial) photosensitive polyimide.

Figure 330:
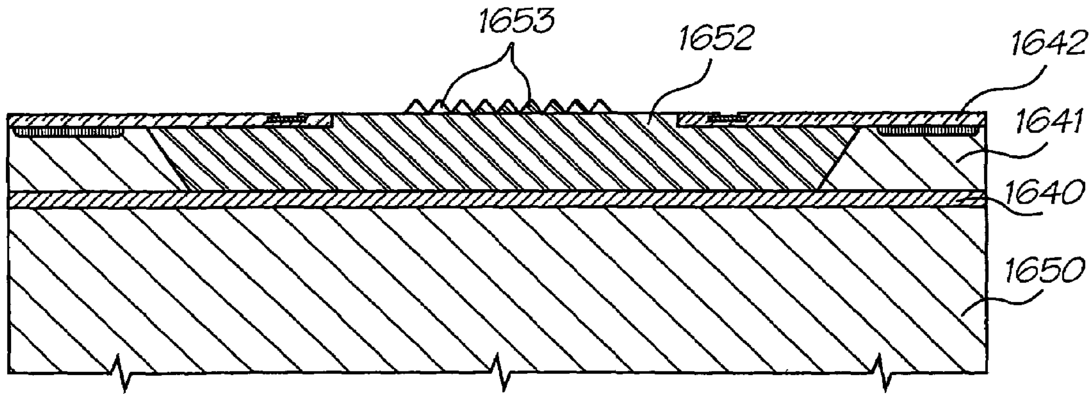

8. Expose and develop the photosensitive polyimide using Mask 2. This mask is a gray-scale mask which defines the concertina ridges of the flexible membrane containing the central part of the solenoid. The result of the etch is a series of triangular ridges 1653 across the whole length of the ink pushing membrane. This step is shown in FIG. 330.

9. Deposit 0.1 microns of PECVD silicon nitride ($Si_3N_4$) (Not shown).

10. Etch the nitride layer using Mask 3. This mask defines the contact vias 1654 from the solenoid coil to the second-level metal contacts.

11. Deposit a seed layer of copper.

Figure 331:
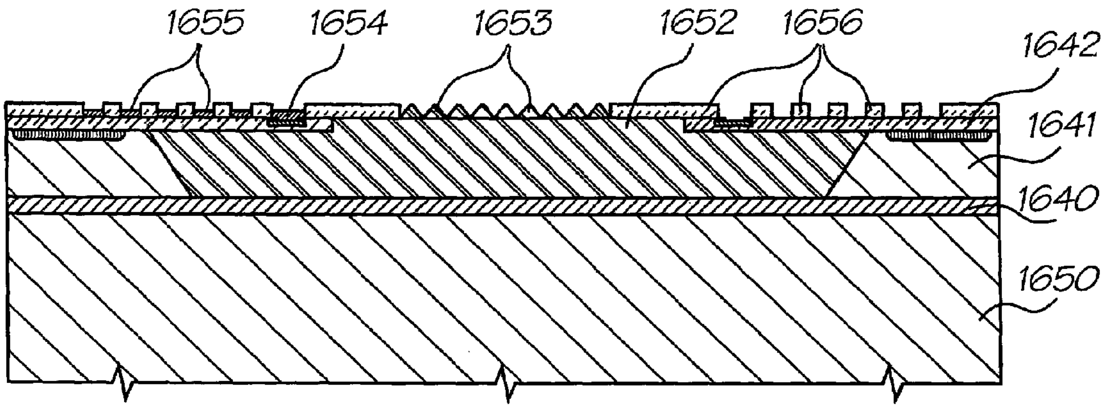

12. Spin on 2 microns of resist 1656, expose with Mask 4, and develop. This mask defines the coil of the solenoid. The resist acts as an electroplating mold. This step is shown in FIG. 331.

13. Electroplate 1 micron of copper 1655. Copper is used for its low resistivity (which results in higher efficiency) and its high electromigration resistance, which increases reliability at high current densities.

Figure 332:
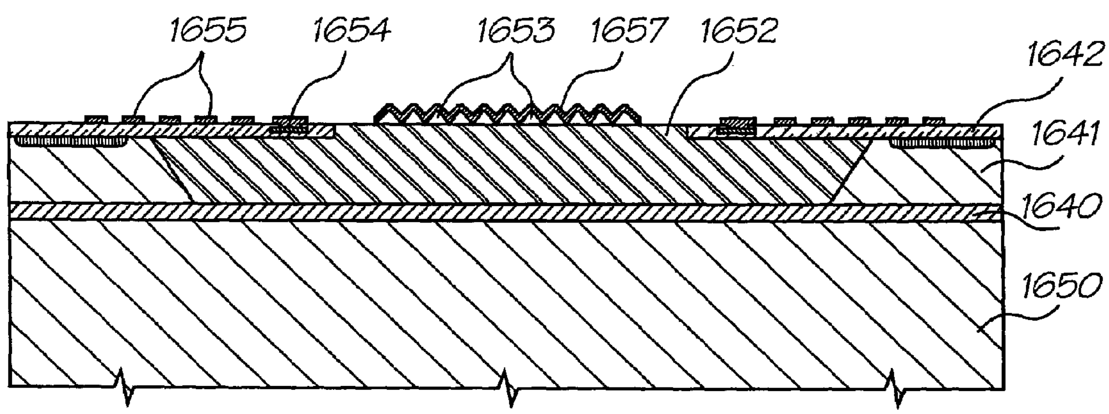

14. Strip the resist and etch the exposed copper seed layer 1657. This step is shown in FIG. 332.

15. Deposit 0.1 microns of silicon nitride ($Si_3N_4$) (Not shown).

16. Etch the nitride layer using Mask 5. This mask defines the edges of the ink pushing membrane and the bond pads.

17. Wafer probe. All electrical connections are complete at this point, bond pads are accessible, and the chips are not yet separated.

Figure 333:
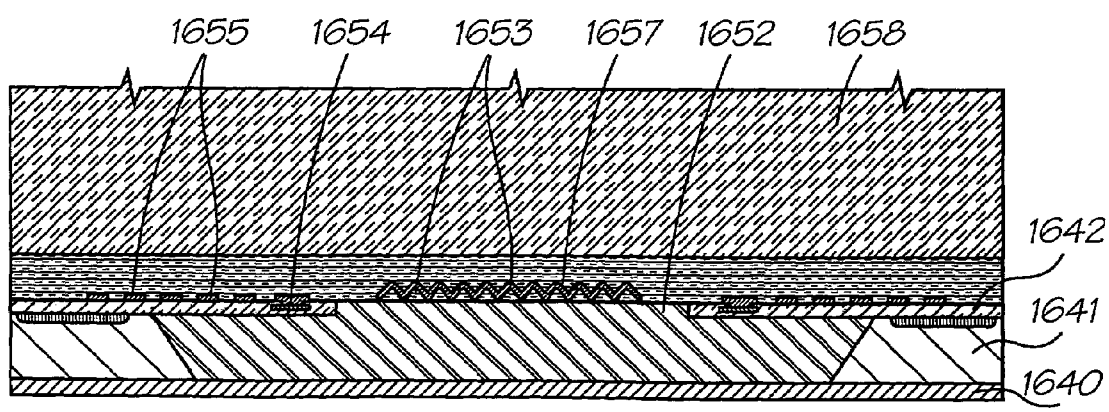

18. Mount the wafer on a glass blank 1658 and back-etch the wafer using KOH with no mask. This etch thins the wafer and stops at the buried boron doped silicon layer. This step is shown in FIG. 333.

Figure 334:
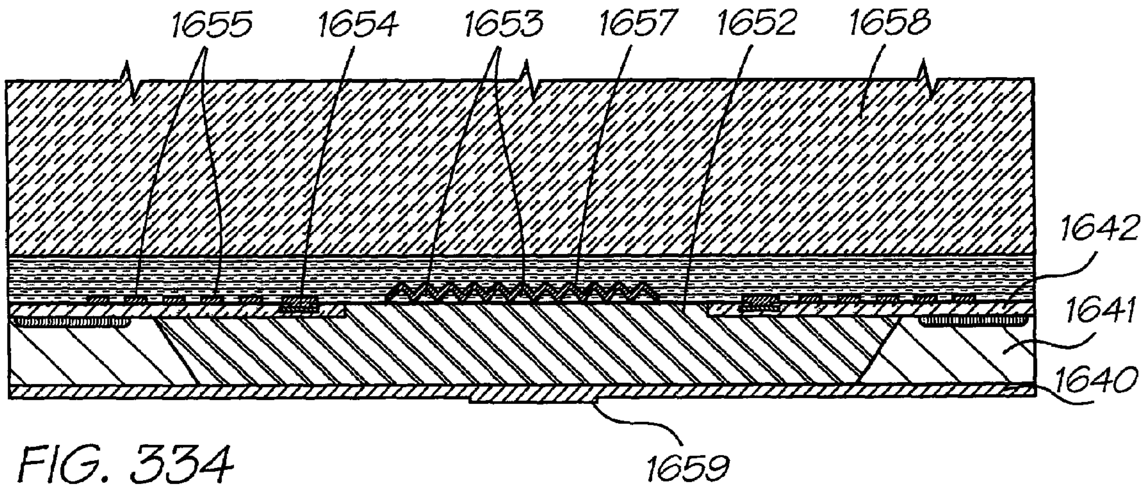

19. Plasma back-etch the boron doped silicon layer to a depth of 1 micron using Mask 6. This mask defines the nozzle rim 1659. This step is shown in FIG. 334.

Figure 335:
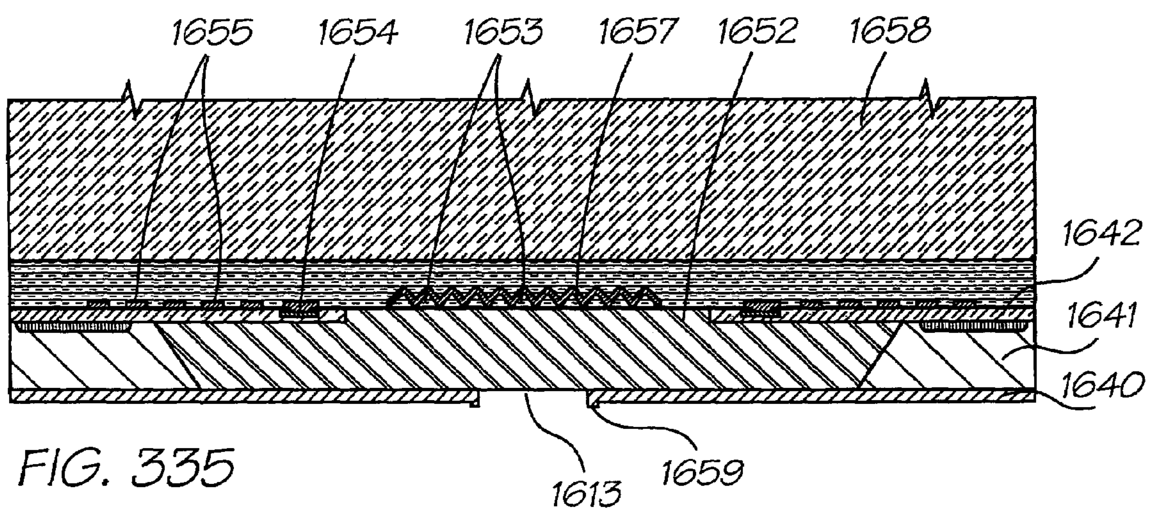

20. Plasma back-etch through the boron doped layer using Mask 7. This mask defines the nozzle 1613, and the edge of the chips. At this stage, the chips are still mounted on the glass blank. This step is shown in FIG. 335.

Figure 336:
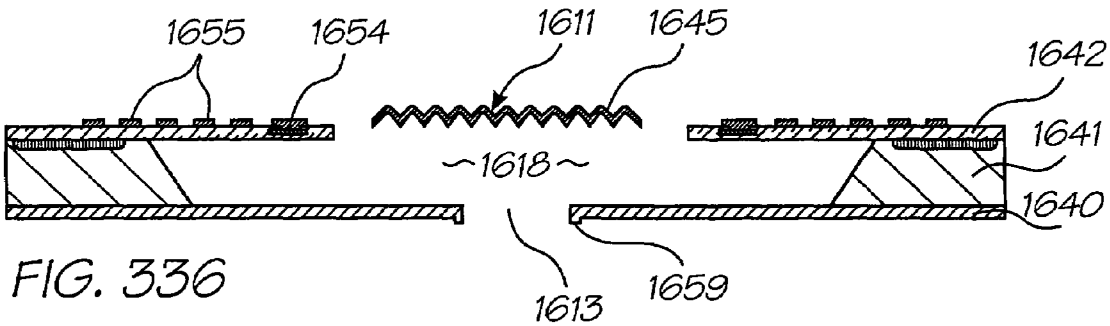

21. Strip the adhesive layer to detach the chips from the glass blank. Etch the sacrificial layer. This process completely separates the chips. This step is shown in FIG. 336.

22. Mount the printheads in their packaging, which may be a molded plastic former incorporating ink channels which supply different colors of ink to the appropriate regions of the front surface of the wafer.

23. Connect the printheads to their interconnect systems.

24. Hydrophobize the front surface of the printheads.

Figure 337:
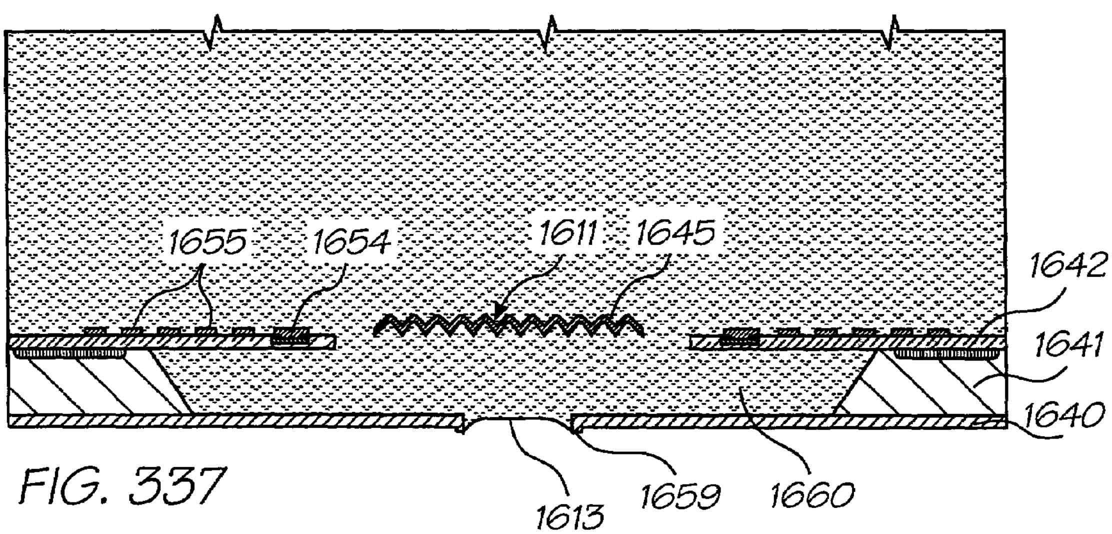

25. Fill with ink 1660, apply a strong magnetic field in the plane of the chip surface, and test the completed printheads. A filled nozzle is shown in FIG. 337.

IJ17

In a preferred embodiment, an oscillating ink reservoir pressure is used to eject ink from ejection nozzles. Each nozzle has an associated shutter which normally blocks the nozzle. The shutter is moved away from the nozzle by an actuator whenever an ink drop is to be fired.

Figure 338:
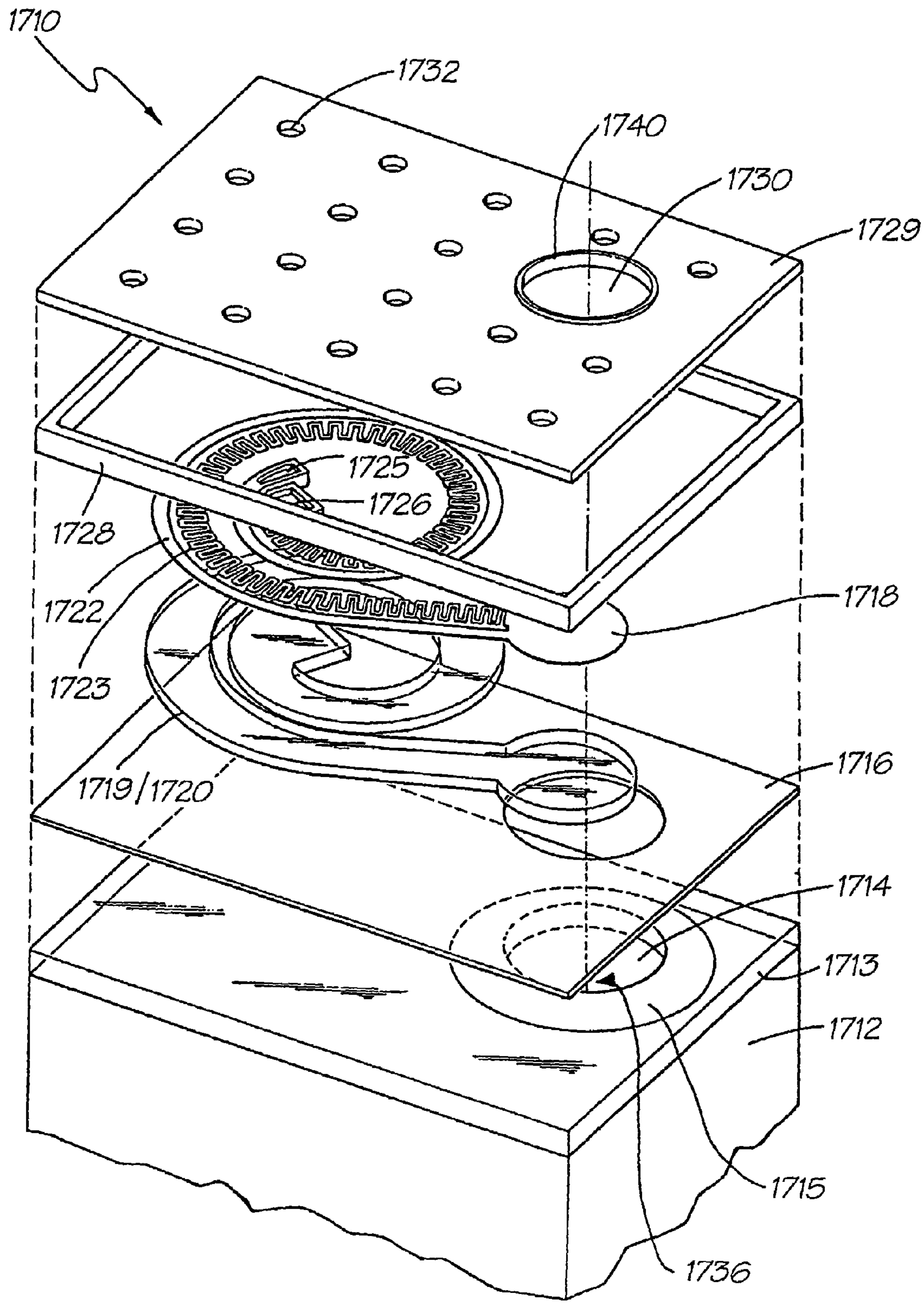
FIG. 338 is an exploded perspective view illustrating the construction of a single ink jet nozzle in accordance with a preferred embodiment.

Turning initially to FIG. 338, there is illustrated in exploded perspective a single ink jet nozzle 1710 as constructed in accordance with the principles of the present invention. The exploded perspective illustrates a single ink jet nozzle 1710. Ideally, the nozzles are formed as an array at a time on a bottom silicon wafer 1712. The silicon wafer 1712 is processed so as to have two level metal CMOS circuitry which includes metal layers and glass layers 1713 and which are planarized after construction. The CMOS metal layer has a reduced aperture 1714 for the access of ink from the back of silicon wafer 1712 via the larger radius portal 1715.

A bottom nitride layer 1716 is constructed on top of the CMOS layer 1713 so as to cover, protect and passivate the CMOS layer 1713 from subsequent etching processes. Subsequently, there is provided a copper heater layer 1718 which is sandwiched between two polytetrafluoroethylene (PTFE) layers 1719, 1720. The copper layer 1718 is connected to lower CMOS layer 1713 through vias 1725, 1726. The copper layer 1718 and PTFE layers 1719, 1720 are encapsulated within nitride borders e.g. 1728 and nitride top layer 1729 which includes an ink ejection portal 1730 in addition to a number of sacrificial etched access holes 1732 which are of a smaller dimension than the ejection portal 1730 and are provided for allowing access of a etchant to lower sacrificial layers thereby allowing the use of a etchant in the construction of layers, 1718, 1719, 1720 and 1728.

Figure 339:
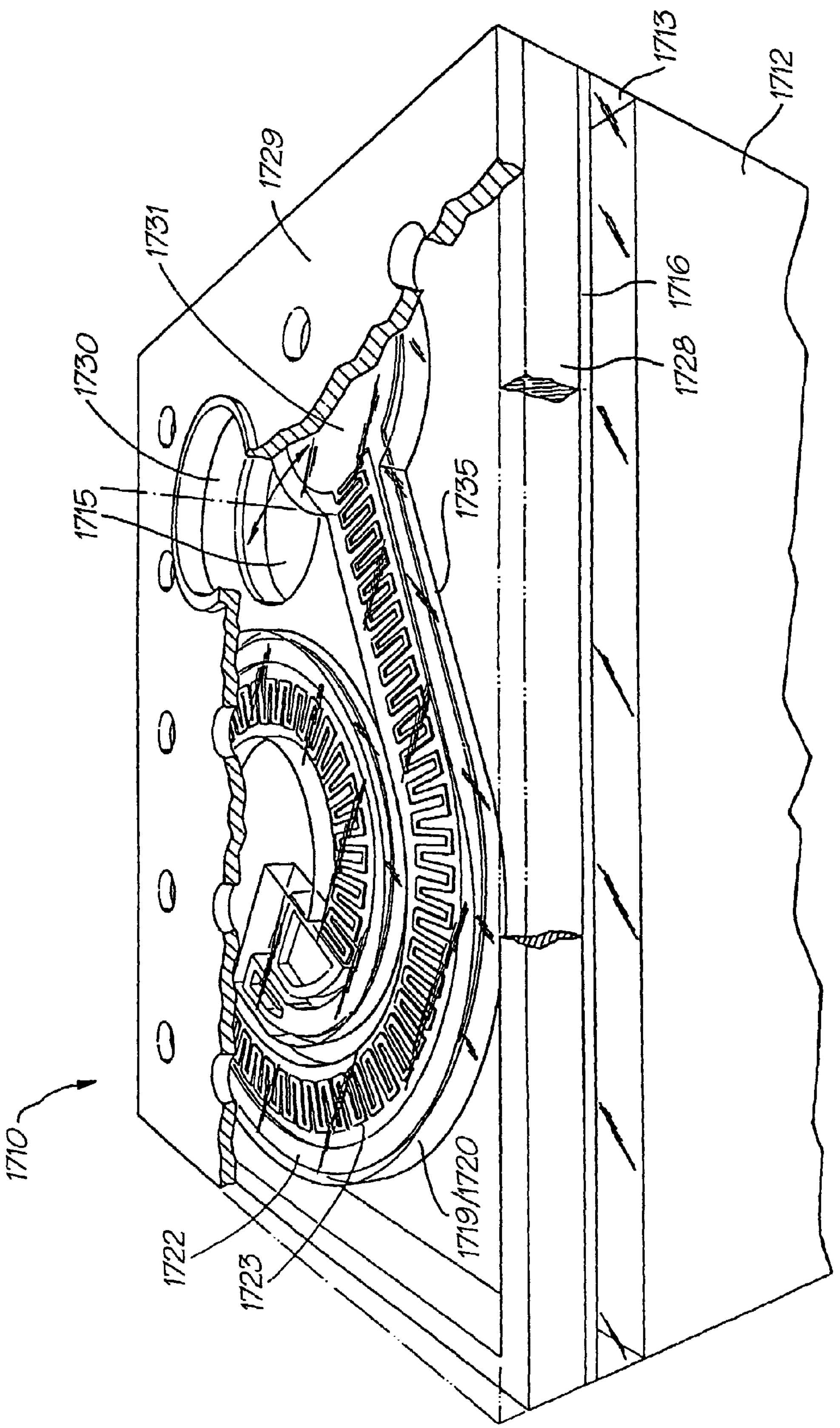
FIG. 339 is a perspective view, partly in section, of a single ink jet nozzle constructed in accordance with a preferred embodiment.

Turning now to FIG. 339, there is shown a cut-out perspective view of a fully constructed ink jet nozzle 1710. The ink jet nozzle uses an oscillating ink pressure to eject ink from ejection port 1730. Each nozzle has an associated shutter 1731 which normally blocks it The shutter 1731 is moved away from the ejection port 1730 opening by an actuator 1735 whenever an ink drop is to be fired.

The nozzles 1730 are in connected to ink chambers which contain the actuators 1735. These chambers are connected to ink supply channels 1736 which are etched through the silicon wafer. The ink supply channels 1736 are substantially wider than the nozzles 1730, to reduce the fluidic resistance to the ink pressure wave. The ink channels 1736 are connected to an ink reservoir. An ultrasonic transducer (for example, a piezoelectric transducer) is positioned in the reservoir. The transducer oscillates the ink pressure at approximately 100 KHz. The ink pressure oscillation is sufficient that ink drops would be ejected from the nozzle were it not blocked by the shutter 1731.

The shutters are moved by a thermoelastic actuator 1735. The actuators are formed as a coiled serpentine copper heater 1723 embedded in polytetrafluoroethylene (PTFE) 1719, 1720. PTFE has a very high coefficient of thermal expansion (approximately $770\times10^{-6}$). The current return trace 1722 from the heater 1723 is also embedded in the PTFE actuator 1735, the current return trace 1722 is made wider than the heater trace 1723 and is not serpentine. Therefore, it does not heat the PTFE as much as the serpentine heater 1723 does. The serpentine heater 1723 is positioned along the inside edge of the PTFE coil, and the return trace is positioned on the outside edge. When actuated, the inside edge becomes hotter than the outside edge, and expands more. This results in the actuator 1735 uncoiling.

The heater layer 1723 is etched in a serpentine manner both to increase its resistance, and to reduce its effective tensile strength along the length of the actuator. This is so that the low thermal expansion of the copper does not prevent the actuator from expanding according to the high thermal expansion characteristics of the PTFE.

By varying the power applied to the actuator 1735, the shutter 1731 can be positioned between the fully on and fully off positions. This may be used to vary the volume of the ejected drop. Drop volume control may be used either to implement a degree of continuous tone operation, to regulate the drop volume, or both.

When data signals distributed on the printhead indicate that a particular nozzle is turned on, the actuator 1735 is energized, which moves the shutter 1731 so that it is not blocking the ink chamber. The peak of the ink pressure variation causes the ink to be squirted out of the nozzle 1730. As the ink pressure goes negative, ink is drawn back into the nozzle, causing drop break-off. The shutter 1731 is kept open until the nozzle is refilled on the next positive pressure cycle. It is then shut to prevent the ink from being withdrawn from the nozzle on the next negative pressure cycle.

Each drop ejection takes two ink pressure cycles. Preferably half of the nozzles 1710 should eject drops in one phase, and the other half of the nozzles should eject drops in the other phase. This minimises the pressure variations which occur due to a large number of nozzles being actuated.

The amplitude of the ultrasonic transducer can be altered in response to the viscosity of the ink (which is typically affected by temperature), and the number of drops which are to be ejected in the current cycle. This amplitude adjustment can be used to maintain consistent drop size in varying environmental conditions.

The drop firing rate can be around 50 KHz. The ink jet head is suitable for fabrication as a monolithic page wide printhead. FIG. 339 shows a single nozzle of a 1600 dpi printhead in "up shooter" configuration.

Return again to FIG. 338, one method of construction of the ink jet print nozzles 1710 will now be described. Starting with the bottom wafer layer 1712, the wafer is processed so as to add CMOS layers 1713 with an aperture 1714 being inserted. The nitride layer 1716 is laid down on top of the CMOS layers so as to protect them from subsequent etchings.

A thin sacrificial glass layer is then laid down on top of nitride layers 1716 followed by a first PTFE layer 1719, the copper layer 1718 and a second PTFE layer 1720. Then a sacrificial glass layer is formed on top of the PTFE layer and etched to a depth of a few microns to form the nitride border regions 1728. Next the top layer 1729 is laid down over the sacrificial layer using the mask for forming the various holes including the processing step of forming the rim 1740 on nozzle 1730. The sacrificial glass is then dissolved away and the channel 1715 formed through the wafer by means of utilisation of high density low pressure plasma etching such as that available from Surface Technology Systems.

Figure 340:
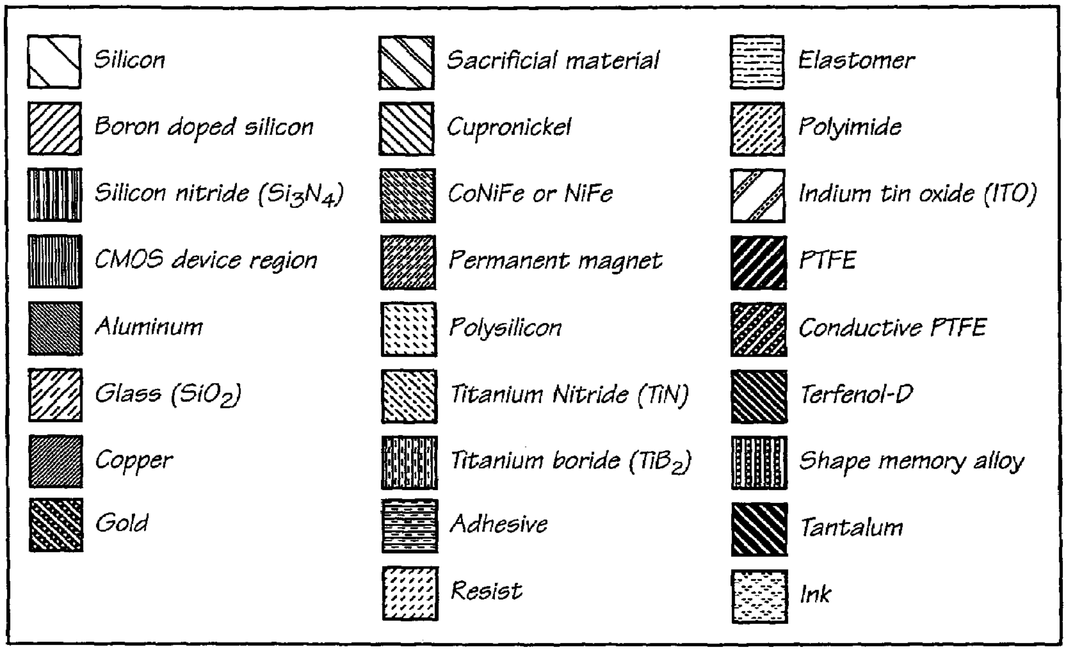
FIG. 340 provides a legend of the materials indicated in FIGS. 341 to 353.
Figure 341:
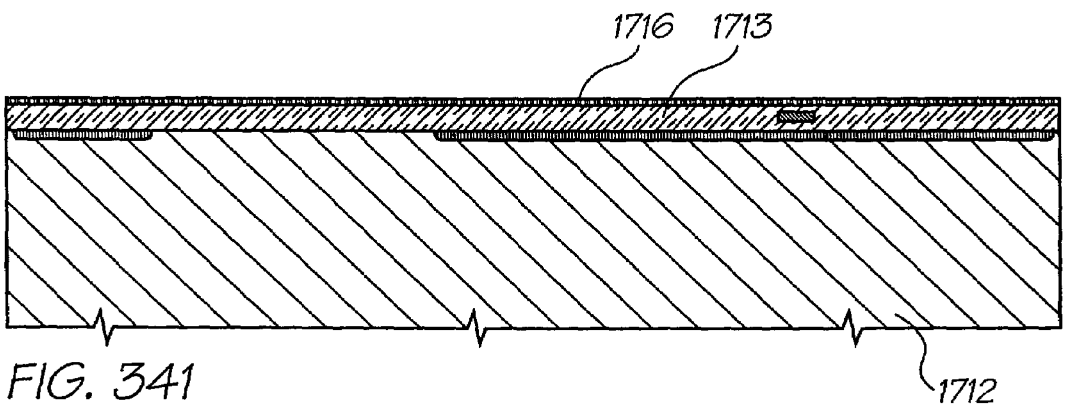
FIG. 341 to FIG. 353 illustrate sectional views of the manufacturing steps in one form of construction of an ink jet printhead nozzle.

One form of detailed manufacturing process which can be used to fabricate monolithic ink jet printheads operating in accordance with the principles taught by the present embodiment can proceed using the following steps:

1. Using a double sided polished wafer 1712, Complete drive transistors, data distribution, and timing circuits using a 0.5 micron, one poly, 2 metal CMOS process 1713. The wafer is passivated with 0.1 microns of silicon nitride 1716. This step is shown in FIG. 341. For clarity, these diagrams may not be to scale, and may not represent a cross section though any single plane of the nozzle. FIG. 340 is a key to representations of various materials in these manufacturing diagrams, and those of other cross referenced ink jet configurations.

Figure 342:
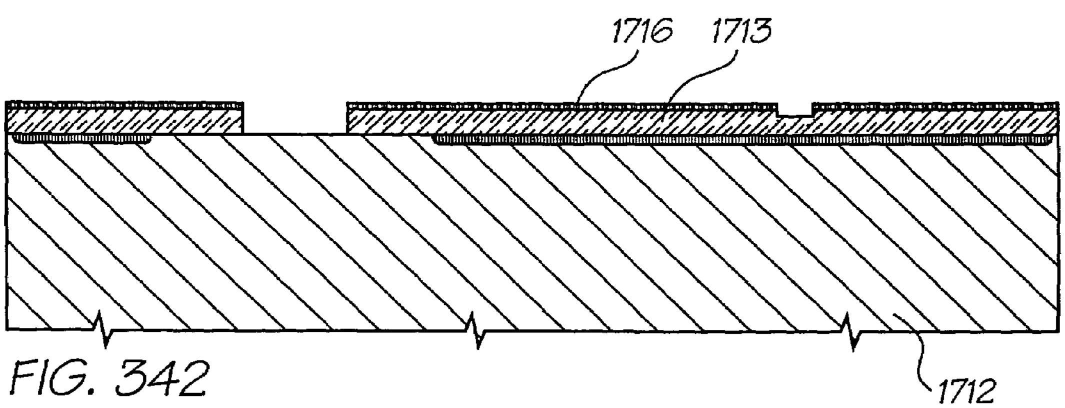

2. Etch nitride and oxide down to silicon using Mask 1. This mask defines the nozzle inlet below the shutter. This step is shown in FIG. 342.

3. Deposit 3 microns of sacrificial material 1750 (e.g. aluminum or photosensitive polyimide)

Figure 343:
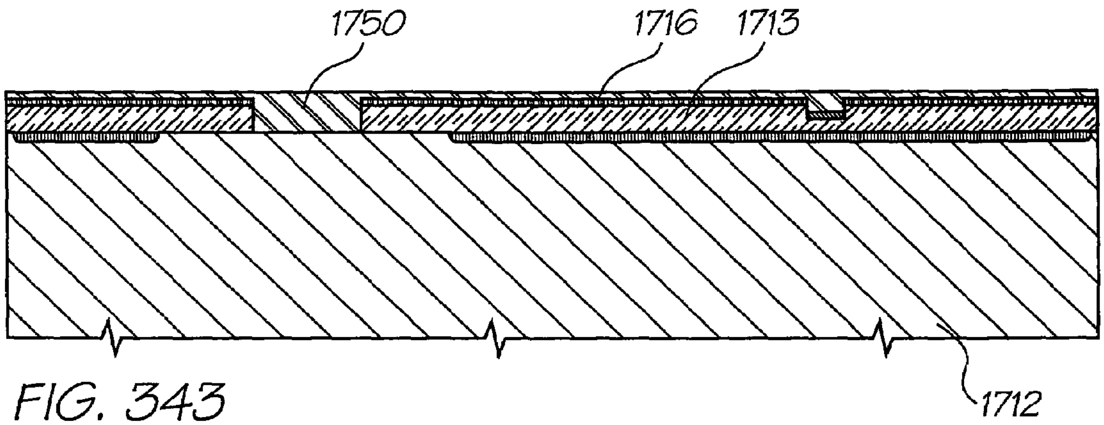

4. Planarize the sacrificial layer to a thickness of 1 micron over nitride. This step is shown in FIG. 343.

Figure 344:
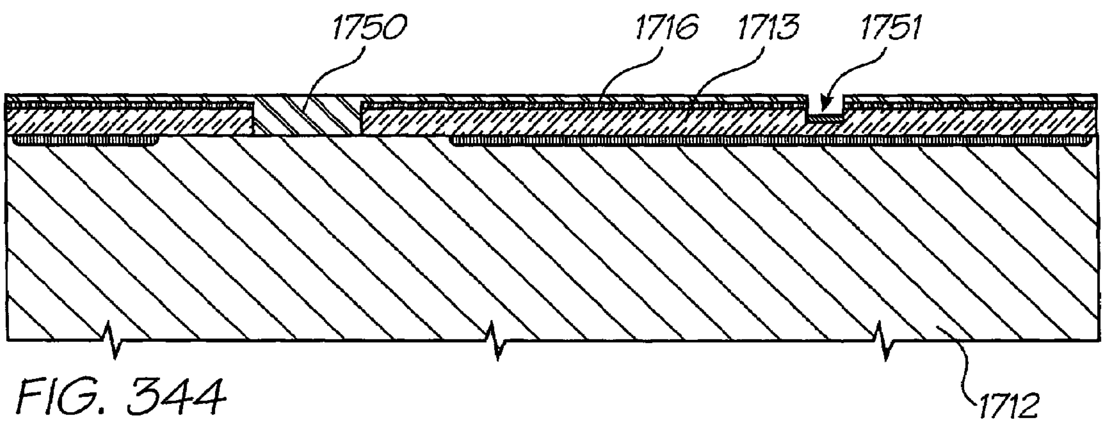

5. Etch the sacrificial layer using Mask 2. This mask defines the actuator anchor point 1751. This step is shown in FIG. 344.

6. Deposit 1 micron of PTFE 1752.

7. Etch the PTFE, nitride, and oxide down to second level metal using Mask 3. This mask defines the heater vias 1725, 1726. This step is shown in FIG. 345.

8. Deposit the heater 1753, which is a 1 micron layer of a conductor with a low Young's modulus, for example aluminum or gold.

Figure 346:
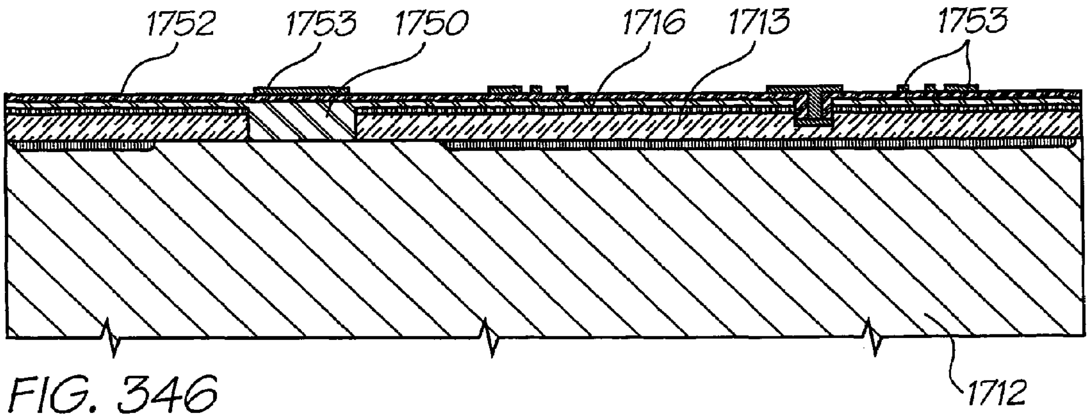

9. Pattern the conductor using Mask 4. This step is shown in FIG. 346.

10. Deposit 1 micron of PTFE 1754.

Figure 347:
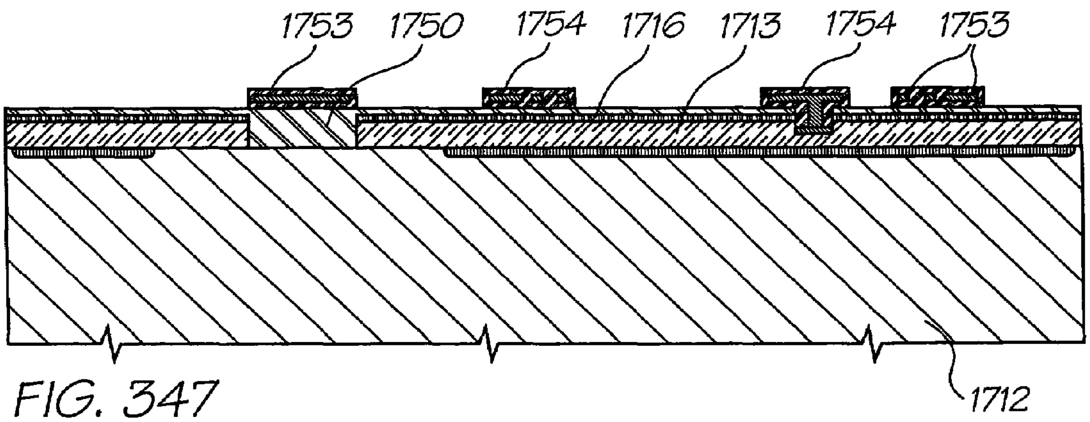

11. Etch the PTFE down to the sacrificial layer using Mask 5. This mask defines the actuator and shutter This step is shown in FIG. 347.

12. Wafer probe. All electrical connections are complete at this point, bond pads are accessible, and the chips are not yet separated.

13. Deposit 3 microns of sacrificial material 1755. Planarize using CMP

Figure 348:
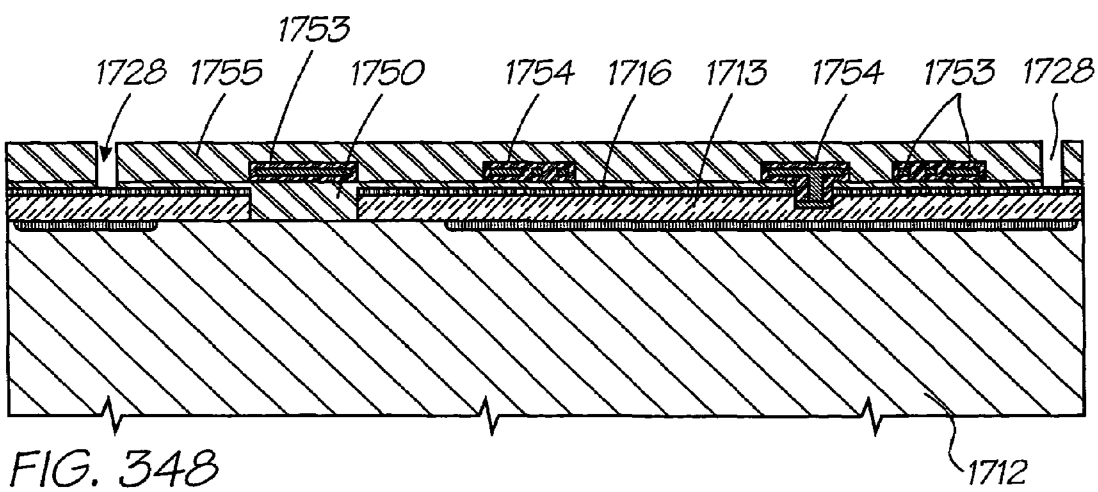

14. Etch the sacrificial material using Mask 6. This mask defines the nozzle chamber wall 1728. This step is shown in FIG. 348.

15. Deposit 3 microns of PECVD glass 1756.

Figure 349:
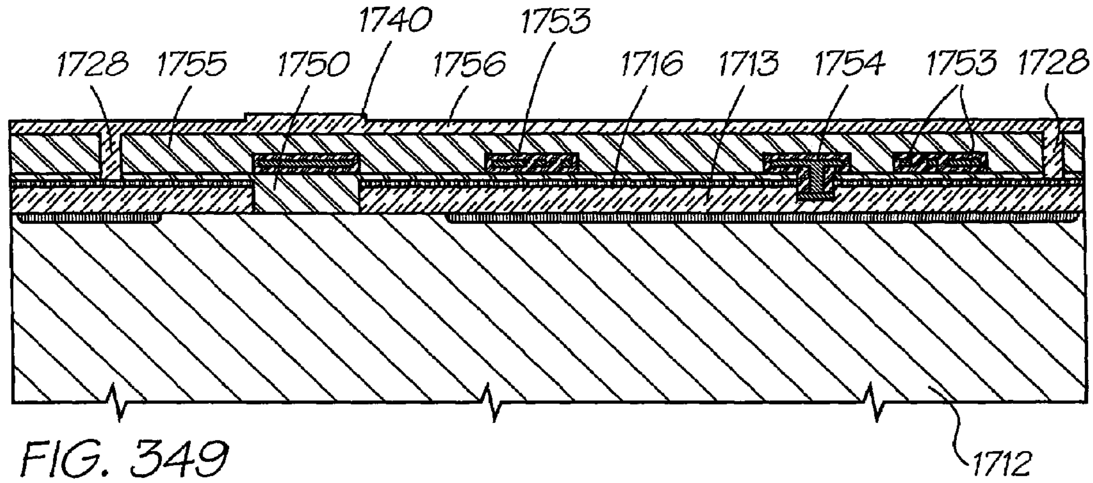

16. Etch to a depth of (approx.) 1 micron-using Mask 7. This mask defines the nozzle rim 1740. This step is shown in FIG. 349.

Figure 350:
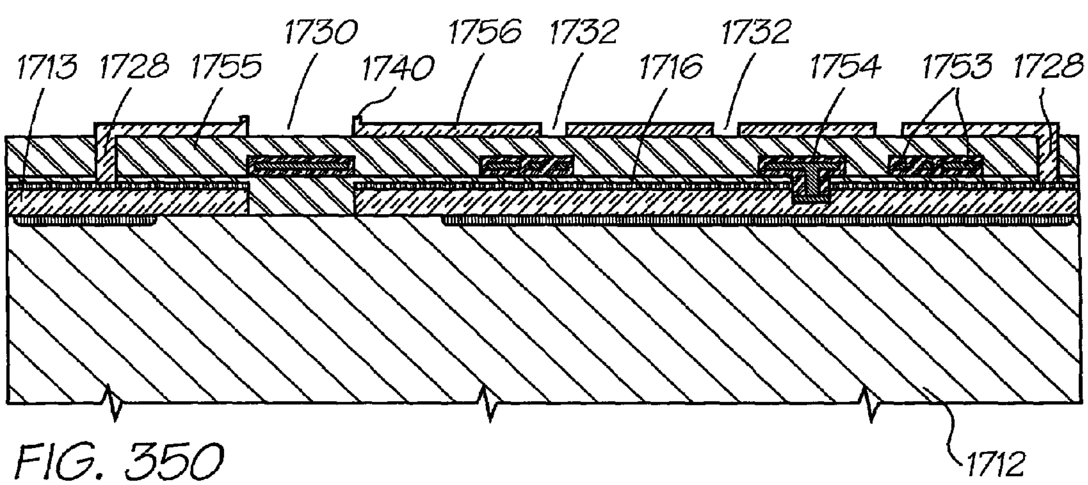

17. Etch down to the sacrificial layer using Mask 6. This mask defines the roof of the nozzle chamber, the nozzle 1730, and the sacrificial etch access holes 1732. This step is shown in FIG. 350.

Figure 351:
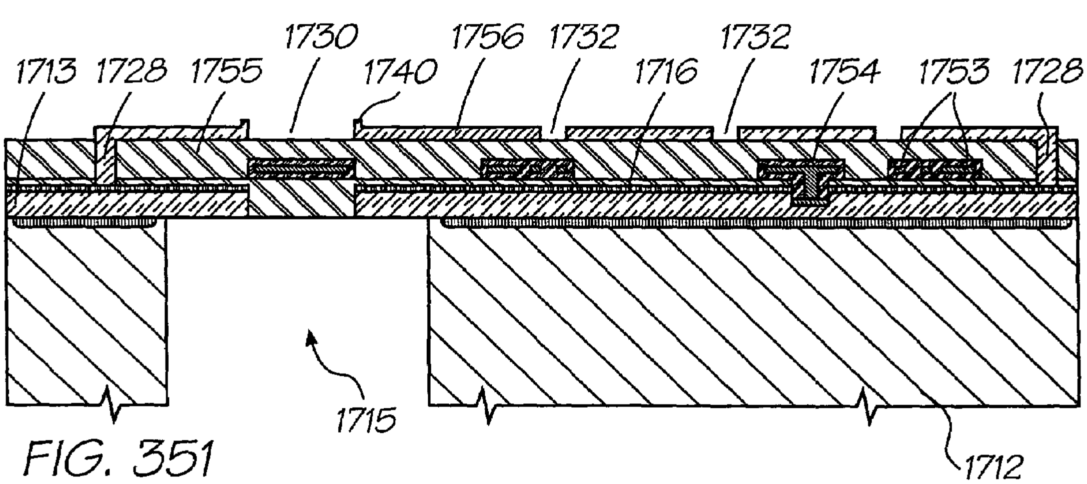

18. Back-etch completely through the silicon wafer (with, for example, an ASE Advanced Silicon Etcher from Surface Technology Systems) using Mask 7. This mask defines the ink inlets 1715 which are etched through the wafer. The wafer is also diced by this etch. This step is shown in FIG. 351.

Figure 352:
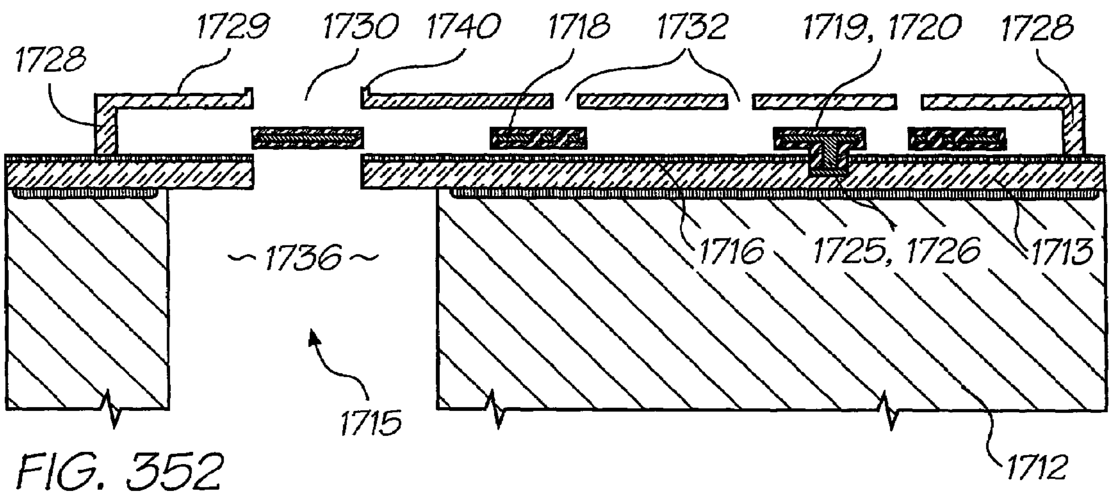

19. Etch the sacrificial material. The nozzle chambers are cleared, the actuators freed, and the chips are separated by this etch This step is shown in FIG. 352.

20. Mount the printheads in their packaging, which may be a molded plastic former incorporating ink channels which supply the appropriate color ink to the ink inlets at the back of the wafer. The package also includes a piezoelectric actuator attached to the rear of the ink channels. The piezoelectric actuator provides the oscillating ink pressure required for the ink jet operation.

21. Connect the printheads to their interconnect systems. For a low profile connection with minimum disruption of airflow, TAB may be used. Wire bonding may also be used if the printer is to be operated with sufficient clearance to the paper.

22. Hydrophobize the front surface of the printheads.

Figure 353:
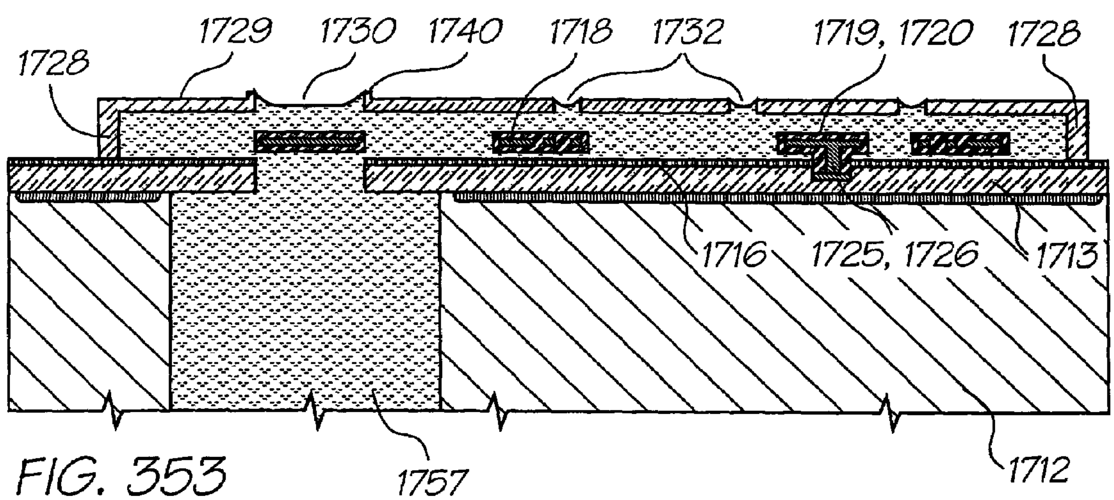

23. Fill the completed printheads with ink 1757 and test them. A filled nozzle is shown in FIG. 353.

IJ18

In a preferred embodiment, an inkjet printhead includes a shutter mechanism which interconnects the nozzle chamber with an ink supply reservoir, the reservoir being under an oscillating ink pressure. Hence, when the shutter is open, ink is forced through the shutter mechanism and out of the nozzle chamber. Closing the shutter mechanism results in the nozzle chamber remaining in a stable state and not ejecting any ink from the chamber.

Figure 354:
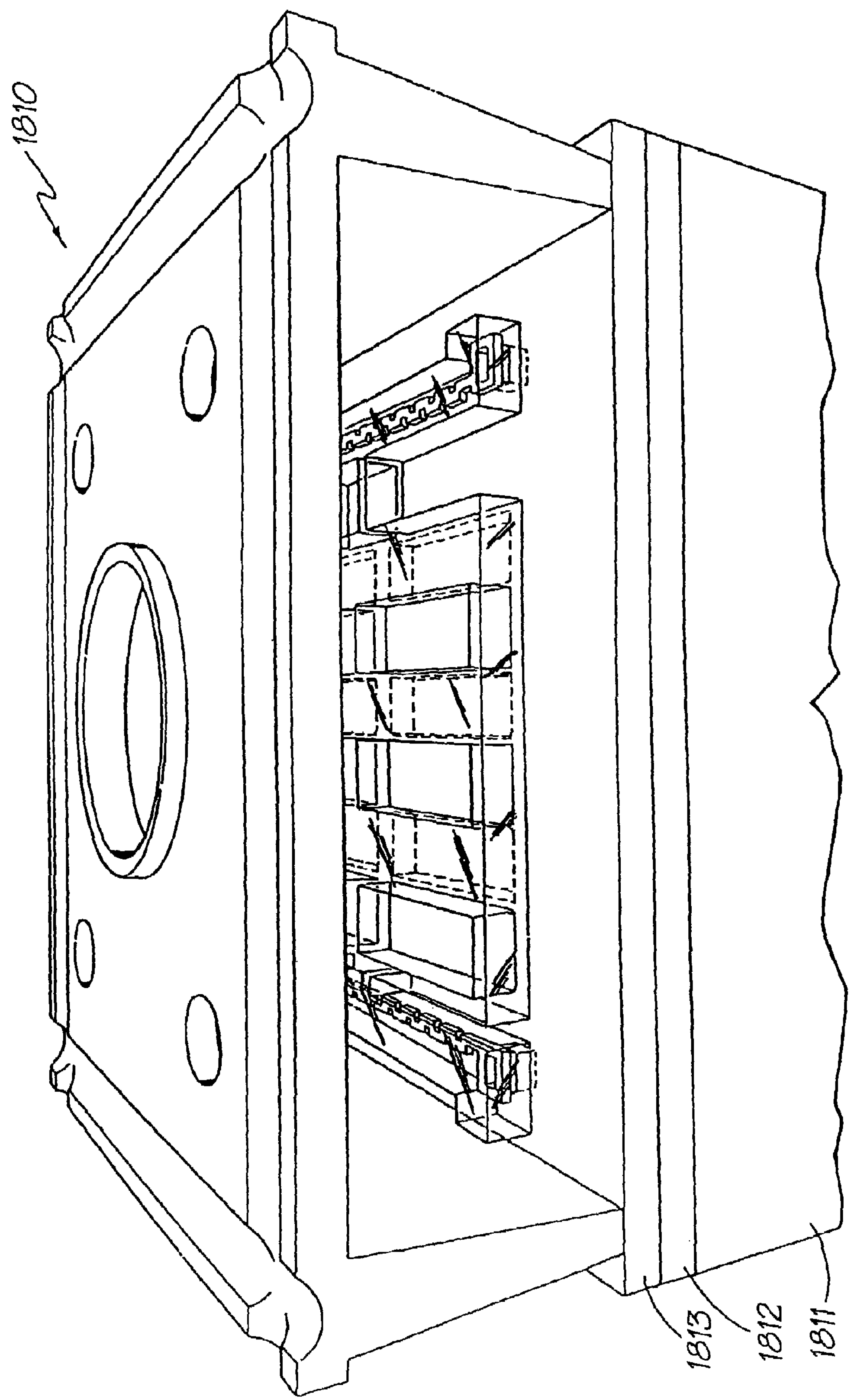
FIG. 354 is a top view of a single ink nozzle chamber constructed in accordance with the principals of a preferred embodiment, with the shutter in a close state.

Turning initially to FIG. 354, there is illustrated a single nozzle chamber 1810 as constructed in accordance with the principles of a preferred embodiment. The nozzle chamber 1810 can be constructed on a silicon wafer 1811, having an electrical circuitry layer 1812 which contains the control circuitry and drive transistors. The layer 1812 can comprise a two level metal CMOS layer or another suitable form of semi conductor processing layer. On top of the layer 1812 is deposited a nitride passivation layer 1813. FIG. 354 illustrates the shutter in a closed state while FIG. 355 illustrates the shutter when in an open state.

Figure 355:
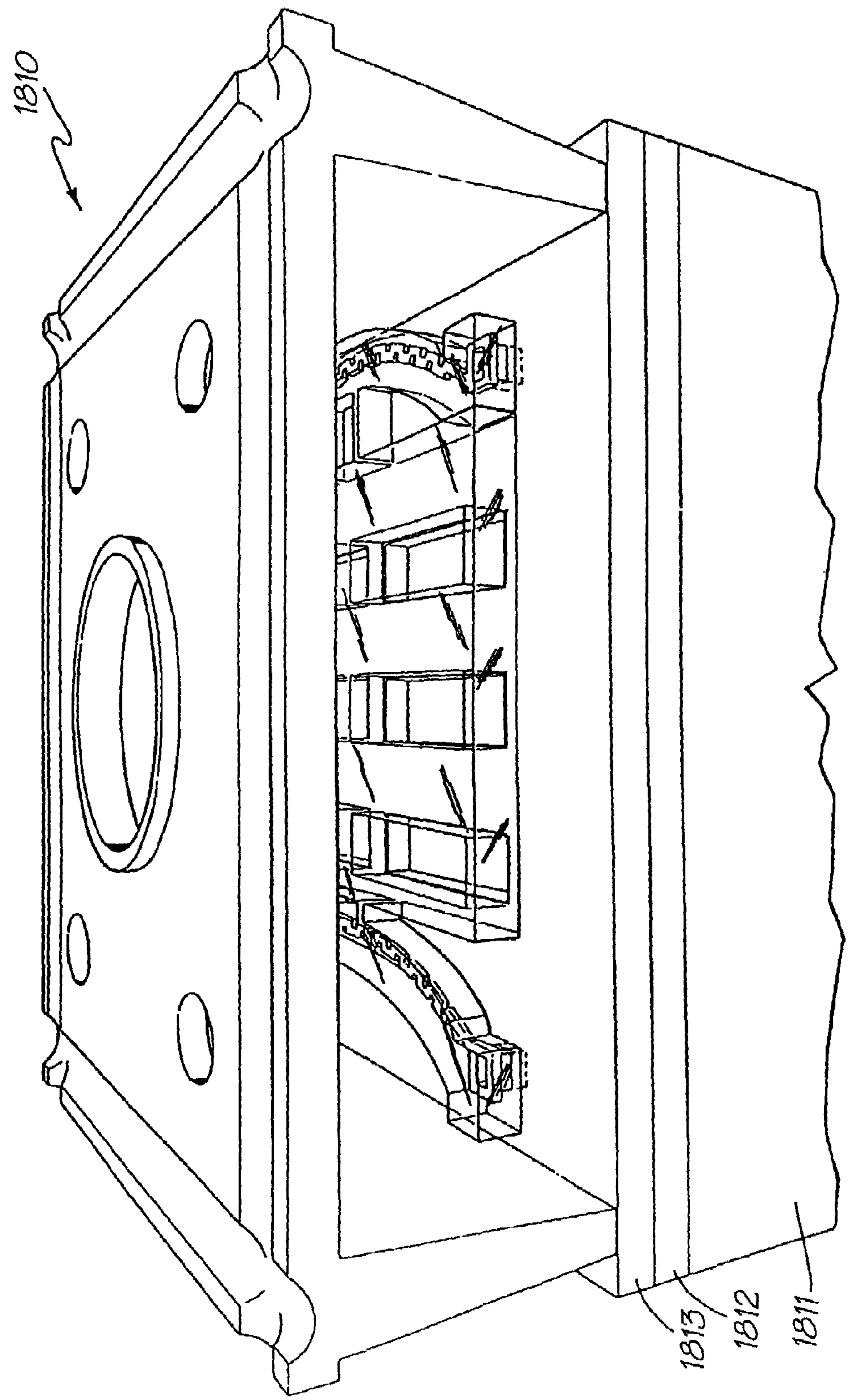
FIG. 355 is a top view of a single ink nozzle chamber as constructed in accordance with a preferred embodiment with the shutter in an open state.
Figure 356:
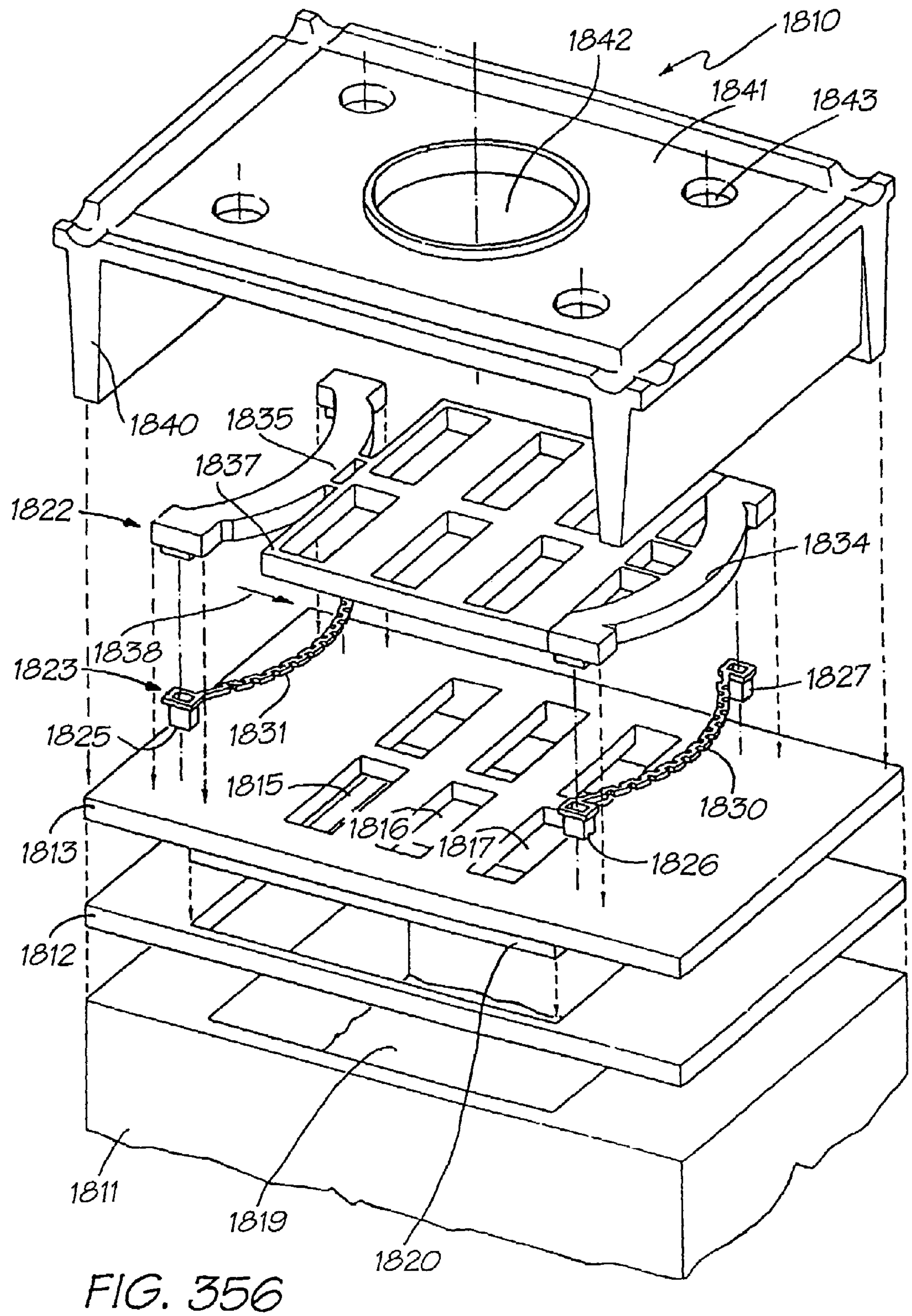
FIG. 356 is an exploded perspective view illustrating the construction of a single ink nozzle chamber in accordance with a preferred embodiment of the present invention.

FIG. 356 illustrates an exploded perspective view of the various layers of the inkjet nozzle when the shutters are in an open state as illustrated in FIG. 355. The nitride layer 1813 includes a series of slots e.g. 1815, 1816 and 1817 which allow for the flow of ink from an ink channel 1819 etched through the silicon wafer 1811. The nitride layer 1813 also preferably includes bottom portion 1820 which acts to passivate those exposed portions of lower layer 1812 which may be attacked in any sacrificial etch utilized in the construction of the nozzle chamber 1810. The next layers include a polytetrafluoroethylene (PTFE) layer 1822 having an internal copper structure 1823. The PTFE layers 1822 and internal copper portions 1823 comprise the operational core of the nozzle chamber 1810. The copper layer 1823 includes copper end posts, e.g. 1825-1827, interconnecting serpentine copper portions 1830, 1831. The serpentine copper portions 1830, 1831 are designed for greatly expanding like a concertina upon heating. The heating circuit is provided by means of interconnecting vias (not shown) between the end portions, e.g. 1825-1827, and lower level CMOS circuitry at CMOS level 1812. Hence when it is desired to open the shutter, a current is passed through the two portions 1830, 1831 thereby heating up portions 1834, 1835 of the PTFE layer 1822. The PTFE layer has a very high co-efficient of the thermal expansion (approximately $770\times10^{-6}$) and hence expands more rapidly than the copper portions 1830, 1831. However, the copper portions 1830, 1831 are constructed in a serpentine manner which allows the serpentine structure to expand like a concertina to accommodate the expansion of the PTFE layer. This results in a buckling of the PTFE layer portions 1834, 1835 which in turn results in a movement of the shutter portions e.g. 1837 generally in the direction 1838. The movement of the shutter 1837 in direction 1838 in turn results in an opening of the nozzle chamber 1810 to the ink supply. As stated previously, in FIG. 354 there is illustrated the shutter in a closed position whereas in FIG. 355, there is illustrated an open shutter after activation by means of passing a current through the two copper portions 1830, 1831. The portions 1830, 1831 are positioned along one side within the portions 1833, 1835 so as to ensure buckling in the correct direction.

Nitride layers, including side walls 1840 and top portion 1841, are constructed to form the rest of a nozzle chamber 1810. The top surface includes an ink ejection nozzle 1842 in addition to a number of smaller nozzles 1843 which are provided for sacrificial etching purposes. The nozzles 1843 are much smaller than the nozzle 1842 such that, during operation, surface tension effects restrict any ejection of ink from the nozzles 1843.

In operation, the ink supply channel 1819 is driven with an oscillating ink pressure. The oscillating ink pressure can be induced by means of driving a piezoelectric actuator in an ink chamber. When it is desired to eject a drop from the nozzle 1842, the shutter is opened forcing the drop of ink out of the nozzle 1842 during the next high pressure cycle of the oscillating ink pressure. The ejected ink is separated from the main body of ink within the nozzle chamber 1810 when the pressure is reduced. The separated ink continues to the paper. Preferably, the shutter is kept open so that the ink channel may refill during the next high pressure cycle. Afterwards it is rapidly shut so that the nozzle chamber remains full during subsequent low cycles of the oscillating ink pressure. The nozzle chamber is then ready for subsequent refiring on demand.

The inkjet nozzle chamber 1810 can be constructed as part of an array of inkjet nozzles through MEMS depositing of the various layers utilizing the required masks, starting with a CMOS layer 1812 on top of which the nitride layer 1813 is deposited having the requisite slots. A sacrificial glass layer can then be deposited followed by a bottom portion of the PTFE layer 1822, followed by the copper layer 1823 with the lower layers having suitable vias for interconnecting with the copper layer. Next, an upper PTFE layer is deposited so as to encase to the copper layer 1823 within the PTFE layer 1822. A further sacrificial glass layer is then deposited and etched, before a nitride layer is deposited forming side walls 1840 and nozzle plate 1841. The nozzle plate 1841 is etched to have suitable nozzle hole 1842 and sacrificial etching nozzles 1843 with the plate also being etched to form a rim around the nozzle hole 1842. Subsequently, the sacrificial glass layers can be etched away, thereby releasing the structure of the actuator of the PTFE and copper layers. Additionally, the wafer can be through etched utilizing a high density low pressure plasma etching process such as that available from Surface Technology Systems.

As noted previously many nozzles can be formed on a single wafer with the nozzles grouped into their desired width heads and the wafer diced in accordance with requirements. The diced printheads can then be interconnected to a printhead ink supply reservoir on the back portion thereof, for operation, producing a drop on demand ink jet printer.

Figure 357:
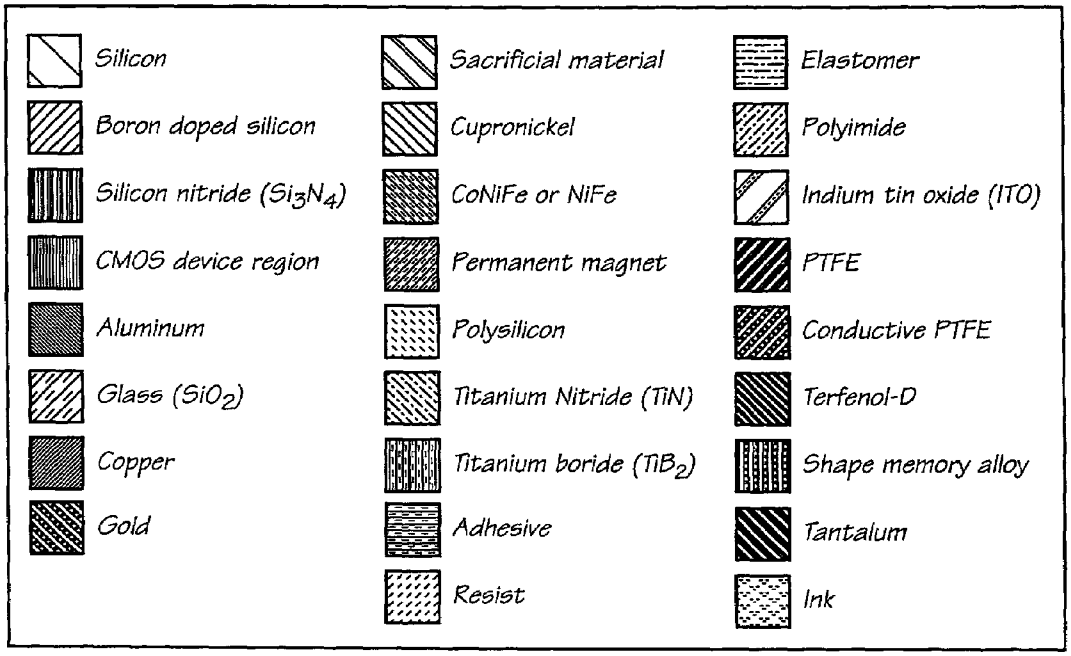
FIG. 357 provides a legend of the materials indicated in FIGS. 358 to 370.
Figure 358:
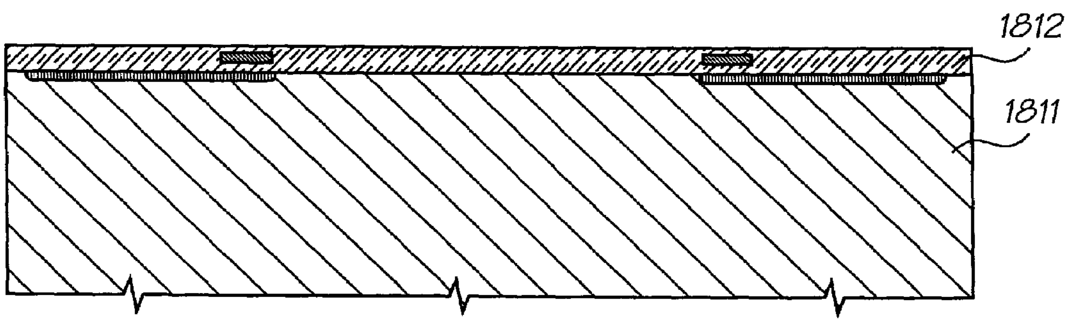
FIG. 358 to FIG. 370 illustrate sectional views of the manufacturing steps in one form of construction of an ink jet printhead nozzle.

One form of detailed manufacturing process which can be used to fabricate monolithic ink jet printheads operating in accordance with the principles taught by the present embodiment can proceed utilizing the following steps:

1. Using a double sided polished wafer 1811, complete drive transistors, data distribution, and timing circuits using a 0.5 micron, one poly, 2 metal CMOS process. Relevant features of the wafer at this step are shown in FIG. 358. For clarity, these diagrams may not be to scale, and may not represent a cross section though any single plane of the nozzle. FIG. 357 is a key to representations of various materials in these manufacturing diagrams, and those of other cross referenced ink jet configurations.

Figure 359:
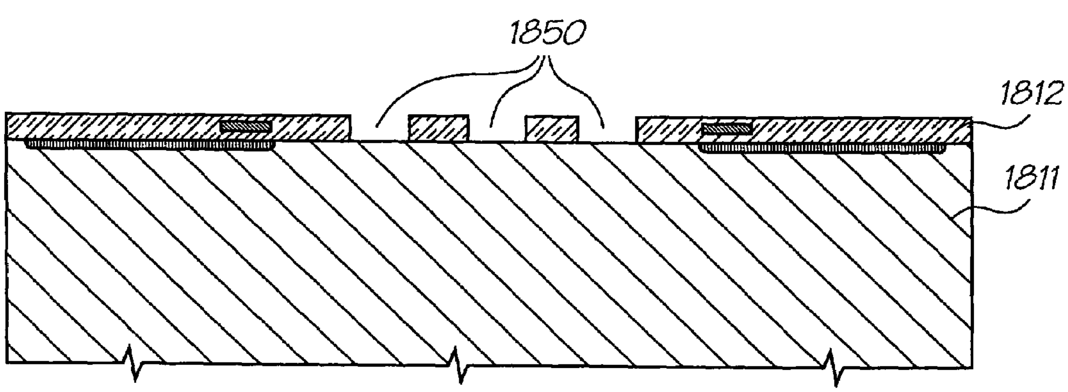

2. Etch the oxide layers down to silicon using Mask 1. This mask defines the lower fixed grill 1850. This step is shown in FIG. 359.

3. Deposit 3 microns of sacrificial material 1851 (e.g. aluminum or photosensitive polyimide)

Figure 360:
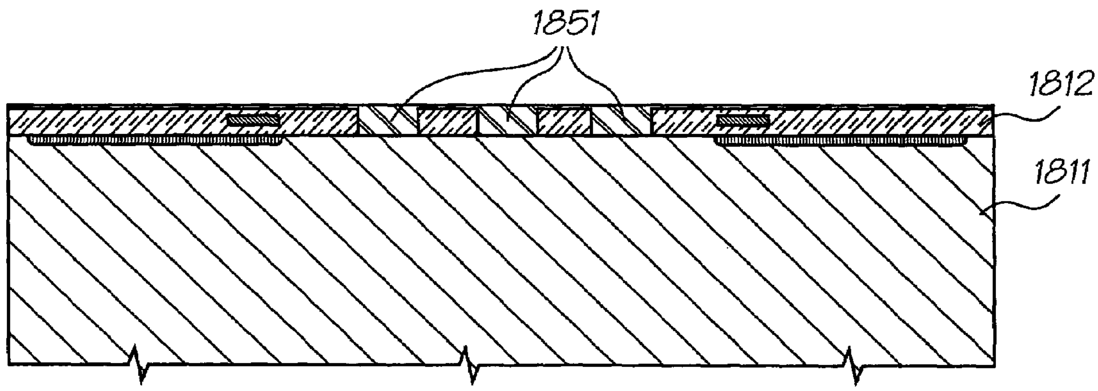

4. Planarize the sacrificial layer to a thickness of 0.5 micron over glass. This step is shown in FIG. 360.

Figure 361:
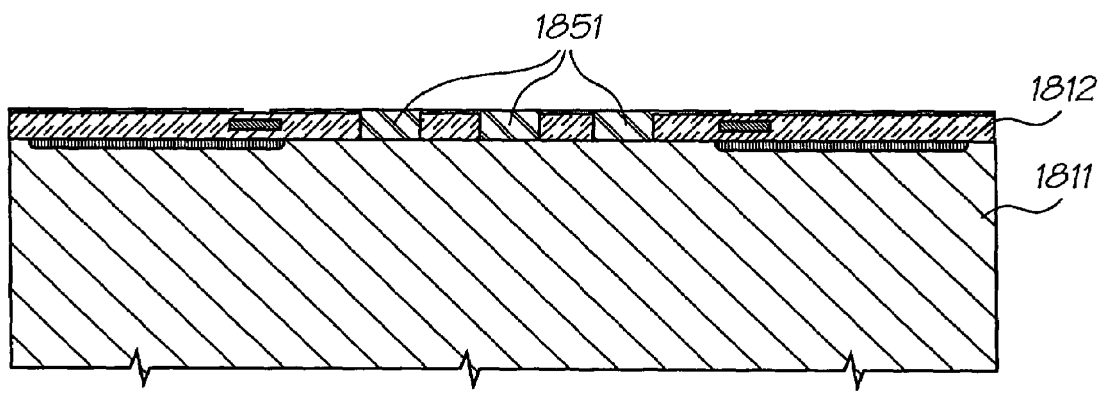

5. Etch the sacrificial layer using Mask 2. This mask defines the nozzle chamber walls and the actuator anchor points. This step is shown in FIG. 361.

6. Deposit 1 micron of PTFE 1852.

Figure 362:
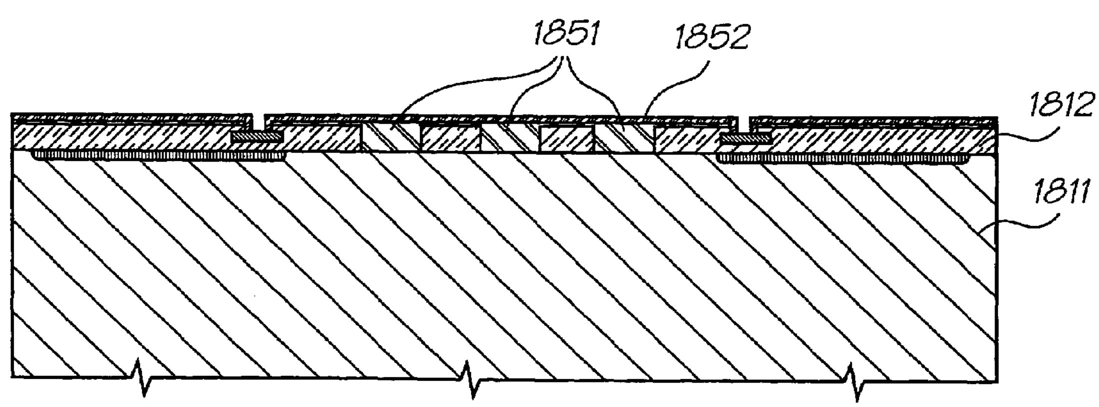

7. Etch the PTFE and oxide down to second level metal using Mask 3. This mask defines the heater vias. This step is shown in FIG. 362.

8. Deposit 1 micron of a conductor with a low Young's modulus 1853, for example aluminum or gold.

Figure 363:
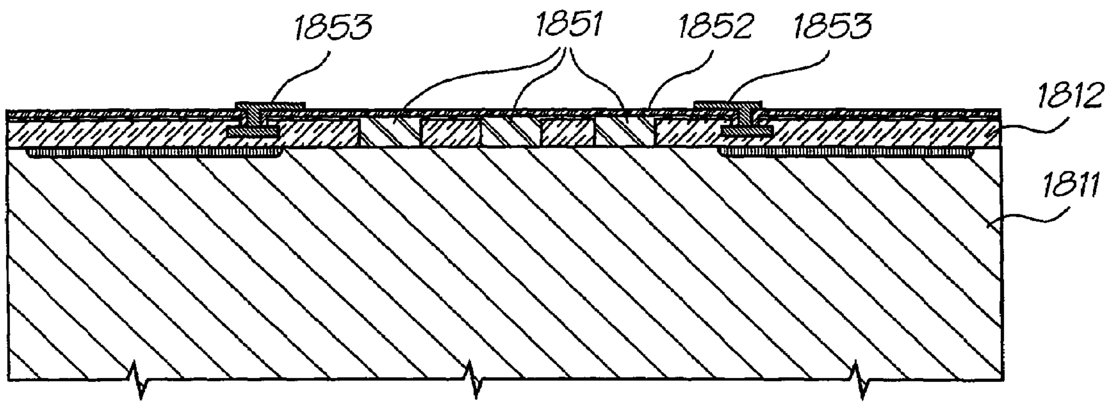

9. Pattern the conductor using Mask 4. This step is shown in FIG. 363.

10. Deposit 1 micron of PTFE 1855.

Figure 364:
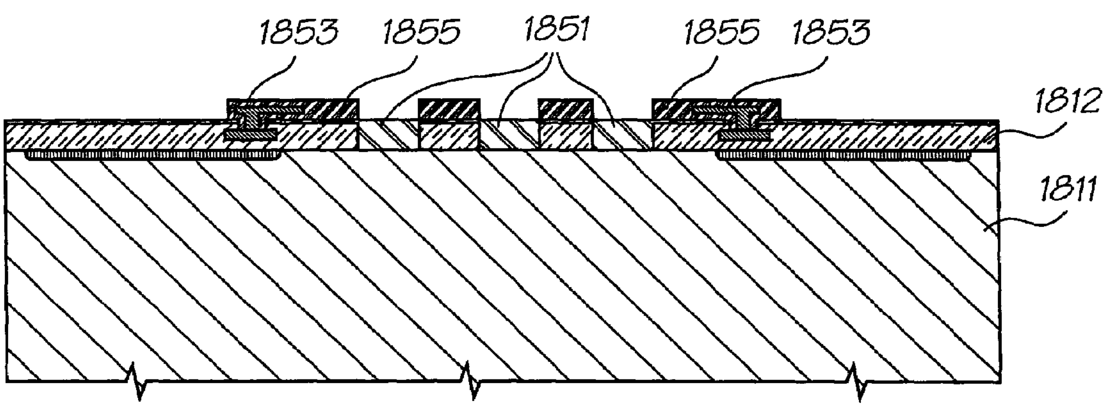

11. Etch the PTFE down to the sacrificial layer using Mask 5. This mask defines the actuator and shutter This step is shown in FIG. 364.

12. Wafer probe. All electrical connections are complete at this point, bond pads are accessible, and the chips are not yet separated.

13. Deposit 6 microns of sacrificial material 1856.

Figure 365:
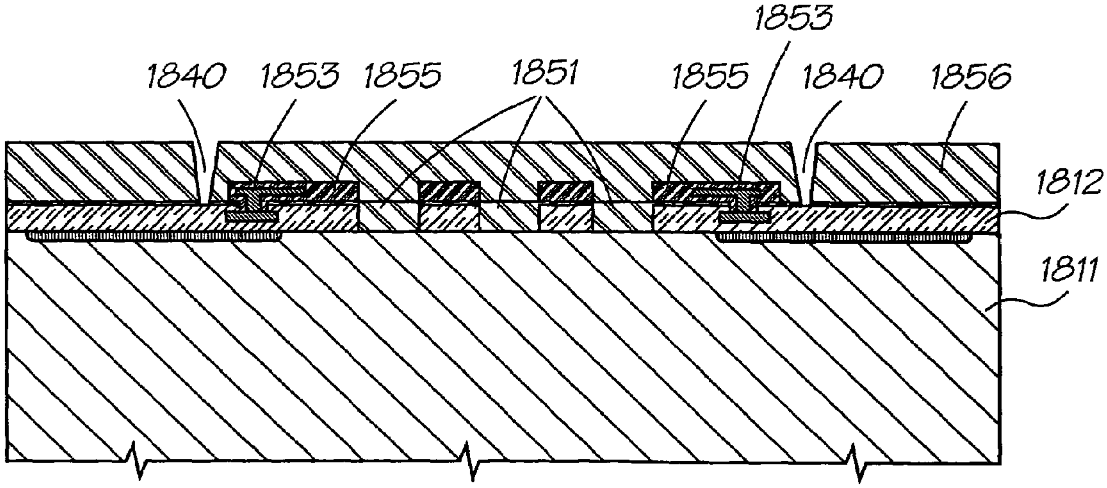

14. Etch the sacrificial material using Mask 6. This mask defines the nozzle chamber wall 1840. This step is shown in FIG. 365.

15. Deposit 3 microns of PECVD glass 1857.

Figure 366:
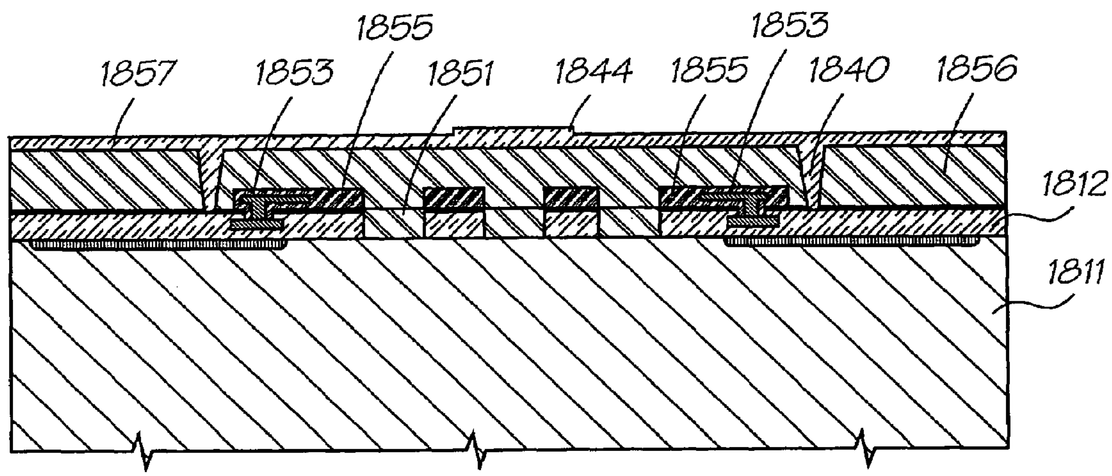

16. Etch to a depth of (approx.) 1 micron using Mask 7. This mask defines the nozzle rim 1844. This step is shown in FIG. 366.

Figure 367:
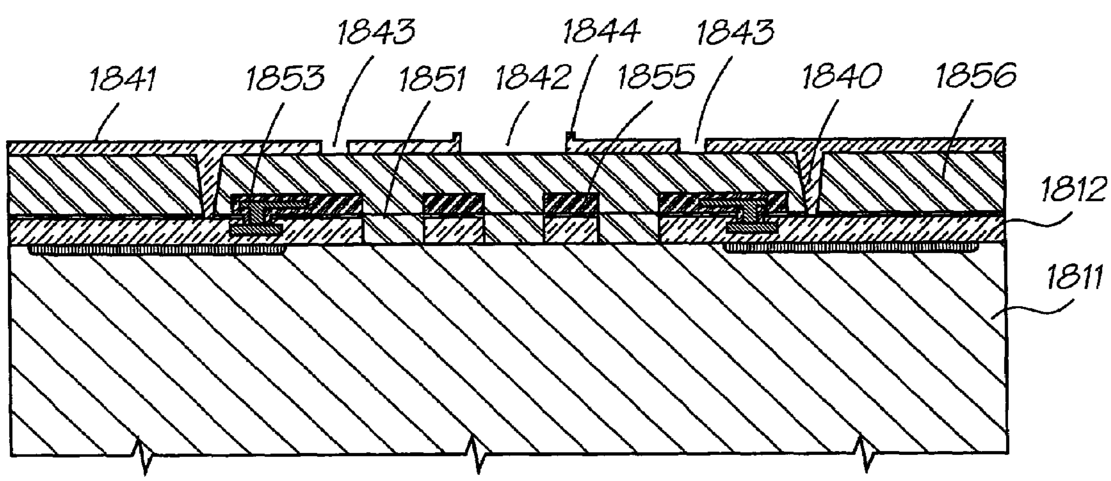

17. Etch down to the sacrificial layer using Mask 6. This mask defines the roof 1841 of the nozzle chamber, the nozzle 1842, and the sacrificial etch access holes 1843. This step is shown in FIG. 367.

Figure 368:
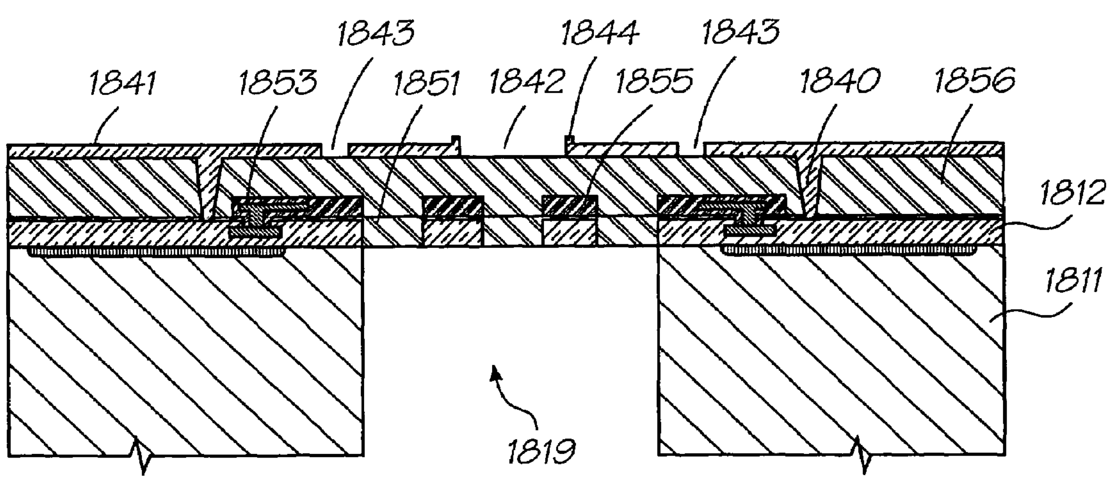

18. Back-etch completely through the silicon wafer (with, for example, an ASE Advanced Silicon Etcher from Surface Technology Systems) using Mask 7. This mask defines the ink inlets 1819 which are etched through the wafer. The wafer is also diced by this etch. This step is shown in FIG. 368.

Figure 369:
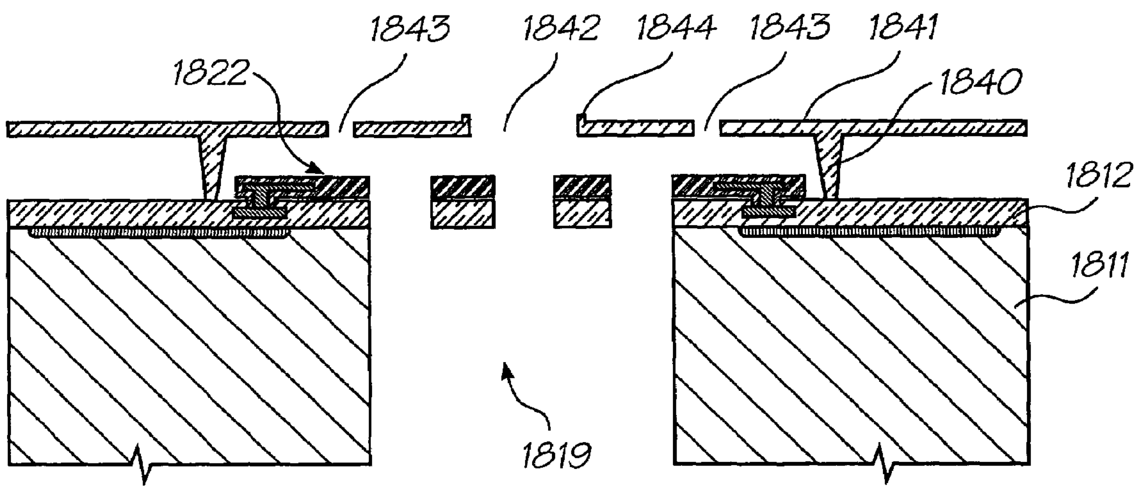

19. Etch the sacrificial material. The nozzle chambers are cleared, the actuators freed, and the chips are separated by this etch This step is shown in FIG. 369.

20. Mount the printheads in their packaging, which may be a molded plastic former incorporating ink channels which supply the appropriate color ink to the ink inlets at the back of the wafer. The package also includes a piezoelectric actuator attached to the rear of the ink channels. The piezoelectric actuator provides the oscillating ink pressure required for the ink jet operation.

21. Connect the printheads to their interconnect systems. For a low profile connection with minimum disruption of airflow, TAB may be used. Wire bonding may also be used if the printer is to be operated with sufficient clearance to the paper.

22. Hydrophobize the front surface of the printheads.

Figure 370:
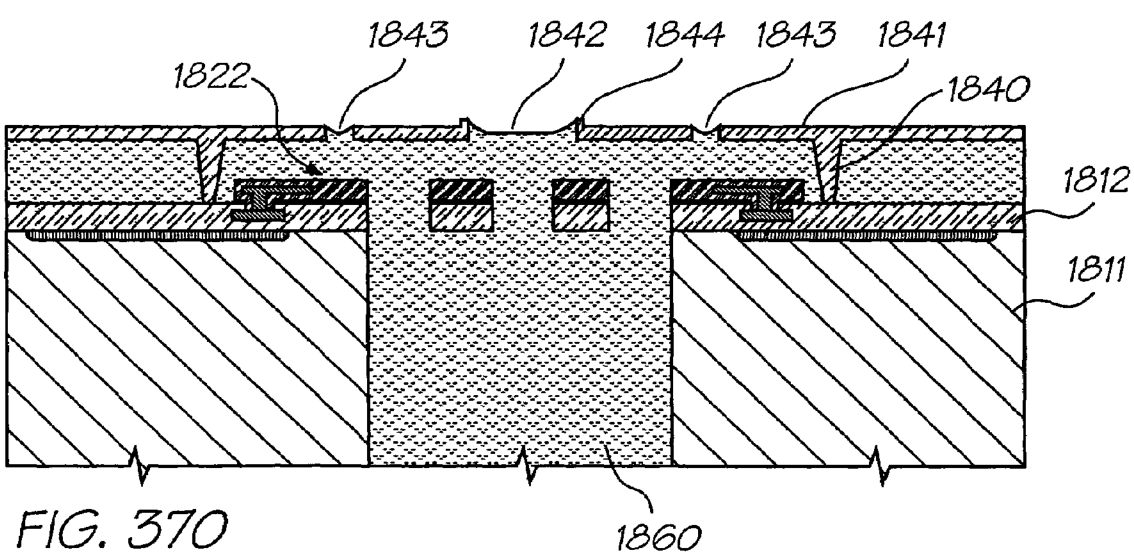

23. Fill the completed printheads with ink 1860 and test them. A filled nozzle is shown in FIG. 370.

IJ19

A preferred embodiment utilises an ink reservoir with oscillating ink pressure and a shutter activated by a thermal actuator to eject drops of ink.

Figure 371:
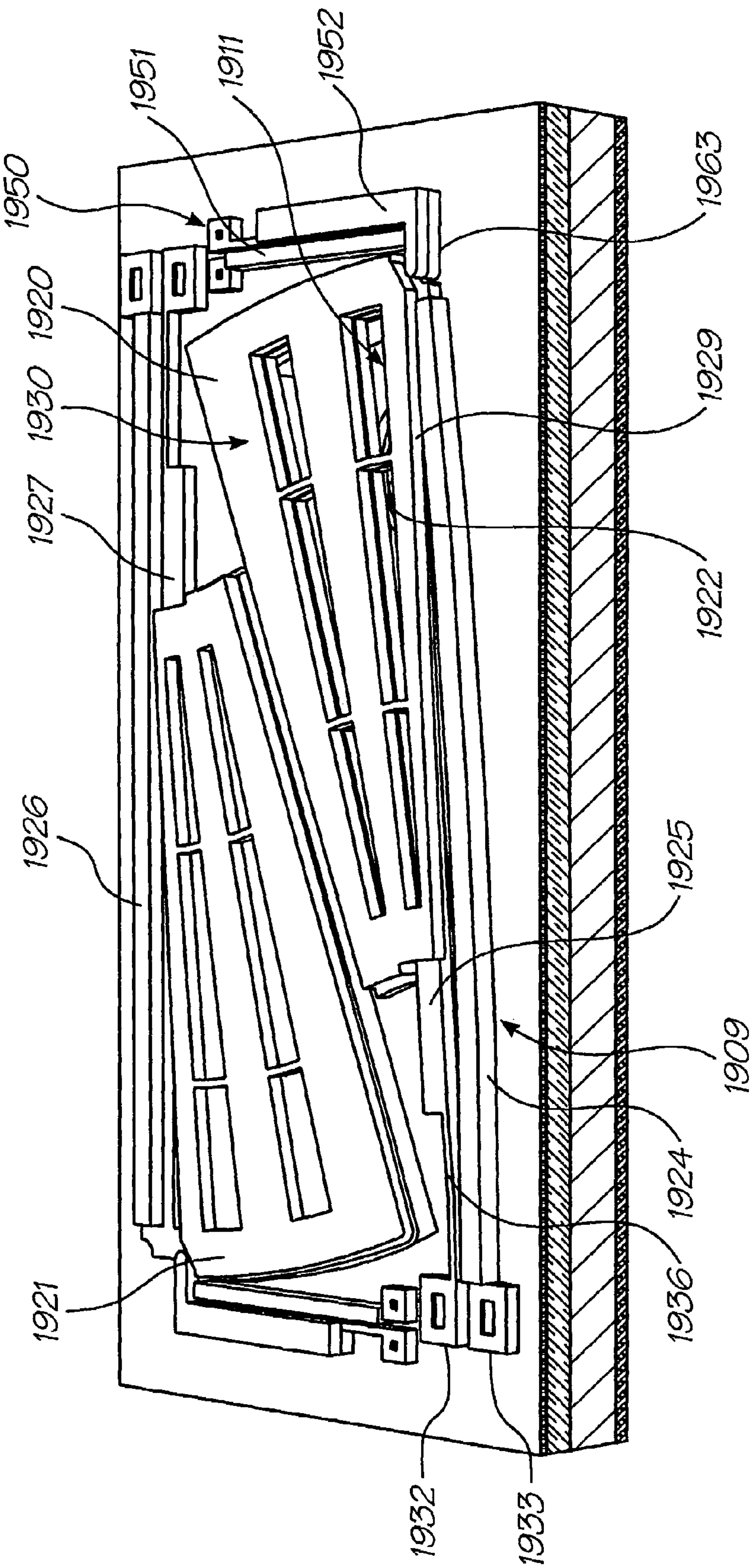
FIG. 371 is a perspective view of the top of a print nozzle pair.

Turning now to FIG. 371, there is illustrated two ink nozzle arrangements 1920, 1921 as constructed in accordance with a preferred embodiment The ink nozzle arrangement 1920 is shown in an open position with the ink nozzle arrangement 1921 shown in a closed position. The ink nozzle arrangement of FIG. 371 can be constructed as part of a large array of nozzles or print heads on a silicon wafer utilizing micro-electro mechanical technologies (MEMS).

In FIG. 371, each of the ink nozzle arrangements 1920, 1921 covers an ink nozzle e.g. 1922 from which ejection of ink occurs when the ink nozzle arrangement is in an open state and the pressure wave is at a maximum.

Each of the ink nozzle arrangements of FIG. 371 utilizes a thermocouple actuator device 1909 having two arms. The ink nozzle arrangement 1920 utilizes arms 1924, 1925 and the ink nozzle arrangement 1921 uses thermocouple arms 1926, 1927. The thermocouple arms 1924, 1925 are responsible for movement of a grated shutter device within a shutter cage 1929.

Figure 372:
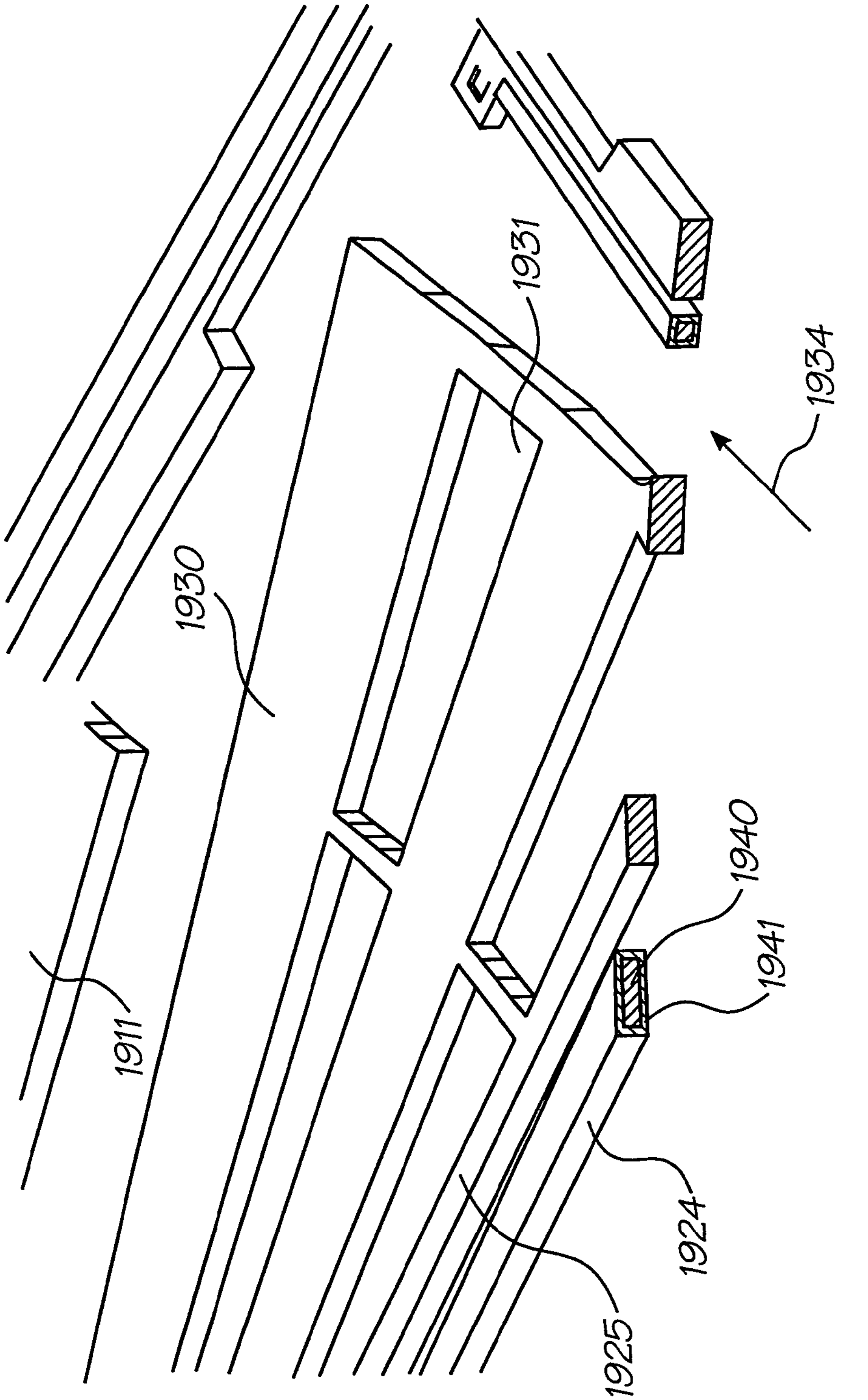
FIG. 372 illustrates a partial, cross-sectional view of one shutter and one arm of the thermocouple utilized in a preferred embodiment.

Referring now to FIG. 372, there is illustrated the thermocouple arms 1924, 1925 and shutter 1930 of FIG. 371 without the cage. The shutter 1930 includes a number of apertures 1931 for the passage of ink through the shutter 1930 when the shutter is in an open state. The thermocouple arms 1924, 1925 are responsible for movement of the shutter 1930 upon activation of the thermocouple by means of an electric current flowing through bonding pads 1932, 1933 (FIG. 371). The thermal actuator of FIG. 372 operates along similar principles to that disclosed in the aforementioned proceedings by the authors J. Robert Reid, Victor M. Bright and John. H. Comtois with a number of significant differences in operation which will now be discussed. The arm 1924 can comprise an inner core 1940 of poly-silicon surrounded by an outer jacket 1941 of thermally insulating material. The cross-section of the arm 1924 is illustrated in FIG. 372 and includes the inner core 1940 and the outerjacket 1941.

A current is passed through the two arms 1924, 1925 via bonding pads 1932, 1933. The arm 1924 includes the inner core 1940 which is an inner resistive element, preferably comprising polysilicon or the like which heats up upon a current being passed through it The thermal jacket 1941 is provided to isolate the inner core 1940 from the ink chamber 1911 in which the arms 1924, 1925 are immersed.

It should be noted that the arm 1924 contains a thermal jacket 1941 whereas the arm 1925 does not include a thermal jacket Hence, the arm 1925 will be generally cooler than the arm 1924 and undergoes a different rate of thermal expansion. The two arms act together to form a thermal actuator. The thermocouple comprising arms 1924, 1925 results in movement of the shutter 1930 generally in the direction 1934 upon a current being passed through the two arms. Importantly, the arm 1925 includes a thinned portion 1936 (in FIG. 371) which amplifies the radial movement of shutter 1930 around a central axis near the bonding pads 1932, 1933 (in FIG. 371). This results in a "magnification" of the rotational effects of activation of the thermocouple, resulting in an increased movement of the shutter 1930. The thermocouples 1924, 1925 can be activated to move the shutter 1930 from the closed position as illustrated generally at 1921 in FIG. 371 to an open position as illustrated at 1920 in FIG. 371.

Returning now to FIG. 371 a second thermocouple actuator 1950 is also provided having first and second arms 1951, 1952. The actuator 1950 operates on the same physical principles as the arm associated with the shutter system 1930. The actuator 1950 is designed to be operated so as to lock the shutter 1930 in an open or closed position. The actuator 1950 locking the shutter 1930 in an open position is illustrated in FIG. 371. When in a closed position, the arm 1950 locks the shutter by means of engagement of knob with a cavity on shutter 1930 (not shown). After a short period, the shutter 1930 is deactivated, and the hot arm 1924 (FIG. 372) of the actuator 1909 begins to cool.

Figure 373:
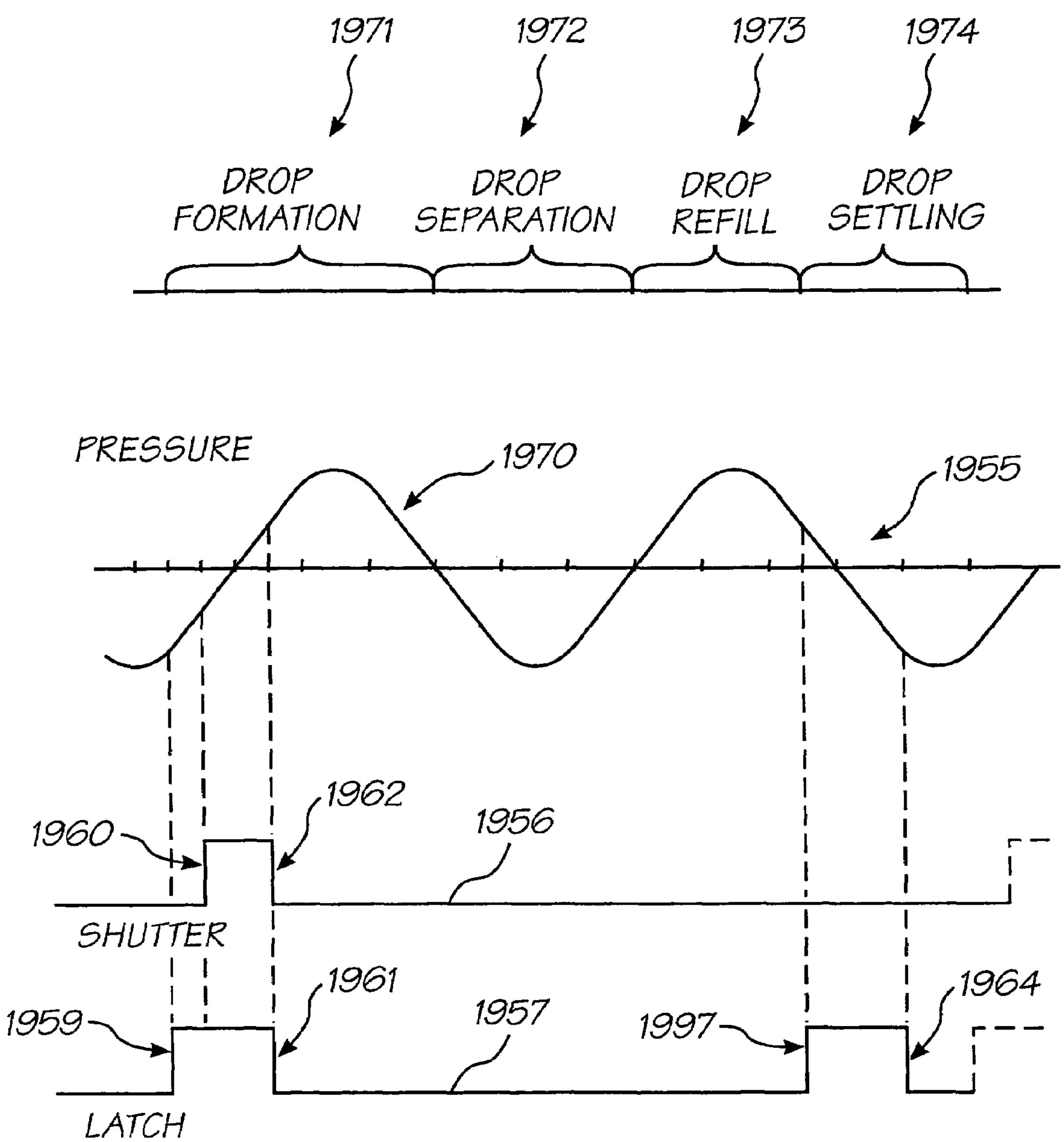
FIG. 373 is a timing diagram illustrating the operation of a preferred embodiment.

An example timing diagram of operation of each ink nozzle arrangement will now be described. In FIG. 373 there is illustrated generally at 1955 a first pressure plot which illustrates the pressure fluctuation around an ambient pressure within the ink chamber (1911 of FIG. 372) as a result of the driving of a piezoelectric actuator in a substantially sinusoidal manner. The pressure fluctuation 1970 is also substantially sinusoidal in nature and the printing cycle is divided into four phases being a drop formation phase 1971, a drop separation phase 1972, a drop refill phase 1973 and a drop settling phase 1974.

Also shown in FIG. 373 are clock timing diagrams 1956 and 1957. The first diagram 1956 illustrates the control pulses received by the shutter thermal actuator of a single ink nozzle so as to open and close the shutter. The second clock timing diagram 1957 is directed to the operation of the second thermal actuator (eg. 1950 of FIG. 371).

At the start of the drop formation phase 1971 when the pressure 1970 within the ink chamber is going from a negative pressure to a positive pressure, the actuator 1950 is actuated at 1959 to an open state. Subsequently, the shutter 1930 is also actuated at 1960 so that it also moves from a closed to an open position. Next, the actuator 1950 is deactivated at 1961 thereby locking the shutter 1930 in an open position with the head 1963 (FIG. 371) of the actuator 1950 locking against one side of the shutter 1930. Simultaneously, the shutter 1930 is deactivated at 1962 to reduce the power consumption in the nozzle.

As the ink chamber and ink nozzle are in a positive pressure state at this time, the ink meniscus will be expanding out of the ink nozzle.

Subsequently, the drop separation phase 1972 is entered wherein the chamber undergoes a negative pressure causing a portion of the ink flowing out of the ink nozzle back into the chamber. This rapid flow causes ink bubble separation from the main body of ink. The ink bubble or jet then passes to the print media while the surface meniscus of the ink collapses back into the ink nozzle. Subsequently, the pressure cycle enters the drop refill stage 1973 with the shutter 1930 still open with a positive pressure cycle experienced. This causes rapid refilling of the ink chamber. At the end of the drop re-filling stage, the actuator 1950 is opened at 1997 causing the now cold shutter 1930 to spring back to a closed position. Subsequently, the actuator 1950 is closed at 1964 locking the shutter 1930 in the closed position, thereby completing one cycle of printing. The closed shutter 1930 allows a drop settling stage 1974 to be entered which allows for the dissipation of any resultant ringing or transient in the ink meniscus position while the shutter 1930 is closed. At the end of the drop settling stage, the state has returned to the start of the drop formation stage 1971 and another drop can be ejected from the ink nozzle.

Of course, a number of refinements of operation are possible. In a first refinement, the pressure wave oscillation which is shown to be a constant oscillation in magnitude and frequency can be altered in both respects. The size and period of each cycle can be scaled in accordance with such precalculated factors such as the number of nozzles ejecting ink and the tuned pressure requirements for nozzle refill with different inks. Further, the clock periods of operation can be scaled to take into account differing effects such as actuation speeds etc.

Figure 374:
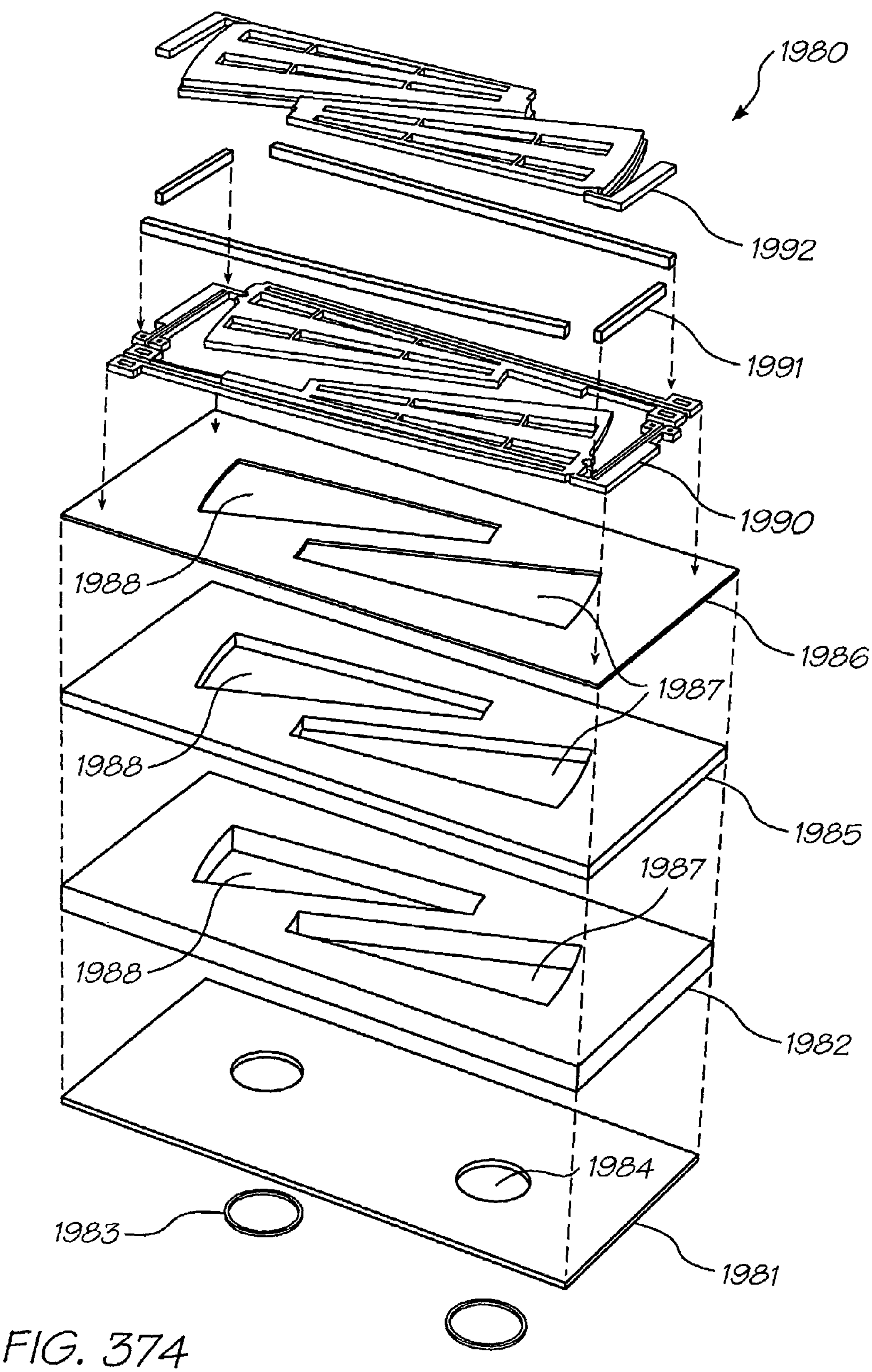
FIG. 374 illustrates an exploded perspective view of a pair of print nozzles constructed in accordance with a preferred embodiment.

Turning now to FIG. 374, there is illustrated at 1980 an exploded perspective view of one form of construction of the ink nozzle pair 1920, 1921 of FIG. 371.

The ink jet nozzles are constructed on a buried boron-doped layer 1981 of a silicon wafer 1982 which includes fabricated nozzle rims, e.g. 1983 which form part of the layer 1981 and limit any hydrophilic spreading of the meniscus on the bottom end of the layer 1981. The nozzle rim, e.g. 1983 can be dispensed with when the bottom surface of layer 1981 is suitably treated with a hydrophobizing process.

On top of the wafer 1982 is constructed a CMOS layer 1985 which contains all the relevant circuitry required for driving of the two nozzles. This CMOS layer is finished with a silicon dioxide layer 1986. Both the CMOS layer 1985 and the silicon dioxide 1986 include triangular apertures 1987 and 1988 allowing for fluid communication with the nozzle ports, e.g. 1984.

On top of the $SiO_2$ layer 1986 are constructed the various shutter layers 1990 to 1992. A first shutter layer 1990 is constructed from a first layer of polysilicon and comprises the shutter and actuator mechanisms. A second shutter layer 1991 can be constructed from a polymer, for example, polyamide and acts as a thermal insulator on one arm of each of the thermocouple devices. A final covering cage layer 1992 is constructed from a second layer of polysilicon.

The construction of the nozzles 1980 relies upon standard semi-conductor fabrication processes and MEMS process known to those skilled in the art.

One form of construction of nozzle arrangement 1980 would be to utilize a silicon wafer containing a boron doped epitaxial layer which forms the final layer 1981. The silicon wafer layer 1982 is formed naturally above the boron doped epitaxial 1981. On top of this layer is formed the layer 1985 with the relevant CMOS circuitry etc. being constructed in this layer. The apertures 1987, 1988 can be formed within the layers by means of plasma etching utilizing an appropriate mask. Subsequently, these layers can be passivated by means of a nitride covering and then filled with a sacrificial material such as glass which will be subsequently etched. A sacrificial material with an appropriate mask can also be utilized as a base for the moveable portions of the layer 1990 which are again deposited utilizing appropriate masks. Similar procedures can be carried out for the layers 1991, 1992. Next, the wafer can be thinned by means of back etching of the wafer to the boron doped epitaxial layer 1991 which is utilized as an etchant stop. Subsequently, the nozzle rims and nozzle apertures can be formed and the internal portions of the nozzle chamber and other layers can be sacrificially etched away releasing the shutter structure. Subsequently, the wafer can be diced into appropriate print heads attached to an ink chamber wafer and tested for operational yield.

Of course, many other materials can be utilized to form the construction of each layer. For example, the shutter and actuators could be constructed from tantalum or a number of other substances known to those skilled in the art of construction of MEMS devices.

It will be evident to the person skilled in the art, that large arrays of ink jet nozzle pairs can be constructed on a single wafer and ink jet print heads can be attached to a corresponding ink chamber for driving of ink through the print head, on demand, to the required print media. Further, normal aspects of (MEMS) construction such as the utilization of dimples to reduce the opportunity for stiction, while not specifically disclosed in the current embodiment could be used as means to improve yield and operation of the shutter device as constructed in accordance with a preferred embodiment.

One form of detailed manufacturing process which can be used to fabricate monolithic ink jet print heads operating in accordance with the principles taught by the present embodiment can proceed utilizing the following steps:

1. Using a double sided polished wafer 1975 deposit 3 microns of epitaxial silicon heavily doped with boron 1981.

Figure 375:
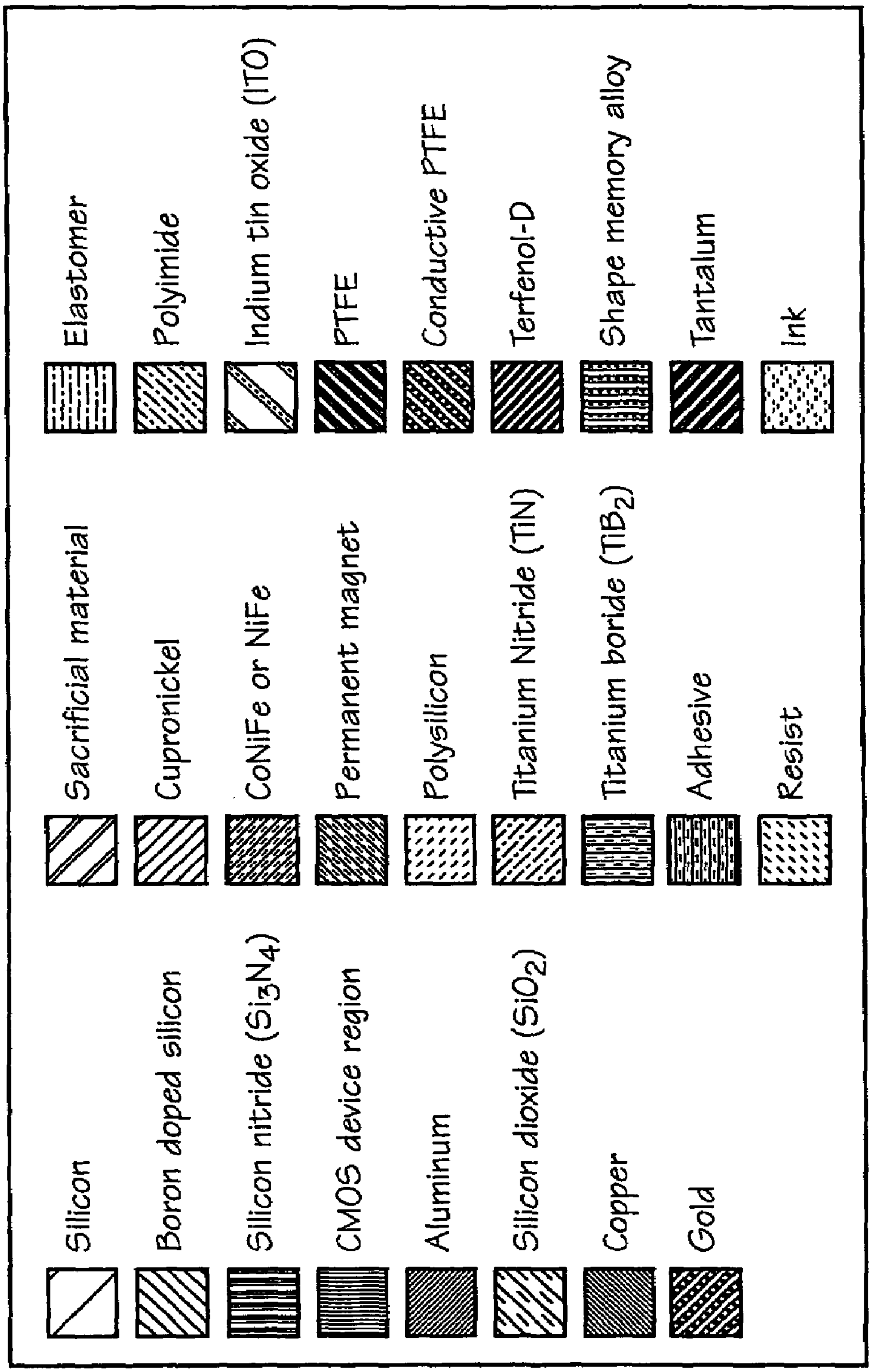
FIG. 375 provides a legend of the materials indicated in FIGS. 376 to 390.
Figure 376:
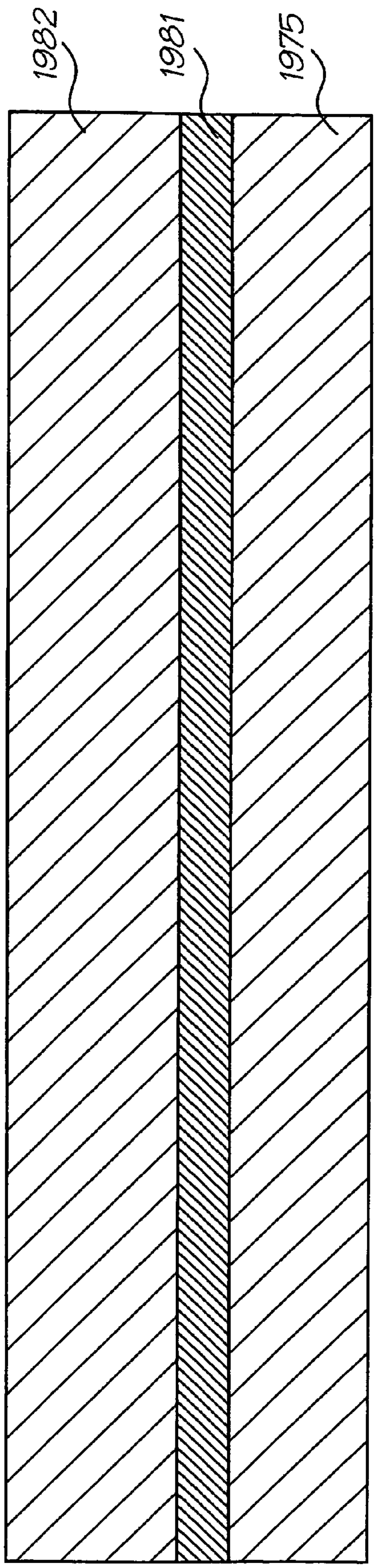
FIG. 376 to FIG. 390 illustrate sectional views of the manufacturing steps in one form of construction of an ink jet printhead nozzle.

2. Deposit 10 microns of n/n+ epitaxial silicon 1982. Note that the epitaxial layer is substantially thicker than required for CMOS. This is because the nozzle chambers are crystallographically etched from this layer. This step is shown in FIG. 376. FIG. 375 is a key to representations of various materials in these manufacturing diagrams, and those of other cross referenced ink jet configurations. For clarity, these diagrams may not be to scale, and may not represent a cross section though any single plane of the nozzle.

Figure 377:
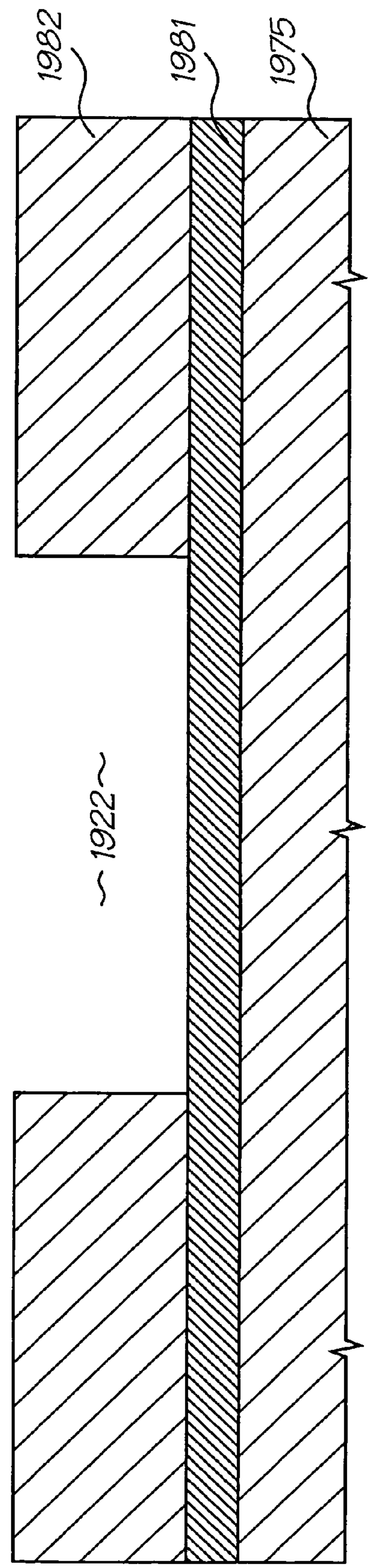

3. Plasma etch the epitaxial silicon 1982 with approximately 90 degree sidewalls using MEMS Mask 1. This mask defines the nozzle cavity 1922. The etch is timed for a depth approximately equal to the epitaxial silicon 1982 (10 microns), to reach the boron doped silicon buried layer 1981. This step is shown in FIG. 377.

Figure 378:
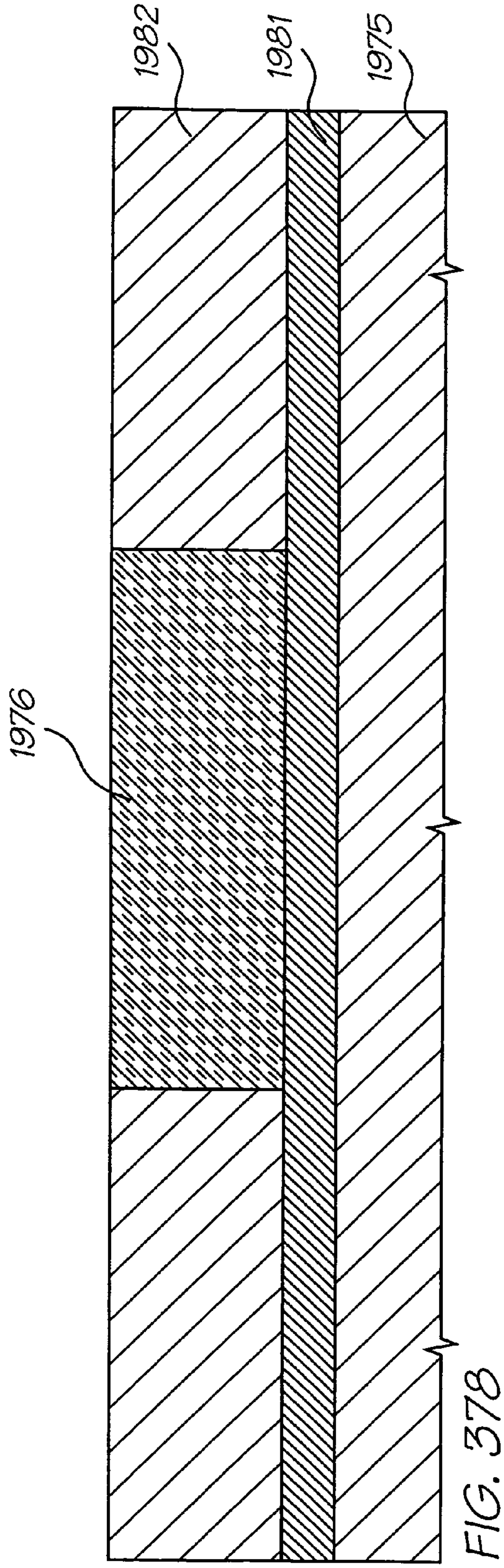

4. Deposit 10 microns of low stress sacrificial oxide 1976. Planarize down to silicon 1982 using CMP. The sacrificial material 1976 temporarily fills the nozzle cavity. This step is shown in FIG. 378.

5. Begin fabrication of the drive transistors, data distribution, and timing circuits using a CMOS process. The MEMS processes which form the mechanical components of the inkjet are interleaved with the CMOS device fabrication steps. The example given here is of a 1 micron, 2 poly, 1 metal retrograde P-well process. The mechanical components are formed from the CMOS polysilicon layers 1985. For clarity, the CMOS active components are omitted.

Figure 379:
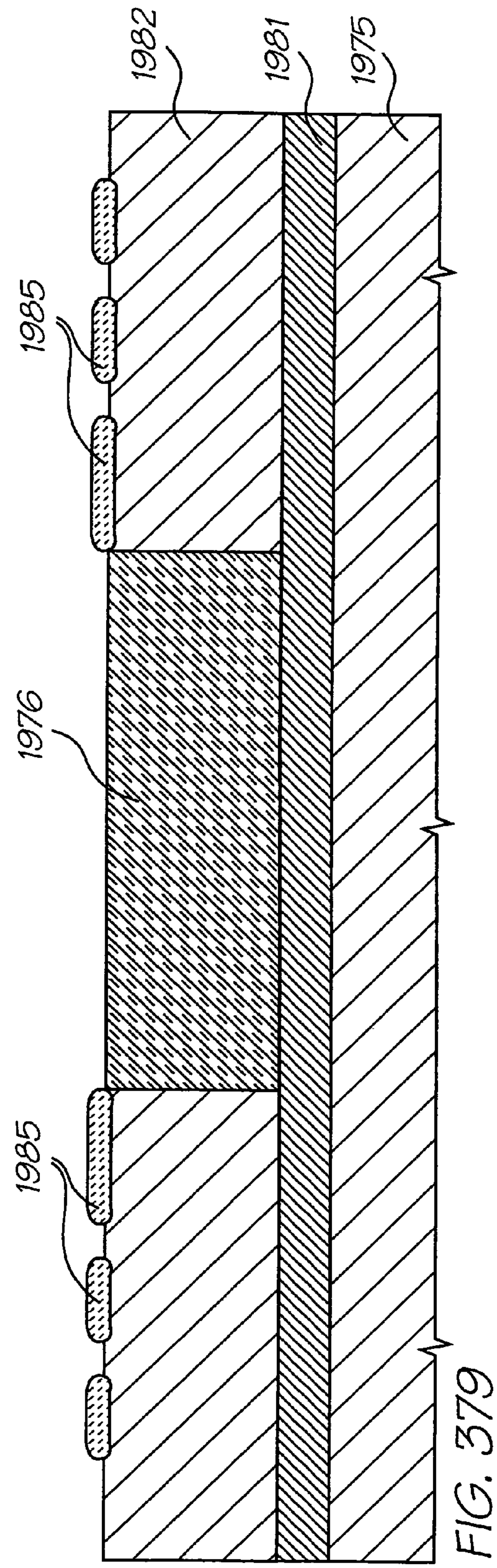

6. Grow the field oxide using standard LOCOS techniques to a thickness of 0.5 microns. As well as the isolation between transistors, the field oxide is used as a MEMS sacrificial layer, so inkjet mechanical details are incorporated in the active area mask. The MEMS features of this step are shown in FIG. 379.

7. Perform the PMOS field threshold implant The MEMS fabrication has no effect on this step except in calculation of the total thermal budget 8. Perform the retrograde P-well and NMOS threshold adjust implants. The MEMS fabrication has no effect on this step except in calculation of the total thermal budget.

9. Perform the PMOS N-tub deep phosphorus punch-through control implant and shallow boron implant. The MEMS fabrication has no effect on this step except in calculation of the total thermal budget.

Figure 380:
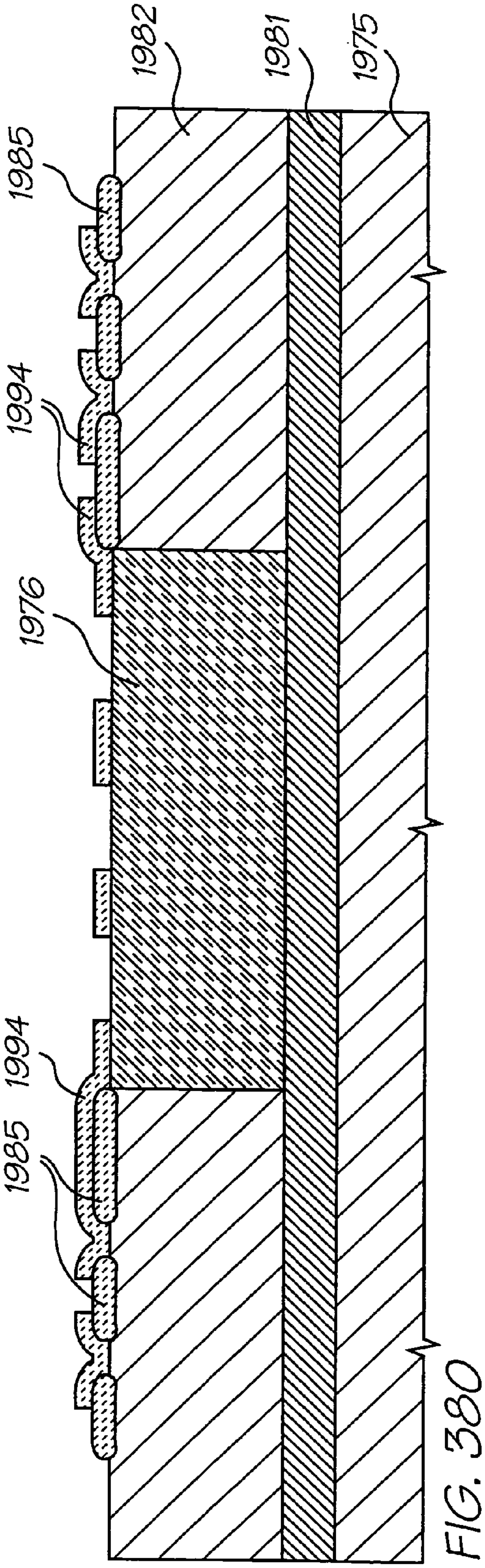

10. Deposit and etch the first polysilicon layer 1994. As well as gates and local connections, this layer 1994 includes the lower layer of MEMS components. This includes the shutter, the shutter actuator, and the catch actuator. It is preferable that this layer 1994 be thicker than the normal CMOS thickness. A polysilicon thickness of 1 micron can be used. The MEMS features of this step are shown in FIG. 380.

11. Perform the NMOS lightly doped drain (LDD) implant This process is unaltered by the inclusion of MEMS in the process flow.

12. Perform the oxide deposition and RIE etch for polysilicon gate sidewall spacers. This process is unaltered by the inclusion of MEMS in the process flow.

13. Perform the NMOS source/drain implant The extended high temperature anneal time to reduce stress in the two polysilicon layers must be taken into account in the thermal budget for diffusion of this implant. Otherwise, there is no effect from the MEMS portion of the chip.

14. Perform the PMOS source/drain implant. As with the NMOS source/drain implant, the only effect from the MEMS portion of the chip is on thermal budget for diffusion of this implant.

Figure 381:
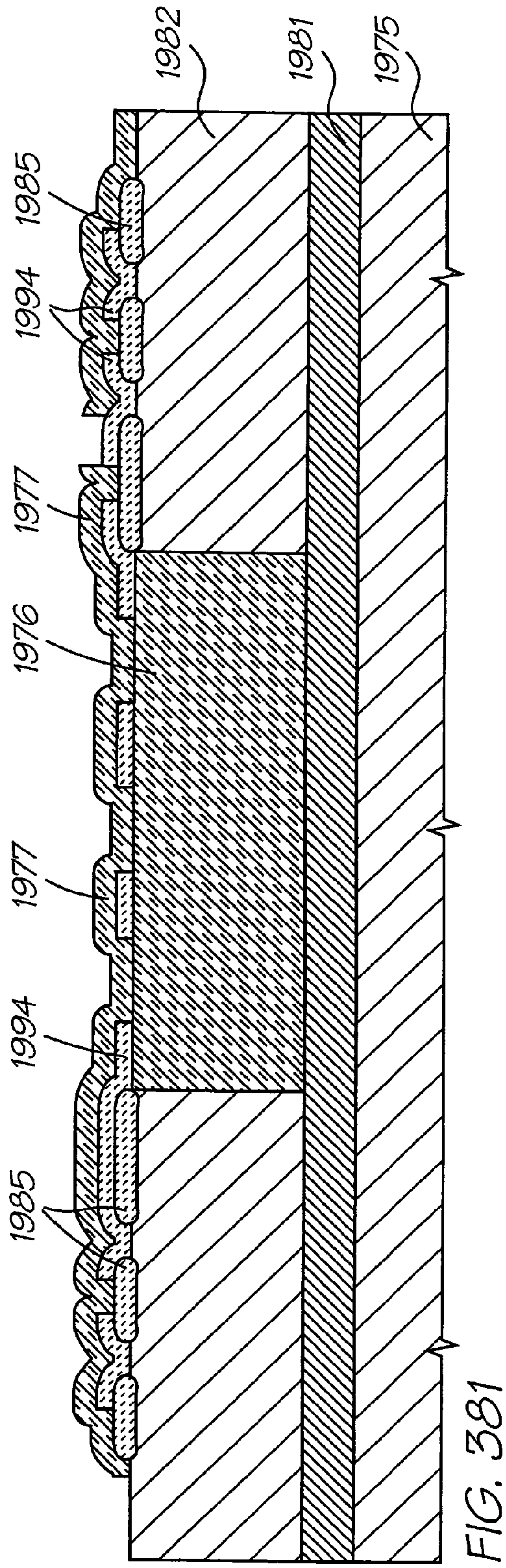

15. Deposit 1.3 micron of glass 1977 as the first interlevel dielectric and etch using the CMOS contacts mask. The CMOS mask for this level also contains the pattern for the MEMS inter-poly sacrificial oxide. The MEMS features of this step are shown in FIG. 381.

Figure 382:
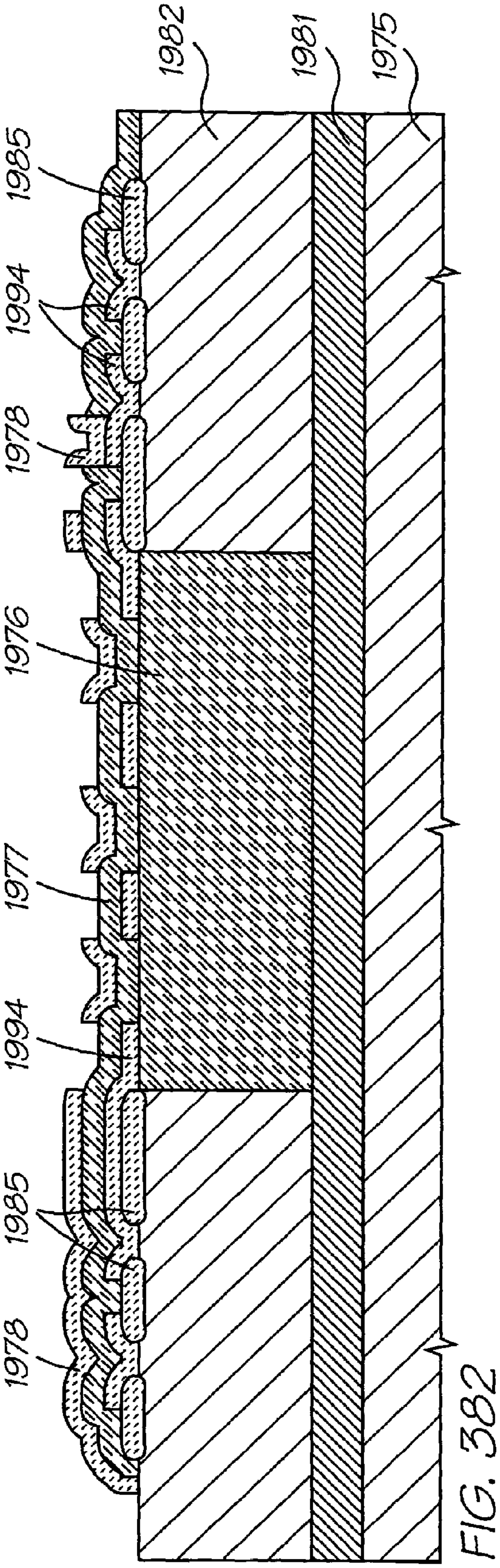

16. Deposit and etch the second polysilicon layer 1978. As well as CMOS local connections, this layer 1978 includes the upper layer of MEMS components. This includes the grill and the catch second layer (which exists to ensure that the catch does not 'slip off' the shutter. A polysilicon thickness of 1 micron can be used. The MEMS features of this step are shown in FIG. 382.

17. Deposit 1 micron of glass 1979 as the second interlevel dielectric and etch using the CMOS via 1 mask. The CMOS mask for this level also contains the pattern for the MEMS actuator contacts.

Figure 383:
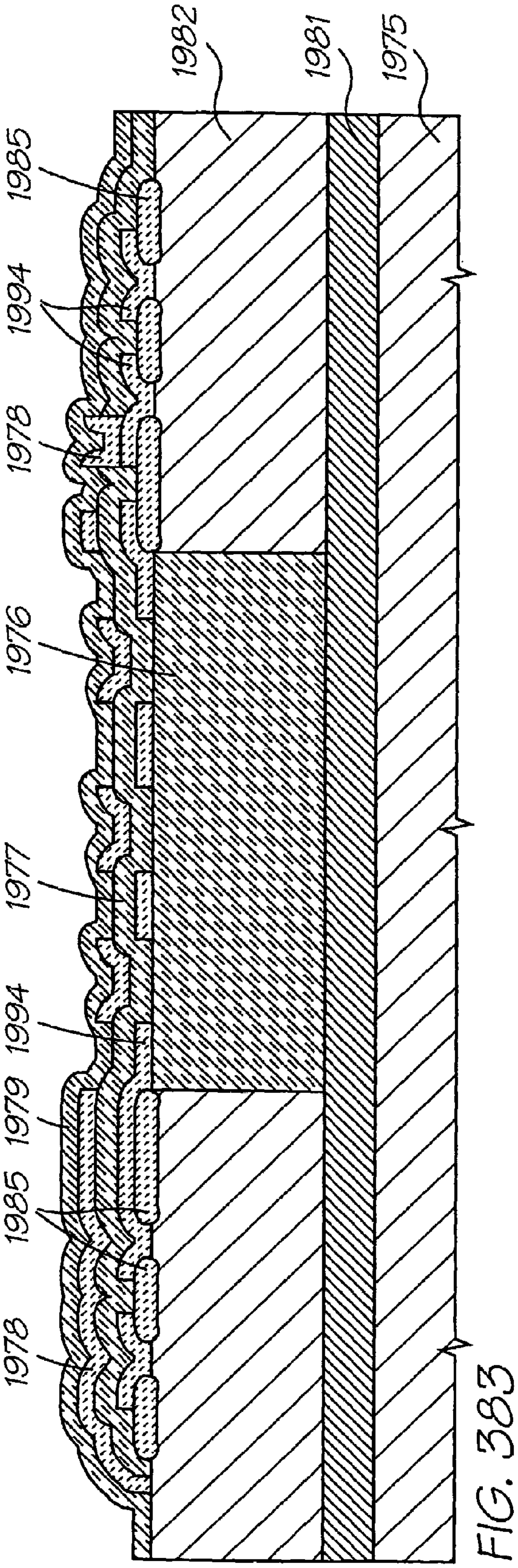

18. Deposit and etch the metal layer. None of the metal appears in the MEMS area, so this step is unaffected by the MEMS process additions. However, all required annealing of the polysilicon should be completed before this step. The MEMS features of this step are shown in FIG. 383.

Figure 384:
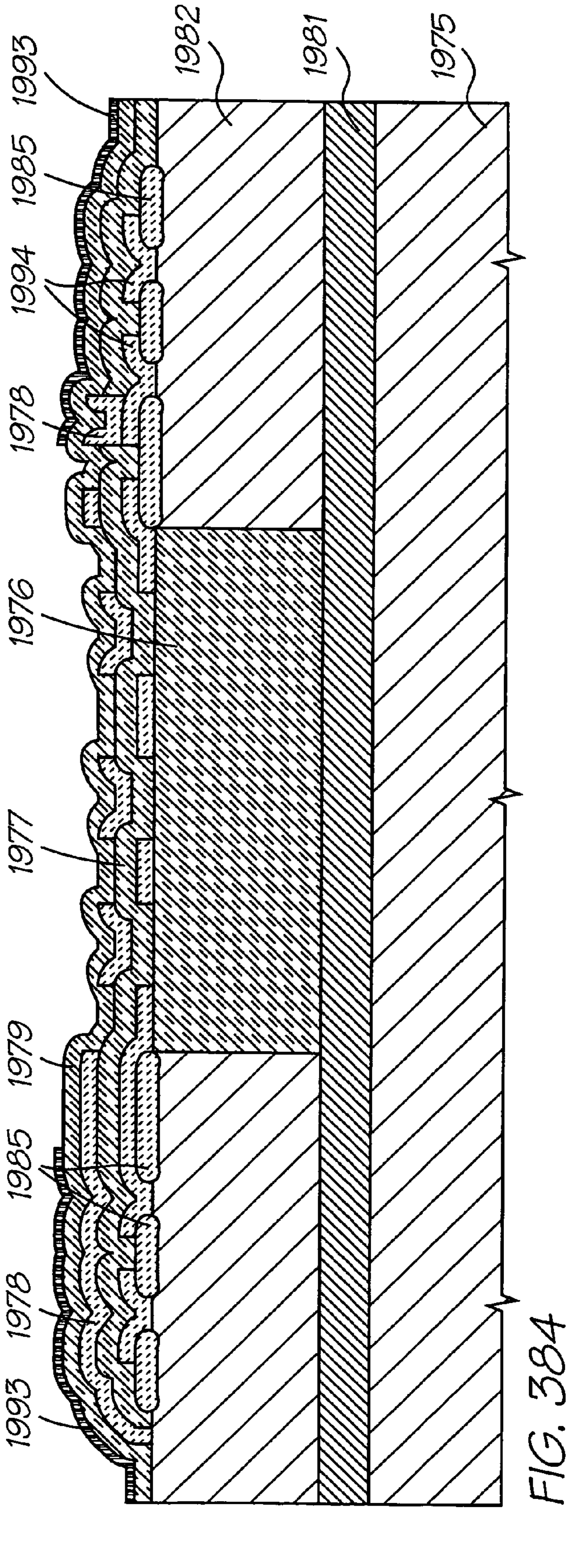

19. Deposit 0.5 microns of silicon nitride ($Si_3N_4$) 1993 and etch using MEMS Mask 2. This mask defines the region of sacrificial oxide etch performed in step 24. The silicon nitride aperture is substantially undersized, as the sacrificial oxide etch is isotropic. The CMOS devices must be located sufficiently far from the MEMS devices that they are not affected by the sacrificial oxide etch. The MEMS features of this step are shown in FIG. 384.

Figure 385:
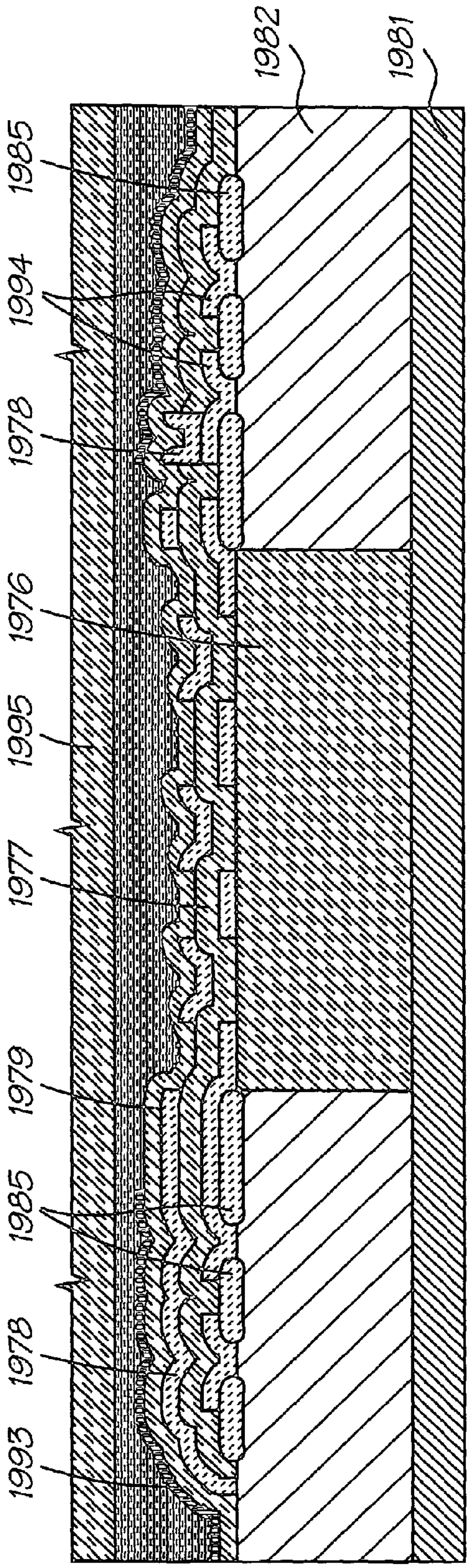

20. Mount the wafer on a glass blank 1995 and back-etch the wafer 1981 using KOH with no mask This etch thins the wafer and stops at the buried boron doped silicon layer. The MEMS features of this step are shown in FIG. 385.

Figure 386:
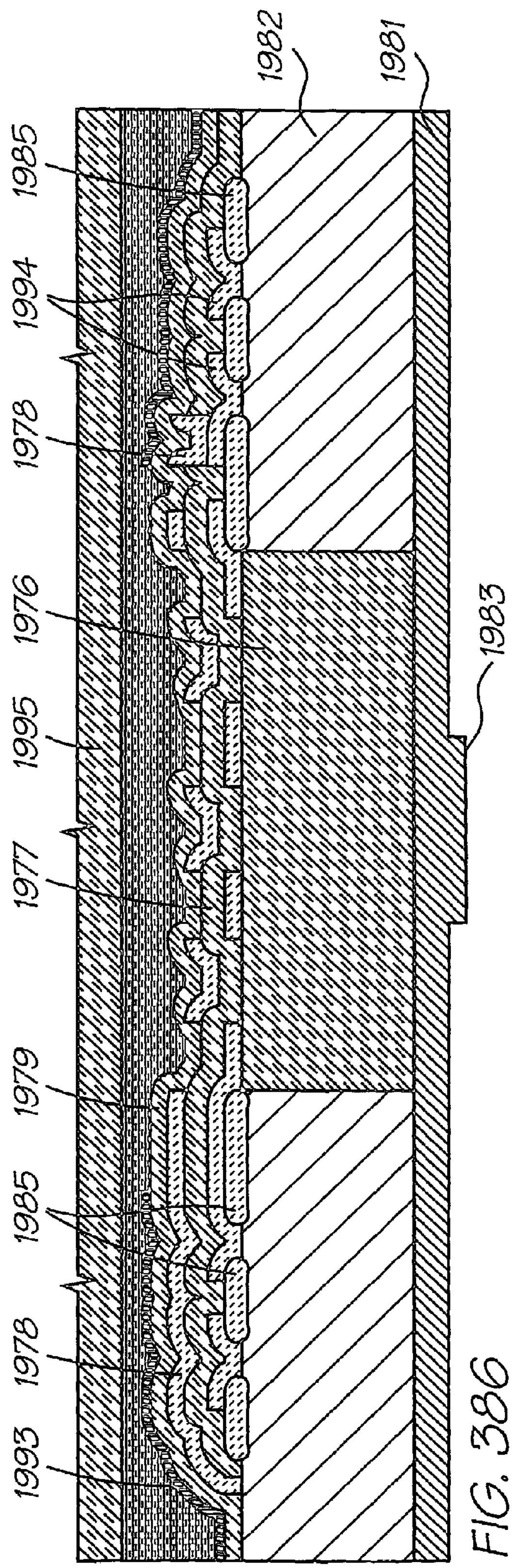

21. Plasma back-etch the boron doped silicon layer 1981 to a depth of 1 micron using MEMS Mask 3. This mask defines the nozzle rim 1983. The MEMS features of this step are shown in FIG. 386.

Figure 387:
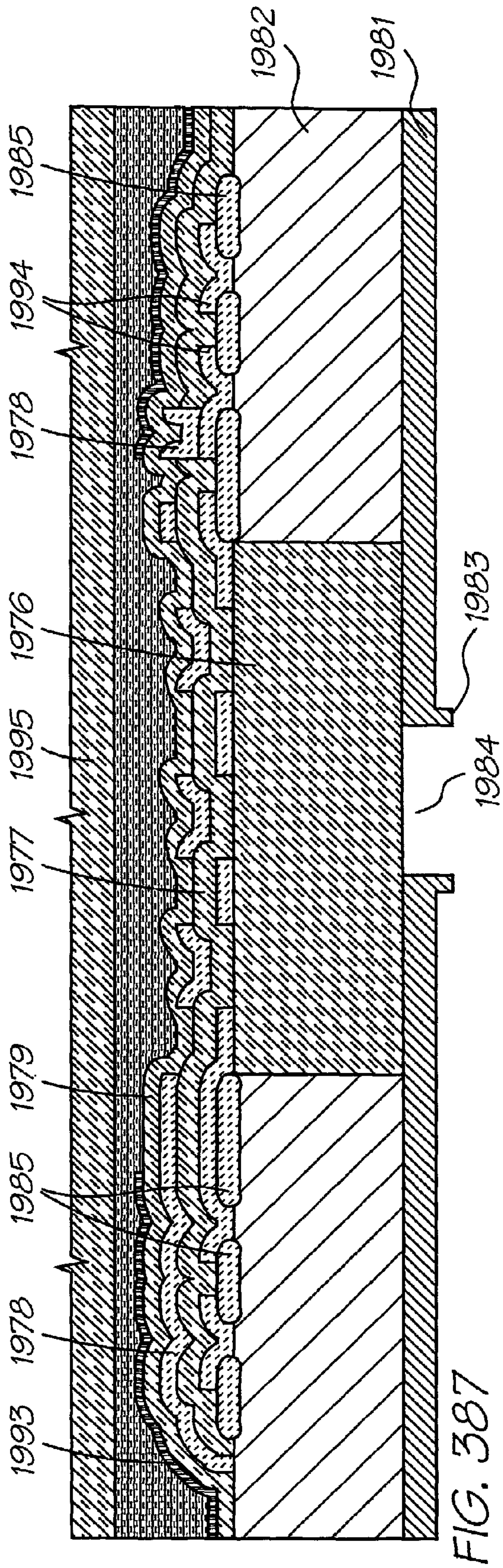

22. Plasma back-etch through the boron doped layer 1981 using MEMS Mask 4. This mask defines the nozzle 1984, and the edge of the chips. At this stage, the chips are separate, but are still mounted on the glass blank. The MEMS features of this step are shown in FIG. 387.

Figure 388:
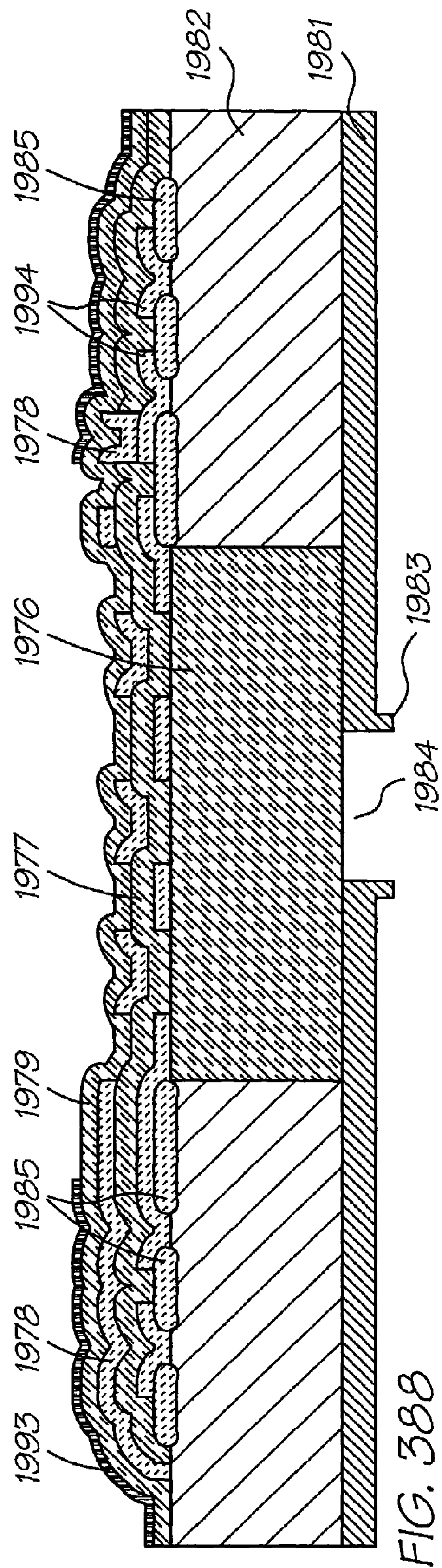

23. Detach the chips from the glass blank 1995. Strip the adhesive. This step is shown in FIG. 388.

Figure 389:
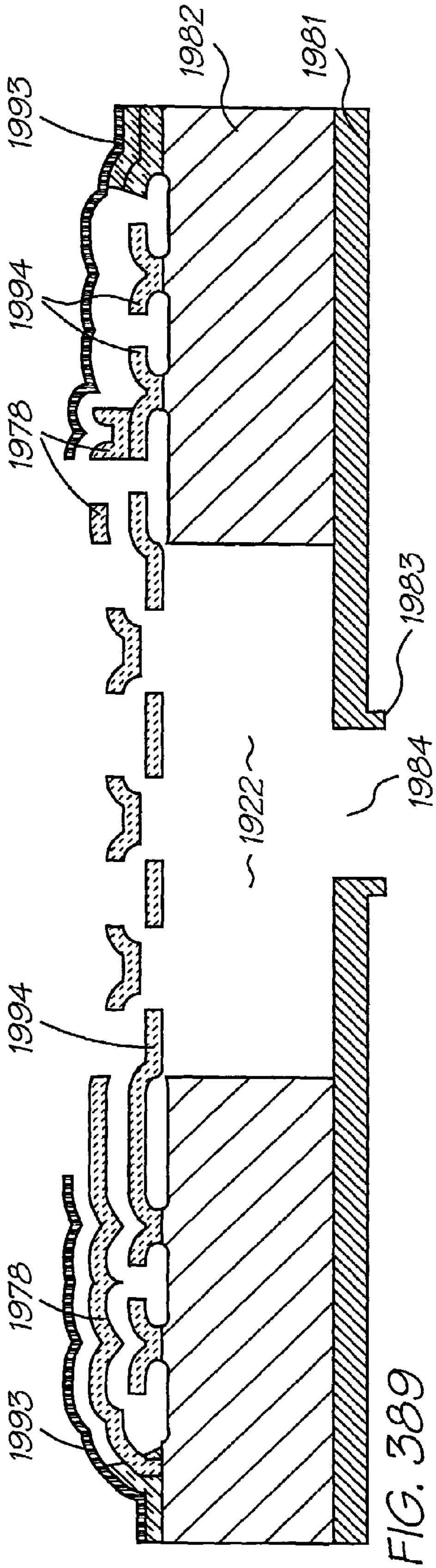

24. Etch the sacrificial oxide 1976 using vapor phase etching (VPE) using an anhydrous HF/methanol vapor mixture. The use of a dry etch avoids problems with stiction. This step is shown in FIG. 389.

25. Mount the print heads in their packaging, which may be a molded plastic former incorporating ink channels which supply different colors of ink to the appropriate regions of the front surface of the wafer. The package also includes a piezoelectric actuator attached to the rear of the ink channels. The piezoelectric actuator provides the oscillating ink pressure required for the ink jet operation.

26. Connect the print heads to their interconnect systems.

27. Hydrophobize the front surface of the print heads.

Figure 390:
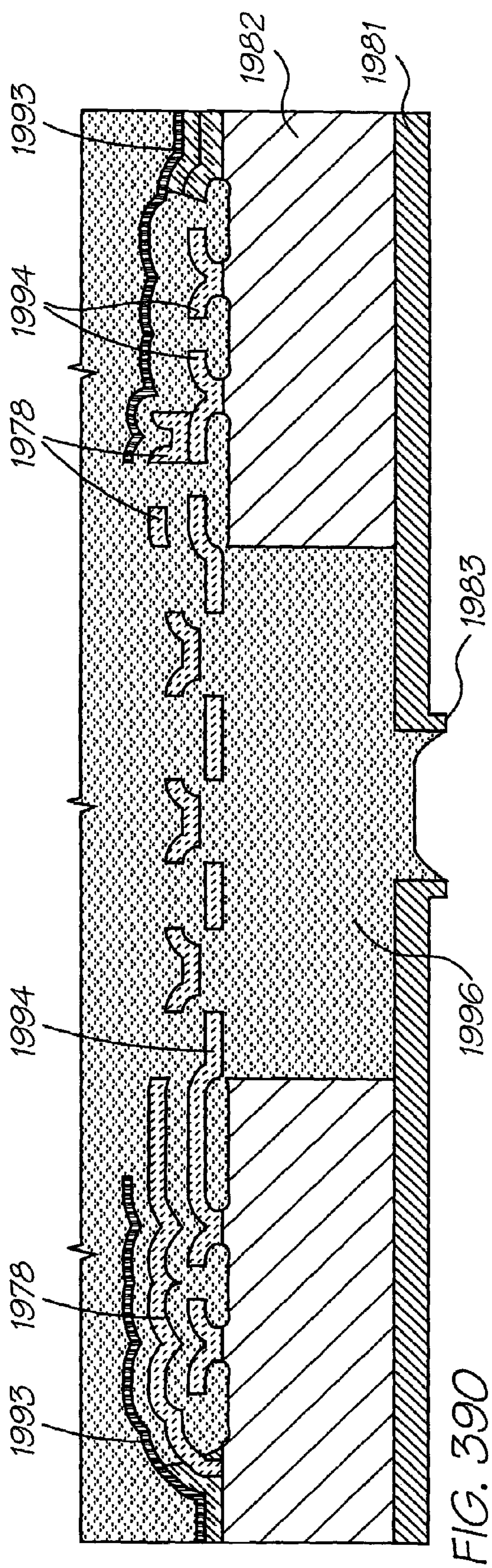

28. Fill the completed print heads with ink 1996 and test them. A filled nozzle is shown in FIG. 390.

IJ20

In a preferred embodiment, an ink jet printhead is constructed from an array of ink nozzle chambers which utilize a thermal actuator for the ejection of ink having a shape reminiscent of the calyx arrangement of a flower. The thermal actuator is activated so as to close the flower arrangement and thereby cause the ejection of ink from a nozzle chamber formed in the space above the calyx arrangement. The calyx arrangement has particular advantages in allowing for rapid refill of the nozzle chamber in addition to efficient operation of the thermal actuator.

Figure 391:
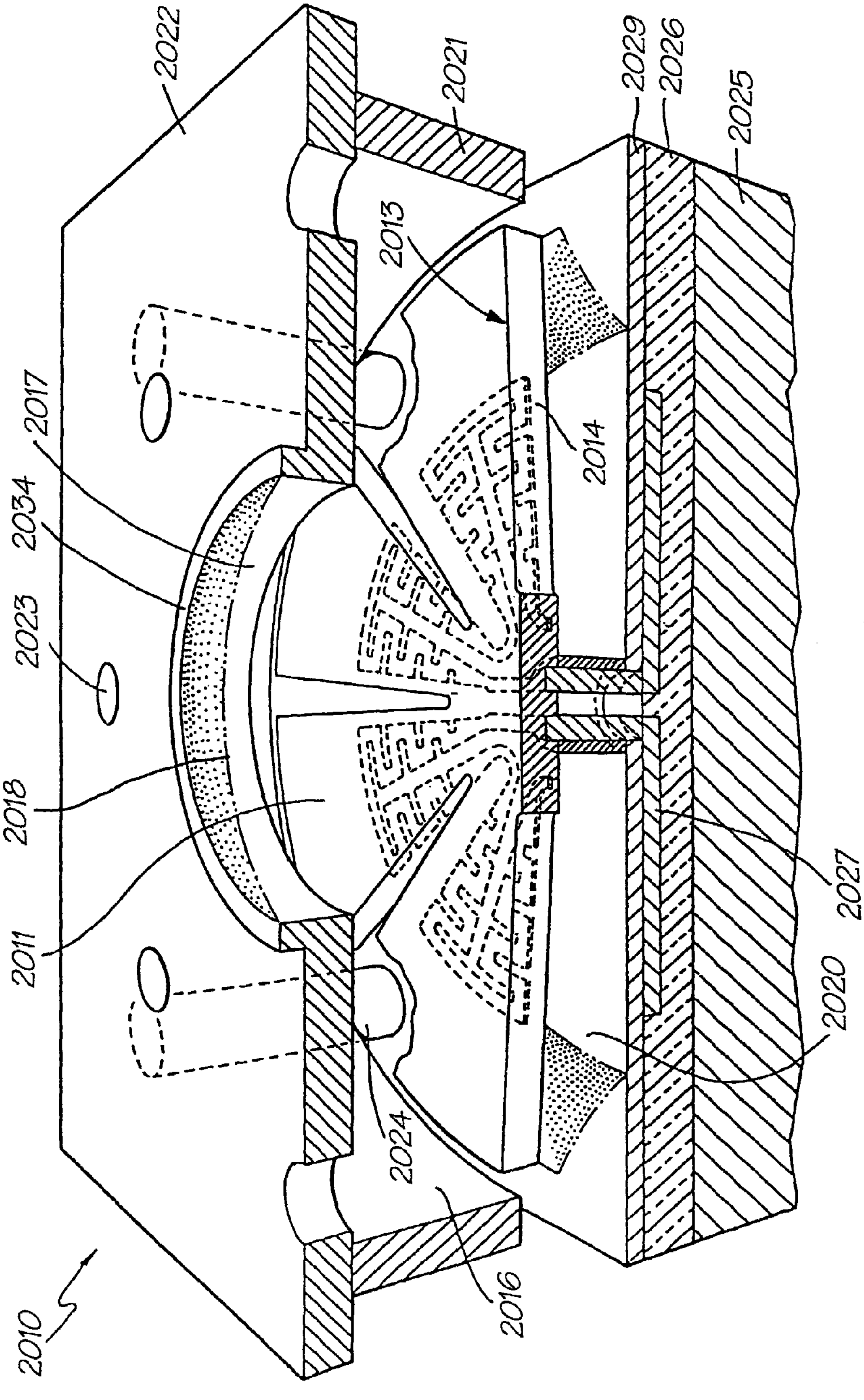
FIG. 391 is a cross-sectional perspective view of a single ink nozzle arrangement constructed in accordance with a preferred embodiment, with the actuator in its quiescent state.

Turning to FIG. 391, there is shown a perspective—sectional view of a single nozzle chamber of a printhead 2010 as constructed in accordance with a preferred embodiment. The printhead arrangement 2010 is based around a calyx type structure 2011 which includes a plurality of petals e.g. 2013 which are constructed from polytetrafluoroethylene (PTFE). The petals 2013 include an internal resistive element 2014 which can comprise a copper heater. The resistive element 2014 is generally of a serpentine structure, such that, upon heating, the resistive element 2014 can concertina and thereby expand at the rate of expansion of the PTFE petals, e.g. 2013. The PTFE petal 2013 has a much higher coefficient thermal expansion ($770\times10^{-6}$) and therefore undergoes substantial expansion upon heating. The resistive elements 2014 are constructed nearer to the lower surface of the PTFE petal 2013 and as a result, the bottom surface of PTFE petal 2013 is heated more rapidly than the top surface. The difference in thermal grading results in a bending upwards of the petals 2013 upon heating. Each petal e.g. 2013 is heated together which results in a combined upward movement of all the petals at the same time which in turn results in the imparting of momentum to the ink within chamber 2016 such that ink is forced out of the ink nozzle 2017. The forcing out of ink out of ink nozzle 2017 results in an expansion of the meniscus 2018 and subsequently results in the ejection of drops of ink from the nozzle 2017.

Figure 392:
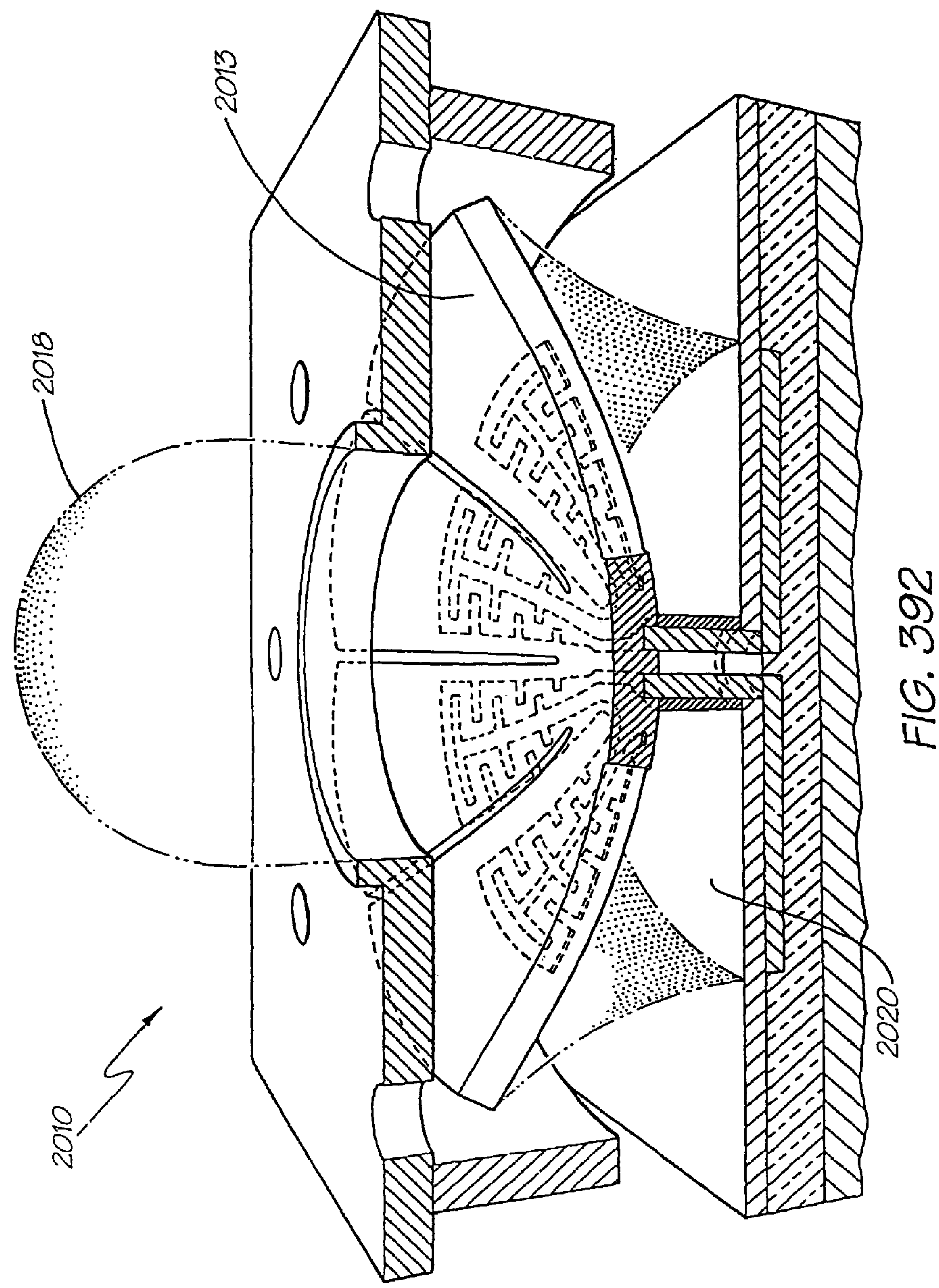
FIG. 392 is a cross-sectional perspective view of a single ink nozzle arrangement constructed in accordance with a preferred embodiment, in its activated state.

An important advantageous feature of a preferred embodiment is that PTFE is normally hydrophobic. In a preferred embodiment the bottom surface of petals 2013 comprises untreated PTFE and is therefore hydrophobic. This results in an air bubble 2020 forming under the surface of the petals. The air bubble contracts on upward movement of petals 2013 as illustrated in FIG. 392 which illustrates a cross-sectional perspective view of the form of the nozzle after activation of the petal heater arrangement.

The top of the petals is treated so as to reduce its hydrophobic nature. This can take many forms, including plasma damaging in an ammonia atmosphere. The top of the petals 2013 is treated so as to generally make it hydrophilic and thereby attract ink into nozzle chamber 2016.

Returning now to FIG. 391, the nozzle chamber 2016 is constructed from a circular rim 2021 of an inert material such as nitride as is the top nozzle plate 2022. The top nozzle plate 2022 can include a series of the small etchant holes 2023 which are provided to allow for the rapid etching of sacrificial material used in the construction of the nozzle chamber 2010. The etchant holes 2023 are large enough to allow the flow of etchant into the nozzle chamber 2016 however, they are small enough so that surface tension effects retain any ink within the nozzle chamber 2016. A series of posts 2024 are further provided for support of the nozzle plate 2022 on a wafer 2025.

The wafer 2025 can comprise a standard silicon wafer on top of which is constructed data drive circuitry which can be constructed in the usual manner such as two level metal CMOS with portions 2026 of one level of metal (aluminium) being used for providing interconnection with the copper circuitry portions 2027.

The arrangement 2010 of FIG. 391 has a number of significant advantages in that, in the petal open position, the nozzle chamber 2016 can experience rapid refill, especially where a slight positive ink pressure is utilised. Further, the petal arrangement provides a degree of fault tolerance in that, if one or more of the petals is non-functional, the remaining petals can operate so as to eject drops of ink on demand.

Figure 393:
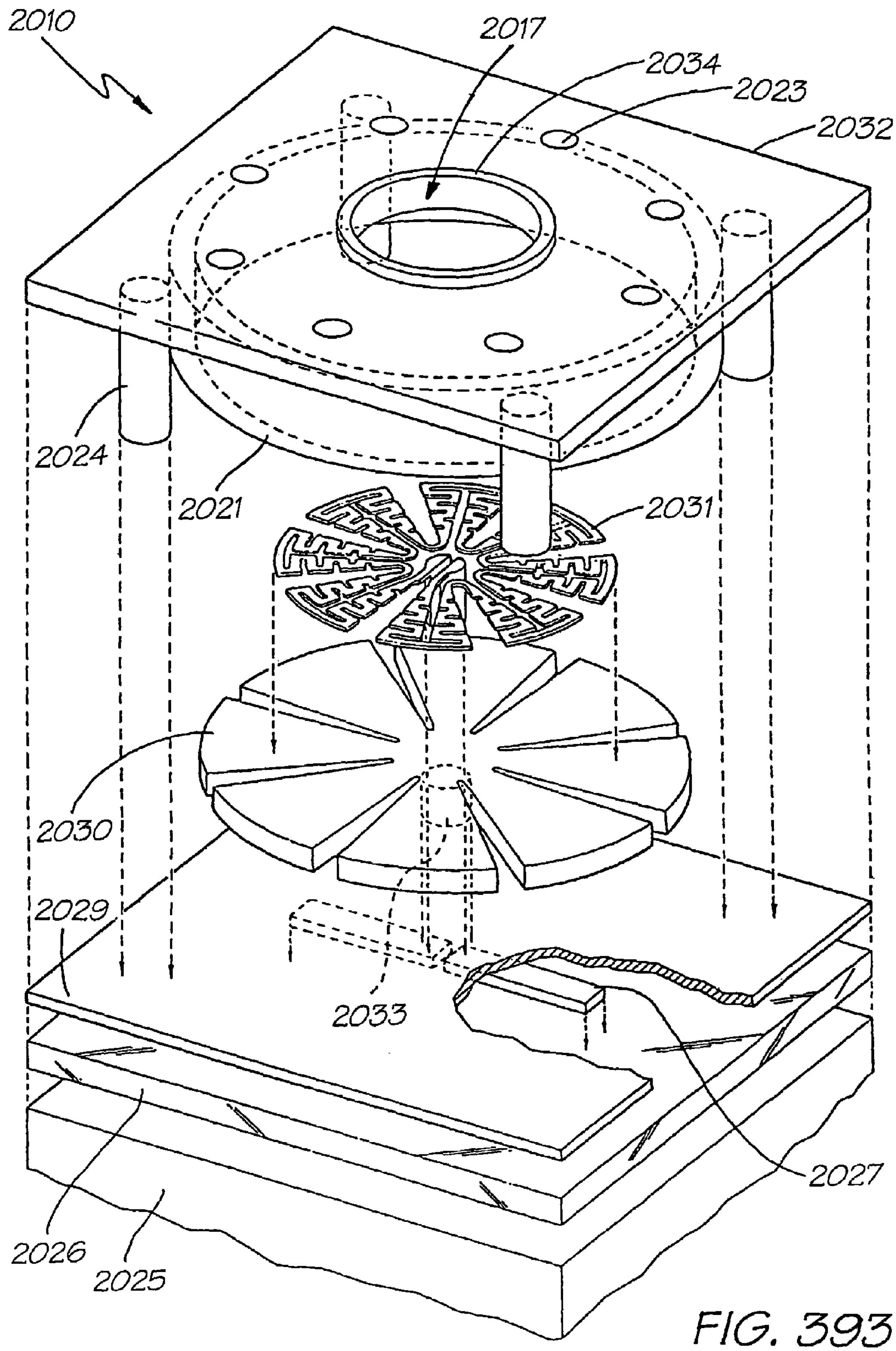
FIG. 393 is an exploded perspective view illustrating the construction of a single ink nozzle in accordance with a preferred embodiment of the present invention.

Turning now to FIG. 393, there is illustrated an exploded perspective of the various layers of a nozzle arrangement 2010. The nozzle arrangement 2010 is constructed on a base wafer 2025 which can comprise a silicon wafer suitably diced in accordance with requirements. On the silicon wafer 2025 is constructed a silicon glass layer which can include the usual CMOS processing steps to construct a two level metal CMOS drive and control circuitry layer. Part of this layer will include portions 2027 which are provided for interconnection with the drive transistors. On top of the CMOS layer 2026, 2027 is constructed a nitride passivation layer 2029 which provides passivation protection for the lower layers during operation and also should an etchant be utilized which would normally dissolve the lower layers. The PTFE layer 2030 really comprises a bottom PTFE layer below a copper metal layer 2031 and a top PTFE layer above it, however, they are shown as one layer in FIG. 393. Effectively, the copper layer 2031 is encased in the PTFE layer 2030 as a result. Finally, a nitride layer 2032 is provided so as to form the rim 2021 of the nozzle chamber and nozzle posts 2024 in addition to the nozzle plate.

The arrangement 2010 can be constructed on a silicon wafer using micro-electro-mechanical systems techniques. The PTFE layer 2030 can be constructed on a sacrificial material base such as glass, wherein a via for stem 2033 of layer 2030 is provided.

The layer 2032 is constructed on a second sacrificial etchant material base so as to form the nitride layer 2032. The sacrificial material is then etched away using a suitable etchant which does not attack the other material layers so as to release the internal calyx structure. To this end, the nozzle plate 2032 includes the aforementioned etchant holes e.g. 2023 so as to speed up the etching process, in addition to the nozzle 2017 and the nozzle rim 2034.

The nozzles 2010 can be formed on a wafer of printheads as required. Further, the printheads can include supply means either in the form of a “through the wafer” ink supply means which uses high density low pressure plasma etching such as that available from Surface Technology Systems or via means of side ink channels attached to the side of the printhead. Further, areas can be provided for the interconnection of circuitry to the wafer in the normal fashion as is normally utilized with MEMS processes.

Figure 394:
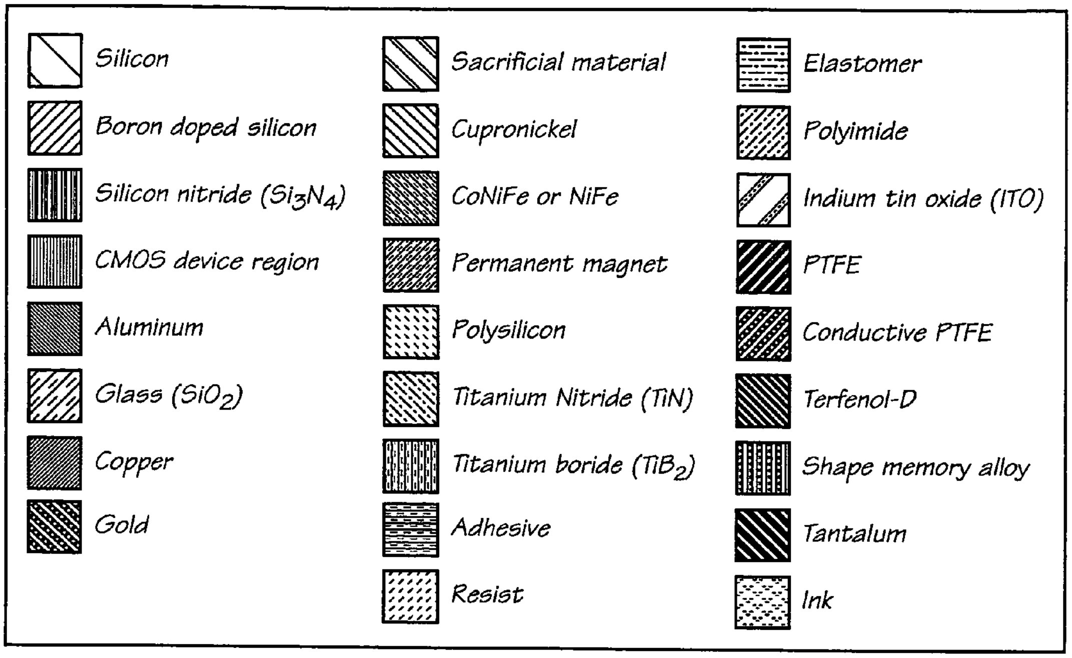
FIG. 394 provides a legend of the materials indicated in FIGS. 395 to 408.
Figure 395:
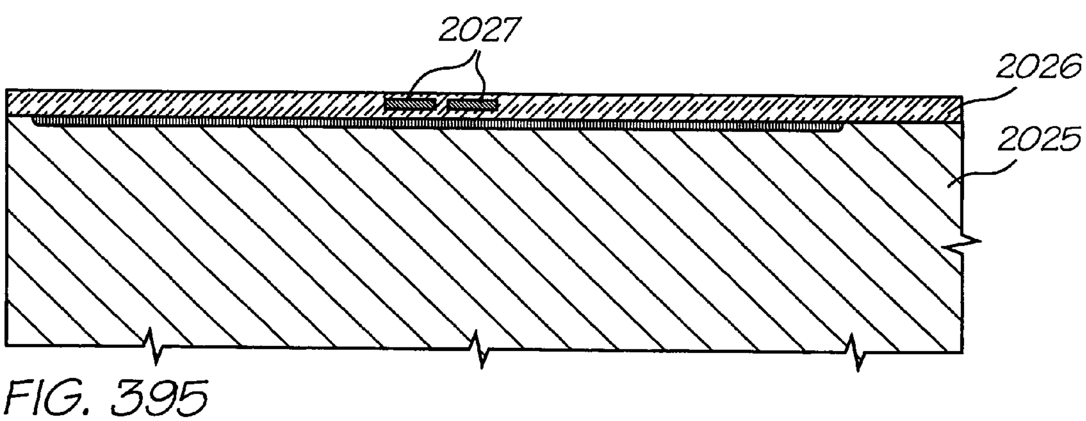
FIG. 395 to FIG. 408 illustrate sectional views of the manufacturing steps in one form of construction of an ink jet printhead nozzle.

One form of detailed manufacturing process which can be used to fabricate monolithic ink jet printheads operating in accordance with the principles taught by the present embodiment can proceed utilizing the following steps:

1. Using a double sided polished wafer 2025, Complete drive transistors, data distribution, and timing circuits using a 0.5 micron, one poly, 2 metal CMOS process 2026. This step is shown in FIG. 395. For clarity, these diagrams may not be to scale, and may not represent a cross section though any single plane of the nozzle. FIG. 394 is a key to representations of various materials in these manufacturing diagrams, and those of other cross referenced ink jet configurations.

Figure 396:
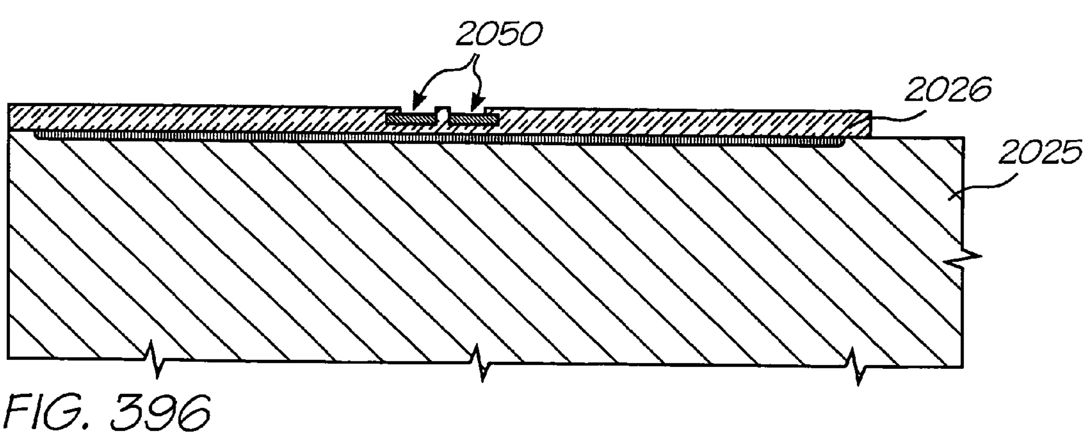

2. Etch through the silicon dioxide layers of the CMOS process down to silicon using mask 1. This mask defines the ink inlet channels and the heater contact vias 2050. This step is shown in FIG. 396.

Figure 397:
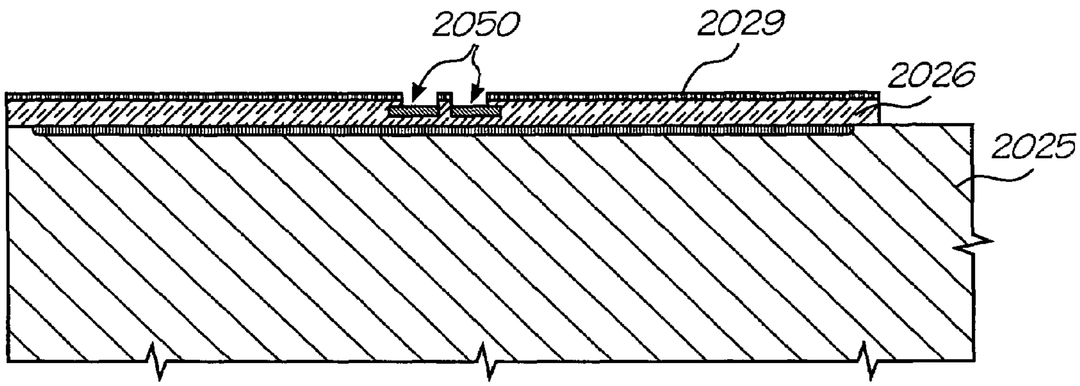

3. Deposit 1 micron of low stress nitride 2029. This acts as a barrier to prevent ink diffusion through the silicon dioxide of the chip surface. This step is shown in FIG. 397.

4. Deposit 3 micron of sacrificial material 2051 (e.g. photosensitive polyimide)

Figure 398:
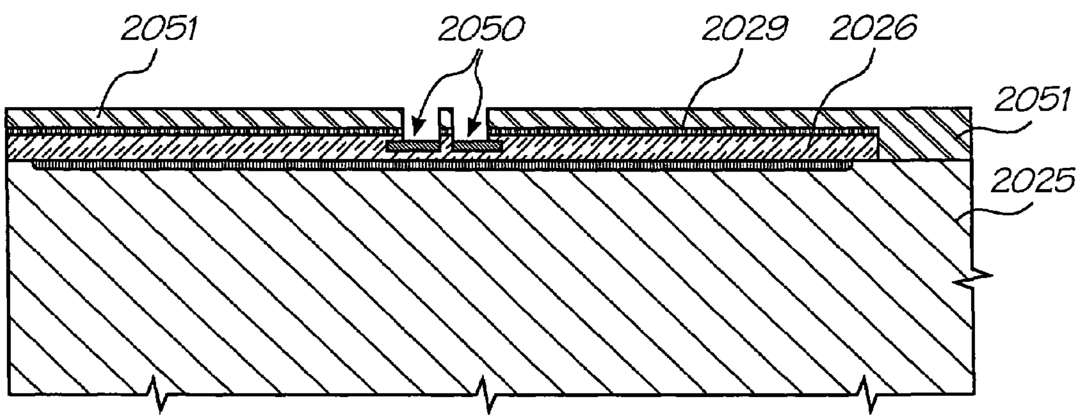

5. Etch the sacrificial layer using mask 2. This mask defines the actuator anchor point This step is shown in FIG. 398.

6. Deposit 0.5 micron of PTFE 2052.

Figure 399:
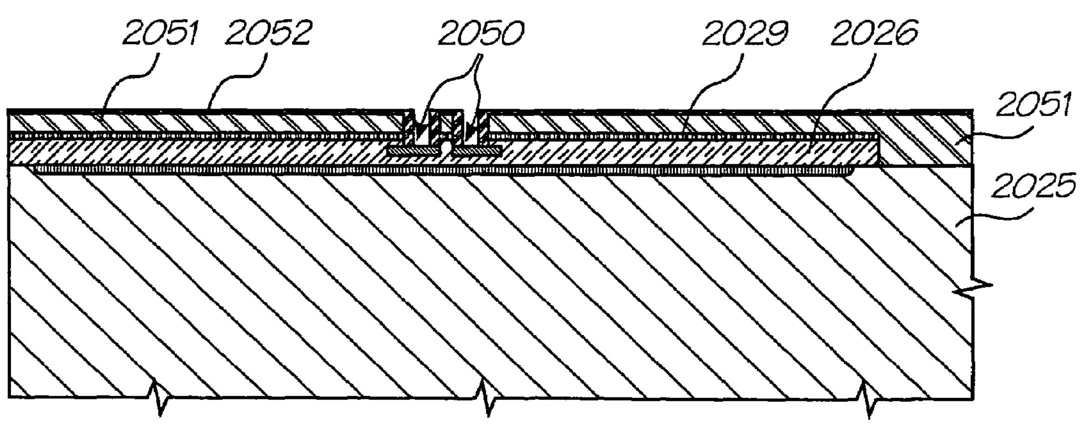

7. Etch the PTFE, nitride, and oxide down to second level metal using mask 3. This mask defines the heater vias. This step is shown in FIG. 399.

8. Deposit 0.5 micron of heater material 2031 with a low Young's modulus, for example aluminum or gold.

Figure 400:
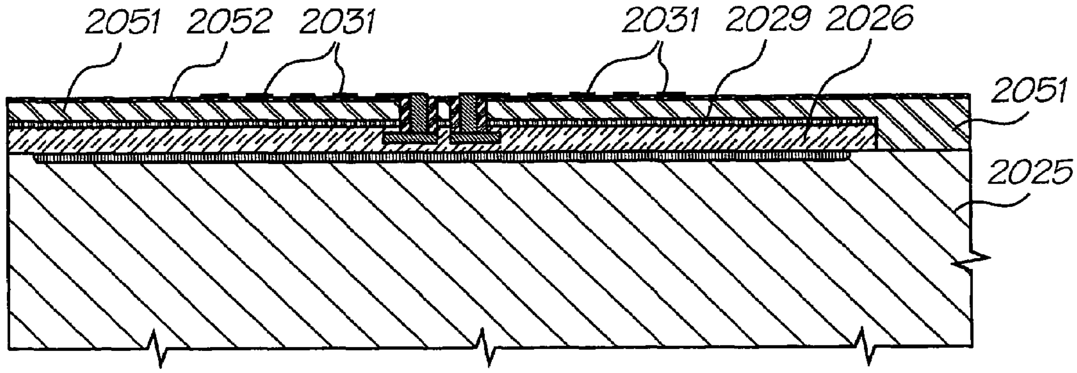

9. Pattern the heater using mask 4. This step is shown in FIG. 400.

10. Wafer probe. All electrical connections are complete at this point, and the chips are not yet separated.

11. Deposit 1.5 microns of PTFE 2053.

Figure 401:
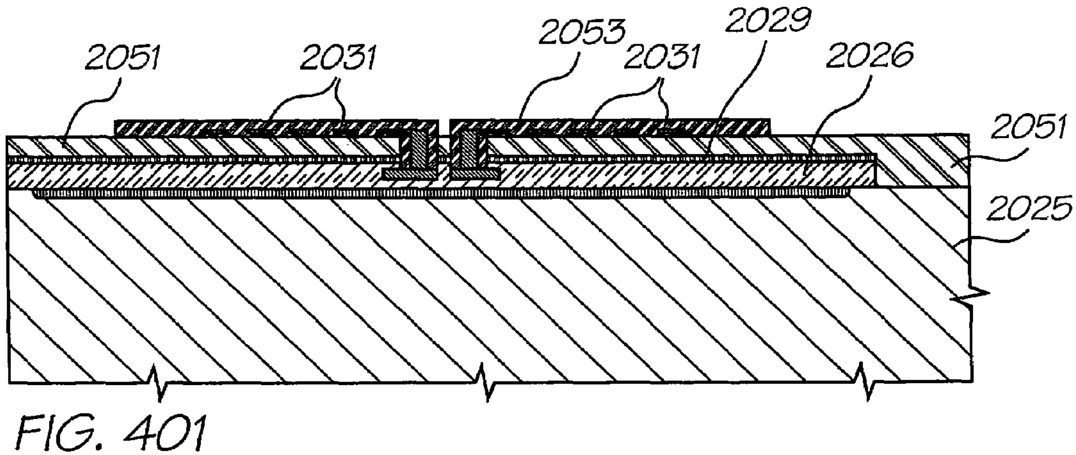

12. Etch the PTFE down to the sacrificial layer using mask 5. This mask defines the actuator petals. This step is shown in FIG. 401.

13. Plasma process the PTFE to make the top surface hydrophilic.

14. Deposit 6 microns of sacrificial material 2054.

15. Etch the sacrificial material to a depth of 5 microns using mask 6. This mask defines the suspended walls 2021 of the nozzle chamber.

Figure 402:
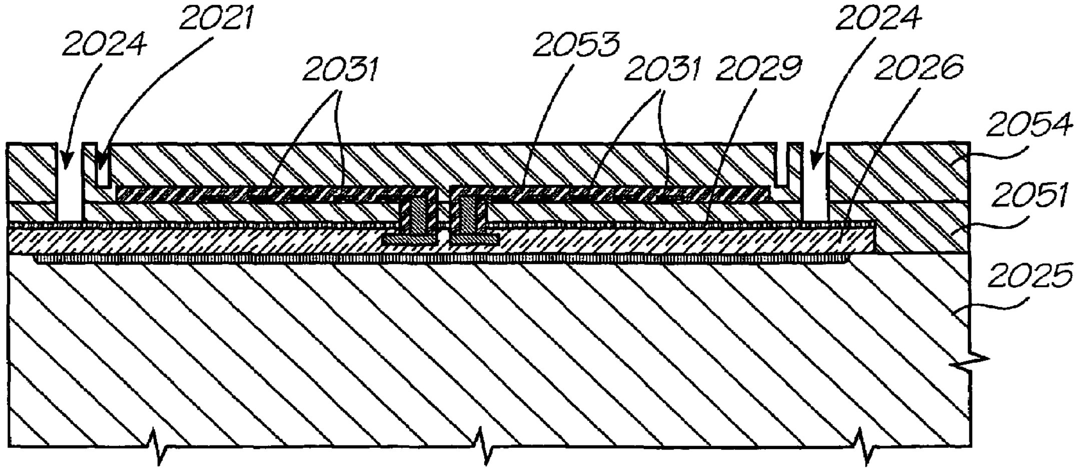

16. Etch the sacrificial material down to nitride using mask 7. This mask defines the nozzle plate supporting posts 2024 and the walls surrounding each ink color (not shown). This step is shown in FIG. 402.

Figure 403:
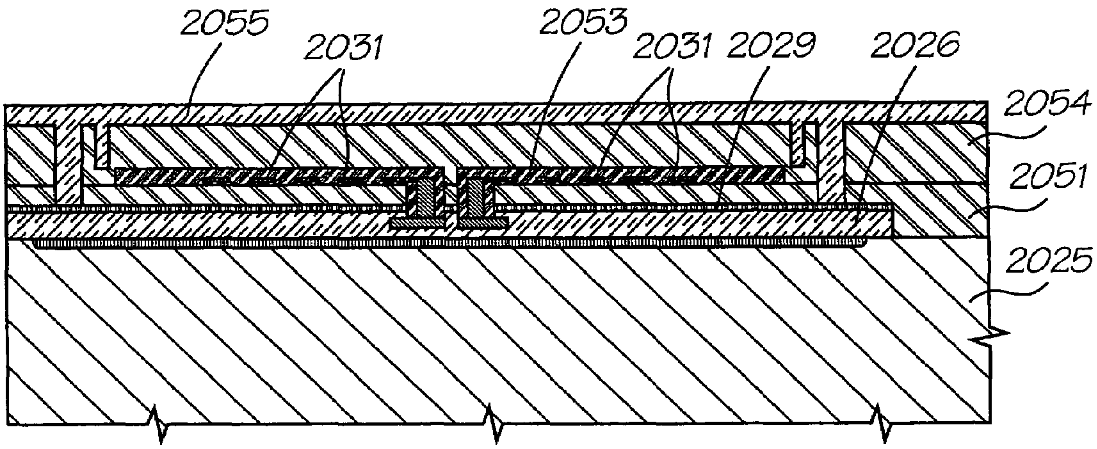

17. Deposit 3 microns of PECVD glass 2055. This step is shown in FIG. 403.

Figure 404:
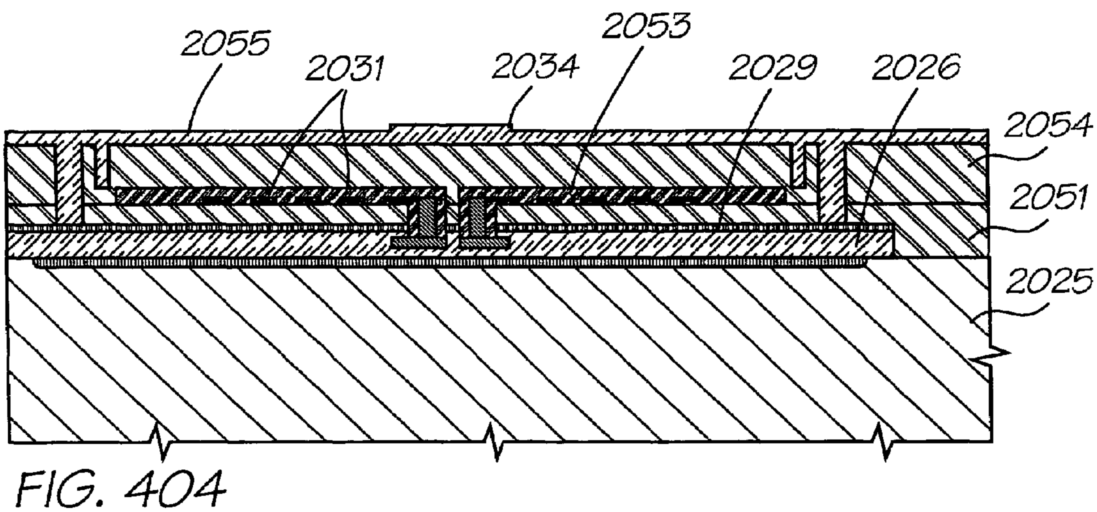

18. Etch to a depth of 1 micron using mask 8. This mask defines the nozzle rim 2034. This step is shown in FIG. 404.

Figure 405:
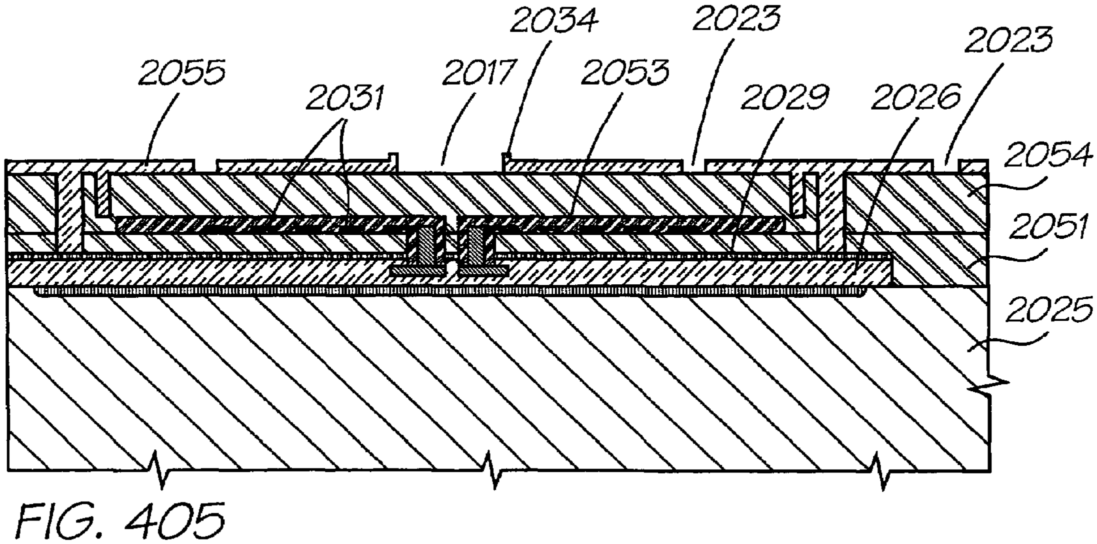

19. Etch down to the sacrificial layer using mask 9. This mask defines the nozzle 2017 and the sacrificial etch access holes 2023. This step is shown in FIG. 405.

Figure 406:
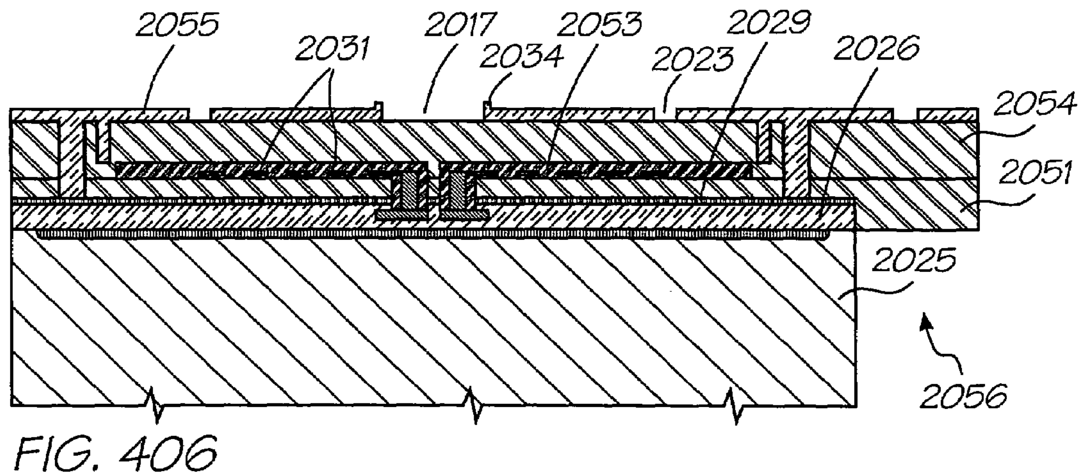

20. Back-etch completely through the silicon wafer (with, for example, an ASE Advanced Silicon Etcher from Surface Technology Systems) using mask 10. This mask defines the ink inlets 2056 which are etched through the wafer. The wafer is also diced by this etch. This step is shown in FIG. 406.

Figure 407:
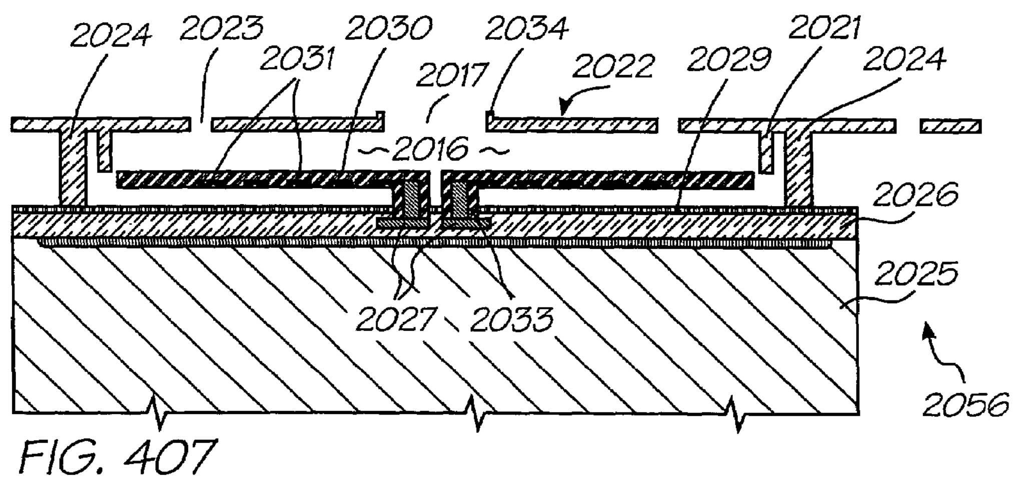

21. Etch the sacrificial material. The nozzle chambers are cleared, the actuators freed, and the chips are separated by this etch This step is shown in FIG. 407.

22. Mount the printheads in their packaging, which may be a molded plastic former incorporating ink channels which supply the appropriate color ink to the ink inlets at the back of the wafer.

23. Connect the printheads to their interconnect systems. For a low profile connection with minimum disruption of airflow, TAB may be used. Wire bonding may also be used if the printer is to be operated with sufficient clearance to the paper.

24. Hydrophobize the front surface of the printheads.

Figure 408:
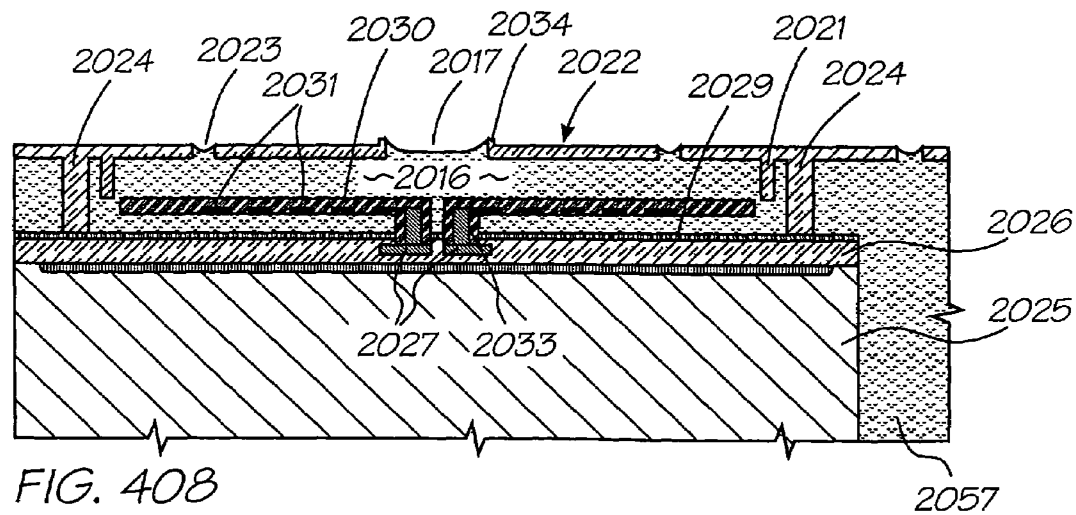

25. Fill the completed printheads with ink 2057 and test them. A filled nozzle is shown in FIG. 408.

IJ21

Figure 409:
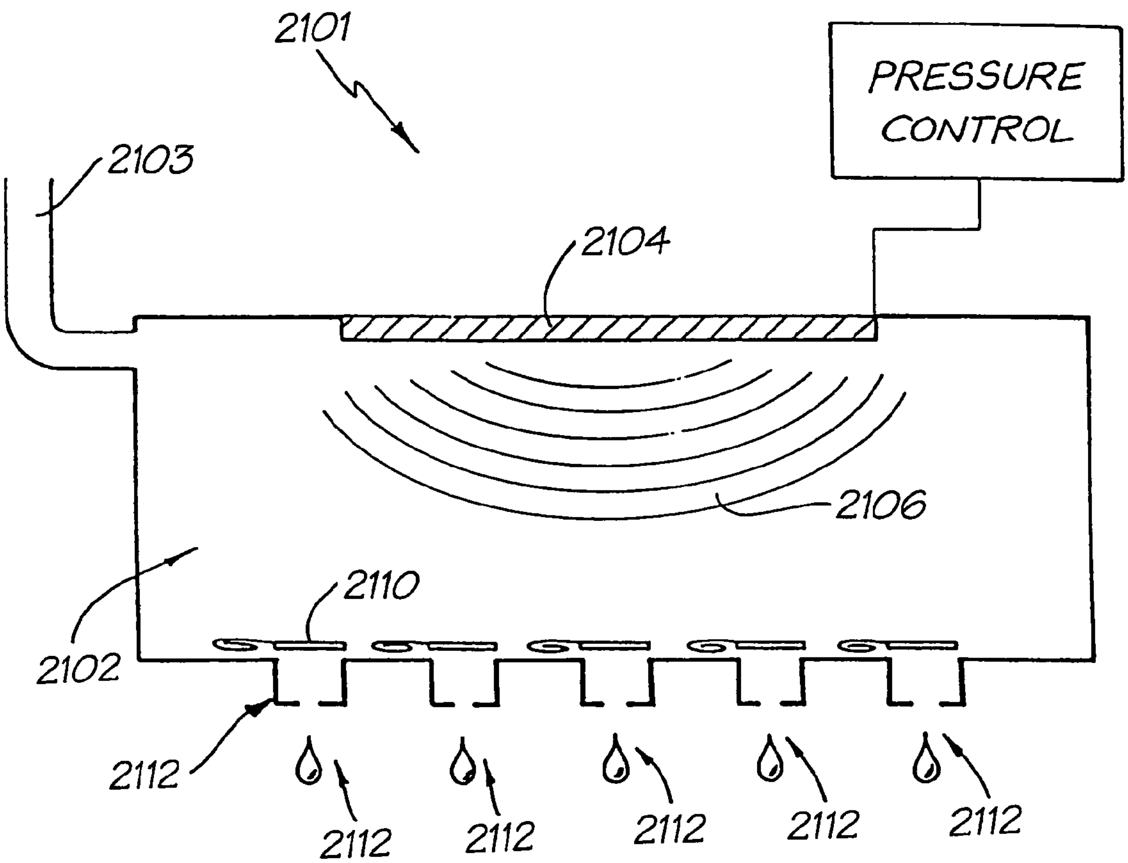
FIG. 409 is a schematic cross-sectional view illustrating an ink jet printing mechanism constructed in accordance with a preferred embodiment.

Turning initially to FIG. 409, in a preferred embodiment of a printing mechanism 2101, there is provided an ink reservoir 2102 which is supplied from an ink supply conduit 2103. A piezoelectric actuator 2104 is driven in a substantially sine wave form so as to set up pressure waves 2106 within the reservoir 2102. The ultrasonic transducer 2104 typically comprises a piezoelectric transducer positioned within the reservoir 2102. The transducer 2104 oscillates the ink pressure within the reservoir 2102 at approximately 100 KHz. The pressure is sufficient to eject the ink drops from each of a number of nozzle arrangements 2112 when required. Each nozzle arrangement 2112 is provided with a shutter 2110 which is opened and closed on demand.

Figure 410:
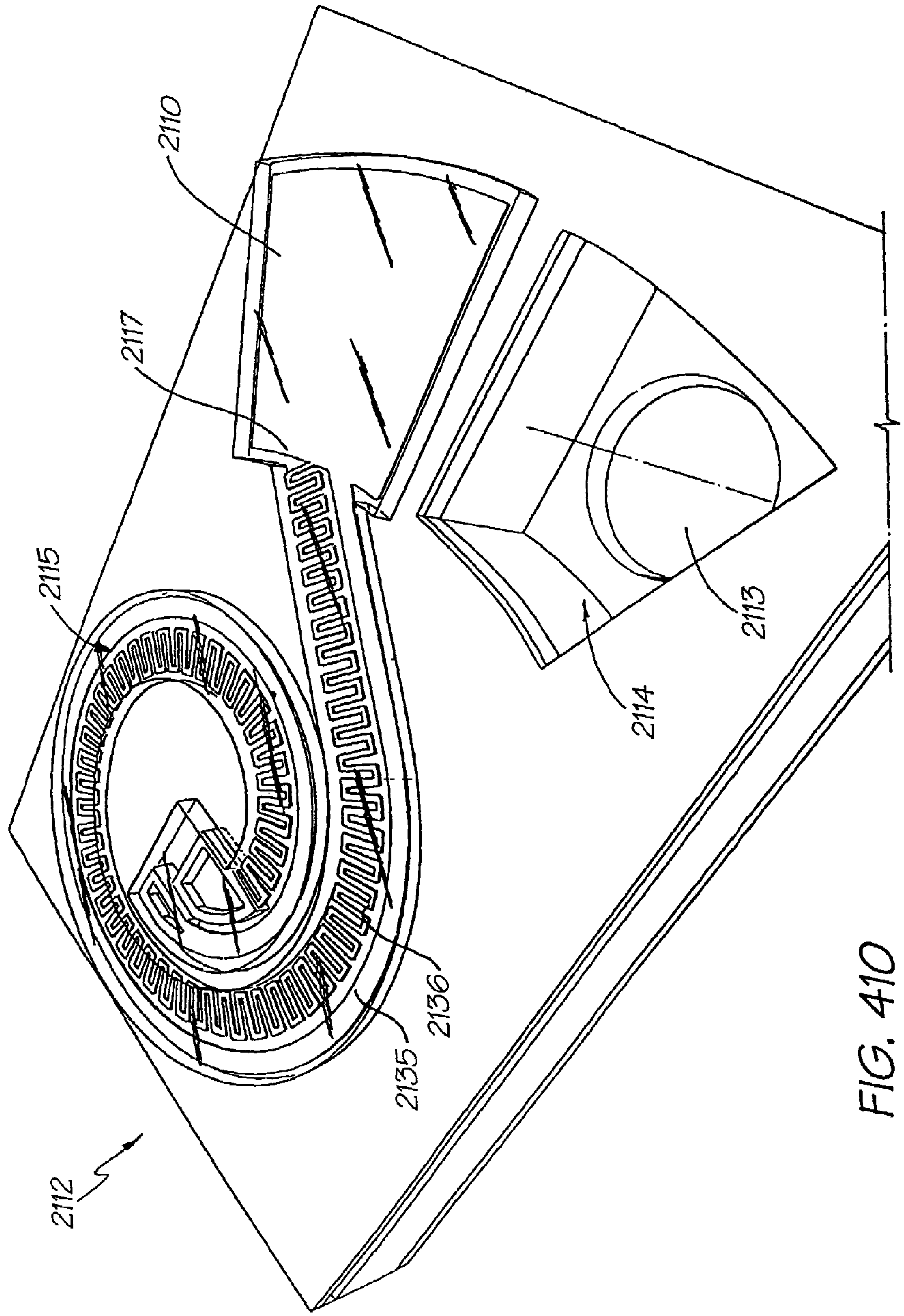
FIG. 410 is a perspective view of a single nozzle arrangement constructed in accordance with a preferred embodiment.

Turning now to FIG. 410, there is illustrated the nozzle arrangement 2112 in further detail.

Each nozzle arrangement 2112 includes an ink ejection port 2113 for the output of ink and a nozzle chamber 2114 which is normally filled with ink. Further, each nozzle arrangement 2112 is provided with a shutter 2110 which is designed to open and close the nozzle chamber 2114 on demand. The shutter 2110 is actuated by a coiled thermal actuator 2115.

The coiled actuator 2115 is constructed from laminated conductors of either differing resistivities, different cross-sectional areas, different indices of thermal expansion, different thermal conductivities to the ink, different length, or some combination thereof A coiled radius of the actuator 2115 changes when a current is passed through the conductors, as one side of the coiled actuator 2115 expands differently to the other. One method, as illustrated in FIG. 410, can be to utilize two current paths 2135, 2136, which are made of electrically conductive material. The current paths 2135, 2136 are connected at the shutter end 2117 of the thermal actuator 2115. One current path 2136 is etched in a serpentine manner to increase its resistance. When a current is passed through paths 2135, 2136, the side of the coiled actuator 2115 that comprises the serpentine path expands more than the side that comprises the paths 2135. This results in the actuator 2115 uncoiling.

The thermal actuator 2115 controls the position of the shutter 2110 so that it can cover none, all or part of the nozzle chamber 2114. If the shutter 2110 does not cover any of the nozzle chamber 2114 then the oscillating ink pressure will be transmitted to the nozzle chamber 2114 and the ink will be ejected out of the ejection port 2113. When the shutter 2110 covers the ink chamber 2114, then the oscillating ink pressure of the chamber is significantly attenuated at the ejection port 2113. The ink pressure within the chamber 2114 will not be entirely stopped, due to leakage around the shutter 2110 when in a closed position and fixing of the shutter 2110 under varying pressures.

The shutter 2110 may also be driven to be partly across the nozzle chamber 2114, resulting in a partial attenuation of the ink pressure variation. This can be used to vary the volume of the ejected drop. This can be utilized to implement a degree of continuation tone operation of the printing mechanism 2101 (FIG. 409), to regulate the drop volume, or both. The shutter is normally shut, and is opened on demand.

The operation of the ink jet nozzle arrangement 2112 will now be explained in further detail.

Figure 411:
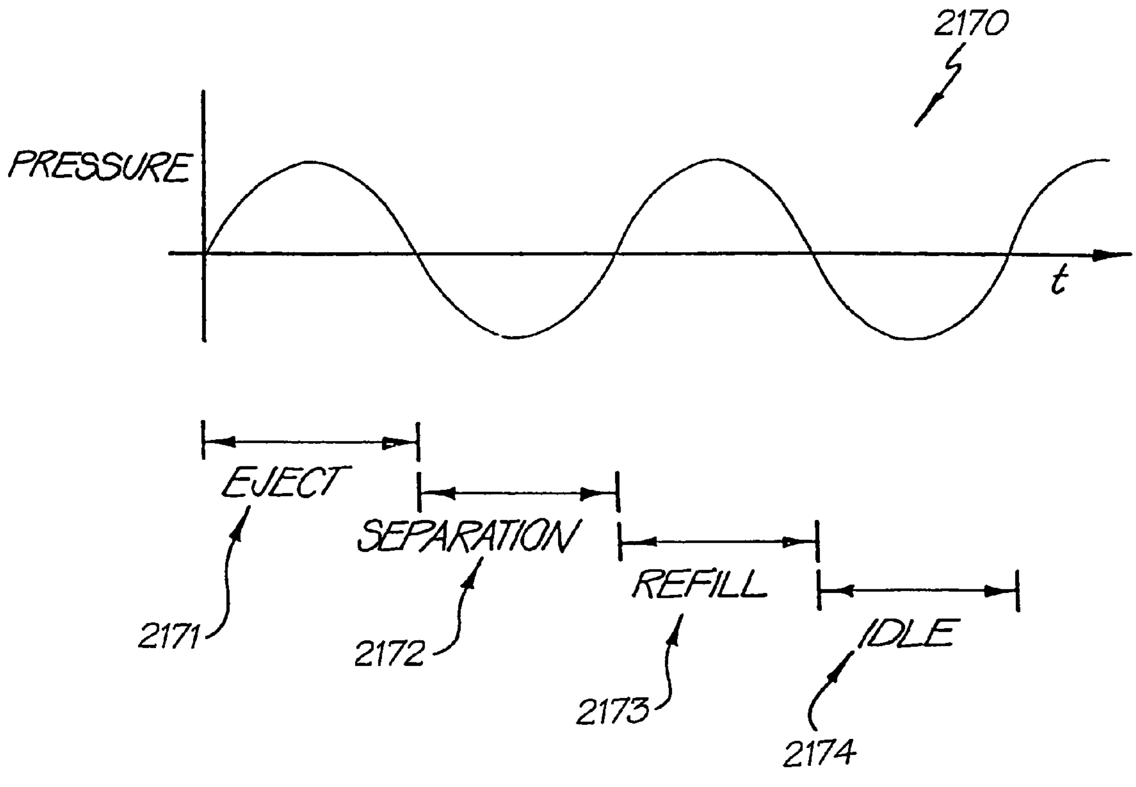
FIG. 411 is a timing diagram illustrating the various phases of the ink jet printing mechanism.

Referring to FIG. 411, the piezoelectric device is driven in a sinusoidal manner which in turn causes a sinusoidal variation 2170 in the pressure within the ink reservoir 2102 (FIG. 409) with respect to time.

The operation of the printing mechanism 2101 utilizes four phases being an ink ejection phase 2171, an ink separation phase 2172, an ink refill phase 2173 and an idle phase 2174.

Figure 412:
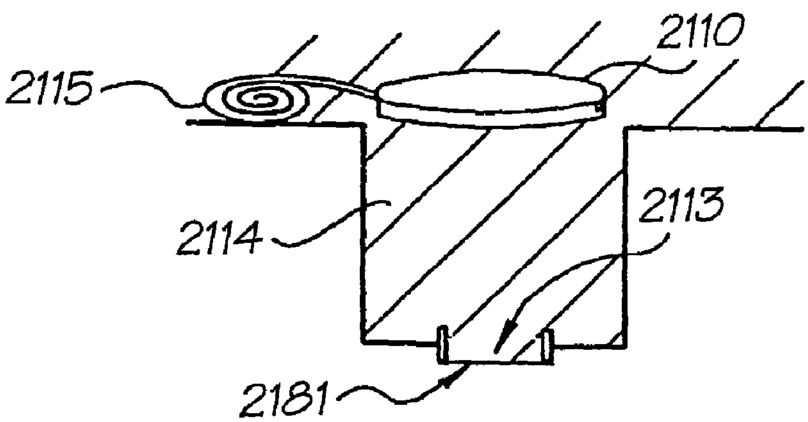
FIG. 412 is a cross-sectional schematic diagram illustrating the nozzle arrangement in its idle phase.

Referring now to FIG. 412, before the ink ejection phase 2171 of FIG. 411, the shutter 2110 is located over the ink chamber 2114 and the ink forms a meniscus 2181 over the ejection port 2113.

Figure 413:
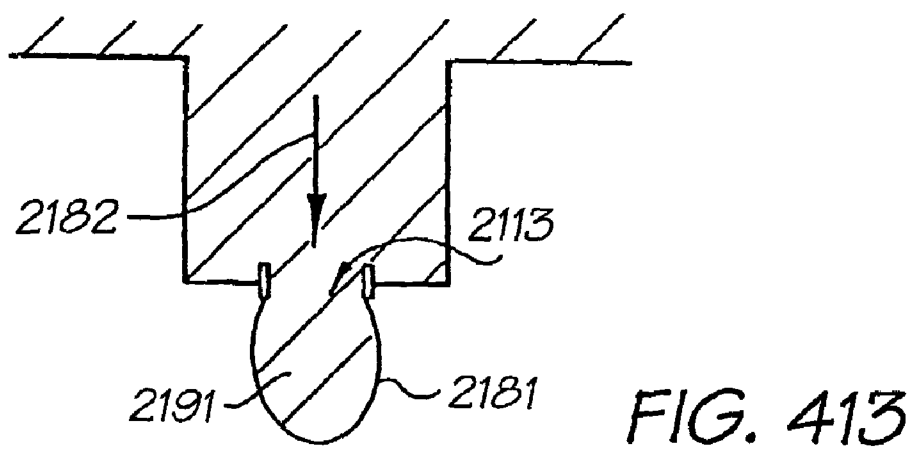
FIG. 413 is a cross-sectional schematic diagram illustrating the nozzle arrangement in its ejection phase.
Figure 414:
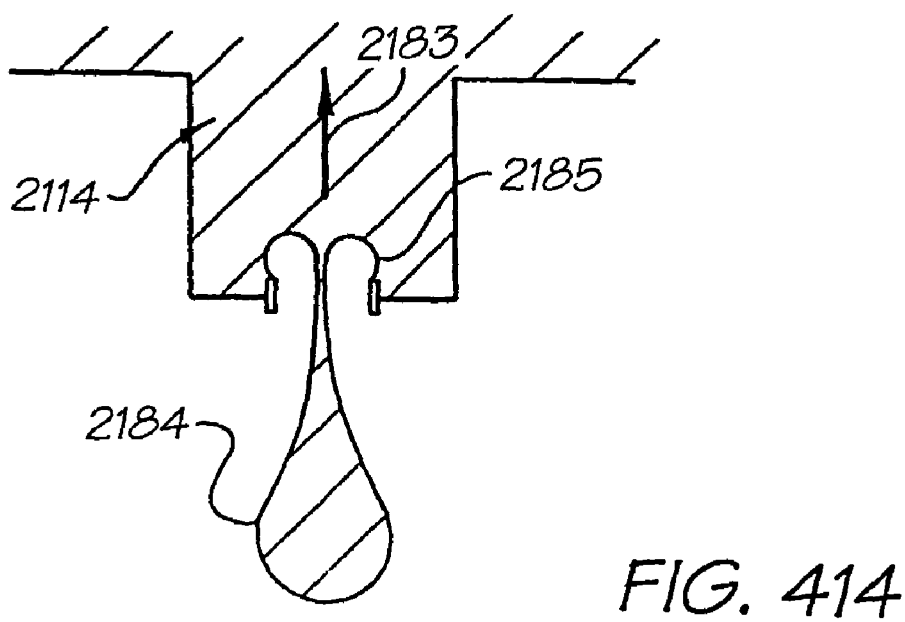
FIG. 414 is a cross-sectional schematic diagram of the nozzle arrangement in its separation phase.

At the start of the ejection phase 2171 the actuator coil is activated and the shutter 2110 moves away from its position over the chamber 2114 as illustrated in FIG. 413. As the chamber undergoes positive pressure, the meniscus 2181 grows and the volume of ink 2191 outside the ejection port 2113 increases due to an ink flow 2182. Subsequently, the separation phase 2172 of FIG. 411 is entered. In this phase, the pressure within the chamber 2114 becomes less than the ambient pressure. This causes a back flow 2183 (FIG. 414) within the chamber 2114 and results in the separation of a body of ink 2184 from the ejection port 2113. The meniscus 2185 moves up into the ink chamber 2114.

Figure 415:
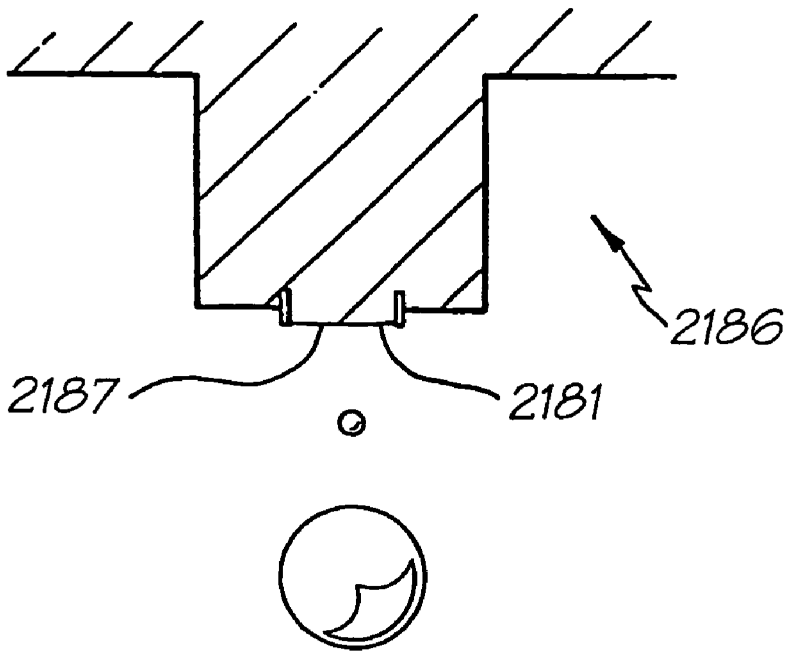
FIG. 415 is a schematic cross-sectional diagram illustrating the nozzle arrangement in its refilling phase.
Figure 416:
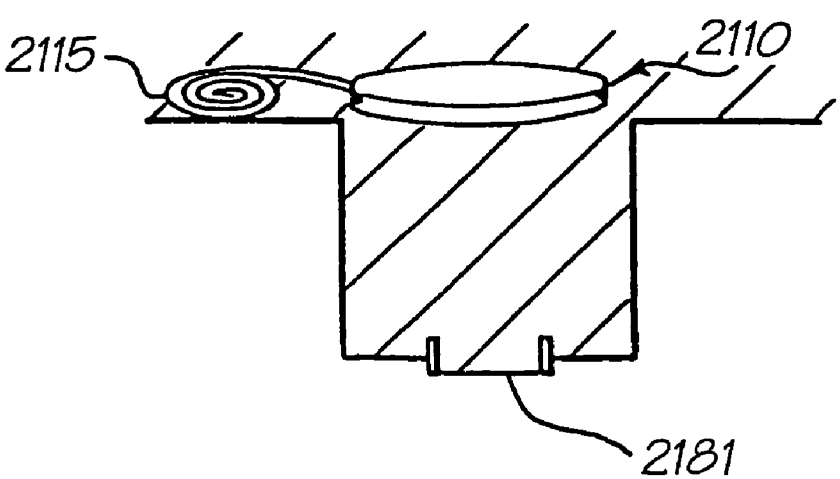
FIG. 416 is a cross-sectional schematic diagram illustrating the nozzle arrangement after returning to its idle phase.

Subsequently, the ink chamber 2114 enters the refill phase 2173 of FIG. 411 wherein positive pressure is again experienced. This results in the condition indicated by 2186 in FIG. 415 wherein the meniscus 2181 is positioned at 2187 to return to that of FIG. 412. Subsequently, as illustrated in FIG. 416, the actuator is turned off and the shutter 2110 returns to its original position ready for reactivation (idle phase 2174 of FIG. 411).

The cyclic operation as illustrated in FIG. 411 has a number of advantages. In particular, the level and duration of each sinusoidal cycle can be closely controlled by means of controlling the signal to the piezo electric actuator 2104 (FIG. 409). Of course, a number of further variations are possible. For example, as each drop ejection takes two ink pressure cycles, half the nozzle arrangements 2112 of FIG. 409 could be ejected in one phase and the other half of the nozzle arrangements 2112 could be ejected during a second phase. This allows for minimization of the pressure variations which would occur if a large number of nozzle arrangements were actuated simultaneously.

Further, the amplitude of the driving signal to the actuator 2104 can be altered in response to the viscosity of the ink which will typically be effected by such factors as temperature and the number of drops which are to be ejected in the current cycle.

Construction and Fabrication

Each nozzle arrangement 2112 further includes drive circuitry which activates the actuator coil when the shutter 2110 is to be opened. The nozzle chamber 2114 should be carefully dimensioned and a radius of the ejection port 2113 carefully selected to control the drop velocity and drop size. Further, the nozzle chamber 2114 of FIG. 410 should be wide enough so that viscous drag from the chamber walls dots not significantly increase the force required from the ultrasonic oscillator.

Preferably, the shutter 2110 is of a disk form which covers the nozzle chamber 2114. The disk preferably has a honeycomb-like structure to maximize strength while minimizing its inertial mass.

Preferably, all surfaces are coated with a passivation layer so as to reduce the possibility of corrosion from the ink flow. A suitable passivation layer can include silicon nitride ($Si_3N_4$), diamond like carbon (DLC), or any other chemically inert, highly impermeable layer. The passivation layer is especially important for device lifetime, as the active device will be immersed in ink.

Fabrication Sequence

Figure 417:
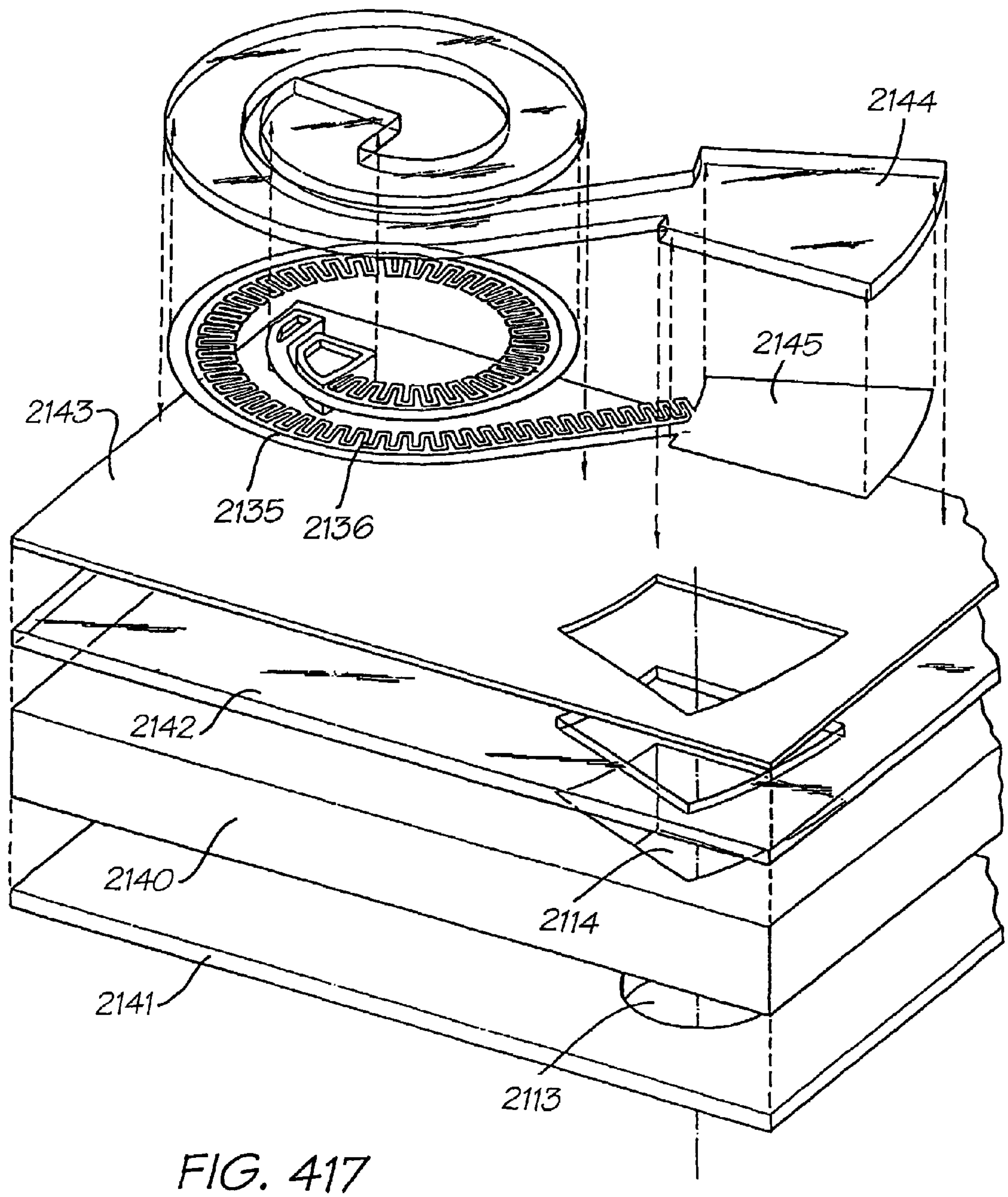

FIG. 417 is an exploded perspective view illustrating the construction of a single ink jet nozzle arrangement in accordance with a preferred embodiment.

1) Start with a single crystal silicon wafer 2140, which has a buried epitaxial layer 2141 of silicon which is heavily doped with boron. The boron should be doped to preferably $10^{20}$ atoms per $cm^3$ of boron or more, and be approximately 2 micron thick The lightly doped silicon epitaxial layer on top of the boron doped layer should be approximately 8 micron thick, and be doped in a manner suitable for the active semiconductor device technology chosen. This is hereinafter called the "Sopij" wafer. The wafer diameter should be the same as the ink channel wafer.

2) Fabricate the drive transistors and data distribution circuitry according to the process chosen in the CMOS layer 2142, up until the oxide extends over second level metal.

3) Planarize the wafer using Chemical Mechanical Planarization (CMP).

4) Plasma etch the nozzle chamber, stopping at the boron doped epitaxial silicon layer. This etch will be through around 8 micron of silicon. The etch should be highly anisotropic, with near vertical sidewalls. The etch stop determination can be the detection of boron in the exhaust gases. This step also etches the edge of printhead chips down to the boron layer 2141, for later separation.

5) Conformally deposit 0.2 microns of high density $Si_3N_4$ 2143. This forms a corrosion barrier, so should be free of pinholes and be impermeable to OH ions.

6) Deposit a thick sacrificial layer. This layer should entirely fill the nozzle chambers 2114, and coat the entire wafer to an added thickness of 2 microns. The sacrificial layer may be $SiO_2$, for example, spin or glass (SOG).

7) Mask and etch the sacrificial layer using the coil post mask.

8) Deposit 0.2 micron of silicon nitride ($Si_3N_4$).

9) Mask and etch the $Si_3N_4$ layer using the coil electric contacts mask, a first layer of PTFE layer 2144 using the coil mask.

10) Deposit 4 micron of nichrome alloy (NiCr).

11) Deposit the copper conductive layer 2145 and etch using the conductive layer mask.

12) Deposit a second layer of PTFE using the coil mask.

13) Deposit 0.2 micron of silicon nitride ($Si_3N_4$) (not shown).

14) Mask and etch the $Si_3N_4$, layer using the spring passivation and bond pad mask.

15) Permanently bond the wafer onto a pre-fabricated ink channel wafer. The active side of the Sopij wafer faces the ink channel wafer.

16) Etch the Sopij wafer to entirely remove the backside silicon to the level of the boron doped epitaxial layer. This etch can be a batch wet etch in ethylene-diamine pyrocatechol (EPD).

17) Mask the ejection ports 2113 from the underside of the Sopij wafer. This mask also includes the chip edges.

18) Etch through the boron doped silicon layer 2141. This etch should also etch fairly deeply into the sacrificial material in the nozzle chambers 2114 to reduce time required to remove the sacrificial layer.

19) Completely etch the sacrificial material. If this material is $SiO_2$, then an HF etch can be used. Access of the HF to the sacrificial layer material is through the ejection port 2113, and simultaneously through an ink channel in the chip.

20) Separate the chips from the backing plate. The two wafers have already been etched through, so the printheads do not need to be diced.

21) TAB bond the good chips.

22) Perform final testing on the TAB bonded printheads.

One alternative form of detailed manufacturing process which can be used to fabricate monolithic ink jet printheads operating in accordance with the principles taught by the present embodiment can proceed utilizing the following steps:

1. Using a double-sided polished wafer 2150 deposit 3 microns of epitaxial silicon 2141 heavily doped with boron.

2. Deposit 10 microns of epitaxial silicon 2140, either p-type or n-type, depending upon the CMOS process used.

Figure 419:
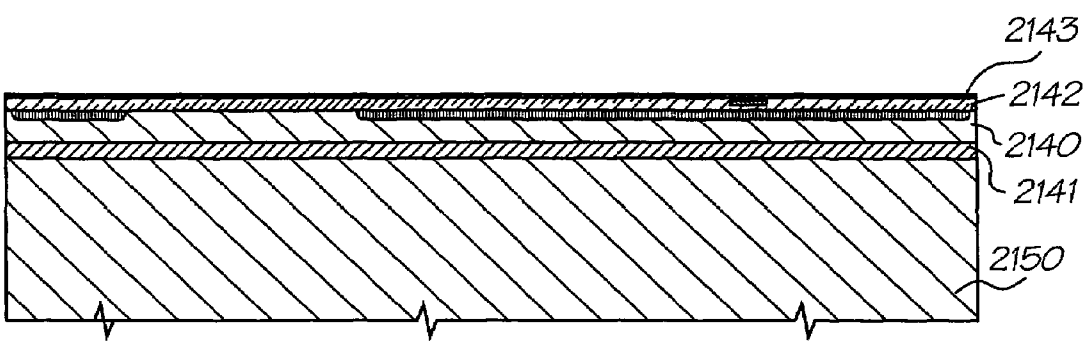

3. Complete drive transistors, data distribution, and timing circuits using a 0.5 micron, one poly, 2 metal CMOS process 2142. The wafer is passivated with 0.1 microns of silicon nitride 2143. This step is shown in FIG. 419. For clarity, these diagrams may not be to scale, and may not represent a cross section though any single plane of the nozzle arrangement 2112. FIG. 418 is a key to representations of various materials in these manufacturing diagrams, and those of other cross referenced ink jet configurations.

4. Etch the CMOS oxide layers down to silicon using Mask 1. This mask defines the nozzle chamber 2114 below the shutter 2110, and the edges of the printhead chips.

Figure 420:
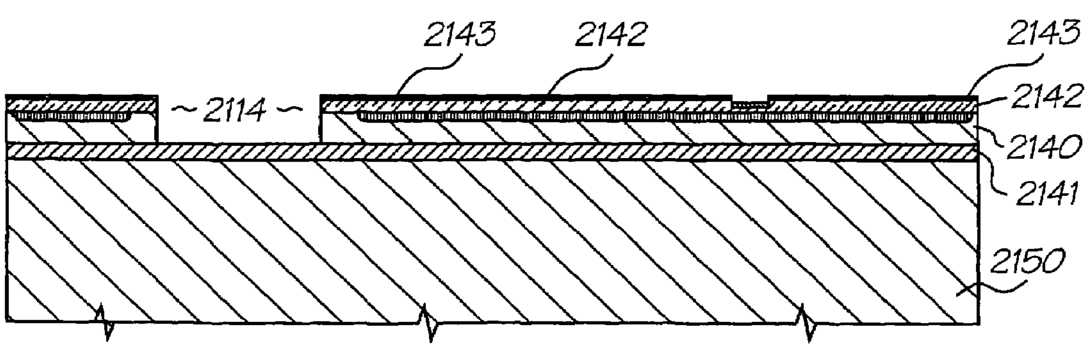

5. Plasma etch the silicon down to the boron doped buried layer 2141, using oxide from step 4 as a mask. This step is shown in FIG. 420.

6. Deposit 6 microns of sacrificial material 2151 (e.g. aluminum or photosensitive polyimide)

Figure 421:
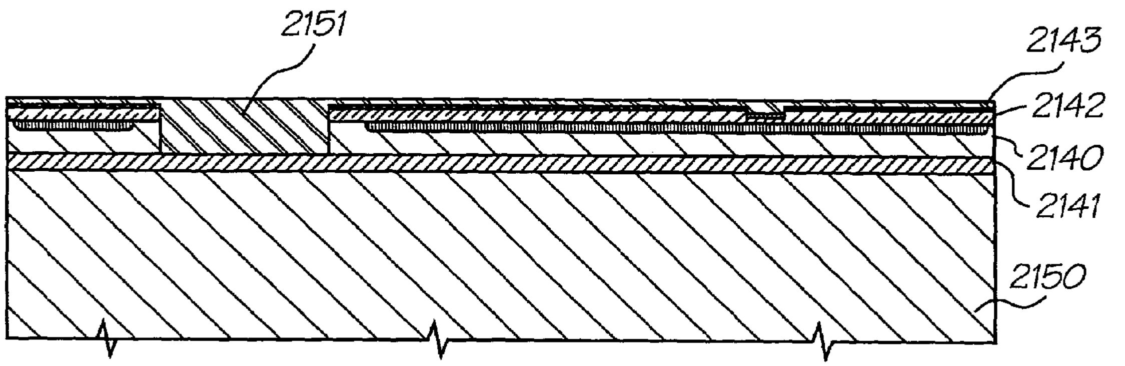

7. Planarize the sacrificial layer 2151 to a thickness of 1 micron over nitride 2143. This step is shown in FIG. 421.

Figure 422:
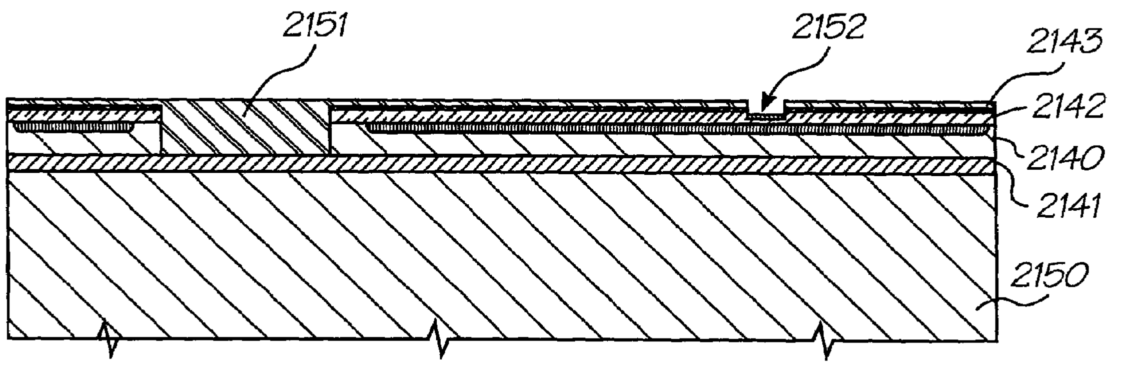

8. Etch the sacrificial layer 2151 using Mask 2. This mask defines the actuator anchor point 2152. This step is shown in FIG. 422.

9. Deposit 1 micron of PTFE 2144.

Figure 423:
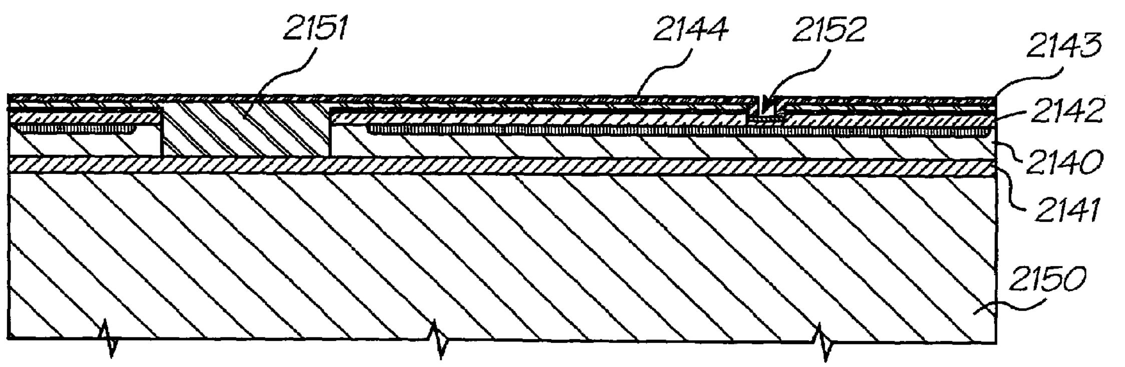

10. Etch the PTFE, nitride, and oxide down to second level metal using Mask 3. This mask defines the heater vias. This step is shown in FIG. 423.

11. Deposit 1 micron of a conductor 2145 with a low Young's modulus, for example aluminum or gold.

Figure 424:
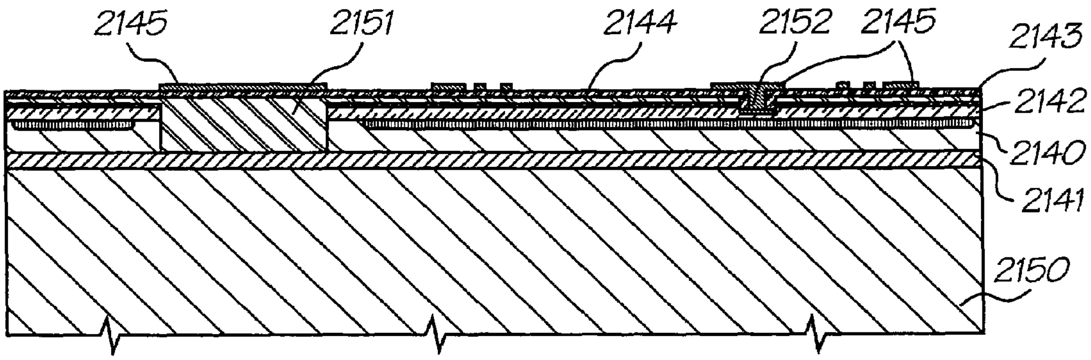

12. Pattern the conductor using Mask 4. This step is shown in FIG. 424.

13. Deposit 1 micron of PTFE.

Figure 425:
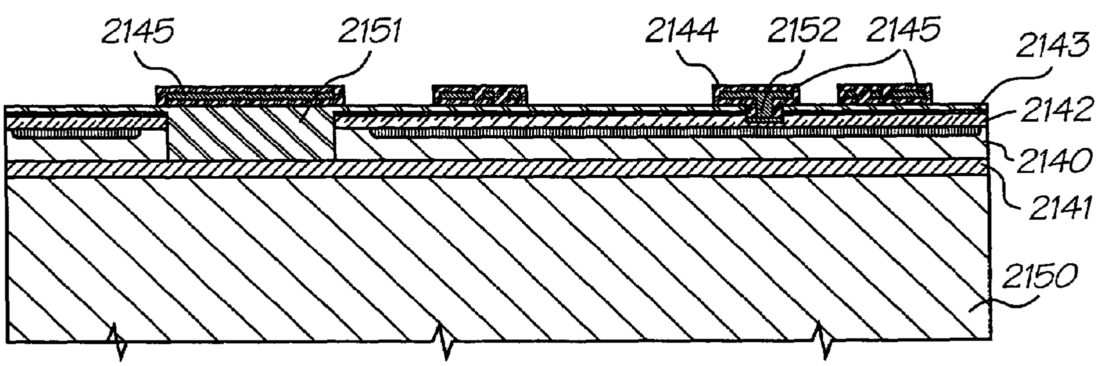

14. Etch the PTFE down to the sacrificial layer using Mask 5. This mask defines the actuator 2115 and shutter 2110 (FIG. 410). This step is shown in FIG. 425.

15. Wafer probe. All electrical connections are complete at this point, bond pads are accessible, and the chips are not yet separated.

Figure 426:
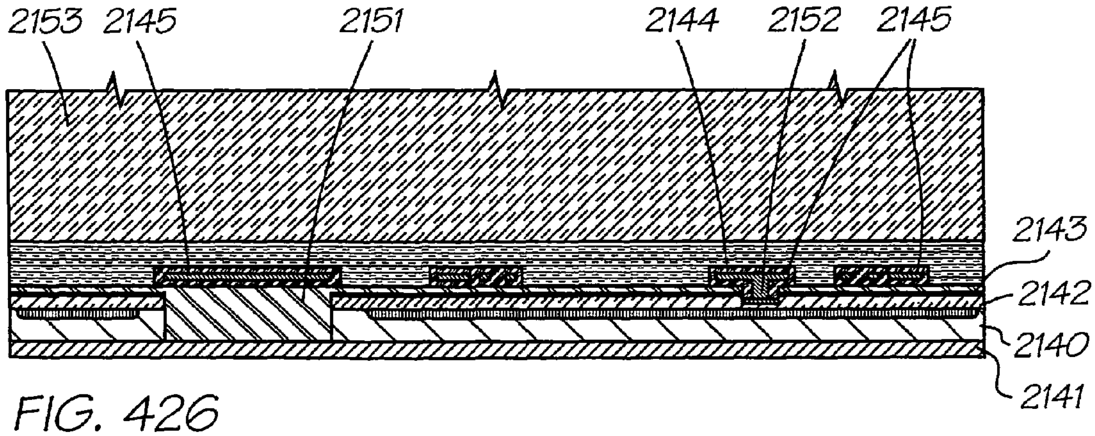

16. Mount the wafer on a glass blank 2153 and back-etch the wafer using KOH with no mask. This etch thins the wafer and stops at the buried boron doped silicon layer 2141. This step is shown in FIG. 426.

Figure 427:
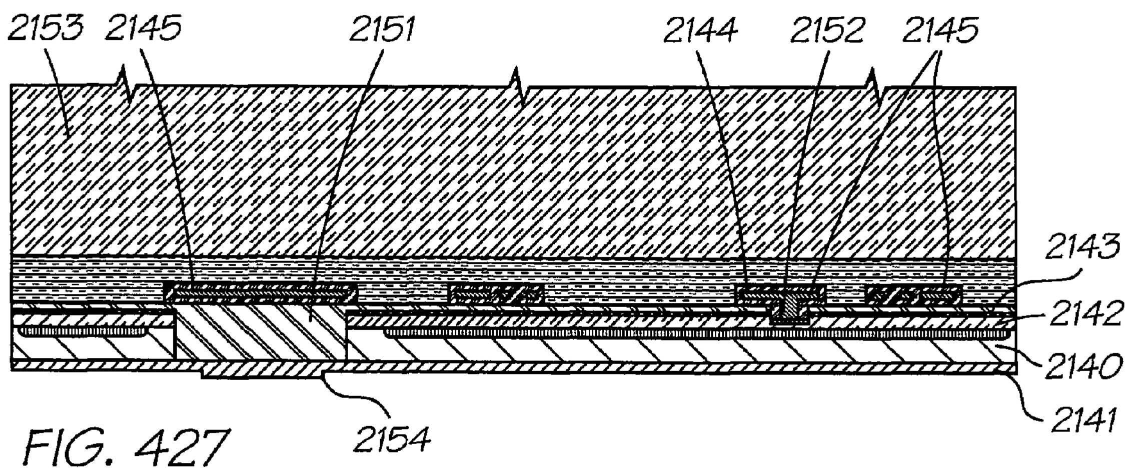

17. Plasma back-etch the boron doped silicon layer 2141 to a depth of (approx.) 1 micron using Mask 6. This mask defines the nozzle rim 2154. This step is shown in FIG. 427.

Figure 428:
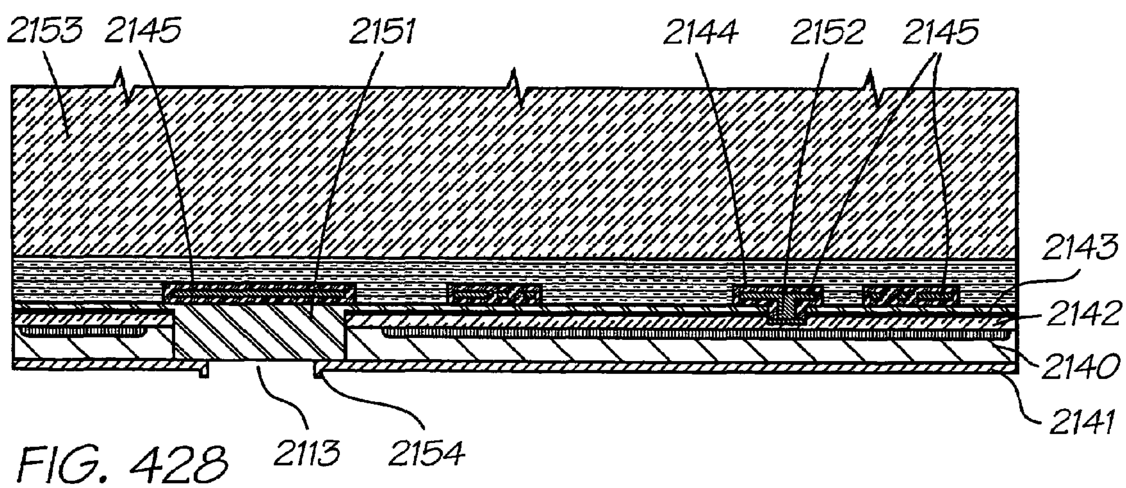

18. Plasma back-etch through the boron doped layer using Mask 7. This mask defines the nozzle 2113, and the edge of the chips. At this stage, the chips are separate, but are still mounted on the glass blank 2153. This step is shown in FIG. 428.

Figure 429:
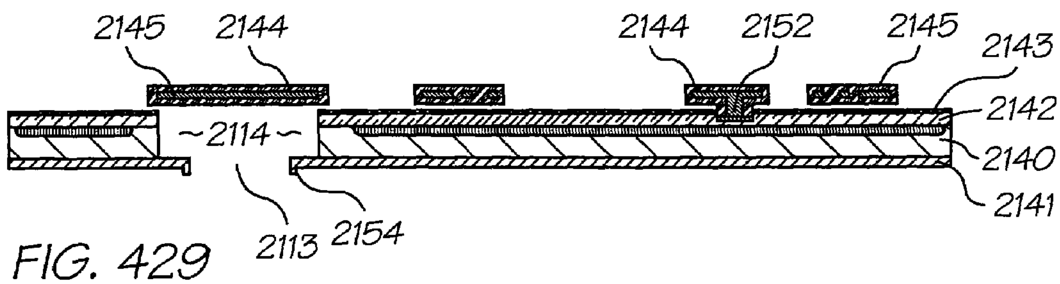

19. Detach the chips from the glass blank 2153 and etch the sacrificial material. The nozzle chambers are cleared, the actuators freed, and the chips are separated by this etch This step is shown in FIG. 429.

20. Mount the printheads in their packaging, which may be a molded plastic former incorporating ink channels which supply different colors of ink to the appropriate regions of the front surface of the wafer.

21. Connect the printheads to their interconnect systems.

22. Hydrophobize the front surface of the printheads.

Figure 430:
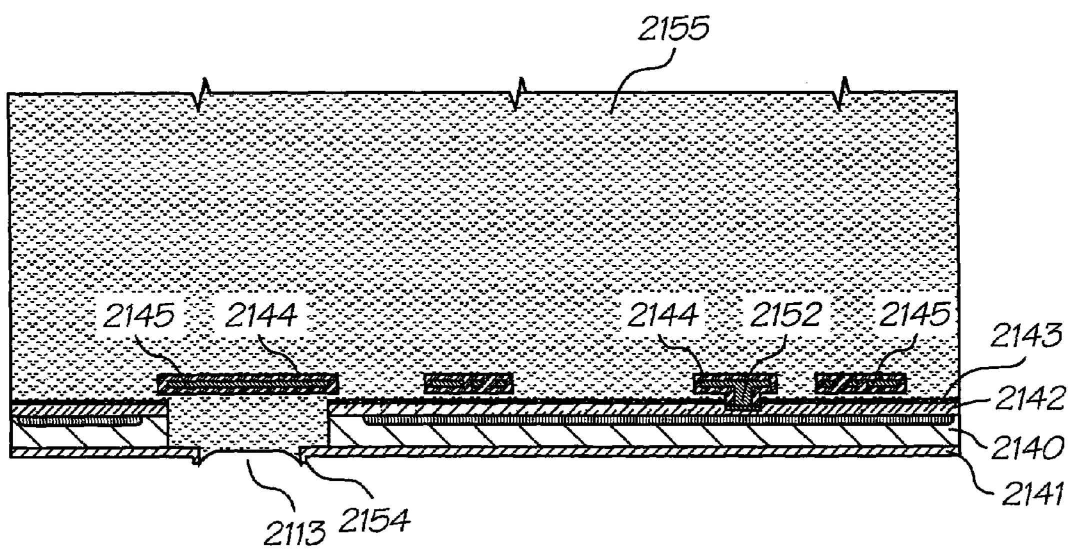

23. Fill the completed printheads with ink 2155 and test them. A filled nozzle is shown in FIG. 430.

IJ22

In a preferred embodiment, there is a provided an ink jet printhead which includes a series of nozzle arrangements, each nozzle arrangement including an actuator device comprising a plurality of actuators which actuate a series of paddles that operate in an iris type motion so as to cause the ejection of ink from a nozzle chamber.

Turning initially to FIG. 431 to FIG. 433, there is illustrated a single nozzle arrangement 2210 (FIG. 433) for the ejection of ink from an ink ejection port 2211. The ink is ejected out of the port 2211 from a nozzle chamber 2212 which is formed from substantially identical iris vanes 2214. Each iris vane 2214 is operated simultaneously to cause the ink within the nozzle chamber 2212 to be squeezed out of the nozzle chamber 2212, thereby ejecting the ink from the ink ejection port 2211.

Each nozzle vane 2214 is actuated by means of a thermal actuator 2215 positioned at its base. Each thermal actuator 2115 has two arms namely, an expanding, flexible arm 2225 and a rigid arm 2226. Each actuator is fixed at one end 2227 and is displaceable at an opposed end 2228. Each expanding arm 2225 can be constructed from a polytetrafluoroethylene (PTFE) layer 2229, inside of which is constructed a serpentine copper heater 2216. The rigid arm 2226 of the thermal actuator 2215 comprises return trays of the copper heater 2216 and the vane 2214. The result of the heating of the expandable arms 2225 of the thermal actuators 2215 is that the outer PTFE layer 2229 of each actuator 2215 is caused to bend around thereby causing the vanes 2214 to push ink towards the centre of the nozzle chamber 2212. The serpentine trays of the copper layer 2216 concertina in response to the high thermal expansion of the PTFE layer 2229. The other vanes 2218-2220 are operated simultaneously. The four vanes therefore cause a general compression of the ink within the nozzle chamber 2212 resulting in a subsequent ejection of ink from the ink ejection port 2211.

A roof 2222 of the nozzle arrangement 2210 is formed from a nitride layer and is supported by posts 2223. The roof 2222 includes a series of holes 2224 which are provided in order to facilitate rapid etching of sacrificial materials within lower layers during construction. The holes 2224 are provided of a small diameter such that surface tension effects are sufficient to stop any ink being ejected from the nitride holes 2224 as opposed to the ink ejection port 2211 upon activation of the iris vanes 2214.

The arrangement of FIG. 431 can be constructed on a silicon wafer utilizing standard semi-conductor fabrication and micro-electro-mechanical systems (MEMS) techniques. The nozzle arrangement 2210 can be constructed on a silicon wafer and built up by utilizing various sacrificial materials where necessary as is common practice with MEMS constructions. Turning to FIG. 433, there is illustrated an exploded perspective view of a single nozzle arrangement 2210 illustrating the various layers utilized in the construction of a single nozzle. The lowest layer of the construction comprises a silicon wafer base 2230. A large number of printheads each having a large number of print nozzles in accordance with requirements can be constructed on a single large wafer which is appropriately diced into separate printheads in accordance with requirements. On top of the silicon wafer layer 2230 is first constructed a CMOS circuitry/glass layer 2231 which provides all the necessary interconnections and driving control circuitry for the various heater circuits. On top of the CMOS layer 2231 is constructed a nitride passivation layer 2232 which is provided for passivating the lower CMOS layer 2231 against any etchants which may be utilized. A layer 2232 having the appropriate vias (not shown) for connection of the heater 2216 to the relevant portion of the lower CMOS layer 2231 is provided.

On top of the nitride layer 2232 is constructed the aluminum layer 2233 which includes various heater circuits in addition to vias to the lower CMOS layer.

Next a PTFE layer 2234 is provided with the PTFE layer 2234 comprising layers which encase a lower copper layer 2233. Next, a first nitride layer 2236 is constructed for the iris vanes 2214, 2218-2220 of FIG. 431. On of this is a second nitride layer 2237 which forms the posts and nozzle roof of the nozzle chamber 2212.

The various layers—2233, 2234, 2236 and 2237 can be constructed utilizing intermediate sacrificial layers which are, as standard with MEMS processes, subsequently etched away so as to release the functional device. Suitable sacrificial materials include glass. When necessary, such as in the construction of nitride layer 2237, various other semi-conductor processes such as dual damascene processing can be utilized.

Figure 435:
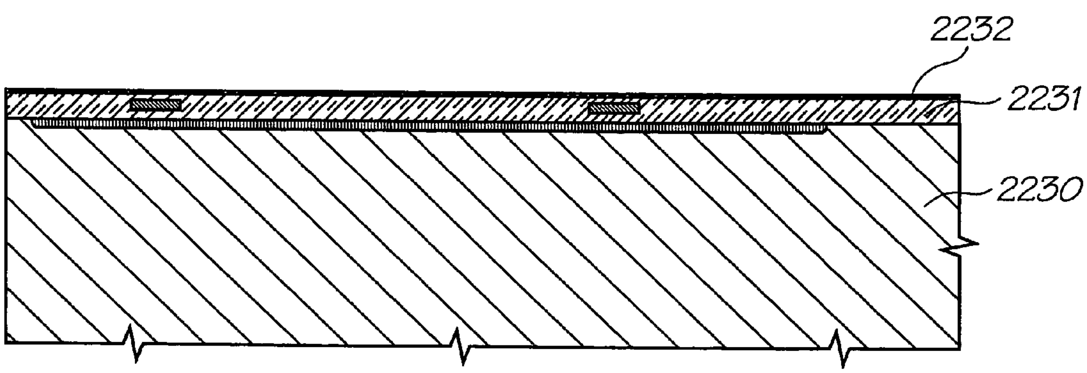

One form of detailed manufacturing process which can be used to fabricate monolithic ink jet printheads operating in accordance with the principles taught by the present embodiment can proceed utilizing the following steps:

1. Using a double sided polished wafer 2230, complete drive transistors, data distribution, and timing circuits using a 0.5 micron, one poly, 2 metal CMOS process 2231. The wafer is passivated with 0.1 microns of silicon nitride 2232. Relevant features of the wafer at this step are shown in FIG. 435. For clarity, these diagrams may not be to scale, and may not represent a cross section though any single plane of the nozzle. FIG. 434 is a key to representations of various materials in these manufacturing diagrams, and those of other cross referenced ink jet configurations.

2. Deposit 1 micron of sacrificial material 2241 (e.g. aluminum or photosensitive polyimide)

Figure 436:
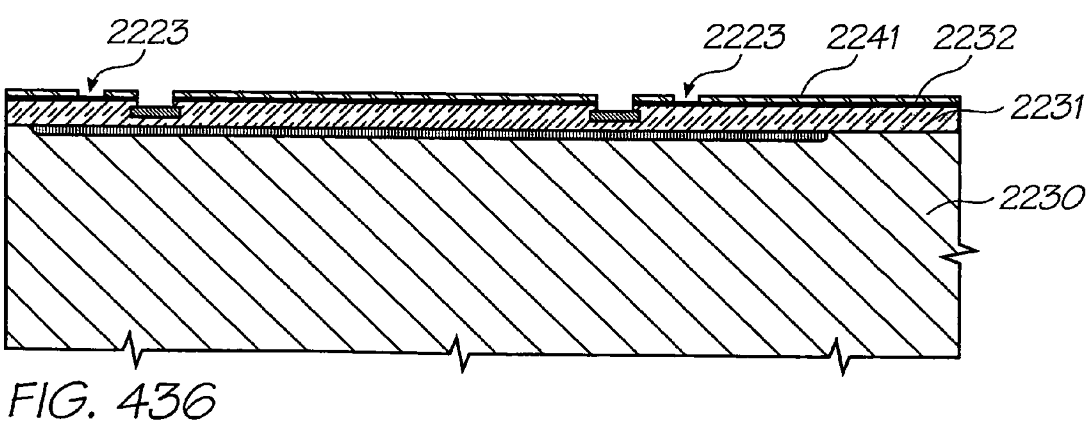

3. Etch the sacrificial layer using Mask 1. This mask defines the nozzle chamber posts 2223 and the actuator anchor point This step is shown in FIG. 436.

4. Deposit 1 micron of PTFE 2242.

Figure 437:
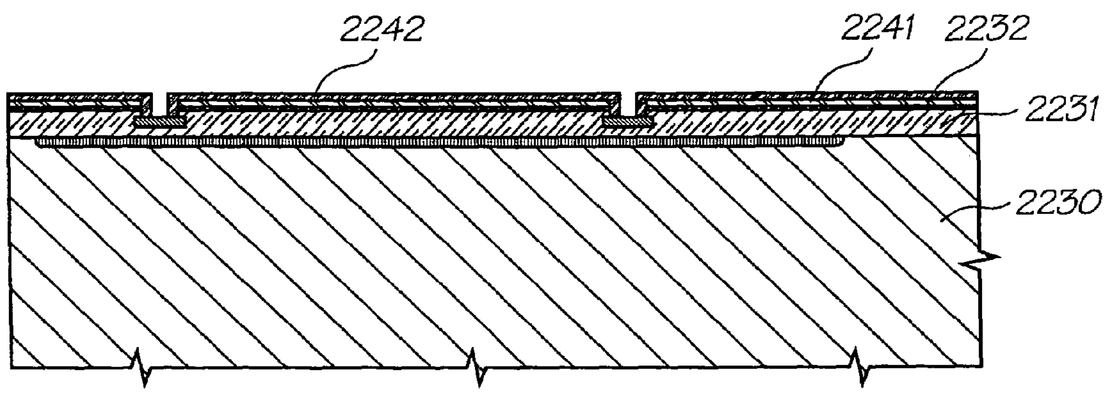

5. Etch the PTFE, nitride, and oxide down to second level metal using Mask 2. This mask defines the heater vias. This step is shown in FIG. 437.

6. Deposit 1 micron of a conductor 2216 with a low Young's modulus, for example aluminum or gold.

Figure 438:
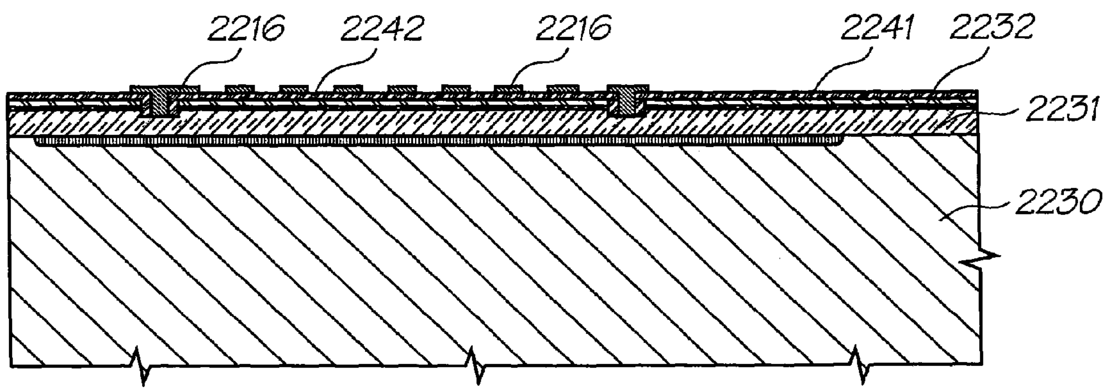

7. Pattern the conductor using Mask 3. This step is shown in FIG. 438.

8. Deposit 1 micron of PTFE.

Figure 439:
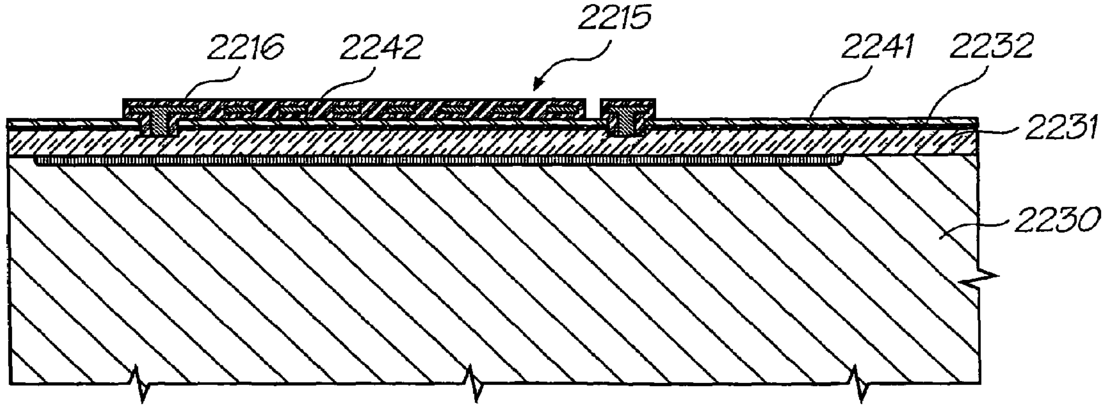

9. Etch the PTFE down to the sacrificial layer using Mask 4. This mask defines the actuators 2215. This step is shown in FIG. 439.

10. Wafer probe. All electrical connections are complete at this point, bond pads are accessible, and the chips are not yet separated.

11. Deposit 6 microns of sacrificial material 2243.

Figure 440:
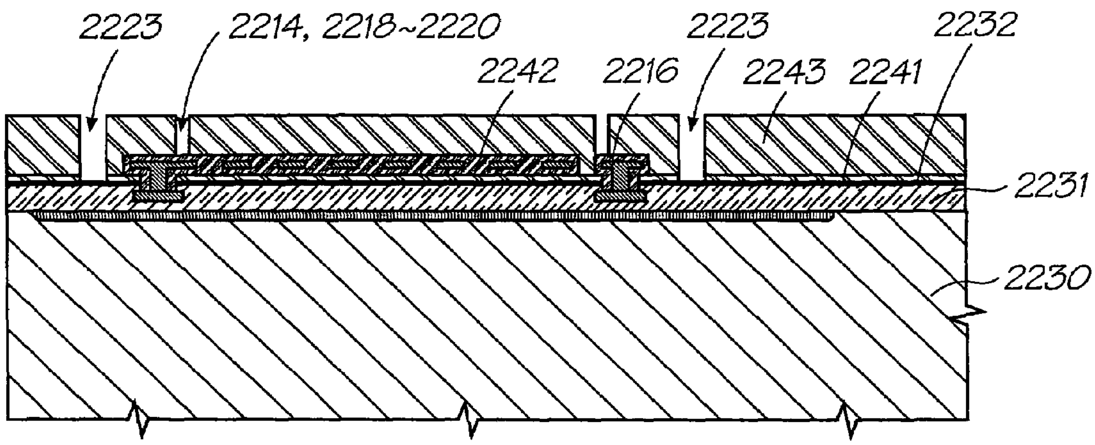

12. Etch the sacrificial material using Mask 5. This mask defines the iris paddle vanes 2214, 2218-2220 and the nozzle chamber posts 2223. This step is shown in FIG. 440.

13. Deposit 3 microns of PECVD glass and planarize down to the sacrificial layer using CMP.

14. Deposit 0.5 micron of sacrificial material.

Figure 441:
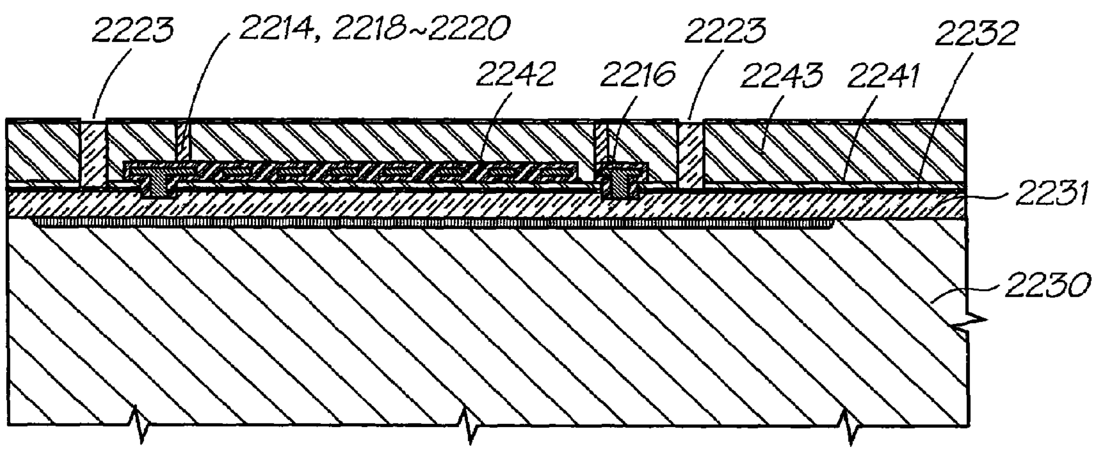

15. Etch the sacrificial material down to glass using Mask 6. This mask defines the nozzle chamber posts 2223. This step is shown in FIG. 441.

16. Deposit 3 microns of PECVD glass 2244.

Figure 442:
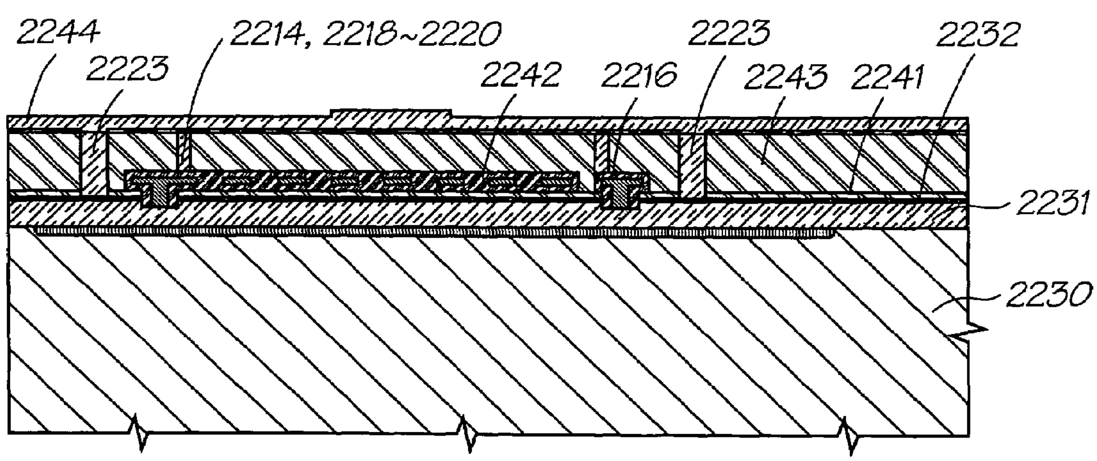

17. Etch to a depth of (approx.) 1 micron using Mask 7. This mask defines a nozzle rim. This step is shown in FIG. 442.

Figure 443:
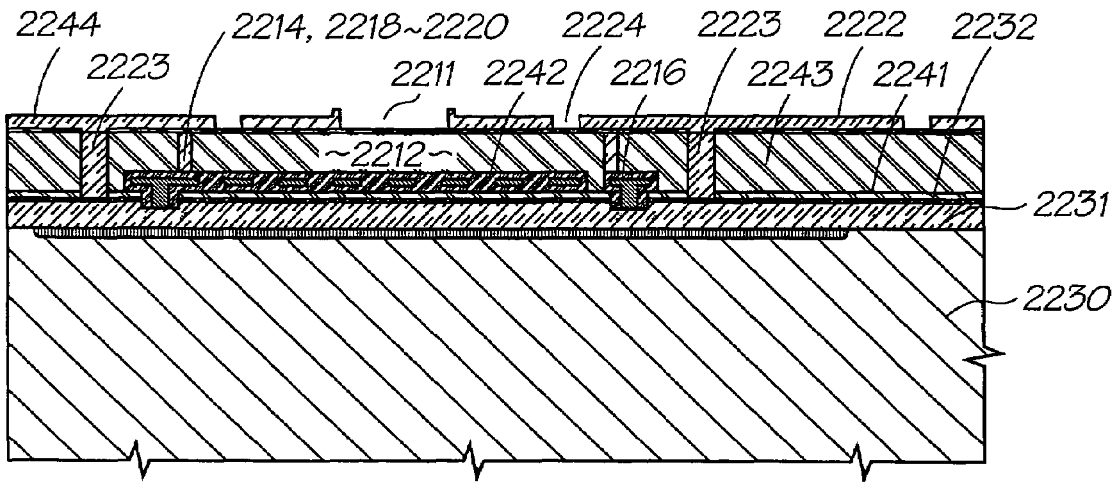

18. Etch down to the sacrificial layer using Mask 8. This mask defines the roof 2222 of the nozzle chamber 2212, the port 2211, and the sacrificial etch access holes 2224. This step is shown in FIG. 443.

Figure 444:
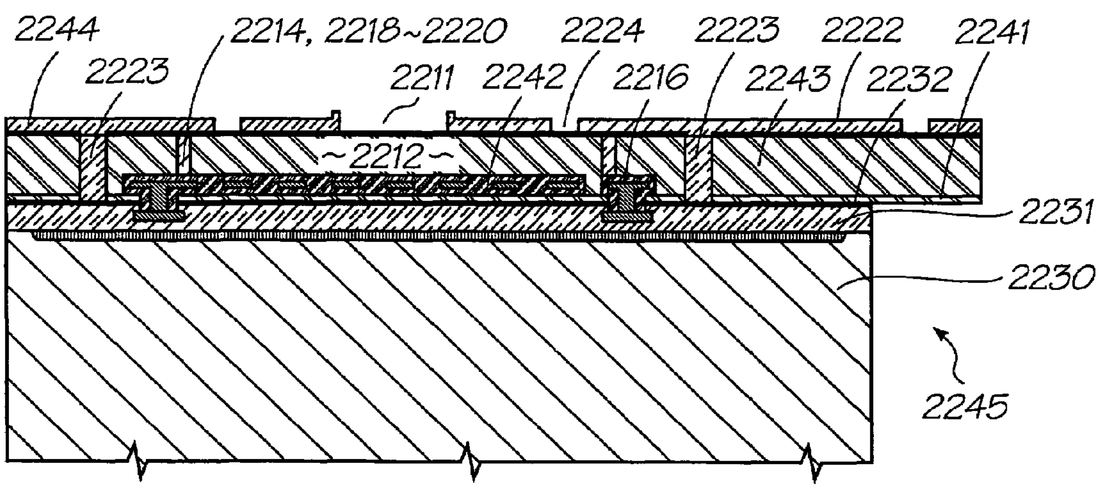

19. Back-etch completely through the silicon wafer (with, for example, an ASE Advanced Silicon Etcher from Surface Technology Systems) using Mask 9. This mask defines the ink inlets 2245 which are etched through the wafer. When the silicon layer is etched, change the etch chemistry to etch the glass and nitride using the silicon as a mask. The wafer is also diced by this etch This step is shown in FIG. 444.

Figure 445:
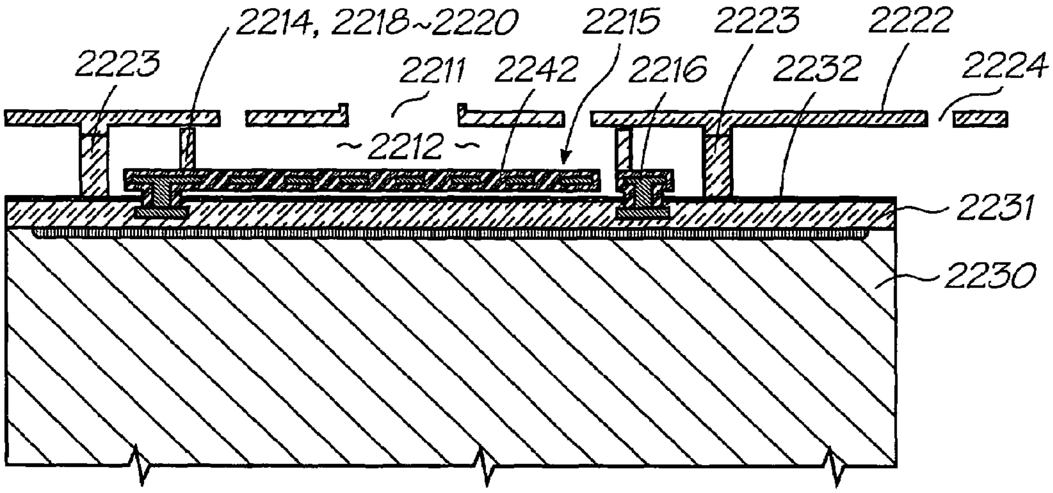

20. Etch the sacrificial material. The nozzle chambers 2212 are cleared, the actuators 2215 freed, and the chips are separated by this etch. This step is shown in FIG. 445.

21. Mount the printheads in their packaging, which may be a molded plastic former incorporating ink channels which supply the appropriate color ink to the ink inlets at the back of the wafer.

22. Connect the printheads to their interconnect systems. For a low profile connection with minimum disruption of airflow, TAB may be used. Wire bonding may also be used if the printer is to be operated with sufficient clearance to the paper.

23. Hydrophobize the front surface of the printheads.

Figure 446:
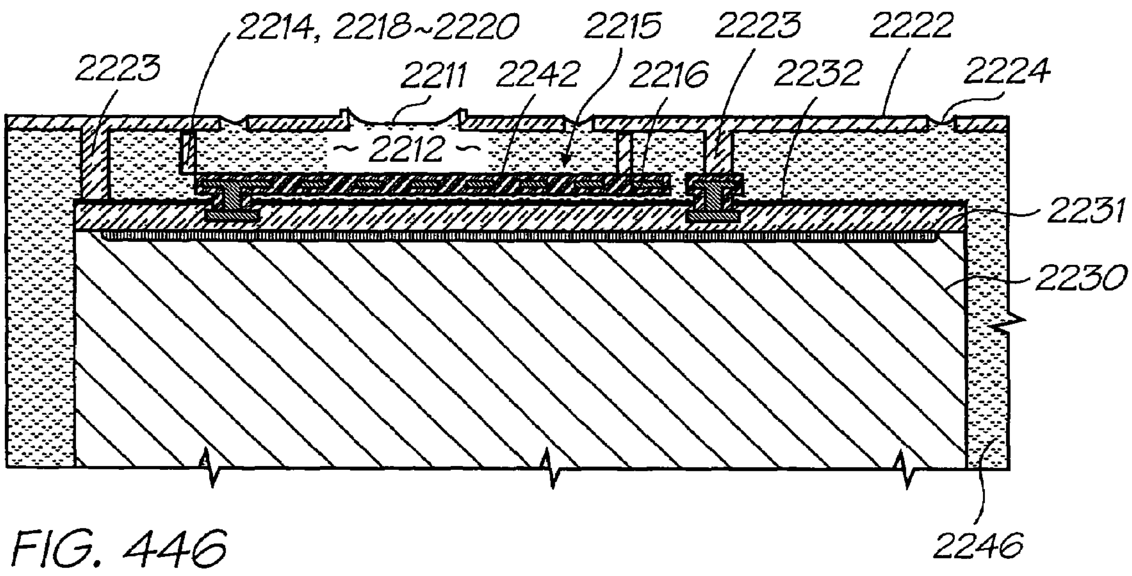

24. Fill the completed printheads with ink 2246 and test them. A filled nozzle is shown in FIG. 446.

IJ23

In a preferred embodiment, ink is ejected from a nozzle arrangement by bending of a thermal actuator so as to eject t ink.

Turning now to FIG. 447, there is illustrated a single nozzle arrangement 2301 of a preferred embodiment. The nozzle arrangement 2301 includes a thermal actuator 2302 located above a nozzle chamber 2303 and an ink ejection port 2304. The thermal actuator 2302 includes an electrical circuit comprising leads 2306, 2307 connected to a serpentine resistive element 2308. The resistive element 8 can comprise the copper layer in this respect, a copper stiffener 2309 is provided to provide support for one end of the thermal actuator 2302.

The copper resistive element 2308 is constructed in a serpentine manner to provide very little tensile strength along the length of the thermal actuator panel 2302.

The copper resistive element 2308 is embedded in a polytetrafluoroethylene (PTFE) layer 2312. The PTFE layer 2312 has a very high coefficient of thermal expansion (approximately $770\times10^{-6}$). This layer undergoes rapid expansion when heated by the copper heater 2308. The copper heater 2308 is positioned closer to a top surface of the PTFE layer 2312, thereby heating an upper layer of the PTFE layer 2312 faster than the bottom layer, resulting in a bending down of the thermal actuator 2302 towards the ejection port 2304.

The operation of the nozzle arrangement 2301 is as follows:

1) When data signals distributed on the printhead indicate that the nozzle arrangement is to eject a drop of ink, a drive transistor for the nozzle arrangement is turned on. This energizes the leads 2306, 2307, and the heater 2308 in the actuator 2302 of the nozzle arrangement The heater 2308 is energized for approximately 3 microseconds, with the actual duration depending upon the design chosen for the nozzle arrangement.

2) The heater heats the PTFE layer 2312, with the top layer of the PTFE layer 2312 being heated more rapidly than the bottom layer. This causes the actuator to bend generally towards the ejection port 2304, in to the nozzle chamber 2303, as illustrated in FIG. 448. The bending of the actuator 2302 pushes ink from the ink chamber 2303 out of the ejection 2304.

3) When the heater current is turned off, the actuator 2302 begins to return to its quiescent position. The return of the actuator 2302 'sucks' some of the ink back into the nozzle chamber 2303, causing an ink ligament connecting the ink drop to the ink in the chamber 2303 to thin. The forward velocity of the drop and backward velocity of the ink in the chamber are resolved by the ink drop breaking off from the ink in the chamber 2303. The ink drop then continues towards the recording medium.

4) The actuator 2302 remains at the quiescent position until the next drop ejection cycle.

Construction

In order to construct a series of the nozzle arrangement 2301 the following major parts need to be constructed:

1) Drive circuitry to drive the nozzle arrangement 2301.

2) The ejection port 2304. The radius of the ejection port 2304 is an important determinant of drop velocity and drop size.

3) The actuator 2302 is constructed of a heater layer embedded in the PTFE layer 2312. The actuator 2302 is fixed at one side of the ink chamber 2303, and the other end is suspended 'over' the ejection port 2304. Approximately half of the actuator 2302 contains the copper element 2308. A heater section of the element 2308 is proximate the fixed end of the actuator 2302.

4) The nozzle chamber 2303. The nozzle chamber 2303 is slightly wider than the actuator 2302. The gap between the actuator 2302 and the nozzle chamber 2303 is determined by the fluid dynamics of the ink ejection and refill process. If the gap is too large, much of the actuator force will be wasted on pushing ink around the edges of the actuator. If the gap is too small, the ink refill time will be too long. Also, if the gap is too small, the crystallographic etch of the nozzle chamber will take too long to complete. A 2 micron gap will usually be sufficient. The nozzle chamber is also deep enough so that air ingested through the ejection port 2304 when the actuator returns to its quiescent state does not extend to the actuator. If it does, the ingested bubble may form a cylindrical surface instead of a hemispherical surface. If this happens, the chamber 2303 will not refill properly. A depth of approximately 20 micron is suitable.

5) Nozzle chamber ledges 2313. As the actuator 2302 moves approximately 10 microns, and a crystallographic etch angle of chamber surface 2314 is 54.74 degrees, a gap of around 7 micron is required between the edge of the paddle 2302 and the outermost edge of the nozzle chamber 2303. The walls of the nozzle chamber 2303 must also clear the ejection port 2304. This requires that the nozzle chamber 2303 be approximately 52 micron wide, whereas the actuator 2302 is only 30 micron wide. Were there to be an 11 micron gap around the actuator 2302, too much ink would flow around to the sides of the actuator 2302 when the actuator 2302 is energized. To prevent this, the nozzle chamber 2303 is undercut 9 micron into the silicon surrounding the paddle, leaving a 9 micron wide ledge 2313 to prevent ink flow around the actuator 2302.

EXAMPLE

Basic Fabrication Sequence

Two wafers are required: a wafer upon which the active circuitry and nozzles are fabricated (the print head wafer) and a further wafer in which the ink channels are fabricated. This is the ink channel wafer. One form of construction of printhead wafer will now be discussed with reference to FIG. 449 which illustrates an exploded perspective view of a single ink jet nozzle constructed in accordance with a preferred embodiment.

1) Starting with a single crystal silicon wafer, which has a buried epitaxial layer 2316 of silicon which is heavily doped with boron. The boron should be doped to preferably $10^{20}$ atoms per $cm^3$ of boron or more, and be approximately 3 micron thick. The lightly doped silicon epitaxial layer 2315 on top of the boron doped layer should be approximately 8 micron thick, and be doped in a manner suitable for the active semiconductor device technology chosen. This is the printhead wafer. The wafer diameter should preferably be the same as the ink channel wafer.

2) The drive transistors and data distribution circuitry layer 2317 is fabricated according to the process chosen, up until the oxide layer over second level metal.

3) Next, a silicon nitride passivation layer 2318 is deposited.

4) Next, the actuator 2302 (FIG. 447) is constructed. The actuator 2302 comprises one copper layer 2319 embedded in a PTFE layer 2320. The copper layer 2319 comprises both the heater element 2308 and planar portion 2309 (of FIG. 447). Turning now to FIG. 450, the corrugated resistive element can be formed by depositing a resist layer 2350 on top of the first PTFE layer 2351. The resist layer 2350 is exposed utilizing a mask 2352 having a half-tone pattern delineating the corrugations. After development the resist 2350 contains the corrugation pattern. The resist layer 2350 and the PTFE layer 2351 are then etched utilizing an etchant that erodes the resist layer 2350 at substantially the same rate as the PTFE layer 2351. This transfers the corrugated pattern into the PTFE layer 2351. Turning to FIG. 451, on top of the corrugated PTFE layer 2351 is deposited the copper heater layer 2319 which takes on a corrugated form in accordance with its under layer. The copper heater layer 2319 is then etched in a serpentine or concertina form. In FIG. 452 there is illustrated a top view of the copper layer 2319 only, comprising the serpentine heater element 2308 and the portion 2309. Subsequently, a further PTFE layer 2353 is deposited on top of layer 2319 so as to form the top layer of the thermal actuator 2302. Finally, the second PTFE layer 2352 is planarized to form the top surface of the thermal actuator 2302 (FIG. 447).

5) Etch through the PTFE, and all the way down to silicon in the region around the three sides of the paddle. The etched region should be etched on all previous lithographic steps, so that the etch to silicon does not require strong selectivity against PTFE.

6) Etch the wafers in an anisotropic wet etch, which stops on <111> crystallographic planes or on heavily boron doped silicon. The etch can be a batch wet etch in ethylenediamine pyrocatechol (EDP). The etch proceeds until the paddles are entirely undercut thereby forming the nozzle chamber 2303. The backside of the wafer need not be protected against this etch, as the wafer is to be subsequently thinned. Approximately 60 micron of silicon will be etched from the wafer backside during this process.

7) Permanently bond the printhead wafer onto a pre-fabricated ink channel wafer. The active side of the printhead wafer faces the ink channel wafer. The ink channel wafer is attached to a backing plate, as it has already been etched into separate ink channel chips.

8) Etch the printhead wafer to entirely remove the backside silicon to the level of the boron doped epitaxial layer 2316. This etch can be a batch wet etch in ethylenediamine pyrocatechol (EDP).

9) Mask an ejection port rim 2311 (FIG. 447) from the underside of the print head wafer. This mask is a series of circles approximately 0.5 micron to 1 micron larger in radius than the nozzles. The purpose of this step is to leave a raised rim 2311 around the ejection port 2304, to help prevent ink spreading on the front surface of the wafer. This step can be eliminated if the front surface is made sufficiently hydrophobic to reliably prevent front surface wetting.

10) Etch the boron doped silicon layer 2316 to a depth of 1 micron.

11) Mask the ejection ports from the underside of the printhead wafer. This mask can also include the chip edges.

12) Etch through the boron doped silicon layer to form the ink ejection ports 2304.

13) Separate the chips from their backing plate. Each chip is now a full printhead including ink channels. The two wafers have already been etched through, so the printheads do not need to be diced.

14) Test the printheads and TAB bond the good printheads.

15) Hydrophobize the front surface of the printheads.

17) Perform final testing on the TAB bonded printheads.

It would be evident to persons skilled in the relevant arts that the arrangement described by way of example in a preferred embodiments will result in a nozzle arrangement able to eject ink on demand and be suitable for incorporation in a drop on demand ink jet printer device having an array of nozzles for the ejection of ink on demand.

Of course, alternative embodiments will also be self-evident to the person skilled in the art. For example, the thermal actuator could be operated in a reverse mode wherein passing current through the actuator results in movement of the actuator to an ink loading position when the subsequent cooling of the paddle results in the ink being ejected. However, this has a number of disadvantages in that cooling is likely to take a substantially longer time than heating and this arrangement would require a constant current to be passed through the nozzle arrangement when not in use.

One form of detailed manufacturing process which can be used to fabricate monolithic ink jet printheads operating in accordance with the principles taught by the present embodiment can proceed utilizing the following steps:

1. Using a double sided polished wafer 2360 deposit 3 microns of epitaxial silicon heavily doped with boron 2316.

2. Deposit 10 microns of epitaxial silicon 2315, either p-type or n-type, depending upon the CMOS process used.

Figure 454:
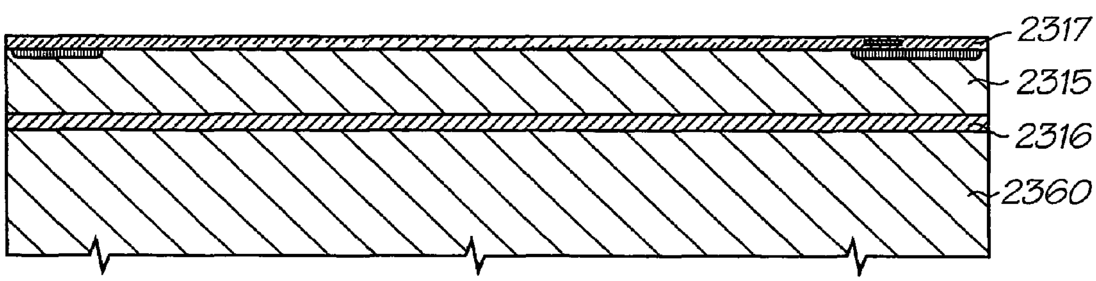

3. Complete drive transistors, data distribution, and timing circuits using a 0.5 micron, one poly, 2 metal CMOS process 2317. This step is shown in FIG. 454. For clarity, these diagrams may not be to scale, and may not represent a cross section though any single plane of the nozzle. FIG. 453 is a key to representations of various materials in these manufacturing diagrams, and those of other cross referenced ink jet configurations.

Figure 455:
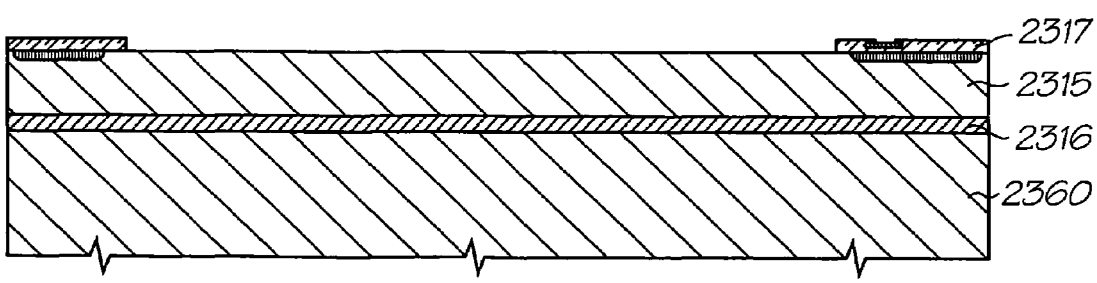

4. Etch the CMOS oxide layers down to silicon or aluminum using Mask 1. This mask defines the nozzle chamber, and the edges of the printheads chips. This step is shown in FIG. 455.

Figure 456:
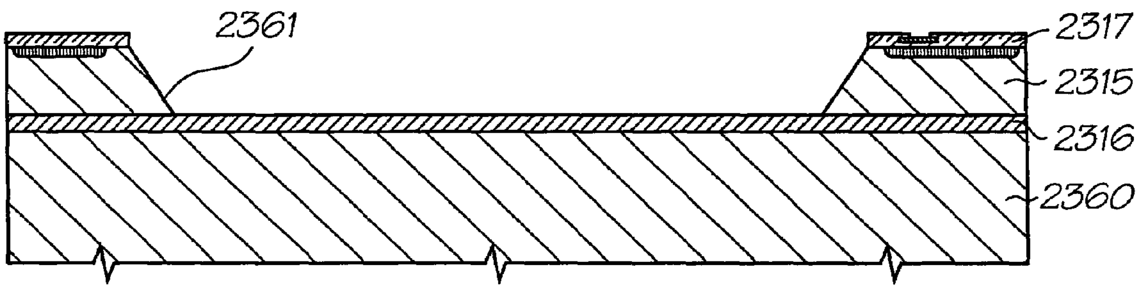

5. Crystallographically etch the exposed silicon using, for example, KOH or EDP (ethylenediamine pyrocatechol). This etch stops on <111> crystallographic planes 2361, and on the boron doped silicon buried layer. This step is shown in FIG. 456.

6. Deposit 0.5 microns of low stress silicon nitride 2362.

Figure 457:
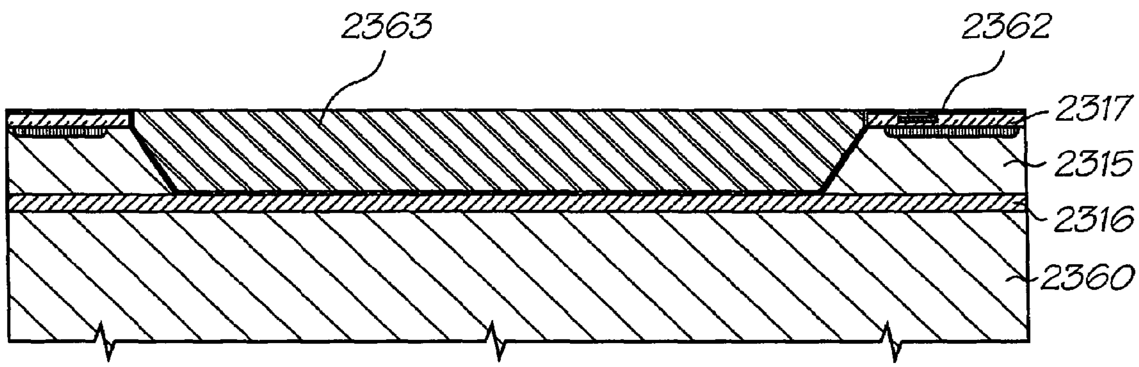

7. Deposit 12 microns of sacrificial material (polyimide) 2363. Planarize down to nitride using CMP. The sacrificial material temporarily fills the nozzle cavity. This step is shown in FIG. 457.

8. Deposit 1 micron of PTFE 2364.

9. Deposit, expose and develop 1 micron of resist 2365 using Mask 2. This mask is a gray-scale mask which defines the heater vias as well as the corrugated PTFE surface that the heater is subsequently deposited on.

Figure 458:
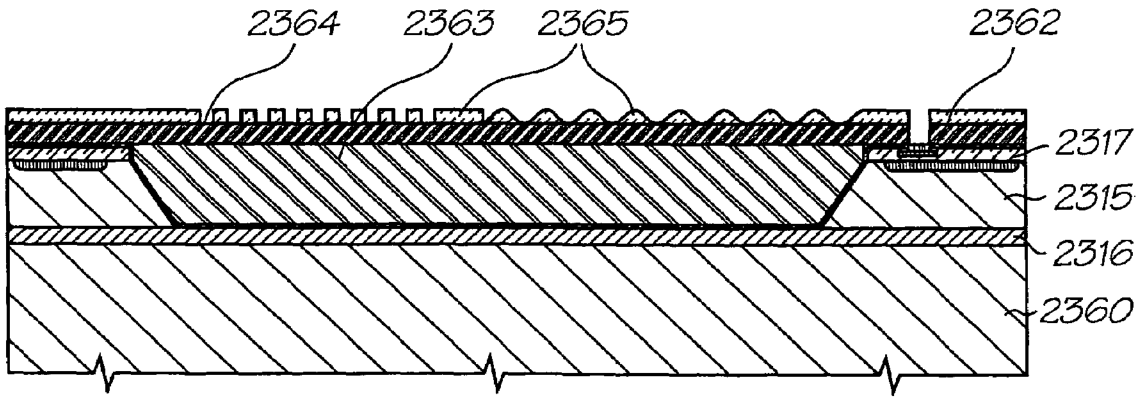

10. Etch the PTFE and resist at substantially the same rate. The corrugated resist thickness is transferred to the PTFE, and the PTFE is completely etched in the heater via positions. In the corrugated regions, the resultant PTFE thickness nominally varies between 0.25 micron and 0.75 micron, though exact values are not critical. This step is shown in FIG. 458.

11. Etch the nitride and CMOS passivation down to second level metal using the resist and PTFE as a mask.

12. Deposit and pattern resist using Mask 3. This mask defines the heater.

Figure 459:
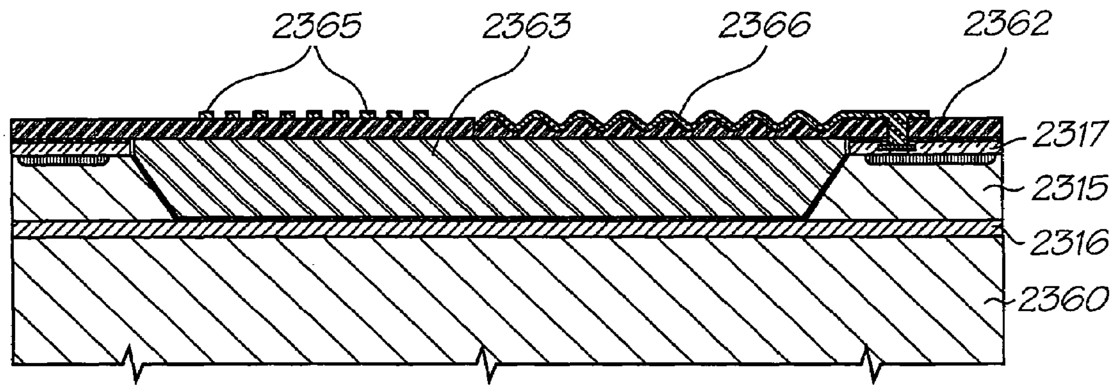

13. Deposit 0.5 microns of gold 2366 (or other heater material with a low Young's modulus) and strip the resist Steps 11 and 12 form a lift-off process. This step is shown in FIG. 459. 14. Deposit 1.5 microns of PTFE 2367.

Figure 460:
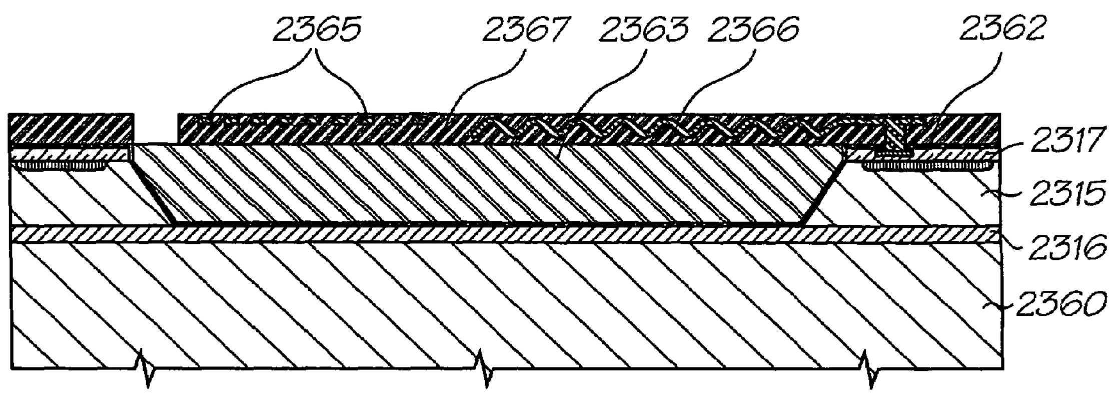

15. Etch the PTFE down to the nitride or sacrificial layer using Mask 4. This mask defines the actuator 2302 and the bond pads. This step is shown in FIG. 460.

16. Wafer probe. All electrical connections are complete at this point, and the chips are not yet separated.

17. Plasma process the PTFE to make the top and side surfaces of the paddle hydrophilic. This allows the nozzle chamber to fill by capillarity.

Figure 461:
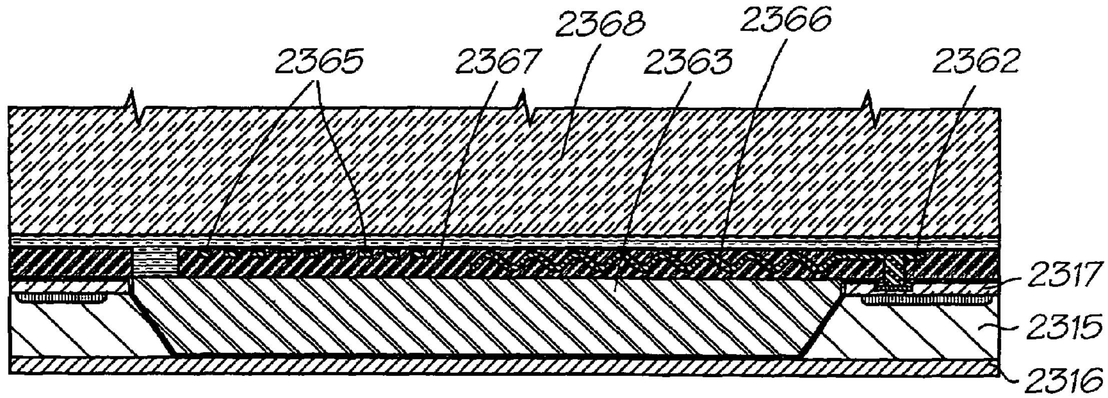

18. Mount the wafer on a glass blank 2368 and back-etch the wafer using KOH with no mask. This etch thins the wafer and stops at the buried boron doped silicon layer. This step is shown in FIG. 461.

Figure 462:
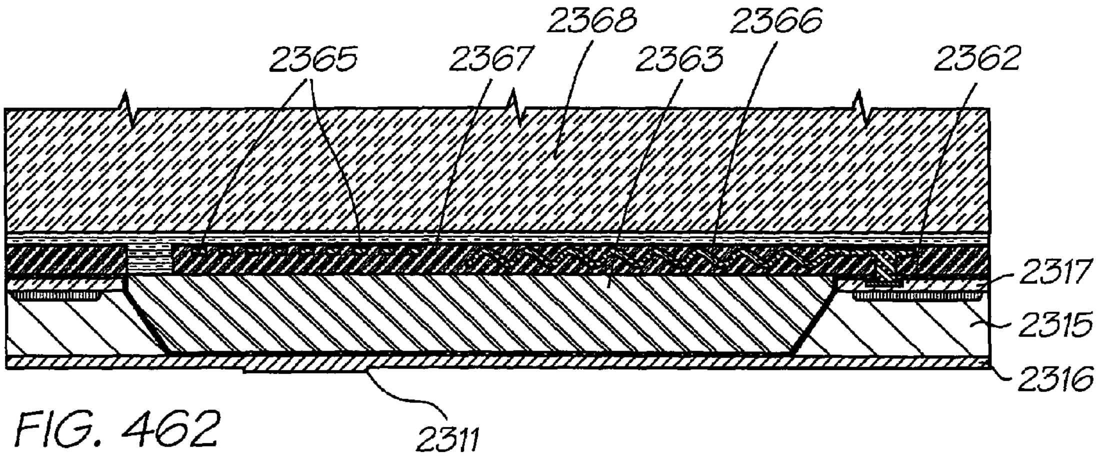

19. Plasma back-etch the boron doped silicon layer to a depth of 1 micron using Mask 5. This mask defines the nozzle rim 2311. This step is shown in FIG. 462.

Figure 463:
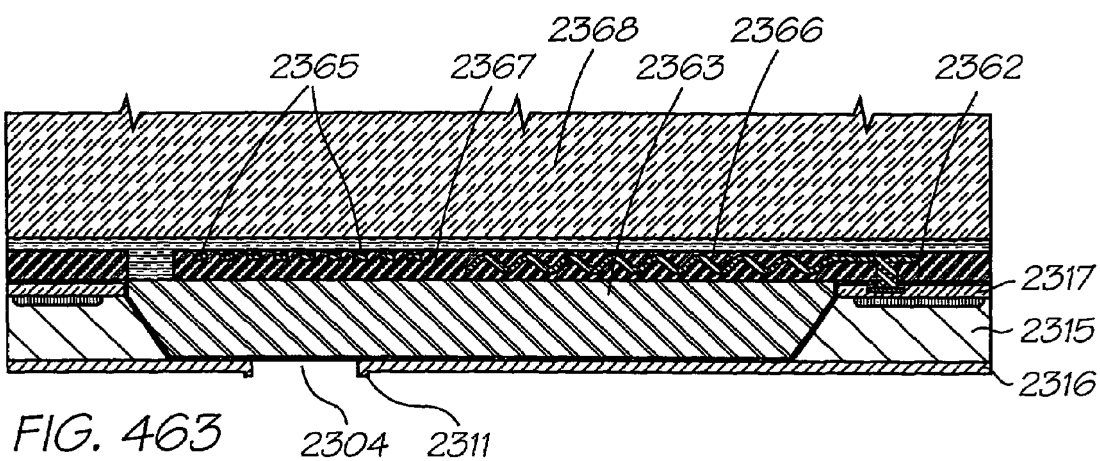

20. Plasma back-etch through the boron doped layer and sacrificial layer using Mask 6. This mask defines the nozzle 2304, and the edge of the chips. At this stage, the chips are still mounted on the glass blank. This step is shown in FIG. 463.

21. Etch the remaining sacrificial material while the wafer is still attached to the glass blank.

22. Plasma process the PTFE through the nozzle holes to render the PTFE surface hydrophilic.

Figure 464:
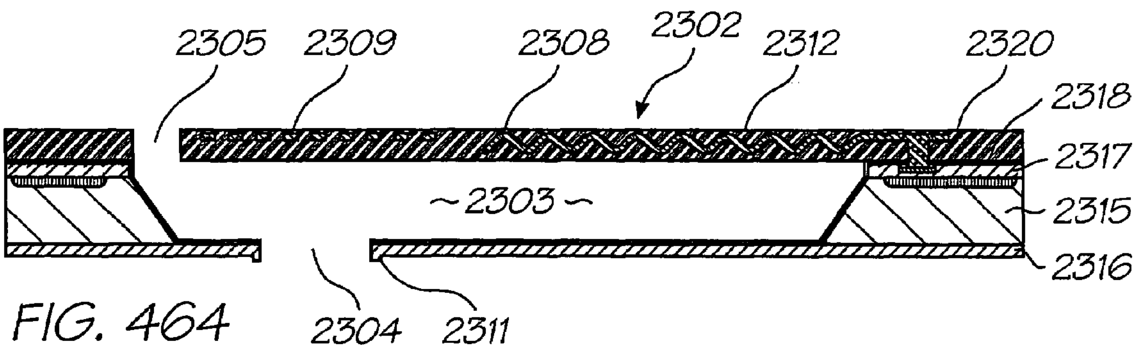

23. Strip the adhesive layer to detach the chips from the glass blank. This process completely separates the chips. This step is shown in FIG. 464.

24. Mount the printheads in their packaging, which may be a molded plastic former incorporating ink channels which supply different colors of ink to the appropriate regions of the front surface of the wafer.

25. Connect the printheads to their interconnect systems.

26. Hydrophobize the front surface of the printheads.

Figure 465:
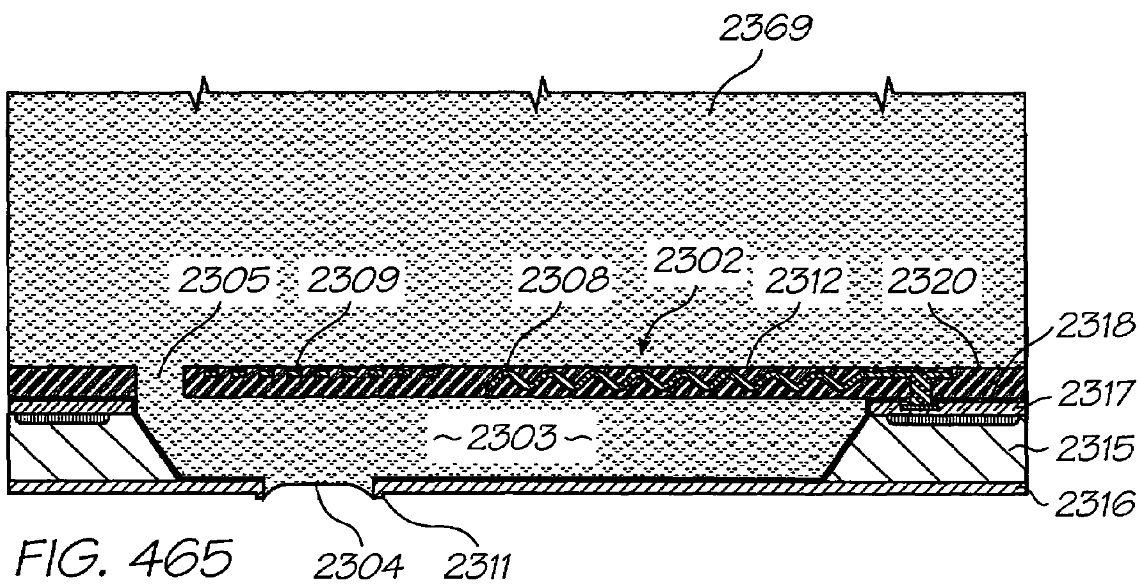

27. Fill with ink 2369 and test the completed printheads. A filled nozzle is shown in FIG. 465.

IJ24

In a preferred embodiment, an inkjet nozzle is provided having a thermally based actuator which is highly energy efficient. The thermal actuator is located within a chamber filled with ink and relies upon the thermal expansion of materials when an electric current is being passed through them to activate the actuator thereby causing the ejection of ink out of a nozzle provided in the nozzle chamber.

Turning to the Figures, in FIG. 466, there are illustrated two adjoining inkjet nozzles 2401 constructed in accordance with a preferred embodiment, with FIG. 467 showing an exploded perspective and FIG. 469 showing various sectional views. Each nozzle 2401, can be constructed as part of an array of nozzles on a silicon wafer device and can be constructed utilizing semiconductor processing techniques in addition to micro machining and micro fabrication process technology (MEMS) and a full familiarity with these technologies is hereinafter assumed.

A nozzle chamber 2410 includes a ink ejection port 2411 for the ejection of ink from within the nozzle chamber. Ink is supplied via an inlet port 2412 which has a grill structure fabricated from a series of posts 2414, the grill acting to filter out foreign bodies within the ink supply and also to provide stability to the nozzle chamber structure. Inside the nozzle chamber is constructed a thermal actuator device 2416 which is interconnected to an electric circuit (not shown) which, when thermally actuated, acts as a paddle bending upwards so as to cause the ejection of ink from each ink ejection port 2411. A series of etchant holes e.g. 2418 are also provided in the top of nozzle chamber 2410, the holes 2418 being provided for manufacturing purposes only so to allow a sacrificial etchant to easily etch away the internal portions of nozzle chamber 2410. The etchant ports 2418 are of a sufficiently small diameter so that the resulting surface tension holds the ink within chamber 2410 such that no ink leaks out via ports 2418.

The thermal actuator 2416 is composed primarily of polytetrafluoroethylene (PTFE) which is a generally hydrophobic material. The top layer of the actuator 2416 is treated or coated so as to make it hydrophilic and thereby attract water/ink via inlet port 2412. Suitable treatments include plasma exposure in an ammonia atmosphere. The bottom surface remains hydrophobic and repels the water from the underneath surface of the actuator 2416. Underneath the actuator 2416 is provided a further surface 2419 also composed of a hydrophobic material such as PTFE. The surface 2419 has a series of holes 2420 in it which allow for the flow of air into the nozzle chamber 2410. The diameter of the nozzle holes 2420 again being of such a size so as to restrict the flow of fluid out of the nozzle chamber via surface tension interactions. out of the nozzle chamber.

The surface 2419 is separated from a lower level 2423 by means of a series of spaced apart posts e.g. 2422 which can be constructed when constructing the layer 2419 utilizing an appropriate mask. The nozzle chamber 2410, but for grill inlet port 2412, is walled on its sides by silicon nitride walls e.g. 2425, 2426. An air inlet port is formed between adjacent nozzle chambers such that air is free to flow between the walls 2425, 2428. Hence, air is able to flow down channel 2429 and along channel 2430 and through holes e.g. 2420 in accordance with any fluctuating pressure influences.

The air flow acts to reduce the vacuum on the back surface of actuator 2416 during operation. As a result, less energy is required for the movement of the actuator 2416. In operation, the actuator 2416 is thermally actuated so as to move upwards and cause ink ejection. As a result, air flows in along channels 2429, 2430 and through the holes e.g. 2420 into the bottom area of actuator 2416. Upon deactivation of the actuator 2416, the actuator lowers with a corresponding airflow out of port 2420 along channel 2430 and out of channel 2429. Any fluid within nozzle chamber 2410 is firstly repelled by the hydrophobic nature of the bottom side of the surface of actuator 2416 in addition to the top of the surface 2419 which is again hydrophobic. As noted previously the limited size holes e.g. 2420 further stop the fluid from passing the holes 2420 as a result of surface tension characteristics.

A further preferable feature of nozzle chamber 2410 is the utilisation of the nitride posts 2414 to also clamp one end of the surfaces 2416 and 2419 firmly to bottom surface 2420 thereby reducing the likelihood delaminating during operation.

In FIG. 467, there is illustrated an exploded perspective view of a single nozzle 2401. The exploded perspective view illustrates the form of construction of each layer of a simple nozzle 2401. The nozzle arrangement can be constructed on a base silicon wafer 2434 having a top glass layer which includes the various drive and control circuitry and which, for example, can comprise a two level metal CMOS layer 2435 with the various interconnects (not shown). On top of the layer 2435 is first laid out a nitride passivation layer 2423 of approximately one micron thickness which includes a number of vias (not shown) for the interconnection of the subsequent layers to the CMOS layer 2435. The nitride layer is provided primarily to protect lower layers from corrosion or etching, especially where sacrificial etchants are utilized. Next, a one micron PTFE layer 2419 is constructed having the aforementioned holes e.g. 2420 and posts 2422. The structure of the PTFE layer 2419 can be formed by first laying down a sacrificial glass layer (not shown) onto which the PTFE layer 2419 is deposited. The PTFE layer 2419 includes various features, for example, a lower ridge portion 2438 in addition to a hole 2439 which acts as a via for the subsequent material layers.

The actuator proper is formed from two PTFE layers 2440, 2441. The lower PTFE layer 2440 is made conductive. The PTFE layer 2440 can be made conductive utilizing a number of different techniques including:

(i) Doping the PTFE layer with another material so as to make it conductive.

(ii) Embedding within the PTFE layer a series of quantum wires constructed from such a material as carbon nanotubes created in a mesh form. ("Individual single-wall carbon nanotubes as quantum wires" by Tans et al Nature, Volume 386, 3rd Apr. 1997 at pages 474-477). The PTFE layer 2440 includes certain cut out portions e.g. 2443 so that a complete circuit is formed around the PTFE actuator 2440. The cut out portions can be optimised so as to regulate the resistive heating of the layer 2440 by means of providing constricted portions so as to thereby increase the heat generated in various "hot spots" as required. A space is provided between the PTFE layer 2419 and the PTFE layer 2440 through the utilisation of an intermediate sacrificial glass layer (not shown).

On top of the PTFE layer 2440 is deposited a second PTFE layer 2441 which can be a standard non conductive PTFE layer and can include filling in those areas in the lower PTFE layer e.g. 2443 which are not conductive. The top of the PTFE layer is further treated or coated to make it hydrophilic.

Next a nitride layer can be deposited to form the nozzle chamber proper. The nitride layer can be formed by first laying down a sacrificial glass layer and etching the glass layer to form walls e.g. 2425, 2426 and grilled portion e.g. 2414. Preferably, the mask utilized results a first anchor portion 2445 which mates with the hole 2439 in layer 2419 so as to fix the layer 2419 to the nitride layer 2423. Additionally, the bottom surface of the grill 2414 meets with a corresponding step 2447 (See FIG. 468) in the PTFE layer 2441 so as to clamp the end portion of the PTFE layers 2441, 2440 and 2439 to the wafer surface so as to guard against delamination. Next, a top nitride layer 2450 can be formed having a number of holes e.g. 2418 and nozzle hole 2411 around which a rim can be etched through etching of the nitride layer 2450. Subsequently, the various sacrificial layers can be etched away so as to release the structure of the thermal actuator.

Obviously, large arrays of inkjet nozzles 2401 can be created side by side on a single wafer. The ink can be supplied via ink channels etched through the wafer utilizing a high density low pressure plasma etching system such as that supplied by Surface Technology Systems of the United Kingdom.

The foregoing describes only one embodiment of the invention and many variations of the embodiment will be obvious for a person skilled in the art of semi conductor, micro mechanical fabrication. Certainly, various other materials can be utilized in the construction of the various layers.

Figure 471:
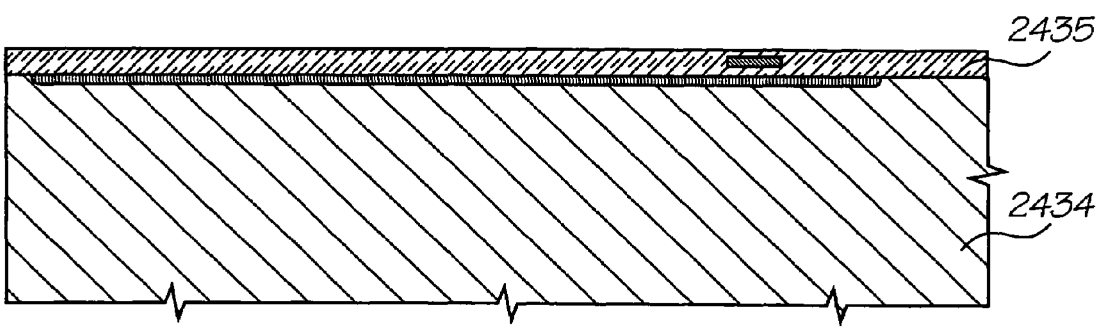

One form of detailed manufacturing process which can be used to fabricate monolithic ink jet printheads operating in accordance with the principles taught by the present embodiment can proceed utilizing the following steps:

1. Using a double sided polished wafer 2434, complete drive transistors, data distribution, and timing circuits using a 0.5 micron, one poly, 2 metal CMOS process 2435. Relevant features of the wafer at this step are shown in FIG. 471. For clarity, these diagrams may not be to scale, and may not represent a cross section though any single plane of the nozzle. FIG. 470 is a key to representations of various materials in these manufacturing diagrams, and those of other cross referenced inkjet configurations.

2. Deposit 1 micron of low stress nitride 2423. This acts as a barrier to prevent ink diffusion through the silicon dioxide of the chip surface.

3. Deposit 2 microns of sacrificial material 2460 (e.g. polyimide).

Figure 472:
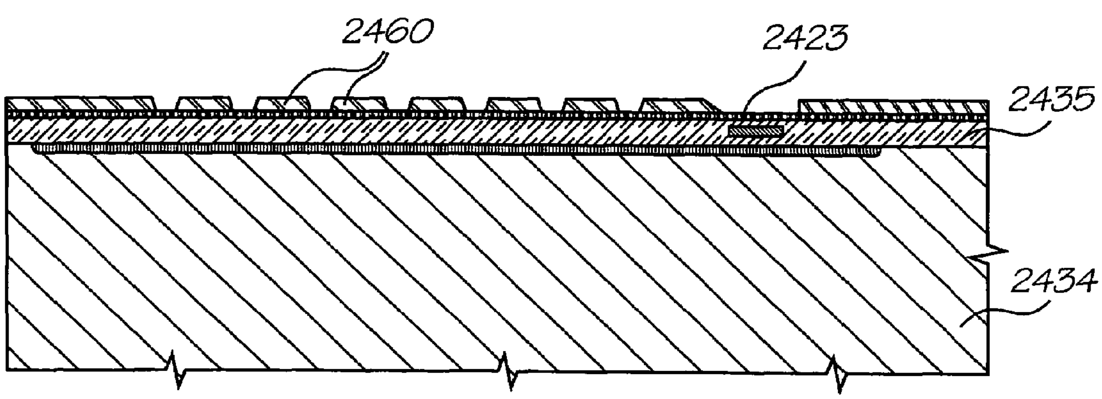

4. Etch the sacrificial layer using Mask 1. This mask defines the PTFE venting layer support pillars and anchor point This step is shown in FIG. 472.

5. Deposit 2 microns of PTFE 2419.

Figure 473:
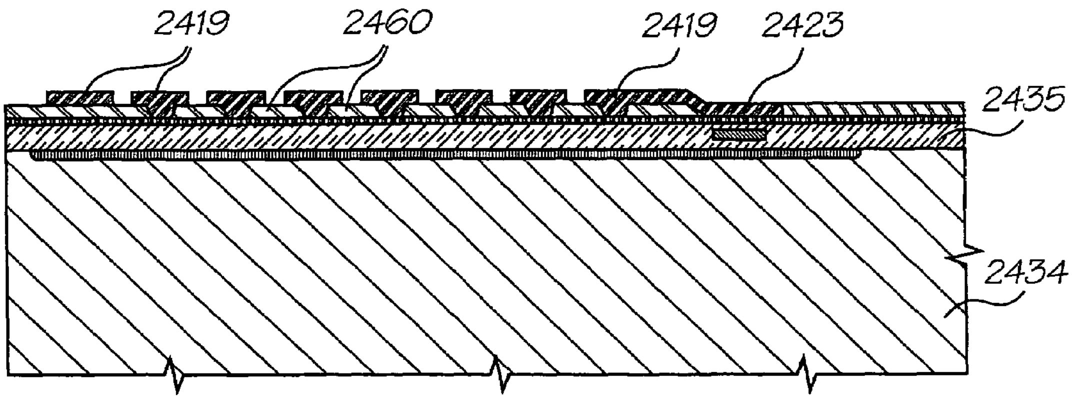

6. Etch the PTFE using Mask 2. This mask defines the edges of the PTFE venting layer, and the holes in this layer. This step is shown in FIG. 473.

7. Deposit 3 micron of sacrificial material 2461 (e.g. polyimide).

Figure 474:
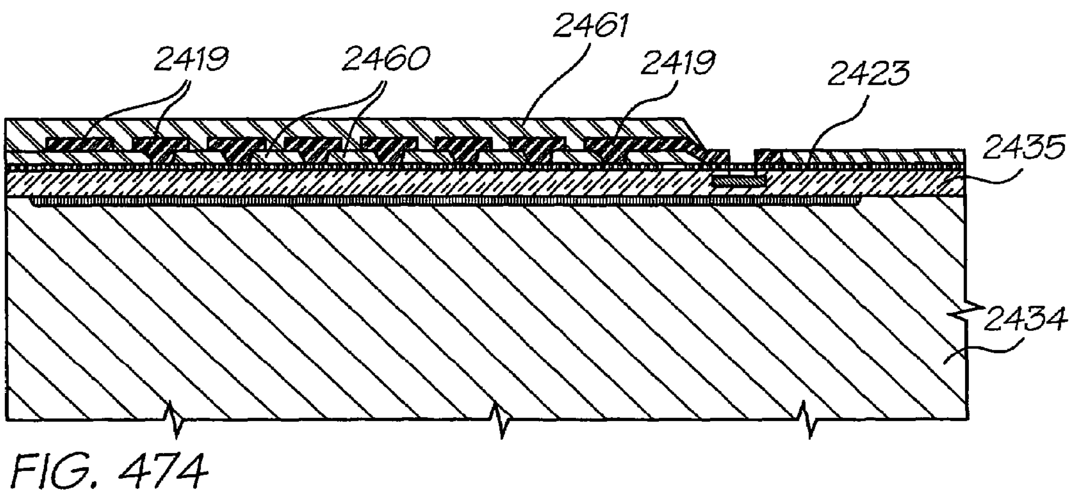

8. Etch the sacrificial layer and CMOS passivation layer using Mask 3. This mask defines the actuator contacts. This step is shown in FIG. 474.

Figure 475:
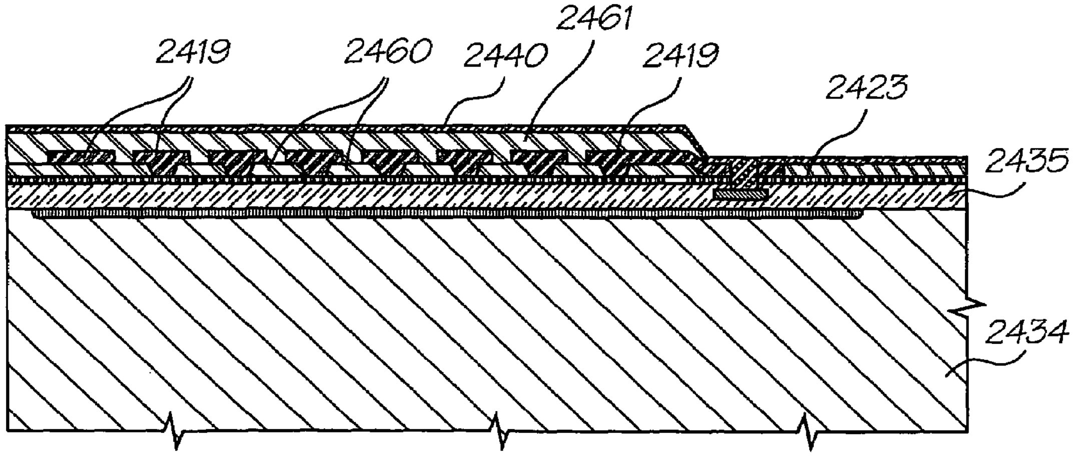

9. Deposit 1 micron of conductive PTFE 2440. Conductive PTFE can be formed by doping the PTFE with a conductive material, such as extremely fine metal or graphitic filaments, or fine metal particles, and so forth. The PTFE should be doped so that the resistance of the PTFE conductive heater is sufficiently low so that the correct amount of power is dissipated by the heater when the drive voltage is applied. However, the conductive material should be a small percentage of the PTFE volume, so that the coefficient of thermal expansion is not significantly reduced. Carbon nanotubes can provide significant conductivity at low concentrations. This step is shown in FIG. 475.

Figure 476:
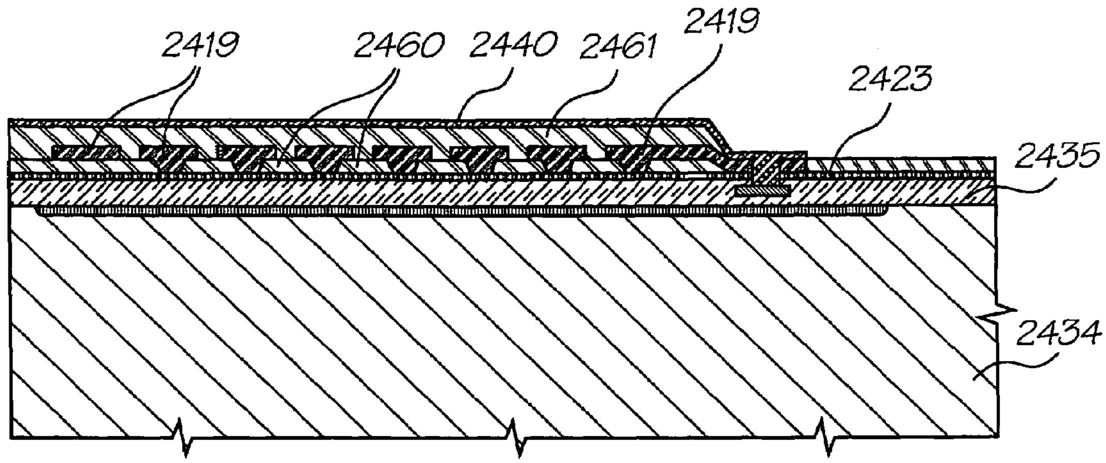

10. Etch the conductive PTFE using Mask 4. This mask defines the actuator conductive regions. This step is shown in FIG. 476.

11. Deposit 1 micron of PTFE 2441.

Figure 477:
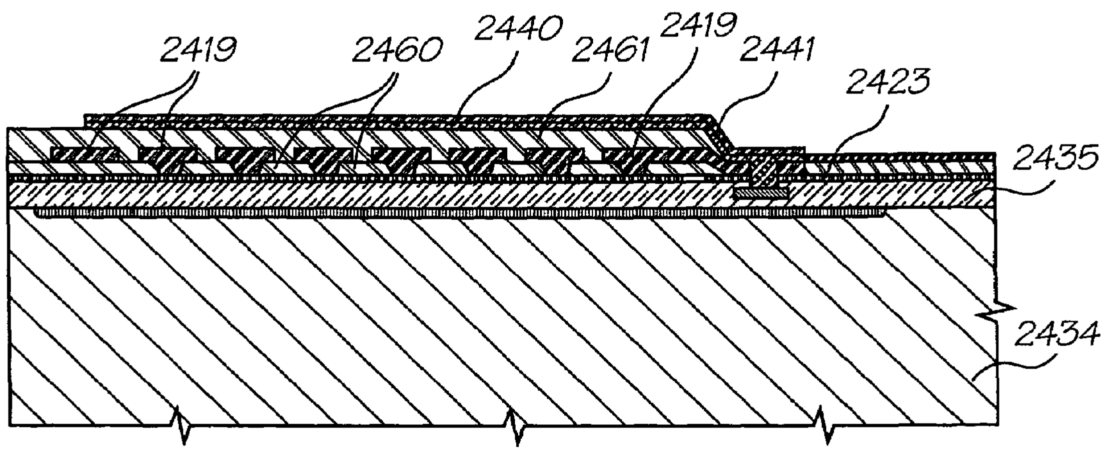

12. Etch the PTFE down to the sacrificial layer using Mask 5. This mask defines the actuator paddle. This step is shown in FIG. 477.

13. Wafer probe. All electrical connections are complete at this point, and the chips are not yet separated.

14. Plasma process the PTFE to make the top and side surfaces of the paddle hydrophilic. This allows the nozzle chamber to fill by capillarity.

15. Deposit 10 microns of sacrificial material 2462.

Figure 478:
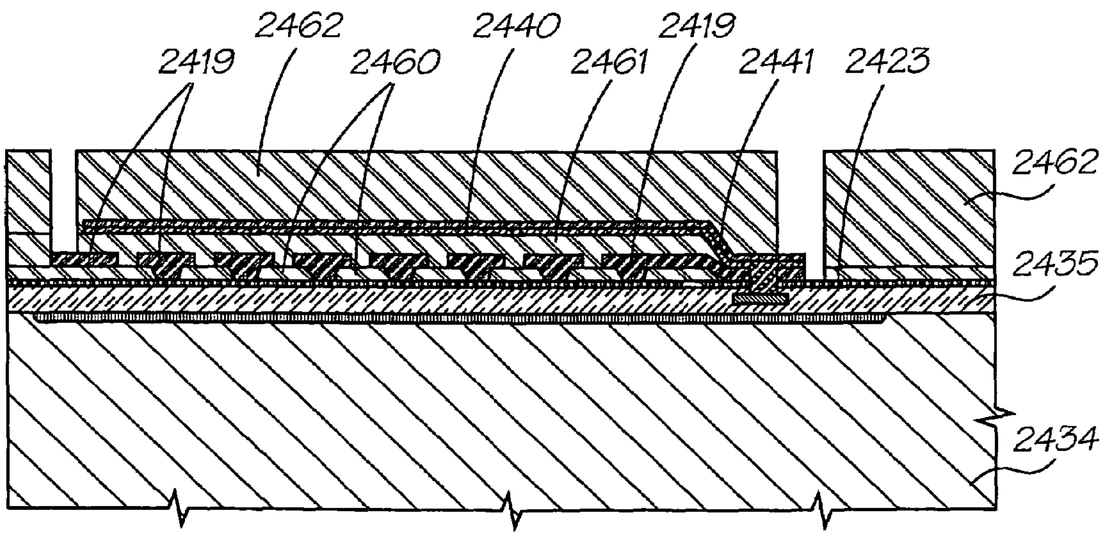

16. Etch the sacrificial material down to nitride using Mask 6. This mask defines the nozzle chamber and inlet filter. This step is shown in FIG. 478.

Figure 479:
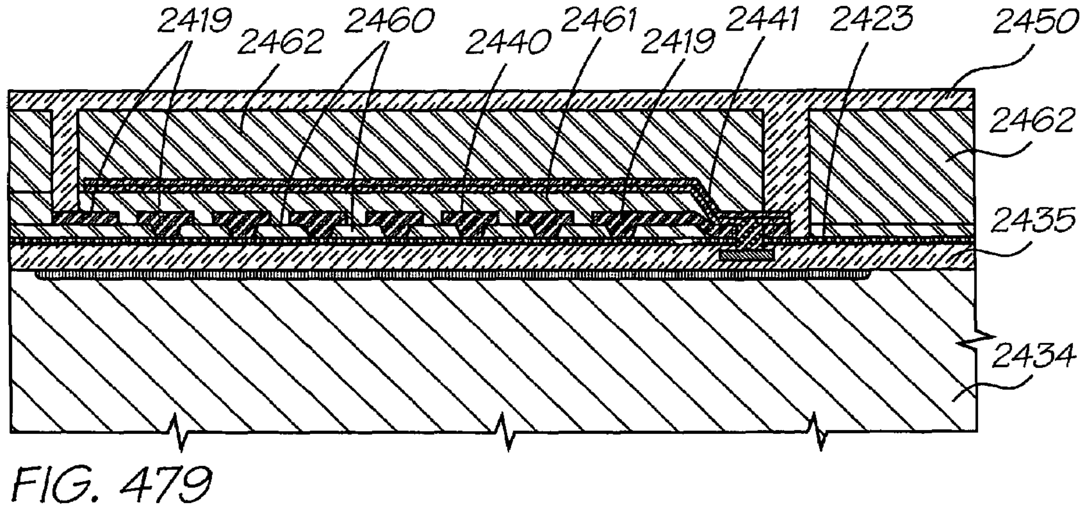

17. Deposit 3 microns of PECVD glass 2450. This step is shown in FIG. 479.

Figure 480:
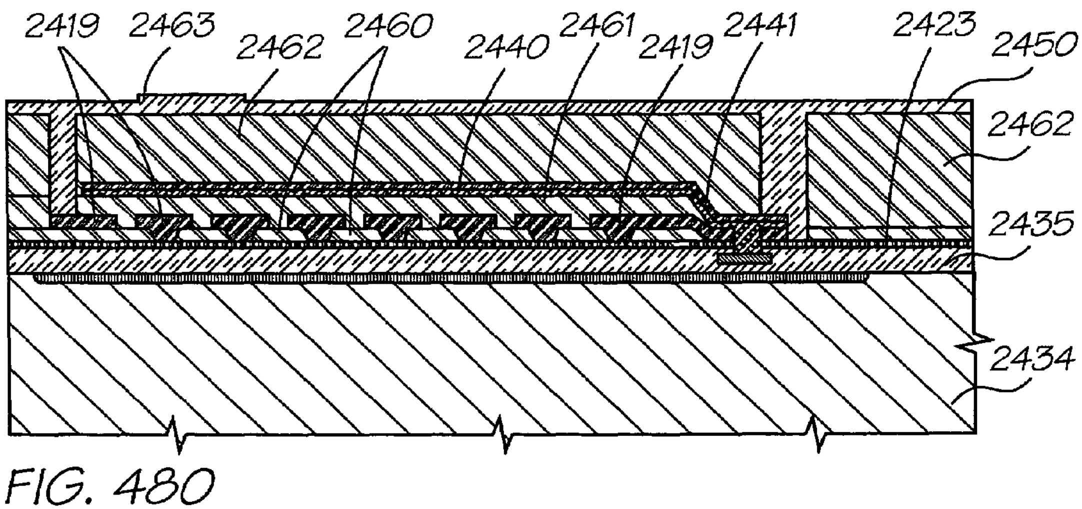

18. Etch to a depth of 1 micron using Mask 7. This mask defines the nozzle rim 2463. This step is shown in FIG. 480.

Figure 481:
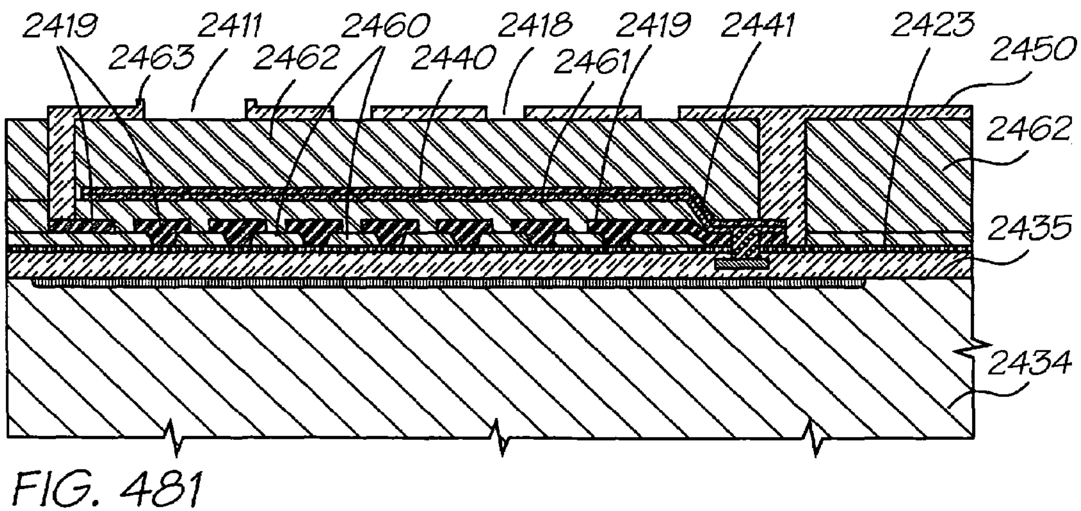

19. Etch down to the sacrificial layer using Mask 8. This mask defines the nozzle 2411 and the sacrificial etch access holes 2418. This step is shown in FIG. 481.

Figure 482:
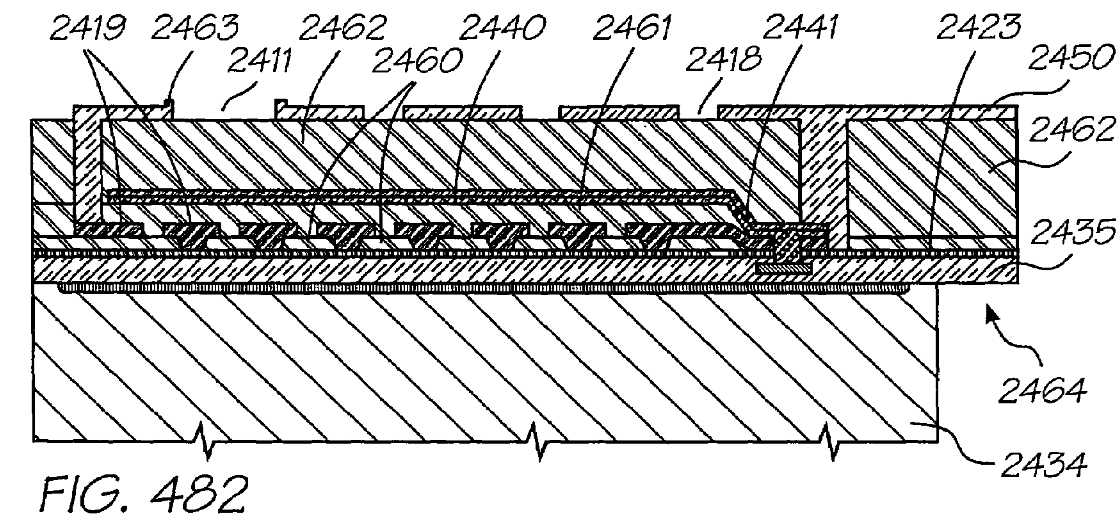

20. Back-etch completely through the silicon wafer (with, for example, an ASE Advanced Silicon Etcher from Surface Technology Systems) using Mask 9. This mask defines the ink inlets 2461 which are etched through the wafer. The wafer is also diced by this etch. This step is shown in FIG. 482.

21. Back-etch the CMOS oxide layers and subsequently deposited nitride layers through to the sacrificial layer using the back-etched silicon as a mask.

Figure 483:
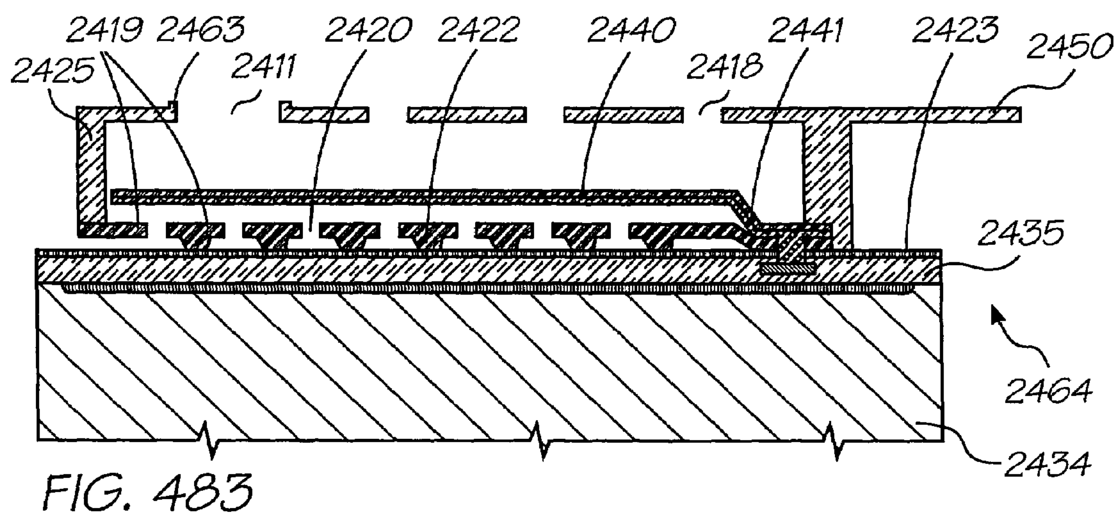

22. Etch the sacrificial material. The nozzle chambers are cleared, the actuators freed, and the chips are separated by this etch This step is shown in FIG. 483.

23. Mount the printheads in their packaging, which may be a molded plastic former incorporating ink channels which supply the appropriate color ink to the ink inlets at the back of the wafer.

24. Connect the printheads to their interconnect systems. For a low profile connection with minimum disruption of airflow, TAB may be used. Wire bonding may also be used if the printer is to be operated with sufficient clearance to the paper.

25. Hydrophobize the front surface of the printheads.

Figure 484:
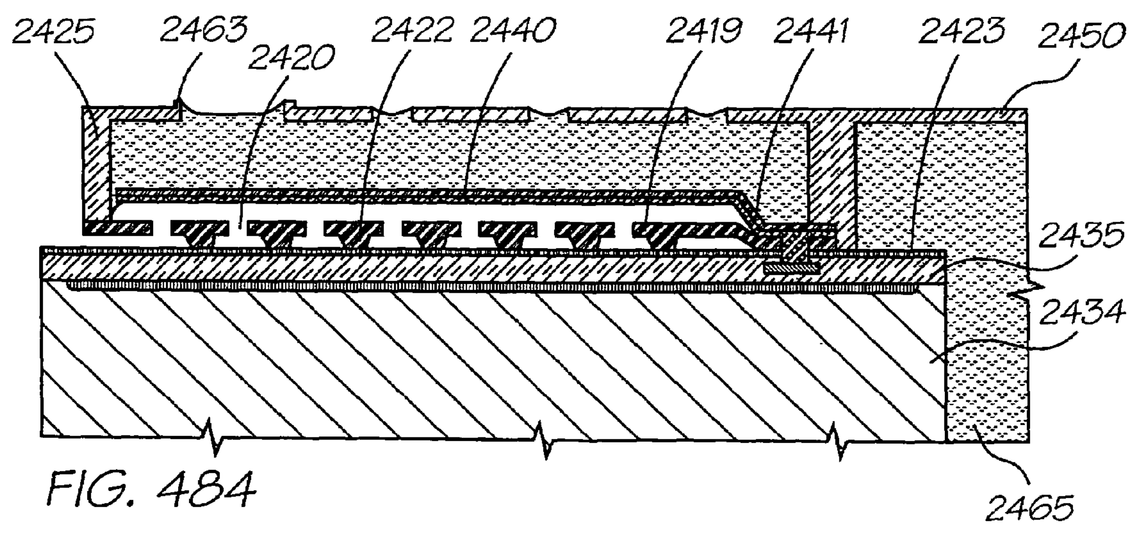

26. Fill the completed printheads with ink 2465 and test them. A filled nozzle is shown in FIG. 484.

IJ25

In a preferred embodiment, there is provided a nozzle chamber having an ink ejection port and a magnetostrictive actuator surrounded by an electrical coil such that, upon activation of the coil, a magnetic field is produced which affects the actuator to the extent that it causes the ejection of ink from the nozzle chamber.

Turning now to FIG. 485, there is illustrated a perspective cross-sectional view, of a single ink jet nozzle arrangement 2510. The nozzle arrangement includes a nozzle chamber 2511 which opens to a nozzle ejection port 2512 for the ejection of ink.

The nozzle 2510 can be formed on a large silicon wafer with multiple printheads being formed from nozzle groups at the same time. The ejection port 2512 can be formed from back etching the silicon wafer to the level of a boron doped epitaxial layer 2513 which is subsequently etched using an appropriate mask to form the nozzle portal 2512 including a rim 2515. The nozzle chamber 2511 is further formed from a crystallographic etch of the remaining portions of the silicon wafer 2516, the crystallographic etching process being well known in the field of micro-electro-mechanical systems (MEMS).

Turning now to FIG. 486 there is illustrated an exploded perspective view illustrating the construction of a single ink jet nozzle arrangement 2510 in accordance with a preferred embodiment.

On top of the silicon wafer 2516 there is previously constructed a two level metal CMOS layer 2517, 2518 which includes an aluminum layer (not shown). The CMOS layer 2517, 2518 is constructed to provide data and control circuitry for the ink jet nozzle 2510. On top of the CMOS layer 2517, 2518 is constructed a nitride passivation layer 2520 which includes nitride paddle portion 2521. The nitride layer 2521 can be constructed by using a sacrificial material such as glass to first fill the crystallographic etched nozzle chamber 2511 then depositing the nitride layer 2520, 2521 before etching the sacrificial layer away to release the nitride layer 2521. On top of the nitride layer 2521 is formed a Terfenol-D layer 2522. Terfenol-D is a material having high magnetostrictive properties (for further information on the properties of Terfenol-D, reference is made to "magnetostriction, theory and applications of magnetoelasticity" by Etienne du Trémolett de Lachiesserie published 1993 by CRC Press). Upon it being subject to a magnetic field, the Terfenol-D substance expands. The Terfenol-D layer 2522 is attached to a lower nitride layer 2521 which does not undergo expansion. As a result the forces are resolved by a bending of the nitride layer 2521 towards the nozzle ejection hole 2512 thereby causing the ejection of ink from the ink ejection portal 2512.

The Terfenol-D layer 2522 is passivated by a top nitride layer 2523 on top of which is a copper coil layer 2524 which is interconnected to the lower CMOS layer 2517 via a series of vias so that copper coil layer 2524 can be activated upon demand. The activation of the copper coil layer 2524 induces a magnetic field across the Terfenol-D layer 2522 thereby causing the Terfenol-D layer 2522 to undergo phase change on demand. Therefore, in order to eject ink from the nozzle chamber 2511, the Terfenol-D layer 2522 is activated to undergo phase change causing the bending of actuator 2526 (FIG. 485) in the direction of the ink ejection port 2512 thereby causing the ejection of ink drops. Upon deactivation of the upper coil layer 2524 the actuator 2526 (FIG. 485) returns to its quiescent position drawing some of the ink back into the nozzle chamber causing an ink ligament connecting the ink drop to the ink in the nozzle chamber to thin. The forward velocity of the drop and backward velocity of the ink in the nozzle chamber 2511 are resolved by the ink drop breaking off from the ink in the nozzle chamber 2511. Ink refill of the nozzle chamber 2511 is via the sides of actuator 2526 (FIG. 485) as a result of the surface tension of the ink meniscus at the ejection port 2512.

The copper layer 2524 is passivated by a nitride layer (not shown) and the nozzle arrangement 2510 abuts an ink supply reservoir 2528 (FIG. 485).

A method of ejecting ink from the nozzle chamber 2511 comprises providing the actuator 2526 formed of magnetostrictive material as a wall of the chamber 2511 and then effecting a phase transformation of the magnetostrictive material in the magnetic field by activating the copper coil layer 2524 (or vice versa). This in turn causes the ejection of ink from nozzle chamber 2511 via ejection port 2512.

The actuator 2526 comprises a magnetostrictive paddle which transfers from the quiescent state as shown in FIG. 485 to an ink ejection state upon application of the magnetic field. The actuator 2526 moves downwardly in the direction of the arrow shown in FIG. 485 toward the ejection port 2512.

The magnetic field is applied by passing a current through the copper coil layer 2524 adjacent to the actuator 2526. The actuator 2526 as shown in FIG. 485 forms one wall of the chamber 2511 opposite the ink ejection port 2512 from which ink is ejected.

The ink ejection port 2512 is formed by back etching a silicon wafer to an epitaxial layer and etching a nozzle portal in the epitaxial layer. The crystallographic etch provides side wall slots of non-etched layers of a processed silicon wafer so as to extend dimensionally chamber 2511 as a result of the crystallographic etch process. As a result, side walls of the chamber 2511 as shown in FIG. 485 have an upwardly, outwardly tapered profile.

One form of detailed manufacturing process which can be used to fabricate monolithic ink jet printheads operating in accordance with the principles taught by the present embodiment can proceed utilizing the following steps:

1. Using a double sided polished wafer 2530 deposit 3 microns of epitaxial silicon 2513 heavily doped with boron.

2. Deposit 20 microns of epitaxial silicon 2516, either p-type or n-type, depending upon the CMOS process used.

Figure 488:
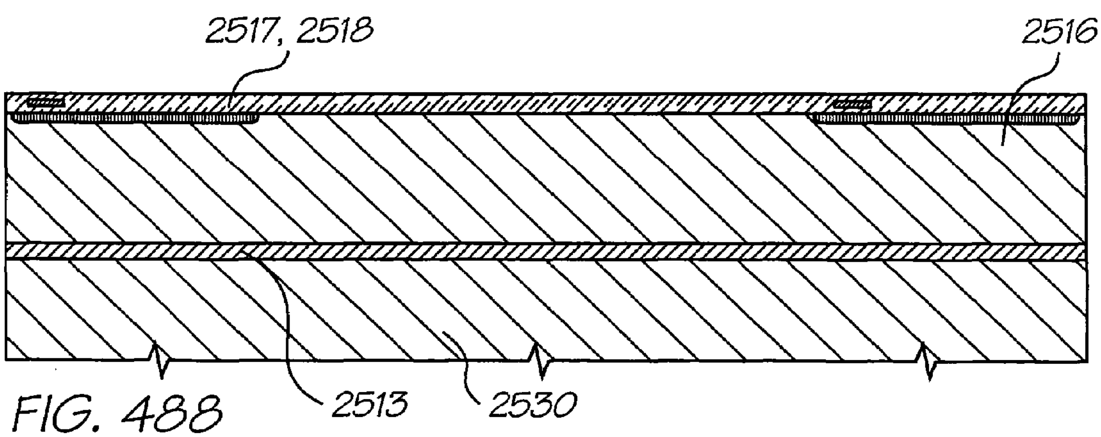

3. Complete drive transistors, data distribution, and timing circuits using a 0.5 micron, one poly, 2 metal CMOS process 2517, 2518. The metal layers are copper instead of aluminum, due to high current densities and subsequent high temperature processing. Relevant features of the wafer at this step are shown in FIG. 488. For clarity, these diagrams may not be to scale, and may not represent a cross section though any single plane of the nozzle. FIG. 487 is a key to representations of various materials in these manufacturing diagrams, and those of other cross referenced ink jet configurations.

Figure 489:
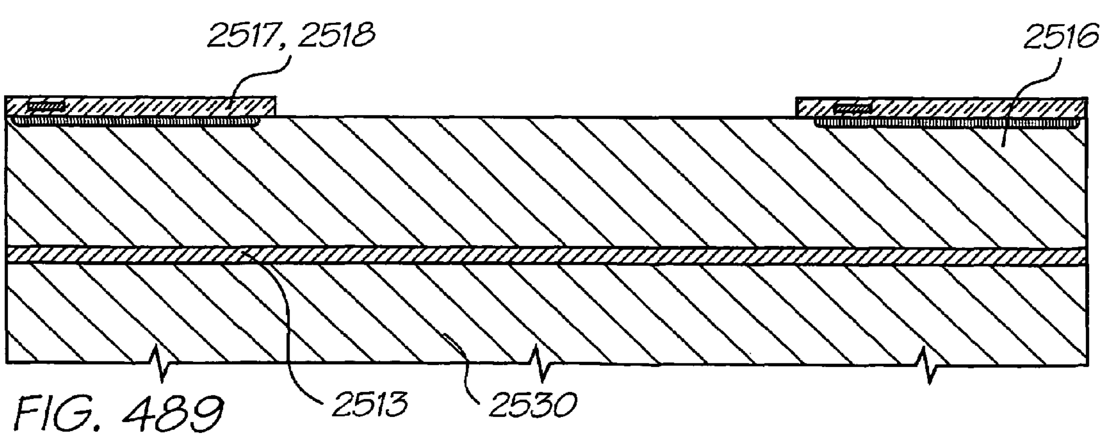

4. Etch the CMOS oxide layers down to silicon using Mask 1. This mask defines the nozzle chamber 2511. This step is shown in FIG. 489.

5. Deposit 1 micron of low stress PECVD silicon nitride ($Si_3N_4$) 2520.

6. Deposit a seed layer of Terfenol-D.

Figure 490:
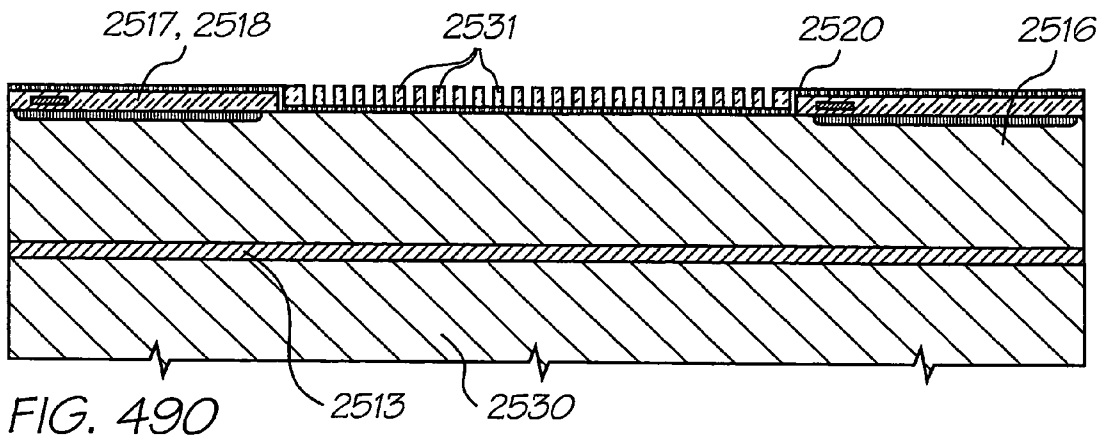

7. Deposit 3 microns of resist 2531 and expose using Mask 2. This mask defines the actuator beams. The resist forms a mold for electroplating of the Terfenol-D. This step is shown in FIG. 490.

8. Electroplate 2 microns of Terfenol-D 2522.

Figure 491:
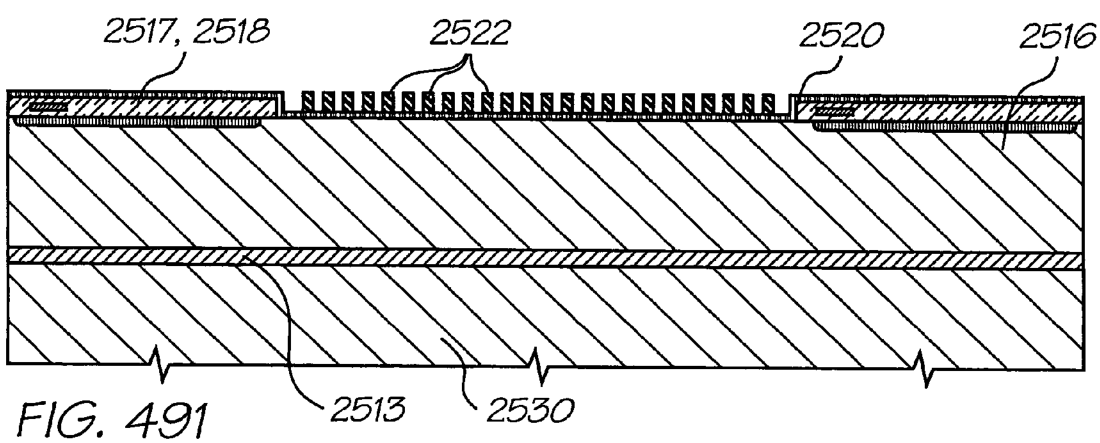

9. Strip the resist and etch the seed layer. This step is shown in FIG. 491.

Figure 492:
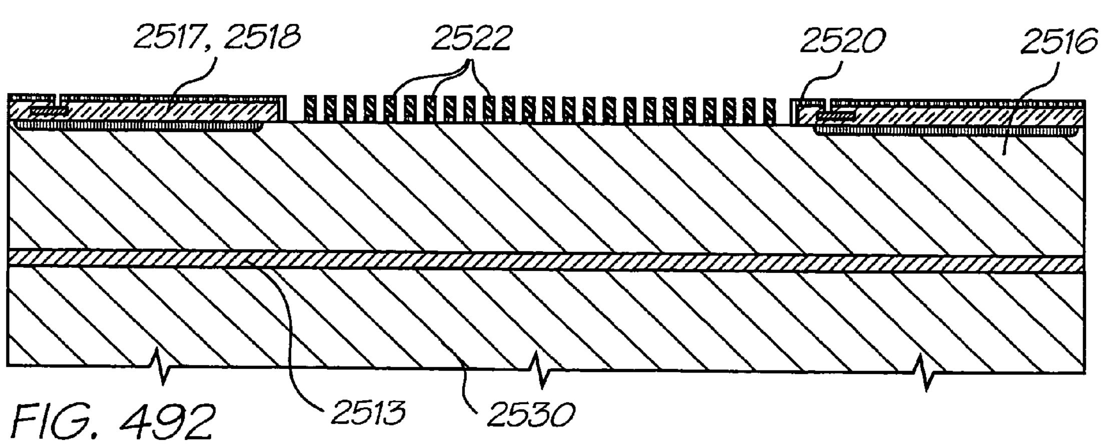

10. Etch the nitride layer 2520 using Mask 3. This mask defines the actuator beams and the nozzle chamber 2511, as well as the contact vias from the solenoid coil 2524 to the second-level metal contacts. This step is shown in FIG. 492.

11. Deposit a seed layer of copper.

Figure 493:
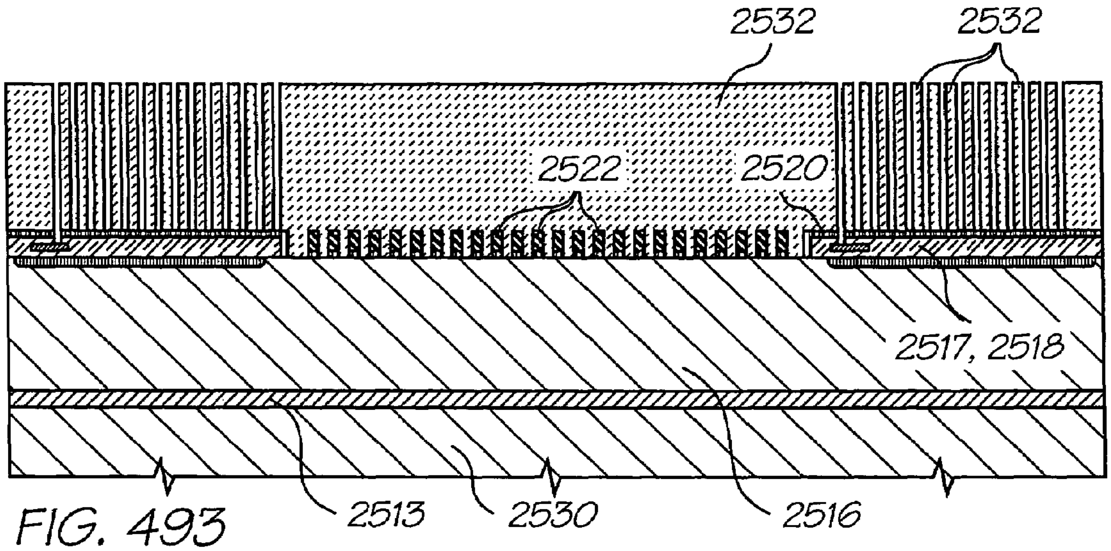

12. Deposit 22 microns of resist 2532 and expose using Mask 4. This mask defines the solenoid, and should be exposed using an x-ray proximity mask, as the aspect ratio is very large. The resist forms a mold for electroplating of the copper. This step is shown in FIG. 493.

13. Electroplate 20 microns of copper 2533.

Figure 494:
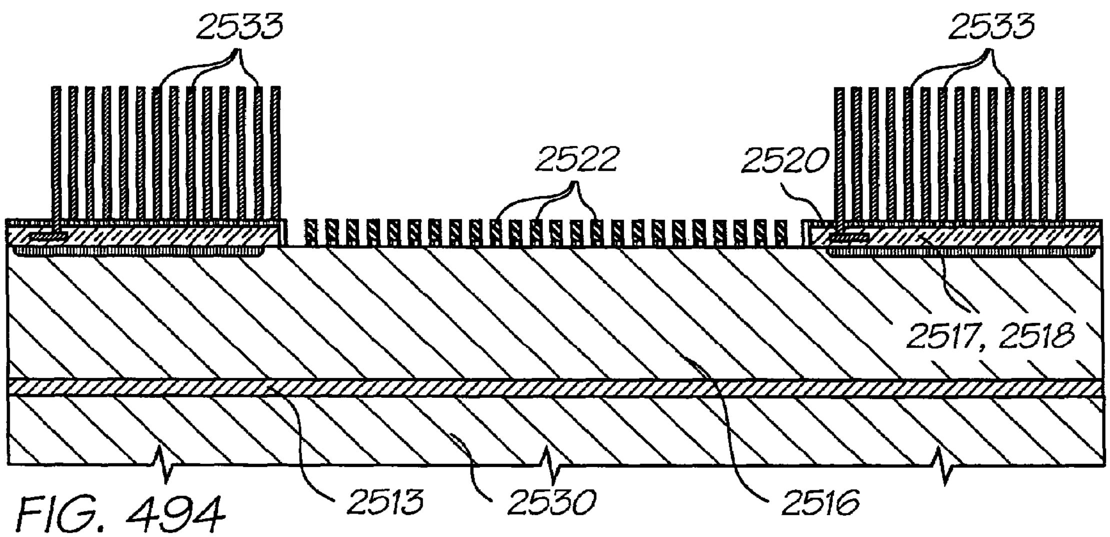

14. Strip the resist and etch the copper seed layer. Steps 10 to 13 form a LIGA process. This step is shown in FIG. 494.

Figure 495:
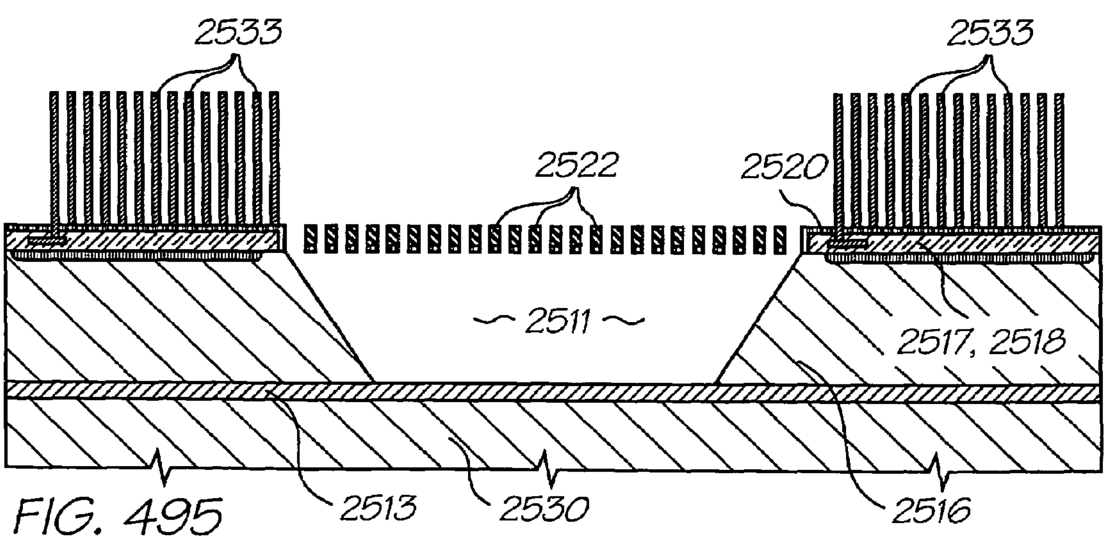

15. Crystallographically etch the exposed silicon using, for example, KOH or EDP (ethylenediamine pyrocatechol). This etch stops on <111> crystallographic planes, and on the boron doped silicon buried layer 2513. This step is shown in FIG. 495.

16. Deposit 0.1 microns of ECR diamond like carbon (DLC) as a corrosion barrier (not shown).

17. Open the bond pads using Mask 5.

18. Wafer probe. All electrical connections are complete at this point, bond pads are accessible, and the chips are not yet separated.

Figure 496:
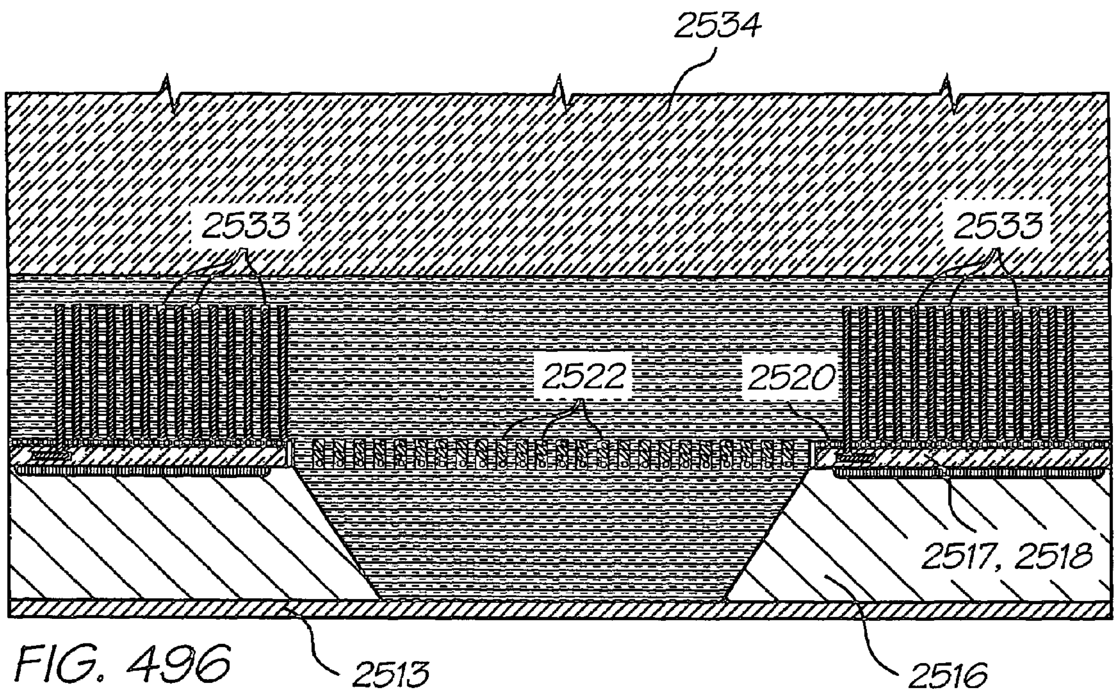

19. Mount the wafer 2516 on a glass blank 2534 and back-etch the wafer 2516 using KOH with no mask. This etch thins the wafer 2516 and stops at the buried boron doped silicon layer 2513. This step is shown in FIG. 496.

Figure 497:
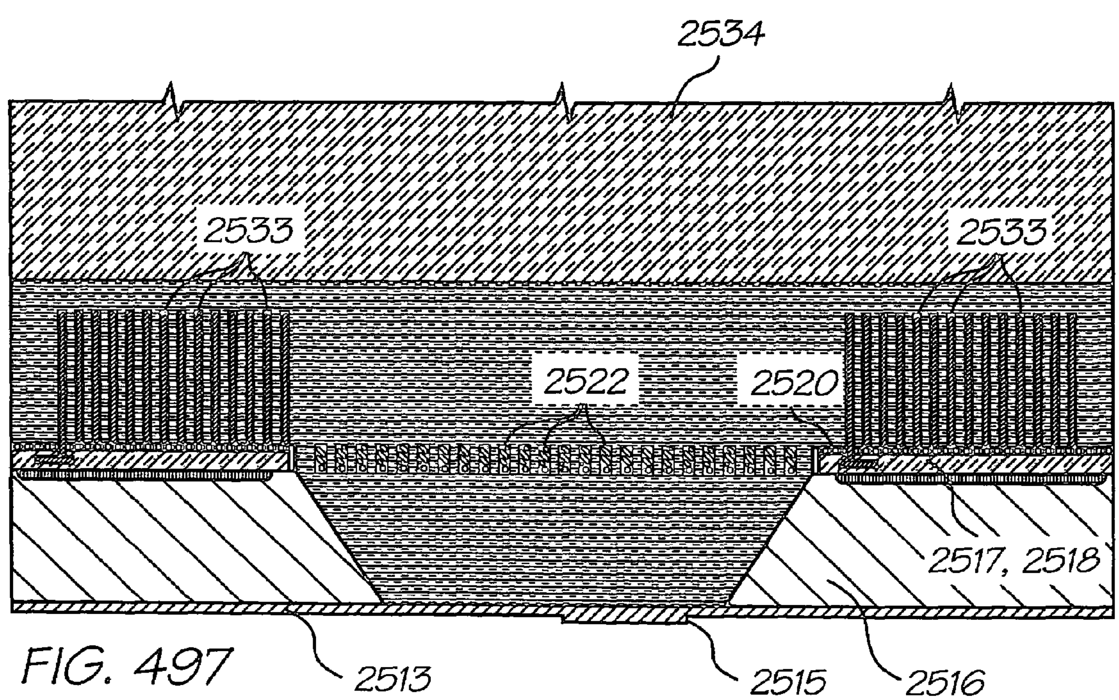

20. Plasma back-etch the boron doped silicon layer 2513 to a depth of 1 micron using Mask 6. This mask defines the nozzle rim 2515. This step is shown in FIG. 497.

Figure 498:
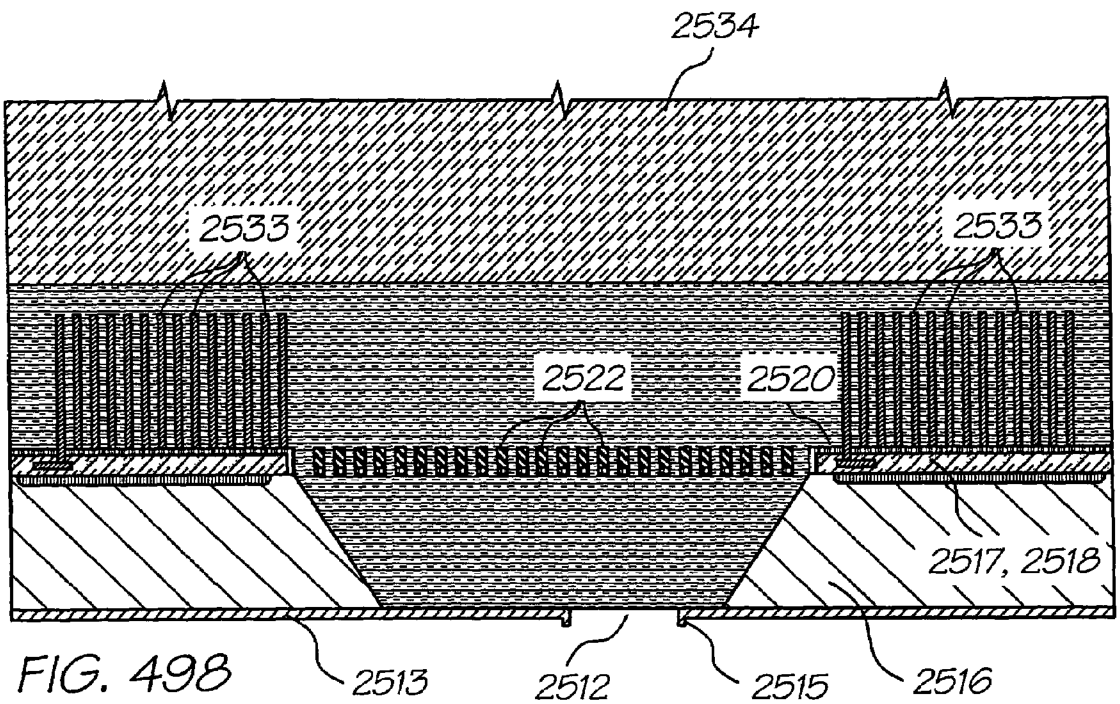

21. Plasma back-etch through the boron doped layer 2513 using Mask 6. This mask defines the nozzle 2512, and the edge of the chips. Etch the thin ECR DLC layer through the nozzle hole 2512. This step is shown in FIG. 498.

22. Strip the adhesive layer to detach the chips from the glass blank 2534.

23. Mount the printheads in their packaging, which may be a molded plastic former incorporating ink channels which supply different colors of ink to the appropriate regions of the front surface of the wafer.

24. Connect the printheads to their interconnect systems.

25. Hydrophobize the front surface of the printheads.

Figure 499:
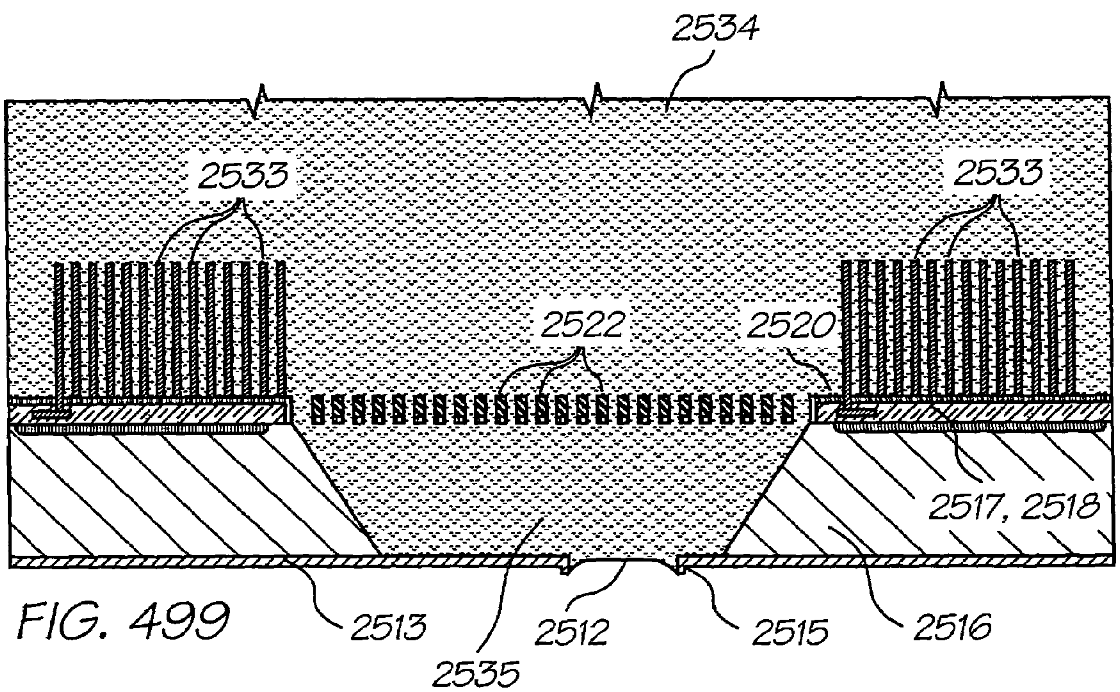

26. Fill the completed printheads with ink 2535 and test them. A filled nozzle is shown in FIG. 499.

IJ26

In a preferred embodiment, shape memory materials are utilized to construct an actuator suitable for injecting ink from the nozzle of an ink chamber.

Turning to FIG. 500, there is illustrated an exploded perspective view of a single ink jet nozzle 2610 as constructed in accordance with a preferred embodiment The ink jet nozzle 2610 is constructed from a silicon wafer base utilizing back etching of the wafer to a boron doped epitaxial layer. Hence, the ink jet nozzle 2610 comprises a lower layer 2611 which is constructed from boron doped silicon. The boron doped silicon layer is also utilized a crystallographic etch stop layer. The next layer comprises the silicon layer 2612 that includes a crystallographic pit 2613 having side walls etch at the usual angle of 54.74 degrees. The layer 2612 also includes the various required circuitry and transistors for example, CMOS layer (not shown). After this, a 0.5 micron thick thermal silicon oxide layer 2615 is grown on top of the silicon wafer 2612.

After this, comes various layers which can comprise a two level metal CMOS process layers which provide the metal interconnect for the CMOS transistors formed within the layer 2612. The various metal pathways etc. are not shown in FIG. 500 but for two metal interconnects 2618, 2619 which provide interconnection between a shape memory alloy layer 2620 and the CMOS metal layers 2616. The shape memory metal layer is next and is shaped in the form of a serpentine coil to be heated by end interconnect/via portions 2621, 2623. A top nitride layer 2622 is provided for overall passivation and protection of lower layers in addition to providing a means of inducing tensile stress to curl upwards the shape memory alloy layer 2620 in its quiescent state.

A preferred embodiment relies upon the thermal transition of a shape memory alloy 2620 (SMA) from its martensitic phase to its austenitic phase. The basis of a shape memory effect is a martensitic transformation which creates a polydemane phase upon cooling. This polydemane phase accommodates finite reversible mechanical deformations without significant changes in the mechanical self energy of the system. Hence, upon re-transformation to the austenitic state the system returns to its former macroscopic state to displaying the well known mechanical memory. The thermal transition is achieved by passing an electrical current through the SMA. The actuator layer 2620 is suspended at the entrance to a nozzle chamber connected via leads 2618, 2619 to the lower layers.

In FIG. 501, there is shown a cross-section of a single nozzle 2610 when in its actuated state, the section basically being taken through the line A-A of FIG. 500. The actuator 2630 is bent away from the nozzle when in its actuated state. In FIG. 502, there is shown a corresponding cross-section for a single nozzle 2610 when in a quiescent state. When energized, the actuator 2630 straightens, with the corresponding result that the ink is pushed out of the nozzle. The process of energizing the actuator 2630 requires supplying enough energy to raise the SMA above its transition temperature, and to provide the latent heat of transformation to the SMA 2620.

Obviously, the SMA martensitic phase must be pre-stressed to achieve a different shape from the austenitic phase. For printheads with many thousands of nozzles, it is important to achieve this pre-stressing in a bulk manner. This is achieved by depositing the layer of silicon nitride 2622 using Plasma Enhanced Chemical Vapour Deposition (PECVD) at around 300° C. over the SMA layer. The deposition occurs while the SMA is in the austenitic shape. After the printhead cools to room temperature the substrate under the SMA bend actuator is removed by chemical etching of a sacrificial substance. The silicon nitride layer 2622 is under tensile stress, and causes the actuator to curl upwards. The weak martensitic phase of the SMA provides little resistance to this curl. When the SMA is heated to its austenitic phase, it returns to the flat shape into which it was annealed during the nitride deposition. The transformation being rapid enough to result in the ejection of ink from the nozzle chamber.

There is one SMA bend actuator 2630 for each nozzle. One end 2631 of the SMA bend actuator is mechanically connected to the substrate. The other end is free to move under the stresses inherent in the layers.

Returning to FIG. 500 the actuator layer is therefore composed of three layers:

1. An $SiO_2$ lower layer 2615. This layer acts as a stress 'reference' for the nitride tensile layer. It also protects the SMA from the crystallographic silicon etch that forms the nozzle chamber. This layer can be formed as part of the standard CMOS process for the active electronics of the printhead.

2. A SMA heater layer 2620. A SMA such as nickel titanium (NiTi) alloy is deposited and etched into a serpentine form to increase the electrical resistance.

3. A silicon nitride top layer 2622. This is a thin layer of high stiffness which is deposited using PECVD. The nitride stoichiometry is adjusted to achieve a layer with significant tensile stress at room temperature relative to the $SiO_2$ lower layer. Its purpose is to bend the actuator at the low temperature martensitic phase.

As noted previously the ink jet nozzle of FIG. 500 can be constructed by utilizing a silicon wafer having a buried boron epitaxial layer. The 0.5 micron thick dioxide layer 2615 is then formed having side slots 2645 which are utilized in a subsequent crystallographic etch. Next, the various CMOS layers 2616 are formed including drive and control circuitry (not shown). The SMA layer 2620 is then created on top of layers 2615/2616 and being interconnected with the drive circuitry. Subsequently, a silicon nitride layer 2622 is formed on top. Each of the layers 2615, 2616, 2622 include the various slots e.g. 2645 which are utilized in a subsequent crystallographic etch. The silicon wafer is subsequently thinned by means of back etching with the etch stop being the boron layer 2611. Subsequent boron etching forms the nozzle hole e.g. 2647 and rim 2646 (FIG. 502). Subsequently, the chamber proper is formed by means of a crystallographic etch with the slots 2645 defining the extent of the etch within the silicon oxide layer 2612.

A large array of nozzles can be formed on the same wafer which in turn is attached to an ink chamber for filling the nozzle chambers.

One form of detailed manufacturing process which can be used to fabricate monolithic ink jet printheads operating in accordance with the principles taught by the present embodiment can proceed utilizing the following steps:

1. Using a double sided polished wafer 2650 deposit 3 microns of epitaxial silicon heavily doped with boron 2611.

2. Deposit 10 microns of epitaxial silicon 2612, either p-type or n-type, depending upon the CMOS process used.

Figure 504:
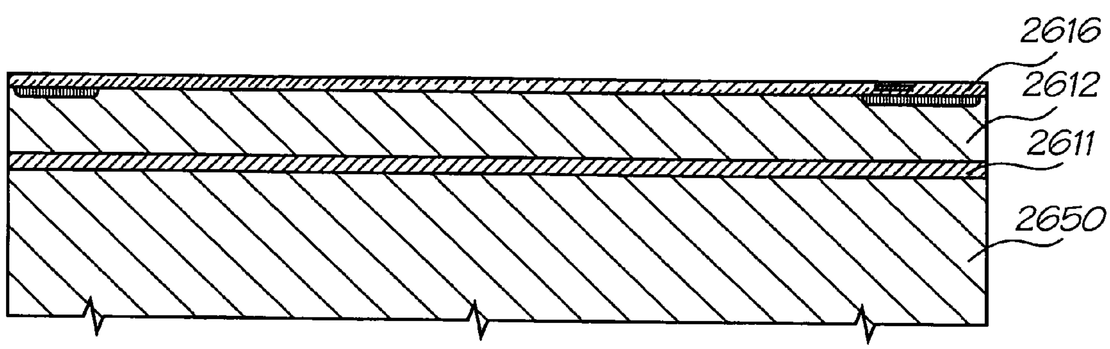

3. Complete drive transistors, data distribution, and timing circuits using a 0.5 micron, one poly, 2 metal CMOS process 2616. This step is shown in FIG. 504. For clarity, these diagrams may not be to scale, and may not represent a cross section though any single plane of the nozzle. FIG. 503 is a key to representations of various materials in these manufacturing diagrams, and those of other cross referenced ink jet configurations.

Figure 505:
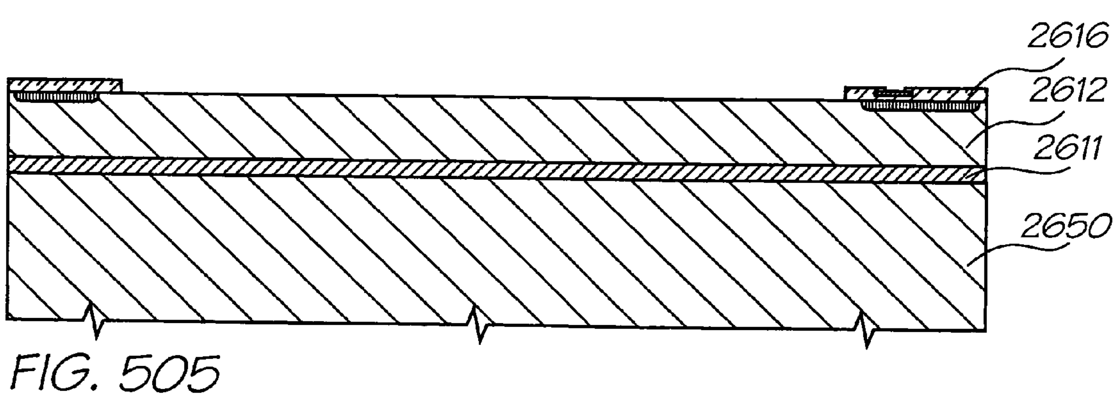

4. Etch the CMOS oxide layers down to silicon or aluminum using Mask 1. This mask defines the nozzle chamber, and the edges of the printheads chips. This step is shown in FIG. 505.

Figure 506:
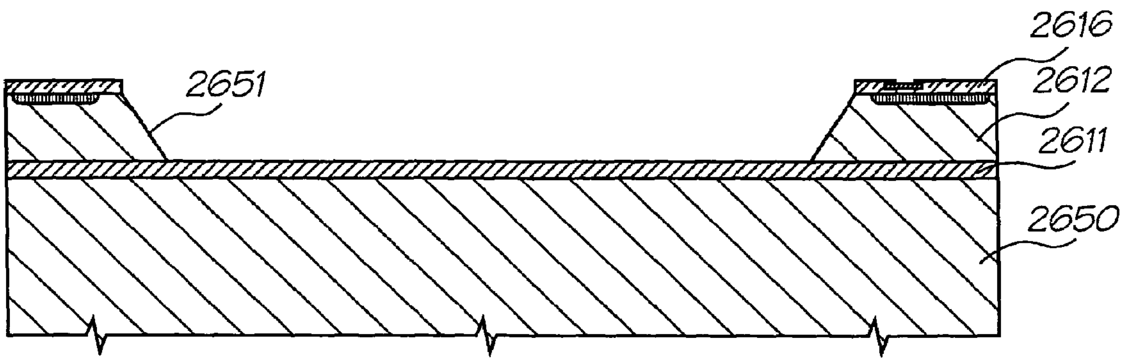

5. Crystallographically etch the exposed silicon using, for example, KOH or EDP (ethylenediamine pyrocatechol). This etch stops on <111> crystallographic planes 2651, and on the boron doped silicon buried layer. This step is shown in FIG. 506.

Figure 507:
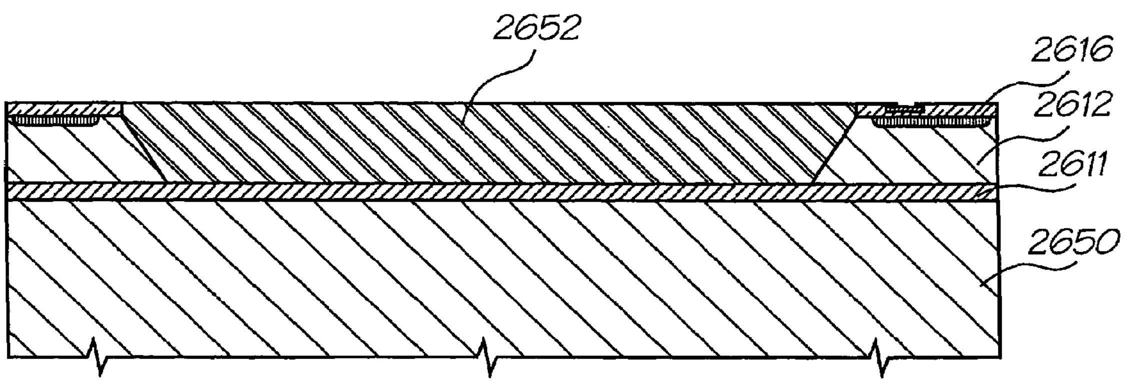

6. Deposit 12 microns of sacrificial material 2652. Planarize down to oxide using CMP. The sacrificial material temporarily fills the nozzle cavity. This step is shown in FIG. 507.

7. Deposit 0.1 microns of high stress silicon nitride ($Si_3N_4$).

8. Etch the nitride layer using Mask 2. This mask defines the contact vias from the shape memory heater to the second-level metal contacts.

9. Deposit a seed layer.

Figure 508:
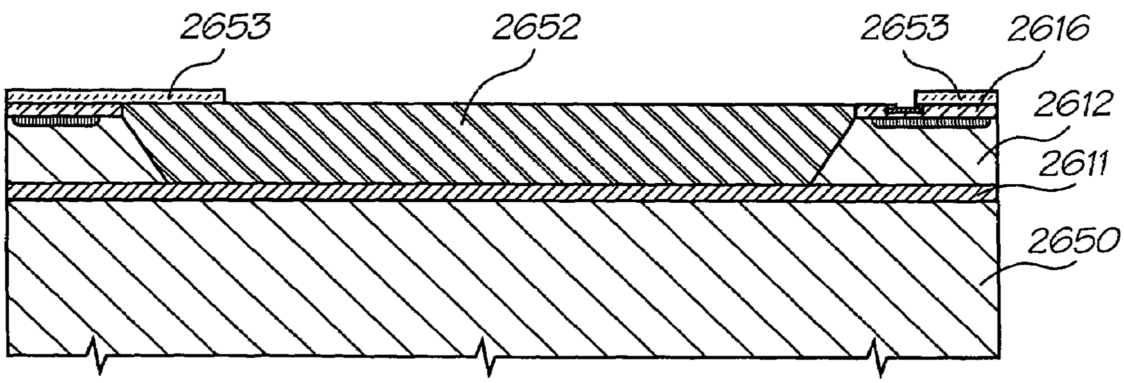

10. Spin on 2 microns of resist 2653; expose with Mask 3, and develop. This mask defines the shape-memory wire embedded in the paddle. The resist acts as an electroplating mold. This step is shown in FIG. 508.

11. Electroplate 1 micron of Nitinol 2655. Nitinol is a 'shape memory' alloy of nickel and titanium, developed at the Naval Ordnance Laboratory in the US (hence Ni—Ti—NOL). A shape memory alloy can be thermally switched between its weak martensitic state and its high stiffness austenic state.

Figure 509:
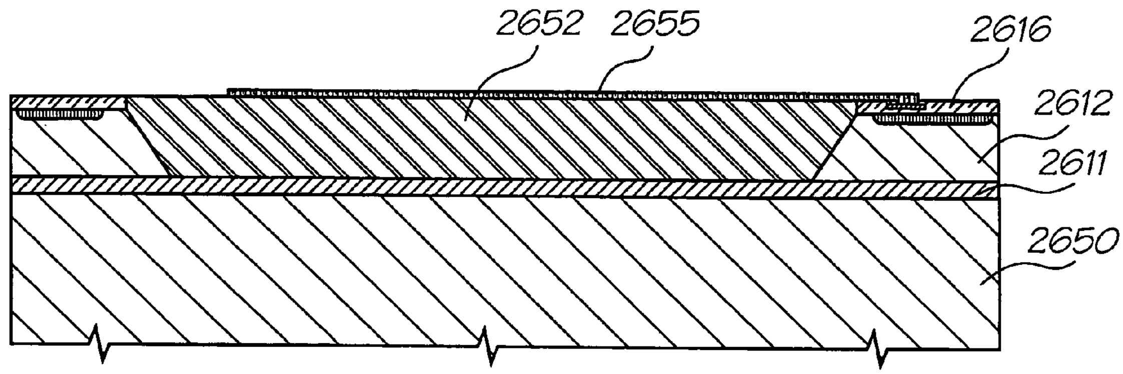

12. Strip the resist and etch the exposed seed layer. This step is shown in FIG. 509.

13. Wafer probe. All electrical connections are complete at this point, bond pads are accessible, and the chips are not yet separated.

14. Deposit 0.1 microns of high stress silicon nitride. High stress nitride is used so that once the sacrificial material is etched, and the paddle is released, the stress in the nitride layer will bend the relatively weak martensitic phase of the shape memory alloy. As the shape memory alloy—in its austenic phase—is flat when it is annealed by the relatively high temperature deposition of this silicon nitride layer, it will return to this flat state when electrothermally heated.

Figure 510:
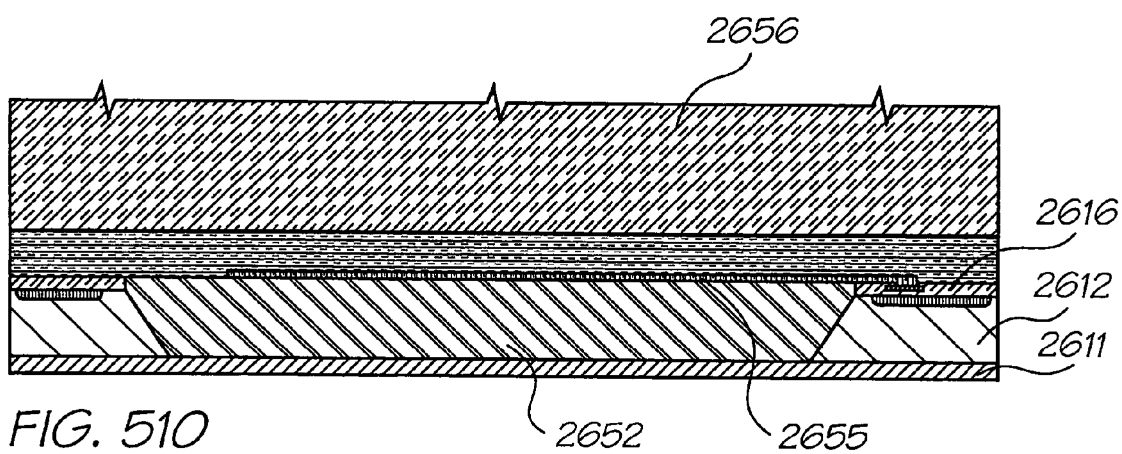

15. Mount the wafer on a glass blank 2656 and back-etch the wafer using KOH with no mask. This etch thins the wafer and stops at the buried boron doped silicon layer. This step is shown in FIG. 510.

Figure 511:
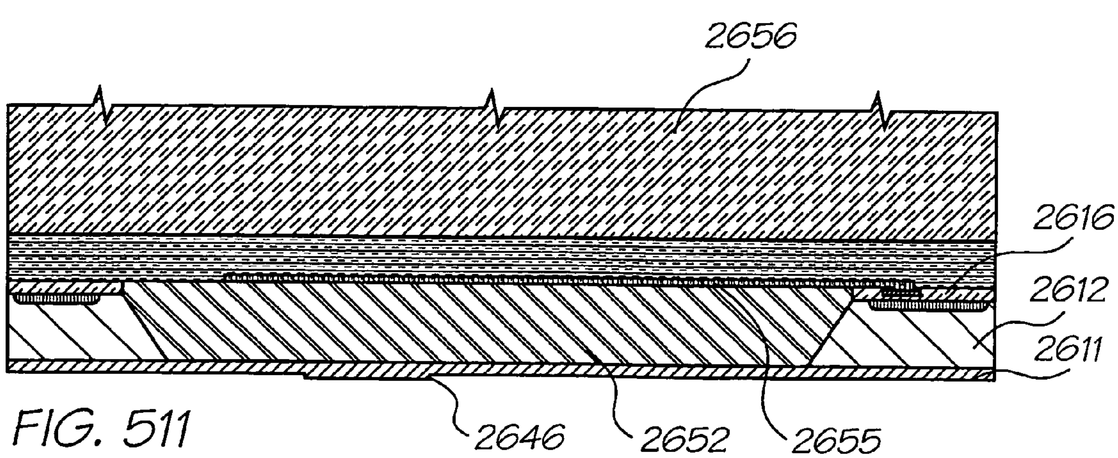

16. Plasma back-etch the boron doped silicon layer to a depth of 1 micron using Mask 4. This mask defines the nozzle rim 2646. This step is shown in FIG. 511.

Figure 512:
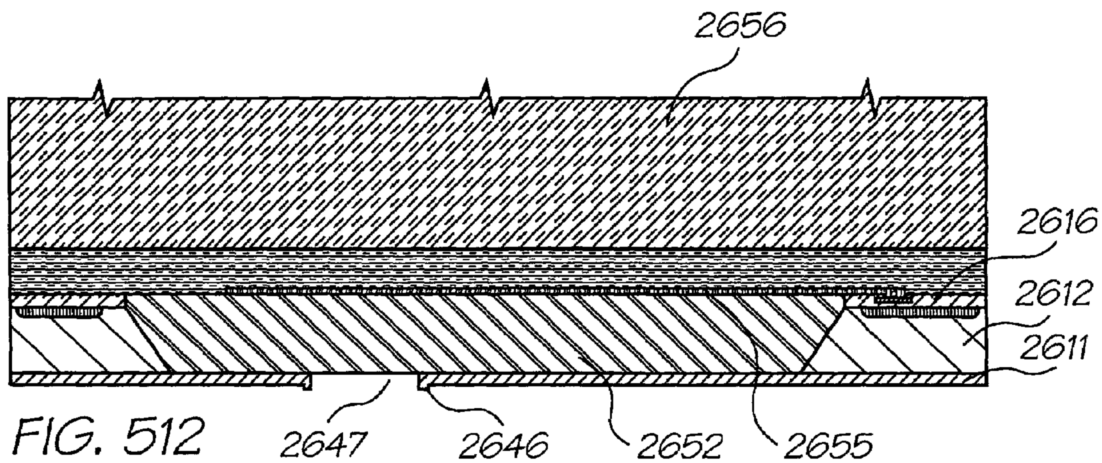

17. Plasma back-etch through the boron doped layer using Mask 5. This mask defines the nozzle 2647, and the edge of the chips. At this stage, the chips are still mounted on the glass blank. This step is shown in FIG. 512.

Figure 513:
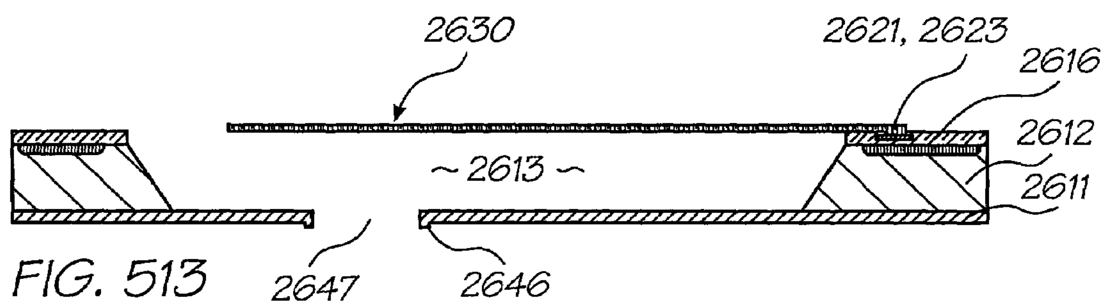

18. Strip the adhesive layer to detach the chips from the glass blank. Etch the sacrificial layer. This process completely separates the chips. This step is shown in FIG. 513.

19. Mount the printheads in their packaging, which may be a molded plastic former incorporating ink channels which supply different colors of ink to the appropriate regions of the front surface of the wafer.

20. Connect the printheads to their interconnect systems.

21. Hydrophobize the front surface of the printheads.

Figure 514:
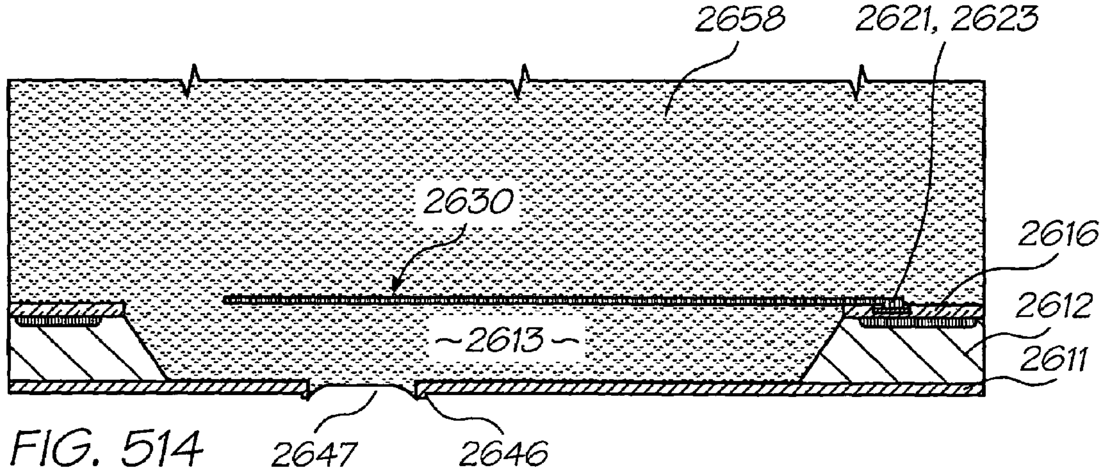

22. Fill with ink 2658 and test the completed printheads. A filled nozzle is shown in FIG. 514.

IJ27

In a preferred embodiment, a "roof shooting" ink jet printhead is constructed utilizing a buckle plate actuator for the ejection of ink. In a preferred embodiment, the buckle plate actuator is constructed from polytetrafluoroethylene (PTFE) which provides superior thermal expansion characteristics. The PTFE is heated by an integral, serpentine shaped heater, which preferably is constructed from a resistive material, such as copper.

Turning now to FIG. 515 there is shown a sectional perspective view of an ink jet printhead 2701 of a preferred embodiment. The ink jet printhead includes a nozzle chamber 2702 in which ink is stored to be ejected. The chamber 2702 can be independently connected to an ink supply (not shown) for the supply and refilling of the chamber. At the base of the chamber 2702 is a buckle plate 2703 which comprises a heater element 2704 which can be of an electrically resistive material such as copper. The heater element 2704 is encased in a polytetrafluoroethylene layer 2705. The utilization of the PTFE layer 2705 allows for high rates of thermal expansion and therefore more effective operation of the buckle plate 2703. PTFE has a high coefficient of thermal expansion ($770\times10^{-6}$) with the copper having a much lower degree of thermal expansion. The copper heater element 2704 is therefore fabricated in a serpentine pattern so as to allow the expansion of the PTFE layer to proceed unhindered. The serpentine fabrication of the heater element 2704 means that the two coefficients of thermal expansion of the PTFE and the heater material need not be closely matched. The PTFE is primarily chosen for its high thermal expansion properties.

Current can be supplied to the buckle plate 2703 by means of connectors 2707, 2708 which inter-connect the buckle plate 2703 with a lower drive circuitry and logic layer 2726. Hence, to operate the ink jet head 2701, the heater coil 2704 is energized thereby heating the PTFE 2705. The PTFE 2705 expands and buckles between end portions 2712, 2713. The buckle causes initial ejection of ink out of a nozzle 2715 located at the top of the nozzle chamber 2702. There is an air bubble between the buckle plate 2703 and the adjacent wall of the chamber which forms due to the hydrophobic nature of the PTFE on the back surface of the buckle plate 2703. An air vent 2717 connects the air bubble to the ambient air through a channel 2718 formed between a nitride layer 2719 and an additional PTFE layer 2720, separated by posts, e.g. 2721, and through holes, e.g. 2722, in the PTFE layer 2720. The air vent 2717 allows the buckle plate 2703 to move without being held back by a reduction in air pressure as the buckle plate 2703 expands. Subsequently, power is turned off to the buckle plate 2703 resulting in a collapse of the buckle plate and the sucking back of some of the ejected ink. The forward motion of the ejected ink and the sucking back is resolved by an ink drop breaking off from the main volume of ink and continuing onto a page. Ink refill is then achieved by surface tension effects across the nozzle part 2715 and a resultant inflow of ink into the nozzle chamber 2702 through the grilled supply channel 2716.

Subsequently the nozzle chamber 2702 is ready for refiring.

It has been found in simulations of a preferred embodiment that the utilization of the PTFE layer and serpentine heater arrangement allows for a substantial reduction in energy requirements of operation in addition to a more compact design.

Turning now to FIG. 516, there is provided an exploded perspective view partly in section illustrating the construction of a single ink jet nozzle in accordance with a preferred embodiment The nozzle arrangement 2701 is fabricated on top of a silicon wafer 2725. The nozzle arrangement 2701 can be constructed on the silicon wafer 2725 utilizing standard semi-conductor processing techniques in addition to those techniques commonly used for the construction of micro-electro-mechanical systems (MEMS).

On top of the silicon layer 2725 is deposited a two level CMOS circuitry layer 2726 which substantially comprises glass, in addition to the usual metal layers. Next a nitride layer 2719 is deposited to protect and passivate the underlying layer 2726. The nitride layer 2719 also includes vias for the interconnection of the heater element 2704 to the CMOS layer 2726. Next, a PTFE layer 2720 is constructed having the aforementioned holes, e.g. 2722, and posts, e.g. 2721. The structure of the PTFE layer 2720 can be formed by first laying down a sacrificial glass layer (not shown) onto which the PTFE layer 2720 is deposited. The PTFE layer 2720 includes various features, for example, a lower ridge portion 2727 in addition to a hole 2728 which acts as a via for the subsequent material layers. The buckle plate 2703 (FIG. 515) comprises a conductive layer 2731 and a PTFE layer 2732. A first, thicker PTFE layer is deposited onto a sacrificial layer (not shown). Next, a conductive layer 2731 is deposited including contacts 2729, 2730. The conductive layer 2731 is then etched to form a serpentine pattern. Next, a thinner, second PTFE layer is deposited to complete the buckle plate 2703 (FIG. 515) structure.

Finally, a nitride layer can be deposited to form the nozzle chamber proper. The nitride layer can be formed by first laying down a sacrificial glass layer and etching this to form walls, e.g. 2733, and grilled portions, e.g. 2734. Preferably, the mask utilized results in a first anchor portion 2735 which mates with the hole 2728 in layer 2720. Additionally, the bottom surface of the grill, for example 2734 meets with a corresponding step 2736 in the PTFE layer 2732. Next, a top nitride layer 2737 can be formed having a number of holes, e.g. 2738, and nozzle port 2715 around which a rim 2739 can be etched through etching of the nitride layer 2737. Subsequently the various sacrificial layers can be etched away so as to release the structure of the thermal actuator and the air vent channel 2718 (FIG. 515).

Figure 518:
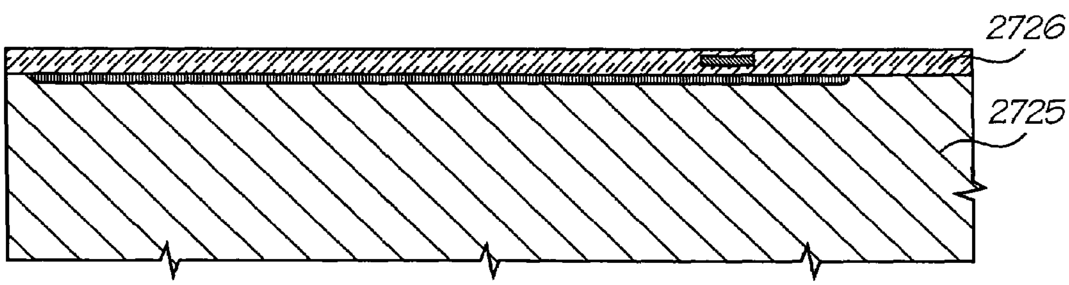

One form of detailed manufacturing process which can be used to fabricate monolithic ink jet print heads operating in accordance with the principles taught by the present embodiment can proceed utilizing the following steps:

1. Using a double sided polished wafer 2725, complete drive transistors, data distribution, and timing circuits using a 0.5 micron, one poly, 2 metal CMOS process 2726. Relevant features of the wafer 2725 at this step are shown in FIG. 518. For clarity, these diagrams may not be to scale, and may not represent a cross section though any single plane of the nozzle. FIG. 517 is a key to representations of various materials in these manufacturing diagrams, and those of other cross referenced ink jet configurations.

2. Deposit 1 micron of low stress nitride 2719. This acts as a barrier to prevent ink diffusion through the silicon dioxide of the chip surface.

3. Deposit 2 microns of sacrificial material 2750 (e.g. polyimide).

Figure 519:
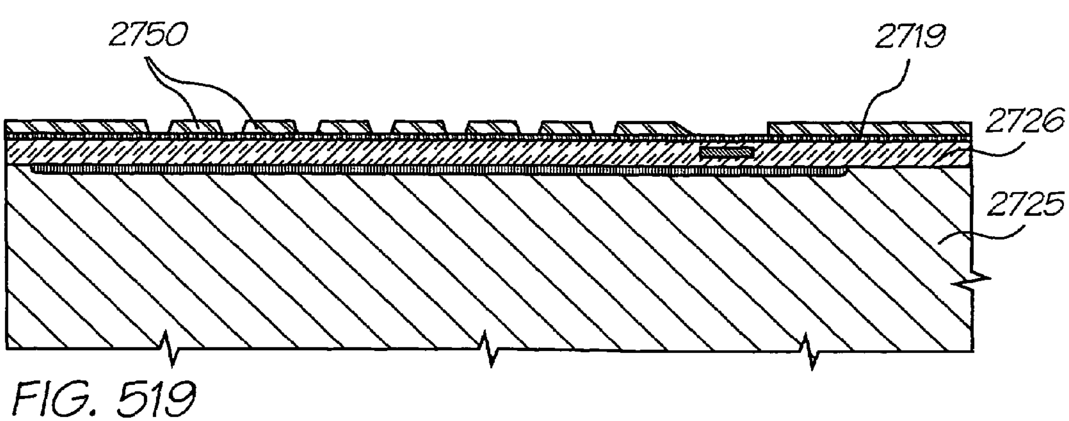

4. Etch the sacrificial layer 2750 using Mask 1. This mask defines the PTFE venting layer support pillars 2721 (FIG. 515) and anchor point This step is shown in FIG. 519.

5. Deposit 2 microns of PTFE 2720.

Figure 520:
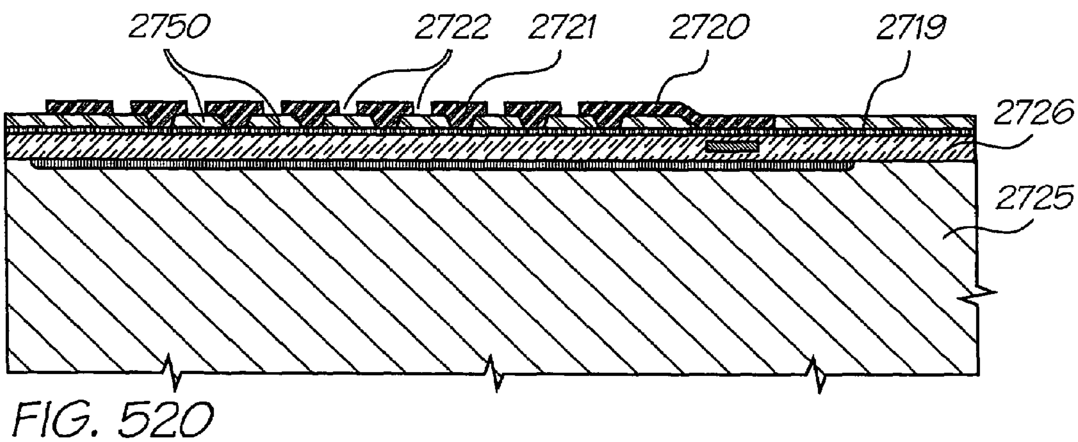

6. Etch the PTFE 2720 using Mask 2. This mask defines the edges of the PTFE venting layer, and the holes 2722 in this layer 2720. This step is shown in FIG. 520.

7. Deposit 3 microns of sacrificial material 2751.

Figure 521:
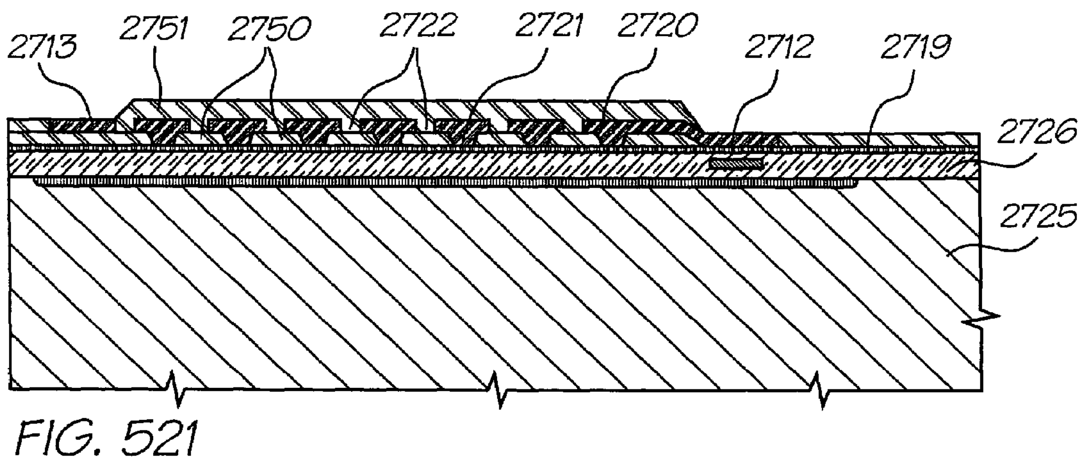

8. Etch the sacrificial layer 2751 using Mask 3. This mask defines the anchor points 2712, 2713 at both ends of the buckle actuator. This step is shown in FIG. 521.

9. Deposit 1.5 microns of PTFE 2731.

10. Deposit and pattern resist using Mask 4. This mask defines the heater.

Figure 522:
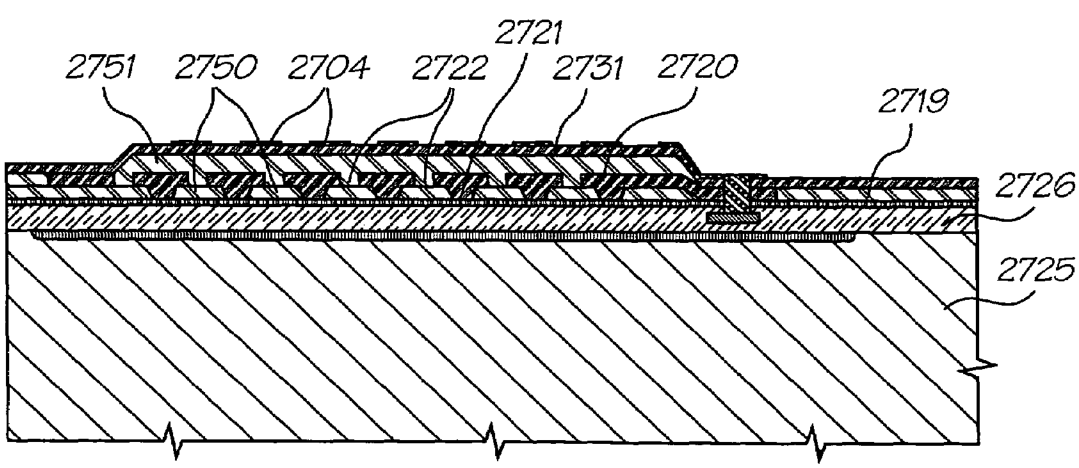

11. Deposit 0.5 microns of gold 2704 (or other heater material with a low Young's modulus) and strip the resist Steps 10 and 11 form a lift-off process. This step is shown in FIG. 522.

12. Deposit 0.5 microns of PTFE 2732.

Figure 523:
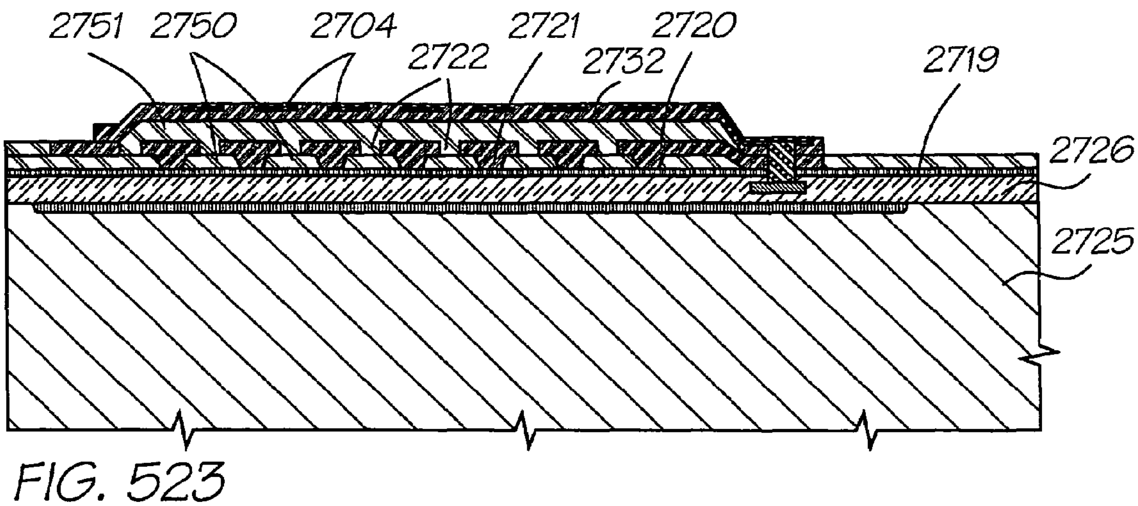

13. Etch the PTFE 2732 down to the sacrificial layer 2751 using Mask 5. This mask defines the actuator paddle 2703 (See FIG. 515) and the bond pads. This step is shown in FIG. 523.

14. Wafer probe. All electrical connections are complete at this point, and the chips are not yet separated.

15. Plasma process the PTFE to make the top and side surfaces of the buckle actuator hydrophilic. This allows the nozzle chamber to fill by capillarity.

16. Deposit 10 microns of sacrificial material 2752.

Figure 524:
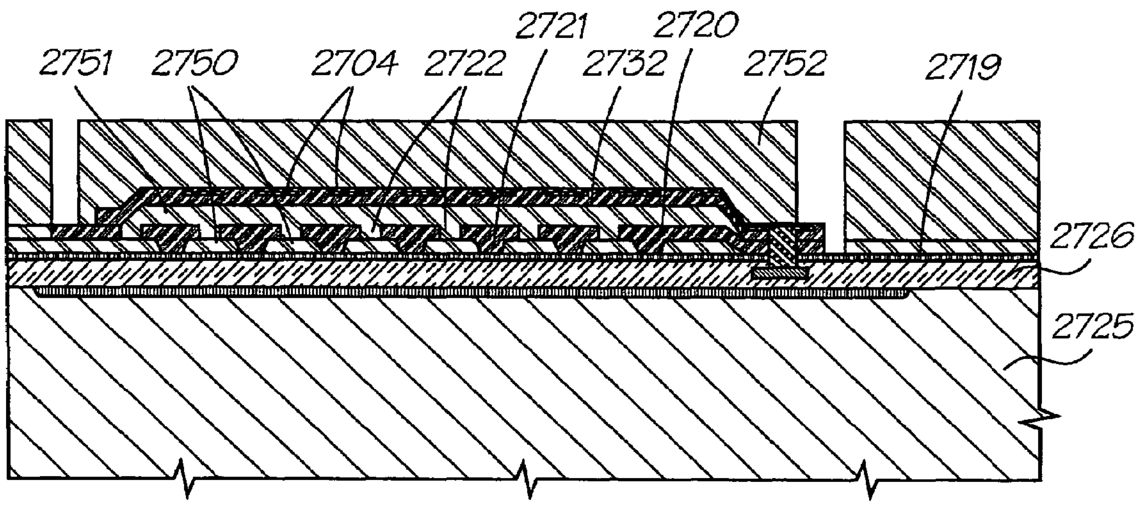

17. Etch the sacrificial material 2752 down to nitride 2719 using Mask 6. This mask defines the nozzle chamber 2702. This step is shown in FIG. 524.

Figure 525:
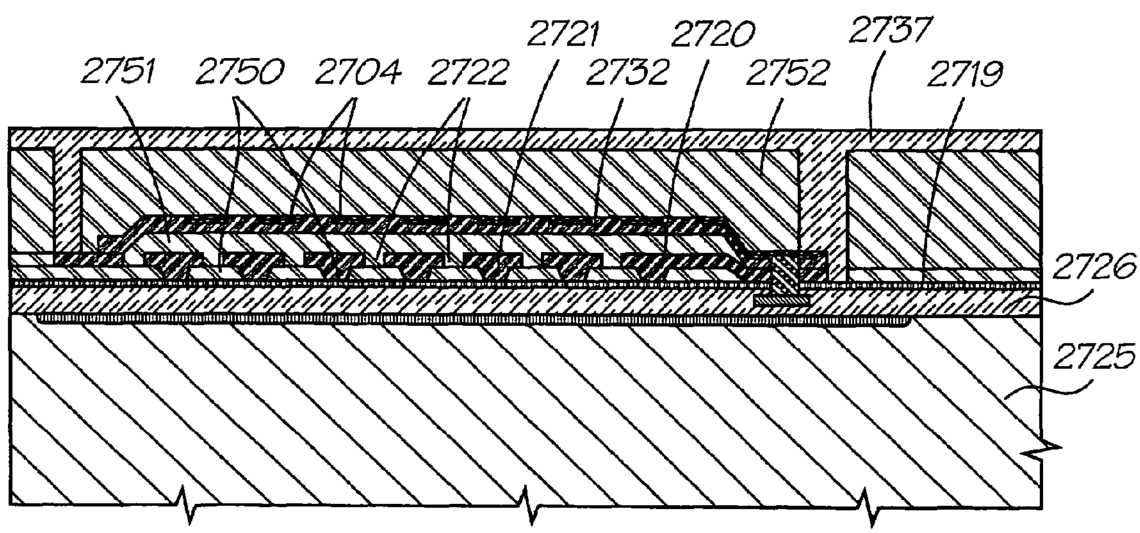

18. Deposit 3 microns of PECVD glass 2737. This step is shown in FIG. 525.

Figure 526:
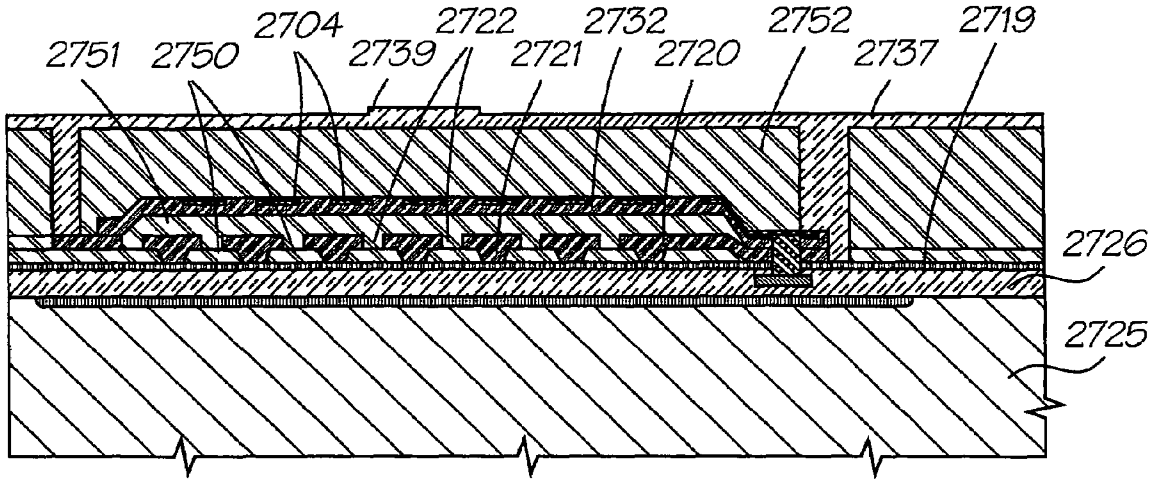

19. Etch to a depth of 1 micron using Mask 7. This mask defines the nozzle rim 2739. This step is shown in FIG. 526.

Figure 527:
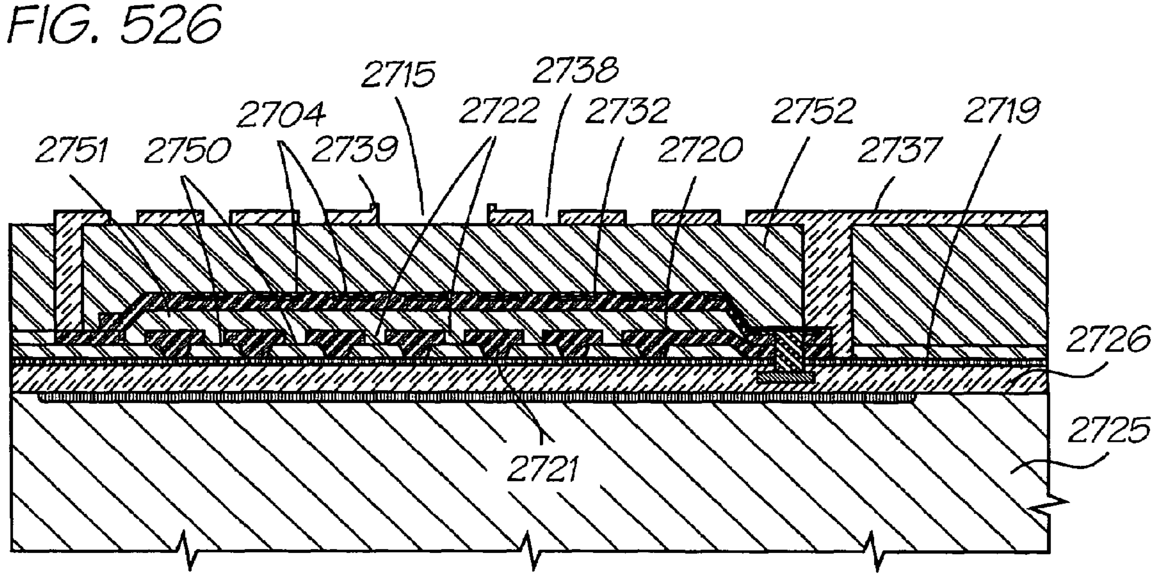

20. Etch down to the sacrificial layer 2752 using Mask 8. This mask defines the nozzle 2715 and the sacrificial etch access holes 2738. This step is shown in FIG. 527.

Figure 528:
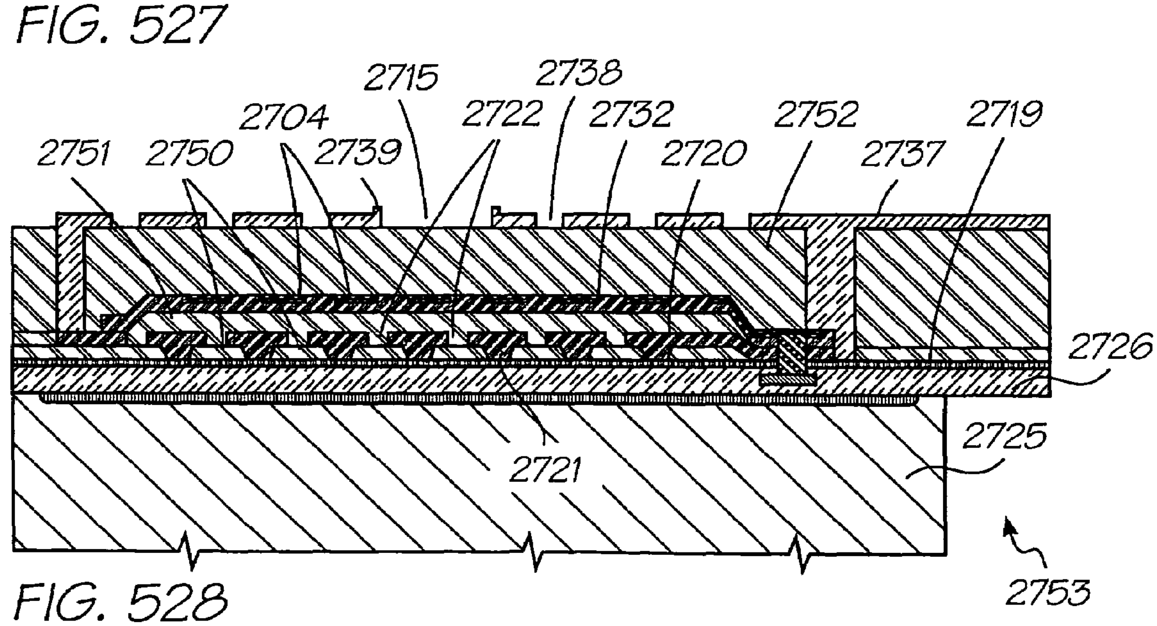

21. Back-etch completely through the silicon wafer 2725 (with, for example, an ASE Advanced Silicon Etcher from Surface Technology Systems) using Mask 9. This mask defines the ink inlets 2753 which are etched through the wafer 2725. The wafer 2725 is also diced by this etch. This step is shown in FIG. 528.

22. Back-etch the CMOS oxide layers 2726 and subsequently deposited nitride layers 2719 and sacrificial layer 2750, 2751 through to PTFE 2720, 2732 using the back-etched silicon as a mask.

Figure 529:
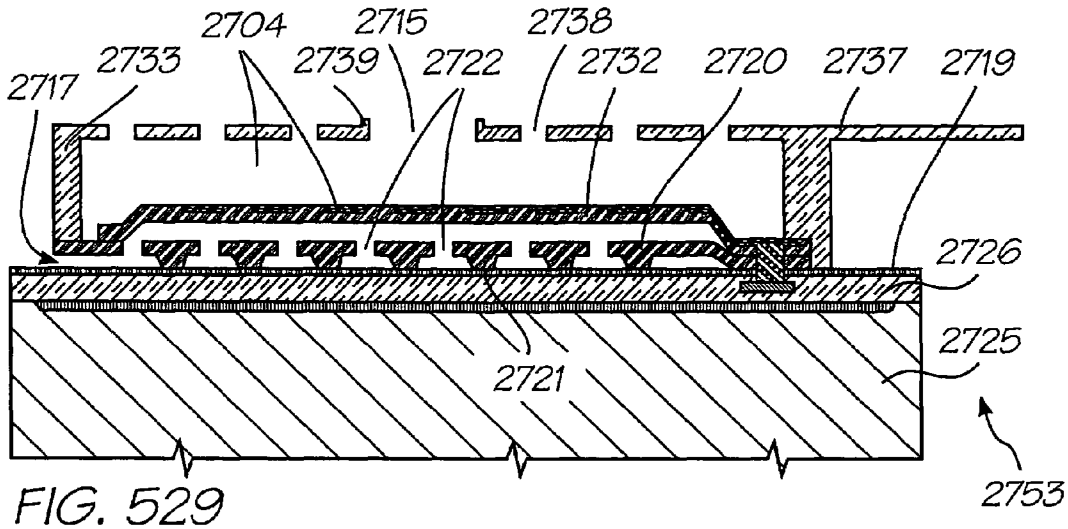

23. Etch the sacrificial material 2752. The nozzle chambers are cleared, the actuators freed, and the chips are separated by this etch This step is shown in FIG. 529.

24. Mount the printheads in their packaging, which may be a molded plastic former incorporating ink channels which supply the appropriate color ink to the ink inlets at the back of the wafer.

25. Connect the printheads to their interconnect systems. For a low profile connection with minimum disruption of airflow, TAB may be used. Wire bonding may also be used if the printer is to be operated with sufficient clearance to the paper.

26. Hydrophobize the front surface of the printheads.

Figure 530:
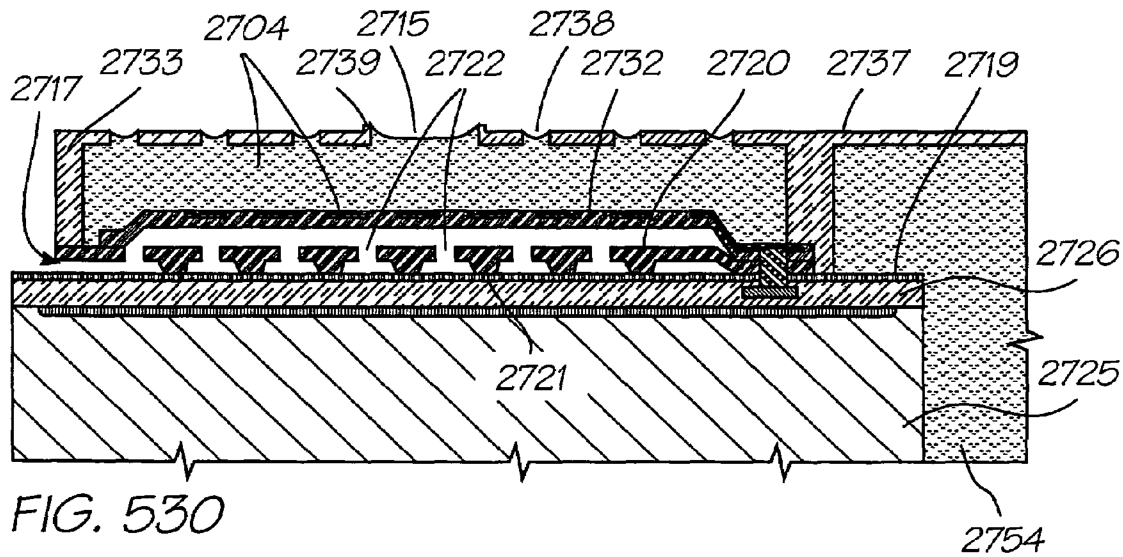

27. Fill the completed printheads with ink 2754 and test them. A filled nozzle is shown in FIG. 530.

IJ28

In a preferred embodiment, a thermal actuator is utilized to activate a set of "vanes" so as to compress a volume of ink and thereby force ink out of an ink nozzle.

Turning to FIG. 531, there is illustrated an exploded perspective view of a single inkjet nozzle 2801. A preferred embodiment fundamentally comprises a series of vane chambers 2802 which are normally filled with ink. The vane chambers 2802 include side walls which define static vanes 2803 each having a first radial wall 2805 and a second circumferential wall 2806. A set of "impeller vanes" 2807 is also provided which each have a radially aligned surface and are attached to rings 2809, 2810 with the inner ring 2809 being pivotally mounted around a pivot unit 2812. The outer ring 2810 is also rotatable about the pivot point 2812 and is interconnected with thermal actuators 2813, 2822. The thermal actuators 2813, 2822 are of a circumferential form and undergo expansion and contraction thereby rotating the impeller vanes 2807 towards the radial wall 2805 of the static vanes 2803. As a consequence the vane chamber 2802 undergoes a rapid reduction in volume thereby resulting in a substantial increase in pressure resulting in the expulsion of ink from the chamber 2802.

The static vane 2803 is attached to a nozzle plate 2815. The nozzle plate 2815 includes a nozzle rim 2816 defining an aperture 2814 into the vane chambers 2802. The aperture 2814 defined by rim 2816 allows for the injection of ink from the vane chambers 2802 onto the relevant print media.

FIG. 532 shows a perspective view taken from above of relevant portions of an ink jet nozzle arrangement 2801, constructed in accordance with a preferred embodiment. The outer ring 2810 is interconnected at points 2820, 2821 to thermal actuators 2813, 2822. The thermal actuators 2813, 2822 include inner resistive elements 2824, 2825 which are constructed from copper or the like. Copper has a low coefficient of thermal expansion and is therefore constructed in a serpentine manner, so as to allow for greater expansion in the radial direction 2828. The inner resistive elements 2824, 2825 are each encased in an outer jacket 2826 of a material having a high coefficient of thermal expansion. Suitable material includes polytetrafluoroethylene (PTFE) which has a high coefficient of thermal expansion ($770\times10^{-6}$). The thermal actuators 2813, 2822 is anchored at the points 2827 to a lower layer of the wafer. The anchor points 2827 also form an electrical connection with a relevant drive line of the lower layer. The resistive elements 2824, 2825 are also electronically connected at 2820, 2821 to the outer ring 2810. Upon activation of the resistive element 2824, 2825, the outer jacket 2826 undergoes rapid expansion which includes the expansion of the serpentine resistive elements 2824, 2825. The rapid expansion and subsequent contraction on de-energizing the resistive elements 2824, 2825 results in a rotational force in the direction 2828 being induced in the ring 2810. The rotation of the ring 2810 causes a corresponding rotation in the relevant impeller vanes 2807 (FIG. 531). Hence, by the activation of the thermal actuators 2813, 2822, ink can be ejected out of the nozzle aperture 2814 (FIG. 531).

Turning now to FIG. 533, there is illustrated a cross-sectional view through a single nozzle arrangement The illustration of FIG. 533 shows a drop 2831 being ejected out of the nozzle aperture 2814 as a result of displacement of the impeller vanes 2807 (FIG. 531). The nozzle arrangement 2801 is constructed on a silicon wafer 2833. Electronic drive circuitry 2834 is first constructed for control and driving of the thermal actuators 2813, 2822. A silicon dioxide layer 2835 is provided for defining the nozzle chamber which includes channel walls separating ink of one color from an adjacent ink reservoirs (not shown). The nozzle plate 2815, is also interconnected to the wafer 2833 via nozzle plate posts, 2837 so as to provide for stable separation from the wafer 2833. The static vanes 2803 are constructed from silicon nitrate as is the nozzle plate 2815. The static vanes 2803 and nozzle plate 2815 can be constructed utilizing a dual damascene process utilizing a sacrificial layer as discussed further hereinafter.

Figure 535:
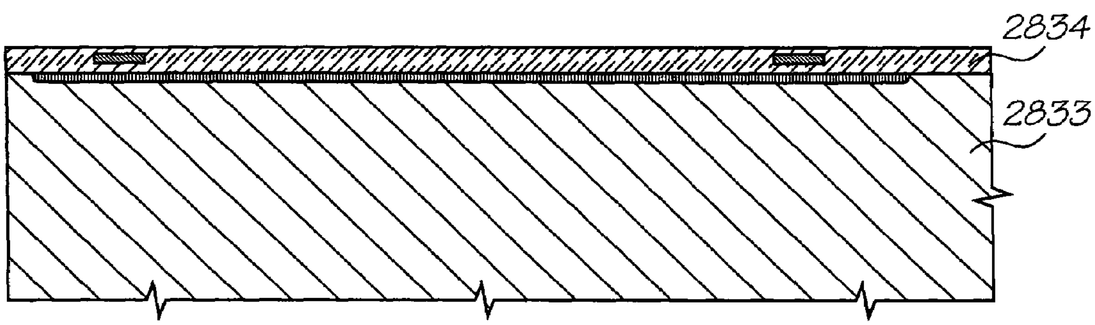

One form of detailed manufacturing process which can be used to fabricate monolithic ink jet printheads including a plane of the nozzle arrangement 2801 can proceed utilizing the following steps:

1. Using a double sided polished wafer 2833, complete drive transistors, data distribution, and timing circuits using a 0.5 micron, one poly, 2 metal CMOS process 2834. Relevant features of the wafer at this step are shown in FIG. 535. For clarity, these diagrams may not be to scale, and may not represent a cross section though any single plane of the nozzle arrangement 2801. FIG. 534 is a key to representations of various materials in these manufacturing diagrams, and those of other cross referenced ink jet configurations.

2. Deposit 1 micron of low stress nitride 2835. This acts as a barrier to prevent ink diffusion through the silicon dioxide of the chip surface.

3. Deposit 2 microns of sacrificial material 2850.

Figure 536:
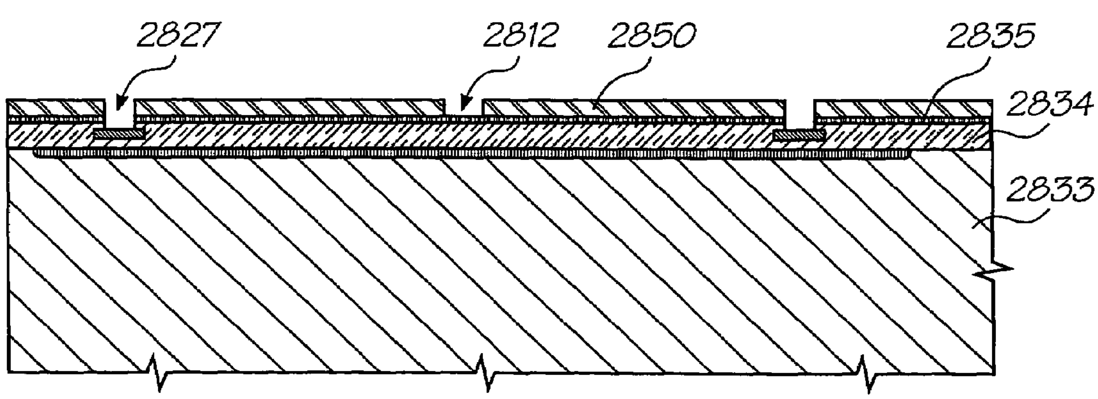

4. Etch the sacrificial layer using Mask 1. This mask defines the axis pivot 2812 and the anchor points 2827 of the actuators. This step is shown in FIG. 536.

5. Deposit 1 micron of PTFE 2851.

Figure 537:
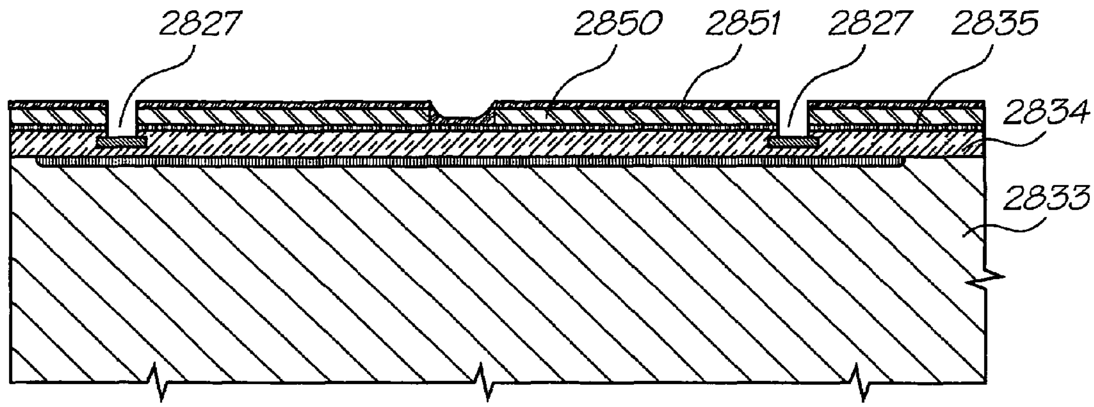

6. Etch the PTFE down to top level metal using Mask 2. This mask defines the heater contact vias. This step is shown in FIG. 537.

7. Deposit and pattern resist using Mask 3. This mask defines the heater, the vane support wheel, and the axis pivot.

Figure 538:
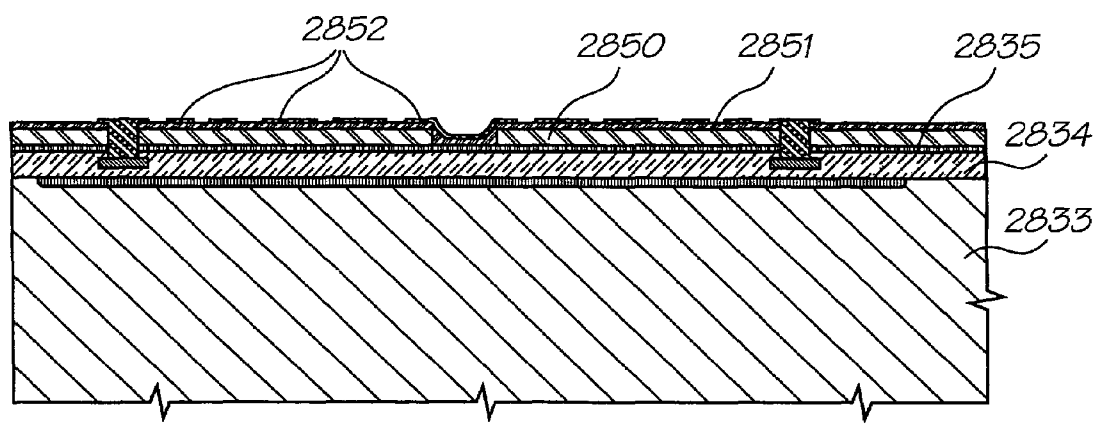

8. Deposit 0.5 microns of gold 2852 (or other heater material with a low Young's modulus) and strip the resist Steps 7 and 8 form a lift-off process. This step is shown in FIG. 538.

9. Deposit 1 micron of PTFE 2853.

Figure 539:
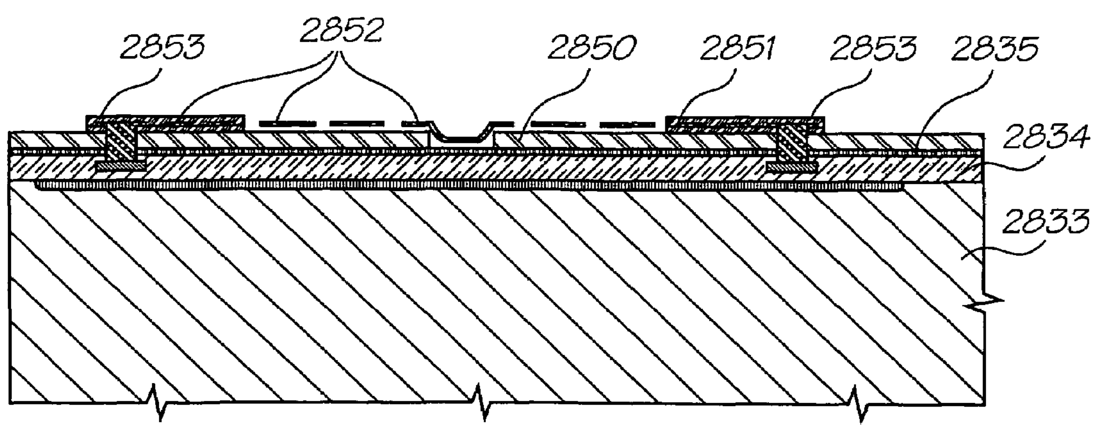

10. Etch both layers of PTFE down to the sacrificial material using Mask 4. This mask defines the actuators and the bond pads. This step is shown in FIG. 539.

11. Wafer probe. All electrical connections are complete at this point, and the chips are not yet separated.

12. Deposit 10 microns of sacrificial material 2855.

Figure 540:
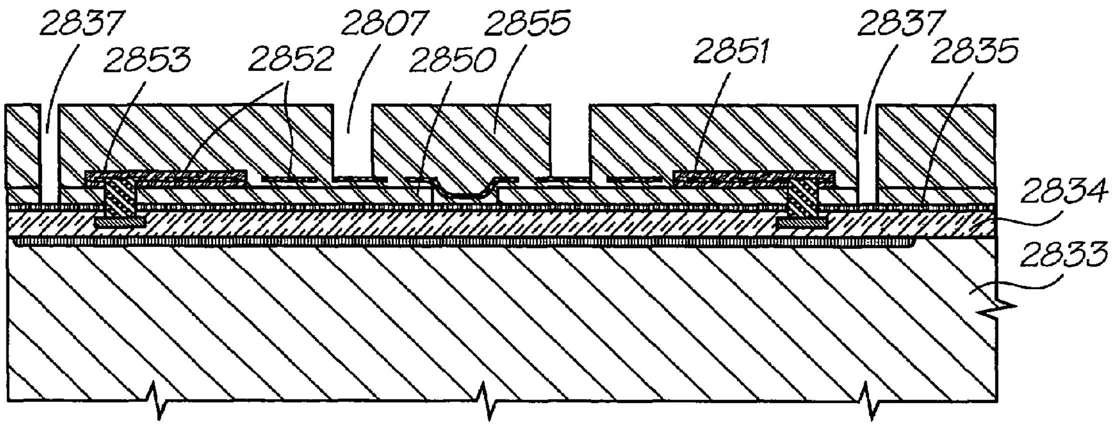

13. Etch the sacrificial material down to heater material or nitride using Mask 5. This mask defines the nozzle plate support posts and the moving vanes, and the walls surrounding each ink color. This step is shown in FIG. 540.

Figure 541:
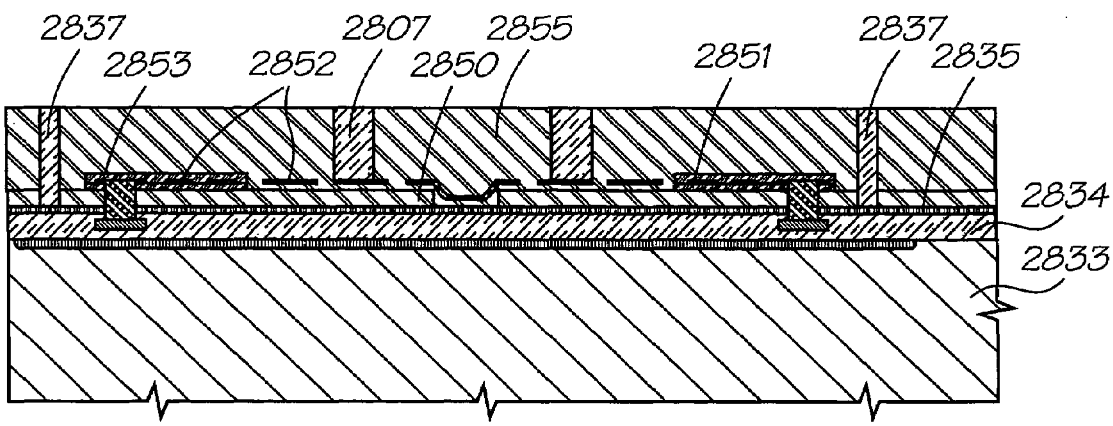

14. Deposit a conformal layer of a mechanical material and planarize to the level of the sacrificial layer. This material may be PECVD glass, titanium nitride, or any other material which is chemically inert, has reasonable strength, and has suitable deposition and adhesion characteristics. This step is shown in FIG. 541.

15. Deposit 0.5 microns of sacrificial material 2856.

16. Etch the sacrificial material to a depth of approximately 1 micron above the heater material using Mask 6. This mask defines the fixed vanes 2803 and the nozzle plate support posts, and the walls surrounding each ink color. As the depth of the etch is not critical, it may be a simple timed etch.

Figure 542:
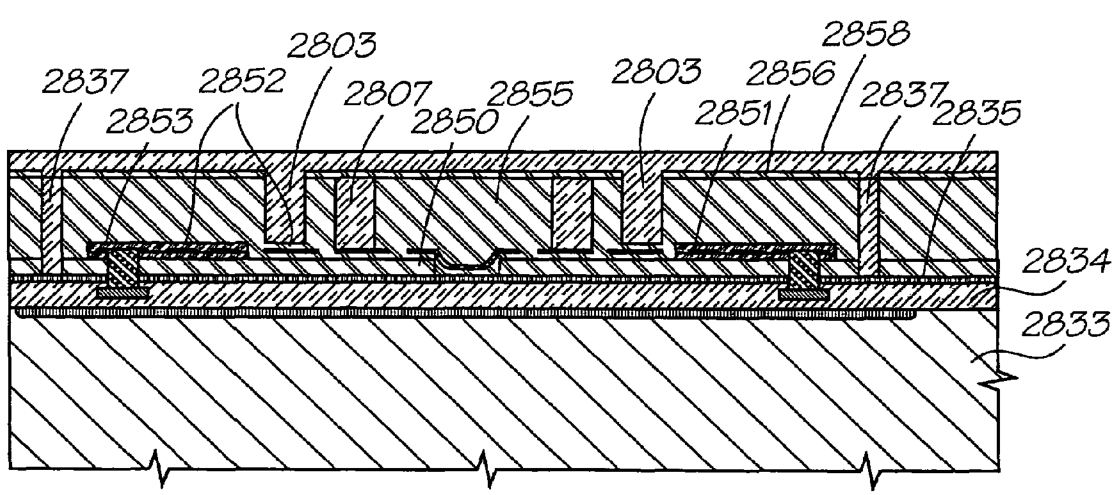

17. Deposit 3 microns of PECVD glass 2858. This step is shown in FIG. 542.

Figure 543:
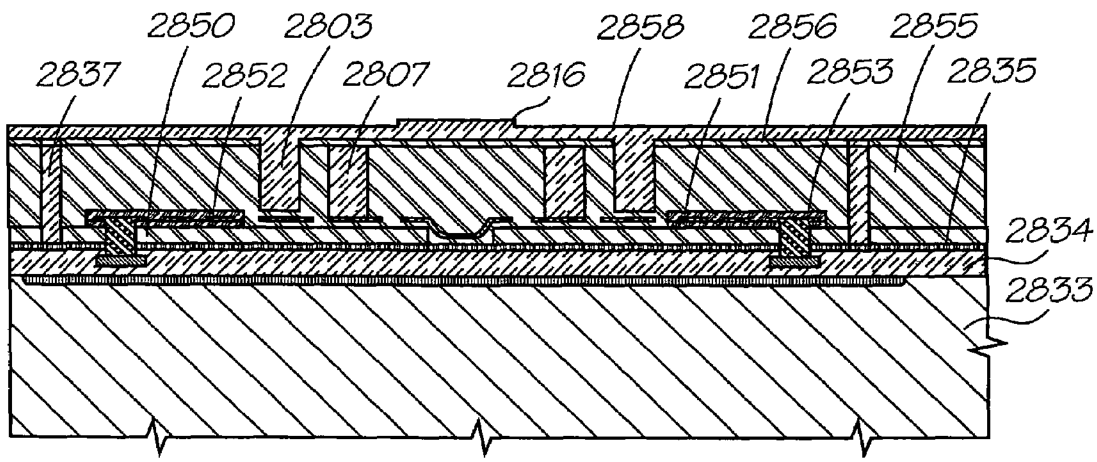

18. Etch to a depth of 1 micron using Mask 7. This mask defines the nozzle rim 2816. This step is shown in FIG. 543.

Figure 544:
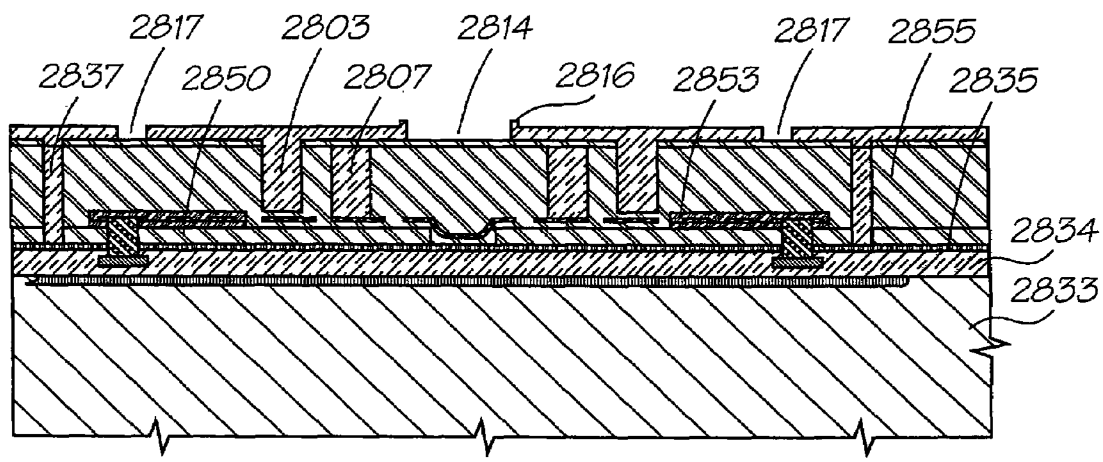

19. Etch down to the sacrificial layer using Mask 8. This mask defines the nozzle 2814 and the sacrificial etch access holes 2817. This step is shown in FIG. 544.

Figure 545:
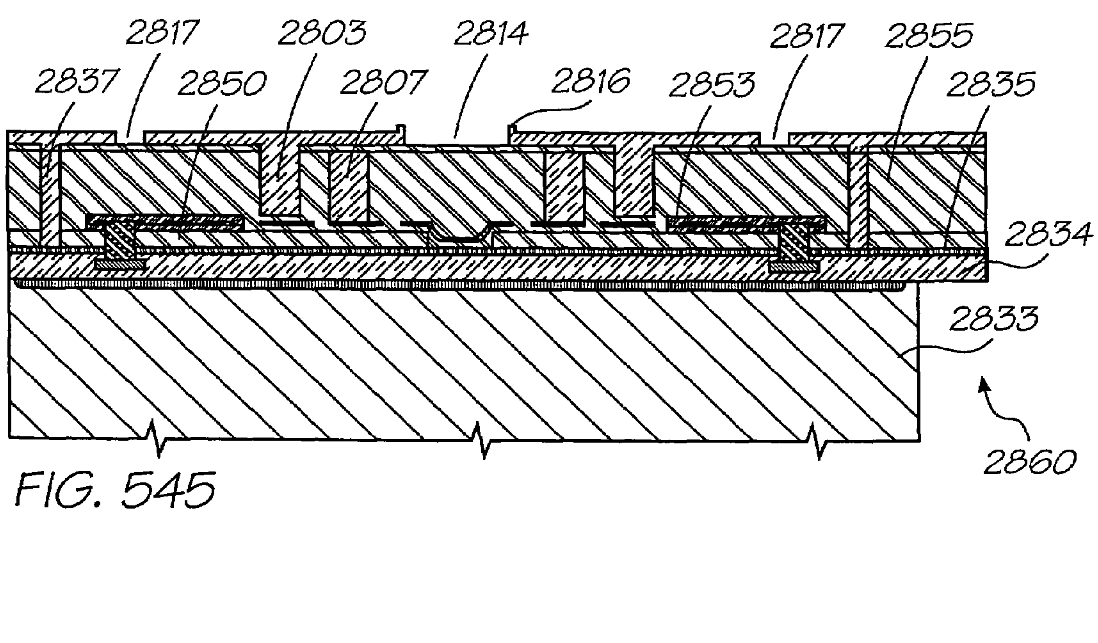

20. Back-etch completely through the silicon wafer (with, for example, an ASE Advanced Silicon Etcher from Surface Technology Systems) using Mask 9. This mask defines the ink inlets 2860 which are etched through the wafer. The wafer is also diced by this etch. This step is shown in FIG. 545.

21. Back-etch the CMOS oxide layers and subsequently deposited nitride layers through to the sacrificial layer using the back-etched silicon as a mask.

Figure 546:
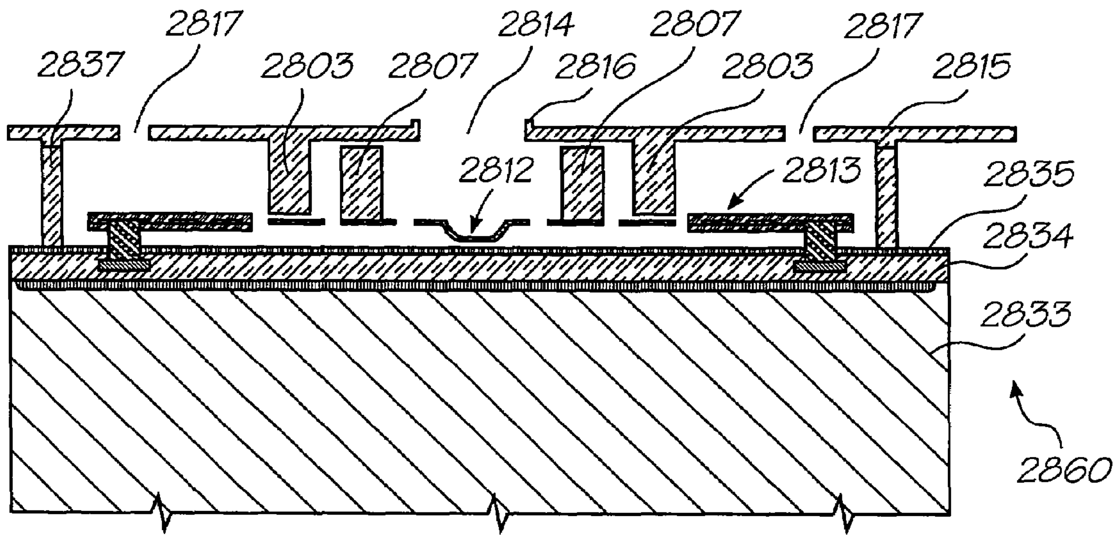

22. Etch the sacrificial material. The nozzle chambers are cleared, the actuators freed, and the chips are separated by this etch This step is shown in FIG. 546.

23. Mount the printheads in their packaging, which may be a molded plastic former incorporating ink channels which supply the appropriate color ink to the ink inlets at the back of the wafer.

24. Connect the printheads to their interconnect systems. For a low profile connection with minimum disruption of airflow, TAB may be used. Wire bonding may also be used if the printer is to be operated with sufficient clearance to the paper.

25. Hydrophobize the front surface of the printheads.

26. Fill the completed printheads with ink 2861 and test them. A filled nozzle is shown in FIG. 547.

IJ29

In a preferred embodiment, a new form of thermal actuator is utilized for the ejection of drops of ink on demand from an ink nozzle. Turning now to FIGS. 548 to 551, there will be illustrated the basis of operation of the inkjet printing device utilizing the actuator. Turning initially to FIG. 548, there is illustrated 2901, the quiescent position of a thermal actuator 2902 in a nozzle chamber 2903 filled with ink and having a nozzle 2904 for the ejection of ink. The nozzle 2904 has an ink meniscus 2905 in a state of surface tension ready for the ejection of ink. The thermal actuator 2902 is coated on a first surface 2906, facing the chamber 2903, with a hydrophilic material. A second surface 2907 is coated with a hydrophobic material which causes an air bubble 2908 having a meniscus 2909 underneath the actuator 2902. The air bubble 2908 is formed over time by outgassing from the ink within chamber 2903 and the meniscus 2909 is shown in an equilibrium position between the hydrophobic 2907 and hydrophilic 2906 surfaces. The actuator 2902 is fixed at one end 2911 to a substrate 2912 from which it also derives an electrical connection.

When it is desired to eject a drop from the nozzle 2904, the actuator 2902 is activated as shown in FIG. 549, resulting in a movement in direction 2914, the movement in direction 2914 causes a substantial increase in the pressure of the ink around the nozzle 2904. This results in a general expansion of the meniscus 2905 and the passing of momentum to the ink so as to form a partial drop 2915. Upon movement of the actuator 2902 in the direction 2914, the ink meniscus 2909 collapses generally in the indicated direction 2916.

Subsequently, the thermal actuator 2902 is deactivated as illustrated in FIG. 550, resulting in a return of the actuator 2902 in the direction generally indicated by the arrow 2917. The movement back of the actuator 2917 results in a low pressure region being experienced by the ink within the nozzle area 2904. The forward momentum of the drop 2915 and the low pressure around the nozzle 2904 results in the ink drop 2915 being broken off from the main body of the ink. The drop 2915 continues to the print media as required The movement of the actuator 2902 in the direction 2917 further causes ink to flow in the direction 2919 around the actuator 2902 in addition to causing the meniscus 2909 to move as a result of the ink flow 2919. Further, further ink 2920 is sucked into the chamber 2903 to refill the ejected ink 2915.

Finally, as illustrated in FIG. 551, the actuator 2902 returns to its quiescent position with the meniscus 2905 also returning to a state of having a slight bulge. The actuator 2902 is then in a state for refiring of another drop on demand as required.

In one form of implementation of an inkjet printer utilizing the method illustrated in FIGS. 548 to 551, standard semiconductive fabrication techniques are utilized in addition to standard micro-electro-mechanical (MEMS) techniques construct a suitable print device having a polarity of the chambers as illustrated in FIG. 548 with corresponding actuators 2902.

Turning now to FIG. 552, there is illustrated a cross-section through one form of suitable nozzle chamber. A group of such ink jet nozzles is shown in FIG. 553. One end 2911 of the actuator 2902 is connected to the substrate 2912 and the other end includes a stiff paddle 2925 for use in ejecting ink. The actuator itself is constructed from a four layer MEMS processing technique. The layers are as follows:

1. A polytetrafluoroethylene (PTFE) lower layer 2926. PTFE has a very high coefficient of thermal expansion (approximately $770\times10^{-6}$, or around 380 times that of silicon). This layer expands when heated by a heater layer.

2. A heater layer 2927. A serpentine heater 2927 is etched in this layer, which may be formed from nichrome, copper or other suitable material with a resistivity such that the drive voltage for the heater is compatible with the drive transistors utilized. The serpentine heater 2927 is arranged to have very little tensile strength in the direction 2929 along the length of the actuator.

3. A PTFE upper layer 2930. This layer 2930 expands when heated by the heater layer.

4. A silicon nitride layer 2932. This is a thin layer 2932 is of high stiffness and low coefficient of thermal expansion. Its purpose is to ensure that the actuator bends, instead of simply elongating as a result of thermal expansion of the PTFE layers. Silicon nitride can be used simply because it is a standard semi-conductor material, and $SiO_2$ cannot easily be used if it is also the sacrificial material used when constructing the device.

Operation of the ink jet actuator 2902 will then be as follows:

1. When data signals distributed on the print-head indicate that a particular nozzle is to eject a drop of ink, the drive transistor for that nozzle is turned on. This energises the heater 2927 in the paddle for that nozzle. The heater is energised for approximately 2 microseconds, with the actual duration depending upon the exact design chosen for the actuator nozzle and the inks utilized.

2. The heater 2927 heats the PTFE layers 2926, 2930 which expand at a rate many times that of the $Si_3N_4$ layer 2932. This expansion causes the actuator 2902 to bend, with the PTFE layer 2926 being the convex side. The bending of the actuator moves the paddle, pushing ink out of the nozzle. The air bubble 2908 (FIG. 548) between the paddle and the substrate, forms due to the hydrophobic nature of the PTFE on the back surface of the paddle. This air bubble reduces the thermal coupling to the hot side of the actuator, achieving a higher temperature with lower power. The cold side of the actuator including SiN layer 2932 will still be water cooled. The air bubble will also expand slightly when heated, helping to move the paddle. The presence of the air bubble also means that less ink is required to move under the paddle when the actuator is energised. These three factors lead to a lower power consumption of the actuator.

3. When the heater current is turned off, as noted previously, the paddle 2925 begins to return to its quiescent position. The paddle return 'sucks' some of the ink back into the nozzle, causing the ink ligament connecting the ink drop to the ink in the nozzle to thin. The forward velocity of the drop and the backward velocity of the ink in the chamber are resolved by the ink drop breaking off from the ink in the nozzle. The ink drop then continues towards the recording medium.

4. The actuator 2902 is finally at rest in the quiescent position until the next drop ejection cycle.

Basic Fabrications Sequence

One form of print-head fabrication sequence utilizing MEMS technology will now be described. The description assumes that the reader is familiar with surface and micro-machining techniques utilized for the construction of MEMS devices, including the latest proceedings in these areas. Turning now to FIG. 554, there is illustrated an exploded perspective view of a single ink jet nozzle as constructed in accordance with a preferred embodiment The construction of a print-head can proceed as follows:

1. Start with a standard single crystal silicon wafer 2980 suitable for the desired manufacturing process of the active semiconductor device technology chosen. Here the manufacturing process is assumed to be 0.5 microns CMOS.

2. Complete fabrication the CMOS circuitry layer 2983, including an oxide layer (not shown) and passivation layer 2982 for passivation of the wafer. As the chip will be immersed in water based ink, the passivation layer must be highly impervious. A layer of high density silicon nitride ($Si_3N_4$) is suitable. Another alternative is diamond-like carbon (DLC).

3. Deposit 2 micron of phosphosilicate glass (PSG). This will be a sacrificial layer which raises the actuator and paddle from the substrate. This thickness is not critical.

4. Etch the PSG to leave islands under the actuator positions on which the actuators will be formed.

5. Deposit 1.0 micron of polytetrafluoroethylene (PTFE) layer 2984. The PTFE may be roughened to promote adhesion. The PTFE may be deposited as a spin-on nanoemulsion [T. Rosenmayer, H. Wu, "PTFE nanoemulsions as spin-on, low dielectric constant materials for ULSI applications", PP 463-468, Advanced Metallisation for Future ULSI, MRS vol. 427, 1996].

6. Mask and etch via holes through to the top level metal of the CMOS circuitry for connection of a power supply to the actuator (not shown). Suitable etching procedures for PTFE are discussed in "Thermally assisted Ian Beam Etching of polytetrafluoroethylene: A new technique for High Aspect Ratio Etching of MEMS" by Berenschot et al in the Proceedings of the Ninth Annual International Workshop on Micro Electro Mechanical Systems, San Diego, February 1996.

7. Deposit the heater material layer 2985. This may be Nichrome (an alloy of 80% nickel and 20% chromium) which may be deposited by sputtering. Many other heater materials may be used. The principal requirements are a resistivity which results in a drive voltage which is suitable for the CMOS drive circuitry layer, a melting point above the temperature of subsequent process steps, electromigration resistance, and appropriate mechanical properties.

8. Etch the heater material using a mask pattern of the heater and the paddle stiffener.

9. Deposit 2.0 micron of PTFE. As with step 5, the PTFE may be spun on as a nanoemulsion, and may be roughened to promote adhesion. (This layer forms part of layer 2984 in FIG. 554.)

10. Deposit via a mask 0.25 of silicon nitride for the top of the layer 2986 of the actuator, or any of a wide variety of other materials having suitable properties as previously described. The major materials requirements are: a low coefficient of thermal expansion compared to PTFE; a relatively high Young's modulus, does not corrode in water, and a low etch rate in hydrofluoric acid (HF). The last of these requirements is due to the subsequent use of HF to etch the sacrificial glass layers. If a different sacrificial layer is chosen, then this layer should obviously have resistance to the process used to remove the sacrificial material.

11. Using the silicon nitride as a mask, etch the PTFE, PTFE can be etched with very high selectivity (>1,000 to one) with ion beam etching. The wafer may be tilted slightly and rotated during etching to prevent the formation of microglass. Both layers of PTFE can be etched simultaneously.

12. Deposit 20 micron of $SiO_2$. This may be deposited as spin-on glass (SOG) and will be used as a sacrificial layer (not shown).

13. Etch through the glass layer using a mask defining the nozzle chamber and ink channel walls, e.g. 2951, and filter posts, e.g. 2952. This etch is through around 20 micron of glass, so should be highly anisotropic to minimise the chip area required. The minimum line width is around 6 microns, so coarse lithography may be used. Overlay alignment error should preferably be less than 0.5 microns. The etched areas are subsequently filled by depositing silicon nitride through the mask.

14. Deposit 2 micron of silicon nitride layer 2987. This forms the front surface of the print-head. Many other materials could be used. A suitable material should have a relatively high Young's modulus, not corrode in water, and have a low etch rate in hydrofluoric acid (HF). It should also be hydrophilic.

15. Mask and etch nozzle rims (not shown). These are I micron annular protrusions above the print-head surface around the nozzles, e.g. 2904, which help to prevent ink flooding the surface of the print-head. They work in conjunction with the hydrophobizing of the print-head front surface.

16. Mask and etch the nozzle holes 2904. This mask also includes smaller holes, e.g. 2947, which are placed to allow the ingress of the etchant for the sacrificial layers. These holes should be small enough to that the ink surface tension ensures that ink is not ejected from the holes when the ink pressure waves from nearby actuated nozzles is at a maximum. Also, the holes should be small enough to ensure that air bubbles are not ingested at times of low ink pressure. These holes are spaced close enough so that etchant can easily remove all of the sacrificial material even though the paddle and actuator are fairly large and flexible, stiction should not be a problem for this design. This is because the paddle is made from PTFE.

17. Etch ink access holes (not shown) through the wafer 2980. This can be done as an anisotropic crystallographic silicon etch, or an anisotropic dry etch A dry etch system capable of high aspect ratio deep silicon trench etching such as the Surface Technology Systems (STS) Advance Silicon Etch (ASE) system is recommended for volume production, as the chip size can be reduced over wet etch. The wet etch is suitable for small volume production, as the chip size can be reduced over wet etch The wet etch is suitable for small volume production where a suitable plasma etch system is not available. Alternatively, but undesirably, ink access can be around the sides of the print-head chips. If ink access is through the wafer higher ink flow is possible, and there is less requirement for high accuracy assembly. If ink access is around the edge of the chip, ink flow is severely limited, and the print-head chips must be carefully assembled onto ink channel chips. This latter process is difficult due to the possibility of damaging the fragile nozzle plate. If plasma etching is used, the chips can be effectively diced at the same time. Separating the chips by plasma etching allows them to be spaced as little as 35 micron apart, increasing the number of chips on a wafer. At this stage, the chips must be handled carefully, as each chip is a beam of silicon 100 mm long by 0.5 mm wide and 0.7 mm thick.

18. Mount the print-head chips into print-head carriers. These are mechanical support and ink connection mouldings. The print-head carriers can be moulded from plastic, as the minimum dimensions are 0.5 mm.

19. Probe test the print-heads and bond the good print-heads. Bonding may be by wire bonding or TAB bonding.

20. Etch the sacrificial layers. This can be done with an isotropic wet etch, such as buffered HF. This stage is performed after the mounting of the print-heads into moulded print-head carriers, and after bonding, as the front surface of the print-heads is very fragile after the sacrificial etch has been completed. There should be no direct handling of the print-head chips after the sacrificial etch.

21. Hydrophobize the front surface of the printheads.

22. Fill with ink and perform final testing on the completed printheads.

Figure 556:
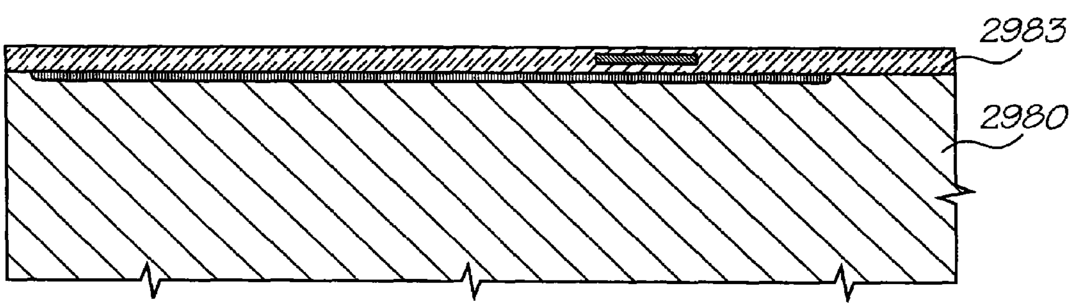

One form of detailed manufacturing process which can be used to fabricate monolithic ink jet printheads operating in accordance with the principles taught by the present embodiment can proceed utilizing the following steps:

1. Using a double sided polished wafer 2980, complete drive transistors, data distribution, and timing circuits using a 0.5 micron, one poly, 2 metal CMOS process 2983. Relevant features of the wafer at this step are shown in FIG. 556. For clarity, these diagrams may not be to scale, and may not represent a cross section though any single plane of the nozzle. FIG. 555 is a key to representations of various materials in these manufacturing diagrams, and those of other cross referenced ink jet configurations.

2. Deposit 1 micron of low stress nitride 2982. This acts as a barrier to prevent ink diffusion through the silicon dioxide of the chip surface.

3. Deposit 3 micron of sacrificial material 2990 (e.g. polyimide).

Figure 557:
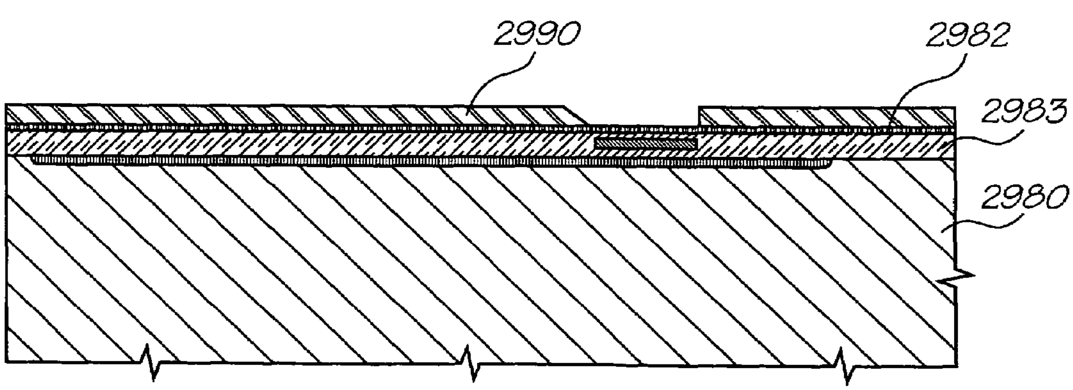

4. Etch the sacrificial layer using Mask 1. This mask defines the actuator anchor point This step is shown in FIG. 557.

5. Deposit 0.5 microns of PTFE 2991.

Figure 558:
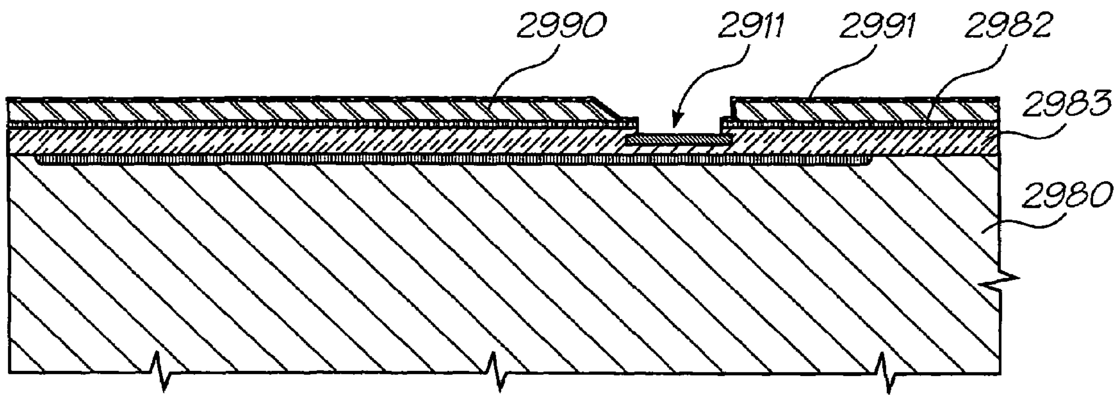

6. Etch the PTFE, nitride, and CMOS passivation down to second level metal using Mask 2. This mask defines the heater vias 2911. This step is shown in FIG. 558.

7. Deposit and pattern resist using Mask 3. This mask defines the heater.

Figure 559:
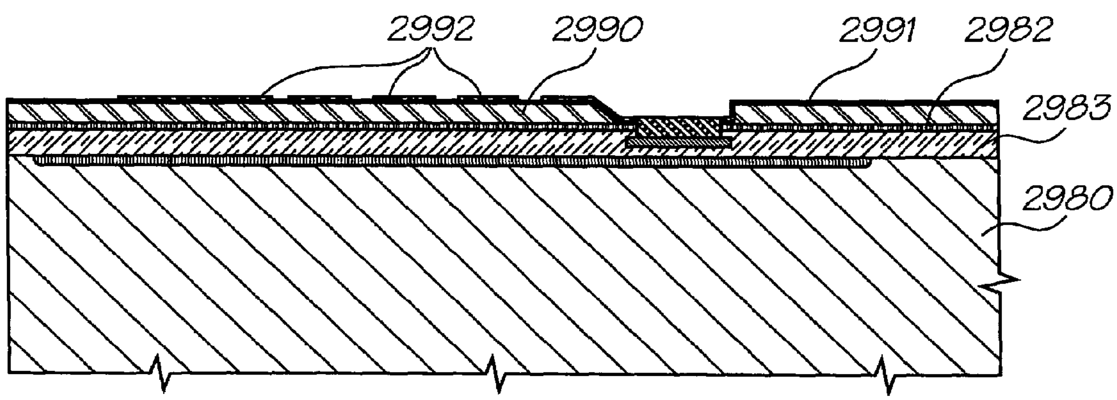

8. Deposit 0.5 microns of gold 2992 (or other heater material with a low Young's modulus) and strip the resist Steps 7 and 8 form a lift-off process. This step is shown in FIG. 559.

9. Deposit 1.5 microns of PTFE 2993.

Figure 560:
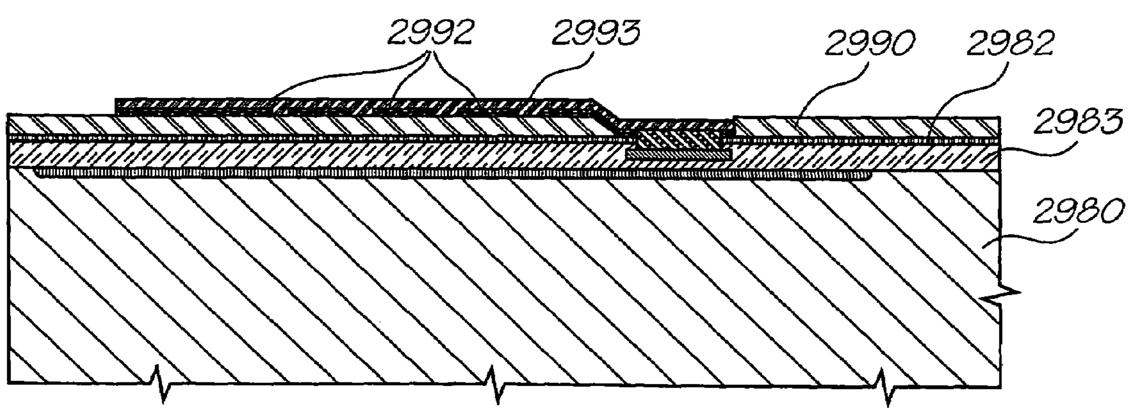

10. Etch the PTFE down to the sacrificial layer using Mask 4. This mask defines the actuator paddle and the bond pads. This step is shown in FIG. 560.

11. Wafer probe. All electrical connections are complete at this point, and the chips are not yet separated.

12. Plasma process the PTFE to make the top surface hydrophilic. This allows the nozzle chamber to fill by capillarity, but maintains a hydrophobic layer underneath the paddle, which traps an air bubble. The air bubble reduces the negative pressure on the back of the paddle, and increases the temperature achieved by the heater.

13. Deposit 10 microns of sacrificial material 2994.

Figure 561:
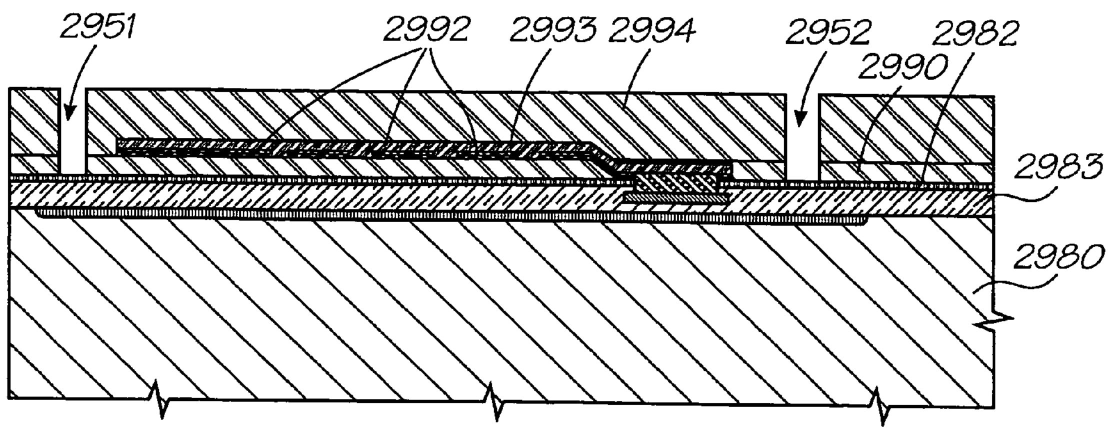

14. Etch the sacrificial material down to nitride using Mask 5. This mask defines the nozzle chamber 2951 and the nozzle inlet filter 2952. This step is shown in FIG. 561.

Figure 562:
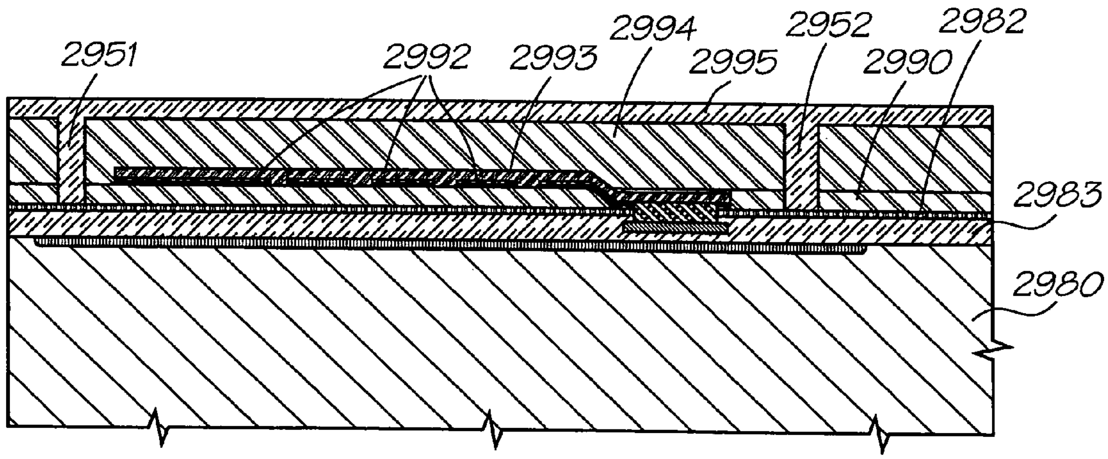

15. Deposit 3 microns of PECVD glass 2995. This step is shown in FIG. 562.

Figure 563:
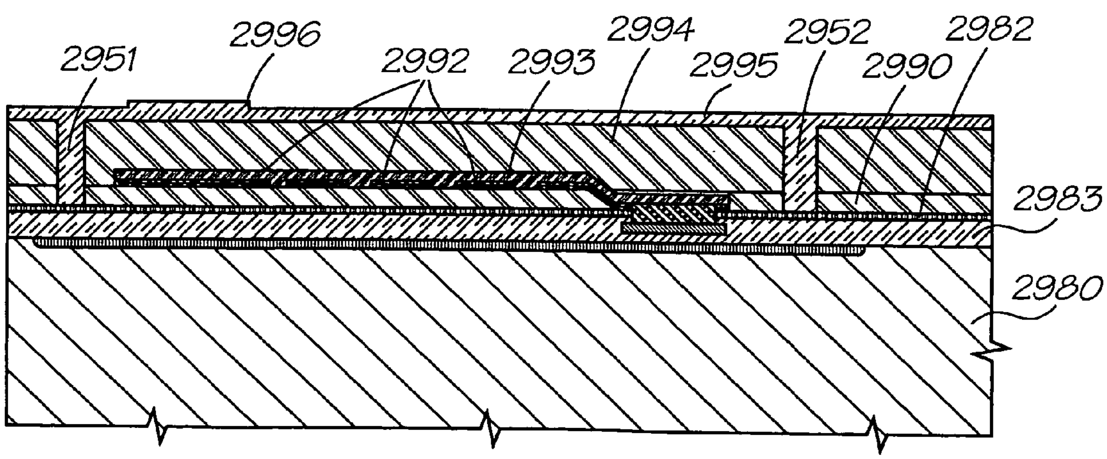

16. Etch to a depth of 1 micron using Mask 6. This mask defines the nozzle rim 2996. This step is shown in FIG. 563.

Figure 564:
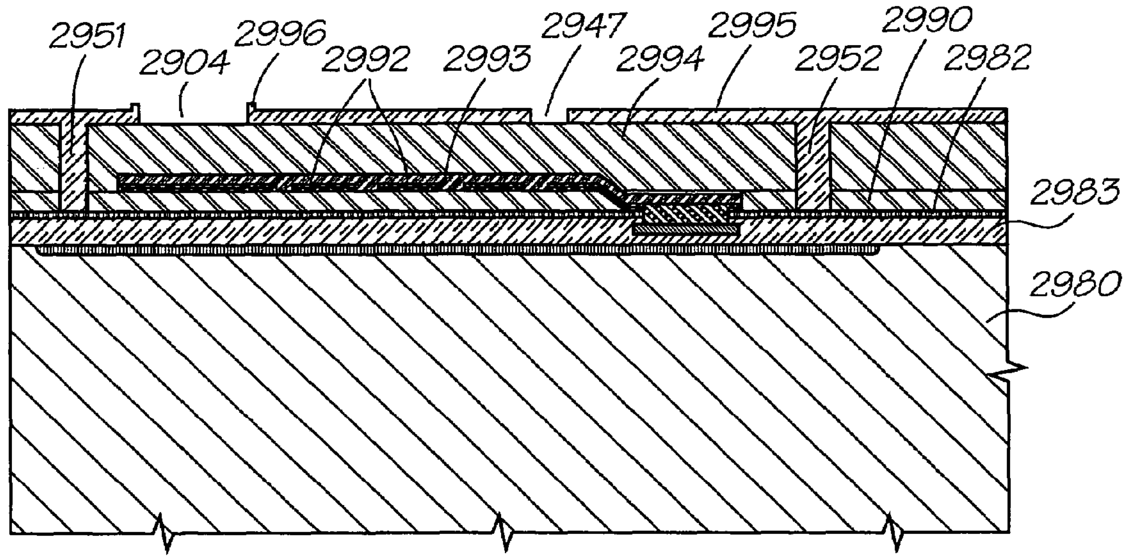

17. Etch down to the sacrificial layer using Mask 7. This mask defines the nozzle 2904 and the sacrificial etch access holes 2947. This step is shown in FIG. 564.

Figure 565:
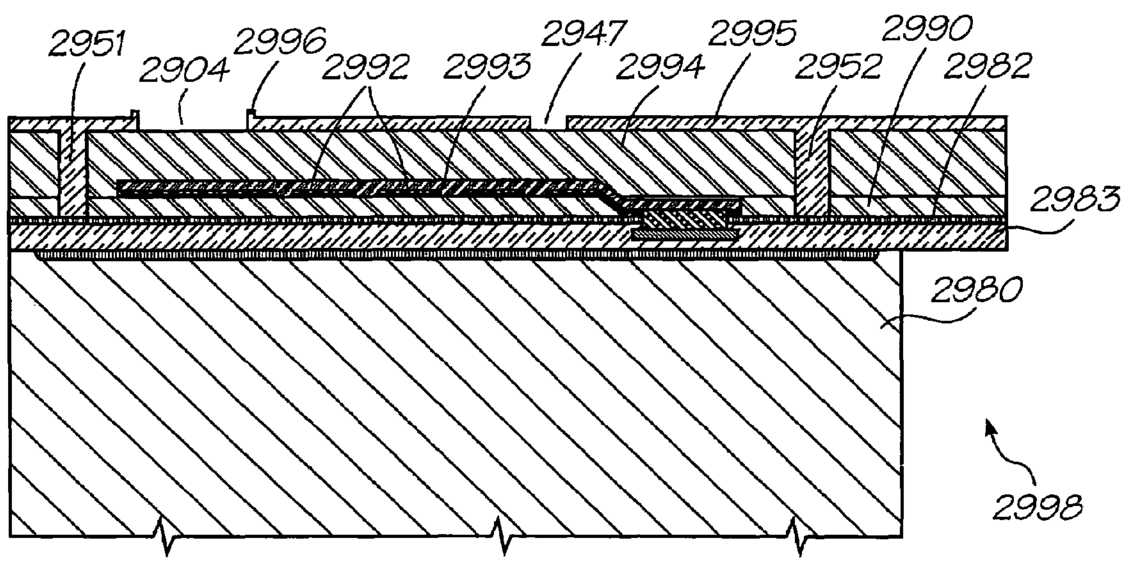

18. Back-etch completely through the silicon wafer (with, for example, an ASE Advanced Silicon Etcher from Surface Technology Systems) using Mask 8. This mask defines the ink inlets 2998 which are etched through the wafer. The wafer is also diced by this etch. This step is shown in FIG. 565.

19. Back-etch the CMOS oxide layers and subsequently deposited nitride layers through to the sacrificial layer using the back-etched silicon as a mask.

Figure 566:
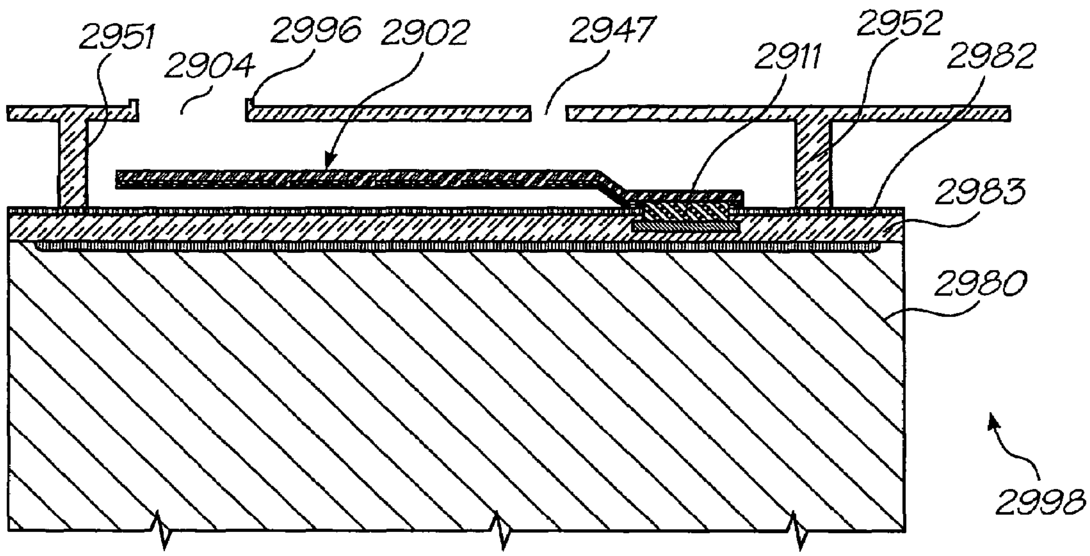

20. Etch the sacrificial material. The nozzle chambers are cleared, the actuators freed, and the chips are separated by this etch This step is shown in FIG. 566.

21. Mount the printheads in their packaging, which may be a molded plastic former incorporating ink channels which supply the appropriate color ink to the ink inlets at the back of the wafer.

22. Connect the printheads to their interconnect systems. For a low profile connection with minimum disruption of airflow, TAB may be used. Wire bonding may also be used if the printer is to be operated with sufficient clearance to the paper.

23. Hydrophobize the front surface of the printheads.

Figure 567:
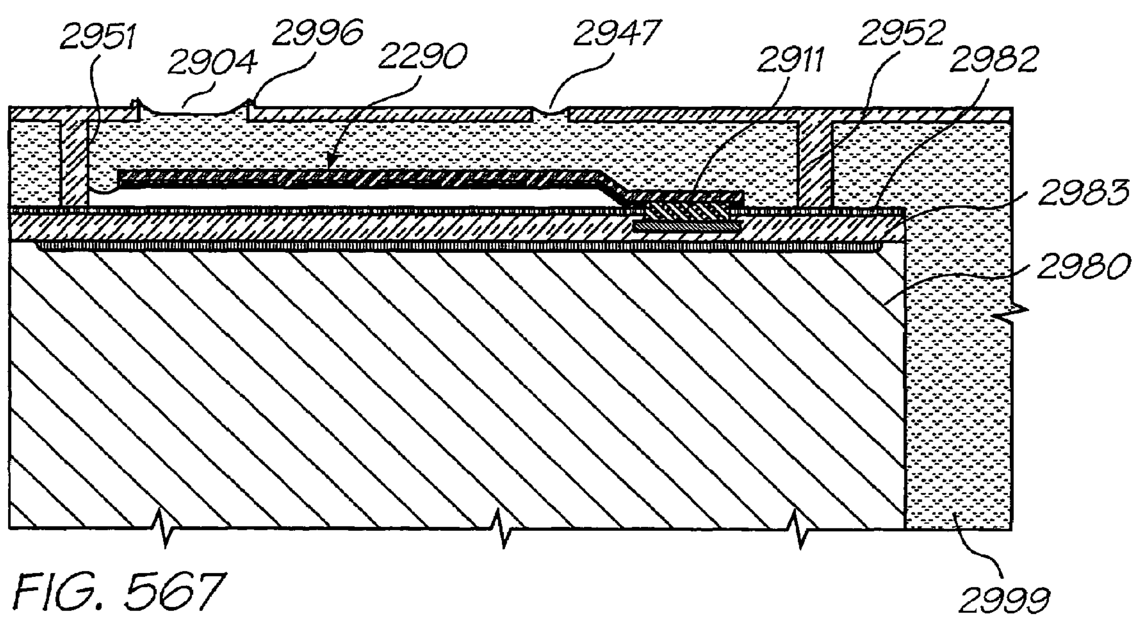

24. Fill the completed printheads with ink 2999 and test them. A filled nozzle is shown in FIG. 567.

IJ30

In a preferred embodiment, there is provided an ink jet printer having ink ejection nozzles from which ink is ejected with the ink ejection being actuated by means of a thermal actuator which includes a "corrugated" copper heating element encased in a polytetrafluoroethylene (PTFE) layer.

Turning now to FIG. 568, there is illustrated a cross-sectional view of a single inkjet nozzle 3010 as constructed in accordance with the present embodiment. The inkjet nozzle 3010 includes an ink ejection port 3011 for the ejection of ink from a chamber 3012 by means of actuation of a thermal paddle actuator 3013. The thermal paddle actuator 3013 comprises an inner copper heating portion 3014 and paddle 3015 which are encased in an outer PTFE layer 3016. The outer PTFE layer 3016 has an extremely high coefficient of thermal expansion (approximately $770\times10^{-6}$, or around 380 times that of silicon). The PTFE layer 3016 is also highly hydrophobic which results in an a bubble 3017 being formed under the actuator 3013 due to out-gassing etc. The top PTFE layer is treated so as to make it hydrophilic. The heater 3014 is also formed within the lower portion of the actuator 3013.

The heater 3014 is connected at ends 3020, 3021 (see also FIG. 574) to a lower CMOS drive layer 3018 containing drive circuitry (not shown). For the purposes of actuation of actuator 3013, a current is passed through the copper heater element 3014 which heats the bottom surface of actuator 3013. Turning now to FIG. 569, the bottom surface of actuator 3013, in contact with air bubble 3017 remains heated while any top surface heating is carried away by the exposure of the top surface of actuator 3013 to the ink within chamber 3012. Hence, the bottom PTFE layer expands more rapidly resulting in a general rapid bending upwards of actuator 3013 (as illustrated in FIG. 569) which consequentially causes the ejection of ink from ink ejection port 3011. An air inlet channel 3028 is formed between two nitride layers 3042, 3026 such that air is free to flow 3029 along channel 3028 and through holes, e.g. 3025, in accordance with any fluctuating pressure influences. The air flow 3029 acts to reduce the vacuum on the back surface of actuator 3013 during operation. As a result less energy is required for the movement of the actuator 3013.

The actuator 3013 can be deactivated by turning off the current to heater element 3014. This will result in a return of the actuator 3013 to its rest position.

The actuator 3013 includes a number of significant features. In FIG. 570 there is illustrated a schematic diagram of the conductive layer of the thermal actuator 3013. The conductive layer includes paddle 3015, which can be constructed from the same material as heater 3014, i.e. copper, and which contains a series of holes e.g. 3023. The holes are provided for interconnecting layers of PTFE both above and below panel 3015 so as to resist any movement of the PTFE layers past the panel 3015 and thereby reducing any opportunities for the delamination of the PTFE and copper layers.

Turning to FIG. 571, there is illustrated a close up view of a portion of the actuator 3013 of FIG. 568 illustrating the corrugated nature 3022 of the heater element 3014 within the PTFE nature of actuator 3013 of FIG. 568. The corrugated nature 3022 of the heater 3014 allows for a more rapid heating of the portions of the bottom layer surrounding the corrugated heater. Any resistive heater which is based upon applying a current to heat an object will result in a rapid, substantially uniform elevation in temperature of the outer surface of the current carrying conductor. The surrounding PTFE volume is therefore heated by means of thermal conduction from the resistive element This thermal conduction is known to proceed, to a first approximation, at a substantially linear rate with respect to distance from a resistive element By utilizing a corrugated resistive element the bottom surface of actuator 3013 is more rapidly heated as, on average, a greater volume of the bottom PTFE surface is closer to a portion of the resistive element Therefore, the utilisation of a corrugated resistive element results in a more rapid heating of the bottom surface layer and therefore a more rapid actuation of the actuator 3013. Further, a corrugated heater also assists in resisting any delamination of the copper and PTFE layer.

Turning now to FIG. 572, the corrugated resistive element can be formed by depositing a resist layer 3050 on top of the first PTFE layer 3051. The resist layer 3050 is exposed utilizing a mask 3052 having a half-tone pattern delineating the corrugations. After development the resist 3050 contains the corrugation pattern. The resist layer 3050 and the PTFE layer 3051 are then etched utilizing an etchant that erodes the resist layer 3050 at substantially the same rate as the PTFE layer 3051. This transfers the corrugated pattern into the PTFE layer 3051. Turning to FIG. 573, on top of the corrugated PTFE layer 3051 is deposited the copper heater layer 3014 which takes on a corrugated form in accordance with its under layer. The copper heater layer 3014 is then etched in a serpentine or concertina form. Subsequently, a further PTFE layer 3053 is deposited on top of layer 3014 so as to form the top layer of the thermal actuator 3013. Finally, the second PTFE layer 3052 is planarized to form the top surface of the thermal actuator 3013 (FIG. 568).

Returning again now to FIG. 568, it is noted that an ink supply can be supplied through a throughway for channel 3038 which can be constructed by means of deep anisotropic silicon trench etching such as that available from STS Limited ("Advanced Silicon Etching Using High Density Plasmas" by J. K. Bhardwaj, H. Ashraf, page 224 of Volume 2639 of the SPIE Proceedings in Micro Machining and Micro Fabrication Process Technology). The ink supply flows from channel 3038 through the side grill portions e.g. 3040 (see also FIG. 574) into chamber 3012. Importantly, the grill portions e.g. 3040 which can comprise silicon nitride or similar insulating material acts to remove foreign bodies from the ink flow. The grill 3040 also helps to pinch the PTFE actuator 3013 to a base CMOS layer 3018, the pinching providing an important assistance for the thermal actuator 3013 so as to ensure a substantially decreased likelihood of the thermal actuator layer 3013 separating from a base CMOS layer 3018.

A series of sacrificial etchant holes, e.g. 3019, are provided in the top wall 3048 of the chamber 3012 to allow sacrificial etchant to enter the chamber 3012 during fabrication so as to increase the rate of etching. The small size of the holes, e.g. 3019, does not affect the operation of the device 3010 substantially as the surface tension across holes, e.g. 3019, stops ink being ejected from these holes, whereas, the larger size hole 3011 allows for the ejection of ink.

Turning now to FIG. 574, there is illustrated an exploded perspective view of a single nozzle 3010. The nozzles 3010 can be formed in layers starting with a silicon wafer device 3041 having a CMOS layer 3018 on top thereof as required. The CMOS layer 3018 provides the various drive circuitry for driving the copper heater elements 3014.

On top of the CMOS layer 3018 a nitride layer 3042 is deposited, providing primarily protection for lower layers from corrosion or etching. Next a nitride layer 3026 is constructed having the aforementioned holes, e.g. 3025, and posts, e.g. 3027. The structure of the nitride layer 3026 can be formed by first laying down a sacrificial glass layer (not shown) onto which the nitride layer 3026 is deposited The nitride layer 3026 includes various features, for example, a lower ridge portion 3030 in addition to vias for the subsequent material layers.

In construction of the actuator 3013 (FIG. 568), the process of creating a first PTFE layer proceeds by laying down a sacrificial layer on top of layer 3026 in which the air bubble underneath actuator 3013 (FIG. 568) subsequently forms. On top of this is formed a first PTFE layer utilizing the relevant mask. Preferably, the PTFE layer includes vias for the subsequent copper interconnections. Next, a copper layer 3043 is deposited on top of the first PTFE layer 3051 and a subsequent PTFE layer is deposited on top of the copper layer 3043, in each case, utilizing the required mask.

The nitride layer 3046 can be formed by the utilisation of a sacrificial glass layer which is masked and etched as required to form the side walls and the grill 3040. Subsequently, the top nitride layer 3048 is deposited again utilizing the appropriate mask having considerable holes as required. Subsequently, the various sacrificial layers can be etched away so as to release the structure of the thermal actuator.

In FIG. 575 there is illustrated a section of an ink jet printhead configuration 3090 utilizing ink jet nozzles constructed in accordance with a preferred embodiment, e.g. 3091. The configuration 3090 can be utilized in a three color process 1600 dpi printhead utilizing 3 sets of 2 rows of nozzle chambers, e.g. 3092, 3093, which are interconnected to one ink supply channel, e.g. 3094, for each set. The 3 supply channels 3094, 3095, 3096 are interconnected to cyan, magenta and yellow ink reservoirs respectively.

Figure 577:
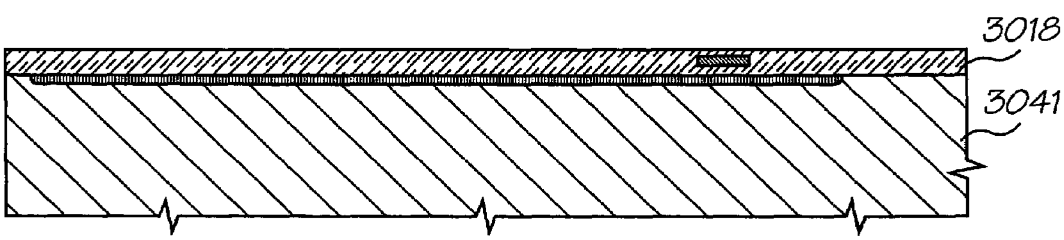

One form of detailed manufacturing process which can be used to fabricate monolithic ink jet printheads operating in accordance with the principles taught by the present embodiment can proceed utilizing the following steps:

1. Using a double sided polished wafer 3041, complete drive transistors, data distribution, and timing circuits using a 0.5 micron, one poly, 2 metal CMOS process 3018. Relevant features of the wafer at this step are shown in FIG. 577. For clarity, these diagrams may not be to scale, and may not represent a cross section though any single plane of the nozzle. FIG. 576 is a key to representations of various materials in these manufacturing diagrams, and those of other cross referenced ink jet configurations.

2. Deposit 1 micron of low stress nitride 3042. This acts as a barrier to prevent ink diffusion through the silicon dioxide of the chip surface.

3. Deposit 2 microns of sacrificial material 3060 (e.g. polyimide).

Figure 578:
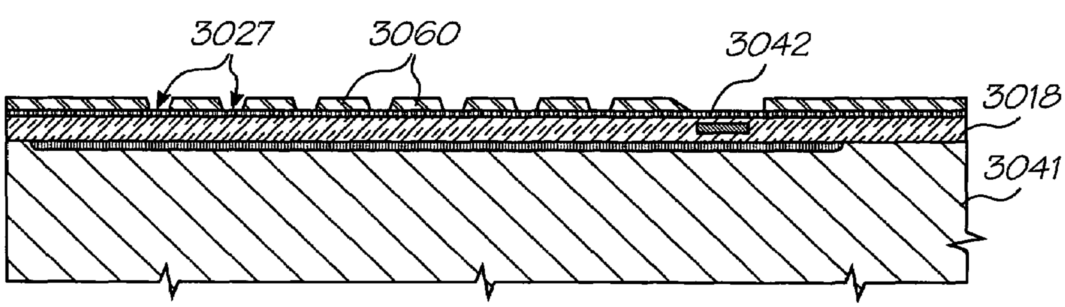

4. Etch the sacrificial layer using Mask 1. This mask defines the PTFE venting layer support pillars e.g. 3027 and anchor point. This step is shown in FIG. 578.

5. Deposit 2 microns of PTFE 3026.

Figure 579:
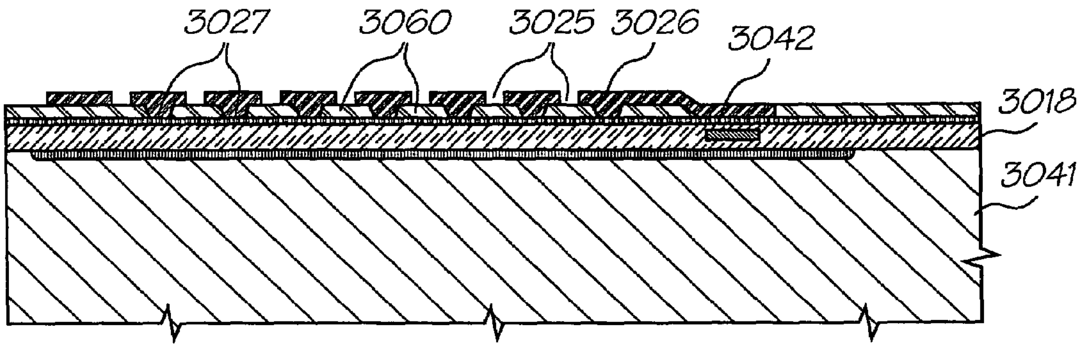

6. Etch the PTFE using Mask 2. This mask defines the edges of the PTFE venting layer, and the holes in this layer. This step is shown in FIG. 579.

7. Deposit 3 micron of sacrificial material 3061 (e.g. polyimide).

Figure 580:
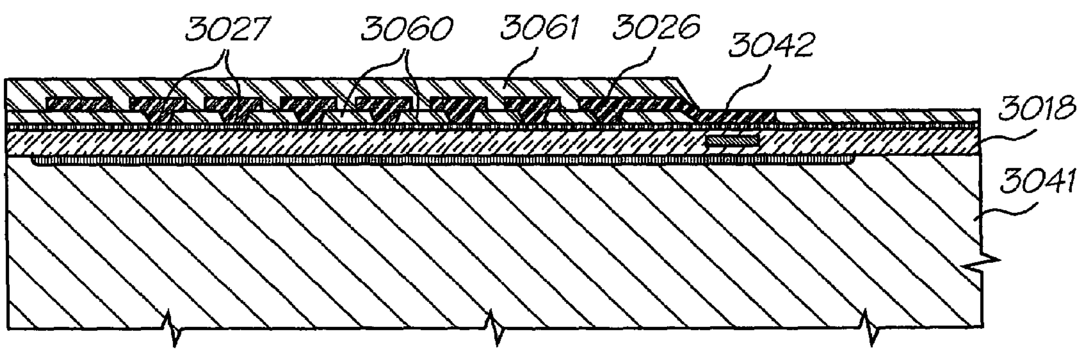

8. Etch the sacrificial layer using Mask 3. This mask defines the actuator anchor point This step is shown in FIG. 580.

9. Deposit 1 micron of PTFE.

10. Deposit expose and develop 1 micron of resist using Mask 4. This mask is a gray-scale mask which defines the heater vias as well as the corrugated PTFE surface 3062 that the heater is subsequently deposited on.

Figure 581:
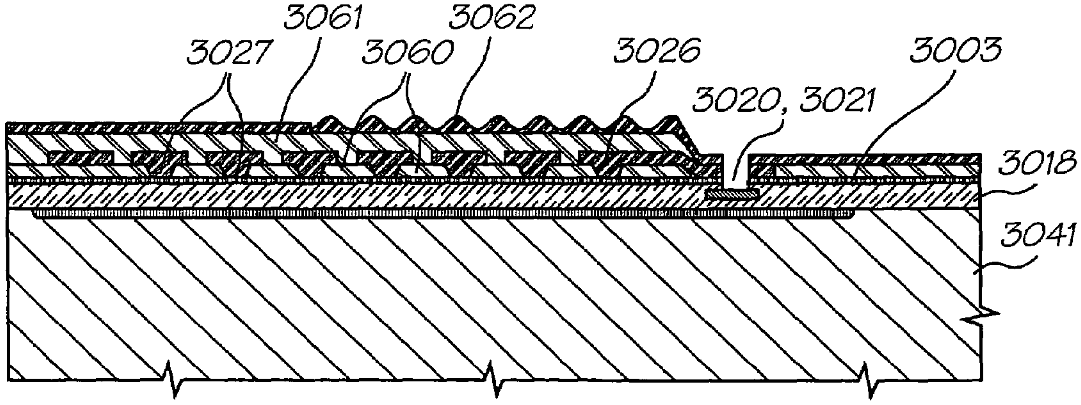

11. Etch the PTFE and resist at substantially the same rate. The corrugated resist thickness is transferred to the PTFE, and the PTFE is completely etched in the heater via positions. In the corrugated regions, the resultant PTFE thickness nominally varies between 0.25 micron and 0.75 micron, though exact values are not critical. This step is shown in FIG. 581.

12. Deposit and pattern resist using Mask 5. This mask defines the heater.

Figure 582:
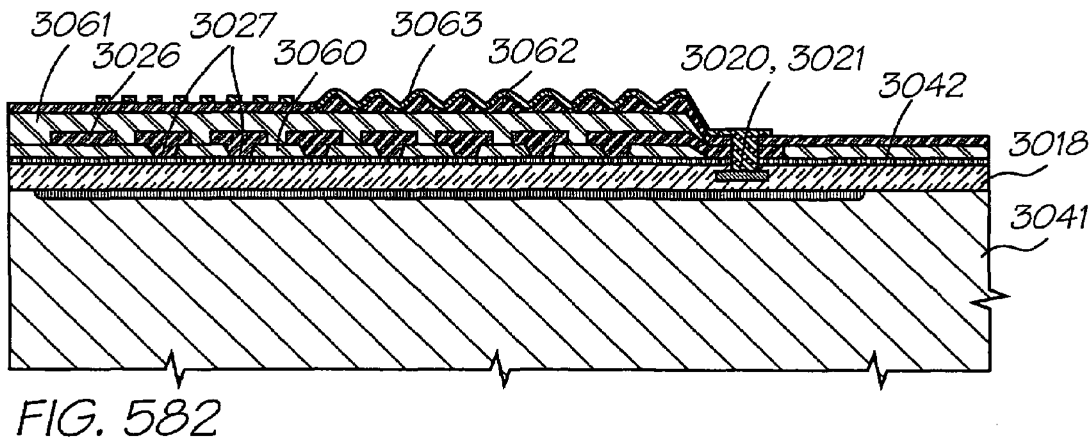

13. Deposit 0.5 microns of gold 3063 (or other heater material with a low Young's modulus) and strip the resist Steps 12 and 13 form a lift-off process. This step is shown in FIG. 582.

14. Deposit 1.5 microns of PTFE 3016.

Figure 583:
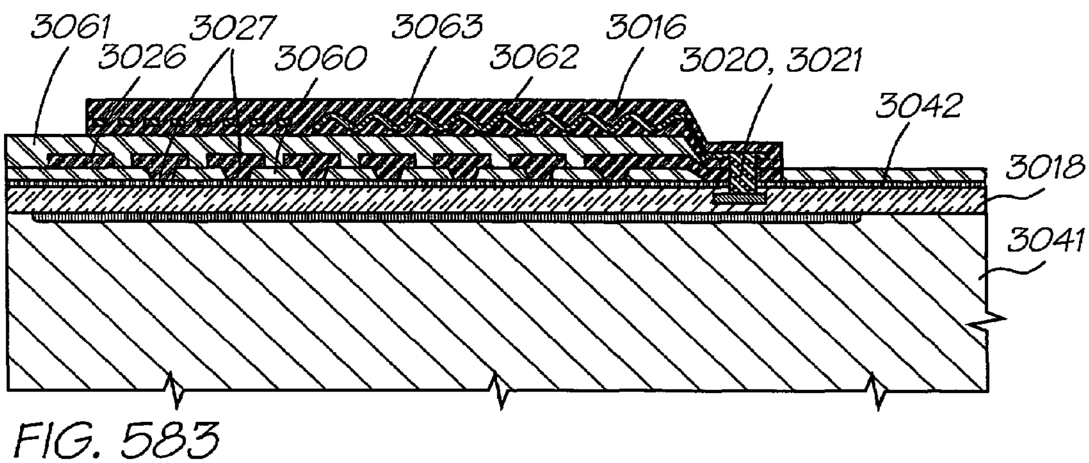

15. Etch the PTFE down to the sacrificial layer using Mask 6. This mask defines the actuator paddle and the bond pads. This step is shown in FIG. 583.

16. Wafer probe. All electrical connections are complete at this point, and the chips are not yet separated.

17. Plasma process the PTFE to make the top and side surfaces of the paddle hydrophilic. This allows the nozzle chamber to fill by capillarity.

18. Deposit 10 microns of sacrificial material 3064.

Figure 584:
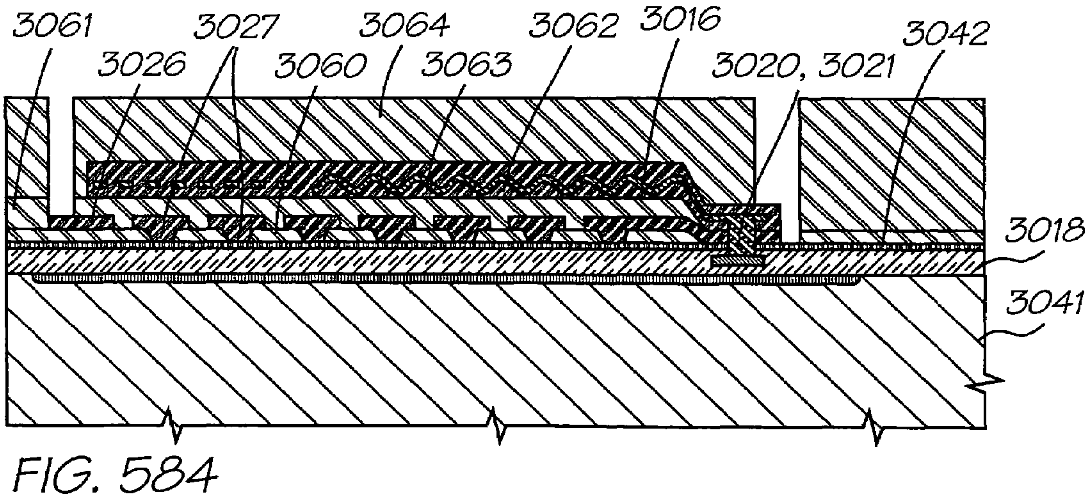

19. Etch the sacrificial material down to nitride using Mask 7. This mask defines the nozzle chamber. This step is shown in FIG. 584.

Figure 585:
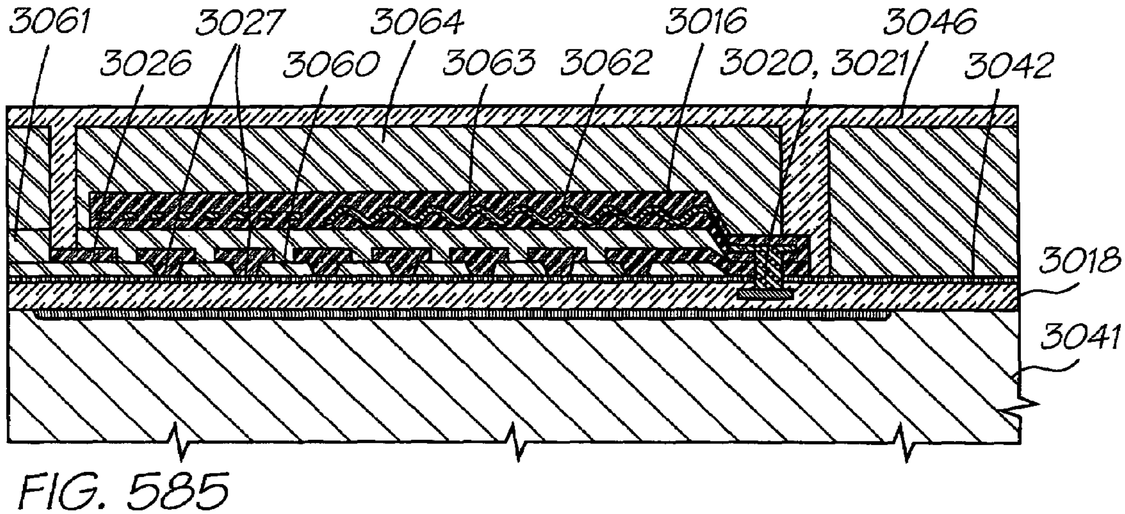

20. Deposit 3 microns of PECVD glass 3046. This step is shown in FIG. 585.

Figure 586:
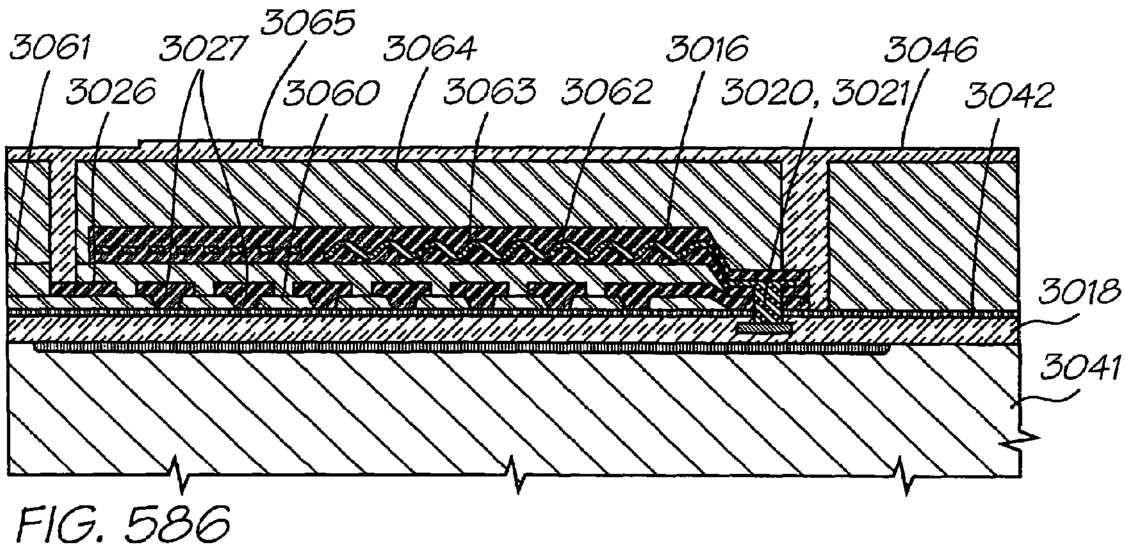

21. Etch to a depth of 1 micron using Mask 8. This mask defines the nozzle rim 3065. This step is shown in FIG. 586.

Figure 587:
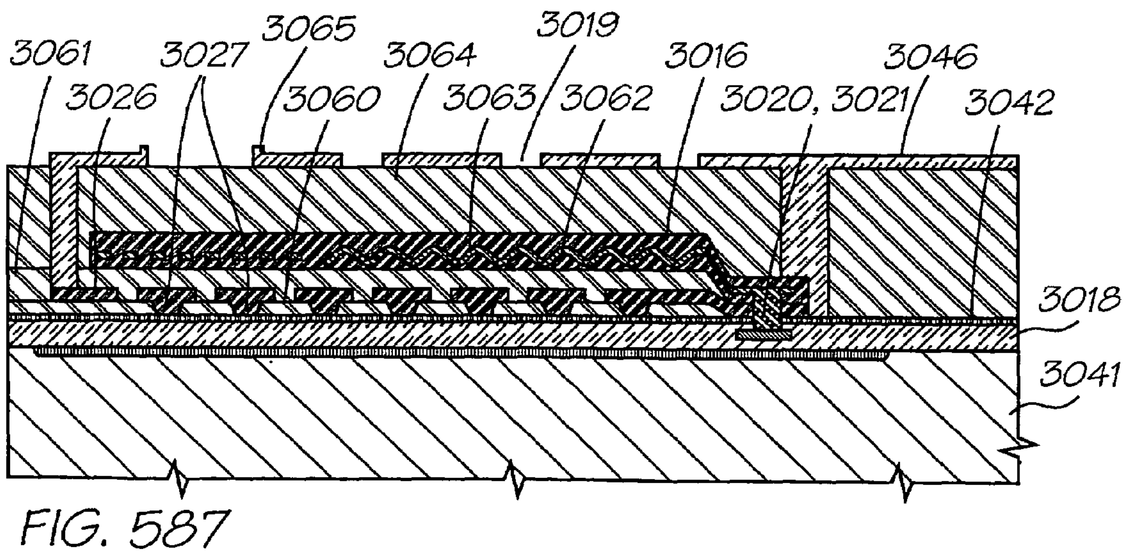

22. Etch down to the sacrificial layer using Mask 9. This mask defines the nozzle and the sacrificial etch access holes e.g. 3019. This step is shown in FIG. 587.

Figure 588:
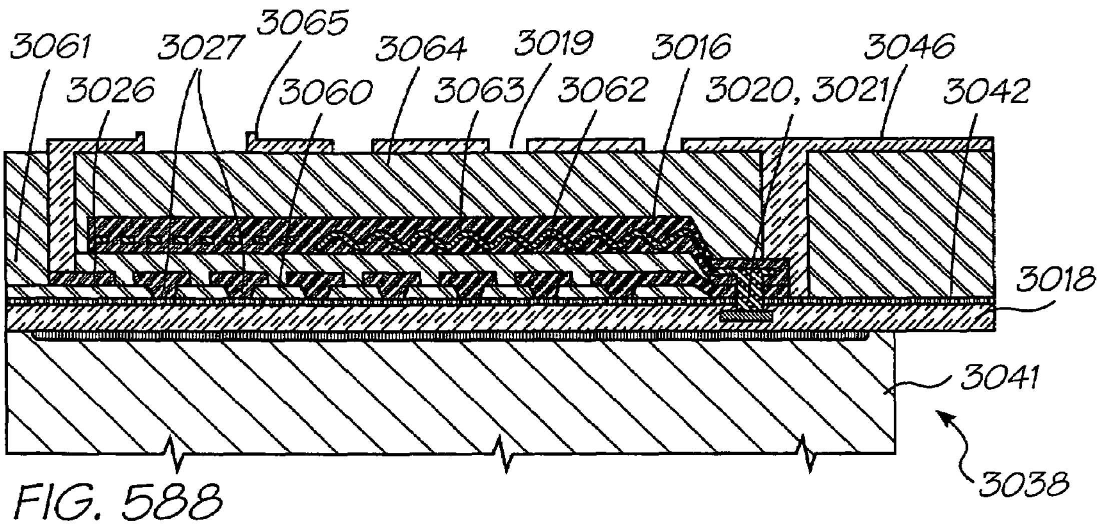

23. Back-etch completely through the silicon wafer (with, for example, an ASE Advanced Silicon Etcher from Surface Technology Systems) using Mask 10. This mask defines the ink inlets 3038 which are etched through the wafer. The wafer is also diced by this etch. This step is shown in FIG. 588.

24. Back-etch the CMOS oxide layers and subsequently deposited nitride layers and sacrificial layer through to PTFE using the back-etched silicon as a mask.

Figure 589:
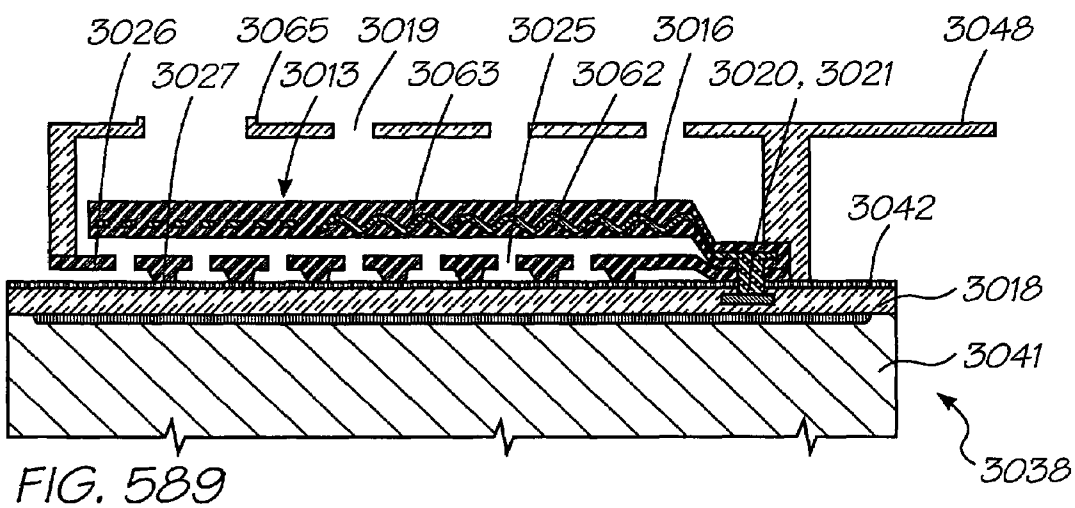

25. Etch the sacrificial material. The nozzle chambers are cleared, the actuators freed, and the chips are separated by this etch This step is shown in FIG. 589.

26. Mount the printheads in their packaging, which may be a molded plastic former incorporating ink channels which supply the appropriate color ink to the ink inlets at the back of the wafer.

27. Connect the printheads to their interconnect systems. For a low profile connection with minimum disruption of airflow, TAB may be used. Wire bonding may also be used if the printer is to be operated with sufficient clearance to the paper.

28. Hydrophobize the front surface of the printheads.

Figure 590:
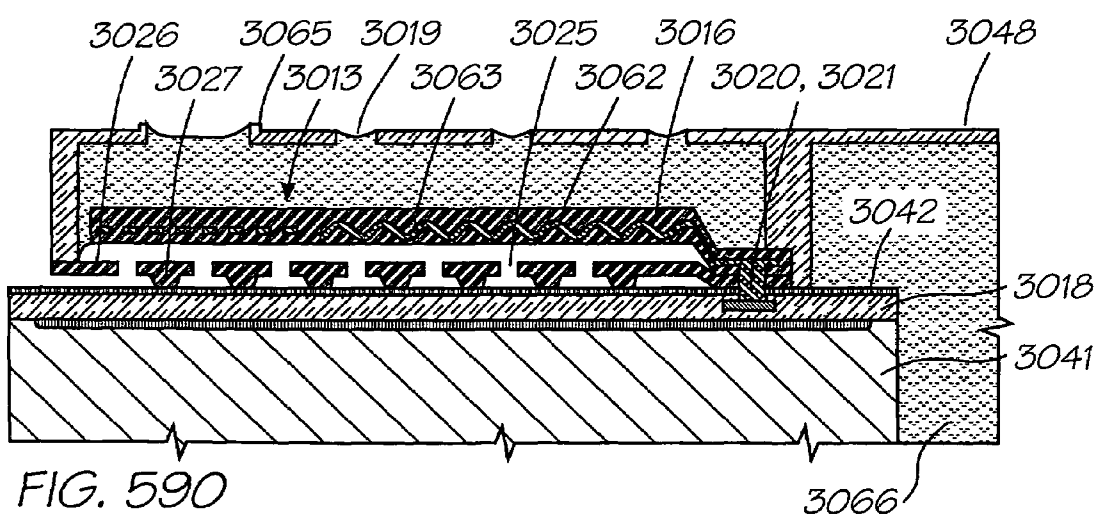

29. Fill the completed printheads with ink 3066 and test them. A filled nozzle is shown in FIG. 590.

IJ31

In a preferred embodiment, a drop on demand ink jet nozzle arrangement is provided which allows for the ejection of ink on demand by means of a thermal actuator which operates to eject the ink from a nozzle chamber. The nozzle chamber is formed directly over an ink supply channel thereby allowing for an extremely compact form of nozzle arrangement The extremely compact form of nozzle arrangement allows for minimal area to be taken up by a printing mechanism thereby resulting in improved economics of fabrication.

Turning initially to FIGS. 591-593, the operation of a preferred embodiment of the nozzle arrangement is now described. In FIG. 591, there is illustrated a sectional view of two ink jet nozzle arrangements 3110, 3111 which are formed on a silicon wafer 3112 which includes a series of through-wafer ink supply channels 3113.

Located over a portion of the wafer 3112 and over the ink supply channel 3113 is a thermal actuator 3114 which is actuated so as to eject ink from a corresponding nozzle chamber. The actuator 3114 is placed substantially over the ink supply channel 3113. In the quiescent position, the ink fills the nozzle chamber and an ink meniscus 3115 forms across an ink ejection port 3135 (FIG. 594) of the chamber.

When it is desired to eject a drop from the chamber, the thermal actuator 3114 is activated by passing a current through the actuator 3114. The actuation causes the actuator 3114 to rapidly bend upwards as indicated in FIG. 592. The movement of the actuator 3114 results in an increase in the ink pressure around the ejection port 3135 of the chamber which in turn causes a significant bulging of the meniscus 3115 and the flow of ink out of the nozzle chamber. The actuator 3114 can be constructed so as to impart sufficient momentum to the ink to cause the direct ejection of a drop.

Alternatively, as indicated in FIG. 593, the activation of actuator 3114 can be timed so as to turn the actuation current off at a predetermined point. This causes the return of the actuator 3114 to its original position thereby resulting in a consequential backflow of ink in the direction of an arrow 3117 into the chamber. This causes a necking and separation of a body of ink 3118 which has a continuing momentum and continues towards the output media, such as paper, for printing thereof. The actuator 3114 then returns to its quiescent position and surface tension effects result in a refilling of the nozzle chamber via the ink supply channel 3113 as a consequence of surface tension effects on the meniscus 3115. In time, the condition of the ink returns to that depicted in FIG. 591.

Turning now to FIGS. 594 and 595, there is illustrated the structure of a single nozzle arrangement 3110 in more detail. FIG. 594 is a part sectional view while FIG. 595 shows a corresponding exploded perspective view. Many ink jet nozzles can be formed at a time, on a selected wafer base 3112 utilizing standard semi-conductor processing techniques in addition to micro-machining and micro-fabrication process technology (MEMS) and a full familiarity with these technologies is hereinafter assumed.

On top of the silicon wafer layer 3112 is formed a CMOS layer 3120. The CMOS layer 3120 can, in accordance with standard techniques, include multi-level metal layers sandwiched between oxide layers and preferably at least a two level metal process is utilized. In order to reduce the number of necessary processing steps, the masks utilized include areas which provide for a build up of an aluminum barrier 3121 which can be constructed from a first level 3122 of aluminum and second level 3123 of aluminum layer. Additionally, aluminum portions 3124 are provided which define electrical contacts to a subsequent heater layer. The aluminum barrier portion 3121 is important for providing an effective barrier to the possible subsequent etching of the oxide within the CMOS layer 3120 when a sacrificial etchant is utilized in the construction of the nozzle arrangement 3110 with the etchable material preferably being glass layers.

On top of the CMOS layer 3120 is formed a nitride passivation layer 3126 to protect the lower CMOS layers from sacrificial etchants and ink erosion. Above the nitride layer 3126 there is formed a gap 3128 in which an air bubble forms during operation The gap 3128 can be constructed by laying down a sacrificial layer and subsequently etching the gap 3128 as will be explained hereinafter.

On top of the air gap 3128 is constructed a polytetrafluoroethylene (PTFE) layer 3129 which comprises a gold serpentine heater layer 3130 sandwiched between two PTFE layers. The gold heater layer 3130 is constructed in a serpentine form to allow it to expand on heating. The heater layer 3130 and PTFE layer 3129 together comprise the thermal actuator 3114 of FIG. 591.

The outer PTFE layer 3129 has an extremely high coefficient of thermal expansion (approximately $770\times10^{-6}$, or around 380 times that of silicon). The PTFE layer 3129 is also normally highly hydrophobic which results in an air bubble being formed under the actuator in the gap 3128 due to outgassing etc. The top PTFE surface layer is treated so as to make it hydrophilic in addition to those areas around ink supply channel 3113. This can be achieved with a plasma etch in an ammonia atmosphere. The heater layer 3130 is also formed within the lower portion of the PTFE layer.

The heater layer 3130 is connected at ends e.g. 3131 to the lower CMOS drive layer 3120 which contains the drive circuitry (not shown). For operation of the actuator 3114, a current is passed through the gold heater element 3130 which heats the bottom surface of the actuator 3114. The bottom surface of actuator 3114, in contact with the air bubble remains heated while any top surface heating is carried away by the exposure of the top surface of actuator 3114 to the ink within a chamber 3132. Hence, the bottom PTFE layer expands more rapidly resulting in a general rapid upward bending of actuator 3114 (as illustrated in FIG. 592) which consequentially causes the ejection of ink from the ink ejection port 3135.

The actuator 3114 can be deactivated by turning off the current to the heater layer 3130. This will result in a return of the actuator 3114 to its rest position.

On top of the actuator 3114 are formed nitride side wall portions 3133 and a top wall portion 3134. The wall portions 3133 and the top portions 3134 can be formed via a dual damascene process utilizing a sacrificial layer. The top wall portion 3134 is etched to define the ink ejection port 3135 in addition to a series of etchant holes 3136 which are of a relatively small diameter and allow for effective etching of lower sacrificial layers when utilizing a sacrificial etchant. The etchant holes 3136 are made small enough such that surface tension effects restrict the possibilities of ink being ejected from the chamber 3132 via the etchant holes 3136 rather than the ejection port 3135.

Figure 596:
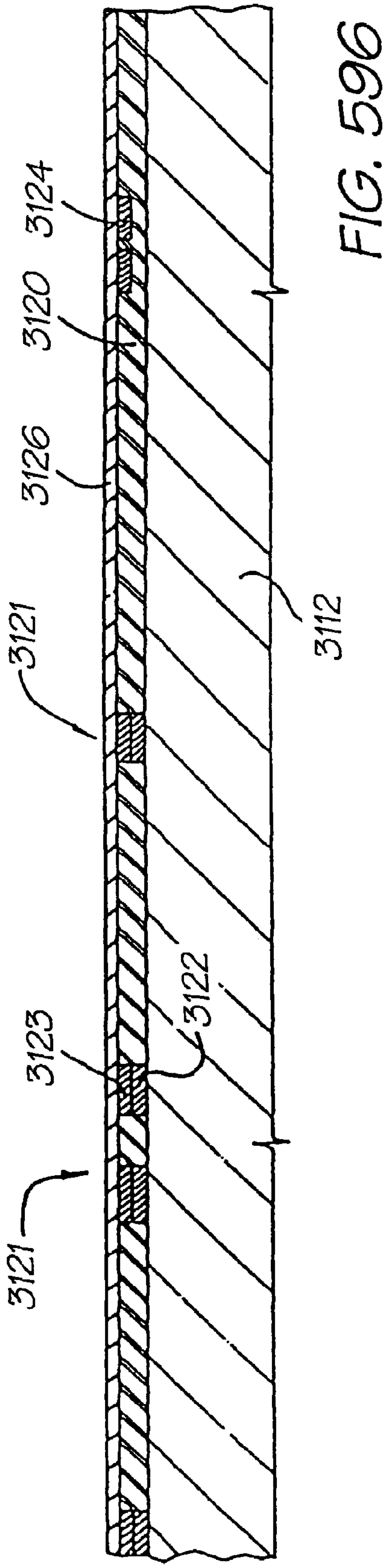

Turning now to FIGS. 596-605, there will now be explained the various steps involved in the construction of an array of ink jet nozzle arrangements:

1. Turning initially to FIG. 596, the starting position comprises a silicon wafer 3112 including a CMOS layer 3120 which has nitride passivation layer 3126 and which is surface finished with a chemical—mechanical planarization process.

Figure 597:
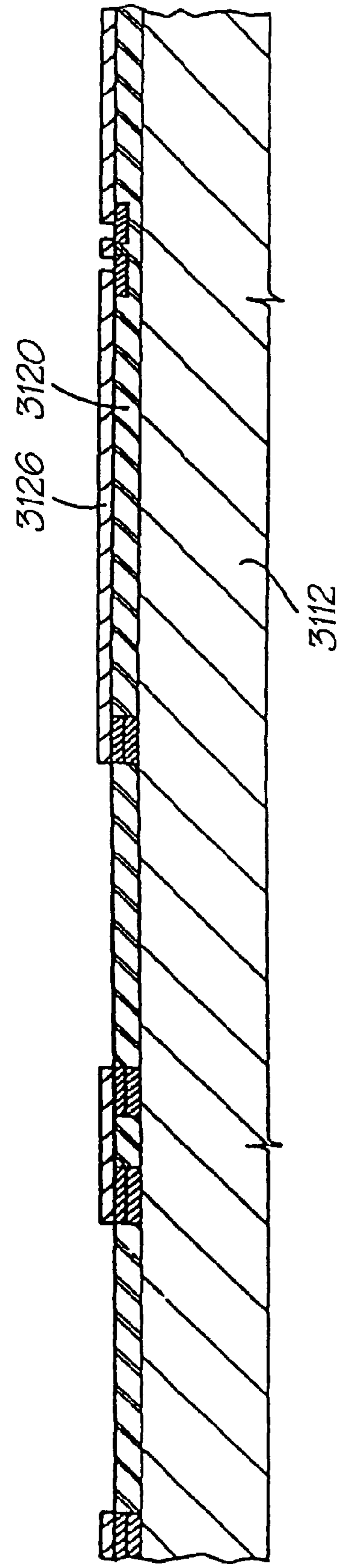

2. The nitride layer is masked and etched as illustrated in FIG. 597 so as to define portions of the nozzle arrangement and areas for interconnection between any subsequent heater layer and a lower CMOS layer.

Figure 598:
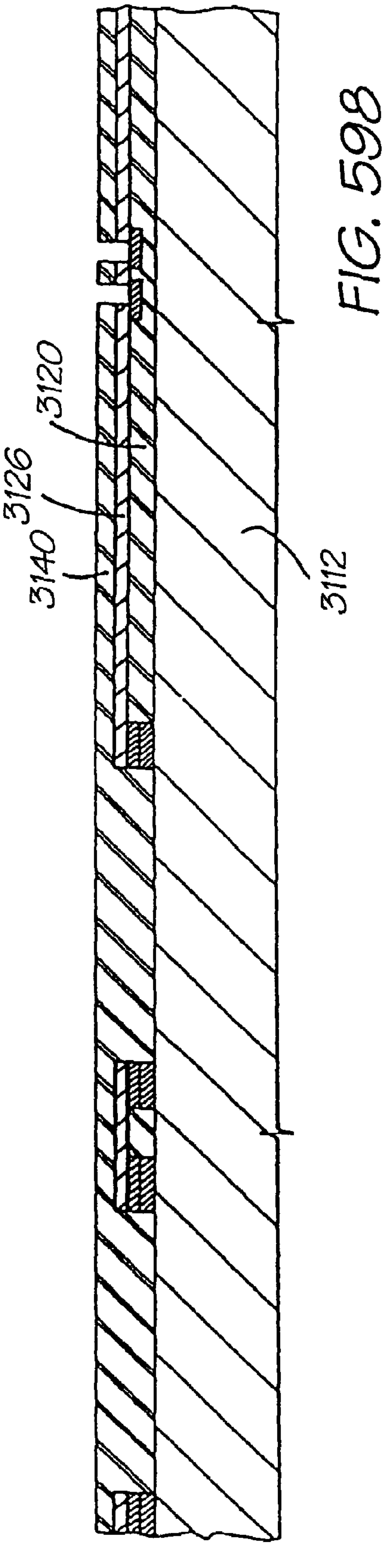

3. Next, a sacrificial oxide layer 3140 is deposited, masked and etched as indicated in FIG. 598 with the oxide layer being etched in those areas that a subsequent heater layer electronically contacts the lower layers.

Figure 599:
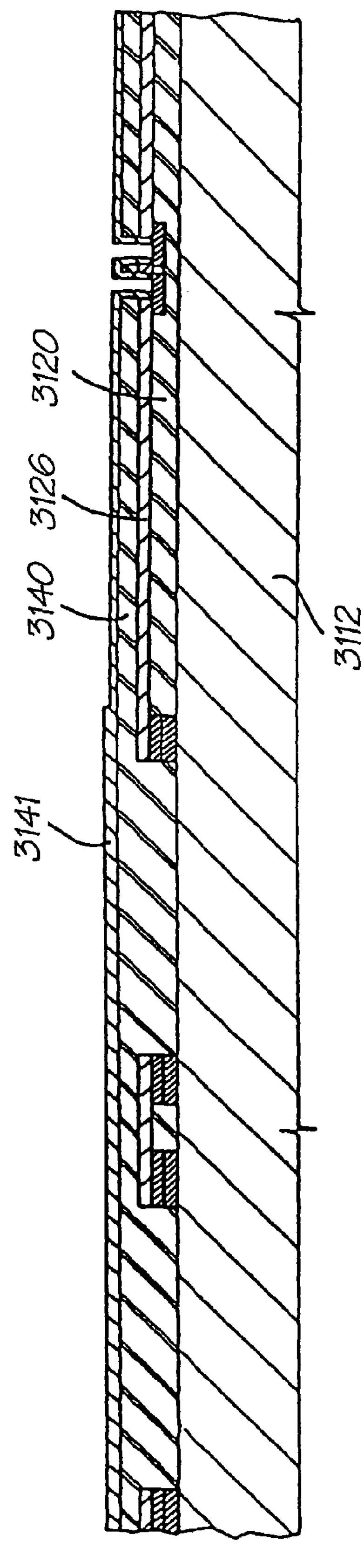

4. As illustrated in FIG. 599, next a 1 micron layer of PTFE 3141 is deposited and first masked and etched for the heater contacts to the lower CMOS layer and then masked and etched for the heater shape.

Figure 600:
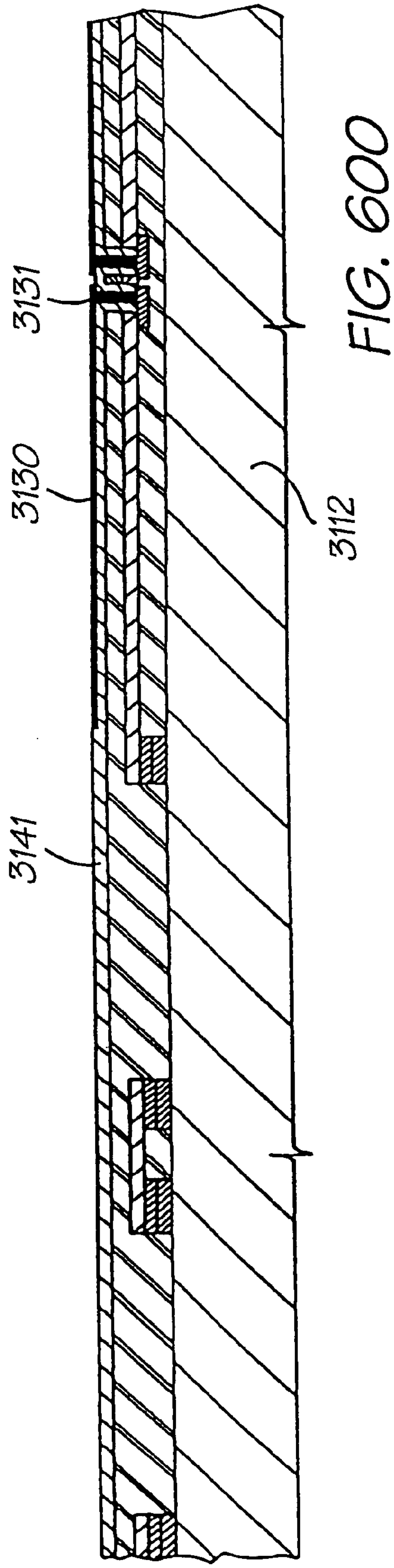

5. Next, as illustrated in FIG. 600, the gold heater layer 3130, 3131 is deposited. Due to the fact that it is difficult to etch gold, the layer can be conformally deposited and subsequently portions removed utilizing chemical mechanical planarization so as to leave those portions associated with the heater element. The processing steps 4 and 5 basically comprise a dual damascene process.

Figure 601:
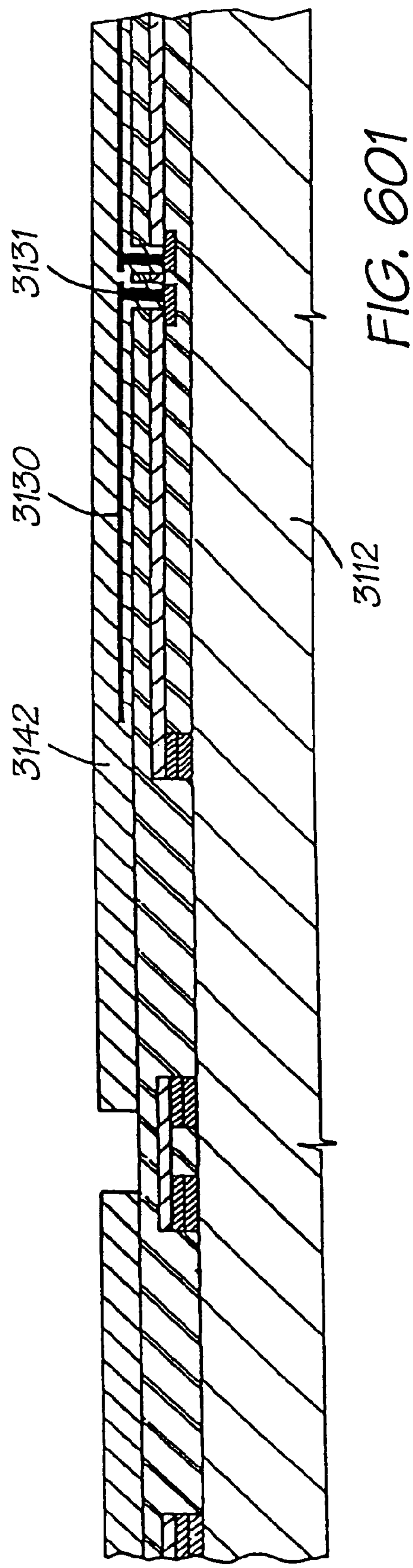

6. Next, a top PTFE layer 3142 is deposited and masked and etched down to the sacrificial layer as illustrated in FIG. 601 so as to define the heater shape. Subsequently, the surface of the PTFE layer is plasma processed so as to make it hydrophilic. Suitable processing can including plasma damage in an ammonia atmosphere. Alternatively, the surface could be coated with a hydrophilic material.

Figure 602:
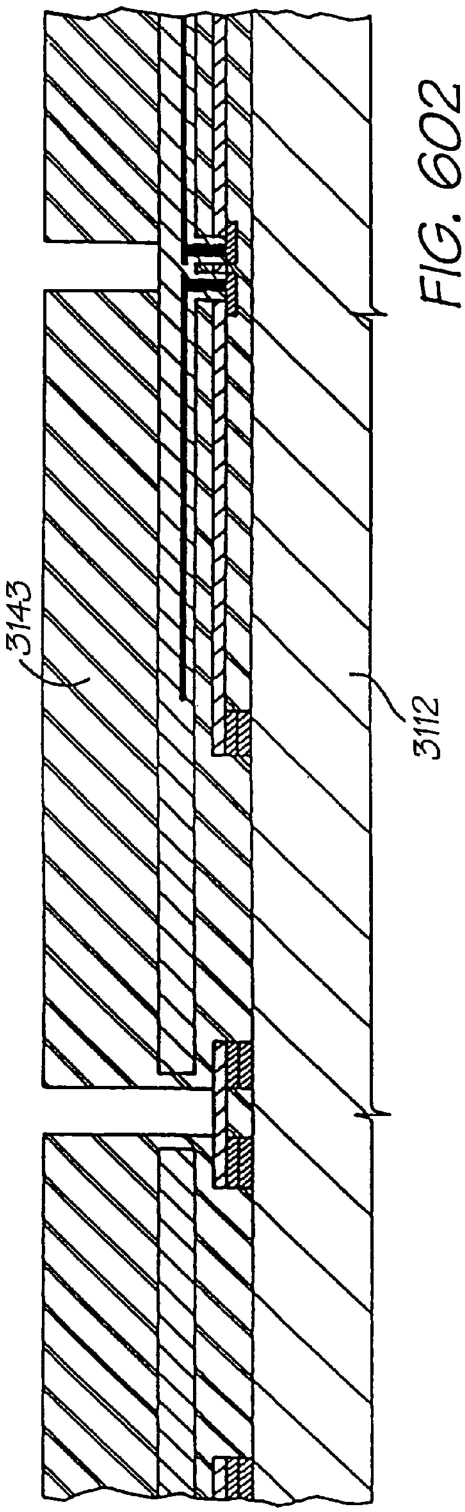

7. A further sacrificial layer 3143 is then deposited and etched as illustrated in FIG. 602 so as to form the structure for the nozzle chamber. The sacrificial oxide being is masked and etched in order to define the nozzle chamber walls.

Figure 603:
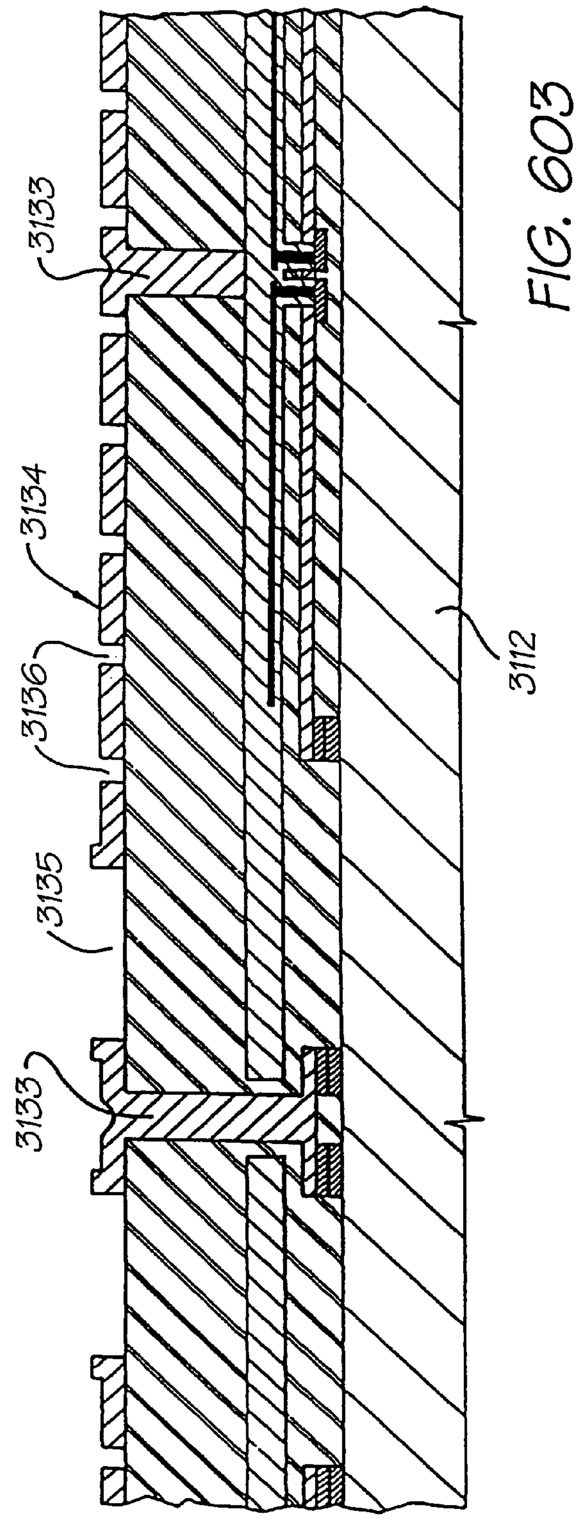

8. Next, as illustrated in FIG. 603, the nozzle chamber is formed by conformally depositing three microns of nitride and etching a mask nozzle rim to a depth of one micron for the nozzle rim (the etched depth not being overly time critical). Subsequently, a mask is utilized to etch the ink ejection port 3135 in addition to the sacrificial layer etchant holes 3136.

Figure 604:
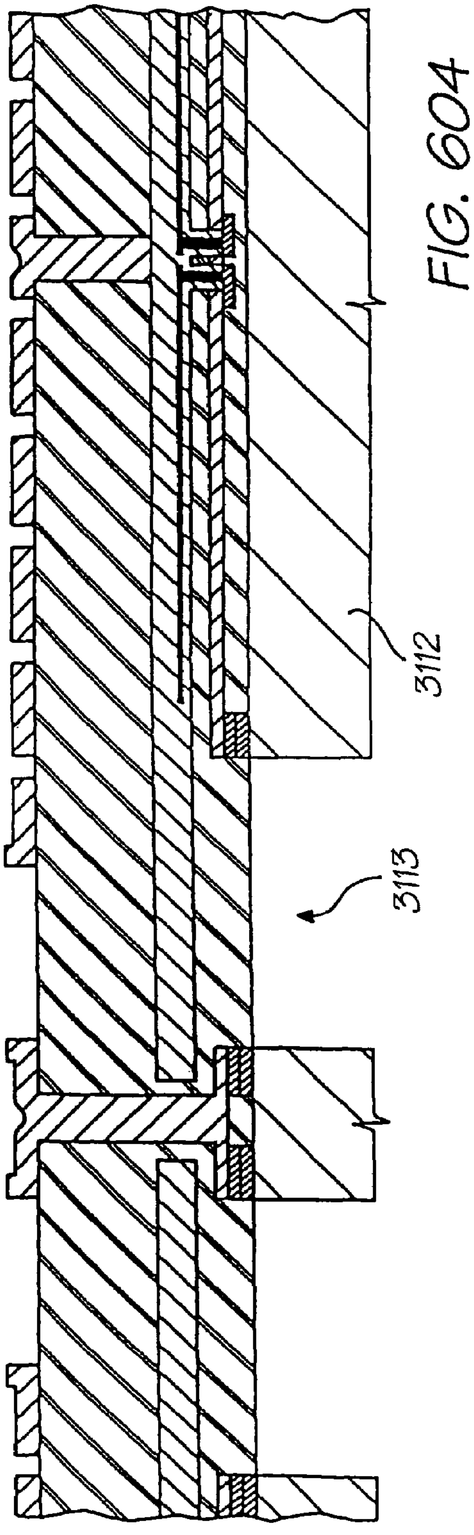

9. Next, as illustrated in FIG. 604, the backside of the wafer is masked for the ink channels 3113 and plasma etched through the wafer. A suitable plasma etching process can include a deep anisotropic trench etching system such as that available from SDS Systems Limited (See) "Advanced Silicon Etching Using High Density Plasma" by J. K. Bhardwaj, H. Ashraf, page 224 of Volume 2639 of the SPIE Proceedings in Micro Machining and Micro Fabrication Process Technology).

Figure 605:
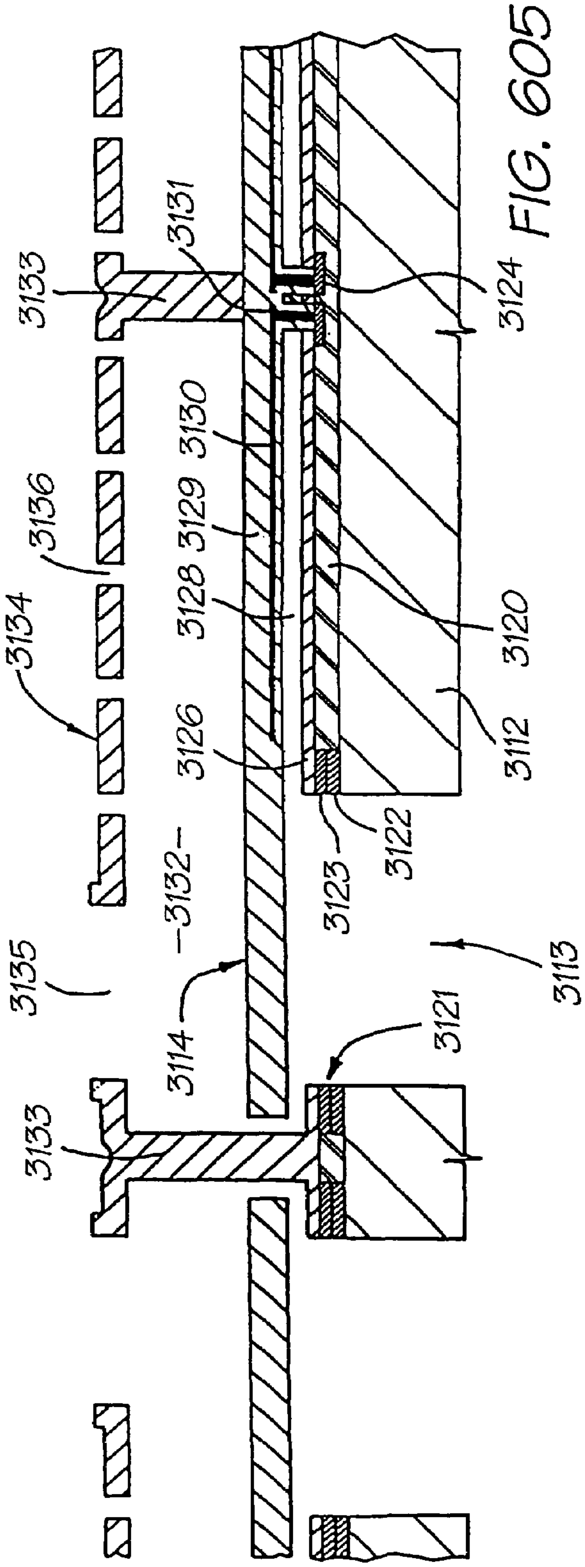

10. Next, as illustrated in FIG. 605, the sacrificial layers are etched away utilizing a sacrificial etchant such as hydrochloric acid. Subsequently, the portion underneath the actuator which is around the ink channel is plasma processed through the backside of the wafer to make the panel end hydrophilic.

Subsequently, the wafer can be separated into separate printheads and each printhead is bonded into an injection molded ink supply channel and the electrical signals to the chip can be tape automated bonded (TAB) to the printhead for subsequent testing. FIG. 606 illustrates a top view of nozzle arrangement constructed on a wafer so as to provide for pagewidth multicolor output.

Figure 608:
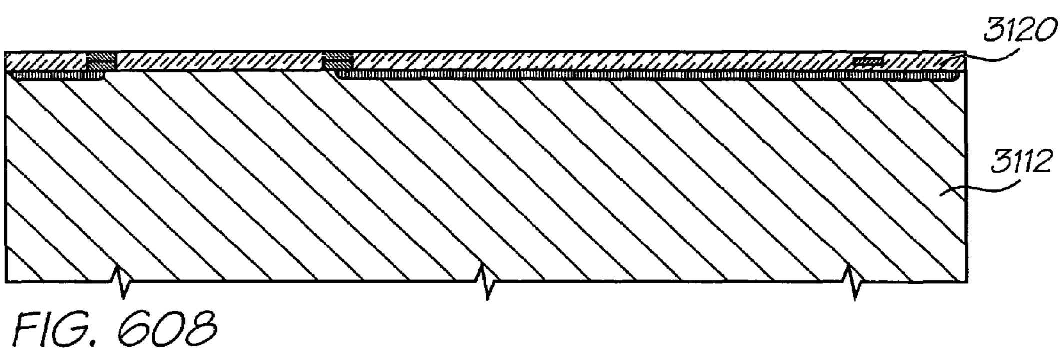

One form of detailed manufacturing process which can be used to fabricate monolithic ink jet printheads operating in accordance with the principles taught by the present embodiment can proceed utilizing the following steps:

1. Using a double sided polished wafer 3112, Complete drive transistors, data distribution, and timing circuits using a 0.5 micron, one poly, 2 metal CMOS process 3120. This step is shown in FIG. 608. For clarity, these diagrams may not be to scale, and may not represent a cross section though any single plane of the nozzle. FIG. 607 is a key to representations of various materials in these manufacturing diagrams, and those of other cross-referenced ink jet configurations.

2. Deposit 1 micron of low stress nitride 3150. This acts as a barrier to prevent ink diffusion through the silicon dioxide of the chip surface.

3. Deposit 3 microns of sacrificial material 3151 (e.g. polyimide).

Figure 609:
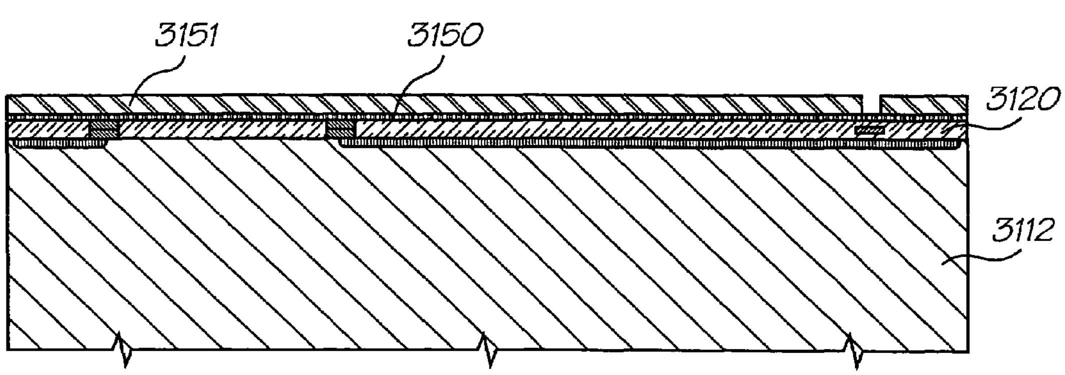

4. Etch the sacrificial layer using Mask 1. This mask defines the actuator anchor point This step is shown in FIG. 609.

5. Deposit 0.5 microns of PTFE 3152.

Figure 610:
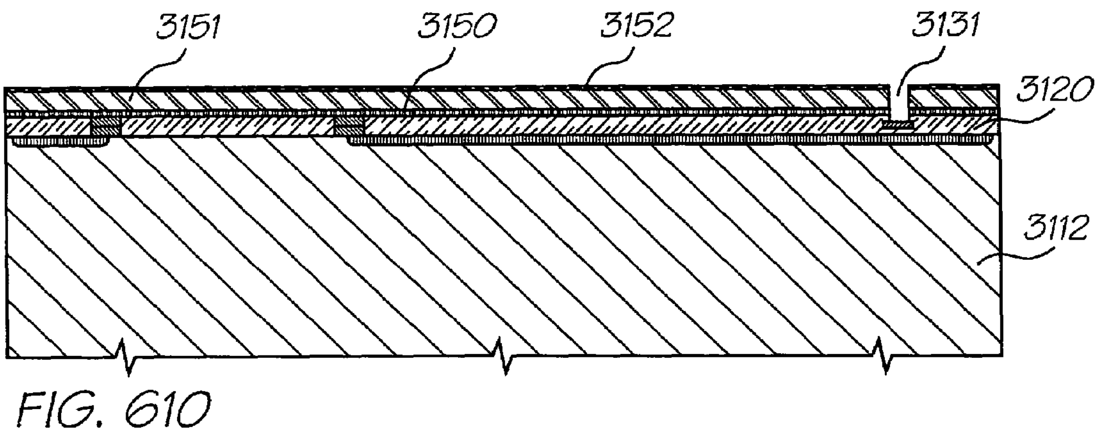

6. Etch the PTFE, nitride, and CMOS passivation down to second level metal using Mask 2. This mask defines the heater vias 3131. This step is shown in FIG. 610.

7. Deposit and pattern resist using Mask 3. This mask defines the heater.

Figure 611:
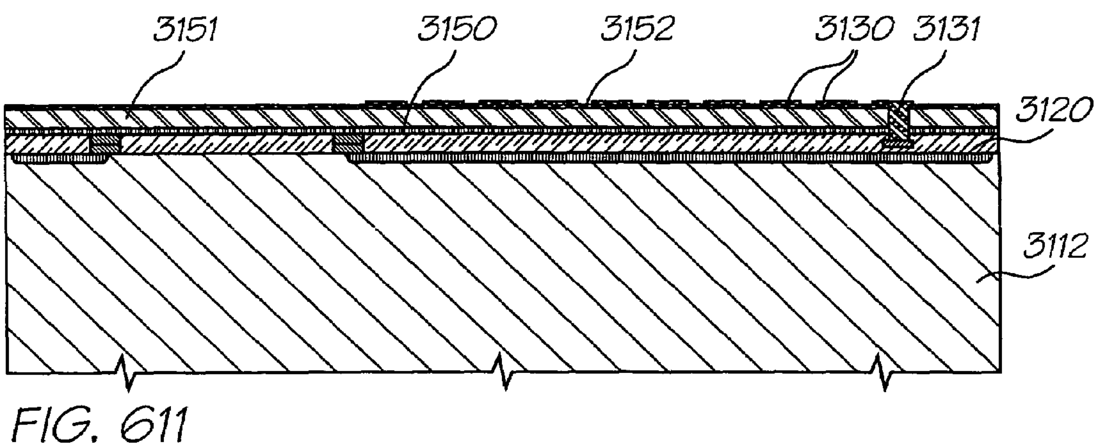

8. Deposit 0.5 microns of gold 3130 (or other heater material with a low Young's modulus) and strip the resist Steps 7 and 8 form a lift-off process. This step is shown in FIG. 611.

9. Deposit 1.5 microns of PTFE 3153.

Figure 612:
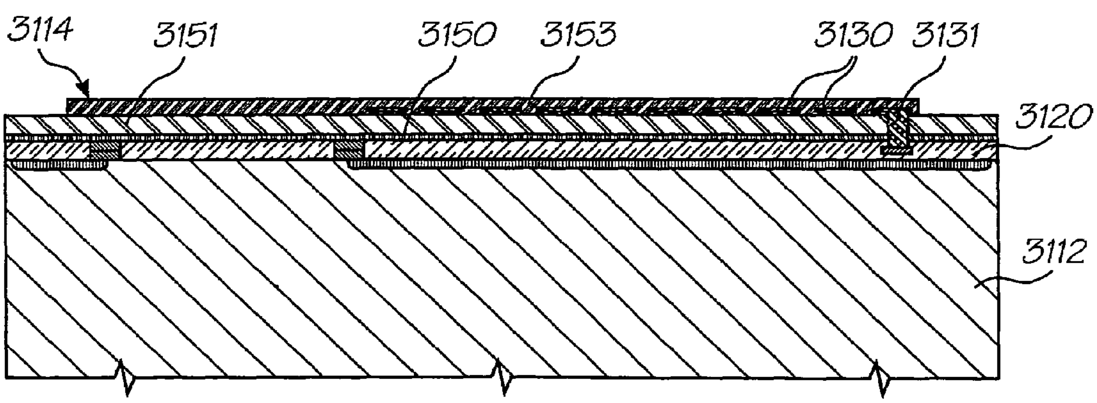

10. Etch the PTFE down to the sacrificial layer using Mask 4. This mask defines the actuator 3114 and the bond pads. This step is shown in FIG. 612.

11. Wafer probe. All electrical connections are complete at this point, and the chips are not yet separated.

12. Plasma process the PTFE to make the top and side surfaces of the actuator hydrophilic. This allows the nozzle chamber to fill by capillarity.

13. Deposit 10 microns of sacrificial material 3154.

Figure 613:
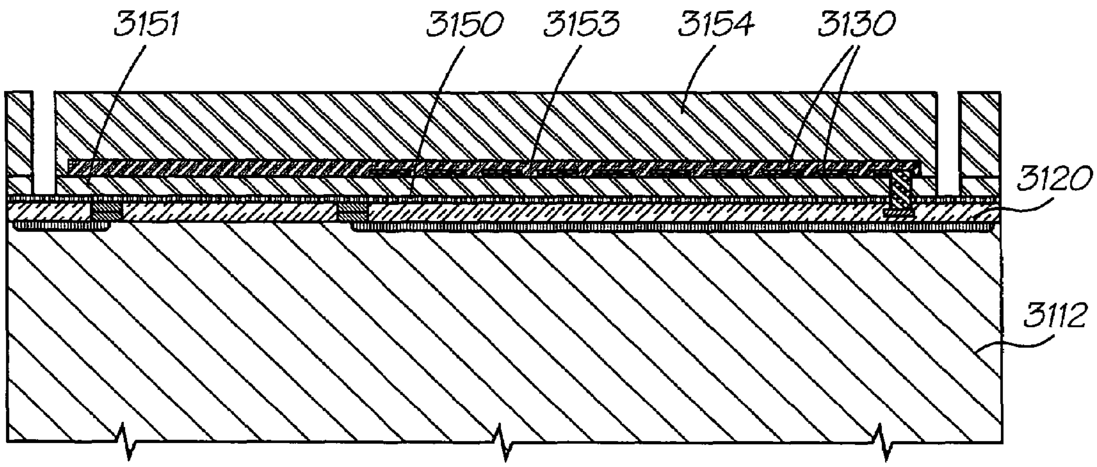

14. Etch the sacrificial material down to nitride using Mask 5. This mask defines the nozzle chamber. This step is shown in FIG. 613.

Figure 614:
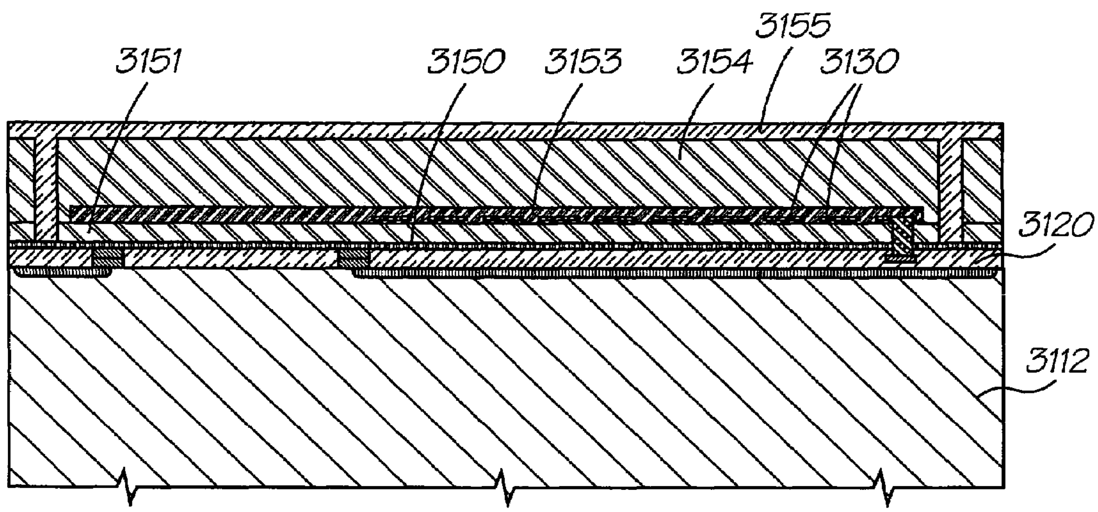

15. Deposit 3 microns of PECVD glass 3155. This step is shown in FIG. 614.

Figure 615:
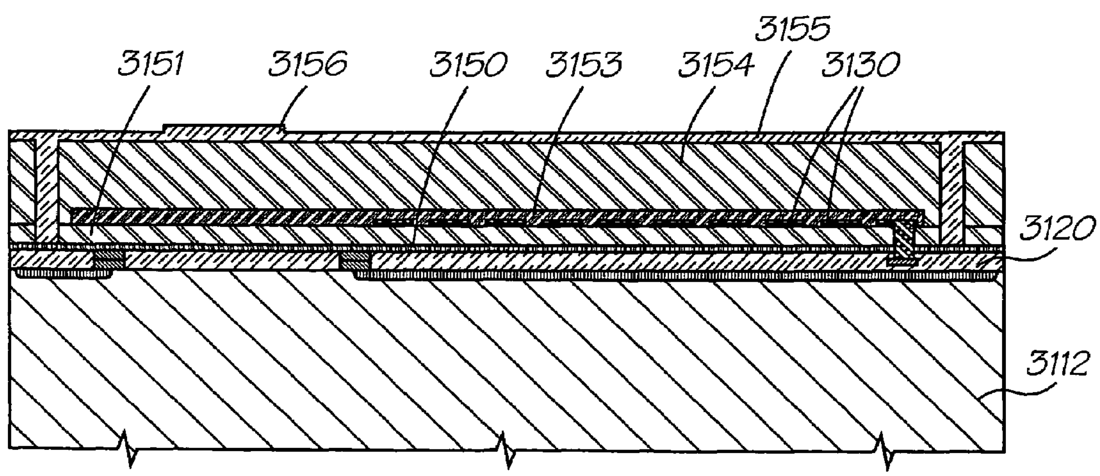

16. Etch to a depth of 1 micron using Mask 6. This mask defines a rim 3156 of the ejection port. This step is shown in FIG. 615.

Figure 616:
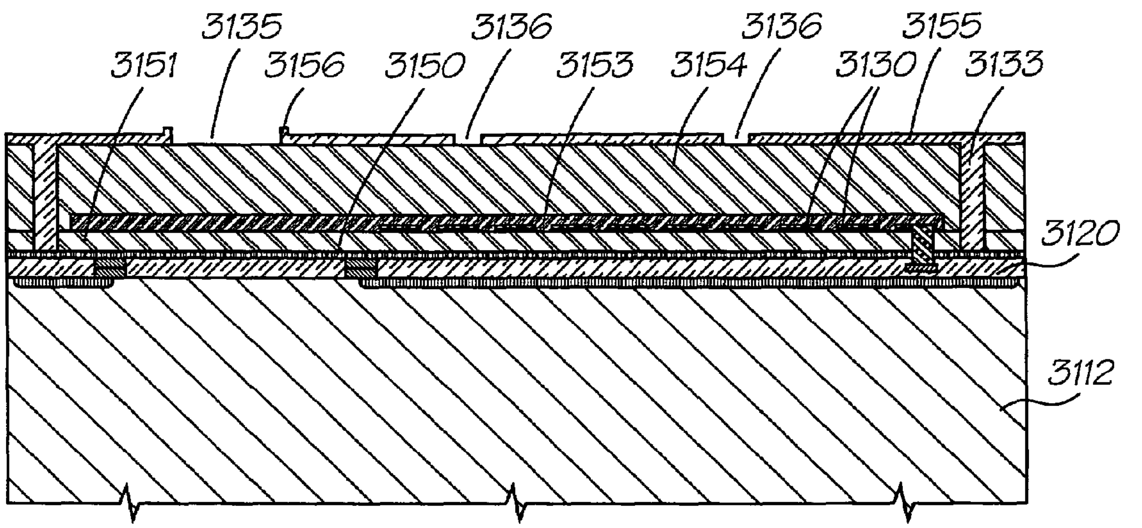

17. Etch down to the sacrificial layer using Mask 7. This mask defines the ink ejection port 3135 and the sacrificial etch access holes 3136. This step is shown in FIG. 616.

Figure 617:
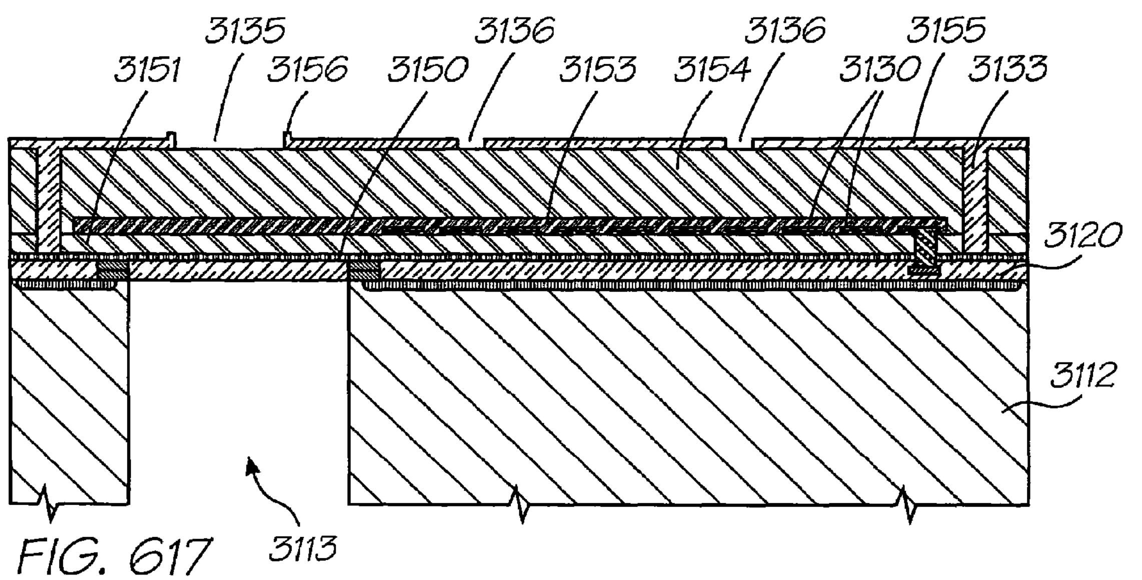

18. Back-etch completely through the silicon wafer (with, for example, an ASE Advanced Silicon Etcher from Surface Technology Systems) using Mask 8. This mask defines the ink inlets 3113 which are etched through the wafer. The wafer is also diced by this etch. This step is shown in FIG. 617.

19. Back-etch the CMOS oxide layers and subsequently deposited nitride layers and sacrificial layer through to PTFE using the back-etched silicon as a mask.

20. Plasma process the PTFE through the back-etched holes to make the top surface of the actuator hydrophilic. This allows the nozzle chamber to fill by capillarity, but maintains a hydrophobic surface underneath the actuator. This hydrophobic section causes an air bubble to be trapped under the actuator when the nozzle is filled with a water based ink. This bubble serves two purposes: to increase the efficiency of the heater by decreasing thermal conduction away from the heated side of the PTFE, and to reduce the negative pressure on the back of the actuator.

Figure 618:
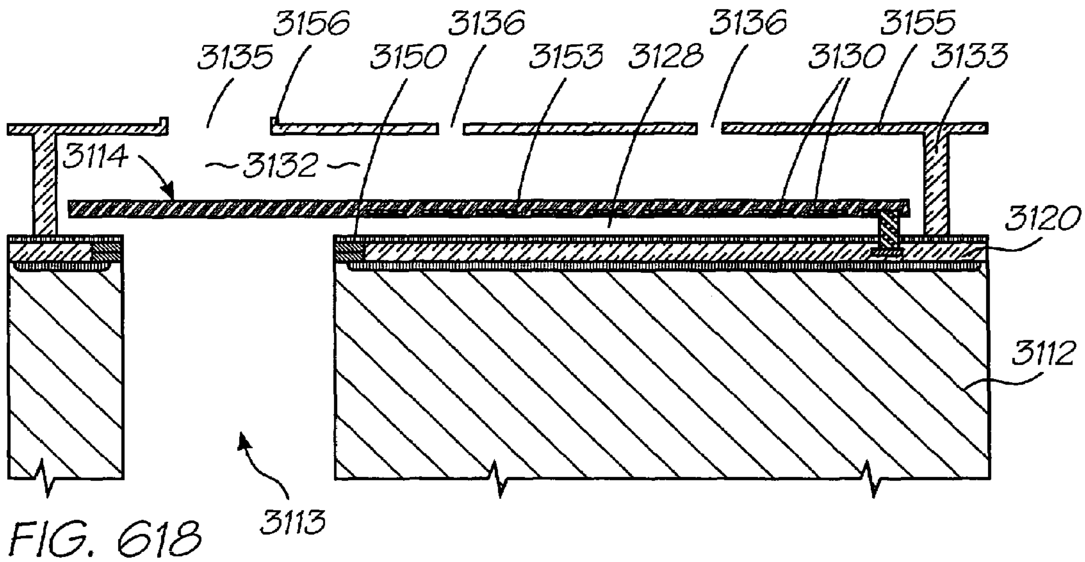

21. Etch the sacrificial material. The nozzle arrangements are cleared, the actuators freed, and the chips are separated by this etch This step is shown in FIG. 618.

22. Mount the printheads in their packaging, which may be a molded plastic former incorporating ink channels which supply the appropriate color ink to the ink inlets at the back of the wafer.

23. Connect the printheads to their interconnect systems. For a low profile connection with minimum disruption of airflow, TAB may be used. Wire bonding may also be used if the printer is to be operated with sufficient clearance to the paper.

24. Hydrophobize the front surface of the printheads.

Figure 619:
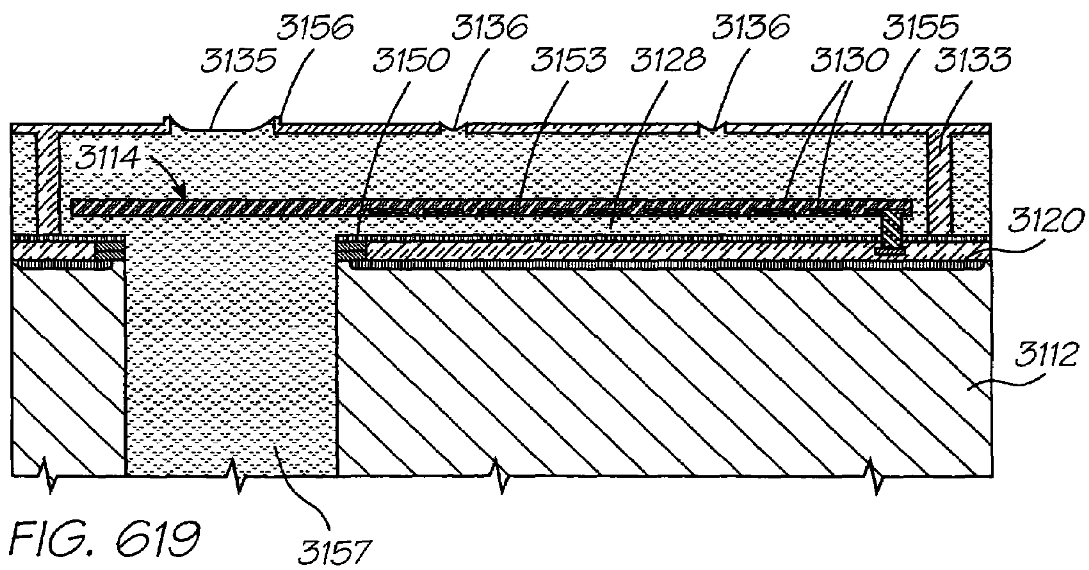

25. Fill the completed printheads with ink 3157 and test them. A filled nozzle is shown in FIG. 619.

IJ32

In a preferred embodiment, the actuation of an actuator for the ejection of ink is based around the utilization of material having a High Young's modulus.

In a preferred embodiment, materials are utilized for the ejection of ink which have a high bend efficiency when thermally heated. The inkjet printhead is constructed utilizing standard MEMS technology and therefore should utilize materials that are common in the construction of semi-conductor wafers. In a preferred embodiment, the materials have been chosen by using a bend efficiency for actuator devices which can be calculated in accordance with the following formula.

$$\text{bend efficiency} = \frac{\text{Young's Modulus} \times (\text{Coefficient of thermal Expansion})}{\text{Density} \times \text{Specific Heat Capacity}}$$

Of course, different equations could be utilized and, in particular, the factors on the numerator and the denominator have been chosen for their following qualities.

Coefficient of thermal expansion: The greater the coefficient of thermal expansion, the greater will be the degree of movement for any particular heating of a thermal actuator.

Young's Modulus: The Young's modulus provides a measure of the tensile or compressive stress of a material and is an indicator of the "strength" of the bending movement Hence, a material having a high Young's modulus or strength is desirable.

Heat capacity: In respect of the heat capacity, the higher the heat capacity, the greater the ability of material to absorb heat without deformation. This is an undesirable property in a thermal actuator.

Density: The denser the material the greater the heat energy required to heat the material and again, this is an undesirable property.

Example materials and their corresponding "Bend Efficiencies" are listed in the following table:

| MATERIAL | CTE $*10^{-6}/K$ | Young's modulus GPa | Heat capacity W/Kg/C | Density Kg/M$^3$ | "Bend efficiency" |
|---|---|---|---|---|---|
| Gold | 14.2 | 80 | 129 | 19300 | 456 |
| PTFE | 770 | 1.3 | 1024 | 2130 | 459 |

-continued

| MATERIAL | CTE $*10^{-6}$/K | Young's modulus GPa | Heat capacity W/Kg/C | Density Kg/$M^3$ | "Bend efficiency" |
|---|---|---|---|---|---|
| Silicon Nitride | 3.3 | 337 | 712 | 3200 | 488 |
| Osmium | 2.6 | 581 | 130 | 22570 | 515 |
| Tantalum-Tungsten alloy | 6.48 | 186 | 140 | 16660 | 517 |
| Silver | 18.9 | 71 | 235 | 10500 | 544 |
| Platinum | 8.8 | 177 | 133 | 21500 | 545 |
| Copper | 16.5 | 124 | 385 | 8960 | 593 |
| Molybdenum | 4.8 | 323 | 251 | 10200 | 606 |
| Aluminum | 23.1 | 28.9 | 897 | 2700 | 657 |
| Nickel | 13.4 | 206 | 444 | 8900 | 699 |
| Tungsten | 4.5 | 408 | 132 | 19300 | 721 |
| Ruthenium | 5.05 | 394 | 247 | 12410 | 1067 |
| Stainless Steel | 20.2 | 215 | 500 | 7850 | 1106 |
| Iridium | 6.8 | 549 | 130 | 22650 | 1268 |
| High Silicon Brass | 31.5 | 130 | 376 | 8250 | 1320 |
| "Chromel D" alloy | 25.2 | 212 | 448 | 7940 | 1502 |
| Titanium DiBoride | 8.2 | 575 | 636 | 4450 | 1666 |
| Boron Carbide | 10.1 | 454 | 955 | 2520 | 1905 |

Utilizing the above equation, it can be seen that a suitable material is titanium diboride ($TiB_2$) which has a high bend efficiency and is also regularly used in semiconductor fabrication techniques. Although this material has a High Young's modulus, the coefficient of thermal expansion is somewhat lower than other possible materials. Hence, in a preferred embodiment, a fulcrum arrangement is utilized to substantially increase the travel of a material upon heating thereby more fully utilizing the effect of the High Young's modulus material.

Turning initially to FIG. 620 and 621, there is illustrated a single nozzle arrangement 3201 of an inkjet printhead constructed in accordance with a preferred embodiment. FIG. 620 illustrates a side perspective view of the nozzle arrangement and FIG. 621 is an exploded perspective view of the nozzle arrangement of FIG. 620. The single nozzle arrangement 3201 can be constructed as part of an array of nozzle arrangements formed on a silicon wafer 3202 utilizing standard MEM processing techniques. On top of the silicon wafer 3202 is formed a CMOS layer 3203 which can include multiple metal layers formed within glass layers in accordance with the normal CMOS methodologies.

The wafer 3202 can contain a number of etched chambers e.g. 3233 the chambers being etched through the wafer utilizing a deep trench silicon etcher.

A suitable plasma etching process can include a deep anisotropic trench etching system such as that available from SDS Systems Limited (See "Advanced Silicon Etching Using High Density Plasmas" by J. K. Bhardwaj, H. Ashraf, page 224 of Volume 2639 of the SPIE Proceedings in Micro Machining and Micro Fabrication Process Technology).

A preferred embodiment 3201 includes two arms 3204, 3205 which operate in air and are constructed from a thin 0.3 micrometer layer of titanium diboride 3206 on top of a much thicker 5.8 micron layer of glass 3207. The two arms 3204, 3205 are joined together and pivot around a point 3209 which is a thin membrane forming an enclosure which in turn forms part of the nozzle chamber 3210.

The arms 3204 and 3205 are affixed by posts 3211, 3212 to lower aluminum conductive layers 3214, 3215 which can form part of the CMOS layer 3203. The outer surfaces of the nozzle chamber 3218 can be formed from glass or nitride and provide an enclosure to be filled with ink. The outer chamber 3218 includes a number of etchant holes e.g. 3219 which are provided for the rapid sacrificial etchant of internal cavities during construction. A nozzle rim 3220 is further provided around an ink ejection port 3221 for the ejection of ink.

The paddle surface 3224 is bent downwards as a result of release of the structure during fabrication. A current is passed through the titanium boride layer 3206 to cause heating of this layer along arms 3204 and 3205. The heating generally expands the $TiB_2$ layer of arms 3204 and 3205 which have a high young's modulus. This expansion acts to bend the arms generally downwards, which are in turn pivoted around the membrane 3209. The pivoting results in a rapid upward movement of the paddle surface 3224. The upward movement of the paddle surface 3224 causes the ejection of ink from the nozzle chamber 3210. The increase in pressure is insufficient to overcome the surface tension characteristics of the smaller etchant holes 3219 with the result being that ink is ejected from the nozzle chamber hole 3221.

As noted previously the thin titanium diboride strip 3206 has a sufficiently high young's modulus so as to cause the glass layer 3207 to be bent upon heating of the titanium diboride layer 3206. Hence, the operation of the inkjet device can be as illustrated in FIGS. 622-624. In its quiescent state, the inkjet nozzle is as illustrated in FIG. 622, generally in the bent down position with the ink meniscus 3230 forming a slight bulge and the paddle being pivoted around the membrane wall 3209. The heating of the titanium diboride layer 3206 causes it to expand. Subsequently, it is bent by the glass layer 3207 so as to cause the pivoting of the paddle 3225 around the membrane wall 3209 as indicated in FIG. 623. This causes the rapid expansion of the meniscus 3230 resulting in the general ejection of ink from the nozzle chamber 3210. Next, the current to the titanium diboride layer is turned off and the paddle 3225 returns to its quiescent state resulting in a general sucking back of ink via the meniscus 3230 which in turn results in the ejection of a drop 3231 on demand from the nozzle chamber 3210.

Although many different alternatives are possible, the arrangement of a preferred embodiment can be constructed utilizing the following processing steps:

1. The starting wafer is a CMOS processed wafer with suitable electrical circuitry for the operation of an array of printhead nozzles and includes aluminum layer portions 3214, 3215.

2. First, the CMOS wafer layer 3203 can be etched down to the silicon wafer layer 3202 in the area of an ink supply channel 3234.

3. Next, a sacrificial layer can be constructed on top of the CMOS layer and planarized. A suitable sacrificial material can be aluminum. This layer is planarized, masked and etched to form cavities for the glass layer 3207. Subsequently, a glass layer is deposited on top of the sacrificial aluminum layer and etched so as to form the glass layer 3207 and a layer 3213.

4. A titanium diboride layer 3206 is then deposited followed by the deposition of a second sacrificial material layer, the material again can be aluminum, the layer subsequently being planarized.

5. The sacrificial etchant layer is then etched to form cavities for the deposition of the side walls e.g. 3209 of the top of the nozzle chamber 3210.

6. A glass layer 3252 is then deposited on top of the sacrificial layer and etched so as to form a roof of the chamber layer.

7. The rim 3220 ink ejection port 3221 and etchant holes e.g. 3219 can then be formed in the glass layer 3252 utilizing suitable etching processes.

8. The sacrificial aluminum layers are sacrificially etched away so as to release the MEMS structure.

9. The ink supply channels can be formed through the back etching of the silicon wafer utilizing a deep anisotropic trench etching system such as that available from Silicon Technology Systems. The deep trench etching systems can also be simultaneously utilized to separate printheads of a wafer which can then be mounted on an ink supply system and tested for operational capabilities.

Figure 627:
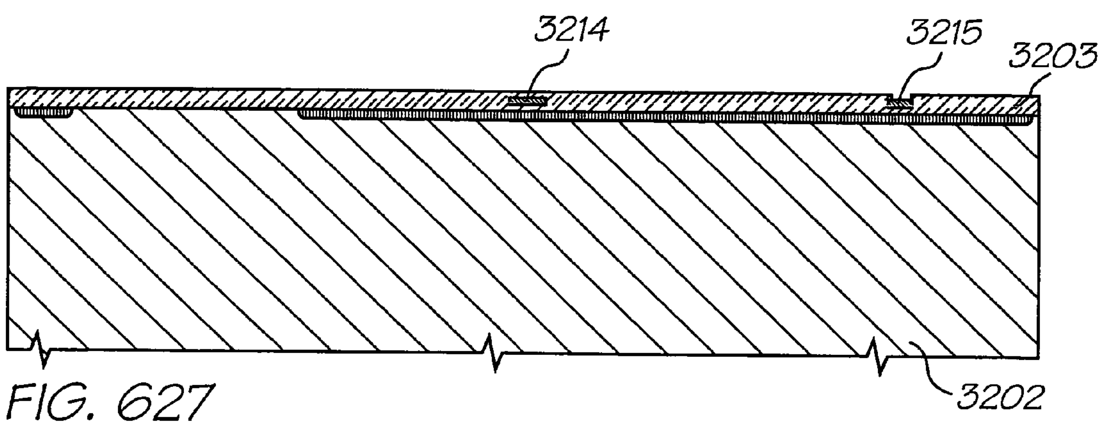

Turning finally to FIG. 625, there is illustrated a portion of a printhead 3240 showing a multi-colored series of inkjet nozzles suitably arranged to form a multi-colored printhead. The portion is shown, partially in section so as to illustrate the through wafer etching process One form of detailed manufacturing process which can be used to fabricate monolithic ink jet printheads operating in accordance with the principles taught by the present embodiment can proceed utilizing the following steps:

1. Using a double sided polished wafer 3202, complete drive transistors, data distribution, and timing circuits using a 0.5 micron, one poly, 2 metal CMOS process 3203. Relevant features of the wafer at this step are shown in FIG. 627. For clarity, these diagrams may not be to scale, and may not represent a cross section though any single plane of the nozzle. FIG. 626 is a key to representations of various materials in these manufacturing diagrams, and those of other cross referenced ink jet configurations.

Figure 628:
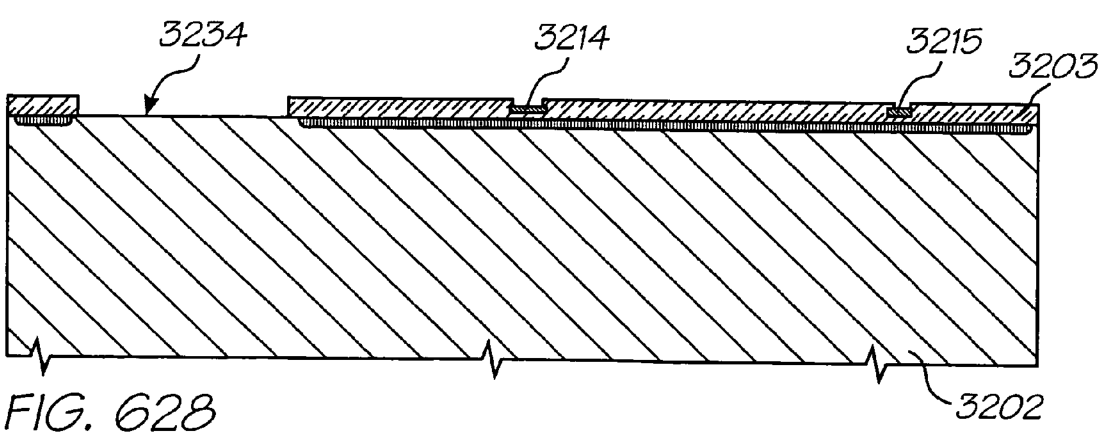

2. Etch oxide down to silicon or aluminum using Mask 1. This mask defines the ink inlet, channel 3234, a heater contact vias, and the edges of the printhead chips. This step is shown in FIG. 628.

3. Deposit 1 micron of sacrificial material 3250 (e.g. aluminum)

Figure 629:
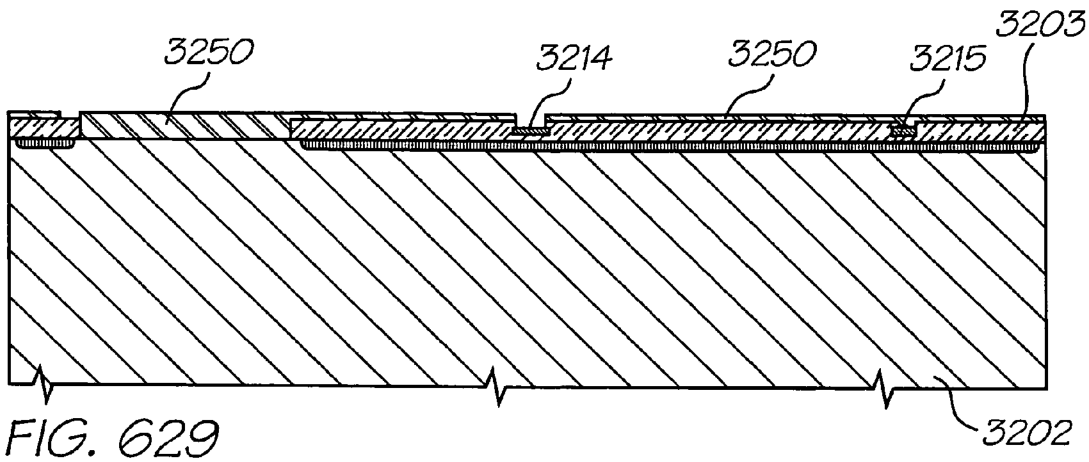

4. Etch the sacrificial layer using Mask 2, defining the nozzle chamber wall and the actuator anchor point. This step is shown in FIG. 629.

5. Deposit 3 microns of PECVD glass 3213, and etch the glass 3213 using Mask 3. This mask defines the actuator, the nozzle walls, and the actuator anchor points with the exception of the contact vias. The etch continues through to aluminum.

Figure 630:
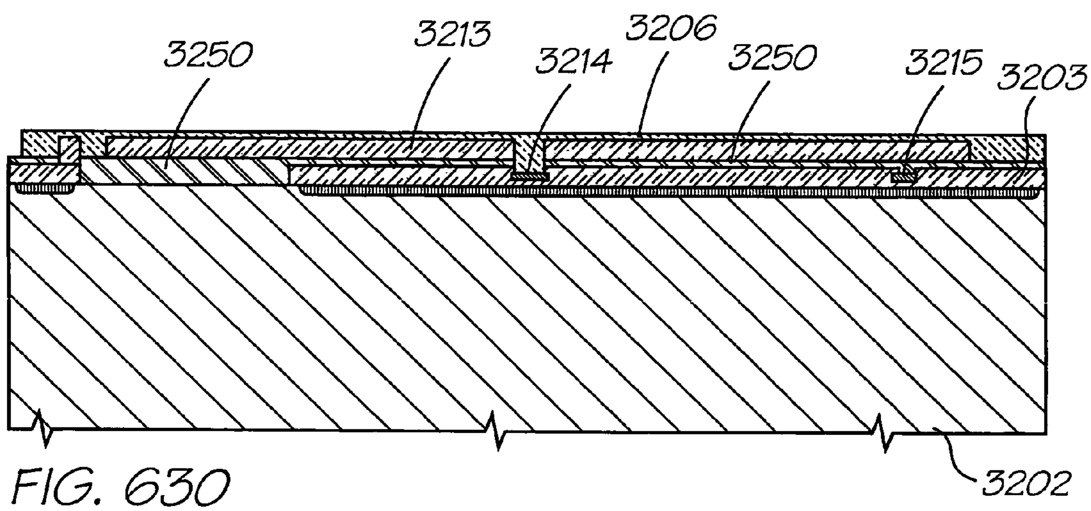

6. Deposit 0.5 microns of heater material 3206, for example titanium nitride (TiN) or titanium diboride ($TiB_2$). This step is shown in FIG. 630.

Figure 631:
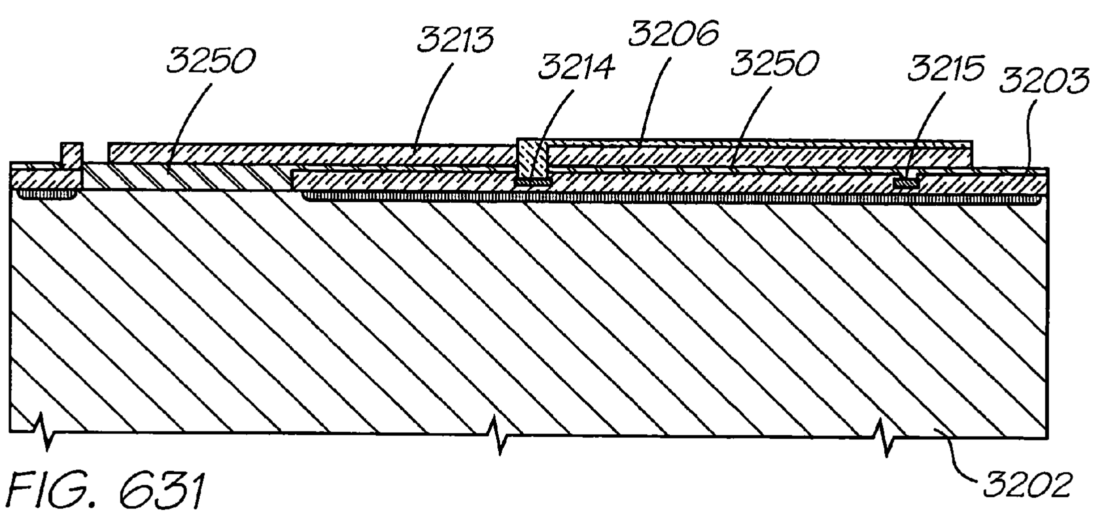

7. Etch the heater material using Mask 4, which defines the actuator loop. This step is shown in FIG. 631.

8. Wafer probe. All electrical connections are complete at this point bond pads are accessible, and the chips are not yet separated.

9. Deposit 8 microns of sacrificial material 3251.

Figure 632:
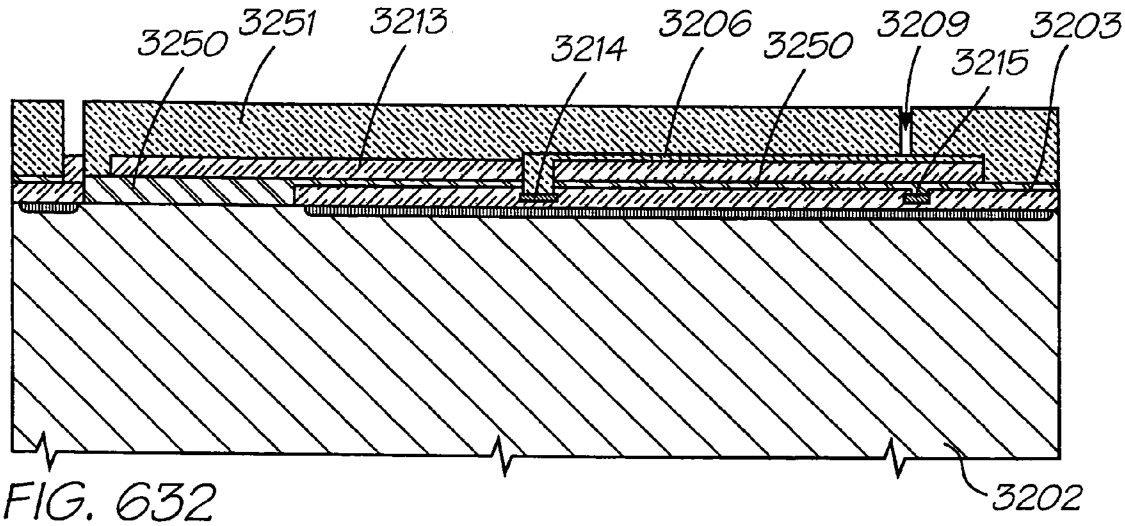

10. Etch the sacrificial material down to glass or heater material using Mask 5. This mask defines the nozzle chamber wall the side wall e.g. 3209, and actuator anchor points. This step is shown in FIG. 632.

Figure 633:
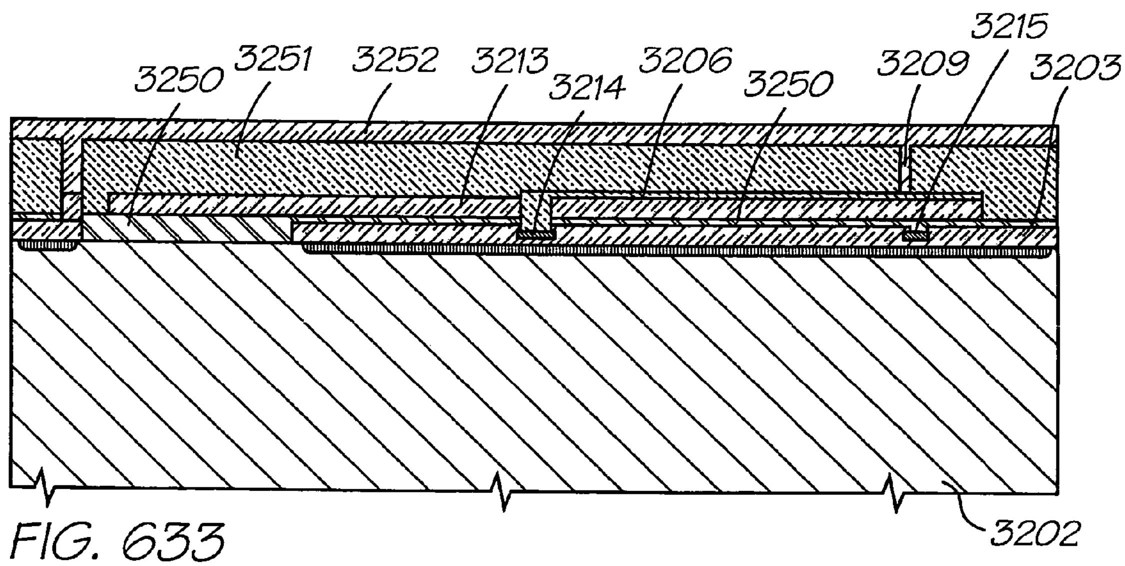

11. Deposit 3 microns of PECVD glass 3252. This step is shown in FIG. 633.

Figure 634:
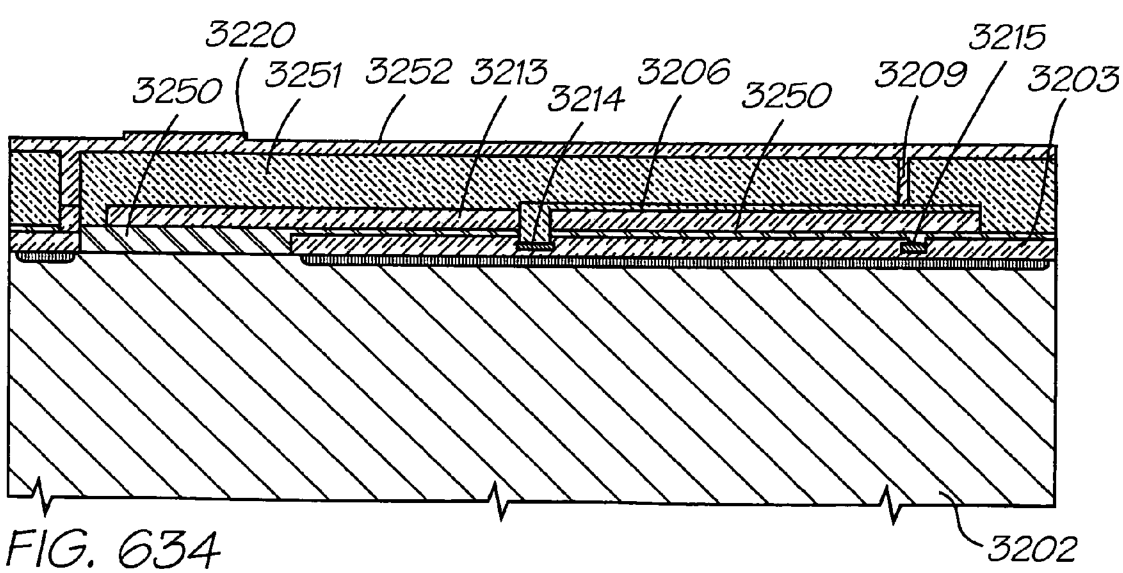

12. Etch the glass 3252 to a depth of 1 micron using Mask 6. This mask defines the nozzle rim 3220. This step is shown in FIG. 634.

Figure 635:
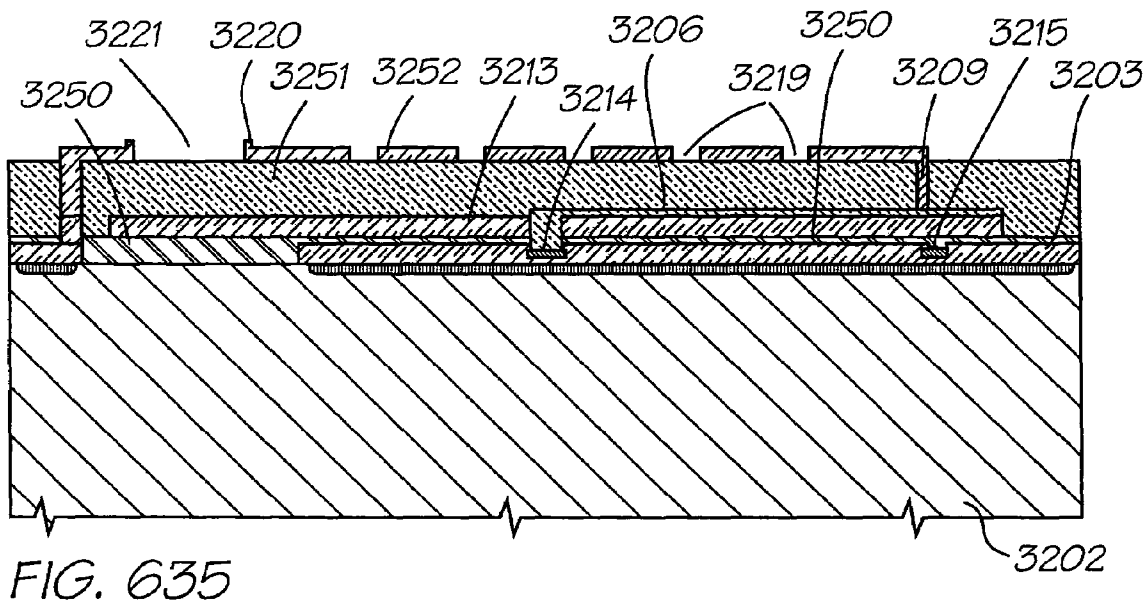

13. Etch down to the sacrificial layer using Mask 7. This mask defines the nozzle port 3221 and the sacrificial etch access holes 3219. This step is shown in FIG. 635.

Figure 636:
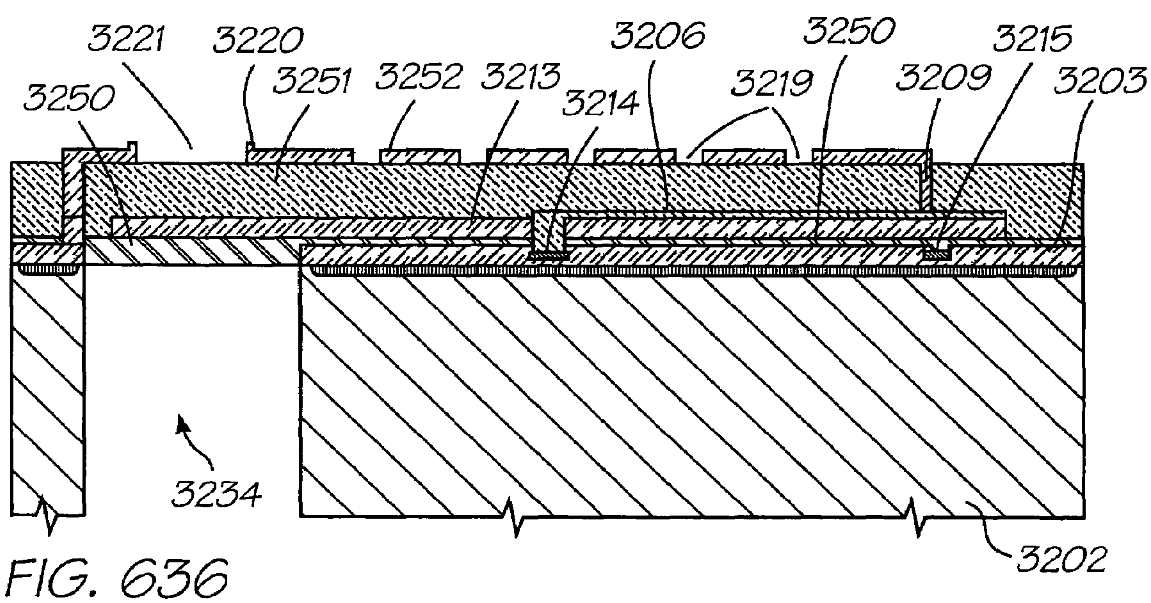

14. Back-etch completely through the silicon wafer (with, for example, an ASE Advanced Silicon Etcher from Surface Technology Systems) using Mask 3208. This mask defines the ink inlet channels 3234 which are etched through the wafer. The wafer is also diced by this etch. This step is shown in FIG. 636.

Figure 637:
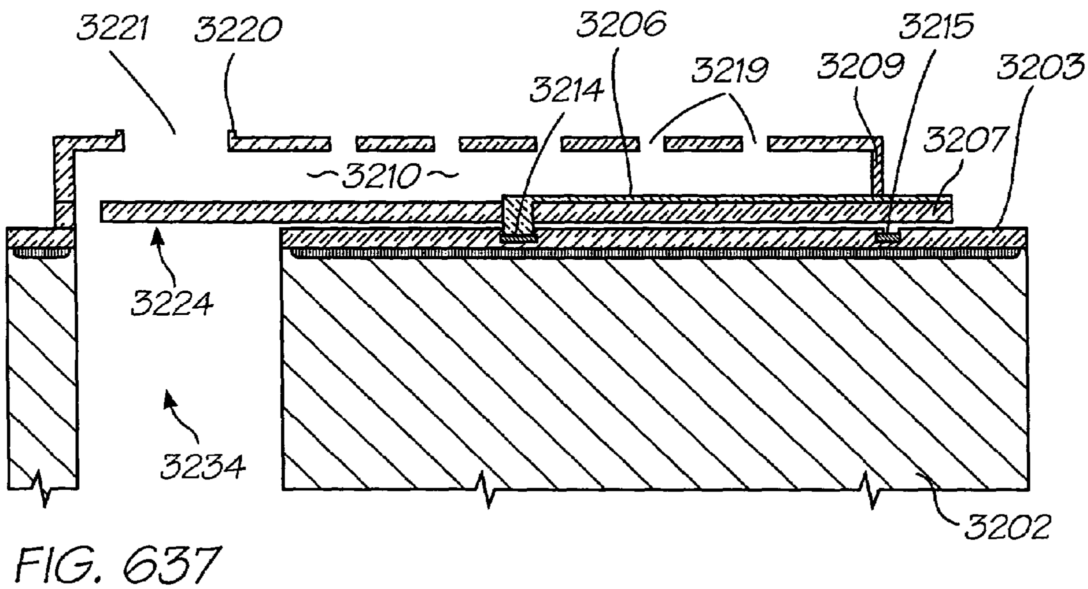

15. Etch the sacrificial material. The nozzle chambers 3210 are cleared, the actuators freed, and the chips are separated by this etch This-step is shown in FIG. 637.

16. Mount the printheads in their packaging, which may be a molded plastic former incorporating ink channels which supply the appropriate color ink to the ink inlets at the back of the wafer.

17. Connect the printheads to their interconnect systems. For a low profile connection with minimum disruption of airflow, TAB may be used. Wire bonding may also be used if the printer is to be operated with sufficient clearance to the paper.

18. Hydrophobize the front surface of the printheads.

Figure 638:
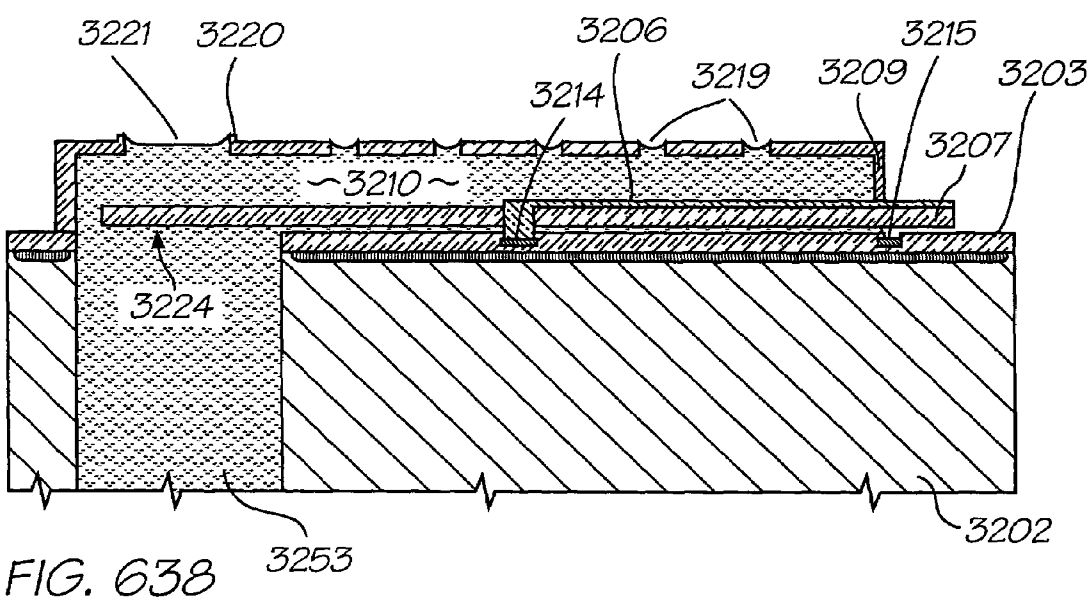

19. Fill the completed printheads with ink 3253 and test them. A filled nozzle is shown in FIG. 638.

IJ33

In a preferred embodiment, there is provided an ink jet printing system wherein each nozzle has a nozzle chamber having a slotted side wall through which is formed an actuator mechanism attached to a vane within the nozzle chamber such that the actuator can be activated to move the vane within the nozzle chamber to thereby cause ejection of ink from the nozzle chamber.

Turning now to the figures, there is illustrated in FIG. 639 an example of an ink jet nozzle arrangement 3301 as constructed in accordance with a preferred embodiment. The nozzle arrangement includes a nozzle chamber 3302 normally filled with ink and an actuator mechanism 3303 for actuating a vane 3304 for the ejection of ink from the nozzle chamber 3302 via an ink ejection port 3305.

FIG. 639 is a perspective view of the ink jet nozzle arrangement of a preferred embodiment in its idle or quiescent position. FIG. 640 illustrates a perspective view after actuation of the actuator 3303.

The actuator 3303 includes two arms 3306, 3307. The two arms can be formed from titanium diboride ($TiB_2$) which has a high Young's modulus and therefore provides a large degree of bending strength. A current is passed along the arms 3306, 3307 with the arm 3307 having a substantially thicker portion along most of its length. The arm 3307 is stiff but for in the area of thinned portion 3308 and hence the bending moment is concentrated in the area 3308. The thinned arm 3306 is of a thinner form and is heated by means of resistive heating of a current passing through the arms 3306, 3307. The arms 3306, 3307 are interconnected with electrical circuitry via connections 3310, 3311.

Upon heating of the arm 3306, the arm 3306 is expanded with the bending of the arm 3307 being concentrated in the area 3308. This results in movement of the end of the actuator mechanism 3303 which proceeds through a slot 3319 in a wall of the nozzle chamber 3302. The bending further causes movement of vane 3304 so as to increase the pressure of the ink within the nozzle chamber and thereby cause its subsequent ejection from ink ejection port 3305. The nozzle chamber 3302 is refilled via an ink channel 3313 (FIG. 641) formed in a wafer substrate 3314. After movement of the vane 3304, so as to cause the ejection of ink, the current to arm 3306 is turned off which results in a corresponding back movement of the vane 3304. The ink within nozzle chamber 3302 is then replenished by means of wafer ink supply channel 3313 which is attached to an ink supply formed on the back of wafer 3314. The refill can be by means of a surface tension reduction effect of the ink within nozzle chamber 3302 across ink ejection port 3305.

FIG. 641 illustrates an exploded perspective view of the components of the ink jet nozzle arrangement.

Referring now specifically to FIG. 641, a preferred embodiment can be constructed utilizing semiconductor processing techniques in addition to micro machining and micro fabrication process technology (MEMS) and a full familiarity with these technologies is hereinafter assumed.

The nozzles can preferably be constructed by constructing a large array of nozzles on a single silicon wafer at a time. The array of nozzles can be divided into multiple printheads, with each printhead itself having nozzles grouped into multiple colors to provide for full color image reproduction. The arrangement can be constructed via the utilization of a standard silicon wafer substrate 3314 upon which is deposited an electrical circuitry layer 3316 which can comprise a standard CMOS circuitry layer. The CMOS layer can include an etched portion defining pit 3317. On top of the CMOS layer is initially deposited a protective layer (not shown) which comprise silicon nitride or the like. On top of this layer is deposited a sacrificial material which is initially suitably etched so as to form cavities for the portion of the thermal actuator 3303 and bottom portion of the vane 3304, in addition to the bottom rim of nozzle chamber 3302. These cavities can then be filled with titanium diboride. Next, a similar process is used to form the glass portions of the actuator. Next, a further layer of sacrificial material is deposited and suitably etched so as to form the rest of the vane 3304 in addition to a portion of the nozzle chamber walls to the same height of vane 3304.

Subsequently, a further sacrificial layer is deposited and etched in a suitable manner so as to form the rest of the nozzle chamber 3302. The top surface of the nozzle chamber is further etched so as to form the nozzle rim rounding the ejection port 3305. Subsequently, the sacrificial material is etched away so as to release the construction of a preferred embodiment It will be readily evident to those skilled in the art that other MEMS processing steps could be utilized.

Preferably, the thermal actuator and vane portions 3303 and 3304 in addition to the nozzle chamber 3302 are constructed from titanium diboride. The utilization of titanium diboride is standard in the construction of semiconductor systems and, in addition, its material properties, including a high Young's modulus, is utilized to advantage in the construction of the thermal actuator 3303.

Further, preferably the actuator 3303 is covered with a hydrophobic material, such as Teflon, so as to prevent any leaking of the liquid out of the slot 3319 (FIG. 639).

Further, as a final processing step, the ink channel can be etched through the wafer utilizing a high anisotropic silicon wafer etch. This can be done as an anisotropic crystallographic silicon etch, or an anisotropic dry etch A dry etch system capable of high aspect ratio deep silicon trench etching such as the Surface Technology Systems (STS) Advance Silicon Etch (ASE) system is recommended for volume production, as the chip size can be reduced over a wet etch. The wet etch is suitable for small volume production where a suitable plasma etch system is not available. Alternatively, but undesirably, ink access can be around the sides of the printhead chips. If ink access is through the wafer higher ink flow is possible, and there is less requirement for high accuracy assembly. If ink access is around the edge of the chip, ink flow is severely limited, and the printhead chips must be carefully assembled onto ink channel chips. This latter process is difficult due to the possibility of damaging the fragile nozzle plate. If plasma etching is used, the chips can be effectively diced at the same time. Separating the chips by plasma etching allows them to be spaced as little as 35 μm apart, increasing the number of chips on a wafer.

Figure 643:
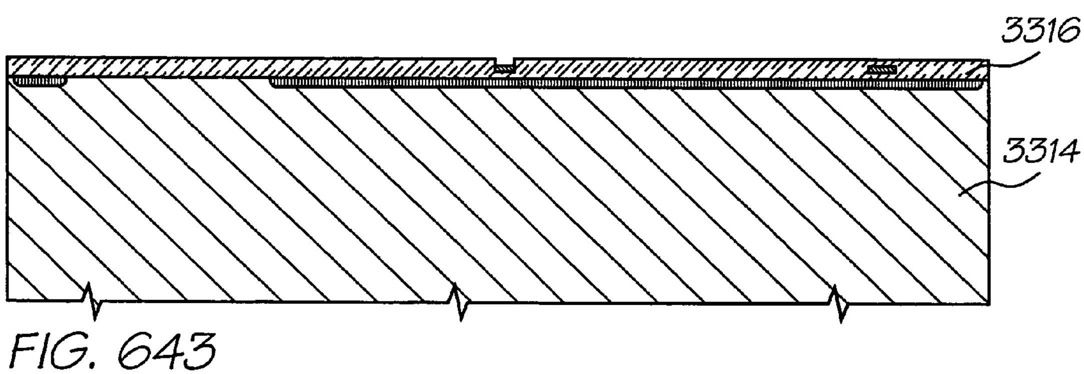

One form of detailed manufacturing process which can be used to fabricate monolithic ink jet print heads operating in accordance with the principles taught by the present embodiment can proceed utilizing the following steps:

1. Using a double sided polished wafer 3314, complete drive transistors, data distribution, and timing circuits using a 0.5 micron, one poly, 2 metal CMOS process 3316. Relevant features of the wafer at this step are shown in FIG. 643. For clarity, these diagrams may not be to scale, and may not represent a cross section though any single plane of the nozzle. FIG. 642 is a key to representations of various materials in these manufacturing diagrams, and those of other cross referenced ink jet configurations.

Figure 644:
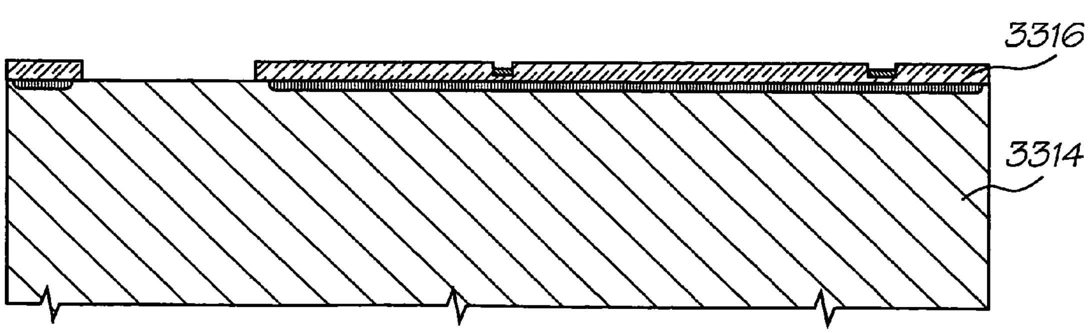

2. Etch oxide down to silicon or aluminum using Mask 1. This mask defines the ink inlet, the heater contact vias, and the edges of the printhead chips. This step is shown in FIG. 644.

3. Deposit 1 micron of sacrificial material 3321 (e.g. aluminum)

Figure 645:
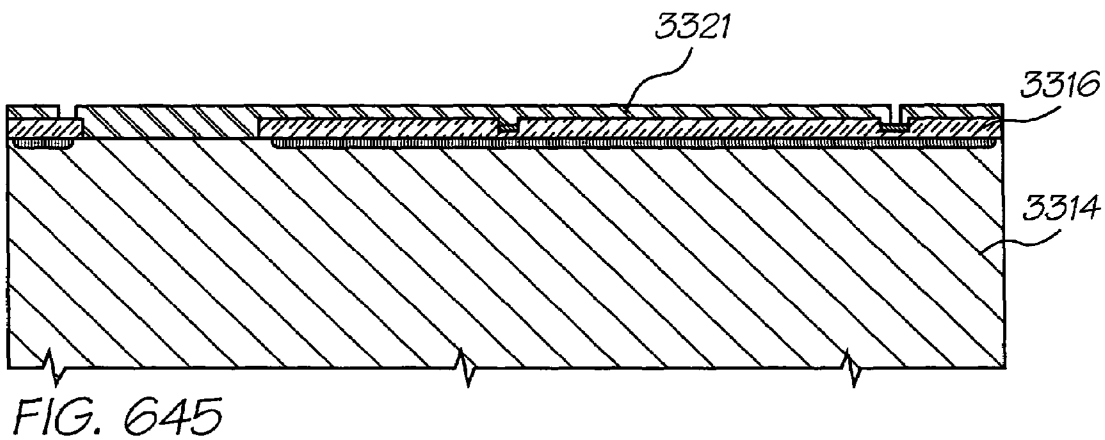

4. Etch the sacrificial layer 3321 using Mask 2, defining the nozzle chamber wall and the actuator anchor point. This step is shown in FIG. 645.

5. Deposit 1 micron of heater material 3322, for example titanium nitride (TiN) or titanium diboride ($TiB_2$).

Figure 646:
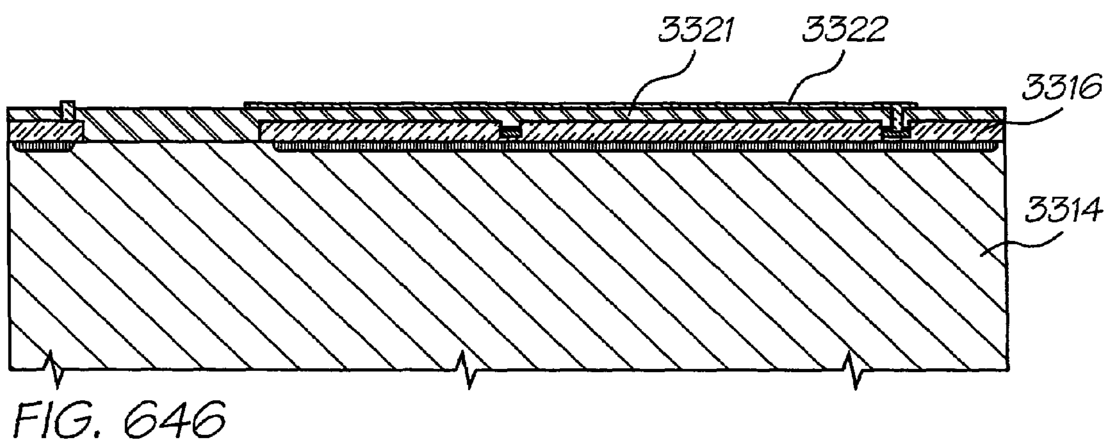

6. Etch the heater material 3322 using Mask 3, which defines the actuator loop and the lowest layer of the nozzle wall. This step is shown in FIG. 646.

7. Wafer probe. All electrical connections are complete at this point, bond pads are accessible, and the chips are not yet separated.

8. Deposit 1 micron of titanium nitride 3323.

Figure 647:
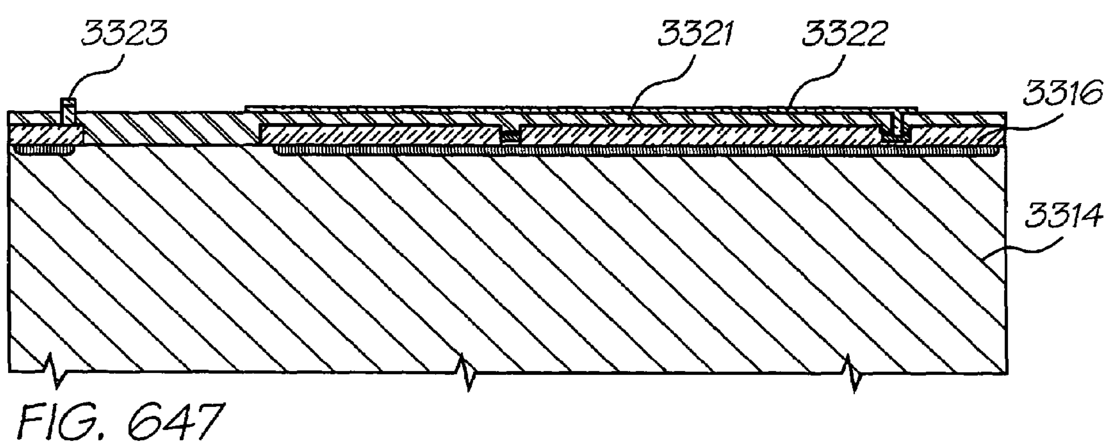

9. Etch the titanium nitride 3323 using Mask 4, which defines the nozzle chamber wall, with the exception of the nozzle chamber actuator slot, and the paddle. This step is shown in FIG. 647.

10. Deposit 8 microns of sacrificial material 3324.

Figure 648:
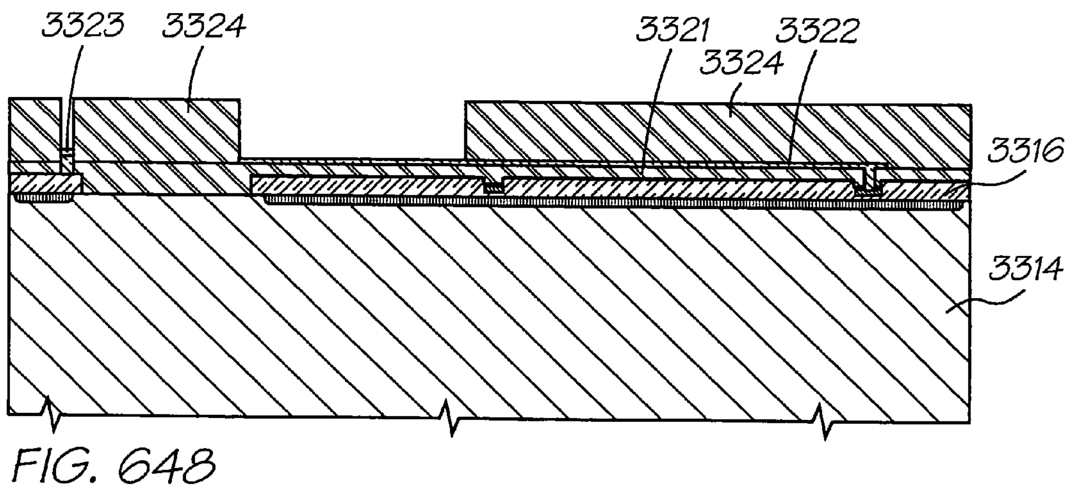

11. Etch the sacrificial material 3324 down to titanium nitride 3323 using Mask 5. This mask defines the nozzle chamber wall and the paddle. This step is shown in FIG. 648.

12. Deposit a 0.5 micron conformal layer of titanium nitride 3325 and planarize down to the sacrificial layer using CMP.

13. Deposit 1 micron of sacrificial material 3326.

Figure 649:
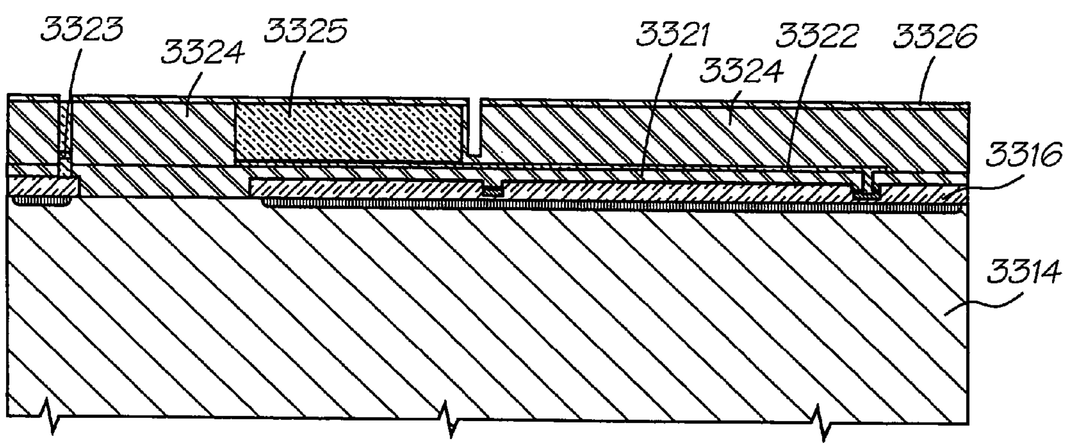

14. Etch the sacrificial material 3326 down to titanium nitride 3325 using Mask 6. This mask defines the nozzle chamber wall. This step is shown in FIG. 649.

15. Deposit 1 micron of titanium nitride 3327.

Figure 650:
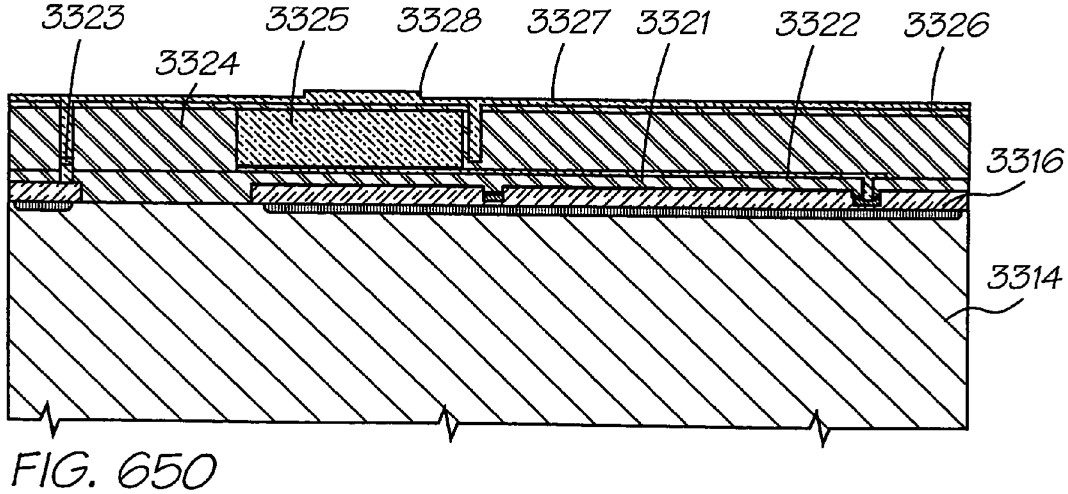

16. Etch to a depth of (approx.) 0.5 micron using Mask 7. This mask defines the nozzle rim 3328. This step is shown in FIG. 650.

Figure 651:
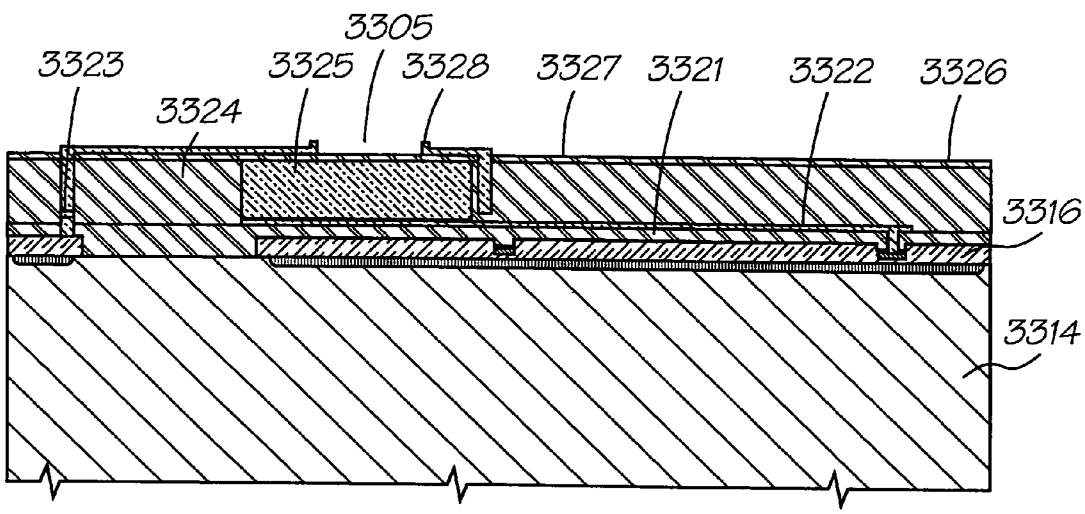

17. Etch down to the sacrificial layer 3326 using Mask 8. This mask defines the roof of the nozzle chamber 3302, and the port 3305. This step is shown in FIG. 651.

Figure 652:
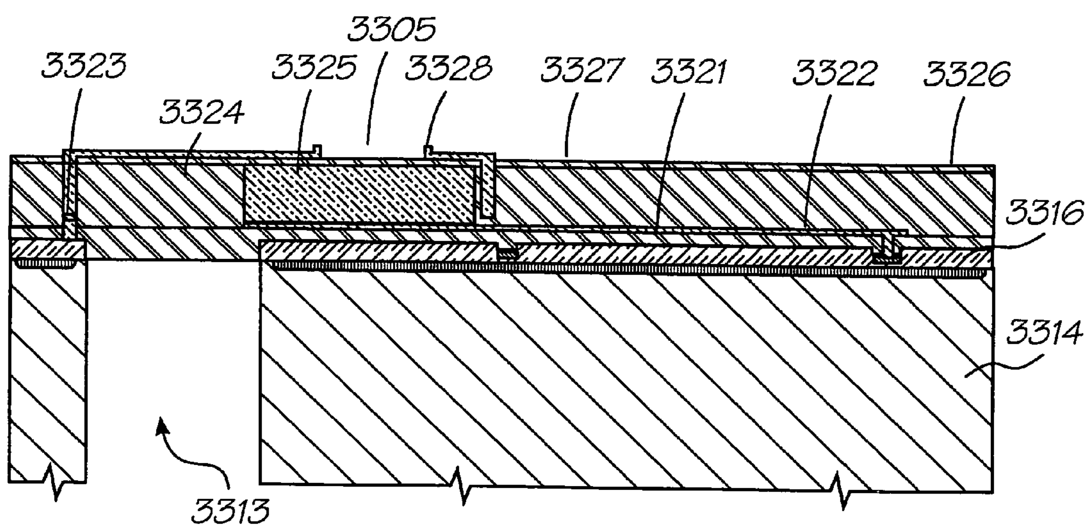

18. Back-etch completely through the silicon wafer 3314 (with, for example, an ASE Advanced Silicon Etcher from Surface Technology Systems) using Mask 9. This mask defines the ink inlets 3313 which are etched through the wafer 3314. The wafer 3314 is also diced by this etch This step is shown in FIG. 652.

Figure 653:
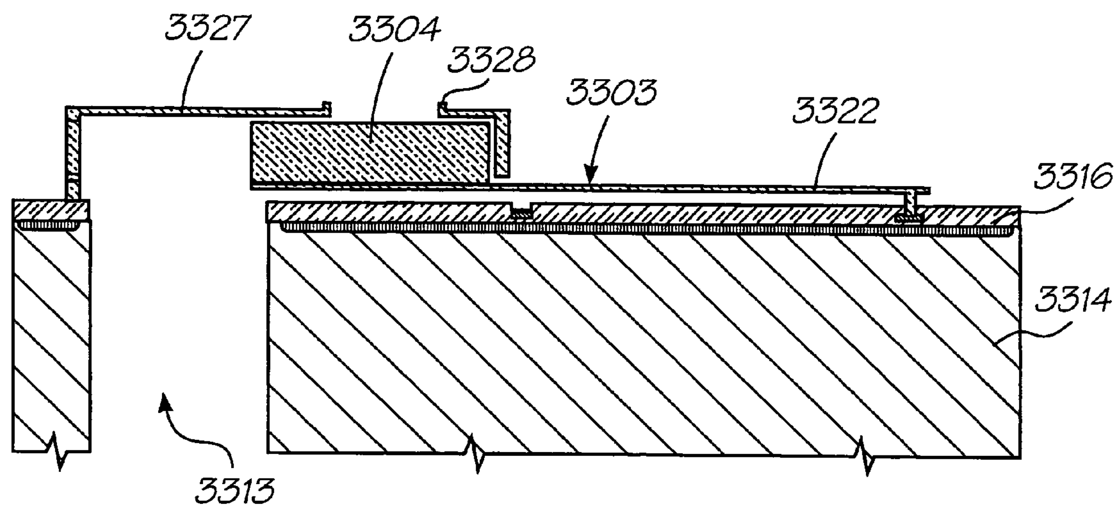

19. Etch the sacrificial material 3324. The nozzle chambers 3302 are cleared, the actuators 3303 freed, and the chips are separated by this etch This step is shown in FIG. 653.

20. Mount the printheads in their packaging, which may be a molded plastic former incorporating ink channels which supply the appropriate color ink to the ink inlets at the back of the wafer.

21. Connect the printheads to their interconnect systems. For a low profile connection with minimum disruption of airflow, TAB may be used. Wire bonding may also be used if the printer is to be operated with sufficient clearance to the paper.

22. Hydrophobize the front surface of the printheads.

Figure 654:
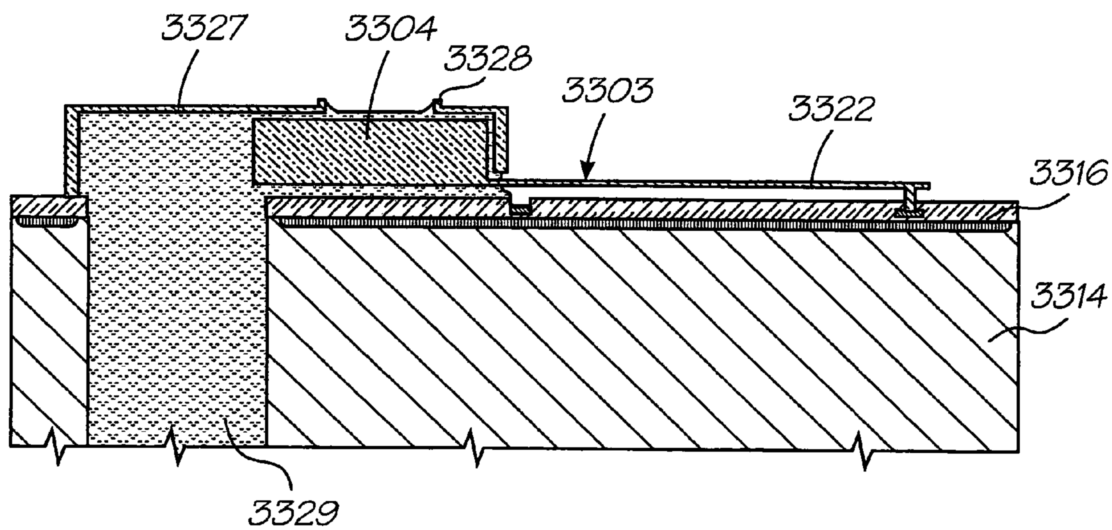

23. Fill the completed printheads with ink 3329 and test them. A filled nozzle is shown in FIG. 654.

IJ34

In a preferred embodiment, there is provided an inkjet printer having a series of ink ejection mechanisms wherein each ink ejection mechanism includes a paddle actuated by a coil actuator, the coil spring actuator having a unique cross section so as to provide for efficient actuation as a coiled thermal actuator.

Turning initially to FIG. 655, there is illustrated a single ink ejection mechanism 3401 constructed in accordance with the principles of a preferred embodiment The ink ejection mechanism 3401 includes a chamber 3402 having a rim 3403. The chamber 3402 is normally filled with ink which bulges out around a surface having a border along the edge of rim 3403, the ink being retained within the chamber 3402 by means of surface tension around the rim 3403. Outside of the chamber 3402 is located a thermal actuator device 3405. The thermal actuator device 3405 is interconnected via a strut 3406 through a hole 3407 to a paddle device within the chamber 3402. The strut 3406 and hole 3407 are treated so as to be hydrophobic. Further, the hole 3407 is provided in a thin elongated form so that surface tension characteristics also assist in stopping any ink from flowing out of the hole 3407.

The thermal actuator device 3405 comprises a first arm portion 3409 which can be constructed from glass or other suitable material. A second arm portion 3410 can be constructed from material such as titanium diboride which has a large Young's modulus or bending strength and hence, when a current is passed through the titanium diboride layer 3410, it expands with a predetermined coefficient of thermal expansion. The thin strip 3410 has a high Young's modulus or bending strength and therefore the thin strip 3410 is able to bend the much thicker strip 3409 which has a substantially lower Young's modulus.

Turning to FIG. 656, there is illustrated a cross-section of the arm through the line II-II of FIG. 655 illustrating the structure of the actuator device 3405. As described previously, the actuator device 3405 includes two titanium diboride portions 3410*a*, 3410*b* forming a circuit around the coil in addition to the glass portion 3409 which also provides for electrical isolation of the two arms, the arms being conductively joined at the strut end.

Turning now to FIGS. 657-659, there will now be explaining the operation of the ink ejection mechanism 3401 for the ejection of ink. Initially, before the paddle 3408 has started moving, the situation is as illustrated in FIG. 657 with the nozzle chamber 3402 being filled with ink and having a slightly bulging in meniscus 3412. Upon actuation of the actuator mechanism, the paddle 3408 begins to move towards the nozzle rim 3403 resulting in a substantial increase in pressure in the area around the nozzle rim 3403. This in turn results in the situation as illustrated in FIG. 658 wherein the meniscus begins to significantly bulge as a result of the increases in pressure. Subsequently, the actuator is deactivated resulting in a general urge for the paddle 3408 to return to its rest position. This results in the ink being sucked back into the chamber 3402 which in turn results in the meniscus necking and breaking off into a meniscus 3412 and ink drop 3414, the drop 3414 proceeding to a paper or film medium (not shown) for marking. The meniscus 3412 has generally a concave shape and surface tension characteristics result in chamber refilling by means of in flow 3413 from an ink supply channel etched through the wafer. The refilling is as a consequence of surface tension forces on the meniscus 3412. Eventually the meniscus returns to its quiescent state as illustrated in FIG. 657.

Turning now to FIG. 660, there is illustrated an exploded perspective view of a single ink ejection mechanism 3401 illustrating the various material layers. The ink ejection mechanism 3401 can be formed as part of a large array of mechanisms forming a print head with multiple printheads being simultaneously formed on a silicon wafer 3417. The wafer 3417 is initially processed so as to incorporate a standard CMOS circuitry layer 3418 which provides for the electrical interconnect for the control of the conductive portions of the actuator. The CMOS layer 3418 can be completed with a silicon nitride passivation layer so as to protect it from subsequent processing steps in addition to ink flows through channel 3420. The subsequent layers e.g. 3409, 3410 and 3402 can be deposited utilizing standard micro-electro mechanical systems (MEMS) construction techniques including the deposit of sacrificial aluminum layers in addition to the deposit of the layers 3410 constructed from titanium diboride the layer 3409 constructed from glass material and the nozzle chamber proper 3402 again constructed from titanium diboride. Each of these layers can be built up in a sacrificial material such as aluminum which is subsequently etched away. Further, an ink supply channel e.g. 3421 can be etched through the wafer 3417. The etching can be by means of an isotropic crystallographic silicon etch or an isotropic dry etch. A dry etch system capable of high aspect ratio silicon trench etching such as the Surface Technology Systems (STS) Advance Silicon Etch (ASE) system is recommended.

Subsequent to construction of the nozzle arrangement 3401, it can be attached to an ink supply apparatus for supplying ink to the reverse surface of the wafer 3417 so that ink can flow into chamber 3402.

The external surface of nozzle chamber 3402 including rim 3403, in addition to the area surrounding slot 3407, can then be hydrophobically treated so as to reduce the possibility of any ink exiting slot 3407.

Figure 662:
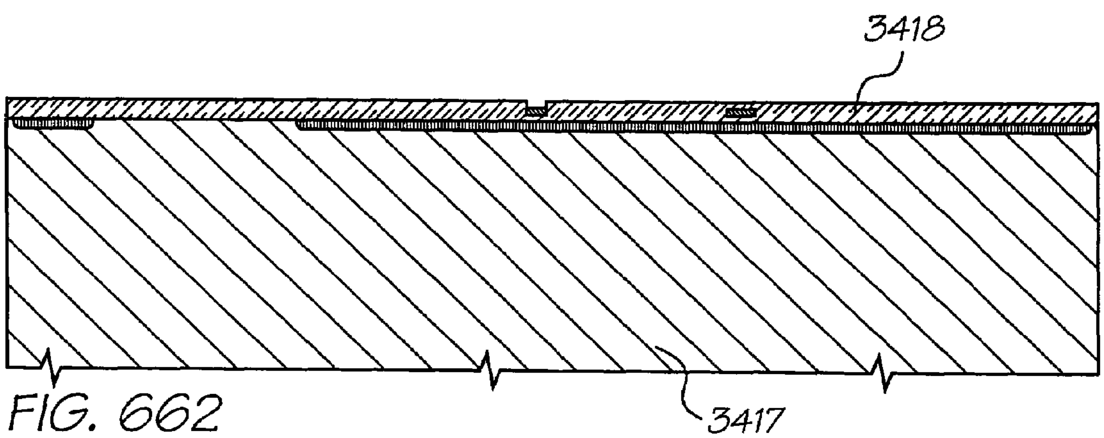

One form of detailed manufacturing process which can be used to fabricate monolithic ink jet print heads operating in accordance with the principles taught by the present embodiment can proceed utilizing the following steps:

1. Using a double sided polished wafer 3417, complete drive transistors, data distribution, and timing circuits using a 0.5 micron, one poly, 2 metal CMOS process to form layer 3418. This step is shown in FIG. 662. For clarity, these diagrams may not be to scale, and may not represent a cross section though any single plane of the nozzle. FIG. 661 is a key to representations of various materials in these manufacturing diagrams, and those of other cross referenced ink jet configurations.

Figure 663:
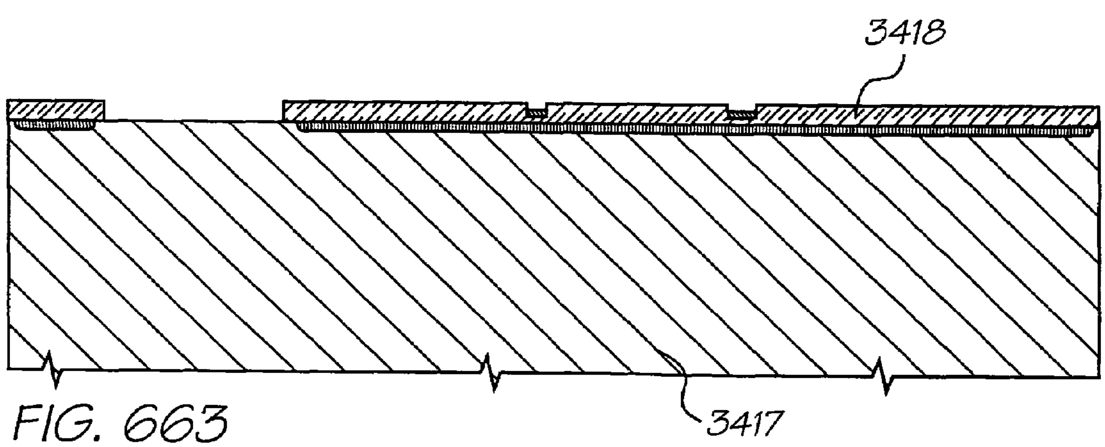

2. Etch oxide layer 3418 down to silicon or aluminum using Mask 1. This mask defines the ink inlet, the heater contact vias, and the edges of the print heads chip. This step is shown in FIG. 663.

3. Deposit 1 micron of sacrificial material 3430 (e.g. aluminum)

Figure 664:
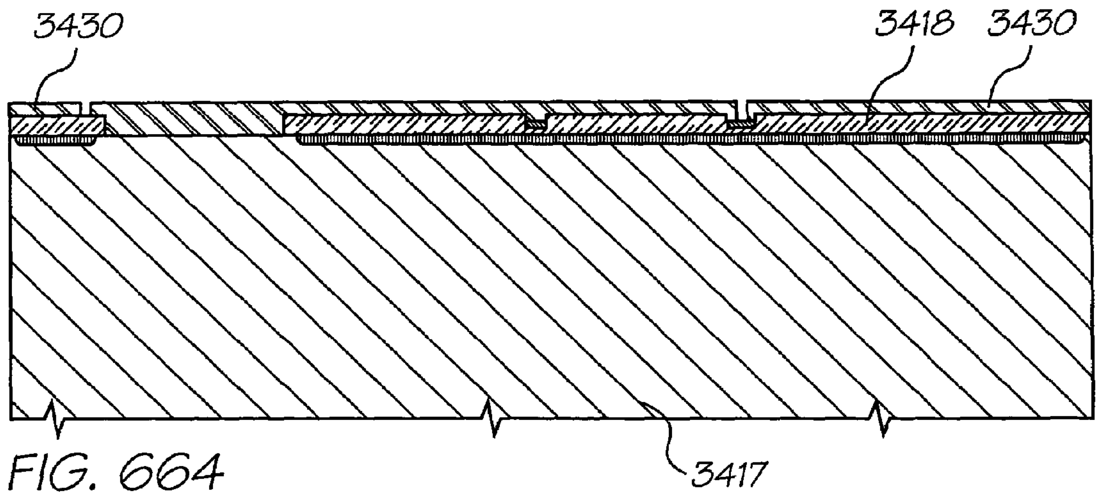

4. Etch the sacrificial layer 3430 using Mask 2, defining the nozzle chamber wall and the actuator anchor point. This step is shown in FIG. 664.

5. Deposit 1 micron of glass 3431.

6. Etch the glass using Mask 3, which defines the lower layer of the actuator loop.

Figure 665:
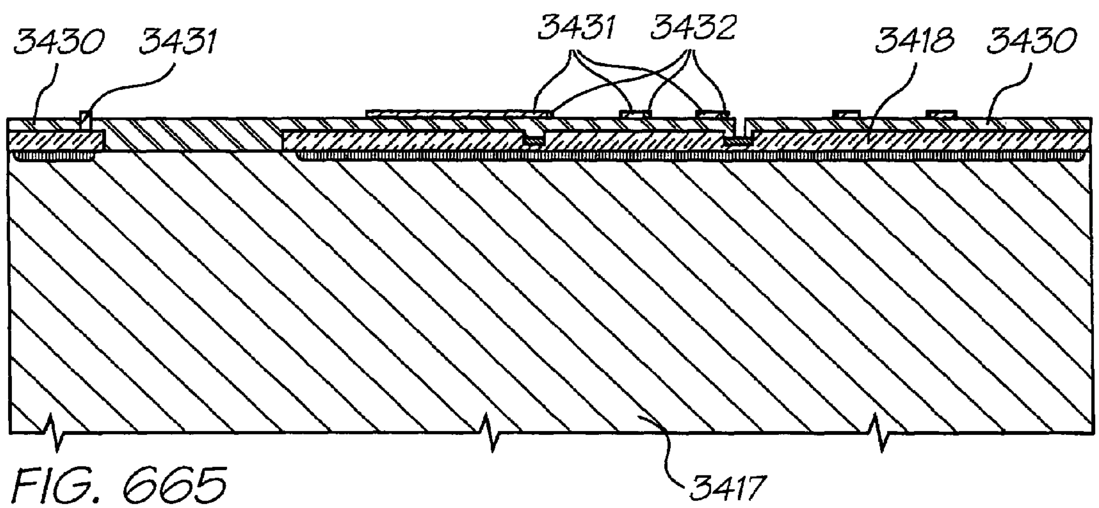

7. Deposit 1 micron of heater material 3432, for example titanium nitride (TiN) or titanium diboride (TiB2). Planarize using CMP. Steps 5 to 7 form a 'damascene' process. This step is shown in FIG. 665.

8. Deposit 0.1 micron of silicon nitride (not shown).

9. Deposit 1 micron of glass 3433.

10. Etch the glass 3433 using Mask 4, which defines the upper layer of the actuator loop.

11. Etch the silicon nitride using Mask 5, which defines the vias connecting the upper layer of the actuator loop to the lower layer of the actuator loop.

Figure 666:
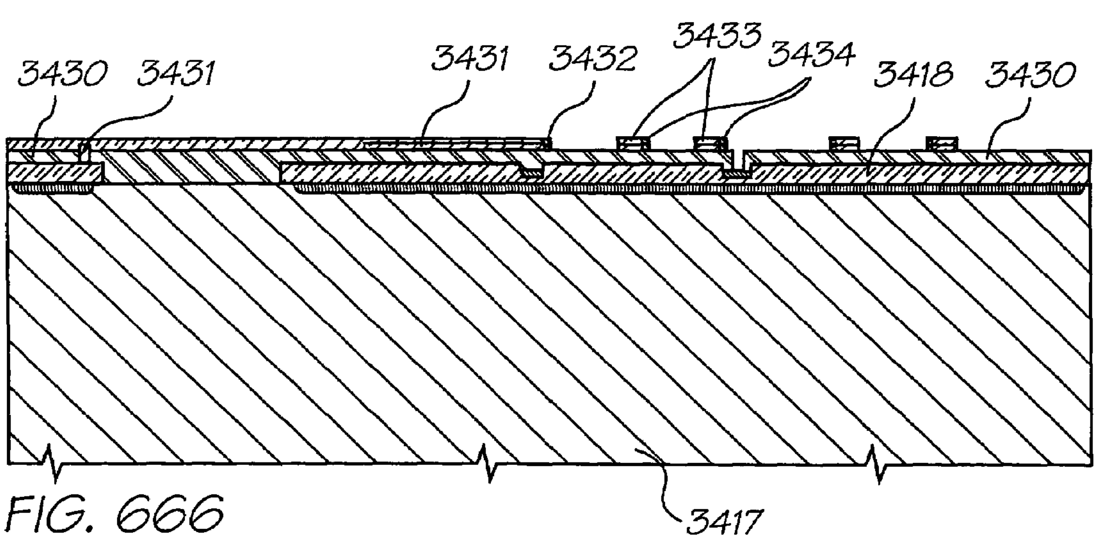

12. Deposit 1 micron of the same heater material 3434 as in step 7 heater material 3432. Planarize using CMP. Steps 8 to 12 form a 'dual damascene' process. This step is shown in FIG. 666.

Figure 667:
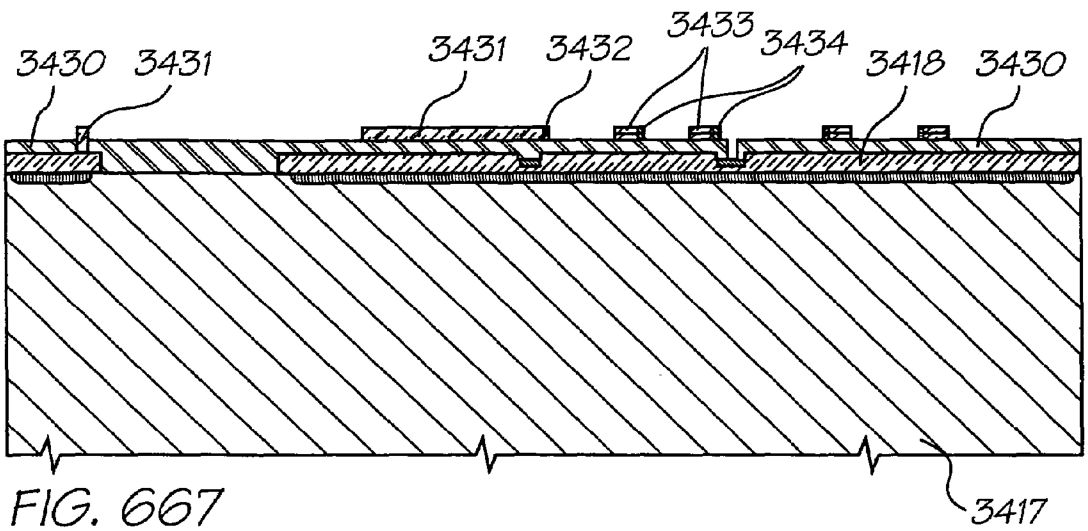

13. Etch the glass down to the sacrificial layer 3430 using Mask 6, which defines the actuator and the nozzle chamber wall, with the exception of the nozzle chamber actuator slot. This step is shown in FIG. 667.

14. Wafer probe. All electrical connections are complete at this point, bond pads are accessible, and the chips are not yet separated.

15. Deposit 3 microns of sacrificial material 3435.

Figure 668:
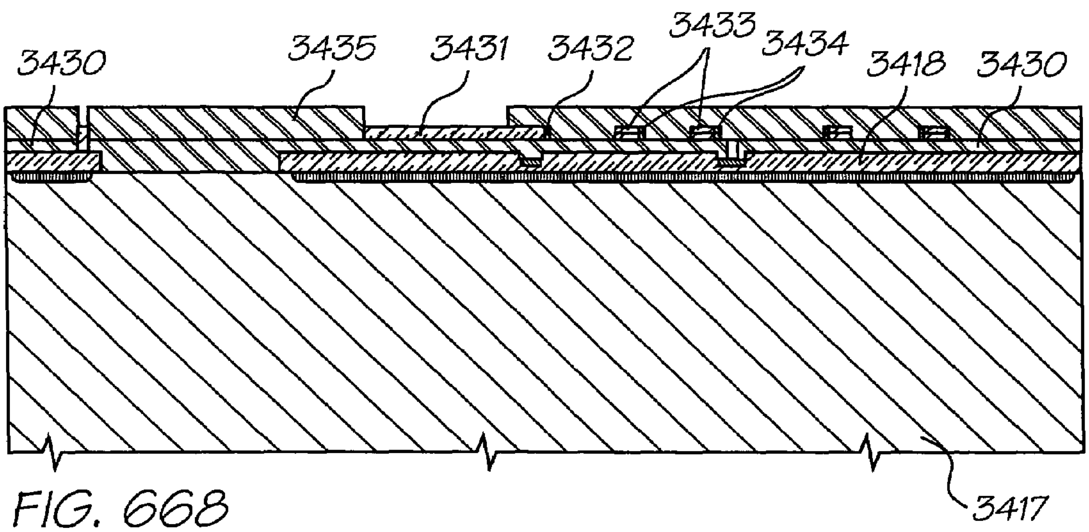

16. Etch the sacrificial layer 3435 down to glass using Mask 7, which defines the nozzle chamber wall, with the exception of the nozzle chamber actuator slot. This step is shown in FIG. 668.

Figure 669:
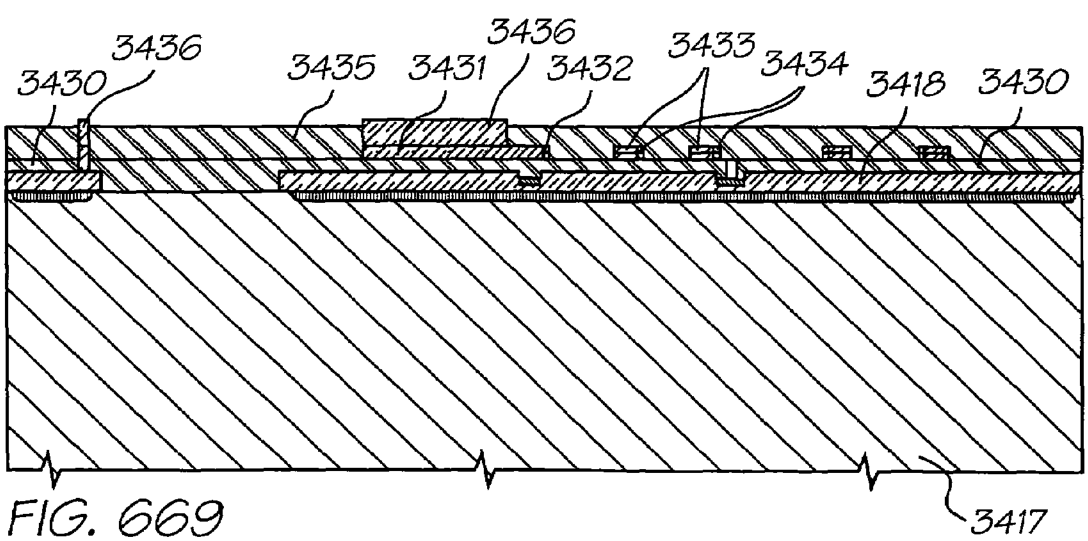

17. Deposit 1 micron of PECVD glass 3436 and planarize down to the sacrificial layer 3435 using CMP. This step is shown in FIG. 669.

18. Deposit 5 microns of sacrificial material 3437.

Figure 670:
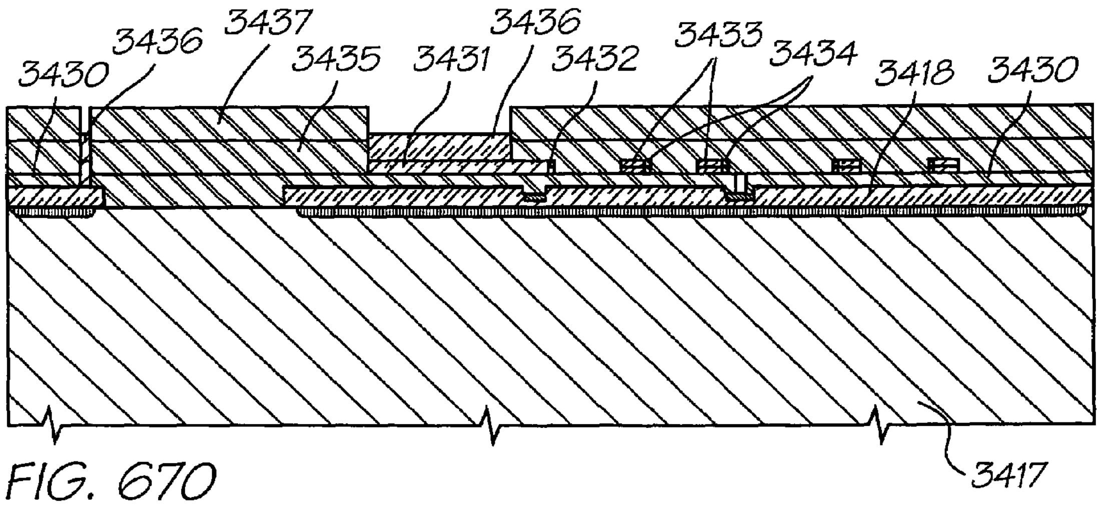

19. Etch the sacrificial material 3437 down to glass using Mask 8. This mask defines the nozzle chamber wall and the paddle. This step is shown in FIG. 670.

20. Deposit 3 microns of PECVD glass 3438 and planarize down to the sacrificial layer 3437 using CMP.

21. Deposit 1 micron of sacrificial material 3439.

Figure 671:
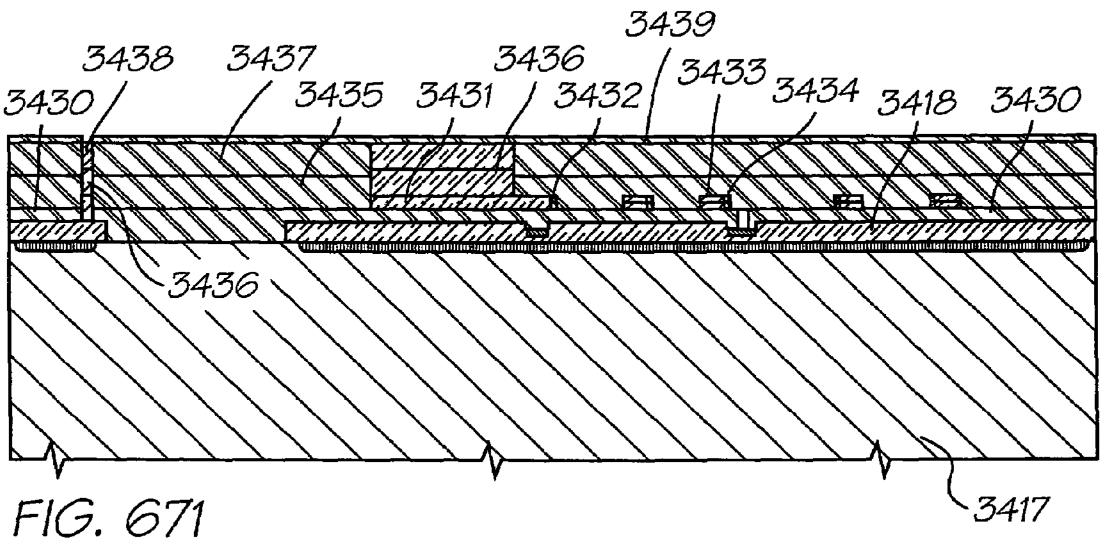

22. Etch the sacrificial material 3439 down to glass using Mask 9. This mask defines the nozzle chamber wall. This step is shown in FIG. 671.

23. Deposit 3 microns of PECVD glass 3440.

Figure 672:
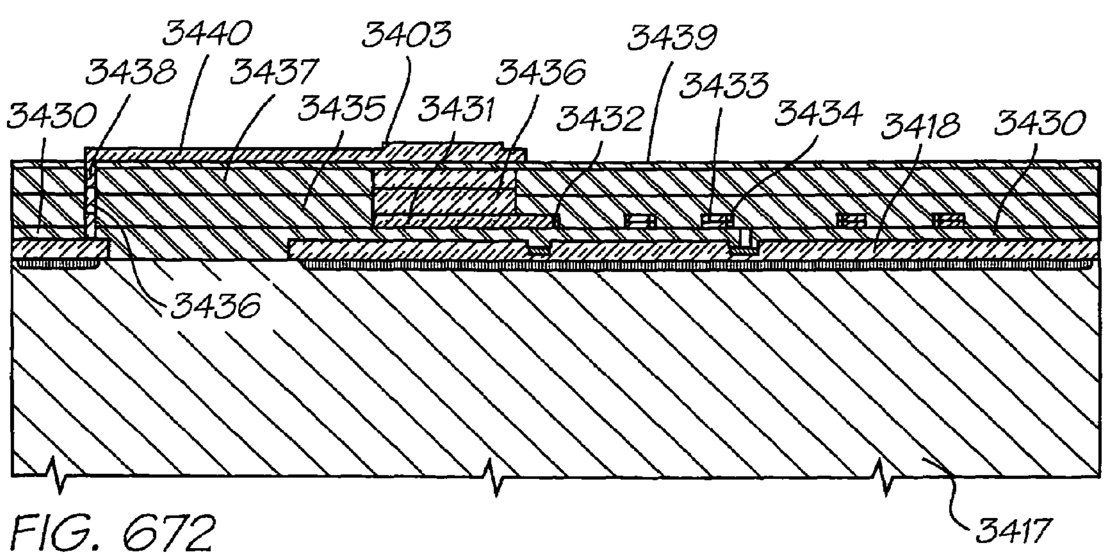

24. Etch to a depth of (approx.) 1 micron using Mask 3410. This mask defines the nozzle rim 3403. This step is shown in FIG. 672.

Figure 673:
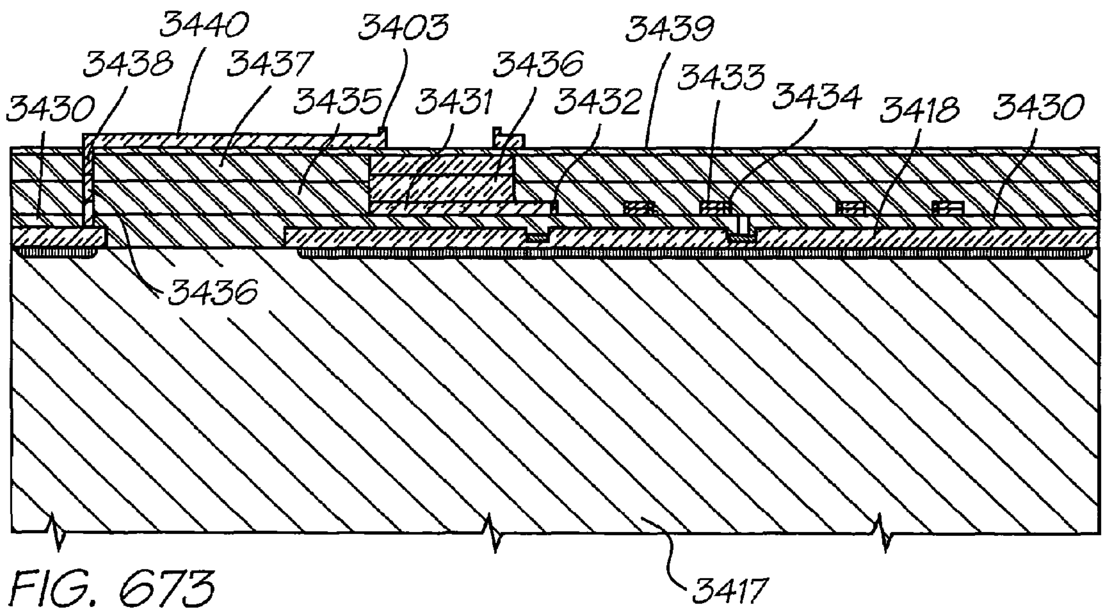

25. Etch down to the sacrificial layer 3439 using Mask 11. This mask defines the roof of the nozzle chamber, and the nozzle itself. This step is shown in FIG. 673.

Figure 674:
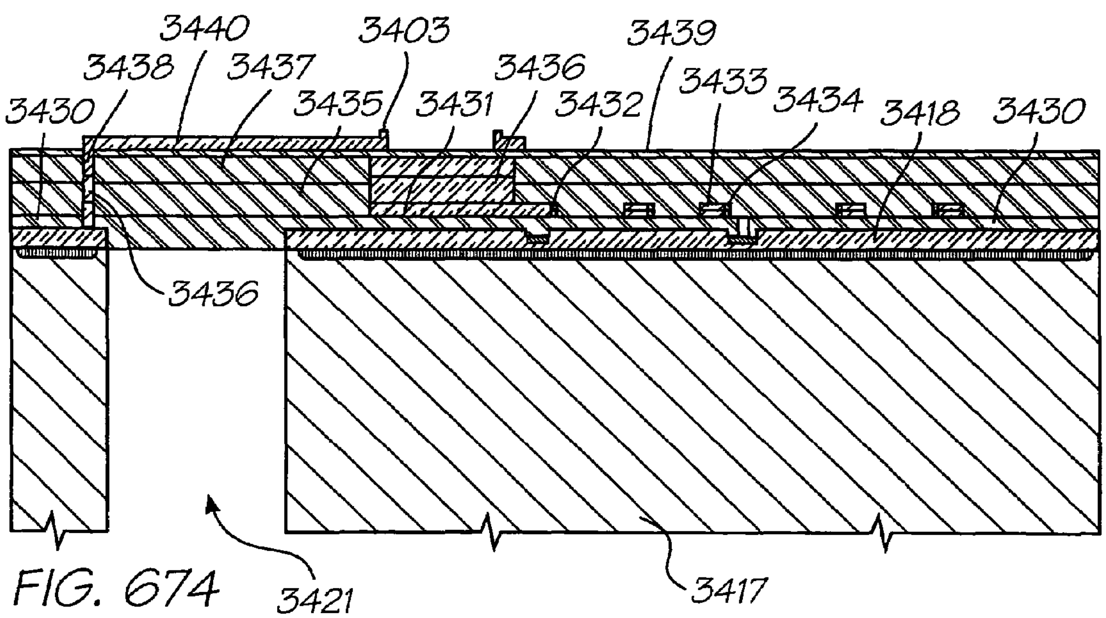

26. Back-etch completely through the silicon wafer (with, for example, an ASE Advanced Silicon Etcher from Surface Technology Systems) using Mask 12. This mask defines the ink inlets 3421 which are etched through the wafer. The wafer is also diced by this etch. This step is shown in FIG. 674.

Figure 675:
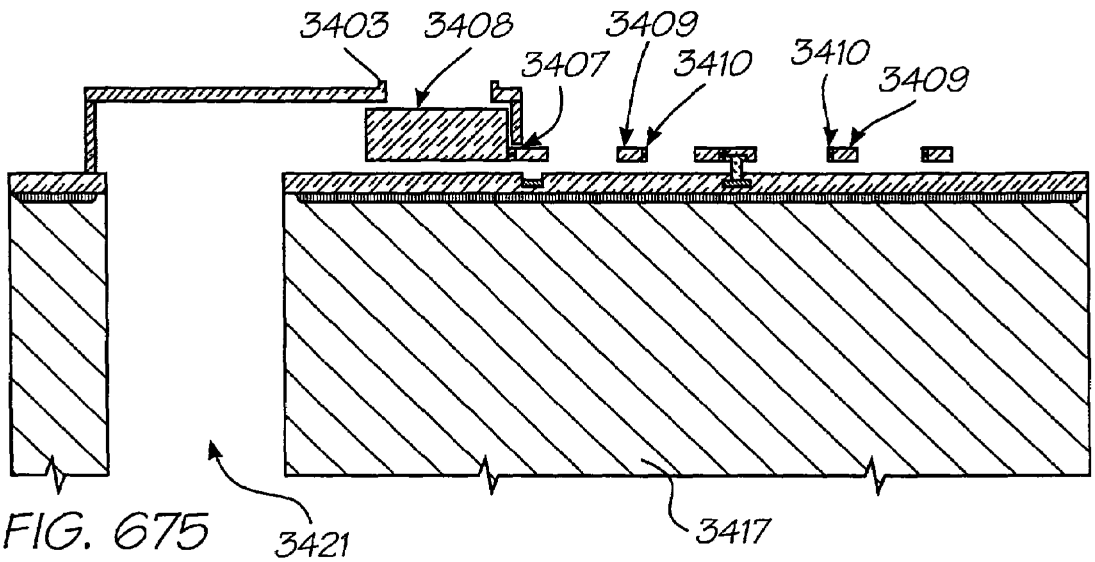

27. Etch the sacrificial material 3430, 3435, 3437, 3439. The nozzle chambers are cleared, the actuators freed, and the chips are separated by this etch. This step is shown in FIG. 675.

28. Mount the print heads in their packaging, which may be a molded plastic former incorporating ink channels which supply the appropriate color ink to the ink inlets at the back of the wafer.

29. Connect the print heads to their interconnect systems. For a low profile connection with minimum disruption of airflow, TAB may be used. Wire bonding may also be used if the printer is to be operated with sufficient clearance to the paper.

30. Hydrophobize the front surface of the print heads.

Figure 676:
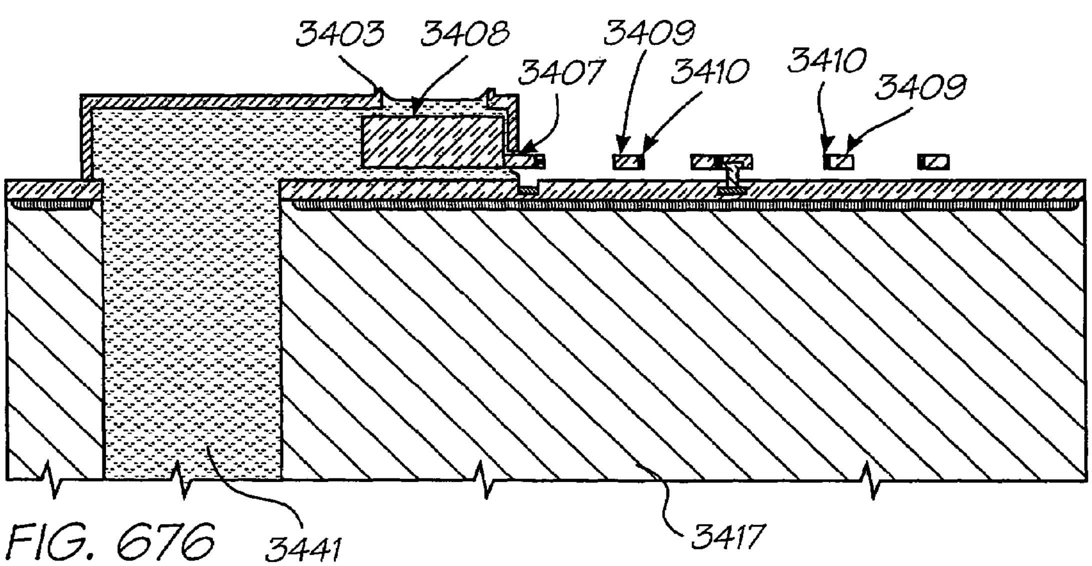

31. Fill the completed print heads with ink 3441 and test them. A filled nozzle is shown in FIG. 676.

IJ35

In a preferred embodiment, there is provided an inkjet printing arrangement arranged on a silicon wafer. The ink is supplied to a first surface of the silicon wafer by means of channels etched through the back of the wafer to an ink ejection chamber located along the surface of the wafer. The ink ejection chamber is filled with ink and includes a paddle attached to an external actuator which is activated so as to compress a portion of the ink within the chamber against a sidewall resulting in the corresponding ejection of ink from the chamber.

FIG. 677 illustrates an ink ejection arrangement 3501 of the invention in the quiescent position with FIG. 678 illustrating the view arrangement 3501 after activation of a thermal actuator 3507 and FIG. 679 illustrates an exploded perspective view of the ink ejection arrangement 3501.

Ink is supplied to an ink ejection chamber 3502 from an ink supply channel 3503 which is etched through the wafer 3504. A paddle 3506 is located in the ink ejection chamber 3502 and attached to a thermal actuator 3507. When the actuator 3507 is activated, the paddle 3506 is moved as illustrated in FIG. 678 thereby displacing ink within the ink ejection chamber 3502 resulting in the ejection of the ink from the chamber 3502. The actuator 3507 comprises a coiled arm which is in turn made up of three sub-arm components.

Turning to FIG. 680, there is illustrated a section through the line IV-IV of FIG. 677 illustrating the structure of the arm which includes an upper conductive arm 3510 and a lower conductive arm 3511. The two arms can be made from conductive titanium diboride which has a high Young's modulus in addition to a suitably high coefficient of thermal expansion. The two arms 3510, 3511 are encased in a silicon nitride portion 3512 of the arm. The two arms 3510, 3511 are conductively interconnected at one end 3513 (FIG. 677) of the actuator 3507 and, at the other end, they are electrically interconnected at 3514, 3515, respectively, to control circuitry to a lower CMOS layer 3517 which includes the drive circuitry for activating the actuator 3507.

The conductive heating of the arms 3510, 3511 results in a general expansion of these two arms 3510, 3511. The expansion works against the nitride portion 3512 of the arm resulting in a partial "uncoiling" of the actuator 3507 which in turn results in a corresponding movement of the paddle 3506 resulting in the ejection of ink from the nozzle chamber 3502. The nozzle chamber 3502 can include a rim 3518 which, for convenience, can also be constructed from titanium diboride. The rim 3518 has an arcuate profile shown at 3519 which is shaped to guide the paddle 3506 on an arcuate path Walls defining the ink ejection chamber 3502 are similarly profiled. Upon the ejection of a drop, the paddle 3506 returns to its quiescent position.

In FIGS. 681-700, there is shown manufacturing processing steps involved in the fabrication of a preferred embodiment.

1. Starting initially with FIG. 681, a starting point for manufacture is a silicon wafer having a CMOS layer 3517 which can comprise the normal CMOS processes including multi-level metal layers etc. and which provide the electrical circuitry for the operation of a preferred embodiment which can be formed as part of a multiple series or array of nozzles at a single time on a single wafer.

Figure 682:
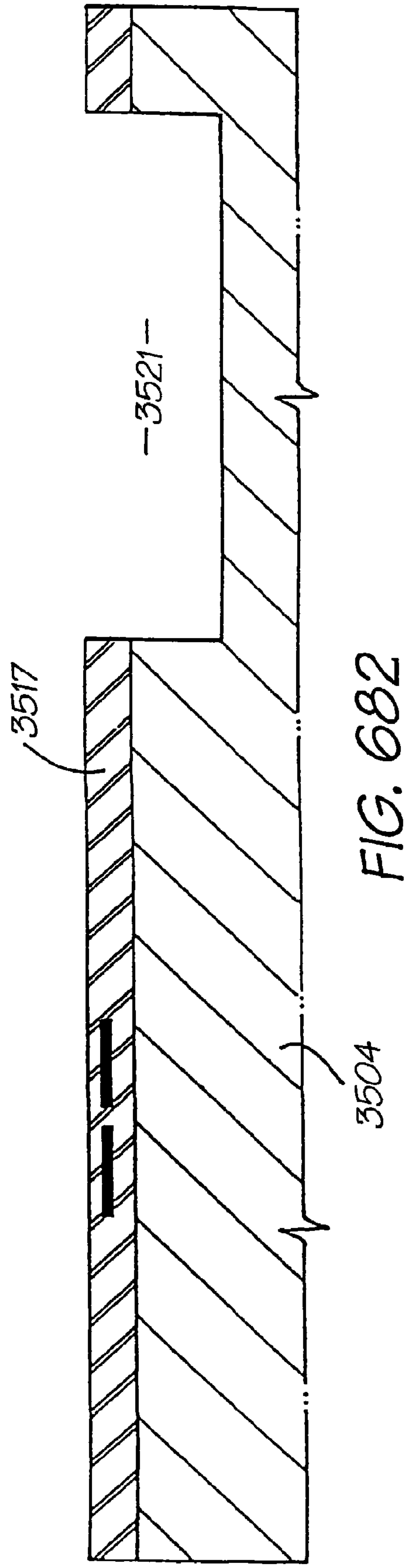

2. The next step in the construction of a preferred embodiment is to form an etched pit 3521 as illustrated in FIG. 682. The etched pit 3521 can be formed utilizing a highly anisotropic trench etcher such as that available from Silicon Technology Systems of the United Kingdom. The pit 3521 is preferably etched to have steep sidewalls. A dry etch system capable of high aspect ratio deep silicon trench etching is that known as the Advance Silicon Etch System available from Surface Technology Systems of the United Kingdom.

Figure 683:
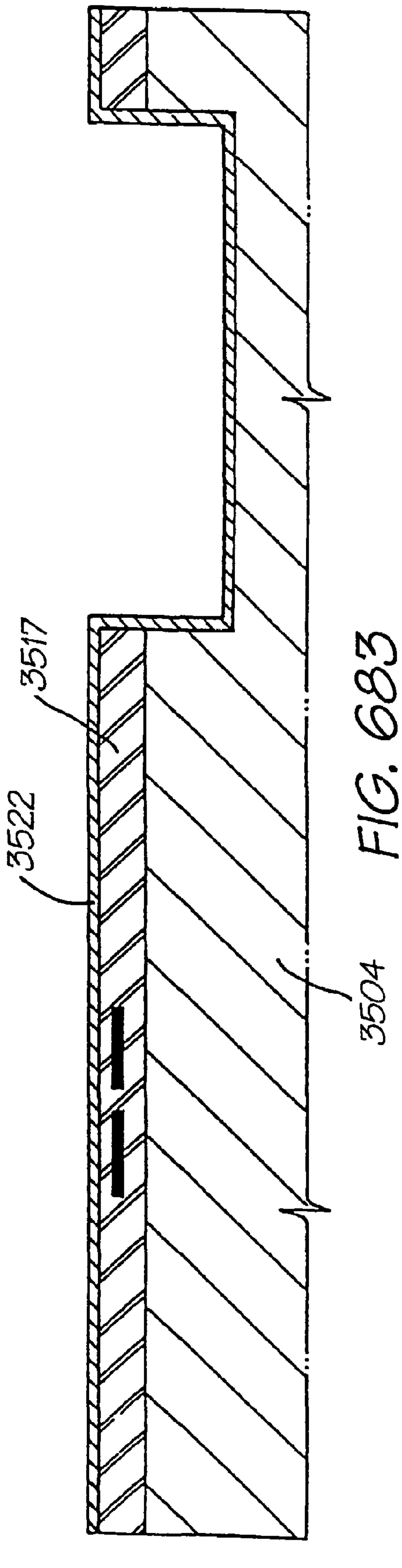

3. Next, as illustrated in FIG. 683, a 1 micron layer of aluminum 3522 is deposited over the surface of the wafer.

Figure 684:
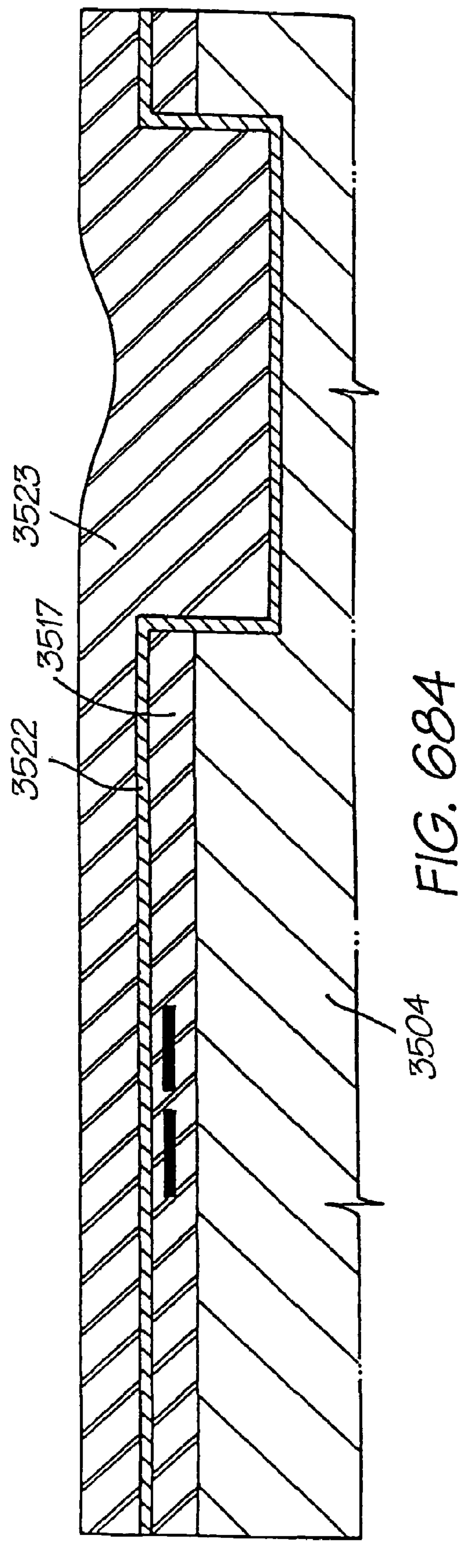

4. Next, as illustrated in FIG. 684 a five micron glass layer 3523 is deposited on top of the aluminum layer 3522.

Figure 685:
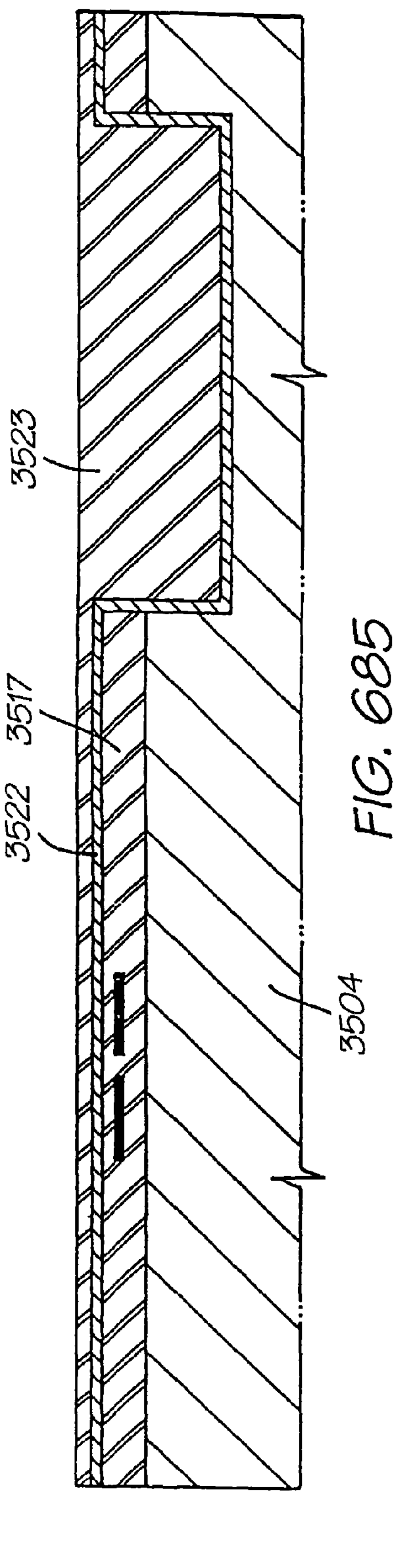

5. Next, the glass layer 3523 is chemically and/or mechanically planarized to provide a 1 micron thick layer of glass over the aluminum layer 3522 as illustrated in FIG. 685.

Figure 686:
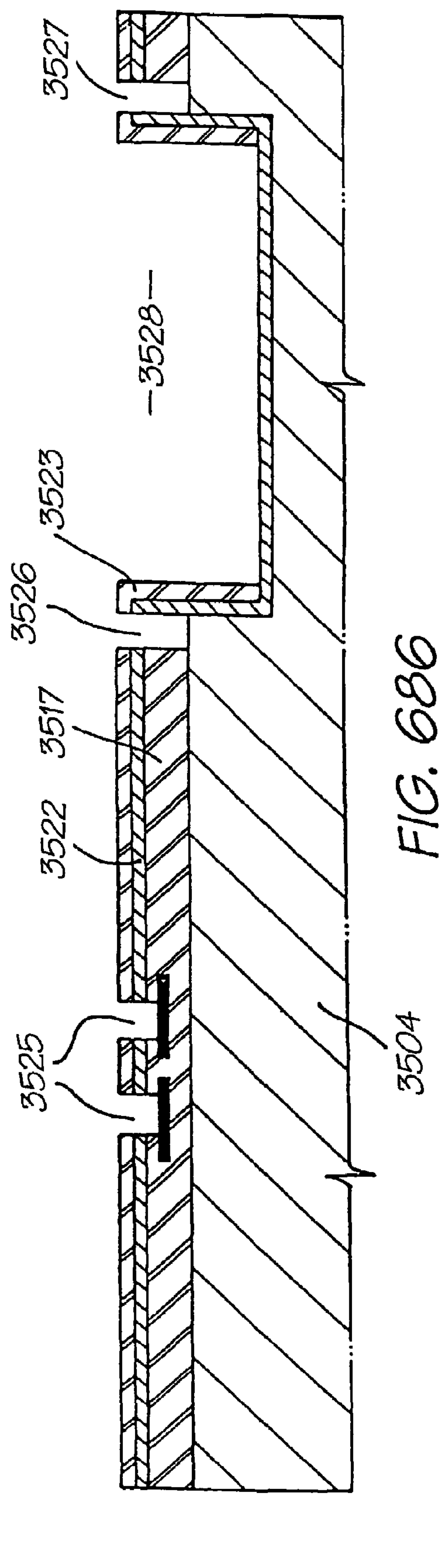

6. A triple masked etch process is then utilized to etch the deposited layer as illustrated in FIG. 686. The etch includes a 1.5 micron etch of the glass layer 3523. The etch defines the via 3525, a trench for rim portions 3526, 3527 and a paddle portion 3528.

Figure 687:
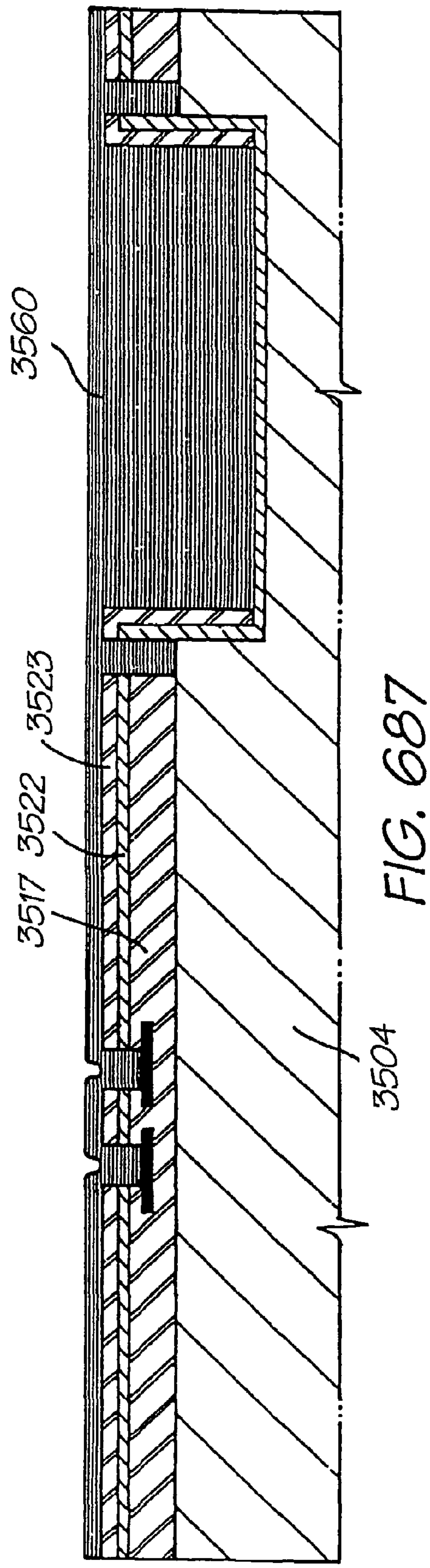

7. Next, as illustrated in FIG. 687, a 0.9 micron layer 3560 of titanium diboride is deposited.

Figure 688:
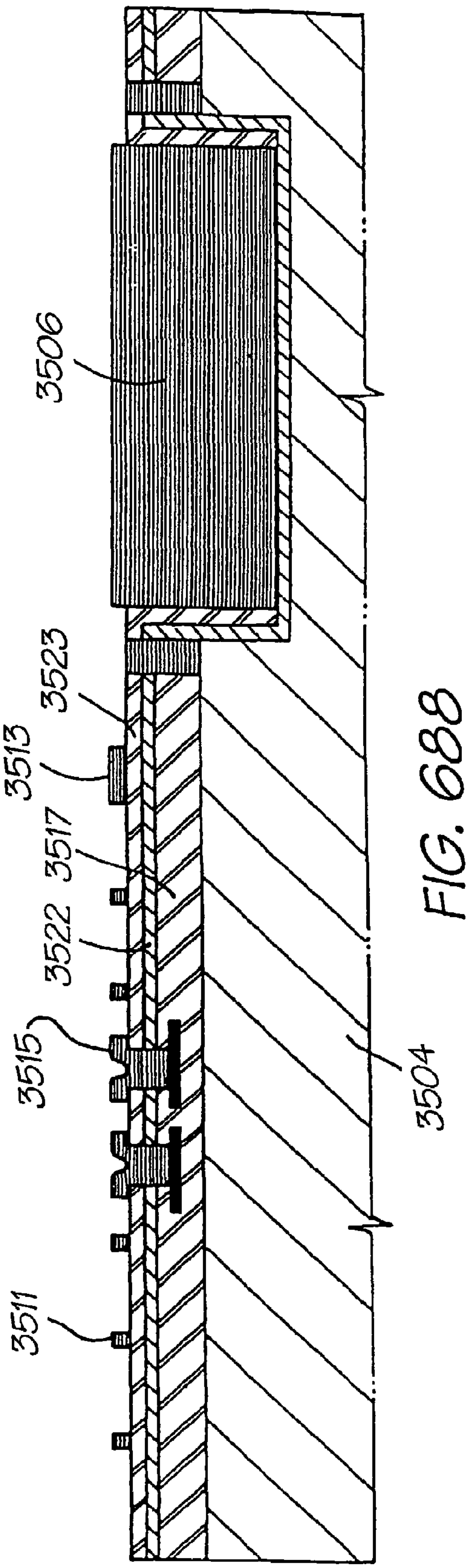

8. The titanium diboride layer 3560 is subsequently masked and etched to leave those portions as illustrated in FIG. 688.

Figure 689:
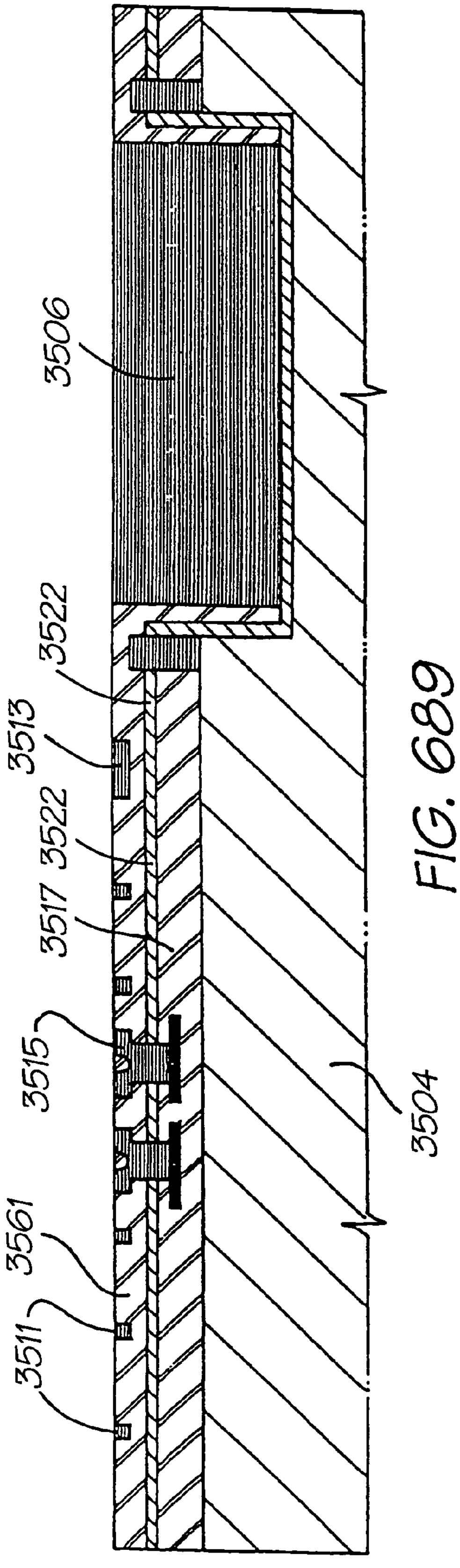

9. A 1 micron layer of silicon dioxide ($SiO_2$) is then deposited and chemically and/or mechanically planarized as illustrated in FIG. 689 to a level of the titanium diboride.

Figure 690:
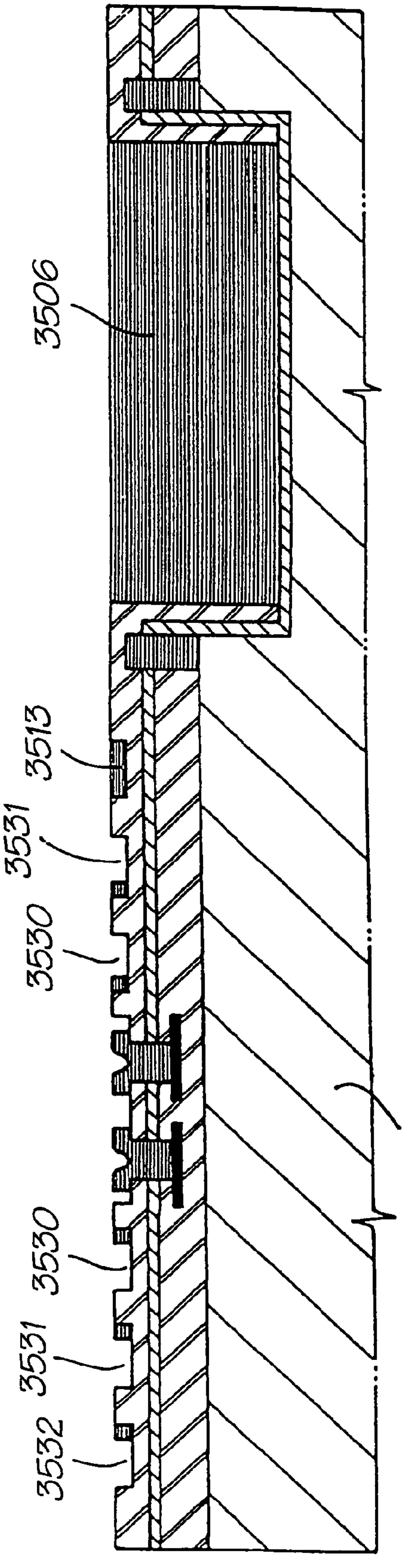

10. As illustrated in FIG. 690 the silicon dioxide layer 3561 is then etched to form a spiral pattern where a nitride layer will later be deposited. The spiral pattern includes etched portions 3530-3532.

Figure 691:
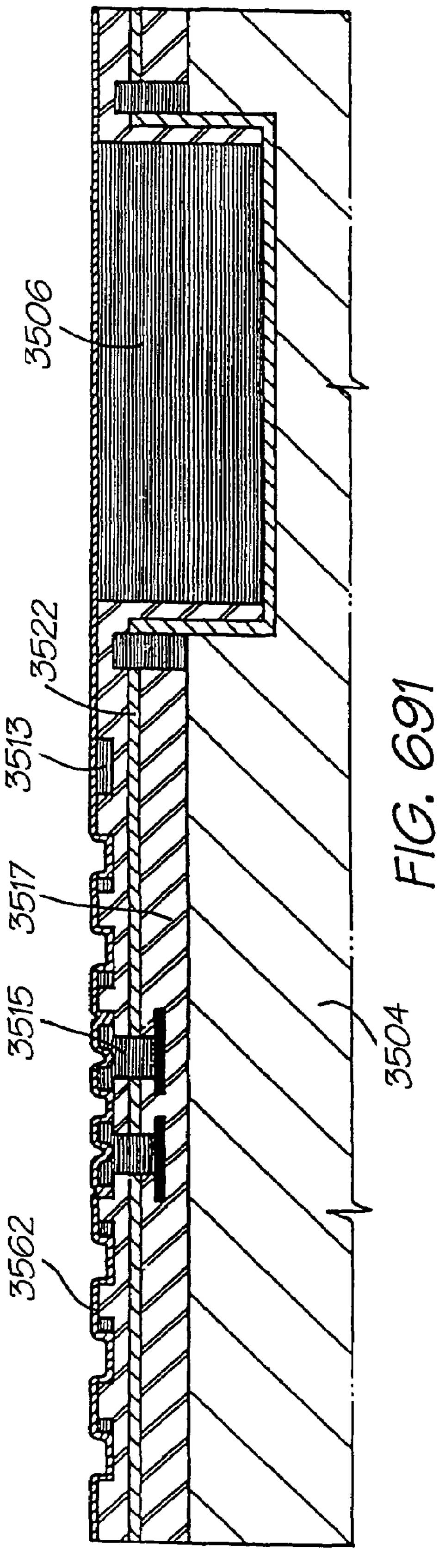

11. Next, as illustrated in FIG. 691, a 0.2 micron layer 3562 of the silicon nitride is deposited.

Figure 692:
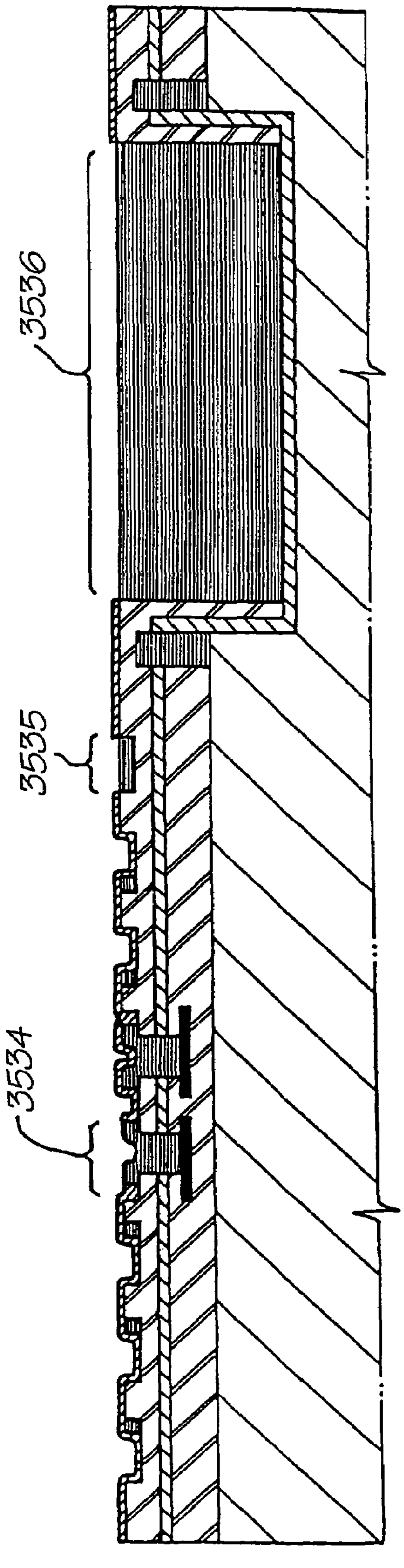

12. The silicon nitride layer 3562 is then etched in areas 3534-3536 to provide for electrical interconnection in areas 3534, 3535, in addition to a mechanical interconnection, as will become more apparent hereinafter, in the area 3536 as shown in FIG. 692.

Figure 693:
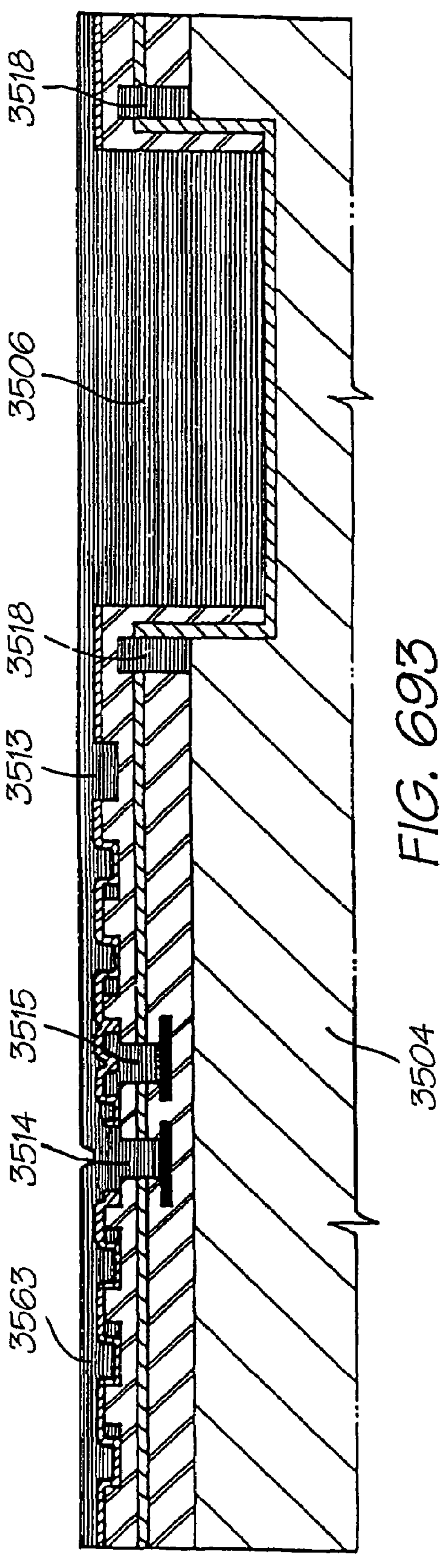

13. As shown in FIG. 693, a 0.9 micron layer 3563 of titanium diboride is then deposited.

Figure 694:
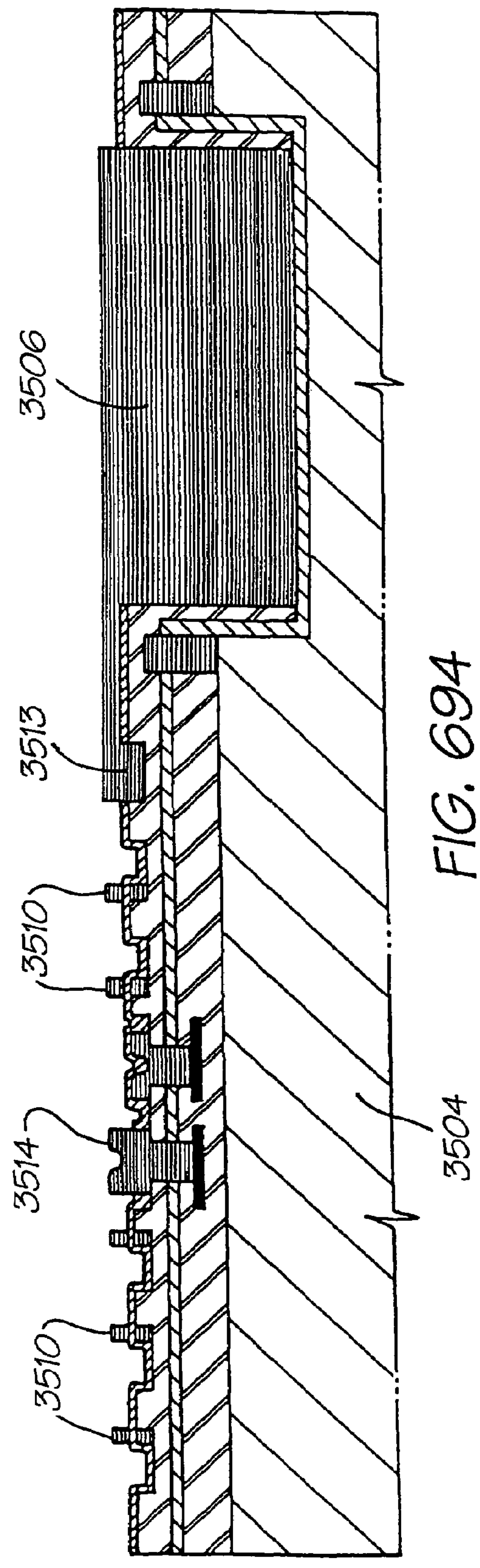

14. The titanium diboride is then etched to leave the via structure 3514 the spiral structure 3510 and the paddle arm 3506, as shown in FIG. 694.

Figure 695:
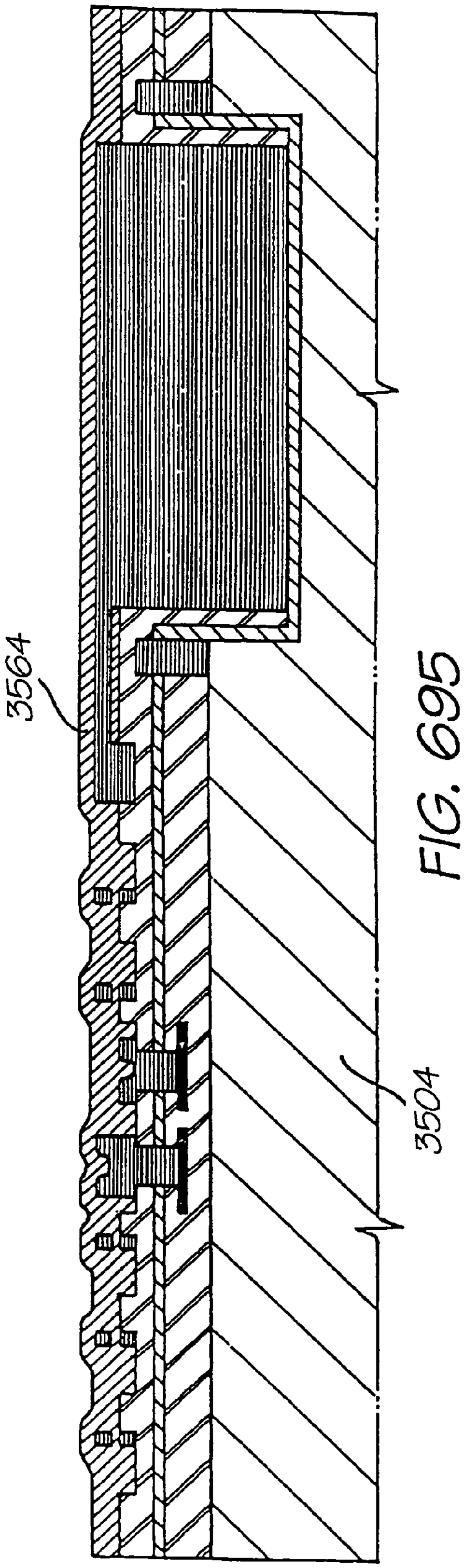

15. A 1 micron layer 3564 of silicon nitride is then deposited as illustrated in FIG. 695.

Figure 696:
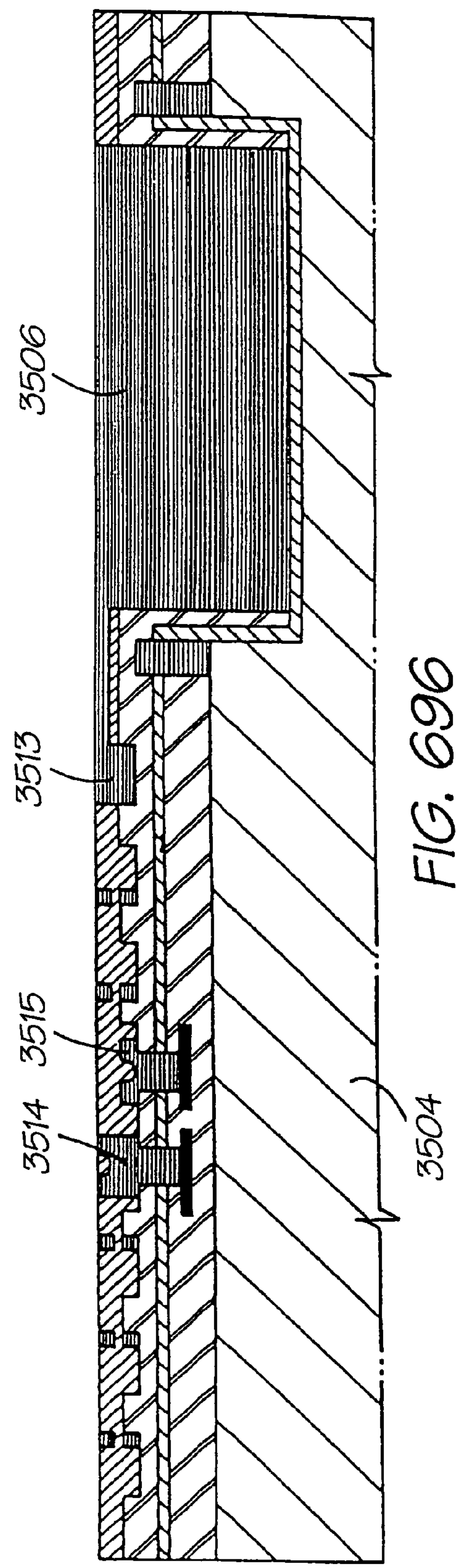

16. The nitride layer 3564 is then chemically and mechanically planarized to the level of the titanium diboride layer 3563 as shown in FIG. 696.

Figure 697:
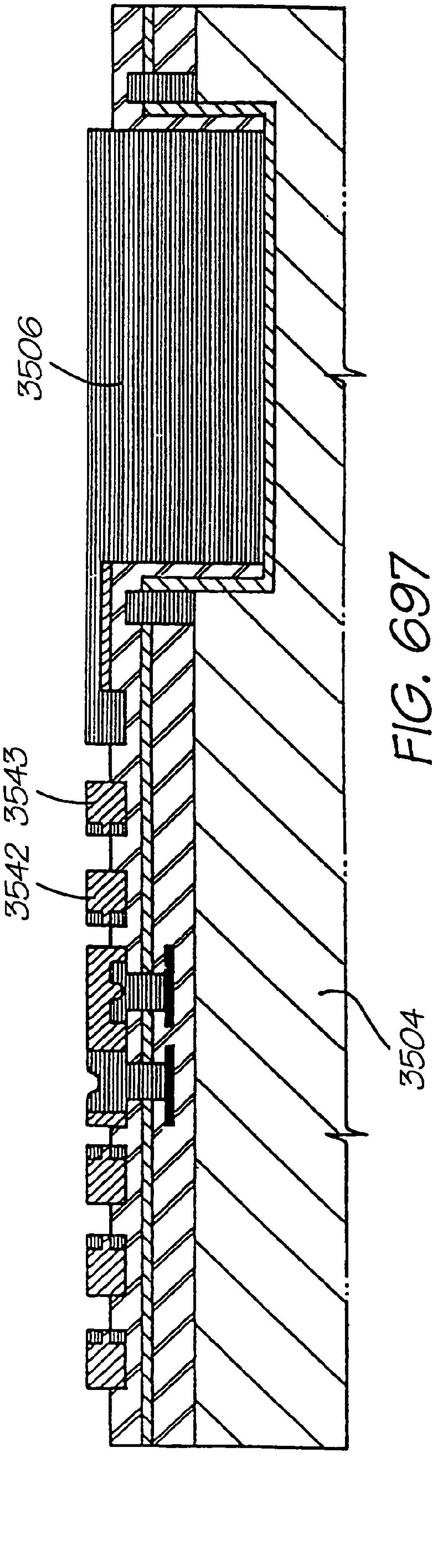

17. The silicon nitride layer 3564 is then etched so as to form the silicon nitride portions of a spiral arm 3542, 3543 with a thin portion of silicon nitride also remaining under the paddle arm as shown in FIG. 697.

Figure 698:
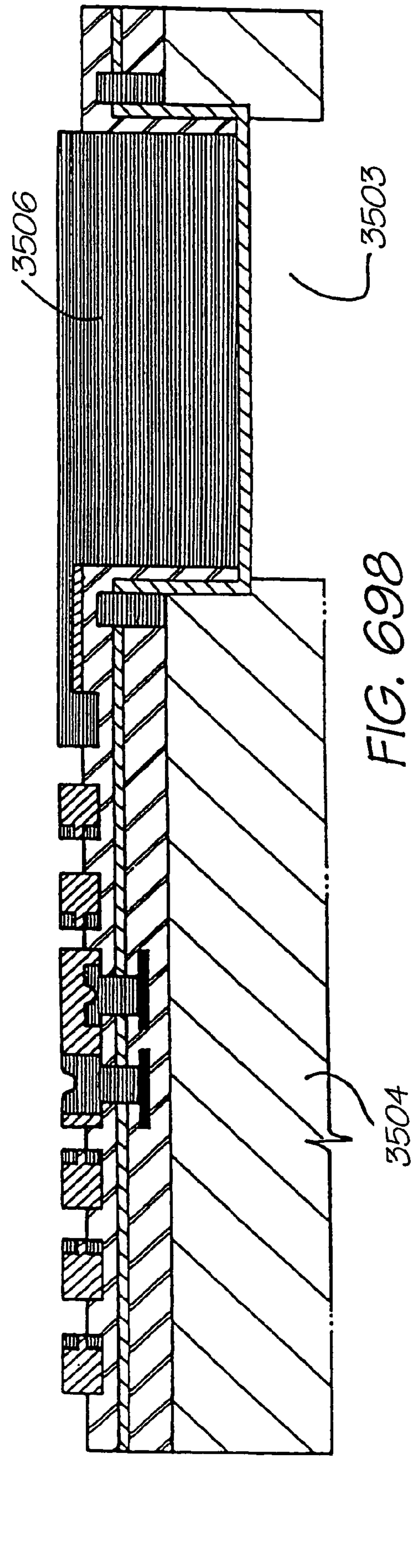

18. As shown in FIG. 698 an ink supply channel 3503 can be etched from a back of the wafer 3504. Again, an STS deep silicon trench etcher can be utilized.

Figure 699:
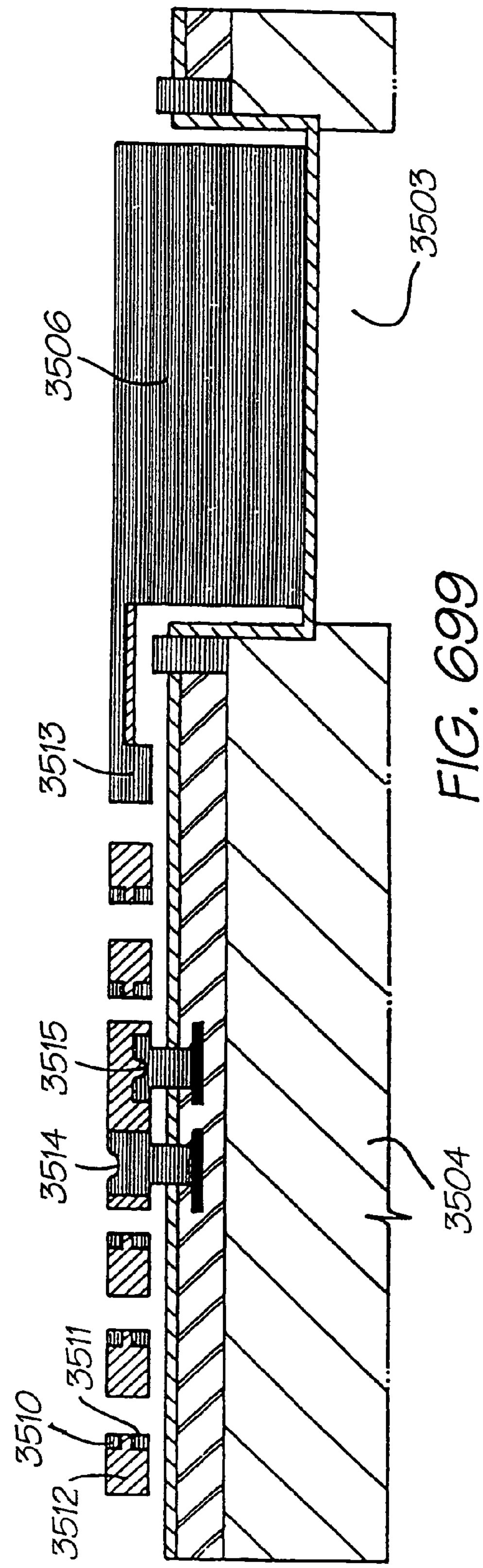

19. The next step is a wet etch of all exposed glass ($SiO_2$) surfaces of the wafer 3504 which results in a substantial release of the paddle structure as illustrated in FIG. 699.

Figure 700:
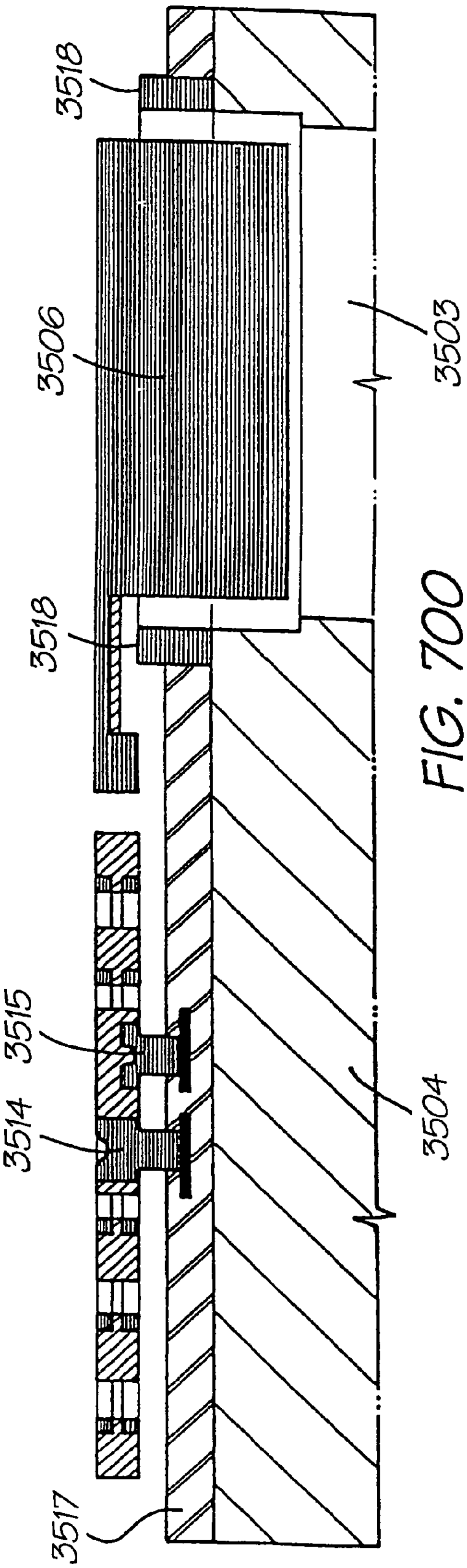

20. Finally, as illustrated in FIG. 700, the exposed aluminum surfaces are then wet etched away resulting in a release of the paddle structure which springs back to its quiescent or return position ready for operation.

The wafer can then be separated into printhead units and interconnected to an ink supply along the back surface of the wafer for the supply of ink to the nozzle arrangement.

In FIG. 701, there is illustrated a portion 3549 of an array of nozzles which can include a three color output including a first color series 3550, second color series 3551 and third color series 3552. Each color series is further divided into two rows 3554 of ink ejection units with each unit providing for the ejection ink drops corresponding to a single pixel of a line. Hence, a page width array of nozzles can be formed including appropriate bond pads 3555 for providing electrical interconnection. The page width printhead can be formed with a silicon wafer with multiple printheads being formed simultaneously using the aforementioned steps. Subsequently, the printheads can be separated and joined to an ink supply mechanism for supplying ink via the back of the wafer to each ink ejection arrangement, the supply being suitably arranged for providing separate colors.

One form of detailed manufacturing process which can be used to fabricate monolithic ink jet printheads operating in accordance with the principles taught by the present embodiment can proceed utilizing the following steps:

1. Using a double-sided polished wafer 3504, complete drive transistors, data distribution, and timing circuits using a 0.5 micron, one poly, 2 metal CMOS process layer 3517. Relevant features of the wafer 3504 at this step are shown in FIG. 703. For clarity, these diagrams may not be to scale, and may not represent a cross section though any single plane of the nozzle. FIG. 702 is a key to representations of various materials in these manufacturing diagrams, and those of other cross referenced ink jet configurations.

2. Etch oxide down to silicon or aluminum using Mask 1. This mask defines the ink inlet, the heater contact vias, and the edges of the printhead chips. This step is shown in FIG. 704.

Figure 705:
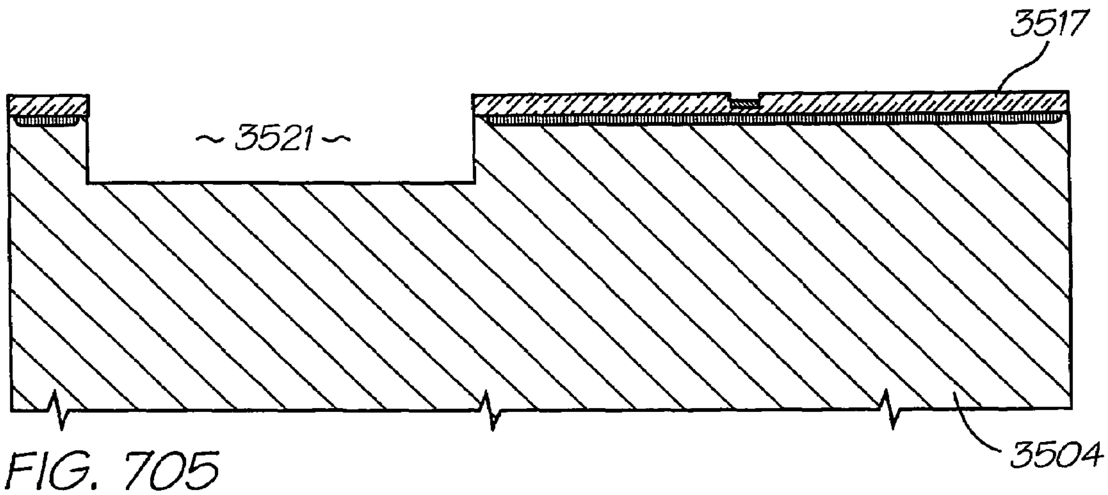

3. Etch silicon to a depth of 10 microns using the etched oxide as a mask. This step is shown in FIG. 705.

Figure 706:
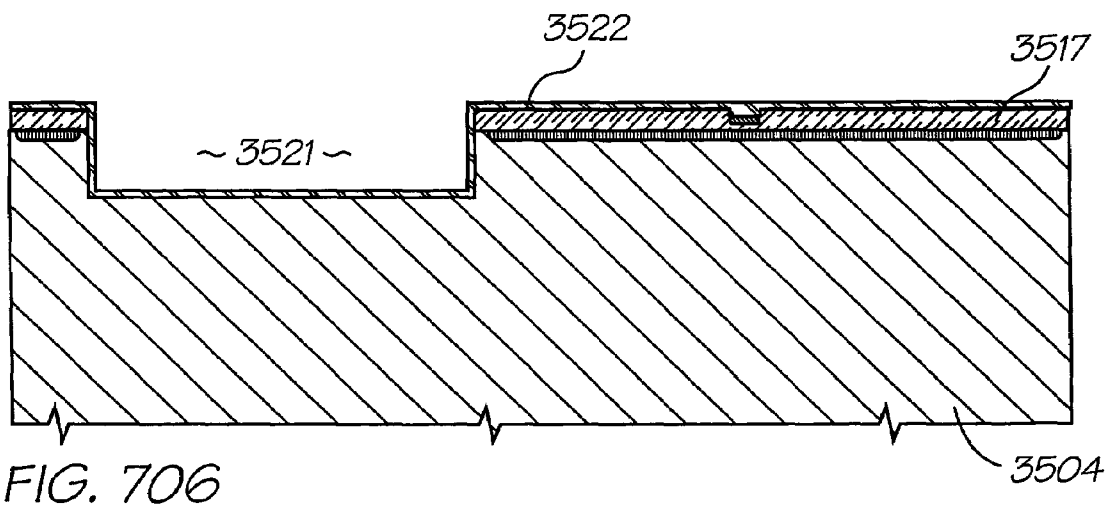

4. Deposit 1 micron of sacrificial material 3522 (e.g. aluminum). This step is shown in FIG. 706.

5. Deposit 10 microns of a second sacrificial material 3570 (e.g. polyimide). This fills the etched silicon hole.

Figure 707:
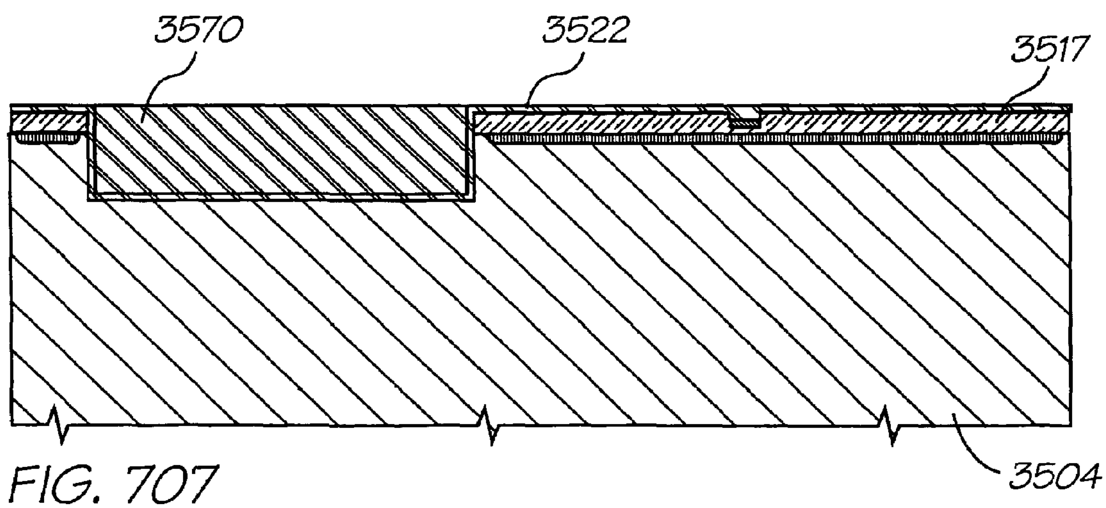

6. Planarize using CMP to the level of the first sacrificial material 3522. This step is shown in FIG. 707.

Figure 708:
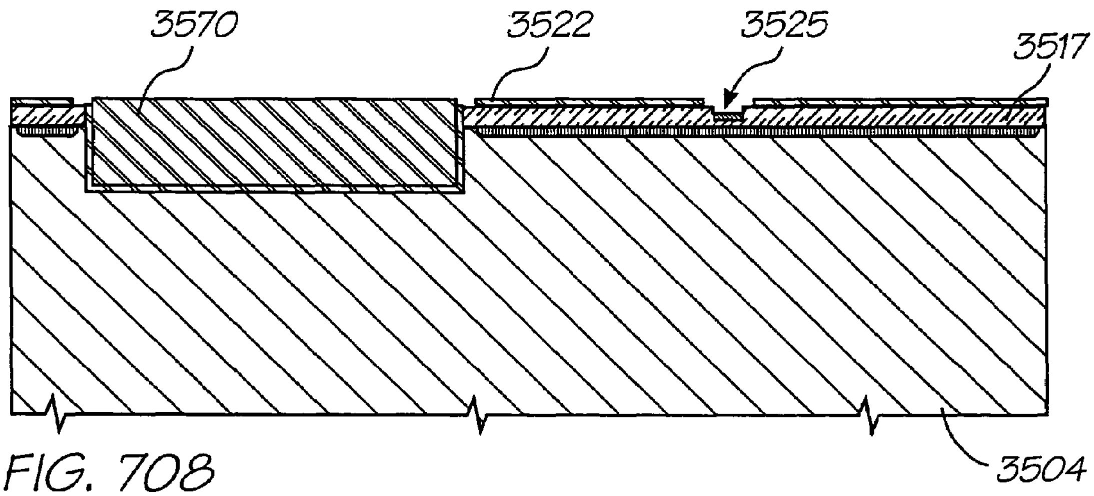

7. Etch the first sacrificial layer 3522 using Mask 2, defining the nozzle chamber wall and the actuator anchor point 3525. This step is shown in FIG. 708.

8. Deposit 1 micron of glass 3571.

9. Etch the glass 3571 and second sacrificial layer 3570 using Mask 3. This mask defines the lower layer of the actuator loop, the nozzle chamber wall, and the lower section of the paddle.

Figure 709:
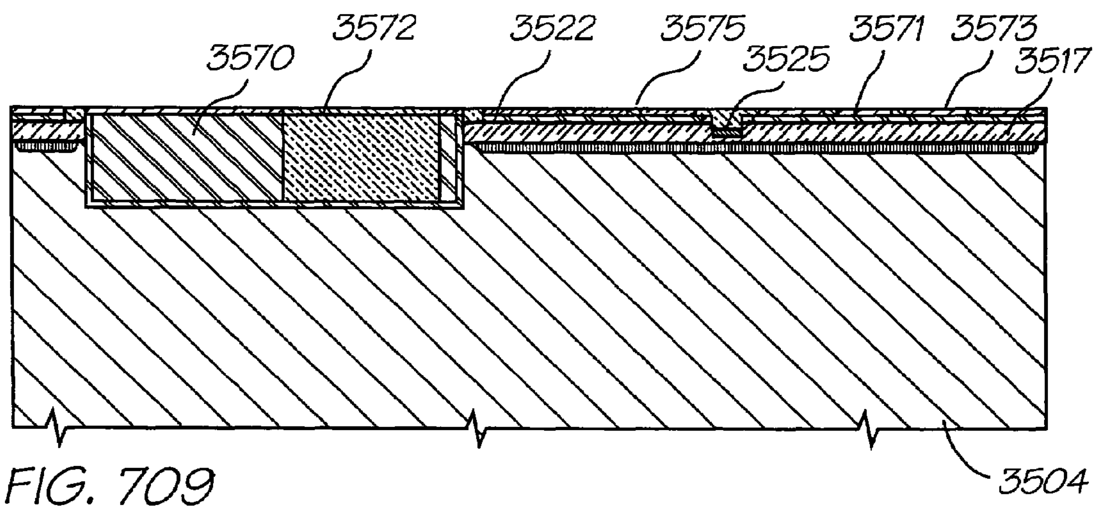

10. Deposit 1 micron of heater material 3572, for example titanium nitride (TiN) or titanium diboride (TiB2). Planarize using CMP. Steps 8 to 10 form a 'damascene' process. This step is shown in FIG. 709.

11. Deposit 0.1 micron of silicon nitride 3573.

12. Deposit 1 micron of glass 3574.

13. Etch the glass 3574 using Mask 4, which defines the upper layer of the actuator loop, the arm to the paddle, and the upper section of the paddle.

14. Etch the silicon nitride 3573 using Mask 5, which defines the vias connecting the upper layer of the actuator loop to the lower layer of the actuator loop, as well as the arm to the paddle, and the upper section of the paddle.

Figure 710:
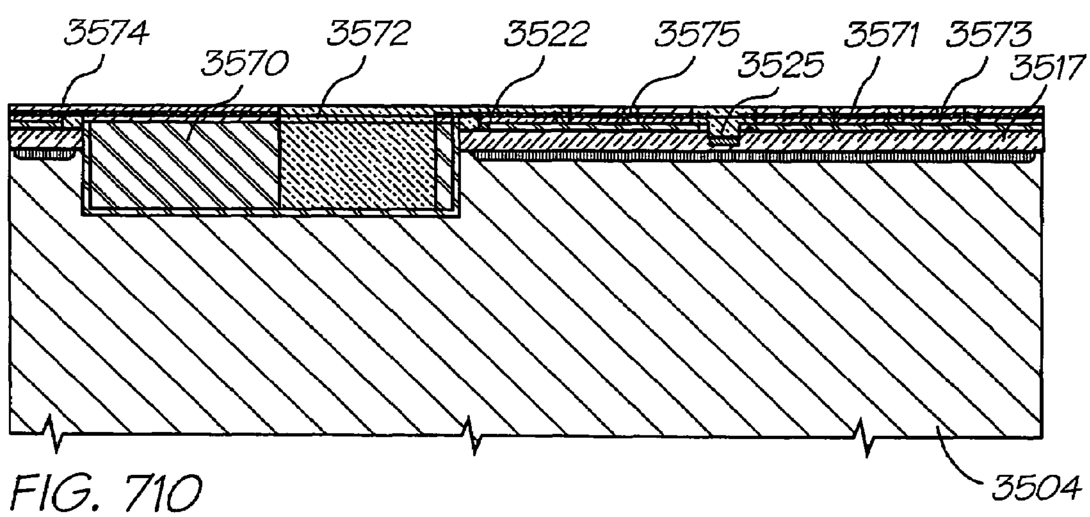

15. Deposit 1 micron of the same heater material 3575 as in step 10. Planarize using CMP. Steps 11 to 15 form a 'dual damascene' process. This step is shown in FIG. 710.

Figure 711:
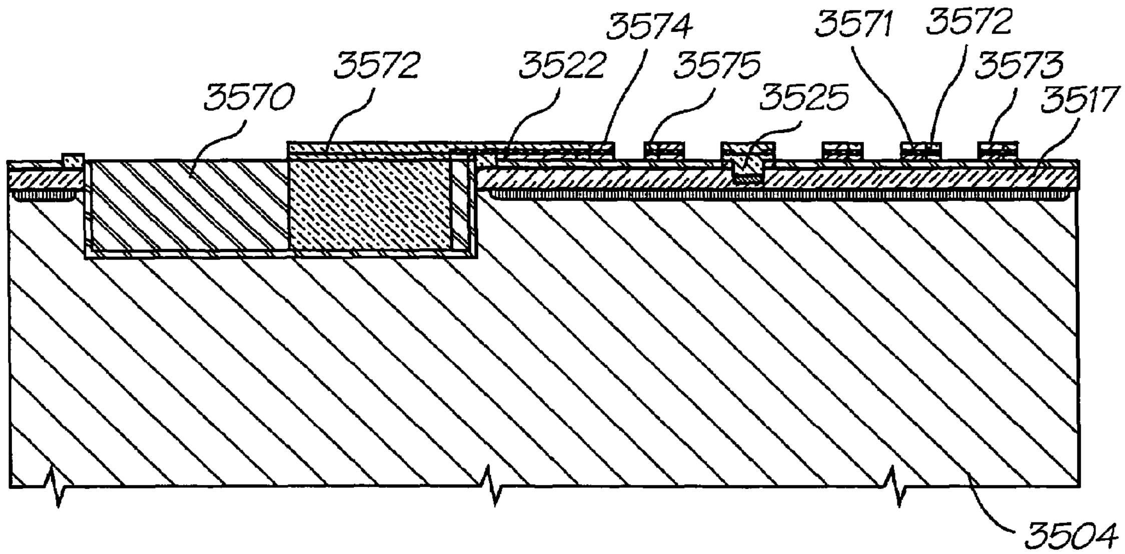

16. Etch the glass and nitride down to the sacrificial layer 3522 using Mask 6, which defines the actuator. This step is shown in FIG. 711.

17. Wafer probe. All electrical connections are complete at this point, bond pads are accessible, and the chips are not yet separated.

Figure 712:
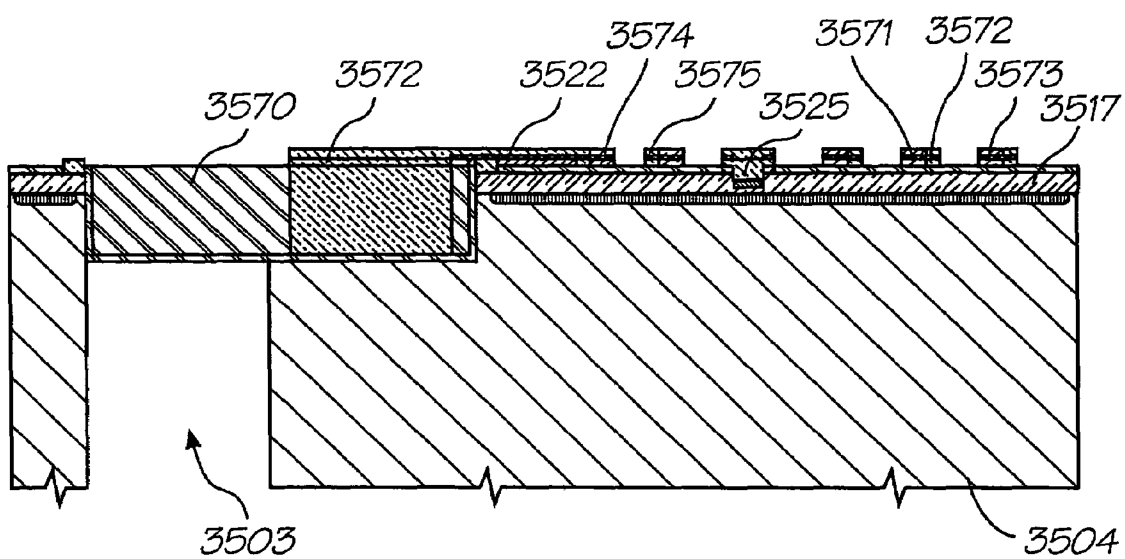

18. Back-etch completely through the silicon wafer (with, for example, an ASE Advanced Silicon Etcher from Surface Technology Systems) using Mask 7. This mask defines the ink inlets 3503 which are etched through the wafer 3504. The wafer 3504 is also diced by this etch. This step is shown in FIG. 712.

Figure 713:
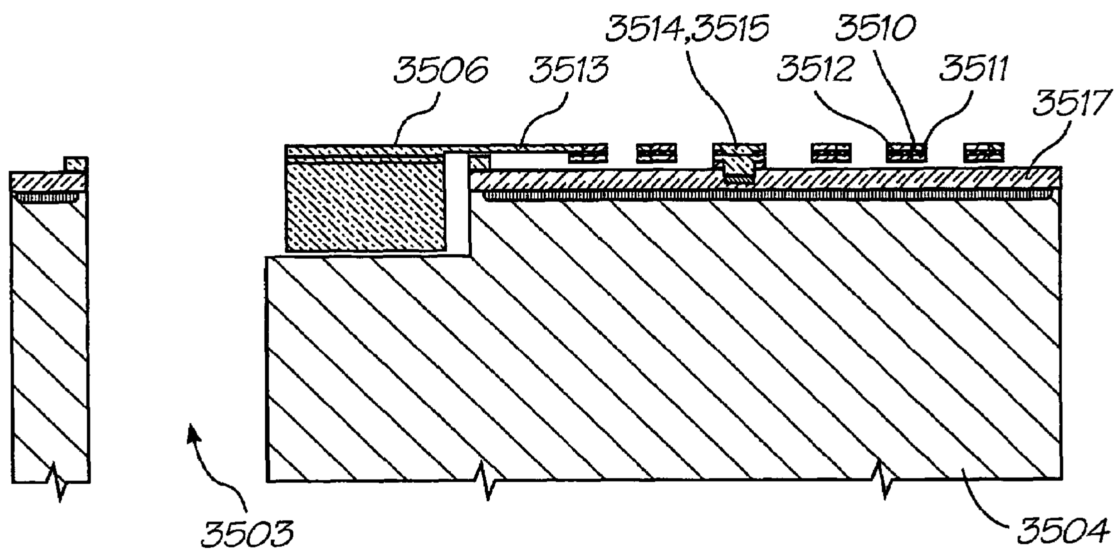

19. Etch both sacrificial materials 3522, 3570. The nozzle chambers are cleared, the actuators freed, and the chips are separated by this etch. This step is shown in FIG. 713.

20. Mount the chips in their packaging, which may be a molded plastic former incorporating ink channels which supply the appropriate color ink to the ink inlets 3503 at the back of the wafer.

21. Connect the chips to their interconnect systems. For a low profile connection with minimum disruption of airflow, TAB may be used. Wire bonding may also be used if the printer is to be operated with sufficient clearance to the paper.

22. Fill the printhead with water. Hydrophobize the exposed portions of the printhead by exposing the printhead to a vapor of a perfluorinated alkyl trichlorosilane. Drain the water and dry the printhead.

Figure 714:
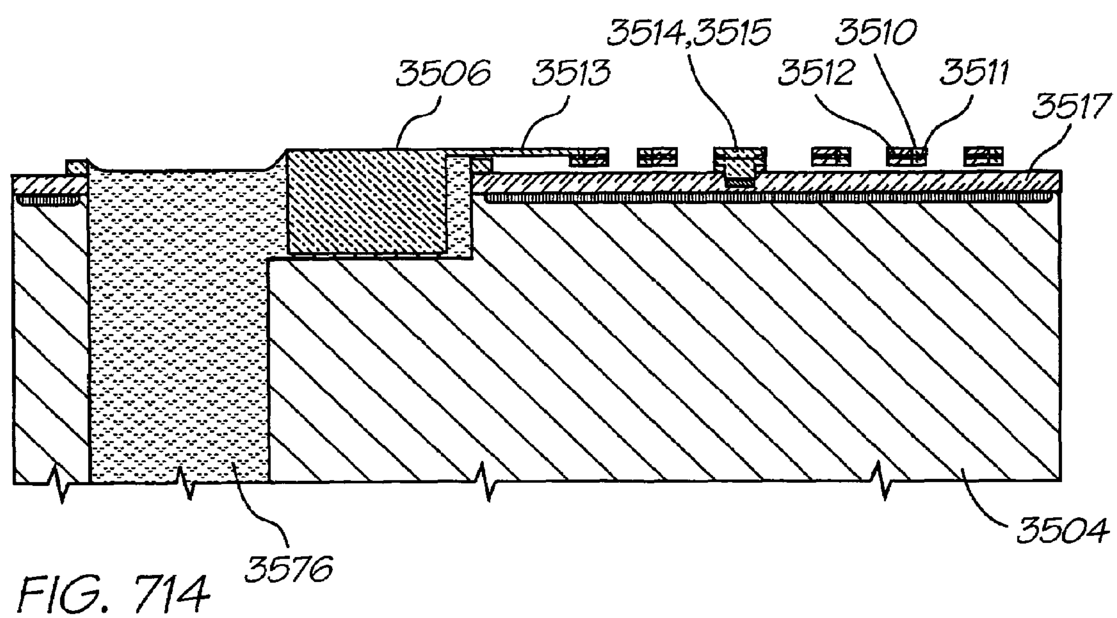

23. Fill the completed printhead with ink 3576 and test it. A filled nozzle is shown in FIG. 714.

IJ36

In a preferred embodiment, there is provided an inkjet printhead having an array of nozzles wherein the nozzles are grouped in pairs and each pair is provided with a single actuator which is actuated so as to move a paddle type mechanism to force the ejection of ink out of one or other of the nozzle pairs. The paired nozzles eject ink from a single nozzle chamber which is resupplied by means of an ink supply channel. Further, the actuator of a preferred embodiment has unique characteristics so as to simplify the actuation process.

Turning initially to FIGS. 715 to 719, there will now be explained the principles of operation of a preferred embodiment In a preferred embodiment, a single nozzle chamber 3601 is utilized to supply ink two ink ejection nozzles 3602, 3603. Ink is resupplied to the nozzle chamber 3601 via means of an ink supply channel 3605. In its quiescent position, to ink menisci 3606, 3607 are formed around the ink ejection holes 3602, 3603. The arrangement of FIG. 715 being substantially axially symmetric around a central paddle 3609 which is attached to an actuator mechanism.

Figure 716:
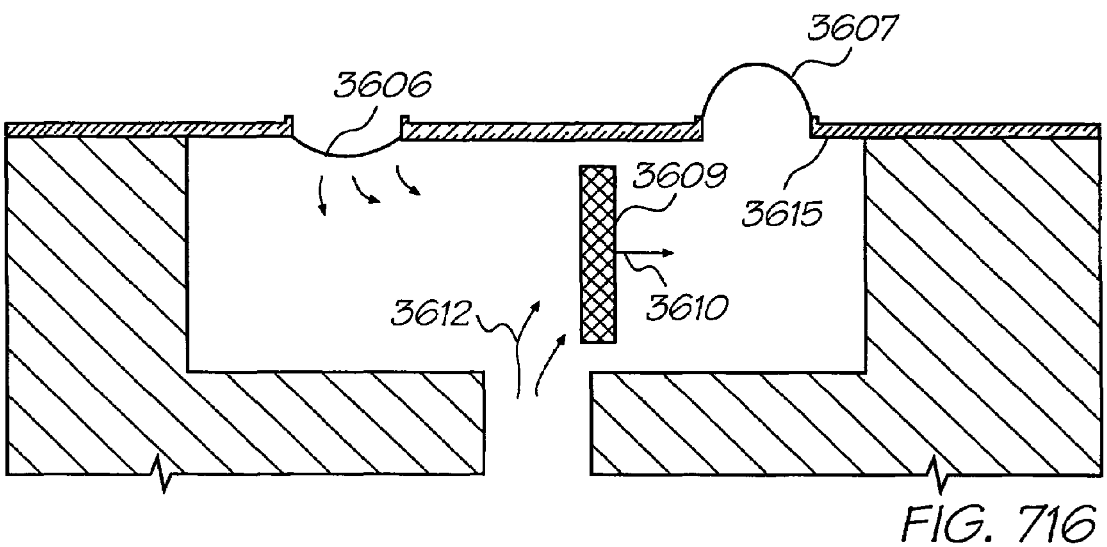
Figure 717:
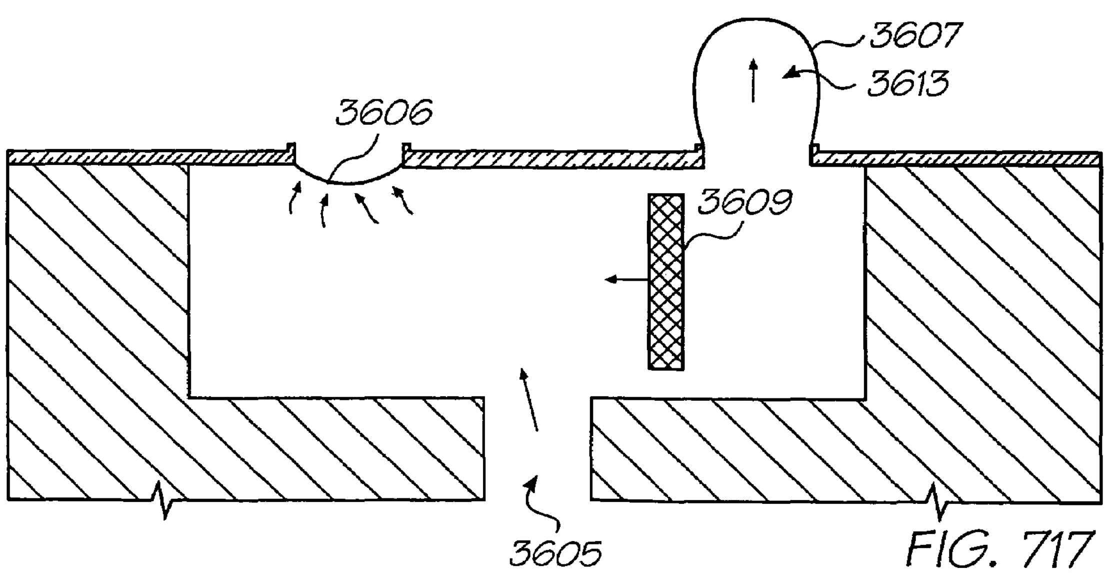
Figure 718:
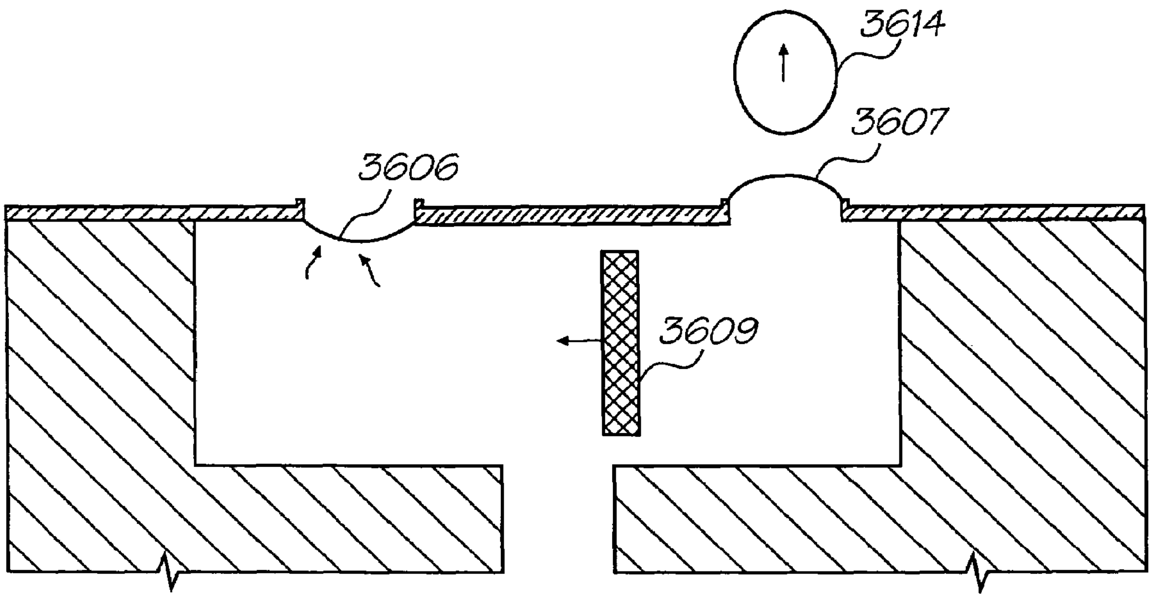

When it is desired to eject ink out of one of the nozzles, say nozzle 3603, the paddle 3609 is actuated so that it begins to move as indicated in FIG. 716. The movement of paddle 3609 in the direction 3610 results in a general compression of the ink on the right hand side of the paddle 3609. The compression of the ink results in the meniscus 3607 growing as the ink is forced out of the nozzles 3603. Further, the meniscus 3606 undergoes an inversion as the ink is sucked back on the left hand side of the actuator 3610 with additional ink 3612 being sucked in from ink supply channel 3605. The paddle actuator 3609 eventually comes to rest and begins to return as illustrated in FIG. 717. The ink 3613 within meniscus 3607 has substantial forward momentum and continues away from the nozzle chamber whilst the paddle 3609 causes ink to be sucked back into the nozzle chamber. Further, the surface tension on the meniscus 3606 results in further in flow of the ink via the ink supply channel 3605. The resolution of the forces at work in the resultant flows results in a general necking and subsequent breaking of the meniscus 3607 as illustrated in FIG. 718 wherein a drop 3614 is formed which continues onto the media or the like. The paddle 3609 continues to return to its quiescent position.

Figure 715:
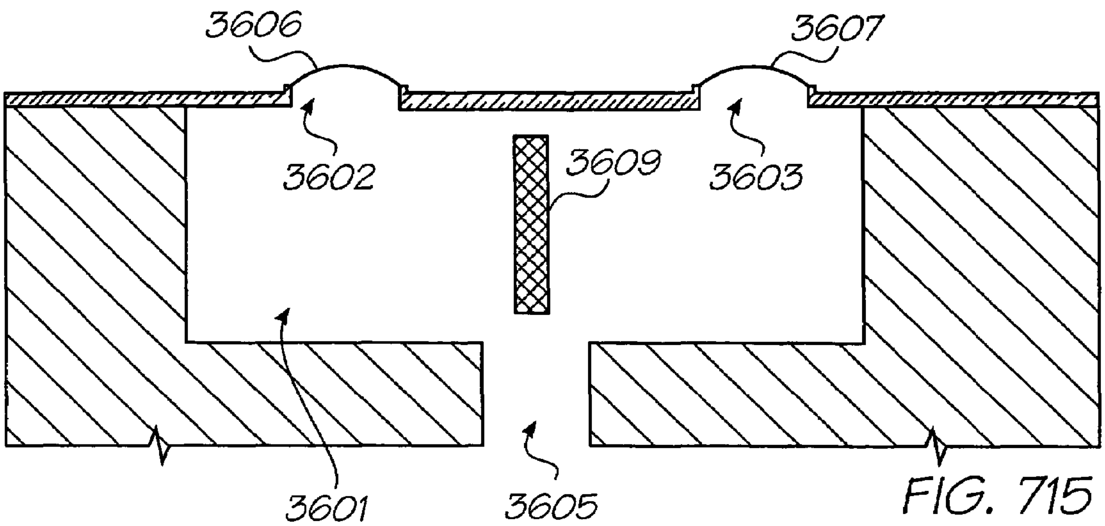
Figure 719:
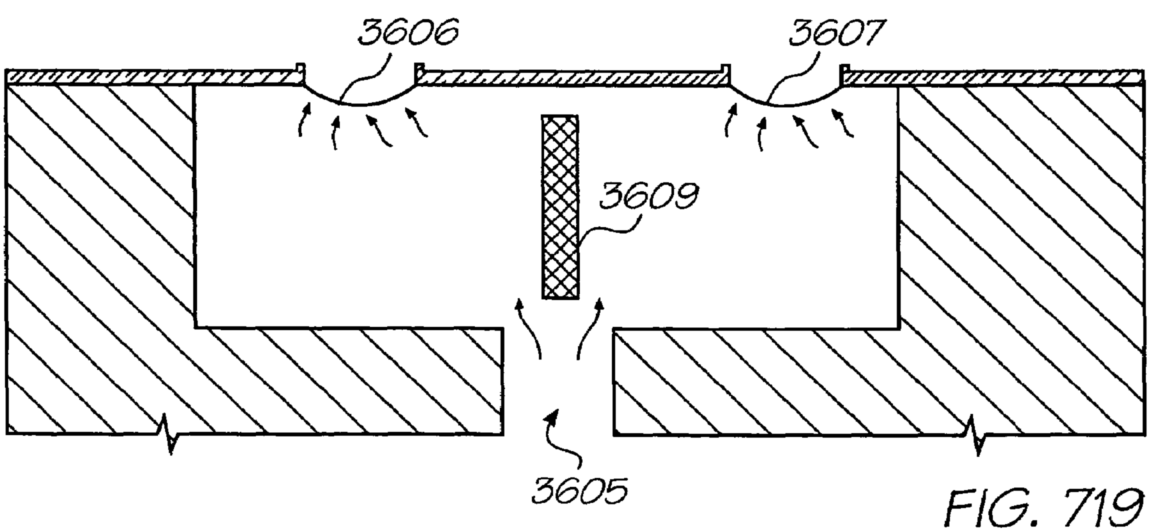

Next, as illustrated in FIG. 719, the paddle 3609 returns to its quiescent position and the nozzle chamber refills by means of surface tension effects acting on meniscuses 3606, 3607 with the arrangement of returning to that showing in FIG. 715. When required, the actuator 3609 can be activated to eject ink out of the nozzle 3602 in a symmetrical manner to that described with reference to FIGS. 715-719. Hence, a single actuator 3609 is activated to provide for ejection out of multiple nozzles. The dual nozzle arrangement has a number of advantages including in that movement of actuator 3609 does not result in a significant vacuum forming on the back surface of the actuator 3609 as a result of its rapid movement Rather, meniscus 3606 acts to ease the vacuum and further acts as a "pump" for the pumping of ink into the nozzle chamber. Further, the nozzle chamber is provided with a lip 3615 (FIG. 716) which assists in equalizing the increase in pressure around the ink ejection holes 3603 which allows for the meniscus 3607 to grow in an actually symmetric manner thereby allowing for straight break off of the drop 3614.

Turning now to FIGS. 720 and 721, there is illustrated a suitable nozzle arrangement with FIG. 720 showing a single side perspective view and FIG. 721 showing a view, partly in section illustrating the nozzle chamber. The actuator 3620 includes a pivot arm attached at the post 3621. The pivot arm includes an internal core portion 3622 which can be constructed from glass. On each side 3623, 3624 of the internal portion 3622 is two separately control heater arms which can be constructed from an alloy of copper and nickel (45% copper and 55% nickel). The utilization of the glass core is advantageous in that it has a low coefficient thermal expansion and coefficient of thermal conductivity. Hence, any energy utilized in the heaters 3623, 3624 is substantially maintained in the heater structure and utilized to expand the heater structure and opposed to an expansion of the glass core 3622. Structure or material chosen to form part of the heater structure preferably has a high "bend efficiency". One form of definition of bend efficiency can be the Young's modulus times the coefficient of thermal expansion divided by the density and by the specific heat capacity.

The copper nickel alloy in addition to being conductive has a high coefficient of thermal expansion, a low specific heat and density in addition to a high Young's modulus. It is therefore a highly suitable material for construction of the heater element although other materials would also be suitable.

Each of the heater elements can comprise a conductive out and return trace with the traces being insulated from one and other along the length of the trace and conductively joined together at the far end of the trace. The current supply for the heater can come from a lower electrical layer via the pivot anchor 3621. At one end of the actuator 3620, there is provided a bifurcated portion 3630 which has attached at one end thereof to leaf portions 3631, 3632.

To operate the actuator, one of the arms 3623, 3624 e.g. 3623 is heated in air by passing current through it. The heating of the arm results in a general expansion of the arm. The expansion of the arm results in a general bending of the arm 3620. The bending of the arm 3620 further results in leaf portion 3632 pulling on the paddle portion 3609. The paddle 3609 is pivoted around a fulcrum point by means of attachment to leaf portions 3638, 3639 which are generally thin to allow for minor flexing. The pivoting of the arm 3609 causes ejection of ink from the nozzle hole 3640. The heater is deactivated resulting in a return of the actuator 3620 to its quiescent position and its corresponding return of the paddle 3609 also to is quiescent position. Subsequently, to eject ink out of the other nozzle hole 3641, the heater 3624 can be activated with the paddle operating in a substantially symmetric manner.

It can therefore be seen that the actuator can be utilized to move the paddle 3609 on demand so as to eject drops out of the ink ejection hole e.g. 3640 with the ink refilling via an ink supply channel 3644 (FIG. 721) located under the paddle 3609.

The nozzle arrangement of a preferred embodiment can be formed on a silicon wafer utilizing standard semi-conductor fabrication processing steps and micro-electromechanical systems (MEMS) construction techniques.

Preferably, a large wafer of printheads is constructed at any one time with each printhead providing a predetermined pagewidth capabilities and a single printhead can in turn comprise multiple colors so as to provide for full color output as would be readily apparent to those skilled in the art.

Figure 722:
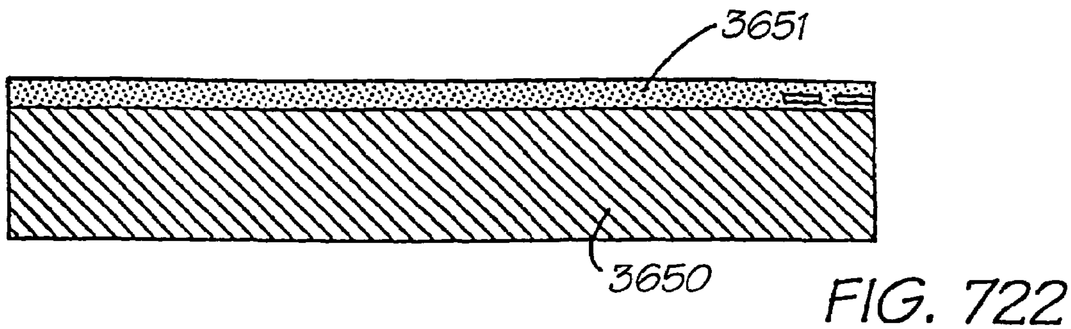
Figure 723:
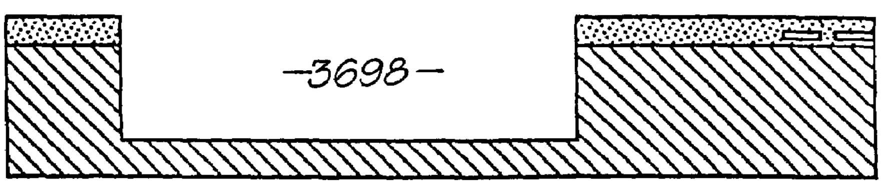
Figure 724:
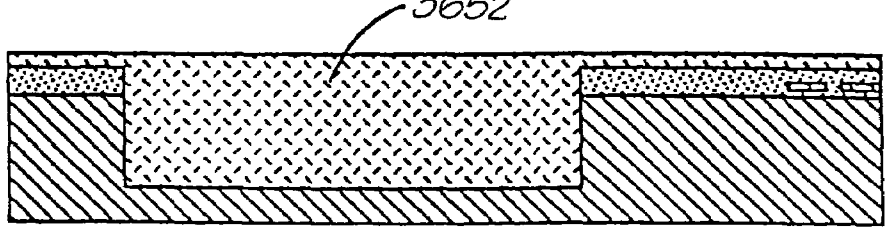
Figure 725:
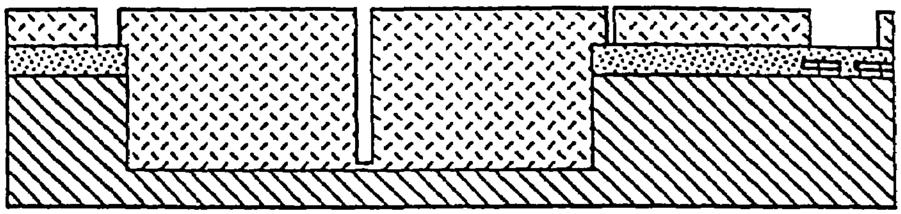

Turning now to FIG. 722-FIG. 741 there will now be explained one form of fabrication of a preferred embodiment A preferred embodiment can start as illustrated in FIG. 722 with a CMOS processed silicon wafer 3650 which can include a standard CMOS layer 3651 including of the relevant electrical circuitry etc. The processing steps can then be as follows:

As illustrated in FIG. 723, a deep etch of the nozzle chamber 3698 is performed to a depth of 25 micron;

As illustrated in FIG. 724, a 27 micron layer of sacrificial material 3652 such as aluminum is deposited;

As illustrated in FIG. 725, the sacrificial material is etched to a depth of 26 micron using a glass stop so as to form cavities using a paddle and nozzle mask.

Figure 726:
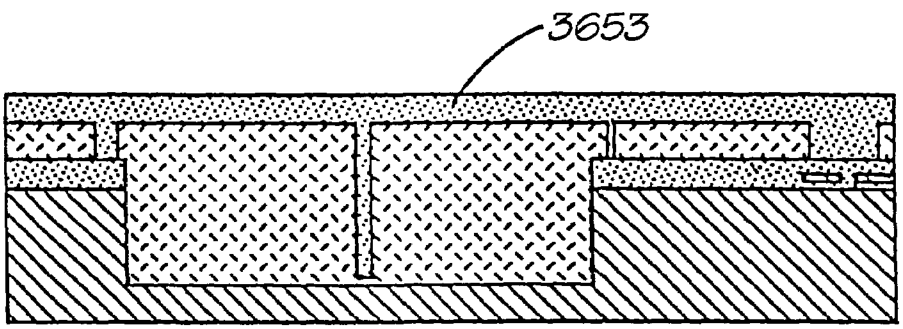

As illustrated in FIG. 726, a 2 micron layer of low stress glass 3653 is deposited.

Figure 727:
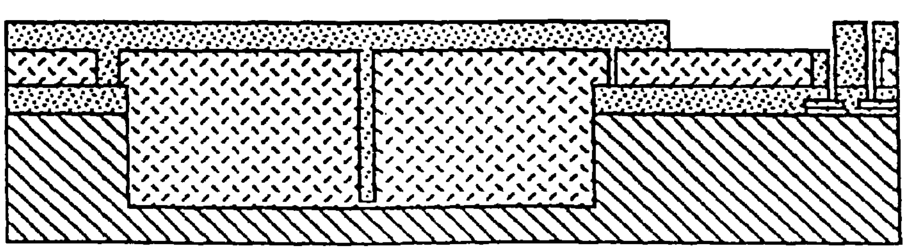

As illustrated in FIG. 727, the glass is etched to the aluminum layer utilizing a first heater via mask.

Figure 728:
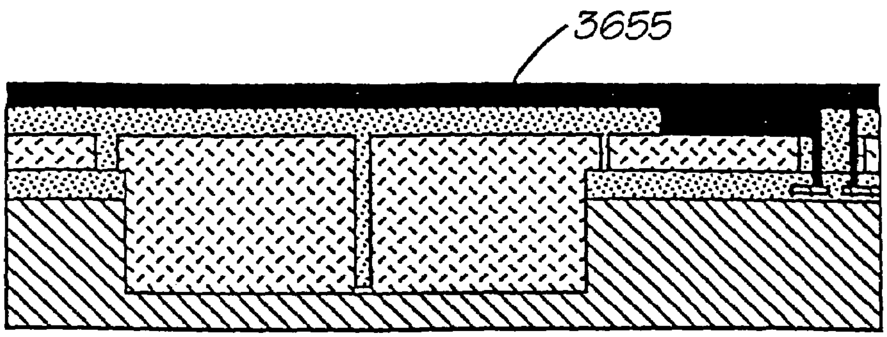
Figure 729:
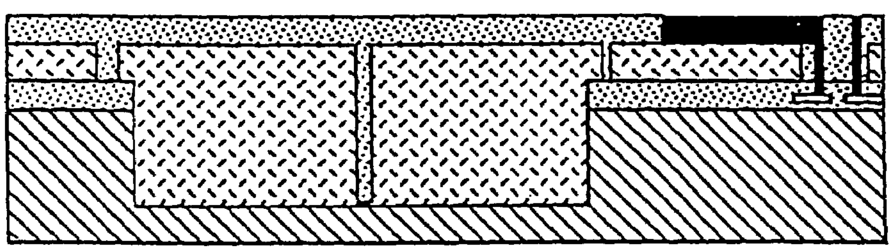

As illustrated in FIG. 728, a 2 micron layer of 60% copper and 40% nickel is deposited 3655 and planarized (FIG. 729) using chemical mechanical planarization (CMP).

Figure 730:
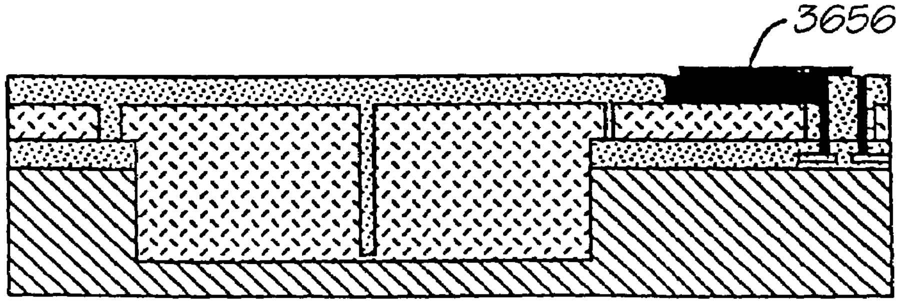

As illustrated in FIG. 730, a 0.1 micron layer of silicon nitride is deposited 3656 and etched using a heater insulation mask.

Figure 731:
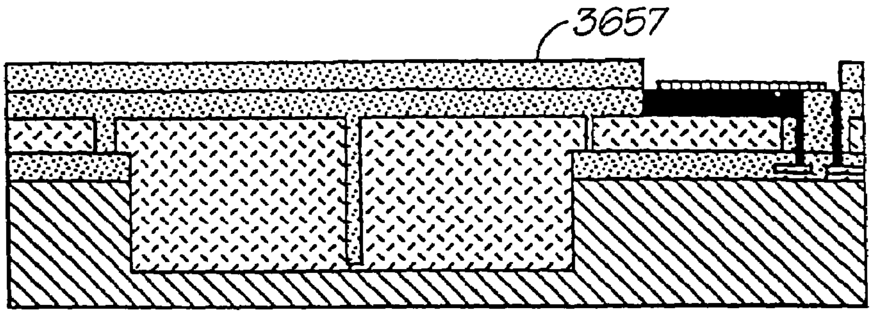

As illustrated in FIG. 731, a 2 micron layer of low stress glass 3657 is deposited and etched using a second heater mask.

Figure 732:
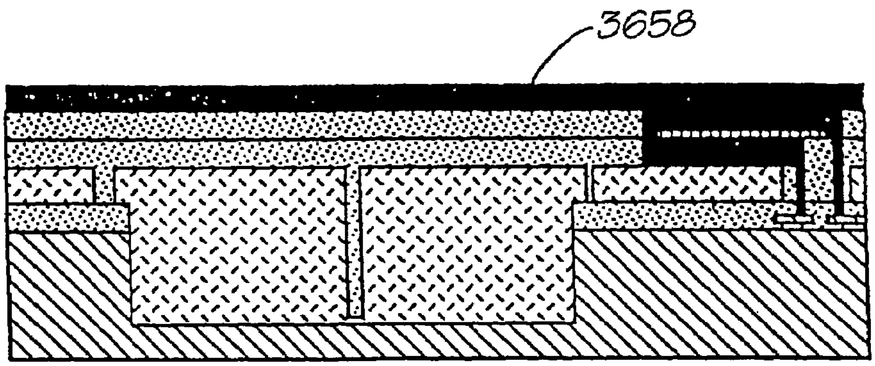
Figure 733:
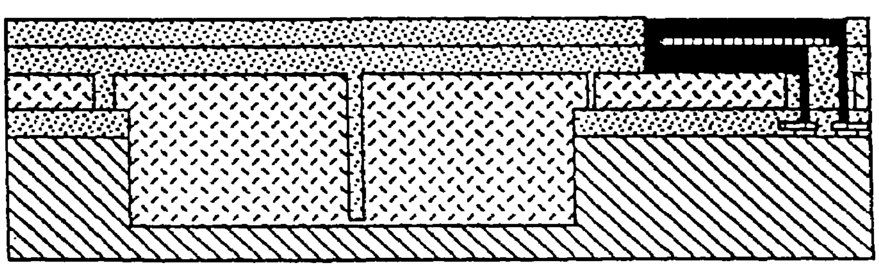

As illustrated in FIG. 732, a 2 micron layer of 60% copper and 40% nickel 3658 is deposited and planarized (FIG. 733) using chemical mechanical planarization.

Figure 734:
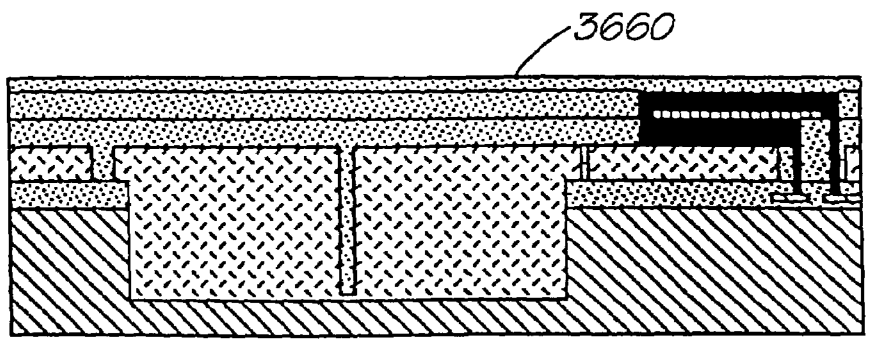
Figure 735:
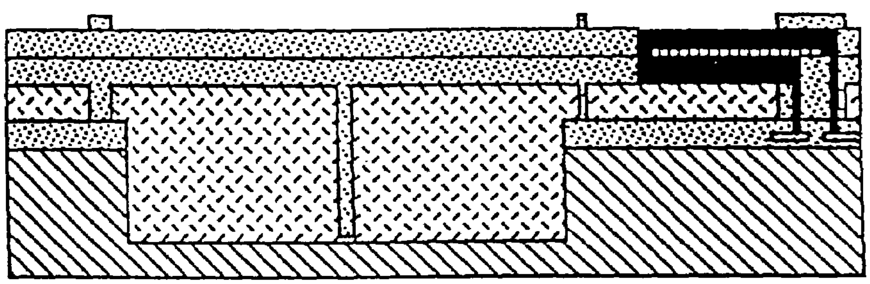

As illustrated in FIG. 734, a 1 micron layer of low stress glass 3660 is deposited and etched (FIG. 735) using a nozzle wall mask.

Figure 736:
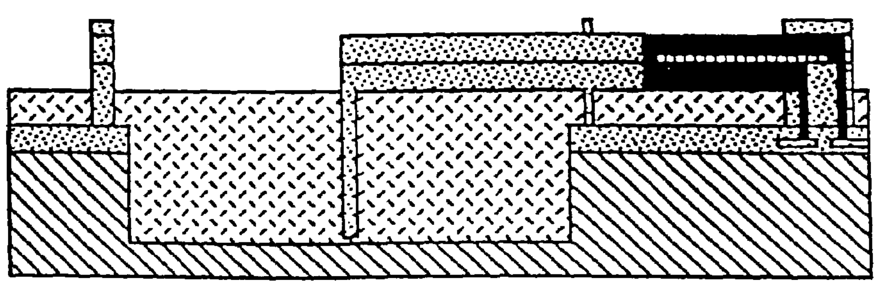

As illustrated in FIG. 736, the glass is etched down to the sacrificial layer using an actuator paddle wall mask.

Figure 737:
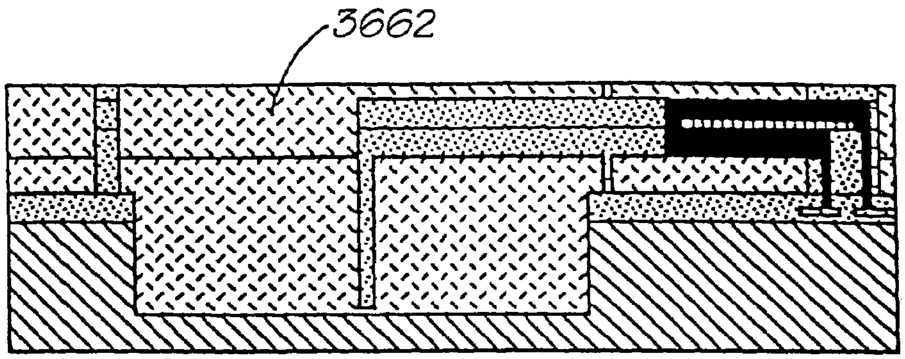

As illustrated in FIG. 737, a 5 micron layer of sacrificial material 3662 is deposited and planarized using CMP.

Figure 738:
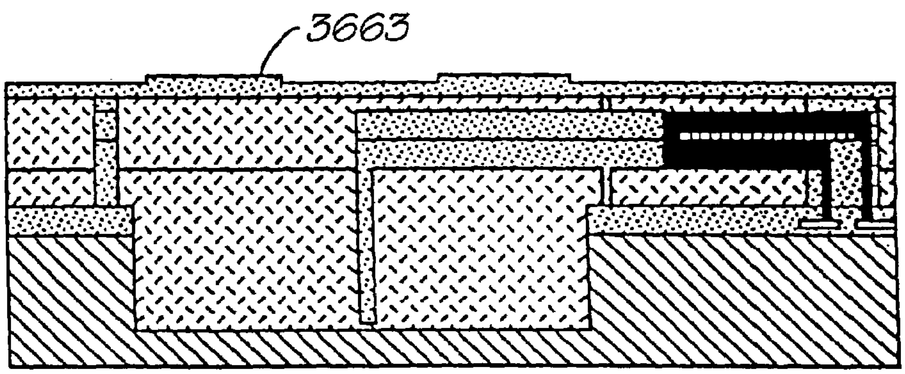

As illustrated in FIG. 738, a 3 micron layer of low stress glass 3663 is deposited and etched using a nozzle rim mask.

Figure 739:
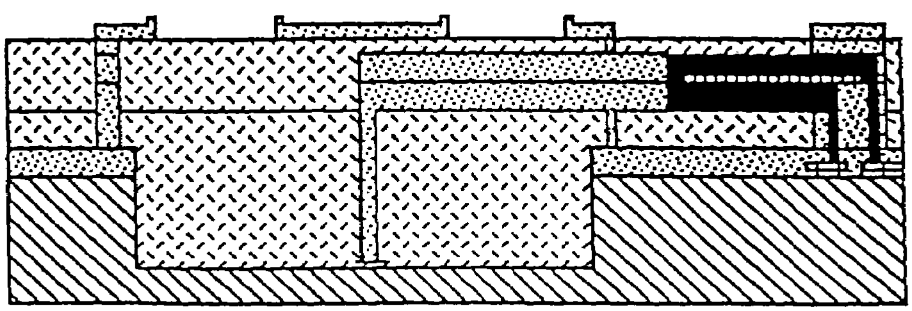

As illustrated in FIG. 739, the glass is etched down to the sacrificial layer using nozzle mask.

Figure 740:
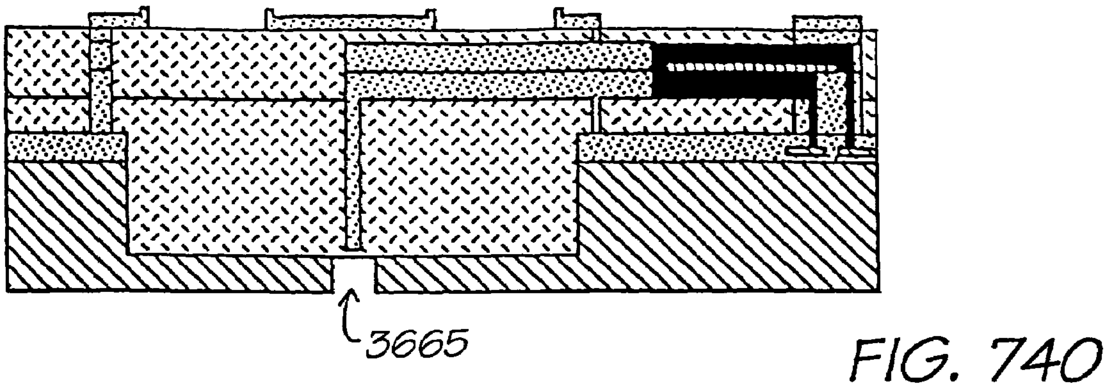

As illustrated in FIG. 740, the wafer can be etched from the back using a deep silicon trench etcher such as the Silicon Technology Systems deep trench etcher.

Figure 741:
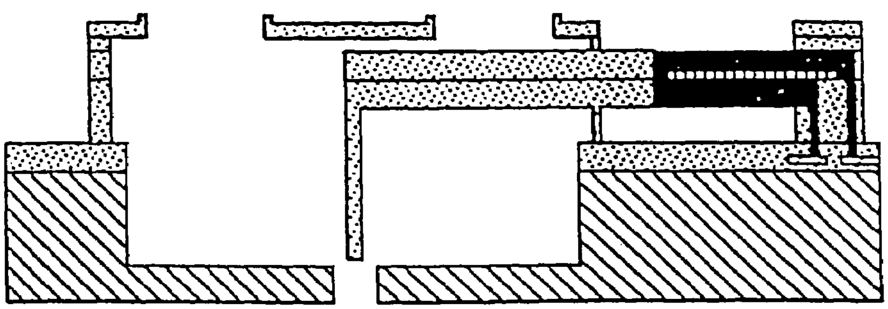

Finally, as illustrated in FIG. 741, the sacrificial layers are etched away releasing the ink jet structure.

Subsequently, the print head can be washed, mounted on an ink chamber, relevant electrical interconnections TAB bonded and the print head tested.

Turning now to FIG. 742, there is illustrated a portion of a full color printhead which is divided into three series of nozzles 3671, 3672 and 3673. Each series can supply a separate color via means of a corresponding ink supply channel. Each series is further subdivided into two sub-rows e.g. 3676, 3677 with the relevant nozzles of each sub-row being fired simultaneously with one sub-row being fired a predetermined time after a second sub-row such that a line of ink drops is formed on a page.

As illustrated in FIG. 742 the actuators a formed in a curved relationship with respect to the main nozzle access so as to provide for a more compact packing of the nozzles. Further, the block portion (3621 of FIG. 720) is formed in the wall of an adjacent series with the block portion of the row 3673 being formed in a separate guide rail 3680 provided as an abutment surface for the TAB strip when it is abutted against the guide rail 3680 so as to provide for an accurate registration of the tab strip with respect to the bond pads 3681, 3682 which are provided along the length of the printhead so as to provide for low impedance driving of the actuators.

The principles of a preferred embodiment can obviously be readily extended to other structures. For example, a fulcrum arrangement could be constructed which includes two arms which are pivoted around a thinned wall by means of their attachment to a cross bar. Each arm could be attached to the central cross bar by means of similarly leafed portions to that shown in FIG. 720 and FIG. 721. The distance between a first arm and the thinned wall can be L units whereas the distance between the second arm and wall can be NL units. Hence, when a translational movement is applied to the second arm for a distance of N×X units the first arm undergoes a corresponding movement of X units. The leafed portions allow for flexible movement of the arms whilst providing for full pulling strength when required.

It would be evident to those skilled in the art that the present invention can further be utilized in either mechanical arrangements requiring the application forces to induce movement in a structure.

Figure 744:
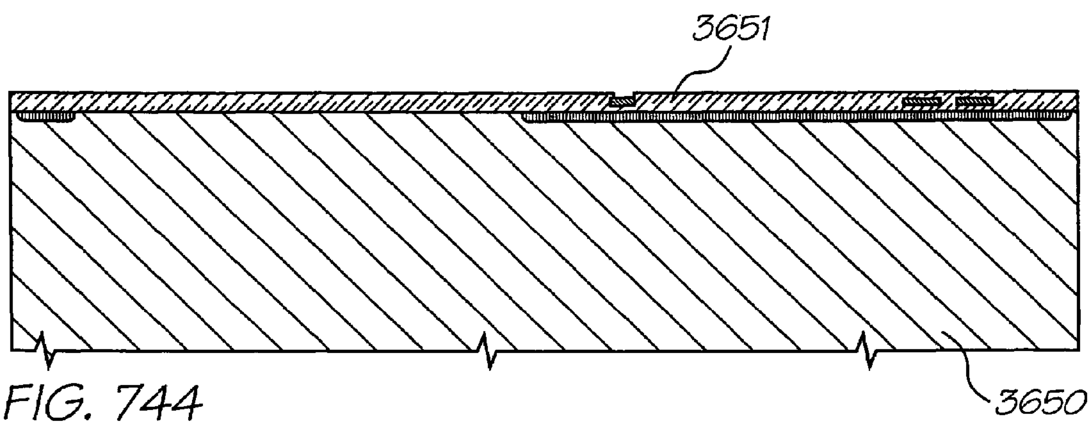

One form of detailed manufacturing process which can be used to fabricate monolithic ink jet print heads operating in accordance with the principles taught by the present embodiment can proceed utilizing the following steps:

1. Using a double sided polished wafer 3650, complete drive transistors, data distribution, and timing circuits using a 0.5 micron, one poly, 2 metal CMOS process 3651. Relevant features of the wafer at this step are shown in FIG. 744. For clarity, these diagrams may not be to scale, and may not represent a cross section though any single plane of the nozzle. FIG. 743 is a key to representations of various materials in these manufacturing diagrams, and those of other cross referenced ink jet configurations.

Figure 745:
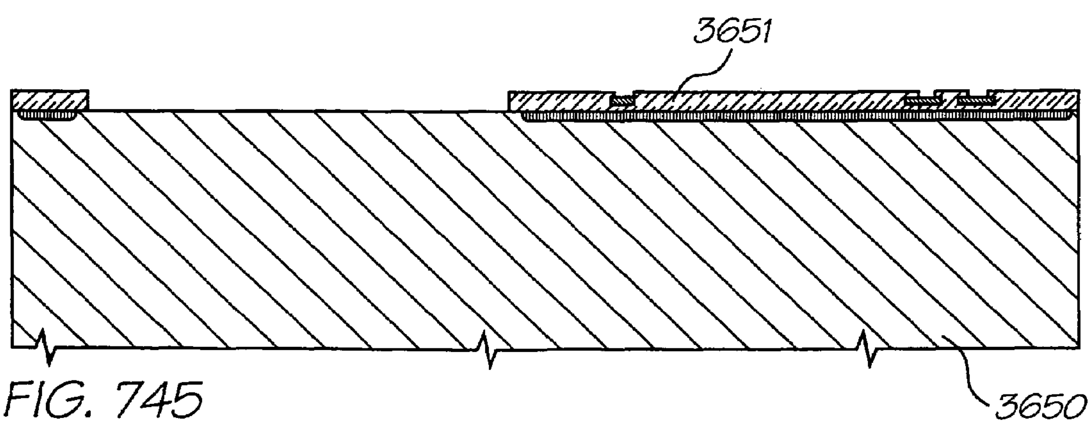

2. Etch oxide down to silicon or aluminum using Mask 1. This mask defines the ink inlet, the heater contact vias, and the edges of the print head chips. This step is shown in FIG. 745.

Figure 746:
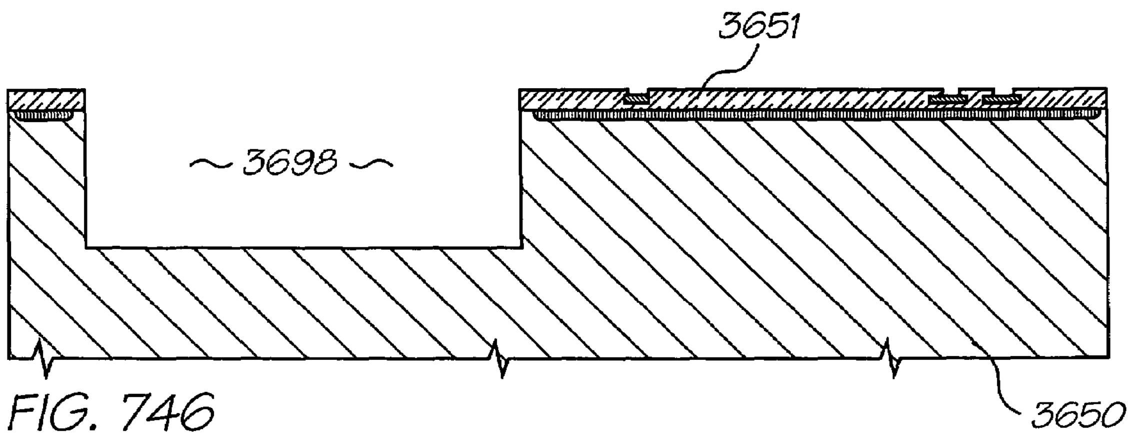

3. Etch exposed silicon 3650 to a depth of 20 microns. This step is shown in FIG. 746.

4. Deposit a 1 micron conformal layer of a first sacrificial material 3691.

Figure 747:
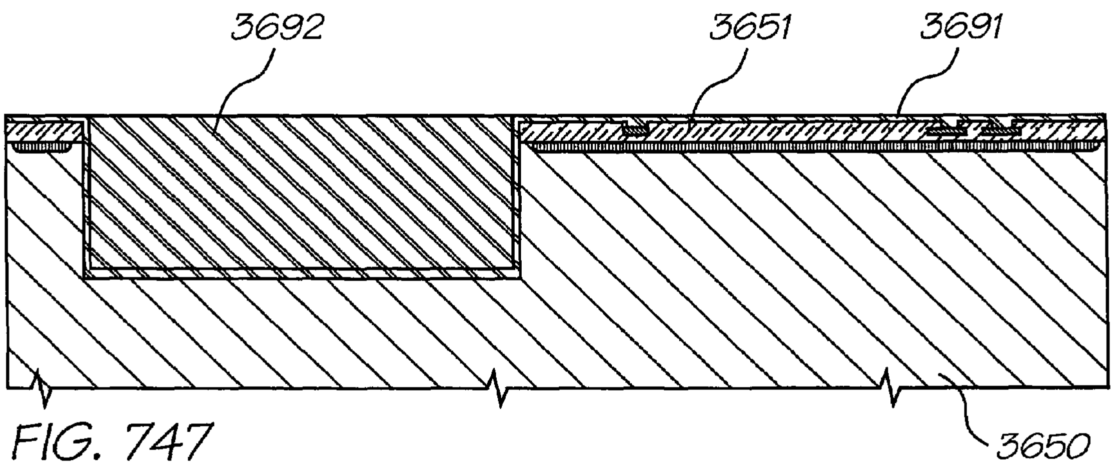

5. Deposit 20 microns of a second sacrificial material 3692, and planarize down to the first sacrificial layer using CMP. This step is shown in FIG. 747.

Figure 748:
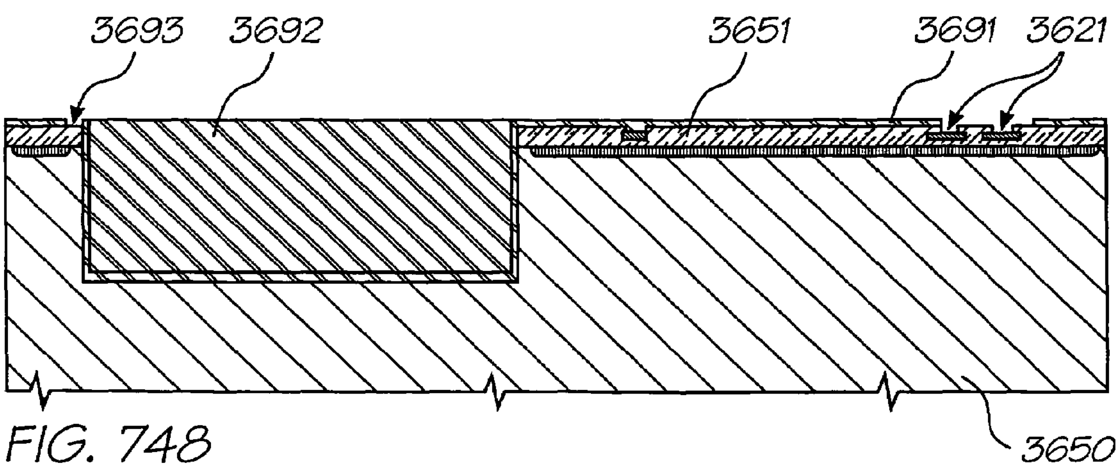

6. Etch the first sacrificial layer using Mask 2, defining the nozzle chamber wall 3693, the paddle 3609, and the actuator anchor point 3621. This step is shown in FIG. 748.

Figure 749:
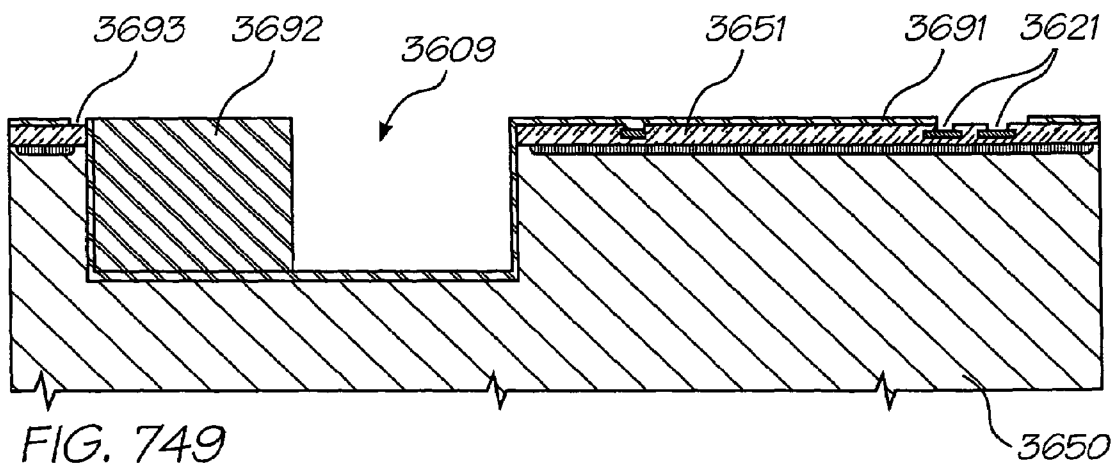

7. Etch the second sacrificial layer down to the first sacrificial layer using Mask 3. This mask defines the paddle 3609. This step is shown in FIG. 749.

8. Deposit a 1 micron conformal layer of PECVD glass 3653.

9. Etch the glass using Mask 4, which defines the lower layer of the actuator loop.

Figure 750:
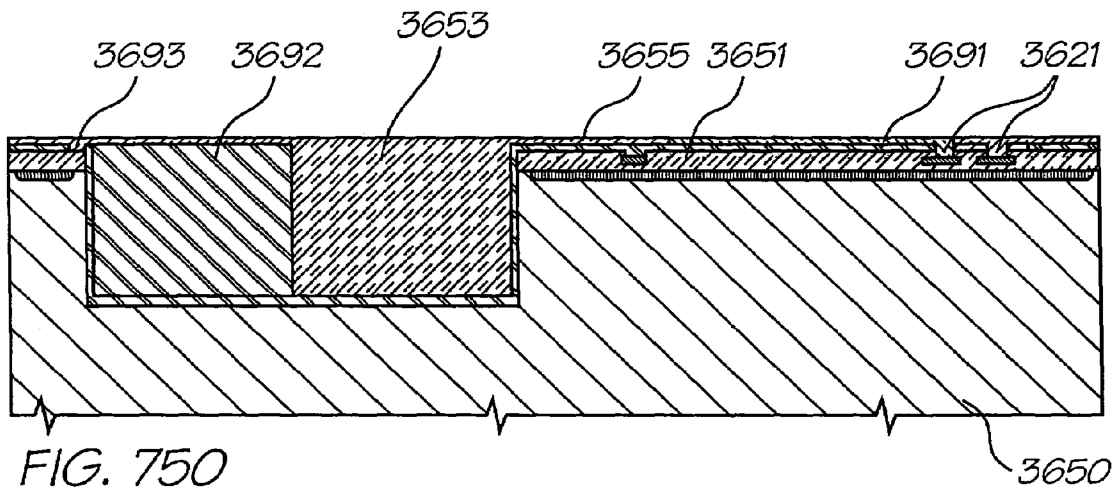

10. Deposit 1 micron of heater material 3655, for example titanium nitride (TiN) or titanium diboride ($TiB_2$). Planarize using CMP. This step is shown in FIG. 750.

11. Deposit 0.1 micron of silicon nitride 3656.

12. Deposit 1 micron of PECVD glass 3657.

13. Etch the glass using Mask 5, which defines the upper layer of the actuator loop.

14. Etch the silicon nitride using Mask 6, which defines the vias connecting the upper layer of the actuator loop to the lower layer of the actuator loop.

Figure 751:
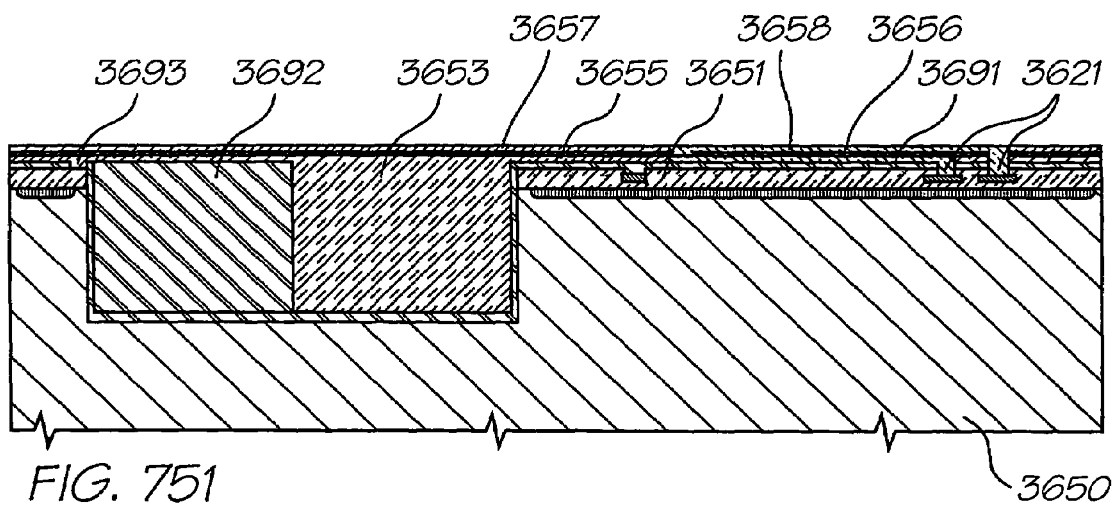

15. Deposit 1 micron of the same heater material 3658 previously deposited. Planarize using CMP. This step is shown in FIG. 751.

16. Deposit 1 micron of PECVD glass 3660.

Figure 752:
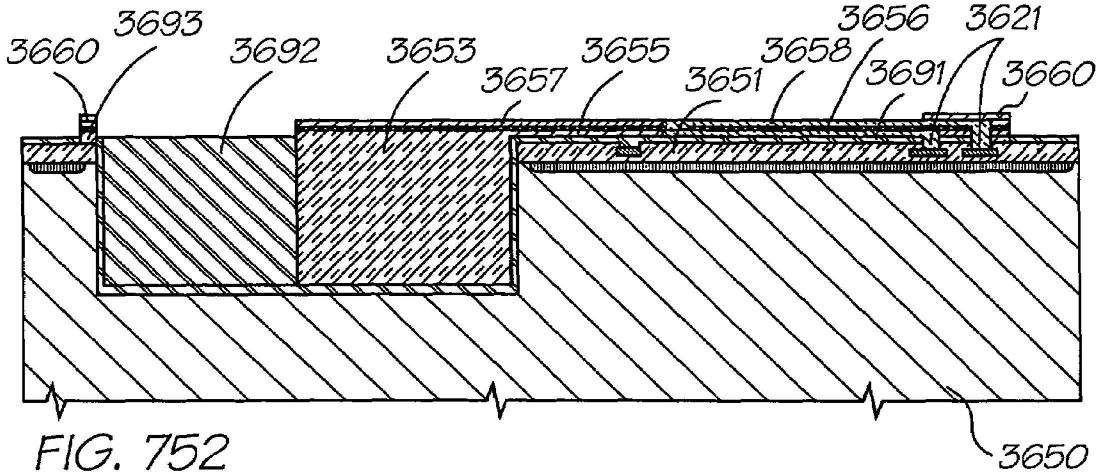

17. Etch the glass down to the sacrificial layer using Mask 6. This mask defines the actuator and the nozzle chamber wall, with the exception of the nozzle chamber actuator slot. This step is shown in FIG. 752.

18. Wafer probe. All electrical connections are complete at this point, bond pads are accessible, and the chips are not yet separated.

19. Deposit 4 microns of sacrificial material 3662 and planarize down to glass using CMP.

Figure 753:
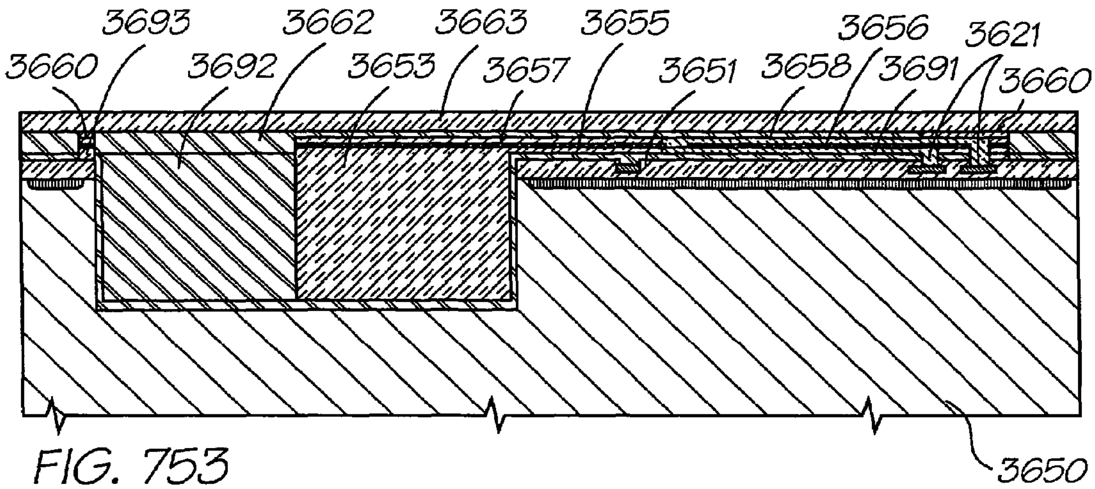

20. Deposit 3 microns of PECVD glass 3663. This step is shown in FIG. 753.

Figure 754:
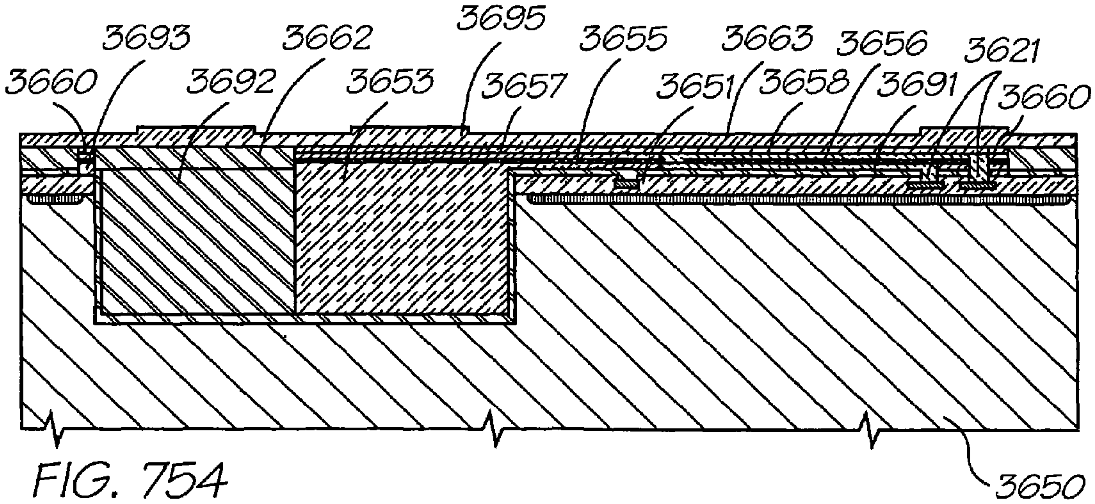

21. Etch to a depth of (approx.) 1 micron using Mask 7. This mask defines the nozzle rim 3695. This step is shown in FIG. 754.

Figure 755:
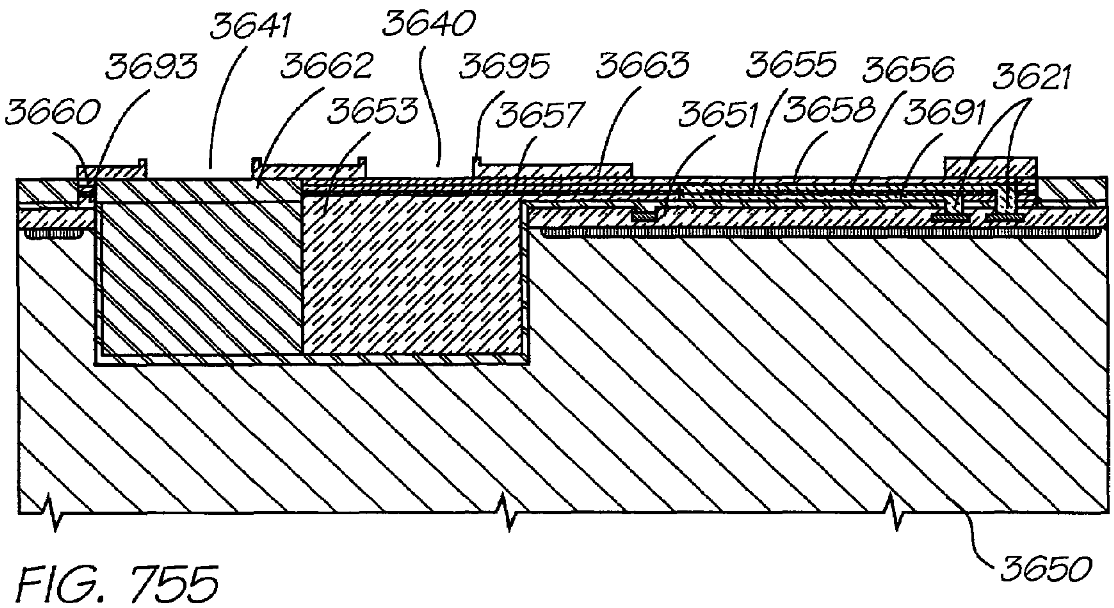

22. Etch down to the sacrificial layer using Mask 8. This mask defines the roof of the nozzle chamber, and the nozzle 3640, 3641 itself. This step is shown in FIG. 755.

Figure 756:
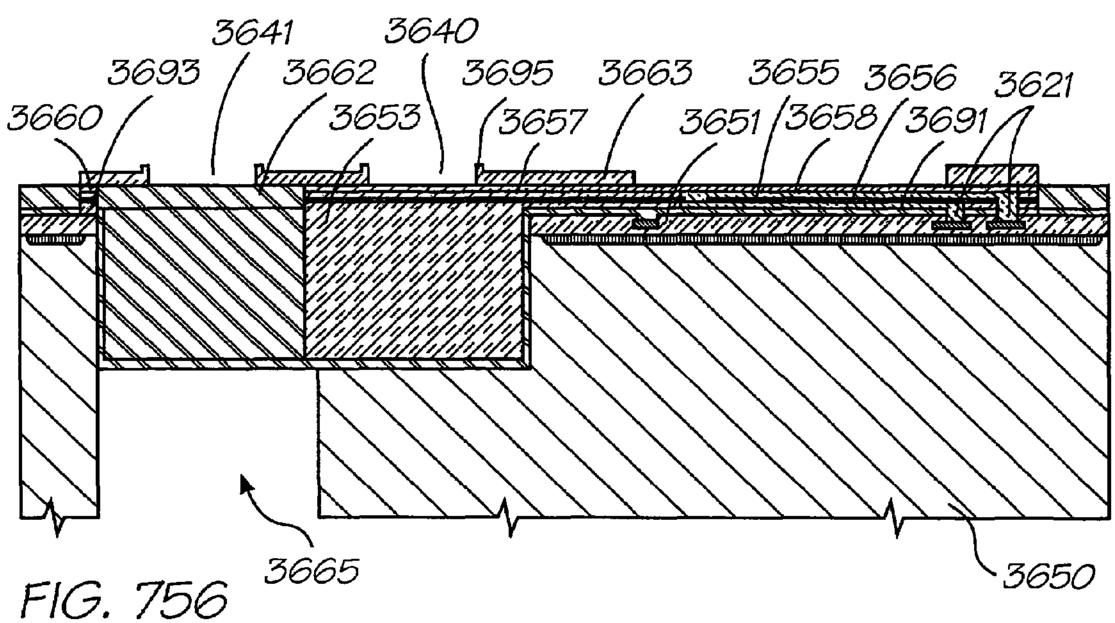

23. Back-etch completely through the silicon wafer (with, for example, an ASE Advanced Silicon Etcher from Surface Technology Systems) using Mask 9. This mask defines the ink inlets 3665 which are etched through the wafer. The wafer is also diced by this etch. This step is shown in FIG. 756.

Figure 757:
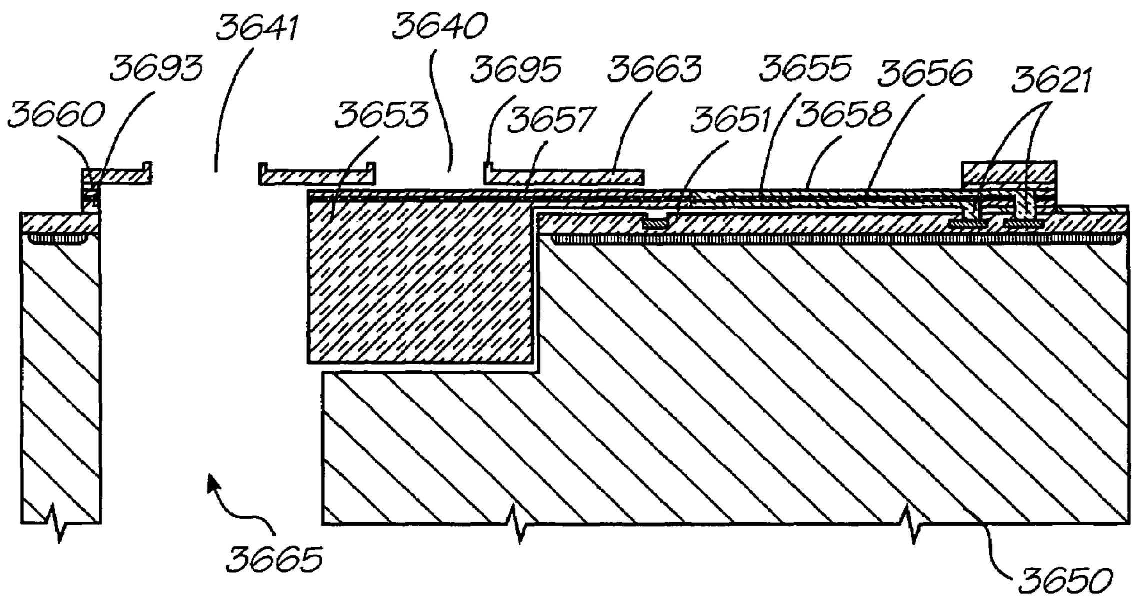

24. Etch both types of sacrificial material. The nozzle chambers are cleared, the actuators freed, and the chips are separated by this etch. This step is shown in FIG. 757.

25. Mount the print heads in their packaging, which may be a molded plastic former incorporating ink channels which supply the appropriate color ink to the ink inlets at the back of the wafer.

26. Connect the print heads to their interconnect systems. For a low profile connection with minimum disruption of airflow, TAB may be used. Wire bonding may also be used if the printer is to be operated with sufficient clearance to the paper.

27. Hydrophobize the front surface of the print heads.

Figure 758:
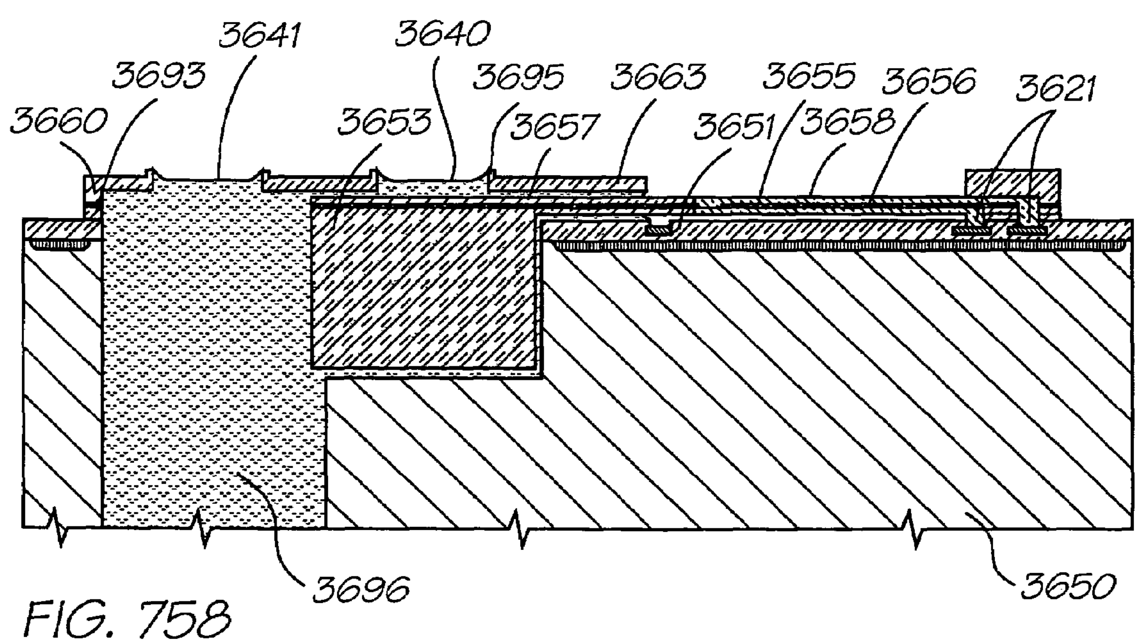

28. Fill the completed print heads with ink 3696 and test them. A filled nozzle is shown in FIG. 758.

IJ37

In a preferred embodiment, an inkjet printing system is provided for the projection of ink from a series of nozzles. In a preferred embodiment a single paddle is located within a nozzle chamber and attached to an actuator device. When the nozzle is actuated in a first direction, ink is ejected through a first nozzle aperture and when the actuator is activated in a second direction causing the paddle to move in a second direction, ink is ejected out of a second nozzle. Turning initially to FIGS. 759-763, there will now be illustrated in a schematic form, the operational principles of a preferred embodiment.

Figure 759:
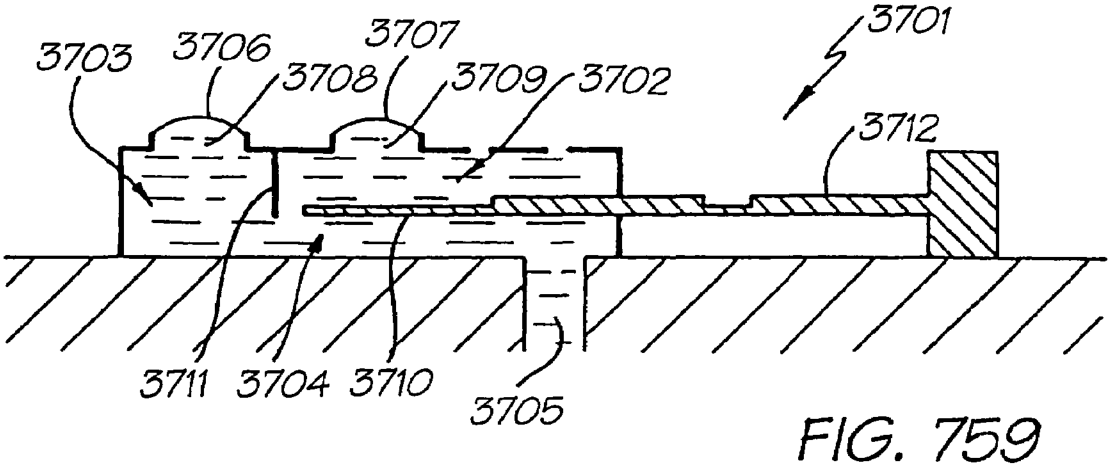

Turning initially to FIG. 759, there is shown a nozzle arrangement 3701 of a preferred embodiment when in its quiescent state. In the quiescent state, ink fills a first portion 3702 of the nozzle chamber and a second portion 3703 of the nozzle chamber. A baffle is situated between the first portion 3702 and the second portion 3703 of the nozzle chamber. The ink fills the nozzle chambers from an ink supply channel 3705 to the point that a meniscus 3706, 3707 is formed around corresponding nozzle holes 3708, 3709. A paddle 3710 is provided within the nozzle chamber 3702 with the paddle 3710 being interconnected to an actuator device 3712 which can comprise a thermal actuator which can be actuated so as to cause the actuator 3712 to bend, as will be become more apparent hereinafter.

Figure 760:
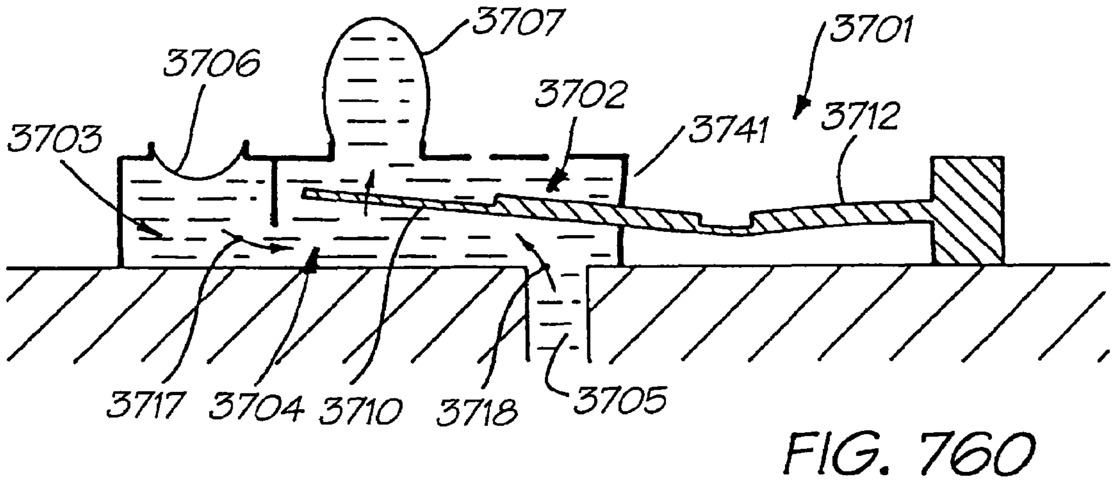
Figure 761:
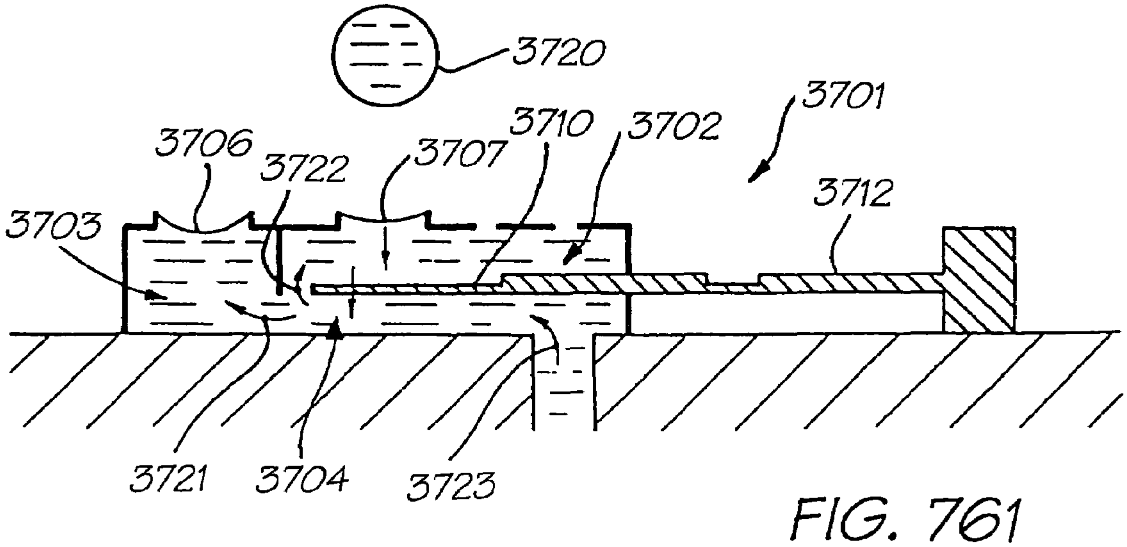

In order to eject ink from the first nozzle hole 3709, the actuator 3712, which can comprise a thermal actuator, is activated so as to bend as illustrated in FIG. 760. The bending of actuator 3712 causes the paddle 3710 to rapidly move upwards which causes a substantial increase in the pressure of the fluid, such as ink, within nozzle chamber 3702 and adjacent to the meniscus 3707. This results in a general rapid expansion of the meniscus 3707 as ink flows through the nozzle hole 3709 with result of the increasing pressure. The rapid movement of paddle 3710 causes a reduction in pressure along the back surface of the paddle 3710. This results in general flows as indicated 3717, 3718 from the second nozzle chamber and the ink supply channel. Next, while the meniscus 3707 is extended, the actuator 3712 is deactivated resulting in the return of the paddle 3710 to its quiescent position as indicated in FIG. 761. The return of the paddle 3710 operates against the forward momentum of the ink adjacent the meniscus 3707 which subsequently results in the breaking off of the meniscus 3707 so as to form the drop 3720 as illustrated in FIG. 761. The drop 3720 continues onto the print media. Further, surface tension effects on the ink meniscus 3707 and ink meniscus 3706 result in ink flows 3721-3723 which replenish the nozzle chambers. Eventually, the paddle 3710 returns to its quiescent position and the situation is again as illustrated in FIG. 759.

Figure 762:
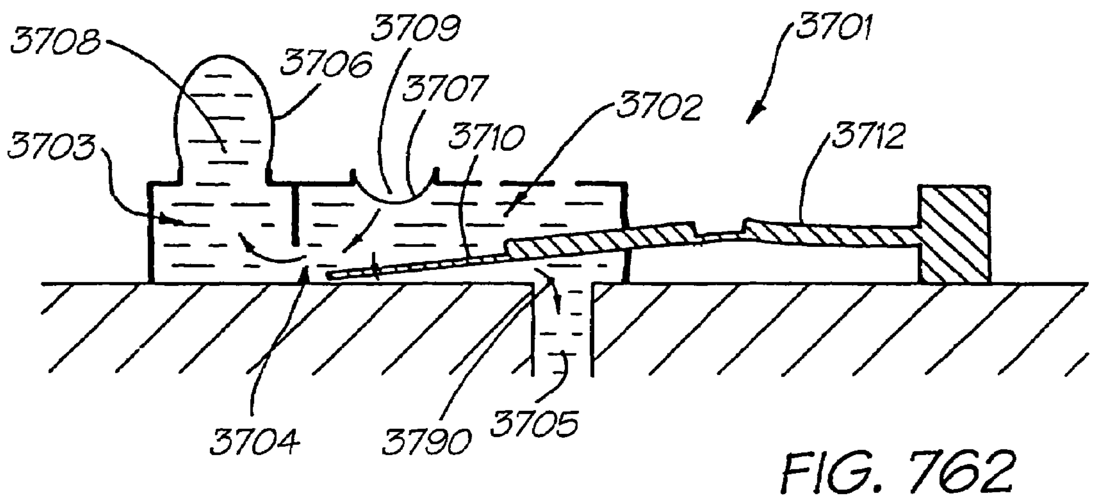
Figure 763:
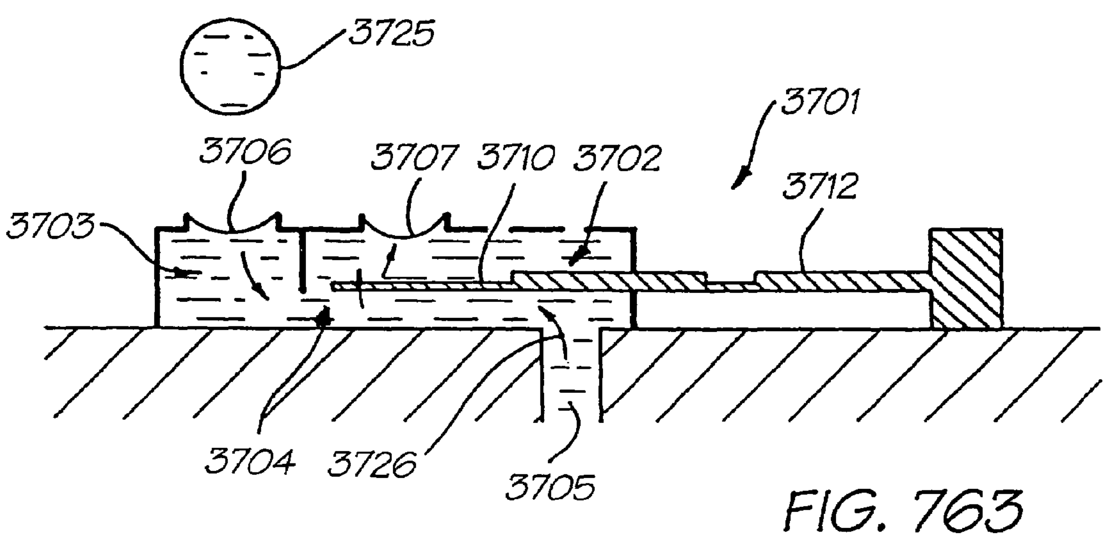

Subsequently, when it is desired to eject a drop via ink ejection hole 3708, the actuator 3712 is activated as illustrated in FIG. 762. The actuation 3712 causes the paddle 3710 to move rapidly down causing a substantial increase in pressure in the nozzle chamber 3703 which results in a rapid growth of the meniscus 3706 around the nozzle hole 3708. This rapid growth is accompanied by a general collapse in meniscus 3707 as the ink is sucked back into the chamber 3702. Further, ink flow also occurs into ink supply channel 3705 however, hopefully this ink flow is minimized. Subsequently, as indicated in FIG. 763, the actuator 3712 is deactivated resulting in the return of the paddle 3710 to is quiescent position. The return of the paddle 3710 results in a general lessening of pressure within the nozzle chamber 3703 as ink is sucked back into the area under the paddle 3710. The forward momentum of the ink surrounding the meniscus 3706 and the backward momentum of the other ink within nozzle chamber 3703 is resolved through the breaking off of an ink drop 3725 which proceeds towards the print media. Subsequently, the surface tension on the meniscus 3706 and 3707 results in a general ink inflow from nozzle chamber 3703 resulting, in the arrangement returning to the quiescent state as indicated in FIG. 759.

It can therefore be seen that the schematic illustration of FIG. 759 to FIG. 763 describes a system where a single planar paddle is actuated so as to eject ink from multiple nozzles.

Turning now to FIG. 764, there is illustrated a sectional view through one form of implementation of a single nozzle arrangement 3701. The nozzle arrangement 3701 can be constructed on a silicon wafer base 3728 through the construction of large arrays of nozzles at one time using standard micro electromechanical processing techniques.

An array of nozzles on a silicon wafer device and can be constructed using semiconductor processing techniques in addition to micro machining and micro fabrication process technology (MEMS) and a full familiarity with these technologies is hereinafter assumed.

One form of construction will now be described with reference to FIGS. 765 to 782. On top of the silicon wafer 3728 is first constructed a CMOS processing layer 3729 which can provide for the necessary interface circuitry for driving the thermal actuator and its interconnection with the outside world. The CMOS layer 3729 being suitably passivated so as to protect it from subsequent MEMS processing techniques. The walls e.g. 3730 can be formed from glass ($SiO_2$). Preferably, the paddle 3710 includes a thinned portion 3732 for more efficient operation. Additionally, a sacrificial etchant hole 3733 is provided for allowing more effective etching of sacrificial etchants within the nozzle chamber 3702. The ink supply channel 3705 is generally provided for interconnecting an ink supply conduit 3734 which can be etched through the wafer 3728 by means of a deep anisotropic trench etcher such as that available from Silicon Technology Systems of the United Kingdom.

The arrangement 3701 further includes a thermal actuator device e.g. 3712 which includes two arms comprising an upper arm 3736 and a lower arm 3737 extending from a port 3754 and formed around a glass core 3738. Both upper and lower arm heaters 3736, 3737 can comprise a 0.4 μm film of 60% copper and 40% nickel hereinafter known as (Cupronickel) alloy. Copper and nickel is used because it has a high bend efficiency and is also highly compatible with standard VLSI and MEMS processing techniques. The bend efficiency can be calculated as the square of the coefficient of the thermal expansion times the Young's modulus, divided by the density and divided by the heat capacity. This provides a measure of the amount of "bend energy" produced by a material per unit of thermal (and therefore electrical) energy supplied.

The core can be fabricated from glass which also has many suitable properties in acting as part of the thermal actuator. The actuator 3712 includes a thinned portion 3740 for providing an interconnect between the actuator and the paddle 3710. The thinned portion 3740 provides for non-destructive flexing of the actuator 3712. Hence, when it is desired to actuate the actuator 3712, say to cause it to bend downwards, a current is passed down through the top cupronickel layer causing it to be heated and expand. This in turn causes a general bending due to the thermocouple relationship between the layers 3736 and 3738. The bending down of the actuator 3736 also causes thinned portion 3740 to move downwards in addition to the portion 3741. Hence, the paddle 3710 is pivoted around the wall 3741 which can, if necessary, include slots for providing for efficient bending. Similarly, the heater coil 3737 can be operated so as to cause the actuator 3712 to bend up with the consequential movement upon the paddle 3710.

A pit 3739 is provided adjacent to the wall of the nozzle chamber to ensure that any ink outside of the nozzle chamber has minimal opportunity to "wick" along the surface of the printhead as, the wall 3741 can be provided with a series of slots to assist in the flexing of the fulcrum.

Figure 765:
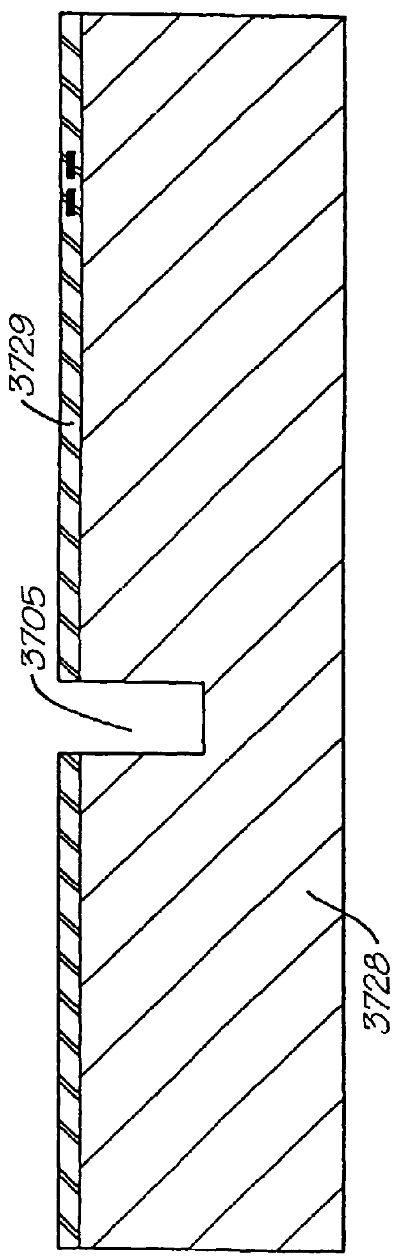

Turning now to FIGS. 765-782, there will now be described one form of processing construction of a preferred embodiment of FIG. 764. This can involve the following steps:

1. Initially, as illustrated in FIG. 765, starting with a fully processed CMOS wafer 3728 the CMOS layer 3729 is deep silicon etched so as to provide for the nozzle ink inlet 3705.

Figure 766:
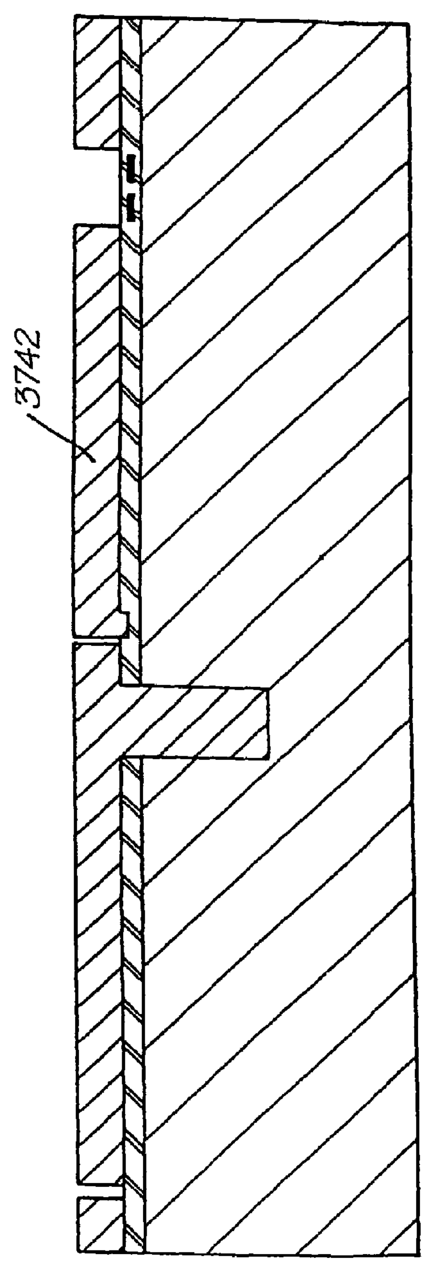

2. Next, as illustrated in FIG. 766, a 7 micron layer 3742 of a suitable sacrificial material (for example, aluminum), is deposited and etched with a nozzle wall mask in addition to the electrical interconnect mask.

Figure 767:
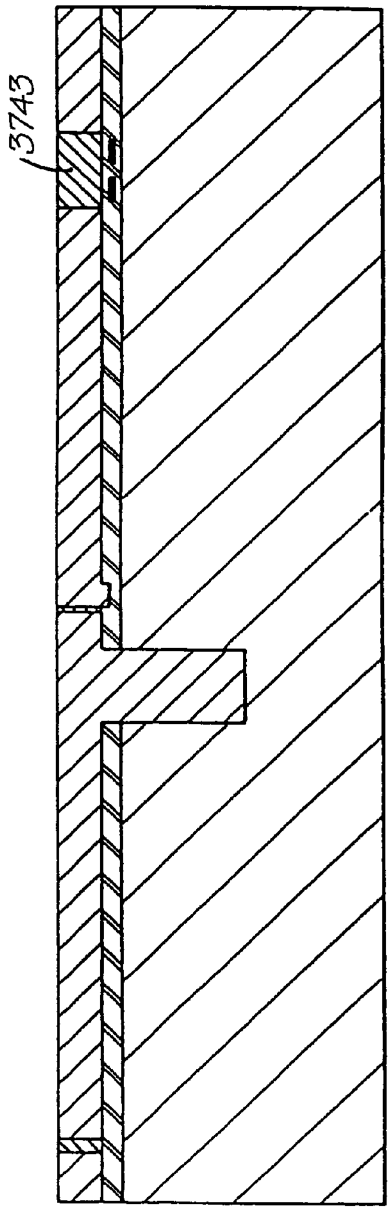

3. Next, as illustrated in FIG. 767, a 7 micron layer of low stress glass 3743 is deposited and planarized using chemical planarization.

Figure 768:
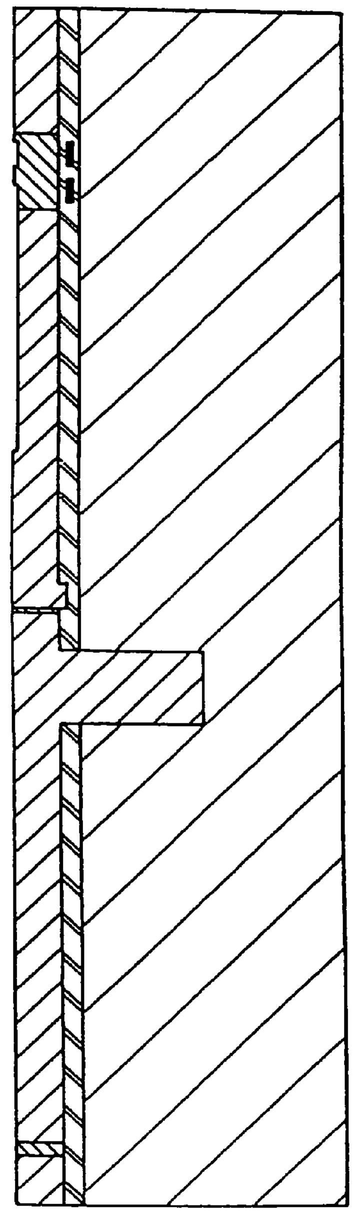

4. Next, as illustrated in FIG. 768, the sacrificial material is etched to a depth of 0.4 micron and the glass to at least a level of 0.4 micron utilizing a first heater mask.

Figure 769:
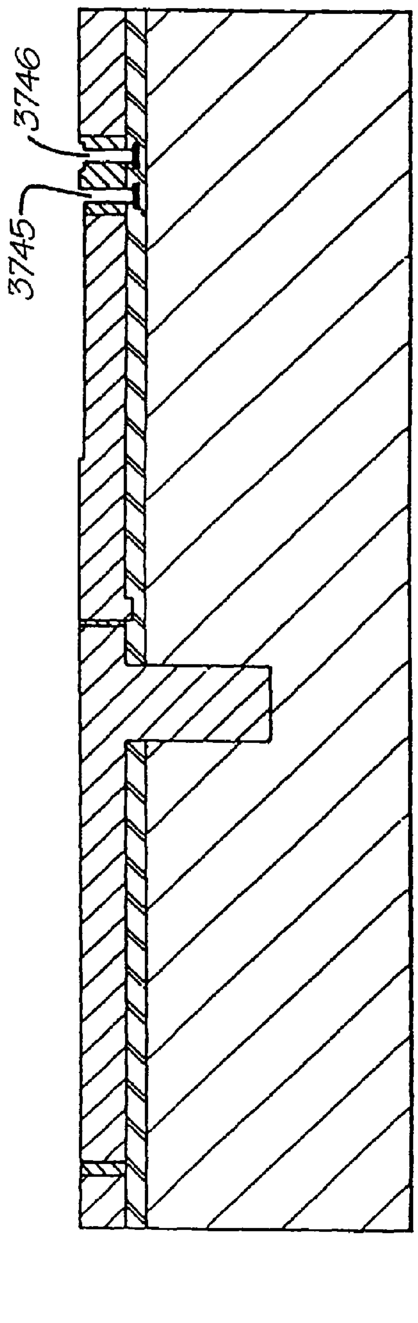

5. Next, as illustrated in FIG. 769, the glass layer is etched 3745, 3746 down to the aluminum portions of the CMOS layer 3704 providing for an electrical interconnect using a first heater via mask.

Figure 770:
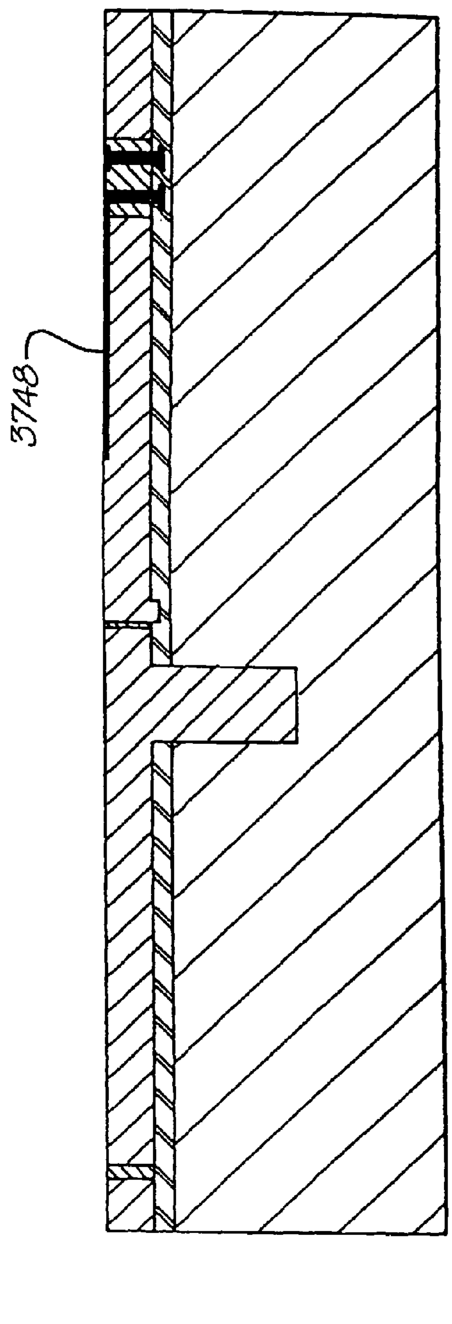

6. Next, as illustrated in FIG. 770, a 3 micron layer 3748 of 50% copper and 40% nickel alloy is deposited and planarized using chemical mechanical planarization.

Figure 771:
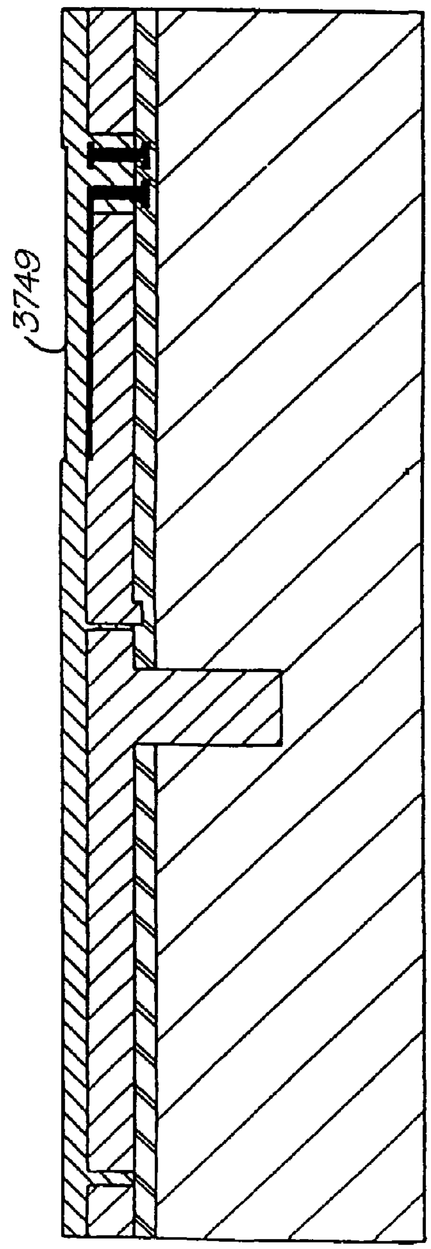

7. Next, as illustrated in FIG. 771, a 4 micron layer 3749 of low stress glass is deposited and etched to a depth of 0.5 micron utilizing a mask for the second heater.

Figure 772:
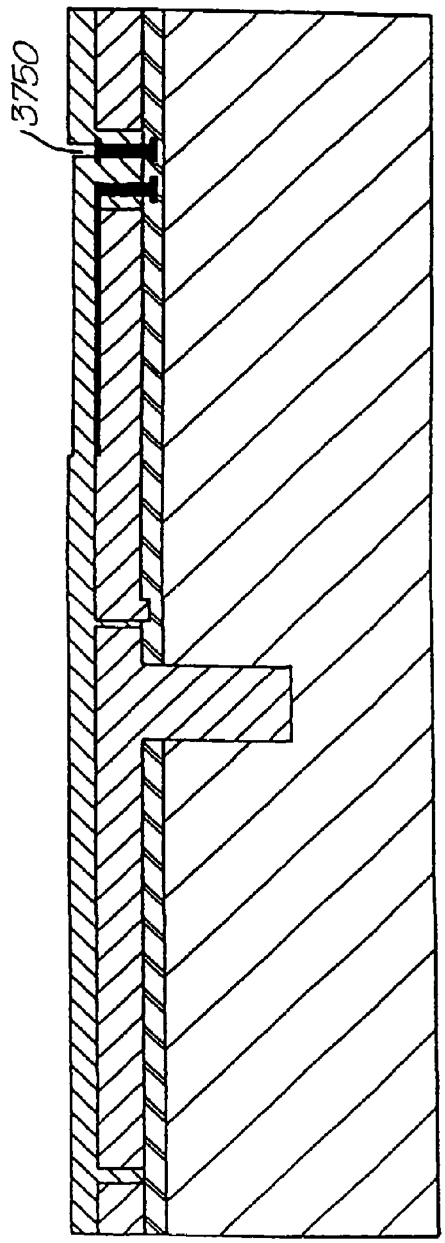

8. Next, as illustrated in FIG. 772, the deposited glass layer is etched 3750 down to the cupronickel using a second heater via mask.

Figure 773:
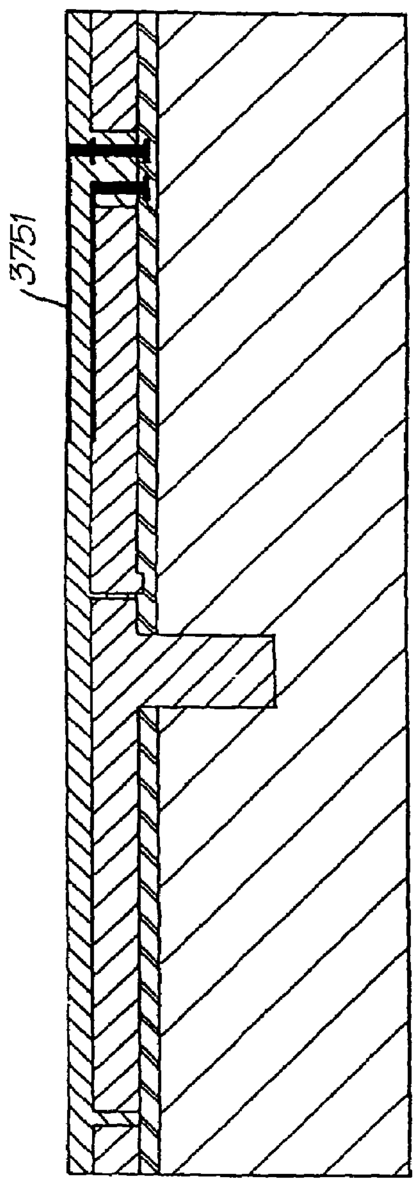

9. Next, as illustrated in FIG. 773, a 3 micron layer 3751 of cupronickel is deposited 3751 and planarized using chemical mechanical planarization.

Figure 774:
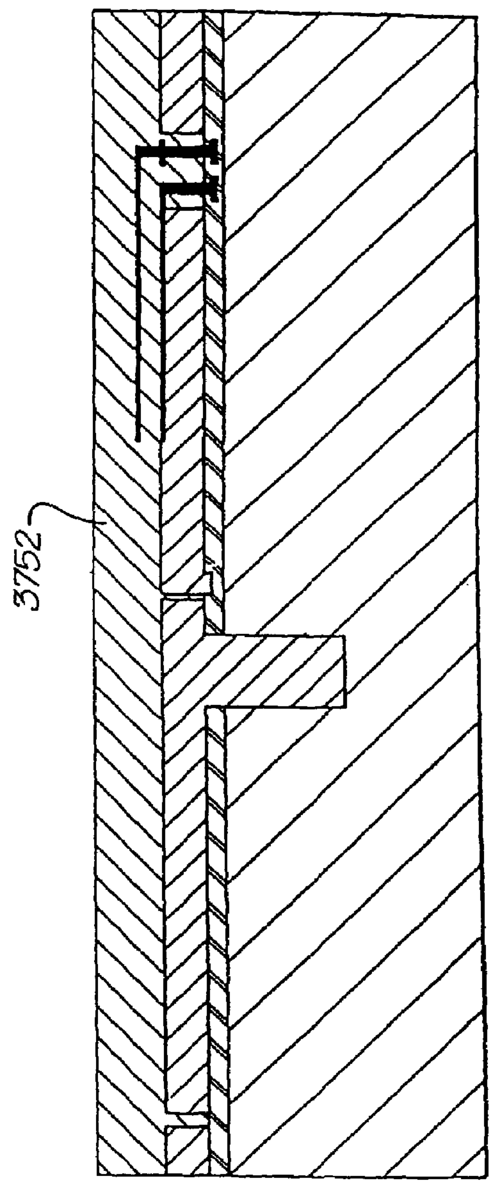

10. As illustrated in FIG. 774, next, a 7 micron layer 3752 of low stress glass is deposited.

Figure 775:
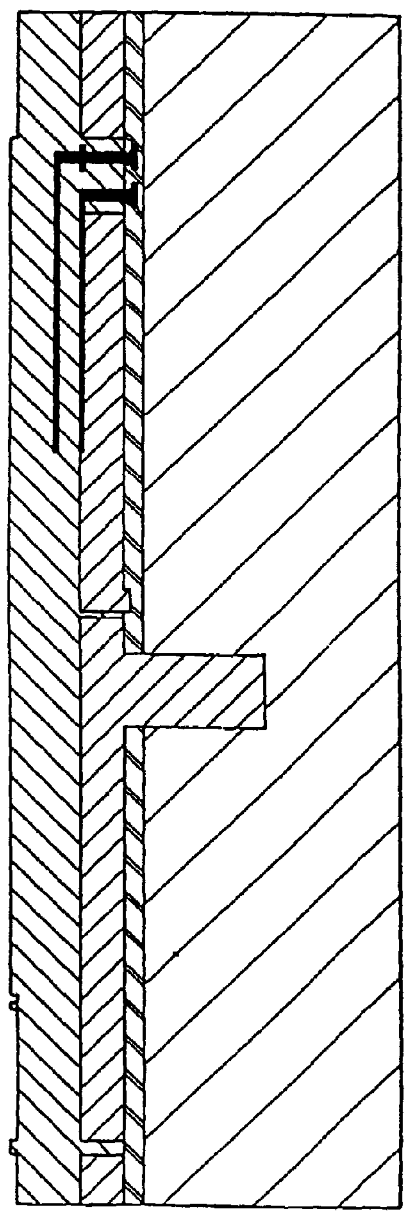

11. The glass 3752 is etched, as illustrated in FIG. 775 to a depth of 1 micron utilizing a first paddle mask.

Figure 776:
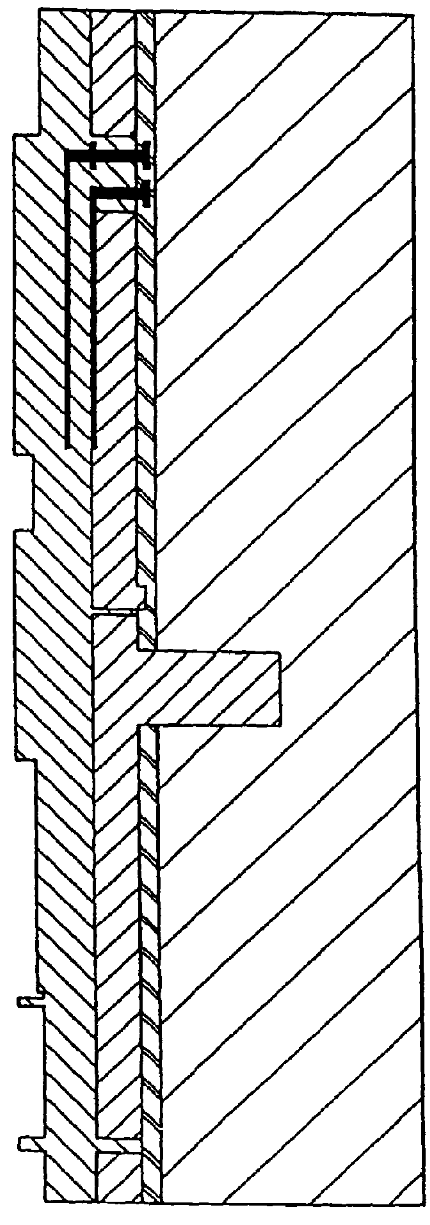

12. Next, as illustrated in FIG. 776, the glass 3752 is again etched to a depth of 3 micron utilizing a second paddle mask with the first mask utilized in FIG. 775 etching away those areas not having any portion of the paddle and the second mask as illustrated in FIG. 776 etching away those areas having a thinned portion. Both the first and second mask of FIG. 775 and FIG. 776 can be a timed etch.

Figure 777:
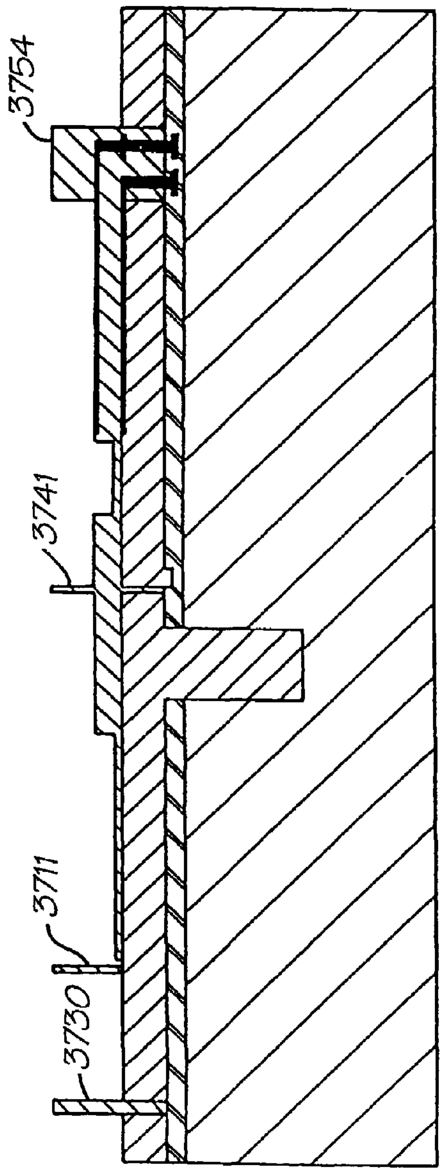

13. Next, as illustrated in FIG. 777, the glass 3752 is etched to a depth of 7 micron using a third paddle mask. The third paddle mask leaving the nozzle wall 3730, baffle 3711, thinned wall 3741 and end portion 3754 which fixes one end of the thermal actuator firmly to the substrate.

Figure 778:
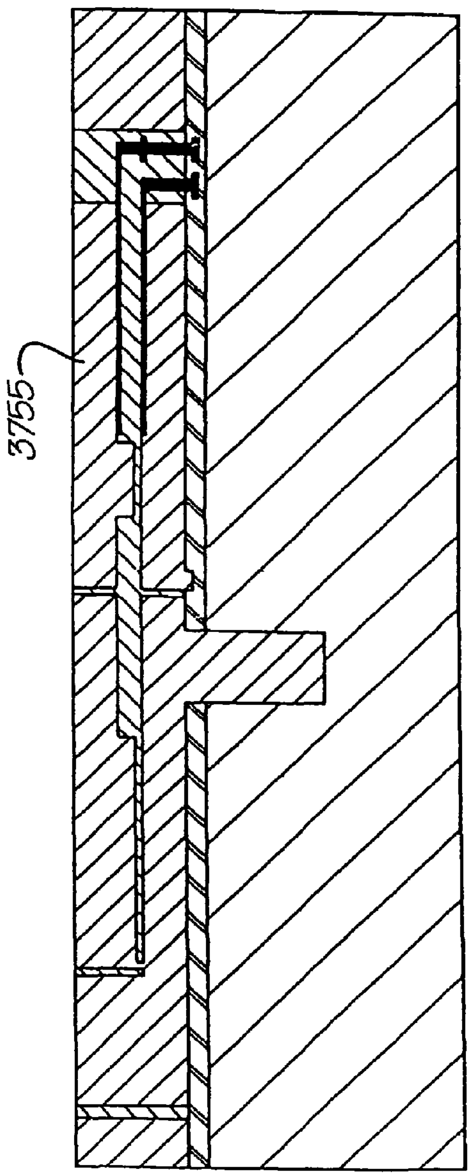

14. The next step, as illustrated in FIG. 778, is to deposit an 11 micron layer 3755 of sacrificial material such as aluminum and planarize the layer utilizing chemical mechanical planarization.

Figure 779:
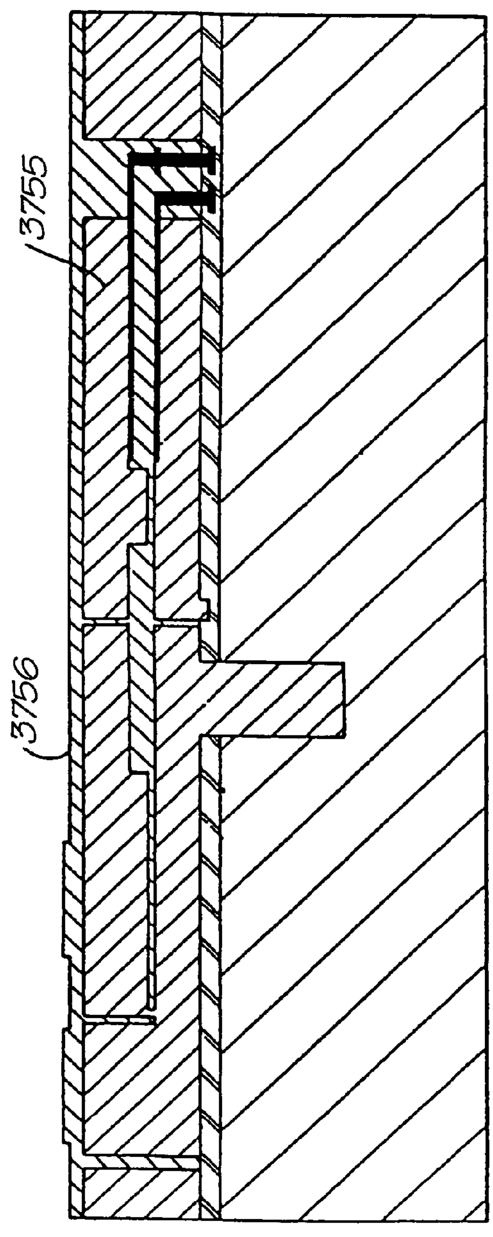

15. As illustrated in FIG. 779, a 3 micron layer 3756 of glass is deposited and etched to a depth of 1 micron utilizing a nozzle rim mask.

Figure 780:
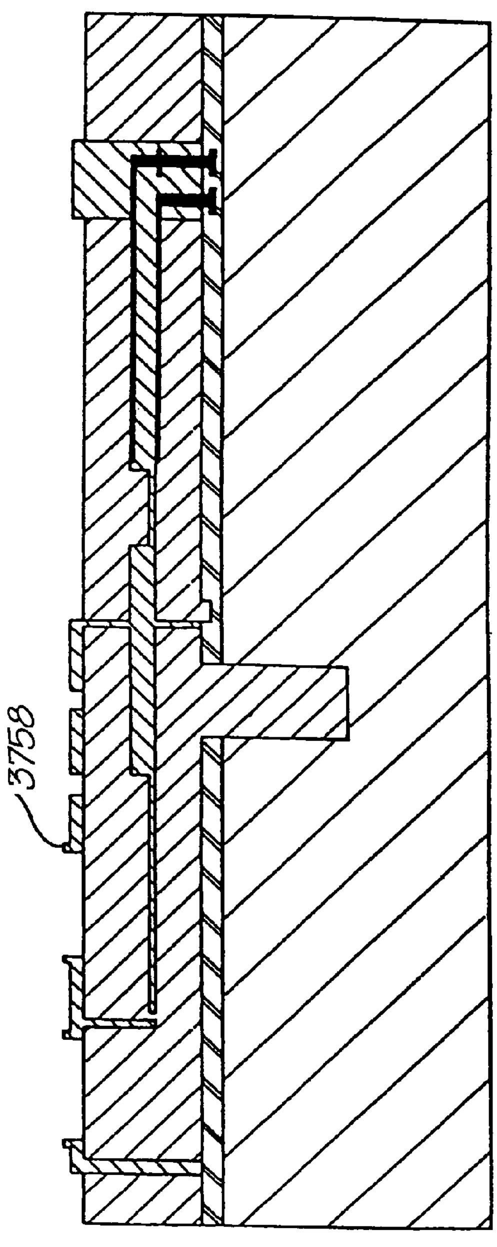

16. Next, as illustrated in FIG. 780, the glass 3756 is etched down to the sacrificial layer using a nozzle mask so as to form the nozzle structure 3758.

Figure 781:
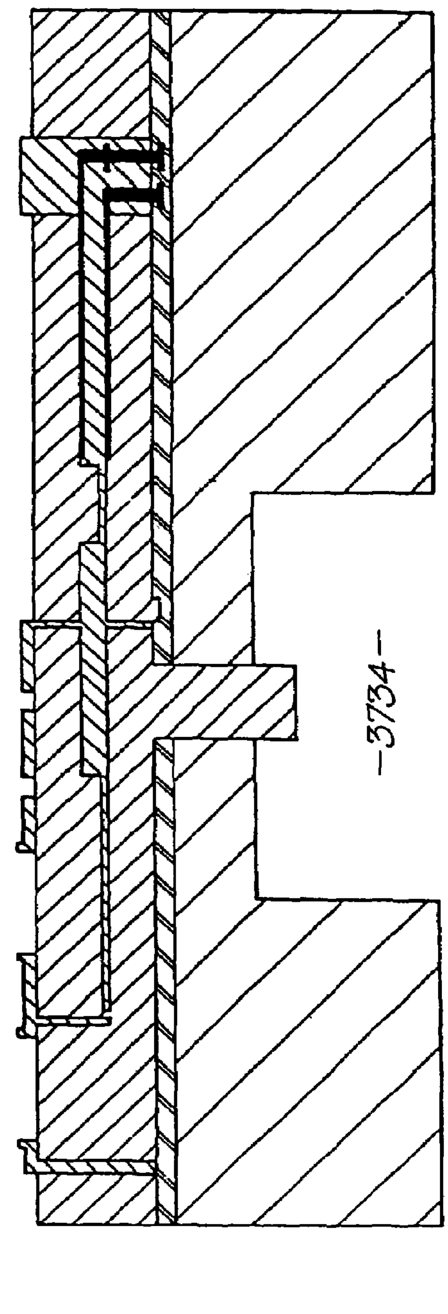

17. The next step, as illustrated in FIG. 781, is to back etch an ink supply channel 3734 using a deep silicon trench etcher such as that available from Silicon Technology Systems. The printheads can also be diced by this etch.

18. Next, as illustrated in FIG. 782, the sacrificial layers are etched away by means of a wet etch and wash.

The printheads can then be inserted in an ink chamber molding, tab bonded and a PTFE hydrophobic layer evaporated over the surface so as to provide for a hydrophobic surface.

In FIG. 783, there is illustrated a portion of a page with printhead including a series of nozzle arrangements as constructed in accordance with the principles of a preferred embodiment. The array 3760 has been constructed for three color output having a first row 3761 a second row 3762 and a third row 3763. Additionally, a series of bond pads, e.g. 3764, 3765 are provided at the side for tab automated bonding to the printhead. Each row 3761, 3762, 3763 can be provided with a different color ink including cyan, magenta and yellow for providing full color output. The nozzles of each row 3761-3763 are further divided into sub rows e.g. 3768, 3769. Further, a glass strip 3770 can be provided for anchoring the actuators of the row 3763 in addition to providing for alignment for the bond pad 3764, 3765.

The CMOS circuitry can be provided so as to fire the nozzles with the correct timing relationships. For example, each nozzle in the row 3768 is fired together followed by each nozzle in the row 3769 such that a single line is printed.

It could be therefore seen that a preferred embodiment provides for an extremely compact arrangement of an inkjet printhead which can be made in a highly inexpensive manner in large numbers on a single silicon wafer with large numbers of printheads being made simultaneously. Further, the actuation mechanism provides for simplified complexity in that the number of actuators is halved with the arrangement of a preferred embodiment.

Figure 785:
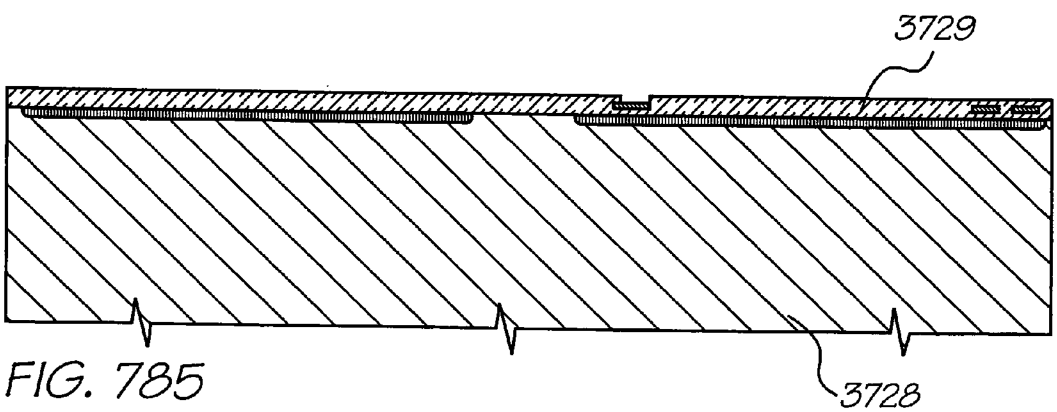

One alternative form of detailed manufacturing process which can be used to fabricate monolithic ink jet printheads operating in accordance with the principles taught by the present embodiment can proceed utilizing the following steps:

1. Using a double sided polished wafer 3728, complete drive transistors, data distribution, and timing circuits using a 0.5 micron, one poly, 2 metal CMOS process 3729. Relevant features of the wafer at this step are shown in FIG. 785. For clarity, these diagrams may not be to scale, and may not represent a cross section though any single plane of the nozzle. FIG. 784 is a key to representations of various materials in these manufacturing diagrams, and those of other cross referenced ink jet configurations.

2. Etch oxide down to silicon or aluminum using Mask 1. This mask defines the ink inlet hole.

Figure 786:
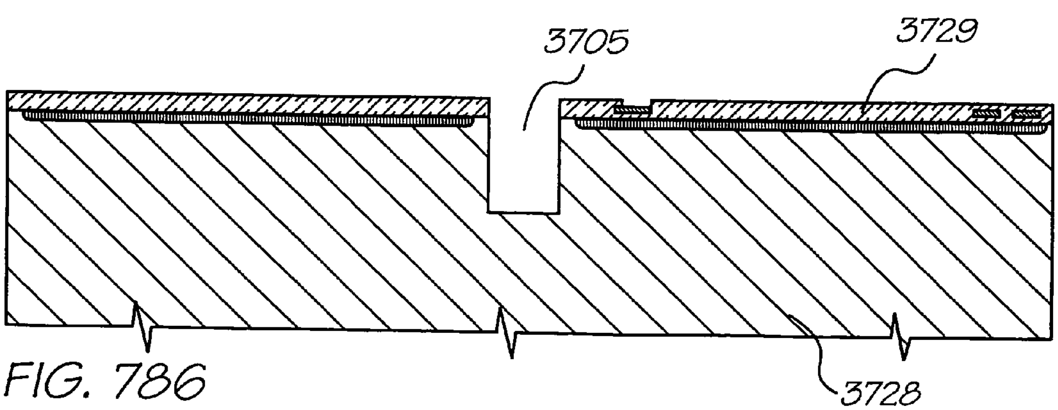

3. Etch silicon to a depth of 15 microns using etched oxide as a mask. The sidewall slope of this etch is not critical (75 to 90 degrees is acceptable), so standard trench etchers can be used. This step is shown in FIG. 786.

4. Deposit 7 microns of sacrificial aluminum 3742.

Figure 787:
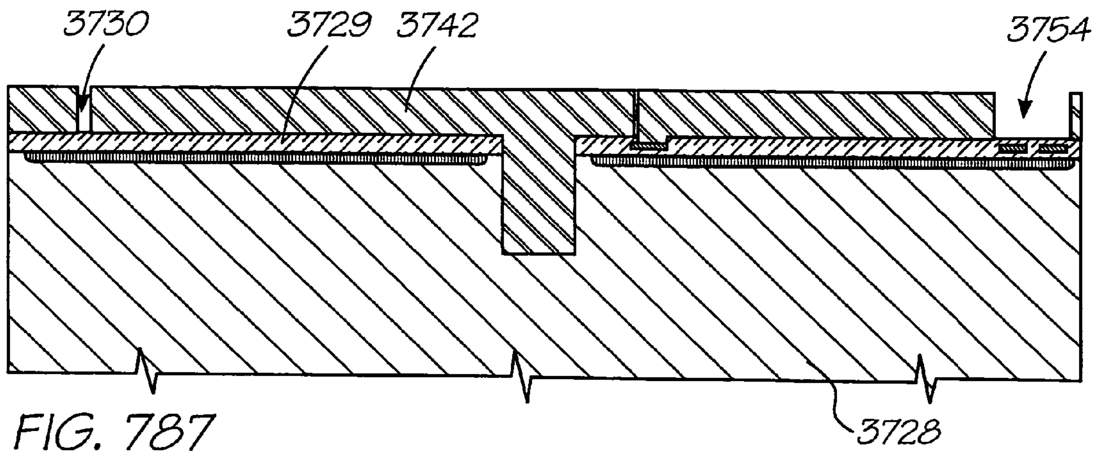

5. Etch the sacrificial layer using Mask 2, which defines the nozzle walls e.g. 3730 and actuator anchor 3754. This step is shown in FIG. 787.

6. Deposit 7 microns of low stress glass 3743 and planarize down to aluminum using CMP.

Figure 788:
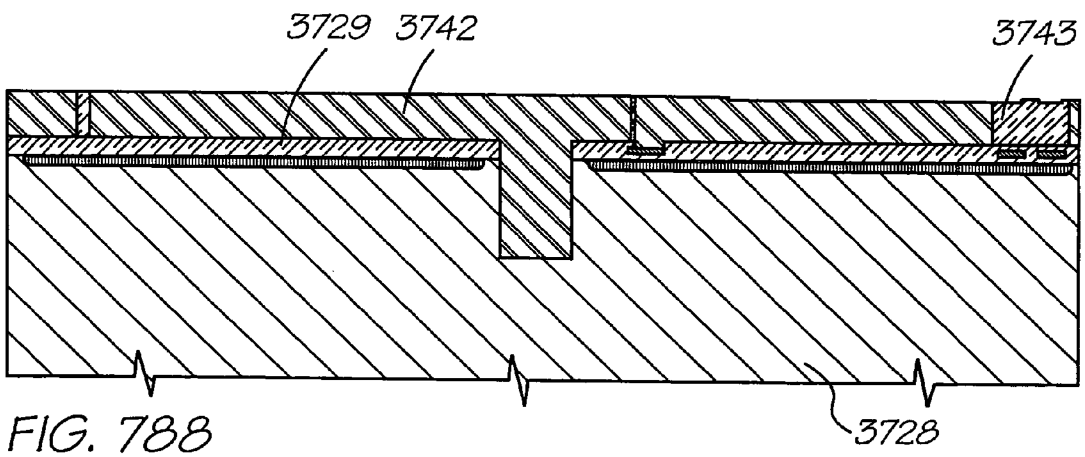

7. Etch the sacrificial material to a depth of 0.4 microns, and glass to a depth of at least 0.4 microns, using Mask 3. This mask defined the lower heater. This step is shown in FIG. 788.

Figure 789:
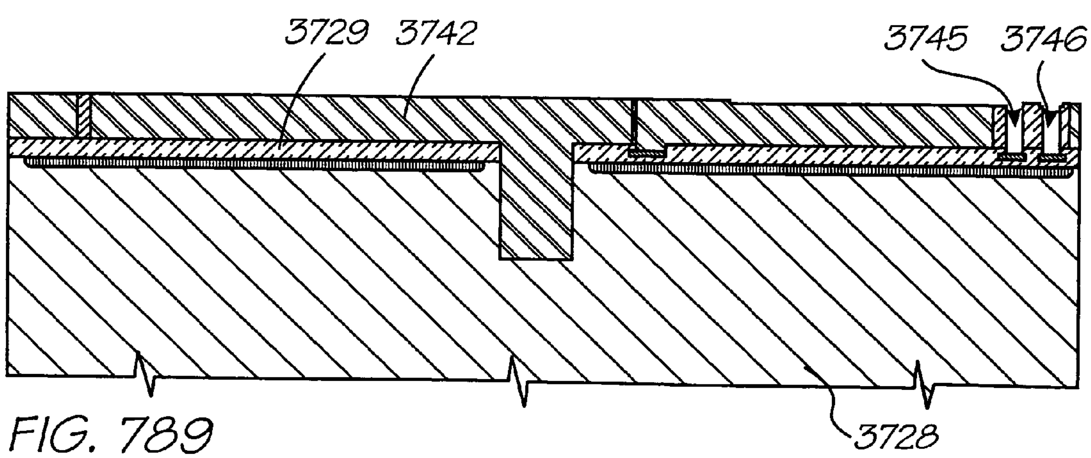

8. Etch the glass layer down to aluminum using Mask 4, defining heater vias 3745, 3746. This step is shown in FIG. 789.

Figure 790:
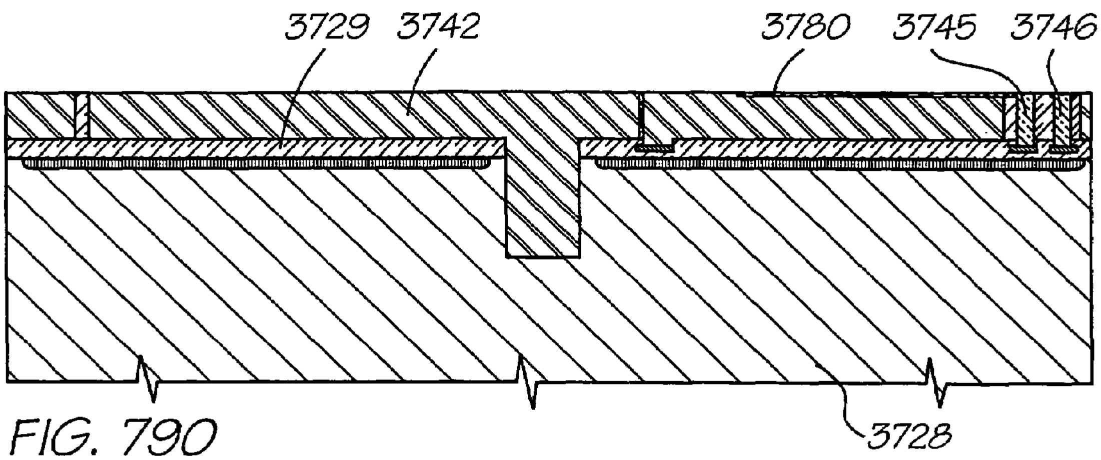

9. Deposit 1 micron of heater material 3780 (e.g. titanium nitride (TiN)) and planarize down to the sacrificial aluminum using CMP. This step is shown in FIG. 790.

Figure 791:
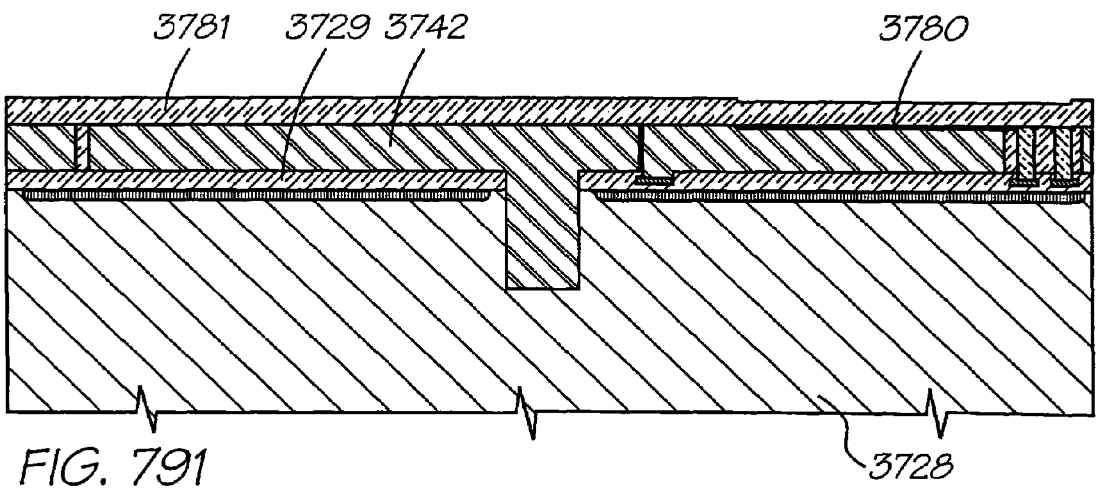

10. Deposit 4 microns of low stress glass 3781, and etch to a depth of 0.4 microns using Mask 5. This mask defines the upper heater. This step is shown in FIG. 791.

11. Etch glass down to TiN using Mask 6. This mask defines the upper heater vias.

Figure 792:
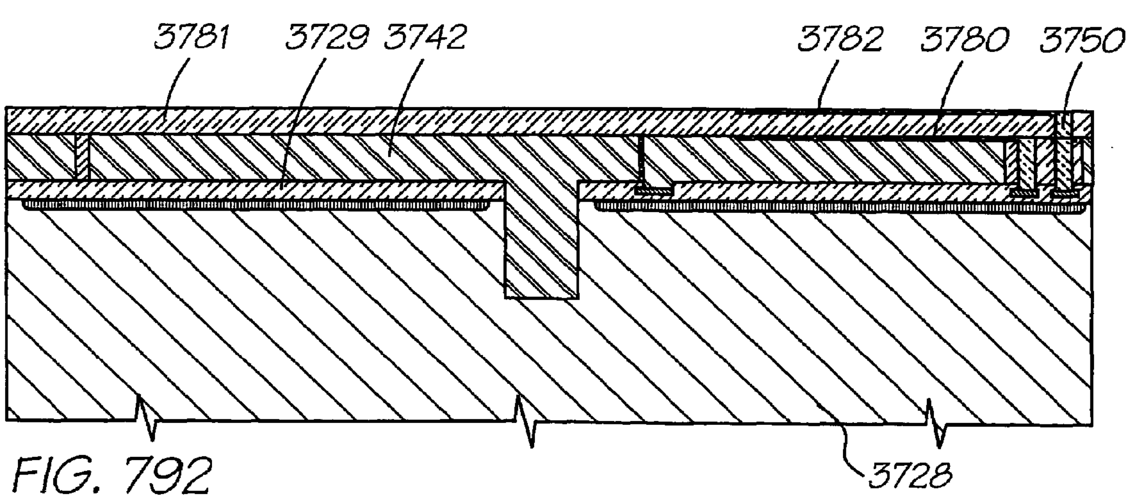

12. Deposit 1 micron of TiN 3782 and planarize down to the glass using CMP. This step is shown in FIG. 792.

13. Deposit 7 microns of low stress glass 3783.

Figure 793:
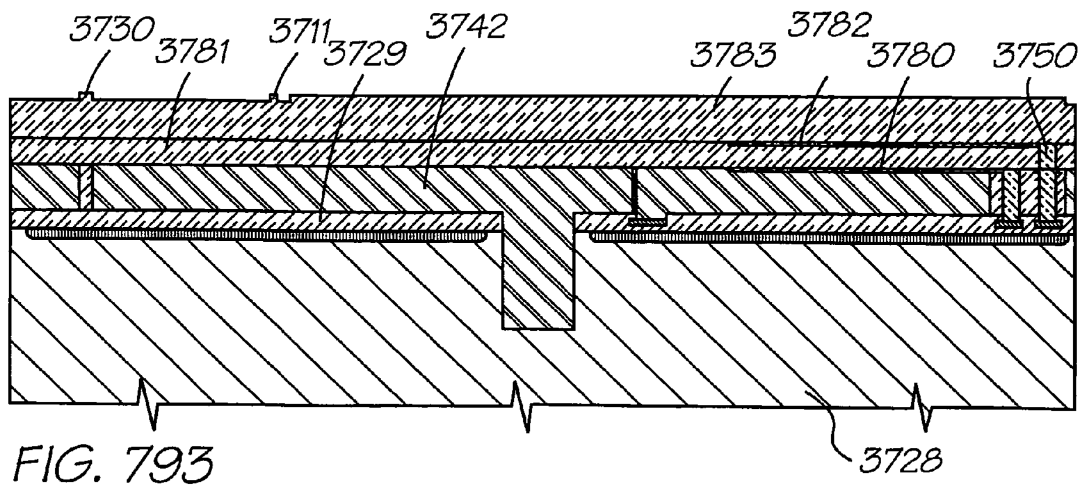

14. Etch glass to a depth of 1 micron using Mask 7. This mask defines the nozzle walls e.g. 3730, nozzle chamber baffle 3711, the paddle, the flexure, the actuator arm, and the actuator anchor. This step is shown in FIG. 793.

Figure 794:
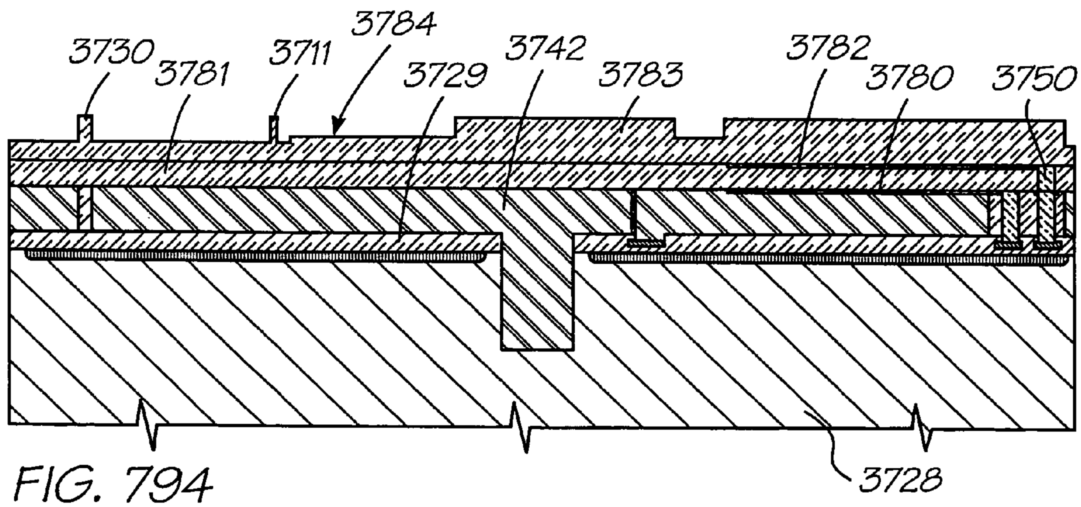

15. Etch glass to a depth of 3 microns using Mask 8. This mask defines the nozzle walls 3730, nozzle chamber baffle 3711, the actuator arm 3784, and the actuator anchor. This step is shown in FIG. 794.

Figure 795:
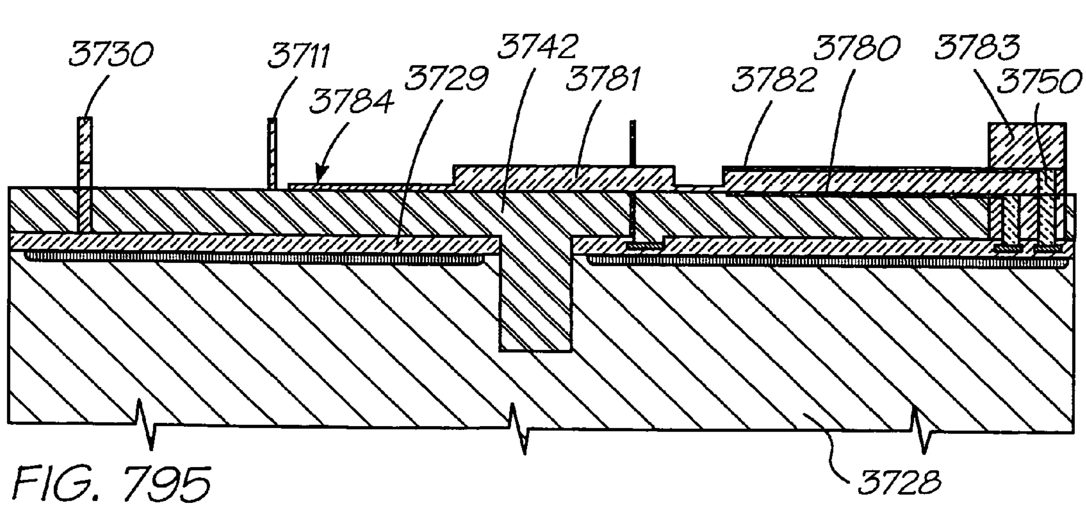

16. Etch glass to a depth of 7 microns using Mask 9. This mask defines the nozzle walls and the actuator anchor. This step is shown in FIG. 795.

Figure 796:
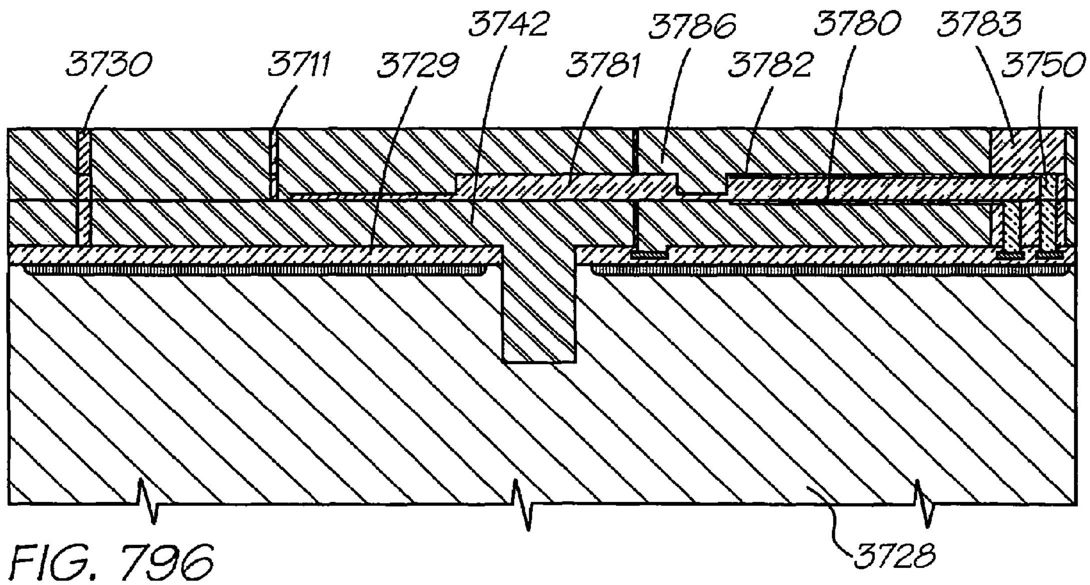

17. Deposit 11 microns of sacrificial aluminum 3786 and planarize down to glass using CMP. This step is shown in FIG. 796.

18. Deposit 3 microns of PECVD glass 3787.

Figure 797:
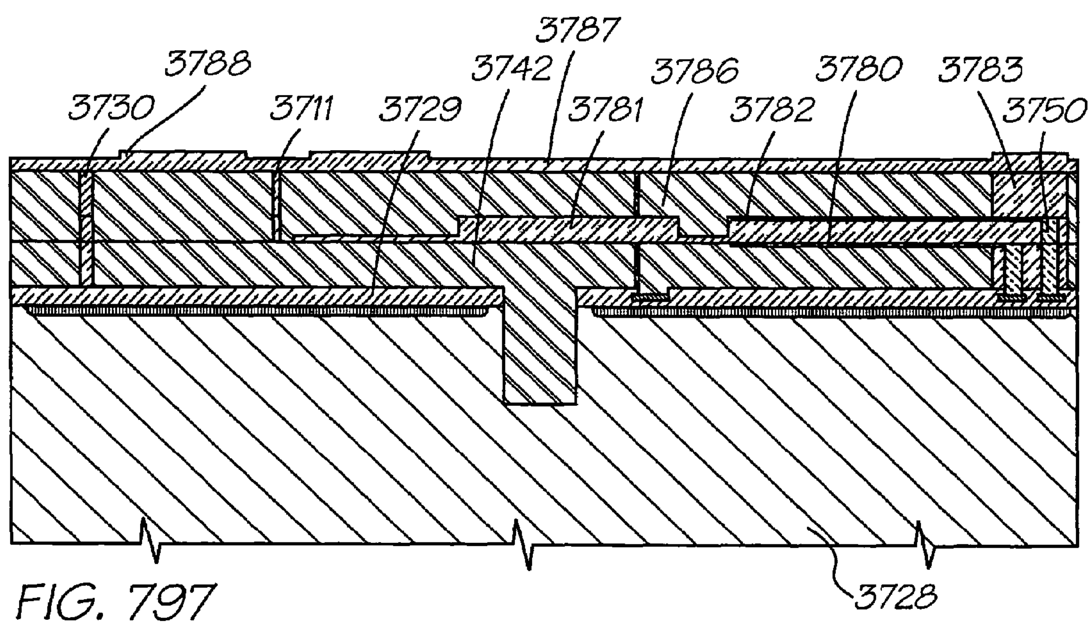

19. Etch glass to a depth of 1 micron using Mask 10, which defines the nozzle rims 3788. This step is shown in FIG. 797.

Figure 798:
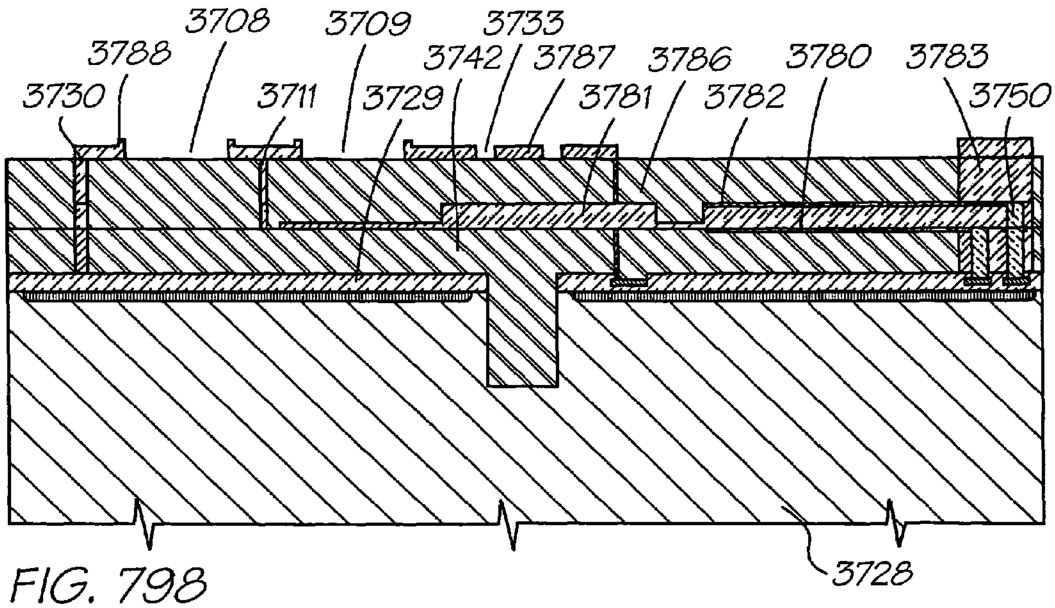

20. Etch glass down to the sacrificial layer (3 microns) using Mask 11, defining the nozzles 3708 and the nozzle chamber roof. This step is shown in FIG. 798.

21. Wafer probe. All electrical connections are complete at this point, bond pads are accessible, and the chips are not yet separated.

Figure 799:
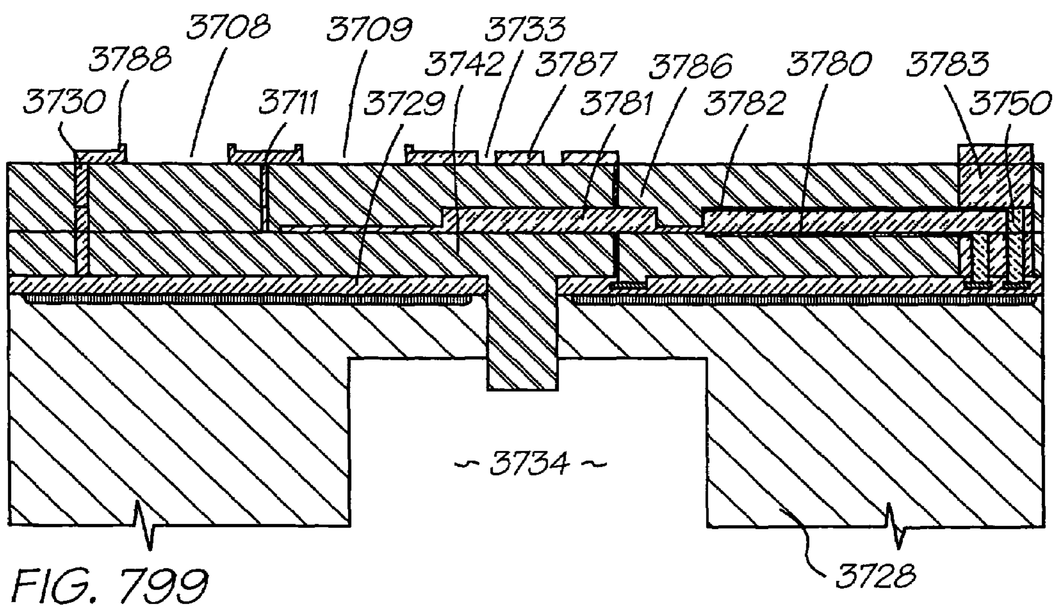

22. Back-etch the silicon wafer to within approximately 10 microns of the front surface using Mask 12. This mask defines the ink inlets 3734 which are etched through the wafer. The wafer is also diced by this etch. This etch can be achieved with, for example, an ASE Advanced Silicon Etcher from Surface Technology Systems. This step is shown in FIG. 799.

Figure 800:
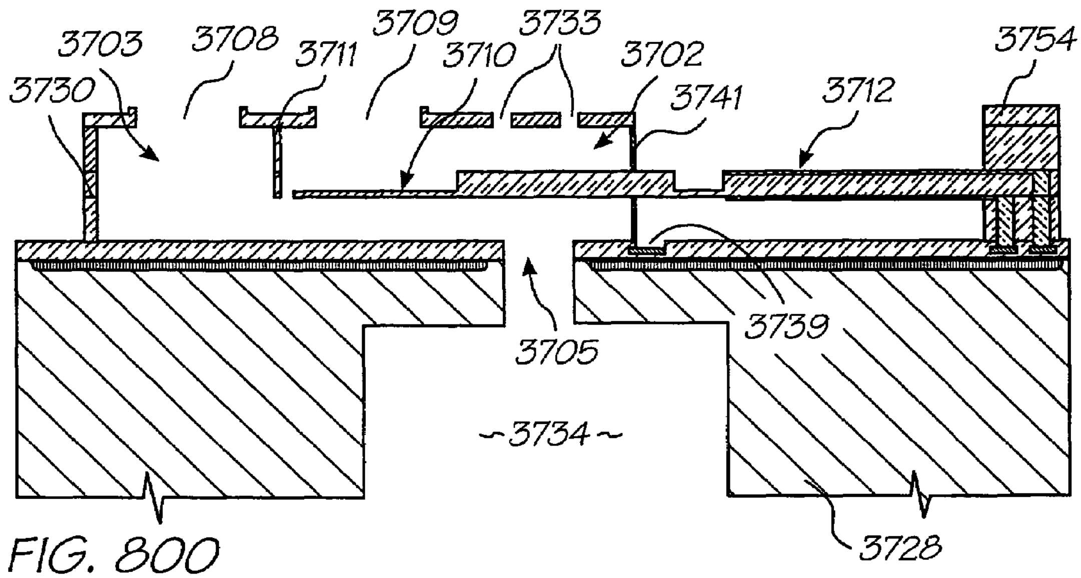

23. Etch all of the sacrificial aluminum. The nozzle chambers are cleared, the actuators freed, and the chips are separated by this etch. This step is shown in FIG. 800.

24. Mount the printheads in their packaging, which may be a molded plastic former incorporating ink channels which supply the appropriate color ink to the ink inlets at the back of the wafer.

25. Connect the printheads to their interconnect systems. For a low profile connection with minimum disruption of airflow, TAB may be used. Wire bonding may also be used if the printer is to be operated with sufficient clearance to the paper.

26. Hydrophobize the front surface of the printheads.

Figure 801:
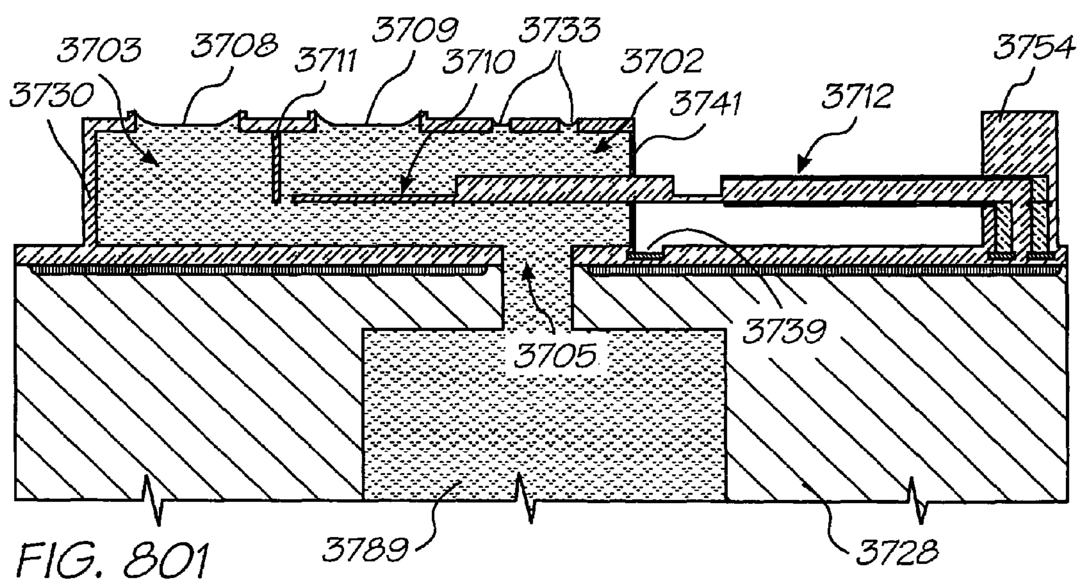

27. Fill the completed printheads with ink 3789 and test them. A filled nozzle is shown in FIG. 801.

IJ38

A preferred embodiment of the present invention includes an inkjet nozzle arrangement wherein a single actuator drives two output nozzles. When the actuator is driven in the first direction, ink is ejected out of a first ink ejection port and when the actuator is driven in a second direction, ink is ejected out of a second ink ejection port. The paddle actuator is interconnected via a slot in the nozzle chamber wall to a rigid thermal actuator which can be actuated so as to cause the ejection of ink from the ink ejection ports.

Turning initially to FIG. 807 and 808, there is illustrated a nozzle arrangement 3801 of a preferred embodiment with FIG. 808 being a sectional view through the line VII-VII of FIG. 807. The nozzle arrangement 3801 includes two ink ejection ports 3802, 3803 for the ejection of ink from within a nozzle chamber. The nozzle chamber further includes first and second chamber portions 3805, 3806 in addition to an etched cavity 3807 which, during normal operation, are normally filled with ink supplied via an ink inlet channel 3808. The ink inlet channel 3808 is in turn connected to an ink supply channel 3809 etched through a silicon wafer. Inside the nozzle chamber is located an actuator paddle 3810 which is interconnected through a slot 3812 in the chamber wall to an actuator arm 3813 which is actuated by means of heaters 3814, 3815 which are in turn connected to a substrate 3817 via an end block portion 3818 with the substrate 3817 providing the relevant electrical interconnection for the heaters 3814, 3815.

Hence, the actuator arm 3813 can be actuated by the heaters 3814, 3815 to move up and down as a result of the expansion of the heaters 3814, 3815 so as to eject ink via the nozzle holes 3802 or 3803. A series of holes 3820-3822 are also provided in a top wall of the nozzle arrangement. As will become more readily apparent hereinafter, the holes 3820-3822 assist in the etching of sacrificial layers during construction in addition to providing for "breathing" assistance during operation of the nozzle arrangement 3801. The two chambers 3805, 3806 are separated by a baffle 3824 and the paddle arm 3810 includes a end lip portion 3825 in addition to a plug portion 3826. The plug portion 3826 is designed to mate with the boundary of the ink inlet channel 3808 during operation.

Figure 802:
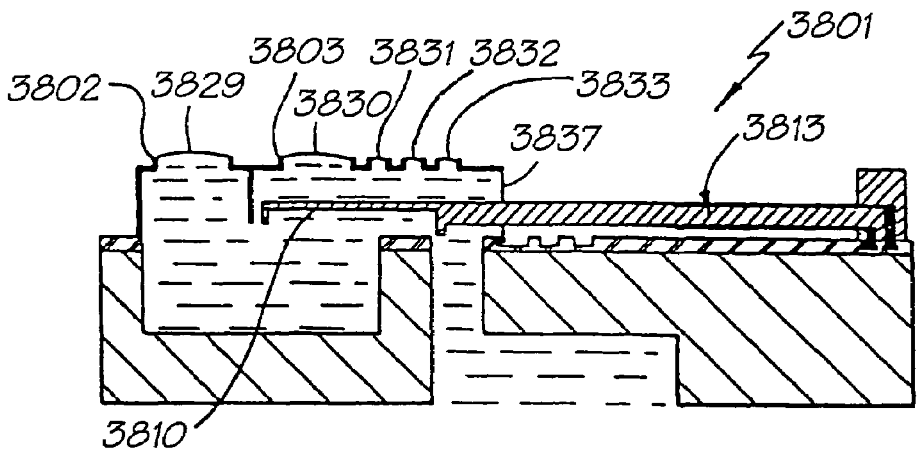
Figure 803:
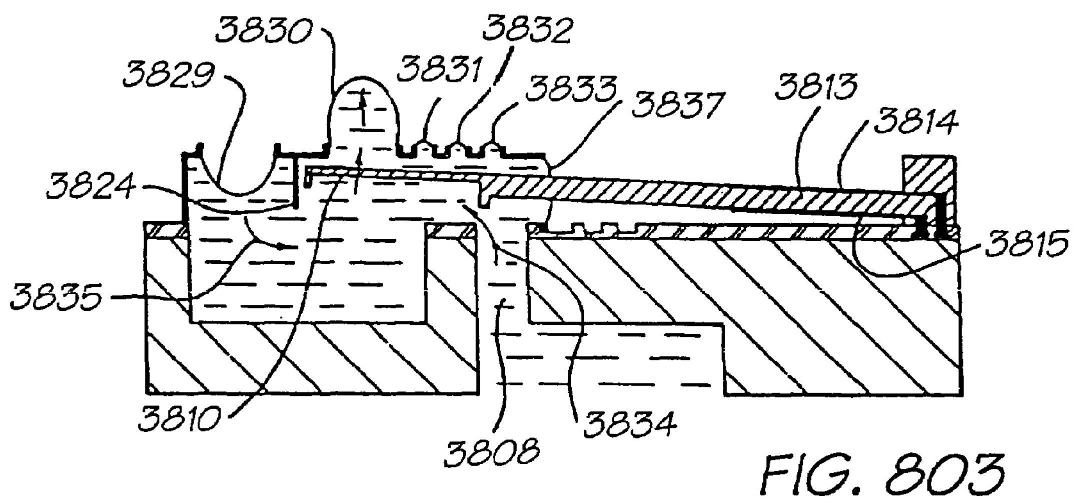

Turning now to FIGS. 802-806, there will now be explained the operation of the nozzle arrangement 3801. Each of FIGS. 802-806 illustrate a cross sectional view of the nozzle arrangement during various stages of operation. Turning initially to FIG. 802, there is shown the nozzle arrangement 3801 when in its quiescent position. In this state, the paddle 3810 is idle and ink fills the nozzle chamber so as to form menisci 3829-3833 and 3837.

Figure 804:
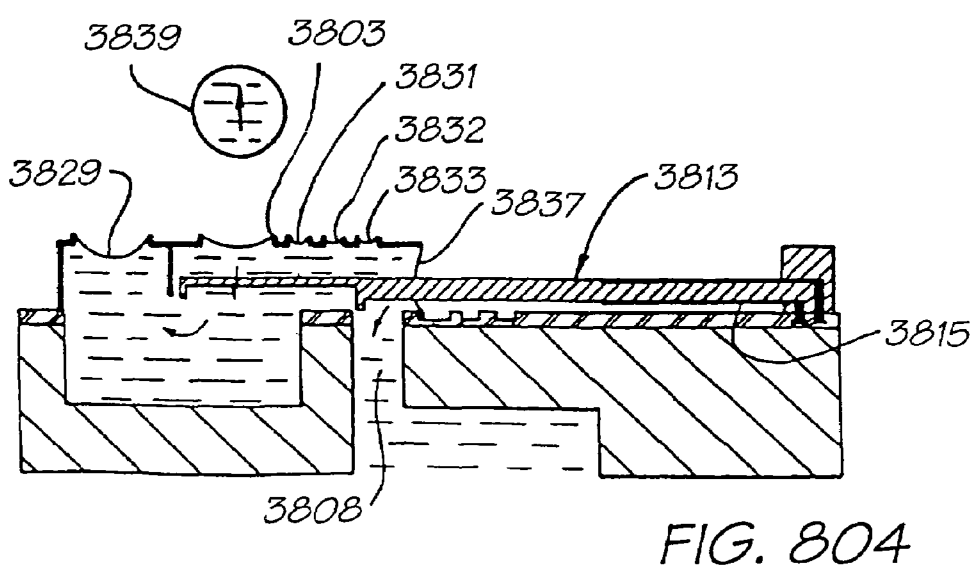

When it is desired to eject a drop out of the nozzle port 3803, as indicated in FIG. 804, the bottom heater 3815 is actuated. The heater 3815 can comprise a 60% copper and 40% nickel alloy which has a high bending efficiency where the bending efficiency is defined as:

$$\text{bend efficiency} = \frac{\text{Young's Modulus} \times (\text{Coefficient of thermal Expansion})}{\text{Density} \times \text{Specific Heat Capacity}}$$

The two heaters 3814, 3815 can be constructed from the same material and normally exist in a state of balance when the paddle 3810 is in its quiescent position. As noted previously, when it is desired to eject a drop out of nozzle chamber 3803, the heater 3815 is actuated which causes a rapid upwards movement of the actuator paddle 3810. This causes a general increase in pressure in the area in front of the actuator paddle 3810 which further causes a rapid expansion in the meniscus 3830 in addition to a much less significant expansion in the menisci 3831-3833 (due to their being of a substantially smaller radius). Additionally, the substantial decrease in pressure around the back surface of the paddle 3810 causes a general inflow of ink through the ink inlet channel 3808 in addition to causing a general collapse in the meniscus 3829 and a corresponding flow of ink 3835 around the baffle 3824. A slight bulging also occurs in the meniscus 3837 around the slot in the side wall 3812.

Turning now to FIG. 804, the heater 3815 is merely pulsed and turned off when it reaches its maximum extent. Hence, the paddle actuator 3810 rapidly begins to return to its quiescent position causing the ink around the ejection port 3803 to begin to flow back into the chamber. The forward momentum of the ink in the expanded meniscus and the backward pressure exerted by actuator paddle 3810 results in a general necking of the meniscus and the subsequent breaking off of a separate drop 3839 which proceeds to the print media. The menisci 3829, 3831, 3832 and 3833 are then each of a generally concave shape and exert a further force on the ink within the nozzle chamber which begins to draw ink in from the ink inlet channel 3808 so as to replenish the nozzle chamber. Eventually, the nozzle arrangement 3801 returns to the quiescent position which is as previously illustrated in respect of FIG. 802.

Figure 805:
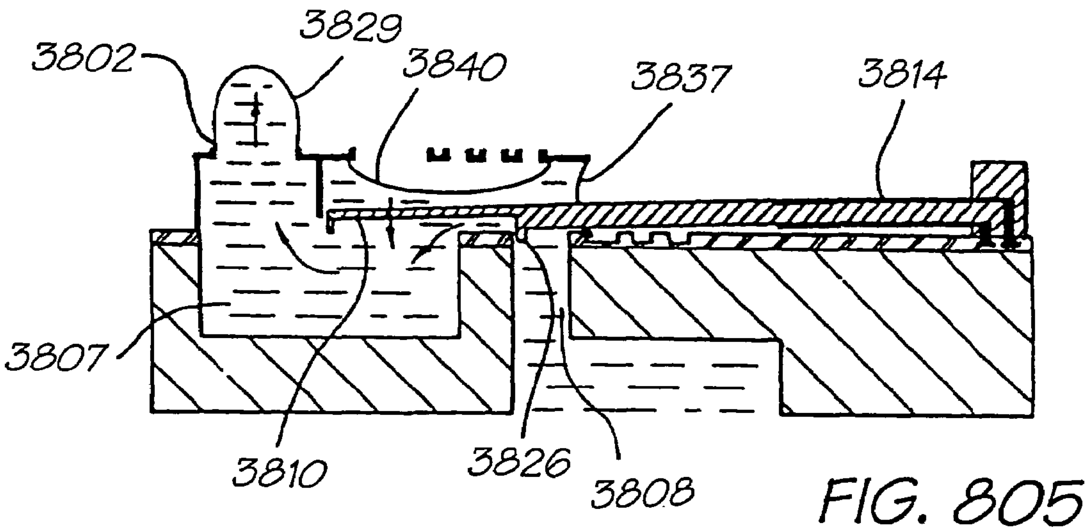
Figure 806:
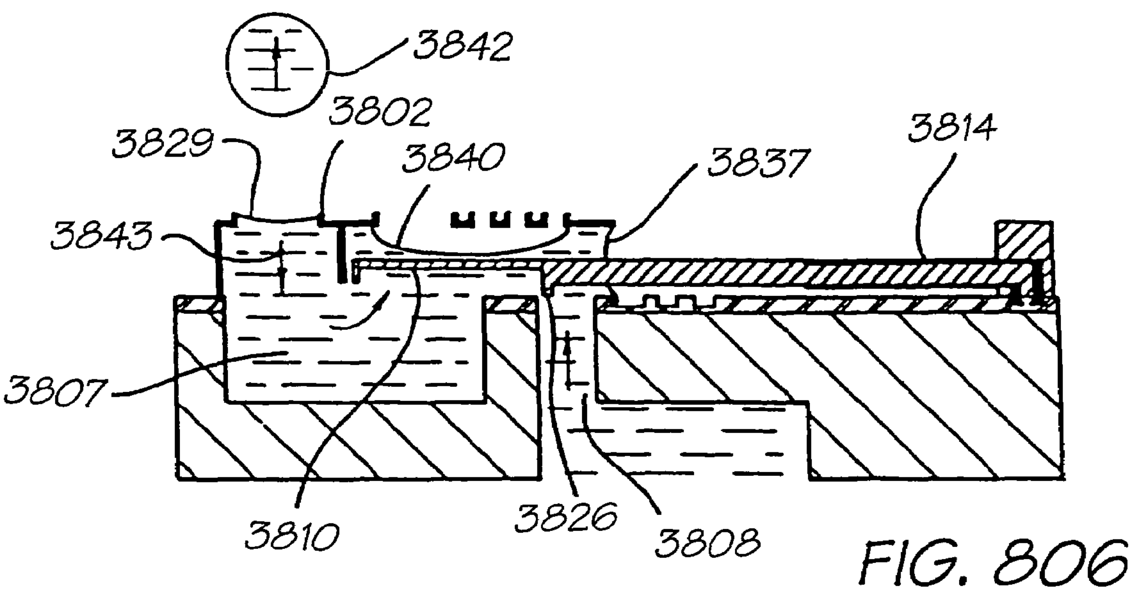

Turning now to FIG. 805, when it is desired to eject a droplet of ink out of the ink ejection port 3802, the heater 3814 is actuated resulting in a general expansion of the heater 3814 which in turn causes a rapid downward movement of the actuator paddle 3810. The rapid downward movement causes a substantial increase in pressure within the cavity 3807 which in turn results in a general rapid expansion of the meniscus 3829. The end plug portion 3826 results in a general blocking of the ink supply channel 3808 stopping fluid from flowing back down the ink supply channel 3808. This further assists in causing ink to flow towards the cavity 3807. The menisci 3830-3833 of FIG. 802 are drawn generally into the nozzle chamber and may unite so as to form a single meniscus 3840. The meniscus 3837 is also drawn into the chamber. The heater 3814 is merely pulsed, which as illustrated in FIG. 806 results in a rapid return of the paddle 3810 to its quiescent position. The return of the paddle 3810 results in a general reduction in pressure within the cavity 3807 which in turn results in the ink around the nozzle 3802 beginning to flow 3843 back into the nozzle chamber in the direction of arrow 3843. The forward momentum of the ink around the meniscus 3829 in addition to the backflow 3843 results in a general necking of the meniscus 3829 and the formation of an ink drop 3842 which separates from the main body of the ink and continues to the print media.

The return of the actuator paddle 3810 further results in plugging portion 3826 "unplugging" the ink supply channel 3808. The general reduction in pressure in addition to the collapsed menisci 3840, 3837 and 3829 results in a flow of ink from the ink inlet channel 3808 into the nozzle chamber so as to cause replenishment of the nozzle chamber and return to the quiescent state as illustrated in FIG. 802.

Returning now to FIG. 807 and FIG. 808, a number of other important features of a preferred embodiment include the fact that each of the ports 3802, 3803, and each of the holes 3820, 3821, 3822, and the slot 3812 etc. includes a rim around its outer periphery. The rim acts to stop wicking of the meniscus formed across the nozzle rim. Further, the actuator arm 3813 is provided with a wick minimization protrusion 3844 in addition to a series of pits 3845 which are shaped so as to minimize wicking along the surfaces surrounding the actuator arms 3813.

The nozzle arrangement of a preferred embodiment can be formed on a silicon wafer utilizing standard semi-conductor fabrication processing steps and micro-electromechanical systems (MEMS) construction techniques.

Preferably, a large wafer of printheads is constructed at any one time with each printhead providing a predetermined pagewidth capabilities and a single printhead can in turn comprise multiple colors so as to provide for fill color output as would be readily apparent to those skilled in the art.

Figure 809:
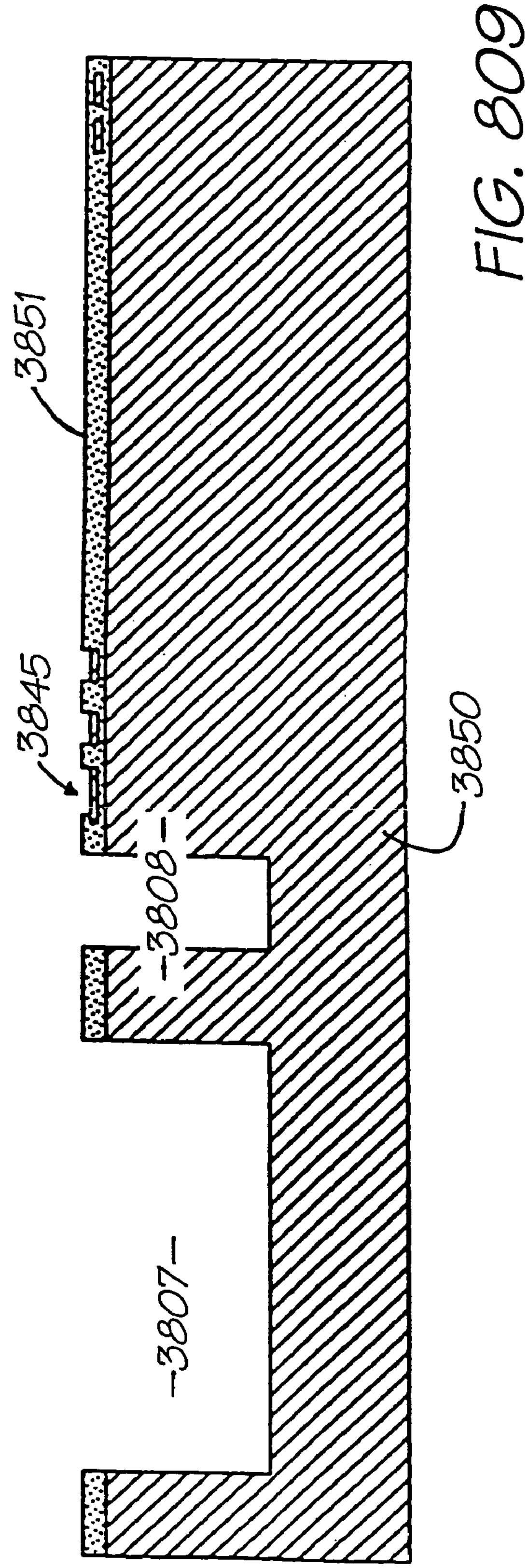

Turning now to FIG. 809-FIG. 827 there will now be explained one form of fabrication of a preferred embodiment in order to describe the structure of the nozzle arrangement 3801. A preferred embodiment can start with a CMOS processed silicon wafer 3850 which can include a standard CMOS layer 3851 of the relevant electrical circuitry etc. The processing steps can then be as follows:

1. As illustrated in FIG. 809 a deep silicon etch is performed so as to form the nozzle cavity 3807 and ink inlet 3808. A series of pits e.g. 3845 are also etched down to an aluminum portion of the CMOS layer.

Figure 810:
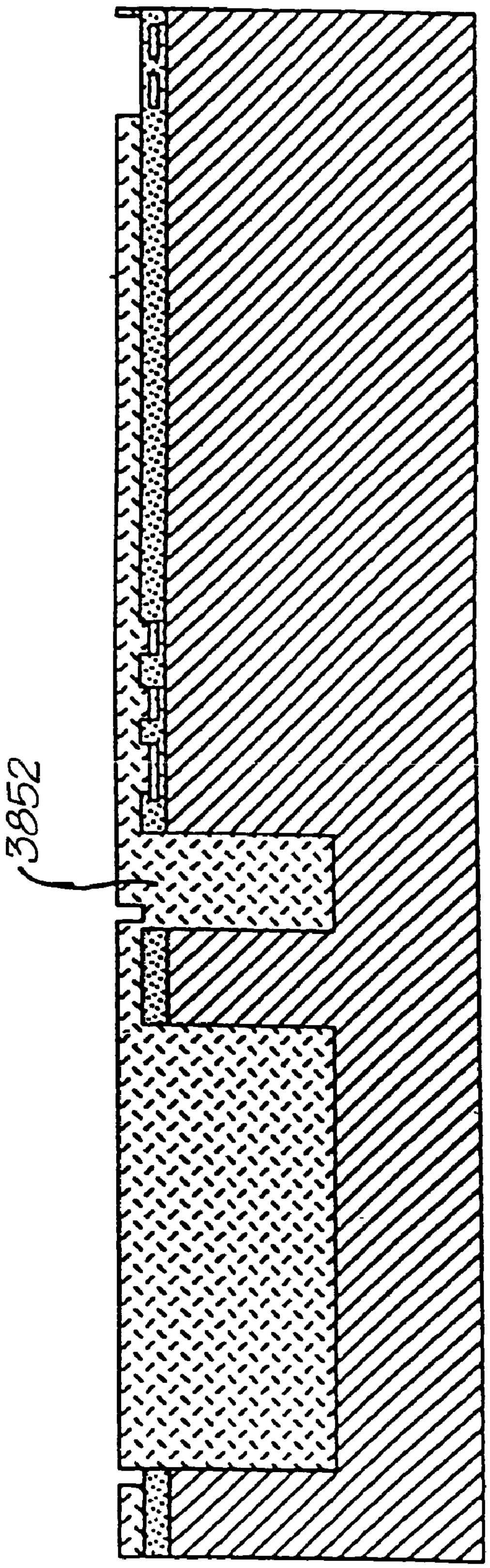

2. Next, as illustrated in FIG. 810, a sacrificial material layer 3852 is deposited and planarized using a standard Chemical Mechanical Planarization (CMP) process before being etched with a nozzle wall mask so as to form cavities for the nozzle wall, plug portion and interconnect portion. A suitable sacrificial material is aluminum which is often utilized in MEMS processes as a sacrificial material.

Figure 811:
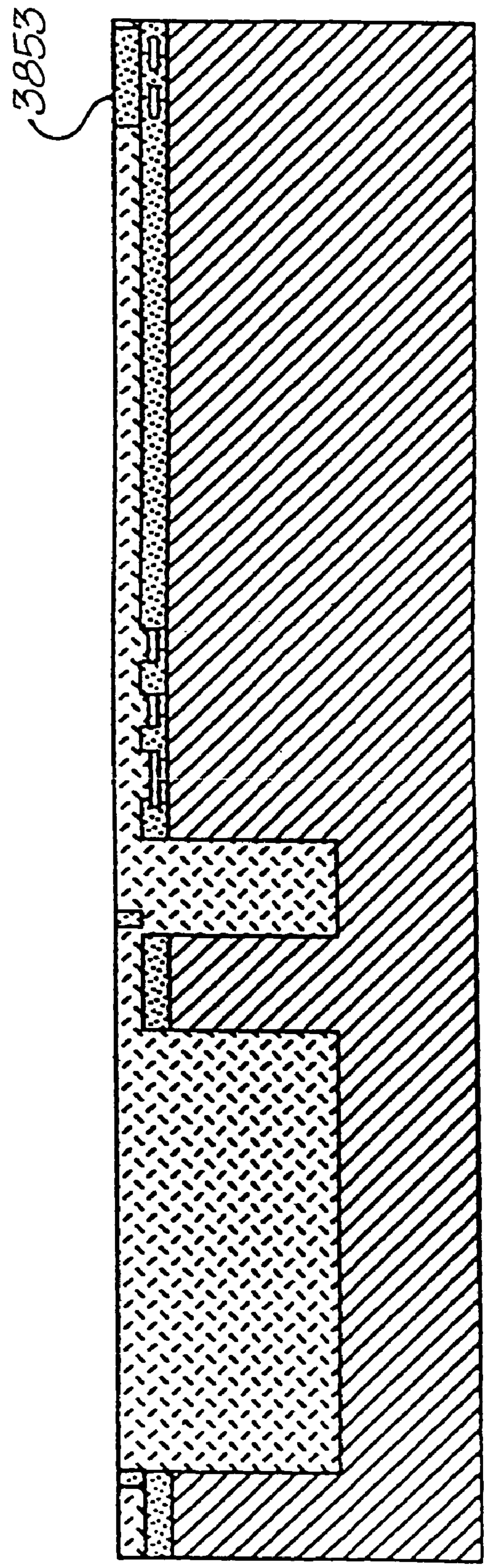

3. Next, as illustrated in FIG. 811, a 3 micron layer of low stress glass 3853 is deposited and planarized utilizing CMP.

Figure 812:
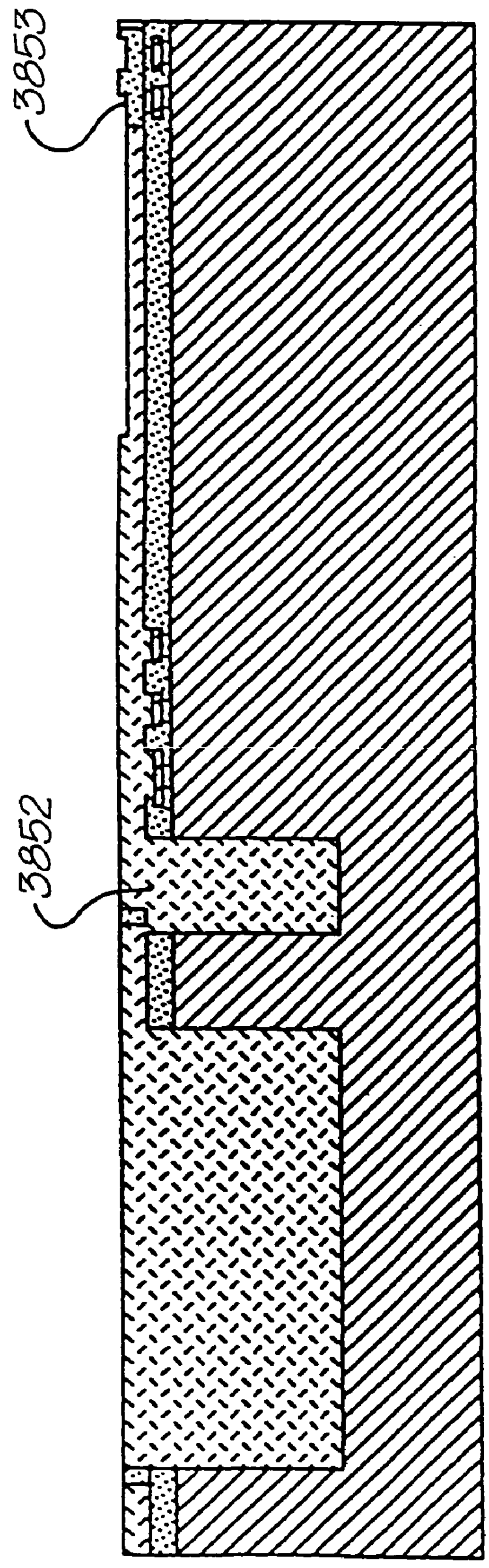

4. Next, as illustrated in FIG. 812, the sacrificial material 3852 is etched to a depth of 1.1 micron and the glass 3853 is further etched at least 1.1 micron utilizing a first heater mask.

Figure 813:
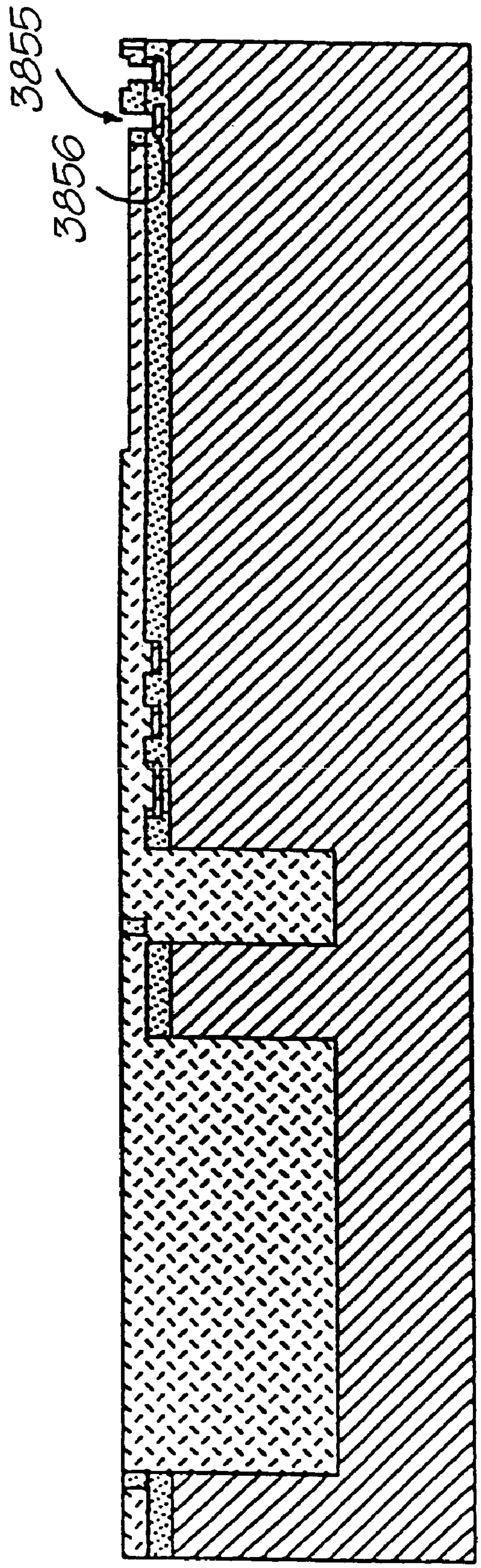

5. Next, as illustrated in FIG. 813, the glass is etched e.g. 3855 down to an aluminum layer e.g. 3856 of the CMOS layer.

Figure 814:
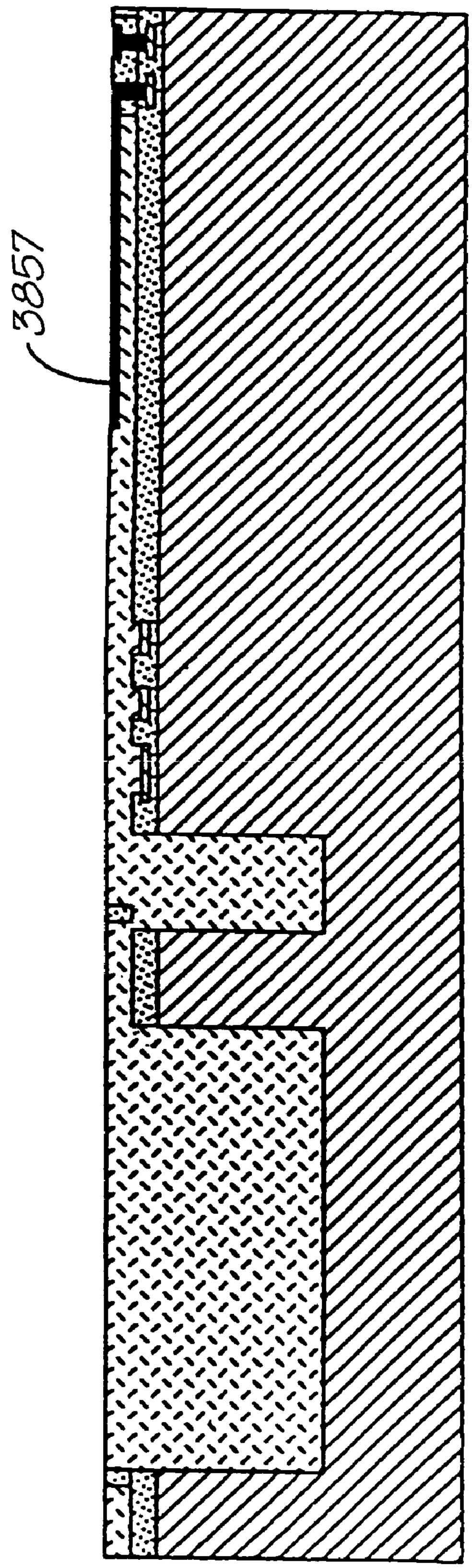

6. Next, as illustrated in FIG. 814, a 3 micron layer of 60% copper and 40% nickel alloy is deposited 3857 and planarized utilizing CMP. The copper and nickel alloy hereinafter called "cupronickel" is a material having a high "bend efficiency" as previously described.

Figure 815:
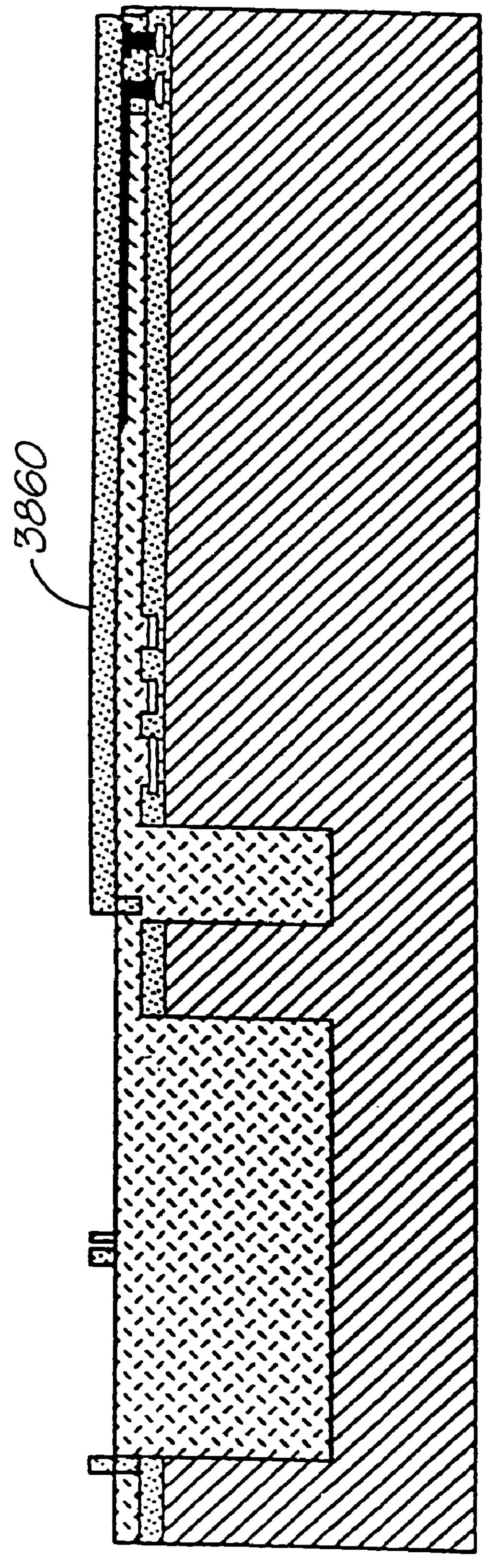

7. Next, as illustrated in FIG. 815, a 3 micron layer 3860 of low stress glass is deposited and etched utilizing a first paddle mask.

Figure 816:
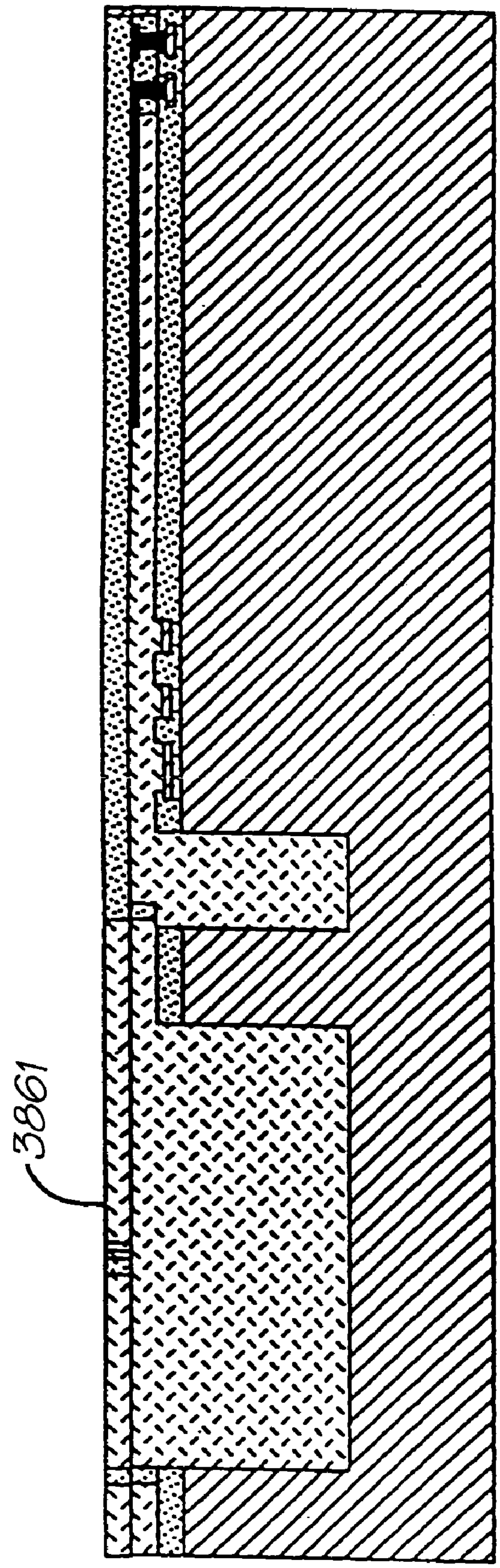

8. Next, as illustrated in FIG. 816, a further 3 micron layer of aluminum e.g. 3861 is deposited and planarized utilizing chemical mechanical planarization.

Figure 817:
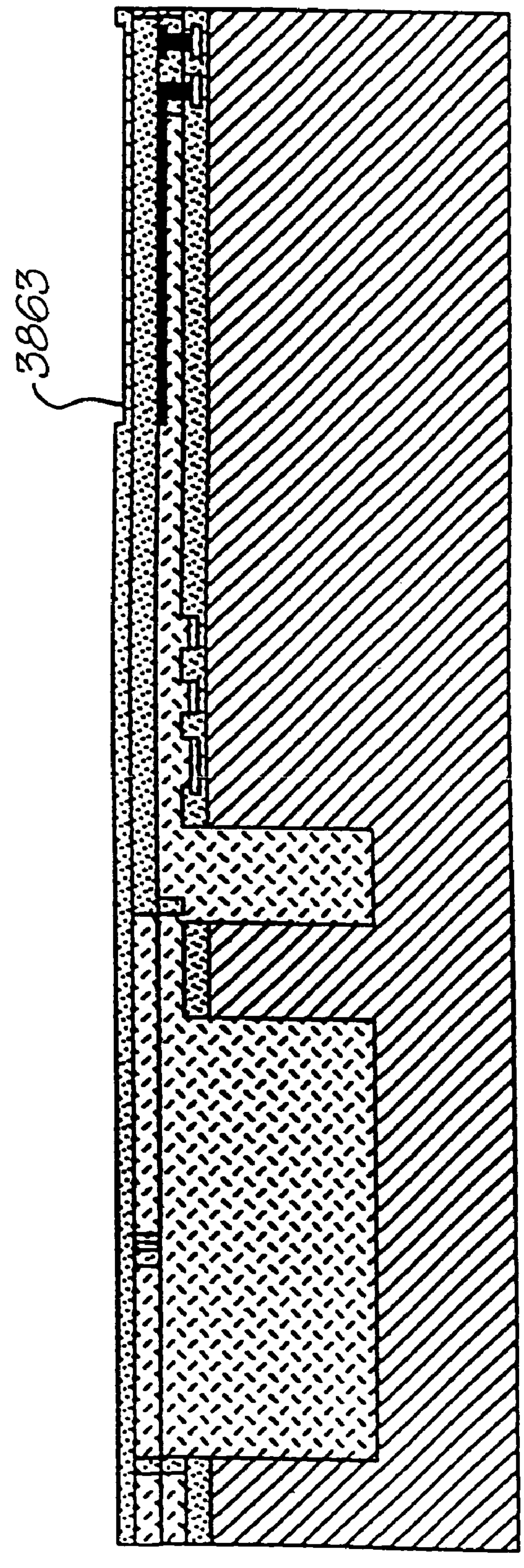

9. Next, as illustrated in FIG. 817, a 2 micron layer of low stress glass is deposited and etched 3863 by 1.1 micron utilizing a heater mask for the second heater.

Figure 818:
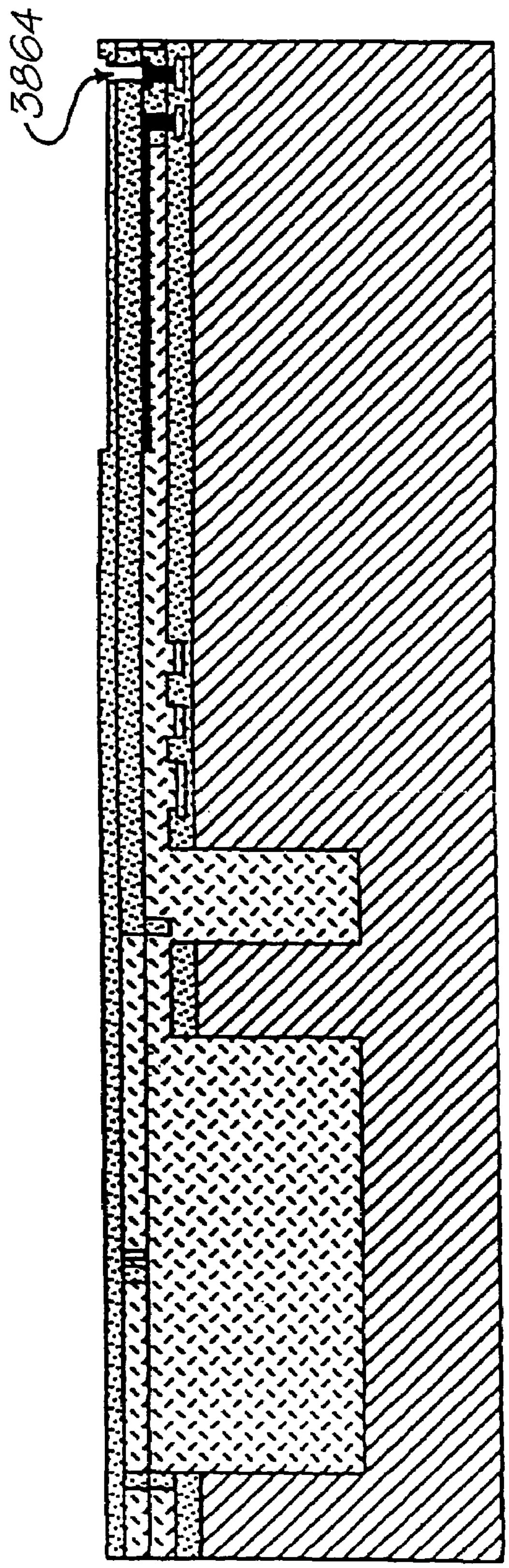

10. As illustrated in FIG. 818, the glass is etched at 3864 down to the cupronickel layer so as to provide for the upper level heater contact.

Figure 819:
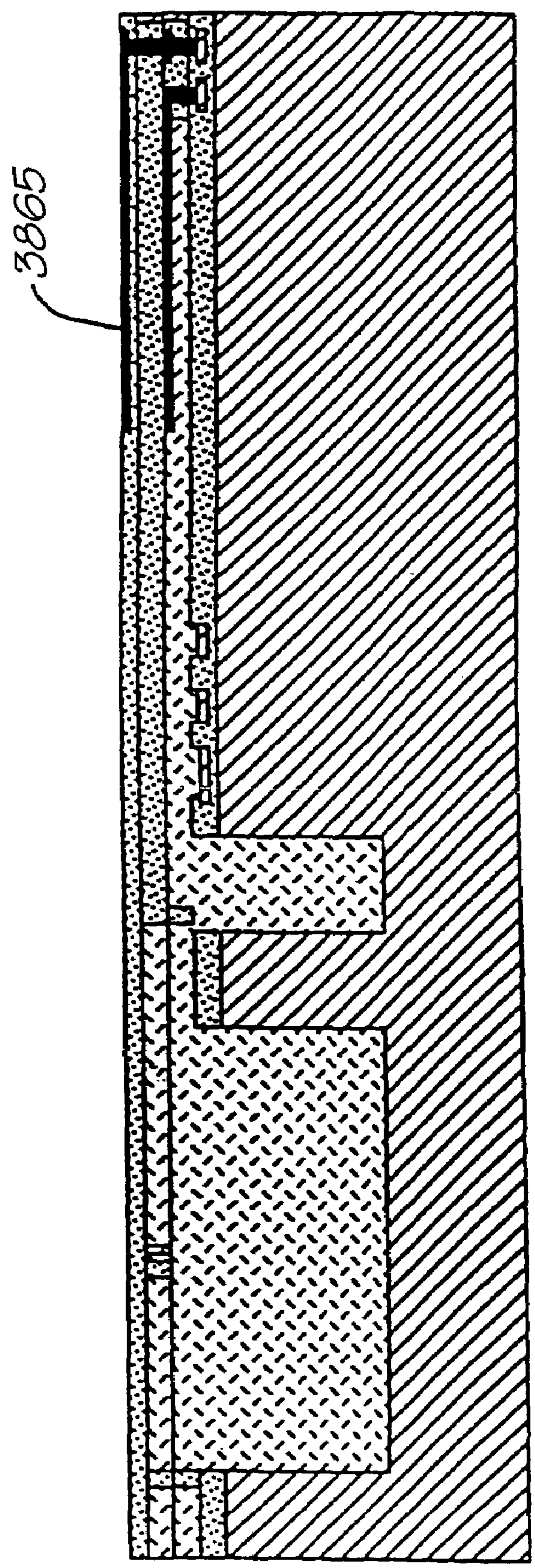

11. Next, as illustrated in FIG. 819, a 3 micron layer of cupronickel alloy is deposited and planarized at 3865 utilizing CMP.

Figure 820:
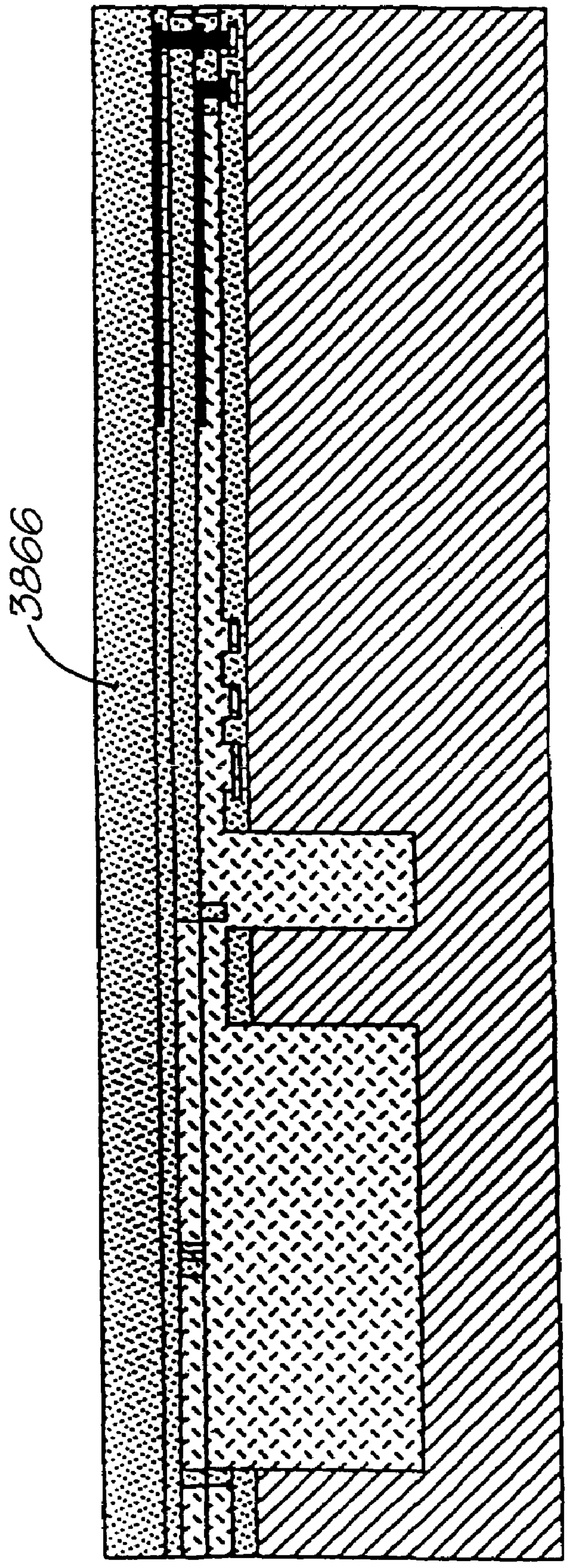

12. Next, as illustrated in FIG. 820, a 7 micron layer of low stress glass 3866 is deposited.

Figure 821:
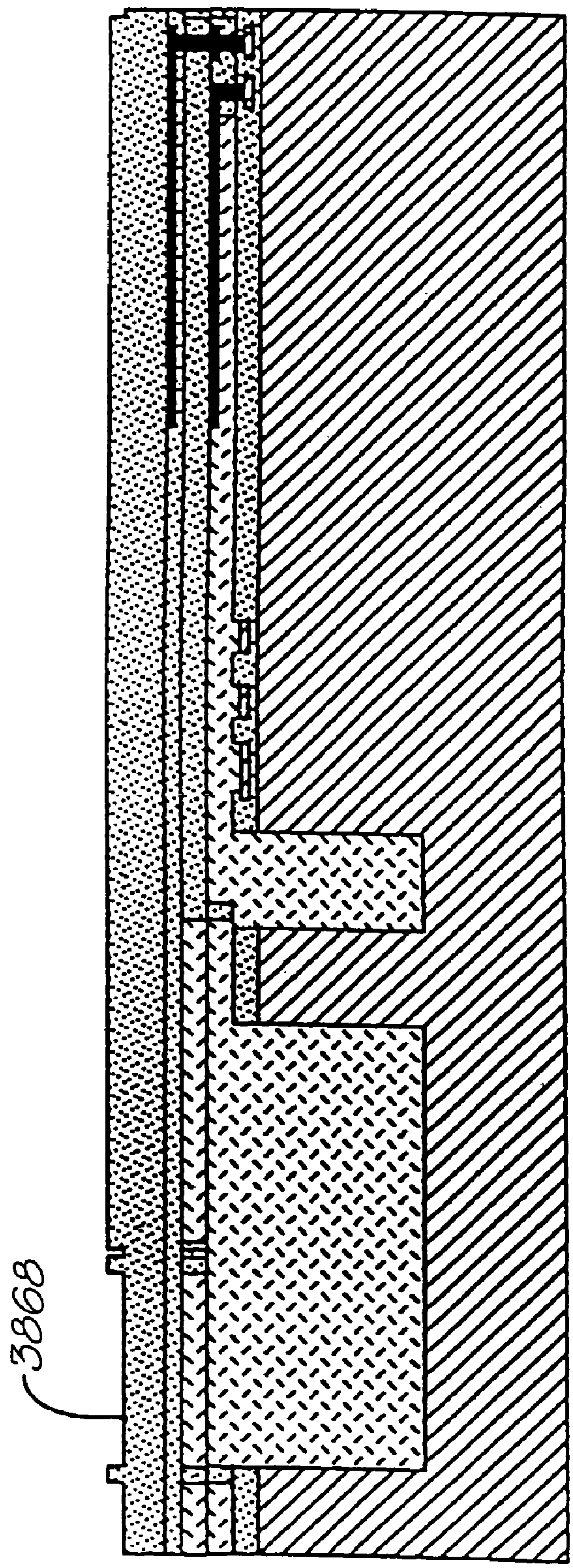

13. Next, as illustrated in FIG. 821 the glass is etched at 3868 to a depth of 2 micron utilizing a mask for the paddle.

Figure 822:
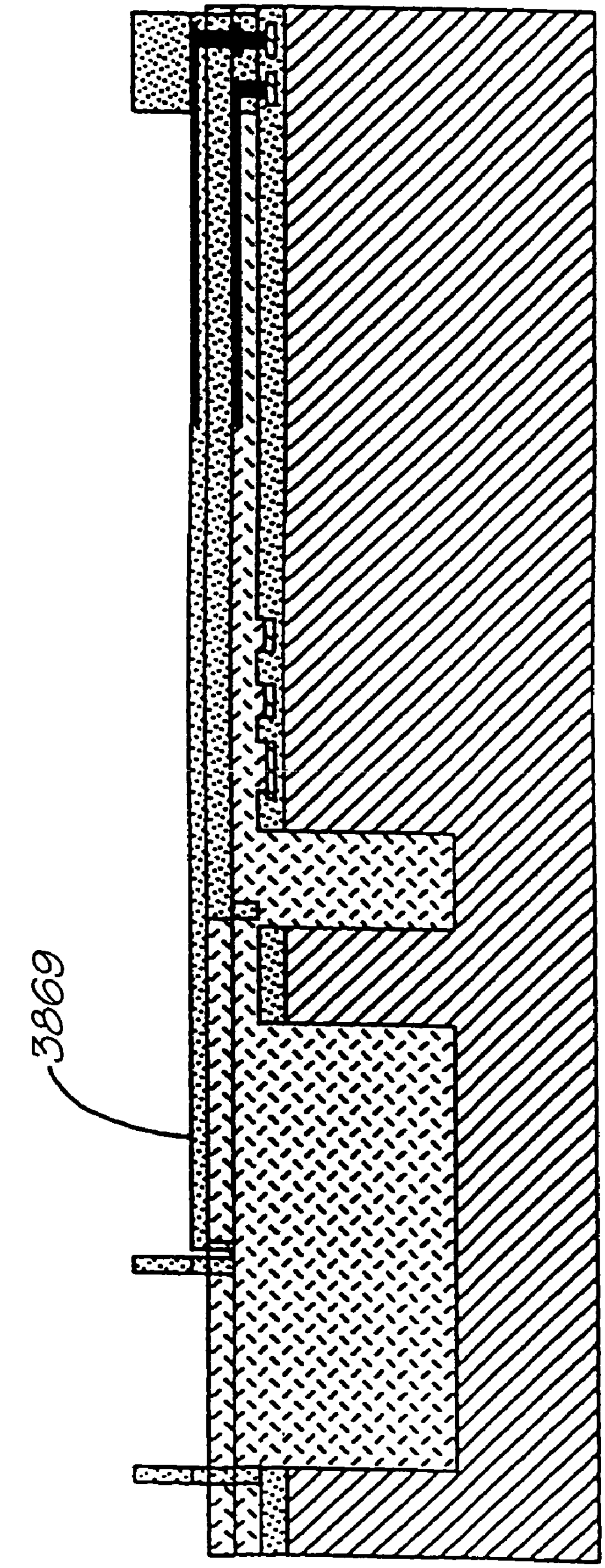

14. Next, as illustrated in FIG. 822, the glass is etched at 3869 to a depth of 7 micron using a mask for the nozzle walls, portions of the actuator and the post portion.

Figure 823:
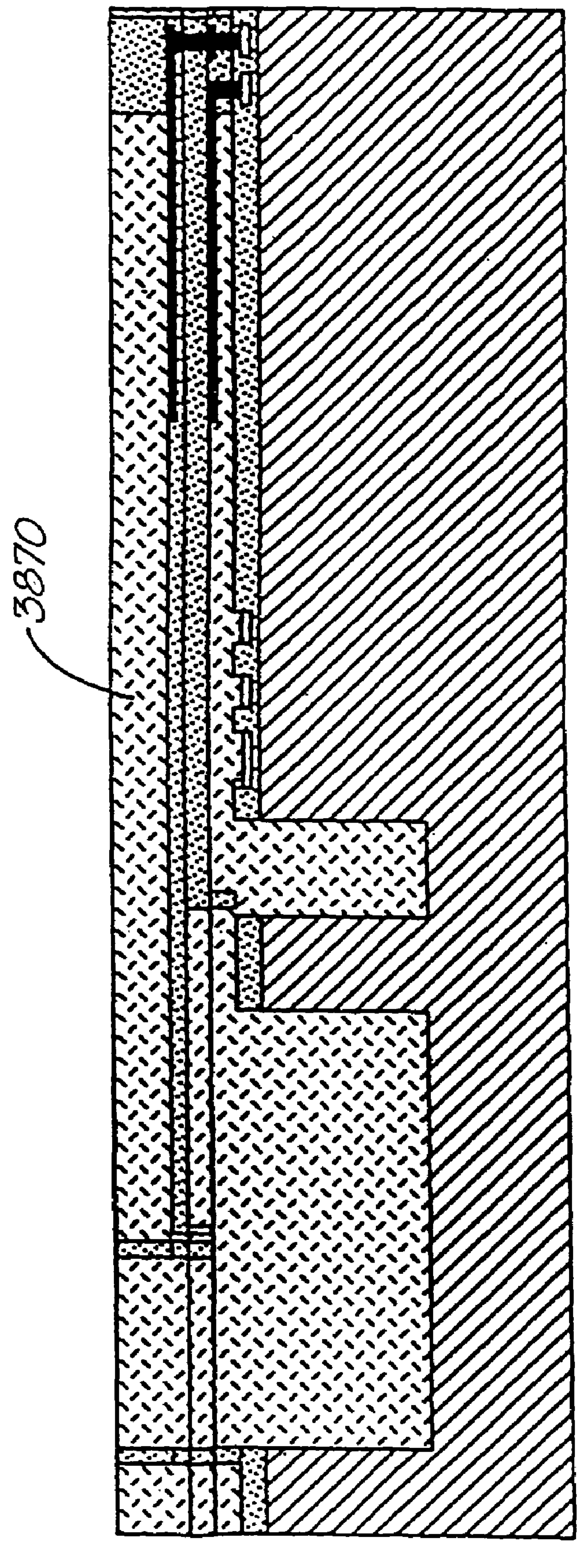

15. Next, as illustrated in FIG. 823, a 9 micron layer of sacrificial material is deposited at 3870 and planarized utilizing CMP.

Figure 824:
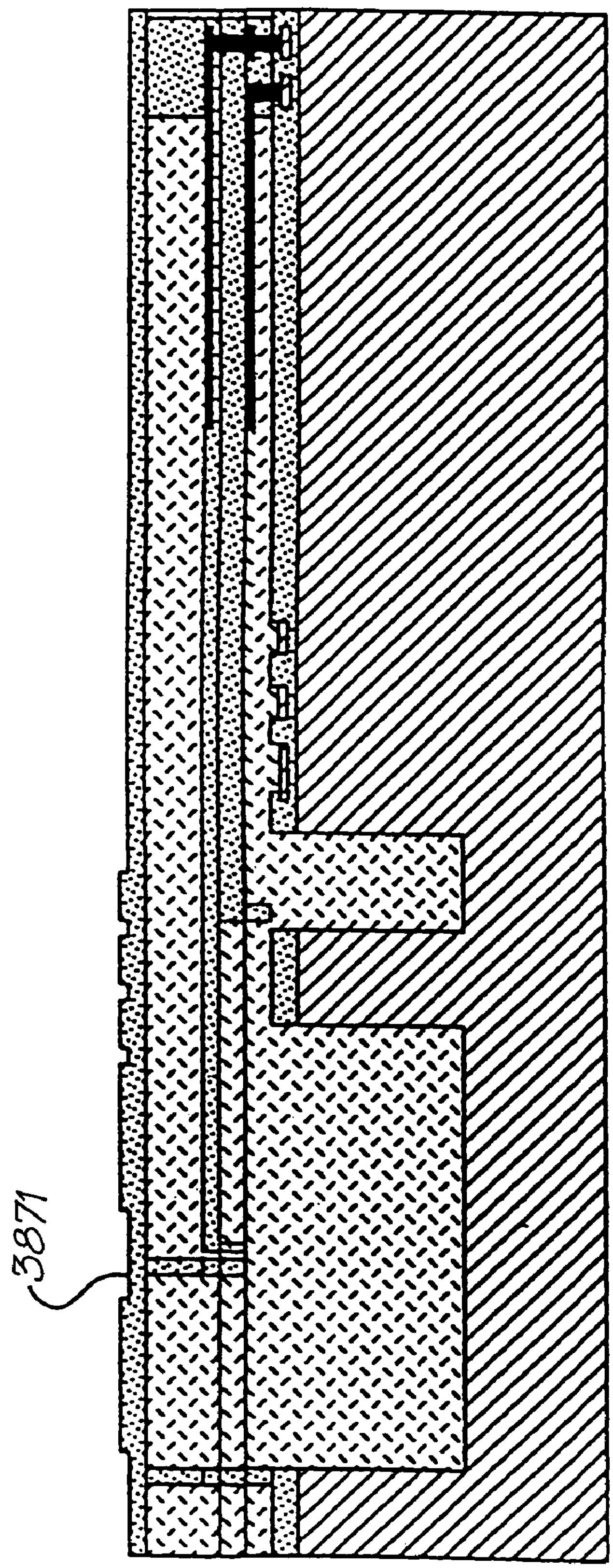

16. Next, as illustrated in FIG. 824, a 3 micron layer of low stress glass is deposited and etched at 3871 to a depth of 1 micron utilizing a nozzle rim mask.

Figure 825:
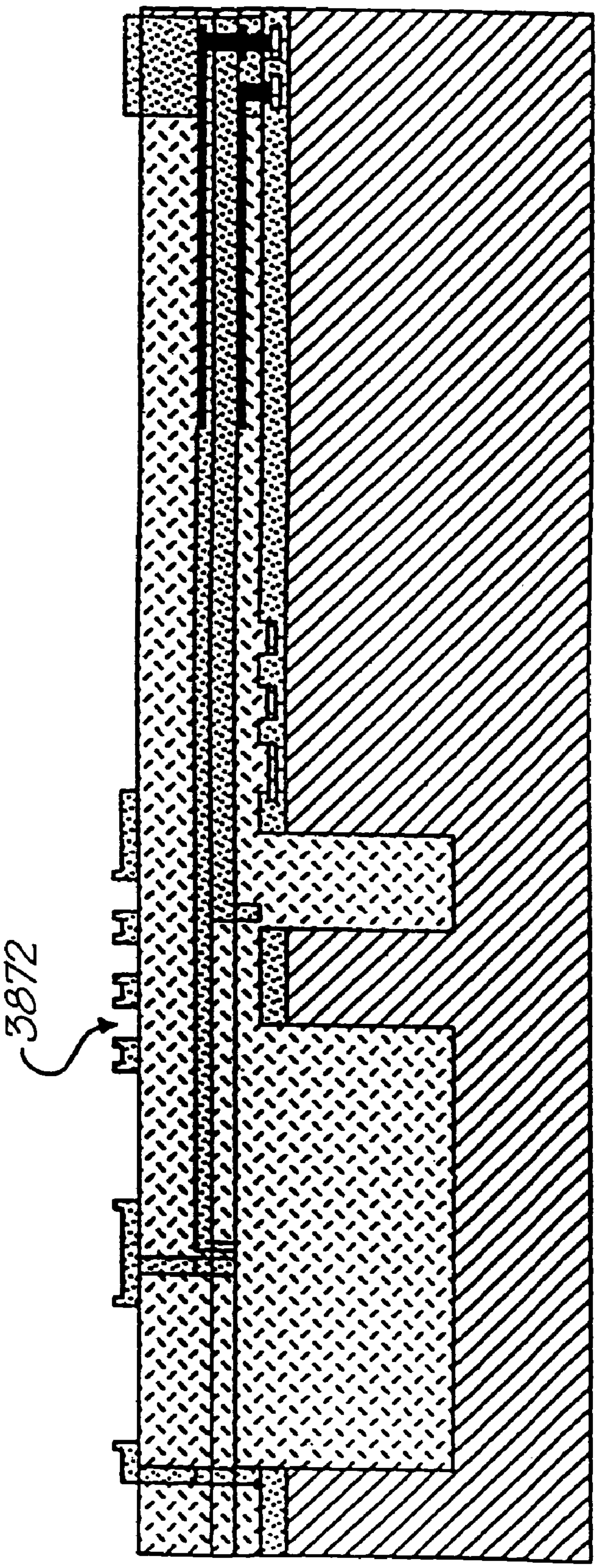

17. Next, as illustrated in FIG. 825, the glass is etched down to the sacrificial layer at 3872 utilizing a nozzle mask.

Figure 826:
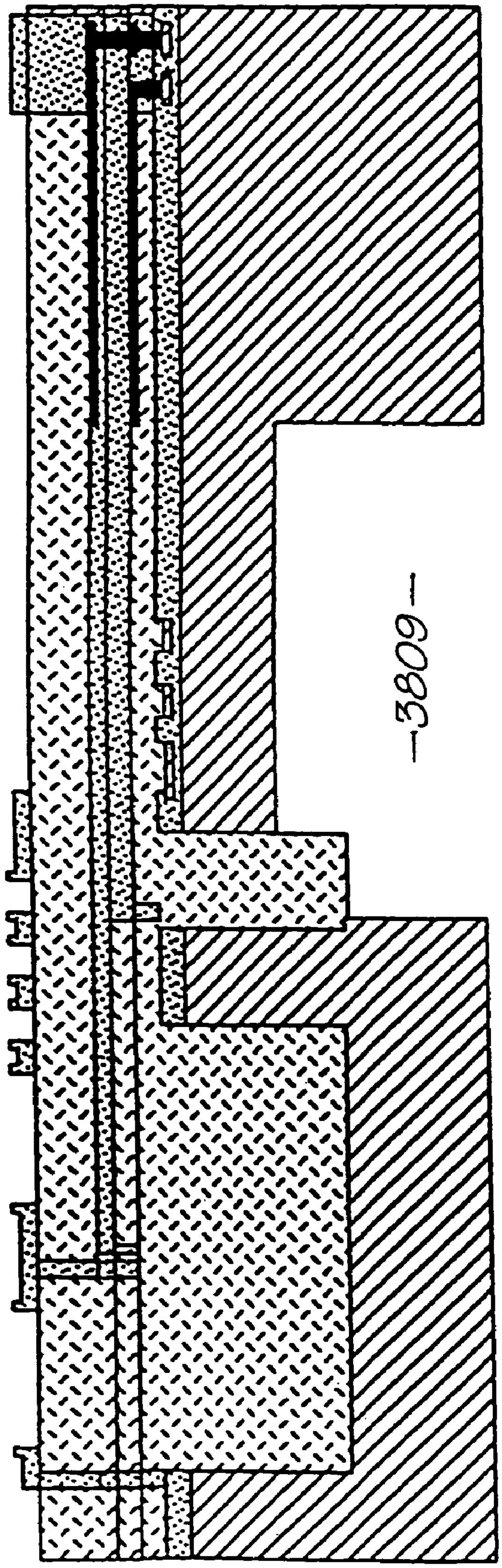

18. Next, as illustrated in FIG. 826, an ink supply channel 3809 is etched through from the back of the wafer utilizing a silicon deep trench etcher which has near vertical side wall etching properties. A suitable silicon trench etcher is the deep silicon trench etcher available from Silicon Technology Systems of the United Kingdom. The printheads can also be "diced" as a result of this etch.

Figure 827:
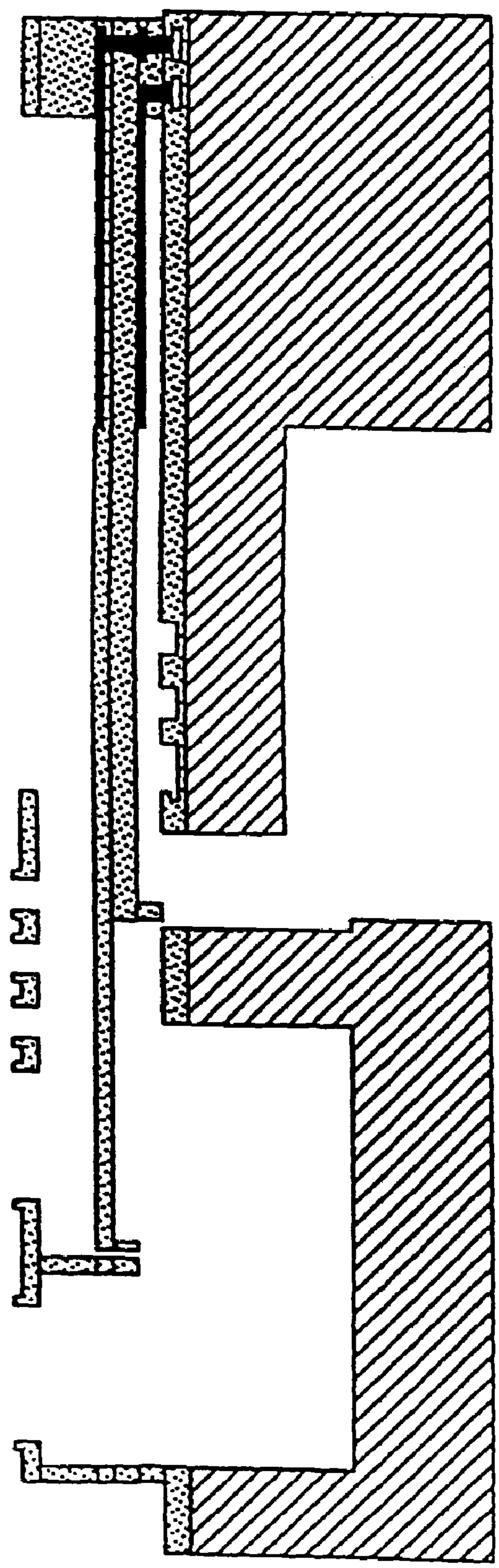

19. Next, as illustrated in FIG. 827, the sacrificial layers are etched away utilizing a wet etch so as release the structure of the printhead.

The printheads can then be washed and inserted in an ink chamber molding for providing an ink supply to the back of the wafer so to allow ink to be supplied via the ink supply channel. The printhead can then have one edge along its surface TAB bonded to external control lines and preferably a thin anti-corrosion layer of ECR diamond-like carbon deposited over its surfaces so as to provide for anti corrosion capabilities.

Turning now to FIG. 828, there is illustrated a portion 3880 of a full color printhead which is divided into three series 3881, 3882 and 3883 of nozzle arrangements 3801 (FIG. 807). Each series can supply a separate color via a corresponding ink supply channel. Each series is further subdivided into two sub-rows 3886, 3887 with the relevant nozzle arrangements of each sub-row being fired simultaneously with one sub-row being fired a predetermined time after a second sub-row such that a line of ink drops is formed on a page.

As illustrated in FIG. 828 the actuators are formed in a curved relationship with respect to a line on which each series of nozzle arrangements 3801 lies, so as to provide for a compact packing of the nozzle arrangements. Further, the block portion 3818 of FIG. 807 is formed in a wall of an adjacent series with the block portion of the row 3883 being formed in a separate guide rail 3890 provided as an abutment surface for the TAB strip when it is abutted against the guide rail 3890 so as to provide for an accurate registration of the tab strip with respect to the bond pads 3891, 3892 which are provided along the length of the printhead so as to provide for low impedance driving of the actuators.

Figure 830:
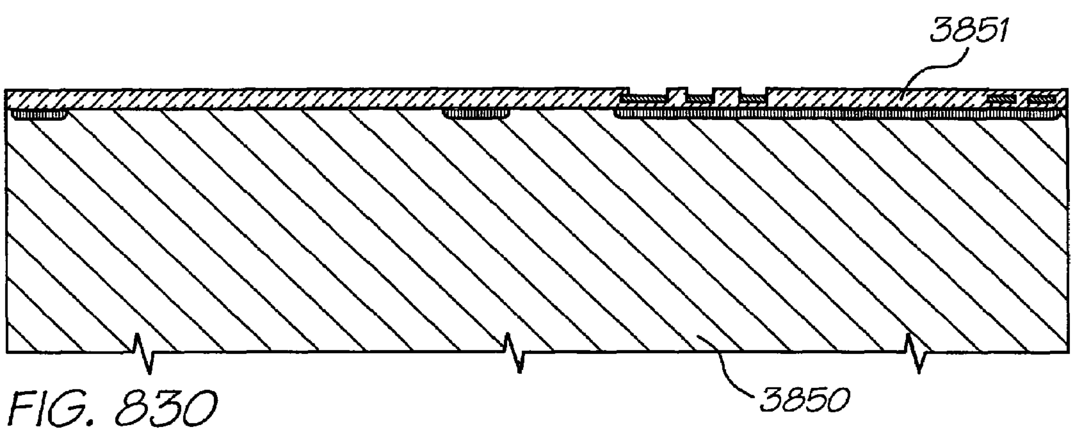

One form of detailed manufacturing process which can be used to fabricate monolithic ink jet printheads operating in accordance with the principles taught by the present embodiment can proceed utilizing the following steps:

1. Using a double sided polished wafer 3850, Complete drive transistors, data distribution, and timing circuits using a 0.5 micron, one poly, 2 metal CMOS process 3851. This step is shown in FIG. 830. For clarity, these diagrams may not be to scale, and may not represent a cross section though any single plane of the nozzle. FIG. 829 is a key to representations of various materials in these manufacturing diagrams, and those of other cross referenced ink jet configurations.

2. Etch oxide down to silicon or aluminum using Mask 1. This mask defines the pit underneath the paddle, the anti-wicking pits at the actuator entrance to the nozzle chamber, as well as the edges of the print heads chip.

Figure 831:
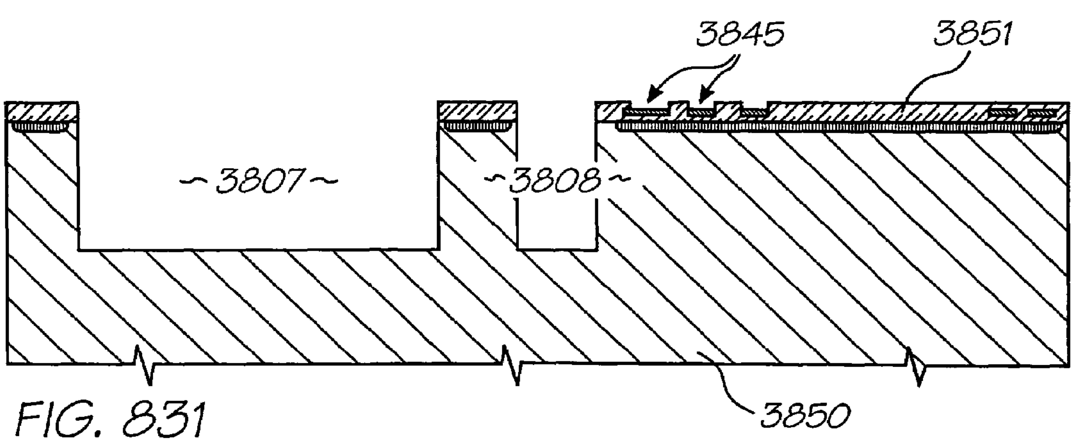

3. Etch silicon to a depth of 20 microns using etched oxide as a mask. The sidewall slope of this etch is not critical (60 to 90 degrees is acceptable), so standard trench etchers can be used. This step is shown in FIG. 831.

4. Deposit 23 microns of sacrificial material 3852 (e.g. polyimide or aluminum). Planarize to a thickness of 3 microns over the chip surface using CMP.

Figure 832:
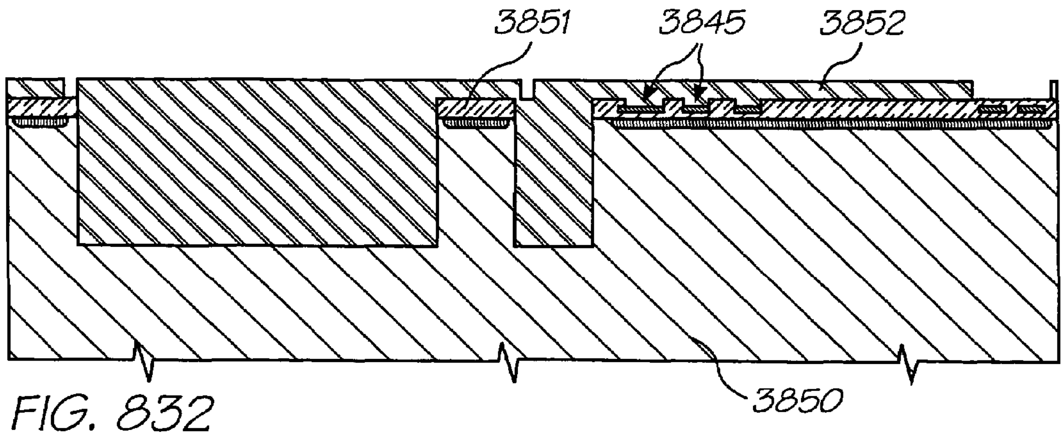

5. Etch the sacrificial layer using Mask 2, which defines the nozzle walls and actuator anchor. This step is shown in FIG. 832.

6. Deposit 3 microns of PECVD glass 3853 and planarize using CMP.

Figure 833:
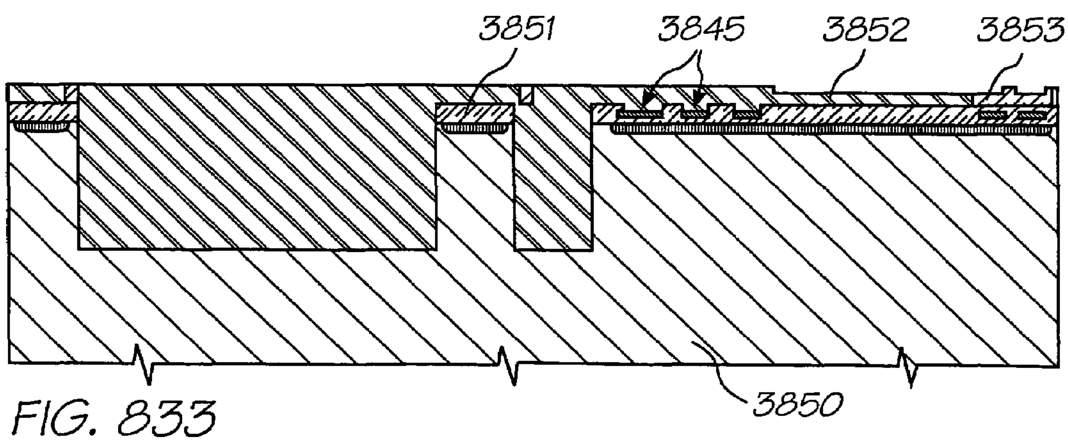

7. Etch the sacrificial material to a depth of 1.1 microns, and glass to a depth of at least 1.1 microns, using Mask 3. This mask defined the lower heater. This step is shown in FIG. 833.

Figure 834:
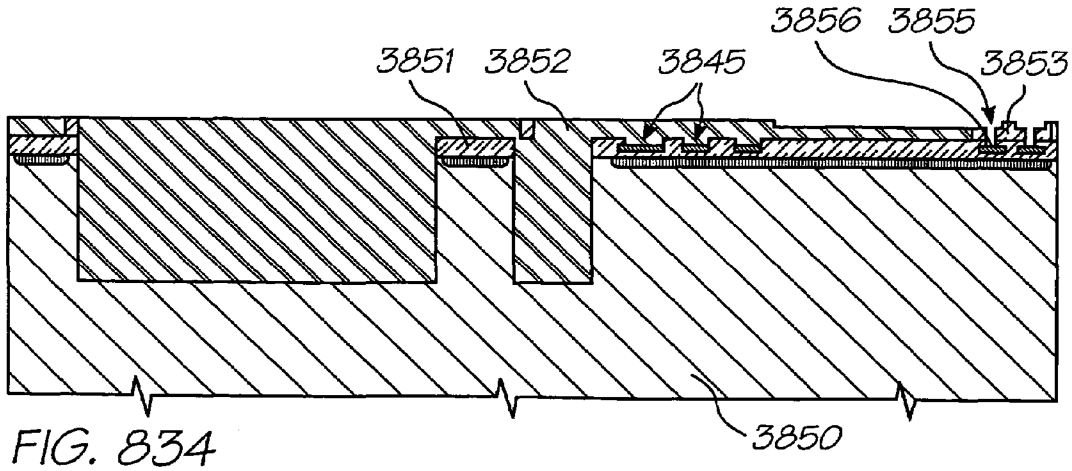

8. Etch the glass layer down to aluminum using Mask 4, defining heater vias. This step is shown in FIG. 834.

9. Deposit 3 microns of heater material 3857 (e.g. cupronickel [Cu: 60%, Ni: 40%] or TiN). If cupronickel, then deposition can consist of three steps-a thin anti-corrosion layer of, for example, TiN, followed by a seed layer, followed by electroplating of the cupronickel.

Figure 835:
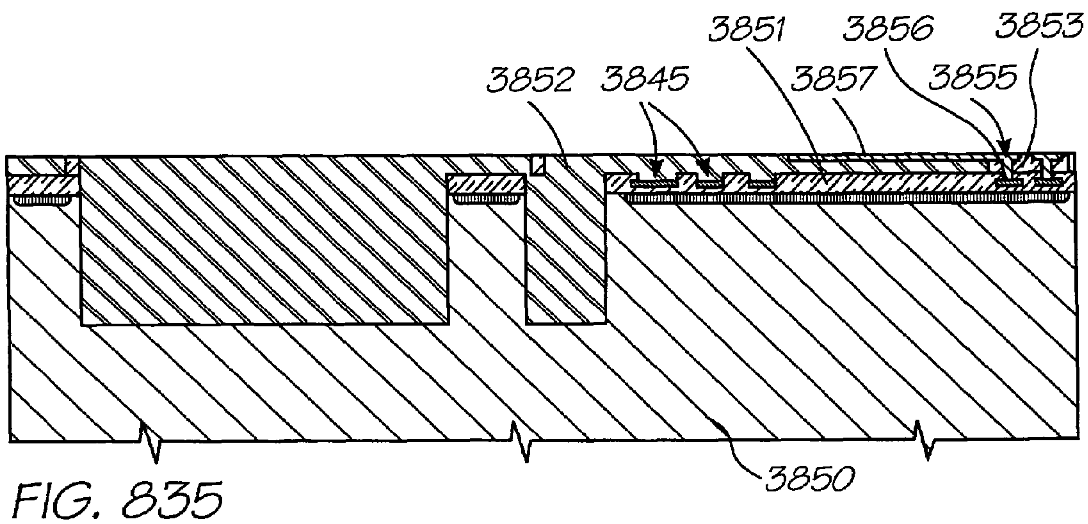

10. Planarize down to the sacrificial layer using CMP. Steps 7 to 10 form a 'dual damascene' process. This step is shown in FIG. 835.

Figure 836:
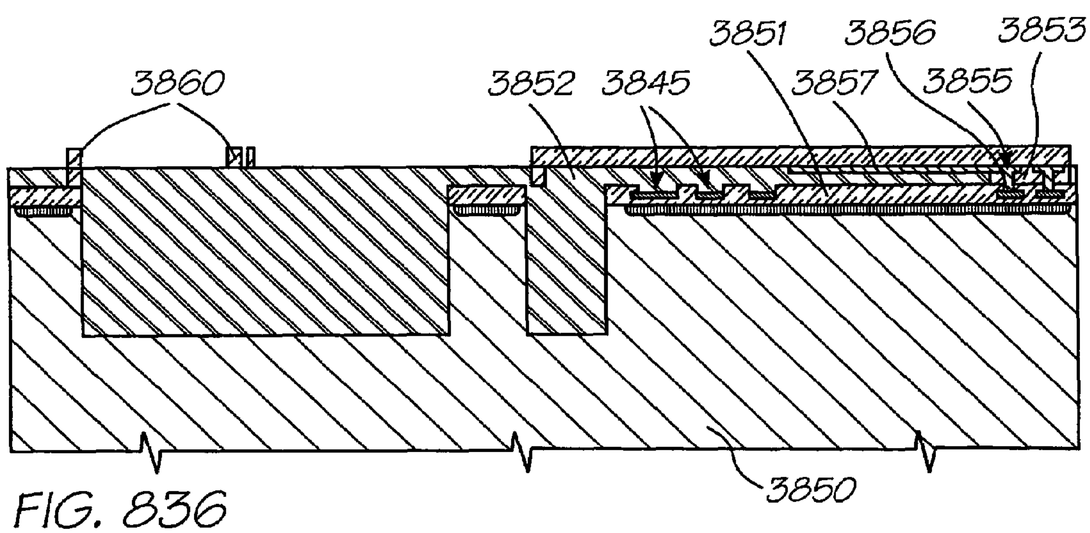

11. Deposit 3 microns of PECVD glass 3860 and etch using Mask 5. This mask defines the actuator arm and the second layer of the nozzle chamber wall. This step is shown in FIG. 836.

12. Deposit 3 microns of sacrificial material 3861 and planarize using CUT.

13. Deposit 2 microns of PECVD glass 3863.

Figure 837:
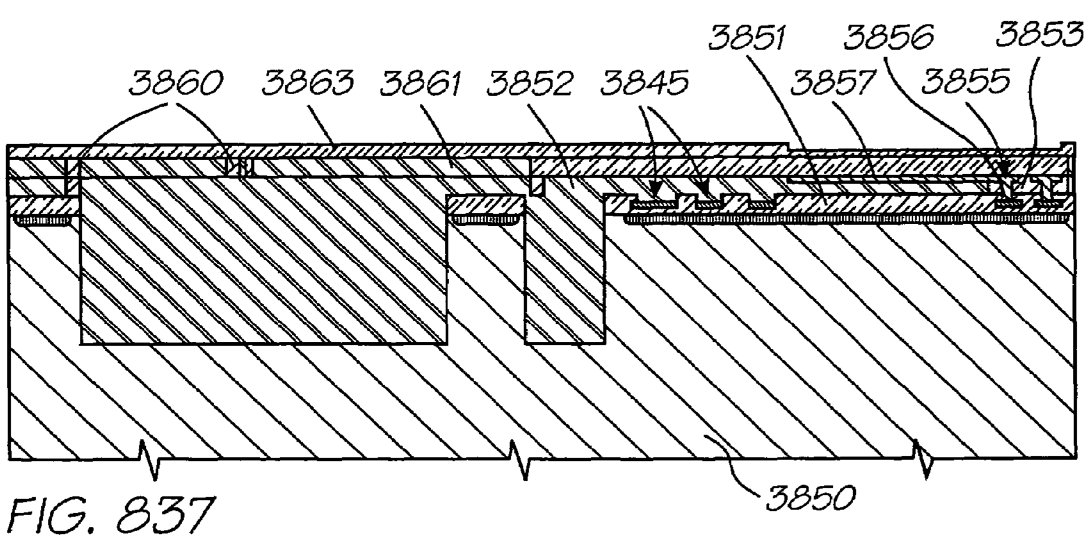

14. Etch the glass to a depth of 1.1 microns, using Mask 6. This mask defined the upper heater. This step is shown in FIG. 837.

Figure 838:
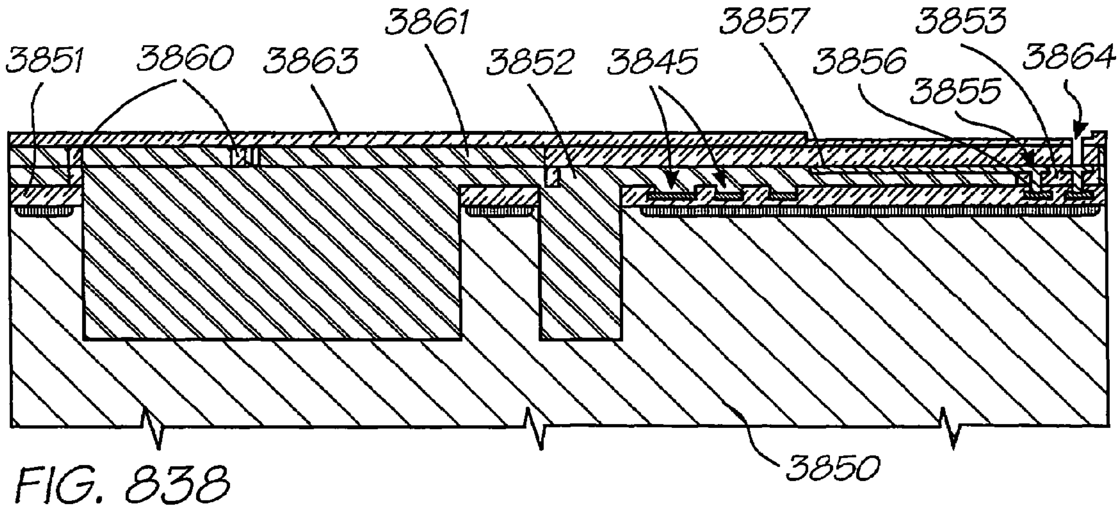

15. Etch the glass layer down to heater material using Mask 7, defining the upper heater vias 3864. This step is shown in FIG. 838.

16. Deposit 3 microns of the same heater material 3865 as step 9.

Figure 839:
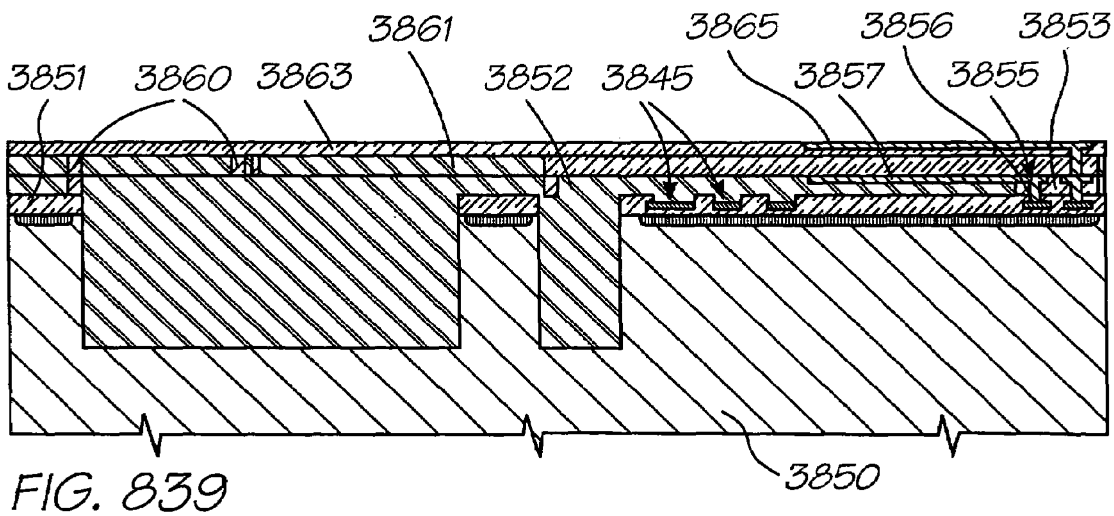

17. Planarize down to the glass layer using CMP. Steps 14 to 17 form a second dual damascene process. This step is shown in FIG. 839.

Figure 840:
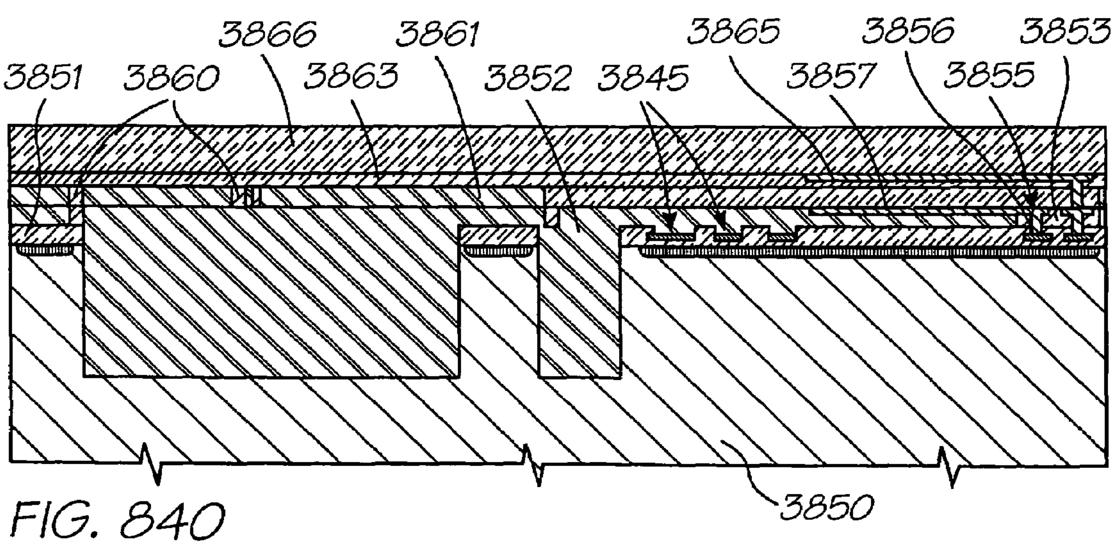

18. Deposit 7 microns of PECVD glass 3866. This step is shown in FIG. 840.

Figure 841:
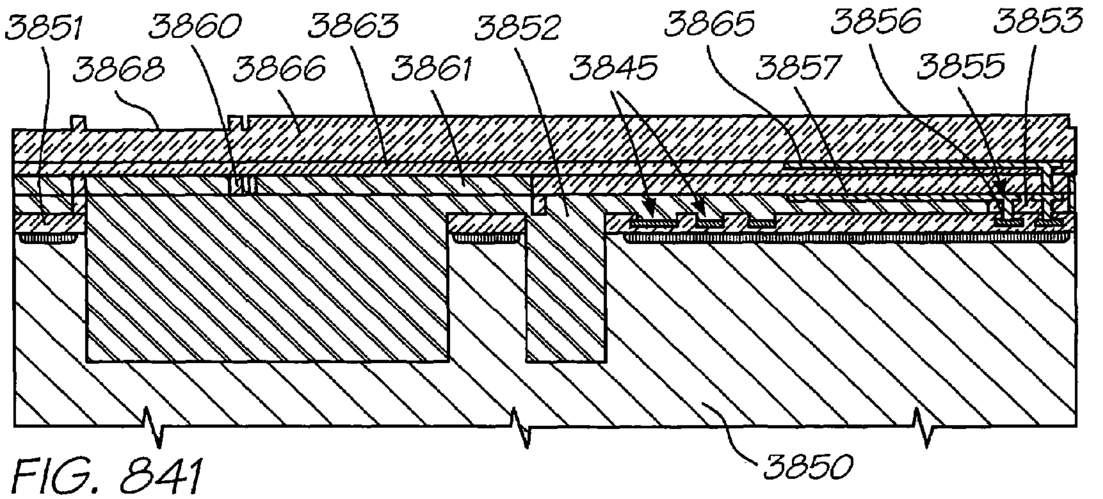

19. Etch glass to a depth of 2 microns using Mask 8. This mask defines the paddle, actuator, actuator anchor, as well as the nozzle walls. This step is shown in FIG. 841.

Figure 842:
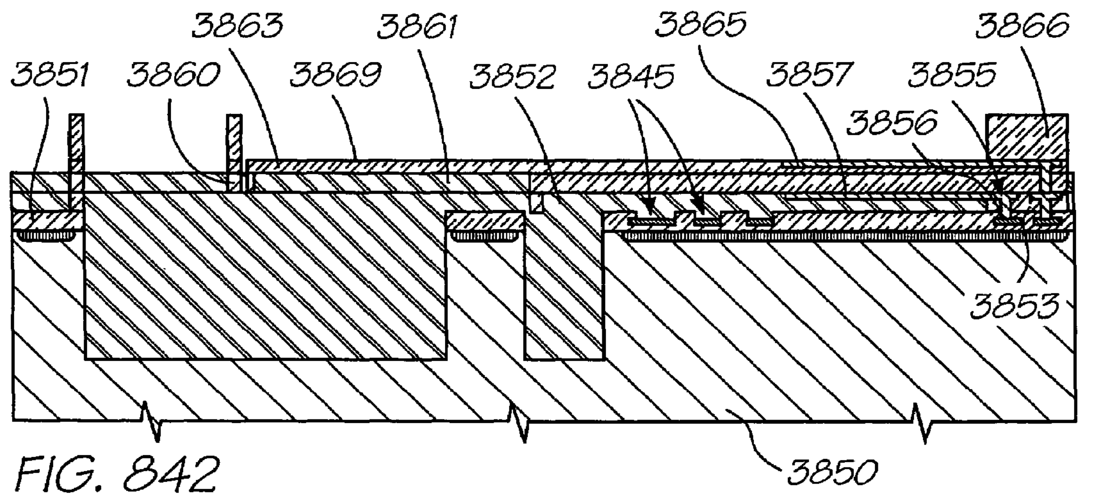

20. Etch glass to a depth of 7 microns (stopping on sacrificial material in exhaust gasses) using Mask 9. This mask defines the nozzle walls and actuator anchor. This step is shown in FIG. 842.

Figure 843:
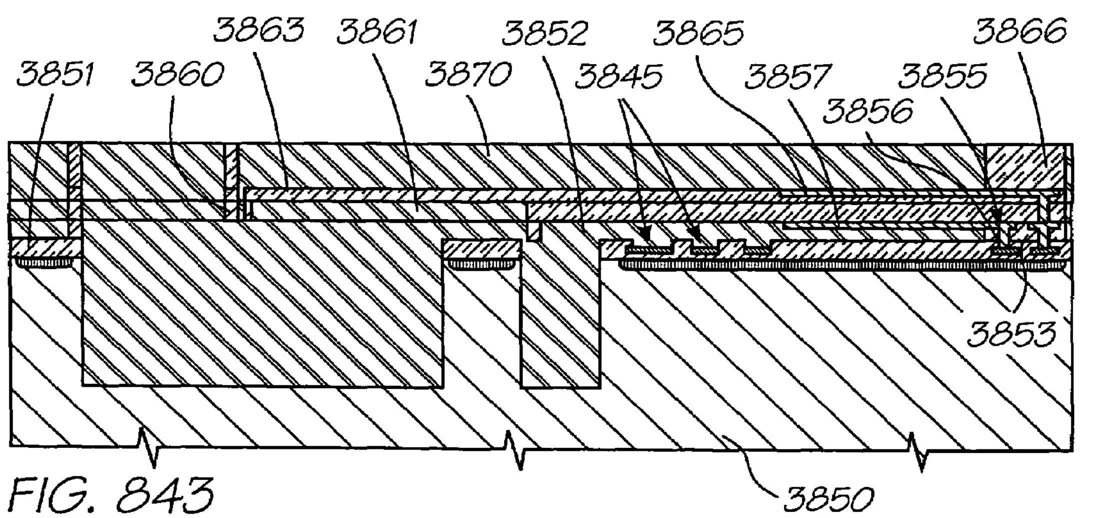

21. Deposit 9 microns of sacrificial material 3870 and planarize down to glass using CMP. This step is shown in FIG. 843.

22. Deposit 3 microns of PECVD glass 3871.

Figure 844:
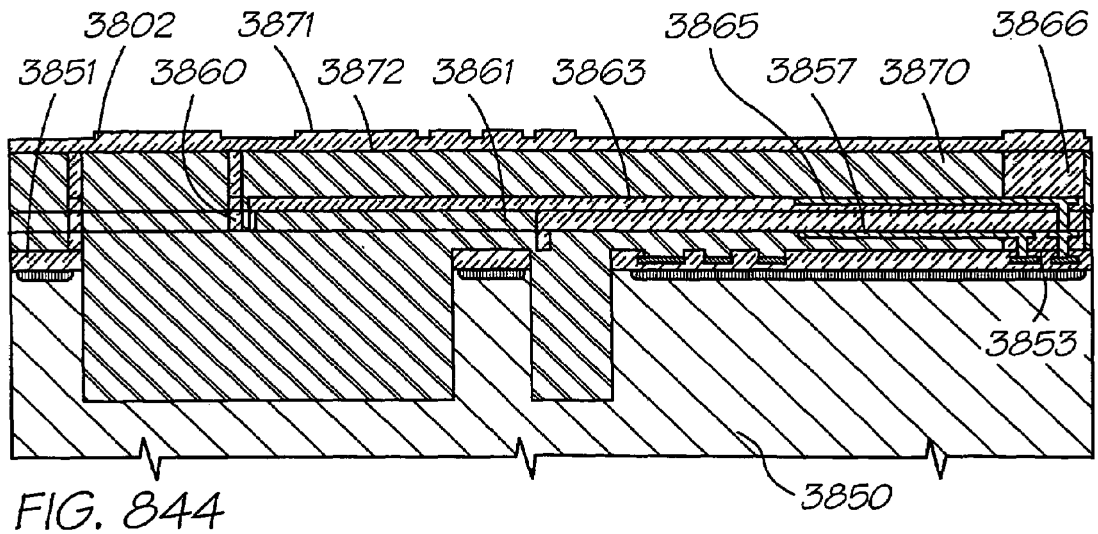

23. Etch glass to a depth of 1 micron using Mask 10, which defines the nozzle rims 3802. This step is shown in FIG. 844.

Figure 845:
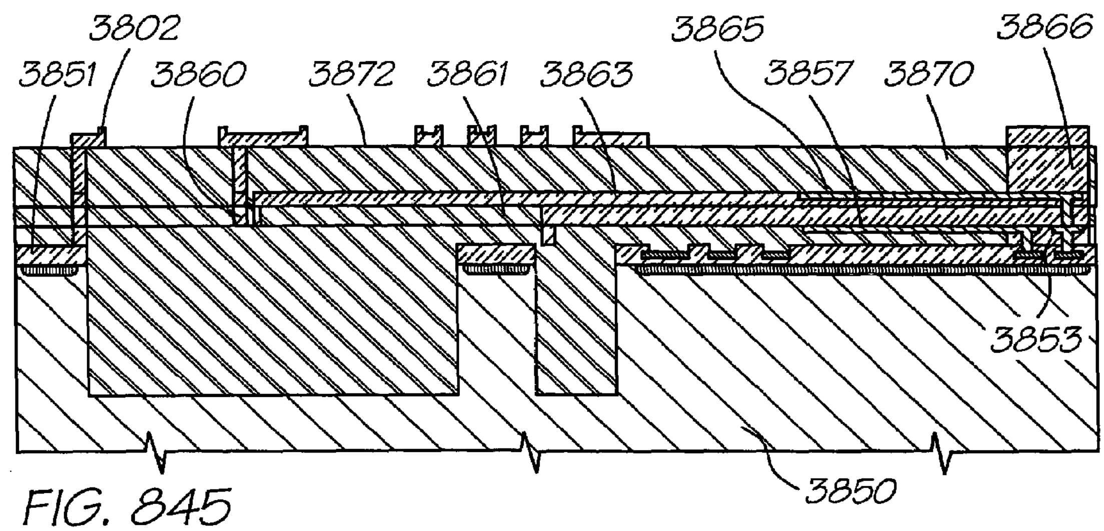

24. Etch glass down to the sacrificial layer (3 microns) using Mask 11, defining the nozzles and the nozzle chamber roof. This step is shown in FIG. 845.

25. Wafer probe. All electrical connections are complete at this point, bond pads are accessible, and the chips are not yet separated.

Figure 846:
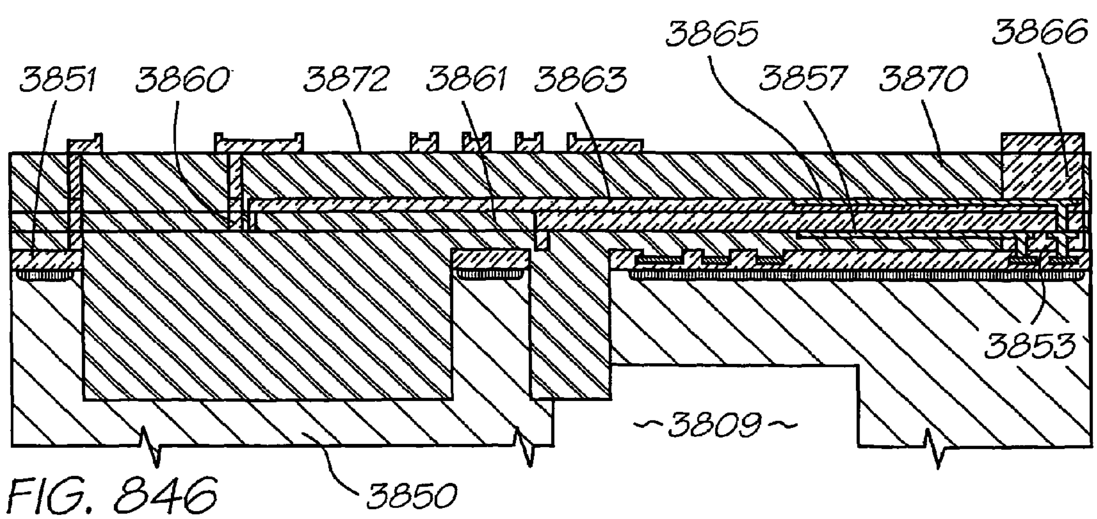

26. Back-etch silicon wafer to within approximately 15 microns of the front surface using Mask 8. This mask defines the ink inlets 3809 which are etched through the wafer. The wafer is also diced by this etch. This etch can be achieved with, for example, an ASE Advanced Silicon Etcher from Surface Technology Systems. This step is shown in FIG. 846.

Figure 847:
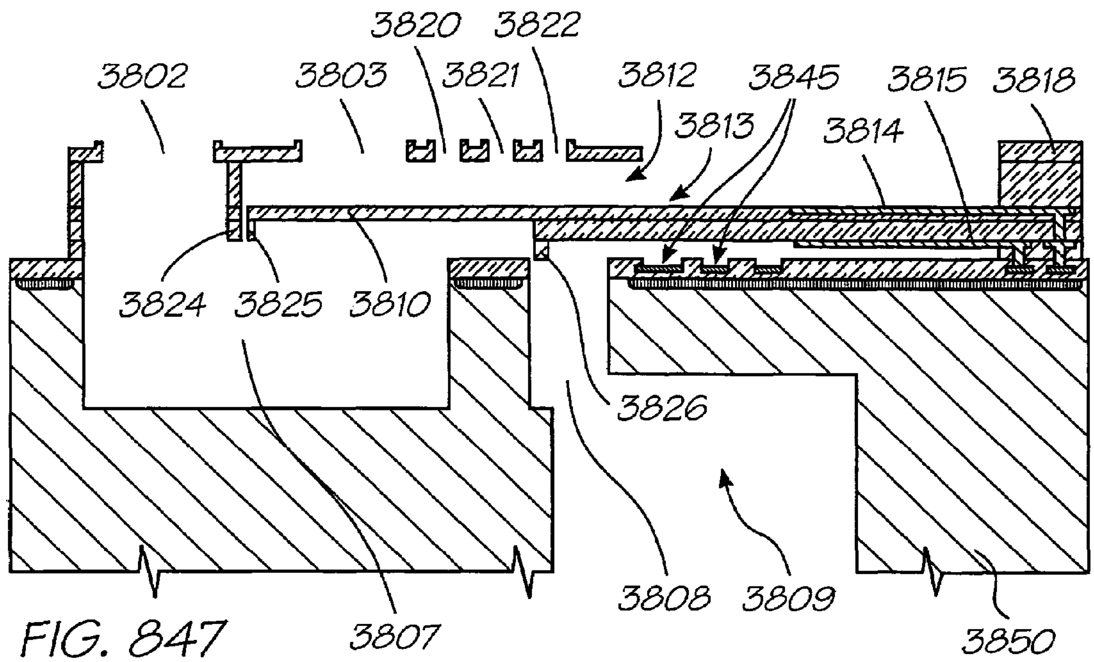

27. Etch the sacrificial material. The nozzle chambers are cleared, the actuators freed, and the chips are separated by this etch This step is shown in FIG. 847.

28. Mount the print heads in their packaging, which may be a molded plastic former incorporating ink channels which supply the appropriate color ink to the ink inlets at the back of the wafer.

29. Connect the print heads to their interconnect systems. For a low profile connection with minimum disruption of airflow, TAB may be used. Wire bonding may also be used if the printer is to be operated with sufficient clearance to the paper.

30. Hydrophobize the front surface of the print heads.

Figure 848:
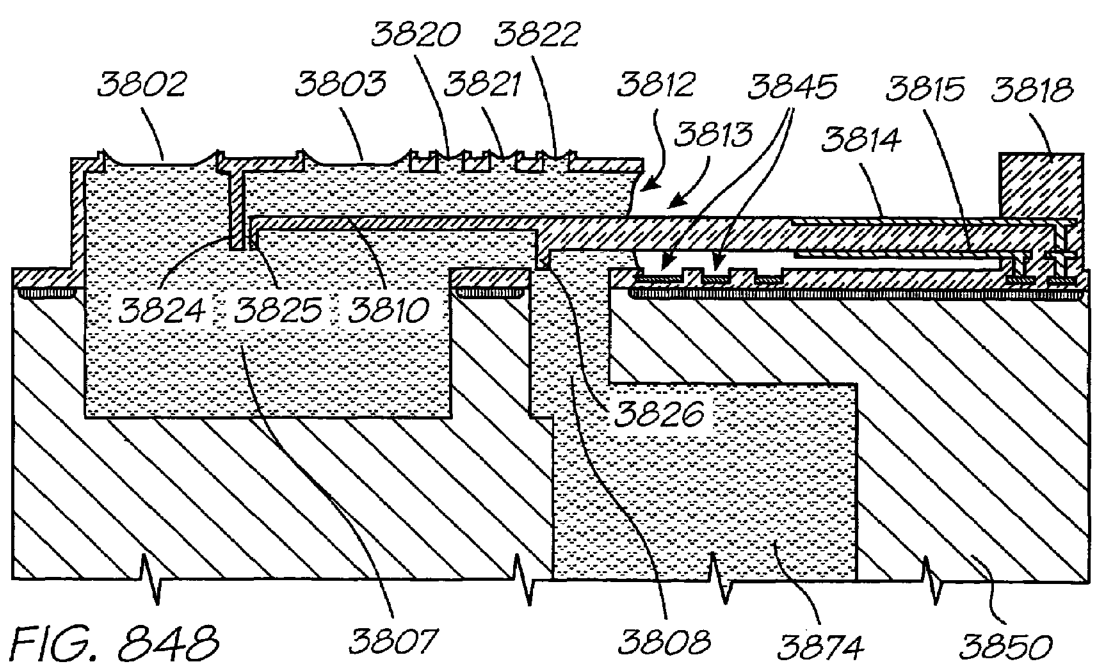

31. Fill the completed print heads with ink 3874 and test them. A filled nozzle is shown in FIG. 848.

IJ39

In a preferred embodiment, an inkjet printing system is provided having an ink ejection nozzle arrangement such that a paddle actuator type device is utilized to eject ink from a refillable nozzle chamber. As a result of the construction processes utilized, the paddle is generally of a "cupped" shape. The cup shape provides for the alleviation of a number of the aforementioned problems. The paddle is interconnected to a thermal actuator device which is thermally actuated by means of passing a current through a portion of the thermal actuator, so as to cause the ejection of ink therefrom. Further, the cupped paddle allows for a suitable construction process which does not require the formation of thick surface layers during the process of construction. This means that thermal stresses across a series of devices constructed on a single wafer are minimized.

Turning initially to FIGS. 849-851, there will now be explained the operational principles of a preferred embodiment In FIG. 849 there is illustrated an inkjet nozzle arrangement 3901 having a nozzle chamber 3902 which is normally filled with ink from a supply channel 3903 such that a meniscus 3904 forms across the ink ejection aperture of the nozzle arrangement Inside the nozzle arrangement, a cupped paddle actuator 3905 is provided and interconnected to an actuator arm 3906 which, when in a quiescent position, is bent downwards. The lower surface of the actuator arm 3906 includes a heater element 3908 which is constructed of material having a high "bend efficiency".

Preferably, the heater element has a high bend efficiency wherein the bend efficiency is defined as:

$$\text{bend efficiency} = \frac{\text{Young's Modulus} \times (\text{Coefficient of thermal Expansion})}{\text{Density} \times \text{Specific Heat Capacity}}$$

A suitable material can be a copper nickel alloy of 60% copper and 40% nickel, hereinafter called (cupronickel). which can be formed below a glass layer so as to bend the glass layer.

In its quiescent position, the arm 3906 is bent down by the element 3908. When it is desired to eject a droplet of ink from the nozzle chamber 3902, a current is passed through the actuator arm 3908 by means of an interconnection provided by a post 3909. The heater element 3908 is heated and expands with a high bend efficiency thereby causing the arm 3906 to move upwards as indicated in FIG. 850. The upward movement of the actuator arm 3906 causes the cupped paddle 3905 to also move up which results in a general increase in pressure within the nozzle chamber 3902 in the area surrounding the meniscus 3904. This results in a general outflow of ink and a bulging of the meniscus 3904. Next, as indicated in FIG. 851, the heater element 3908 is turned off which results in the general return of the arm 3906 to its quiescent position which further results in a downward movement of the cupped paddle 3905. This results in a general sucking back 3911 of the ink within the nozzle chamber 3902. The forward momentum of the ink surrounding the meniscus and the backward momentum of the ink results in a general necking of the meniscus and the formation of a drop 3912 which proceeds to the surface of the page. Subsequently, the shape of the meniscus 3904 results in a subsequent inflow of ink via the inlet channel 3903 which results in a refilling of the nozzle chamber 3902. Eventually, the state returns to that indicated by FIG. 849.

Turning now to FIG. 852, there is illustrated a side perspective view partly in section of one form of construction, a single nozzle arrangement 3901 in greater detail. The nozzle arrangement 3901 includes a nozzle chamber 3902 which is normally filled with ink. Inside the nozzle chamber 3902 is a paddle actuator 3905 which divides the nozzle chamber from an ink refill supply channel 3903 which supplies ink from a back surface of a silicon wafer 3914.

Outside of the nozzle chamber 3902 is located an actuator arm 3906 which includes a glass core portion and an external cupronickel portion 3908. The actuator arm 3906 interconnects with the paddle 3905 by means of a slot 3919 located in one wall of the nozzle chamber 3902. The slot 3919 is of small dimensions such that surface tension characteristics retain the ink within the nozzle chamber 3902. Preferably, the external portions of the arrangement 3901 are further treated so as to be strongly hydrophobic. Additionally, a pit 3921 is provided around the slot 3919. The pit includes a ledge 3922 with the pit and ledge interacting so as to minimize the opportunities for "wicking" along the actuator arm 3906. Further, to assist of minimizing of wicking, the arm 3906 includes a thinned portion 3924 adjacent to the nozzle chamber 3902 in addition to a right angled wall 3925.

The surface of the paddle actuator 3905 includes a slot 3912. The slot 3912 aids in allowing for the flow of ink from the back surface of paddle actuator 3905 to a front surface. This is especially the case when initially the arrangement is filled with air and a liquid is injected into the refill channel 3903. The dimensions of the slot are such that, during operation of the paddle for ejecting drops, minimal flow of fluid occurs through the slot 3912.

The paddle actuator 3905 is housed within the nozzle chamber and is actuated so as to eject ink from the nozzle 3927 which in turn includes a rim 3928. The rim 3928 assists in minimizing wicking across the top of the nozzle chamber 3902.

The cupronickel element 3908 is interconnected through a post portion 3909 to a lower CMOS layer 3915 which provides for the electrical control of the actuator element.

Each nozzle arrangement 3901, can be constructed as part of an array of nozzles on a silicon wafer device and can be constructed from the utilizing semiconductor processing techniques in addition to micro machining and micro fabrication process technology (MEMS) and a full familiarity with these technologies is hereinafter assumed.

Figure 854A:
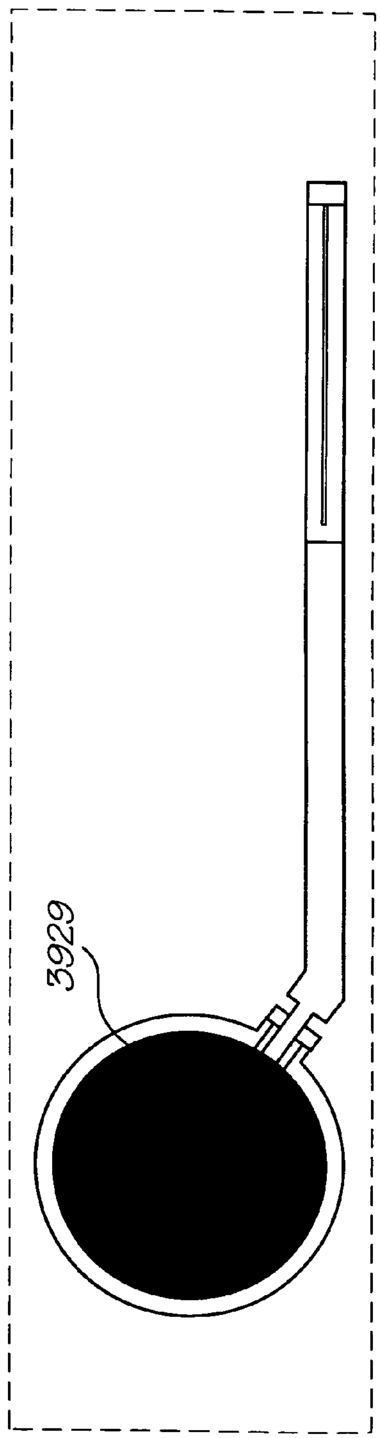
Figure 854B:
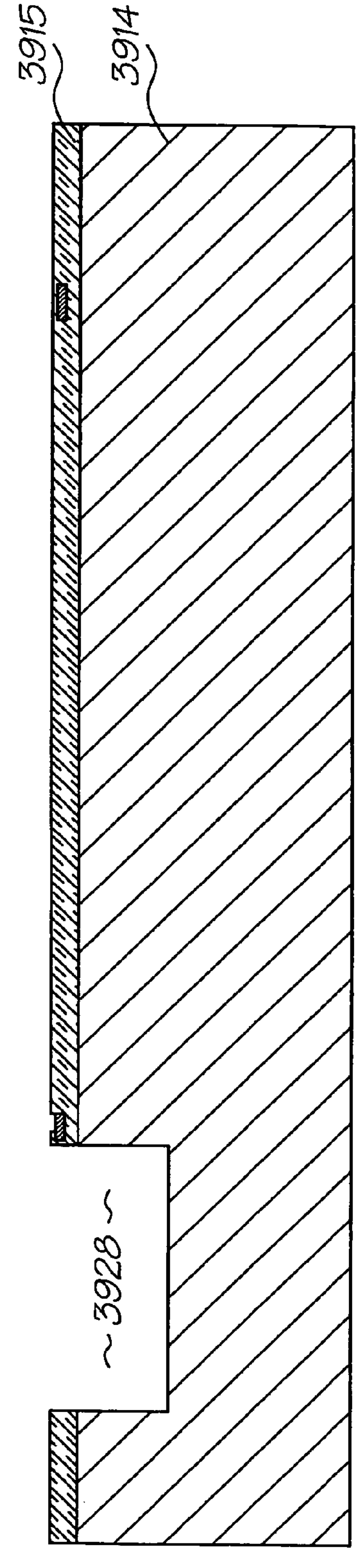

Turning initially to FIG. 854*a* and 854*b*, in FIG. 854*b* there is shown an initial processing step which utilizes a mask having a region as specified in FIG. 854*a*. The initial starting material is preferably a silicon wafer 3914 having a standard 0.25 micron CMOS layer 3915 which includes drive electronics (not shown), the structure of the drive on electronics being readily apparent to those skilled in the art of CMOS integrated circuit designs.

The first step in the construction of a single nozzle is to pattern and etch a pit 3928 to a depth of 13 microns using the mask pattern having regions specified 3929 as illustrated in FIG. 854*a*.

Figure 855A:
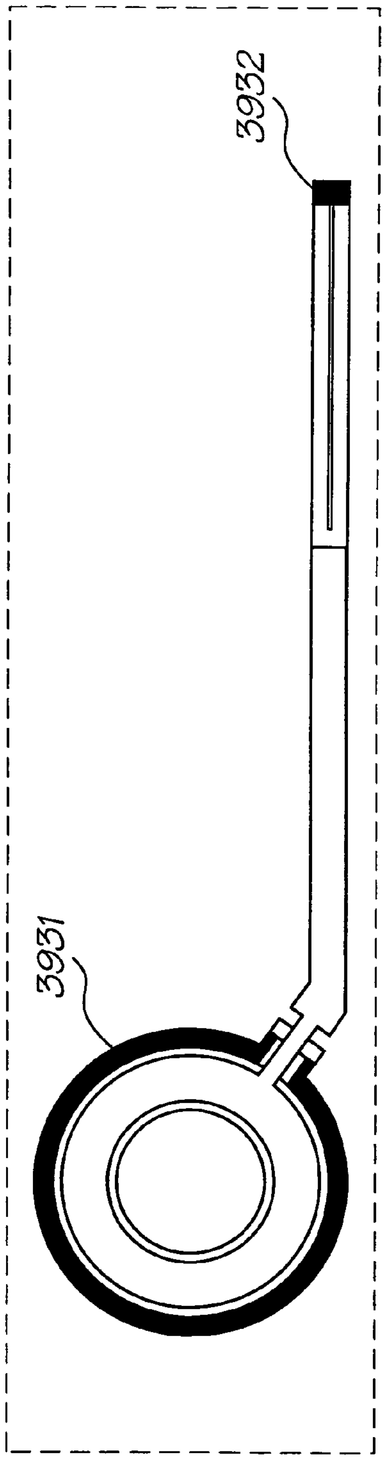
Figure 855B:
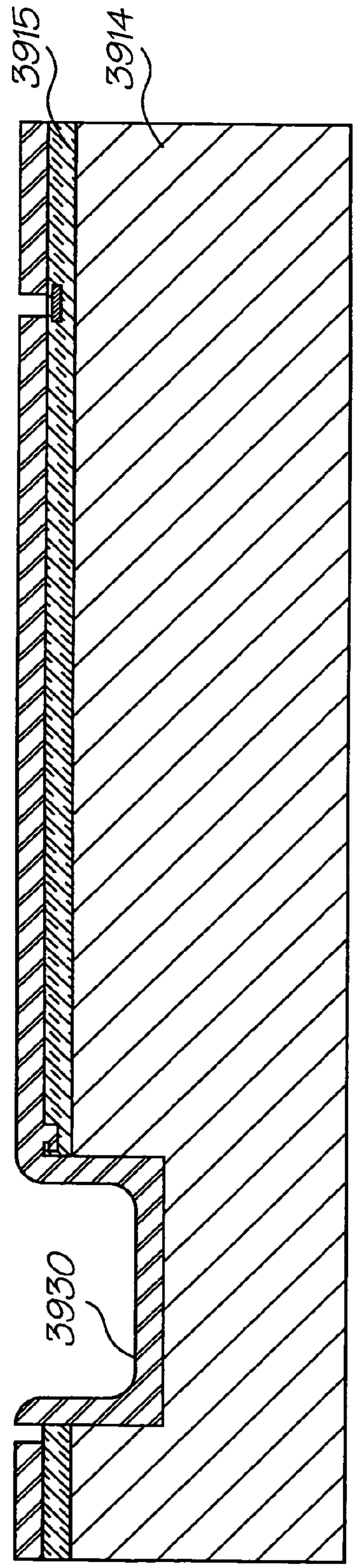

Next, as illustrated in FIG. 855*b*, a 3 micron layer of the sacrificial material 3930 is deposited. The sacrificial material can comprise aluminum. The sacrificial material 3930 is then etched utilizing a mask pattern having portions 3931 and 3932 as indicated at FIG. 855*a*.

Figure 856A:
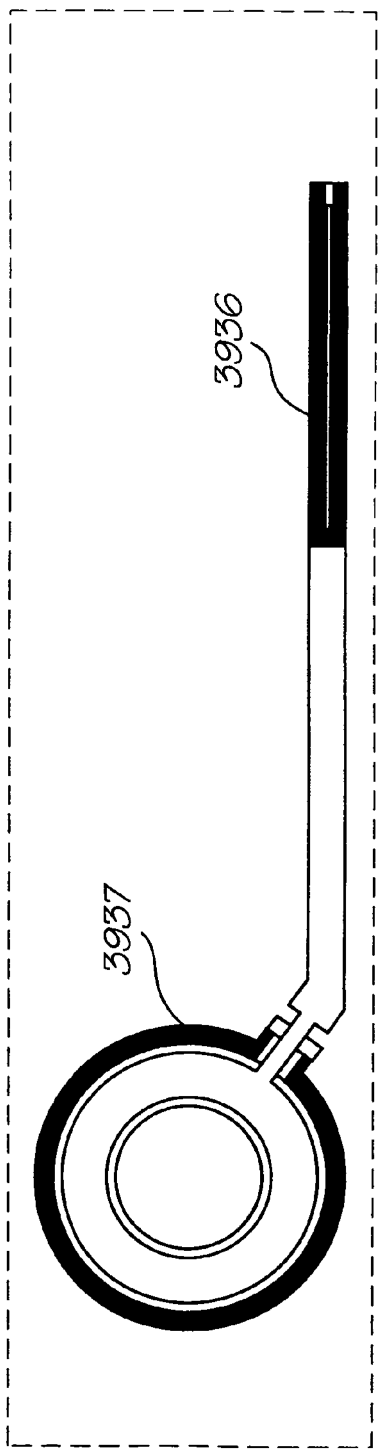
Figure 856B:
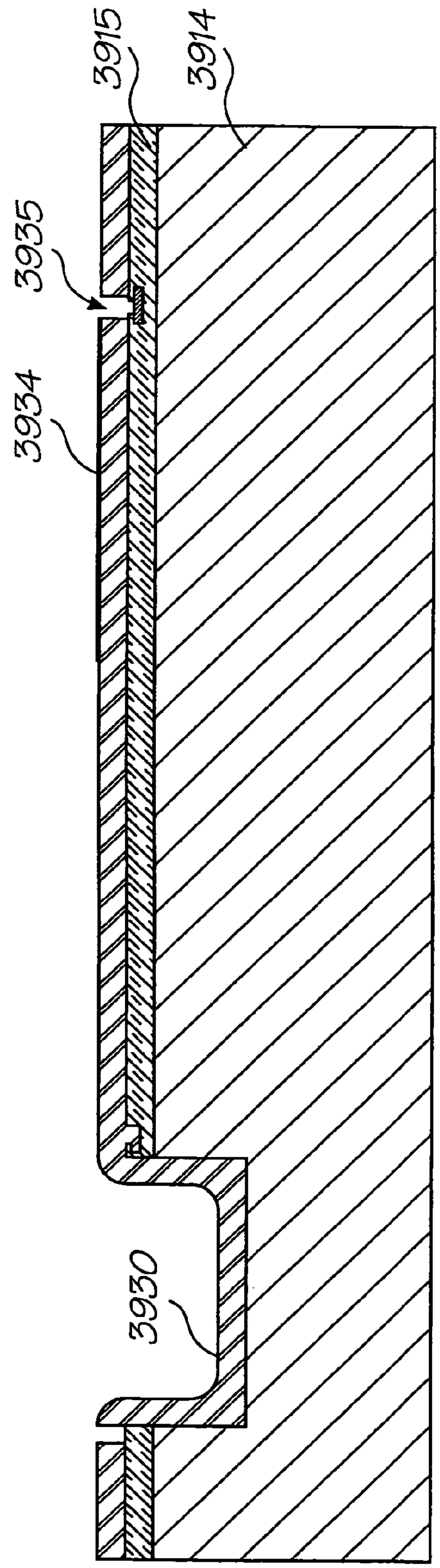

Next, as shown in FIG. 856*b* a very thin 0.1 micron layer of a corrosion barrier material 3934 (for example, silicon nitride) is deposited and subsequently etched so as to form the heater element 3935. The etch utilizes a third mask having mask regions specified 3936 and 3937 in FIG. 856*a*.

Figure 857A:
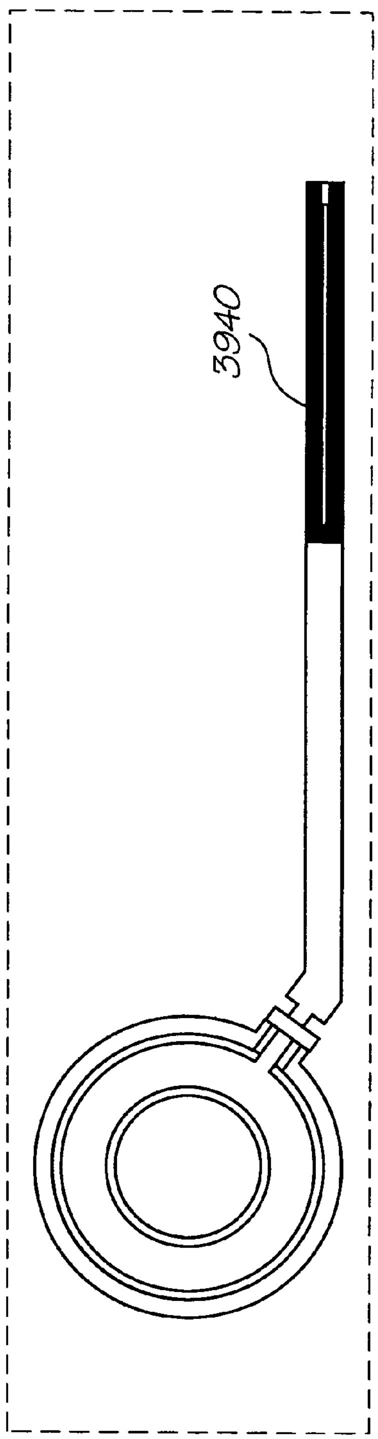
Figure 857B:
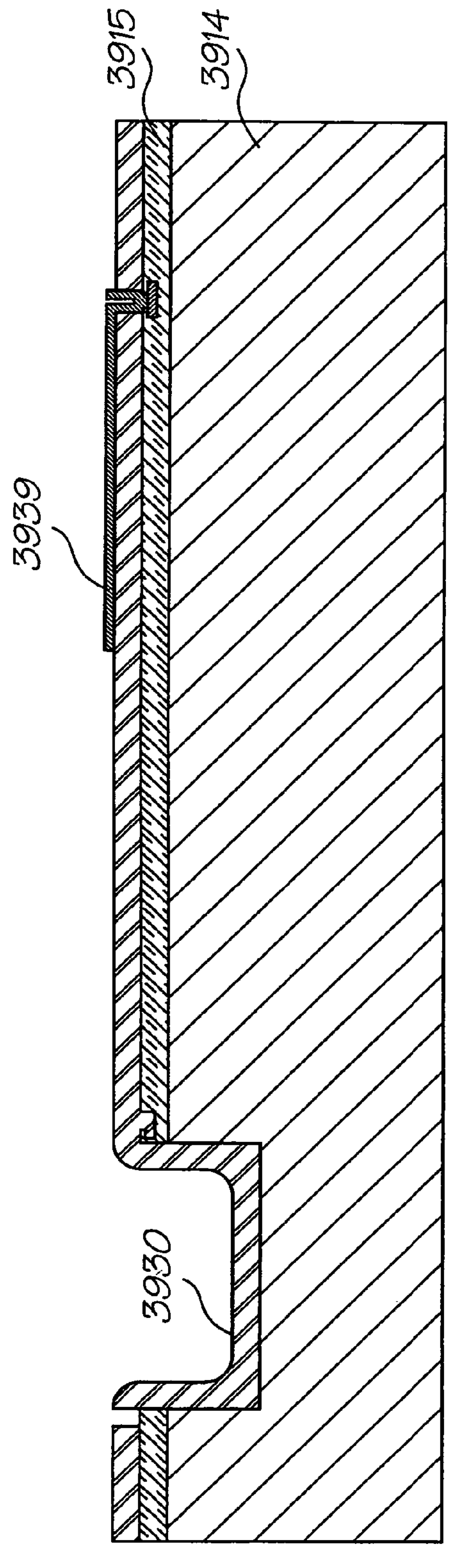

Next, as shown intended in FIG. 857*b*, a 1.1 micron layer of heater material 3939 which can comprise a 60% copper 40% nickel alloy is deposited utilizing a mask having a resultant mask region 3940 as illustrated in FIG. 857*a*.

Next a 0.1 micron corrosion layer is deposited over the surface. The corrosion barrier can again comprise silicon nitride.

Figure 858A:
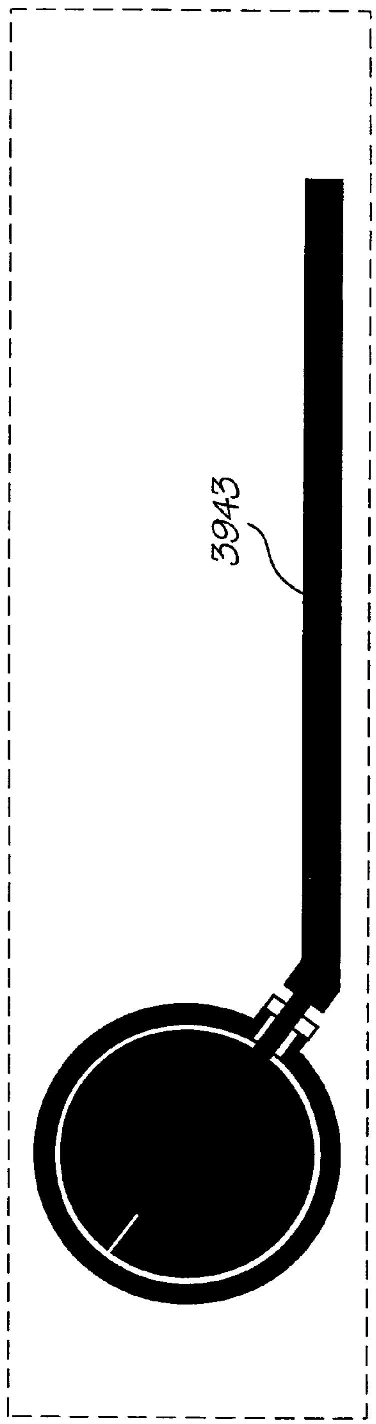
Figure 858B:
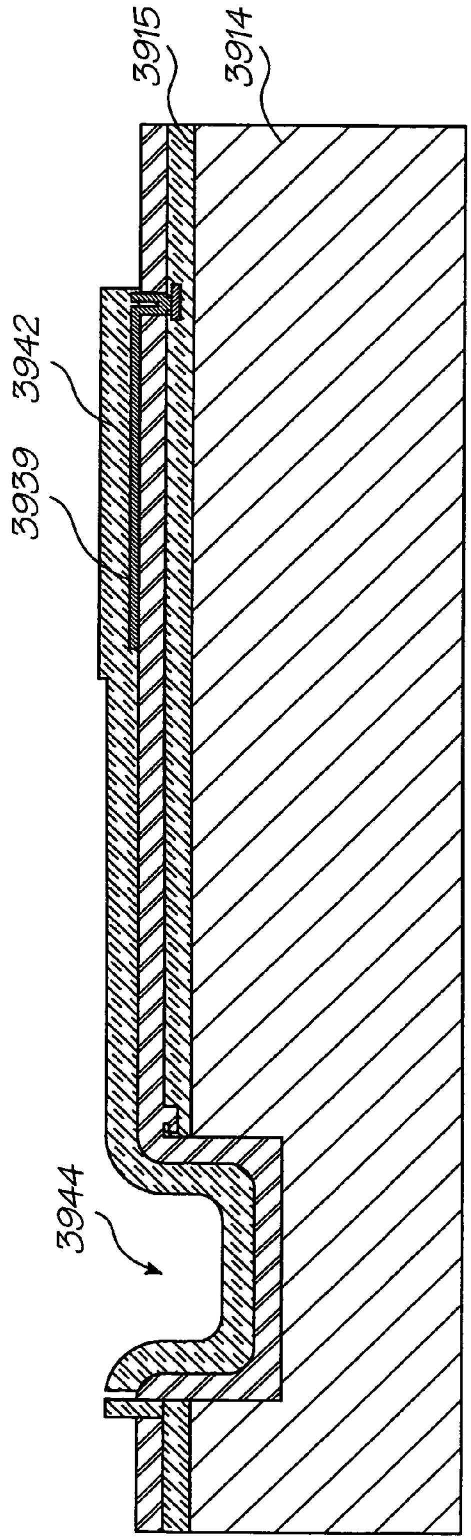

Next, as illustrated in FIG. 858*b*, a 3.4 micron layer of glass 3942 is deposited. The glass and nitride can then be etched utilizing a mask as specified 3943 in FIG. 858*a*. The glass layer 3942 includes, as part of the deposition process, a portion 3944 which is a result of the deposition process following the lower surface profile.

Figure 859A:
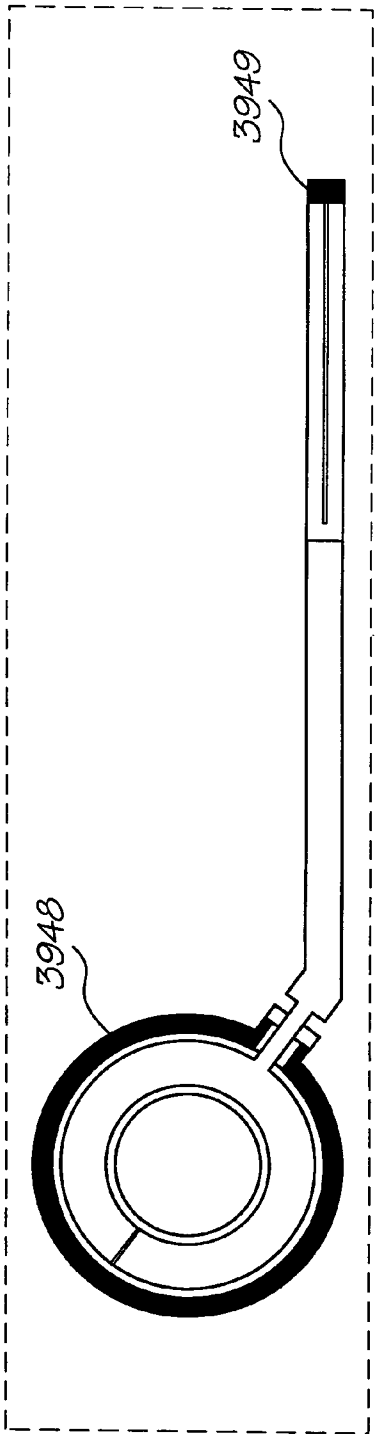
Figure 859B:
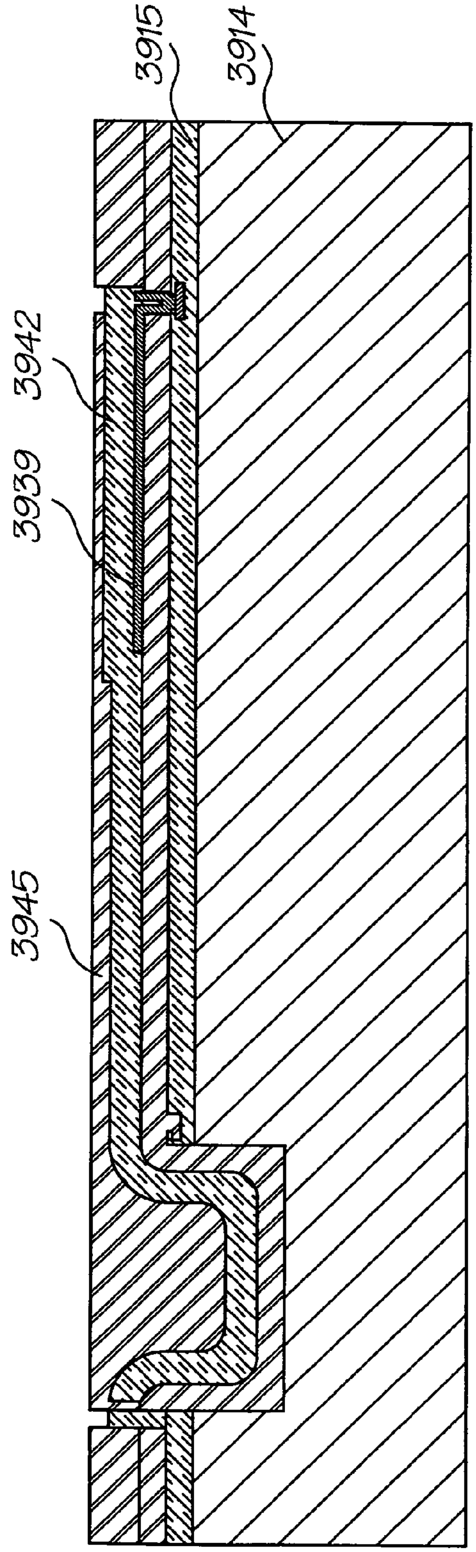

Next, a 6 μm layer of sacrificial material 3945 such as aluminum is deposited as indicated in FIG. 859*b*. This layer is planarized to approximately 4 micron minimum thickness utilizing a Chemical Mechanical Planarization (CMP) process. Next, the sacrificial material layer is etched utilizing a mask having regions 3948, 3949 as illustrated in FIG. 859*a* so as to form portions of the nozzle wall and post.

Figure 860A:
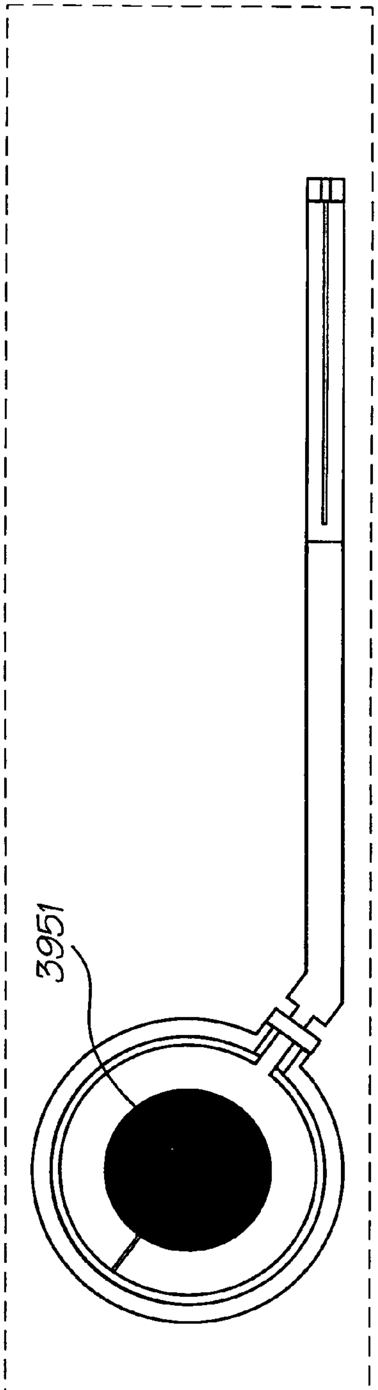
Figure 860B:
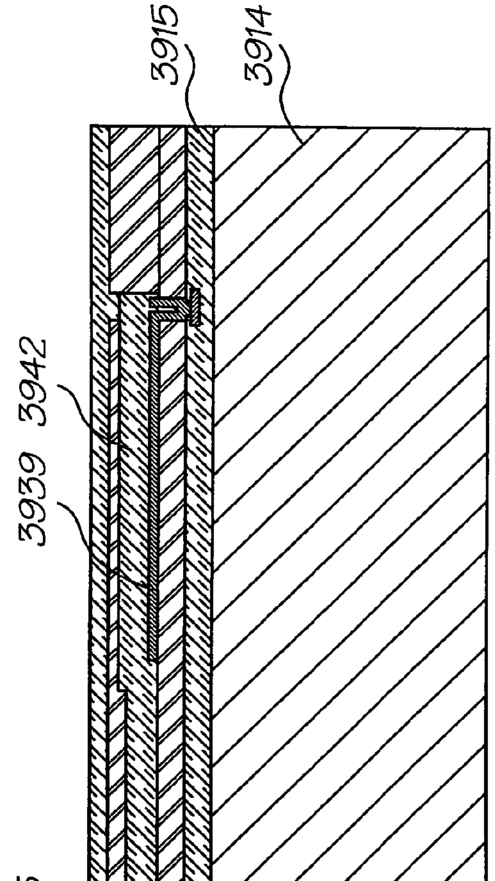

Next, as illustrated in FIG. 860*b*, a 3 micron layer of glass 3950 is deposited. The 3 micron layer is patterned and etched to a depth of 1 micron using a mask having a region specified 3951 as illustrated in FIG. 860*a* so as to form a nozzle rim.

Figure 861A:
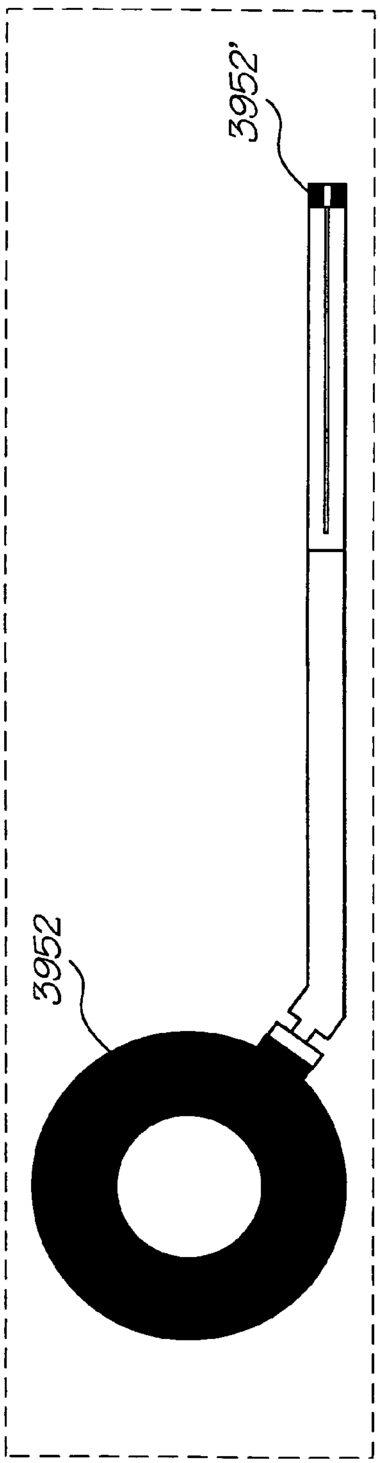
Figure 861B:
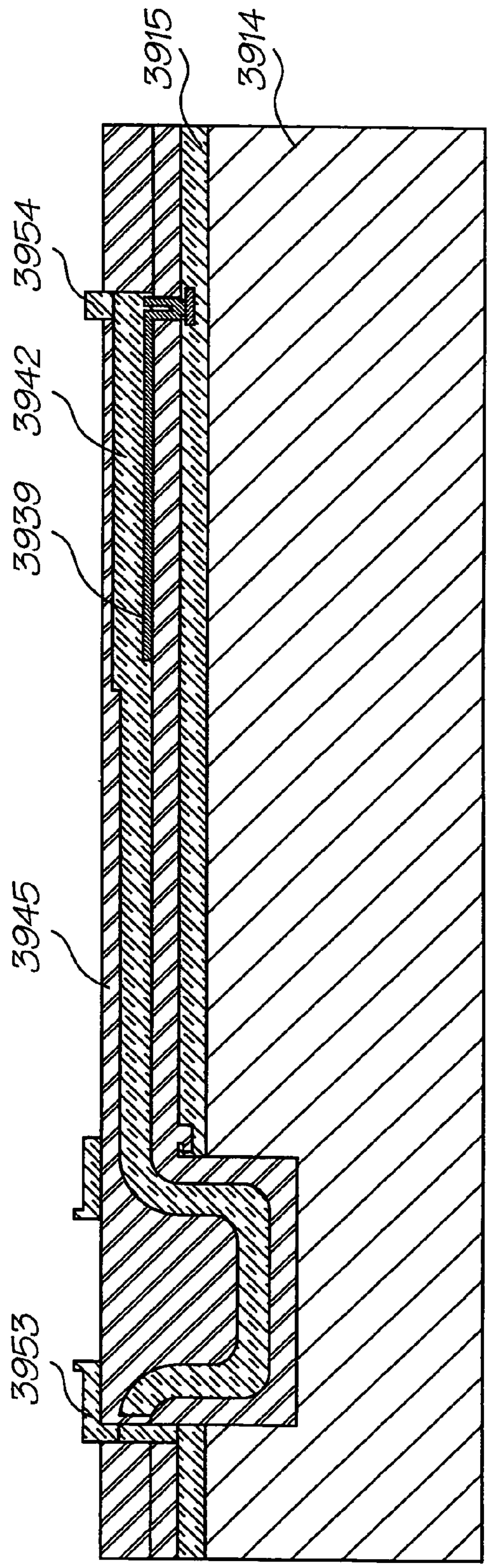

Next, as illustrated in FIG. 861*b* the glass layer is etched utilizing a further mask 3952 as illustrated in FIG. 861*a* which leaves glass portions e.g. 3953 to form the nozzle chamber wall and post portion 3954.

Figure 862A:
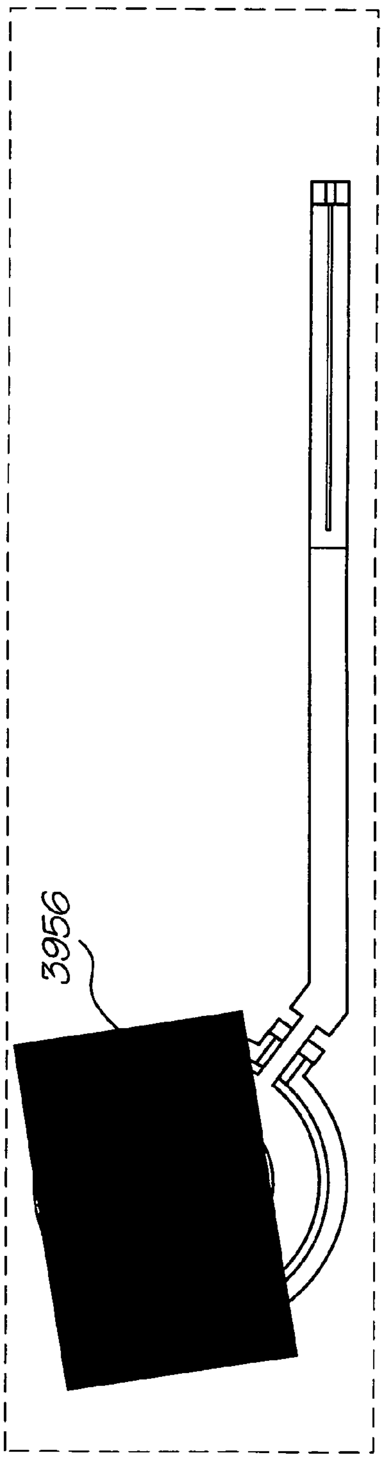
Figure 962B:
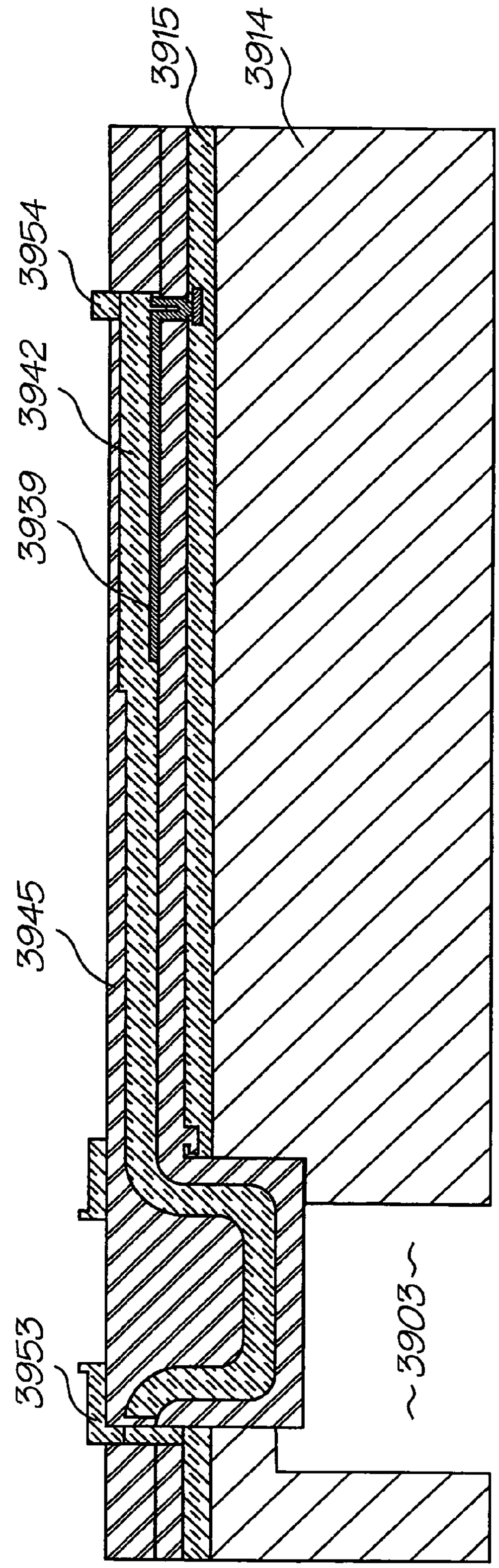

Next, as illustrated in FIG. 862*b* the backside of the wafer is patterned and etched so as to form an ink supply channel 3903. The mask utilized can have regions 3956 as specified in FIG. 862*a*. The etch through the backside of the wafer can preferably utilize a high quality deep anisotropic etching system such as that available from Silicon Technology Systems of the United Kingdom. Preferably, the etching process also results in the dicing of the wafer into its separate printheads at the same time.

Figure 863:
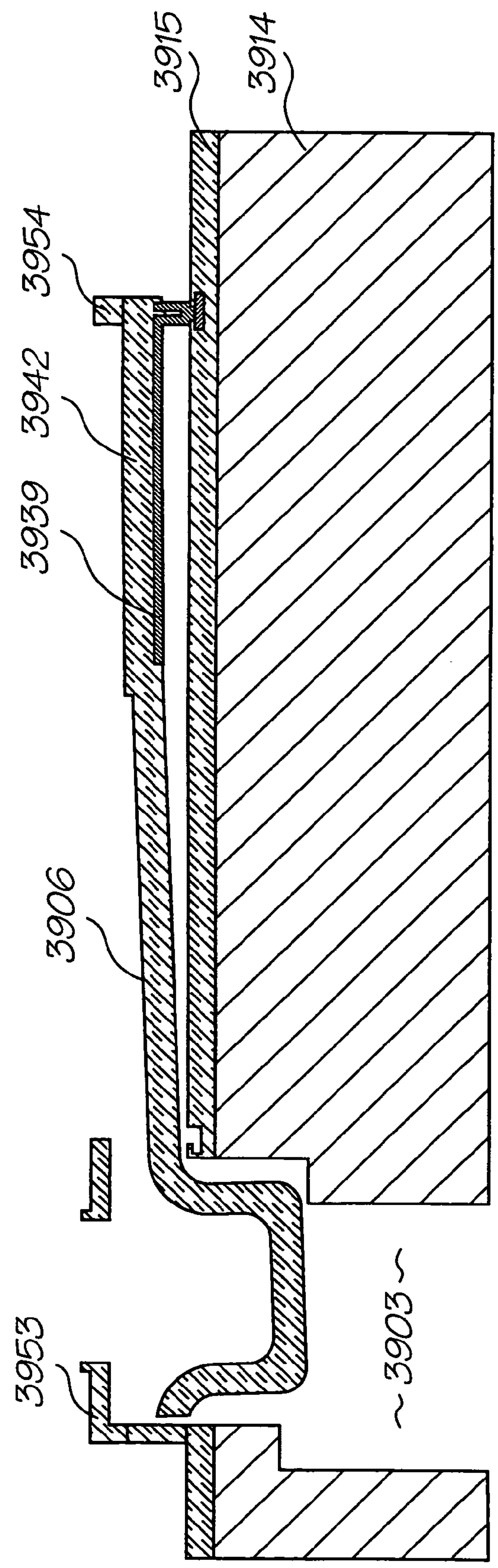

Next, as illustrated in FIG. 863, the sacrificial material can be etched away so as to release the actuator structure. Upon release, the actuator 3906 bends downwards due to its release from thermal stresses built up during deposition. The printhead can then be cleaned and mounted in a molded ink supply system for the supply of ink to the back surface of the wafer. A TAB film for supplying electric control to an edge of the printhead can then be bonded utilizing normal TAB bonding techniques. The surface area can then be hydrophobically treated and finally the ink supply channel and nozzle chamber filled with ink for testing.

Hence, as illustrated in FIG. 864, a pagewidth printhead having a repetitive structure 3960 can be constructed for full color printing. FIG. 864 shows a portion of the final printhead structure and includes three separate groupings 3961-3963 with one grouping for each color and each grouping e.g. 3963 in turn consisting of two separate rows of inkjet nozzles 3965, 3966 which are spaced apart in an interleaved pattern. The nozzle 3965, 3966 are fired at predetermined times so as to form an output image as would be readily understood by those skilled in the art of construction of inkjet printhead. Each nozzle e.g. 3968 includes its own actuator arm 3969 which, in order to form an extremely compact arrangement, is preferably formed so as to be generally bent with respect to the line perpendicular to the row of nozzles. Preferably, a three color arrangement is provided which has one of the groups 3961-3963 dedicated to cyan, magenta and another yellow color printing. Obviously, four color printing arrangements can be constructed if required.

Preferably, at one side a series of bond pads e.g. 3971 are formed along the side for the insertion of a tape automated bonding (TAB) strip which can be aligned by means of alignment rail e.g. 3972 which is constructed along one edge of the printhead specifically for this purpose.

Figure 866:
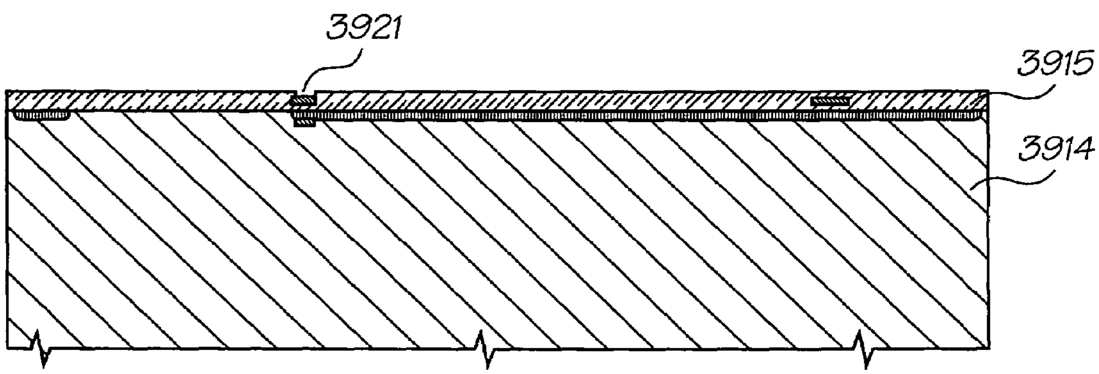

One form of detailed manufacturing process which can be used to fabricate monolithic ink jet print heads operating in accordance with the principles taught by the present embodiment can proceed utilizing the following steps:

1. Using a double sided polished wafer 3914, complete drive transistors, data distribution, and timing circuits using a 0.5 micron, one poly, 2 metal CMOS process 3915. This step is shown in FIG. 866. For clarity, these diagrams may not be to scale, and may not represent a cross section though any single plane of the nozzle. FIG. 865 is a key to representations of various materials in these manufacturing diagrams, and those of other cross referenced ink jet configurations.

2. Etch oxide down to silicon or aluminum using Mask 1. This mask defines the pit underneath the paddle, as well as the edges of the printheads chip.

Figure 867:
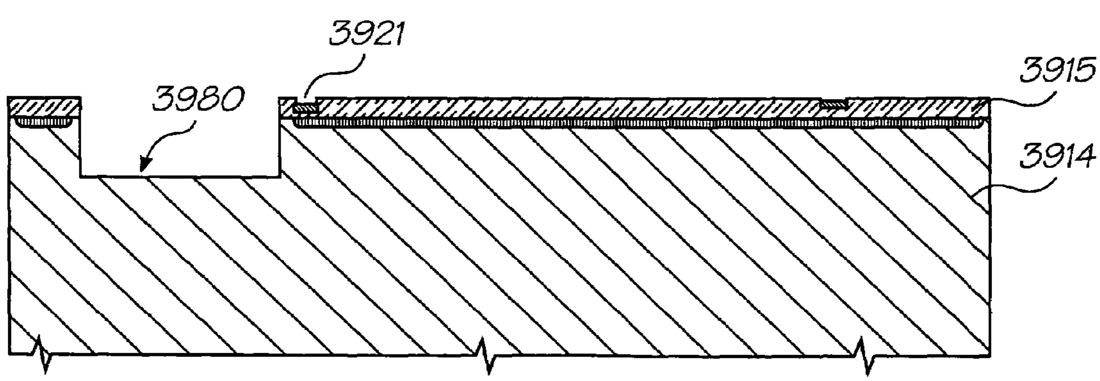

3. Etch silicon to a depth of 8 microns 3980 using etched oxide as a mask. The sidewall slope of this etch is not critical (60 to 90 degrees is acceptable), so standard trench etchers can be used. This step is shown in FIG. 867.

4. Deposit 3 microns of sacrificial material 3981 (e.g. aluminum or polyimide)

Figure 868:
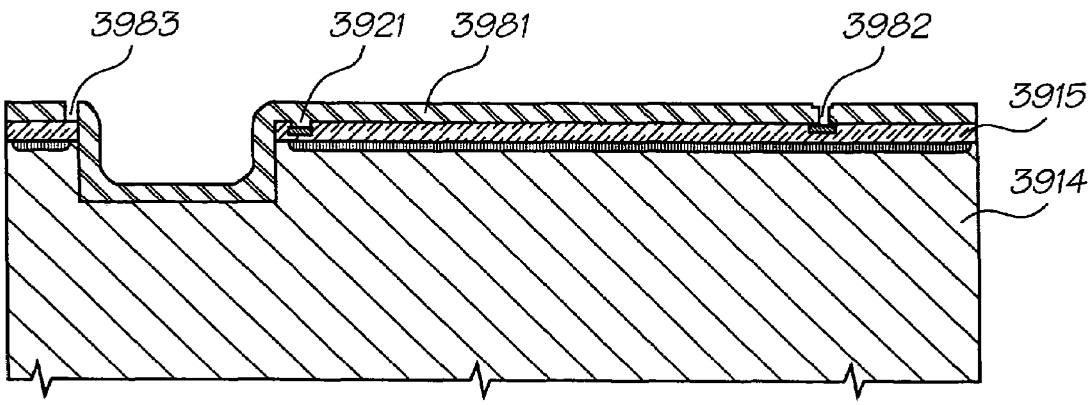

5. Etch the sacrificial layer using Mask 3, defining heater vias 3982 and nozzle chamber walls 3983. This step is shown in FIG. 868.

6. Deposit 0.2 microns of heater material 3984, e.g. TiN.

Figure 869:
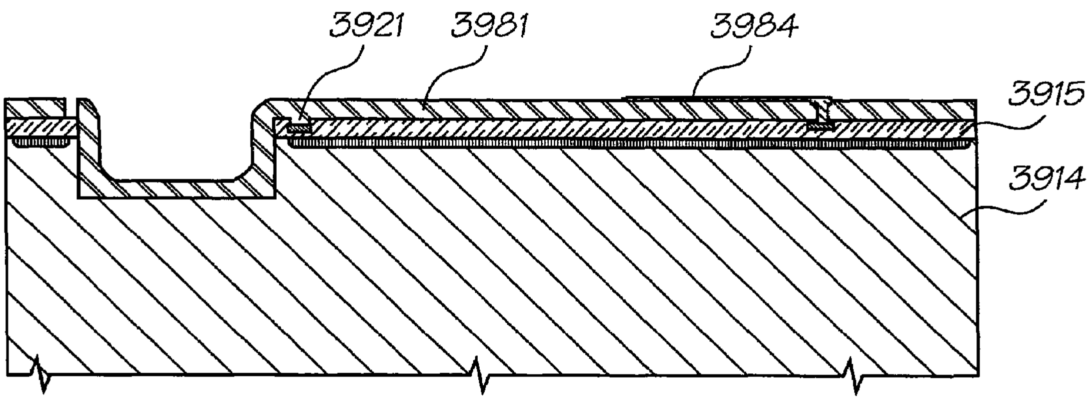

7. Etch the heater material using Mask 3, defining the heater shape. This step is shown in FIG. 869.

8. Wafer probe. All electrical connections are complete at this point, bond pads are accessible, and the chips are not yet separated.

9. Deposit 3 microns of PECVD glass 3985.

Figure 870:
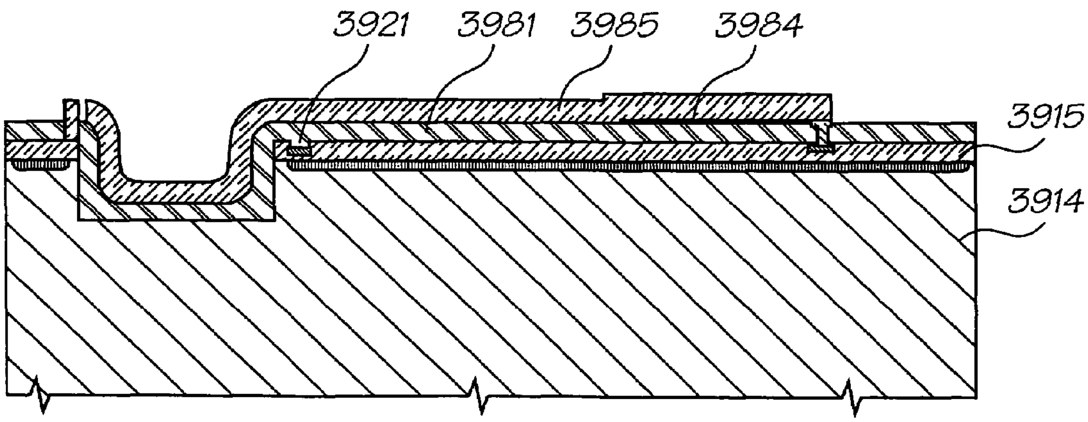

10. Etch glass layer using Mask 4. This mask defines the nozzle chamber wall, the paddle, and the actuator arm. This step is shown in FIG. 870.

11. Deposit 6 microns of sacrificial material 3986.

Figure 871:
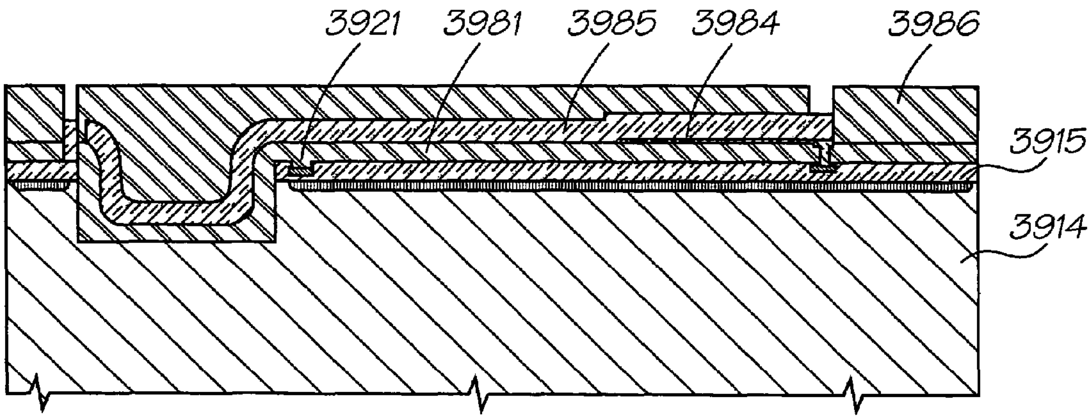

12. Etch the sacrificial material using Mask 5. This mask defines the nozzle chamber wall. This step is shown in FIG. 871.

13. Deposit 3 microns of PECVD glass 3987.

Figure 872:
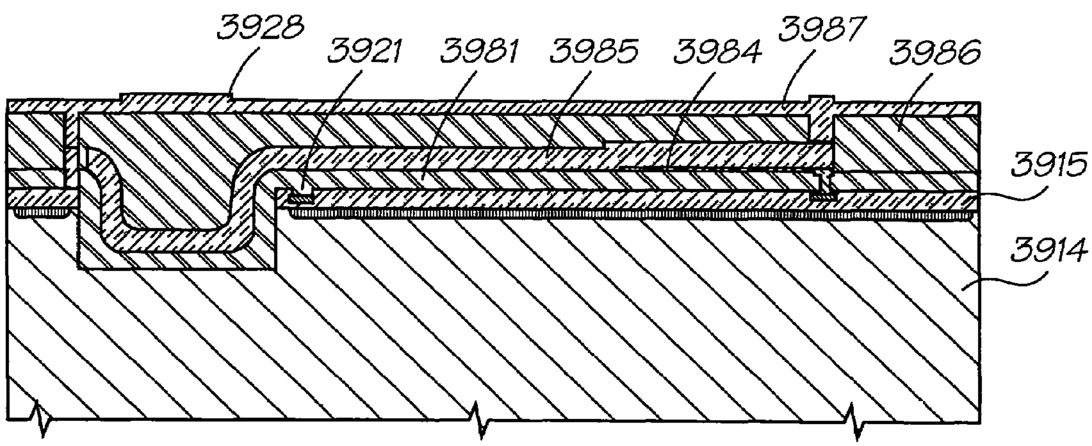

14. Etch to a depth of (approx.) 1 micron using Mask 6. This mask defines the nozzle rim 3928. This step is shown in FIG. 872.

Figure 873:
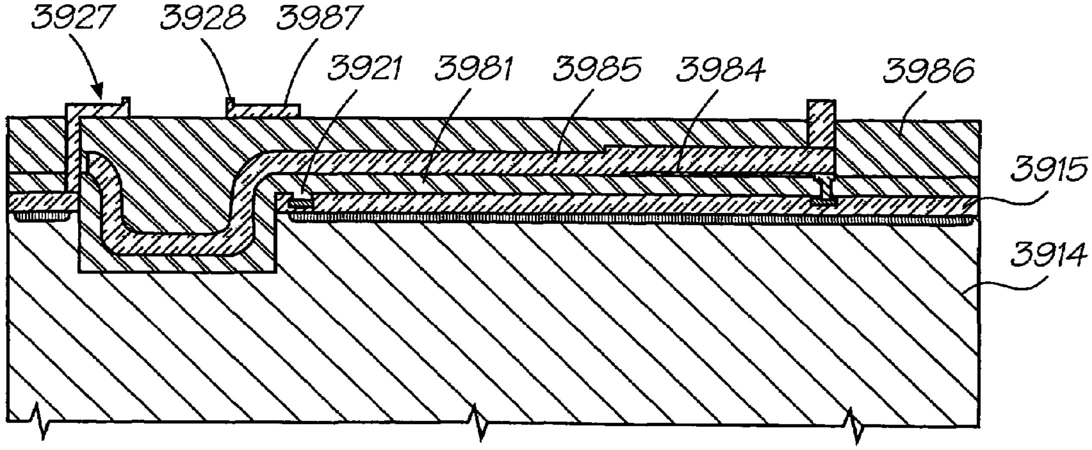

15. Etch down to the sacrificial layer using Mask 7. This mask defines the roof of the nozzle chamber, and the nozzle 3927 itself. This step is shown in FIG. 873.

Figure 874:
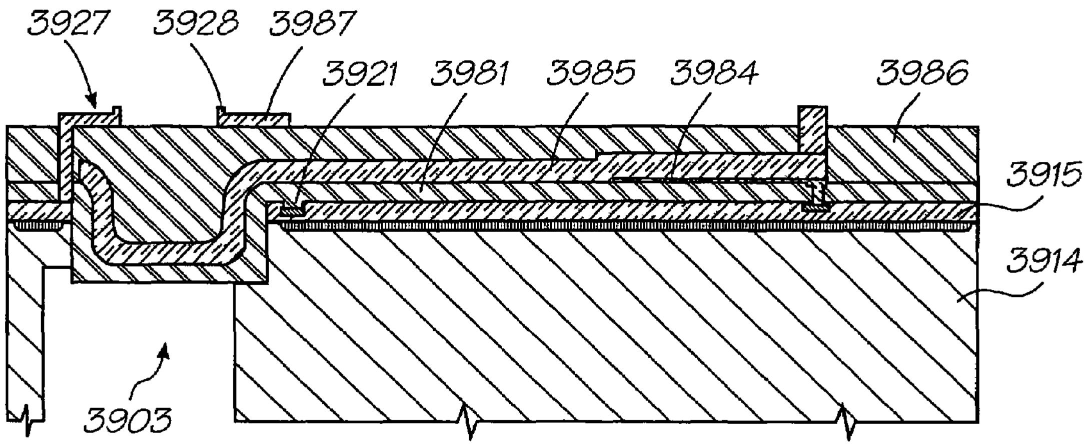

16. Back-etch completely through the silicon wafer (with, for example, an ASE Advanced Silicon Etcher from Surface Technology Systems) using Mask 8. This mask defines the ink inlets 3903 which are etched through the wafer. The wafer is also diced by this etch. This step is shown in FIG. 874.

Figure 875:
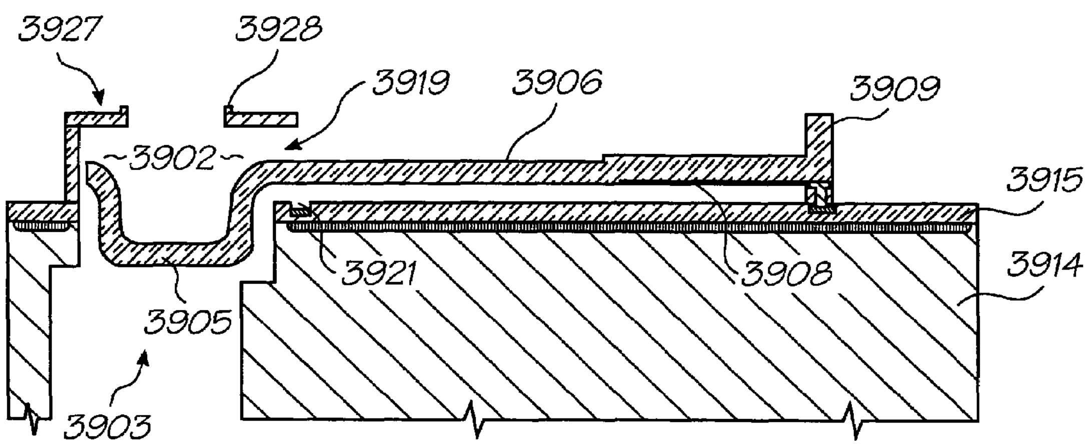

17. Etch the sacrificial material. The nozzle chambers are cleared, the actuators freed, and the chips are separated by this etch This step is shown in FIG. 875.

18. Mount the printheads in their packaging, which may be a molded plastic former incorporating ink channels which supply the appropriate color ink to the ink inlets at the back of the wafer.

19. Connect the printheads to their interconnect systems. For a low profile connection with minimum disruption of airflow, TAB may be used. Wire bonding may also be used if the printer is to be operated with sufficient clearance to the paper.

20. Hydrophobize the front surface of the printheads.

Figure 876:
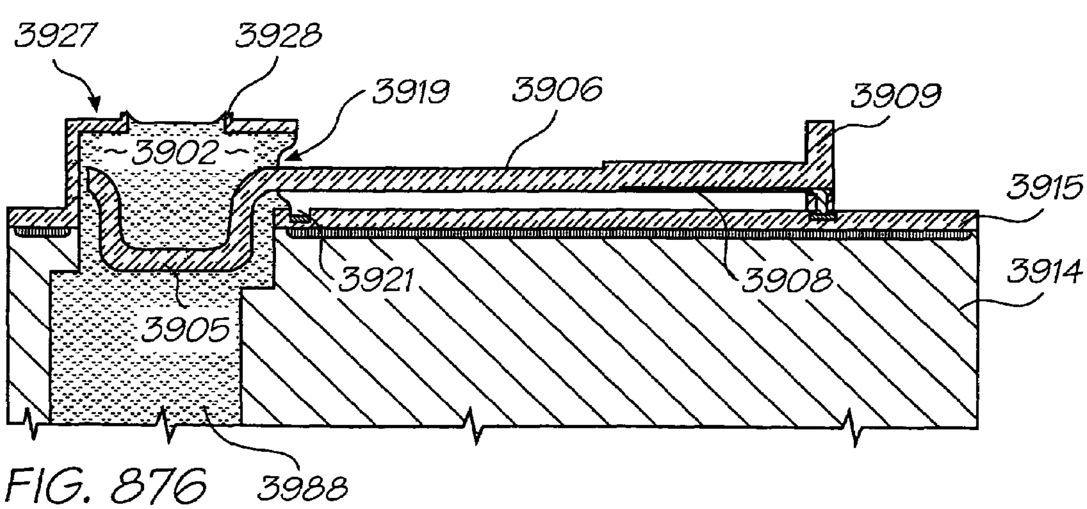

21. Fill the completed printheads with ink 3988 and test them. A filled nozzle is shown in FIG. 876.

IJ40

In a preferred embodiment, there is provided a nozzle arrangement having a nozzle chamber containing ink and a thermal actuator connected to a paddle positioned within the chamber. The thermal actuator device is actuated so as to eject ink from the nozzle chamber. A preferred embodiment includes a particular thermal actuator which includes a series of tapered portions for providing conductive heating of a conductive trace. The actuator is connected to the paddle via an arm received through a slotted wall of the nozzle chamber. The actuator arm has a mating shape so as to mate substantially with the surfaces of the slot in the nozzle chamber wall.

Turning initially to FIG. 877-879, there is provided schematic illustrations of the basic operation of a nozzle arrangement of the invention. A nozzle chamber 4001 is provided filled with ink 4002 by means of an ink inlet channel 4003 which can be etched through a wafer substrate on which the nozzle chamber 4001 rests. The nozzle chamber 4001 further includes an ink ejection port 4004 around which an ink meniscus 4005 forms.

Inside the nozzle chamber 4001 is a paddle type device 4007 which is interconnected to an actuator 4008 through a slot in the wall of the nozzle chamber 4001. The actuator 4008 includes a heater means e.g. 4009 located adjacent to an end portion of a post 4010. The post 4010 is fixed to a substrate.

When it is desired to eject a drop from the nozzle chamber 4001, as illustrated in FIG. 878, the heater means 4009 is heated so as to undergo thermal expansion. Preferably, the heater means 4009 itself or the other portions of the actuator 4008 are built from materials having a high bend efficiency where the bend efficiency is defined as $$\text{bend efficiency} = \frac{\text{Young's Modulus} \times (\text{Coefficient of thermal Expansion})}{\text{Density} \times \text{Specific Heat Capacity}}$$

A suitable material for the heater elements is a copper nickel alloy which can be formed so as to bend a glass material.

The heater means 4009 is ideally located adjacent the end portion of the post 4010 such that the effects of activation are magnified at the paddle end 4007 such that small thermal expansions near the post 4010 result in large movements of the paddle end.

The heater means 4009 and consequential paddle movement causes a general increase in pressure around the ink meniscus 4005 which expands, as illustrated in FIG. 878, in a rapid manner. The heater current is pulsed and ink is ejected out of the port 4004 in addition to flowing in from the ink channel 4003.

Subsequently, the paddle 4007 is deactivated to again return to its quiescent position. The deactivation causes a general reflow of the ink into the nozzle chamber. The forward momentum of the ink outside the nozzle rim and the corresponding backflow results in a general necking and breaking off of the drop 4012 which proceeds to the print media. The collapsed meniscus 4005 results in a general sucking of ink into the nozzle chamber 4002 via the ink flow channel 4003. In time, the nozzle chamber 4001 is refilled such that the position in FIG. 877 is again reached and the nozzle chamber is subsequently ready for the ejection of another drop of ink.

FIG. 880 illustrates a side perspective view of the nozzle arrangement FIG. 881 illustrates sectional view through an array of nozzle arrangement of FIG. 880. In these figures, the numbering of elements previously introduced has been retained.

Firstly, the actuator 4008 includes a series of tapered actuator units e.g. 4015 which comprise an upper glass portion (amorphous silicon dioxide) 4016 formed on top of a titanium nitride layer 4017. Alternatively a copper nickel alloy layer (hereinafter called cupronickel) can be utilized which will have a higher bend efficiency where bend efficiency is defined as:

$$\text{bend efficiency} = \frac{\text{Young's Modulus} \times (\text{Coefficient of thermal Expansion})}{\text{Density} \times \text{Specific Heat Capacity}}$$

The titanium nitride layer 4017 is in a tapered form and, as such, resistive heating takes place near an end portion of the post 4010. Adjacent titanium nitride/glass portions 4015 are interconnected at a block portion 4019 which also provides a mechanical structural support for the actuator 4008.

The heater means 4009 ideally includes a plurality of the tapered actuator unit 4015 which are elongate and spaced apart such that, upon heating, the bending force exhibited along the axis of the actuator 4008 is maximized. Slots are defined between adjacent tapered units 4015 and allow for slight differential operation of each actuator 4008 with respect to adjacent actuators 4008.

The block portion 4019 is interconnected to an arm 4020. The arm 4020 is in turn connected to the paddle 4007 inside the nozzle chamber 4001 by means of a slot e.g. 4022 formed in the side of the nozzle chamber 4001. The slot 4022 is designed generally to mate with the surfaces of the arm 4020 so as to minimize opportunities for the outflow of ink around the arm 4020. The ink is held generally within the nozzle chamber 4001 via surface tension effects around the slot 4022.

When it is desired to actuate the arm 4020, a conductive current is passed through the titanium nitride layer 4017 via vias within the block portion 4019 connecting to a lower CMOS layer 4006 which provides the necessary power and control circuitry for the nozzle arrangement. The conductive current results in heating of the nitride layer 4017 adjacent to the post 4010 which results in a general upward bending of the arm 4020 and consequential ejection of ink out of the nozzle 4004. The ejected drop is printed on a page in the usual manner for an inkjet printer as previously described.

An array of nozzle arrangements can be formed so as to create a single printhead. For example, in FIG. 881 there is illustrated a partly sectioned various array view which comprises multiple ink ejection nozzle arrangements of FIG. 880 laid out in interleaved lines so as to form a printhead array. Of course, different types of arrays can be formulated including full color arrays etc.

Fabrication of the ink jet nozzle arrangement is indicated in FIGS. 883 to 892. A preferred embodiment achieves a particular balance between utilization of the standard semi-conductor processing material such as titanium nitride and glass in a MEMS process. Obviously the skilled person may make other choices of materials and design features where the economics are justified. For example, a copper nickel alloy of 50% copper and 50% nickel may be more advantageously deployed as the conductive heating compound as it is likely to have higher levels of bend efficiency. Also, other design structures may be employed where it is not necessary to provide for such a simple form of manufacture.

Figure 883:
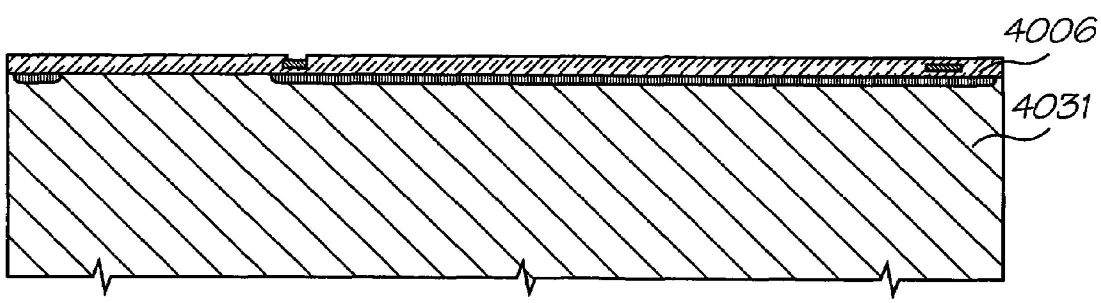

One form of detailed manufacturing process which can be used to fabricate monolithic ink jet print heads operating in accordance with the principles taught by the present embodiment can proceed utilizing the following steps:

1. Using a double sided polished wafer 4031, complete a 0.5 micron, one poly, 2 metal CMOS process to form layer 4006. This step is shown in FIG. 883. For clarity, these diagrams may not be to scale, and may not represent a cross section though any single plane of the nozzle. FIG. 882 is a key to representations of various materials in these manufacturing diagrams, and those of other cross referenced ink jet configurations.

Figure 884:
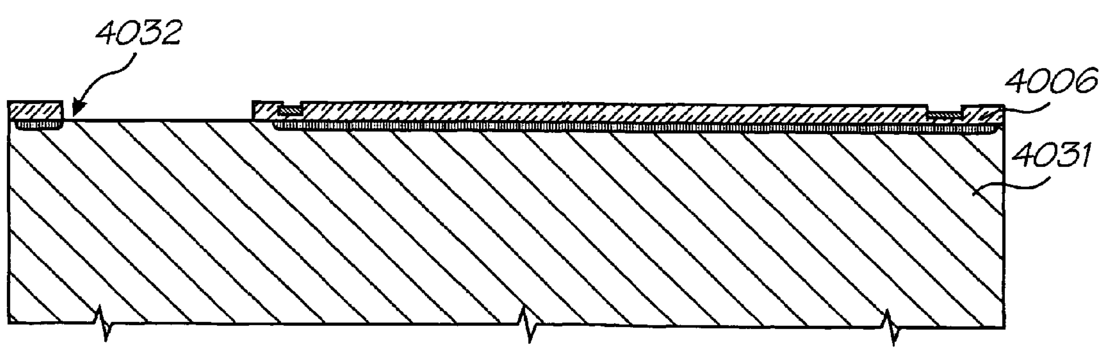

2. Etch oxide layer 4006 down to silicon or aluminum 4032 using Mask 1. This mask defines the nozzle chamber, the surface anti-wicking notch, and the heater contacts. This step is shown in FIG. 884.

3. Deposit 1 micron of sacrificial material 4033 (e.g. aluminum or photosensitive polyimide)

Figure 885:
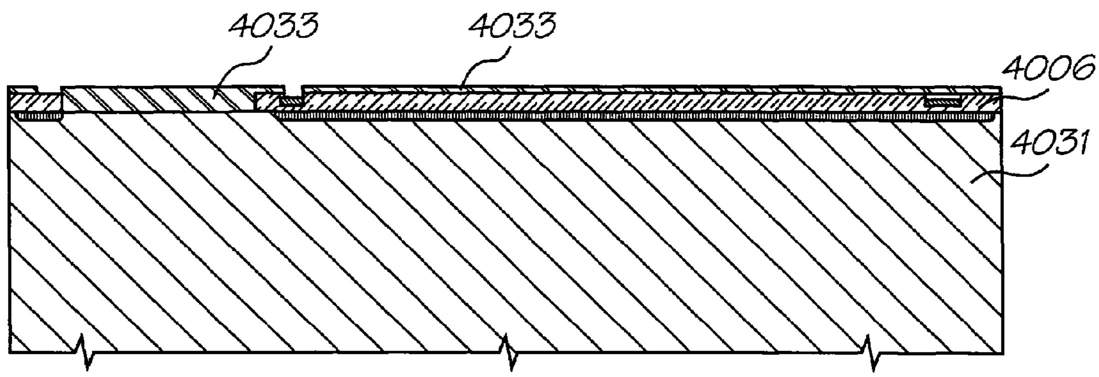

4. Etch (if aluminum) or develop (if photosensitive polyimide) the sacrificial layer 4033 using Mask 2. This mask defines the nozzle chamber walls and the actuator anchor point. This step is shown in FIG. 885.

5. Deposit 0.2 micron of heater material 4034, e.g. TiN.

6. Deposit 3.4 microns of PECVD glass 4035.

Figure 886:
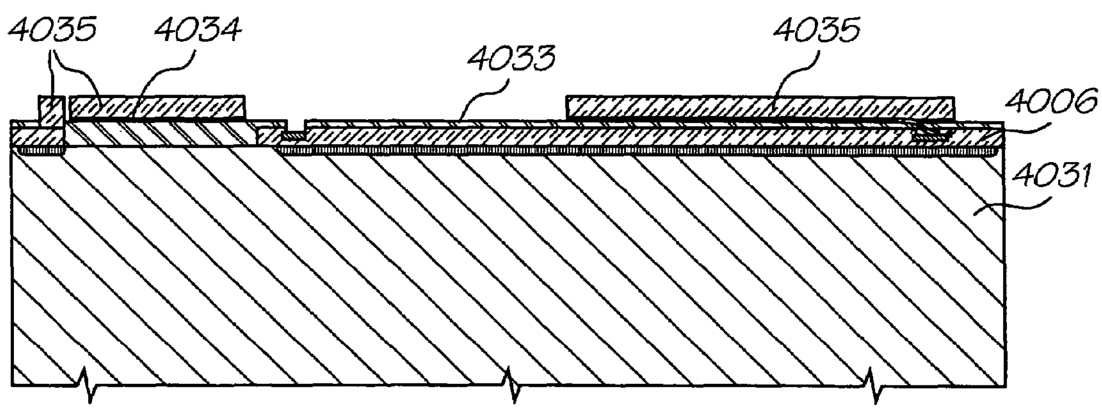

7. Etch both glass 4035 and heater 4034 layers together, using Mask 3. This mask defines the actuator, paddle, and nozzle chamber walls. This step is shown in FIG. 886.

8. Wafer probe. All electrical connections are complete at this point, bond pads are accessible, and the chips are not yet separated.

9. Deposit 10 microns of sacrificial material 4036.

Figure 887:
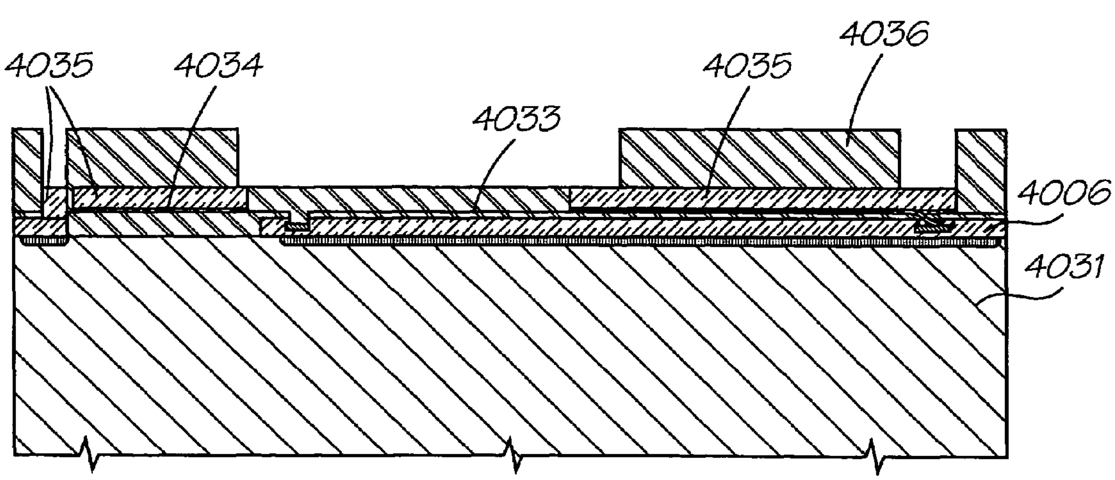

10. Etch or develop sacrificial material 4036 using Mask 4. This mask defines the nozzle chamber wall. This step is shown in FIG. 887.

11. Deposit 3 microns of PECVD glass 4037.

Figure 888:
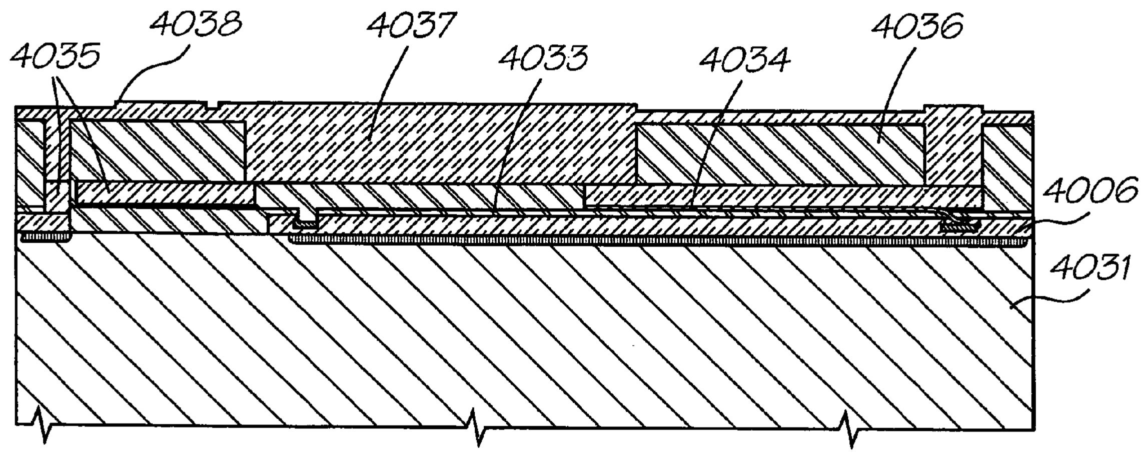

12. Etch to a depth of (approx.) 1 micron using Mask 5. This mask defines the nozzle rim 4038. This step is shown in FIG. 888.

Figure 889:
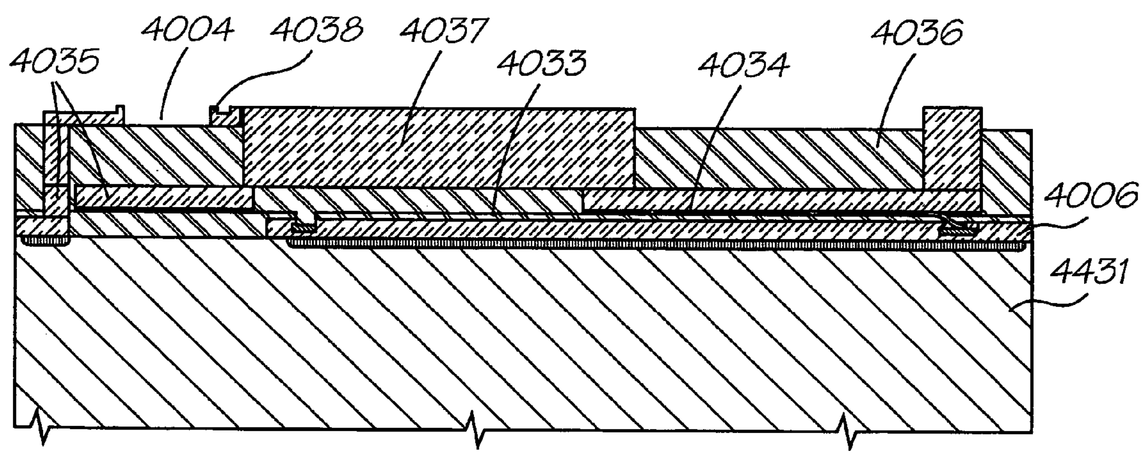

13. Etch down to the sacrificial layer 4036 using Mask 6. This mask defines the roof of the nozzle chamber, and the nozzle 4004 itself. This step is shown in FIG. 889.

Figure 890:
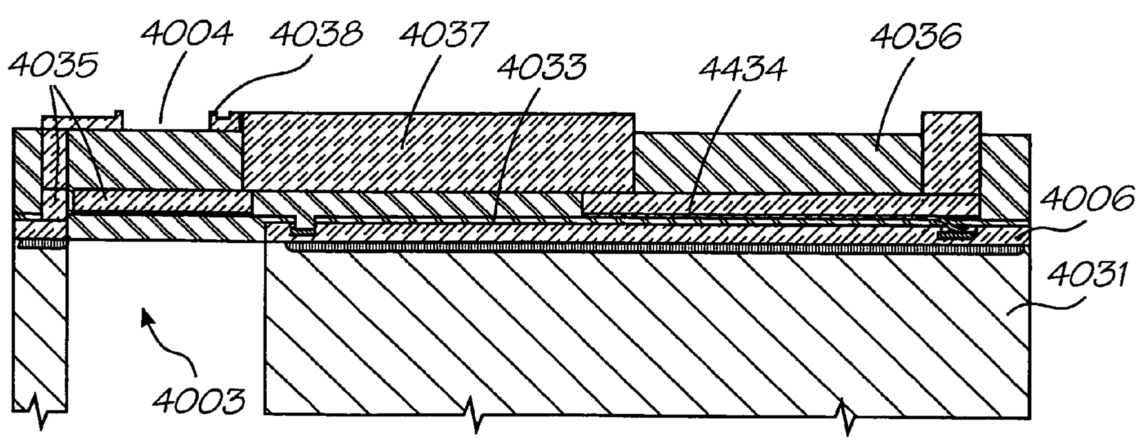

14. Back-etch completely through the silicon wafer (with, for example, an ASE Advanced Silicon Etcher from Surface Technology Systems) using Mask 7. This mask defines the ink inlets 4003 which are etched through the wafer. The wafer is also diced by this etch. This step is shown in FIG. 890.

Figure 891:
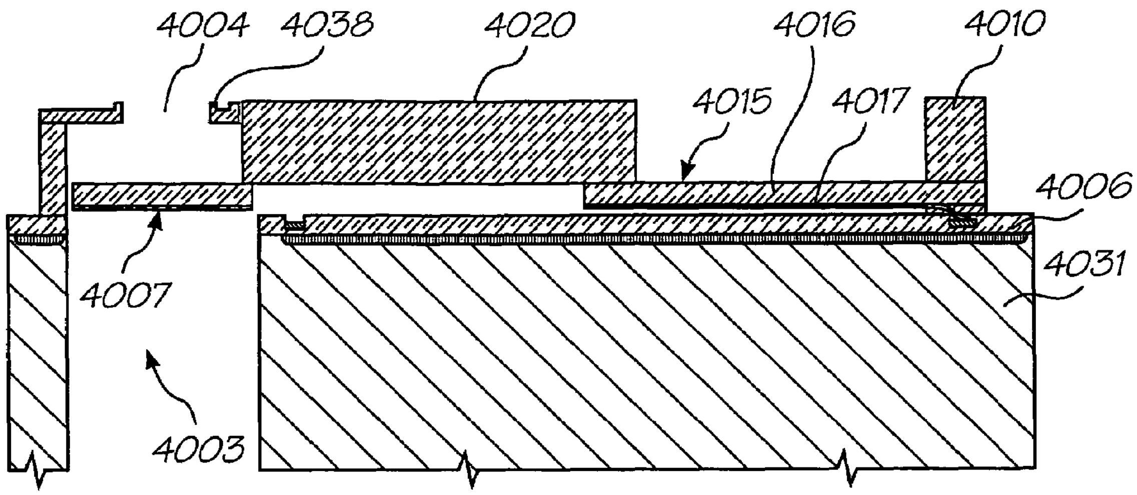

15. Etch the sacrificial material 4033, 4036. The nozzle chambers are cleared, the actuators freed, and the chips are separated by this etch This step is shown in FIG. 891.

16. Mount the print heads in their packaging, which may be a molded plastic former incorporating ink channels which supply the appropriate color ink to the ink inlets 4003 at the back of the wafer.

17. Connect the print heads to their interconnect systems. For a low profile connection with minimum disruption of airflow, TAB may be used. Wire bonding may also be used if the printer is to be operated with sufficient clearance to the paper.

18. Hydrophobize the front surface of the print heads.

Figure 892:
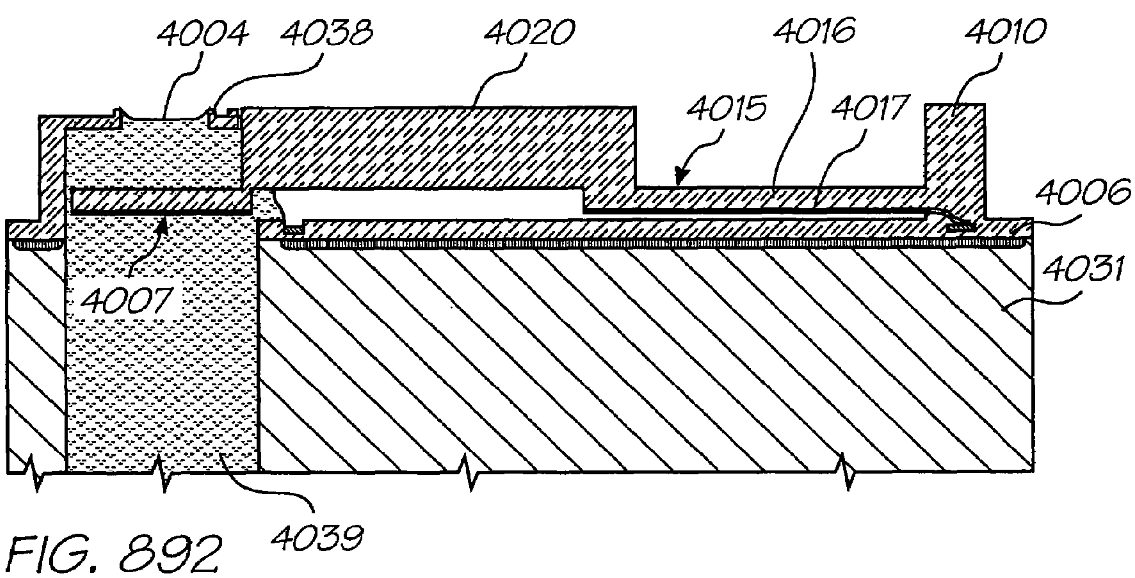

19. Fill the completed print heads with ink 4039 and test them. A filled nozzle is shown in FIG. 892.

IJ41

In a preferred embodiment, there is provided a nozzle chamber having ink within it and a thermal actuator device interconnected to a paddle, the thermal actuator device being actuated so as to eject ink from the nozzle chamber. A preferred embodiment includes a particular thermal actuator structure which includes a tapered heater structure arm for providing positional heating of a conductive heater layer row. The actuator arm is connected to the paddle through a slotted wall in the nozzle chamber. The actuator arm has a mating shape so as to mate substantially with the surfaces of the slot in the nozzle chamber wall.

Turning initially to FIGS. 893-895, there is provided schematic illustrations of the basic operation of the device. A nozzle chamber 4101 is provided filled with ink 4102 by means of an ink inlet channel 4103 which can be etched through a wafer substrate on which the nozzle chamber 4101 rests. The nozzle chamber 4101 includes an ink ejection nozzle or aperture 4104 around which an ink meniscus forms.

Inside the nozzle chamber 4101 is a paddle type device 4107 which is connected to an actuator arm 4108 through a slot in the wall of the nozzle chamber 4101. The actuator arm 4108 includes a heater means 4109 located adjacent to a post end portion 4110 of the actuator arm. The post 4110 is fixed to a substrate.

When it is desired to eject a drop from the nozzle chamber, as illustrated in FIG. 894, the heater means 4109 is heated so as to undergo thermal expansion. Preferably, the heater means itself or the other portions of the actuator arm 4108 are built from materials having a high bend efficiency where the bend efficiency is defined as $$\text{bend efficiency} = \frac{\text{Young's Modulus} \times (\text{Coefficient of thermal Expansion})}{\text{Density} \times \text{Specific Heat Capacity}}$$

A suitable material for the heater elements is a copper nickel alloy which can be formed so as to bend a glass material.

The heater means is ideally located adjacent the post end portion 4110 such that the effects of activation are magnified at the paddle end 4107 such that small thermal expansions near post 4110 result in large movements of the paddle end. The heating 4109 causes a general increase in pressure around the ink meniscus 4105 which expands, as illustrated in FIG. 894, in a rapid manner. The heater current is pulsed and ink is ejected out of the nozzle 4104 in addition to flowing in from the ink channel 4103. Subsequently, the paddle 4107 is deactivated to again return to its quiescent position. The deactivation causes a general reflow of the ink into the nozzle chamber. The forward momentum of the ink outside the nozzle rim and the corresponding backflow results in a general necking and breaking off of a drop 4112 which proceeds to the print media. The collapsed meniscus 4105 results in a general sucking of ink into the nozzle chamber 4101 via the in flow channel 4103. In time, the nozzle chamber is refilled such that the position in FIG. 893 is again reached and the nozzle chamber is subsequently ready for the ejection of another drop of ink.

Turning now to FIG. 896, there is illustrated a single nozzle arrangement 4120 of a preferred embodiment. The arrangement includes an actuator arm 4121 which includes a bottom layer 4122 which is constructed from a conductive material such as a copper nickel alloy (hereinafter called cupronickel) or titanium nitride (TiN). The layer 4122, as will become more apparent hereinafter includes a tapered end portion near the end post 4124. The tapering of the layer 4122 near this end means that any conductive resistive heating occurs near the post portion 4124.

The layer 4122 is connected to the lower CMOS layers 4126 which are formed in the standard manner on a silicon substrate surface 4127. The actuator arm 4121 is connected to an ejection paddle which is located within a nozzle chamber 4128. The nozzle chamber includes an ink ejection nozzle 4129 from which ink is ejected and includes a convoluted slot arrangement 4130 which is constructed such that the actuator arm 4121 is able to move up and down while causing minimal pressure fluctuations in-the area of the nozzle chamber 4128 around the slot 4130.

FIG. 897 illustrates a sectional view through a single nozzle. FIG. 897 illustrates more clearly the internal structure of the nozzle chamber which includes the paddle 4132 attached to the actuator arm 4121 having face 4133. Importantly, the actuator arm 4121 includes, as noted previously, a bottom conductive layer 4122. Additionally, a top layer 4125 is also provided.

The utilization of a second layer 4125 of the same material as the first layer 4122 allows for more accurate control of the actuator position as will be described with reference to FIGS. 898 and 899. In FIG. 898, there is illustrated the example where a high Young's modulus material 4140 is deposited utilizing standard semiconductor deposition techniques and on top of which is further deposited a second layer 4141 having a much lower Young's modulus. Unfortunately, the deposition is likely to occur at a high temperature. Upon cooling, the two layers are likely to have different coefficients of thermal expansion and different Young's modulus. Hence, in ambient room temperature, the thermal stresses are likely to cause bending of the two layers of material as shown at 4142.

Figure 899:
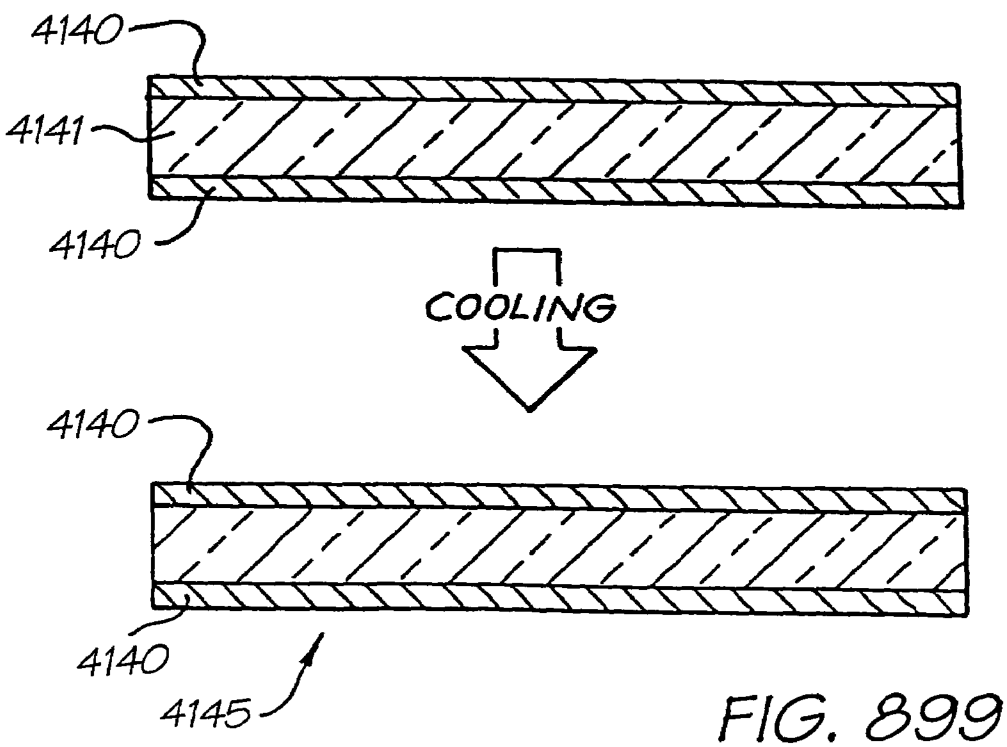

By utilizing a second deposition of the material having a high Young's Modulus, the situation in FIG. 899 is likely to result wherein the material 4141 is sandwiched between the two layers 4140. Upon cooling, the two layers 4140 are kept in tension with one another so as to result in a more planar structure 4145 regardless of the operating temperature. This principle is utilized in the deposition of the two layers 4122, 4125 of FIGS. 896-897.

Turning again to FIGS. 896 and 897, one important attribute of a preferred embodiments includes the slotted arrangement 4130. The slotted arrangement results in the actuator arm 4121 moving up and down thereby causing the paddle 4132 to also move up and down resulting in the ejection of ink. The slotted arrangement 4130 results in minimum ink outflow through the actuator arm connection and also results in minimal pressure increases in this area. The face 4133 of the actuator arm is extended out so as to form an extended interconnect with the paddle surface thereby providing for better attachment The face 4133 is connected to a block portion 4136 which is provided to provide a high degree of rigidity. The actuator arm 4121 and the wall of the nozzle chamber 4128 have a general corrugated nature so as to reduce any flow of ink through the slot 4130. The exterior surface of the nozzle chamber adjacent the block portion 4136 has a rim e.g. 4138 so to minimize wicking of ink outside of the nozzle chamber. A pit 4137 is also provided for this purpose. The pit 4137 is formed in the lower CMOS layers 4126. An ink supply channel 4139 is provided by means of back etching through the wafer to the back surface of the nozzle.

Turning to FIGS. 900-907 there will now be described the manufacturing steps utilized on the construction of a single nozzle in accordance with a preferred embodiment.

The manufacturing uses standard micro-electro mechanical techniques.

1. A preferred embodiment starts with a double sided polished wafer complete with, say, a 0.5 micron 1 poly 2 metal CMOS process providing for all the electrical interconnects necessary to drive the inkjet nozzle.

Figure 900:
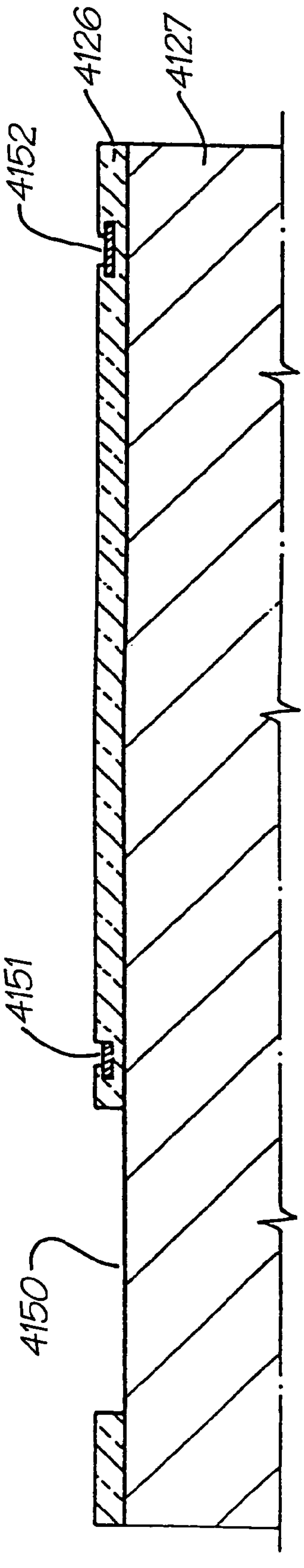

2. As shown in FIG. 900, the CMOS wafer 4126 is etched at 4150 down to the silicon layer 4127. The etching includes etching down to an aluminum CMOS layer 4151, 4152.

Figure 901:
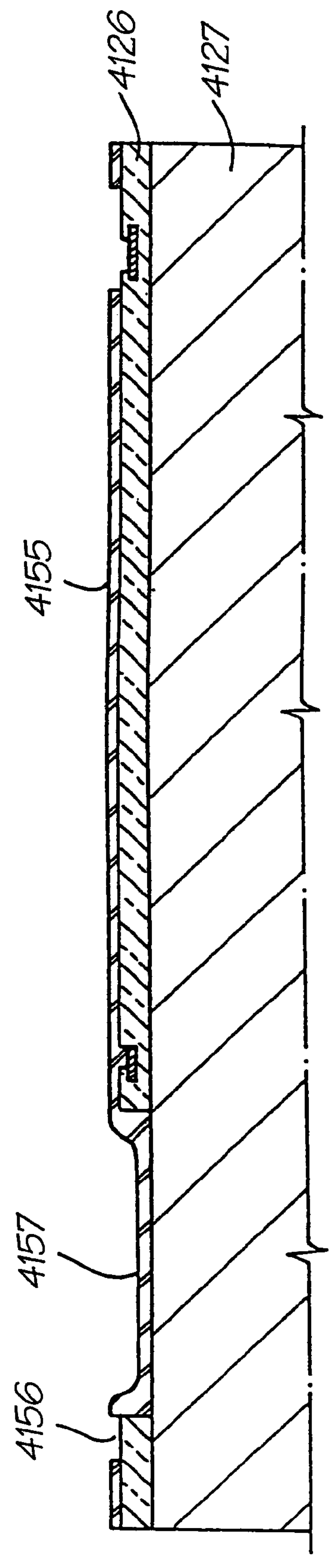

3. Next, as illustrated in FIG. 901, a 1 micron layer of sacrificial material 4155 is deposited. The sacrificial material can be aluminum or photosensitive polyimide.

4. The sacrificial material is etched in the case of aluminum or exposed and developed in the case of polyimide in the area of the nozzle rim 4156 and including a dished paddle area 4157. Next, a 1 micron layer of heater material 4160 (cupronickel or TIN) is deposited. A 3.4 micron layer of PECVD glass 4161 is then deposited.

7. A second layer 4162 equivalent to the first layer 4160 is then deposited.

Figure 902:
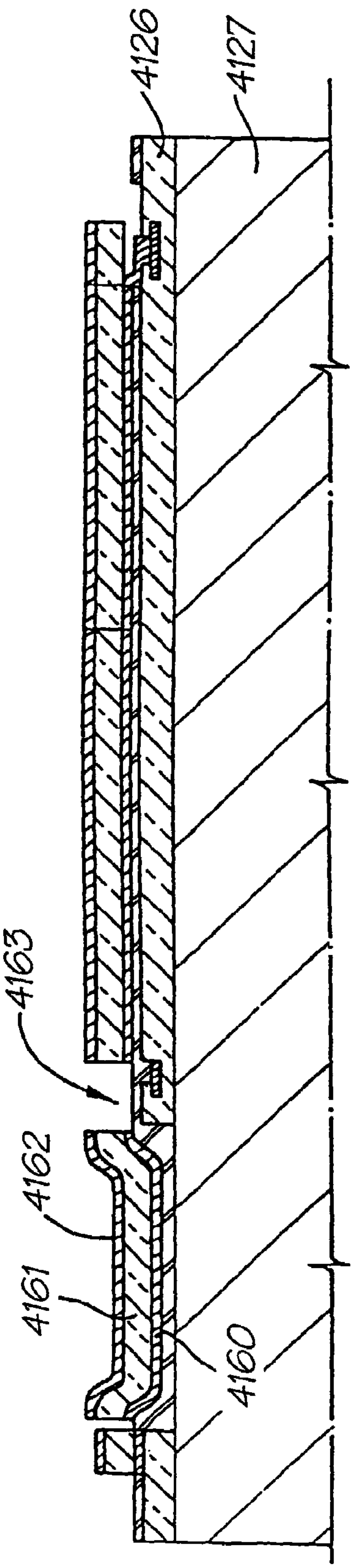

8. All three layers 4160-4162 are then etched utilizing the same mask. The utilization of a single mask substantially reduces the complexity in the processing steps involved in creation of the actuator paddle structure and the resulting structure is as illustrated in FIG. 902. Importantly, a break 4163 is provided so as to ensure electrical isolation of the heater portion from the paddle portion.

Figure 903:
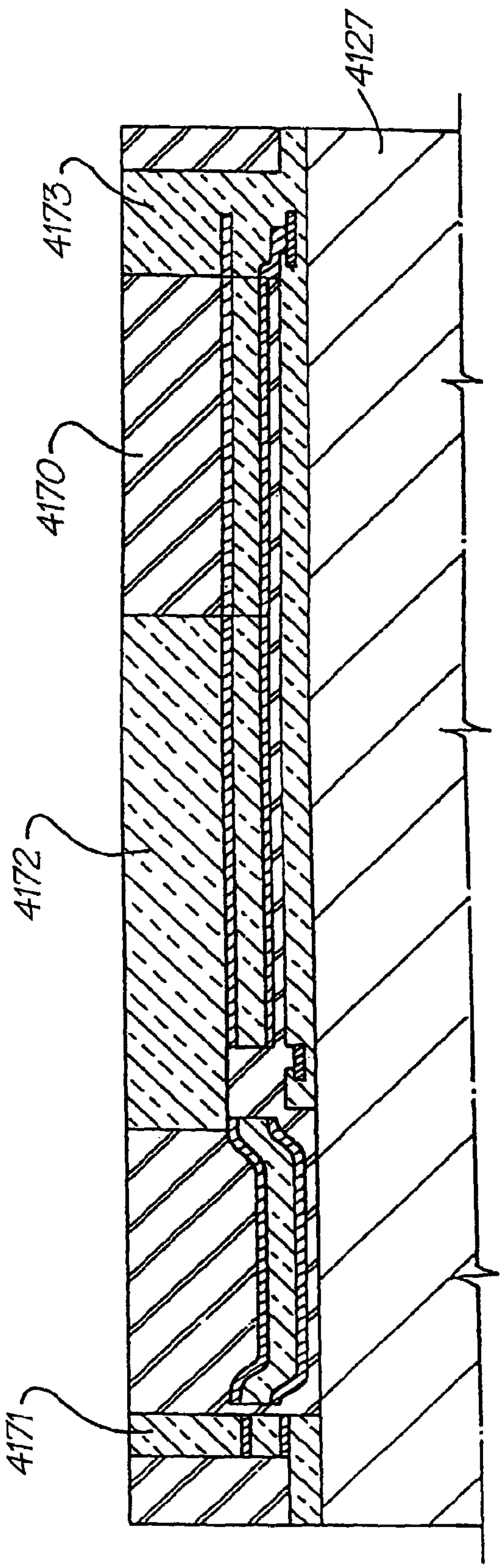

9. Next, as illustrated in FIG. 903, a 10 micron layer of sacrificial material 4170 is deposited.

10. The deposited layer is etched (or just developed if polyimide) utilizing a fourth mask which includes nozzle rim etchant holes 4171, block portion holes 4172 and post portion 4173.

11. Next a 10 micron layer of PECVD glass is deposited so as to form the nozzle rim 4171, arm portions 4172 and post portions 4173.

12. The glass layer is then planarized utilizing chemical mechanical planarization (CMP) with the resulting structure as illustrated in FIG. 903.

13. Next, a 3 micron layer of PECVD glass is deposited.

Figure 904:
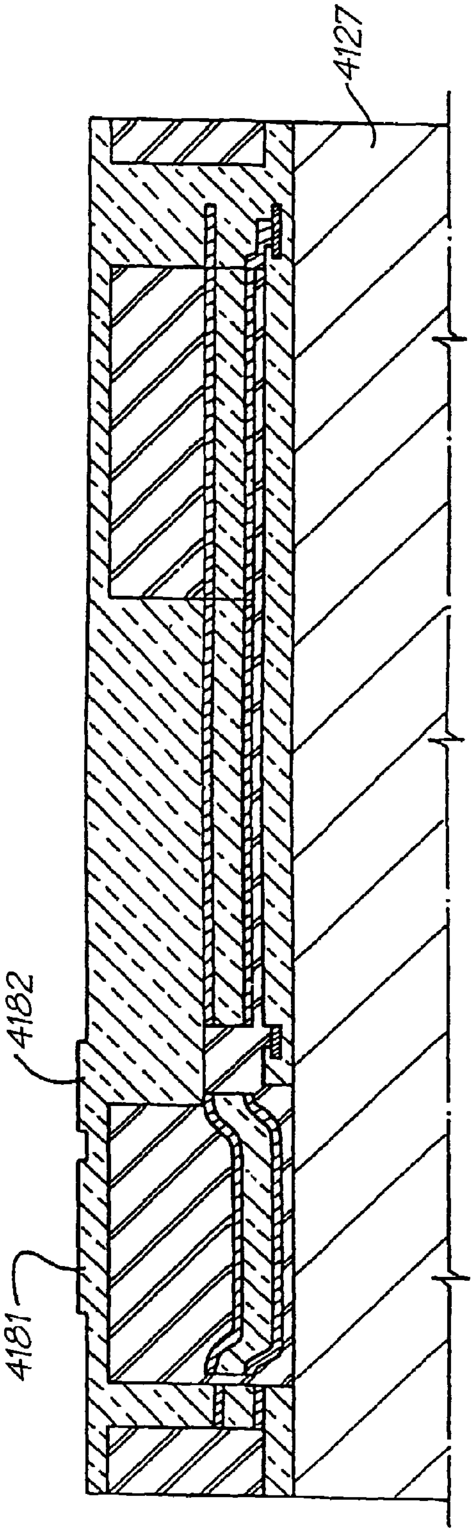

14. The deposited glass is then etched as shown in FIG. 904, to a depth of approximately 1 micron so as to form nozzle rim portion 4181 and actuator interconnect portion 4182.

Figure 905:
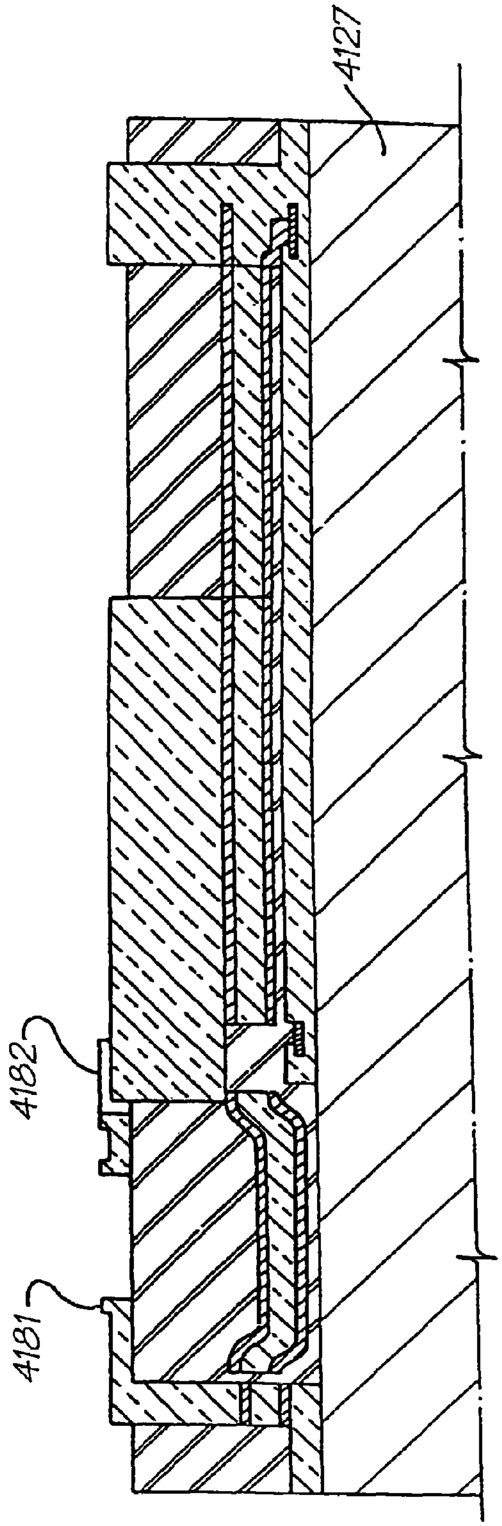

15. Next, as illustrated in FIG. 905, the glass layer is etched utilizing a 6th mask so as to form final nozzle rim portion 4181 and actuator guide portion 4182.

Figure 906:
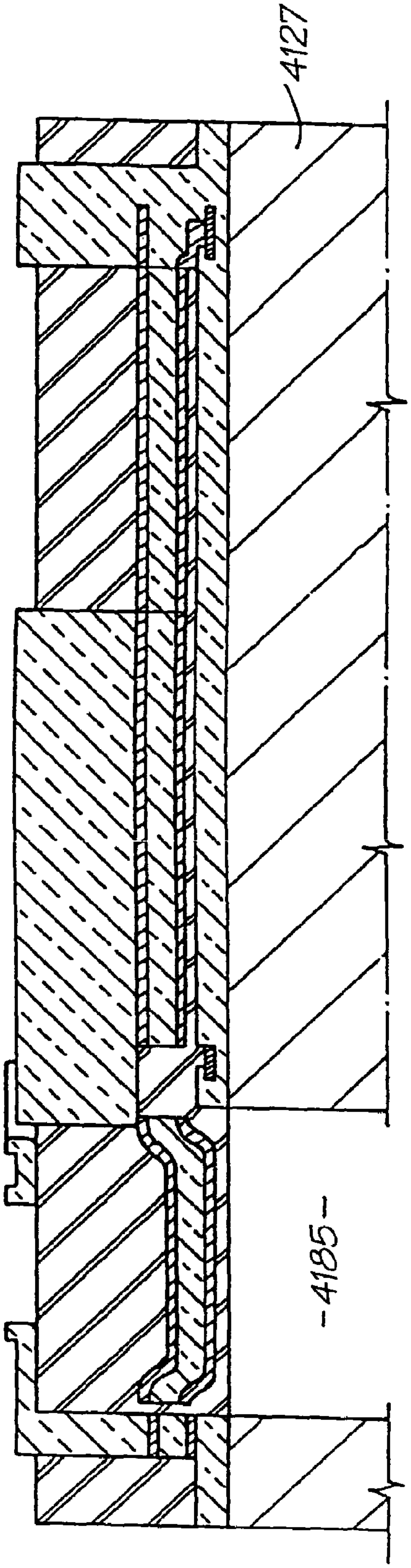

16. Next, as illustrated in FIG. 906, the ink supply channel is back etched 4185 from the back of the wafer utilizing a 7th mask. The etch can be performed utilizing a high precision deep silicon trench etcher such as the STS Advanced Silicon Etcher (ASE). This step can also be utilized to nearly completely dice the wafer.

Figure 907:
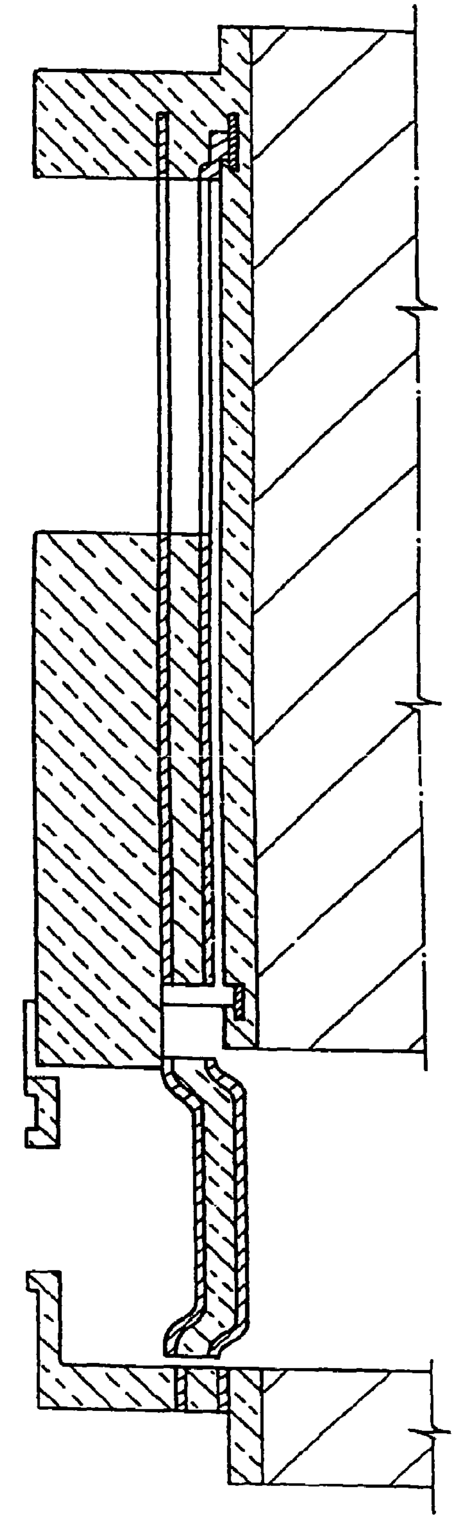

17. Next, as illustrated in FIG. 907 the sacrificial material can be stripped or dissolved to also complete dicing of the wafer in accordance with requirements.

18. Next, the printheads can be individually mounted on attached molded plastic ink channels to supply ink to the ink supply channels.

19. The electrical control circuitry and power supply can then be bonded to an etch of the printhead with a TAB film.

20. Generally, if necessary, the surface of the printhead is then hydrophobized so as to ensure minimal wicking of the ink along external surfaces. Subsequent testing can determine operational characteristics.

Importantly, as shown in the plan view of FIG. 908, the heater element has a tapered portion adjacent the post 4173 so as to ensure maximum heating occurs near the post.

Of course, different forms of inkjet printhead structures can be formed. For example, there is illustrated in FIG. 909, a portion of a single color printhead having two spaced apart rows 4190, 4191, with the two rows being interleaved so as to provide for a complete line of ink to be ejected in two stages. Preferably, a guide rail 4192 is provided for proper alignment of a TAB film with bond pads 4193. A second protective barrier 4194 can also preferably be provided. Preferably, as will become more apparent with reference to the description of FIG. 910 adjacent actuator arms are interleaved and reversed.

Turning now to FIG. 910, there is illustrated a full color printhead arrangement which includes three series of inkjet nozzles 4195, 4196, 4197 one each devoted to a separate color. Again, guide rails 4198, 4199 are provided in addition to bond pads, e.g. 4174. In FIG. 910, there is illustrated a general plan of the layout of a portion of a full color printhead which clearly illustrates the interleaved nature of the actuator arms.

Figure 912:
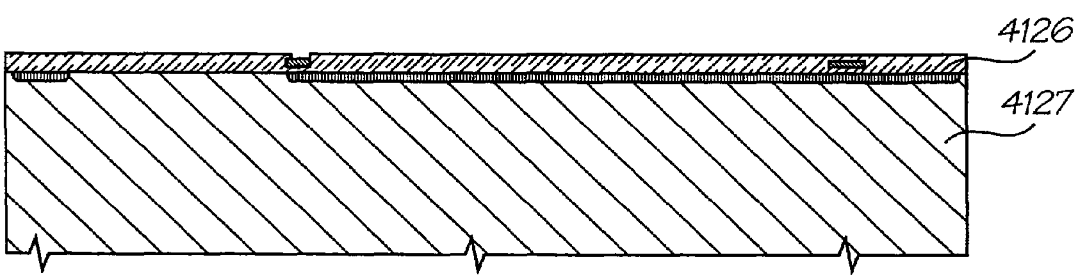

One alternative form of detailed manufacturing process which can be used to fabricate monolithic ink jet printheads operating in accordance with the principles taught by the present embodiment can proceed utilizing the following steps:

1. Using a double sided polished wafer 4127, complete drive transistors, data distribution, and timing circuits using a 0.5 micron, one poly, 2 metal CMOS process to form layer 4126. Relevant features of the wafer at this step are shown in FIG. 912. For clarity, these diagrams may not be to scale, and may not represent a cross section though any single plane of the nozzle. FIG. 911 is a key to representations of various materials in these manufacturing diagrams, and those of other cross referenced ink jet configurations.

Figure 913:
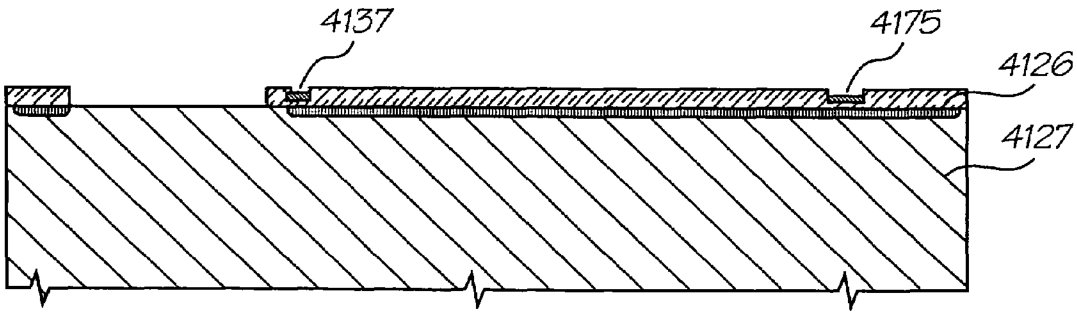

2. Etch oxide down to silicon or aluminum using Mask 1. This mask defines the nozzle chamber, the surface anti-wicking notch 4137, and the heater contacts 4175. This step is shown in FIG. 913.

3. Deposit 1 micron of sacrificial material 4155 (e.g. aluminum or photosensitive polyimide)

Figure 914:
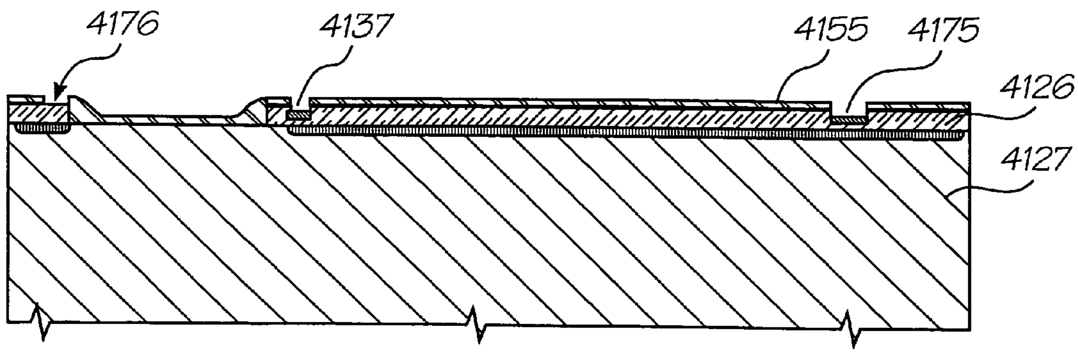

4. Etch (if aluminum) or develop (if photosensitive polyimide) the sacrificial layer using Mask 2. This mask defines the nozzle chamber walls 4176 and the actuator anchor point This step is shown in FIG. 914.

5. Deposit 1 micron of heater material 4160 (e.g. cupronickel or TiN). If cupronickel, then deposition can consist of three steps-a thin anti-corrosion layer of, for example, TiN, followed by a seed layer, followed by electroplating of the 1 micron of cupronickel.

6. Deposit 3.4 microns of PECVD glass 4161.

7. Deposit a layer 4162 identical to step 5.

Figure 915:
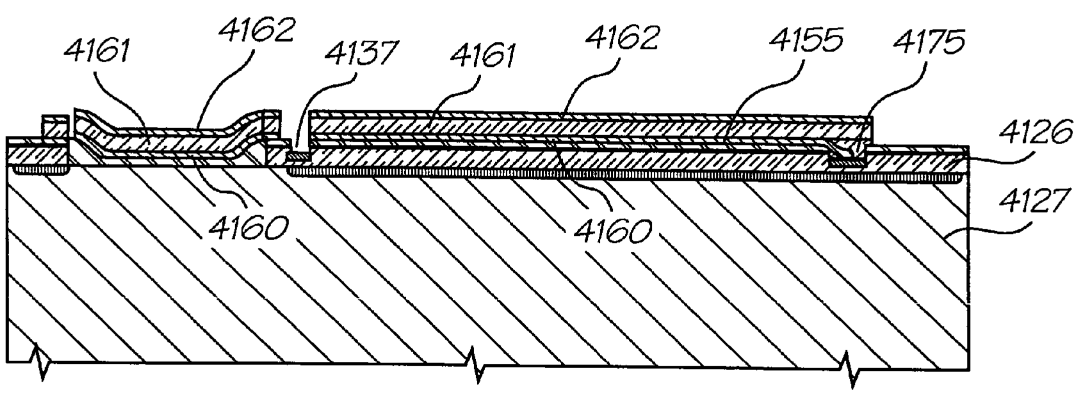

8. Etch both layers of heater material, and glass layer, using Mask 3. This mask defines the actuator, paddle, and nozzle chamber walls. This step is shown in FIG. 915.

9. Wafer probe. All electrical connections are complete at this point, bond pads are accessible, and the chips are not yet separated.

10. Deposit 10 microns of sacrificial material 4170.

Figure 916:
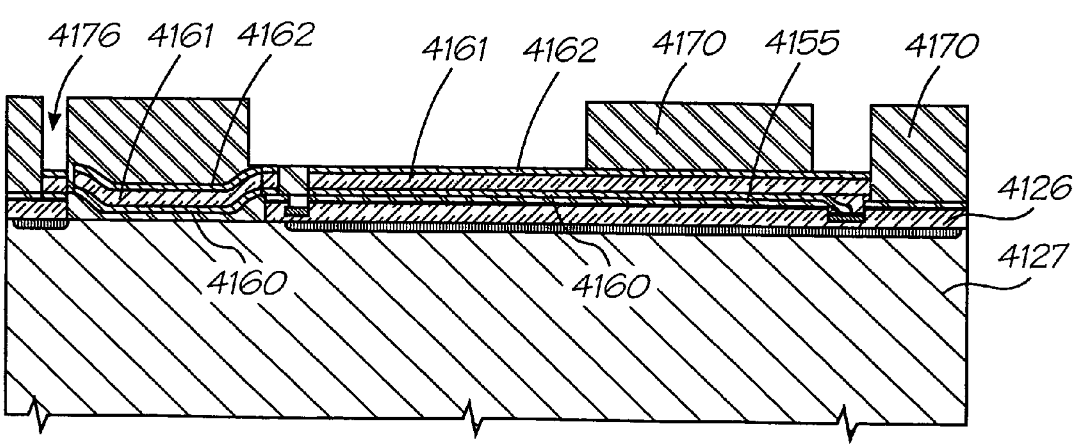

11. Etch or develop sacrificial material using Mask 4. This mask defines the nozzle chamber wall 4176. This step is shown in FIG. 916.

12. Deposit 3 microns of PECVD glass 4177.

Figure 917:
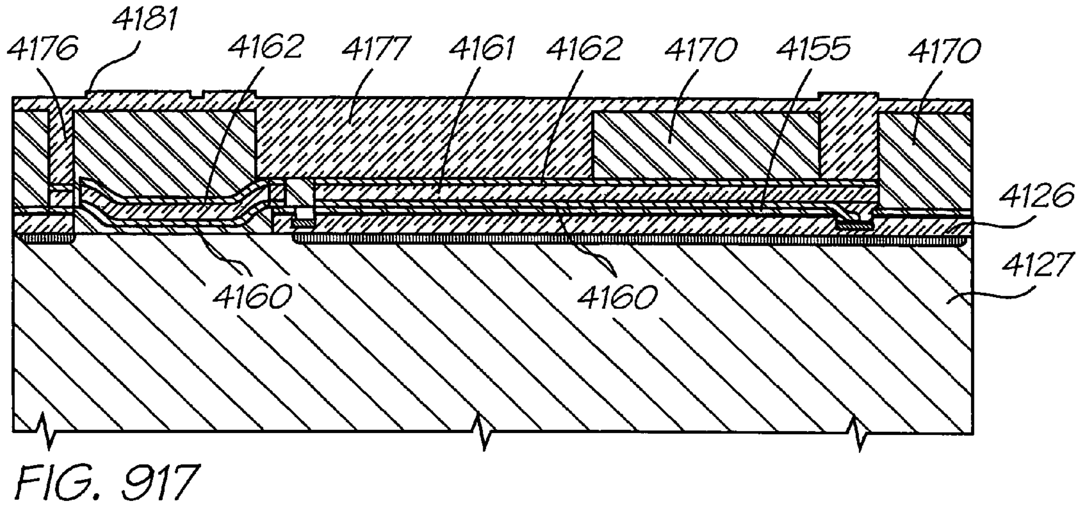

13. Etch to a depth of (approx.) 1 micron using Mask 5. This mask defines the nozzle rim 4181. This step is shown in FIG. 917.

Figure 918:
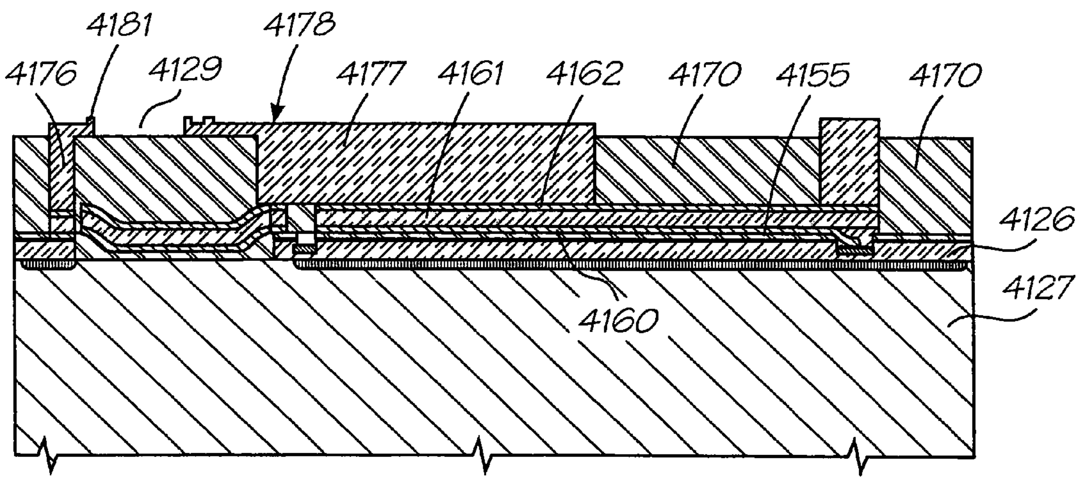

14. Etch down to the sacrificial layer using Mask 6. This mask defines the roof 4178 of the nozzle chamber, and the nozzle itself. This step is shown in FIG. 918.

Figure 919:
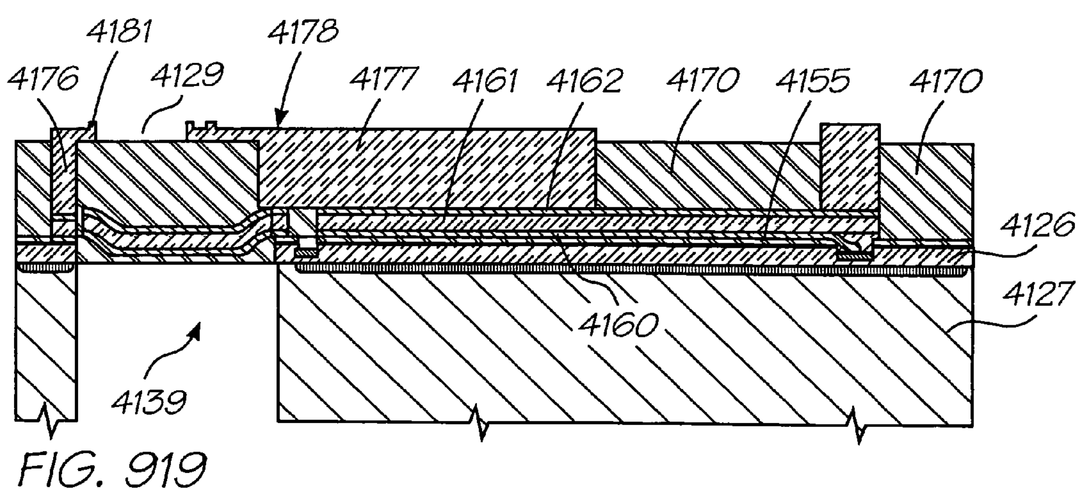

15. Back-etch completely through the silicon wafer (with, for example, an ASE Advanced Silicon Etcher from Surface Technology Systems) using Mask 7. This mask defines the ink inlets 4139 which are etched through the wafer. The wafer is also diced by this etch This step is shown in FIG. 919.

Figure 920:
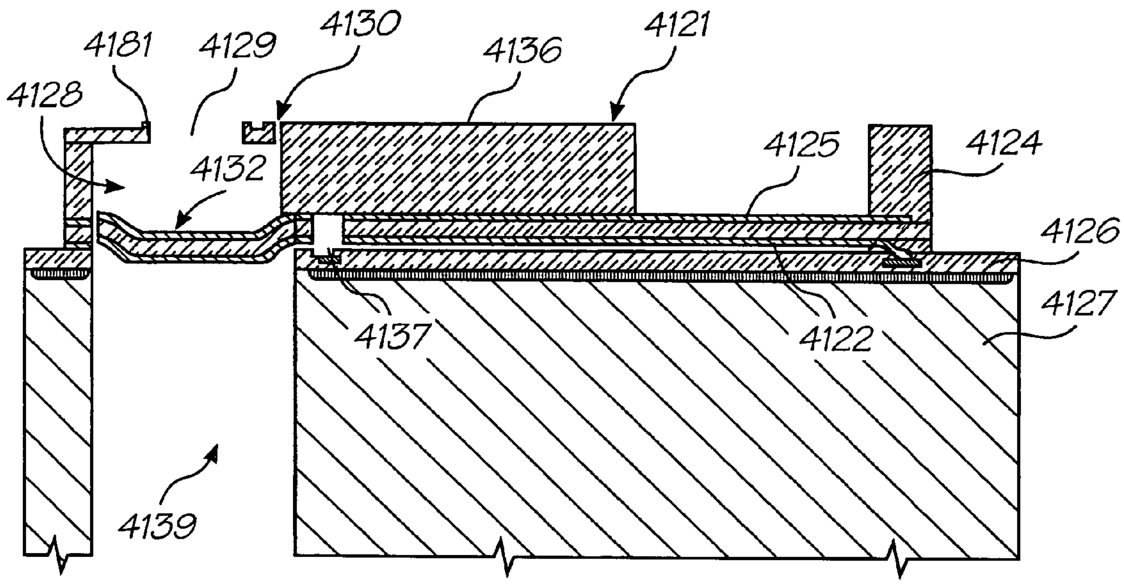

16. Etch the sacrificial material. The nozzle chambers are cleared, the actuators freed, and the chips are separated by this etch. This step is shown in FIG. 920.

17. Mount the printheads in their packaging, which may be a molded plastic former incorporating ink 10 channels which supply the appropriate color ink to the ink inlets at the back of the wafer.

18. Connect the printheads to their interconnect systems. For a low profile connection with minimum disruption of airflow, TAB may be used. Wire bonding may also be used if the printer is to be operated with sufficient clearance to the paper.

19. Hydrophobize the front surface of the printheads.

Figure 921:
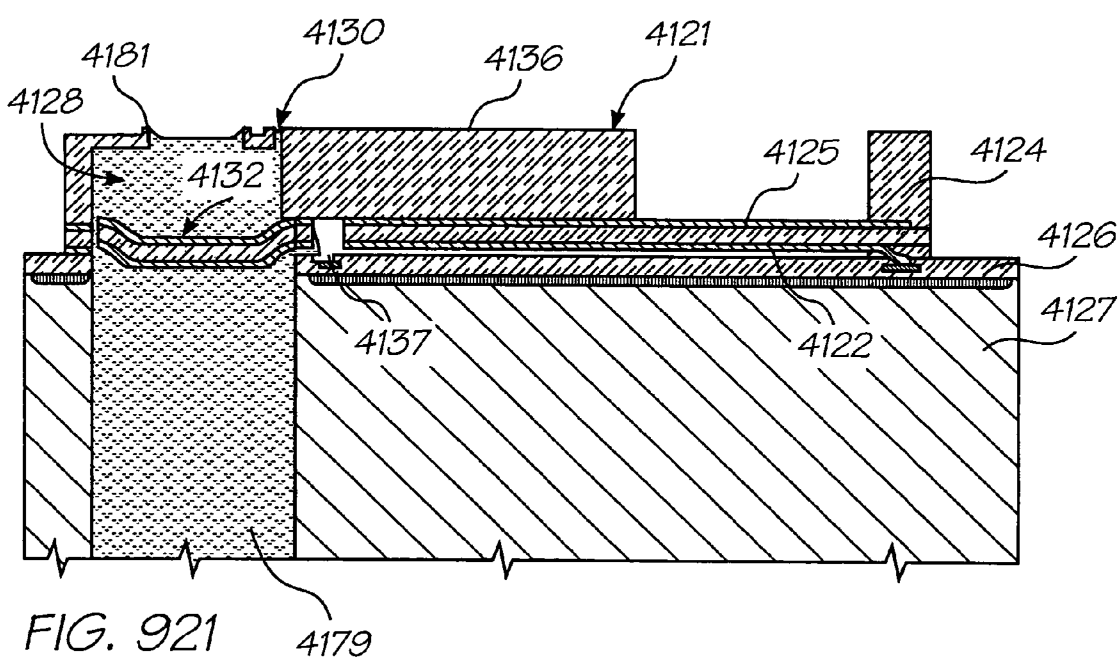

20. Fill the completed printheads with ink 4179 and test them. A filled nozzle is shown in FIG. 921.

IJ42

In a preferred embodiment, ink is ejected out of a nozzle chamber via an ink ejection port as the result of the utilization of a series of radially positioned thermal actuator devices that are arranged around the ink ejection port and are activated so as to pressurize the ink within the nozzle chamber thereby causing ink ejection.

Turning now to FIGS. 922, 923 and 924, there is illustrated the basic operational principles of a preferred embodiment. FIG. 922 illustrates a single nozzle arrangement 4201 in a quiescent state. The arrangement 4201 includes a nozzle chamber 4202 which is normally filled with ink to form a meniscus 4203 in an ink ejection port 4204. The nozzle chamber 4202 is formed within a wafer 4205. The nozzle chamber 4202 is in fluid communication with an ink supply channel 4206 which is etched through the wafer 4205 using a highly isotropic plasma etching system. A suitable etcher is the Advance Silicon Etch (ASE) system available from Surface Technology Systems of the United Kingdom.

The nozzle arrangement 4201 includes a series of radially positioned thermoactuator devices 4208, 4209 about the ink ejection port 4204. These devices comprise a series of polytetrafluoroethylene (PTFE) actuators having an internal serpentine copper core, which is positioned so that upon heating of the copper core, the subsequent expansion of the surrounding Teflon results in a generally inward movement of radically outer edges of the actuators 4208, 4209. Hence, when it is desired to eject ink from the ink ejection nozzle 4204, a current is passed through the actuators 4208, 4209 which results in the bending as illustrated in FIG. 923. The bending movement of actuators 4208, 4209 results in a substantial increase in pressure within the nozzle chamber 4202. The rapid increase in pressure in nozzle chamber 4202, in turn results in a rapid expansion of the meniscus 4203 as illustrated in FIG. 923.

The actuators 4208, 4209 are briefly activated only and subsequently deactivated so that the actuators 4208, 4209 rapidly return to their original positions as shown in FIG. 924. This results in a general inflow of ink and a necking and breaking of the meniscus 4203 resulting in the ejection of a drop 4212. The necking and breaking of the meniscus 4203 is a consequence of a forward momentum of the ink of the drop 4212 and a negative pressure created as a result of the return of the actuators 4208, 4209 to their original positions. The return of the actuators 4208, 4209 also results in a general inflow of ink in the direction of an arrow so from the supply channel 4206. Surface tension effects results in a return of the nozzle arrangement 4201 to the quiescent position as illustrated in FIG. 922.

FIGS. 925(*a*) and 925(*b*) illustrate a principle of operation of the thermal actuators 4208, 4209. Each thermal 4208, 4209 actuator is preferably constructed from a material 4214 having a high coefficient of thermal expansion. Embedded within the material 4214 is a series of heater elements 4215 which can be a series of conductive elements designed to carry a current. The conductive elements 4215 are heated by passing a current through the elements 4215 with the heating resulting in a general increase in temperature in the area around the heating elements 4215. The increase in temperature causes a corresponding expansion of the PTFE which has a high coefficient of thermal expansion. Hence, as illustrated in FIG. 925(*b*), the PTFE is bent generally in a inward direction.

Turning now to FIG. 926, there is illustrated a side perspective view of one nozzle arrangement constructed in accordance with the principles previously outlined. The nozzle chamber 4202 is formed by an isotropic surface etch of the wafer 4205. The wafer 4205 includes a CMOS layer 4221 including all the required power and drive circuits. Further, the actuators 4208, 4209 are fabricated as a series of leaf or petal type actuators each having an internal copper or aluminum core 4217 which winds in a serpentine nature to provide for substantially unhindered expansion of the actuator device. The operation of the actuators 4208, 4209 is as described earlier with reference to FIG. 925(*a*) and FIG. 925(*b*) such that, upon activation, the petals 4208 bend inwardly as previously described. The ink supply channel 4206 is created with a deep silicon back edge of the wafers utilizing a plasma etcher or the like. The copper or aluminum coil 4217 defines a complete circuit A central arm 4218 which includes both metal and PTFE portions provides main structural support for the actuators 4208,4209 in addition to providing a current trace for the conductive elements.

Figure 927:
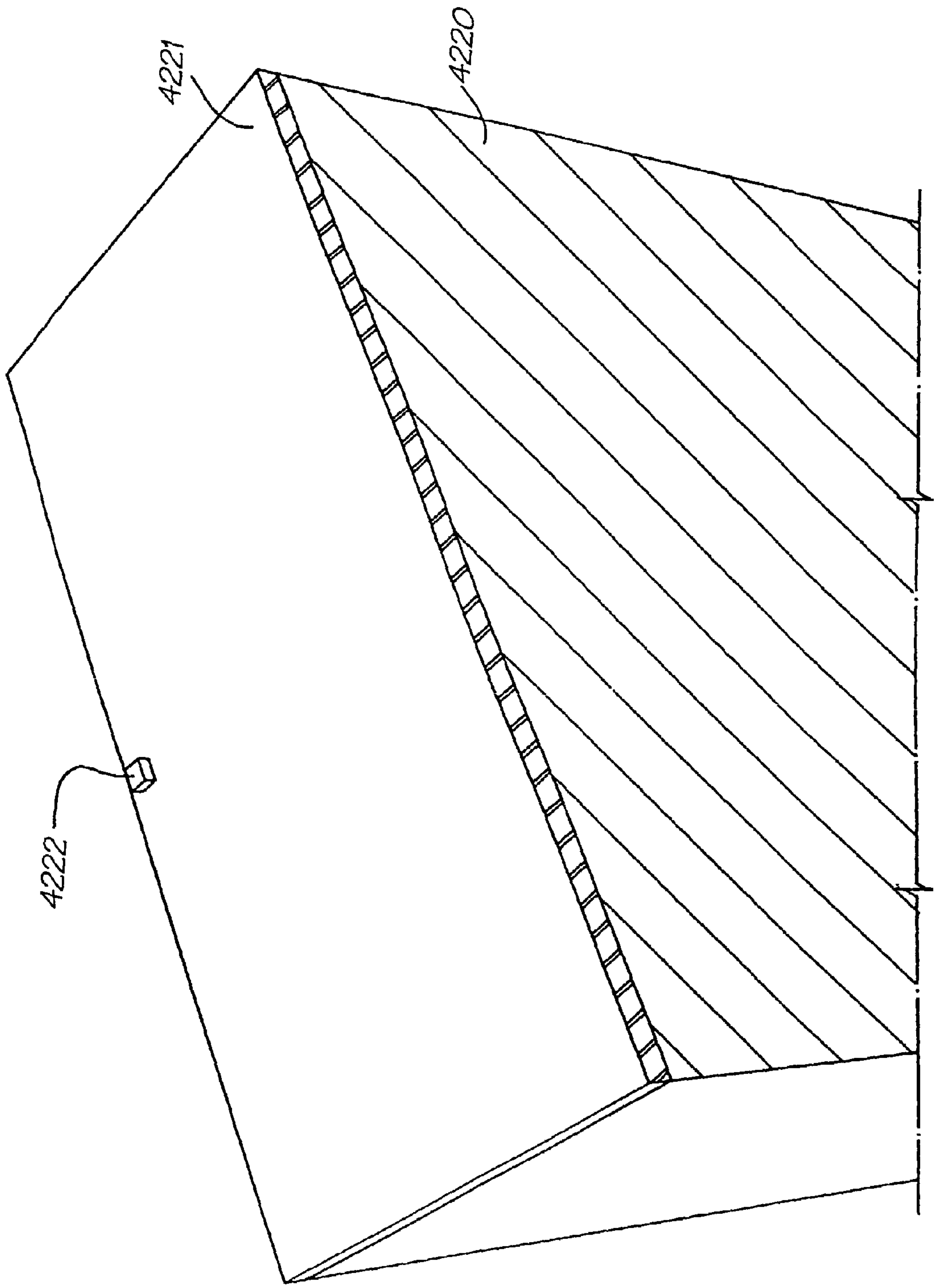

Steps of the manufacture of the nozzle arrangement 4201 are described with reference to FIG. 927 to FIG. 934. The nozzle arrangement 4201 is preferably constructed utilizing microelectromechanical (MEMS) techniques and can include the following construction techniques:

As shown initially in FIG. 927, the initial processing starting material is a standard semi-conductor wafer 4220 having a complete CMOS level 4221 to the first level metal. The first level metal includes portions 4222 which are utilized for providing power to the thermal actuators 4208,4209 (FIG. 926).

Figure 928:
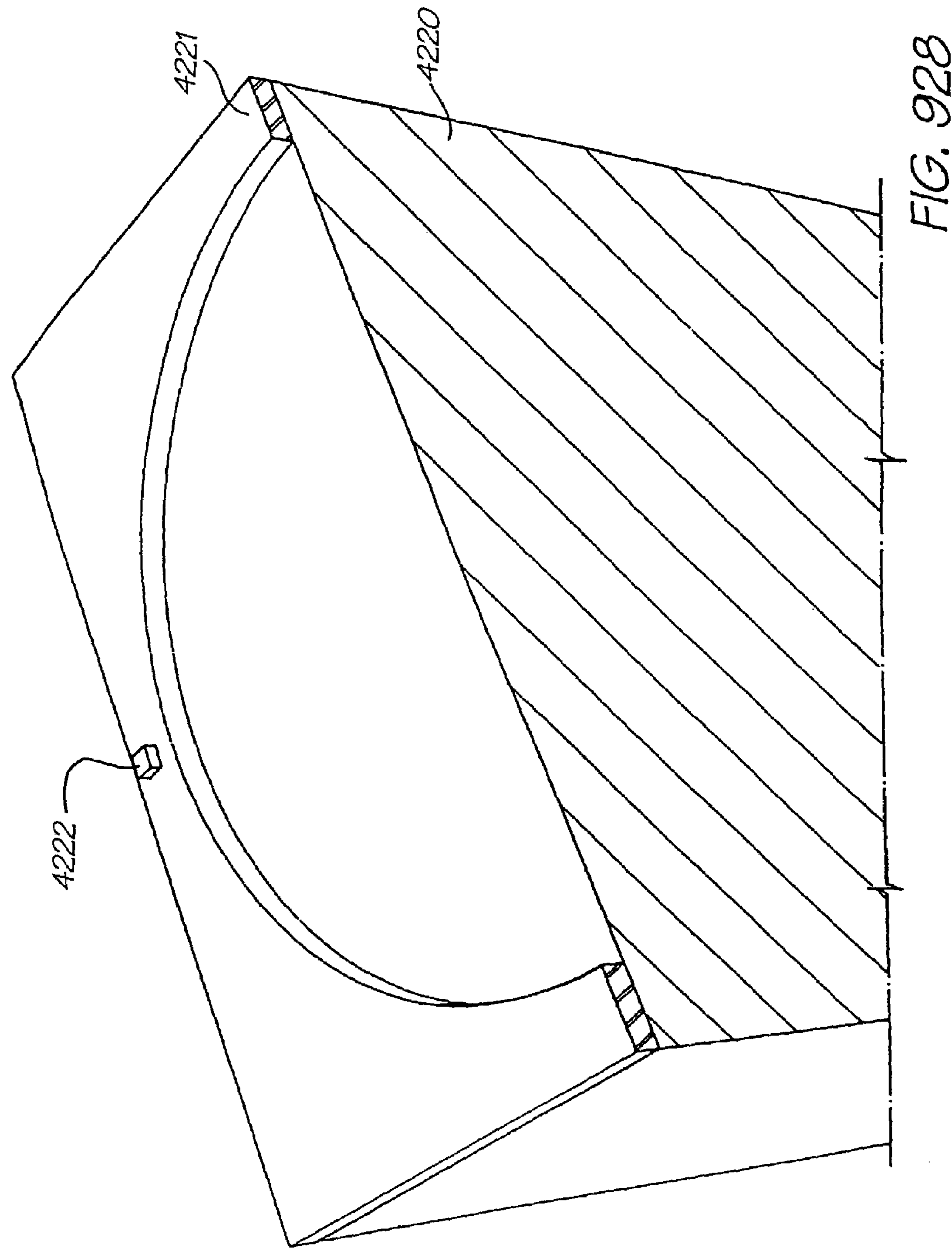

The first step, as illustrated in FIG. 928, is to etch a nozzle region down to the silicon wafer 4220 utilizing an appropriate mask.

Figure 929:
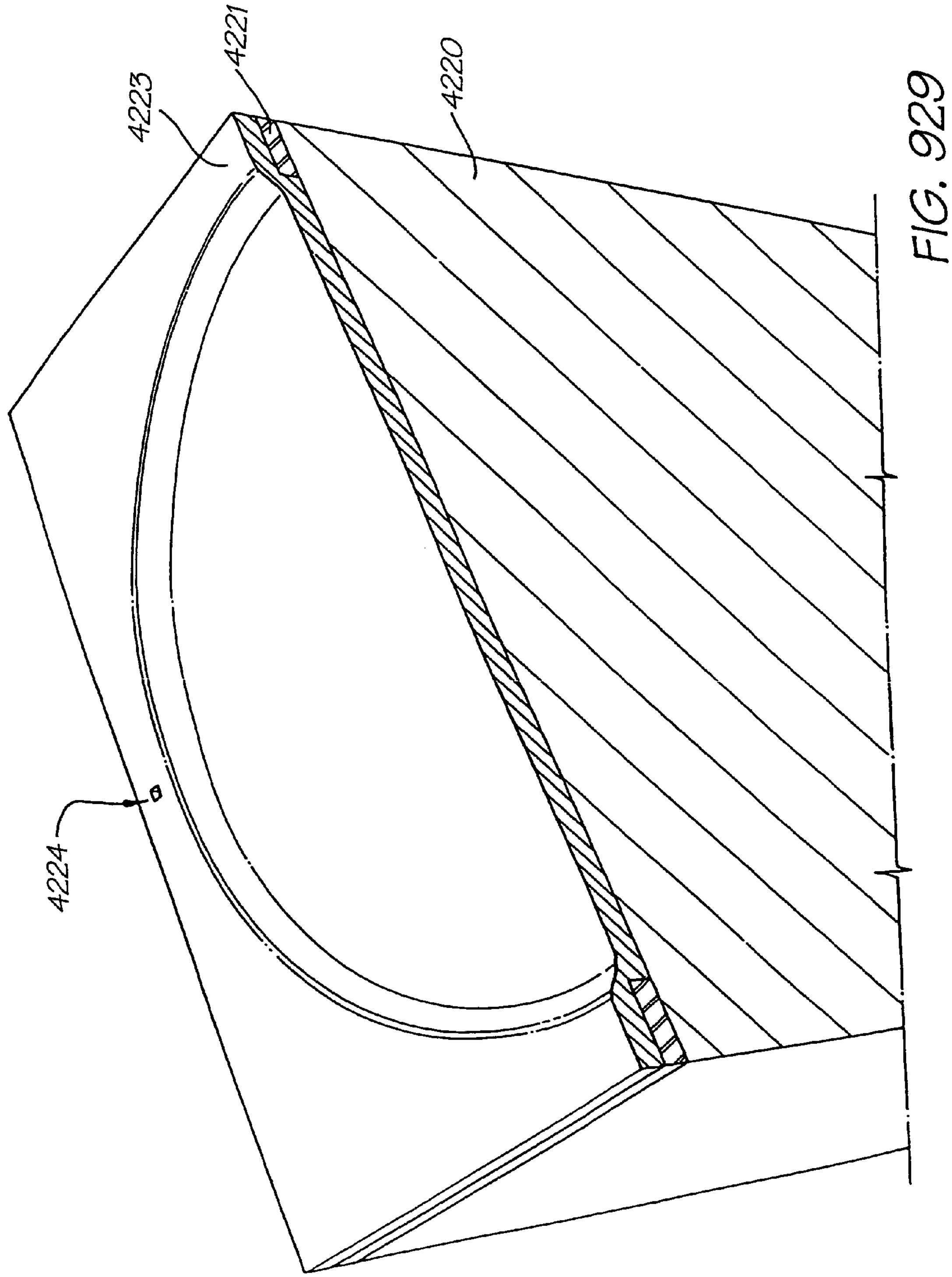

Next, as illustrated in FIG. 929, a 2 micron layer of polytetrafluoroethylene (PTFE) 4223 is deposited and etched to define vias 4224 for interconnecting multiple levels.

Figure 930:
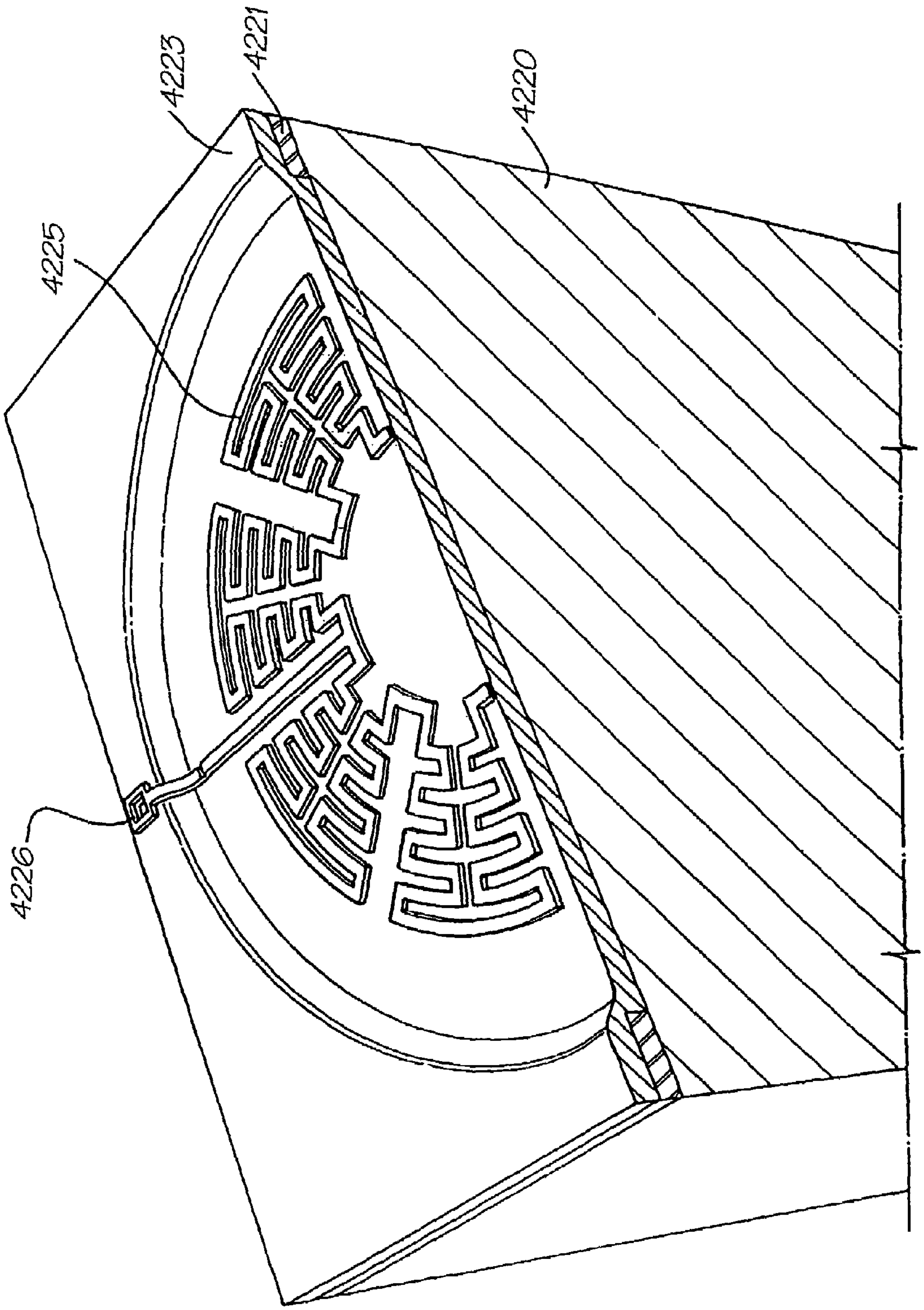

Next, as illustrated in FIG. 930, the second level metal layer is deposited, masked and etched to form a heater structure 4225. The heater structure 4225 is connected at 4226 with a lower aluminum layer.

Figure 931:
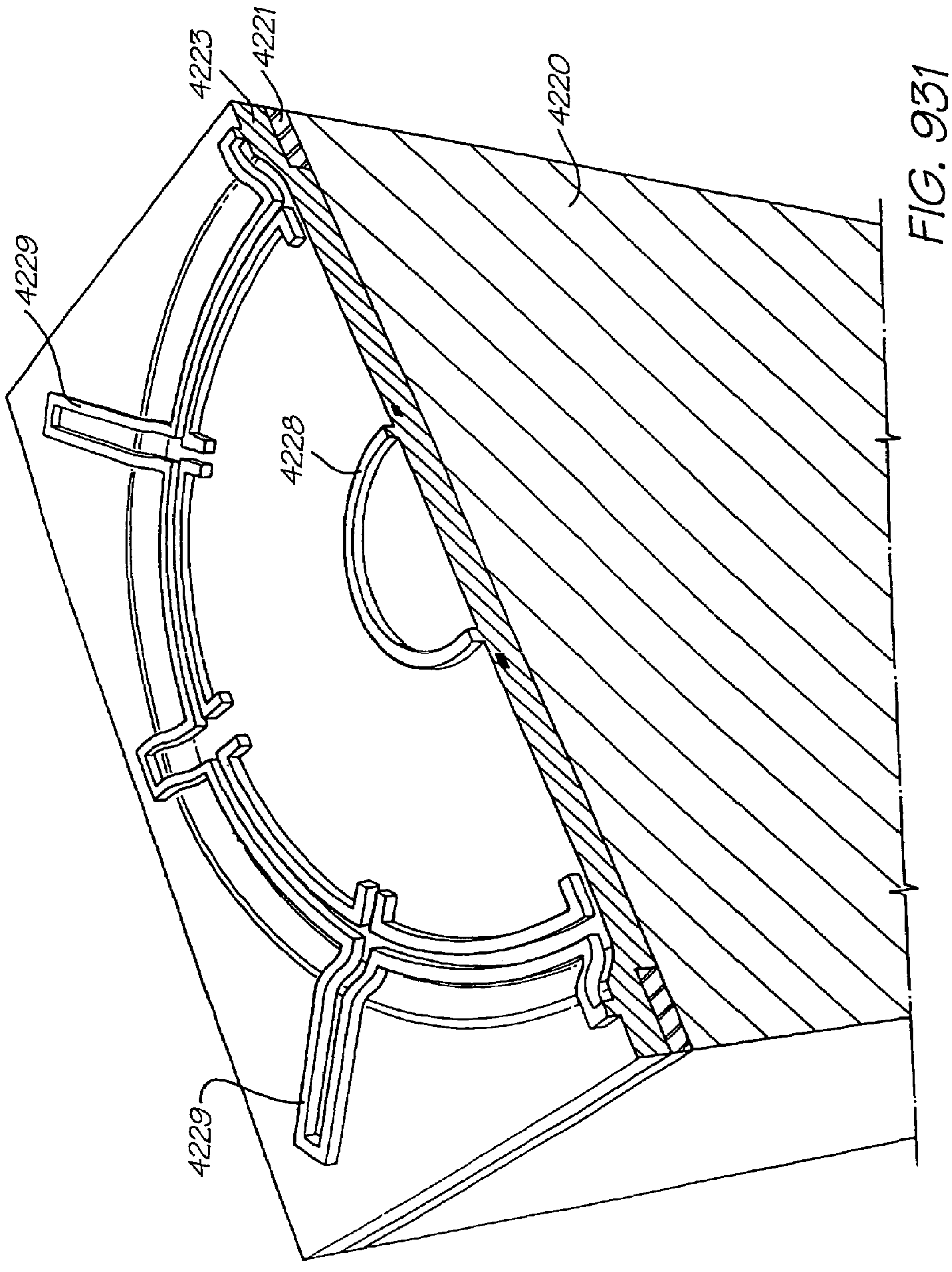

Next, as illustrated in FIG. 931, a further 2 micron layer of PTFE 4223 is deposited and etched to a depth of micron utilizing a nozzle rim mask so as to form a nozzle rim 4228 in addition to ink flow guide rails 4229 which inhibit wicking along the surface of the IPTE layer. The guide rails 4229 thin slots. Thus, surface tension effects result in minimal outflow of ink during operation from the slots.

Figure 932:
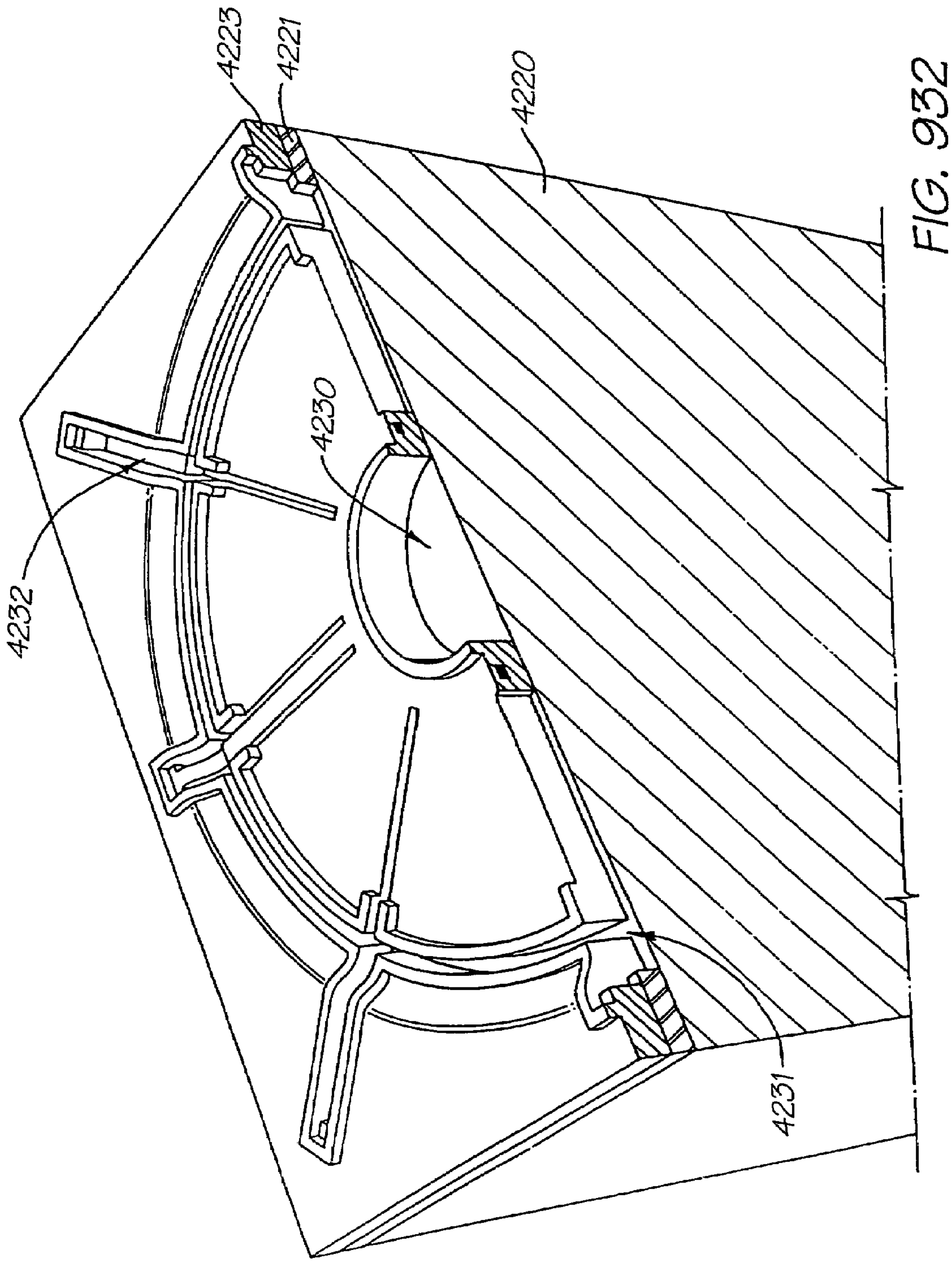

Next, as illustrated in FIG. 932, the PTFE is etched utilizing a nozzle and actuator mask to define an ejection nozzle port 4230 and slots 4231 and 4232.

Next, as illustrated in FIG. 933, the wafer is crystallographically etched on a <111 >plane utilizing a standard crystallographic etchant such as KOH. The etching forms a chamber 4233, directly below the ink ejection port 4230.

Next, tuning to FIG. 934, the ink supply channel 4206 is etched from a back of the wafer utilizing a highly anisotropic etcher such as the STS etcher from Silicon Technology Systems of the United Kingdom. An array 4236 of ink jet nozzles can be formed simultaneously with a portion of the array 4236 being illustrated in FIG. 935. A portion of the printhead is formed simultaneously and diced by the STS etching process. The array 4236 shown provides for four column printing with each separate column attached to a different color ink supply channel which is supplied from the back of the wafer. Bond pads 4237 provide for electrical control of the ejection mechanism.

In this manner, large pagewidth printheads can be formulated to provide for a drop on demand ink ejection mechanism.

Figure 937:
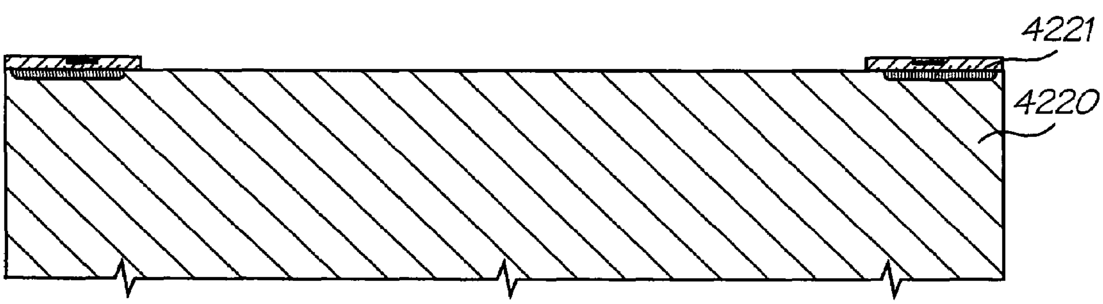

One form of detailed manufacturing process which can be used to fabricate monolithic ink jet printheads operating in accordance with the principles taught by the present embodiment can proceed along the following steps:

1. Using a double sided polished wafer 4220, complete a 0.5 micron, one poly, 2 metal CMOS process to form layer 4221. This step is shown in FIG. 937. For clarity, these diagrams may not be to scale, and may not represent a cross section though any single plane of the nozzle. FIG. 936 is a key to representations of various materials in these manufacturing diagrams, and those of other cross referenced inkjet configurations.

2. Etch the CMOS oxide layers down to silicon or second level metal using Mask 1. This mask defines the nozzle cavity and the edge of the chips. This step is shown in FIG. 937.

3. Deposit a thin layer (not shown) of a hydrophilic polymer, and treat the surface of this polymer for PTFE adherence.

4. Deposit 1.5 microns of polytetrafluoroethylene (PTFE) 4260.

Figure 938:
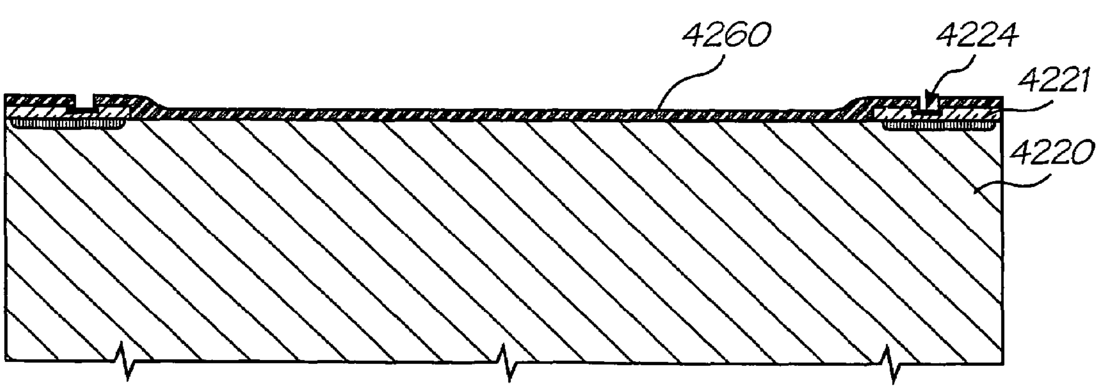

5. Etch the PTFE and CMOS oxide layers to second level metal using Mask 2. This mask defines the contact vias 4224 for the heater electrodes. This step is shown in FIG. 938.

Figure 939:
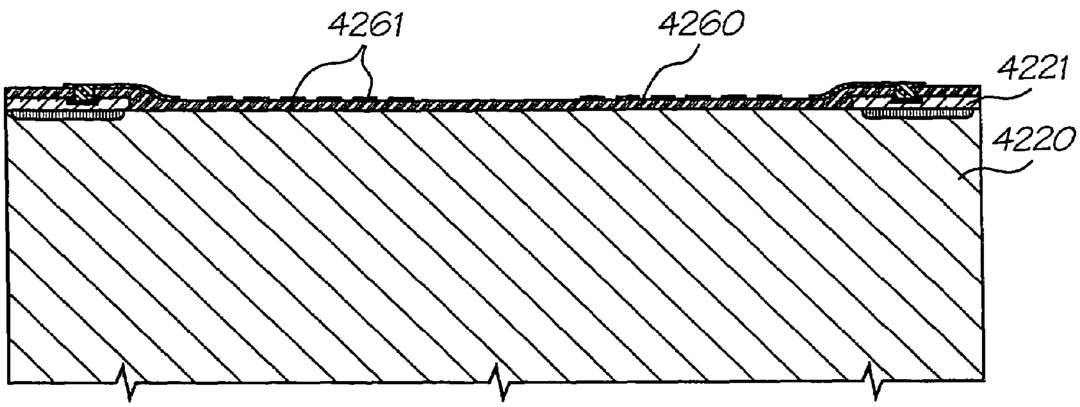

6. Deposit and pattern 0.5 microns of gold 4261 using a lift-off process using Mask 3. This mask defines the heater pattern. This step is shown in FIG. 939.

7. Deposit 1.5 microns of PTFE 4262.

Figure 940:
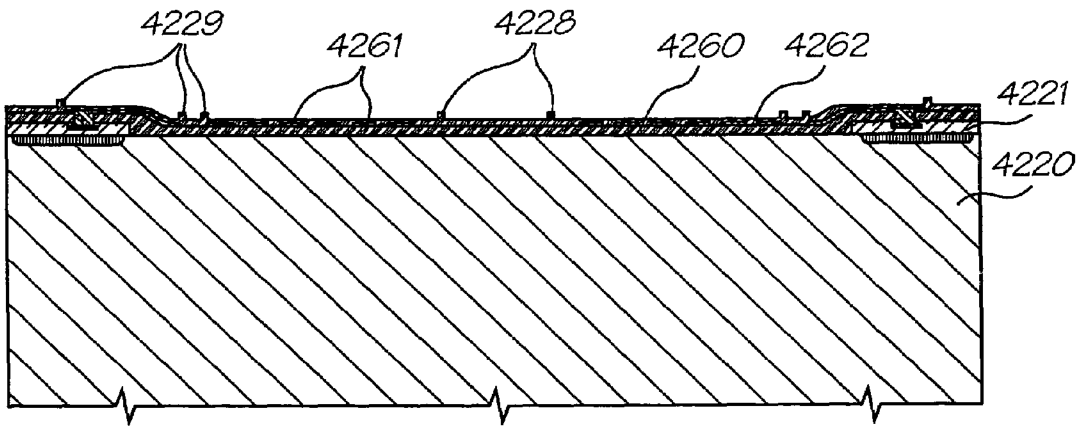

8. Etch 1 micron of PTFE using Mask 4. This mask defines the nozzle rim 4228 and the ink flow guide rails 4229 at the edge of the nozzle chamber. This step is shown in FIG. 940.

Figure 941:
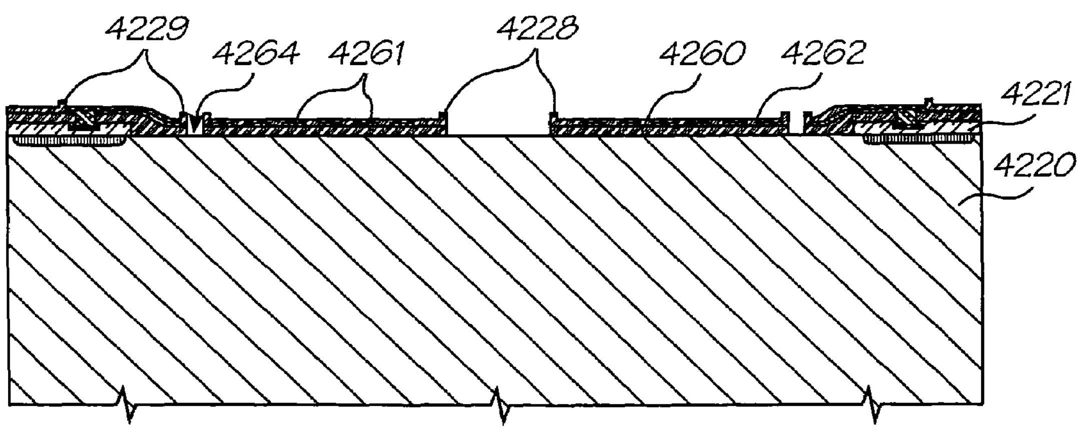

9. Etch both layers of PTFE and the thin hydrophilic layer down to silicon using Mask 5. This mask defines a gap 4264 at the edges of the actuators 4208, 4209 (FIG. 926), and the edge of the chips. It also forms the mask for the subsequent crystallographic etch. This step is shown in FIG. 941.

Figure 942:
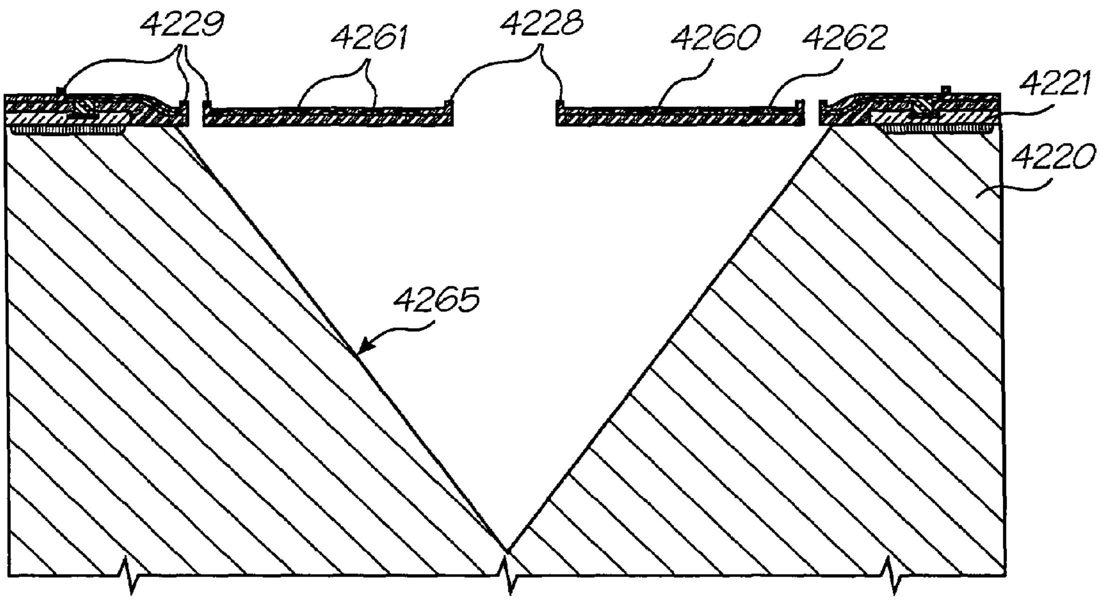

10. Crystallographically etch the exposed silicon using KOH. This etch stops on <111> crystallographic planes 4265, forming an inverted square pyramid with sidewall angles of 54.74 degrees. This step is shown in FIG. 942.

Figure 943:
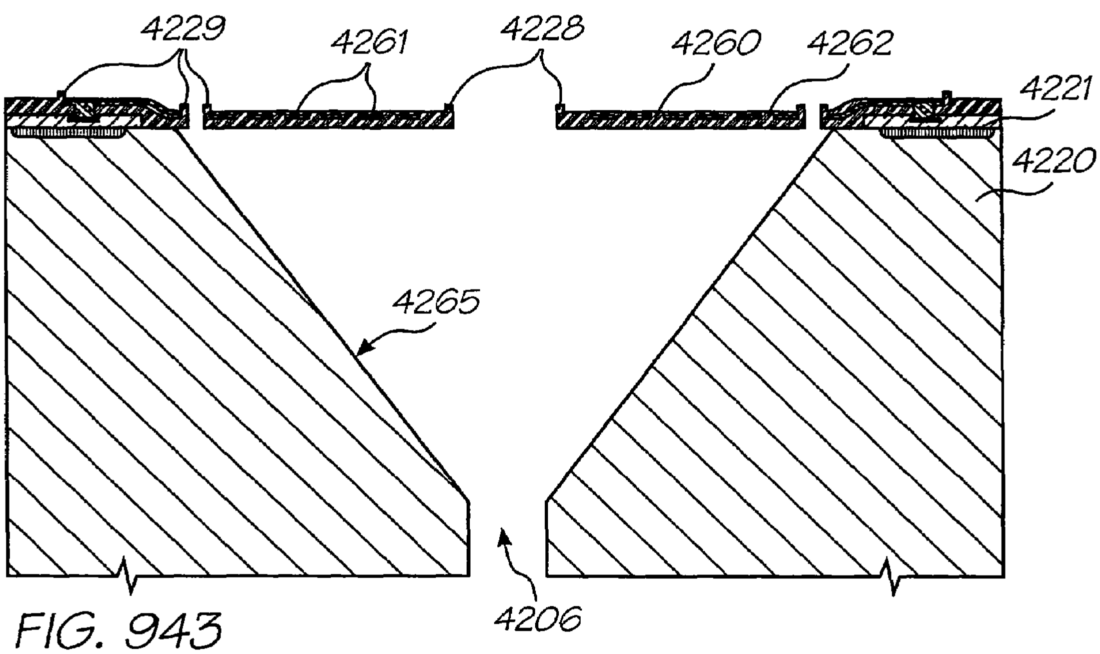

11. Back-etch through the silicon wafer (with, for example, an ASE Advanced Silicon Etcher from Surface Technology Systems) using Mask 6. This mask defines the ink supply channel 4206 which are etched through the wafer 4220. The wafer 4220 is also diced by this etch. This step is shown in FIG. 943.

12. Mount the printheads in their packaging, which may be a molded plastic former incorporating ink channels which supply the appropriate color ink to the ink inlets at the back of the wafer.

13. Connect the printheads to their interconnect systems. For a low profile connection with minimum disruption of airflow, TAB may be used. Wire bonding may also be used if the printer is to be operated with sufficient clearance to the paper.

Figure 944:
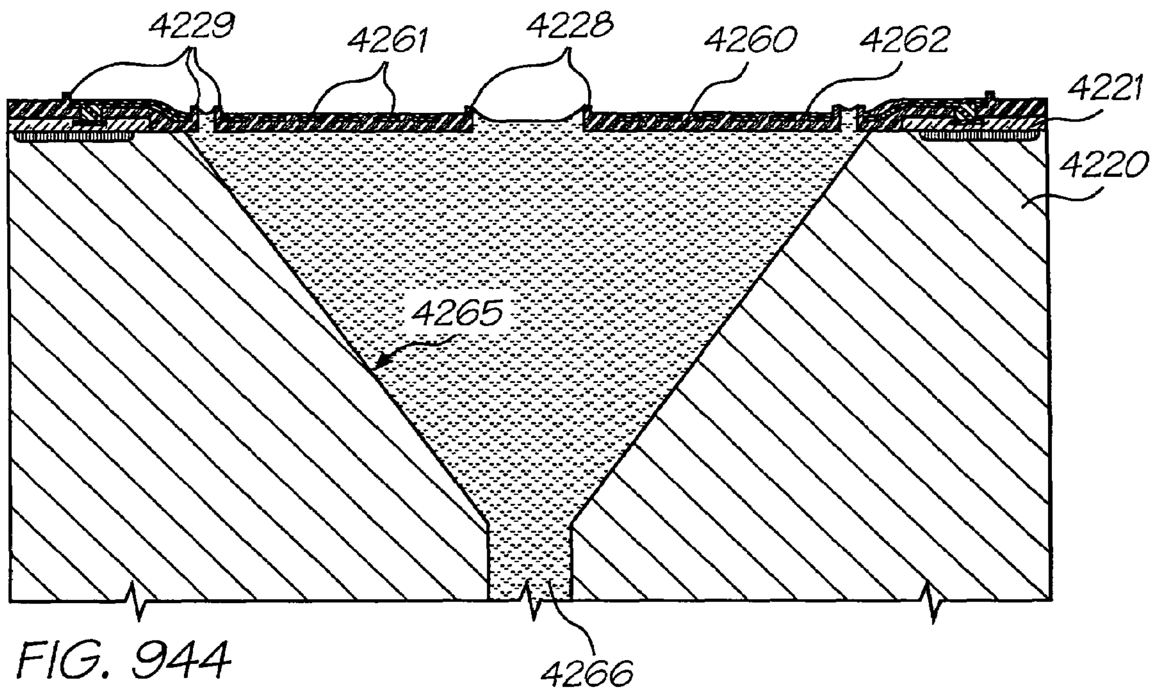

14. Fill the completed printheads with ink 4266 and test them. A filled nozzle is shown in FIG. 944.

IJ43

In a preferred embodiment, ink is ejected out of a nozzle chamber via an ink ejection port using a series of radially positioned thermal actuator devices that are arranged about the ink ejection port and are activated to pressurize the ink within the nozzle chamber thereby causing the ejection of ink through the ejection port.

Turning now to FIGS. 945, 946 and 947, there is illustrated the basic operational principles of a preferred embodiment FIG. 945 illustrates a single nozzle arrangement 4301 in its quiescent state. The arrangement 4301 includes a nozzle chamber 4302 which is normally filled with ink so as to form a meniscus 4303 in an ink ejection port 4304. The nozzle chamber 4302 is formed within a wafer 4305. The nozzle chamber 4302 is supplied with ink via an ink supply channel 4306 which is etched through the wafer 4305 with a highly isotropic plasma etching system. A suitable etcher can be the Advance Silicon Etch (ASE) system available from Surface Technology Systems of the United Kingdom.

A top of the nozzle arrangement 4301 includes a series of radially positioned actuators 4308, 4309. These actuators comprise a polytetrafluoroethylene (PTFE) layer and an internal serpentine copper core 4317. Upon heating of the copper core 4317, the surrounding PTFE expands rapidly resulting in a generally downward movement of the actuators 4308, 4309. Hence, when it is desired to eject ink from the ink ejection port 4304, a current is passed through the actuators 4308, 4309 which results in them bending generally downwards as illustrated in FIG. 946. The downward bending movement of the actuators 4308, 4309 results in a substantial increase in pressure within the nozzle chamber 4302. The increase in pressure in the nozzle chamber 4302 results in an expansion of the meniscus 4303 as illustrated in FIG. 946.

The actuators 4308, 4309 are activated only briefly and subsequently deactivated. Consequently, the situation is as illustrated in FIG. 947 with the actuators 4308, 4309 returning to their original positions. This results in a general inflow of ink back into the nozzle chamber 4302 and a necking and breaking of the meniscus 4303 resulting in the ejection of a drop 4312. The necking and breaking of the meniscus 4303 is a consequence of the forward momentum of the ink associated with drop 4312 and the backward pressure experienced as a result of the return of the actuators 4308, 4309 to their original positions. The return of the actuators 4308, 4309 also results in a general inflow of ink 4350 from the channel 4306 as a result of surface tension effects and, eventually, the state returns to the quiescent position as illustrated in FIG. 945.

FIGS. 948(*a*) and 948(*b*) illustrate the principle of operation of the thermal actuator. The thermal actuator is preferably constructed from a material 4314 having a high coefficient of thermal expansion. Embedded within the material 4314 are a series of heater elements 4315 which can be a series of conductive elements designed to carry a current. The conductive elements 4315 are heated by passing a current through the elements 4315 with the heating resulting in a general increase in temperature in the area around the heating elements 4315. The position of the elements 4315 is such that uneven heating of the material 4314 occurs. The uneven increase in temperature causes a corresponding uneven expansion of the material 4314. Hence, as illustrated in FIG. 948(*b*), the PTFE is bent generally in the direction 4351 shown.

In FIG. 949, there is illustrated a cross-sectional perspective view of one embodiment of a nozzle arrangement constructed in accordance with the principles previously outlined. The nozzle chamber 4302 formed with an isotropic surface etch of the wafer 4305. The wafer 4305 can include a CMOS layer including all the required power and drive circuits. Further, the actuators 4308, 4309 each have a leaf or petal formation which extends towards a nozzle rim 4328 defining the ejection port 4304. The normally inner end of each leaf or petal formation is displaceable with respect to the nozzle rim 4328. Each activator 4308, 4309 has an internal copper core 4317 defining the element 4315 (FIG. 948(*a*)). The core 4317 winds in a serpentine manner to provide for substantially unhindered expansion of the actuators 4308, 4309. The operation of the actuators 4308, 4309 is as illustrated in FIG. 949(*a*) and FIG. 949(*b*) such that, upon activation, the actuators 4308 bend as previously described resulting in a displacement of each petal formation away from the nozzle rim 4328 and into the nozzle chamber 4302. The ink supply channel 4306 can be created via a deep silicon back etch of the wafer 4305 utilizing a plasma etcher or the like. The copper or aluminum core 4317 can provide a complete circuit. A central arm 4318 which can include both metal and PTFE portions provides the main structural support for the actuators 4308,4309.

Figure 950:
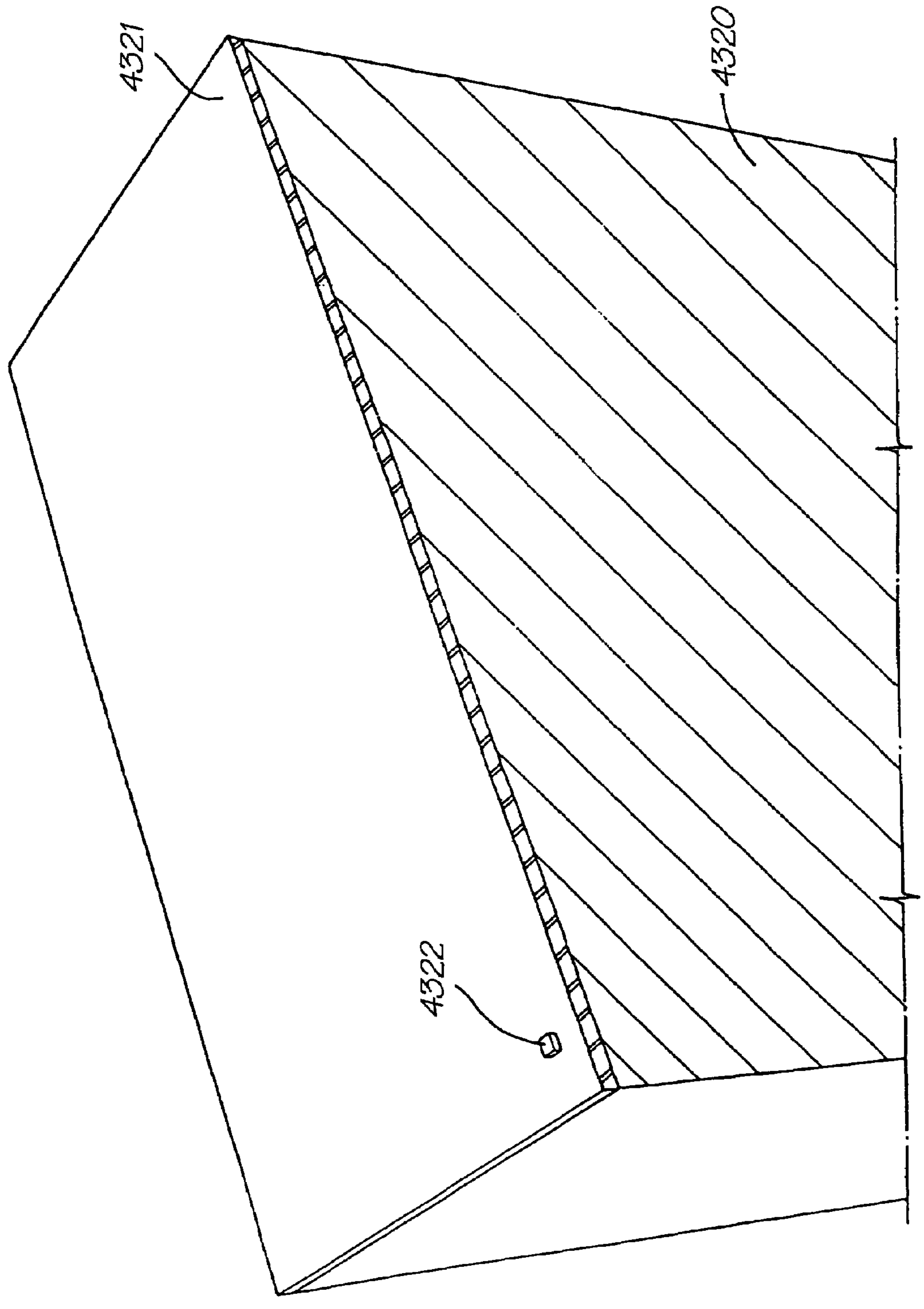

Turning now to FIG. 950 to FIG. 957, one form of manufacture of the nozzle arrangement 4301 in accordance with the principles of a preferred embodiment is shown. The nozzle arrangement 4301 is preferably manufactured using microelectromechanical (MEMS) techniques and can include the following construction techniques:

As shown initially in FIG. 950, the initial processing starting material is a standard semi-conductor wafer 4320 having a complete CMOS level 4321 to a first level of metal. The first level of metal includes portions 4322 which are utilized for providing power to the thermal actuators 4308, 4309.

Figure 951:
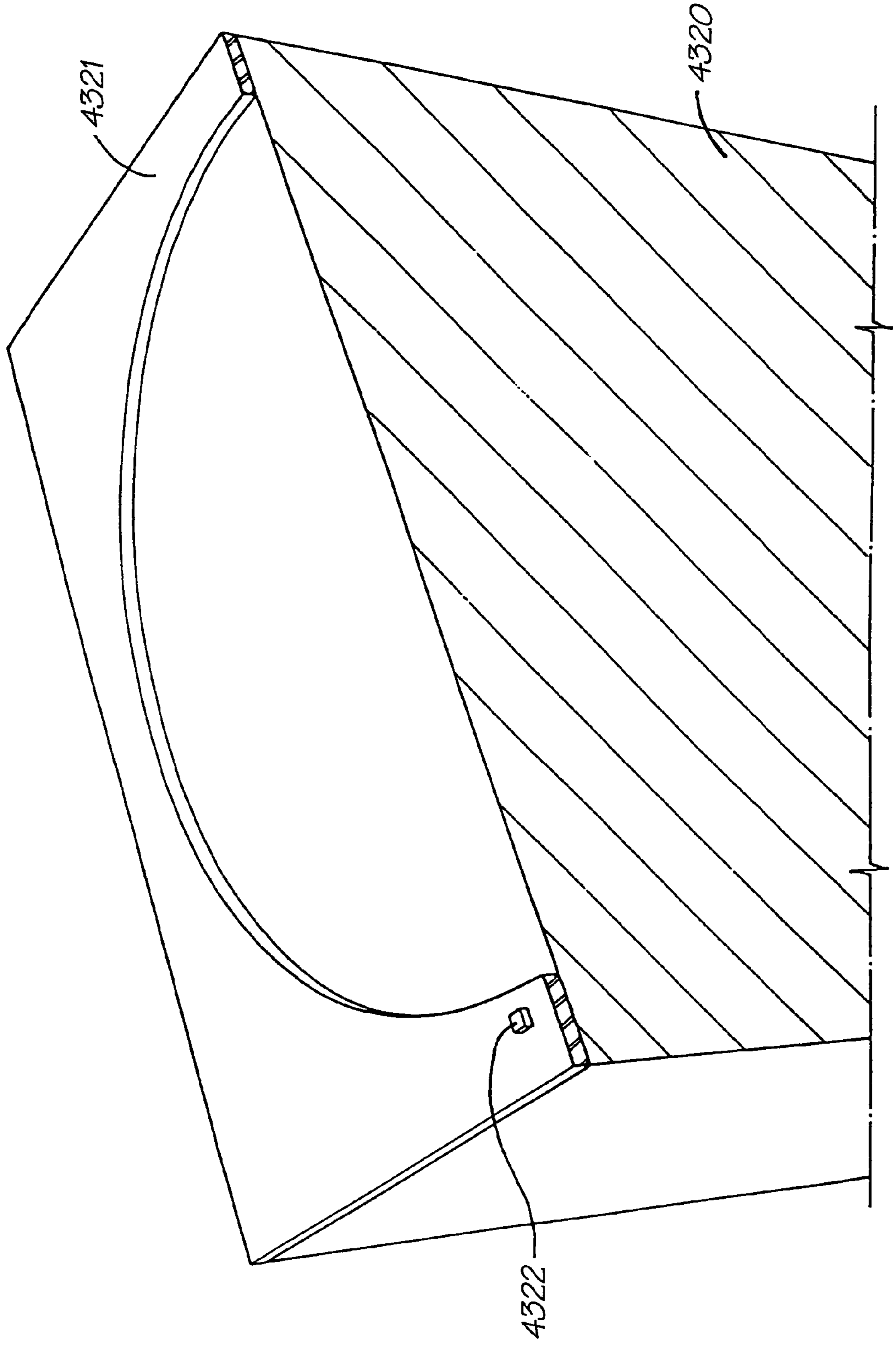

The first step, as illustrated in FIG. 951, is to etch a nozzle region down to the silicon wafer 4320 utilizing an appropriate mask.

Figure 952:
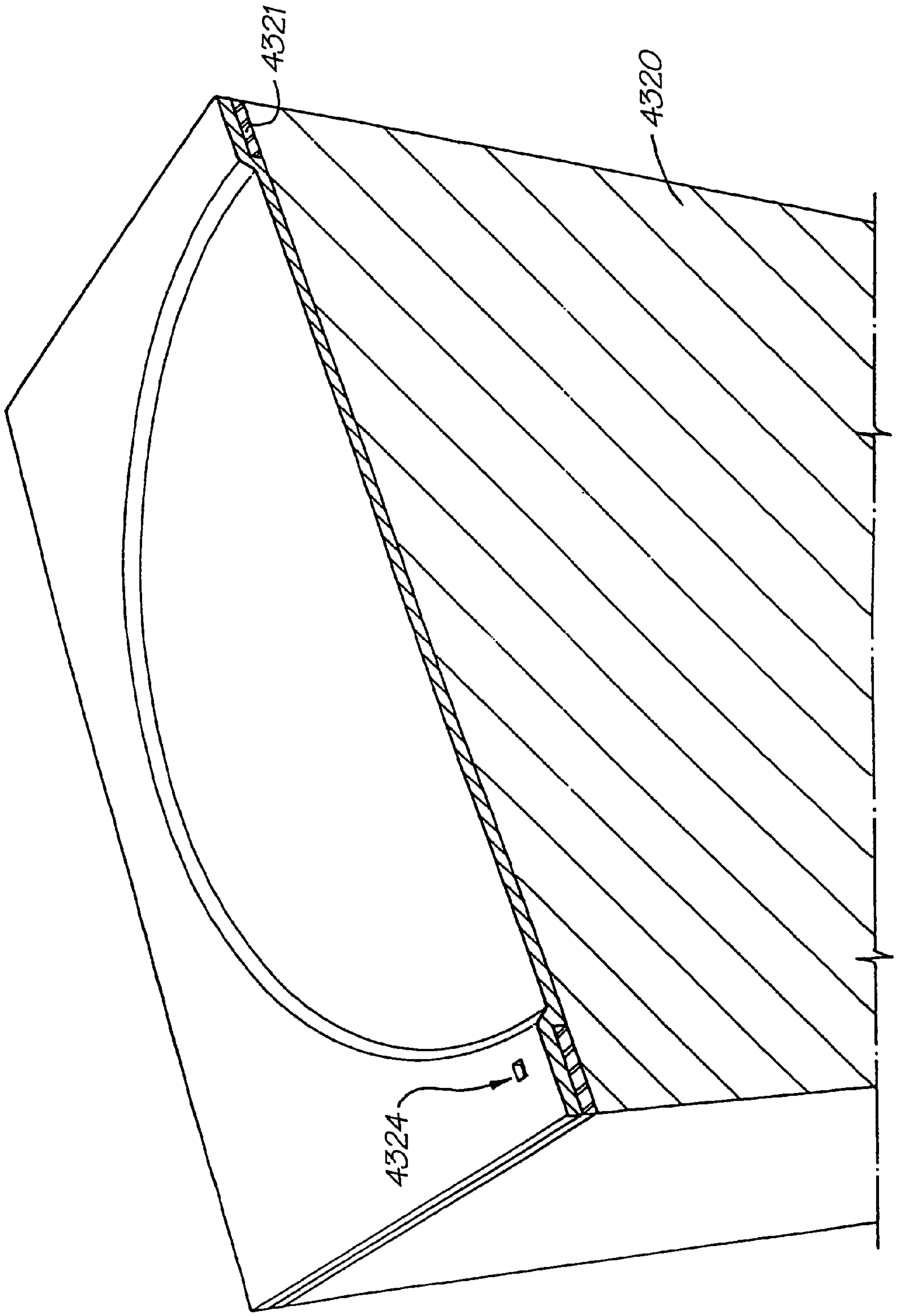

Next, as illustrated in FIG. 952, a 2 micron layer of polytetrafluoroethylene (PTFE) is deposited and etched so as to define vias 4324 for interconnecting multiple levels.

Figure 953:
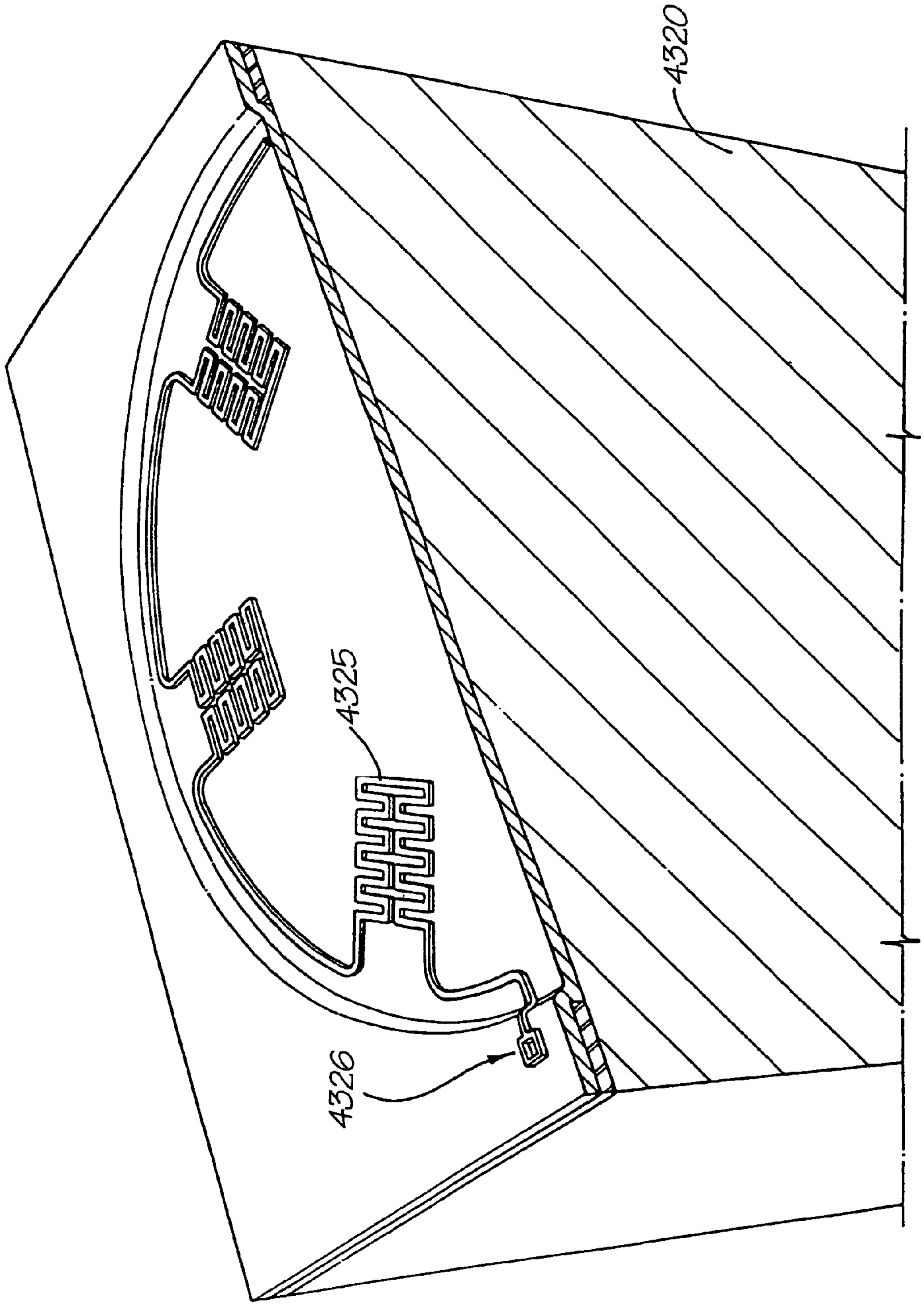
Figure 954:
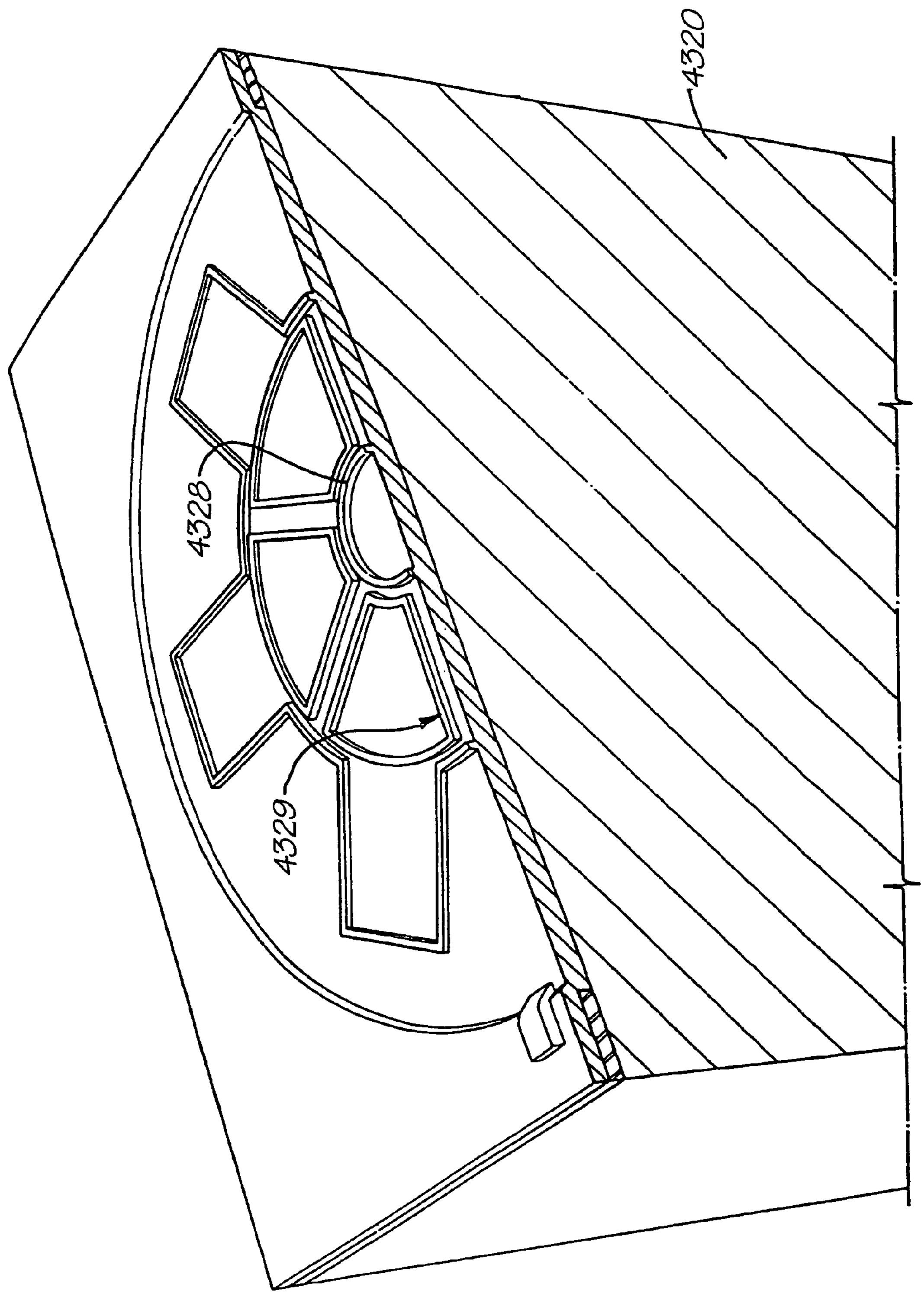

Next, as illustrated in FIG. 953, the second level metal layer is deposited, masked and etched to define a heater structure 4325. The heater structure 4325 includes via 4326 interconnected with a lower aluminum layer. Next, as illustrated in FIG. 954, a further 2 micron layer of PTFE is deposited and etched to the depth of 1 micron utilizing a nozzle rim mask to define the nozzle rim 4328 in addition to ink flow guide rails 4329 which generally restrain any wicking along the surface of the PTFE layer. The guide rails 4329 surround small thin slots and, as such, surface tension effects are a lot higher around these slots which in turn results in minimal outflow of ink during operation.

Figure 955:
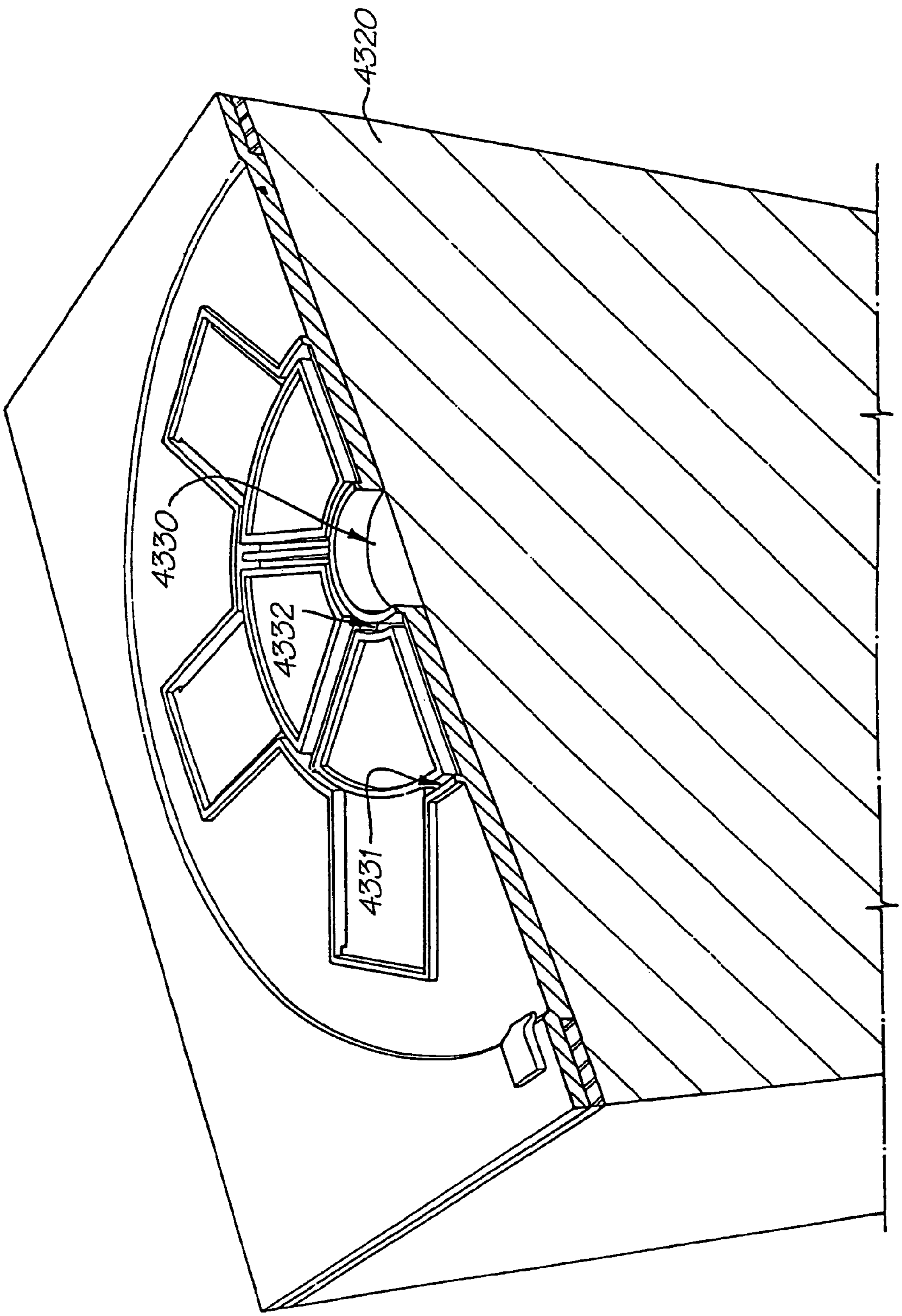

Next, as illustrated in FIG. 955, the PTFE is etched utilizing a nozzle and actuator mask to define a port portion 4330 and slots 4331 and 4332.

Figure 956:
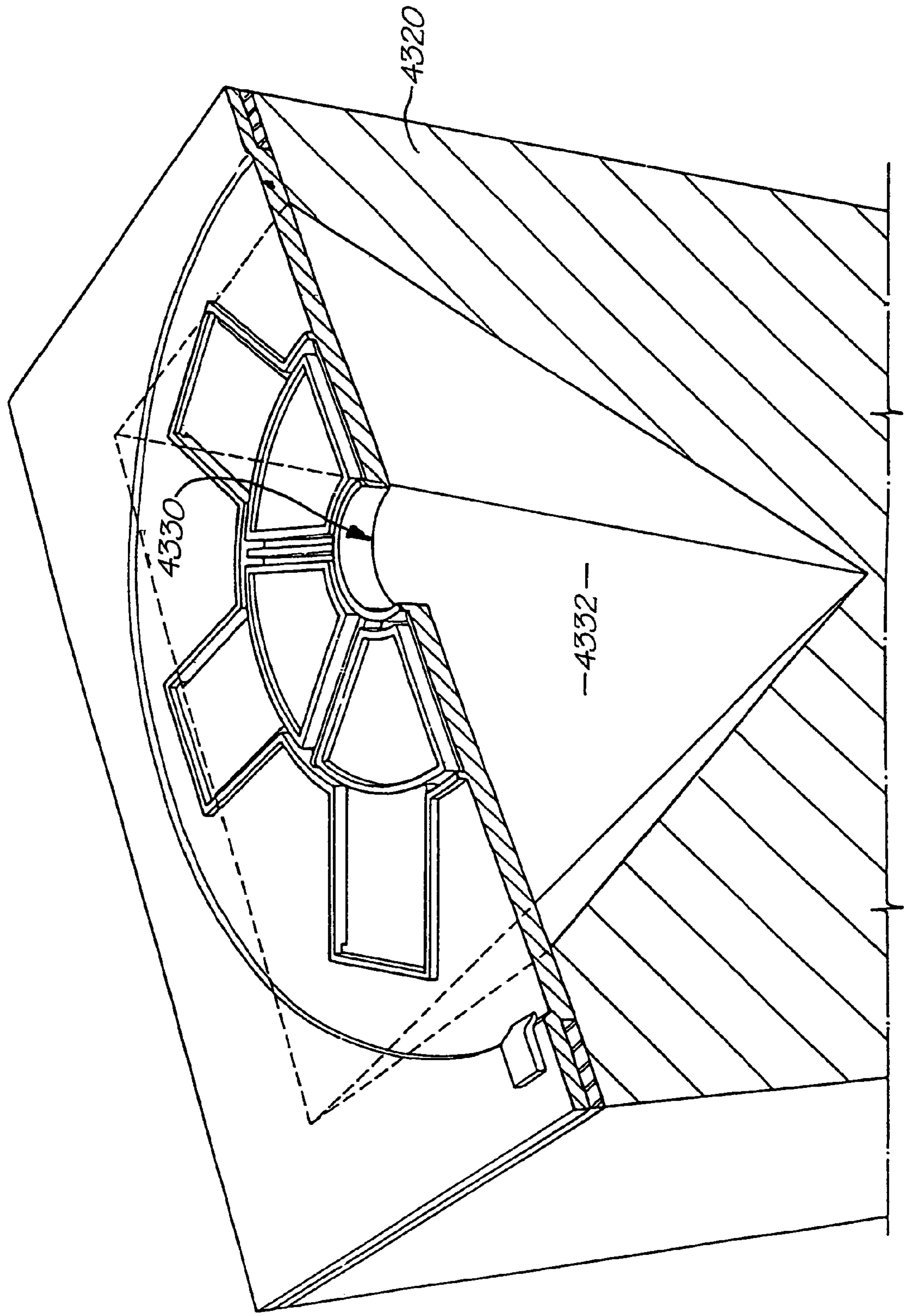

Next, as illustrated in FIG. 956, the wafer is crystallographically etched on a <111> plane utilizing a standard crystallographic etchant such as KOH. The etching forms a chamber 4332, directly below the port portion 4330.

Figure 957:
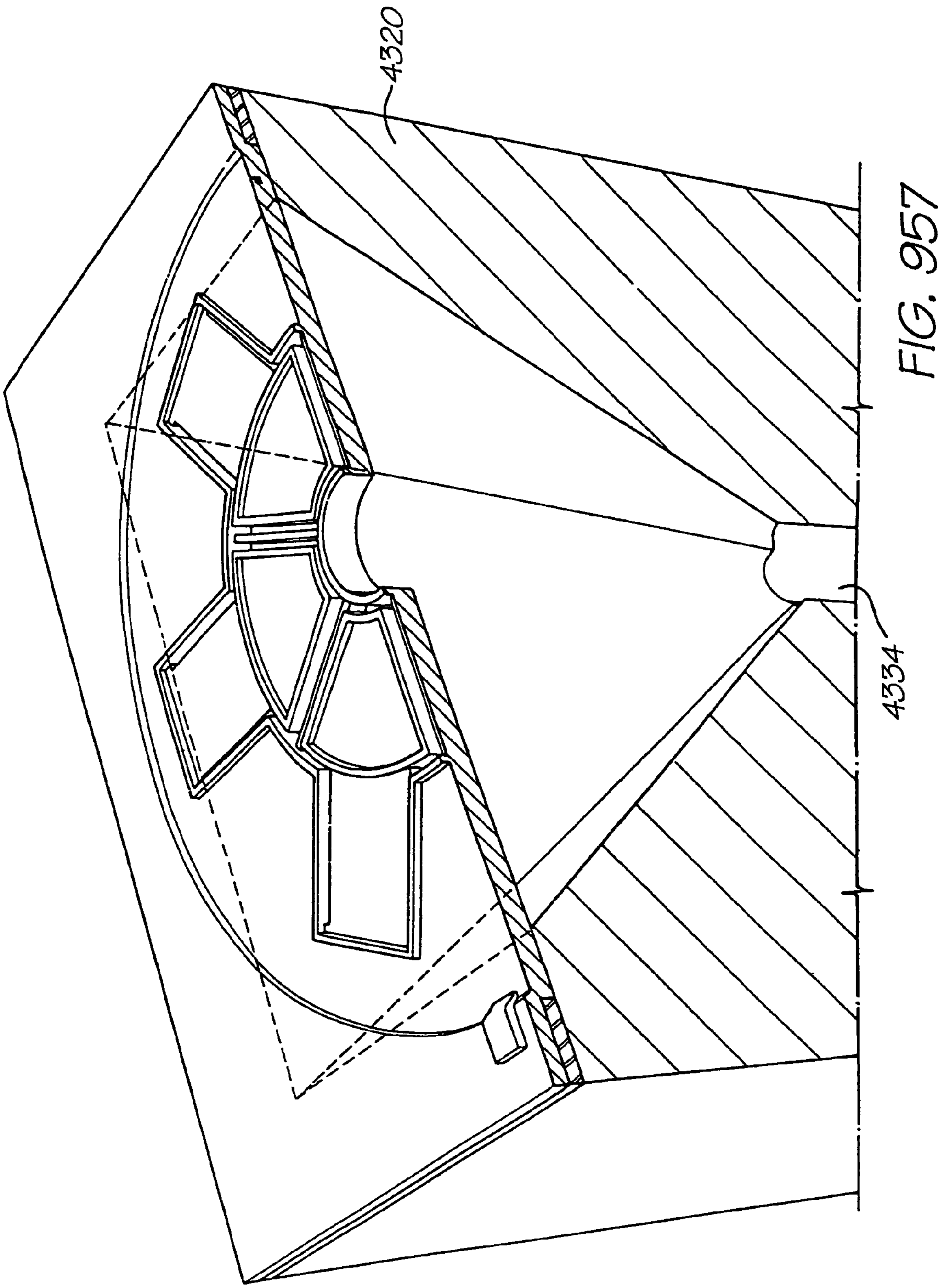

In FIG. 957, the ink supply channel 4334 can be etched from the back of the wafer utilizing a highly anisotropic etcher such as the STS etcher from Silicon Technology Systems of the United Kingdom. An array of ink jet nozzles can be formed simultaneously with a portion of an array 4336 being illustrated in FIG. 958. A portion of the printhead is formed simultaneously and diced by the STS etching process. The array 4336 shown provides for four column printing with each separate column attached to a different color ink supply channel being supplied from the back of the wafer. Bond pads 4337 provide for electrical control of the ejection mechanism.

In this manner, large pagewidth printheads can be fabricated so as to provide for a drop-on-demand ink ejection mechanism.

Figure 960:
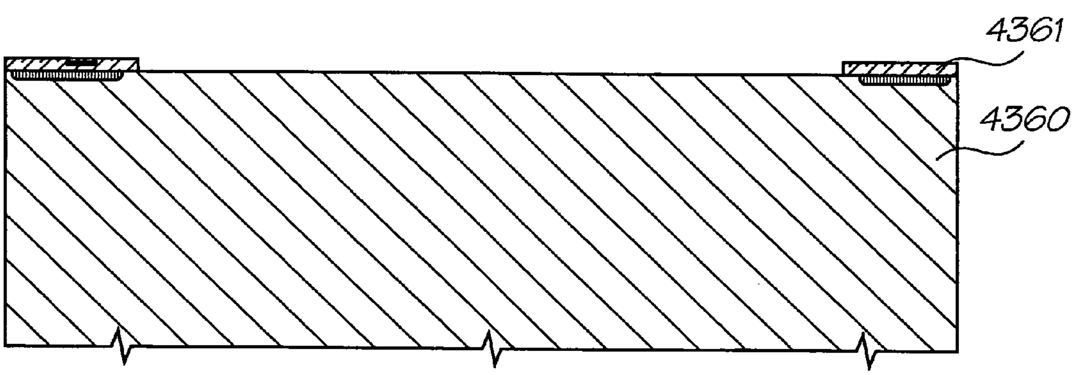

One form of detailed manufacturing process which can be used to fabricate monolithic ink jet printheads operating in accordance with the principles taught by the present embodiment can proceed utilizing the following steps:

1. Using a double-sided polished wafer 4360, complete a 0.5 micron, one poly, 2 metal CMOS process 4361. This step is shown in FIG. 960. For clarity, these diagrams may not be to scale, and may not represent a cross section though any single plane of the nozzle. FIG. 959 is a key to representations of various materials in these manufacturing diagrams, and those of other cross referenced ink jet configurations.

2. Etch the CMOS oxide layers down to silicon or second level metal using Mask 1. This mask defines the nozzle cavity and the edge of the chips. This step is shown in FIG. 960.

3. Deposit a thin layer (not shown) of a hydrophilic polymer, and treat the surface of this polymer for PTFE adherence.

4. Deposit 1.5 microns of polytetrafluoroethylene (PTFE) 4362.

Figure 961:
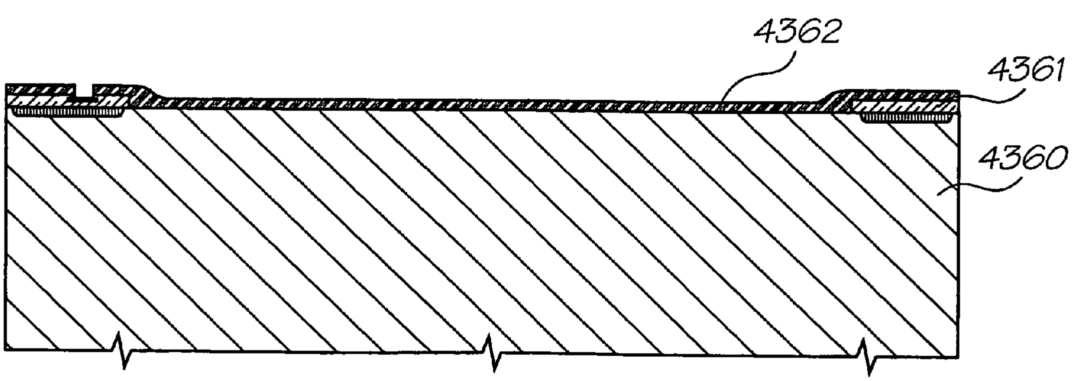

5. Etch the FIFE and CMOS oxide layers to second level metal using Mask 2. This mask defines the contact vias for the heater electrodes. This step is shown in FIG. 961.

Figure 962:
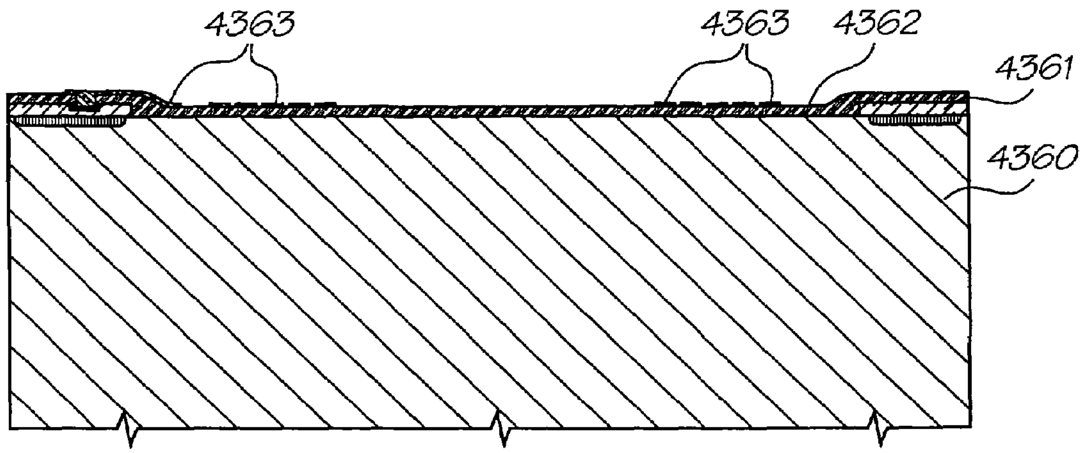

6. Deposit and pattern 0.5 microns of gold 4363 using a lift-off process using Mask 3. This mask defines the heater pattern. This step is shown in FIG. 962.

7. Deposit 1.5 microns of PTFE 4364.

Figure 963:
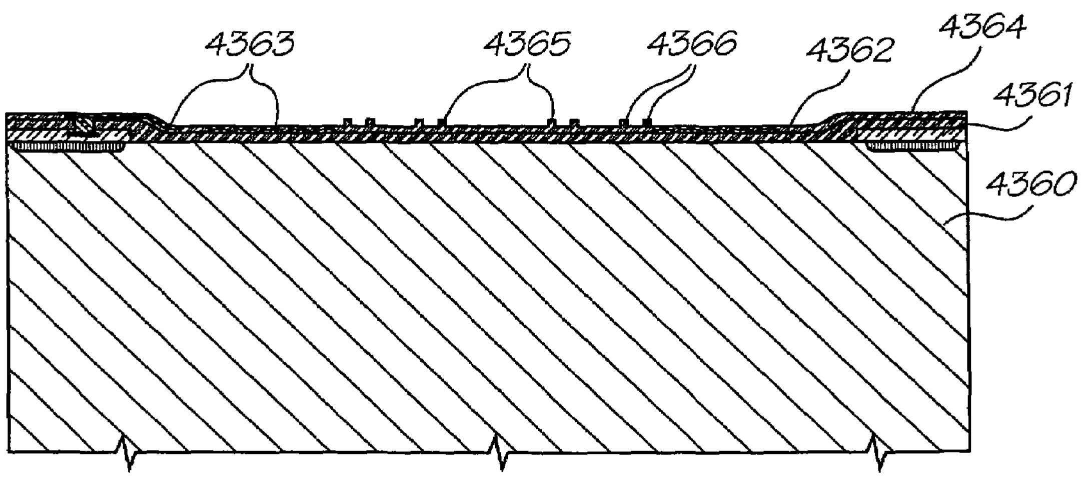

8. Etch 1 micron of PTFE using Mask 4. This mask defines the nozzle rim 4365 and the rim at the edge 4366 of the nozzle chamber. This step is shown in FIG. 963.

Figure 964:
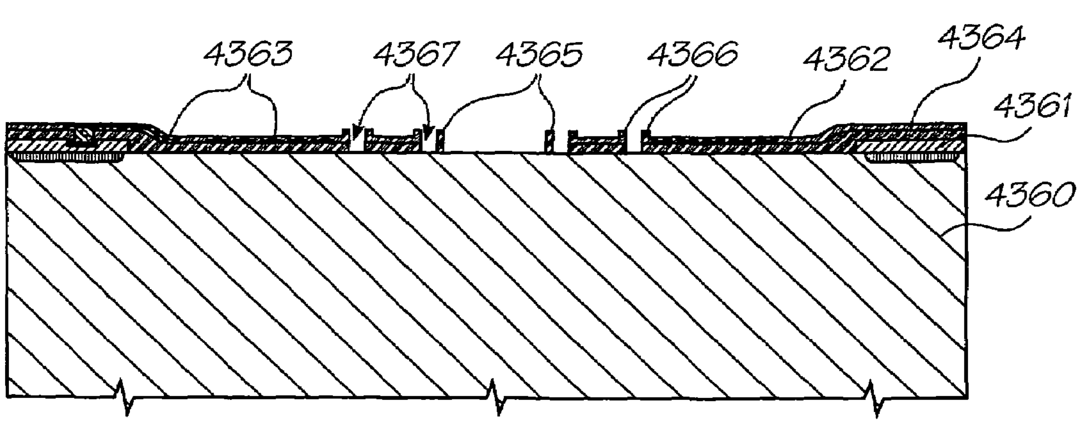

9. Etch both layers of PTFE and the thin hydrophilic layer down to silicon using Mask 5. This mask defines a gap 4367 at inner edges of the actuators, and the edge of the chips. It also forms the mask for a subsequent crystallographic etch. This step is shown in FIG. 964.

Figure 965:
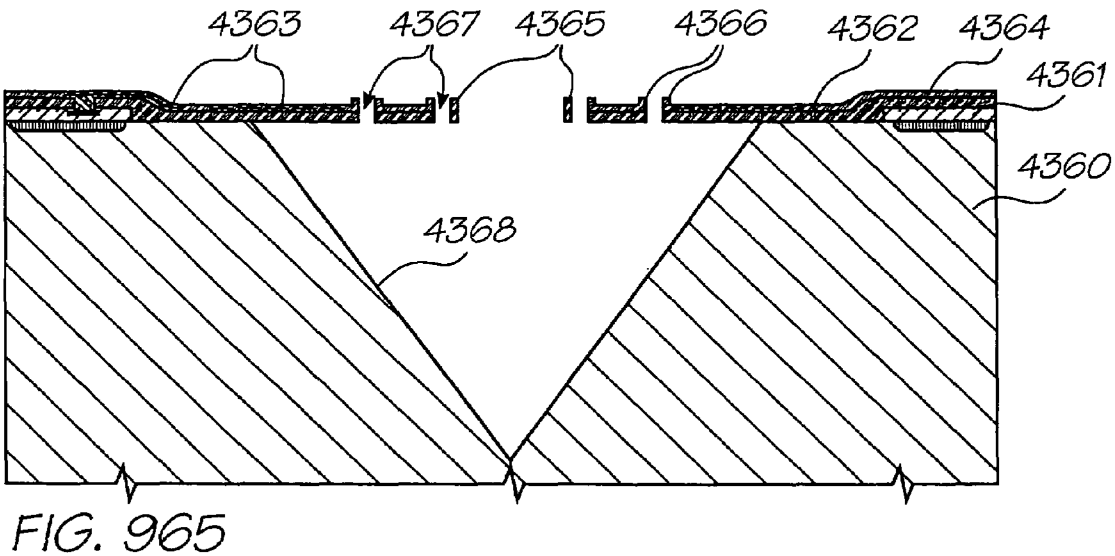

10. Crystallographically etch the exposed silicon using KOH. This etch stops on <111> crystallographic planes 4368, forming an inverted square pyramid with sidewall angles of 54.74 degrees. This step is shown in FIG. 965.

Figure 966:
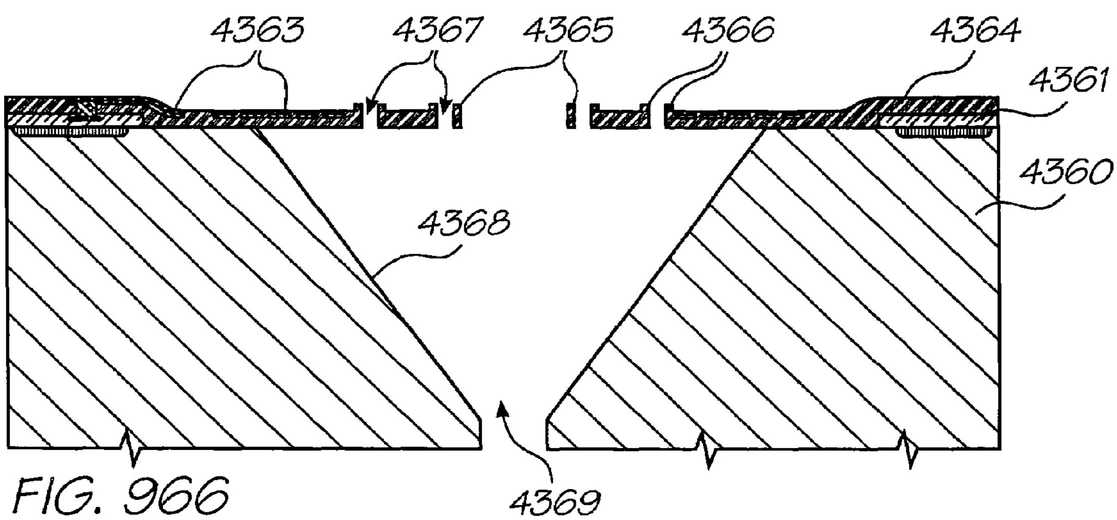

11. Back-etch through the silicon wafer (with, for example, an ASE Advanced Silicon Etcher from Surface Technology Systems) using Mask 6. This mask defines the ink inlets 4369 which are etched through the wafer. The wafer is also diced by this etch. This step is shown in FIG. 966.

12. Mount the printheads in their packaging, which may be a molded plastic former incorporating ink channels which supply the appropriate color ink to the ink inlets 4369 at the back of the wafer.

13. Connect the printheads to their interconnect systems. For a low profile connection with minimum disruption of airflow, TAB may be used. Wire bonding may also be used if the printer is to be operated with sufficient clearance to the paper.

Figure 967:
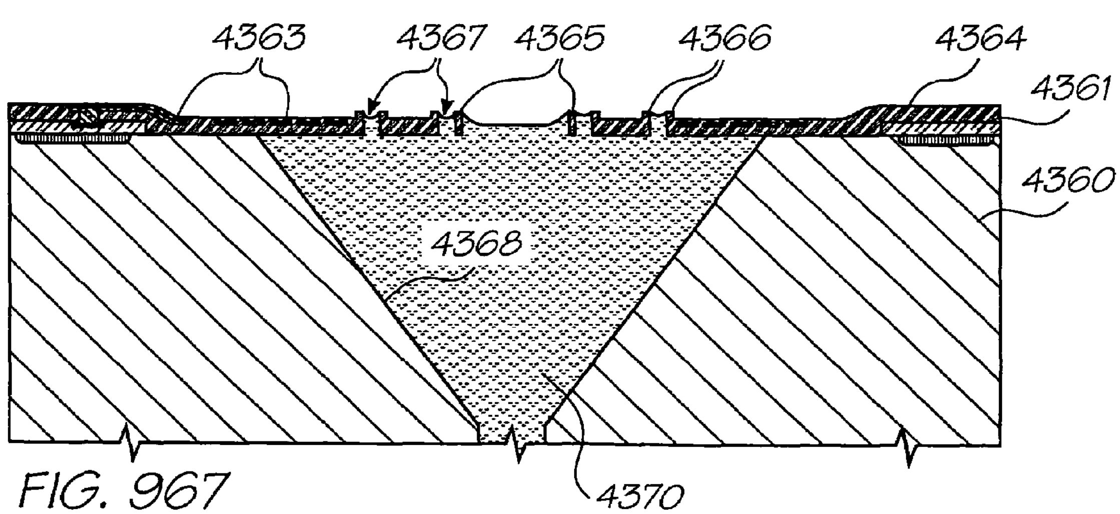

14. Fill the completed print heads with ink 4370 and test them. A filled nozzle is shown in FIG. 967.

IJ44

A preferred embodiment of the present invention discloses an inkjet printing device made up of a series of nozzle arrangements. Each nozzle arrangement includes a thermal surface actuator device which includes an L-shaped cross sectional profile and an air breathing edge such that actuation of the paddle actuator results in a drop being ejected from a nozzle utilizing a very low energy level.

Turning initially to FIG. 968 to FIG. 970, there will now be described the operational principles of a preferred embodiment In FIG. 968, there is illustrated schematically a sectional view of a single nozzle arrangement 4401 which includes an ink nozzle chamber 4402 containing an ink supply which is resupplied by means of an ink supply channel 4403. A nozzle rim 4404 is provided, across which a meniscus 4405 forms, with a slight bulge when in the quiescent state. A bend actuator device 4407 is formed on the top surface of the nozzle chamber and includes a side arm 4408 which runs generally parallel to the surface 4409 of the nozzle chamber wall so as to form an "air breathing slot" 4410 which assists in the low energy actuation of the bend actuator 4407. Ideally, the front surface of the bend actuator 4407 is hydrophobic such that a meniscus 4412 forms between the bend actuator 4407 and the surface 4409 leaving an air pocket in slot 4410.

When it is desired to eject a drop via the nozzle rim 4404, the bend actuator 4407 is actuated so as to rapidly bend down as illustrated in FIG. 969. The rapid downward movement of the actuator 4407 results in a general increase in pressure of the ink within the nozzle chamber 4402. This results in a outflow of ink around the nozzle rim 4404 and a general bulging of the meniscus 4405. The meniscus 4412 undergoes a low amount of movement.

The actuator device 4407 is then turned off so as to slowly return to its original position as illustrated in FIG. 970. The return of the actuator 4407 to its original position results in a reduction in the pressure within the nozzle chamber 4402 which results in a general back flow of ink into the nozzle chamber 4402. The forward momentum of the ink outside the nozzle chamber in addition to the back flow of ink 4415 results in a general necking and breaking off of the drop 4414. Surface tension effects then draw further ink into the nozzle chamber via ink supply channel 4403. Ink is drawn in the nozzle chamber 4403 until the quiescent position of FIG. 968 is again achieved.

The actuator device 4407 can be a thermal actuator which is heated by means of passing a current through a conductive core. Preferably, the thermal actuator is provided with a conductive core encased in a material such as polytetrafluoroethylene which has a high level coefficient of expansion. As illustrated in FIG. 971*a*, a conductive core 4423 is preferably of a serpentine form and encased within a material 4424 having a high coefficient of thermal expansion. Hence, as illustrated in FIG. 971*b*, on heating of the conductive core 4423, the material 4424 expands to a greater extent and is therefore caused to bend down in accordance with requirements.

Turning now to FIG. 972, there is illustrated a side perspective view, partly in section, of a single nozzle arrangement when in the state as described with reference to FIG. 969. The nozzle arrangement 4401 can be formed in practice on a semiconductor wafer 4420 utilizing standard MEMS techniques.

The silicon wafer 4420 preferably is processed so as to include a CMOS layer 4421 which can include the relevant electrical circuitry required for the full control of a series of nozzle arrangements 4401 formed so as to form a printhead unit On top of the CMOS layer 4421 is formed a glass layer 4422 and an actuator 4407 which is driven by means of passing a current through a serpentine copper coil 4423 which is encased in the upper portions of a polytetrafluoroethylene (PTFE) layer 4424. Upon passing a current through the coil 4423, the coil 4423 is heated as is the PTFE layer 4424. PTFE has a very high coefficient of thermal expansion and hence expands rapidly. The coil 4423 constructed in a serpentine nature is able to expand substantially with the expansion of the PTFE layer 4424. The PTFE layer 4424 includes a lip portion 4408 which upon expansion, bends in a scooping motion as previously described. As a result of the scooping motion, the meniscus 4405 generally bulges and results in a consequential ejection of a drop of ink. The nozzle chamber 4402 is later replenished by means of surface tension effects in drawing ink through an ink supply channel 4403 which is etched through the wafer through the utilization of a highly an isotropic silicon trench etcher. Hence, ink can be supplied to the back surface of the wafer and ejected by means of actuation of the actuator 4407. The gap between the side arm 4408 and chamber wall 4409 allows for a substantial breathing effect which results in a low level of energy being required for drop ejection.

A large number of arrangements 4401 of FIG. 972 can be formed together on a wafer with the arrangements being collected into printheads which can be of various sizes in accordance with requirements. Turning now to FIG. 973, there is illustrated one form of an array 4430 which is designed so as to provide three color printing with each color providing two spaced apart rows of nozzle arrangements 4434. The three groupings can comprise groupings 4431, 4432 and 4433 with each grouping supplied with a separate ink color so as to provide for full color printing capability. Additionally, a series of bond pads e.g. 4436 are provided for TAB bonding control signals to the printhead 4430. Obviously, the arrangement 4430 of FIG. 973 illustrates only a portion of a printhead which can be of a length as determined by requirements.

Figure 975:
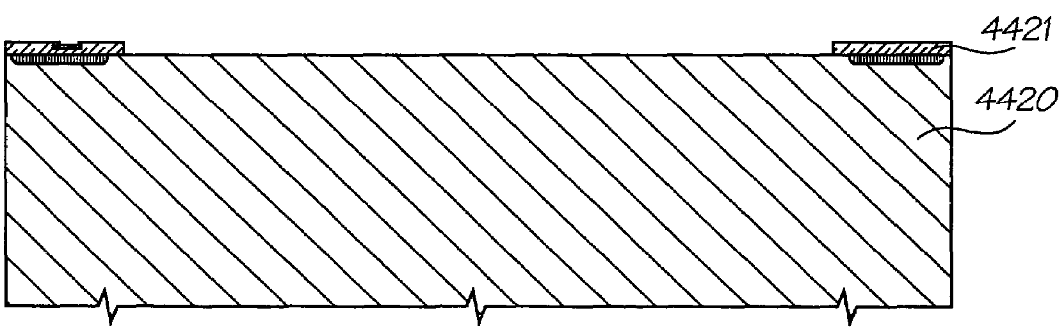

One form of detailed manufacturing process which can be used to fabricate monolithic ink jet printheads operating in accordance with the principles taught by the present embodiment can proceed utilizing the following steps:

1. Using a double sided polished wafer 4420, complete drive transistors, data distribution, and timing circuits using a 0.5 micron, one poly, 2 metal CMOS process 4421. Relevant features of the wafer at this step are shown in FIG. 975. For clarity, these diagrams may not be to scale, and may not represent a cross section though any single plane of the nozzle. FIG. 974 is a key to representations of various materials in these manufacturing diagrams, and those of other cross referenced ink jet configurations.

2. Etch the CMOS oxide layers down to silicon or second level metal using Mask 1. This mask defines the nozzle cavity and the edge of the chips. Relevant features of the wafer at this step are shown in FIG. 975.

Figure 976:
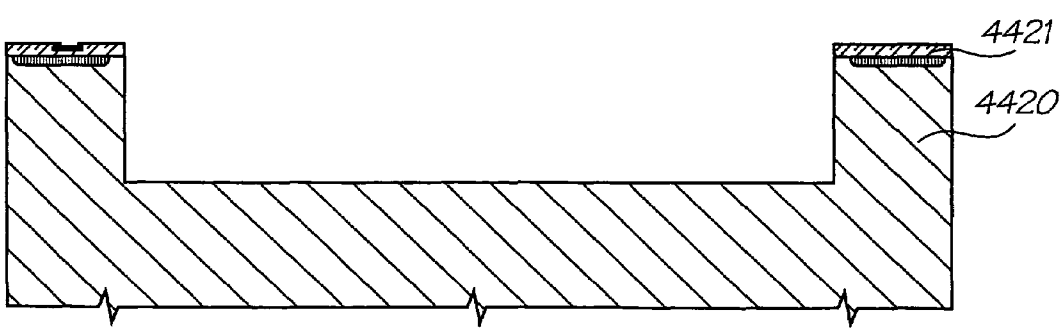

3. Plasma etch the silicon to a depth of 20 microns using the oxide as a mask. This step is shown in FIG. 976.

Figure 977:
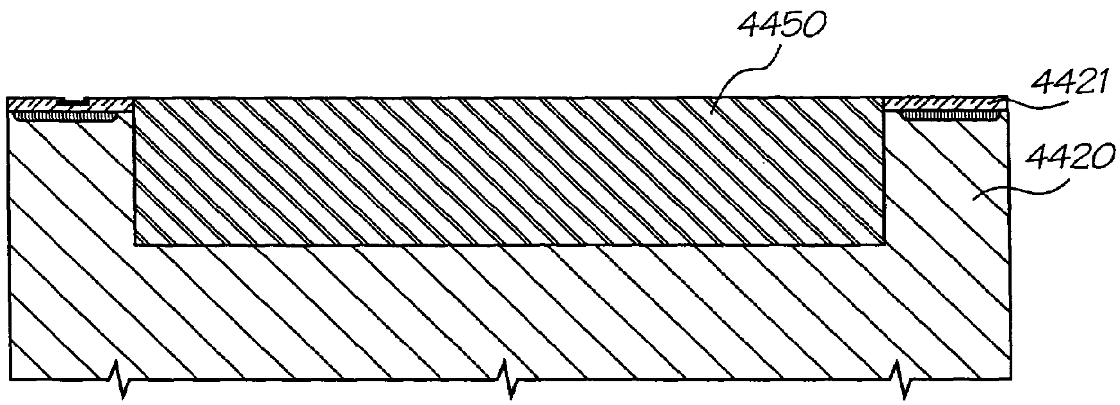

4. Deposit 23 microns of sacrificial material 4450 and planarize down to oxide using CMP. This step is shown in FIG. 977.

Figure 978:
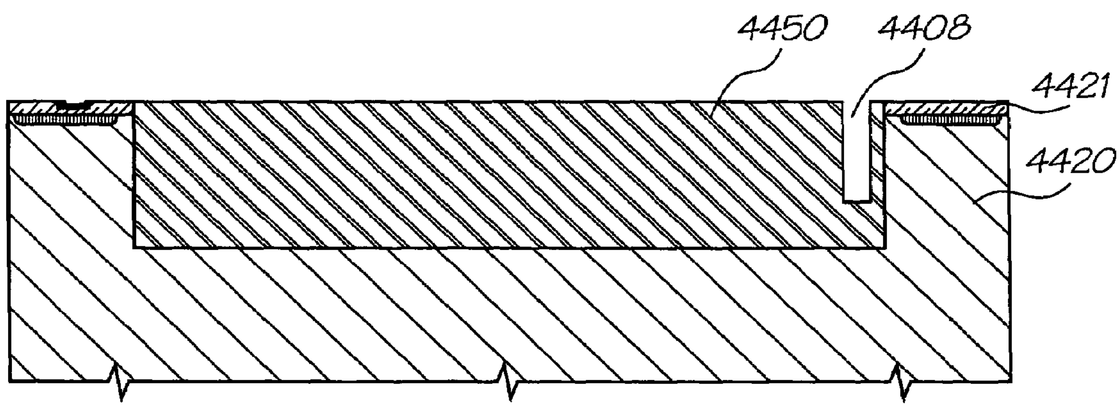

5. Etch the sacrificial material to a depth of 15 microns using Mask 2. This mask defines the vertical paddle 4408 at the end of the actuator. This step is shown in FIG. 978.

6. Deposit a thin layer (not shown) of a hydrophilic polymer, and treat the surface of this polymer for PTFE adherence.

7. Deposit 1.5 microns of polytetrafluoroethylene (PTFE) 4451.

Figure 979:
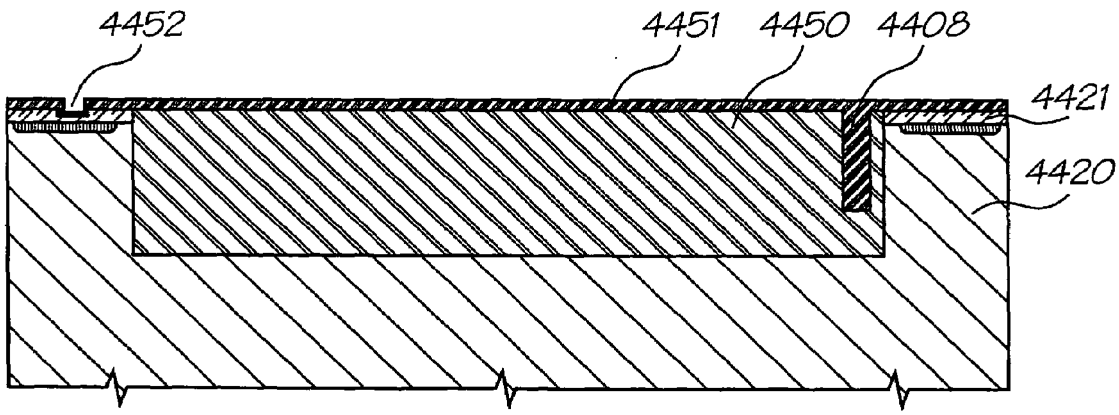

8. Etch the PTFE and CMOS oxide layers to second level metal using Mask 3. This mask defines the contact vias 4452 for the heater electrodes. This step is shown in FIG. 979.

Figure 980:
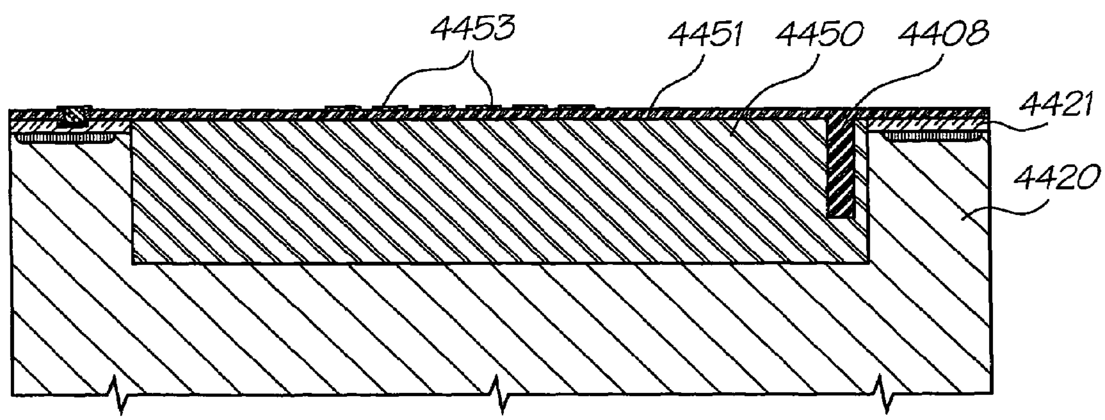

9. Deposit and pattern 0.5 microns of gold 4453 using a lift-off process using Mask 4. This mask defines the heater pattern. This step is shown in FIG. 980.

10. Deposit 1.5 microns of PTFE 4454.

Figure 981:
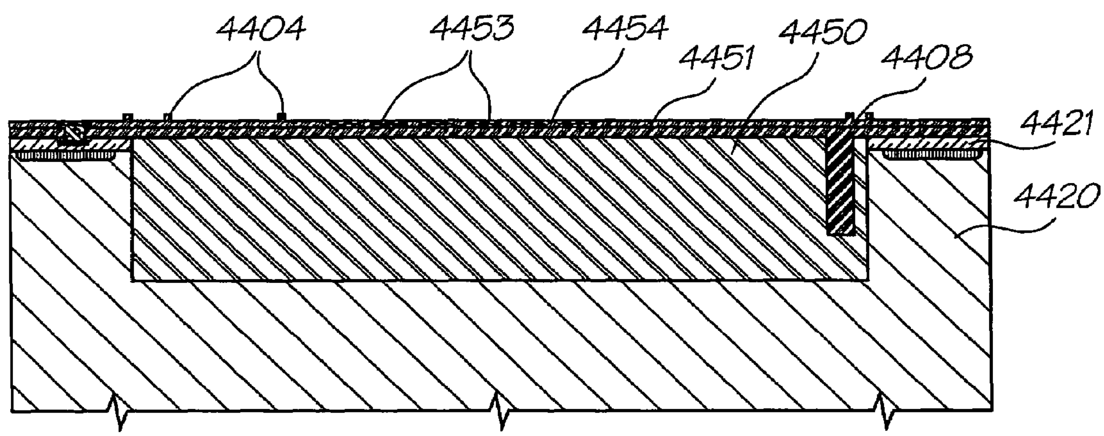

11. Etch 1 micron of PTFE using Mask 5. This mask defines the nozzle rim 4404 and the rim 4404 at the edge of the nozzle chamber. This step is shown in FIG. 981.

Figure 982:
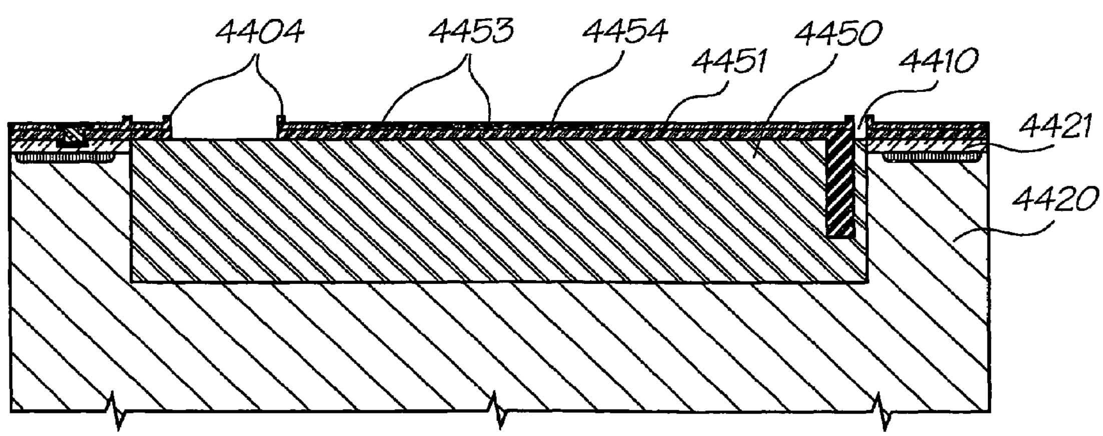

12. Etch both layers of PTFE and the thin hydrophilic layer down to the sacrificial layer using Mask 6. This mask defines the gap 4410 at the edges of the actuator and paddle. This step is shown in FIG. 982.

Figure 983:
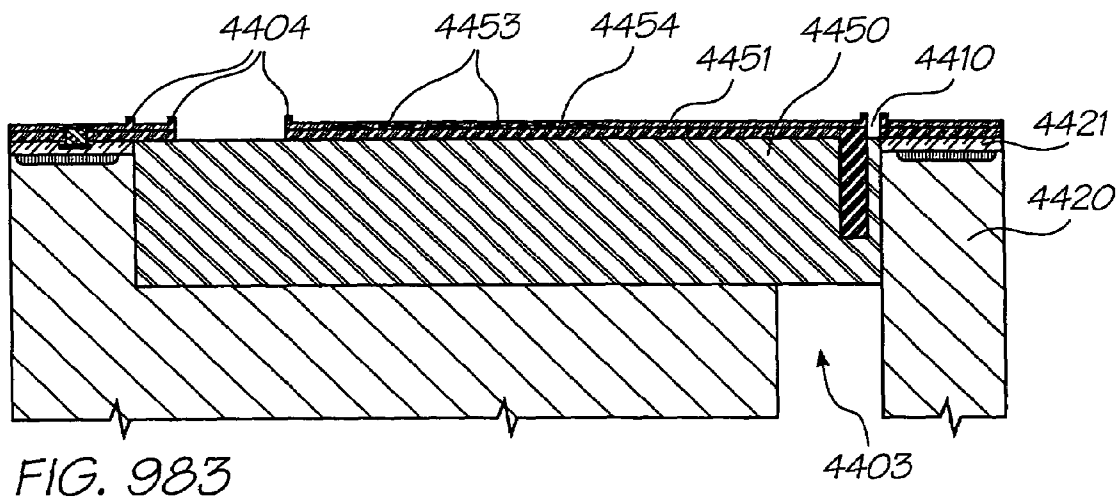

13. Back-etch through the silicon wafer to the sacrificial layer (with, for example, an ASE Advanced Silicon Etcher from Surface Technology Systems) using Mask 7. This mask defines the ink inlets which 4403 are etched through the wafer. This step is shown in FIG. 983.

14. Etch the sacrificial layers. The wafer is also diced by this etch.

15. Mount the printheads in their packaging, which may be a molded plastic former incorporating ink channels which supply the appropriate color ink to the ink inlets at the back of the wafer.

16. Connect the printheads to their interconnect systems. For a low profile connection with minimum disruption of airflow, TAB may be used. Wire bonding may also be used if the printer is to be operated with sufficient clearance to the paper.

Figure 984:
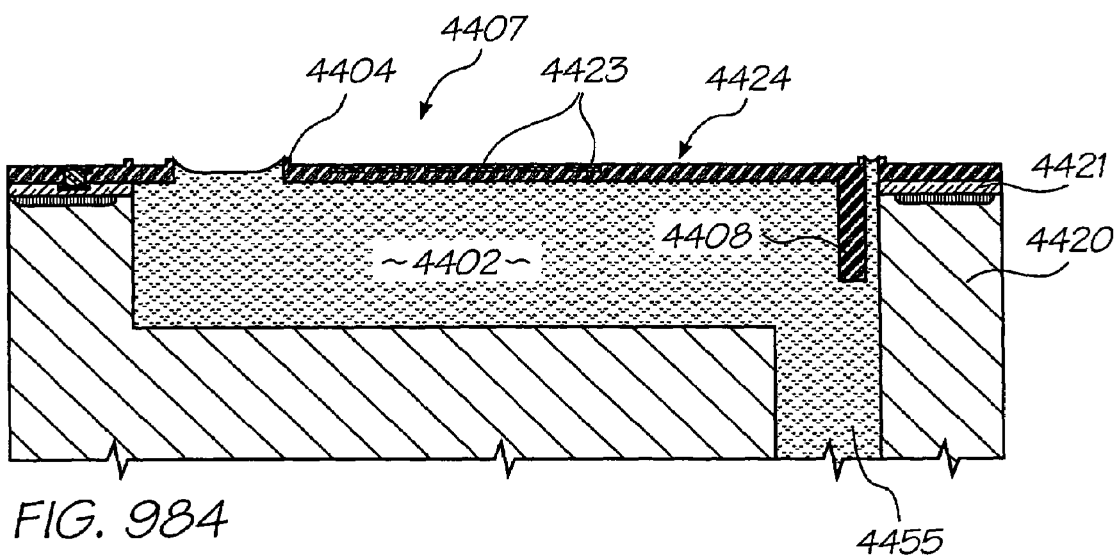

17. Fill the completed printheads with ink 4455 and test them. A filled nozzle is shown in FIG. 984.

IJ45

In a preferred embodiment, an ink jet print head is constructed from a series of nozzle arrangements where each nozzle arrangement includes a magnetic plate actuator which is actuated by a coil which is pulsed so as to move the magnetic plate and thereby cause the ejection of ink. The movement of the magnetic plate results in a leaf spring device being extended resiliently such that when the coil is deactivated, the magnetic plate returns to a rest position resulting in the ejection of a drop of ink from an aperture created within the plate.

Turning now to FIGS. 985 to FIG. 987, there will now be explained the operation of this embodiment.

Turning initially to FIG. 985, there is illustrated an ink jet nozzle arrangement 4501 which includes a nozzle chamber 4502 which connects with an ink ejection nozzle 4503 such that, when in a quiescent position, an ink meniscus 4504 forms over the nozzle 4503. The nozzle 4503 is formed in a magnetic nozzle plate 4505 which can be constructed from a ferrous material. Attached to the nozzle plate 4505 is a series of leaf springs e.g. 4506,4507 which bias the nozzle plate 4505 away from a base plate 4509. Between the nozzle plate 4505 and the base plate 4509, there is provided a conductive coil 4510 which is interconnected and controlled via a lower circuitry layer 4511 which can comprise a standard CMOS circuitry layer. The ink chamber 4502 is supplied with ink from a lower ink supply channel 4512 which is formed by etching through a wafer substrate 4513. The wafer substrate 4513 can comprise a semiconductor wafer substrate. The ink chamber 4502 is interconnected to the ink supply channel 4512 by means of a series of slots 4514 which can be etched through the CMOS layer 4511.

The area around the coil 4510 is hydrophobically treated so that, during operation, a small meniscus e.g. 4516, 4517 forms between the nozzle plate 4505 and base plate 4509.

When it is desired to eject a drop of ink, the coil 4510 is energized. This results in a movement of the plate 4505 as illustrated in FIG. 986. The general downward movement of the plate 4505 results in a substantial increase in pressure within nozzle chamber 4502. The increase in pressure results in a rapid growth in the meniscus 4504 as ink flows out of the nozzle chamber 4503. The movement of the plate 4505 also results in the springs 4506, 4507 undergoing a general resilient extension. The small width of the slot 4514 results in minimal outflows of ink into the nozzle chamber 4502.

Moments later, as illustrated in FIG. 987, the coil 4510 is deactivated resulting in a return of the plate 4505 towards its quiescent position as a result of the springs 4506, 4507 acting on the nozzle plate 4505. The return of the nozzle plate 4505 to its quiescent position results in a rapid decrease in pressure within the nozzle chamber 4502 which in turn results in a general back flow of ink around the ejection nozzle 4503. The forward momentum of the ink outside the nozzle plate 4505 and the back suction of the ink around the ejection nozzle 4503 results in a drop 4519 being formed and breaking off so as to continue to the print media.

The surface tension characteristics across the nozzle 4503 result in a general inflow of ink from the ink supply channel 4512 until such time as the quiescent position of FIG. 985 is again reached. In this manner, a coil actuated magnetic ink jet print head is formed for the adoption of ink drops on demand. Importantly, the area around the coil 4510 is hydrophobically treated so as to expel any ink from flowing into this area.

Turning now to FIG. 988, there is illustrated a side perspective view, partly in section of a single nozzle arrangement constructed in accordance with the principles as previously outlined with respect to FIGS. 985 to FIG. 987. The arrangement 4501 includes a nozzle plate 4505 which is formed around an ink supply chamber 4502 and includes an ink ejection nozzle 4503. A series of leaf spring elements 4506-4508 are also provided which can be formed from the same material as the nozzle plate 4505. A base plate 4509 also is provided for encompassing the coil 4510. The wafer 4513 includes a series of slots 4514 for the wicking and flowing of ink into nozzle chamber 4502 with the nozzle chamber 4502 being interconnected via the slots with an ink supply channel 4512. The slots 4514 are of a thin elongated form so as to provide for fluidic resistance to a rapid outflow of fluid from the chamber 4502.

The coil 4510 is conductive interconnected at a predetermined portion (not shown) with a lower CMOS layer for the control and driving of the coil 4510 and movement of base plate 4505. Alternatively, the plate 4509 can be broken into two separate semi-circular plates and the coil 4510 can have separate ends connected through one of the semi circular plates through to a lower CMOS layer.

Obviously, an array of ink jet nozzle devices can be formed at a time on a single silicon wafer so as to form multiple printheads.

Figure 990:
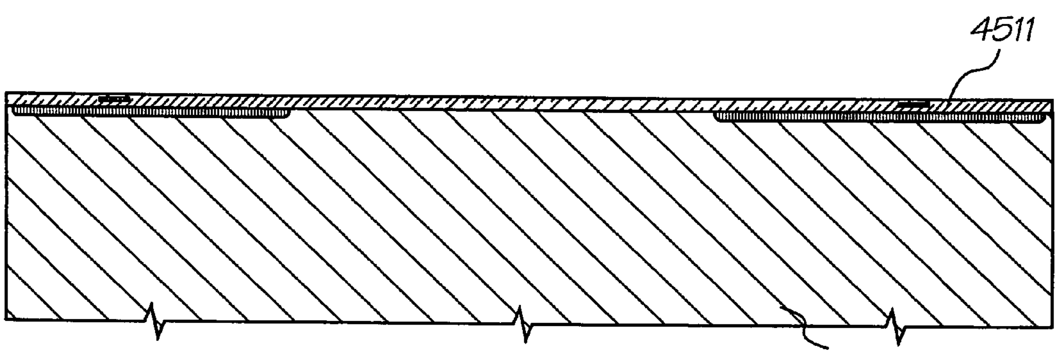

One form of detailed manufacturing process which can be used to fabricate monolithic ink jet print heads operating in accordance with the principles taught by the present embodiment can proceed utilizing the following steps:

1. Using a double sided polished wafer 4513, complete a 0.5 micron, one poly, 2 metal CMOS process 4511. Due to high current densities, both metal layers should be copper for resistance to electromigration. This step is shown in FIG. 990. For clarity, these diagrams may not be to scale, and may not represent a cross section though any single plane of the nozzle. FIG. 989 is a key to representations of various materials in these manufacturing diagrams, and those of other cross referenced ink jet configurations.

2. Etch the CMOS oxide layers down to silicon or aluminum using Mask 1. This mask defines the nozzle chamber inlet cross, the edges of the print heads chips, and the vias for the contacts from the second level metal electrodes to the two halves of the split fixed magnetic plate 4509.

Figure 991:
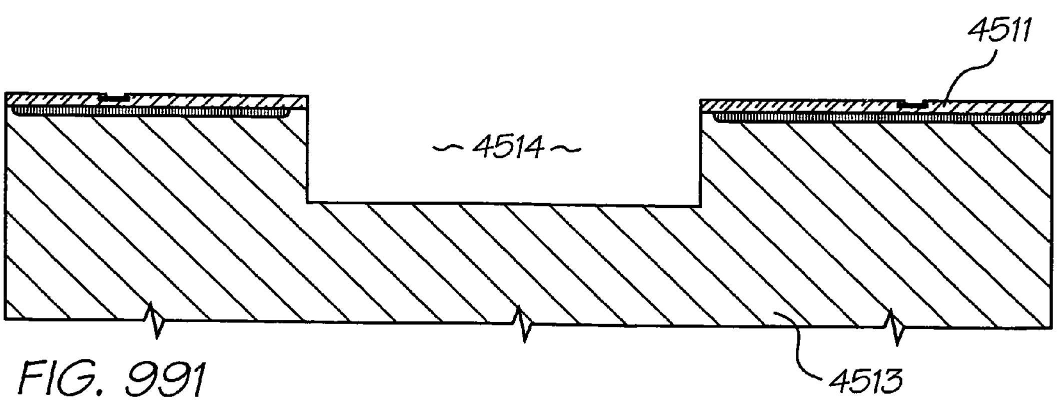

3. Plasma etch the silicon to a depth of 15 microns, using oxide from step 2 as a mask. This etch does not substantially etch the second level metal. This step is shown in FIG. 991.

4. Deposit a seed layer of cobalt nickel iron alloy. CoNiFe is chosen due to a high saturation flux density of 2 Tesla, and a low coercivity. [Osaka, Tetsuya et al, A soft magnetic CoNiFe film with high saturation magnetic flux density, Nature 392, 796-798 (1998)].

Figure 992:
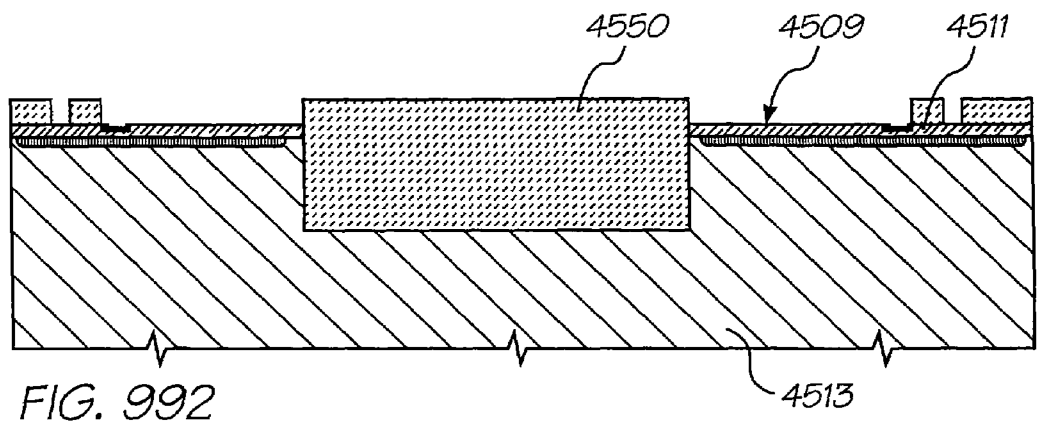

5. Spin on 4 microns of resist 4550, expose with Mask 2, and develop. This mask defines the split fixed magnetic plate 4509, for which the resist acts as an electroplating mold. This step is shown in FIG. 992.

Figure 993:
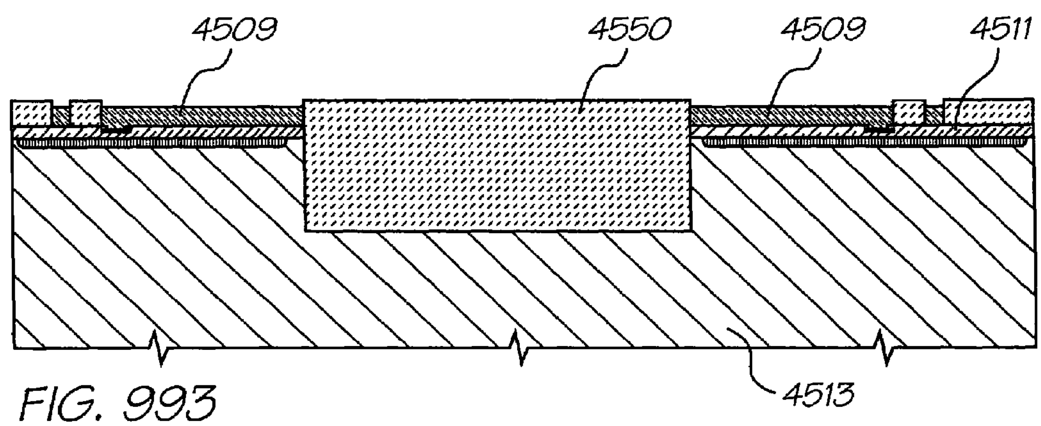

6. Electroplate 3 microns of CoNiFe. This step is shown in FIG. 993.

Figure 994:
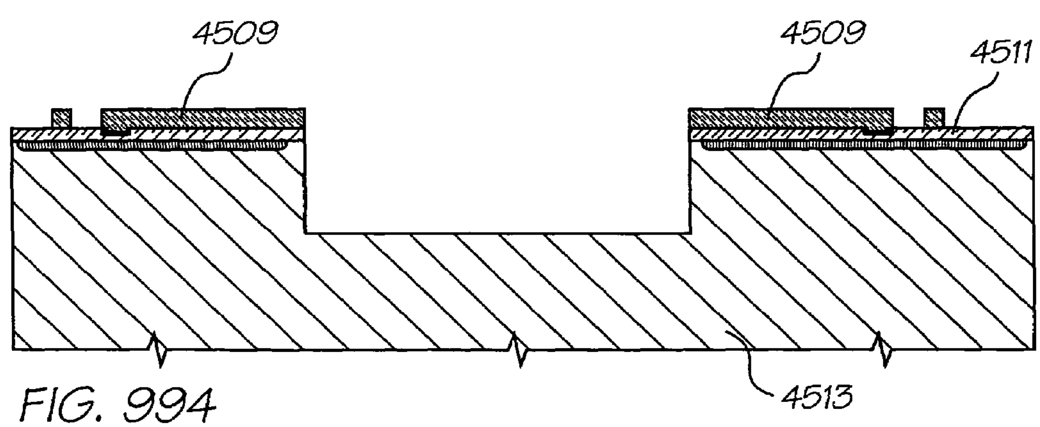

7. Strip the resist and etch the exposed seed layer. This step is shown in FIG. 994.

8. Deposit 0.5 microns of silicon nitride 4551, which insulates the solenoid from the fixed magnetic plate 4509.

Figure 995:
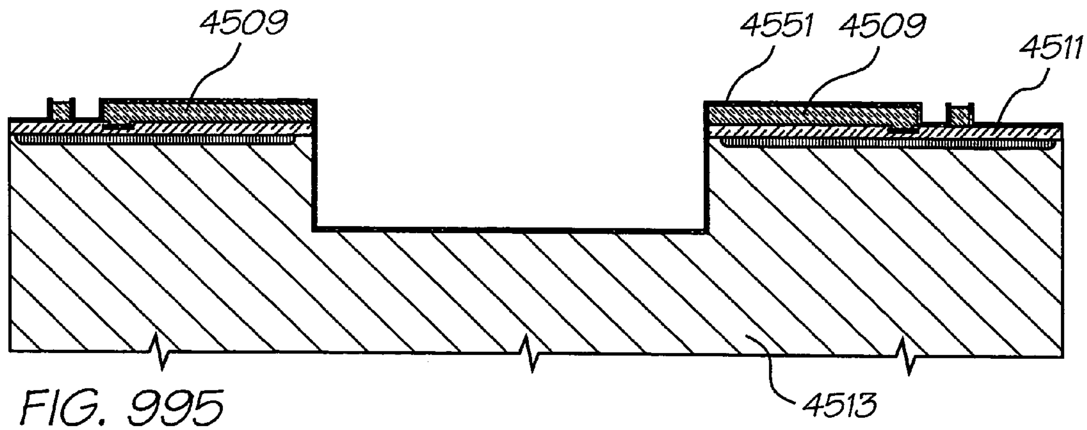

9. Etch the nitride layer using Mask 3. This mask defines the contact vias from each end of the solenoid coil to the two halves of the split fixed magnetic plate 4509, as well as returning the nozzle chamber 4502 to a hydrophilic state. This step is shown in FIG. 995.

10. Deposit an adhesion layer plus a copper seed layer. Copper is used for its low resistivity (which results in higher efficiency) and its high electromigration resistance, which increases reliability at high current densities.

Figure 996:
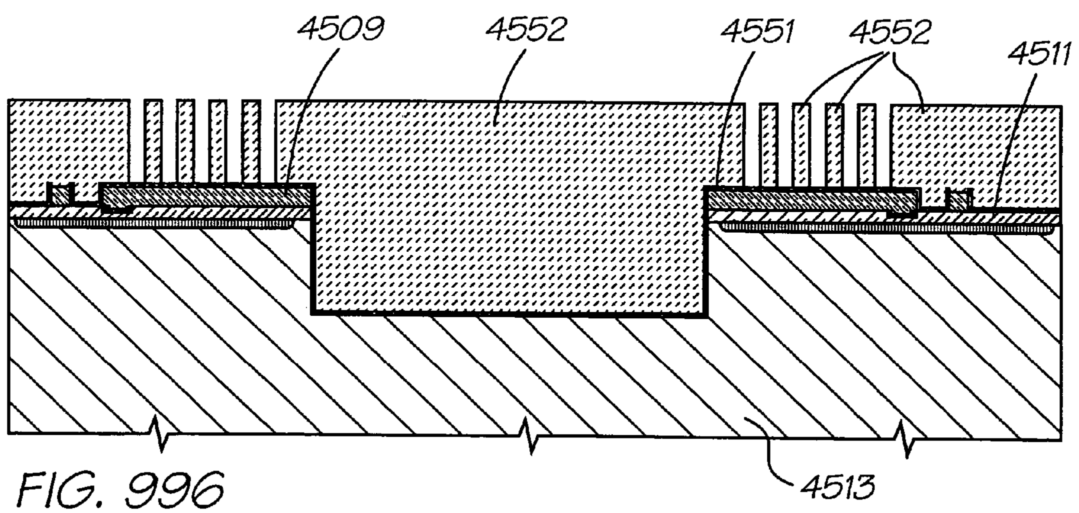

11. Spin on 13 microns of resist 4552 and expose using Mask 4, which defines the solenoid spiral coil, for which the resist acts as an electroplating mold. As the resist is thick and the aspect ratio is high, an X-ray proximity process, such as LIGA, can be used. This step is shown in FIG. 996.

12. Electroplate 12 microns of copper 4510.

Figure 997:
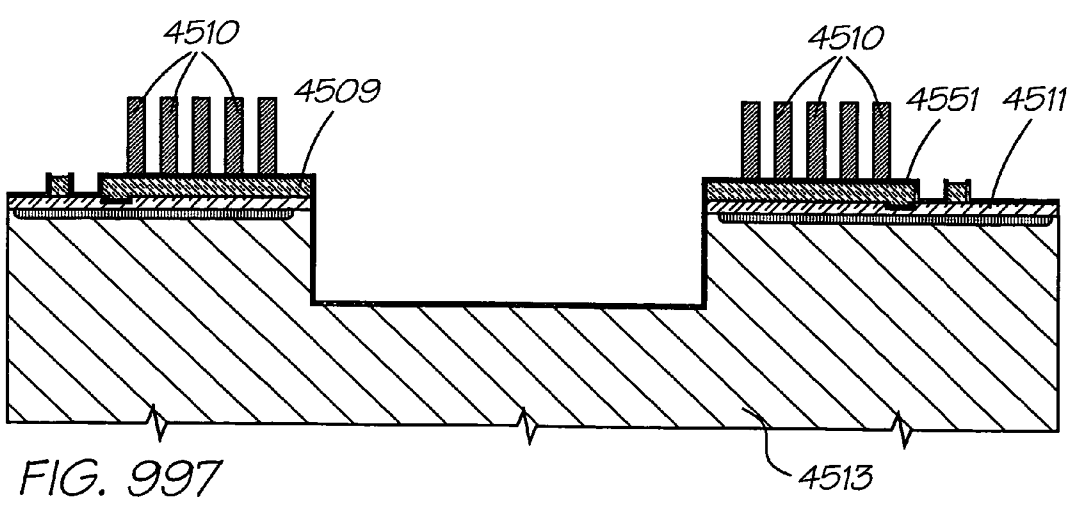

13. Strip the resist and etch the exposed copper seed layer. This step is shown in FIG. 997.

14. Wafer probe. All electrical connections are complete at this point, bond pads are accessible, and the chips are not yet separated.

15. Deposit 0.1 microns of silicon nitride, which acts as a corrosion barrier (not shown).

16. Deposit 0.1 microns of PTFE (not shown), which makes the top surface of the fixed magnetic plate 4509 and the solenoid hydrophobic, thereby preventing the space between the solenoid and the magnetic piston from filling with ink (if a water based ink is used. In general, these surfaces should be made ink-phobic).

17. Etch the PTFE layer using Mask 5. This mask defines the hydrophilic region of the nozzle chamber 4502. The etch returns the nozzle chamber 4502 to a hydrophilic state.

18. Deposit 1 micron of sacrificial material 4553. This defines the magnetic gap, and the travel of the magnetic piston.

19. Etch the sacrificial layer using Mask 6. This mask defines the spring posts. This step is shown in FIG. 998.

20. Deposit a seed layer of CoNiFe.

21. Deposit 12 microns of resist 4554. As the solenoids will prevent even flow during a spin-on application, the resist should be sprayed on. Expose the resist using Mask 7, which defines the walls of the magnetic plunger, plus the spring posts. As the resist is thick and the aspect ratio is high, an X-ray proximity process, such as LIGA, can be used. This step is shown in FIG. 999.

22. Electroplate 12 microns of CoNiFe 4555. This step is shown in FIG. 1000.

23. Deposit a seed layer of CoNiFe.

24. Spin on 4 microns of resist 4556, expose with Mask 8, and develop. This mask defines the roof of the magnetic plunger, the nozzle, the springs, and the spring posts. The resist forms an electroplating mold for these parts. This step is shown in FIG. 1001.

25. Electroplate 3 microns of CoNiFe 4557. This step is shown in FIG. 1002.

26. Strip the resist, sacrificial, and exposed seed layers. This step is shown in FIG. 1003.

27. Back-etch through the silicon wafer until the nozzle chamber inlet cross is reached using Mask 9. This etch may be performed using an ASE Advanced Silicon Etcher from Surface Technology Systems. The mask defines the ink inlets 4512 which are etched through the wafer. The wafer is also diced by this etch. This step is shown in FIG. 1004.

28. Mount the printheads in their packaging, which may be a molded plastic former incorporating ink channels which supply the appropriate color ink to the ink inlets at the back of the wafer.

29. Connect the printheads to their interconnect systems. For a low profile connection with minimum disruption of airflow, TAB may be used. Wire bonding may also be used if the printer is to be operated with sufficient clearance to the paper.

30. Fill the completed printheads with ink 4558 and test them. A filled nozzle is shown in FIG. 1005.

IJ46

Recently, for example, in PCT Application No. PCT/AU98/00550 the present applicant has proposed an inkjet printing device which utilizes micro-electromechanical (MEMS) processing techniques in the construction of a thermal bend actuator type device for the ejection of fluid from a nozzle chamber.

The aforementioned application discloses an actuator which is substantially exposed to an external atmosphere, often adjacent a print media surface. This is likely to lead to substantial operational problems in that the exposed actuator could be damaged by foreign objects or paper dust etc. leading to a malfunction.

Accordingly, there is provided an inkjet printhead chip that comprises a substrate that incorporates drive circuitry;

a plurality of nozzle arrangements that are positioned on the substrate, each nozzle arrangement comprising:

a nozzle chamber wall and a roof wall positioned on the substrate to define a nozzle chamber, the roof wall defining an ink ejection port in fluid communication with the nozzle chamber;

an ink ejection member that is positioned in the nozzle chamber and is displaceable towards and away from the ink ejection port to eject ink from the ink ejection port; and an elongate actuator that is fast, at one end, to the substrate to receive an electrical signal from the drive circuitry and fast, at an opposite end, with the ink ejection member, the actuator incorporating a heating circuit that is connected to the drive circuitry layer the heating circuit being positioned and configured so that, on receipt of, and termination of, a suitable electrical drive signal from the drive circuitry layer, the heating circuit serves to generate differential thermal expansion and contraction, respectively, such that the actuator is displaced to drive the ink ejection member towards and away from the ink ejection port, wherein the drive circuitry is configured to generate a heating signal which is sufficient to heat the actuator, without generating movement, to an extent such that the ink is heated, prior to generating the drive signal.

The drive circuitry may be configured to generate a series of pulses with pulses of a predetermined first duration defining heating signals and a series of pulses of a predetermined second duration defining drive signals.

The printhead chip may include a number of temperature sensors that are connected to a temperature determination unit for detecting ink temperature and an ink ejection drive unit for determining whether or not preheating of the ink is required.

The drive circuitry may be defined by CMOS circuitry positioned in the substrate. The CMOS circuitry may incorporate control logic circuitry for each nozzle arrangement, which is connected to the heating circuit.

Each control logic circuitry may include shift register circuitry for receiving a data input, transfer register circuitry that is connected to the shift register circuitry to generate a transfer enable signal and to latch the data input and to generate a firing phase control signal, and gate circuitry that is connected to the transfer register circuitry to be activated by the control signal to output a heating pulse which is received by the heating circuit.

Each elongate actuator may have a laminated structure of at least two layers, with one of the layers defining the heating circuit.

Each elongate actuator may have three layers in the form of a middle layer of a resiliently flexible, non-electrically conductive material, and a pair of opposite, substantially identical metal layers.

According to another aspect, there is provided an inkjet printhead formed on a silicon wafer and including a plurality of nozzle devices, each nozzle device comprising a nozzle chamber and an aperture through which ink from the nozzle chamber is ejected, an actuator for applying pressure to ink within the nozzle chamber to cause ejection of an ink drop through the aperture, and drive circuitry for controlling the actuator, wherein the drive circuitry and the actuator share area of said silicon wafer.

Preferably the actuator and the drive circuitry overlap.

Preferably the actuator overlies the drive circuitry.

Preferably the actuator is external to the nozzle chamber.

Preferably the actuator is a thermal bend actuator.

Preferably the actuator is attached to a paddle which resides within the nozzle chamber.

DESCRIPTION OF PREFERRED AND OTHER EMBODIMENTS

The preferred embodiment is a 1600 dpi modular monolithic print head suitable for incorporation into a wide variety of page width printers and in print-on-demand camera systems. The print head is fabricated by means of Micro-Electro-Mechanical-Systems (MEMS) technology, which refers to mechanical systems built on the micron scale, usually using technologies developed for integrated circuit fabrication.

As more than 50,000 nozzles are required for a 1600 dpi A4 photographic quality page width printer, integration of the drive electronics on the same chip as the print head is essential to achieve low cost. Integration allows the number of external connections to the print head to be reduced from around 50,000 to around 100. To provide the drive electronics, the preferred embodiment integrates CMOS logic and drive transistors on the same wafer as the MEMS nozzles. MEMS has several major advantages over other manufacturing techniques:

mechanical devices can be built with dimensions and accuracy on the micron scale;

millions of mechanical devices can be made simultaneously, on the same silicon wafer; and the mechanical devices can incorporate electronics.

To reduce the cost of manufacturing each mechanical device, as many as possible devices should be manufactured from the same silicon wafer.

The drive circuitry to drive a paddle actuator takes up space on a silicon wafer. The actuator itself also takes up space. A greater number of devices could be yielded from a single silicon wafer if the drive circuit and actuator shared silicon area. That is, a greater yield could be achieved if the drive circuitry and actuator overlapped. This might be achieved by having the actuator completely or partly overlying the drive circuitry or by having the drive circuitry completely or partly overlying the actuator. That is, the drive circuitry could be above or below the actuator in part or in full.

The term “IJ46 print head” is used herein to identify print heads made according to the preferred embodiment of this invention.

Operating Principle

One embodiment relies on the utilization of a thermally actuated lever arm which is utilized for the ejection of ink. The nozzle chamber from which ink ejection occurs includes a thin nozzle rim around which a surface meniscus is formed. A nozzle rim is formed utilizing a self aligning deposition mechanism. The preferred embodiment also includes the advantageous feature of a flood prevention rim around the ink ejection nozzle.

Turning initially to FIG. 1006 to FIG. 1008, there will be now initially explained the operation of principles of the ink jet print head of the preferred embodiment. In FIG. 1006, there is illustrated a single nozzle arrangement 46001 which includes a nozzle chamber 46002 which is supplied via an ink supply channel 46003 so as to form a meniscus 46004 around a nozzle rim 46005. A thermal actuator mechanism 46006 is provided and includes an end paddle 46007 which can be a circular form. The paddle 46007 is attached to an actuator arm 46008 which pivots at a post 46009. The actuator arm 46008 includes two layers 46010, 46011 which are formed from a conductive material having a high degree of stiffness, such as titanium nitride. The bottom layer 46010 forms a conductive circuit interconnected to post 46009 and further includes a thinned portion near the end post 46009. Hence, upon passing a current through the bottom layer 46010, the bottom layer is heated in the area adjacent the post 46009. Without the heating, the two layers 46010, 46011 are in thermal balance with one another. The heating of the bottom layer 46010 causes the overall actuator mechanism 46006 to bend generally upwards and hence paddle 46007 as indicated in FIG. 1007 undergoes a rapid upward movement The rapid upward movement results in an increase in pressure around the rim 46005 which results in a general expansion of the meniscus 46004 as ink flows outside the chamber. The conduction to the bottom layer 46010 is then turned off and the actuator arm 46006, as illustrated in FIG. 1008 begins to return to its quiescent position. The return results in a movement of the paddle 46007 in a downward direction. This in turn results in a general sucking back of the ink around the nozzle 46005. The forward momentum of the ink outside the nozzle in addition to the backward momentum of the ink within the nozzle chamber results in a drop 46014 being formed as a result of a necking and breaking of the meniscus 46004. Subsequently, due to surface tension effects across the meniscus 46004, ink is drawn into the nozzle chamber 46002 from the ink supply channel 46003.

The operation of the preferred embodiment has a number of significant features. Firstly, there is the aforementioned balancing of the layer 46010,46011. The utilization of a second layer 46011 allows for more efficient thermal operation of the actuator device 46006. Further, the two-layer operation ensures thermal stresses are not a problem upon cooling during manufacture, thereby reducing the likelihood of peeling during fabrication This is illustrated in FIG. 1009 and FIG. 1010. In FIG. 1009, there is shown the process of cooling off a thermal actuator arm having two balanced material layers 46020, 46021 surrounding a central material layer 46022. The cooling process affects each of the conductive layers 46020, 46021 equally resulting in a stable configuration. In FIG. 1010, a thermal actuator arm having only one conductive layer 46020 as shown. Upon cooling after manufacture, the upper layer 46020 is going to bend with respect to the central layer 46022. This is likely to cause problems due to the instability of the final arrangement and variations and thickness of various layers which will result in different degrees of bending.

Further, the arrangement described with reference to FIGS. 1006 to 1009 includes an ink jet spreading prevention rim 46025 (FIG. 1006) which is constructed so as to provide for a pit 46026 around the nozzle rim 46005. Any ink which should flow outside of the nozzle rim 46005 is generally caught within the pit 46026 around the rim and thereby prevented from flowing across the surface of the ink jet print head and influencing operation. This arrangement can be clearly seen in FIG. 1016.

Further, the nozzle rim 46005 and ink spread prevention rim 46025 are formed via a unique chemical mechanical planarization technique. This arrangement can be understood by reference to FIG. 1011 to FIG. 1014. Ideally, an ink ejection nozzle rim is highly symmetrical in form as illustrated at 46030 in FIG. 1011. The utilization of a thin highly regular rim is desirable when it is time to eject ink. For example, in FIG. 1012 there is illustrated a drop being ejected from a rim during the necking and breaking process. The necking and breaking process is a high sensitive one, complex chaotic forces being involved. Should standard lithography be utilized to form the nozzle rim, it is likely that the regularity or symmetry of the rim can only be guaranteed to within a certain degree of variation in accordance with the lithographic process utilized. This may result in a variation of the rim as illustrated at 46035 in FIG. 1013. The rim variation leads to a non-symmetrical rim 46035 as illustrated in FIG. 1013. This variation is likely to cause problems when forming a droplet. The problem is illustrated in FIG. 1016 wherein the meniscus 36 creeps along the surface 46037 where the rim is bulging to a greater width. This results in an ejected drop likely to have a higher variance in direction of ejection.

In the preferred embodiment, to overcome this problem, a self aligning chemical mechanical planarization (CMP) technique is utilized. A simplified illustration of this technique will now be discussed with reference to FIG. 1015. In FIG. 1015, there is illustrated a silicon substrate 46040 upon which is deposited a first sacrificial layer 46041 and a thin nozzle layer 46042 shown in exaggerated form. The sacrificial layer is first deposited and etched so as to form a "blank" for the nozzle layer 46042 that is deposited over all surfaces conformally. In an alternative manufacturing process, a further sacrificial material layer can be deposited on top of the nozzle layer 46042.

Next, the critical step is to chemically mechanically planarize the nozzle layer and sacrificial layers down to a first level eg. 46044. The chemical mechanical planarization process acts to effectively "chop off" the top layers down to level 46044. Through the utilization of conformal deposition, a regular rim is produced. The result, after chemical mechanical planarization, is illustrated schematically in FIG. 1016.

The description of the preferred embodiments will now proceed by first describing an ink jet preheating step preferably utilized in the IJ46 device.

Ink Preheating

In the preferred embodiment, an ink preheating step is utilized so as to bring the temperature of the print head arrangement to be within a predetermined bound. The steps utilized are illustrated at 46101 in FIG. 1017. Initially, the decision to initiate a printing run is made at 46102. Before any printing has begun, the current temperature of the print head is sensed to determine whether it is above a predetermined threshold. If the heated temperature is too low, a preheat cycle 46104 is applied which heats the print head by means of heating the thermal actuators to be above a predetermined temperature of operation. Once the temperature has achieved a predetermined temperature, the normal print cycle 46105 has begun.

The utilization of the preheating step 46104 results in a general reduction in possible variation in factors such as viscosity etc. allowing for a narrower operating range of the device and, the utilization of lower thermal energies in ink ejection.

The preheating step can take a number of different forms. Where the ink ejection device is of a thermal bend actuator type, it would normally receive a series of clock pulse as illustrated in FIG. 1018 with the ejection of ink requiring clock pulses 46110 of a predetermined thickness so as to provide enough energy for ejection.

As illustrated in FIG. 1019, when it is desired to provide for preheating capabilities, these can be provided through the utilization of a series of shorter pulses eg. 46111, which whilst providing thermal energy to the print head, fail to cause ejection of the ink from the ink ejection nozzle.

FIG. 1021 illustrates an example graph of the print head temperature during a printing operation. Assuming the print head has been idle for a substantial period of time, the print head temperature, initially 46115, will be the ambient temperature. When it is desired to print, a preheating step (46104 of FIG. 1017) is executed such that the temperature rises as shown at 46116 to an operational temperature T2 at 46117, at which point printing can begin and the temperature left to fluctuate in accordance with usage requirements.

Alternately, as illustrated in FIG. 1021, the print head temperature can be continuously monitored such that should the temperature fall below a threshold eg. 46120, a series of preheating cycles are injected into the printing process so as to increase the temperature to 46121, above a predetermined threshold.

Assuming the ink utilized has properties substantially similar to that of water, the utilization of the preheating step can take advantage of the substantial fluctuations in ink viscosity with temperature. Of course, other operational factors may be significant and the stabilisation to a narrower temperature range provides for advantageous effects. As the viscosity changes with changing temperature, it would be readily evident that the degree of preheating required above the ambient temperature will be dependant upon the ambient temperature and the equilibrium temperature of the print head during printing operations. Hence, the degree of preheating may be varied in accordance with the measured ambient temperature so as to provide for optimal results.

A simple operational schematic is illustrated in FIG. 1023 with the print head 46130 including an on-board series of temperature sensors which are connected to a temperature determination unit 46131 for determining the current temperature which in turn outputs to an ink ejection drive unit 46132 which determines whether preheating is required at any particular stage. The on-chip (print head) temperature sensors can be simple MEMS temperature sensors, the construction of which is well known to those skilled in the art.

Manufacturing Process

IJ46 device manufacture can be constructed from a combination of standard CMOS processing, and MEMS postprocessing. Ideally, no materials should be used in the MEMS portion of the processing which are not already in common use for CMOS processing. In the preferred embodiment, the only MEMS materials are PECVD glass, sputtered TiN, and a sacrificial material (which may be polyimide, PSG, BPSG, aluminum, or other materials). Ideally, to fit corresponding drive circuits between the nozzles without increasing chip area, the minimum process is a 0.5 micron, one poly, 3 metal CMOS process with aluminum metalization. However, any more advanced process can be used instead. Alternatively, NMOS, bipolar, BiCMOS, or other processes may be used. CMOS is recommended only due to its prevalence in the industry, and the availability of large amounts of CMOS fab capacity.

For a 100 mm photographic print head using the CMY process color model, the CMOS process implements a simple circuit consisting of 19,200 stages of shift register, 19,200 bits of transfer register, 19,200 enable gates, and 19,200 drive transistors. There are also some clock buffers and enable decoders. The clock speed of a photo print head is only 3.8 MHz, and a 30 ppm A4 print head is only 14 MHz, so the CMOS performance is not critical. The CMOS process is fully completed, including passivation and opening of bond pads before the MEMS processing begins. This allows the CMOS processing to be completed in a standard CMOS fab, with the MEMS processing being performed in a separate facility.

Reasons for Process Choices

It will be understood from those skilled in the art of manufacture of MEMS devices that there are many possible process sequences for the manufacture of an IJ46 print head. The process sequence described here is based on a 'generic' 0.5 micron (drawn) n-well CMOS process with 1 poly and three metal layers. This table outlines the reasons for some of the choices of this 'nominal' process, to make it easier to determine the effect of any alternative process choices.

| Nominal Process | Reason |
|---|---|
| CMOS | Wide availability |
| 0.5 micron or less | 0.5 micron is required to fit drive electronics under the actuators |
| 0.5 micron or more | Fully amortized fabs, low cost |
| N-well | Performance of n-channel is more important than p-channel transistors |
| 6" wafers | Minimum practical for 4" monolithic print heads |
| 1 polysilicon layer | 2 poly layers are not required, as there is little low current connectivity |
| 3 metal layers | To supply high currents, most of metal 3 also provides sacrificial structures |
| Aluminum metalization | Low cost, standard for 0.5 micron processes (copper may be more efficient) |

Mask Summary

| Mask # | Mask | Notes | Type | Pattern | Align to | CD |
|---|---|---|---|---|---|---|
| 1 | N-well | | CMOS 1 | Light | Flat | 4 μm |
| 2 | Active | Includes nozzle chamber | CMOS 2 | Dark | N-Well | 1 μm |
| 3 | Poly | | CMOS 3 | Dark | Active | 0.5 μm |
| 4 | N+ | | CMOS 4 | Dark | Poly | 4 μm |
| 5 | P+ | | CMOS 4 | Light | Poly | 4 μm |
| 6 | Contact | Includes nozzle chamber | CMOS 5 | Light | Poly | 0.5 μm |
| 7 | Metal 1 | | CMOS 6 | Dark | Contact | 0.6 μm |
| 8 | Via 1 | Includes nozzle chamber | CMOS 7 | Light | Metal 1 | 0.6 μm |
| 9 | Metal 2 | Includes sacrificial al. | CMOS 8 | Dark | Via 1 | 0.6 μm |
| 10 | Via 2 | Includes nozzle chamber | CMOS 9 | Light | Metal 2 | 0.6 μm |
| 11 | Metal 3 | Includes sacrificial al. | CMOS 10 | Dark | Poly | 1 μm |
| 12 | Via 3 | Overcoat, but 0.6 μm CD | CMOS 11 | Light | Poly | 0.6 μm |
| 13 | Heater | | MEMS 1 | Dark | Poly | 0.6 μm |
| 14 | Actuator | | MEMS 2 | Dark | Heater | 1 μm |
| 15 | Nozzle | For CMP control | MEMS 3 | Dark | Poly | 2 μm |
| 16 | Chamber | | MEMS 4 | Dark | Nozzle | 2 μm |
| 17 | Inlet | Backside deep silicon etch | MEMS 5 | Light | Poly | 4 μm |

Example Process Sequence (Including CMOS Steps)

Although many different CMOS and other processes can be used, this process description is combined with an example CMOS process to show where MEMS features are integrated in the CMOS masks, and show where the CMOS process may be simplified due to the low CMOS performance requirements.

Process steps described below are part of the example 'generic' 1P3M 0.5 micron CMOS process.

As shown in FIG. 18, processing starts with a standard 6" p-type <100> wafers. (8" wafers can also be used, giving a substantial increase in primary yield).

Using the n-well mask of FIG. 1024, implant the n-well transistor portions 46210 of FIG. 1025.

Grow a thin layer of $SiO_2$ and deposit $Si_3N_4$ forming a field oxide hard mask.

Etch the nitride and oxide using the active mask of FIG. 1027. The mask is oversized to allow for the LOCOS birds beak. The nozzle chamber region is incorporated in this mask as field oxide is excluded from the nozzle chamber. The result is a series of oxide regions 46212, illustrated in FIG. 1028.

Implant the channel-stop using the n-well mask with a negative resist, or using a complement of the n-well mask.

Perform any required channel stop implants as required by the CMOS process used.

Grow 0.5 micron of field oxide using LOCOS.

Perform any required n/p transistor threshold voltage adjustments. Depending upon the characteristics of the CMOS process, it may be possible to omit the threshold adjustments. This is because the operating frequency is only 3.8 MHz, and the quality of the p-devices is not critical. The n-transistor threshold is more significant, as the on-resistance of the n-channel drive transistor has a significant effect on the efficiency and power consumption while printing.

Grow the Gate Oxide

Deposit 0.3 microns of poly, and pattern using the poly mask illustrated in FIG. 1030 so as to form poly portions 46214 shown in FIG. 1029.

Perform the n+ implant shown e.g. 46216 in FIG. 1034 using the n+ mask shown in FIG. 1033. The use of a drain engineering processes such as LDD should not be required, as the performance of the transistors is not critical.

Perform the p+ implant shown e.g. 218 in FIG. 1037, using a complement of the n+ mask shown in FIG. 1036, or using the n+ mask with a negative resist. The nozzle chamber region will be doped either n+ or p+ depending upon whether it is included in the n+ mask or not. The doping of this silicon region is not relevant as it is subsequently etched, and the STS ASE etch process recommended does not use boron as an etch stop.

Deposit 0.6 microns of PECVD TEOS glass to form ILD 1, shown e.g. 46220 in FIG. 1040.

Etch the contact cuts using the contact mask of FIG. 1039. The nozzle region is treated as a single large contact region, and will not pass typical design rule checks. This region should therefore be excluded from the DRC.

Deposit 0.6 microns of aluminum to form metal 46001.

Etch the aluminum using the metal 46001 mask shown in FIG. 1042 so as to form metal regions e.g. 46224 shown in FIG. 1043. The nozzle metal region is covered with metal 1 e.g. 46225. This aluminum 46225 is sacrificial, and is etched as part of the MEMS sequence. The inclusion of metal 46001 in the nozzle is not essential, but helps reduce the step in the neck region of the actuator lever arm.

Deposit 0.7 microns of PECVD TEOS glass to form ILD 2 regions e.g. 46228 of FIG. 1046.

Etch the contact cuts using the via 1 mask shown in FIG. 1045. The nozzle region is treated as a single large via region, and again it will not pass DRC.

Deposit 0.6 microns of aluminum to form metal 2.

Etch the aluminum using the metal 2 mask shown in FIG. 1047 so as to form metal portions e.g. 46230 shown in FIG. 1048. The nozzle region 46231 is fully covered with metal 2. This aluminum is sacrificial, and is etched as part of the MEMS sequence. The inclusion of metal 2 in the nozzle is not essential, but helps reduce the step in the neck region of the actuator lever arm. Sacrificial metal 2 is also used for another fluid control feature. A relatively large rectangle of metal 2 is included in the neck region 46233 of the nozzle chamber. This is connected to the sacrificial metal 3, so is also removed during the MEMS sacrificial aluminum etch. This undercuts the lower rim of the nozzle chamber entrance for the actuator (which is formed from ILD 3). The undercut adds 90 degrees to angle of the fluid control surface, and thus increases the ability of this rim to prevent ink surface spread.

Deposit 0.7 microns of PECVD TEOS glass to form ILD) 3.

Etch the contact cuts using the via 2 mask shown in FIG. 1050 so as to leave portions e.g. 46236 shown in FIG. 1051.

As well as the nozzle chamber, fluid control rims are also formed in ILD 3. These will also not pass DRC.

Deposit 1.0 microns of aluminum to form metal 3.

Etch the aluminum using the metal 3 mask shown in FIG. 1052 so as to leave portions e.g. 46238 as shown in FIG. 1053. Most of metal 46003 e.g. 46239 is a sacrificial layer used to separate the actuator and paddle from the chip surface. Metal 3 is also used to distribute V+ over the chip. The nozzle region is fully covered with metal 3 e.g. 46240.

This aluminum is sacrificial, and is etched as part of the MEMS sequence. The inclusion of metal 3 in the nozzle is not essential, but helps reduce the step in the neck region of the actuator lever arm.

Deposit 0.5 microns of PECVD TEOS glass to form the overglass.

Deposit 0.5 microns of $Si_3N_4$ to form the passivation layer.

Etch the passivation and overglass using the via 3 mask shown in FIG. 1055 so as to form the arrangement of FIG. 1056. This mask includes access 46242 to the metal 3 sacrificial layer, and the vias e.g. 46243 to the heater actuator.

Lithography of this step has 0.6 micron critical dimensions (for the heater vias) instead of the normally relaxed lithography used for opening bond pads. This is the one process step which is different from the normal CMOS process flow. This step may either be the last process step of the CMOS process, or the first step of the MEMS process, depending upon the fab setup and transport requirements.

Wafer Probe. Much, but not all, of the functionality of the chips can be determined at this stage. If more complete testing at this stage is required, an active dummy load can be included on chip for each drive transistor. This can be achieved with minor chip area penalty, and allows complete testing of the CMOS circuitry.

Transfer the wafers from the CMOS facility to the MEMS facility. These may be in the same fab, or may be distantly located.

Deposit 0.9 microns of magnetron sputtered TiN. Voltage is −65V, magnetron current is 7.5 A, argon gas pressure is 0.3 Pa, temperature is 300° C. This results in a coefficient of thermal expansion of $9.4\times10^{-6}$/° C., and a Young's modulus of 600 GPa [*Thin Solid Films* 270 p 266, 1995], which are the key thin film properties used.

Etch the TiN using the heater mask shown in FIG. 1058. This mask defines the heater element, paddle arm, and paddle.

There is a small gap 46247 shown in FIG. 1059 between the heater and the TiN layer of the paddle and paddle arm.

This is to prevent electrical connection between the heater and the ink, and possible electrolysis problems. Sub-micron accuracy is required in this step to maintain a uniformity of heater characteristics across the wafer. This is the main reason that the heater is not etched simultaneously with the other actuator layers. CD for the heater mask is 0.5 microns. Overlay accuracy is ±0.1 microns. The bond pads are also covered with this layer of TiN. This is to prevent the bond pads being etched away during the sacrificial aluminum etch. It also prevents corrosion of the aluminum bond pads during operation. TiN is an excellent corrosion barrier for aluminum. The resistivity of TiN is low enough to not cause problems with the bond pad resistance.

Deposit 2 microns of PECVD glass. This is preferably done at around 350° C. to 400° C. to minimize intrinsic stress in the glass. Thermal stress could be reduced by a lower deposition temperature, however thermal stress is actually beneficial, as the glass is sandwiched between two layers of TiN. The TiN/glass/TiN tri-layer cancels bend due to thermal stress, and results in the glass being under constant compressive stress, which increases the efficiency of the actuator.

Deposit 0.9 microns of magnetron sputtered TiN. This layer is deposited to cancel bend from the differential thermal stress of the lower TiN and glass layers, and prevent the paddle from curling when released from the sacrificial materials. The deposition characteristics should be identical to the first TiN layer.

Anisotropically plasma etch the TiN and glass using actuator mask as shown in FIG. 1061. This mask defines the actuator and paddle. CD for the actuator mask is 1 micron. Overlay accuracy is ±0.1 microns. The results of the etching process is illustrated in FIG. 1062 with the glass layer 46250 sandwiched between TiN layers 46251, 46248.

Electrical testing can be performed by wafer probing at this time. All CMOS tests and heater functionality and resistance tests can be completed at wafer probe.

Deposit 15 microns of sacrificial material. There are many possible choices for this material. The essential requirements are the ability to deposit a 15 micron layer without excessive wafer warping, and a high etch selectivity to PECVD glass and TiN. Several possibilities are phosphosilicate glass (PSG), borophosphosilicate glass (BPSG), polymers such as polyimide, and aluminum. Either a close CTE match to silicon (BPSG with the correct doping, filled polyimide) or a low Young's modulus (aluminum) is required. This example uses BPSG. Of these issues, stress is the most demanding due to the extreme layer thickness. BPSG normally has a CTE well below that of silicon, resulting in considerable compressive stress. However, the composition of BPSG can be varied significantly to adjust its CTE close to that of silicon. As the BPSG is a sacrificial layer, its electrical properties are not relevant, and compositions not normally suitable as a CMOS dielectric can be used. Low density, high porosity, and a high water content are all beneficial characteristics as they will increase the etch selectivity versus PECVD glass when using an anhydrous HF etch.

Etch the sacrificial layer to a depth of 2 microns using the nozzle mask as defined in FIG. 1064 so as to form the structure 46254 illustrated in section in FIG. 1065. The mask of FIG. 1064 defines all of the regions where a subsequently deposited overcoat is to be polished off using CMP. This includes the nozzles themselves, and various other fluid control features. CD for the nozzle mask is 2 microns. Overlay accuracy is ±0.5 microns.

Anisotropically plasma etch the sacrificial layer down to the CMOS passivation layer using the chamber mask as illustrated in FIG. 1067. This mask defines the nozzle chamber and actuator shroud including slots 46255 as shown in FIG. 1068. CD for the chamber mask is 2 microns. Overlay accuracy is ±0.2 microns.

Deposit 0.5 microns of fairly conformal overcoat material 46257 as illustrated in FIG. 1070. The electrical properties of this material are irrelevant, and it can be a conductor, insulator, or semiconductor. The material should be: chemically inert, strong, highly selective etch with respect to the sacrificial material, be suitable for CMP, and be suitable for conformal deposition at temperatures below 500° C. Suitable materials include: PECVD glass, MOCVD TiN, ECR CVD TiN, PECVD $Si_3N_4$, and many others. The choice for this example is PECVD TEOS glass. This must have a very low water content if BPSG is used as the sacrificial material and anhydrous HF is used as the sacrificial etchant, as the anhydrous HF etch relies on water content to achieve 1000:1 etch selectivity of BPSG over TEOS glass. The conformed overcoat 46257 forms a protective covering shell around the operational portions of the thermal bend actuator while permitting movement of the actuator within the shell.

Planarize the wafer to a depth of 1 micron using CMP as illustrated in FIG. 1072. The CMP processing should be maintained to an accuracy of ±0.5 microns over the wafer surface. Dishing of the sacrificial material is not relevant. This opens the nozzles 46259 and fluid control regions e.g. 46260. The rigidity of the sacrificial layer relative to the nozzle chamber structures during CMP is one of the key factors which may affect the choice of sacrificial materials. Turn the print head wafer over and securely mount the front surface on an oxidized silicon wafer blank 46262 illustrated in FIG. 1074 having an oxidized surface 46263. The mounting can be by way of glue 46265. The blank wafers 46262 can be recycled.

Thin the print head wafer to 300 microns using backgrinding (or etch) and polish. The wafer thinning is performed to reduce the subsequent processing duration for deep silicon etching from around 5 hours to around 2.3 hours. The accuracy of the deep silicon etch is also improved, and the hardmask thickness is halved to 2.55 microns. The wafers could be thinned further to improve etch duration and print head efficiency. The limitation to wafer thickness is the print head fragility after sacrificial BPSG etch.

Deposit a $SiO_2$ hard mask (2.55 microns of PECVD glass) on the backside of the wafer and pattern using the inlet mask as shown in FIG. 1072. The hard mask of FIG. 1072 is used for the subsequent deep silicon etch, which is to a depth of 315 microns with a hard mask selectivity of 150:1. This mask defines the ink inlets, which are etched through the wafer. CD for the inlet mask is 4 microns. Overlay accuracy is ±2 microns. The inlet mask is undersize by 5.25 microns on each side to allow for a re-entrant etch angle of 91 degrees over a 300 micron etch depth. Lithography for this step uses a mask aligner instead of a stepper. Alignment is to patterns on the front of the wafer. Equipment is readily available to allow sub-micron front-to-back alignment.

Back-etch completely through the silicon wafer (using, for example, an ASE Advanced Silicon Etcher from Surface Technology Systems) through the previously deposited hard mask. The STS ASE is capable of etching highly accurate holes through the wafer with aspect ratios of 30:1 and sidewalls of 90 degrees. In this case, a re-entrant sidewall angle of 91 degrees is taken as nominal. A re-entrant angle is chosen because the ASE performs better, with a higher etch rate for a given accuracy, with a slightly re-entrant angle. Also, a reentrant etch can be compensated by making the holes on the mask undersize. Non-re-entrant etch angles cannot be so easily compensated, because the mask holes would merge. The wafer is also preferably diced by this etch. The final result is as illustrated in FIG. 1074 including back etched ink channel portions 46264.

Etch all exposed aluminum. Aluminum on all three layers is used as sacrificial layers in certain places.

Etch all of the sacrificial material. The nozzle chambers are cleared by this etch with the result being as shown in FIG.

1076. If BPSG is used as the sacrificial material, it can be removed without etching the CMOS glass layers or the actuator glass. This can be achieved with 1000:1 selectivity against undoped glass such as TEOS, using anhydrous HF at 1500 sccm in a $N_2$ atmosphere at 60° C. [L. Chang et al, "Anhydrous HF etch reduces processing steps for DRAM capacitors", *Solid State Technology* Vol.41 No.5, pp 71-76, 1998]. The actuators are freed and the chips are separated from each other, and from the blank wafer, by this etch. If aluminum is used as the sacrificial layer instead of BPSG, then its removal is combined with the previous step, and this step is omitted.

Pick up the loose print heads with a vacuum probe, and mount the print heads in their packaging. This must be done carefully, as the unpackaged print heads are fragile. The front surface of the wafer is especially fragile, and should not be touched. This process should be performed manually, as it is difficult to automate. The package is a custom injection molded plastic housing incorporating ink channels that supply the appropriate color ink to the ink inlets at the back of the print head. The package also provides mechanical support to the print head. The package is especially designed to place minimal stress on the chip, and to distribute that stress evenly along the length of the package. The print head is glued into this package with a compliant sealant such as silicone.

Form the external connections to the print head chip. For a low profile connection with minimum disruption of airflow, tape automated bonding (TAB) may be used. Wire bonding may also be used if the printer is to be operated with sufficient clearance to the paper. All of the bond pads are along one 100 mm edge of the chip. There are a total of 504 bond pads, in 8 identical groups of 63 (as the chip is fabricated using 8 stitched stepper steps). Each bond pad is 100×100 micron, with a pitch of 200 micron. 256 of the bond pads are used to provide power and ground connections to the actuators, as the peak current is 6.58 Amps at 3V. There are a total of 40 signal connections to the entire print head (24 data and 16 control), which are mostly bussed to the eight identical sections of the print head. Hydrophobize the front surface of the print heads. This can be achieved by the vacuum deposition of 50 nm or more of polytetrafluoroethylene (PTFE). However, there are also many other ways to achieve this. As the fluid is filly controlled by mechanical protuberances formed in previous steps, the hydrophobic layer is an 'optional extra' to prevent ink spreading on the surface if the print head becomes contaminated by dust.

Plug the print heads into their sockets. The socket provides power, data, and ink. The ink fills the print-head by capillarity. Allow the completed print heads to fill with ink, and test. FIG. 1079 illustrates the filling of ink 46268 into the nozzle chamber.

Process Parameters Used for this Implementation Example

The CMOS process parameters utilized can be varied to suit any CMOS process of 0.5 micron dimensions or better. The MEMS process parameters should not be varied beyond the tolerances shown below. Some of these parameters affect the actuator performance and fluidics, while others have more obscure relationships. For example, the wafer thin stage affects the cost and accuracy of the deep silicon etch, the thickness of the back-side hard mask, and the dimensions of the associated plastic ink channel molding. Suggested process parameters can be as follows:

| Parameter | Type | Min. | Nom. | Max. | Units | Tol. |
|---|---|---|---|---|---|---|
| Wafer resistivity | CMOS | 15 | 20 | 25 | Ωcm | ±25% |
| Wafer thickness | CMOS | 600 | 650 | 700 | μm | ±8% |
| N-Well Junction depth | CMOS | 2 | 2.5 | 3 | μm | ±20% |
| n+ Junction depth | CMOS | 0.15 | 0.2 | 0.25 | μm | ±25% |
| p+ Junction depth | CMOS | 0.15 | 0.2 | 0.25 | μm | ±25% |
| Field oxide thickness | CMOS | 0.45 | 0.5 | 0.55 | μm | ±10% |
| Gate oxide thickness | CMOS | 12 | 13 | 14 | nm | ±7% |
| Poly thickness | CMOS | 0.27 | 0.3 | 0.33 | μm | ±10% |
| ILD 1 thickness (PECVD glass) | CMOS | 0.5 | 0.6 | 0.7 | μm | ±16% |
| Metal 1 thickness (aluminum) | CMOS | 0.55 | 0.6 | 0.65 | μm | ±8% |
| ILD 2 thickness (PECVD glass) | CMOS | 0.6 | 0.7 | 0.8 | μm | ±14% |
| Metal 2 thickness (aluminum) | CMOS | 0.55 | 0.6 | 0.65 | μm | ±8% |
| ILD 3 thickness (PECVD glass) | CMOS | 0.6 | 0.7 | 0.8 | μm | ±14% |
| Metal 3 thickness (aluminum) | CMOS | 0.9 | 1.0 | 1.1 | μm | ±10% |
| Overcoat (PECVD glass) | CMOS | 0.4 | 0.5 | 0.6 | μm | ±20% |
| Passivation ($Si_3N_4$) | CMOS | 0.4 | 0.5 | 0.6 | μm | ±20% |
| Heater thickness (TiN) | MEMS | 0.85 | 0.9 | 0.95 | μm | ±5% |
| Actuator thickness (PECVD glass) | MEMS | 1.9 | 2.0 | 2.1 | μm | ±5% |
| Bend compensator thickness (TiN) | MEMS | 0.85 | 0.9 | 0.95 | μm | ±5% |
| Sacrificial layer thickness (low stress BPSG) | MEMS | 13.5 | 15 | 16.5 | μm | ±10% |
| Nozzle etch (BPSG) | MEMS | 1.6 | 2.0 | 2.4 | μm | ±20% |
| Nozzle chamber and shroud (PECVD glass) | MEMS | 0.3 | 0.5 | 0.7 | μm | ±40% |
| Nozzle CMP depth | MEMS | 0.7 | 1 | 1.3 | μm | ±30% |
| Wafer thin (back-grind and polish) | MEMS | 295 | 300 | 305 | μm | ±1.6% |
| Back-etch hard mask ($SiO_2$) | MEMS | 2.25 | 2.5 | 2.75 | μm | ±10% |
| STS ASE back-etch (stop on aluminum) | MEMS | 305 | 325 | 345 | μm | ±6% |

Control Logic

Turning over to FIG. 1081, there is illustrated the associated control logic for a single ink jet nozzle. The control logic 46280 is utilized to activate a heater element 46281 on demand. The control logic 46280 includes a shift register 46282, a transfer register 46283 and a firing control gate 46284. The basic operation is to shift data from one shift register 46282 to the next until it is in place. Subsequently, the data is transferred to a transfer register 46283 upon activation of a transfer enable signal 46286. The data is latched in the transfer register 46283 and subsequently, a firing phase control signal 46289 is utilized to activate a gate 46284 for output of a heating pulse to heat an element 46281.

As the preferred implementation utilizes a CMOS layer for implementation of all control circuitry, one form of suitable CMOS implementation of the control circuitry will now be described. Turning now to FIG. 1082, there is illustrated a schematic block diagram of the corresponding CMOS circuitry. Firstly, shift register 46282 takes an inverted data input and latches the input under control of shift clocking signals 46291, 46292. The data input 46290 is output 46294 to the next shift register and is also latched by a transfer register 46283 under control of transfer enable signals 46296, 46297. The enable gate 46284 is activated under the control of enable signal 46299 so as to drive a power transistor 46300 which allows for resistive heating of resistor 46281. The functionality of the shift register 46282, transfer register 46283 and enable gate 46284 are standard CMOS components well understood by those skilled in the art of CMOS circuit design.

Replicated Units

The ink jet print head can consist of a large number of replicated unit cells each of which has basically the same design. This design will now be discussed.

Turning initially to FIG. 1083, there is illustrated a general key or legend of different material layers utilized in subsequent discussions.

FIG. 1084 illustrates the unit cell 46305 on a 1 micron grid 46306. The unit cell 46305 is copied and replicated a large number of times with FIG. 1084 illustrating the diffusion and poly-layers in addition to vias e.g. 46308. The signals 46290, 46291, 46292, 46296, 46297 and 46299 are as previously discussed with reference to FIG. 1082. A number of important aspects of FIG. 1084 include the general layout including the shift register, transfer register and gate and drive transistor. Importantly, the drive transistor 46300 includes an upper poly-layer e.g. 46309 which is laid out having a large number of perpendicular traces e.g. 46312. The perpendicular traces are important in ensuring that the corrugated nature of a heater element formed over the power transistor 46300 will have a corrugated bottom with corrugations running generally in the perpendicular direction of trace 46112. This is best shown in FIGS. 1074, 1076 and 1079. Consideration of the nature and directions of the corrugations, which arise unavoidably due to the CMOS wiring underneath, is important to the ultimate operational efficiency of the actuator. In the ideal situation, the actuator is formed without corrugations by including a planarization step on the upper surface of the substrate step prior to forming the actuator. However, the best compromise that obviates the additional process step is to ensure that the corrugations extend in a direction that is transverse to the bending axis of the actuator as illustrated in the examples, and preferably constant along its length This results in an actuator that may only be 2% less efficient than a flat actuator, which in many situations will be an acceptable result. By contrast, corrugations that extend longitudinally would reduce the efficiency by about 20% compared to a flat actuator.

In FIG. 1085, there is illustrated the addition of the first level metal layer which includes enable lines 46296, 46297.

In FIG. 1086, there is illustrated the second level metal layer which includes data in-line 46290, SClock line 46291, SClock 46292, Q 294, TEn 46296 and TEn 46297, V− 46320, $V_{DD}$ 46321, $V_{SS}$ 46322, in addition reflected components 46323 to 46328. The portions 46330 and 46331 are utilized as a sacrificial etch.

Turning now to FIG. 1087 there is illustrated the third level metal layer which includes a portion 46340 which is utilized as a sacrificial etch layer underneath the heater actuator. The portion 46341 is utilized as part of the actuator structure with the portions 46342 and 46343 providing electrical interconnections.

Turning now to FIG. 1088, there is illustrated the planar conductive heating circuit layer including heater arms 46350 and 46351 which are interconnected to the lower layers. The heater arms are formed on either side of a tapered slot so that they are narrower toward the fixed or proximal end of the actuator arm, giving increased resistance and therefore heating and expansion in that region. The second portion of the heating circuit layer 46352 is electrically isolated from the arms 46350 and 46351 by a discontinuity 46355 and provides for structural support for the main paddle 46356. The discontinuity may take any suitable form but is typically a narrow slot as shown at 46355.

In FIG. 1089 there is illustrated the portions of the shroud and nozzle layer including shroud 46353 and outer nozzle chamber 46354.

Turning to FIG. 1090, there is illustrated a portion 46360 of a array of ink ejection nozzles which are divided into three groups 46361-46363 with each group providing separate color output (cyan, magenta and yellow) so as to provide full three color printing. A series of standard cell clock buffers and address decoders 46364 is also provided in addition to bond pads 46365 for interconnection with the external circuitry.

Each color group 46361, 46363 consists of two spaced apart rows of ink ejection nozzles e.g. 46367 each having a heater actuator element.

FIG. 1092 illustrates one form of overall layout in a cut away manner with a first area 46370 illustrating the layers up to the polysilicon level. A second area 46371 illustrating the layers up to the first level metal, the area 46372 illustrating the layers up to the second level metal and the area 46373 illustrating the layers up to the heater actuator layer.

The ink ejection nozzles are grouped in two groups of 10 nozzles sharing a common ink channel through the wafer. Turning to FIG. 1093, there is illustrated the back surface of the wafer which includes a series of ink supply channels 46380 for supplying ink to a front surface.

Replication

The unit cell is replicated 19,200 times on the 4" print head, in the hierarchy as shown in the replication hierarchy table below. The layout grid is ½ l at 0.5 micron (0.125 micron). Many of the ideal transform distances fall exactly on a grid point Where they do not, the distance is rounded to the nearest grid point The rounded numbers are shown with an asterisk. The transforms are measured from the center of the corresponding nozzles in all cases. The transform of a group of five even nozzles into five odd nozzles also involves a 180° rotation. The translation for this step occurs from a position where all five pairs of nozzle centers are coincident Replication Hierarchy Table

| Replication | Replication Stage | Rotation (°) | Replication Ratio | Total Nozzles | X Transform pixels | Y Transform Grid units | Actual microns | Pixels | Grid units | Actual microns |
|---|---|---|---|---|---|---|---|---|---|---|
| 0 | Initial rotation | 45 | 1:1 | 1 | 0 | 0 | 0 | 0 | 0 | 0 |
| 1 | Even nozzles in a pod | 0 | 5:1 | 5 | 2 | 254 | 31.75 | 1⁄10 | 13* | 1.625* |
| 2 | Odd nozzles in a pod | 180 | 2:1 | 10 | 1 | 127 | 15.875 | 1 9⁄16 | 198* | 24.75* |

-continued

Replication Hierarchy Table

| Replication | Replication Stage | Rotation (°) | Replication Ratio | Total Nozzles | X Transform pixels | Y Transform Grid units | Actual microns | Pixels | Grid units | Actual microns |
|---|---|---|---|---|---|---|---|---|---|---|
| 3 | Pods in a CMY tripod | 0 | 3:1 | 30 | 5½ | 699* | 87.375* | 7 | 889 | 111.125 |
| 4 | Tripods per podgroup | 0 | 10:1 | 300 | 10 | 1270 | 158.75 | 0 | 0 | 0 |
| 5 | Podgroups per firegroup | 0 | 2:1 | 600 | 100 | 12700 | 1587.5 | 0 | 0 | 0 |
| 6 | Firegroups per segment | 0 | 4:1 | 2400 | 200 | 25400 | 3175 | 0 | 0 | 0 |
| 7 | Segments per print head | 0 | 8:1 | 19200 | 800 | 101600 | 12700 | 0 | 0 | 0 |

Composition

Taking the example of a 4-inch print head suitable for use in camera photoprinting as illustrated in FIG. 1094, a 4-inch print head 46380 consists of 8 segments eg. 46381, each segment is ½ an inch in length. Consequently each of the segments prints bi-level cyan, magenta and yellow dots over a different part of the page to produce the final image. The positions of the 8 segments are shown in FIG. 1094. In this example, the print head is assumed to print dots at 1600 dpi, each dot is 15.875 microns in diameter. Thus each half-inch segment prints 800 dots, with the 8 segments corresponding to positions as illustrated in the following table:

| Segment | First dot | Last dot |
|---|---|---|
| 0 | 0 | 799 |
| 1 | 800 | 1599 |
| 2 | 1600 | 2399 |
| 3 | 2400 | 3199 |
| 4 | 3200 | 3999 |
| 5 | 4000 | 4799 |
| 6 | 4800 | 5599 |
| 7 | 5600 | 6399 |

Although each segment produces 800 dots of the final image, each dot is represented by a combination of bi-level cyan, magenta, and yellow ink. Because the printing is bi-level, the input image should be dithered or error-diffused for best results.

Each segment 46381 contains 2,400 nozzles: 800 each of cyan, magenta, and yellow. A four-inch print head contains 8 such segments for a total of 19,200 nozzles.

The nozzles within a single segment are grouped for reasons of physical stability as well as minimization of power consumption during printing. In terms of physical stability, as shown in FIG. 1093 groups of 10 nozzles are grouped together and share the same ink channel reservoir. In terms of power consumption, the groupings are made so that only 96 nozzles are fired simultaneously from the entire print head. Since the 96 nozzles should be maximally distant, 12 nozzles are fired from each segment To fire all 19,200 nozzles, 200 different sets of 96 nozzles must be fired.

FIG. 1095 shows schematically, a single pod 46395 which consists of 10 nozzles numbered 1 to 10 sharing a common ink channel supply. 5 nozzles are in one row, and 5 are in another. Each nozzle produces dots 15.875 μm in diameter. The nozzles are numbered according to the order in which they must be fired.

Although the nozzles are fired in this order, the relationship of nozzles and physical placement of dots on the printed page is different The nozzles from one row represent the even dots from one line on the page, and the nozzles on the other row represent the odd dots from the adjacent line on the page. FIG. 1096 shows the same pod 46395 with the nozzles numbered according to the order in which they must be loaded.

The nozzles within a pod are therefore logically separated by the width of 1 dot The exact distance between the nozzles will depend on the properties of the ink jet firing mechanism. In the best case, the print head could be designed with staggered nozzles designed to match the flow of paper. In the worst case there is an error of 1/3200 dpi. While this error would be viewable under a microscope for perfectly straight lines, it certainly will not be an apparent in a photographic image.

As shown in FIG. 1097, three pods representing Cyan 46398, Magenta 46197, and Yellow 46396 units, are grouped into a tripod 46400. A tripod represents the same horizontal set of 10 dots, but on different lines. The exact distance between different color pods depends on the ink jet operating parameters, and may vary from one ink jet to another. The distance can be considered to be a constant number of dot-widths, and must therefore be taken into account when printing: the dots printed by the cyan nozzles will be for different lines than those printed by the magenta or yellow nozzles. The printing algorithm must allow for a variable distance up to about 8 dot-widths.

As illustrated in FIG. 1098, 10 tripods eg. 46404 are organized into a single podgroup 46405. Since each tripod contains 30 nozzles, each podgroup contains 300 nozzles: 100 cyan, 100 magenta and 100 yellow nozzles. The arrangement is shown schematically in FIG. 1098, with tripods numbered 0-9. The distance between adjacent tripods is exaggerated for clarity.

As shown in FIG. 1099, two podgroups (PodgroupA 46410 and PodgroupB 46411) are organized into a single firegroup 46414, with 4 firegroups in each segment 46415. Each segment 46415 contains 4 firegroups. The distance between adjacent firegroups is exaggerated for clarity.

| Name of Grouping | Composition | Replication Ratio | Nozzle Count |
|---|---|---|---|
| Nozzle | Base unit | 1:1 | 1 |
| Pod | Nozzles per pod | 10:1 | 10 |
| Tripod | Pods per CMY tripod | 3:1 | 30 |
| Podgroup | Tripods per podgroup | 10:1 | 300 |
| Firegroup | Podgroups per firegroup | 2:1 | 600 |
| Segment | Firegroups per segment | 4:1 | 2,400 |
| Print head | Segments per print head | 8:1 | 19,200 |

Load And Print Cycles

The print head contains a total of 19,200 nozzles. A Print Cycle involves the firing of up to all of these nozzles, dependent on the information to be printed. A Load Cycle involves the loading up of the print head with the information to be printed during the subsequent Print Cycle.

Each nozzle has an associated NozzleEnable (46289 of FIG. 1081) bit that determines whether or not the nozzle will fire during the Print Cycle. The NozzleEnable bits (one per nozzle) are loaded via a set of shift registers.

Logically there are 3 shift registers per color, each 800 deep. As bits are shifted into the shift register they are directed to the lower and upper nozzles on alternate pulses. Internally, each 800-deep shift register is comprised of two 400-deep shift registers: one for the upper nozzles, and one for the lower nozzles. Alternate bits are shifted into the alternate internal registers. As far as the external interface is concerned however, there is a single 800 deep shift register.

Once all the shift registers have been fully loaded (800 pulses), all of the bits are transferred in parallel to the appropriate NozzleEnable bits. This equates to a single parallel transfer of 19,200 bits. Once the transfer has taken place, the Print Cycle can begin. The Print Cycle and the Load Cycle can occur simultaneously as long as the parallel load of all NozzleEnable bits occurs at the end of the Print Cycle.

In order to print a 6"×4" image at 1600 dpi in say 2 seconds, the 4" print head must print 9,600 lines (6×1600). Rounding up to 10,000 lines in 2 seconds yields a line time of 200 microseconds. A single Print Cycle and a single Load Cycle must both finish within this time. In addition, a physical process external to the print head must move the paper an appropriate amount.

Load Cycle

The Load Cycle is concerned with loading the print head's shift registers with the next Print Cycle's NozzleEnable bits.

Each segment has 3 inputs directly related to the cyan, magenta, and yellow pairs of shift registers. These inputs are called CDataIn, MDataIn, and YDataIn. Since there are 8 segments, there are a total of 24 color input lines per print head. A single pulse on the SRClock line (shared between all 8 segments) transfers 24 bits into the appropriate shift registers. Alternate pulses transfer bits to the lower and upper nozzles respectively. Since there are 19,200 nozzles, a total of 800 pulses are required for the transfer. Once all 19,200 bits have been transferred, a single pulse on the shared PTransfer line causes the parallel transfer of data from the shift registers to the appropriate NozzleEnable bits. The parallel transfer via a pulse on PTransfer must take place after the Print Cycle has finished. Otherwise the NozzleEnable bits for the line being printed will be incorrect.

Since all 8 segments are loaded with a single SRClock pulse, the printing software must produce the data in the correct sequence for the print head. As an example, the first SRClock pulse will transfer the C, M, and Y bits for the next Print Cycle's dot 0, 800, 1600, 2400, 3200, 4000, 4800, and 5600. The second SRClock pulse will transfer the C, M, and Y bits for the next Print Cycle's dot 1, 801, 1601, 2401, 3201, 4001, 4801 and 5601. After 800 SRClock pulses, the PTransfer pulse can be given.

It is important to note that the odd and even C, M, and Y outputs, although printed during the same Print Cycle, do not appear on the same physical output line. The physical separation of odd and even nozzles within the print head, as well as separation between nozzles of different colors ensures that they will produce dots on different lines of the page. This relative difference must be accounted for when loading the data into the print head. The actual difference in lines depends on the characteristics of the ink jet used in the print head. The differences can be defined by variables $D_1$ and $D_2$ where $D_1$ is the distance between nozzles of different colors (likely value 4 to 8), and $D_2$ is the distance between nozzles of the same color (likely value=1). Table 3 shows the dots transferred to segment n of a print head on the first 4 pulses.

| | Yellow | | Magenta | | Cyan | |
|---|---|---|---|---|---|---|
| Pulse | Line | Dot | Line | Dot | Line | Dot |
| 1 | N | 800S | $N + D_1$ | 800S | N + 2D1 | 800S |
| 2 | $N + D_2$ | 800S + 1 | $N + D_1 + D_2$ | 800S + 1 | $N + 2D_1 + D_2$ | 800S + 1 |
| 3 | N | 800S + 2 | $N + D_1$ | 800S + 2 | $N + 2D_1$ | 800S + 2 |
| 4 | $N + D_2$ | 800S + 3 | $N + D_1 + D_2$ | 800S + 3 | $N + 2D_1 + D_2$ | 800S + 3 |

And so on for all 800 pulses. The 800 SRClock pulses (each clock pulse transferring 24 bits) must take place within the 200 microseconds line time. Therefore the average time to calculate the bit value for each of the 19,200 nozzles must not exceed 200 microseconds/19200=10 nanoseconds. Data can be clocked into the print head at a maximum rate of 10 MHz, which will load the data in 80 microseconds. Clocking the data in at 4 MHz will load the data in 200 microseconds.

Print Cycle

The print head contains 19,200 nozzles. To fire them all at once would consume too much power and be problematic in terms of ink refill and nozzle interference. A single print cycle therefore consists of 200 different phases. 96 maximally distant nozzles are fired in each phase, for a total of 19,200 nozzles.

4 bits TripodSelect (select 1 of 10 tripods from a firegroup)

The 96 nozzles fired each round equate to 12 per segment (since all segments are wired up to accept the same print signals). The 12 nozzles from a given segment come equally from each firegroup. Since there are 4 firegroups, 3 nozzles fire from each firegroup. The 3 nozzles are one per color. The nozzles are determined by:

4 bits NozzleSelect (select 1 of 10 nozzles from a pod)

The duration of the firing pulse is given by the AEnable and BEnable lines, which fire the PodgroupA and PodgroupB nozzles from all firegroups respectively. The duration of a pulse depends on the viscosity of the ink (dependent on temperature and ink characteristics) and the amount of power available to the print head. The AEnable and BEnable are separate lines in order that the firing pulses can overlap. Thus the 200 phases of a Print Cycle consist of 100 A phases and 100 B phases, effectively giving 100 sets of Phase A and Phase B.

When a nozzle fires, it takes approximately 100 microseconds to refill. This is not a problem since the entire Print Cycle takes 200 microseconds. The firing of a nozzle also causes perturbations for a limited time within the common ink channel of that nozzle's pod. The perturbations can interfere with the firing of another nozzle within the same pod. Consequently, the firing of nozzles within a pod should be offset by at least this amount The procedure is to therefore fire three nozzles from a tripod (one nozzle per color) and then move onto the next tripod within the podgroup. Since there are 10 tripods in a given podgroup, 9 subsequent tripods must fire before the original tripod must fire its next three nozzles. The 9 firing intervals of 2 microseconds gives an ink settling time of 18 microseconds.

Consequently, the firing order is:

TripodSelect 0, NozzleSelect 0 (Phases A and B)
TripodSelect 1, NozzleSelect 0 (Phases A and B)
TripodSelect 2, NozzleSelect 0 (Phases A and B)
. . .
TripodSelect 9, NozzleSelect 0 (Phases A and B)
TripodSelect 0, NozzleSelect 1 (Phases A and B)
TripodSelect 1, NozzleSelect 1 (Phases A and B)
TripodSelect 2, NozzleSelect 1 (Phases A and B)
. . .
TripodSelect 8, NozzleSelect 9 (Phases A and B)
TripodSelect 9, NozzleSelect 9 (Phases A and B)

Note that phases A and B can overlap. The duration of a pulse will also vary due to battery power and ink viscosity (which changes with temperature). FIG. 1100 shows the AEnable and BEnable lines during a typical Print Cycle.

Feedback from the Print Head

The print head produces several lines of feedback (accumulated from the 8 segments). The feedback lines can be used to adjust the timing of the firing pulses. Although each segment produces the same feedback, the feedback from all segments share the same tri-state bus lines. Consequently only one segment at a time can provide feedback. A pulse on the SenseEnable line ANDed with data on CYAN enables the sense lines for that segment. The feedback sense lines are as follows:

- Tsense informs the controller how hot the print head is. This allows the controller to adjust timing of firing pulses, since temperature affects the viscosity of the ink.
- Vsense informs the controller how much voltage is available to the actuator. This allows the controller to compensate for a flat battery or high voltage source by adjusting the pulse width.
- Rsense informs the controller of the resistivity (Ohms per square) of the actuator heater. This allows the controller to adjust the pulse widths to maintain a constant energy irrespective of the heater resistivity.
- Wsense informs the controller of the width of the critical part of the heater, which may vary up to ±5% due to lithographic and etching variations. This allows the controller to adjust the pulse width appropriately.

Preheat Mode

The printing process has a strong tendency to stay at the equilibrium temperature. To ensure that the first section of the printed photograph has a consistent dot size, ideally the equilibrium temperature should be met before printing any dots. This is accomplished via a preheat mode.

The Preheat mode involves a single Load Cycle to all nozzles with is (i.e. setting all nozzles to fire), and a number of short firing pulses to each nozzle. The duration of the pulse must be insufficient to fire the drops, but enough to heat up the ink surrounding the heaters. Altogether about 200 pulses for each nozzle are required, cycling through in the same sequence as a standard Print Cycle.

Feedback during the Preheat mode is provided by Tsense, and continues until an equilibrium temperature is reached (about 30° C. above ambient). The duration of the Preheat mode can be around 50 milliseconds, and can be tuned in accordance with the ink composition.

Print Head Interface Summary

The print head has the following connections:

| Name | # Pins | Description |
|---|---|---|
| Tripod Select | 4 | Select which tripod will fire (0-9) |
| NozzleSelect | 4 | Select which nozzle from the pod will fire (0-9) |
| AEnable | 1 | Firing pulse for podgroup A |
| BEnable | 1 | Firing pulse for podgroup B |
| CDataIn[0-7] | 8 | Cyan input to cyan shift register of segments 0-7 |
| MDataIn[0-7] | 8 | Magenta input to magenta shift register of segments 0-7 |
| YDataIn[0-7] | 8 | Yellow input to yellow shift register of segments 0-7 |
| SRClock | 1 | A pulse on SRClock (ShiftRegisterClock) loads the current values from CDataIn[0-7], MdataIn[0-7] and YDataIn[0-CDataIn[0-7], MDataIn[0-7] and YDataIn[0-7] into the 24 shift registers. |
| PTransfer | 1 | Parallel transfer of data from the shift registers to the internal NozzleEnable bits (one per nozzle). |
| SenseEnable | 1 | A pulse on SenseEnable ANDed with data on CDataIn[n] enables the sense lines for segment n. |
| Tsense | 1 | Temperature sense |
| Vsense | 1 | Voltage sense |
| Rsense | 1 | Resistivity sense |
| Wsense | 1 | Width sense |
| Logic GND | 1 | Logic ground |
| Logic PWR | 1 | Logic power |
| V− | Bus bars | |
| V+ | | |
| TOTAL | 43 | |

Internal to the print head, each segment has the following connections to the bond pads:

Pad Connections

Although an entire print head has a total of 504 connections, the mask layout contains only 63. This is because the chip is composed of eight identical and separate sections, each 12.57 micron long. Each of these sections has63 pads at a pitch of 200 microns. There is an extra 50 microns at each end of the group of 63 pads, resulting in an exact repeat distance of 12,700 microns (12.57 micron, ½")

| Pads | | |
|---|---|---|
| No. | Name | Function |
| 1 | V− | Negative actuator supply |
| 2 | $V_{ss}$ | Negative drive logic supply |
| 3 | V+ | Positive actuator supply |
| 4 | $V_{dd}$ | Positive drive logic supply |
| 5 | V− | Negative actuator supply |
| 6 | SClk | Serial data transfer clock |
| 7 | V+ | Positive actuator supply |
| 8 | TEn | Parallel transfer enable |
| 9 | V− | Negative actuator supply |
| 10 | EPEn | Even phase enable |
| 11 | V+ | Positive actuator supply |

-continued

Pads

| No. | Name | Function |
|---|---|---|
| 12 | OPEn | Odd phase enable |
| 13 | V− | Negative actuator supply |
| 14 | NA[0] | Nozzle Address [0] (in pod) |
| 15 | V+ | Positive actuator supply |
| 16 | NA[1] | Nozzle Address [1] (in pod) |
| 17 | V− | Negative actuator supply |
| 18 | NA[2] | Nozzle Address [2] (in pod) |
| 19 | V+ | Positive actuator supply |
| 20 | NA[3] | Nozzle Address [3] (in pod) |
| 21 | V− | Negative actuator supply |
| 22 | PA[0] | Pod Address [0] (1 of 10) |
| 23 | V+ | Positive actuator supply |
| 24 | PA[1] | Pod Address [1] (1 of 10) |
| 25 | V− | Negative actuator supply |
| 26 | PA[2] | Pod Address [2] (1 of 10) |
| 27 | V+ | Positive actuator supply |
| 28 | PA[3] | Pod Address [3] (1 of 10) |
| 29 | V− | Negative actuator supply |
| 30 | PGA[0] | Podgroup Address [0] |
| 31 | V+ | Positive actuator supply |
| 32 | FGA[0] | Firegroup Address [0] |
| 33 | V− | Negative actuator supply |
| 34 | FGA[1] | Firegroup Address [1] |
| 35 | V+ | Positive actuator supply |
| 36 | SEn | Sense Enable |
| 37 | V− | Negative actuator supply |

-continued

Pads

| No. | Name | Function |
|---|---|---|
| 38 | Tsense | Temperature sense |
| 39 | V+ | Positive actuator supply |
| 40 | Rsense | Actuator resistivity sense |
| 41 | V− | Negative actuator supply |
| 42 | Wsense | Actuator width sense |
| 43 | V+ | Positive actuator supply |
| 44 | Vsense | Power supply voltage sense |
| 45 | V− | Negative actuator supply |
| 46 | N/C | Spare |
| 47 | V+ | Positive actuator supply |
| 48 | D[C] | Cyan serial data in |
| 49 | V− | Negative actuator supply |
| 50 | D[M} | Magenta serial data in |
| 51 | V+ | Positive actuator supply |
| 52 | D[Y] | Yellow serial data in |
| 53 | V− | Negative actuator supply |
| 54 | Q[C] | Cyan data out (for testing) |
| 55 | V+ | Positive actuator supply |
| 56 | Q[M} | Magenta data out (for testing) |
| 57 | V− | Negative actuator supply |
| 58 | Q[Y] | Yellow data out (for testing) |
| 59 | V+ | Positive actuator supply |
| 60 | $V_{ss}$ | Negative drive logic supply |
| 61 | V− | Negative actuator supply |
| 62 | $V_{dd}$ | Positive drive logic supply |
| 63 | V+ | Positive actuator supply |

Fabrication and Operational Tolerances

| Parameter | Cause of variation | Compensation | Min. | Nom. | Max. | Units |
|---|---|---|---|---|---|---|
| Ambient Temperature | Environmental | Real-time | −10 | 25 | 50 | ° C. |
| Nozzle Radius | Lithographic | Brightness adjust | 5.3 | 5.5 | 5.7 | micron |
| Nozzle Length | Processing | Brightness adjust | 0.5 | 1.0 | 1.5 | micron |
| Nozzle Tip Contact Angle | Processing | Brightness adjust | 100 | 110 | 120 | ° |
| Paddle Radius | Lithographic | Brightness adjust | 9.8 | 10.0 | 10.2 | micron |
| Paddle-Chamber Gap | Lithographic | Brightness adjust | 0.8 | 1.0 | 1.2 | micron |
| Chamber Radius | Lithographic | Brightness adjust | 10.8 | 11.0 | 11.2 | micron |
| Inlet Area | Lithographic | Brightness adjust | 5500 | 6000 | 6500 | $micron^2$ |
| Inlet Length | Processing | Brightness adjust | 295 | 300 | 305 | micron |
| Inlet etch angle (re-entrant) | Processing | Brightness adjust | 90.5 | 91 | 91.5 | degrees |
| Heater Thickness | Processing | Real-time | 0.95 | 1.0 | 1.05 | micron |
| Heater Resistivity | Materials | Real-time | 115 | 135 | 160 | μΩ-cm |
| Heater Young's Modulus | Materials | Mask design | 400 | 600 | 650 | GPa |
| Heater Density | Materials | Mask design | 5400 | 5450 | 5500 | $kg/m^3$ |
| Heater CTE | Materials | Mask design | 9.2 | 9.4 | 9.6 | $10^{-6}$/° C. |
| Heater Width | Lithographic | Real-time | 1.15 | 1.25 | 1.35 | micron |
| Heater Length | Lithographic | Real-time | 27.9 | 28.0 | 28.1 | micron |
| Actuator Glass Thickness | Processing | Brightness adjust | 1.9 | 2.0 | 2.1 | micron |
| Glass Young's Modulus | Materials | Mask design | 60 | 75 | 90 | GPa |
| Glass CTE | Materials | Mask design | 0.0 | 0.5 | 1.0 | $10^{-6}$/° C. |
| Actuator Wall Angle | Processing | Mask design | 85 | 90 | 95 | degrees |
| Actuator to Substrate Gap | Processing | None required | 0.9 | 1.0 | 1.1 | micron |
| Bend Cancelling Layer | Processing | Brightness adjust | 0.95 | 1.0 | 1.05 | micron |
| Lever Arm Length | Lithographic | Brightness adjust | 87.9 | 88.0 | 88.1 | micron |
| Chamber Height | Processing | Brightness adjust | 10 | 11.5 | 13 | micron |
| Chamber Wall Angle | Processing | Brightness adjust | 85 | 90 | 95 | degrees |
| Color Related Ink Viscosity | Materials | Mask design | −20 | Nom. | +20 | % |
| Ink Surface tension | Materials | Programmed | 25 | 35 | 65 | mN/m |
| Ink Viscosity @ 25° C. | Materials | Programmed | 0.7 | 2.5 | 15 | cP |
| Ink Dye Concentration | Materials | Programmed | 5 | 10 | 15 | % |
| Ink Temperature (relative) | Operation | None | −10 | 0 | +10 | ° C. |
| Ink Pressure | Operation | Programmed | −10 | 0 | +10 | kPa |
| Ink Drying | Materials | Programmed | +0 | +2 | +5 | cP |
| Actuator Voltage | Operation | Real-time | 2.75 | 2.8 | 2.85 | V |
| Drive Pulse Width | Xtal Osc. | None required | 1.299 | 1.300 | 1.301 | microsec |
| Drive Transistor Resistance | Processing | Real-time | 3.6 | 4.1 | 4.6 | W |

-continued

| Fabrication and Operational Tolerances | | | | | | |
|---|---|---|---|---|---|---|
| Parameter | Cause of variation | Compensation | Min. | Nom. | Max. | Units |
| Fabrication Temp. (TiN) | Processing | Correct by design | 300 | 350 | 400 | ° C. |
| Battery Voltage | Operation | Real-time | 2.5 | 3.0 | 3.5 | V |

Variation with Ambient Temperature

The main consequence of a change in ambient temperature is that the ink viscosity and surface tension changes. As the bend actuator responds only to differential temperature between the actuator layer and the bend compensation layer, ambient temperature has negligible direct effect on the bend actuator. The resistivity of the TiN heater changes only slightly with temperature. The following simulations are for an water based ink, in the temperature range 0° C. to 80° C.

The drop velocity and drop volume does not increase monotonically with increasing temperature as one may expect This is simply explained: as the temperature increases, the viscosity falls faster than the surface tension falls. As the viscosity falls, the movement of ink out of the nozzle is made slightly easier. However, the movement of the ink around the paddle—from the high pressure zone at the paddle front to the low pressure zone behind the paddle—changes even more. Thus more of the ink movement is 'short circuited' at higher temperatures and lower viscosities.

Variation with Nozzle Radius

The nozzle radius has a significant effect on the drop volume and drop velocity. For this reason it is closely controlled by 0.5 micron lithography. The nozzle is formed by a 2 micron etch of the sacrificial material, followed by deposition of the nozzle wall material and a CMP step. The CMP planarizes the nozzle structures, removing the top of the overcoat, and exposed the sacrificial material inside. The sacrificial material is subsequently removed, leaving a self-aligned nozzle and nozzle rim. The accuracy internal radius of the nozzle is primarily determined by the accuracy of the lithography, and the consistency of the sidewall angle of the 2 micron etch.

The following table shows operation at various nozzle radii. With increasing nozzle radius, the drop velocity steadily decreases. However, the drop volume peaks at around a 5.5 micron radius. The nominal nozzle radius is 5.5 microns, and

| Ambient Temperature ° C. | Ink Viscosity cP | Surface Tension dyne | Actuator Width μm | Actuator Thickness μm | Actuator Length μm | Pulse Voltage V | Pulse Current mA | Pulse Width μs | Pulse Energy nJ | Peak Temperature ° C. | Paddle Deflection μm | Paddle Velocity m/s | Drop Velocity m/s | Drop Volume pl |
|---|---|---|---|---|---|---|---|---|---|---|---|---|---|---|
| 0 | 1.79 | 38.6 | 1.25 | 1.0 | 27 | 2.8 | 42.47 | 1.6 | 190 | 465 | 3.16 | 2.06 | 2.82 | 0.80 |
| 20 | 1.00 | 35.8 | 1.25 | 1.0 | 27 | 2.8 | 42.47 | 1.6 | 190 | 485 | 3.14 | 2.13 | 3.10 | 0.88 |
| 40 | 0.65 | 32.6 | 1.25 | 1.0 | 27 | 2.8 | 42.47 | 1.6 | 190 | 505 | 3.19 | 2.23 | 3.25 | 0.93 |
| 60 | 0.47 | 29.2 | 1.25 | 1.0 | 27 | 2.8 | 42.47 | 1.6 | 190 | 525 | 3.13 | 2.17 | 3.40 | 0.78 |
| 80 | 0.35 | 25.6 | 1.25 | 1.0 | 27 | 2.8 | 42.47 | 1.6 | 190 | 545 | 3.24 | 2.31 | 3.31 | 0.88 |

The temperature of the IJ46 print head is regulated to optimize the consistency of drop volume and drop velocity. The temperature is sensed on chip for each segment. The temperature sense signal (Tsense) is connected to a common Tsense output. The appropriate Tsense signal is selected by asserting the Sense Enable (Sen) and selecting the appropriate segment using the $D[C_{0-7}]$ lines. The Tsense signal is digitized by the drive ASIC, and drive pulse width is altered to compensate for the ink viscosity change. Data specifying the viscosity/temperature relationship of the ink is stored in the Authentication chip associated with the ink.

the operating tolerance specification allows a ±4% variation on this radius, giving a range of 5.3 to 5.7 microns. The stimulations also include extremes outside of the nominal operating range (5.0 and 6.0 micron). The major nozzle radius variations will likely be determined by a combination of the sacrificial nozzle etch and the CMP step. This means that variations are likely to be non-local: differences between wafers, and differences between the center and the perimeter of a wafer. The between wafer differences are compensated by the 'brightness' adjustment. Within wafer variations will be imperceptible as long as they are not sudden.

| Nozzle Radius μm | Ink Viscosity cP | Surface Tension mN/m | Actuator Width μm | Actuator Length μm | Pulse Voltage V | Pulse Current mA | Pulse Width μs | Pulse Energy nJ | Peak Temperature ° C. | Peak Pressure kPa | Paddle Deflection μm | Paddle Velocity m/s | Drop Velocity m/s | Drop Volume pl |
|---|---|---|---|---|---|---|---|---|---|---|---|---|---|---|
| 5.0 | 0.65 | 32.6 | 1.25 | 25 | 2.8 | 42.36 | 1.4 | 166 | 482 | 75.9 | 2.81 | 2.18 | 4.36 | 0.84 |
| 5.3 | 0.65 | 32.6 | 1.25 | 25 | 2.8 | 42.36 | 1.4 | 166 | 482 | 69.0 | 2.88 | 2.22 | 3.92 | 0.87 |
| 5.5 | 0.65 | 32.6 | 1.25 | 25 | 2.8 | 42.36 | 1.4 | 166 | 482 | 67.2 | 2.96 | 2.29 | 3.45 | 0.99 |
| 5.7 | 0.65 | 32.6 | 1.25 | 25 | 2.8 | 42.36 | 1.4 | 166 | 482 | 64.1 | 3.00 | 2.33 | 3.09 | 0.95 |
| 6.0 | 0.65 | 32.6 | 1.25 | 25 | 2.8 | 42.36 | 1.4 | 166 | 482 | 59.9 | 3.07 | 2.39 | 2.75 | 0.89 |

Ink Supply System

A print head constructed in accordance with the aforementioned techniques can be utilized in a print camera system similar to that disclosed in PCT patent application No. PCT/AU98/00544. A print head ink supply arrangement suitable for utilization in a print on demand camera system will now be described. Starting initially with FIG. 1101 and FIG. 1102, there is illustrated portions of an ink supply arrangement in the form of an ink supply unit 46430. The supply unit can be configured to include three ink storage chambers 46521 to supply three color inks to the back surface of a print head, which in the preferred form is a print head chip 46431. The ink is supplied to the print head by means of an ink distribution molding or manifold 46433 which includes a series of slots e.g. 434 for the flow of ink via closely toleranced ink outlets 46432 to the back of the print head 46431. The outlets 46432 are very small having a width of about 100 microns and accordingly need to be made to a much higher degree of accuracy than the adjacent interacting components of the ink supply unit such as the housing 46495 described hereafter.

The print head 44631 is of an elongate structure and can be attached to the print head aperture 46435 in the ink distribution manifold by means of silicone gel or a like resilient adhesive 46520.

Preferably, the print head is attached along its back surface 46438 and sides 46439 by applying adhesive to the internal sides of the print head aperture 46435. In this manner the adhesive is applied only to the interconnecting faces of the aperture and print head, and the risk of blocking the accurate ink supply passages 46380 formed in the back of the print head chip 46431 (see FIG. 1093) is minimised. A filter 46436 is also provided that is designed to fit around the distribution molding 46433 so as to filter the ink passing through the molding 46433.

Ink distribution molding 46433 and filter 46436 are in turn inserted within a baffle unit 46437 which is again attached by means of a silicone sealant applied at interface 46438, such that ink is able to, for example, flow through the holes 46440 and in turn through the holes 46434. The baffles 437 can be a plastic injection molded unit which includes a number of spaced apart baffles or slats 46441-46443. The baffles are formed within each ink channel so as to reduce acceleration of the ink in the storage chambers 46521 as may be induced by movement of the portable printer, which in this preferred form would be most disruptive along the longitudinal extent of the print head, whilst simultaneously allowing for flows of ink to the print head in response to active demand therefrom. The baffles are effective in providing for portable carriage of the ink so as to minimize disruption to flow fluctuations during handling.

The baffle unit 46437 is in turn encased in a housing 46445. The housing 46445 can be ultrasonically welded to the baffle member 46437 so as to seal the baffle member 46437 into three separate ink chambers 46521. The baffle member 46437 further includes a series of pierceable end wall portions 46450-46452 which can be pierced by a corresponding mating ink supply conduit for the flow of ink into each of the three chambers. The housing 46445 also includes a series of holes 46455 which are hydrophobically sealed by means of tape or the like so as to allow air within the three chambers of the baffle units to escape whilst ink remains within the baffle chambers due to the hydrophobic nature of the holes eg. 46455.

By manufacturing the ink distribution unit in separate interacting components as just described, it is possible to use relatively conventional molding techniques, despite the high degree of accuracy required at the interface with the print head. That is because the dimensional accuracy requirements are broken down in stages by using successively smaller components with only the smallest final member being the ink distribution manifold or second member needing to be produced to the narrower tolerances needed for accurate interaction with the ink supply passages 46380 formed in the chip.

The housing 46445 includes a series of positioning protuberances eg. 46460-46462. A first series of protuberances is designed to accurately position interconnect means in the form of a tape automated bonded film 46470, in addition to first 46465 and second 46466 power and ground busbars which are interconnected to the TAB film 46470 at a large number of locations along the surface of the TAB film so as to provide for low resistance power and ground distribution along the surface of the TAB film 46470 which is in turn interconnected to the print head chip 46431.

The TAB film 46470, which is shown in more detail in an opened state in FIGS. 1107 and 1108, is double sided having on its outer side a data/signal bus in the form of a plurality of longitudinally extending control line interconnects 46550 which releasably connect with a corresponding plurality of external control lines. Also provided on the outer side are busbar contacts in the form of deposited noble metal strips 46552.

The inner side of the TAB film 46470 has a plurality of transversely extending connecting lines 46553 that alternately connect the power supply via the busbars and the control lines 46550 to bond pads on the print head via region 46554. The connection with the control lines occurring by means of vias 46556 that extend through the TAB film. One of the many advantages of using the TAB film is providing a flexible means of connecting the rigid busbar rails to the fragile print head chip 46431.

The busbars 46465, 46466 are in turn connected to contacts 46475, 46476 which are firmly clamped against the busbars 46465, 46466 by means of cover unit 46478. The cover unit 46478 also can comprise an injection molded part and includes a slot 480 for the insertion of an aluminum bar for assisting in cutting a printed page.

Turning now to FIG. 1103 there is illustrated a cut away view of the print head unit 46430, associated platen unit 46490, print roll and ink supply unit 46491 and drive power distribution unit 46492 which interconnects each of the units 46430, 46490 and 46491.

The guillotine blade 46495 is able to be driven by a first motor along the aluminum blade 46498 so as to cut a picture 46499 after printing has occurred. The operation of the system of FIG. 1103 is very similar to that disclosed in PCT patent application PCT/AU98/00544. Ink is stored in the core portion 46500 of a print roll former 46501 around which is rolled print media 46502. The print media is fed under the control of electric motor 46494 between the platen 46290 and print head unit 46490 with the ink being interconnected via ink transmission channels 46505 to the print head unit 46430. The print roll unit 46491 can be as described in the aforementioned PCT specification. In FIG. 1104, there is illustrated the assembled form of single printer unit 46510.

Features and Advantages

The IJ46 print head has many features and advantages over other printing technologies. In some cases, these advantages stem from new capabilities. In other cases, the advantages stem from the avoidance of problems inherent in prior art technologies. A discussion of some of these advantages follows.

High Resolution

The resolution of a IJ46 print head is 1,600 dots per inch (dpi) in both the scan direction and transverse to the scan direction. This allows full photographic quality color images, and high quality text (including Kanji). Higher resolutions are possible: 2,400 dpi and 4,800 dpi versions have been investigated for special applications, but 1,600 dpi is chosen as ideal for most applications. The true resolution of advanced commercial piezoelectric devices' is around 120 dpi and thermal ink jet devices around 600 dpi.

Excellent Image Quality

High image quality requires high resolution and accurate placement of drops. The monolithic page width nature of IJ46 print heads allows drop placement to sub-micron precision. High accuracy is also achieved by eliminating misdirected drops, electrostatic deflection, air turbulence, and eddies, and maintaining highly consistent drop volume and velocity. Image quality is also ensured by the provision of sufficient resolution to avoid requiring multiple ink densities. Five color or 6 color 'photo' ink jet systems can introduce halftoning artifacts in mid tones (such as flesh-tones) if the dye interaction and drop sizes are not absolutely perfect. This problem is eliminated in binary three color systems such as used in IJ46 print heads.

High Speed (30 ppm Per Print Head)

The page width nature of the print head allows high-speed operation, as no scanning is required. The time to print a full color A4 page is less than 2 seconds, allowing full 30 page per minute (ppm) operation per print head. Multiple print heads can be used in parallel to obtain 60 ppm, 90 ppm, 120 ppm, etc. IJ46 print heads are low cost and compact, so multiple head designs are practical.

Low Cost

As the nozzle packing density of the IJ46 print head is very high, the chip area per print head can be low. This leads to a low manufacturing cost as many print head chips can fit on the same wafer.

All Digital Operation

The high resolution of the print head is chosen to allow fully digital operation using digital halftoning. This eliminates color non-linearity (a problem with continuous tone printers), and simplifies the design of drive ASICs.

Small Drop Volume

To achieve true 1,600 dpi resolution, a small drop size is required. An IJ46 print head's drop size is one picoliter (1 pl). The drop size of advanced commercial piezoelectric and thermal ink jet devices is around 3 pl to 30 pl.

Accurate Control of Drop Velocity

As the drop ejector is a precise mechanical mechanism, and does not rely on bubble nucleation, accurate drop velocity control is available. This allows low drop velocities (3-4 m/s) to be used in applications where media and airflow can be controlled. Drop velocity can be accurately varied over a considerable range by varying the energy provided to the actuator. High drop velocities (10 to 15 m/s) suitable for plain-paper operation and relatively uncontrolled conditions can be achieved using variations of the nozzle chamber and actuator dimensions.

Fast Drying

A combination of very high resolution, very small drops, and high dye density allows fill color printing with much less water ejected. A 1600 dpi IJ46 print head ejects around 33% of the water of a 600 dpi thermal ink jet printer. This allows fast drying and virtually eliminates paper cockle.

Wide Temperature Range

IJ46 print heads are designed to cancel the effect of ambient temperature. Only the change in ink characteristics with temperature affects operation and this can be electronically compensated. Operating temperature range is expected to be 0° C. to 50° C. for water based inks.

No Special Manufacturing Equipment Required

The manufacturing process for IJ46 print heads leverages entirely from the established semiconductor manufacturing industry. Most ink jet systems encounter major difficulty and expense in moving from the laboratory to production, as high accuracy specialized manufacturing equipment is required.

High Production Capacity Available

A 6" CMOS fab with 10,000 wafer starts per month can produce around 18 million print heads per annum. An 8" CMOS fab with 20,000 wafer starts per month can produce around 60 million print heads per annum. There are currently many such CMOS fabs in the world.

Low Factory Setup Cost

The factory set-up cost is low because existing 0.5 micron 6" CMOS fabs can be used. These fabs could be fully amortized, and essentially obsolete for CMOS logic production. Therefore, volume production can use 'old' existing facilities. Most of the MEMS post-processing can also be performed in the CMOS fab.

Good Light-Fastness

As the ink is not heated, there are few restrictions on the types of dyes that can be used. This allows dyes to be chosen for optimum light-fastness. Some recently developed dyes from companies such as Avecia and Hoechst have light-fastness of 4. This is equal to the light-fastness of many pigments, and considerably in excess of photographic dyes and of ink jet dyes in use until recently.

Good Water-Fastness

As with light-fastness, the lack of thermal restrictions on the dye allows selection of dyes for characteristics such as water-fastness. For extremely high water-fastness (as is required for washable textiles) reactive dyes can be used.

Excellent Color Gamut

The use of transparent dyes of high color purity allows a color gamut considerably wider than that of offset printing and silver halide photography. Offset printing in particular has a restricted gamut due to light scattering from the pigments used. With three-color systems (CMY) or four-color systems (CMYK) the gamut is necessarily limited to the tetrahedral volume between the color vertices. Therefore it is important that the cyan, magenta and yellow dies are as spectrally pure as possible. A slightly wider 'hexcone' gamut that includes pure reds, greens, and blues can be achieved using a 6 color (CMYRGB) model. Such a six-color print head can be made economically as it requires a chip width of only 1 mm.

Elimination of Color Bleed

Ink bleed between colors occurs if the different primary colors are printed while the previous color is wet. While image blurring due to ink bleed is typically insignificant at 1600 dpi, ink bleed can 'muddy' the midtones of an image. Ink bleed can be eliminated by using microemulsion-based ink, for which IJ46 print heads are highly suited. The use of microemulsion ink can also help prevent nozzle clogging and ensure long-term ink stability.

High Nozzle Count

An IJ46 print head has 19,200 nozzles in a monolithic CMY three-color photographic print head. While this is large compared to other print heads, it is a small number compared to the number of devices routinely integrated on CMOS VLSI chips in high volume production. It is also less than 3% of the number of movable mirrors which Texas Instruments integrates in its Digital Micromirror Device (DMD), manufactured using similar CMOS and MEMS processes.

51,200 Nozzles per A4 Page Width Print Head

A four color (CMYK) IJ46 print head for page width A4/US letter printing uses two chips. Each 0.66 $cm^2$ chip has 25,600 nozzles for a total of 51,200 nozzles.

Integration of Drive Circuits

In a print head with as many as 51,200 nozzles, it is essential to integrate data distribution circuits (shift registers), data timing, and drive transistors with the nozzles. Otherwise, a minimum of 51,201 external connections would be required. This is a severe problem with piezoelectric ink jets, as drive circuits cannot be integrated on piezoelectric substrates. Integration of many millions of connections is common in CMOS VLSI chips, which are fabricated in high volume at high yield. It is the number of off-chip connections that must be limited.

Monolithic Fabrication

IJ46 print heads are made as a single monolithic CMOS chip, so no precision assembly is required. All fabrication is performed using standard CMOS VLSI and MEMS (Micro-Electro-Mechanical Systems) processes and materials. In thermal ink jet and some piezoelectric ink jet systems, the assembly of nozzle plates with the print head chip is a major cause of low yields, limited resolution, and limited size. Also, page width arrays are typically constructed from multiple smaller chips. The assembly and alignment of these chips is an expensive process.

Modular, Extendable for Wide Print Widths

Long page width print heads can be constructed by butting two or more 100 mm IJ46 print heads together. The edge of the IJ46 print head chip is designed to automatically align to adjacent chips. One print head gives a photographic size printer, two gives an A4 printer, and four gives an A3 printer. Larger numbers can be used for high speed digital printing, page width wide format printing, and textile printing.

Duplex Operation

Duplex printing at the fill print speed is highly practical. The simplest method is to provide two print heads—one on each side of the paper. The cost and complexity of providing two print heads is less than that of mechanical systems to turn over the sheet of paper.

Straight Paper Path

As there are no drums required, a straight paper path can be used to reduce the possibility of paper jams. This is especially relevant for office duplex printers, where the complex mechanisms required to turn over the pages are a major source of paper jams.

High Efficiency

Thermal ink jet print heads are only around 0.01% efficient (electrical energy input compared to drop kinetic energy and increased surface energy). IJ46 print heads are more than 20 times as efficient.

Self-Cooling Operation

The energy required to eject each drop is 160 nJ (0.16 microJoules), a small fraction of that required for thermal ink jet printers. The low energy allows the print head to be completely cooled by the ejected ink, with only a 40° C. worst-case ink temperature rise. No heat sinking is required.

Low Pressure

The maximum pressure generated in an IJ46 print head is around 60 kPa (0.6 atmospheres). The pressures generated by bubble nucleation and collapse in thermal ink jet and Bubblejet systems are typically in excess of 10 MPa (100 atmospheres), which is 160 times the maximum IJ46 print head pressure. The high pressures in Bubblejet and thermal ink jet designs result in high mechanical stresses.

Low Power

A 30 ppm A4 IJ46 print head requires about 67 Watts when printing full 3 color black. When printing 5% coverage, average power consumption is only 3.4 Watts.

Low Voltage Operation

IJ46 print heads can operate from a single 3V supply, the same as typical drive ASICs. Thermal ink jets typically require at least 20 V, and piezoelectric ink jets often require more than 50 V. The IJ46 print head actuator is designed for nominal operation at 2.8 volts, allowing a 0.2 volt drop across the drive transistor, to achieve 3V chip operation.

Operation from 2 or 4 AA Batteries

Power consumption is low enough that a photographic IJ46 print head can operate from AA batteries. A typical 6"×4" photograph requires less than 20 Joules to print (including drive transistor losses). Four AA batteries are recommended if the photo is to be printed in 2 seconds. If the print time is increased to 4 seconds, 2 AA batteries can be used.

Battery Voltage Compensation

IJ46 print heads can operate from an unregulated battery supply, to eliminate efficiency losses of a voltage regulator. This means that consistent performance must be achieved over a considerable range of supply voltages. The IJ46 print head senses the supply voltage, and adjusts actuator operation to achieve consistent drop volume.

Small Actuator and Nozzle Area

The area required by an IJ46 print head nozzle, actuator, and drive circuit is 1764 $dm^2$. This is less than 1% of the area required by piezoelectric ink jet nozzles, and around 5% of the area required by Bubblejet nozzles. The actuator area directly affects the print head manufacturing cost.

Small Total Print Head Size

An entire print head assembly (including ink supply channels) for an A4, 30 ppm, 1,600 dpi, four color print head is 210 mm×12 mm×7 mm. The small size allows incorporation into notebook computers and miniature printers. A photograph printer is 106 mm×7 mm×7 mm, allowing inclusion in pocket digital cameras, palmtop PC's, mobile phone/fax, and so on. Ink supply channels take most of this volume. The print head chip itself is only 102 mm×0.55 mm×0.3 mm.

Miniature Nozzle Capping System

A miniature nozzle capping system has been designed for IJ46 print heads. For a photograph printer this nozzle capping system is only 106 mm×5 mm×4 mm, and does not require the print head to move.

High Manufacturing Yield

The projected manufacturing yield (at maturity) of the IJ46 print heads is at least 80%, as it is primarily a digital CMOS chip with an area of only 0.55 $cm^2$. Most modern CMOS processes achieve high yield with chip areas in excess of 1 $cm^2$. For chips less than around 1 $cm^2$, cost is roughly proportional to chip area. Cost increases rapid between 1 $cm^2$ and 4 $cm^2$, with chips larger than this rarely being practical. There is a strong incentive to ensure that the chip area is less than 1 $cm^2$. For thermal ink jet and Bubblejet print heads, the chip width is typically around 5 mm, limiting the cost effective chip length to around 2 cm. A major target of IJ46 print head development has been to reduce the chip width as much as possible, allowing cost effective monolithic page width print heads.

Low Process Complexity

With digital IC manufacture, the mask complexity of the device has little or no effect on the manufacturing cost or difficulty. Cost is proportional to the number of process steps, and the lithographic critical dimensions. IJ46 print heads use a standard 0.5 micron single poly triple metal CMOS manufacturing process, with an additional 5 MEMS mask steps. This makes the manufacturing process less complex than a typical 0.25 micron CMOS logic process with 5 level metal.

Simple Testing

IJ46 print heads include test circuitry that allows most testing to be completed at the wafer probe stage. Testing of all electrical properties, including the resistance of the actuator, can be completed at this stage. However, actuator motion can only be tested after release from the sacrificial materials, so final testing must be performed on the packaged chips.

Low Cost Packaging

IJ46 print heads are packaged in an injection molded polycarbonate package. All connections are made using Tape Automated Bonding (TAB) technology (though wire bonding can be used as an option). All connections are along one edge of the chip.

No Alpha Particle Sensitivity

Alpha particle emission does not need to be considered in the packaging, as there are no memory elements except static registers, and a change of state due to alpha particle tracks is likely to cause only a single extra dot to be printed (or not) on the paper.

Relaxed Critical Dimensions

The critical dimension (CD) of the IJ46 print head CMOS drive circuitry is 0.5 microns. Advanced digital IC's such as microprocessors currently use CDs of 0.25 microns, which is two device generations more advanced than the IJ46 print head requires. Most of the MEMS post processing steps have CDs of 1 micron or greater.

Low Stress During Manufacture

Devices cracking during manufacture are a critical problem with both thermal ink jet and piezoelectric devices. This limits the size of the print head that it is possible to manufacture. The stresses involved in the manufacture of IJ46 print heads are no greater than those required for CMOS fabrication.

No Scan Banding

IJ46 print heads are full page width, so do not scan. This eliminates one of the most significant image quality problems of ink jet printers. Banding due to other causes (mis-directed drops, print head alignment) is usually a significant problem in page width print heads. These causes of banding have also been addressed.

'Perfect' Nozzle Alignment

All of the nozzles within a print head are aligned to sub-micron accuracy by the 0.5 micron stepper used for the lithography of the print head. Nozzle alignment of two 4" print heads to make an A4 page width print head is achieved with the aid of mechanical alignment features on the print head chips. This allows automated mechanical alignment (by simply pushing two print head chips together) to within 1 micron. If finer alignment is required in specialized applications, 4" print heads can be aligned optically.

No Satellite Drops

The very small drop size (1 pl) and moderate drop velocity (3 m/s) eliminates satellite drops, which are a major source of image quality problems. At around 4 m/s, satellite drops form, but catch up with the main drop. Above around 4.5 m/s, satellite drops form with a variety of velocities relative to the main drop. Of particular concern is satellite drops which have a negative velocity relative to the print head, and therefore are often deposited on the print head surface. These are difficult to avoid when high drop velocities (around 10 m/s) are used.

Laminar Air Flow

The low drop velocity requires laminar airflow, with no eddies, to achieve good drop placement on the print medium. This is achieved by the design of the print head packaging. For 'plain paper' applications and for printing on other 'rough' surfaces, higher drop velocities are desirable. Drop velocities to 15 m/s can be achieved using variations of the design dimensions. It is possible to manufacture 3 color photographic print heads with a 4 m/s drop velocity, and 4 color plain-paper print heads with a 15 m/s drop velocity, on the same wafer. This is because both can be made using the same process parameters.

No Misdirected Drops

Misdirected drops are eliminated by the provision of a thin rim around the nozzle, which prevents the spread of a drop across the print head surface in regions where the hydrophobic coating is compromised.

No Thermal Crosstalk

When adjacent actuators are energized in Bubblejet or other thermal ink jet systems, the heat from one actuator spreads to others, and affects their firing characteristics. In IJ46 print heads, heat diffusing from one actuator to adjacent actuators affects both the heater layer and the bend-cancelling layer equally, so has no effect on the paddle position. This virtually eliminates thermal crosstalk.

No Fluidic Crosstalk

Each simultaneously fired nozzle is at the end of a 300 micron long ink inlet etched through the (thinned) wafer. These ink inlets are connected to large ink channels with low fluidic resistance. This configuration virtually eliminates any effect of drop ejection from one nozzle on other nozzles.

No Structural Crosstalk

This is a common problem with piezoelectric print heads. It does not occur in IJ46 print heads.

Permanent Print Head

The IJ46 print heads can be permanently installed. This dramatically lowers the production cost of consumables, as the consumable does not need to include a print head.

No Kogation

Kogation (residues of burnt ink, solvent, and impurities) is a significant problem with Bubblejet and other thermal ink jet print heads. IJ46 print heads do not have this problem, as the ink is not directly heated.

No Cavitation

Erosion caused by the violent collapse of bubbles is another problem that limits the life of Bubblejet and other thermal ink jet print heads. IJ46 print heads do not have this problem because no bubbles are formed.

No Electromigration

No metals are used in IJ46 print head actuators or nozzles, which are entirely ceramic. Therefore, there is no problem with electromigration in the actual ink jet devices. The CMOS metalization layers are designed to support the required currents without electromigration. This can be readily achieved because the current considerations arise from heater drive power, not high speed CMOS switching.

Reliable Power Connections

While the energy consumption of IJ46 print heads are fifty times less than thermal ink jet print heads, the high print speed and low voltage results in a fairly high electrical current consumption. Worst case current for a photographic IJ46 print head printing in two seconds from a 3 Volt supply is 4.9 Amps. This is supplied via copper busbars to 256 bond pads along the edge of the chip. Each bond pad carries a maximum of 40 mA. On chip contacts and vias to the drive transistors carry a peak current of 1.5 mA for 1.3 microseconds, and a maximum average of 12 mA.

No Corrosion

The nozzle and actuator are entirely formed of glass and titanium nitride (TiN), a conductive ceramic commonly used as metalization barrier layers in CMOS devices. Both materials are highly resistant to corrosion.

No Electrolysis

The ink is not in contact with any electrical potentials, so there is no electrolysis.

No Fatigue

All actuator movement is within elastic limits, and the materials used are all ceramics, so there is no fatigue.

No Friction

No moving surfaces are in contact, so there is no friction.

No Stiction

The IJ46 print head is designed to eliminate stiction, a problem common to many MEMS devices. Stiction is a word combining "stick" with "friction" and is especially significant at the in MEMS due to the relative scaling of forces. In the IJ46 print head, the paddle is suspended over a hole in the substrate, eliminating the paddle-to-substrate stiction which would otherwise be encountered.

No Crack Propagation

The stresses applied to the materials are less than 1% of that which leads to crack propagation with the typical surface roughness of the TiN and glass layers. Comers are rounded to minimize stress 'hotspots'. The glass is also always under compressive stress, which is much more resistant to crack propagation than tensile stress.

No Electrical Poling Required

Piezoelectric materials must be poled after they are formed into the print head structure. This poling requires very high electrical field strengths—around 20,000 V/cm. The high voltage requirement typically limits the size of piezoelectric print heads to around 5 cm, requiring 100,000 Volts to pole. IJ46 print heads require no poling.

No Rectified Diffusion

Rectified diffusion-the formation of bubbles due to cyclic pressure variations-is a problem that primarily afflicts piezoelectric ink jets. IJ46 print heads are designed to prevent rectified diffusion, as the ink pressure never falls below zero.

Elimination of the Saw Street

The saw street between chips on a wafer is typically 200 microns. This would take 26% of the wafer area. Instead, plasma etching is used, requiring just 4% of the wafer area. This also eliminates breakage during sawing.

Lithography Using Standard Steppers

Although IJ46 print heads are 100 mm long, standard steppers (which typically have an imaging field around 20 mm square) are used. This is because the print head is 'stitched' using eight identical exposures. Alignment between stitches is not critical, as there are no electrical connections between stitch regions. One segment of each of 32 print heads is imaged with each stepper exposure, giving an 'average' of 4 print heads per exposure.

Integration of Full Color on a Single Chip

IJ46 print heads integrate all of the colors required onto a single chip. This cannot be done with page width 'edge shooter' ink jet technologies.

Wide Variety of Inks

IJ46 print heads do not rely on the ink properties for drop ejection. Inks can be based on water, microemulsions, oils, various alcohols, MEK, hot melt waxes, or other solvents. IJ46 print heads can be 'tuned' for inks over a wide range of viscosity and surface tension. This is a significant factor in allowing a wide range of applications.

Laminar Air Flow with no Eddies

The print head packaging is designed to ensure that airflow is laminar, and to eliminate eddies. This is important, as eddies or turbulence could degrade image quality due to the small drop size.

Drop Repetition Rate

The nominal drop repetition rate of a photographic IJ46 print head is 5 kHz, resulting in a print speed of 2 second per photo. The nominal drop repetition rate for an A4 print head is 10 kHz for 30+ppm A4 printing. The maximum drop repetition rate is primarily limited by the nozzle refill rate, which is determined by surface tension when operated using non-pressurized ink. Drop repetition rates of 50 kHz are possible using positive ink pressure (around 20 kPa). However, 34 ppm is entirely adequate for most low cost consumer applications. For very high-speed applications, such as commercial printing, multiple print heads can be used in conjunction with fast paper handling. For low power operation (such as operation from 2 AA batteries) the drop repetition rate can be reduced to reduce power.

Low Head-to-Paper Speed

The nominal head to paper speed of a photographic IJ46 print head is only 0.076 m/sec. For an A4 print head it is only 0.16 m/sec, which is about a third of the typical scanning ink jet head speed. The low speed simplifies printer design and improves drop placement accuracy. However, this head-to-paper speed is enough for 34 ppm printing, due to the page width print head. Higher speeds can readily be obtained where required.

High Speed CMOS not Required

The clock speed of the print head shift registers is only 14 MHz for an A4/letter print head operating at 30 ppm. For a photograph printer, the clock speed is only 3.84 MHz. This is much lower than the speed capability of the CMOS process used. This simplifies the CMOS design, and eliminates power dissipation problems when printing near-white images.

Fully Static CMOS Design

The shift registers and transfer registers are fully static designs. A static design requires 35 transistors per nozzle, compared to around 13 for a dynamic design. However, the static design has several advantages, including higher noise immunity, lower quiescent power consumption, and greater processing tolerances.

Wide Power Transistor

The width to length ratio of the power transistor is 688. This allows a 4 Ohm on-resistance, whereby the drive transistor consumes 6.7% of the actuator power when operating from 3V. This size transistor fits beneath the actuator, along with the shift register and other logic. Thus an adequate drive transistor, along with the associated data distribution circuits, consumes no chip area that is not already required by the actuator.

There are several ways to reduce the percentage of power consumed by the transistor. increase the drive voltage so that the required current is less, reduce the lithography to less than 0.5 micron, use BiCMOS or other high current drive technology, or increase the chip area, allowing room for drive transistors which are not underneath the actuator. However, the 6.7% consumption of the present design is considered a cost-performance optimum.

Range of Applications

The presently disclosed ink jet printing technology is suited to a wide range of printing systems. Major example applications include:

Color and monochrome office printers
SOHO printers
Home PC printers
Network connected color and monochrome printers
Departmental printers
Photographic printers
Printers incorporated into cameras
Printers in 3G mobile phones
Portable and notebook printers
Wide format printers
Color and monochrome copiers
Color and monochrome facsimile machines
Multi-function printers combining print, fax, scan, and copy functions
Digital commercial printers
Short run digital printers
Packaging printers
Textile printers
Short run digital printers
Offset press supplemental printers
Low cost scanning printers
High speed page width printers
Notebook computers with inbuilt page width printers
Portable color and monochrome printers
Label printers
Ticket printers
Point-of-sale receipt printers
Large format CAD printers
Photofinishing printers
Video printers
PhotoCD printers
Wallpaper printers
Laminate printers
Indoor sign printers
Billboard printers
Videogame printers
Photo 'kiosk' printers
Business card printers
Greeting card printers
Book printers
Newspaper printers
Magazine printers
Forms printers
Digital photo album printers
Medical printers
Automotive printers
Pressure sensitive label printers
Color proofing printers
Fault tolerant commercial printer arrays.

Prior Art ink jet technologies

Similar capability print heads are unlikely to become available from the established ink jet manufacturers in the near future. This is because the two main contenders-thermal ink jet and piezoelectric ink jet-each have severe fundamental problems meeting the requirements of the application.

The most significant problem with thermal ink jet is power consumption. This is approximately 100 times that required for these applications, and stems from the energy-inefficient means of drop ejection. This involves the rapid boiling of water to produce a vapor bubble which expels the ink. Water has a very high heat capacity, and must be superheated in thermal ink jet applications. The high power consumption limits the nozzle packing density.

The most significant problem with piezoelectric ink jet is size and cost. Piezoelectric crystals have a very small deflection at reasonable drive voltages, and therefore require a large area for each nozzle. Also, each piezoelectric actuator must be connected to its drive circuit on a separate substrate. This is not a significant problem at the current limit of around 300 nozzles per print head, but is a major impediment to the fabrication of page width print heads with 19,200 nozzles.

Comparison of IJ46 print heads and Thermal Ink Jet (TIJ) printing mechanisms

| Factor | TIJ print heads | IJ46 print heads | Advantage |
|---|---|---|---|
| Resolution | 600 | 1,600 | Full photographic image quality and high quality text |
| Printer type | Scanning | Page width | IJ46 print heads do not scan, resulting in faster printing and smaller size |
| Print speed | <1 ppm | 30 ppm | IJ46 print head's page width results in >30 times faster operation |
| Number of nozzles | 300 | 51,200 | >100 times as many nozzles enables the high print speed |
| Drop volume | 20 picoliters | 1 picoliter | Less water on the paper, print is immediately dry, no 'cockle' |
| Construction | Multi-part | Monolithic | IJ46 print heads do not require high precision assembly |

-continued

| Factor | TIJ print heads | IJ46 print heads | Advantage |
|---|---|---|---|
| Efficiency | <0.1% | 2% | 20 times increase in efficiency results in low power operation |
| Power supply | Mains power | Batteries | Battery operation allows portable printers, e.g. in cameras, phones |
| Peak pressure | >100 atm | 0.6 atm | The high pressures in a thermal ink jet cause reliability problems |
| Ink temperature | +300° C. | +50° C. | High ink temperatures cause burnt dye deposits (kogation) |
| Cavitation | Problem | None | Cavitation (erosion due to bubble collapse) limits head life |
| Head life | Limited | Permanent | TIJ print heads are replaceable due to cavitation and kogation |
| Operating voltage | 20 V | 3 V | Allows operation from small batteries, important for portable and pocket printers |
| Energy per drop | 10 μJ | 160 nJ | <1/50 of the drop ejection energy allows battery operation |
| Chip area per nozzle | 40,000 $\mu m^2$ | 1,764 $\mu m^2$ | Small size allows low cost manufacture |

The presently disclosed ink jet printing technology is potentially suited to a wide range of printing system including: color and monochrome office printers, short run digital printers, high speed digital printers, offset press supplemental printers, low cost scanning printers high speed pagewidth printers, notebook computers with inbuilt pagewidth printers, portable color and monochrome printers, color and monochrome copiers, color and monochrome facsimile machines, combined printer, facsimile and copying machines, label printers, large format plotters, photograph copiers, printers for digital photographic "minilabs", video printers, PHOTO CD (PHOTO CD is a registered trademark of the Eastman Kodak Company) printers, portable printers for PDAs, wallpaper printers, indoor sign printers, billboard printers, fabric printers, camera printers and fault tolerant commercial printer arrays.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An inkjet printhead comprising:

a supporting wafer substrate;

an array of drop ejection apparatuses formed on a first side of the supporting wafer substrate, the array of drop ejection apparatuses configured as pairs of rows of drop ejection apparatuses defining a common ink channel between each pair;

a plurality of ink supply conduits extending through the supporting wafer substrate from a second side of the supporting wafer substrate to respective common ink channels on the first side, wherein, each of the drop ejection apparatuses has a chamber with a nozzle, and an actuator for ejecting drops of ink through the nozzle, the chamber having a side wall adjacent to the common ink channel, one of the ink supply conduits supplies ink of a first color to drop ejection apparatuses in a first pair of rows, and another of the ink supply conduits supplies ink of a second color to drop ejection apparatuses in a second pair of rows, and the side wall adjacent to the common ink channel is adapted to permit ink flow therethrough from the common ink channel into the chamber.

2. An inkjet printhead as claimed in claim 1 wherein the printhead is pagewidth.

3. An inkjet printhead as claimed in claim 2 further comprising a plurality of the supporting wafer substrates provided in series, thereby extending the pagewidth of the printhead.

4. An inkjet printhead as claimed in claim 1 wherein said actuator comprises an electrothermal heater positioned for heating ink in said chamber to a temperature above the boiling point of the ink, causing a bubble to form in order to eject a drop of the ink from said nozzle.

5. An inkjet printhead as claimed in claim 1 wherein said actuator comprises an piezoelectric crystal adapted to expand, shear or bend to apply pressure to the ink, in order to eject drops of the ink from said nozzle.

6. An inkjet printhead as claimed in claim 1 wherein the actuator has relaxor materials and is adapted to produce an electric field wherein the electric field activates electrostriction in the relaxor materials in order to eject drops of the ink from said nozzle.

7. An inkjet printhead as claimed in claim 1 wherein the actuator material has an antiferroelectric and a ferroelectric phase, wherein applying an electric field to the actuator material results in a transition from the antiferroelectric to the ferroelectric phase in order to eject drops of the ink from said nozzle.

8. An inkjet printhead as claimed in claim 1 wherein said actuator comprises conductive plates which are separated by a compressible or fluid dielectric, such that applying a voltage to said plates causes said plates to attract each other and displace ink, said displacement resulting in ejection of ink drops from said nozzle.

9. An inkjet printhead as claimed in claim 1 wherein the actuator is adapted to apply a strong electric field to the ink, whereupon electrostatic attraction accelerates the drops of ink towards a print medium.

10. An inkjet printhead as claimed in claim 1 wherein said actuator comprises an electromagnet and a permanent magnet, wherein the electromagnet is configured to directly attract a permanent magnet, to cause ejection of, or assists the ejection of ink from said nozzle.

11. An inkjet printhead as claimed in claim 1 wherein said actuator comprises a soft magnetic core and a solenoid adapted to induce a magnetic field in the soft magnetic core, the soft magnetic core having two parts spaced apart such that inducing a magnetic field in the soft magnetic core causes said two parts to attract each other, to cause ejection of or assist the ejection of, ink from said nozzle.

12. An inkjet printhead as claimed in claim 1 wherein the actuator is adapted to use a Lorenz force acting on said actuator to cause ejection of, or assist the ejection of ink from said nozzle.

13. An inkjet printhead as claimed in claim 1 wherein the actuator includes material that exhibit giant magnetostrictive effect, wherein the actuator is adapted to use the giant magnetostrictive effect to cause ejection of, or assist the ejection of ink from said nozzle.

14. An inkjet printhead as claimed in claim 1 wherein said actuator is adapted to use differential thermal expansion upon Joule heating to cause ejection of, or assist the ejection of ink from said nozzle.

15. An inkjet printhead as claimed in claim 1 wherein said actuator comprises a material with a very high coefficient of thermal expansion, such that thermal expansion of the actuator causes ejection of, or assists the ejection of, ink from said nozzle.

16. An inkjet printhead as claimed in claim 1 wherein said actuator comprises a polymer with a high coefficient of thermal expansion which is doped with conducting substances to increase its conductivity such that resistively heating the actuator results in mechanical motion which ejects or assists in ejecting ink from said nozzle.

17. An inkjet printhead as claimed in claim 1 wherein said actuator comprises a shape memory alloy capable of thermal switching between its martensitic state and its austenic state, the switching between states causing the actuator to change shape in order to cause ejection of, or assist in causing ejection of, ink from said nozzle.

18. An inkjet printhead as claimed in claim 1 wherein said actuator is a linear magnetic actuator, wherein activation of the actuator causes ejection of, or assists in causing ejection of, ink from said nozzle.

19. An inkjet printhead as claimed in claim 1 wherein during use, activation of said actuator supplies sufficient kinetic energy to the ink in the chamber to expel a drop of ink from said nozzle.

20. An inkjet printhead as claimed in claim 1 wherein said actuator is capable of directly firing the ink drops from said nozzle, without the assistance of an external field.

21. An inkjet printhead as claimed in claim 1 wherein the actuator has a paddle which pushes on ink in the chamber to eject the ink drops from said nozzle, and a catch for selectively preventing said paddle from moving, such that during use, said printhead is placed in a pulsed magnetic field to cyclically move the paddle when it is not held by the catch.

22. An inkjet printhead as claimed in claim 1 wherein said actuator moves to directly effect ejection of the ink drops without any mechanical amplification of the actuator motion.

23. An inkjet printhead as claimed in claim 1 wherein said actuator is a differential expansion bend actuator capable of converting a high force, low travel mechanism to high travel, lower force mechanism.

24. An inkjet printhead as claimed in claim 1 wherein said actuator is a trilayer bend actuator where the two outside layers are substantially identical.

25. An inkjet printhead as claimed in claim 1 wherein said actuator has a spring and a mechanism to load the spring such that when the mechanism is deactivated, the spring releases to eject the ink drops.

26. An inkjet printhead as claimed in claim 1 wherein said actuator comprises a stacked series of thin thermal bend actuators.

27. An inkjet printhead as claimed in claim 1 wherein said actuator comprises multiple smaller actuators adapted to operate simultaneously to move the ink drops.

28. An inkjet printhead as claimed in claim 1 wherein the actuator has a linear spring for transforming a motion with small travel and high force into a longer travel, lower force motion.

29. An inkjet printhead as claimed in claim 1 wherein said actuator is a coiled bend actuator.

30. An inkjet printhead as claimed in claim 1 wherein said actuator is a bend actuator cantilevered into the chamber from a fixed end, wherein the actuator has a region near the fixed end that flexes more readily than the remainder of said actuator.

31. An inkjet printhead as claimed in claim 1 wherein said actuator has an ink pusher for ejecting the drops of ink, and a controllable catch for to releasably engaging the ink pusher to prevent its movement and thereby the ejection of the drops of ink.

32. An inkjet printhead as claimed in claim 1 wherein said actuator has components operatively coupled by gears such that travel of one component causes an increased travel in another component.

33. An inkjet printhead as claimed in claim 1 wherein said actuator has a moveable part and a buckle plate such that movement of the moveable part results in movement with increased speed or travel of a part of the buckle plate.

34. An inkjet printhead as claimed in claim 1 wherein said actuator comprises a tapered magnetic pole.

35. An inkjet printhead as claimed in claim 1 wherein said actuator has a moveable part, and a lever and fulcrum for transforming the motion of the moveable part.

36. An inkjet printhead as claimed in claim 1 wherein the apparatus further comprises a rotary impellor, wherein the rotary impeller is connected to the actuator.

37. An inkjet printhead as claimed in claim 1 wherein the actuator has a sharp point for concentrating an electrostatic field to cause or assist ink drop ejection from said nozzle.

38. An inkjet printhead as claimed in claim 1 wherein the actuator has a variable volume such that the volume of the actuator is increased in order to eject the ink drop from the nozzle.

39. An inkjet printhead as claimed in claim 1, wherein the nozzles of the array are formed in a flat surface and the actuators move in a direction normal to the surface.

40. An inkjet printhead as claimed in claim 1, wherein the nozzles of the array are formed in a flat surface and the actuators move in a direction parallel to the surface.

41. An inkjet drop ejection apparatus as defined in claim 1 wherein the chamber has a stiff membrane configured for contact with ink in said chamber and the actuator is configured for pushing the stiff membrane.

42. An inkjet drop ejection apparatus as defined in claim 1 wherein said actuator is adapted to rotate an element of said drop ejection apparatus.

43. An inkjet drop ejection apparatus as defined in claim 1 wherein said actuator bends when energized.

44. An inkjet drop ejection apparatus as defined in claim 1 further comprising a pivot, wherein said actuator swivels around the pivot when energized.

45. An inkjet drop ejection apparatus as defined in claim 1 wherein said actuator is normally bent, and straightens when energized.

46. An inkjet drop ejection apparatus as defined in claim 1 wherein said actuator has two elements, such that the actuator bends in one direction when one element is energized, and bends in an opposing direction when the other element is energized.

47. An inkjet drop ejection apparatus as defined in claim 1 wherein said actuator has material that deforms in a shear motion when energized.

48. An inkjet drop ejection apparatus as defined in claim 1 wherein said actuator is coiled, and either coils further, or uncoils when energized.

49. An inkjet drop ejection apparatus as defined in claim 1 wherein said actuator has a middle region that bows or buckles when the actuator is energized.

50. An inkjet drop ejection apparatus as defined in claim 1 wherein said actuator comprises a shutter and two controlling actuators, one of the controlling actuators pulls said shutter, and the other controlling actuator pushes said shutter.

51. An inkjet drop ejection apparatus as defined in claim 1 wherein said actuator comprises a set of actuator members configured to enclose a volume of ink, the actuator members curl when energized to reduce the volume of ink that said set of actuators enclose.

52. An inkjet drop ejection apparatus as defined in claim 1 wherein said actuator comprises a set of actuator members which curl when energized to pressurize ink in said chamber surrounding said set of actuator members, and eject ink from said nozzle.

53. An inkjet drop ejection apparatus as defined in claim 1 wherein the actuator comprises a plurality of vanes configured for enclosing a volume of ink between adjacent vanes, the actuator adapted to simultaneously rotate said vanes when energized in order to reduce the volume of ink between adjacent vanes.

54. An inkjet drop ejection apparatus as defined in claim 1 wherein said actuator is adapted to vibrate at a high frequency.

55. An inkjet drop ejection apparatus as defined in claim 1 wherein said actuator does not move relative to the chamber as it causes ejection of, or assists in causing ejection of, ink from said nozzle.

56. An inkjet drop ejection apparatus as defined in claim 1 wherein the chamber, the actuator and the nozzle are configured such that ink refills the chamber after drop ejection by the surface tension of the ink.

57. An inkjet drop ejection apparatus as defined in claim 1 wherein the actuator has a moveable shutter to impede ink flow from the chamber and the apparatus adapted to cyclically apply pressure to the ink, such that during use, ink refills the chamber after drop ejection by a cycle of positive ink pressure, and said chamber is prevented from emptying during a subsequent cycle of negative ink pressure by the moveable shutter.

58. An inkjet drop ejection apparatus as defined in claim 1 further comprising a second actuator for refilling the chamber with ink.

59. An inkjet drop ejection apparatus as defined in claim 1 further adapted to maintain the ink at a slight positive pressure, wherein during use, ink refills the chamber refills through a combination of both the surface tension of the ink and the slight positive ink pressure.

60. An inkjet drop ejection apparatus as defined in claim 1 further comprising an ink inlet channel to the chamber, the ink inlet channel being long and narrow relative to the dimensions of the chamber such that ink in said chamber is restricted from flowing out during ink drop ejection by viscous drag from the ink inlet channel.

61. An inkjet drop ejection apparatus as defined in claim 1 wherein the chamber has an ink inlet and one or more baffles, such that during drop ejection, ink in said chamber is restricted from flowing out of the ink inlet by the one or more baffles.

62. An inkjet drop ejection apparatus as defined in claim 1 wherein the chamber has an ink inlet and a flexible flap, such that during drop ejection, ink in said chamber is restricted from flowing out of the ink inlet by the flexible flap.

63. An inkjet drop ejection apparatus as defined in claim 1 wherein the chamber has an ink inlet with a cross sectional area smaller than the cross sectional area of said nozzle, such that during drop ejection, ink in said chamber is restricted from flowing out of the ink inlet.

64. An inkjet drop ejection apparatus as defined in claim 1 further comprising a shutter and a second actuator for operating the shutter, and wherein the chamber has an ink inlet such that ink in said chamber is restricted from flowing out of the ink inlet during drop ejection by the shutter.

65. An inkjet drop ejection apparatus as defined in claim 1 wherein the chamber has an ink inlet and the actuator has a part adapted to close the inlet when the actuator is energized, such that during drop ejection, ink in said chamber is restricted from flowing out of the ink inlet.

66. An inkjet drop ejection apparatus as defined in claim 1 further adapted to periodically eject ink from the nozzle, before the ink has time to dry, for preventing ink from drying out in said nozzle.

67. An inkjet drop ejection apparatus as defined in claim 1 further adapted to provide more energy to said actuator than is normally used for drop ejection, for clearing dried or partially dried ink in said nozzle.

68. An inkjet drop ejection apparatus as defined in claim 1 further adapted to energize said actuator in rapid succession for clearing dried or partially dried ink in said nozzle.

69. An inkjet drop ejection apparatus as defined in claim 1 further adapted to provide an enhanced drive to said actuator for clearing dried or partially dried ink in said nozzle.

70. An inkjet drop ejection apparatus as defined in claim 1 further adapted to apply an ultrasonic wave to said ink chamber for clearing dried or partially dried ink in said nozzle.

71. An inkjet drop ejection apparatus as defined in claim 1 further comprising a microfabricated plate with a plurality of posts, such that moving the microfabricated plate toward the nozzle inserts one of the posts into the nozzle, to clear dried or partially dried ink in said nozzle.

72. An inkjet drop ejection apparatus as defined in claim 1 further adapted to temporarily increase the pressure in the chamber such that ink streams from the nozzle to clear dried or partially dried ink from said nozzle.

73. An inkjet drop ejection apparatus as defined in claim 1 further comprising a flexible blade adapted to wipe across the nozzle surface to clear dried or partially dried ink from said nozzle.

74. An inkjet drop ejection apparatus as defined in claim 1 further comprising a heater at the nozzle for clearing dried or partially dried ink in said nozzle by energizing the heater, wherein said heater does not cause or assist the ejection of ink drops.

75. An inkjet drop ejection apparatus as defined in claim 1 wherein the nozzle is formed in a plate fabricated from electroformed nickel.

76. An inkjet drop ejection apparatus as defined in claim 1 wherein said nozzle is an aperture formed by laser ablation.

77. An inkjet drop ejection apparatus as defined in claim 1 wherein the nozzle is formed in a plate that is microfabricated from silicon.

78. An inkjet drop ejection apparatus as defined in claim 1 wherein said nozzle is formed from a glass capillary.

79. An inkjet drop ejection apparatus as defined in claim 1 wherein the nozzle is formed in a surface deposited as a layer using VLSI deposition techniques, wherein the nozzle is etched in said surface.

80. An inkjet drop ejection apparatus as defined in claim 1 wherein the apparatus is formed on and through a substrate, and the nozzle is formed in a layer that is embedded in the substrate wherein said nozzle is etched in said layer.

81. An inkjet drop ejection apparatus as defined in claim 1 wherein the actuator is configured such that ink flows through the actuator when ejecting drops.

82. An inkjet drop ejection apparatus as defined in claim 1 wherein said ink comprises water and a colorant comprising a dye.

83. An inkjet drop ejection apparatus as defined in claim 1 wherein said ink comprises water and a colorant comprising a pigment.

84. An inkjet drop ejection apparatus as defined in claim 1 wherein said ink comprises methyl ethyl ketone.

85. An inkjet drop ejection apparatus as defined in claim 1 wherein said ink comprises an alcohol.

86. An inkjet drop ejection apparatus as defined in claim 1 wherein the ink is solid at room temperature, and is melted before ejection from said nozzle.

87. An inkjet drop ejection apparatus as defined in claim 1 wherein said ink comprises an oil.

88. An inkjet drop ejection apparatus as defined in claim 1 wherein said ink comprises a microemulsion.

* * * * *